United States Patent [19]
Holloway et al.

[11] Patent Number: 4,887,235
[45] Date of Patent: Dec. 12, 1989

[54] SYMBOLIC LANGUAGE DATA PROCESSING SYSTEM

[75] Inventors: John T. Holloway, Belmont; David A. Moon, Cambridge; Howard I. Cannon, Sudbury; Thomas F. Knight; Bruce E. Edwards, both of Belmont; Daniel L. Weinreb, Arlington, all of Mass.

[73] Assignee: Symbolics, Inc., Cambridge, Mass.

[21] Appl. No.: 129,921

[22] Filed: Dec. 3, 1987

Related U.S. Application Data

[63] Continuation of Ser. No. 450,600, Dec. 17, 1982, abandoned.

[51] Int. Cl.[4] .............................................. G06F 9/00

[52] U.S. Cl. ................................ 364/900; 364/951.5; 364/970.4; 364/972.1; 364/967.4

[56] References Cited

U.S. PATENT DOCUMENTS

| | | | |
|---|---|---|---|
| 3,670,307 | 6/1972 | Arnold et al. . | |
| 3,670,309 | 6/1972 | Amdahl et al. . | |
| 4,128,882 | 12/1978 | Dennis | 364/900 |
| 4,130,885 | 12/1978 | Dennis | 364/900 |
| 4,447,875 | 5/1984 | Bolton et al. | 364/200 |

FOREIGN PATENT DOCUMENTS

| | | |
|---|---|---|
| 91-5310 | 10/1972 | Canada . |
| 1017871 | 8/1974 | Canada . |
| 995823 | 8/1976 | Canada . |
| 1023056 | 12/1977 | Canada . |

OTHER PUBLICATIONS

42540/78, 12/14/78, Honeywell Information Systems, Inc.

*Primary Examiner*—Gareth D. Shaw
*Assistant Examiner*—John G. Mills
*Attorney, Agent, or Firm*—Sprung Horn Kramer & Woods

[57] ABSTRACT

A symbolic language data processing system comprises a sequencer unit, a data path unit, a memory control unit, a front-end processor, an I/O and a main memory connected on a common Lbus to which other peripherals and data units can be connected for intercommunication. The system architecture includes a novel bus network, a synergistic combination of the Lbus, microtasking, centralized error correction circuitry and a synchronous pipelined memory including processor mediated direct memory access, stack cache windows with two segment addressing, a page hash table and page hash table cache, garbage collection and pointer control a close connection of the macrocode and microcode which enables one to take interrupts in and out of the macrocode instruction sequences, parallel data type checking with tagged architecture, procedure call and microcode support, a generic bus and a unique insruction set to support symbolic language processing.

6 Claims, 23 Drawing Sheets

TRAP CONTROL CKT.

SYMBOLIC LANGUAGE DATA PROCESSING SYSTEM

This application is a continuation of application Ser. No. 450,600, filed 12/17/82, now abandoned.

BACKGROUND OF THE INVENTION

The present invention relates to a data processing system which is programmable in a symbolic processing language, in particular LISP.

LISP is a computer programming language which originated as a tool to facilitate Artificial Intelligence research. Artificial Intellignce is a branch of computer science that seeks to understand and model intelligent behavior with the aid of computers. Intelligent behavior involves thinking about objects in the environment, how objects relates to each other, and the properties and uses of such objects. LISP is designed to facilitate the representation of arbitrary objects and relationships among them. This design is to be contrasted with that of other languages, such as FORTRAN, which are designed to facilitate computations of the values of algebraic formulae, or COBOL, which is designed to facilitate processing the books and records of businesses.

The acronym "LISP" stands for "List Processing Language", as it was dubbed when Professor John McCarthy of MIT (now of Standford University) invented LISP in the 1950's. At that time, the notion of representing data objects and complex relations beween them by "lists" of storage locations was novel. LISP's motion of "object" has been incorporated into many subsequent languages (e.g., SIMULA 67), but management believes that LISP and the languages derived from it are the first choice of Artificial Intelligence researchers all over the world.

LISP also facilitates the modeling of procedural knowledge (i.e., "how to do something" as opposed to "what something is"). All procedural knowledge is expressed as "functions", computational entitites which "know how" to perform some speciifc action or computation upon supplied objects.

Although the text of LISP functions can be from one line to several thousand lines long, the language imposes no penalty for dividing a program into dozens of hundreds of functions, each one the "expert" in some specific task. Thus, LISP facilitates "modularity", the clean division of a program into unique areas of responsibility, with well-defined interaction. The last twenty years of experience in the computer science community has established the importance of modularity for correct program operation, maintenance and intelligibility.

LISP also features "extensible syntax or notation". This means that language constructs are not limited to those supplied, but can include new constructs, defined by the programmer, which are relevant to the problem at hand. Defining new language constructs does not involve modification of the supplied software, or expertise in its internal detals, but is a standard feature of the language available to the applications (and systems) programmer, within the grasp of every beginner. Through this feature, LISP can incorporate new developments in copmuter science.

LISP frees programmers from the responsibility for the detailed management of memory in the computer. The common FORTRAN and PL/I decisions of how big to make a given array or block of memory have no place in LISP. Although it is possible to construct fixed-size arrays, LISP excels in providing facilities to represent arbitrary-size objects, set of unlimited numbers of elements, objects concerning which the number of details or parameters is totally unknown, and so forth. Antiquated complaints of computers above fixed-size data stores ("ERROR, 100 INPUT ITEMS EXCEEDED") are eliminated in systems written in LISP.

LISP provides an "interactive environment", in which all data (knowledge about what things are and how they are) and functions (knowledge about how to do things) co-exist. Data and functions may be inspected or modified by a person developing a program. When an error is discovered in some function or data object, this error may be corrected, and the correction tested, without the need for a new "run". Correction of the error and trial of the repair may sometimes be accomplished in three keystrokes and two seconds of real time. It is LISP's notion of an interactive environment which allows both novices and experts to develop massive systems a layer at a time. It has been observed that LISP experts enter programs directly without need for "coding sheets" or "job decks"; the program is written, entered, and debugged as one operation. Functions can be tested as they are written and problems found. The computer becomes an active participant in program development, not an adversary. Programs developed in this way build themselves from the ground up with solid foundations. Because of these features, LISP program development is very rapid.

LISP offers a unique blend of expressive power and development power. Current applications of LISP span a broad range from computer-aided design systems to medical diagnosis and geophysical analysis for oil exploration. Common to these applications is a requirement for rapidly constructing large temporary data structures and applying procedures to such structures (a data structure is complex configuration of computer memory representing or modeling an object of interest). The power of LISP is vital for such applications.

Researchers at the M.I.T. Artificial Intelligence Laboratory initiated a LISP Machine project in 1974 which was aimed at developing a state-of-the art personal computer design to support programmers developing complex software systems and in which all of the system software would be written in LISP.

The first stage of the project, was a simulator for a LISP machine written on a timeshared computer system. The first generation LISP machine, the CONS, was running in 1976 and a second generation LISP Machine called the CADR incorporated some hardware improvements and was introduced in 1978, replacing the CONS. Software development for LISP machines has been ongoing since 1975. A third generation LISP machine, the LM-2 was introduced in 1980 by Symbolics, Inc.

The main disadvantages of the aforementioned prior art LISP machines and of symbolic language data processing systems in general, is that the computer hardware architecture used in these systems was originally designed for the more traditional software languages such as FORTRAN, COBAL, etc. As a result, while these systems were programmable in symbolic languages such as LISP, the efficiency and speed thereof were considerably reduced due to the inherent aspects of symbolic processing language as explained hereinbefore.

SUMMARY OF THE INVENTION

The main object of the present invention is to eliminate the disadvantages of the prior art data processing systems which are programmable in symbolic languages and to provide a data processing system whose hardware is particularly designed to be programmable in symbolic languages so as to be able to carry out data processing with an efficiency and speed heretofore unattainable.

This and other objects are achieved by the system according to the present invention which is preferably programmable in symbolic languages and most advantageously in Zetalisp which is a high performance LISP dialect and which is also programmable in the other traditional languages such as FORTRAN, COBAL etc.

The system has many features that make it ideally suited to executing large programs which need high-speed object-oriented symbolic computation. Because the system hardware and firmware were designed in parallel, the basis (macro)instruction set of the system in very close to pure Lisp. Many Zetalisp instructions execute in one microcycle. This means that programs written in Zetalisp on the system execute at near the clock rate of the processor.

The present invention is not simply a speeded-up version of the older Lisp machines. The system features an entirely new design which results in a processor which is extremely fast, but also reboust and reliable. This is accomplished through a myriad of automatic checks for which there is no user overhead.

The system processor architecture is radically different from that of conventional systems and the features of the processor architecture include the following:

- Microprogrammed processor designed for Zetalisp
- 32-bit data paths
- Automatic type-checking in hardware
- Full-paging 256 Mword (1 GByte) virtual memory
- Stack-oriented architecture
- Large, high-speed stack buffer with hardware stack pointers
- Fast instruction fetch unit
- Efficient hardware-assisted garbage-collection
- Microtasking
- 5M words/sec data transfer rate The system according to the present invention comprises a sequencer unit, a data path unit, a memory control unit, a front-end processor, an I/O and a main memory connected on a common Lbus to which other peripherals and data units can be connected for intercommunication. The circuitry present in these aforementioned elements and the firmware contained therein achieved the objects of the present invention. In particular, the novel areas of the system include the Lbus, the synergistic combination of the L-bus, microtasking, centralized error correction circuitry and a synchronous pipelined memory including processor mediated direct memory access, stack cache windows with two segment addressing, a page hash table and page hash table cache, garbage collection and pointer control, a close connection of the macrocode and microcode which enables one to take interrupts in and out of the macrocode instruction sequences, parallel data type checking with tagged architecture, procedure call and microcode support, a generic bus and a unique instruction set to support symbolic language processing.

The stack caching feature of the present invention is carried out in the memory controller which comprises means for effecting storage of data of at least one set of contiguous main memory addresses in a buffer memory which stores data of at least one set of contiguous main memory addresses and is accessible at a higher speed than the main memory. The memory controller also comprises means for identifying those contiguous addresses in main memory for which data is stored in the buffer memory and means receptive of the memory addresses for directly going to the buffer memory and not through the main memory when the identifying means identifies the address as being in the set of contiguous addresses or for going directly to the main memory and not through the buffer memory when the identifying means idenifies the address as not being in the set of contiguous memory addresses.

The central processor of the system which operates on data and produces memory addresses, has means for producing a given memory address corresponding to a base pointer and a selected offset from the base pointer and means for arithmetically combining the given address and offset prior to applying same to the addressing means. Further, the central processing means produces the base pointer and offset in one timing cycle and arithmetically combines the base pointer and offset in the same timing cycle in a preferred manner by providing a arithmetic logic unit which is dedicated solely to this function.

Moreover, the addressing means advantageously comprises means for converting the addresses from the cpu to physical locations in main memory by using the same circuitry as the identifying means.

Further, in order to more efficiently carry out these functions, the cpu has means for liming the offset from the base pointer to within a preselected range and for insuring that the arithmetic combination of the base pointer and offset fall within at least one set of memory addresses. This is advantageously carried out in the compiler which compiles the symbolic processing language into sequences of macrocode instructions.

The parallel data type checking and tagged architecture is achieved by providing the main memory with the ability to store data objects, each having an identifying type field. Means are provided for separating the type field from the remainder of each data object prior to the operation on the data object by the cpu. In parallel with the operation on the data object, means are provided for checking the separated type field with respect to the operation on the remainder of the associated data object and for generating a new type field in accordance with that operation. Means thereafter combine the new type field with the results of the operation. This system particularly advantageously executes each operation on the data object in a predetermined timing cycle and the separating means, checking means and combining means act to separate, check and combine the new type field within the same timing cycle as that of the operation. The system also is provided with means for interrupting the operation of the data processor in response to the predetermined type field that is generated to go into a trap if the type field that is generated is in error or needs to be altered, and for resuming the operation of the data processor upon alteration of the type field.

The page hash table feature is carried out in the system wherein the main memory has each location defined by a multi-bit actual address comprising a page number and an offset number. The cpu operates on data and stores data in the main memory with an associated virtual address comprising a virtual page number and an offset number. The page hash table feature is used to convert the virtual address to the actual address and comprises means for performing a first hash function on the virtual page number to reduce the number of bits thereof to form a map address corresponding to the hashed virtual page number, at least one addressable map converter for storing the actual page number and the virtual page number corresponding thereto in the map address corresponding to the hashed virtual page number and means for comparing the virtual page number with the virtual page number accessed by the map address whereby a favorable comparison indicates that the stored actual page number is in the map converter. Means are also provided for performing a second hash function on the virtual page number in paralell with that of first hash function and conversion and means for applying the accessed actual page number and the original offset number to the main memory when there is a favorable comparison and for applying the second hashed virtual page number to the main memory when the comparison is unfavorable.

In a particularly advantageous embodiment, the converting means comprises at least two addressable map converters each receptive of the map address corresponding to the first hashed virtual page number and means responsive to an unfavorable comparison from all converters for writing the virtual page number and actual page number at the map address in the least recently used of the at least two map converters.

In the event that the first and second hashed addresses do not locate the address, the main memory has means defining a page hashed table therein addressable by the second hashed virtual page number and a secondary table for addresses. The cpu is responsive to macrocode instructions for executing at least one microcode instruction, each within one timing cycle and wherein the converting means comprises means responsive to the failure to locate the physical address in the page hash table for producing a microcode controlled look-up of the address in the secondary table.

A further back-up comprises a secondary storage device, for example a disk and wherein the main memory includes a third table of addresses and the secondary storage device includes a fourth table of addresses. The converting means has means responsive to the failure to locate the address in the secondary table for producing a macrocode controlled look-up of the address in the third table of main memory and then the fourth table if not in the third table, or indicating an error if it is not in the secondary storage device. Another feature provides means for entering the address in all of the tables where the address was not located.

The hardware support for the key feature of the close interrelationship between the microcode and macrocode comprises an improvement in the cpu wherein means are provided for defining a predetermined set of exceptional data processor conditions and for detecting the occurrence of these conditions during the execution of sequences of macrocode instructions. Means are responsive to the detection of one of the conditions for retaining a selected portion of the state of the data processor at the detection to permit the data processor to be restarted to complete the pending sequence of macrocode instructions upon the removal of the detected condition. Means are also provided for initiating a predetermined sequence of macrocode instructions for the detected condition to remove the detected condition and restore the data processor to the pending sequence of macrocode instructions. In a particularly advantageous embodiment, the means for initiating comprises means for manipulating the retained state of the data processor to remove the detected condition and means for regenerating the nonretained portion of the state of the data processor.

The cpu has means for executing each macrocode instruction by at least one microcode instruction and the means defining the set of conditions and for detecting same comprises means controlled by microcode instructions. Moreover, the means for retaining the state of the data processor comprises means controlled by microcode instructions and the means for initiating the predetermined sequence of macrocode instructions comprises means controlled by microcode instructions.

Another important feature of the present invention is the unique and synergistic combination of the Lbus, the microtasking, the synchronized pipelined memory and the centralized error correction circuitry. This combination is carried out in the system according to the present invention with a cpu which executes operations on data in predetermined timing cycles which is synchronous with the operation of the memory and at least one peripheral device connected on the Lbus. The main memory has means for initiating a new memory access in each timing cycle to pipeline data therein and thereout and the cpu further comprises means for storing microcode instruction task sequences and for executing a microcode instruction in each timing cycle and means for interrupting a task sequence with another task sequence in response to a predetermined system condition and for resuming the interrupted task sequence when the condition is removed. The Lbus is a multiconductor bidirectional bus which interconnects the memory, cpu and peripherals in parallel and a single centralized error correction circuit is shared by the memory, cpu and peripherals. Means are provided for controlling data transfers on the bus in synchronism with the system timing cycles to define a first timing mode for communication between the memory and cpu through the centrallized error correction circuit and a second timing mode for communication between the peripheral device and the cpu and thereafter the main memory through the centrallized error correction circuit. In accordance with this combination of features, data is stored in main memory from a peripheral and data is removed from main memory for the peripheral at a predetermined location which is based upon the identification of the peripheral device. Moreover, the cpu has means for altering the state of the peripheral device from which data is received, depending upon the state of the system.

The feature of the generic bus is provided to enable the system according to the present invention, having the cpu in main memory connected by a common system bus to which input and output devices are connectable, to communicate with other peripherals and computer systems on a second bus which is configured to be generic by providing first interfacing means for converting data and control signals between the system bus and the generic bus formats to effect transmission between the system bus and the generic bus and second interfacing means connected to the generic bus for converting data and control signals between the generic bus and a selected external bus format to permit data and control signal transmissions between the system bus and the peripherals of the selected external bus type. A key feature of this generic bus is that the first interfacing means converts data and control signals independently of the external bus that is selected. Thus the first interfacing means includes means for converting the control signals and address of an external bus peripheral from the system bus format to the generic bus format independently of the control signal and address format of the external bus.

The pointer control and garbage collection feature associated therewith is carried out by means for dividing the main memory into predetermined regions, means for locating data objects in the regions and means for producing a table of action codes, each corresponding to one region. A generated address is then applied to the table in parallel with the operation on that address to obtain the action code associated therewith and means are provided which are responsive to the action code for determining, in parallel with the operation on the address, if an action is to be taken. In a particular advantageous embodiment, the action code is obtained and the response thereto is determined within the same timing cycle as that of the operation on the address. This is done by controlling the determining means by microcode instructions.

The cpu includes means for executing a sequence of macrocode and microcode instruction sequences to effect garbage collection in the system by determining areas of memory to be garbage collected and wherein the means for producing the action code table produces one action code which initiates the garbage collection sequences. In accordance with the invention, the garbage collection is effected by means for examining the data object at a generated address to see if it was moved to a new address, means for moving the data object to a new address in a new region if it was not moved, means for updating the data object at the generated address to indicate that it was moved, and means for changing the generated address to a new address if and when the data object is moved and for effecting continuation of the operation on the data object of the generated address.

The system according to the present invention provides hardware support for garbage collection which enables it to carry out this garbage collection sequence in a particularly efficient manner by dividing the main memory into pages and providing storage means having at least one bit associated with each page of memory. The given address is thereafter located in a region of memory and means are provided for entering a code in the at lest one bit for a given page in parallel with the locating of the address in a region of memory to indicate whether an address therein is in a selected set of regions in memory.

This means for entering the code comprises means for producing a table of action codes each corresponding to one region of memory. An address is applied to the table and parallel with the locating thereof and means are provided for determining if the address is in one of the selected set of regions in response to its associated action code. The garbage collection is effected in the set of memory regions by reviewing each page and means sense the at least one bit for each memory page to enable the reviewing means to skip that page when the code is not entered therein.

The bus system in accordance with the present invention is another feature of the present invention which, in the context of the system according to the present invention includes the data processor alone, the data processor in combination with peripherals and peripheral units which have the means for communicating with the data processor on the Lbus. The data processor includes bus control means for effecting all transactions on the bus in synchronism with the data processor system clock and with a timing scheme including a request cycle comprising one clock period wherein the central processor produces a bus request signal to effect the transaction and within the same clock period puts the address data out on the bus. The request cycle is followed by an active cycle comprising at least one next clock period wherein the peripheral unit is accessed. The active cycle is followed by a data cycle comprising the next clock period and wherein data is placed on the bus by the peripheral unit. The bus control means also has means defining a block bus transaction mode for receiving a series of data request signals from the central processor in consecutive clock periods and for overlapping the cycles of consecutive transactions on the bus.

The Lbus control according to the present invention also has means for executing microdirect memory access transfer to achieve communication between a peripheral device and the cpu and thereafter the main memory. In a particularly advantageous embodiment of the present invention, a single centralized error correction circuit is shared by the memory, central processor and peripheral device and all data transfers over the bus are communicated through the single centralized error correction circuit.

Thus, a data unit for use with a data processing system according to the present invention has means therein which is responsive to a transaction request signal on the bus for receiving address data in a request cycle comprising one system clock period, means for accessing address data in an active cycle comprising at least one system clock period and for producing a weight signal when more than one system clock period is necessary and means for applying data to the bus in a data cycle comprising the next system clock period. The data unit also may comprise means for receiving request signals in consecutive clock periods and for overlapping the request, active and data cycles for consecutive transactions.

A data unit in accordance with the present invention, is also able to effect data transfers on the bus in synchronism with the system timing cycle under microcode control to effect a micro DMA data transfer.

These and other objects, features and advantages of the present invention are achieved in accordance with the method and apparatus of the present invention as disclosed in more detail hereinafter with regard to the attached appendix including a microcode listing, a listing of the microcode bits, the microcode compiler, the front end processor program, a summary of the list implementation language and listings of the program array logic devices referred to in the attached system drawings, wherein:

DETAILED DESCRIPTION OF THE INVENTION

Figure 1:
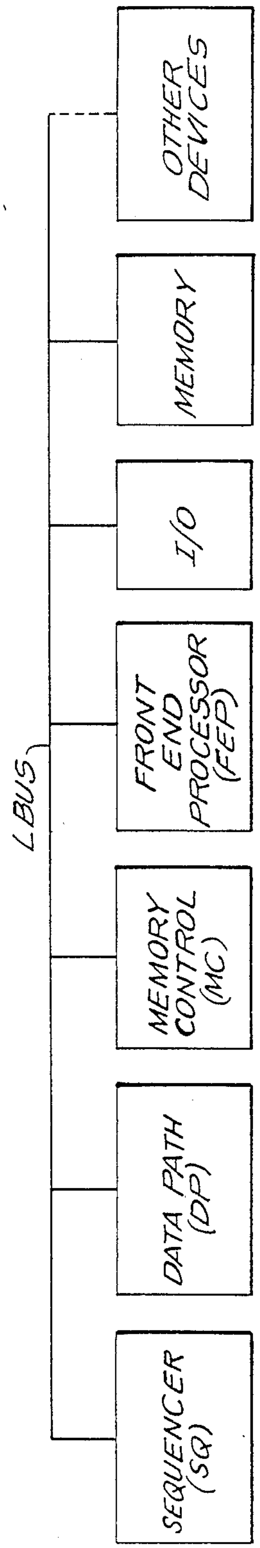
FIG. 1 is a block diagram of the system according to the present invention.

FIG. 1 is a block diagram of the system according to the present invention. As shown therein, the basic system of the present invention includes a sequencer SQ, a data path unit DP, a memory controller MC, a front end processor FEP an I/O unit and the main memory all connected in parallel on a common bus called the Lbus. As is also shown therein, other devices such as peripherals and the like can be connected in parallel along the Lbus.

The basic system includes a processor cabinet having reserved, color-coded slots are provided on the L bus backplane for the DP-ALU, SQ, FEP, IO and IFU-MEM boards. The rest of the backplane is undedicated, with 14 free 36 bit slots on the basic system. Plugging a memory board into an undedicated slot sets the address of that board. There are no switches on the boards for this purpose. For diagnostic purposes, the FEP can always tell which board is plugged into what slot it can even tell the serial number of the board.

No internal cables are used in the system. All board-level interconnections are accomplished through the backplane. An external cable is provided for connecting a console to the processor cabinet.

While the system according to the present invention is physically configured by components in the manner set forth in FIG. 1, many of the novel features of the system have elements thereof on one or more of the system components. Thus the system components will be described with respect to the function of the detailed circuitry contained therein followed by the operation of the system features in terms of these circuit functions.

SEQUENCER

Figure 2:
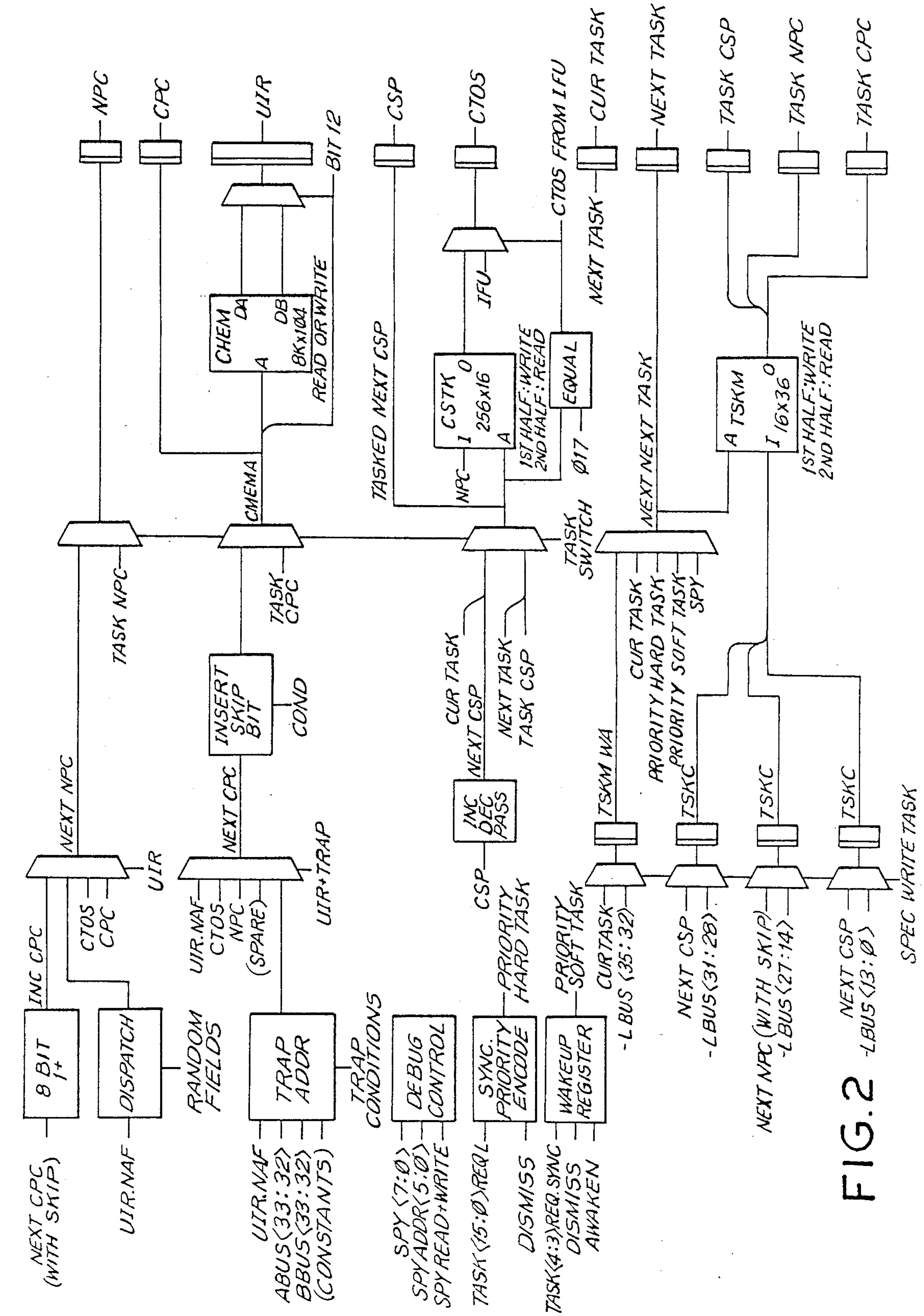
FIG. 2 is a block diagram of the sequencer of FIG. 1.

The sequencer is shown in block diagram form in FIG. 2.

The sequencer controls the operation of the machine, that is, it implements the microtasking. In carrying this out, it utilizes an 8K×112 microcode control memory.

Each 112-bit microcode instruction specifies two 32-bit data sources from a variety of internal scratchpad registers. There is normally no need for one to write microprograms, since many Zetalisp instructions are executed in one microcycle.

The system micromachine is time-division multiplexed. This means that the processor performs housekeeping operations such as driving the disk in addition to executing macroinstructions. This has the advantage of providing a disk controller and other microtasks with the full processing capability and temporary storage of the system micromachine. The close coupling between the micromachine and the disk controller has been proven to be a powerful feature.

Up to eight different hardware tasks can be activated. Control of the micromachine typically switches from one task to another every few microseconds. The following other tasks run in the system:

Zetalisp emulator task—executes instructions

Disk transfer task—fetches data from main memory and loads the disk shift-register; handles timing and control for the disk sequencing.

Ethernet handshaking and protocol encoding and decoding, where Ethernet is a local-area-network for communication between computer systems and peripherals, and their users. The physical structure of the Ethernet is that of a coaxial cable connecting all the nodes on the network.

The FEP and microdevices (i.e., those devices serviced by microcode, such as the disk controller and the Ethernet controller) can initiate task switches on their own behalf. The task priority circuitry on the sequencer board determines the priority of the microtasks. Multiple microcontexts are supported, eliminating the need to save a microtask's context before switching to another.

More specifically, the sequencer includes tasks state capture circuitry, task state memory for storing the tasks state, a task state parity, a task memory output register and a task priority circuit which determines the priority of 16 tasks which are allocated as follows:

- Tasks 8-15 DMA or I/O tasks. Assigned to devices during boot time wakeup requests come from open-collector bus lines.
- Task 7 Not used. The task state memory for this task is available for the FEP to clobber for debugging purposes. The only way this can become the current task is by the FEP forcing it.
- Tasks 1, 2, 5, 8 Software. Wakeup requests are in a register; bit n can be set by doing a special function. One of these tasks is the background service task for all DMA tasks (set up next address and word count); the others remain unassigned.
- Task 4 Low-speed devices; wakeup request from open-collector bus line.
- Task 3 FEP service (wakeup settable by FEP)
- Task 0 Emulator, Wakeup request is always true.

DMA tasks normally only run for 2 cycles per wakeup. The first cycle emits the physical address from A memory, increments it, does DISMISS, and skims on a condition from the device (e.g. error or end of packet). The second cycle decrements the word count and skips on the result (into either the normal first cycle or a "last" first cycle). The data transfer between device and memory takes place over the Lbus under control of the memory control. The "last" first cycle is the same as normal, but its successor sets a "done" flag and wakes up the background service task. It also turns off wakeup-enable in the device so more transfers don't try to happen until the next DMA operation is set up. For some devices there is double buffering of DMA addresses and word counts, and there are two copies of the DMA microcode; each jumps to the other when its word count is exhausted. Processing by the background service task is interruptible by DMA requests for other devices.

Tasks 1, 2, 5, 6, the software requested tasks, are only useful as lowered-priority continuations of higher-priority tasks. They would not normally be awakened by the Emulator (although START-I/O would do that).

Wakeup requests for the hardware tasks (8-15) are open-collector lines on the bus. These are totally unsynchronized. Each device has a register which contains a 3-bit task number and 1-bit tasking-enable; task numbers are assigned to devices according to the desired priority. A wakeup in the absence of enable is held until enable is turned on. Once a device has asserted its wakeup request, it should remain asserted (barring changing of enable or the assigned task number) until the request is dismissed. The request must then drop an adequate time before the end of that microinstruction cycle, so that 2 cycles later it will be gone from the synchronizer register and the task will not wake up again.

Delay from wakeup request to clock that finishes the first microinstruction of service is 4 to 5 cycles (or about a microsecond) if this is the highest priority task and no tasking-inhibit occurs. Really high speed devices may set their wakeup request 600 ns early. The processor synchronizes and priority-encodes the wakeup requests and Dismissing is different for hardware and software tasks. When a hardware task is dismissed it executes one additional microinstruction when a software task is dismissed it executes two additional microinstructions. The hardware task timing is necessary so that a DMA task can wake up and run for only two cycles.

If a dismiss is done when a task switch has already been committed, such that the microinstruction after the dismiss is going to come from a different task, then the machine goes ahead and dismisses. This means that the succeeding microinstruction, which would normally be executed immediately, will not be executed until the next time the task wakes up. This does not apply to a task which dismisses as soon as it wakes up, such as a typical DMA task; since a task will not be preempted by a higher-priority task immediately after a task switch, when a task wakes up it is always guaranteed to run for at least 2 cycles.

Task-switch timing/sequencing is as follows:

First cycle, first half:

Prioritize synchronized task requests. Hardware task requests are masked out of the priority encoder if they are being dismissed this cycle.

First cycle, second half:

Selected task to NEXT NEXT TASK lines. If this differs from current task, NEXT TASK SWITCH asserted. Fetch state of selected task into TASK CPC, TASK NPC, TASK CSP registers. Just before clock, decide whether to really switch tasks or to stay in the same task, in which case the TASK CPC, etc. registers don't matter, and NEXT TASK SWITCH is turned off.

Second cycle, both halves:

TASK SWITCH asserted. TASK CPC selected onto CMEM A: fetch first microinstruction and new task. TASK NPC selected into NPC register. CPS gets CMEM A which is TASK CPC. TSKC register gets NEXT CPC, NEXT NPC, NEXT CSP, and CUR TASK lines. NEXT TASK lines have new task number.

Second cycle, second half:

Control-stack addressed by NEXT TASK and TASK CSP: CTOS gets top of new stack (unless switching to emulator and stack empty, gets IFU in that case). CSP gets TASK CSP.

Third cycle, both halves:

Execute first microinstruction of task. Fetch second microinstruction of task. If only waking up for 2 cycles (dismiss is asserted), choose next task this cycle (line first cycle above).

Third cycle, first half:

Task memory written from TSKC (save state of old task). Address is TSKM WA which got loaded from CUR TASK during second cycle.

Fourth cycle:

Execute second microinstruction of task. If only woke up for 2 cycles, TASK SWITCH is asserted and we do not choose another new task this cycle.

Another feature of the sequencer circuitry is trap addressing. The sources of traps are mostly on the data path board, with the memory control providing the MAP MISS TRAP. Slow jumps all come from the data path board. The sequencer executes normally if no trap or slow jump condition is present. With regard to the trap address interpretation:

Bit 12 is the skip bit; Bits 8–11 are the dispatch bits. Bits 0–7 are capable of incrementing. Thus each macroinstruction gets 4 consecutive control-memory locations; although there is a next-address field in the microinstruction. It is used for many things and so consecutive addressing is often important. It is also possible for most macroinstructions to skip into their consecutive addresses (except for the small opcodes where this conflicts with a wired-in trap address).

In order to do a dispatch, it is nexessary to find a block of 16 locations (in bits 8–11) which are not in use: this is done either by finding a block of opcodes that don't use all 4 of their consecutive locations, or by turning on bit 12 (there are a few dispatches that skip at the same time).

Each task gets 16 locations of control-stack since adders and multiplexors come in 4-bit increments. The CADR doesn't use the top half of its 32-location stack much. Really only 15 locations of control-stack may be used, because the memory is written on every cycle whether or not you PUSHJ.

The CSP register always points at the highest valid location in the stack. Thus it contains 17 when the stack is empty. We do write-before-read rather than read-before-write on this machine, however there is pipelining through the CTOS register. In fact a 1-instruction subroutine will work.

When the emulator stack is empty (CSP-17 and the emulator task is in control), there is an "extra" stack location which contains the next-instruction address from the IFU. POPJing to this location generates the NEXT INST signal and refrains from decrementing the stack pointer (leaves it 17 rather than making it 16). NEXT INST tells the IFU to advance and does one or two other random things (it clears the stack-adjustment counter in the data path).

In the first half of each cycle, NPC is written into the next free location (for the current task) in the control-stack. This is 1+ the location CSP points at. NPC usually contains 1+ the control-memory address from which the currently-executing microinstruction came.

In the second half of each cycle, the top of the control-stack is read into the CTOS register. In the next cycle, CTOS and CSP will agree with each other. When switching tasks, we read from the new task's stack.

Note that what happens when we POPJ, results from the pipelining. In the cycle before the PIPJ, the subroutine return address (or IFU next-instruction address) was read into the CTOS register; this came from the stack location pointed to by CSP if the previous cycle did not PUSHJ or POPJ. Now when we POPJ we decrement CSP and read the next lower subroutine return address into CTOS, in case the next cycle also POPJs. When POPJ goes to the next macroinstruction, CSP is not decremented and CTOS is loaded with the address for the macroinstruction after that.

Trapping forces a "PUSHJ" so that NPC gets saved. Slow-jump does the same, whether or not you wanted it. If we trap out of a POPJ, we change our mind and increment CSP rather than decrementing it. CTOS gets loaded with the NPC that we saved.

The control stack may be popped without jumping to it by specifying POPJ but not specifying for the control-memory address to come from CTOS.

To sum up what happens on the NEXT CSP lines, which are both the input to the CSP register and the address for control-memory, we first ignore tasking to keep things simple:

In the first half of each cycle, NEXT CSP contains CSP+1.

In the second half of each cycle, NEXT CSP contains CSP normally, but contains CSP-1 in the event of a POPJ or CSP+1 in the event of a PUSHJ. A POPJ that causes NEXT INST generates CSP rather than CSP-1. A trap or slow jump generates CSP+1, like PUSHJ.

The first half is a write and the second half is a read.

In the first half of each cycle, the high bits are the current task; in the second half the high bits are the next task and the low bits may get swapped with the next task's CSP.

When pclsring out of a trapped instruction, it is necessary to set the CSP back to −1. This is done by using the -CTOS CAME FROM IFU skip condition, which is true when CSP-1 and this is the emulator task. One can POPJ (without using the CTOS as the microinstruction address source) until this condition becomes true.

TABLE 1

| Microcode Control of Sequencer |
|---|
| U SEQ <1:0> |
| 0 no function |
| 1 pushj (i.e. increment CSP) |
| 2 dismiss current task |
| 3 popj (i.e. decrement CSP) |
| This field is effectively forced to 0 when the sequencer is stopped, and forced to 1 when a trap or slow jump is taken. |
| U CPC SEL <1:0> |
| Selects address from which next microinstruction will be taken, except for bit 12 which may be selected from -COND (skip). |
| 0 NAF (next-address-field of current instruction) |
| 1 CTOS (control-stack or IFU, normally used together with POPJ) |
| 2 NPC (take-dispatch, restore from trap) |
| 3 (spare) |
| A trap or slow jump supplies an address and ignores this field. |
| U NPC SEL |
| Selects source for loading NPC register. |
| Normally: |
| 0 NAF modified by dispatch in bits 11:8 |
| 1 NEXT CPC + 1 (only the low 8 bits increment) |
| With SPEC NPC SEL 1 and MAGIC = 3 (or 0 on rev-3 board). |
| 0 CTOS (restore from trap) |
| 1 CPC (forced when taking trap or slow jump) |
| U NAF <13:0> |
| Next-address field |

TABLE 1-continued

| Microcode Control of Sequencer |
|---|
| These fields also used by data-path: |
| U COND FUNC <1:0> |
| 0 nothing |
| 1 SKIP (CMEM A 12 gets -COND) |
| 2 (TRAP IF COND) |
| 3 (TRAP IF -COND) |
| U SPEC <4:0> |
| 30 ARITHMETIC TRAP WITH DISPATCH |
| (If trap to address in NAF, bits 11-8 |
| get replaced by high type bits of Abus and Bbus.) |
| 31 HALT |
| Stops the machine after executing this microinstruction. |
| 32 NPC MAGIC |
| Modifies U NPC SEL above, also allows connection between the data path and the sequencer (see MICROINSTRUCTION.BITS). |
| 33 AWAKEN TASK |
| Set wakeup for software task selected by U MAGIC <1:0> |
| 34 WRITE TASK |
| Write task memory from address and data on Obus. |
| 35 TASK DISABLE |
| Forces the current task to be the same in the cycle after next as in the next cycle. Because of this pipelining, you need to do this function twice in a row before it really takes effect. |

The clocking circuitry shown in FIGS. 35 and 36 effects controls of the tasking of the machine.

The data path board always gets an ungated clock. Decoding of the microinstruction is modulated by NDP where necessary.

NDP is the DR of nop due to taking a trap, nop due to the machine waiting (see below), and nop due to the machine being stopped, either by the FEP or by a parity error or by a halt microinstruction.

Waiting is a kind of temporary stop. When the machine is waiting it continuously executes the same microinstrution without side-effects, until either the wait condition goes away or it switches tasks (other tasks might not need to wait). Upon return from the task switch the same microinstruction is executed again. Waiting is used to synchronize with the memory and IFU; a wait occurs if the data path asks for data from memory that hasn't arrived yet not in the temporary memory control, if an attempt is made to start a memory cycle when the memory is busy. If an attempt is made to do a microdevice operation when the bus is busy, or if the address from the IFU is being branched to (this is the last microinstruction of a macroinstruction) of a macroinstruction) and the IFU says that the address is provided (in the previous cycle) was bad.

The wait decision has to be made during the first half of the cycle, because it is used to gate the clock in some places.

A wait causes a NDP, inhibiting side-effects of the microinstruction, but only partially inhibits task switching in the sequencer. If a task switch was scheduled in the previous cycle, i.e. TASK SWITCH is asserted, then the sequencer state (CPC, NPC, UIR, CSP) is clocked from the new task's state, but the old task's state is not saved; thus the current microinstruction will be executed again when control returns to this task. If no task switch was scheduled, the sequencer state remains unchanged and the microinstruction is immediately retried. During a wait new task wakeups are still accepted and so the wait can be interrupted by a higher-priority task; when that task dismisses the waiting microinstruction will be retried.

A trap causes a NDP, inhibiting the side-effects of the microinstruction, but when a trap occurs, the sequencer still runs. The cycle is stretched to double-length so that the control-memory address may be changed to the trap addresses. Trapping interacts correctly with tasking. The cycle is still stretched to double length when though the actual control-memory address is not changing. The revised contents of the NEXT CPC lines (the trap address) gets written into the task-state memory. Note that NDP is not valid before the leading edge of the clock, and cannot be used to gate the clock.

In order for the memory control, which needs to decide whether to start a memory cycle well in advance of the clock, to work, things cannot be be this simple. NDP actually consists of an early component and a late component. The early reasons for NDP are stable by less than 50 ns after the clock and can inhibit the starting of a memory cycle. These include the machine being halted, LBUS WAIT, and wait due to interference for the Lbus. The latter signal is actually a little slower, but the memory control sees it earlier than NDP itself does and hence stabilizes sooner.

The late reasons for NDP are always false while the clock is de-asserted. After the leading edge of the clock, NDP can come on to prevent side-effects of the current microinstruction. If a memory cycle has been started, it cannot be stopped, however a write will be changed into a read. Except when there is a map miss NDP will stop it before the trailing edge of the clock. The late reasons for NDP are traps, parity errors, and the half microinstruction. All hardware errors are late because control-memory parity takes too long to check, but it is desirable to stop before executing the bad microinstruction rather than after, so that wrong parity in control memory may be used as a microcode breakpoint mechanism.

Control-memory parity is computed quickly enough to manage to stop the sequencer clocks (but not quickly enough to turn on NDP and distribute it throughout the processor—and all the signals that derive from NDP—before the leading edge of the clock).

All this is implemented by having a variety of clocks on the memory-control and sequencer board, gated by various conditions.

CLK—the main clock, which never stops.

SQ CLK—clock for the main sequencer state (CPC, NPC, CSP, CUR TASK). This is stopped by WAIT unless switching tasks.

UIR CLK—like SQ CLK but also clocked by single-step even if sequencer stepping is not enabled.

TSK CLK—like SQ CLK but not stopped by WAIT.

TSK CLK A-IDENTICAL TO TSK CLK; an electrically separate copy.

TSKC CLK—clock for the task-state-capture register. Like SQ CLK but always stopped by WAIT.

The CTOS register is clocked by TSK CLK. It can't be clocked by SQ CLK because when the machine is waiting for the IFU the new address from the IFU must be clocked in. It shouldn't be clocked by CLK because when a parity error occurs in the control stack, it is desirable to be able to read this register before it changes.

Table 2 shows clocking conditions (assuming the machine is not stopped by the FEP and not stopped by an error).

TABLE 2

| DWTS | State | CTDS | CUR TASK | NEXT TASK | Capture | OPC | NOP | Error |
|---|---|---|---|---|---|---|---|---|
| — | clk | clk | clk | clk >= | clk | clk | no | clk |
| D— | clk | clk | clk | clk < | clk | clk | no | clk |
| -W— | hold | clk | hold | clk >= | no | clk | yes | clk |
| DW– | hold | clk | hold | clk >= | no | clk | yes | clk |
| –T- | clk | clk | clk | clk >= | clk | clk | yes | clk |
| D-T- | clk | clk | clk | hold | clk | clk | yes | clk |
| -WT- | hold | clk | hold | clk >= | no | clk | yes | clk |
| DWT- | hold | clk | hold | hold | no | clk | yes | clk |
| —S | clk | clk | clk | hold | clk | clk | no | clk |
| D–S | clk | clk | clk | clk = | clk | clk | no | clk |
| -W-S | clk | clk | clk | hold | no | clk | yes | clk |
| DW-S | clk | clk | clk | hold | no | clk | yes | clk |
| –TS | clk | clk | clk | hold | clk | clk | yes | clk |
| D-TS | clk | clk | clk | hold | clk | clk | yes | clk |
| -WTS | clk | clk | clk | hold | no | clk | yes | clk |
| DWTS | clk | clk | clk | hold | no | clk | yes | clk |

DISMISS = (task voluntarily going away, after 1 (or 2) more microinstructions)
W = MC WAIT (NOP this microinstruction and try it again, on demand of memory control)
T = Trap (Double-length cycle, NOP this microinstruction, take different successor)
S = TASK SWITCH (next microinstruction from different task)
State = UIR, NPC, CPC, CSP
Capture = task-state capture registers
Error = hardware error registers When the machine is stopped, it is possible to single-step the sequencer and the data path either separately or together, and to read and write the microinstruction register without disturbing any state. This makes it possible to save and restore the complete state (save the UIR, step just the sequencer to bring all of its state to the spy bus, then execute microinstructions to read the data-path state). It is possible to run the machine at full speed with control-memory disabled, so that the UIR doesn't change, to make one-microinstruction scope loops. It is also possible to run the data path at full speed with the sequencer stopped, which may or may not be useful.

The FEP controls this via the control register on SQCLKC, which is cleared when the machine is reset:

| | |
|---|---|
| 0 RUN | Set to 1 to let the machine run freely |
| 1 STEP | Set to 0 then to 1 to clock the machine once |
| 2 ENABLE DP | If 0, STEP doesn't affect the data path |
| 3-ENABLE SQ | If 1, STEP and RUN don't affect the sequencer except UIR |
| 4 ENABLE CHEM | If 1, UIR from CMEM, else from CMEM WD register |
| 5 CHEM WRITE | If 1, write control-memory |
| 6 ENABLE TRAP | If 1, trap conditions set nop and change cmem address |
| 7 ENABLE ERRHALT | If 1, parity error will inhibit RUN |
| 8 ENABLE TASK | If 1, enables task scheduling, if 0 the |
| 9–12 TASK | task number is forced from these bits here |
| 13 ENABLE WP | Enable write-pulse to task and control- |
| 14 | stack memories spare |
| 15 | spare |

When writing control-memory, CMEM ENB must be 0 to inhibit the RAM outputs and trapping must be disabled so that the control-memory address is stable. Normally UIR would be set up to source the appropriate address.

Trapping (i.e. branching to a special address and nop'ification) does not occur if TRAP ENB is zero. Note that when trapping is enabled reading the NEXT CPC lines isn't too useful since they alternate between the normal address and the trap address in every cycle.

When the sequencer is stopped, the following do not change:

CSP, CPC, NPC, CTOS, CUR TASK

The following do not change when the sequencer is stopped, except that single-stepping changes them regardless of ENABLE SQ:

UIR

If you don't want the UIR to change, you disable control memory and store the appropriate value in the CMEM WD register, which will then be loaded into UIR.

The task registers are clocked on every clock, regardless of whether the sequencer is running. These are the registers after the task memory. The registers before the task memory clock only if the state of the sequencer is to be saved, i.e. if the sequencer is running or being single-stepped is to be saved, i.e. if the sequencer is running or being single-stepped and MC WAIT is not true. All of the main sequencer state registers, including the current task, clock only when the sequencer is running. The FEP can control whether the task chosen when the sequencer is running or single-stepping comes from the task scheduler or a task number supplied by the FEP.

Lastly the sequencer includes diagnostic circuitry including the error half circuit in FIG. 37 and the debug history circuit in FIG. 38 which is part of the spy bus network.

The diagnostic interface to the system includes the Spy bus. This is an 8-bit wide bus which can be used to read from and write to various portions of the 3600 processor. The readable locations in the processor allow the FEP to "spy" on the operation of the cpu, hence the name "Spy bus". Using the Spy bus, the FEP can force the processor to execute microinstructions, for diagnostic purposes.

When diagnostics are not running, the FEP uses the Spy bus as a special channel to certain DMA devices. Normally, the FEP uses the SPy bus to receive a copy of all incoming Ethernet packets. It can also set up and transfer to the Ethernet and read from the disk via the Spy bus.

Table 3 shows the spy functions on the sequencer board:

TABLE 3

SPY WRITE CMEM0,1, . . .,13 WD

Write an 8-bit slice of the CMEM WD register. This register is a source of write data for control-memory and also a source of microinstructions into UIR when cmem is disabled.

SPY READ CMEM0,1, . . .,13

Read an 8-bit slice of UIR (which typically contains data from CMEM).

SPY WRITE CTL1,2

Write sequencer control & clock register described above. This has two spy functions since it is a 16-bit register; the CTL1 is the least-significant byte.

SPY READ NEXT CPC (2 addresses)

Read NEXT CPC lines, which are the control-memory address in the absence of tasking. Allows reading NPC, CTOS, trap address, U NAF, To read the CPC you must first single-step it into the NPC. To control the NEXT CPC selection you force a microinstruction into the UIR.

SPY READ SQ STATUS (2 addresses)

Read error halt conditions as a 16-bit word:

| | |
|---|---|
| 7 AU STOP | 15 -ERRHALT |
| 6 MC STOP | 14 TSK-STOP |
| 5 BMEM PAR ERR | 13 CTOS CAME FROM IFU |
| 4 AMEM PAR ERR | 12 CMEM (UIR) PAR ERR |
| 3 PAGE TAG PAR ERR | 11 TASK MEM PAR ERR |
| 2 TYPE MAP PAR ERR | 10 CTOS (LEFT) PAR ERR |
| 1 GC MAP PAR ERR | 9 CTOS (RIGHT) PAR ERR |
| 0 (spare) | 8 MICROCODE HALT |

SPY READ TASK

<3:0> are CUR TASK

SPY READ SQ STATUS2

More status:
1-0 are the CTOS parity bits

SPY READ SQ BOARD ID

Read the board-ID prom (gives serial number, ECO level, etc.) Address comes from the U AMRA <4:0> field of UIR

SPY READ DP BOARD ID

Read the board-ID prom on the datapath board (the spy address is decoded by the sequencer).

SPY READ OPC1,2

Reads PC history memory.
This is a 16 entry RAM where each entry contains a PC in bits <13:0>, bit <14> = -NOP for that microinstruction, and bit <15> = 1 if the next microinstruction came from a different task. The OPC memory reads out backwards (i.e. with the sequencer stopped, the first read gets you the last instruction executed, the next read gets you the instruction before that, etc.) After 16 reads it is back in its original state Because you can only read this one byte a time (reading either byte decrements the address counter) you have to first read all 16 even bytes and then read all 16 odd bytes).

DATA PATH

Figure 3:
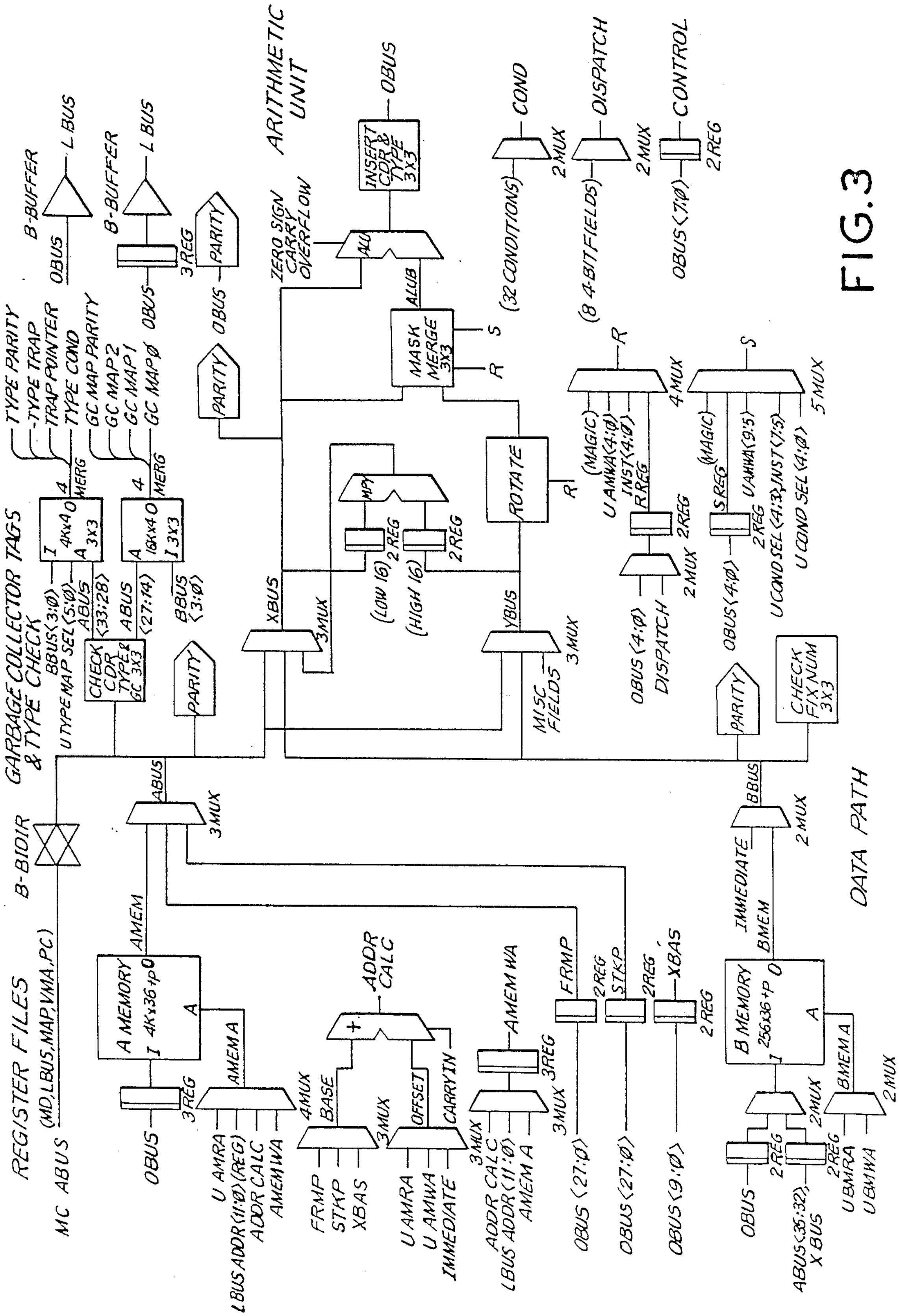
FIG. 3 is a block diagram of the data path of FIG. 1.
Figure 4:
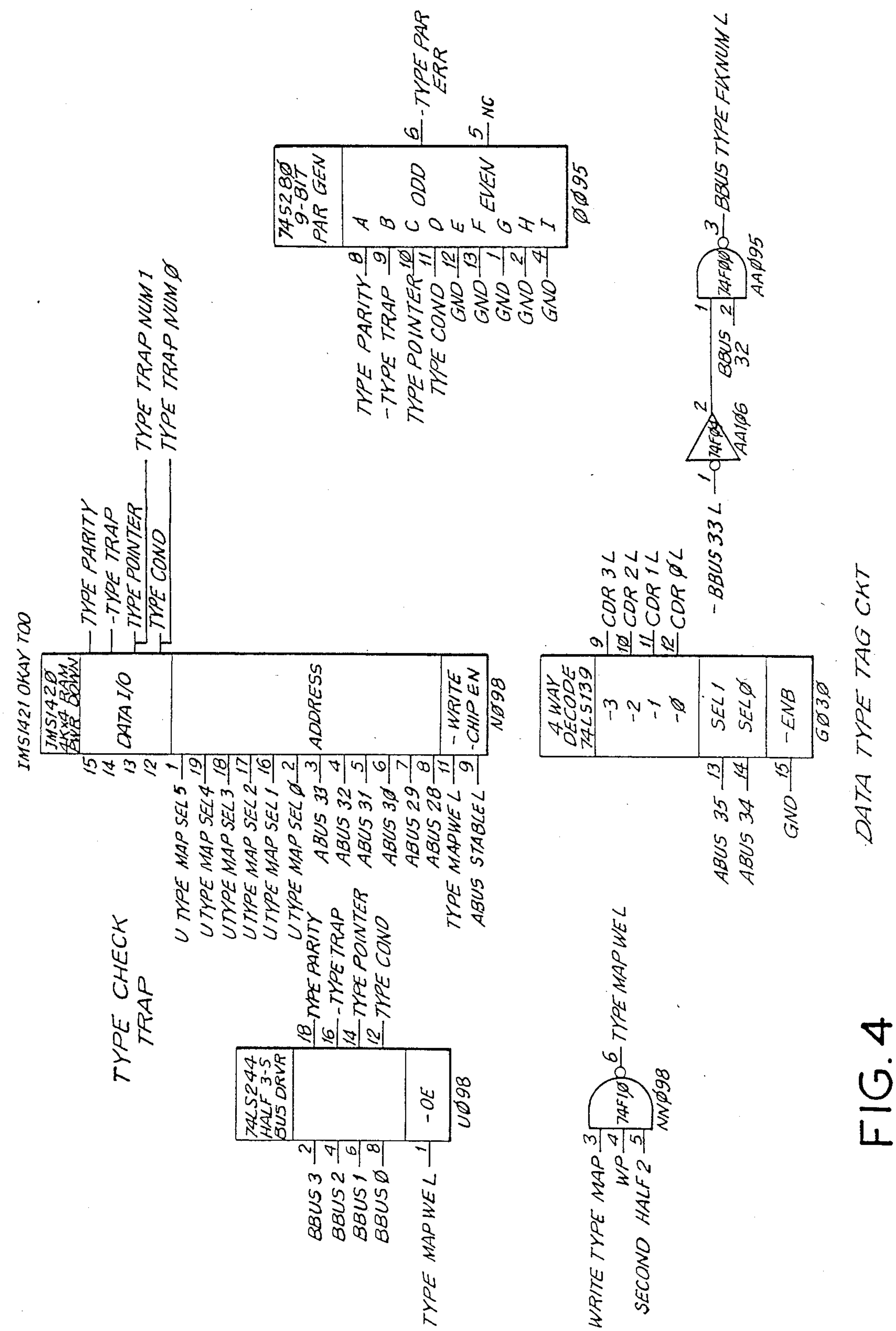
FIG. 4 is a schematic of the data path data type tag circuitry.
Figure 5:
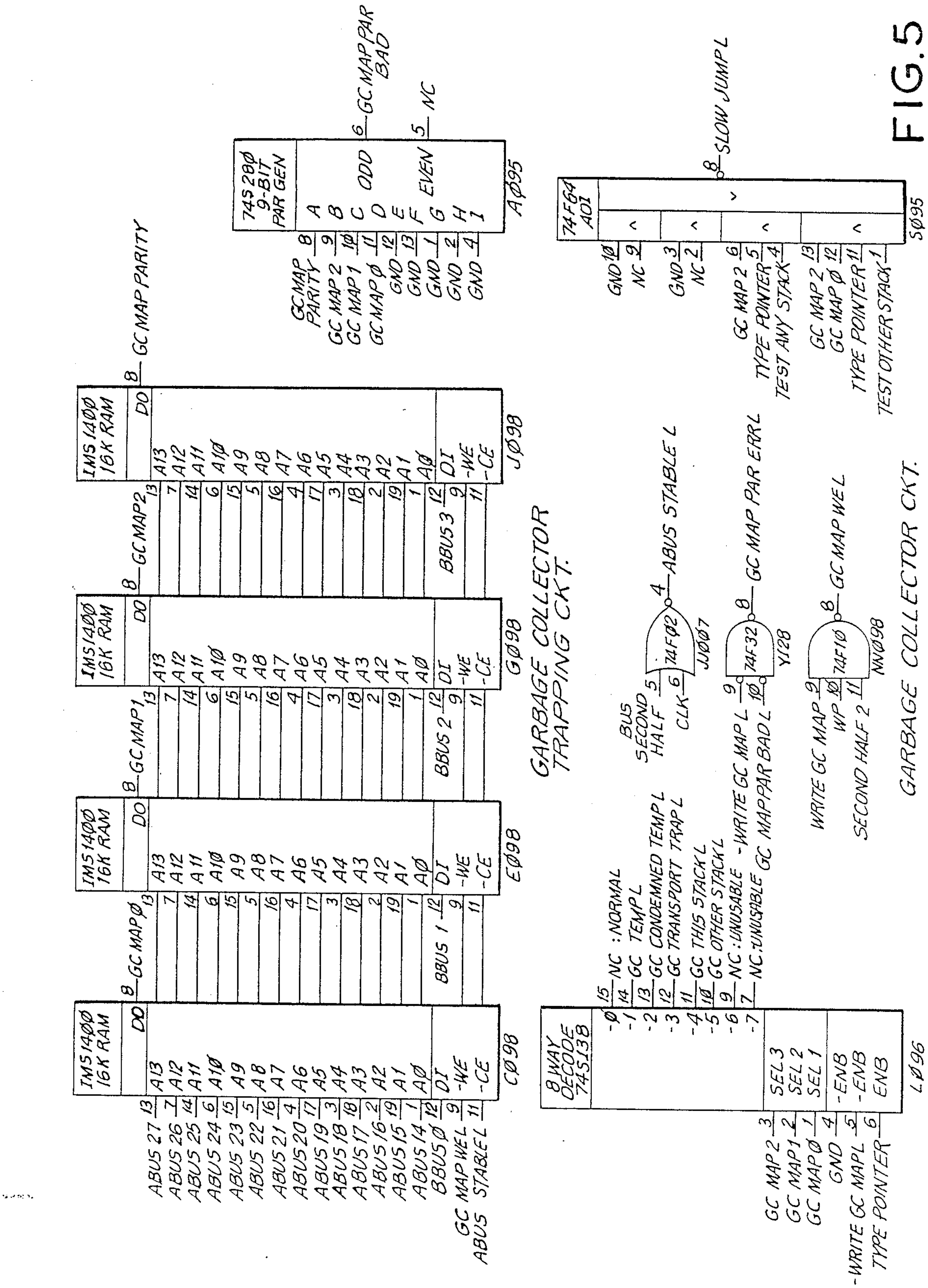
FIG. 5 is a schematic of the data path garbage collection circuitry.
Figure 6:
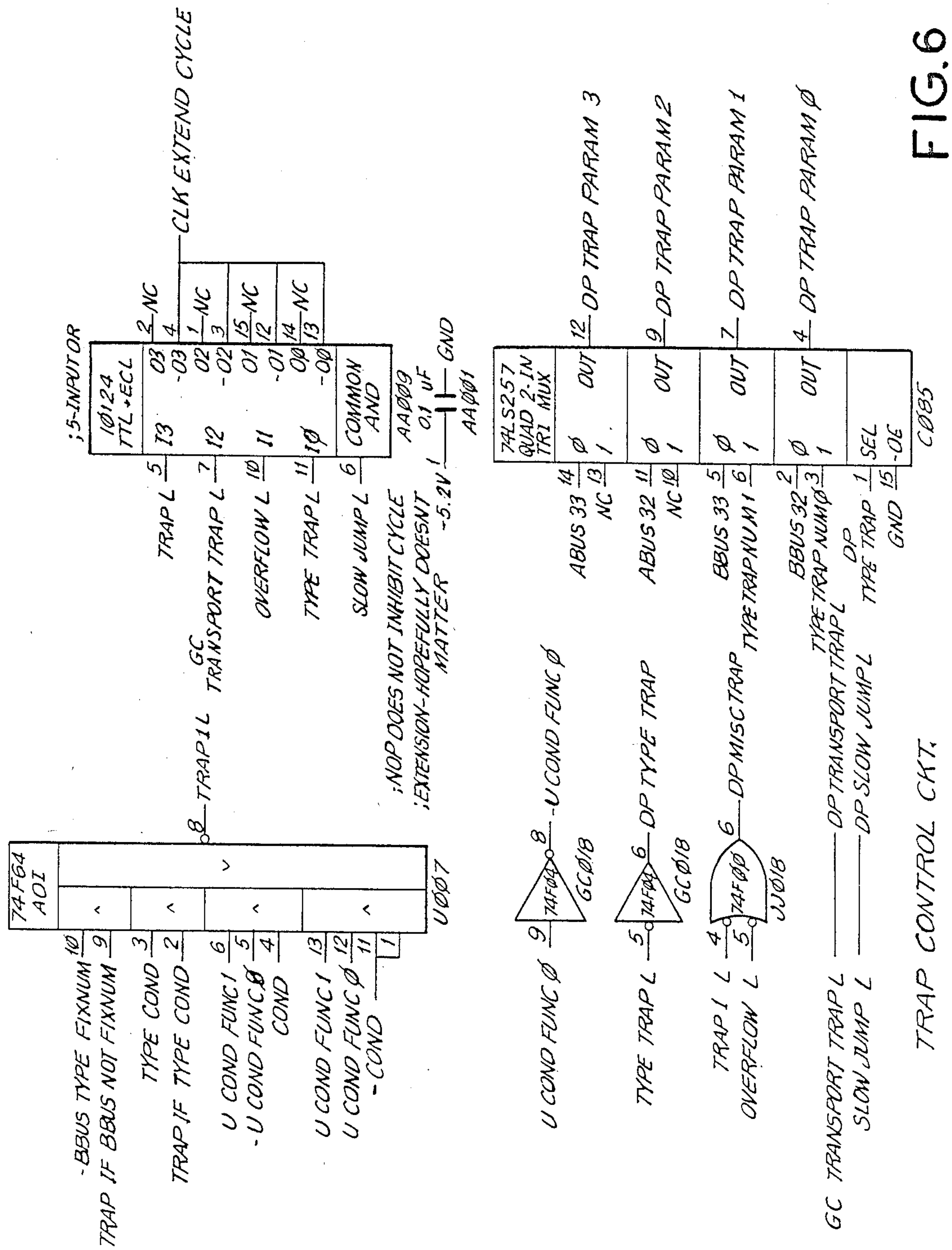
FIG. 6 is a schematic of the data path trap control circuitry.

The data path unit is shown in block diagram form in FIG. 3 with the various circuit elements shown in the block diagram shown in more detail in FIGS. 4–6.

The data path unit includes the stack buffer, the arithmetic logic unit (ALU), the data typing circuitry, the garbage collection circuitry and other related circuit elements.

The A and B memories include the two stack and buffers described hereinabove. The A memory is a 4K×40 bit memory. The B memory which is a 256×40 bit memory is shown in FIGS. 60–64 and the corresponding circuitry therefor is shown in FIGS. 65–66.

Garbage collection circuitry is shown in FIG. 5 and trap control, condition dispatch and microinstruction decode circuitry is shown in FIGS. 3–6.

The ALU is used to carry out the arithmetic combination of a given address and offset and is dedicated solely thereto. As can be seen from the data flow path in the block diagram of FIG. 3, the circuitry on the data path unit separates the type field from the data object and thereafter checks the type field with respect to the operation and generates a new type field in accordance with the operation. The new type field and the results of the operation are combined thereafter.

The central processing unit (cpu or processor) exemplifies a tagged architecture computer wherein type-checking is used to catch invalid operations before they occur. This ensures program reliability and data integrity. While type-checking has been integrated into many software compilers, the present system performs automatic type-checking in hardware, specifically the above-mentioned circuitry in the sequencer. This hardware allows extremely fast type-checks to be carried out at run-time, and not just at compile-time. Run-time type-checking is important in a dynamic Lisp environment, since pointers may reference many different types of Lisp objects. Garbage-collection algorithms (explained hereinafter) also need fast type-checking.

Automatic type-checking is supported by appending a tag field to every word processed by the cpu. The tag field indicates the type of the object being processed. For example, by examining the tag field, the processor can determine whether a word is data or an instruction.

With the tagged architecture, all (macro) instructions are generic. That is, they work on all data types appropriate to them. There is, for example, only one ADD operation, good for fixed and floating-point numbers, double-precision numbers, and so on. The behavior of a specific ADD instruction is determined by the types of the operands, which the hardware reads in the operand's tag fields. There is no performance penalty associated with the type-checking, since it is performed in parallel with the instruction. By using generic instructions and tag fields, one (macro)instruction can do the work for several instructions on more conventional machines. This permits very compact storage of compiled programs.

In the present system a word contains one of many different types of objects. Two basic formats of 36-bit words are provided.

One format, called the tagged pointer format, consists of an 8-bit tag and 28 bits of address. The other immediate number format consists of a 4-bit tag and 32 bits of immediate numerical data. (In main memory, each word is supplemented with 8 more bits, including 7 bits of ECC).

Two bits of every word are reserved for list compaction or cdr-coding. The cdr-code bits are part of a technique for compressing the storage of list structures. The four possible values of the cdr-code are: normal, error, next, and nil. Normal indicates a standard car-cdr list element pair, next and nil represent the list as a vector in memory. This takes up only half as much storage as the normal case, since only the cars are stored. Zetalisp primitives that create lists make these compressed cdr-coded lists. Error is used to indicate a memory cell whose address should not be part of a list.

34 data types are directly supported by the processor. The type-encoding scheme is as follows. A Zetalisp pointer is represented in 34 bits of the 36-bit word. The other two bits are reserved for cdr-coding. The first two bits of the 34-bit tagged pointer are the primary data typing field. Two values of this field indicate that the 32-bits hold an immediate fixed-point of floating-point number, respectively. (The floating-point representation is compatible with the IEEE standard). The other two values of the 2-bit field indicate that the next four bits are further data type bits. The remaining 28 bits are used as an address to that object. The object types include:

- symbols (stored in four parts: print-name, value, function, and properly-list)
- lists (cons cells)
- strings
- arrays
- flavor instances
- bignums (arbitrary-precision integers)
- extended floating-point numbers
- complex numbers
- extended complex numbers
- rational numbers
- intervals
- coroutines
- compiled code
- closures
- lexical closures
- nil The present-system is stack-oriented, with multiple stacks and multiple stack buffers in hardware. Stacks provide fast temporary storage for data and code reference associated with programs, such as values being computed, arguments, local variables, and control-flow information.

A main use of a stack is to pass arguments to instructions, including functions and flavor methods. Fast function calling is critical to the performance of cpu-bound programs. The use and layout of the stack for function calling in the system is novel.

In the system, a given computation is always associated with a particular stack group. Hence, the stacks are organized into stack groups. A stack group has three components:

- A control-stack—contains the lambda bindings, local environment, and caller list.
- A binding stack—contains special variables and counter-flow information.
- A data-stack—contains Lisp objects of dynamic extent (temporary arrays and lists).

In the system, a stack is managed by the processor hardware in the sequencer as set forth above. Many of the system instructions are stack-oriented. This means they require no operand specification, since their operands are assumed to be on the top of the stack. This reduces considerably the size of instructions. The use of the stack, in combination with the tagged architecture features, also reduces the size of the instruction set.

The control stack is formatted into frames. The frames usually correspond to function entities. A frame consists of a fixed header, followed by a number of argument and local variable slots, followed by a temporary stack area. Pointers in the control stack refer to entries in the binding stack. The data stack is provided to allow you to place Zetalisp objects in it for especially fast data manipulations.

Active stacks are always maintained in the stack buffers by the hardware. The stack buffers are special high-speed memories inside the cpu which place a process's stack into a quick access environment. Stack buffer manipulations (e.g., push, pop) are carried out by the processor and occur in one machine cycle.

At the macroinstruction level, the system has no general-purpose registers in the conventional sense, as it is a stack-oriented machine. This means that many instructions fetch their operands directly from the stack.

The two 1K word stack buffers are provided in order to speed the execution of Zetalisp programs. The stack buffers function as special high-speed caches used to contain the top portion of the Zetalisp stack. Since most memory references in Zetalisp programs go through the stack, the stack buffers provide very fast access to the referenced objects.

The stack buffers store several pages surrounding the "current" stack pointer, since there is a high probability they will contain the next-referenced data objects. When a stack overflow or underflows the stack buffer, a fresh page of the stack buffer is automatically allocated (possibly deallocating another page).

Another feature of the stack buffers which supports high-speed access is the use of hardware-controlled pushdown pointers, eliminating the need to execute software instructions to manipulate the stack. All stack manipulations work in one cycle. A hardware top-of-stack register is provided for quick access to that location at all times.

The stack buffer has some area thereof which is allocated as a window to the stack, which means that somewhere in the main memory is a large linear array which is the stack that is being currently used and this window points into some part of it so that it shadows the words that are in actual memory. The window is addressed by a two segment addressing scheme utilizing a stack pointer and an offset. The ALU associated with the stack buffer, combines the pointer and offset in one cycle to address the window in the stack buffer.

In a Lisp environment, storage for Lisp objects is allocated out of a storage area called the heap in virtual memory. Storage must be deallocated and returned automatically to the heap when objects are no longer referenced. In order to manage the dynamic storage allocation and deallocation, storage manager and garbage collection routines must be implmented. Garbage collection is the process of finding "unreferenced" objects and reclaiming their space for the heap. This space is then free to be reallocated.

The goal of a good garbage collection algorithm is to reclaim storage quickly and with a minimum of overhead. Conventional garbage collection schemes are computationally costly and time-consuming, since they involve reading through the entire address space. This is done in order to prove that nowhere in the address space are there any references to the storage being considered for reclamation. The design of the present system includes unique features for hardware assistance to the garbage collection algorithms which greatly simplify and speed up the process. These hardware features are used to "mark" parts of memory to be included in the garbage collection process, leaving the rest of memory untouched. These hardware features include:

- Type fields which indicate pointers
- Page Tag which indicate pages containing pointers to temporary space
- Multi-word read instructions which speed up the memory scanning.

The 2-bit type field inserted into all data words by the hardware simplifies garbage collection. This field indicates whether or not the word contains a pointer, i.e., a reference to a word in virtual memory.

For each physical page of memory there is a bit called a page tag. This is set by the hardware when a pointer to a temporary space is written into any location in that page. When a disk page is read into a main memory page and after a garbage-collection cycle, the microcode sets the bit to the appropriate value. When the garbage-collector algorithm wants to reclaim some temporary space, it scans the page-tag bits in all the pages. Since the page tag memory is small relative to the size of virtual memory, it can be scanned rapidly, about 1 ms per Mword of main memory that it describes. For all pages with the page-tag bit set, the garbage collector scans all words in that page, looking for pointers to "condemned" temporary space. For each such pointer it copies out the object pointed to and adjusts the pointer.

Multi-word read operations speed up the garbage collection by fetching several words at a time to the processor.

The virtual memory software assists garbage collection with another mechansim. If a page with its page-tag bit set is written to disk, the paging software will scan through the contents of the page to see what it points at. The software creates a table recording the swapped-out pages which contain pointers to temporary spaces in memory. Since the garbage collector checks this table, it can tell which pages contain such pointers. This knowledge is used to improve the efficiency of the garbage-collection process, since only the pages with temporary-space pointers are read into memory during garbage collection.

Page Tag Implementation

The page tag bits are made out of 16K static RAM shown in FIG. 149.

The following inputs exist:

| | |
|---|---|
| LBUS ADDR 23:19 | the physical page to be accessed next. |
| NORMAL ACTIVE L | true if this is an active cycle and the page tags are supposed to see it. |
| LBUS STATE CLK L | the clock gated by LBUS WAIT. |
| DP SET CG TAG L | true during an active cycle if the datapath output during the previous cycle was a pointer and its address was in a temporary space. If this active cycle is for a virtual write, the GC tag bit needs to be set. |
| WRITE ACTIVE L | true during an active write cycle (registered version of LBUS WRITE L). |
| WRITE PAGE TAG L | true if lbus-dev-write of the page tag being done. |
| READ PAGE TAG L | true if reading page tag (via lbus-dev-write). |
| LBUS DEV 4:3 | modifiers for the above. |

Note:
the spec and magic fields could be used instead of the microdevice I/O.

The following outputs exist:

| | |
|---|---|
| LBUS DEV COND L | Asserted when READ PAGE TAG and the selected tag bit is set. |
| PAGE TAG PAR ERR L | asserted when bad parity is read from the page tags. |

Microcode control:

One selects a physical page by doing a read of any location in the page. Normally the address would be supplied as a physical address on the Abus although the VMA could also be used. Actually starting a read isn't necessary; it's only necessary to convince the memory control to put the physical address on the Lbus. In the next cycle one uses a microdevice operation to read or write the page tage for the addressed page.

Since the address is supplied in the previous cycle before the read and write, it is necessary to prevent a task switch from intervening. This is done by specifying SPEC TASK-INHIBIT in the microinstruction-before-the one that emits the address on the Abus. It is also possible for a FEP memory access to intervene between the two microinstructions, i.e. the microdevice operation may have to wait for the Lbus to become free. The page tag's address register is not clocked when MC WIAT is asserted, which takes care of this problem.

WRITE PAGE TAG L is asserted during second half when writing to microdevice slot 36, subdevice 1 (on the FEP board).

LBUS DEV 3 is written into the selected bit. The other remains unchanged.

LBUS DEV 4 selects which bit:

| | |
|---|---|
| 0 | the gc tag bit |
| 1 | the referenced bit |

READ PAGE TAG L is asserted when writing to microdevice slot 36 subdevice 3.

LBUS DEV 4:3 select the bit to read, as follows:

| | |
|---|---|
| 00 | the gc tag bit |
| 01 | the referenced bit |
| 10 | the parity bit |
| 11 | (not used) |

The preselected bit comes back on the LBUS DEV COND L line and may be used as a skit condition.

Scanning GC page tag takes place at the rate of 2 cycles per bit. This amounts to 1 millisecond per 750 K of main memory. The microcode alternates between cycles which emit a physical address on the Abus, start a read, and do a compare to check for being done, and cycles which increment the physical address and also skit on the tag bit, into either the first cycle again or the start of the word scanning loop.

There is no special function for writing a pointer into main memory to enable the check and setting of gc page tag. Instead, any write into main memory at a virtual address, where the data type map says the type is a pointer, and the gc map says it points at temporary space, will set the addressed gc page tag bit in the following cycle if necessary.

The STKP, FRMP, and XBAS registers can be used to address A-memory. The low 10 bits of one of these registers is added to a sign-extended 8-bit offset which comes from the microinstruction or the macroinstruction. This is then concatenated with a 2-bit stack bas register to provide a 12-bit A-memory address. The microcode can also select a 4th pseudo base register, which is either FRMP or STKP depending on the sign of the macroinstruction offset. Doing this also adds 1 to the offset if it is negative. Thus you always use a positive or zero offset with FRMP and a negative or zero offset with STKP in this mode.

STKP points at the top of the stack. FRMP points at the current frame.

STKP may be incremented or decremented independently of almost everything else in the machine, and there is a 4-bit counter which clears at the beginning of a macroinstruction and increments or decrements simultaneously with STKP: this allows changes by pulse or minus 7 to STKP to be undone when a macroinstruction is aborted (polsred).

STKP and FRMP are 28-bit registers, holding virtual addresses, and may be read onto the data path. XBAS is only a 10-bit register and may not be read back. (The FEP can read it back by using it as a base register and seeing what address develops). The XVAS register is not used by most of the normal microcode, but it is there as a provision for extra flexibility. The microcode which BLTs blocks of words up and down in the stack (used by function return, for example), needs two pointers to the stack. It currently uses FRMP and STKP, but might be changed to use XBAS and STKP. The funcall (function call with variable function) microcode uses XBAS to hold a computed address which is then used to access the stack.

Interface with Memory Control board

The data path and the memory control need to communicate with each other for the following operations:

Reading the VMA and PC registers into the data path.

Writing the VMA and PC registers from the data path.

Accessing the address map (at least writing it).

Reading main memory or memory-mapped I/O device.

Writing main memory or memory-mapped I/O device.

Emitting a physical address (espcially in a "DMA" task).

Using the bus to access devices such as floating-point unit and doing "microdevice" (non-memory-mapped) I/O.

Setting the GC page tag bit when the pointer is written into memory.

The MC does its own microinstruction decoding. There is a 4-bit field just for it, and it also looks at the Spec, Magic, A Read Address, and A Write Address fields. The A address fields have 9 bits each available for the MC when the source (or destination) is not A-memory, which is normally the case when reading (or writing) the MC. Also the A-memory write address can be taken from the read address field, freeing the write address field for use by the MC. This occurs during the address cycle of a DMA operation, which increments an A-memory location but also hacks the MC. The MC and the sequencer also have a good deal of communication, mostly for synchronization and for the IFU.

The following signals connect between the DP and MC boards:

| | |
|---|---|
| BK ABUS | 35:0 - bidirectional extension of the data path's Abus. This is used to read VMA, PC, map, and memory (or bus) data into the data path, and to emit physical addresses from the data path. Bits 31–0 are bidirectional, but bits 35–32 are unidirectional, they always go from the memory control to the data path; this allows the cdr code of a memory location to be merged into the data to be stored into it, which needs to be on the Abus so it can get to the type and gc maps. The parity bits on the internal Abus do not connect to the MC. |
| LBUS 35:0 | the main data bus. The data path can drive this either directly or through a register. This is used when writing main memory, when writing the bus, and when writing registers on the MC board. The error-correction bits do not connect to the DP. |
| LBUS ADDR 11:0 | physical memory address into the data path. This is used when a supposed main memory access actually refers to internal A memory. See below. |
| MC OBUS TO LBUS L | DP result from this cycle drives LBus. |
| MC OBUS REG To LBUS L | DEP result from last cycle drives LBUS |
| GC TEMP L | to GC page tag bits. If this is asserted at the end of a cycle which writes into main memory, then during the following cycle, which is when the write actually happens, the GC page tag bit for the page being written into its turned on. |
| MC ADDR IN AMEM L | Asserted if the last memory address selected by this task (need only work for emulator) points at A-memory. The data path uses this to enable A-memory instead of BK ABUS for memory reads, and to |

-continued

| | |
|---|---|
| | enable A-memory writing for memory writes. See below. |
| ABUS OFFBOARD L | Asserted if the BK ABUS is an input to the data path. The DP drives the BK ABUS whenever it isn't receiving it. |
| SEQUENCE BREAK | Tells the IFU to generate a bogus instruction to take the sequence break (macrocode interrupt). |

The data path assumes that when a memory reference is redirected to A-memory, the memory control will provide the right address on the Lbus address lines.

For writing, things are simple. In the first cycle, the data path computes to write data; in the second cycle the write data is driven onto the Lbus, where it gets error-correction bits added. The memory card swallows the address at the end of the first cycle and the data during the second. The A-memory wants to the same timing; in the first cycle the address comes from the Lbus and the data come from the Obus inside the data path; in the second half of the second cycle the actual write is performed from the A-memory pipelining registers.

The trap control circuitry of FIG. 46 effects the feature of trapping out of macrocode instruction execution. For example a page table miss trap to microcode looks in the page hash table in main memory. If the page is found, the hardware map is reloaded and the trap microinstruction is simply restarted. A PCLSR of the current instruction happens only if this turns into a fault because the page is not in main memory or a page write-protected fault.

Another trap is where there is an invisible pointer. This trap to microcode follows the invisible pointer, changing the VMA and retries the trap to microinstruction.

Memory write traps include one which is a trap for storing a pointer to the stack, which traps to microcode that maintains the stack GC tables. This trap aborts the following micro instruction, thus the trapped write completes before the trap goes off. The trap handler looks at the VMA and the data that was written into memory at that address, makes entries in tables and then restarts the aborted microinstruction. If it is necessary to trap out to microcode, there are two cases. If the write was at the end of a macroinstruction, then that instruction has completed and the following instruction has not started since its first microinstruction was aborted by the trap. However, the program counter has been incremented and the normal PCLSR mechanism will leave things in exactly the right state. The other cases where the write was not at the end of a macroinstruction, in this case the instruction must be PCLSR, with the state in the stack and the first part done flag.

Another trap is a bad data type of trap and an arithmetic trap wherein one or both of the operands of the numbers on which the arithmetic operations is taking place is a kind of number that the microcode does not handle. The system first coerces the operands to a uniform type and puts them in a uniform place on the stack. Thereafter a quick external macrocode routing for doing this type of operation on that type is called. If the result is not to be returned to the stack, an extra return address must be set up so that when the operation routine returns, it returns to another quick external routine which moves the result to the right place.

Stack buffers traps occur when there is a stack buffer overflow. The trap routine does the necessary copying between the stack buffer and the main memory. It is handled as a trap to macrocode rather than being entirely in microcode, because of the possiblity of recursive traps, when refilling the stack buffer it is possible to envoke the transporter and take page faults. When emptying the stack buffer, it is possible to get unsafe pointer traps.

MEMORY CONTROL

Figure 7:
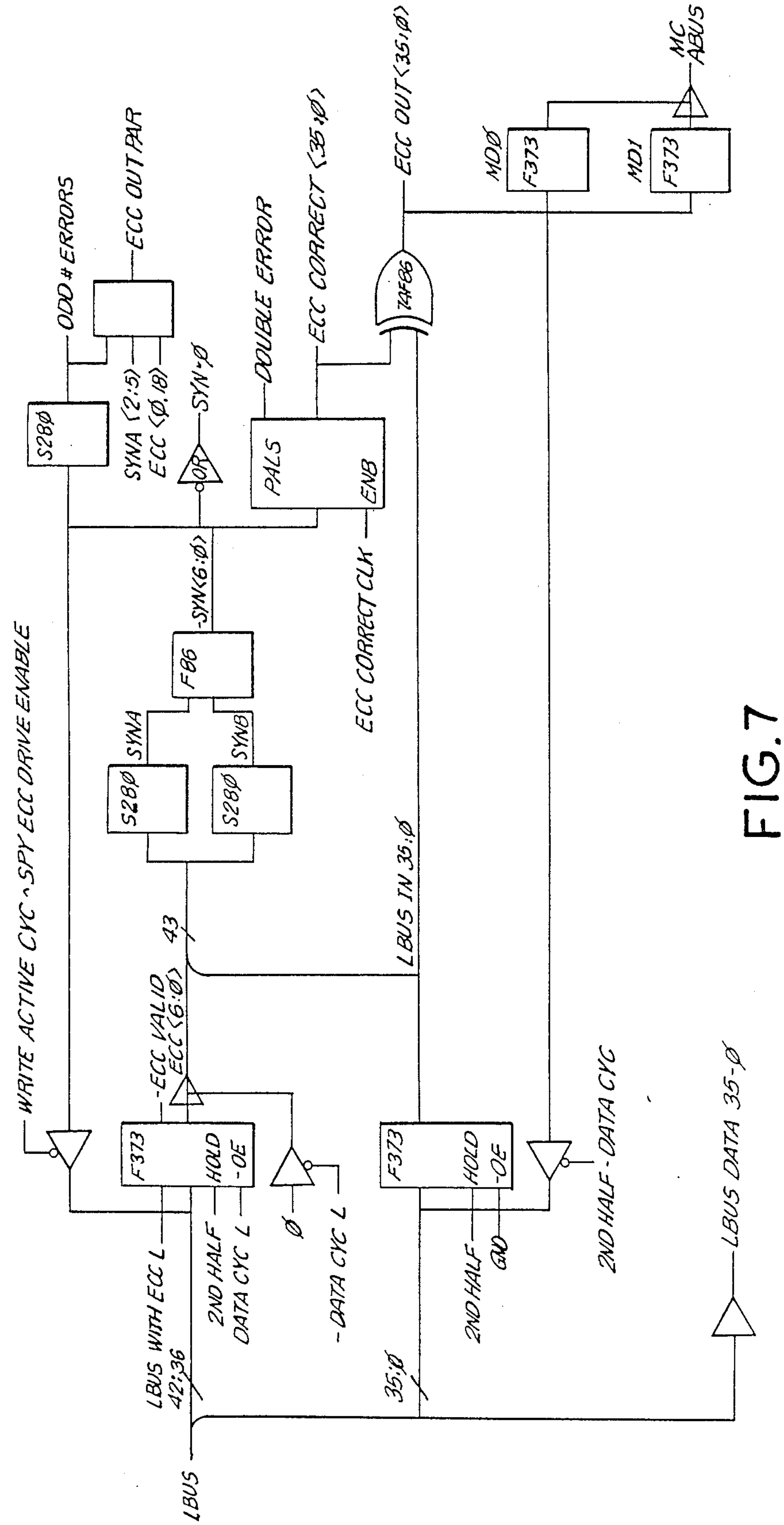
FIG. 7 is a block diagram of the memory control of FIG. 1.
Figure 8:
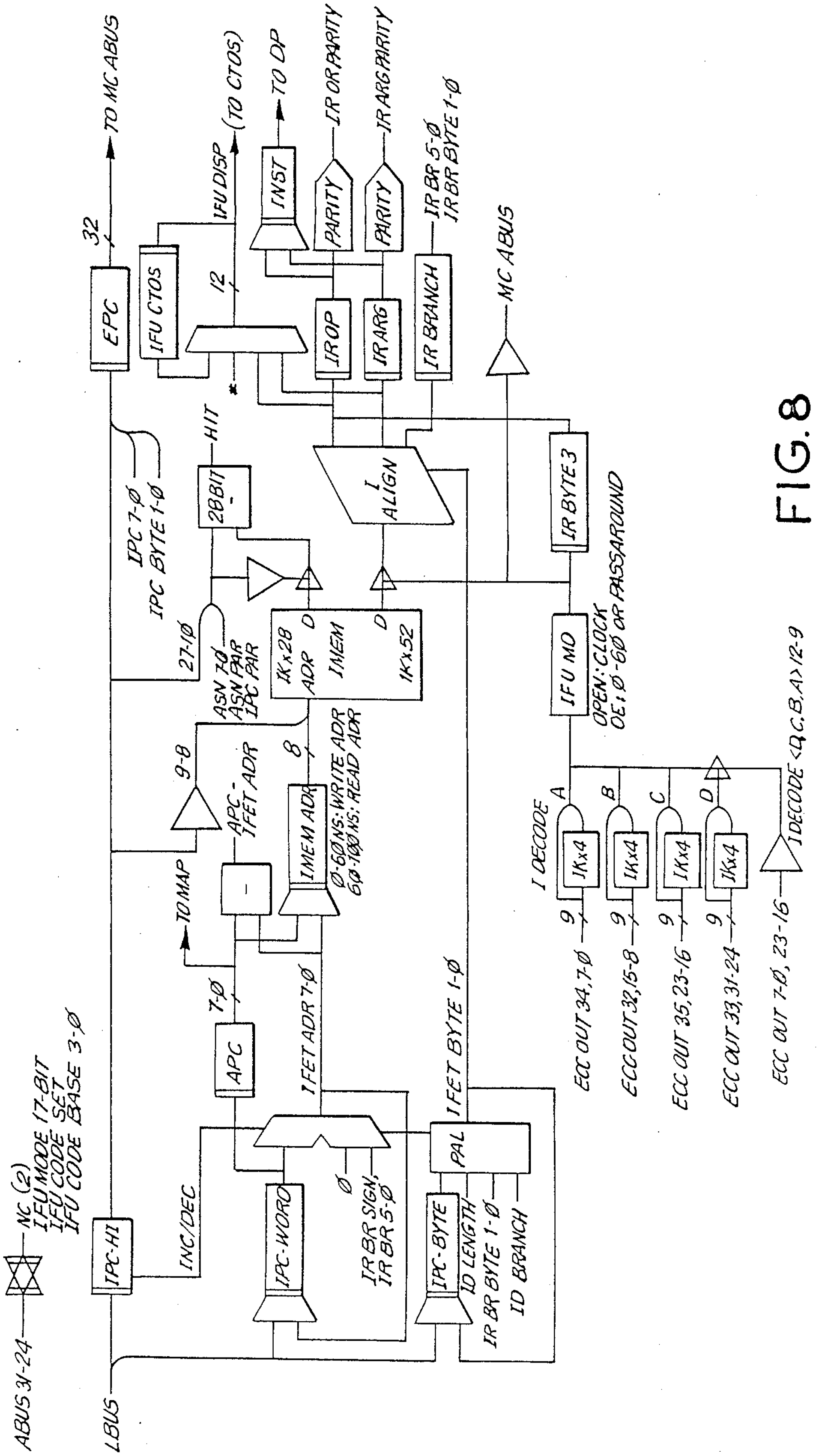
FIG. 8 is a data path diagram of the memory control instruction fetch unit.
Figure 9:
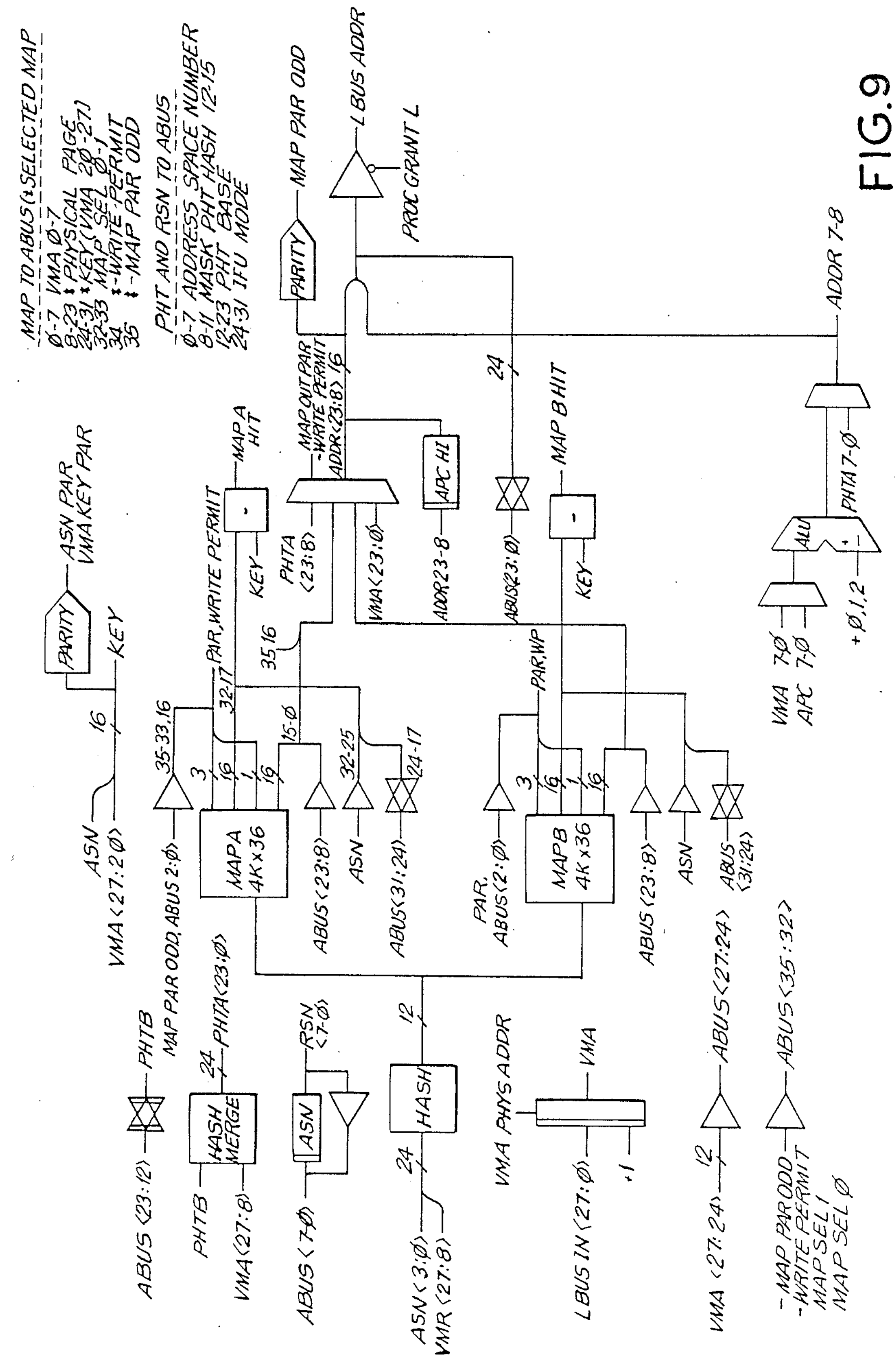
FIG. 9 is a block diagram of the memory control map circuitry.

The memory control is shown in block diagram form in FIGS. 7–9 which show the data and error correction circuitry in FIG. 7, the data path flow of the instruction fetch unit in FIG. 8 and the page hash table mapping in FIG. 9.

Physical memory is addressed in 44-bit word units. This includes 36 bits for data, 7 bits for error correction code (ECC) plus one bit spare. Double-bit errors are automatically detected, while single-bit errors are both detected and corrected automatically. The memory is implemented using 200-ns 64 K bit dynamic RAM (random access memory) chips with a minimum memory configuration of 256 Kwords (1MByte) (See FIGS. 10–23). The write cycle is about 600 ns (three bus cycles). In some cases the system can get or set one word per cycle (200 ns), and access a word in 400 ns.

The system 28-bit virtual address space consists of 16 million (16,777,216) 44-bit wide words (36-bits of data and 8 bits of ECC and spares). This address space is divided into pages, each containing 256 words. The upper 20 bits of a virtual address are called the Virtual Page Number (VPN), and the remaining 8 bits are the word offset within the page. Transfers between main and secondary memory are always done in pages. The next section summarizes the operation of the virtual paging apparatus.

The virtual memory scheme is implemented via a combination of Zetalisp code and microcode. The labor is divided into policies and mechanisms. Policies are realized in Zetalisp; these are decisions as to what the page, when to page it, and where to page it to. Mechanisms are realized in microcode; these constitute decisions as to how to implement the policies.

Zetalisp pointers contain a virtual address. Before the hardware can reference a Zetalisp object, the virtual address must be translated into a physical address. A physical address says where in main memory the object is currently residing. If it is not already in main memory, it must either be created or else copied into main memory from secondary memory such as a disk. Main memory acts as a large cache, referencing the disk only if the object is not already in main memory, and then attempting to keep it resident for as long a it will be used.

In order to quickly and efficiently translate a virtual address into a 24-bit physical address, the system uses a hierarchy of translation tables. The upper levels in the hierarchy are the fastest, but since speed is expensive they also can accommodate the fewest translations. The levels used are:

Dual Map Caches which reside in and are referenced by the hardware and can each accommodate 4 K entries.

A Page Hash Table Cache (PHTC) which resides in wired main memory and is referenced by the microcode with hardware assist. The size of the PHTC is proportional to the number of main memory pages, and can vary from 4 to 64 Kwords, requiring one word per entry. However, the table is only 50% dense to permit a reasonable hashing performance.

A Page Hash Table (PHT) and Main Memory Page Table (MMPT) which reside in wired main memory and are referenced by Zetalisp. The size of both of these tables are proportional to the number of main memory pages, with the PHT being 75% dense and the MMPT 100% dense. Both tables require one word per entry. The PHT and MMPT completely describe all pages in main memory.

The Secondary Memory Page Table (SMPT) describes all pages of disk swapping space, and dynamically grows as more swapping space is used.

A virtual address is translated into a physical address by the hardware checking the Map Caches for the virtual page number (VPN). If found, the cache yields the physical page number the hardware needs. If the VPN isn't in the Map Cache, the hardware hashes the VPN into a PHTC index, and the microcode checks to see if a valid entry of the VPN exists. If it does, the PHTC yields the physical page number. Otherwise a page fault to Zetalisp code is generated.

The page fault handler checks the PHT and MMPT to determine if the page is in main memory. If so, the handler does whatever action is required to make the page accessible, loads the PHTC and the least recently used of the two Map Cache, and returns. If the page is not in main memory, the handler must copy the page from disk into a main memory page. When a page fault gets to this point it is called a hard fault. A hard fault must do the following:

1. Find the virtual page on the disk by looking up the VPN in the SMPT.

2. Find an available page frame in main memory. An approximate FIFO (first-in, first-out) pool of available pages is always maintained with some pages on it. When the pool reaches some minimum size a background process fills it by making the least recently used main memory pages available for reuse. If the page selected for reuse was modified (that is, its contents in main memory were changed so the copy on disk is different) it must be first copied back to disk prior to its being available for reuse. The background process minimizes this occurrence at fault time by copying modified pages back to the disk periodically, especially those eligible for reuse.

3. Copy the disk page into the main memory page frame.

4. If the area of the virtual page has a "swap-in quantum" specified, the next specified number of pages are copies into available main memory page frames as well. If these prefetched pages are not referenced within some interval and some page frames are needed for reuse, their frames will be reused. This minimizes the impact of prefetching unnecessary pages.

5. Update the PHT, MMPT, PHTC, and least recently used of the two Map Cache to contain the page just made resident, and forget previous page whose frame was used.

6. Return from the fault and resume program execution.

The central Memory Control unit manages the state of the bus and arbitrates requests from the processor, the instruction fetch unit, and the front-end processor.

L BUS

For general communication with devices, the L bus acts as an extension of the system processor. Main memory and high speed peripherals such as the disk, network, and TV controllers and the FEP are interfaced to the L bus. The address paths of the L bus are 24 bits wide, and the data paths are 44 bits wide, including 36 bits for data and 8 bits for ECC. The L bus is capable of transferring one word per cycle at peak performance, approximately 20 MByte/sec.

All L bus operations are synchronous with the system clock. The clock cycle is roughly 5 MHz, but the exact period of cycle may be tuned by the microcode. A field in the microcode allows different speed instructions for different purposes. For fast instructions, there is no need to wait the long clock cycle needed by slower instructions. Main memory and cpu operations are synchronous with the L bus clock. When the cpu takes a trap, the clock cycle is stretched to allow a trap handler microinstruction to be fetched.

As an example of L bus operation, a normal memory read cycle includes three phases:

1. Request—The cpu or the FEP selects the memory card from which to read (address request).

2. Active—The memory card access the data; the data is strobed to an output latch at the end of the cycle.

3. Data—The memory card drives the data onto the bus; a new Request cycle can be started.

In a normal write operation, two phases are carried out:

1. Request—The cpu or the FEP selects the memory card to which to write.

2. Active—The cpu or the FEP drives the data onto the bus.

A modified memory cycle on the L bus is used for direct memory access operation by L bus devices. In a DMA output operation, as in all memory operations, the data from memory is routed to the ECC logic. However, instead of passing on to the processor's instruction prefetch unit, the data is shipped to the DMA device (e.g., FEP, disk controller, network controller) that requested it.

For block mode operation, the L bus uses pipelining techniques to overlap several bus requests. On block mode memory writes, an address may be requested while a separate data transfer takes place. On block mode memory reads, three address requests may be overlapped within one L bus cycle.

TABLE 4

MEMORY AND CLOCK SIGNALS. (From <LMIFU>MC.)

The bus is used in three ways; accessing memory, accessing I/O device registers which look like memory, and accessing "MicroDevices" MicroDevices are distinguished because they are addressed by a separate 10-bit field which comes directly from the microcode, and do not follow the 3 cycle Request/Active/Data protocol of memories. One example of such a device is a DMA device such as the disk; the DMA task microcode commands the disk to put data onto the bus or take it off, while doing a memory cycle. We'll call the three classes of responders "Memory, MemoryDevices, and MicroDevices."

All transactions on the L-bus are synchronous with the system clock. For example, memory responds to requests with a 2 or 3 cycle sequence, viz:

On the first cycle (Request), the processor puts an address on LBUS ADDR, puts the type of cycle on LBUS WRITE, and asserts LBUS REQUEST. All the memory cards compare the high bits of the LBUS address with their slot number. The selected memory card drives the row address onto the RAM address lines, and at the leading edge of LBUS CLOCK starts RAS. After a delay it muxes the column address onto the RAM address lines, and finally at the clock boundary CAS is enabled.

The second (Active) cycle is used to access the RAM: on a read the RAM output is strobed into a latch at the end of the cycle; on a write, the bus has the write data and ECC bits and the RAM WE is driven by a gated Lbus Clock (late write operation). RAS and CAS are reset at the end of this cycle.

During the third (Data) cycle, the latched read data is driven on the bus (during First Half), the RAM chips precharge during their RAS recovery time, and possibly a new Request cycle occurs.

The bus clock is designed so that the memory card can start RAS with the leading edge and star CAS with the trailing edge and be guaranteed of meeting the RAM timing specs. No other use is intended for the leading edge of clock. It is suggested that MemoryDevices initiate response to requests at the trailing edge of clock.

The clock seen by devices on the bus (LBUS CLOCK) is a version of the clock that drives the processor. Its frequency is roughly 5 Mhz but the exact period of each cycle may vary between 180-260 ns depending on the cycle length specified by the microcode. Although the processor controls the cycle length, LBUS CLOCK is unaffected by any clock inhibit conditions in the processor - operations on the bus proceed independently of the microcode, once they have been initiated. Memory data error-correction will also extend the clock for some period of time.

An exception to this is when the processor takes a trap. In that case LBUS CLOCK is stretched - the extra time occurs in the second (or high) phase. While the main clock is held high, the clock and sequencer conspire to preform a second cycle internally that fetches the trap handler microinstruction. Because of this, two first-half clocks will happen for only one LBUS CLOCK. If the extended cycle is a Data cycle, the processor will latch the data seen during the first first-half.

Note: The leading edge of FIRST HALF is >>not<< the same as the trailing edge of LBUS CLOCK. First-half is primarily intended as a timing signal that controls enabling data from memories onto the bus. The only other nefarious use you are allowed is to clock something with the mid-cycle edge of FIRST HALF, and then you should be prepared to see two of them on some cycles.

A central Memory Control manages the state of the bus and arbitrates between requests from the processor, IFU, and FEP. Both Memory and MemoryDevices are expected to conform to the same timing protocol. [document FEP/MC arbitration].

Any MemoryDevices (like the TV) that are unable to respond in 3 cycles must assert LBUS WAIT during the Active cycle until they can respond. The memory control state will proceed on the first Active cycle where LBUS WAIT is not asserted. LBUS WAIT should not be present on any other cycle, and must be developed early enough to propogate the length of the bus, go through a xcvr, and gate the clock. DMA devices also watch LBUS WAIT, so they know which cycle is the one that they should read or write the data.

Block mode operations. In some cases the processor issues a series of requests on back-to-back cycles. This is called "block mode". A new request can be started each cycle. When a block-mode operation in underway, the bus is segmented into a 3-stage pipeline, one stage for addressing, one stage for ram access, and one stage for data transfer (on reads).

The addresses of block mode requests are always in increasing sequential order, although any pattern that avoids referencing addresses [n, n+4] in adjacent cycle would be OK. The existing memory card interleaves on bits 18,1,0, so an individual ram always see at least 4 cycles between requests for sequential locations.

MemoryDevices also have to handle block mode requests, because the microcode will not in general want to distinguish references to MOS TABLE 4-continued memory from MemoryDevices. This means that the device must be prepared to accept a request during its "active" cycle. Request cycles are unconditional, there is no way for a device to reject or delay a request. The cycle following a request is the active cycle, which can be repeated (via LBUS WAIT) until the device is ready to accept data (on writes) or enter the data cycle (on reads).
LBUS <43:0> - Bi-directional data bus, active high tri-state.
LBUS <43:36> are the ECC bits. Driven by processor or FEP on write Active cycles. Driven by memories on read Data cycles. Also used to transfer data between processor and Devices. Also is used to carry the Obus signals from the data path card (E) to the other cards in the processor (I and C).
LBUS ADDR<23:0> - Physical address. Tri-state driven from processor or FEP. A physical address of 24 bits is semi-consistent with allowing a maximum of 31 physical slots, each of which could hold 512K words of memory.
LBUS CLOCK +/− - Differential ECL system clock.
LBUS FIRST HALF +/− - differential ECL timing signal from memory control. Used during Data cycles to enable memory data onto the bus. The memory card drives data onto the bus during the first half of the cycle, the memory control reads the bus data and does error correction. During the second half cycle, the corrected data is driven on the bus from the memory control.
Memories must insure that data is driven out on the bus as soon as possible after the leading edge of FIRST HALF, because the memory control needs most of the first half to decode the ECC syndrome.
LBUS REQUEST L - Request for Memory or MemoryDevices addressed by Bus.Address. Stable by leading edge of Bus.Clock enough time for address compare and 2 levels of logic.
LBUS REQUEST L and LBUS WRITE L, along with the address, are asserted towards the end of the first cycle of a transaction.
The data are transferred during the second or third cycle.
The requests, write, and address lines are not valid during those cycles (indeed they may be used to start another transaction).
LBUS WRITE L - from the processor or FEP. The write data will be driven onto the bus during the next cycle. Otherwise, the requested cycle is a read, and the memory will drive the bus during the 2nd succeeding cycle.
LBUS WITH ECC - From Memories that don't have ECC bits. Driven during Data cycle.
LBUS WAIT L - From MemoryDevices. Asserted for as many cycles as necessary to hold memory control in Active cycle state. Must be valid early in the cycle.
LBUS REFRESH L - All dynamic RAM memories perform a refresh.
All rows of memory refresh at once. The memory array bypass capacitors hold enough charge to supply the RAMs for the refresh cycle, so the transient shouldn't be seen by the power supply. The refresh timer and address counter is in the Memory Control, it has nothing to do with micro-tasking so that the memories will continue to get refreshed when the processor is being single stepped.
LBUS ID REQUEST L - Requests that the selected board supply information about itself. The board selection is by matching LBUS ADDR <23:19> against the slot number (see below).
LBUS <7:0> are driven with one of 32 bytes of data selected by LBUS ADDR <6:2>. The format of these data bytes is not yet specified, but generally includes the board type, board serial number, board revision level, and a checksum sensitive to failures of the data and address lines.
Note that memory refreshing may take place, using LBUS ADDR <17:10>, while a board ID is being read using the other address lines. The PROM data should be driven onto the bus for as long as ID REQUEST is asserted. (The memory card is slightly strange in that it "buffers" LBUS ADDR <6:2> through the same latch that it uses to hold the column address during normal memory cycles. This latch is open during LBUS CLOCK, so the memory board doesn't produce correct data until the second cycle after ID REQUEST and LBUS ADDR are present. The FEP compensates for this, and other boards shouldn't necessarily emulate the memory card.

SLOT NUMBERING

LBUS SLOT <4:0> - a slot number built into the blackplane. These pins are grounded in a different pattern at each slot; if the board plugged into that slot provides pullups it will see a unique slot number.
This is matched against LBUS ADDR <23:19> for Memory, MemoryDevice, and IDRequest operations, and against LBUS DEV <9:5> for MicroDevice operations, to select the desire board. LBUS SLOT <4> is actually bussed across each card cage, and is grounded in the main card cage and left floating in the extension cage. More discussion of this below.

RESET SIGNALS

LBUS RESET L - general reset line. This is brought low when power is turned

TABLE 4-continued on, and whenever the FEP feels like asserting it.
LBUS POWER RESET L - brought low when power is not valid. This line is used to protect disks and to perform initializations only needed when first powering on. When the machine is powered up, this line is grounded and remains grounded until the FEP validates the power and cooling and turns it off. This line is also grounded before turning off the power.

MICRODEVICE SIGNALS

LBUS DEV <9:0> - a device address from microdevice operations. Bits <9:5> select a board, by matching against the slot number. The special slot numbers 36 and 37 are used to select the FEP and MC boards, respectively. Bits <4:0> select a register or operation within the board.
LBUS DEV READ L - commands the device to put data onto the Lbus data lines.
LBUS DEV WRITE L - commands the device to take data from the Lbus data lines, at the LBUS CLOCK. Note that when LBUS DEV WRITE is used to inform the device of a DMA memory cycle being started, the Lbus data lines contain unrelated data perhaps associated with an unrelated memory read. LBUS DEV WRITE L should only be depended upon at the clock edge; it should not be used to gate the clock. If the microinstruction doing the microdevice write is NOPed by a trap or by a control-memory parity error (e.g. a microcode breakpoint), LBUS DEV WRITE L will be asserted for a period of time, past the leading edge of the clock, and will then be deasserted some time before the trailing (active) edge of the clock.
LBUS DEV COND L - the selected device may ground this line (with an open-collector nand gate) to feed a skip condition to the microcode.
Microdevice I/O is used for general communication with devices, for internal communication within the processor complex (including the FEP), and for control of DMA operations.
For general communication with devices, the Lbus simply acts as an extension of the processor's internal bus. Data are transmitted within a single cycle and clocked at the trailing edge of the clock.
Microdevice read and write to slot number 36 is used for communication with to FEP, the page tags, and the microsecond clock. Microdevice read and write to slot number 37 is used for communication with the MC and SQ boards. (It is used when reading and writing the NPC register in the SQ board in order to reserve the Lbus and connect it to the datapath; the control signals to the SQ board are transmitted separately.)
DMA works as follows. The device reguests a task wakeup when it wants to transfer a word to or from memory. The microcode task wakes up for 2 cycles. The first cycle puts the address on the Lbus address lines, makes a read or write request to memory, and also increments the address. The second cycle decrements the word count, to decide when the transfer is done. The microcode asserts DISMISS during the first cycle (the task switch occurs after the second cycle.) The device is informed of the DMA operation by the microcode through the use of a microdevice write during the first cycle. This microdevice write does not transfer any data to the device, but simply tells it that a DMA operation is being performed, and clears its wakeup request flag. (The wakeup request is removed from the bus immediately, and the flag is cleared at the clock edge.) For a read from device into memory, the device puts the data on the bus during the active cycle (one cycle after the microdevice write) and it is written into memory. For a write, the device takes data from the bus two cycles after the microdevice write.
Some devices look like memory, rather than using microdevice I/O. The criterion for which to use is generally whether the device is operated by special microcodes, and the convenience and need for speed of that microcode. Devices that look like memory can be accessed directly by Lisp code.

SPY SIGNALS

SPY <7:0> - an 8-bit, bidirectional, rather slow bus used for diagnostic purposes. Allows the FEP to read and write various cpu state while the machine is running.
SPY ADDR <5:0> - addresses the diagnostic register to be read or written
SPY READ L - gates data from the selected register onto the spy bus.
SPY WRITE L - clocks data from the spy bus into the selected register, on the trailing edge.

SPY DMA SIGNALS

When the spy bus isn't being used for diagnostics, the FEP uses it as a special side-door path to certain DMA devices. Normally the FEP uses it to receive a copy of all incoming network packets; it can also set it up to transmit to the network and to read from the disk (possibly also to write the disk; this is unclear and not yet determined). Details are in <LMHARD>DMA.DESIGN; that part of that file is said to be up to date.
SPY <7:0> - 8 bits of data to or from DMA device. These lines are continuously driven during DMA operations; the FEP's DMA buffer does not latch them.
SPY DMA ENB L - asserted if DMA operations are permitted to take place; deasserted if the spy is being used for diagnostic purposes.
SPY DMA SYNC ↑ - a clock, asseted by the device. On the rising edge of this a byte is transferred and the address is incremented. The device must take the data (for write) or supply the new data (for read) on or before the leading edge of this. This is the same wire as SPY ADDR 0.
SPY DMA BUSY L - asserted if the DMA operation has not yet completed. This can be asserted by the device or the FEP or both, depending on who determines the length of the transfer. For example, for network input TABLE 4-continued this comes from the device, while for network output and disk input it comes from the FEP (the disk doesn't know it's own block size). This is the same wire as SPY ADDR 1.

Timing Requirements.

LBUS RESET and LBUS POWER RESET are asynchronous. All other side-effects should take place at the trailing edge of the clock. LBUS REQUEST and the address lines are stable before the leading edge of the clock. LBUS WRITE however is only valid at the trailing edge of the clock; it can change as the result of a trap. Consequently it is illegal for memory reads to have side-effects, as memory reads not requested by the program can occur.

In a microdevice write, the address lines (LBUS DEV 0–9) are stable throughout the cycle, however the data (LBUS 0–35) and LBUS WRITE itself are only valid at the trailing edge of the clock. The data lines are only driven during SECOND HALF.

In a microdevice read, the address lines (LBUS DEV 0–9) are stable throughout the cycle, however LBUS READ itself is only valid at the trailing edge of the clock; side-effects are permitted but may only happen at the clock. The data (LBUS 0–35 or in some devices LBUS 0–31) should be driven throughout the cycle.

TASK 8–15 REQ and TASK 4 REQ are asynchronous and may be driven at any time. Once a task is requested, it should stay requested until explicitly dismissed or until LBUS RESET. When a task is dismissed, the task request must be deasserted during the cycle that is dismissing, so that a new task of presumably lower priority can be scheduled. The task request flip flop however must not be cleared until the trailing edge of the clock, the time when all side-effects occur. During the cycle after a dismiss the task request will not be looked at by the processor, however the device should deassert its request as quickly as it can (a glitch is expected at the beginning of the cycle).

Data driven onto the Lbus data lines (LBUS 0–43) must be synchronized to the processor clock; failure to observe this rule can cause every sort of internal parity error in the processor as well as memory ECC errors. When reading from memory, the data must be stable on the bus as early as possible, to allow time for the ECC-error decision before the end of FIRST HALF. Memory read data are driven onto the bus during FIRST HALF, and then latched by the processor during SECOND HALF. This latch is followed by a second one, that is opened during the middle of FIRST HALF to pick up the raw data, and again during the middle of SECOND HALF to pick up the ECC-corrected data (if any). ("Middle" is controlled by PROC WP). Even devices that deassert LBUS WITH ECC must provide the data early enough to avoid synchronizer failure in either of these latches.

When reading from a microdevice, there is more timing leeway since the microcode knows the specific device it is reading from and can use a slow-first-half cycle. Also there is no ECC computation. The microdevice drives the data lines during the first half and the processor effectively clocks them at the trailing edge of FIRST HALF (actually there is one latch open during FIRST HALF followed by a second latch open during SECOND HALF; this is done for hardware minimization reasons). The device data must be stable early enough to avoid synchronizer failure in these latches. The microcode will use a slow-second-half cycle if necessary, since it does not see the data until SECOND HALF. Lbus data lines not driven by a microdevice will be brought to 1 by the terminator, but not quickly enough to avoid problems. Thus all microdevice reads must drive at least LBUS 0–33.

Note that when doing a memory read, the data are driven two clocks after the request (skipping LBUS WAIT cycles); the bus-driver enable should come from a clocked register. When doing a microdevice read. the data are driven by LBUS DEV READ gated by matching of LBUS DEV ADDR 9–5. LBUS DEV READ takes some time after the beginning of the cycle to become stable, and the device should introduce as little additional delay as it can. The device should only drive the bus during FIRST HALF, so that it turns off in plenty of time before the next cycle.

When writing into memory from a DMA device, the data, including the ECC code added by the memory control, must be stable at the memory chips before the leading edge of the clock (which is when WRITE is asserted to the RAMs).

When a cycle is extended because of a trap, so that FIRST HALF happens twice, the latch through which the processor receives Lbus data is only opened during the first FIRST HALF. When a cycle is repeated because of LBUS WAIT, memory-read data are only received from the bus during the first instance of the cycle. (This only happens when a block read is done from a device that uses LBUS WAIT, since only in a block read can an active cycle and a data cycle coincide, and LBUS WAIT is associated with active cycles.) Microdevice-write and memory-write data are driven during throughout an extended or repeated cycle (microdevice-write data are only driven during SECOND HALF).

The leading edge of FIRST HALF does not precede the trailing edge of the clock. It is not a good idea to depend on this. The trailing edge of FIRST-HALF preceeds the leading edge of the clock.

LBUS WITH ECC is driven with the same timing requirements as the data lines.

LBUS DEV COND must be stable before the trailing edge of the clock.

TABLE 4-continued

| | | |
|---|---|---|
| SPY ADDR 5–0 are stable whenever SPY READ or SPY WRITE is asserted. The SPY data lines should be clocked by the trailing edge of SPY WRITE, and should be driven whenever SPY READ is asserted. If a bidirectional transceiver is used to bring the SPY bus onto a board, its direction should be controlled by SPY READ, so that it will not glitch at the trailing edge of SPY WRITE; the FEP latches the SPY lines before it deasserts SPY READ. The FEP allows a long time [?? ns] for a spy read or write, so slow logic may be employed on this bus. | | |
| LBUS ADDR 0–11 | AA1–12 | DP SQ- MC* AU- FEP* BUS |
| LBUS ADDR 12–23 | AA13–24 | MC* AU- FEP* BUS |
| U TYPE MAP SEL 0–5 | AA13–18 | DP SQ* |
| SPY READ DP ID L | AA19 | DP SQ* |
| U XYBUS SEL | AA20 | DP SQ* |
| U STKP COUNT | AA21 | DP SQ* |
| U OBUS COR 0–2 | AA22–24 | DP SQ* |
| U OBUS HTYPE 0–2 | AA25–27 | DP SQ* |
| LBUS ID REQUEST L | AA25 | MC- AU- FEP* BUS |
| LBUS BLOCK REQUEST L | AA26 | MC* AU- FEP- BUS- |
| LBUS DEV READ L | AA27 | MC* AU- FEP BUS |
| U OBUS LTYPE SEL | AA28 | DP SQ* |
| LBUS DEV WRITE L | AA28 | MC* AU- FEP BUS |
| LBUS DEV COND L | AA29 | DP- SQ MC- AU- FEP- BUS* |
| FEP CONTINUITY | AA30 | DP SQ MC AU FEP* |
| Asserted by the FEP and read back on the other continuity lines to detect the presence of processor boards (and in the correct slots). | | |
| MC CONTINUITY | AA31 | DP- SQ- MC* AU- FEP |
| Jumpered to FEP CONTINUITY on the MC card. | | |
| SQ CONTINUITY | AA32 | DP- SQ* MC- AU- FEP |
| Jumpered to FEP CONTINUITY on the SQ card. | | |
| LBUS 0–29 | AC1–30 | DP* SQ MC* AU FEP* BUS* |
| DP CONTINUITY | AC31 | DP* SQ- MC- AU- FEP |
| Jumpered to FEP CONTINUITY on the DP card. | | |
| AU CONTINUITY | AC32 | DP- SQ- MC- AU* FEP |
| Jumpered to FEP CONTINUITY on the AU card. | | |
| SPY 0–7 | BA1–8 | DP- SQ* MC* FEP* BUS* |
| SPY ADDR 0–5 | BA9–14 | DP- SQ MC AU FEP* BUS |
| SPY ADDR 0–1 also used for FEP-DMA | | |
| SPY READ L | BA15 | DP- SQ MC AU FEP* BUS |
| SPY WRITE L | BA16 | DP- SQ MC AU FEP* BUS |
| SPY DMA ENB L | BA17 | FEP* BUS |
| (spare) | BA17 | DP- SQ- MC- AU- |
| TASK 4 REQ L | BA18 | DP- SQ MC- AU- FEP- BUS* |
| Low-priority task wakeup | | |
| LBUS DEV 0–9 | BA19–28 | DP SQ* MC AU- FEP BUS |
| U AMWA 0–9 | | |
| Note that these lines have two names, since they serve as both the Lbus microdevice address and some datapath control signals. The same wires are bussed all the way through both the processor and the Lbus. | | |
| LBUS FIRST HALF +,− | BA29,BC29 | FEP* BUS |
| Terminate with 68 ohms to −2 V at end of BUS. | | |
| (spare) | BA29,BC29 | DP- SQ- MC- AU- |
| TASK 8–9 REQ L | BA30,BC30 | DP- SQ MC- AU- BUS* |
| (See below; listed here since they fall here in pin order) | | |
| (spare) | BA31 | DP- SQ- |
| -COND | BC31 | DP* SQ* |
| EXTERNAL REQUEST L | BA31 | MC- *** BUS* |
| EXTERNAL GRANT L | BC31 | MC* *** BUS- |
| Traces between SQ and MC should be cut. These will have to be jumpered around the AU and FE slots. | | |
| LBUS CLOCK +,− | BA30,BC30 | FEP* |
| | BA32,BC32 | BUS |
| Terminate with 68 ohms to −2 V at end of BUS. Note that these signals change pin number at the FEP. | | |
| PROC CLOCK +,− | BA32,BC32 | DP SQ MC AU |
| | BA31,BC31 | FEP* |
| (Separately-driven duplicate of LBUS CLOCK. Terminate with 68 ohms to −2 V at DP end. Note that these signals change pin number at the FEP. | | |
| LBUS 30–35 | BC1–6 | DP* SQ MC* AU FEP* BUS* |
| LBUS 36–43 | BC7–14 | MC* AU FEP* BUS* |
| DP TRANSPORT TRAP L | BC7 | DP* SQ |
| Asserted if a trap is required for garbage-collector processing of the data being read from memory (a function of the data type and the high-order address field). | | |
| DP TYPE TRAP | BC8 | DP* SQ |
| Asserted if the type map calls for a trap (bad data type or invisible pointer). | | |
| DP TRAP PARAM 0–3 | BC9–12 | DP* SQ |
| Trap parameter (dispatch code for arithmetic trap, trap number for type trap). | | |
| DP SLOW JUMP L | BC13 | DP* SQ |
| Asserted if a non-NOPing trap is required (used by the stack | | |

TABLE 4-continued

| | | |
|---|---|---|
| garbage collector that doesn't exist yet). | | |
| DP MISC TRAP | BC14 | DP* SQ |
| IOR of trap conditions other than the above. | | |
| LBUS WITH ECC | BC15 | MC AU- FEP BUS* |
| AMEM PAR ERR L | BC15 | DP* SQ |
| Parity error in A-memory; stops machine | | |
| (spare) | BC16 | DP- SQ- MC- AU- FEP- BUS- |
| Spare Lbus line | | |
| LBUS POWER RESET L | BC17 | DP SQ MC AU FEP* BUS |
| Terminate somehow. May need to be brought out to power supply? | | |
| (May go to front panel also, but FEP will provide that connection.) | | |
| TASK 8-15 REQ L | BA30,BC30,BC18-23 | DP- SQ MC- AU- FEP- BUS* |
| TASK 8-9 REQ L are not connected to the FEP. | | |
| LBUS REQUEST L | BC24 | MC* AU- FEP* BUS |
| TYPE PAR ERR L | BC24 | DP* SQ |
| Parity error in type map | | |
| LBUS WRITE L | BC25 | MC* AU- FEP* BUS |
| GC MAP PAR ERR L | BC25 | DP* SQ |
| Parity error in garbage-collector address-space-quantum map | | |
| LBUS REFRESH L | BC26 | MC- AU- FEP* BUS |
| BMEM PAR ERR L | BC26 | DP* SQ |
| Parity error in B-memory; stops machine | | |
| LBUS WAIT L | BC27 | DP SQ- MC AU- FEP BUS* |
| LBUS RESET L | BC28 | DP SQ MC AU FEP* BUS |
| PROC WP +,− | CA1,CC1 | DP SQ MC AU FEP* |
| Write-pulse for internal static RAMs; occurs twice per cycle. | | |
| Terminate with 68 ohms to −2 V at DP end. | | |
| PROC FIRST HALF +,− | CA2,CC2 | DP SQ MC AU FEP* |
| Separately-driven duplicate of LBUS FIRST HALF. | | |
| Terminate with 68 ohms to −2 V at DP end. | | |
| CLK EXTEND CYCLE | CA3 | DP* SQ- MC* AU- FEP |
| A wired-OR ECL signal, asserted when extra time is needed for a trap. | | |
| Terminate with 100 ohms to −2 V at DP end and on FEP. | | |
| CLK CS PRESET L | CA4 | DP SQ- MC- AU- FEP* |
| Forces chip-select for A,B memories on at the beginning of the cycle, | | |
| until there has been enough time for the pass-around decision. | | |
| (Saves a few nanoseconds). | | |
| SQ NEXT INST L | CA5 | DP SQ* MC AU- FEP- |
| Asserted if this is the last microinstruction for this | | |
| macroinstruction. | | |
| U AMRA 0-5 | CA6-11 | DP SQ* |
| FEP LBUS RQ L | CA6 | MC AU- FEP* |
| Asserted if FEP wants the bus or is using it (active cycle). | | |
| REFRESH RQ L | CA7 | MC AU- FEP* |
| Asserted if time for a memory refresh, or refresh active cycle. | | |
| MC ECC DELAY | CA8 | MC* AU- FEP |
| Extends the clock during the second half in order to provide | | |
| time for single-bit error correction. | | |
| This is an ECL signal. | | |
| DOUBLE ECC ERROR L | CA9 | MC* AU- FEP |
| True if there is an uncorrectable error in the data for this | | |
| memory read. | | |
| (unknown) | CA10-11 | MC AU- FEP |
| U AMRA 6-11 | CA12-17 | DP SQ* MC AU(-?) |
| U AMRA SEL 0-1 | CA18-19 | DP SQ* MC AU(-?) |
| U AMWA 10-11 | CA20-21 | DP SQ* MC AU(-?) |
| U AMWA SEL 0-1 | CA22-23 | DP SQ* MC AU(-?) |
| U MAGIC 0-3 | CA24-27 | DP SQ* MC AU |
| U SPEC 0-4 | CA28-32 | DP SQ* MC AU |
| CLK WO ENB L | CC3 | DP SQ- MC- AU- FEP* |
| Another timing signal for A,B memory. | | |
| DP SET GC TAG L | CC4 | DP* SQ- MC- AU- FEP |
| Registered output from the GC map indicating that the | | |
| Abus datum is a pointer to a temporary space. This sets | | |
| a GC page tag bit if main memory is being written. | | |
| NOP L | CC5 | DP SQ* MC AU FEP- |
| Asserted if the current microinstruction should not do | | |
| anything, because the processor is stopped, stalled, or | | |
| trapping (valid late, should not be used to gate the clock). | | |
| U SPEED 0-1 | CC6-7 | DP- SQ* MC- AU- FEP |
| CLK EXTRA INNINGS | CC8 | DP- SQ MC- AU- FEP* |
| Asserted during the second cycle of a trap. | | |
| TASK 3 REQ | CC9 | DP- SQ MC- AU- FEP* |
| Task wakeup from the FEP | | |
| MC PROC NORMAL GRANT L | CC10 | DP SQ- MC* AU- FEP |
| Asserted if the LBUS ADDR lines contain an address derived | | |
| by mapping the VMA to a physical address. This signal enables | | |
| the DP card to capture the mapped address for possible later | | |
| use in addressing A-memory. Also used by the page tag memory. | | |
| PAGE TAG PAR ERR L | CC11 | DP- SQ MC- AU- FEP* |
| Parity error in page tag memory; stops machine. | | |
| SPARE ERROR L | CC12 | DP- SQ MC- AU- |

TABLE 4-continued

| | | |
|---|---|---|
| Grounding this halts the machine after completing the current microinstruction; | | |
| (spare) | CC13–15 | DP- SQ- MC- AU- |
| Bus these across processor (except FEP) and maybe we'll find a need for them. | | |
| INST 0–7 | CC16–23 | DP MC* |
| Low 8 bits of the current macroinstruction. | | |
| Note: these lines are wired around the SQ slot. | | |
| U AU OP 0–7 | CC16–23 | SQ* AU |
| Microcode control for the AU. | | |
| [This assumes 8 more bits of control memory are wedged in.] | | |
| Note: these lines are wired around the MC slot. | | |
| AU STOP L | CC24 | SQ AU* |
| Any error on the AU that needs to stop the machine. | | |
| Note: this line is wired around the MC slot. | | |
| (spare) | CC25–28 | SQ- AU- |
| Connect these between the SQ and AU for possible future use | | |
| Note: these lines are wired around the MC slot. | | |
| SEQUENCE BREAK | CC24 | DP* MC |
| Macrocode interrupt request. | | |
| Note: this line is wired around the SQ slot. | | |
| MC COND | CC25 | DP MC* |
| A microcode skip condition. | | |
| Note: this line is wired around the SQ slot. | | |
| MC OBUS TO LBUS L | CC26 | DP MC* |
| Enables the datapath output to drive the Lbus | | |
| Note: this line is wired around the SQ slot. | | |
| MC OBUS REG TO LBUS L | CC27 | DP MC* |
| Enables the datapath result from the previous microinstruction to drive the Lbus (used when writing main memory) | | |
| Note: this line is wired around the SQ slot. | | |
| MC ADDR IN AMEM L | CC28 | DP MC* |
| Indicates that the VMA maps to an A-memory address | | |
| Note: this line is wired around the SQ slot. | | |
| MC ABUS 32–35 | CC29–32 | DP* SQ- MC* AU* |
| Data bus between DP, MC, and AU. | | |
| MC ABUS 0–31 | DC1–32 | DP* |
| | DA1–32 | MC* AU* |
| Bidirectional data bus between DP, MC, and AU. | | |
| Note: this is wired around the SQ slot. | | |
| Note: this is on the "C" column at the DP, but the "A" column elsewhere. | | |
| U BMRA 0–7 | DA1–8 | DP SQ* |
| U BMWA 0–3 | DAS-12 | DP SQ* |
| U BMEM FROM XBUS | DA13 | DP SQ* |
| U COND FUNC 0–1 | DA14–15 | DP SQ* |
| U COND SEL 0–4 | DA16–20 | DP SQ* |
| U BYTE F 0–1 | DA21–22 | DP SQ* |
| U ALU 0–3 | DA23–26 | DP SQ* |
| DISPATCH 0–3 | DA27–30 | DP* SQ |
| Contents of field being dispatched on | | |
| (spare) | DA31–32 | DP- SQ- |
| (spare) | DC1–4 | SQ- MC- |
| CUR TASK 0–3 | DC5–8 | SQ* MC |
| Task in which the current microinstruction is executing | | |
| TASK SWITCH L | DC9 | SQ* MC |
| Asserted if the next microinstruction will be from a different task | | |
| WANT NEXT INST | DC10 | SQ* MC |
| Asserted if the address supplied by the IFU in the previous cycle is actually being used as the next microinstruction address. | | |
| Stalls the processor if the address was not valid after all. | | |
| MC WAIT | DC11 | SQ MC* |
| Asserted if the processor must stall and wait for the Lbus | | |
| MC MAP MISS L | DC12 | SQ MC* |
| Asserted if a map-miss trap should be taken | | |
| MC TRAP PARAM 0–1 | DC13,14 | SQ MC* |
| Modifiers for trap address | | |
| MC TASK INHIBIT L | DC15 | SQ MC* |
| Inhibits a task switch after the next instruction. | | |
| MC STOP L | DC16 | SQ MC* |
| Any parity error on MC board; stops processor. | | |
| IFU DISP 2–13 | DC18–28 | SQ MC* |
| Control-memory address of the first microinstruction to execute the next macroinstruction | | |
| (spare) | DC29–30 | SQ- MC- |
| U MEM 2–0 | DC17,DC31–32 | SQ* MC |
| Memory-control control field | | |
| Bit 2 is not next to the other bits for historical reasons | | |
| Pins DC1–32 on the AU slot are left unconnected for possible cabling to a second board or other expansion. | | |
| Pins CA11–32, CC12–32, DA1–32, DC1–32 on the FEP slot are left unconnected | | |

TABLE 4-continued

| |
|---|
| for paddleboard use. |

A main goal of the system architecture is to execute one simple macroinstruction per clock tick. The instruction fetch unit (IFU) supports this goal by attempting to prefetch macroinstructions and perform microinstruction dispatching in parallel with the execution of previous instructions.

The prefetch (PF) part of the IFU fills a 1 Kword instruction cache, which holds the 36-bit instruction words. Approximately 2000 17-bit instructions can be held in the instruction cache. The instructions have a data type (integer). The IFU feeds the cache takes the instructions, decodes them, and produces a microcode address. There is a table which translates a macroinstruction onto an address of the first microinstriction.

At the end of the clock tick the processor decides whether it needs a new instruction or it should continue executing microcode.

The system instruction set corresponds very closely to Zetalisp. Although one never programs directly in the instruction set one will encounter the instruction set when using the Inspector or the Window Error Handler. The instructions are 17 bits long. Seven instruction formats are used:

1. Unsigned-immediate operand—This format is used for program-counter-relative branches, immediate fixnum arithmetic, and specialized instructions such as adjusting the height of the stack.

2. Signed-immediate operand—The operand is an 8-bit two's complement quantity. It is used in a similar manner as the unsigned-immediate format.

3. PC-relative operand—This is similar to signed-immediate, with the offset relative to the program counter.

4. No-operand—If there are any operands, they are not specified, since it is assumed they are on the top of the stack. Also used by many basic Zetalisp instructions.

5. Link operand—This specifies a reference to a linkage area in a function header.

6. @Link operand—This specifies an indirect reference to a stack frame area associated with a function.

7. Local operand—The operands are on the stack or within a function frame. This format is used for many basis Zetalisp instructions.

Many instructions address a source of data on which they operate. If they need more than one argument, the other arguments come from the stack. Examples include PUSH (push source onto the stack), ADD (add source and the top of stack), and CAR (take the car of the source and push it onto the stack). These instructions exist in several formats.

There is no separate destination field in the system instructions. All instructions have a version which pushes onto the stack. Additional opcodes are used to specify other destinations.

The following categories of instructions are defined for the system:

Data motion instructions—The instructions move data without changing it. Examples include PUSH, POP, MOVEM, and RETURN.

Housekeeping instructions—These are used in message-passing, function called, and stack manipulation. Examples include POP-N, FIX-TOS, BIND, UNBIND, SAVE-BINDING-STACK-LEVEL, CATCH-OPEN, and CATCH-CLOSE.

Function calling instructions—These use a non-inverted calling sequence; the arguments are already on the stack. Examples include CALL, FUNCALL, FUNCALL-VAR, LEXPR-FUNCALL, and SEND.

Function entry instructions—These are used within functions that take more than four arguments or have a rest argument, and hence do not have their arguments set up by microcode. Examples include TAKE-N-ARGS, TAKE-N-ARGS-REST, TAKE-N-OPTIONAL-ARGS, TAKE-N-OPTIONAL-ARGS-REST.

Function return instructions—These return values from a function. The main opcode 9 is RETURN, with some variations.

Multiple value receiving instructions—These take some number of values off the stack. Example: TAKE-VALUES.

Quick function call and return instructions—These are fast function calls. Example: POPJ.

Branch instructions—Branches change the flow of program control. Branches may be relative to the program counter or to the stack.

Predicates—These include standard tests such as EQ, EQL, NOT, PLUSP, MINUSP, LESSP, GREATERP, ATOM, FIXP, FLOATP, NUMBERP, and SYMBOLP.

Arithmetic instructions—These perform the standard arithmetic, logical, and bit-manipulation operations. Examples include ADD, SUBTRACT, MULTIPLY, TRUNC2 (this does both division and remainer), LOGAND, LOGIOR, LOGXOR, LDB, DPB, LSH, ROT, and ASH.

List instructions—Many Zetalisp list-manipulation instructions are microcode directly into the system. Examples are CAR, CDR, RPLACA, and RPLACD.

Symbol instructions—These instructions manipulate symbols and their property lists. Examples include SET, SYMEVAL, FSET, FSYMEVAL, FBOUNDP, BOUNDP, GET-PNAME, VALUE-CELL-LOCATION, FUNCTION-CELL-LOCATION, PROPERTY-CELL-LOCATION, PACAKGE-CELL-LOCATION.

Array instructions—This category defines and quickly manipulates arrays. Examples include AR-1, AS-1, SETUP-1D-ARRAY, FAST-AREF, ARRAY-LEADER, STORE-ARRAY-LEADER are used to access structure fields.

Miscellaneous instructions—These include pseudo data movement instructions, type-checking instructions, and error recovery instructions not used in normal compiled code.

The system instruction execution engine works using a combination of hardware and microcode. The engine includes hardware for the following functions:

Address computation
Type-checking
Rotation, masking, and merging of bit fields
Arithmetic and logical functions
Multiplication and division
Result-type insertion To give an example of the instruction execution engine, a 32-bit add instruction goes through the following sequence of events.

Fetch the operands (usually from the stack); error correction logic (ECC) checks the integrity of the data; ECC does not add to the execution time if the data is valid.

Check the data type fields.

Assume the operands are integers and perform the 32-bit add in parallel with the data type checking (If the operands were not integers, trap to the microcode to fetch the operands and perform a different type of add).

Check for overflow (if present, trap to microcode).

Tag the result with the proper data type.

Push the result onto the stack.

There is no overhead associated with data type checking since it goes on in parallel with the instruction, within the same cycle.

Rather than having the ECC distributed on all of the boards of the system as shown in FIG. 1, a single centralized ECC is located on the memory control board. All data transfers into and out of the memory and on the Lbus pass through the single centralized ECC. The transfers between peripherals and the FEP during a micro DMA also pass through the centrallized ECC on the way to the main memory.

FRONT END PROCESSOR

During normal operation, the FEP controls the low and medium-speed input/output (I/O) devices, logs errors, and initiates recovery procedures if necessary. The use of the FEP drastically reduces the real-time response requirements imposed directly on the system processor. Devices such as a mouse and keyboard can be connected to the system via the FEP.

The front end process also feeds a generic bus network which is interfaced through the FEP to the Lbus and which, by means of other interfaces are able to convert Lbus data and control signals to the particular signals of an external bus to which peripherals of that external bus type may be connected. An example of an external bus of this type is the multibus. The Lbus data and control signals are converted to a generic bus format by the circuitry of FIGS. 151-2 and 157-8 independent of the particular external bus to be connected to and thereafter convert the generic bus format of data and control signals to that of the external bus.

Four serial lines are connected to the FEP. Two are high-speed and two are low-speed. Each one may be used either synchronously or asynchronously. One high-speed line is always dedicated to a system console. One low speed line must be dedicated to a modem. The band rate of the low-speed lines is programmable, up to 19.2 Kbaud. The available high-speed line is capable of speeds up to 1 Mbaud. All four lines are terminated using standard 25-pin D connectors.

Real-time interrupts from the MULTIBUS are processed by the FEP. After receiving an interrupt, the FEP traps to the appropriate interrupt handler. This handler writes into a system communication area of the FEP's main memory, and then sends an interrupt to the system CPU. The system CPU reads the message left for it in the system communication area and takes appropriate action.

The paddle cards of FIGS. 168-176 provide the remainder of the external bus interface circuitry. Table 5 below indicates the signals to and from the paddle boards for a storage module drive disk controller and for a priam device.

Interrupt processing is sped up by the use of multiple microcontexts stored in the system processor. This makes interrupt servicing faster, since there is no need to save a full microcontext before branching to the interrupt handler.

The FEP also has the ability to achieve processor mediated DMA transfers.

DMA operations from the system to the FEP may be carried out at a rate of 2 MByte per second.

I/O device DMA interface (to FEP buffer and to Microcode Tasks)

FEP to device:

FEP fills buffer with data, arranged so that carry out of buffer address counter happens at right time for stop signal to device. FEP resets address counter to point to first word of data. FEP sets buffer mode to enable buffer data to drive the bus (SPY 7:0), sets device to tell it what operation, the face that it is talking to the FEP, and to enable it to drive the bus control signal SPY DMA SYNC.

Device takes a word of data off of the bus and generates a pulse on SPY DMA SYNC. The trailing edge of this pulse increments the address counter as well as clocking the bus into the device's shift register. A carry comes out of the address counter during this pulse if this is the last word (or near the last, depending on device); this carry clears SPY DMA BUSY which tells the device to stop.

When SPY DMA BUSY clears the FEP is interrupted.

Device to FEP:

For disk, which needs a stop signal, FEP arranges address counter so carry out will generate a stop signal. Network generates its own stop signal based on end-of-packet incoming. FEP resets address counter to point one word before where first word of data should be stored. FEP sets buffer mode to not drive the bus and to do writes into buffer memory, sets device to tell it what operation, the fact that it is talking to the FEP, to enable it to drive the bus from a register, and to enable it to drive the bus control signals SPY DMA SYNC and SPY DMA BUSY (if it is the net).

When device has a word of data, it generates a pulse on SPY DMA SYNC. Trailing edge of this pulse clocks the data into a register in the device, which is driving SPY 7:0, and increments the address counter, which reflects back SPY DMA BUSY (if device is the disk). The buffer control logic waits for address and data setup time then generates an appropriate write pulse to the memory.

When SPY DMA BUSY clears the FEP is interrupted.

To summarize device FET interface lines:

SPY 7:0

Bidirectional data bus. This is the same bus used for diagnostics.

SPY DMA ENB L

Asserted if the spy bus may be used for DMA. The FEP deasserts this when doing diagnostic reads and writes, to make sure that no DMA device drives the spy bus.

SPY DMA SYNC

Driven by selected device, trailing (rising) edge increments address counter and starts write timing chain. This is open-collector.

SPY DMA BUSY L

An open-collector signal which is asserted until the transfer is over. This is driven by the device or the FEP depending on who decides the length of the transfer. (Probably the FEP drives it from a flip flop optionally set by the program, and cleared by the counter overflow.) The FEP can enable itself to be interrupted when SPY DMA BUSY is non-asserted.

An I/O or generic bus is used to set up the device's control registers to perform the transfer and to drive or receive the above signals. Note that all of the tristate enables are set up before the transfer begins and remain constant during the entire transfer.

Device to microtask:

The devices control resistors are first set up using the I/O bus and the state of the microtask is initialized (both its PC and its variables, typically address and word count). A task number is stored into a control register in the device.

When the device has a word of data, it transfers it to a buffer register and sets WAKEUP. This is the same timing as FEP DMA NEXT: WAKEUP may be set on either edge since the processor will not service the request instantaneously. If WAKEUP is already set, it sets OVERRUN, which will be tested after the transfer is over.

The processor decides to run the task (see below). During the first cycle, the task microcode specifies DISMISS: the device sees this, gated by the current task equals its assigned task number, and clears WAKEUP at the end of the cycle. DISMISS also causes the processor to choose a new task internally. The microcode also generates a physical address. The device also sees the microcode function DMA-WRITE, gates by current task equals device's task, and drives the buffer register onto the bus. The processor drives the ECC-syndrome part of the bus and sends a write command to the memory.

During the second cycle, the processor counts down the word count, and does a conditional skip which affects at what PC the task wakes up next time, depending on whether the buffer has run out.

During the cycle two cycles before the first task cycle, the device drives its status onto 3 or 4 special bus lines, which the microtask may have enables to dispatch on. This is used for such things as stopping on disk errors and stopping at the end of a network packet.

Microtask to device:

The device's control registers are first set up using the I/O bus, and the state of the microtask is initialized (both its PC and its variables, typically address and word count). A task number is stored into a control register in the device. WAKEUP is forced on so that the first word of data will be fetched.

When the device wants a word of data, it takes it from a buffer register and sets WAKEUP so that the microtask will refill the buffer register. At the same time it sets BUFFER EMPTY, and if it is already set, sets OVERRUN.

During the first cycle of the task, the microcode spcifies DISMISS, which clears wakeup. It also generates an address and specifies DMA-READ. In the second cycle the task decrements the word count. In the third cycle (task not running), the ECC-corrected data is on the bus; at the end of this cycle it is clocked into the buffer register and BUFFER EMPTY is cleared. DMA-READ anded with current task-device task is delayed through two flip-flops then used to enable this clocking of the holding register.

Task selection hardware (in device and processor):

Device has a task-number register and a WAKEUP flip/flop, which is set by the device and cleared by the DISMISS signal from the processor when the current task equals the device's task. This can be an R/S flip flop or a J/K with either the set or the clear edge-triggered depending on what the device wants; the processor doesn't care. In the device to microtask case above, WAKEUP was being used for the overrun computation, and therefore the clearing should be edge-triggered.

WAKEUP enables an open-collector 3–8 decoder which decodes the assigned task number and drives the selected TASK REQUEST n line to the processor.

The processor sends the following signals to the device in addition to the normal I/O bus and clock;

- CURRENT TASK (the task which the executing microinstruction belongs to)
- NEXT NEXT TASK (2 clocks ahead of CURRENT TASK)
- DISMISS (current task says to clear wakeup)
- TASK-SPECIFIC FUNCTION (communication from microcode to device)
- TASK STARTUP DISPATCH (DMA-READ, DMA-WRITE decodes of this) (communication from device to microcode, driven if NEXT NEXT TASK matches assigned task)

The processor synchronizes the incoming TASK REQUEST lines into a register, clocked by the normal microcode clock. The register is ANDed with a decoder which generates FALSE for the current task if DISMISS is asserted. The results go into a priority encoder. The output of the priority encoder is compared with current task. If they differ, and the microcode is asserted TASK SWITCH ENABLE, and the machine did not switch tasks in the previous cycle, then it switches tasks in this cycle. During the second half of the cycle, NEXT NEXT TASK is selected from the priority encoder output rather than CURRENT TASK, and the state of that task is fetched. There doesn't appear to be a useful place to use a PAL here.

When DISMISS is done, WAKEUP does not clear until the end of the cycle, which means it is still set in the synchronizer register. However, the output of the priority encoder will never be looked at during the cycle after a DISMISS, since we necessarily switched tasks in the previous cycle.

Minimum delay from WAKEUP setting to starting execution of the first microinstruction of the task is two cycles, one to fetch the task state and one to fetch the microinstruction. This can be increased by up to one cycle due to synchronization, by one cycle due to just having switched tasks, and by more if there are higher-priority task requests or the current task is disabling tasking (e.g. tasking is disabled for one cycle during a memory access). Max delay for the highest priority task is then 5 cycles or 1 microsecond, assuming tasking is not disabled for more than one cycle at a time.

When the microcode task is performing a more complicated service than simple DMA, the WAKEUP flip/flop in the device must remain set until the last microinstruction to keep the task alive.

The FEP boots the machine from a cold start by reading a small bootstrap program from the disk, loading it into the system microcode memory, and executing it. Before loading the bootstrap program, the FEP performs diagnostics on the data paths and internal memories of the processor.

Error handling works by having the FEP report error signals from the system processor. If the errors come from hardware failures detected by consistency checks (e.g., parity errors in the internal memories) then the processor must be stopped. At this point the FEP directly tests the hardware and either continues the processor or notifies the user. If the error signals are generated by software (microcode or Zetalisp) then the FEP records the error typically, disk or memory errors).

Periodically, the system requests information from the FEP and records it on disk, to be used by maintenance personnel. Since the FEP always has the most recent error information, it is possible to retrieve it when the rest of the machine crashes. This is especially useful when a recent hardware malfunction causes a crash. Since the error information is preserved, it can be recovered when the processor is revived.

Functions are divided into three categories according to their real-time constraints:

Unit selection, seeking, and miscellaneous things like recalibration and error-handling are done by Lisp code. There are I/O device addresses (pseudo-memory) whic allow sending commands to the disk drive and reading back its status (and its protocol, e.g. SMD, Priam). When formatting the disk, the index and sector pulses are directly read from the disk through this path and the timing relative to them is controlled by Lisp code or special formatting microcode.

Head selection is the same except that it is done by microcode rather than Lisp code so that an I/O operation may be continued from one track to the next in a cylinder without missing a revolution because of the delay in scheduling a real-time process to run some Lisp code.

Read/write operations are done by disk control hardware in cooperation with microcode. There is a state machine which generates the "control tag" signals to the drive (i.e. read gate and write gate), controls the requests to the microcode task to transfer data words into or out of main memory, and controls the ECC hardware.

When the FEP is using the disk, the first two functions above are performed by LIL code in the FEP; the third function is performed by the disk state machine in cooperation with the FEP's high-speed I/O buffer.

The disk state machine can select its clock from one of two unsynchronized clocks, both of which come from the disk. One is the servo clock and the other is the read clock, derived from the recorded data. Servo clock is always valid while there is a selected drive, it is spinning, and it is ready. Delays are always generated from the servo clock, not from the machine clock or one-shots.

The state machine is started by an order from the microcode, Lisp code, or the FEP and usually runs until told to stop. When an SMD is being used, most of the lines on the disk bus, including control tag, come from a register which must be set up beforehand, but the Read Gate and Write Gate lins are OR'ed in by the state machine.

The state machine stops and sets an error flag if any of the following conditions occurs:

No disk selected (SMD)

Multiple disks selected (SMD)

Disk not ready (Priam)

Overrun (slow response from microcode)

An unexpected index or sector pulse

Writing the command register while the state machine is running

These error checks prevents clobbering an entire track if the microcide dies for some reason and never sends the stop signal.

Other errors from the disk, such as Of Cylinder, are not checked for. Most drives will cause a fault if any error occurs while writing. The disk error status (including fault) is checked by microcode and by macrocode after the sector transfer is completed.

The state machine can hang if the clocks from the disk turn off for some reason. The macrocode should provide a timeout.

The following orders to the state machine exist, i.e. it has the following program in its memory:

Read: The state machine delays, turns on read gate, delays some more, changes from the internal clock to the disk bit clock, waits for async pattern, then reads data words and gives them to the microcode until told to stop. The stop signal is issued simultaneous with the acceptance of the third-to-last data word by the microcode task. After reading the last data word, the ECC is read, and the microcode task is awakened one last time as the state machine goes idle. The microcode reads the ECC-0 flag over the bus; the flag is 1 if no error occurred.

Read Header: The state machine waits for a sector pulse, delays, turns on read gate, delays some more, changes from the internal clock to the disk bit clock, waits for async pattern, reads one data word (a sector header), turns off read gate, and falls into the Read program. The header word is given to the macrocode as data (32 bits of header and 4 bits of garbage); it is up to the microcode to do header-comparison to make sure that the proper section is being accessed. There is no ECC on the header, instead there are some redundant bits which the microcode checks in parallel with the real bits. In other words, the header consists of 6 bits of sector number, 6 bits of head number, 12 bits of cylinder number, and 4 bits of some hash function of the other bits, fitting into the 28-bit header stored in a DCW list.

"Memory-mapped" I/O is used for all functions except those relating to the DMA task. This allows the FEP to read from the disk simply by doing Lbus operations, with no need to execute microinstructions (the CPU however must be stopped or at least known not to be touching the disk itself). No provision is made for the FEP to use the disk when the Lbus is non-functional.

Command Register: This register directly controls the bus, tag and unit-select lines to the disk(s), provides a DMA task assignment, and selects a state-machine program to be executed. If the state machine is running when the command register is written, it is stopped with an error. Otherwise it may optionally be started (if bit 24 is 1). Writing the command register resets various error conditions. All bits in the command register may be read back. All bits in the command register except the low 8 are zeroed by Lbus Reset.

| | |
|---|---|
| 10:0 | Disk. bus. |
| 11 | Obus in |
| 15:12 | SMD: tage 3:0 |
| 19:16 | Unit number |
| 23:20 | Command opcode (selects state machine program) |
| 24 | Start. Starts state machine if 1. Reads back as −DISK IDLE (1 if state machine running). |
| 28:25 | Task. 8–15 selects that task, otherwise no task. |
| 29 | FEP using disk. Enables SPY bus DMA. |
| 30 | 32-bit mode (forces fixnum data type in high bits) |
| 31 | (spare) |

A task wakeup occurs if the state machine orders one, and whenever the state machine is not running. No task should be assigned by the command register when the state machine is not being used. A wakeup will always occur immediately when a task assignment is given.

Diagnostic Register

This register allows a program to disable the paddle board and simultate a disk, testing most of the logic with the machine fully assembled. This register is cleared when the machine is powered on.

| | |
|---|---|
| 0 | Read clock |
| 1 | Servo clock |
| 2 | Read data |
| 3 | Index |
| 4 | Sector |
| 7:5 | (spare) |

Paddle Enable Register

This register is cleared when the machine is powered on. It allows the paddle board to be turned off. It is set to 10 for normal operation. The bits are:

| | |
|---|---|
| 0 | Paddle ID enable (paddleboard IO prom to disk bus) |
| 1 | Paddle disk enable (disconnect disk part of paddle board) |
| 2 | Paddle net enable (disconnect network part of paddle board) |
| 3 | Paddle power OK (enable disk to spin up) |

Status Register

Reading this register reads the status of the selected drive, of the disk interface, and some internal diagnostic signals.

Overrun and Error are cleared by writing the command register (however writing the command register while the state machine is running will set Error and stop the state machine).

Rotational Position Sensing

This is a 16-bit register with 4 bits for each deive, containing the current sector number.

Error Correction

If bit 15 of the status register is 0 after a read operation, an ECC error was detected. The error-correct state machine operation may be used to compute the error syndrome. The microcode task wakes up every 32 bits, simply to count the bits. After the state machine stops, the error correction register may be read:

| | |
|---|---|
| 10:0 | Error pattern |
| 15:11 | Bit number within the word |

DMA Transfers

A microdevice write operation is done during the address cycle. At the same time the sequencer is old to dismiss the task and the memory control is told to start the appropriate (read or write) DMA cycle. Bits in the Lbus device address are:

| | |
|---|---|
| 9:5 | card slot number |
| 4:3 | subdevice (0-disk) |
| 2:0 | operation |

Operations:

| | |
|---|---|
| 0 | write disk buffer directly (rev 2 and later) |
| 1 | dma cycle (start dma cycle without dismission) |
| 2 | dismiss, task acknowledge (just clear wakeup) |
| 3 | dismiss & dma cycle |
| 4 | dismiss (only) |
| 5 | kill disk task |
| 6 | dismiss, task acknowledge, set end flag |
| 7 | dma cycle & set end flag & dismiss |

Operation 3 is what is normally used. Operation 1 could allow transferring multiple words per task wakeup if there was more than 1 word of buffering: it is also probably needed by the microcode in order to start a DMA transfer for the disk while continuing to run the task.

Operation 2 is used for non-data-transfer task wakeups, such as the wakeup on sector pulse and the wakeups used to count words when doing ECC correction. It simply dismisses the task (clears wakeup), and also has different timing with respect to the Overrun error.

Operation 5 clears the disk task assignment, preventing further wakeups, clears control tag so that the next disk command can be given cleanly and also "accidentally" clears fep-using-disk and disk-36-bit-mode.

When reading from disk into memory, after the dma cycle with the end flap there will be two additional data words; the state machine will then read and check the ECC code and then stop.

When writing from memory to disk, the data word supplied with the end flag is the second-to-last data word in the sector; the state machine will accept one more data word, then write the ECC code after it, write a guard byte, and then stop. The same timing applies for read-compare.

For microdevice read, the bits in the Lbus device address are:

| | |
|---|---|
| 9:5 | card slot number |
| 4:3 | subdevice (0-disk) |
| 2:0 | operation (0 for disk - read data buffer). |

FIGS. 10-23 are schematics of a memory board having 512K by 44 bits of memory storage and constituting the main memory of the system according to the present invention.

Figure 10:
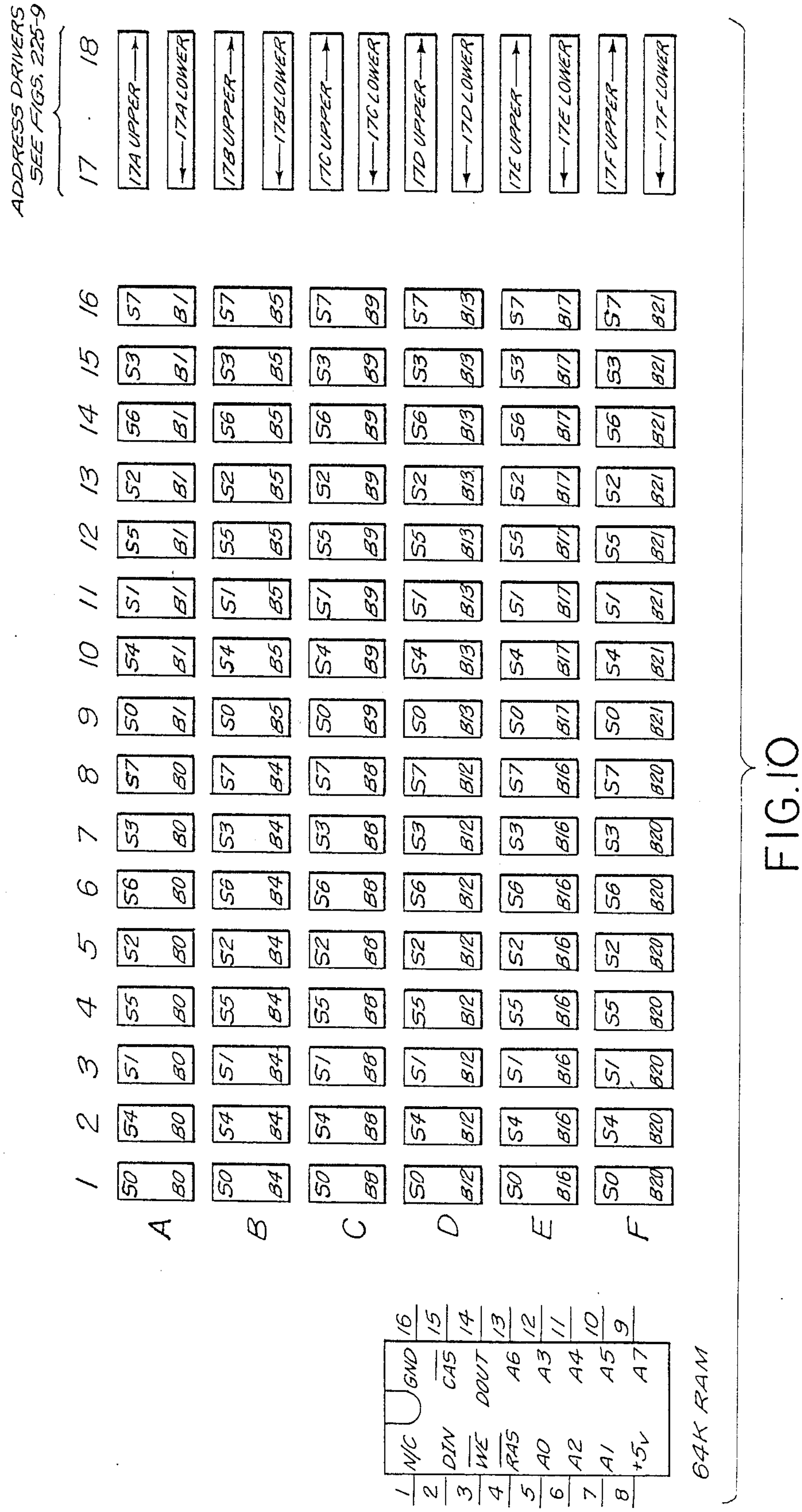
FIGS. 10–23 are a schematic of a 512 K memory card according to FIG. 1.

The memory comprises a board of 64K ram chips as shown in FIG. 10 and which are laid out on the memory board in the manner set forth in FIGS. 10-23, that is in Cols. 1-16 and 19-34 and rows A-M. The address drivers are centrally located in the columns marked 17 and 18 and alternatively drive the left and right or lower and upper memory devices. The read and write signals for the memory checks have been set forth with respect to the description of the Lbus timing modes earlier and will not be repeated herein.

Figure 11:
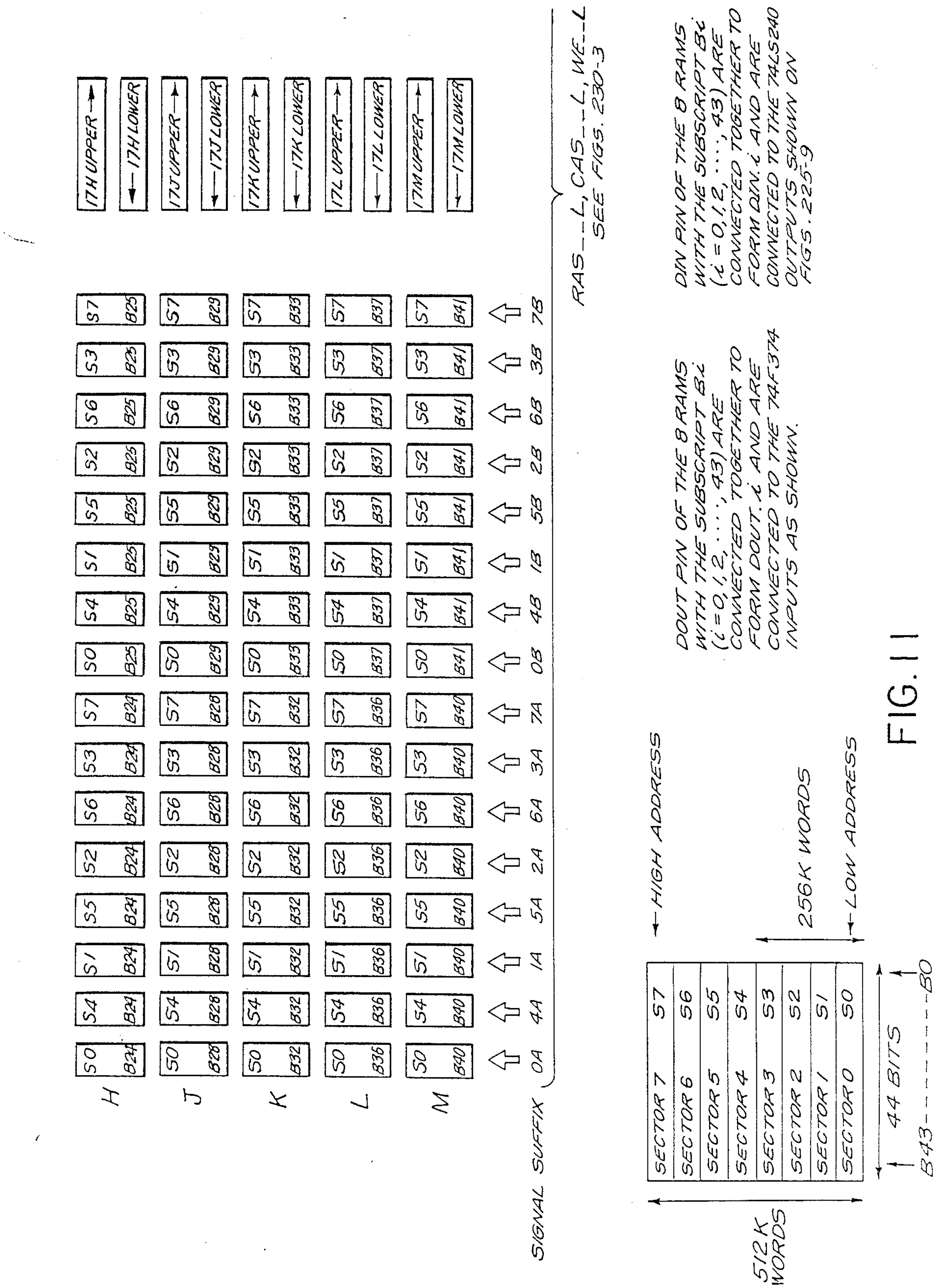
Figure 12:
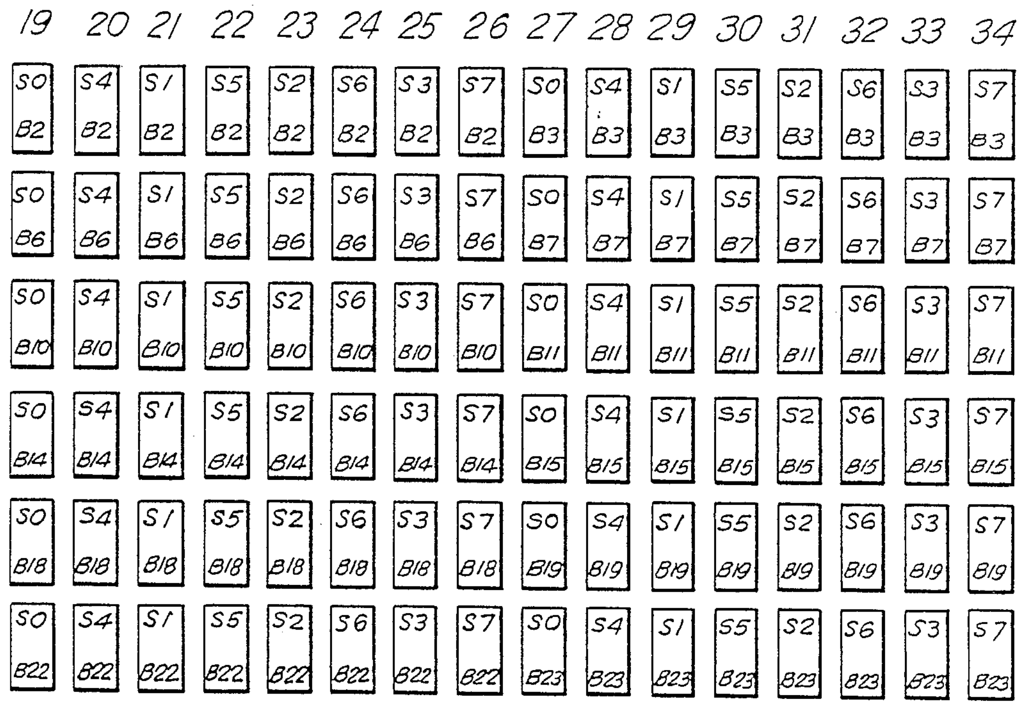
Figure 13:
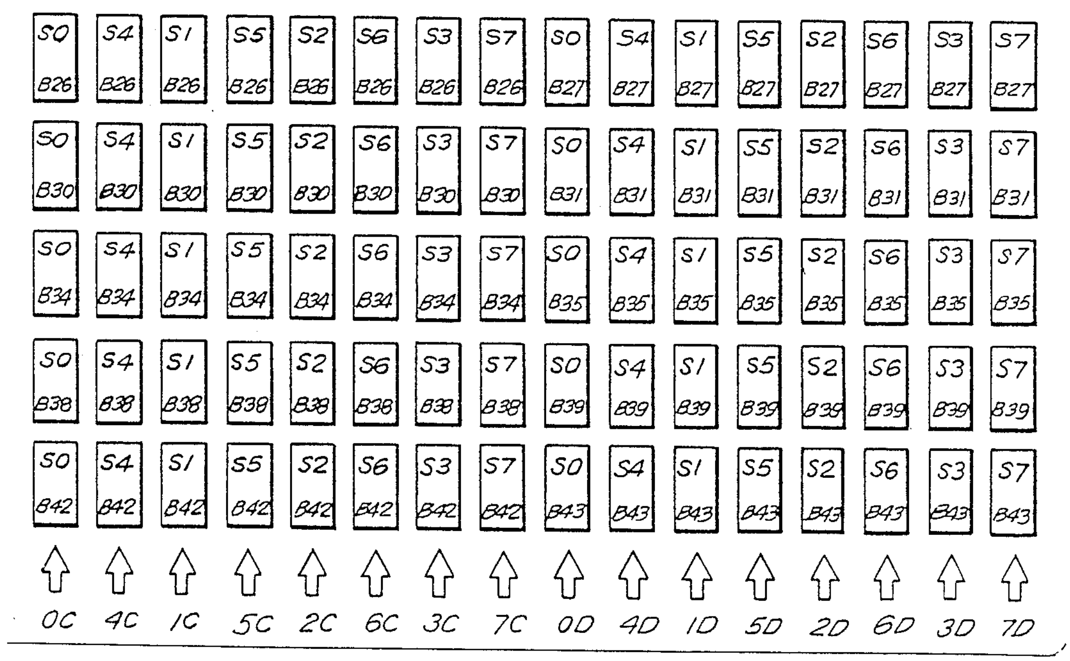

The memory is laid out so as to be interleaved with 19 bits of address. 8 bits of address are used to select a row, 8 bits of address are used to select a column and the three remaining bits of address data are used to select sectors 0 through 7 as shown in the lower left hand corner of FIG. 11.

As a result of this interleving configuration of the memory, with a judicious storage scheme under microcode control, it is possible to pipeline requests for data from the memory and write data into the memory in the block mode discussed hereinbefore.

Figure 14:
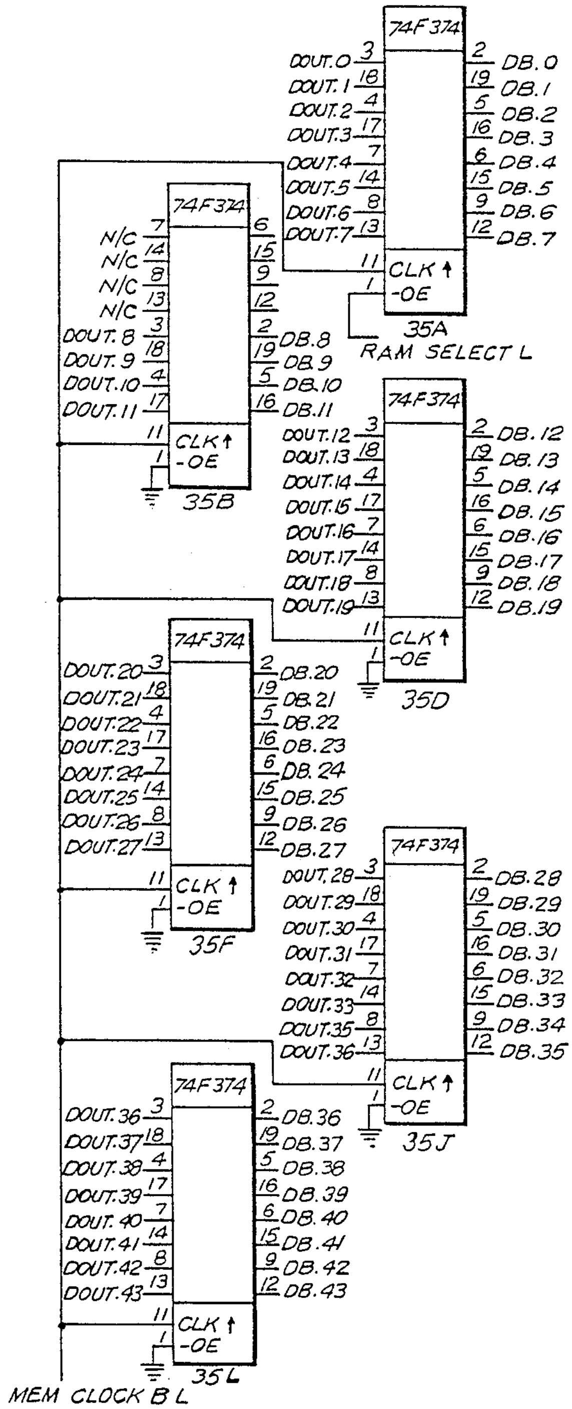
Figure 15:
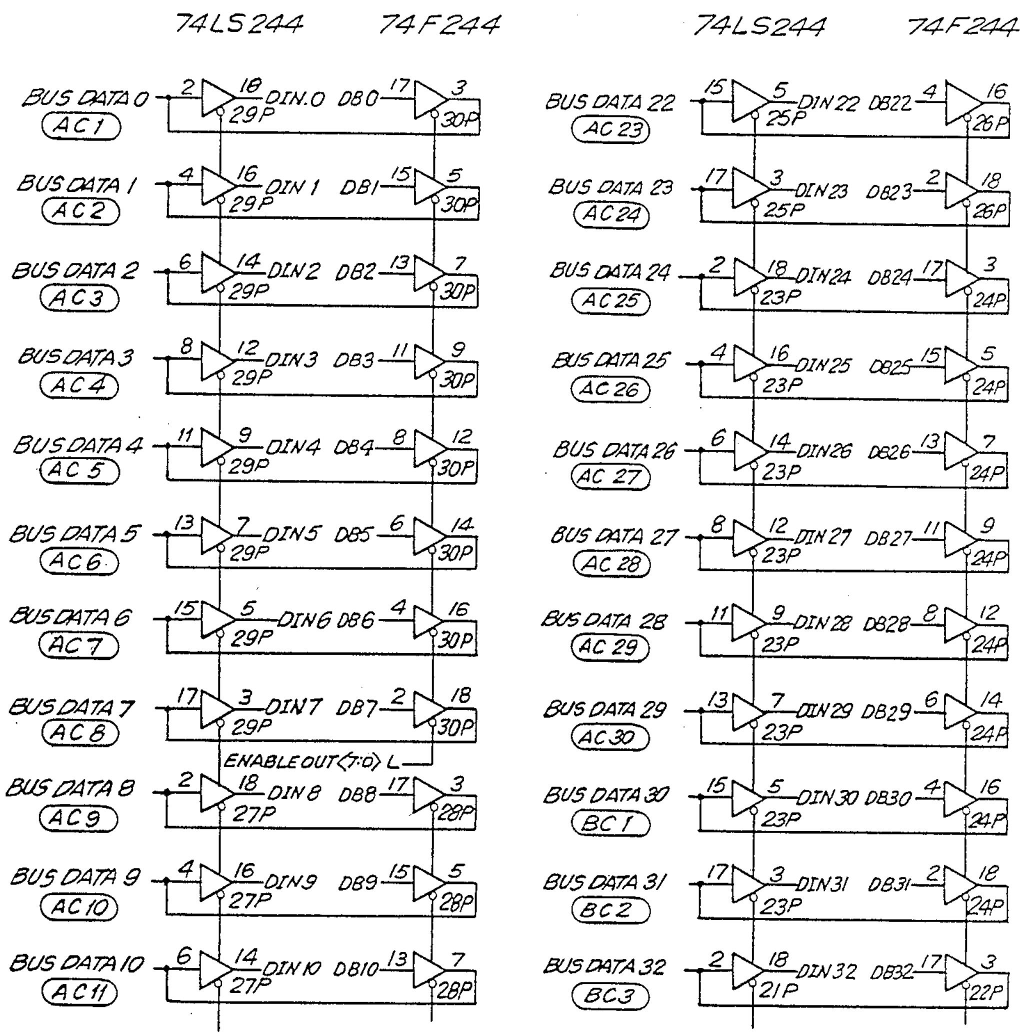
Figure 16:
Figure 17:
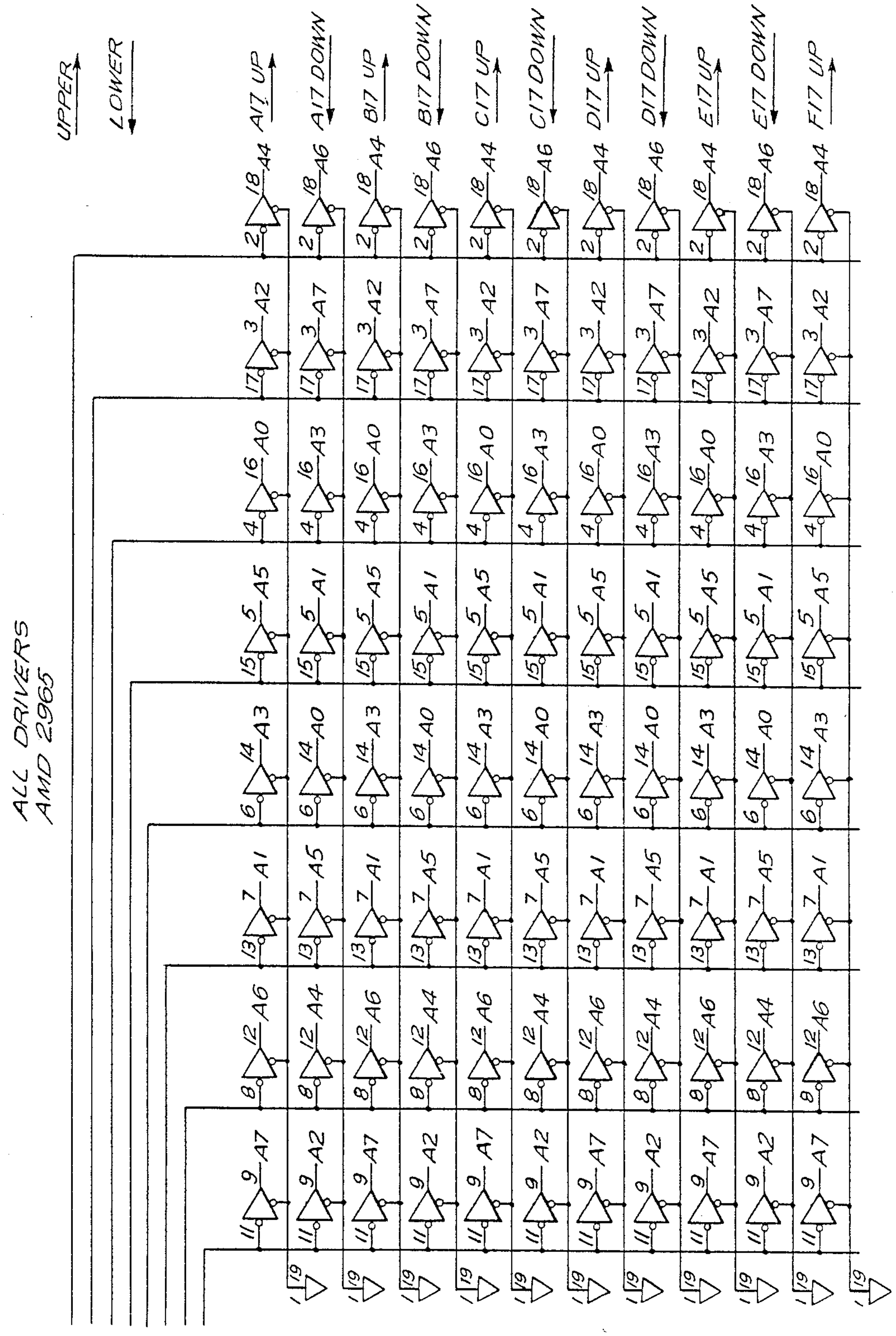
Figure 18:
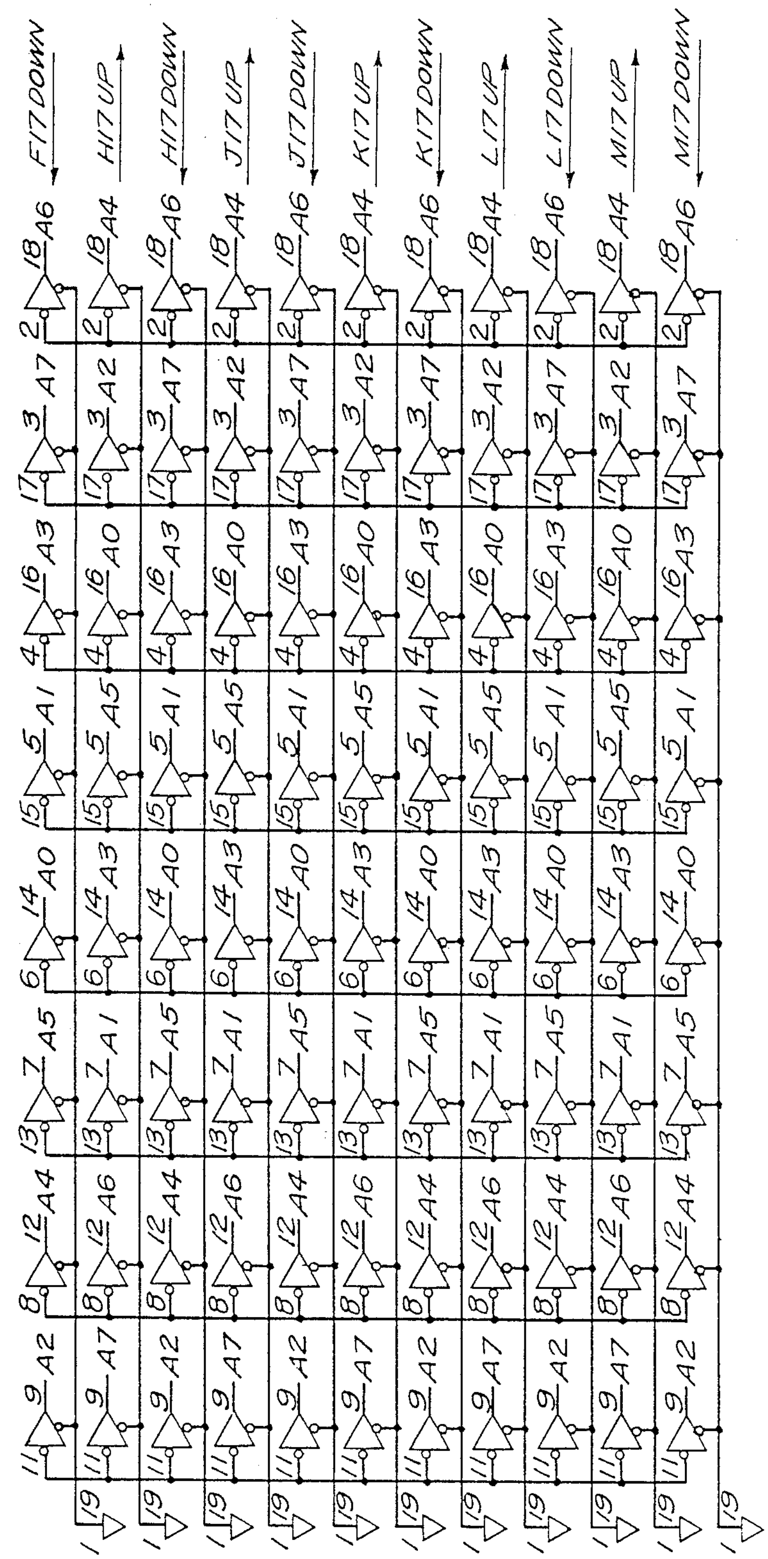
Figure 19:
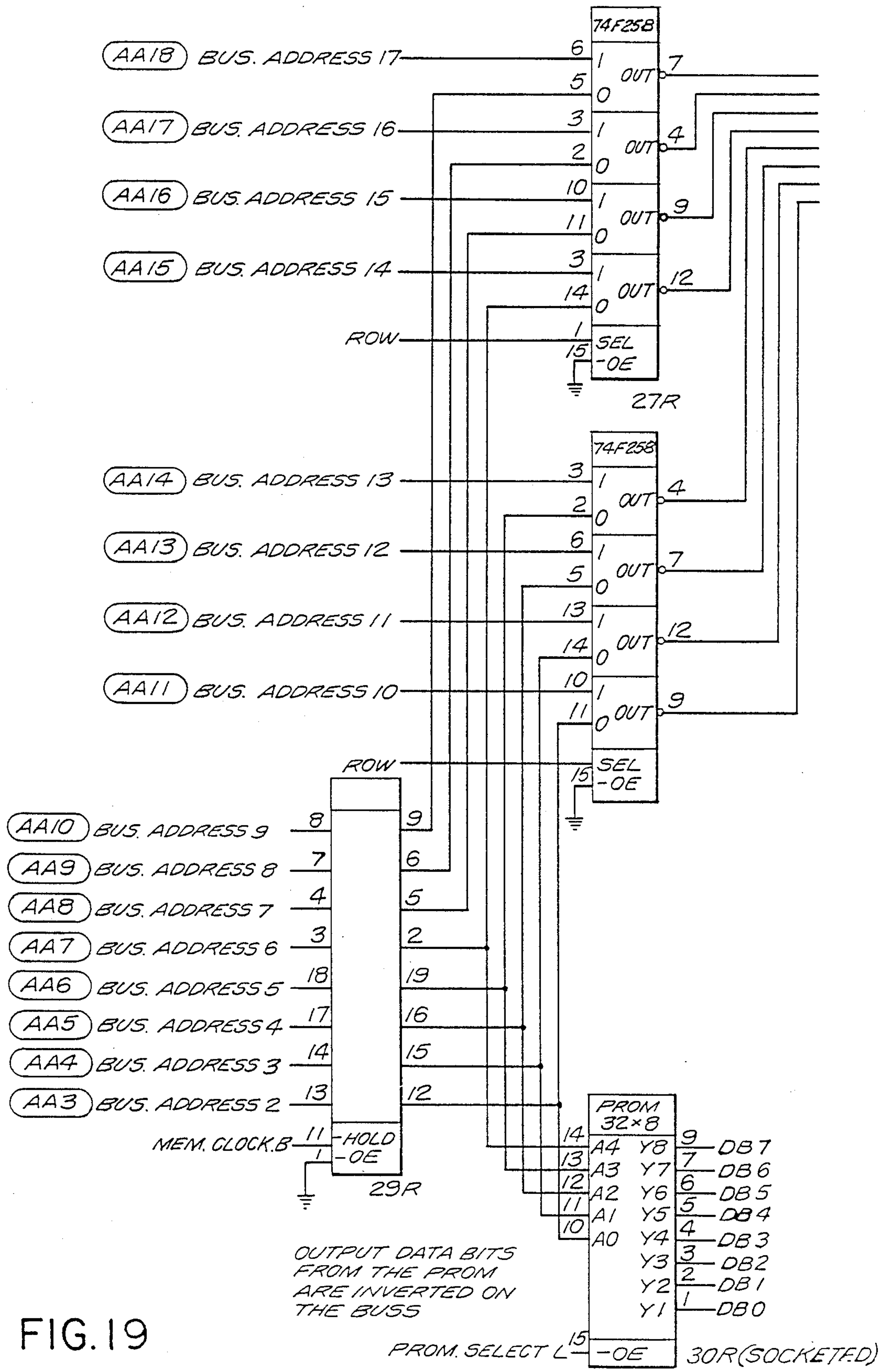
Figure 20:
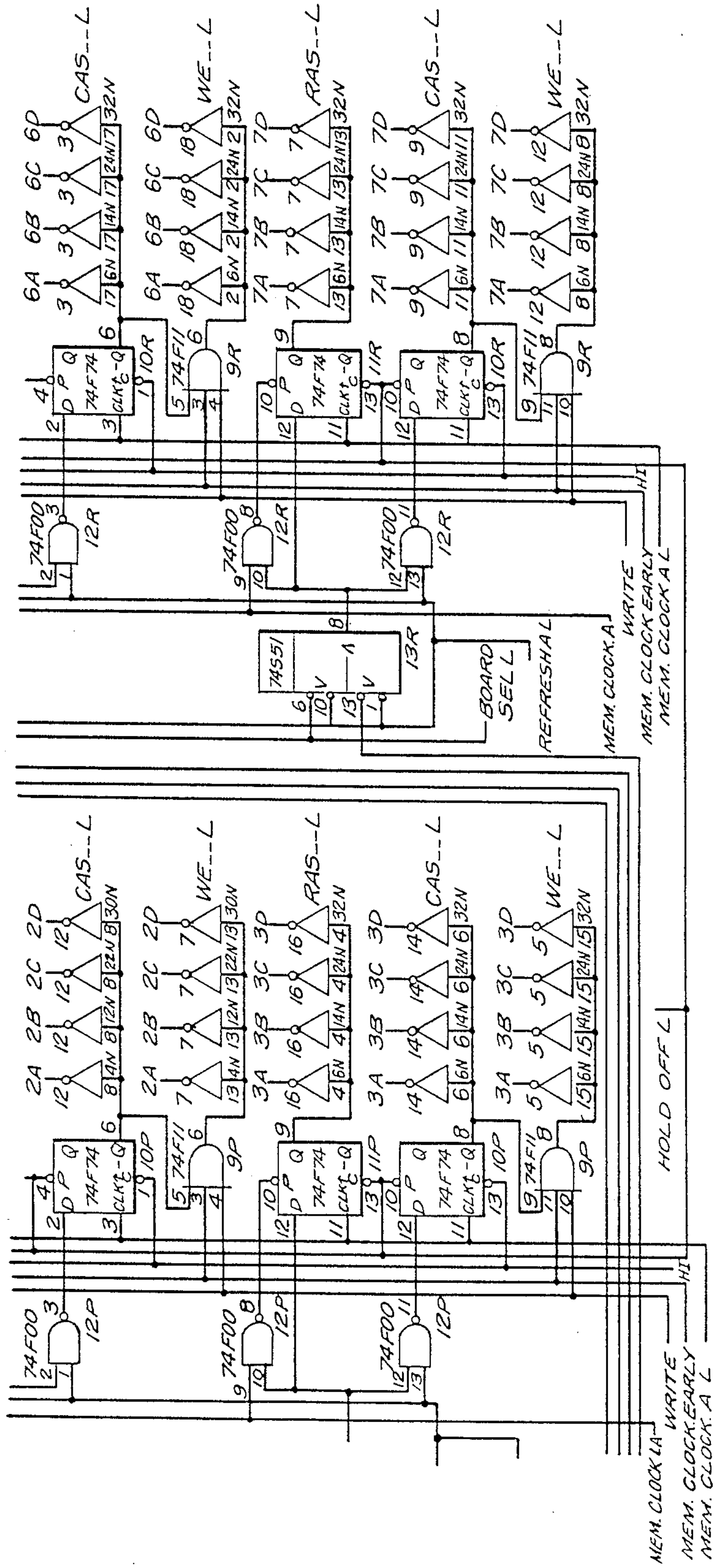
Figure 21:
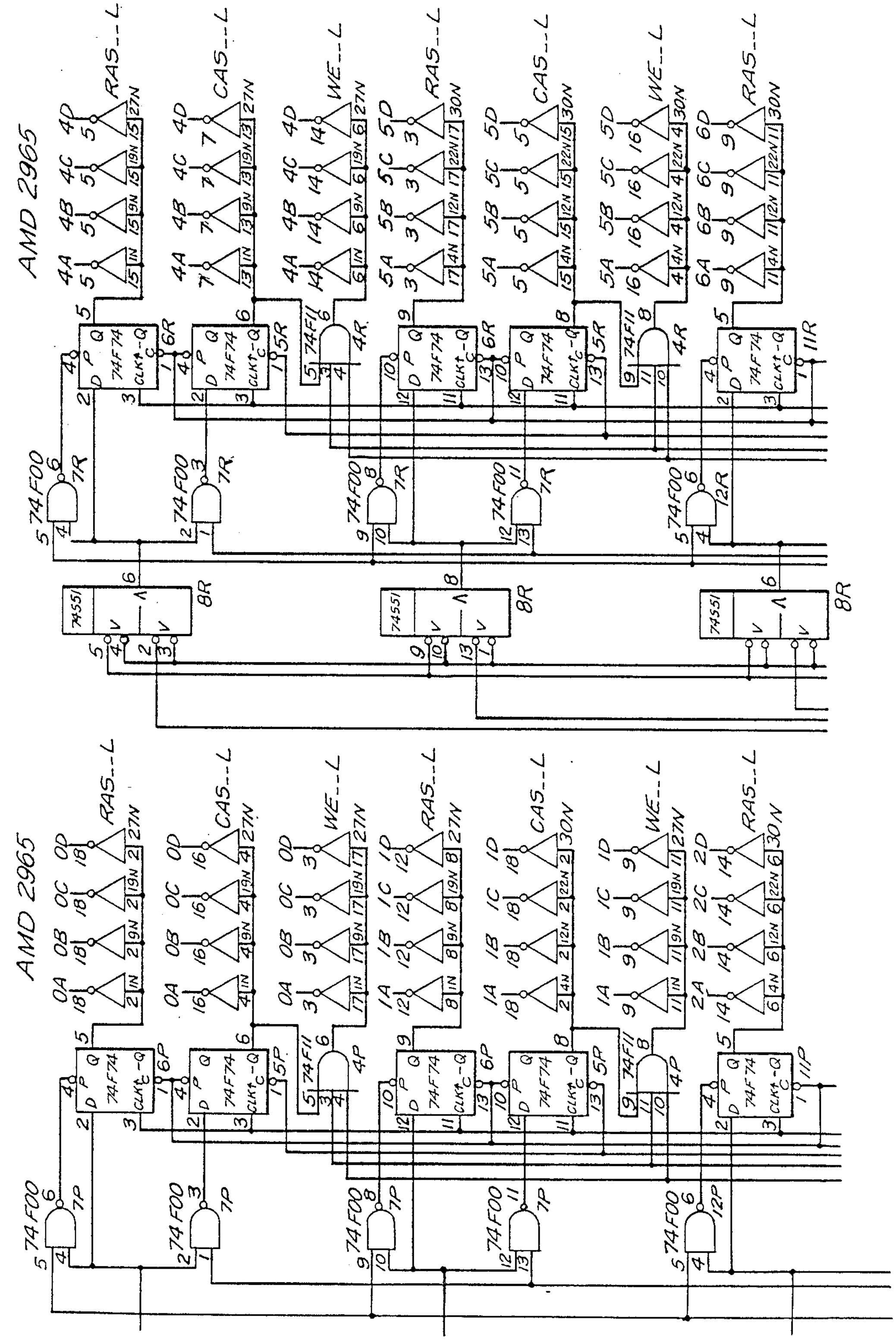
Figure 22:
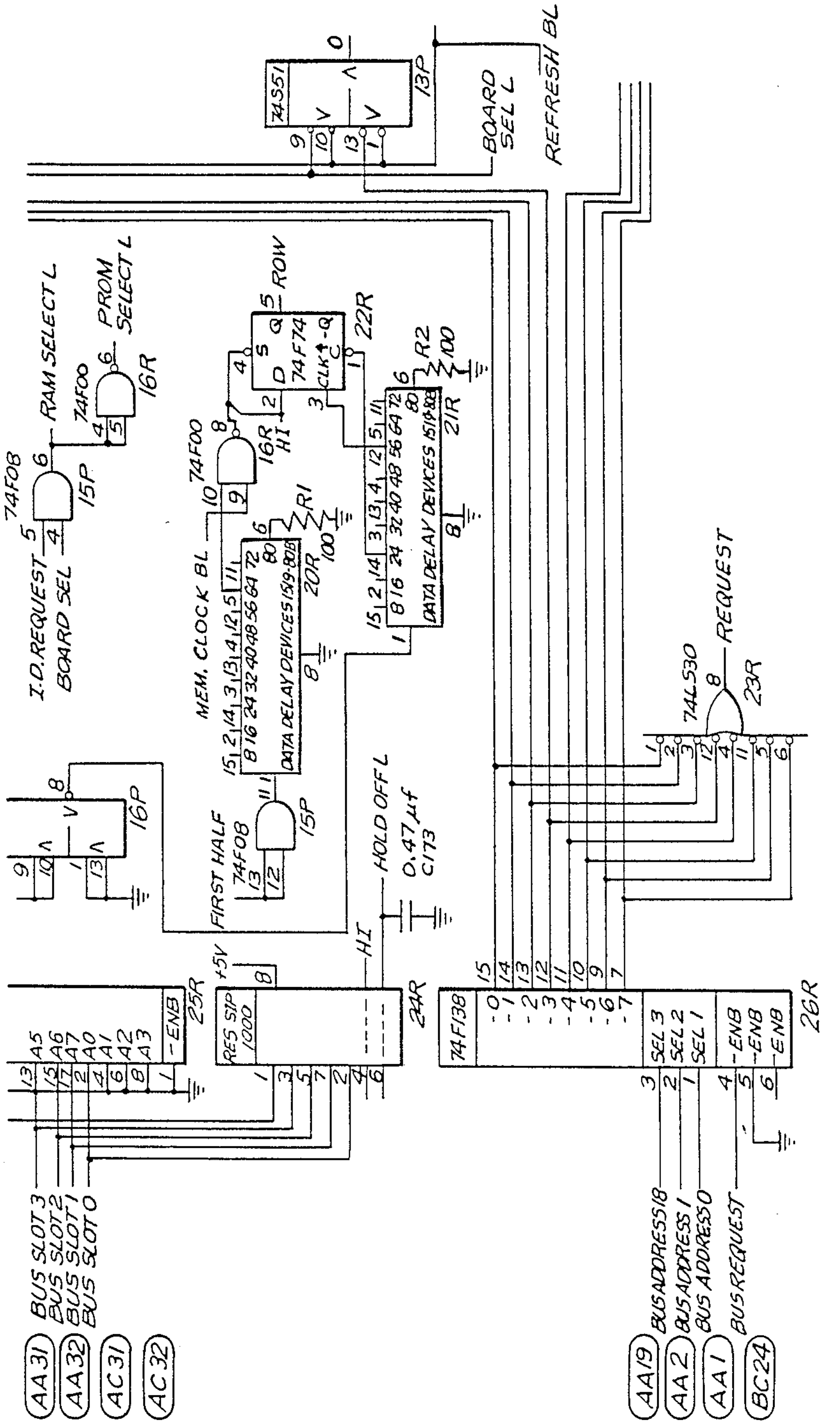
Figure 23:
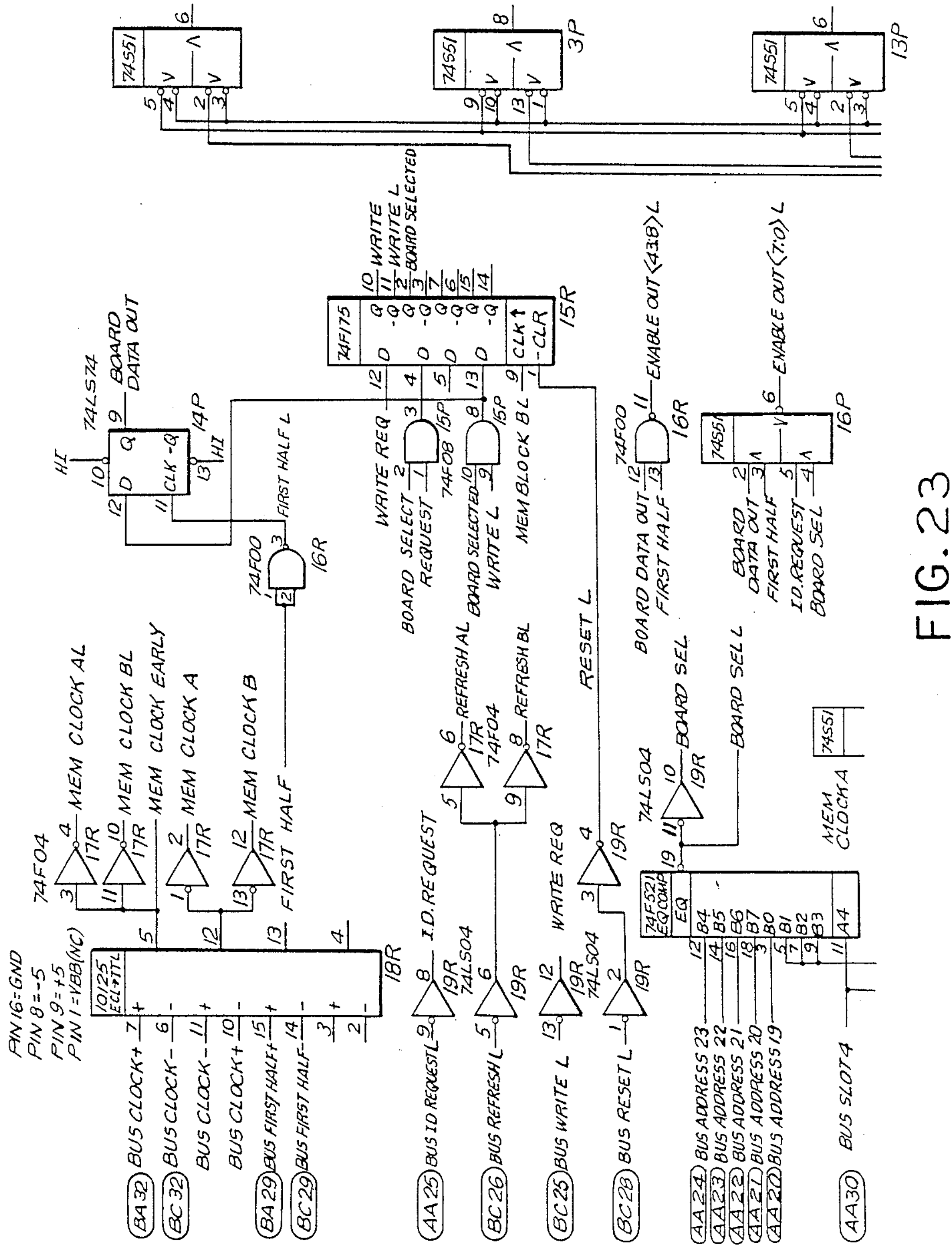

FIG. 14 shows the data output buffers of the memory, and FIGS. 15 and 16 illustrate the tristate data drivers. FIGS. 17-18 illustrate the address drivers, FIG. 19 is the address buffer register and decoders and FIGS. 20-23 illustrate the memory control signal circuitry.

The combination of the synchronous pipeline memory, microtasking, micro DMA and centrallized ECC is believed to be particularly advantageous in that it eliminates a DMA for each microdevice that wants to issue a request to the memory and it also eliminates the use of ECC circuitry on each board of the system.

The synchronous pipeline memory, microtask and micro DMA features combine to enable micro sequencing between an external peripheral and the memory of the system via the FEP with the error correction taking place within the active cycle of the bus timing whereby the microdevice which is requesting data from the memory is not impacted. This combination of features allows an external I/O device to issue a task request and for the microtasking feature of the system to effect the data transfer in a block mode.

It will be appreciated that the instant specification and claims are set forth by way of illustration and not limitation, and that various modifications and changes may be made without departing from the spirit and scope of the present invention.

APPENDIX

F:>lmach>ucode>BETTER-SPRINTER.LISP.17

```
;;; -*- Mode:Lisp; Package:Micro; Base:8; Lowercase:yes -*-
;;; (c) Copyright 1982, Symbolics, Inc.

; "If I have seen less far and less clearly than others, it is because
; giants were standing on my shoulders."  -- Sir Isaac Oldfield

(defvar *bs-widths*)
(defvar *bs-semi-miser-widths*)
(defvar *bs-miser-widths*)
(defvar *bs-flatsizes*)
#Q
(defvar *bs-line* 95.)

(defun better-sprinter (form)
  (terpri)
  (better-sprinter-1 form))

(defun better-sprinter-1 (form)
  (let ((*bs-widths* nil)
        (*bs-semi-miser-widths* nil)
        (*bs-miser-widths* nil)
        (*bs-flatsizes* nil)
```

```
  #M (stream (if ^r (car outfiles) tyo)))
  (bs-print form (bs-charpos) #M (linel stream) #Q *bs-linel*)
  '*))

(defun bs-charpos ()
  #M (charpos (if ^r (car outfiles) tyo))
  #Q (funcall standard-output ':read-cursorpos ':character))

(defun bs-flatsize (form &aux tem)
  (cond ((setq tem (assq form *bs-flatsizes*))
         (cdr tem))
        (t (setq tem (flatsize form))
           (push (cons form tem) *bs-flatsizes*)
           tem)))

(defun bs-width (form &aux tem)
  (cond ((atom form) (bs-flatsize form))
        ((setq tem (assq form *bs-widths*))
         (cdr tem))
        (t (setq tem (bs-width-1 form))
           (push (cons form tem) *bs-widths*)
           tem)))

(defun bs-semi-miser-width (form &aux tem)
  (cond ((atom form) (bs-flatsize form))
        ((setq tem (assq form *bs-semi-miser-widths*))
         (cdr tem))
        ((null (setq tem (bs-format form)))
         (bs-width form))
        (t (setq tem (bs-width-3 form tem))
           (push (cons form tem) *bs-semi-miser-widths*)
           tem)))

(defun bs-miser-width (form &aux tem)
  (cond ((atom form) (bs-flatsize form))
        ((setq tem (assq form *bs-miser-widths*))
         (cdr tem))
        (t (setq tem (bs-width-2 form))
           (push (cons form tem) *bs-miser-widths*)
           tem)))

(defun bs-width-2 (form)
  (1+ (loop for l = form then (cdr l)    ;1+ for leading open paren or space
            when (and (atom l) (not (null l)))
              maximize (+ (bs-width l) 3) fixnum        ;dot sp close
            while (not (atom l))
            when (cdr l)
              maximize (bs-width (car l)) fixnum
            else maximize (1+ (bs-width (car l))) fixnum)))     ;+1 for close

(defun bs-width-1 (form &aux (fmt (bs-format form)))
  (cond ((null fmt)
         (+ (bs-width (car form)) 2              ;2 for open paren and space
            (loop for l = (cdr form) then (cdr l)
                  when (and (atom l) (not (null l)))
                    maximize (+ (bs-width l) 3) fixnum  ;dot sp close
                  while (not (atom l))
                  when (cdr l)
                    maximize (bs-width (car l)) fixnum
                  else maximize (1+ (bs-width (car l)))  ;1+ for close paren
                                 fixnum)))
        (t (let ((head (car fmt))
                 (n-per-line (cadr fmt)))
             (+ (loop for x in form repeat head
                      sum (1+ (bs-flatsize x)) fixnum)
                (if (zerop head) 0 1)
                (loop for l = (nthcdr head form) then ll until (null l)
                      as ll = (nthcdr n-per-line l)
                      maximize (+ (if ll -1 0)  ;for close paren
                                  (loop for x in l repeat n-per-line
(defun bs-width-3 (form fmt)
  (let ((head (car fmt))
        (n-per-line (cadr fmt))
        (indentation (caddr fmt)))
    (max (loop for x in form repeat head
               sum (1+ (bs-flatsize x)) fixnum)
         (+ indentation
            (loop for l = (nthcdr head form) then ll until (null l)
                  as ll = (nthcdr n-per-line l)
                  maximize (+ (if ll -1 0)       ;for close paren
                              (loop for x in l repeat n-per-line
                                    sum (1+ (bs-semi-miser-width x)) fixnum))
                           fixnum)))))

(defun bs-format (form)
  (and (not (atom form))
       (not (dotted-p form))
       (if (symbolp (car form))
           (get (car form) 'bs-format)
           '(0 1 1))))              ;Good for selectq clauses at least
```

```
(defun bs-print (form indent linel)
  (if (atom form) (prin1 form)
      (let ((fmt (bs-format form))
            (space (- linel indent)))
        (cond ((and (or (null fmt) (not (symbolp (car form))))
                    (<= (bs-flatsize form) space))
               (prin1 form))
              ((<= (bs-width form) space)
               (bs-print-1 form indent linel fmt))
              ((and fmt (<= (bs-semi-miser-width form) space))
               (bs-print-3 form indent linel fmt))
              (t (bs-miser form indent linel))))))

(defun bs-print-1 (form indent linel fmt)
  (princ "(")
  (cond ((null fmt)
         (bs-print (car form) (1+ indent) linel)
         (princ " ")
         (setq indent (bs-charpos))
         (loop for l = (cdr form) then (cdr l)
               when (and (atom l) (not (null l)))
                 do (princ ". ") (bs-print l (+ indent 2) linel)
               while (not (atom l))
               do (bs-print (car l) indent linel)
               when (cdr l) do (bs-terpri indent)))
        (t (let ((head (car fmt))
                 (n-per-line (cadr fmt)))
             (bs-row-of form head (1+ indent) linel)
             (or (zerop head) (princ " "))
             (setq indent (bs-charpos))
             (loop for l = (nthcdr head form) then ll until (null l)
                   as ll = (nthcdr n-per-line l)
                   do (bs-row-of l n-per-line indent linel)
                   unless (null ll) do (bs-terpri indent)))))
  (princ ")"))

(defun bs-print-3 (form indent linel fmt)
  (princ "(")
  (let ((head (car fmt))
        (n-per-line (cadr fmt))
        (indentation (caddr fmt)))
    (bs-row-of form head (1+ indent) linel)
    (setq indent (+ indent indentation))
    (or (zerop head) (null (nthcdr head form)) (bs-terpri indent))
    (loop for l = (nthcdr head form) then ll until (null l)
          as ll = (nthcdr n-per-line l)
          do (bs-row-of l n-per-line indent linel)
          unless (null ll) do (bs-terpri indent)))
  (princ ")"))

(defun bs-row-of (list n indent linel)
  (or (zerop n)
      (loop for x in list as i upfrom 1
            do (bs-print x indent linel)
            until (= i n)
            do (princ " ") (setq indent (bs-charpos)))))

(defun bs-terpri (indent)
  (terpri)
  (loop repeat (// indent 8) do (tyo #\tab))
  (loop repeat (\ indent 8) do (tyo #\sp)))

(defun bs-miser (form indent linel)
  (cond ((atom form) (prin1 form))
        (t (princ "(")
           (setq indent (1+ indent))
           (loop for l = form then (cdr l)
                 when (and (atom l) (not (null l)))
```

F:>lmach>ucode>check.lisp.116

```
;;; -*- Mode:Lisp; Package:Micro; Base:8; Lowercase:yes -*-
;;; (c) Copyright 1982, Symbolics, Inc.

; Microcode Syntax Checking

;This is an alist of all fields.
;car of an entry is the name of the field
;cadr is a list of other fields required: elements are either names
; of fields, or lists of name and acceptable values
;caddr is value checking for this field: nil to accept any value, or
; a predicate which returns t if the value is OK, or a list of valid values.
;Note that some values for some of these fields are redundant with
; the spec and/or magic fields.
(defconst valid-microcode
      '((abus () (amem memory-data frame-pointer stack-pointer lbus
                  memory-data-force vma pc map   ;on TMC machine
                  ))
        (amem-read-addr ((abus amem memory-data)) check-amem-addr)
        (bbus () (bmem macro-signed-immediate macro-unsigned-immediate))
```

```
            (bmem-read-addr ((bbus bmem)) check-bmem-addr)
            (write-amem (amem-write-addr) (cbus))
            (amem-write-addr () check-amem-non-constant-addr)
            (write-bmem (bmem-write-addr) (xbus obus))
            (bmem-write-addr (write-bmem) numberp)
            (write-lbus () (obus memory-data junk))
            (lbus-dev-addr () check-lbus-dev-addr)
            (xbus () (abus bbus product))
            (ybus () (abus bbus ybus-crocks-1 ybus-crocks-2))
            (alu () check-alu-func)
            (byte-func () check-byte-func)
            (force-obus<35-34> () (0 1 2 3 abus bbus bbus<7-6>))
            (force-obus<33-32> () (0 1 2 3 abus bbus bbus<5-4>))
            (force-obus<31-28> () (0 1 2 3 4 5 6 7 10 11 12 13 14 15 16 17))
            (type-map () check-type-map)
            (stack-pointer () (increment decrement))
            (spec () (load-byte-r load-byte-s load-stkp load-frmp
                      load-xbas load-control load-special-maps clear-stack-adjustment
                      arithmetic-trap-enb trap-if-type-cond
                      trap-if-type-cond-or-bbus-not-fixnum multiply-and-type-check
                      crocks alub-sign-hack crocks-to-ybus multiply
                      addr-from-abus inhibit-page-tags dma address-phtc
                      check-write-access increment-inst ifu-control
                      arithmetic-trap-with-dispatch halt npc-magic awaken-task
                      write-task disable-tasking))
            (magic () (0 1 2 3 4 5 6 7 10 11 12 13 14 15 16 17))
            (magic-mask (magic) (1 2 3 4 5 6 7 10 11 12 13 14 15 16))
            (dispatch (dispatch-table magic)
                      (alub cdr-code abus<31-28> abus<25-22>
                       abus<21-18> abus<2-0> bbus<31-30>-abus<31-30>))
            (mem () (write-vma start-cycle          ;proto
                    microdevice start-read start-write write-vma block-read block-write))  ;TMC
            (escape-to-lisp () nil)
            (error-table () nil)
            (declare-memory-timing () nil)
            (condition ()
                  (not-cdr-0 not-cdr-1 not-cdr-2 not-cdr-3
                   type-condition bbus-not-fixnum alub-0 ybus-31
                   not-gc-condemned-temp not-gc-this-stack not-gc-other-stack
                   equal-pointer
                   not-equal-fixnum not-equal-typed-pointer
                   not-greater-pointer not-greater-fixnum-unsigned
                   alu-31 sequence-break trace-flag-1 trace-flag-2
                   not-lbus-dev-cond mc-cond not-ctos-came-from-ifu
                   ))
            (sequencer () (popj next-instruction pushj pop push-npc pop-npc
                           dismiss pop-npc-and-cpc-from-npc
                           take-dispatch pushj-return-dispatch))
            (trap-enables () check-trap-enables)
            (skip-true-sequence (condition skip-false-sequence)
                                check-skip-sequence)
            (skip-false-sequence (condition skip-true-sequence)
                                 check-skip-sequence)
            (return-true-sequence (return-false-sequence)
                                  check-skip-sequence)
            (return-false-sequence (return-true-sequence)
                                   check-skip-sequence)
            (return-skip () (t))
            (jump-sequence () check-next-sequence)
            (next-sequence () check-next-sequence)
            (trap-sequence (trap-enables) check-trap-sequence)
            (dispatch-table (dispatch) check-dispatch-table)
            (arith-trap-dispatch-table (spec trap-enables) check-dispatch-table)
            (unique () (t))
            (speed () (slow-first-half slow-second-half slow very-slow))))

;Each element is a list of (field value) pairs where if the first
;one is present, the others are disallowed.
(defconst microcode-field-conflicts
  '(((xbus abus) (ybus abus) "Xbus and Ybus sources not independently selectable")
    ((xbus bbus) (ybus bbus) "Xbus and Ybus sources not independently selectable")
    ((sequencer next-instruction) (spec ifu-control) "Next inst not ready")
    ((abus vma) (mem start-read start-write block-read block-write)
     "Reading VMA uses ADDR outputs")
    ((abus lbus) (ybus abus)
     "Microdevice read is just too slow, must go into the fast side of the ALU")
    ))
#M (declare (*expr fieldp))  ;in UU

(declare (special *backtrace*)) ;in UU
(defvar *code*)            ;So I can see the microinstruction being checked

#M
(defun check-loses (format &rest args)
  (declare (special args))
  (let ((^w nil) (^r nil) (^q nil))                    ;ESAD
    (terpri msgfiles)
    (lexpr-funcall #'format msgfiles format args)
    (format msgfiles "~&;~{~<~%;~:; in ~S~>~}~%" *backtrace*)
    (format msgfiles "~&; Do (PPX *CODE*) to see instruction.")
    (break check-loses)))
```

```
#Q
(defflavor check-loses (format-string format-args code)
                       (sys:no-action-mixin dbg:special-commands-mixin error)
  :initable-instance-variables)
#Q
(defmethod (check-loses :report) (stream)
  (lexpr-funcall #'format stream format-string format-args))
#Q
(defmethod (check-loses :case :special-command :show-failing-microinstruction) ()
  "Pretty-print the microinstruction that failed"
  (ppx code)
  nil)  ;NIL means stay in the debugger
#Q
(push '(:show-failing-microinstruction #\c-sh-P) dbg:*special-command-special-keys*)
#Q
(compile-flavor-methods check-loses)
#Q
(defprop check-loses t :error-reporter)
#Q
(defun check-loses (format-string &rest args)
  (signal 'check-loses ':format-string format-string
                       ':format-args (copylist args)
                       ':code *code*))

(defun check-conflict (code field1 field2 &optional message)
  (check-loses "~@[~A~%~](~S ~S) conflicts with (~S ~S)"
               message field1 (get code field1) field2 (get code field2)))

(defun check-amem-addr (addr)
  (if (atom addr)
      (and (eq (typep addr) 'fixnum) (<= 0 addr) (<= addr 3777))
      (selectq (car addr)
        ((frame-pointer stack-pointer xbas) (eq (typep (cadr addr)) 'fixnum))
        (macrocode (null (cdr addr)))
        (constant (valid-constant (cadr addr)))
        (bus-address (null (cdr addr))))))

(defun check-amem-non-constant-addr (addr)
  (if (atom addr)
      (and (eq (typep addr) 'fixnum) (<= 0 addr) (<= addr 3777))
      (selectq (car addr)
        ((frame-pointer stack-pointer xbas) (eq (typep (cadr addr)) 'fixnum))
        (macrocode (null (cdr addr)))
        (bus-address (null (cdr addr))))))

(defun check-bmem-addr (addr)
  (if (atom addr)
      (and (eq (typep addr) 'fixnum) (<= 0 addr) (<= addr 377))
      (and (eq (car addr) 'constant)
           (valid-constant (cadr addr)))))

(defun valid-constant (val)
  (or (numberp val)
      (and (listp val)
           (eq (car val) 'build-task-state))))

(defun check-lbus-dev-addr (addr)
  (or (numberp addr)
      ;; Also used to select MC destinations
      (memq addr (selectq *machine-version*
                   ((sim proto) '(write-memory))
                   ((tmc) '(write-phta-and-asn write-vma-and-pc
                            write-lru-map write-map-a write-map-b write-both-maps))
                   ((tmc5 ifu) '(write-phta-and-asn
                                 write-lru-map write-map-a write-map-b write-both-maps))))
      ;; Also symbolic card slots
      (and (listp addr) (get (car addr) 'symbolic-lbus-slot))))

(declare (special normal-alu-functions weird-alu-functions))    ;in UU

(defun check-alu-func (func)
  (cond ((memq func (if (and (or (fieldp *code* 'spec 'arithmetic-trap-enb)
                                 (fieldp *code* 'spec 'arithmetic-trap-with-dispatch))
                             (bit-test 4 (get *code* 'magic)))
                        weird-alu-functions
                        normal-alu-functions)))
        ((memq func weird-alu-functions)
         (check-conflict *code* 'alu 'spec
                         "ALU function is wierd, but special function and # not specified")
         t)
        ((memq func normal-alu-functions)
         (check-conflict *code* 'alu 'spec
                         "ALU function is normal, but spec says /"weird ALU function/"")
         t)))

(defun check-byte-func (func)
  (or (eq func 'ybus)                                ;Function 0
      (and (listp func)
           (memq (first func) '(ldb dpb))            ;Other funcs, decided later
           (let ((rot (second func)) (mask (third func)))
             (or (and (eq (typep rot) 'fixnum) (<= 0 rot) (<= rot 37)
```

```
              (eq (typep mask) 'fixnum) (<= 1 mask) (<= mask 40))
         (and (eq rot 'byte-r)
              (or (eq mask 'byte-s)
                  (eq (typep mask) 'fixnum) (<= 1 mask) (<= mask 40)))
         (and (eq rot 'macro) (eq mask 'macro))))
     (or (null (cdddr func))
         (eq (cadddr func) 'merge)))))


(declare (special *data-types* *cdr-codes*))     ;in SIM

;Check that types are valid, outputs are one of the 8 possible combinations,
;and no types are duplicated
(defconst type-map-possibilities
          '(() (cond) (pointer) (pointer cond)
            (trap-0) (trap-1) (trap-2 pointer) (trap-3 pointer)
            ;Alternate spellings
            (cond pointer) (pointer trap-2) (pointer trap-3)))

(defun check-type-map (x)
  (loop for ((types . outputs) . rest) on x
        always (loop for tp in types
                     always (memq tp *data-types*)
                     always (loop for (t2 . o2) in rest
                                  never (memq tp t2)))
        always (member outputs type-map-possibilities)))

;This is not one field in the real machine.  Some of these are inside the
;type map, also.
(defun check-trap-enables (x)
  (loop for en in x
        always (memq en '(condition-true condition-false any-stack other-stack
                          type-condition bbus-non-fixnum overflow
                          transport map-miss))))

;Try to propagate memory timing through skips.
;This is smart enough to get it in, but too dumb to know how to get it out again
(defun check-skip-sequence (seq memory-timing)
  (cond ((null seq))                                  ;drop-through
        ((symbolp seq))                               ;jump tag
        (t (check-microcode seq 'skip-sequence memory-timing)   ;literal code
           t)))

(defun check-next-sequence (seq)
  (cond ((symbolp seq))                               ;jump tag
        (t (check-microcode seq 'next-sequence)       ;literal code
           t)))

(defun check-trap-sequence (seq)
  (cond ((symbolp seq))                               ;jump tag
        (t (check-microcode seq 'trap-sequence)       ;literal code
           t)))

(defun check-dispatch-table (table)
  (setq table (cdr table))                            ;Ignore field specifier at front
  (if (not (listp table))
      (check-loses "Not table of dispatch clauses: ~S" table)
      (loop for clause in table
            unless (eq (car clause) 'otherwise)
              do (loop for cue in (car clause)
                       unless (numberp cue)      ;good enough check for now
                         do (check-loses "~S invalid dispatch cue" cue))
            do (cond ((atom (cadr clause)))                 ;goto
                     (t (check-microcode (cadr clause)
                                         '(dispatch ,(car clause)))))))
  t)

(defun check-microcode (*code* where &optional memory-timing)
  (let ((*backtrace* (cons where *backtrace*)))
    (cond ((and (not (atom *code*)) (eq (car *code*) 'microinstruction))
           (check-microcode1 *code* memory-timing))
          ((and (not (atom *code*)) (eq (car *code*) 'microsequence))
           (push 'microsequence *backtrace*)
           (loop for x in (cdr *code*)
             do (if (and (not (atom x)) (eq (car x) 'microinstruction))
                    (let ((*code* x))
                      (setq memory-timing (check-microcode1 x memory-timing)))
                    (check-loses "Invalid microcode: ~S" x))))
          (t (check-loses "Unrecognizable microcode: ~S" *code*)))))

(defun check-microcode1 (code memory-timing &aux declared-memory-timing)
  ;; First make sure there aren't any misspelled field names, since
  ;; those typically cause spurious other messages
  (loop for (field value) on (cdr code) by 'cddr
    when (null (assq field valid-microcode))
      do (check-loses "~S invalid microcode field name" field))
  ;; Now check inter-field consistency
  (check-field-conflicts code)
  (check-spec-and-magic-fields code)
  (check-next-address-field-consistency code)
  ;; Check the memory timing for temporary memory control
```

```
  (if (setq declared-memory-timing (get code 'declare-memory-timing))
      (setq memory-timing declared-memory-timing))
  (and (fieldp code 'abus 'memory-data)
       (not (memq 'data-cycle memory-timing))
       (check-loses "Reading MD but memory is not in data-cycle (it's in ~S)" memory-timing))
  (and (fieldp code 'lbus-dev-addr 'write-memory)
       (not (memq (get code 'mem) '(start-cycle start-write block-write)))
       (check-loses "Storing into memory without starting a cycle"))
  ;; Compute memory-timing value for following cycle
  (let ((next-active (or (member '(next active-cycle) declared-memory-timing)
                         (memq (get code 'mem) '(start-cycle start-read block-read))))
        (next-data (or (member '(next data-cycle) declared-memory-timing)
                       (memq 'active-cycle memory-timing))))
    (setq memory-timing (if next-active
                            (if next-data '(active-cycle data-cycle) '(active-cycle))
                            (if next-data '(data-cycle) nil))))
  ;; On TMC machine, make sure that microdevice read/write is going in the proper
  ;; direction.  Using Lbus as the Abus source implies microdevice read.
  (cond ((memq *machine-version* '(tmc tmc5 ifu))
         (and (get code 'write-lbus)
              (fieldp code 'abus 'lbus)
              (check-loses "Lbus as Abus source incompatible with microdevice//VMA write"))
         (and (get code 'write-lbus)
              (not (memq (get code 'mem) '(microdevice write-vma)))
              (check-loses "WRITE-LBUS without MEM// MICRODEVICE or WRITE-VMA"))
         (and (neq *machine-version* 'ifu)
              (fieldp code 'write-lbus 'obus)
              (fieldp code 'abus 'memory-data)
              (check-loses "WRITE-LBUS from OBUS but ABUS source is MEMORY-DATA;~@
                            TMC machine will write from MD rather than OBUS!"))))
  ;; Now check field values, and successor instructions
  (loop for (field value) on (cdr code) by 'cddr with tem
    as d = (assq field valid-microcode)
    when (null value)
      unless (memq field '(skip-true-sequence skip-false-sequence)) ;drop-thr
        do (check-loses "~S field has NIL value" field)
    do (loop for c in (cadr d)
             when (atom c)
               do (or (loop for f in (cdr code) by 'cddr thereis (eq f c))
                      (check-loses "~S field missing when ~S ~S present"
                                   c field value))
             else do (or (member (setq tem (get code (car c))) (cdr c))
                         (check-loses
                           "~S field has value ~S, invalid when ~S ~S present"
                           (car c) tem field value)))
    as checker = (caddr d)
    unless (cond ((null checker))
                 ((symbolp checker)
                  (if (memq field '(skip-true-sequence skip-false-sequence
                                    return-true-sequence return-false-sequence))
                      (funcall checker value memory-timing)
                      (funcall checker value)))
                 (t (member value checker)))
      do (check-loses "~S illegal value for ~S field" value field))
  memory-timing)

(defun check-field-conflicts (code)
  (loop for ((f1 v1) (f2 . exclusions) reason) in microcode-field-conflicts
        when (eq (get code f1) v1)
          when (memq (get code f2) exclusions)
            do (check-conflict code f2 f1 reason)))

;If other fields imply values of these, check that they are really there
(defun check-spec-and-magic-fields (code &aux tem tem1)
  (and (setq tem (get code 'force-obus<31-28>))
       (not (fieldp code 'magic tem))
       (check-conflict code 'force-obus<31-28> 'magic))
 (cond ((or (fieldp code 'ybus 'ybus-crocks-1)
            (fieldp code 'ybus 'ybus-crocks-2))
        (or (fieldp code 'spec 'crocks-to-ybus)
            (check-conflict code 'ybus 'spec))
        ;U AMWA <11> must also be free
        (if (get code 'stack-pointer)
            (check-conflict code 'ybus 'stack-pointer "U AMWA <11> conflict"))
        (if (numberp (get code 'amem-write-addr))
            (check-conflict code 'ybus 'amem-write-addr "U AMWA <11> conflict"))))
(cond ((fieldp code 'xbus 'product)
       (or (fieldp code 'spec 'multiply)
           (fieldp code 'spec 'multiply-and-type-check)
           (check-conflict code 'xbus 'spec))
       (or (= (logand (get code 'magic) 6) 4)
           (check-conflict code 'xbus 'magic))))
(cond ((setq tem (get code 'trap-enables))
       (cond ((memq 'other-stack tem)
              (or (fieldp code 'spec 'crocks)
                  (check-conflict code 'trap-enables 'spec
                                  "spec//crocks needed to enable GC traps"))
              (or (equal (get code 'magic) 2)
                  (check-conflict code 'trap-enables 'magic
                                  "magic number needed to enable GC traps")))
```

```
            ((memq 'any-stack tem)
             (or (fieldp code 'spec 'crocks)
                 (check-conflict code 'trap-enables 'spec
                                 "spec//crocks needed to enable GC traps"))
             (or (equal (get code 'magic) 1)
                 (check-conflict code 'trap-enables 'magic
                                 "magic number needed to enable GC traps")))
            ((memq 'type-condition tem)
             (cond ((memq (get code 'spec)
                          '(arithmetic-trap-enb arithmetic-trap-with-dispatch))
                    (or (bit-test 1 (get code 'magic))
                        (check-conflict code 'trap-enables 'magic
                                        "Magic number needed to enable type cond trap")))
                   ((memq (get code 'spec)
                          '(trap-if-type-cond
                            trap-if-type-cond-or-bbus-not-fixnum
                            multiply-and-type-check)))
                   (t (check-conflict code 'trap-enables 'spec
                                      "Spec needed to enable type cond trap"))))
            ((memq 'bbus-non-fixnum tem)
             (cond ((memq (get code 'spec)
                          '(arithmetic-trap-enb
                            arithmetic-trap-with-dispatch))
                    (or (bit-test 2 (get code 'magic))
                        (check-conflict code 'trap-enables 'magic
                                        "Magic number needed to enable bbus type trap")))
                   ((memq (get code 'spec)
                          '(trap-if-type-cond-or-bbus-not-fixnum
                            multiply-and-type-check)))
                   (t (check-conflict code 'trap-enables 'spec
                                      "Spec needed to enable bbus type trap"))))
            ((memq 'overflow tem)
             (or (memq (get code 'alu)
                       '(X+1-overflow X-1-overflow X+Y-overflow X-Y-overflow))
                 (check-conflict code 'trap-enables 'alu)))
            ((memq 'map-miss tem)
             (or (fieldp code 'mem 'start-cycle)
                 (check-conflict code 'trap-enables 'mem
                                 "Start-cycle not specified in MEM field"))))))
;; dispatch and magic assumed made consistent at the source
;; Decide how to encode the byte func, and check for AMWA conflicts
(multiple-value-bind (byte-func magic)
    (choose-byte-func-encoding code)
  (let ((amem-uses-amwa (and (get code 'write-amem)
                             (setq tem (get code 'amem-write-addr))
                             (not (equal tem '(bus-address))) ;only uses bit 10
                             (or (setq tem1 (get code 'amem-read-addr))
                                 (setq tem1 (get code 'abus)))
                             (not (equal tem tem1))))
        (bmem-uses-amwa (and (fieldp code 'spec 'crocks) (fieldp code 'magic 10)))
        (byte-uses-amwa (and (= byte-func 3) (not (bit-test 3 magic))))
        (lbus-uses-amwa (get code 'lbus-dev-addr))
        (stack-pointer-uses-amwa-11 (get code 'stack-pointer))
        (crocks-uses-amwa-11 (fieldp code 'spec 'crocks-to-ybus)))
    (if (and amem-uses-amwa bmem-uses-amwa)
        (check-conflict code 'amem-write-addr 'bmem-write-addr
                        "Conflict for AMWA field"))
    (if (and amem-uses-amwa byte-uses-amwa)
        (check-conflict code 'amem-write-addr 'byte-func
                        "Conflict for AMWA field"))
    (if (and amem-uses-amwa lbus-uses-amwa)
        (check-conflict code 'amem-write-addr 'lbus-dev-addr
                        "Conflict for AMWA field"))
    (if (and bmem-uses-amwa byte-uses-amwa)
        (check-conflict code 'bmem-write-addr 'byte-func
                        "Conflict for AMWA field"))
    (if (and bmem-uses-amwa lbus-uses-amwa)
        (check-conflict code 'bmem-write-addr 'lbus-dev-addr
                        "Conflict for AMWA field"))
    (if (and byte-uses-amwa lbus-uses-amwa)
        (check-conflict code 'byte-func 'lbus-dev-addr
                        "Conflict for AMWA field"))
    ;; Unfortunately, AMWA<11> conflicts happen all over the place unless
    ;; we allow both parties to specify the same bit value.  This means
    ;; that the Amem variables you write into while decrementing the
    ;; stack pointer must go in a specific half of Amem.
    (and amem-uses-amwa crocks-uses-amwa-11
         (atom (setq tem (get code 'amem-write-addr)))
         (neq (if (bit-test 4000 tem) 'ybus-crocks-2 'ybus-crocks-1)
              (get code 'ybus))
         (check-conflict code 'ybus 'amem-write-addr
                         "Conflict for AMWA <11>"))
    (and amem-uses-amwa stack-pointer-uses-amwa-11
         (atom (setq tem (get code 'amem-write-addr)))
         (neq (if (bit-test 4000 tem) 'increment 'decrement)
              stack-pointer-uses-amwa-11)
         (check-conflict code 'stack-pointer 'amem-write-addr
                         "Conflict for AMWA <11>")))))
```

```
;; decide how to encode the byte-func
(defun choose-byte-func-encoding (code &aux tem)
  ;Returns byte-func field, magic field, magic-mask field, cond field, and amwa
  (if (atom (setq tem (get code 'byte-func)))
      (values 0)              ;Pass Ybus
      (let ((r (second tem))
            (s (third tem))     ;Really S+1
            (rm (eq (first tem) 'dpb))
            (mrg (eq (fourth tem) 'merge))
            (magic (get code 'magic)))
        (cond ;; Byte function 0 taken care of already (byte-func = ybus)
          ;; Byte function 2  (S from COND field)
          ((and (equal r 0) (numberp s) (not mrg) (not (get code 'condition)))
           (values 2 nil nil (1- s)))
          ;; Byte function 1, #2=1 case
          ((and (equal r 20) (equal s 20) (not mrg)
                (or (not magic) (bit-test 4 magic))
                (or (not magic)
                    (and (or (fieldp code 'spec 'multiply)
                             (fieldp code 'spec 'multiply-and-type-check))
                         (not (bit-test 1 magic)))      ;#3 free
                    (eq rm (bit-test 10 magic))))
           (values 1 (if rm 14 4) 14))
          ;; Byte function 1, #2=0 case
          ((and (not magic) (not rm) (not mrg) (equal s 40)
                (member r '(0 1 37)))                  ;Could add more...
           (values 1 (cdr (assoc r '((0 . 3) (1 . 2) (37 . 10)))) 17))
          ;; More of that, kludge for first cycle of multiply.  Is there a better way?
          ((and (equal magic 13) (equal r 20) (equal s 20) rm (not mrg))
           (values 1 13 17))
          ;; Otherwise use byte function 3, requires magic number field
          (t (let ((mage (+ (if rm 10 0) (if mrg 4 0)))
                   (cond nil)
                   (amwa nil))
               (cond ;; Byte function 3, case 0  (R and S from AMWA)
                     ((and (numberp r) (numberp s))
                      (setq amwa (dpb (1- s) 0505 r)))
                     ;; Byte function 3, case 1  (R from RREG, S from COND)
                     ((and (eq r 'byte-r) (numberp s))
                      (setq cond (1- s) mage (+ mage 1)))
                     ;; Byte function 3, case 2  (R from RREG, S from SREG)
                     ((and (eq r 'byte-r) (eq s 'byte-s))
                      (setq mage (+ mage 2)))
                     ;; Byte function 3, case 3  (R,S from macroinstruction,
                     ;; high S bits from COND)
                     ((and (eq r 'macro) (eq s 'macro))
                      (setq mage (+ mage 3)
                            cond 'macro))        ;Must fill in from opcode
                  (t (check-loses "I can find no way to encode this byte function!")))
               (and cond (get code 'condition)
                    (check-loses "Unable to encode this byte function without using COND (func 3)"))
               (and magic (not (= mage magic))
                    (check-loses "Unable to encode this byte function without using MAGIC (func 3)"))
               (values 3 mage 17 cond amwa)))))))

;Make sure that anything which uses the next-address field has an explicit one
;so that the assembler doesn't try to use it to link to the next instruction
;and knows that it must use NPC instead.
(defun check-next-address-field-consistency (code &aux tem)
  ;; Arithmetic traps require either a single trap routine or a dispatch table
  (and (setq tem (get code 'trap-enables))
       (or (memq 'type-condition tem)
           (memq 'bbus-non-fixnum tem)
           (memq 'overflow tem))
       (not (getl code '(trap-sequence arith-trap-dispatch-table)))
       (check-loses "Arithmetic trap enabled but no trap handler specified"))
  ;; Other NAF traps require a single trap routine
  (and (setq tem (get code 'trap-enables))
       (or (memq 'condition-true tem)
           (memq 'condition-false tem)
           (memq 'any-stack tem)
           (memq 'other-stack tem))
     (not (get code 'trap-sequence))
     (check-conflict code 'trap-enables 'trap-sequence
                     "NAF trap enabled but no trap handler specified"))
;; Subroutine calling requires a subroutine (separate from return to .+1)
(and (memq (get code 'sequencer) '(pushj pushj-return-dispatch))
     (not (get code 'jump-sequence))
     (not (get code 'skip-true-sequence))      ;for call-select micro
     (check-conflict code 'sequencer 'jump-sequence
                     "Subroutine call but no subroutine specified"))
;; Look for multiple demands on NAF.  Note that skipping can be done
;; to .+1 if necessary (NAF otherwise tied up)
;; next-sequence can always be done by duplicating the target at the
;; next successive control memory location.
(let ((jump (get code 'jump-sequence))
      (trap (get code 'trap-sequence))
      (disp (get code 'dispatch-table))
      (arith (get code 'arith-trap-dispatch-table)))
  (and jump trap
```

```
    (check-conflict code 'jump-sequence 'trap-sequence
                    "Conflict for NAF"))
  (and jump disp
    (check-conflict code 'jump-sequence 'dispatch-table
                    "Conflict for NAF"))
  (and jump arith
    (check-conflict code 'jump-sequence 'arith-trap-dispatch-table
                    "Conflict for NAF"))
  (and trap disp
    (check-conflict code 'trap-sequence 'dispatch-table
                    "Conflict for NAF"))
  (and trap arith
    (check-conflict code 'trap-sequence 'arith-trap-dispatch-table
                    "Conflict for NAF"))
  (and disp arith
    (check-conflict code 'dispatch-table 'arith-trap-dispatch-table
                    "Conflict for NAF"))
  (and (getl code '(skip-true-sequence skip-false-sequence))
    (getl code '(return-true-sequence return-false-sequence return-skip))
    (check-loses "Trying to do two different kinds of skipping at the same time"))
  (and (get code 'next-sequence)              ;Normal successor
    (or (get code 'skip-true-sequence)        ;Skip successor
      (get code 'skip-false-sequence))
    (not (fieldp code 'sequencer 'pushj))  ;Skipping into a subroutine!
    (check-loses "Can't handle both a normal successor and a skip successor"))))
```

F:>lmach>ucode>FAKE-ARRAY.LISP.14

```
; -*- Mode:Lisp; Base:8; Lowercase:yes -*-

(defvar array-type-table                    ;Entries are (type type-code dispatch-code)
   '((art-1b 0 0) (art-2b 1 1) (art-4b 2 2) (art-8b 3 3) (art-16b 4 4)
     (art-string 13 3) (art-fat-string 14 4)
     (art-q 5 5) (art-q-list 6 5)
     (art-boolean 10 10)))

;This only makes leaderless 1-D arrays (arrays of the first kind)
(defun fake-array (memloc type size &aux type-info)
  (or (setq type-info (assq type array-type-table))
      (error "|undefined array type| type))
  (aset (set-cdr (set-type (dpb (third type-info) 2604
                                (dpb (second type-info) 2204
                                     size))
                           dtp-header-i)
                 1)
        *main-memory* memloc)
  (loop for i from 0 below size
        do (aset (set-type 0 dtp-fix) *main-memory* (+ memloc i 1)))
  (set-type memloc dtp-array))

;Make arrays of the second kind (short 1D with leader)
(defun fake-array-with-leader (memloc type size leader-size &aux type-info)
  (or (setq type-info (assq type array-type-table))
      (error "|undefined array type| type))
  (aset (set-cdr (set-type (dpb 10 2604
                                (dpb (second type-info) 2204
                                     (dpb leader-size 1406
                                          size)))
                           dtp-header-i)
                 1)
        *main-memory* memloc)
  (let ((loc memloc))
    (loop repeat leader-size do (aset *nil* *main-memory* (setq loc (1+ loc))))
    (loop for i from 0 below size
          do (aset (set-type 0 dtp-fix) *main-memory* (+ loc i 1))))
  (set-type memloc dtp-array))


(defun pa (array)
  (let ((head (aref *main-memory* (pointer-field array))))
    (cond ((and (data-type? head dtp-header-i)
                (cdr-code? head 1))
           (let ((disp (ldb 2604 head))
                 (type (ldb 2204 head))
                 (long-length (ldb 0022 head))
                 (leader-length (ldb 1406 head))
                 (short-length (ldb 0014 head)))
             (format t "~&Array dispatch ~O, type ~O " disp type)
             (loop for (tp tc dc) in array-type-table
                   when (= tc type) do (format t "(~A) " tp)
                     and unless (or (= disp 10) (= dc disp))
                           do (format t "(disp should be ~O) " dc))
             (cond ((< disp 10)
                    (format t "size=~O~%" long-length)
                    (loop for i from 0 below long-length
                          do (format t "(~O) " i)
                             (pq (aref *main-memory* (+ (pointer-field array) i 1)))
                             (terpri)))
                   ((= disp 10)
                    (format t "leader-size=~O, array-size=~O~%" leader-length short-length)
                    (loop for i from 0 below leader-length
```

```
                        do (format t "(~O) " i)
                           (pq (aref *main-memory* (+ (pointer-field array) i 1)))
                           (terpri))
                    (loop for i from 0 below short-length
                        do (format t "(~O) " i)
                           (pq (aref *main-memory*
                                     (+ (pointer-field array) i leader-length 1)))
                           (terpri)))
                   (t (format t "[Bogus disp code]~%")))))
          (t (format t "~&Bad array header")))))

(defunction aref 1100 (2) ()
  (push-local arg 0)
  (ar-1-local arg 1)
  (return-stack))

(defunction aset 1110 (3) ()
  (push-local arg 0)
  (push-local arg 1)
  (as-1-local arg 2)
  ;(return-local arg 0)
  (push-local arg 0)
  (return-stack)
  )

;array-register test
;(search-array value array from to)
;arg4 is the index offset, arg5-10 are array register, arg11 is subscript
(defunction search-array 1120 (4) ()
  (push-immed 0)                  ;/4/ Make space for index offset
  (push-local arg 1)              ;/5/ Open up the array
  (push-local arg 2)              ;/6/
  (push-local arg 3)              ;/7/
  (setup-1d-array-from-to)        ;/8-12/
  (pop-local arg 4)               ;/11/ Save index offset
  ;head of loop
  (push-local arg 11.)            ;Get subscript
  (push-local arg 10.)            ;Compare against 'to'
  (branch-greater-or-equal 7)     ;Branch if loop finished
  (fast-aref-nopop arg 8)         ;Fetch from array
  (push-local arg 0)              ;Compare against value
  (branch-eq 2)                   ;Escape if found
  (add-immed 1)                   ;Advance subscript
  (branch -8)                     ;Loop more
  ;Here if found
  (subtract-local arg 4)          ;Return unoffset subscript
  (return-stack)
  ;Here if not found
  (push-immed -1)                 ;NIL not addressible yet!
  (return-stack))

(defunction array-leader 1150 (2) ()
  (array-leader)
  (return-stack))

(defunction store-array-leader 1160 (3) ()
  (push-local arg 0)
  (push-local arg 1)
  (push-local arg 2)
  (store-array-leader)
  ;(return-local arg 0)
  (push-local arg 0)
  (return-stack))
; -*- Mode:Lisp; Base:8; Lowercase:yes -*-

; Load up all the files of the simulated microcode

(defun loadup (file)
  (let ((truename (probef (setq file (mergef file '(* fasl))))))
    (terpri)
    (cond ((null truename)
           (princ file)
           (princ '| not found for loading.|))
          (t (princ '|Loading |)
             (princ truename)
             (load file)))))

(loadup'sim)
(loadup'uu)
(loadup'ul)
(loadup'check)
(loadup'ua)
(loadup'basic)
(loadup'branch)
(loadup'predicate)
(loadup'funcall)
(loadup'funcall1)
(loadup'funcall2)
(loadup'stack-buffer)
(loadup'array)
```

```
(loadup'multiply)
(loadup'division)
(loadup'subprim)
(loadup'sym)

;Load up compiled Lisp code files

(loadup 'fact/.sim)
(loadup 'fake-array/.lisp)
```

```
;;; -*- Mode:LISP; Package:MICRO; Base:8 -*-
;;; (c) Copyright 1982, Symbolics, Inc.

;;; MAKE-SYSTEM aids for microcompiler

(DEFVAR *MACHINE-VERSION*)          ;One of SIM, PROTO, TMC, IFU
                                    ;Set this at top-level to what you want before doing
                                    ;incremental compilations.


(DEFUN SIM-FASLOAD-1 (INFILE)
  (SI:FASLOAD-1 INFILE))

(DEFUN SIM-COMPILE-FILE-1 (INFILE OUTFILE)
  (LET ((*MACHINE-VERSION* 'SIM))
    (SI:COMPILE-FILE-1 INFILE OUTFILE)))

(DEFUN PROTO-FASLOAD-1 (INFILE)
  (SI:FASLOAD-1 INFILE))

(DEFUN PROTO-COMPILE-FILE-1 (INFILE OUTFILE)
  (LET ((*MACHINE-VERSION* 'PROTO))
    (SI:COMPILE-FILE-1 INFILE OUTFILE)))

(DEFUN TMC-FASLOAD-1 (INFILE)
  (SI:FASLOAD-1 INFILE))

(DEFUN TMC-COMPILE-FILE-1 (INFILE OUTFILE)
  (LET ((*MACHINE-VERSION* 'TMC))
    (SI:COMPILE-FILE-1 INFILE OUTFILE)))

(DEFUN TMC5-FASLOAD-1 (INFILE)
  (SI:FASLOAD-1 INFILE))

(DEFUN TMC5-COMPILE-FILE-1 (INFILE OUTFILE)
  (LET ((*MACHINE-VERSION* 'TMC5))
    (SI:COMPILE-FILE-1 INFILE OUTFILE)))

(DEFUN IFU-FASLOAD-1 (INFILE)
  (SI:FASLOAD-1 INFILE))

(DEFUN IFU-COMPILE-FILE-1 (INFILE OUTFILE)
  (LET ((*MACHINE-VERSION* 'IFU))
    (SI:COMPILE-FILE-1 INFILE OUTFILE)))
```

```
;-*- Mode:LISP; Package:USER; Base:10 -*-

#M (EVAL-WHEN (EVAL LOAD COMPILE) (SETQ BASE 10. IBASE 10.))

(DEFVAR *EXPAND-ALIST* NIL)        ;Alist of variables and forms bound to
(DEFVAR *FIELD-DEFINITIONS* NIL)          ;Alist for field pseudo-op

;Programming.
;The PAL looks like a 512x4 PROM.  An intact fuse is a 0 and a blown
;fuse is a 1.  We need a map from pin numbers and assertion levels to
;input numbers, a map from product term numbers to output pin numbers
;which they feed (or OEs), and the map from input and product term to
;word and bit in the "PROM".  Also for the smaller PROMs we need the
;"phantom fuse" pattern which fills in the unused locations in the
;512x4 array.
;Note how they managed to win.  If you blow no fuses in a product term,
;it does not contribute to its OR/NOR.  If you blow no fuses in a product
;term that drives an OE, the output is turned off.

;This structure contains all the information for a PAL type definition
(DEFSTRUCT (PALDEF NAMED CONC-NAME)
  (NAME)                  ;Symbol which is the name of the PAL type
  (N-WORDS 512.)          ;Number of words in pseudo PROM
  (INVERTED-PINS NIL)     ;List of output pins which are NOR rather than OR
  (HIGH-INPUT-MAP NIL)    ;A-list from pin number to input-number for H
  (LOW-INPUT-MAP NIL)     ;A-list from pin number to input-number for L
  (N-INPUTS 32.)          ;Number of input columns in array
  (PRODUCT-MAP)           ;A-list from output/register pin number to
                          ; list of product terms; each product
                          ; term is represented by a list of row number and
                          ; bit number.  The fuses for this product term are
                          ; that bit of the PROM words addressed by input number
                          ; for fuse + (* row-number n-inputs).  The product
                          ; terms are ORed or NORed together of course
```

```
 (OE-PRODUCT-MAP NIL)  ;Same for OE product terms (always asserted-high)
 (PHANTOM-FUSE-ROUTINE NIL)    ;Subroutine to initialize the array
 (REGISTERED-PINS NIL) ;List of output pins which are registered
 )                     ;...more later...

(PUTPROP 'PAL16L8
        (MAKE-PALDEF NAME 'PAL16L8
          INVERTED-PINS '(12 13 14 15 16 17 18 19)
          HIGH-INPUT-MAP '((2 0) (3 4) (4 8) (5 12) (6 16) (7 20) (8 24)
                           (9 28) (11 30) (13 26) (14 22) (15 18) (16 14)
                           (17 10) (18 6) (1 2))
          LOW-INPUT-MAP '((2 1) (3 5) (4 9) (5 13) (6 17) (7 21) (8 25)
                          (9 29) (11 31) (13 27) (14 23) (15 19) (16 15)
                          (17 11) (18 7) (1 3))
          PRODUCT-MAP '((19 (1 0) (2 0) (3 0) (4 0) (5 0) (6 0) (7 0))
                        (18 (1 1) (2 1) (3 1) (4 1) (5 1) (6 1) (7 1))
                        (17 (1 2) (2 2) (3 2) (4 2) (5 2) (6 2) (7 2))
                        (16 (1 3) (2 3) (3 3) (4 3) (5 3) (6 3) (7 3))
                        (15 (9 0) (10 0) (11 0) (12 0) (13 0) (14 0) (15 0))
                        (14 (9 1) (10 1) (11 1) (12 1) (13 1) (14 1) (15 1))
                        (13 (9 2) (10 2) (11 2) (12 2) (13 2) (14 2) (15 2))
                        (12 (9 3) (10 3) (11 3) (12 3) (13 3) (14 3) (15 3)))
          OE-PRODUCT-MAP '((19 (0 0)) (18 (0 1)) (17 (0 2)) (16 (0 3))
                           (15 (8 0)) (14 (8 1)) (13 (8 2)) (12 (8 3))))
        'PALDEF)

(PUTPROP 'PAL16R8
        (MAKE-PALDEF NAME 'PAL16R8
          INVERTED-PINS '(12 13 14 15 16 17 18 19)
          REGISTERED-PINS '(12 13 14 15 16 17 18 19)
          HIGH-INPUT-MAP '((2 0) (3 4) (4 8) (5 12) (6 16) (7 20) (8 24)
                           (9 28) (12 30) (13 26) (14 22) (15 18) (16 14)
                           (17 10) (18 6) (19 2))
          LOW-INPUT-MAP '((2 1) (3 5) (4 9) (5 13) (6 17) (7 21) (8 25)
                          (9 29) (12 31) (13 27) (14 23) (15 19) (16 15)
                          (17 11) (18 7) (19 3))
          PRODUCT-MAP
              '((19 (0 0) (1 0) (2 0) (3 0) (4 0) (5 0) (6 0) (7 0))
                (18 (0 1) (1 1) (2 1) (3 1) (4 1) (5 1) (6 1) (7 1))
                (17 (0 2) (1 2) (2 2) (3 2) (4 2) (5 2) (6 2) (7 2))
                (16 (0 3) (1 3) (2 3) (3 3) (4 3) (5 3) (6 3) (7 3))
                (15 (8 0) (9 0) (10 0) (11 0) (12 0) (13 0) (14 0) (15 0))
                (14 (8 1) (9 1) (10 1) (11 1) (12 1) (13 1) (14 1) (15 1))
                (13 (8 2) (9 2) (10 2) (11 2) (12 2) (13 2) (14 2) (15 2))
                (12 (8 3) (9 3) (10 3) (11 3) (12 3) (13 3) (14 3) (15 3))))
        'PALDEF)

(PUTPROP 'PAL16R6
        (MAKE-PALDEF NAME 'PAL16R6
          INVERTED-PINS '(12 13 14 15 16 17 18 19)
          REGISTERED-PINS '(13 14 15 16 17 18)
          HIGH-INPUT-MAP '((2 0) (3 4) (4 8) (5 12) (6 16) (7 20) (8 24)
                           (9 28) (12 30) (13 26) (14 22) (15 18) (16 14)
                           (17 10) (18 6) (19 2))
          LOW-INPUT-MAP '((2 1) (3 5) (4 9) (5 13) (6 17) (7 21) (8 25)
                          (9 29) (12 31) (13 27) (14 23) (15 19) (16 15)
                          (17 11) (18 7) (19 3))
          PRODUCT-MAP
              '((19 (1 0) (2 0) (3 0) (4 0) (5 0) (6 0) (7 0))
                (18 (0 1) (1 1) (2 1) (3 1) (4 1) (5 1) (6 1) (7 1))
                (17 (0 2) (1 2) (2 2) (3 2) (4 2) (5 2) (6 2) (7 2))
                (16 (0 3) (1 3) (2 3) (3 3) (4 3) (5 3) (6 3) (7 3))
                (15 (8 0) (9 0) (10 0) (11 0) (12 0) (13 0) (14 0) (15 0))
                (14 (8 1) (9 1) (10 1) (11 1) (12 1) (13 1) (14 1) (15 1))
                (13 (8 2) (9 2) (10 2) (11 2) (12 2) (13 2) (14 2) (15 2))
                (12 (9 3) (10 3) (11 3) (12 3) (13 3) (14 3) (15 3)))
          OE-PRODUCT-MAP '((19 (0 0)) (12 (8 3))))
        'PALDEF)

(PUTPROP 'PAL16R4
        (MAKE-PALDEF NAME 'PAL16R4
          INVERTED-PINS '(12 13 14 15 16 17 18 19)
          REGISTERED-PINS '(14 15 16 17)
          HIGH-INPUT-MAP '((2 0) (3 4) (4 8) (5 12) (6 16) (7 20) (8 24)
                           (9 28) (12 30) (13 26) (14 22) (15 18) (16 14)
                           (17 10) (18 6) (19 2))
          LOW-INPUT-MAP '((2 1) (3 5) (4 9) (5 13) (6 17) (7 21) (8 25)
                          (9 29) (12 31) (13 27) (14 23) (15 19) (16 15)
                          (17 11) (18 7) (19 3))
          PRODUCT-MAP
              '((19 (1 0) (2 0) (3 0) (4 0) (5 0) (6 0) (7 0))
                (18 (1 1) (2 1) (3 1) (4 1) (5 1) (6 1) (7 1))
                (17 (0 2) (1 2) (2 2) (3 2) (4 2) (5 2) (6 2) (7 2))
                (16 (0 3) (1 3) (2 3) (3 3) (4 3) (5 3) (6 3) (7 3))
                (15 (8 0) (9 0) (10 0) (11 0) (12 0) (13 0) (14 0) (15 0))
                (14 (8 1) (9 1) (10 1) (11 1) (12 1) (13 1) (14 1) (15 1))
                (13 (9 2) (10 2) (11 2) (12 2) (13 2) (14 2) (15 2))
                (12 (9 3) (10 3) (11 3) (12 3) (13 3) (14 3) (15 3)))
          OE-PRODUCT-MAP '((19 (0 0)) (18 (0 1)) (13 (8 2)) (12 (8 3))))
        'PALDEF)
```

```
(PUTPROP 'PAL10H8
        (MAKE-PALDEF NAME 'PAL10H8
          HIGH-INPUT-MAP '((2 0) (3 4) (4 8) (5 12) (6 16) (7 20) (8 24)
                           (9 28) (11 30) (1 2))
          LOW-INPUT-MAP '((2 1) (3 5) (4 9) (5 13) (6 17) (7 21) (8 25)
                          (9 29) (11 31) (1 3))
          PRODUCT-MAP '((19 (0 0) (1 0))
                        (18 (0 1) (1 1))
                        (17 (0 2) (1 2))
                        (16 (0 3) (1 3))
                        (15 (8 0) (9 0))
                        (14 (8 1) (9 1))
                        (13 (8 2) (9 2))
                        (12 (8 3) (9 3)))
          PHANTOM-FUSE-ROUTINE 'PAL10H8-PHANTOM-FUSE)
        'PALDEF)

(DEFUN PAL10H8-PHANTOM-FUSE (ARRAY)
  ;; Fill columns corresponding to unused inputs with 1's
  (LOOP FOR COLUMN IN '(6 7 10 11 14 15 18 19 22 23 26 27)
        DO (LOOP FOR ROW FROM 0 TO 15
                 DO (ASET 15 ARRAY (+ (* ROW 32) COLUMN))))
  ;; Fill unused rows with 0 (all rows except 0, 1, 8, 9)
  (LOOP FOR ROW FROM 0 TO 15
        UNLESS (MEMBER ROW '(0 1 8 9))
          DO (LOOP FOR COLUMN FROM 0 BELOW 32
                   DO (ASET 0 ARRAY (+ (* ROW 32) COLUMN)))))


(PUTPROP 'PAL20L10
        (MAKE-PALDEF NAME 'PAL20L10
          N-INPUTS 40.
          INVERTED-PINS '(14 15 16 17 18 19 20 21 22 23)
          HIGH-INPUT-MAP '((2 0) (3 4) (4 8) (5 12) (6 16) (7 20) (8 24)
                           (9 28) (10 32) (11 36) (13 38) (15 34)
                           (16 30) (17 26) (18 22) (19 18) (20 14)
                           (21 10) (22 6) (1 2))
          LOW-INPUT-MAP '((2 1) (3 5) (4 9) (5 13) (6 17) (7 21) (8 25)
                          (9 29) (10 33) (11 37) (13 39) (15 35)
                          (16 31) (17 27) (18 23) (19 19) (20 15)
                          (21 11) (22 7) (1 3))
          )
        'PALDEF)

;--- For the 20X register series, the layout is similar except that
;--- the 4 product terms for an output are OR'ed together in pairs
;--- then XOR'ed together and the result is the complement of the
;--- output.

;Specials for encodification
(DEFVAR *ARRAY*)
(DEFVAR *IPINS*)
(DEFVAR *PALDEF*)
(DEFVAR *VAR*)
(DEFVAR *TERMS*)

;DEFPAL expands into a PAL-EQUATIONS property for checking,
;plus stores an array into the value of the symbol, where
;the PROM programming software wants it.

;Extraneous macro only necessary because &QUOTE doesn't work in Maclisp
(DEFMACRO DEFPAL (NAME TYPE &REST CLAUSES)
  `(DEFPAL-1 ',NAME ',TYPE ',CLAUSES))

(DEFUN DEFPAL-1 (NAME TYPE CLAUSES
                 &AUX IPINS REAL-IPINS PALDEF RPINS OUTPUTS
                      *EXPAND-ALIST* *FIELD-DEFINITIONS* EQS ARRAY)
  (OR (SETQ PALDEF (GET TYPE 'PALDEF))
      (FERROR NIL "~S undefined PAL type" TYPE))
  ;Parse the specifications
  (DOLIST (CLAUSE CLAUSES)
    (SELECTQ (FIRST CLAUSE)
      (IPIN
       (LET ((SIG (THIRD CLAUSE))
             (PIN (SECOND CLAUSE)))
         (LET ((HINPUT (CADR (ASSOC PIN (PALDEF-HIGH-INPUT-MAP PALDEF))))
               (LINPUT (CADR (ASSOC PIN (PALDEF-LOW-INPUT-MAP PALDEF)))))
           (OR (AND HINPUT LINPUT) (FERROR NIL "Pin ~D is not an input" PIN))
           (IF (MEMBER PIN (PALDEF-REGISTERED-PINS PALDEF))
               (FERROR NIL "Pin ~D is a registered output; don't use IPIN" PIN))
           (IF (EQ (FOURTH CLAUSE) 'L) (PSETQ HINPUT LINPUT LINPUT HINPUT))
           (PUSH (LIST SIG HINPUT LINPUT) IPINS)
           (PUSH SIG REAL-IPINS))))
      ((OPIN RPIN)
       (LET ((SIG (THIRD CLAUSE))
             (PIN (SECOND CLAUSE)))
         (IF (EQ (FIRST CLAUSE) 'RPIN)
             (LET ((REG-INPUT (INTERN (FORMAT NIL "NEXT-~A" (THIRD CLAUSE)))))
               (PUSH (CONS SIG REG-INPUT) RPINS);Set up renaming for feedback
               (OR (MEMBER PIN (PALDEF-REGISTERED-PINS PALDEF))
                   (FERROR NIL "Pin ~D is not a registered output; don't use RPIN" PIN))
```

```
            (LET ((HINPUT (CADR (ASSOC PIN (PALDEF-HIGH-INPUT-MAP PALDEF))))
                  (LINPUT (CADR (ASSOC PIN (PALDEF-LOW-INPUT-MAP PALDEF)))))
              (OR (AND HINPUT LINPUT)
                  (FERROR NIL "Pin ~D is not an input (needed for feedback)" PIN))
              (IF (EQ (FOURTH CLAUSE) 'L) (PSETQ HINPUT LINPUT LINPUT HINPUT))
              (PUSH (LIST SIG HINPUT LINPUT) IPINS)) ;This is feedback
            (SETQ SIG REG-INPUT))            ;This is what comes out of the array
          (IF (MEMBER PIN (PALDEF-REGISTERED-PINS PALDEF))
              (FERROR NIL "Pin ~D is a registered output; don't use OPIN" PIN)))
      (OR (MATCH-ASSERTION-LEVEL? PALDEF PIN (FOURTH CLAUSE))
          (LET ((NEG-SIG (INTERN (FORMAT NIL "NOT-~A" SIG))))
            (PUSH (CONS NEG-SIG '(NOT ,SIG)) *EXPAND-ALIST*)
            (SETQ SIG NEG-SIG)))              ;This is what really comes out of array
      (PUSH (LIST SIG PIN) OUTPUTS)))
    (OE (PUSH (LIST (THIRD CLAUSE) (SECOND CLAUSE) 'OE)
              OUTPUTS))                       ;Always asserted high
    (SETQ (PUSH (CONS (OR (CDR (ASSQ (SECOND CLAUSE) RPINS)) (SECOND CLAUSE))
                      (THIRD CLAUSE))
                *EXPAND-ALIST*))
    (FIELD (PUSH (CDR CLAUSE) *FIELD-DEFINITIONS*))
    (OTHERWISE (FERROR NIL "~S unknown DEFPAL clause" (FIRST CLAUSE)))))
(LOOP FOR (SIG PIN OE) IN OUTPUTS
      UNLESS (ASSOC PIN (IF OE (PALDEF-OE-PRODUCT-MAP PALDEF) (PALDEF-PRODUCT-MAP PALDEF)))
        DO (FERROR NIL "Pin ~D is not defined in the output~:[~;-enable~] table" PIN OE))
;Turn on any outputs whose OEs are not specified!
(LOOP FOR (PIN) IN (PALDEF-OE-PRODUCT-MAP PALDEF)
      WHEN (LOOP FOR (IGNORE OPIN OE) IN OUTPUTS
                 THEREIS (AND (= OPIN PIN) (NOT OE)))
        WHEN (LOOP FOR (IGNORE OPIN OE) IN OUTPUTS
                   NEVER (AND (= OPIN PIN) OE))
          DO (LET ((NAME (INTERN (FORMAT NIL "PIN-~D-OE" PIN))))
               (PUSH (LIST NAME PIN 'OE) OUTPUTS)
               (PUSH (CONS NAME T) *EXPAND-ALIST*)))
;Do the boolean algebra to get a sum of products for each array output
(SETQ EQS (LOOP FOR (VAR) IN OUTPUTS
                COLLECT VAR
                COLLECT (EXPAND-AND-SIMPLIFY VAR)))
(PUTPROP NAME (CONS 'SETQ EQS) 'PAL-EQUATIONS)
;Check that all inputs are used
(LOOP FOR (IGNORE EXP) ON EQS BY 'CDDR
      DO (SETQ REAL-IPINS (DELETE-USED-INPUTS EXP REAL-IPINS)))
(IF REAL-IPINS
    (FORMAT T "~&Inputs not used:~{ ~A~}" REAL-IPINS))
;Make the array and initialize it to the initial fuse states (all intact now)
(SETQ ARRAY (MAKE-ARRAY (PALDEF-N-WORDS PALDEF)))
(FILLARRAY ARRAY '(0))
(IF (PALDEF-PHANTOM-FUSE-ROUTINE PALDEF)
    (FUNCALL (PALDEF-PHANTOM-FUSE-ROUTINE PALDEF) ARRAY))
;Go over the outputs and store their fuses into the array
  (LOOP WITH *ARRAY* = ARRAY AND *IPINS* = IPINS AND *PALDEF* = PALDEF
        FOR (*VAR* PIN OE) IN OUTPUTS AND (IGNORE EXP) ON EQS BY 'CDDR
        AS MAP = (IF OE (PALDEF-OE-PRODUCT-MAP PALDEF) (PALDEF-PRODUCT-MAP PALDEF))
        AS *TERMS* = (CDR (ASSOC PIN MAP))
        DO (ENCODIFY EXP))
  (SET NAME ARRAY)
  (PUTPROP NAME TYPE ':PAL-TYPE)
  NAME)

(DEFUN DELETE-USED-INPUTS (EXP SIGS)
  (COND ((ATOM EXP) (DELQ EXP SIGS))
        (T (LOOP FOR EXP1 IN (CDR EXP)
                 DO (SETQ SIGS (DELETE-USED-INPUTS EXP1 SIGS)))
           SIGS)))

(DEFUN MATCH-ASSERTION-LEVEL? (PALDEF PIN-NUMBER LEVEL)
  (EQ (NOT (EQ LEVEL 'L))
      (NOT (MEMQ PIN-NUMBER (PALDEF-INVERTED-PINS PALDEF)))))

;Blow all fuses except the ones specified
(DEFUN BLOW-PRODUCT-TERM (INPUT-NUMBER-LIST)
  (LET ((TERM (POP *TERMS*)))
    (OR TERM (FERROR NIL "Not enough product terms to do ~S" *VAR*))
    (LOOP WITH TERM-BASE = (* (CAR TERM) (PALDEF-N-INPUTS *PALDEF*))
          WITH BITMASK = (LSH 1 (CADR TERM))
          FOR INP FROM 0 BELOW (PALDEF-N-INPUTS *PALDEF*)
          UNLESS (MEMBER INP INPUT-NUMBER-LIST)
            DO (ASET (LOGIOR (AREF *ARRAY* (+ TERM-BASE INP)) BITMASK)
                     *ARRAY* (+ TERM-BASE INP)))))

(DEFUN ENCODIFY (EXP &AUX TEM)
  (COND ((EQ EXP NIL)
         ;Blow no fuses
         NIL)
        ((EQ EXP T)
         ;Blow all fuses in one product term
         (BLOW-PRODUCT-TERM NIL))
        ((SETQ TEM (ASSQ EXP *IPINS*))
         (BLOW-PRODUCT-TERM (LIST (CADR TEM))))
        ((ATOM EXP)
         (FERROR NIL "~S undefined variable in expression for ~S" EXP *VAR*))
        ((AND (EQ (CAR EXP) 'NOT)
```

```
            (SETQ TEM (ASSQ (CADR EXP) *IPINS*)))
         (BLOW-PRODUCT-TERM (LIST (CADDR TEM))))
        ((EQ (CAR EXP) 'AND) (ENCODIFY-AND (CDR EXP)))
        ((EQ (CAR EXP) 'OR) (MAPC #'ENCODIFY (CDR EXP)))
        (T (FERROR NIL "~S unrecognizable expression for ~S" EXP *VAR*))))

(DEFUN ENCODIFY-AND (FACTORS &AUX TEM)
  (BLOW-PRODUCT-TERM
    (LOOP FOR FACTOR IN FACTORS
          COLLECT
            (COND ((SETQ TEM (ASSQ FACTOR *IPINS*)) (CADR TEM))
                  ((AND (NOT (ATOM FACTOR))
                        (EQ (CAR FACTOR) 'NOT)
                        (SETQ TEM (ASSQ (CADR FACTOR) *IPINS*)))
                   (CADDR TEM))
                  (T (FERROR NIL "~S undefined in expression for ~S"
                             FACTOR *VAR*))))))

;Print out in format similar to MMI manual
;X for 0 (connected fuse), blank for 1 (blown fuse)
(DEFUN PRINT-PAL-ARRAY (ARRAY)
  (TERPRI)
  (PRINC "   .")
  (LOOP FOR COLUMN FROM 0 BELOW 32. BY 4
        DO (FORMAT T "~4@<~D~>." COLUMN))
  (LOOP FOR ROW FROM 0 BELOW 16.
    DO (FORMAT T "~%~2D " ROW)
       (LOOP FOR BIT = 8 THEN (LSH BIT -1) UNTIL (ZEROP BIT)
         DO (TERPRI) (PRINC "   -")
            (LOOP FOR COLUMN FROM 0 BELOW 32.
              UNLESS (ZEROP COLUMN) WHEN (= (\ COLUMN 4) 0) DO (TYO #/.)
              DO (TYO (IF (BIT-TEST BIT (AREF ARRAY (+ (* ROW 32.) COLUMN)))
                          #\SP #/X)))
            (PRINC "-"))))

;Make a name.PAL-CHECK file
(DEFUN MAKE-CHECK-FILE (NAME)
  (LET ((FILE (OPEN (FORMAT NIL "~A.PAL-CHECK" NAME) 'PRINT)))
    (LET #M ((OUTFILES (LIST FILE)) (^R T) (^W T))
         #Q ((STANDARD-OUTPUT FILE))
      (#M SPRINTER #Q GRIND-TOP-LEVEL (GET NAME 'PAL-EQUATIONS))
      (TERPRI)
      (PRINT-PAL-ARRAY (SYMEVAL NAME)))
    (CLOSE FILE)))
;Expansion phase.
;This simply expands macros and plugs in values of "variables"
;No simplification is done.
;You then may call SIMPLIFY on the result.

;This is the "entry"
;So that macros may expand into macro calls, this loops until done
(DEFUN EXPAND (FORM &OPTIONAL NO-COND &AUX TEM FORM1)
  (LOOP DOING
    (COND ((ATOM FORM)
           (IF (SETQ TEM (ASSQ FORM *EXPAND-ALIST*))
               (SETQ FORM (CDR TEM))
               (RETURN FORM)))
          ((AND NO-COND (EQ (CAR FORM) 'COND)) (RETURN FORM))
          ((SETQ TEM (ASSQ (CAR FORM)
                           '((FIELD . EXPAND-FIELD) (COND . EXPAND-COND)
                             (IF . EXPAND-IF)
                             (NOT . EXPAND-NOT) (AND . EXPAND-AND)
                             (OR . EXPAND-OR) (XOR . EXPAND-XOR)
                             (WIRED-XOR . EXPAND-WIRED-XOR))))
           (SETQ FORM1 (FUNCALL (CDR TEM) (CDR FORM)))
           (IF (EQUAL FORM1 FORM) (RETURN FORM)
               (SETQ FORM FORM1)))
          (T (FERROR NIL "~S unrecognized - EXPAND" FORM)))))

;(FIELD signal-n signal-n-1 ... signal-0 (value value...))
;or (FIELD fieldname (value value...))
(DEFUN EXPAND-FIELD (ARGS)
  (CONS 'OR
        (LOOP FOR VALUE IN (IF (LISTP (CAR (LAST ARGS))) (CAR (LAST ARGS))
                               (LAST ARGS))
              WITH SIGNALS = (EXPAND-FIELD-SIGNALS (BUTLAST ARGS))
              COLLECT (CONS 'AND
                            (LOOP FOR SIGNAL IN SIGNALS
                                  FOR MASK = (LSH 1 (1- (LENGTH SIGNALS)))
                                       THEN (LSH MASK -1)
                                  WHEN (BIT-TEST MASK VALUE)
                                    COLLECT SIGNAL
                                    ELSE COLLECT '(NOT ,SIGNAL))))))

(DEFUN EXPAND-FIELD-SIGNALS (SIGS)
  (LOOP FOR SIG IN SIGS
        WHEN (CDR (ASSQ SIG *FIELD-DEFINITIONS*)) APPEND IT
        ELSE COLLECT SIG))

;Note that the antecedents should not overlap, and if it drops off the end
```

```
;it's dont-care
(DEFUN EXPAND-COND (ARGS)
  (CONS 'OR (LOOP FOR CLAUSE IN ARGS
                  WHEN (EQ (CAR CLAUSE) T)
                       DO (FORMAT T "~&Warning: T as predicate in COND clause - ~S" CLAUSE)
                  COLLECT `(AND ,(CAR CLAUSE) ,(CADR CLAUSE)))))

(DEFUN EXPAND-IF (ARGS)
  `(OR (AND ,(FIRST ARGS) ,(SECOND ARGS))
       (AND (NOT ,(FIRST ARGS)) ,(THIRD ARGS))))

;XOR expands in terms of AND and OR
(DEFUN EXPAND-XOR (ARGS)
  (CONS 'OR (LOOP FOR CODE FROM 0 BELOW (EXPT 2 (LENGTH ARGS))
                  WHEN (ODD-PARITY CODE)
                    COLLECT (CONS 'AND
                                  (LOOP FOR ARG IN ARGS FOR BIT = 1 THEN (* BIT 2)
                                        COLLECT (IF (BIT-TEST BIT CODE) `(NOT ,ARG) ARG))))))

(DEFUN ODD-PARITY (N)
  (LOOP FOR N = N THEN (// N 2) UNTIL (ZEROP N) WITH PARITY = NIL
        WHEN (ODDP N) DO (SETQ PARITY (NOT PARITY))
        FINALLY (RETURN PARITY)))

;If WIRED-XOR is present, it stays as WIRED-XOR in the expansion.
;WIRED-XOR may only be used with PALs that have wired-in XOR capability,
;and then only in the right place.  WIRED-XOR is negated by negating its first argument.
(DEFUN EXPAND-WIRED-XOR (ARGS)
  (OR (= (LENGTH ARGS) 2)
      (FERROR NIL "~S WIRED-XOR with other than 2 arguments" (CONS 'WIRED-XOR ARGS)))
  (LIST 'WIRED-XOR (EXPAND (FIRST ARGS)) (EXPAND (SECOND ARGS))))

;NOT NOT cancels.  Move NOT inside of XOR.
;NOT of COND moves inside.  Note well that if COND drops off the end
;the result is dont-care, not NIL!  This is the only form of dont-care.
(DEFUN EXPAND-NOT (ARGS)
  (OR (= (LENGTH ARGS) 1)
      (FERROR NIL "~S NOT with other than 1 argument" (CONS 'NOT ARGS)))
  (LET ((ARG (EXPAND (FIRST ARGS) T)))
    (COND ((ATOM ARG) `(NOT ,ARG))
          ((EQ (CAR ARG) 'NOT) (CADR ARG))
          ((EQ (CAR ARG) 'COND)
           (CONS 'COND (LOOP FOR CLAUSE IN (CDR ARG)
                             COLLECT (LIST (CAR CLAUSE)
                                           (EXPAND-NOT (CDR CLAUSE))))))
          ((EQ (CAR ARG) 'WIRED-XOR) `(WIRED-XOR (NOT ,(CADR ARG)) ,(CADDR ARG)))
          (T `(NOT ,ARG)))))

(DEFUN EXPAND-OR (ARGS)
  (CONS 'OR (MAPCAR #'EXPAND ARGS)))

(DEFUN EXPAND-AND (ARGS)
  (CONS 'AND (MAPCAR #'EXPAND ARGS)))
;Simplification phase

(DEFUN EXPAND-AND-SIMPLIFY (FORM)
  (SIMPLIFY (EXPAND FORM)))

;Simplify and get into disjunctive normal form (with a possible top-level WIRED-XOR)
(DEFUN SIMPLIFY (FORM)
  (COND ((ATOM FORM) FORM)
        ((EQ (CAR FORM) 'NOT) (SIMPLIFY-NOT (CADR FORM)))
        ((EQ (CAR FORM) 'AND) (SIMPLIFY-AND (CDR FORM)))
        ((EQ (CAR FORM) 'OR) (SIMPLIFY-OR (CDR FORM)))
        ((EQ (CAR FORM) 'WIRED-XOR)
         (LIST 'WIRED-XOR (SIMPLIFY (SECOND FORM)) (SIMPLIFY (THIRD FORM))))
        (T (FERROR NIL "~S - at simplify??" FORM))))

;Various useful primitives
(DEFUN LITERAL? (X)
  (OR (ATOM X) (AND (EQ (CAR X) 'NOT) (ATOM (CADR X)))))

(DEFUN OPPOSITES? (X Y)
  (OR (AND (NOT (ATOM X)) (EQ (CAR X) 'NOT) (EQUAL (CADR X) Y))
      (AND (NOT (ATOM Y)) (EQ (CAR Y) 'NOT) (EQUAL (CADR Y) X))))

;Canonical ordering of literals.
;NIL is less than T is less than other atoms, which
;sort alphabetically (only symbols allowed).
;NOTs sort the same as their arguments.
(DEFUN CANONICAL-LESSP (X Y)
  (OR (ATOM X) (SETQ X (CADR X)))
  (OR (ATOM Y) (SETQ Y (CADR Y)))
  (COND ((NULL X) T)
        ((NULL Y) NIL)
        ((EQ X T) T)
        ((EQ Y T) NIL)
        (T (#M ALPHALESSP #Q STRING-LESSP X Y))))
```

```
(DEFUN SIMPLIFY-NOT (ARG)
  (COND ((EQ ARG NIL) T)
        ((EQ ARG T) NIL)
        ((ATOM ARG) '(NOT ,ARG))
        ((EQ (CAR ARG) 'NOT) (SIMPLIFY (CADR ARG)))
        ((EQ (CAR ARG) 'AND) (SIMPLIFY-OR1 (MAPCAR #'SIMPLIFY-NOT (CDR ARG))))
        (T (SETQ ARG (SIMPLIFY ARG))
           (COND ((OR (LITERAL? ARG) (MEMQ (CAR ARG) '(NOT AND)))
                  (SIMPLIFY-NOT ARG))
                 ((EQ (CAR ARG) 'OR)
                  (SIMPLIFY-AND1 (MAPCAR #'SIMPLIFY-NOT (CDR ARG))))
                 (T (FERROR NIL "~S after simplification - SIMPLIFY-NOT"
                            ARG))))))

;OR whose arguments have not yet been simplified
(DEFUN SIMPLIFY-OR (ARGS)
  (COND ((NULL ARGS) NIL)
        ((NULL (CDR ARGS)) (SIMPLIFY (CAR ARGS)))
        (T (SIMPLIFY-OR1 (MAPCAR #'SIMPLIFY ARGS)))))

;OR whose arguments have been simplified (and list may be clobbered)
(DEFUN SIMPLIFY-OR1 (ARGS)
  (SETQ ARGS (DELQ NIL ARGS))
  (COND ((NULL ARGS) NIL)
        ((NULL (CDR ARGS)) (CAR ARGS))
        ((MEMQ T ARGS) T)
        (T ;OR merging
         (LOOP FOR ARG IN ARGS
               UNLESS (LITERAL? ARG)
                 WHEN (EQ (CAR ARG) 'OR)
                   DO (SETQ ARGS (NCONC (DELQ ARG ARGS)
                                        (COPYLIST (CDR ARG))))
                 ELSE UNLESS (EQ (CAR ARG) 'AND)
                   DO (FERROR NIL "~S - garbage term in SIMPLIFY-OR1" ARG))
         ;Remove redundant terms (which must be conjuncts now) and also
         ;merge terms which are the same except for a clash in one factor
         ;Redundant terms or identical or one is covered by the other.
         (SETQ ARGS (REMOVE-REDUNDANCIES ARGS))
         (COND ((NULL ARGS) NIL)
               ((NULL (CDR ARGS)) (CAR ARGS))
               (T (CONS 'OR ARGS))))))

;Note: this is not as optimal as it could be, since it only optimizes pairwise
;For instance, it won't optimize (or (and a b) (and a c) (and b -c) (and -b c))
;into (or (and a b c) (and b -c) (and -b c))
(DEFUN REMOVE-REDUNDANCIES (TERMS)
 (LOOP WHILE
    (LOOP FOR (TERM1 . REST) ON TERMS THEREIS
       (LOOP FOR TERM2 IN REST
             UNLESS (OR (LITERAL? TERM1) (LITERAL? TERM2))
              THEREIS
               (LOOP FOR (X . REST1) ON (CDR TERM1)
                     FOR (Y . REST2) ON (CDR TERM2)
                     UNLESS (EQUAL X Y)
                       WHEN (AND (OPPOSITES? X Y) (EQUAL REST1 REST2))
                         DO (OR (EQ (CAR TERM1) 'AND)   ;paranoid
                                (BREAK REMOVE-REDUNDANCES-BARF T))
                            (SETQ TERMS
                                  (CONS (MAKE-AND (DELQ X (CDR TERM1)))
                                        (DELQ TERM1 (DELQ TERM2 TERMS))))
                            (RETURN T)  ;Done with TERM1
                       ELSE RETURN NIL)
             WHEN (OPPOSITES? TERM1 TERM2)
               RETURN (SETQ TERMS (LIST T))
             WHEN (COVERS? TERM1 TERM2)
               RETURN (SETQ TERMS (DELQ TERM2 TERMS 1))
             WHEN (COVERS? TERM2 TERM1)
               RETURN (SETQ TERMS (DELQ TERM1 TERMS 1)))))
 TERMS)

(DEFUN MAKE-AND (ARGS)
  (COND ((NULL ARGS) T)
        ((NULL (CDR ARGS)) (CAR ARGS))
        (T (CONS 'AND ARGS))))

;Does one conjunct cover another
(DEFUN COVERS? (X Y)
  (IF (LITERAL? X) (IF (LITERAL? Y) (EQUAL X Y)
                       (MEMBER X (CDR Y)))
      (AND (NOT (LITERAL? Y))
           (NOT (> (LENGTH X) (LENGTH Y)))
           (LOOP FOR XX IN (CDR X)
                 ALWAYS (MEMBER XX (CDR Y))))))
;Simplification of ANDs, including distribution of AND over OR.

;AND whose arguments have not yet been simplified
(DEFUN SIMPLIFY-AND (ARGS)
  (COND ((NULL ARGS) T)
        ((NULL (CDR ARGS)) (SIMPLIFY (CAR ARGS)))
```

```
        (T (SIMPLIFY-AND1 (MAPCAR #'SIMPLIFY ARGS)))))

;AND whose arguments have been simplified (and list may be clobbered)
(DEFUN SIMPLIFY-AND1 (ARGS)
  (SETQ ARGS (DELQ T ARGS))
  (COND ((NULL ARGS) T)
        ((NULL (CDR ARGS)) (CAR ARGS))
        ((MEMQ NIL ARGS) NIL)
        (T (LOOP FOR ARG IN ARGS                      ;OR/AND merging
                 UNLESS (LITERAL? ARG)
                   WHEN (EQ (CAR ARG) 'AND) COLLECT ARG INTO ANDS
                   ELSE WHEN (EQ (CAR ARG) 'OR) COLLECT ARG INTO ORS
                 FINALLY
                   (RETURN
                     (COND (ANDS
                            (DOLIST (X ANDS) (SETQ ARGS (DELQ X ARGS)))
                            (DOLIST (X ANDS) (SETQ ARGS (NCONC ARGS (CDR X))))
                            (SIMPLIFY-AND1 ARGS))
                           (ORS
                            (DOLIST (X ORS) (SETQ ARGS (DELQ X ARGS)))
                            (AND (SETQ ARGS (SIMPLIFY-AND1 ARGS))
                                 (SIMPLIFY-OR1
                                   (DISTRIBUTE ORS (LIST ARGS)))))
                           (T
                            (SETQ ARGS (SORT ARGS #'CANONICAL-LESSP))
                            (LOOP FOR (FIRST NEXT) ON ARGS
                                  WHEN (OPPOSITES? FIRST NEXT)
                                    RETURN NIL
                                  UNLESS (EQUAL FIRST NEXT)
                                    COLLECT FIRST INTO RESULT
                                  FINALLY
                                    (RETURN
                                      (COND ((NULL RESULT) T)
                                            ((NULL (CDR RESULT)) (CAR RESULT))
                                            (T (CONS 'AND RESULT))))))))))))

;Distribute each of the OR expressions in ORS over EXPS, which is the
;cdr of an OR expression containing only conjuncts.  Simplify at each
;stage in the hope of avoiding total combinatorial explosion.
(DEFUN DISTRIBUTE (ORS EXP)
  (IF (NULL ORS) EXP
      (SETQ EXP (SIMPLIFY-OR1
                  (LOOP FOR X IN (CDAR ORS)
                        NCONC (LOOP FOR Y IN EXP
                                    WHEN (MERGE-CONJUNCTS X Y)
                                      COLLECT IT))))
      (DISTRIBUTE (CDR ORS)
                  (IF (OR (ATOM EXP) (NOT (EQ (CAR EXP) 'OR)))
                      (LIST EXP)
                      (CDR EXP)))))

(DEFUN MERGE-CONJUNCTS (X Y)
  (COND ((EQ X NIL) NIL)
        ((EQ Y NIL) NIL)
        ((EQ X T) Y)
        ((EQ Y T) X)
        ((LITERAL? X)
         (COND ((NOT (LITERAL? Y)) (ADD-TO-AND Y X T))
               ((EQUAL X Y) X)
               ((OPPOSITES? X Y) NIL)
               ((CANONICAL-LESSP X Y) `(AND ,X ,Y))
               (T `(AND ,Y ,X))))
        ((LITERAL? Y) (ADD-TO-AND X Y T))
        (T (LOOP FOR YY IN (CDR Y) WITH COPYP = T
                 AS NEWX = (ADD-TO-AND X YY COPYP)
                 UNLESS (EQ NEWX X)
                   DO (SETQ X NEWX COPYP NIL)
                 UNTIL (NULL X))
           X)))

;Given a canonical, simplified conjunct, add one more factor
;and return a canonical, simplified conjunct.
(DEFUN ADD-TO-AND (AND FACTOR COPYP)
  (COND ((LITERAL? AND) (SETQ AND `(AND ,AND) COPYP NIL))
        ((EQ (CAR AND) 'AND))
        (T (FERROR NIL "~S - how did this get here? - ADD-TO-AND" AND)))
  (LOOP FOR TAIL = AND THEN (CDR TAIL) AND I UPFROM 0
        WHEN (NULL (CDR TAIL))
          RETURN (IF COPYP (SETQ AND (COPYLIST AND) TAIL (NTHCDR I AND)))
                 (RPLACD TAIL (CONS FACTOR (CDR TAIL)))
        WHEN (EQUAL (CADR TAIL) FACTOR)
          RETURN NIL
        WHEN (OPPOSITES? (CADR TAIL) FACTOR)
          RETURN (SETQ AND NIL)
        WHEN (CANONICAL-LESSP FACTOR (CADR TAIL))
          RETURN (IF COPYP (SETQ AND (COPYLIST AND) TAIL (NTHCDR I AND)))
                 (RPLACD TAIL (CONS FACTOR (CDR TAIL))))
  (COND ((NULL AND) NIL)
        ((NULL (CDR AND)) T)
        ((NULL (CDDR AND)) (CADR AND))
        (T AND)))
```

```
;;; -*- Mode:Lisp; Package:Micro; Base:8; Lowercase:t -*-
;;; (c) Copyright 1982, Symbolics, Inc.

; Simulator of L-machine microcode
; This file contains the framework needed to run everything else
; This part gets loaded before the architecture definitions, SIMX is loaded later

;Kludges

#M (declare (muzzled t))
#M (eval-when (load)
    (putprop 'loop-collect-init (get 'loop 'autoload) 'autoload))

;Memories

(defconst *main-memory-size* 40000)  ;16K should be enough for anyone!
(defvar *main-memory* (make-array *main-memory-size*))

(defconst *a-memory-size* 10000)        ;Possibly only half of this will exist
(defvar *a-memory* (make-array *a-memory-size*))

(defvar *b-memory* (make-array 400))

(defconst *page-size* 400)
(defconst *quantum-size* *page-size*)  ;small for now.  And no virtual mapping.
(defvar *address-space-map* (make-array 2000))  ;by 5

(defconst *a-memory-virtual-address* (lsh 1 16.))  ;arbitrarily chosen

(defvar *opcode-table* (make-array 2000))

;Registers

(defvar *vma*)             ;Virtual memory address
(defvar *pma*)             ;Physical memory address
(defvar *mem*)             ;Data to and from memory
(defvar *pc*)              ;Macroprogram next-instruction pointer (in halfwords)
(defvar *instruction*)     ;Current instruction

;Base registers
;These contain 28-bit addresses that also point at the internal memory
(defvar *frame-pointer*)
(defvar *stack-pointer*)           ;can count up and down

(defconst *base-register-list* '(*frame-pointer* *stack-pointer*))

;These registers control address mapping when internal memory
;is addressed via *frame-pointer* or *stack-pointer*
(defvar *stack-buffer-address* 0)       ;Must be multiple of 400
(defvar *stack-buffer-mask* 1777)       ;Low 8 bits must be 1's

;Because I can't read long strings of 7s
;This has to use subl and expt so I can get a 36-bit mask in Maclisp
;Note that the argument must be a number

(eval-when (compile load eval)
(defun (mask macro) (x)           ;
  (let #Q ((default-cons-area working-storage-area))
  (subl (expt 2 (cadr x))))))
;Basic Word Formats

(comment ;comes from SYSDEF now
(eval-when (compile eval load)
(defconst *data-types* '(                                    ;somewhat preliminary!
        ;Low 16 types
        dtp-null dtp-nil dtp-symbol dtp-extended-number
        dtp-external-value-cell-pointer dtp-locative
          dtp-list dtp-compiled-function
        dtp-array dtp-closure dtp-entity dtp-lexical-closure
        dtp-select-method dtp-instance dtp-header-p dtp-header-i
        ;Fixnum uses up 16 types
        dtp-fix dtp-fix dtp-fix dtp-fix dtp-fix dtp-fix dtp-fix dtp-fix
        dtp-fix dtp-fix dtp-fix dtp-fix dtp-fix dtp-fix dtp-fix dtp-fix
        ;Flonum uses up 16 types
        dtp-float dtp-float dtp-float dtp-float dtp-float dtp-float dtp-float
        dtp-float dtp-float dtp-float dtp-float dtp-float dtp-float dtp-float
        dtp-float dtp-float
        ;High 16 types  (note: dtp-even-pc, dtp-odd-pc must be 0 and 10
        ;                 in this group of 16)
```

```
        dtp-even-pc dtp-gc-forward dtp-one-q-forward dtp-header-forward
        dtp-body-forward dtp-65 dtp-66 dtp-67
        dtp-odd-pc dtp-71 dtp-72 dtp-73
        dtp-74 dtp-75 dtp-76 dtp-77))

(defconst *cdr-codes* '(cdr-next cdr-nil cdr-normal cdr-spare))
);eval-when
);comment
(declare (special *data-types* *cdr-codes*))     ;in SYSDEF

(defmacro pointer-field (q) '(logand (mask 28.) ,q))
(defmacro fixnum-field (q) '(logand (mask 32.) ,q))
(defmacro high-type-field (q) '(ldb 4002 ,q))
(defmacro type-field (q) '(ldb 3406 ,q))
(defmacro cdr-field (q) '(ldb 4202 ,q))

(defmacro set-cdr (value cdr)
  (let ((cdr-code
          (if (numberp cdr) cdr (find-position-in-list cdr *cdr-codes*))))
    (or cdr-code (ferror nil "~S undefined cdr code" cdr))
    '(dpb ,cdr-code 4202 ,value)))

(defmacro set-type (ptr dtp)
  (let ((dtp-code (find-position-in-list dtp *data-types*)))
    (or dtp-code (ferror nil "~S undefined data type" dtp))
    (if (memq dtp '(dtp-fix dtp-float))
        '(dpb ,(lsh dtp-code -4) 4002 (logand (mask 32.) ,ptr))
        '(dpb ,dtp-code 3406 (logand (mask 28.) ,ptr)))))

;Number fields  (fixnum only for now)

(defun unbox-fixnum (q)
  (- (logxor (fixnum-field q) 1_31.) 1_31.))
;;; -*- Mode:Lisp; Package:Micro; Base:8; Lowercase:t -*-
;;; (c) Copyright 1982, Symbolics, Inc.

; Simulator of L-machine microcode
; This file gets loaded after the architecture definitions

#M
(declare (load 'sim))

#M
(declare (*lexpr address-add)
         (fixnum (even-instruction fixnum) (odd-instruction fixnum)
                 (instruction-opcode) (instruction-unsigned-immediate)
                 (instruction-signed-immediate) (pc-add fixnum fixnum)
                 (instruction-baseno) (instruction-offset)
                 (stack-address fixnum) (address-add notype fixnum)))

;Accessor macros for named memory slots

(defmacro top-of-stack () '(aref *b-memory* 360))
(defmacro stack-limit () '(aref *b-memory* 344))

(comment
(defmacro temp-1 () '(aref *b-memory* 361))
(defmacro temp-2 () '(aref *b-memory* 362))
(defmacro temp-3 () '(aref *b-memory* 363))
(defmacro temp-4 () '(aref *b-memory* 364))
(defmacro temp-5 () '(aref *b-memory* 365))
(defmacro trans-temp () '(aref *b-memory* 366))
);comment

(defmacro stack-low () '(aref *a-memory* 2403))
(defmacro a-stack-overflow () '(aref *a-memory* 2404))

;Accessor macros for fields of the VMA

(defmacro vma-quantum () '(// (pointer-field *vma*) *quantum-size*))
(defmacro vma-page () '(// (pointer-field *vma*) *page-size*))
(defmacro vma-within-page () '(logand *vma* ,(1- *page-size*)))

;Accessors for instructions as fetched from memory

(defun even-instruction (mem) (dpb (ldb 4201 mem) 2001 (ldb 0020 mem)))
(defun odd-instruction (mem) (dpb (ldb 4301 mem) 2001 (ldb 2020 mem)))

;Accessors for fields of the instruction

(defun instruction-opcode () (ldb 1011 *instruction*))
(defun instruction-no-operand-opcode () (+ (ldb 0011 *instruction*) 1000))
(defun instruction-unsigned-immediate ()
  (ldb 0010 *instruction*))
(defun instruction-signed-immediate ()
  (- (logxor 200 (instruction-unsigned-immediate)) 200))
(defun instruction-baseno () (ldb 0701 *instruction*))
```

```
(defun instruction-offset () (ldb 0007 *instruction*))


;Address arithmetic for internal memory

(defun address-add (baseno offset &optional (macrocode nil))
  (let ((base-reg (if (numberp baseno) (nth baseno *base-register-list*)
                      baseno)))
    (and macrocode (eq base-reg '*stack-pointer*)
         (setq offset (1+ (logior offset 7600))))
    (let ((addr (logand (+ (symeval base-reg) offset)
                        (1- *a-memory-size*))))
      (stack-address addr))))

(defun stack-address (addr)
  (+ (logand addr *stack-buffer-mask*) *stack-buffer-address*))

(defmacro local-operand ()
  '(aref *a-memory*
         (address-add (instruction-baseno) (instruction-offset) t)))


;Accessor macros for the current frame

;The currently executing function
(defmacro frame-function ()
  '(aref *a-memory* (address-add '*frame-pointer* -1)))

;A fixnum full of various fields
(defmacro frame-misc-data ()
  '(aref *a-memory* (address-add '*frame-pointer* -2)))

;Caller's return PC
(defmacro frame-return-pc ()
  '(aref *a-memory* (address-add '*frame-pointer* -3)))

;Top of previous frame = value to restore to (stack-pointer)
;The cdr code of this word is the value disposition
(defmacro frame-previous-top ()
  '(aref *a-memory* (address-add '*frame-pointer* -4)))

;Base of previous frame = value to restore  to (arg-pointer)
(defmacro frame-previous-frame ()
  '(aref *a-memory* (address-add '*frame-pointer* -5)))


;Fields in frame-misc-data

(defmacro frame-number-of-args ()
  '(ldb 0006 (frame-misc-data)))

(defmacro frame-cleanup-bits ()
  '(ldb 0605 (frame-misc-data)))

(defmacro frame-buffer-underflow-bit ()
  '(ldb 0601 (frame-misc-data)))


;PC manipulation

(defun pc-add (pc offset)
  (let ((word (+ (pointer-field pc) (ash offset -1)))
        (halfword (logxor (ldb 3701 pc) offset (if (minusp offset) 1 0))))
    (if (oddp halfword)
        (set-type word dtp-odd-pc)
        (set-type word dtp-even-pc))))

(defun pc-plus-number (pc offset)
  (let ((word (pointer-field pc))
        (halfword (+ (ldb 3701 pc) offset)))
    (setq word (+ word (if (minusp halfword) (1- (// halfword 2))
                           (// halfword 2))))
    (if (oddp halfword)
        (set-type word dtp-odd-pc)
        (set-type word dtp-even-pc))))

(defun pc-oddp (pc)
  (not (zerop (ldb 3701 pc))))
;Comparisons
; these are all assumed to exist in the real machine

(defun equal-pointer (x y)                              ;28-bit
  (= (pointer-field x) (pointer-field y)))

(defun equal-fixnum (x y)                               ;32-bit
  (= (fixnum-field x) (fixnum-field y)))

(defun equal-typed-pointer (x y)                        ;34-bit
  (= (logand (mask 34.) x) (logand (mask 34.) y)))
```

```
(defun equal-word (x y)                                    ;36-bit
  (= x y))

(defun greater-pointer (x y)                               ;28-bit
  (> (pointer-field x) (pointer-field y)))

(defun lesser-pointer (x y)                                ;28-bit
  (< (pointer-field x) (pointer-field y)))

(defun greater-fixnum (x y)                                ;32-bit
  (> (unbox-fixnum x) (unbox-fixnum y)))

(defun lesser-fixnum (x y)                                 ;32-bit
  (< (unbox-fixnum x) (unbox-fixnum y)))

(defun lesser-fixnum-unsigned (x y)                        ;32-bit unsigned
  (< (fixnum-field x) (fixnum-field y)))

(defmacro data-type? (word &rest types)
  (consify 'or (loop for type in types
                     collect (selectq type
                               (dtp-fix '(= (high-type-field ,word) 1))
                               (dtp-float '(= (high-type-field ,word) 2))
                               (otherwise '(= (type-field ,word)
                                              ,(find-position-in-list type
                                                    *data-types*)))))))

(defmacro cdr-code? (word &rest cdrs)
  (consify 'or (loop for cdr in cdrs
                     collect '(= (cdr-field ,word)
                                 ,(cond ((numberp cdr) cdr)
                                        ((find-position-in-list cdr *cdr-codes*))
                                        (t (ferror nil "~S illegal cdr code" cdr)))))))

;NIL and T constants
(defvar *nil* (set-type 0 dtp-nil))
(defvar *t* (set-type 525252 dtp-symbol))

(eval-when (compile load eval)
(defun consify (head list)
  (cond ((null list) (ferror nil "something is missing"))
        ((null (cdr list)) (car list))
        (t (cons head list))))
);eval-when

;In real machine this comes out of the ALU.  This routine is a crock.
;Return T if bits 31 and 32 of the alu output differ.
(defun overflow-p (alu-output)
  (not (zerop (logand (ash alu-output -31.) (ash alu-output -32.) 1))))

(comment ;not used any more
;Stands for AND of deciding to trap and the arithmetic trap-address PLA
(defun encode-arithmetic-trap-condition
           (abus-type-mismatch bbus-type-mismatch overflow abus bbus)
  (and (or abus-type-mismatch bbus-type-mismatch overflow)
       (cond ((data-type? abus dtp-fix)
              (cond ((data-type? bbus dtp-fix) 'fixnum-fixnum)
                    ((data-type? bbus dtp-float) 'fixnum-flonum)
                    ((data-type? bbus dtp-extended-number) 'fixnum-extnum)
                    (t 'error)))
             ((data-type? abus dtp-float)
              (cond ((data-type? bbus dtp-fix) 'flonum-fixnum)
                    ((data-type? bbus dtp-float) 'flonum-flonum)
                    ((data-type? bbus dtp-extended-number) 'extnum-extnum)
                    (t 'error)))
             ((data-type? abus dtp-extended-number)
              (cond ((data-type? bbus dtp-fix) 'extnum-fixnum)
                    ((data-type? bbus dtp-float) 'extnum-extnum)
                    ((data-type? bbus dtp-extended-number) 'extnum-extnum)
                    (t 'error)))
             (t 'error))))
);comment

;Internal memory (A memory) address conversions

;The A memory can be addressed either directly or by a
;base register plus an offset.  The two base registers are the
;frame pointer and the stack pointer; the latter is an up/down
;counter.  These two base registers are 28-bit registers that
;read and write from the main data path.  The offset that can
;be added can be the low 8 bits of a macro-instruction with
;sign-extension controlled jointly by the microcode and the 8th bit,
;or a microcode constant.
;When the stack pointer is used as a base, the high bits of the
;offset and the carry-in are set to 1 to cause, in effect,
;a subtraction (this only happens when the offset comes from
;a macroinstruction).
;The mapping from the result of the addition of base and offset
;to an internal memory address is as follows:  the low 8 bits
;go straight through.  The high 2 bits come from a special register.
;The middle 2 bits are selectable between the output of the
```

```
;adder and the special register.  The special register and mode
;control are changed when switching between the main and auxiliary
;stack buffers.

;For function calling to work efficiently with this, the main
;data path has to be able to add or subtract a small microcode
;constant from either of the base registers, plug in a data type,
;and put the result on the output bus whence it can be written
;into internal memory or into a base register.  The address adder
;cannot be used for this since it has to be a 28-bit add.  The
;necessary microcode constants are stored in B memory.
```

```
;This function sets up a stack at virtual addresses 32000-37777, puts the
;first 1K of it into the stack buffer in the first 1K of A memory, and sets
;up the frame pointers to give a frame for the specified function and
;arguments.  Also sets the PC to the function's starting address.  This only
;works for functions that use the fast-arg sequence.
(defun initialize-sg (function &rest args)
  ;;Map locations 32000-33777 into A memory 0-1777
  ;--- no map yet ---
  ;;Set pointers to initial frame
  (setq *frame-pointer* 32005)
  ;;Build the frame header
  (setf (frame-misc-data) (set-type (length args) dtp-fix))
  (setf (frame-buffer-underflow-bit) 1)
  (setf (frame-function) function)
        ;Note that the return PC is given valid data type so that a data
        ;type check does not go off prematurely before the frame cleanup
        ;check when returning out the top of a stack group.
  (setf (frame-return-pc) (set-type 0 dtp-even-pc))       ;no caller
  (setf (frame-previous-top)
        (set-cdr (set-type 31777 dtp-locative) 1))        ;empty pdl, for Value
  (setf (frame-previous-frame) *nil*)                     ;no caller
              ;Depends on pointer-field of frame-previous-frame being zero!
  ;;Store the arguments
  (setq *stack-pointer* 32004)
  (locp for arg in args do (pushval arg))
  ;;Set up the stack-buffer limit allowing for 100 words of overhead
  ;;i.e. space for frame header of overflowing frame, for executing
  ;;trap routines, etc.  100 is hopefully much too high.
  (setf (stack-limit) (set-type (- 33777 100) dtp-locative))
  (setf (stack-low) (set-type 32000 dtp-locative))
  (setf (a-stack-overflow) (set-type (- 37777 100) dtp-locative))
  ;;Set the PC
  (setq *pc* (set-type function dtp-odd-pc)))

(declare (*lexpr micro-main-loop))
(defun run-sg (function &rest args)
  (lexpr-funcall #'initialize-sg function args)
  (micro-main-loop))
;Debug I/O routines

;Print a word
(defun pq (q)
  (princ (nth (cdr-field q) *cdr-codes*))
  (tyo #\sp)
  (let ((type (nth (type-field q) *data-types*))
        (base 8))
    (princ type)
    (tyo #\sp)
    (selectq type
      (dtp-fix (prin1 (unbox-fixnum q)))
      (dtp-float (prin1 (fixnum-field q)))   ;--- temporary
      (otherwise (prin1 (pointer-field q)))))
  (princ '|   |)                    ;For people who mapcar this
  #Q (values))

;Print the pdl
(defun pp ()
  (loop for i from *frame-pointer* to *stack-pointer*
        as ii = (stack-address i)
        do (format t "~&~O: ~O   " ii (aref *a-memory* ii))
           (pq (aref *a-memory* ii)))
  (cond ((not (= (top-of-stack)
```

```
              (aref *a-memory* (stack-address *stack-pointer*))))
        (format t "~&TOS-register: ~O   " (top-of-stack))
        (pq (top-of-stack))))
  #Q (values))

;Print the current frame (or any frame)
(defun pf (&optional (ap *frame-pointer*))
 (loop for i from (- ap 5) below ap
       for label in '(previous-frame previous-top return-pc misc-data function)
       as ii = (stack-address i)
       do (format t "~&~O(~A):~22T~O   " ii label (aref *a-memory* ii))
          (pq (aref *a-memory* ii)))
  #Q (values))

;Print contents of one or more memory locations
(defun pm (from &optional (to from))
  (loop for addr from (pointer-field from) to (pointer-field to)
        as data = (raw-mem-read addr)
        do (format t "~&~O// ~O   " addr data)
           (pq data))
  #Q (values))

;Print contents of one or more internal memory locations
(defun pim (from &optional (to from))
  (loop for addr from from to to
        as data = (aref *a-memory* addr)
        do (format t "~&~O// ~O   " addr data)
           (pq data))
  #Q (values))

;Memory referencing without transport


;This does just enough page mapping to make things work.
;Virtual addresses from stack-low through stack-pointer are mapped
;into the low 1K of internal memory.
(defun set-pma-from-vma ()
  (setq *pma* (if (and (<= (pointer-field (stack-low)) *vma*)
                       (<= *vma* (pointer-field *stack-pointer*)))
                  (+ *a-memory-virtual-address* (logand 1777 *vma*))
                  *vma*)))

(defun raw-mem-read (address)
  (setq *vma* address)
  (setq *pma* (pointer-field *vma*))
  (pma-mem-read))

(defun pma-mem-read ()
  (cond ((>= *pma* *a-memory-virtual-address*)
         (let ((tem (- *pma* *a-memory-virtual-address*)))
           (or (< tem 10000) (ferror nil "reading garbage address ~S" *pma*))
           (setq *mem* (aref *a-memory* tem))))
        ((>= *pma* *main-memory-size*)
         (ferror nil "reading garbage address ~S" *pma*))
        (t (setq *mem* (aref *main-memory* *pma*)))))

(defun raw-mem-write (address data)
  (setq *vma* address *mem* data)
  (setq *pma* (pointer-field *vma*))
  (pma-mem-write data))

(defun pma-mem-write (data)
  (cond ((>= *pma* *a-memory-virtual-address*)
         (let ((tem (- *pma* *a-memory-virtual-address*)))
           (or (< tem 10000) (ferror nil "writing garbage address ~S" *pma*))
           (aset data *a-memory* tem)))
        ((>= *pma* *main-memory-size*)
         (ferror nil "writing garbage address ~S" *pma*))
        (t (aset data *main-memory* *pma*))))




(defun simulate-transporter (transport-type)
  (loop doing (pma-mem-read)
        until (selectq (nth (type-field *mem*) *data-types*)
                ((dtp-nil dtp-symbol dtp-extended-number dtp-locative dtp-list
                  dtp-compiled-function dtp-array
                  dtp-closure dtp-entity dtp-lexical-closure
                  dtp-instance dtp-fix dtp-float dtp-even-pc dtp-odd-pc)
                 t)                           ;Good types
                ((dtp-null)
                 (or (memq transport-type '(write bind))
                     (ferror nil "unbound variable//definition")))
```

```
		((dtp-header-p dtp-header-i)
		 (or (eq transport-type 'header)
		     (ferror nil "bad data type encountered")))
		((dtp-external-value-cell-pointer)
		 (memq transport-type '(bind no-evcp)))
		((dtp-one-q-forward dtp-header-forward)
		 (setq *vma* *mem*)
		 nil)
		((dtp-body-forward)
		 (setf (trans-temp) *vma*)
		 (raw-mem-read *mem*)
		 (or (data-type? *mem* dtp-header-forward)
		     (ferror nil "body forward doesn't point to header fwd"))
		 (setq *vma* (dpb (+ (pointer-field *mem*)
				     (- (pointer-field (trans-temp))
					(pointer-field *vma*)))
				  0034 (trans-temp)))
		 nil)
		(otherwise (ferror nil "bad data type encountered")))
	do (setq *pma* (setq *vma* (pointer-field *vma*)))))

(defun mem-read (address &optional (transport-type 'data))
  (transport-address address transport-type)
  *mem*)

(defun mem-write (address data &optional (transport-type 'data))
  (transport-address address transport-type)
  (raw-mem-write *vma* data))   ;Actually, doesn't repeat mapping phase
);end comment
(defun initialize-main-memory (&optional (n-words *main-memory-size*))
  (dotimes (i n-words)
    (aset (set-type i dtp-null) *main-memory* i)))
;Instruction emulation

(comment
(defvar *next-free-opcode* 0)

(defmacro definstruction (name format &body emulator)
  `(progn 'compile
     (add-instruction ',name ',format)
     (defun (,name executor) ()
       . ,emulator)))

(defun add-instruction (name format)
  (let ((opcode
	  (or (car (get name 'instruction-data))
	      (if (eq format '10-bit-immediate)
		  ;Have to assign group of 4 opcodes
		  ;For simulator these actually have to be aligned
		  (let ((opcode (logand (+ *next-free-opcode* 3) -4)))
		    (if (> (setq *next-free-opcode* (+ opcode 4))
			   1000)
			(error "out of opcodes" name 'fail-act))
		    opcode)
		  (prog1 *next-free-opcode*
			 (if (> (setq *next-free-opcode*
				      (1+ *next-free-opcode*))
				1000)
			     (error "out of opcodes" name 'fail-act)))))))
    (putprop name (list opcode format) 'instruction-data)
    (if (eq format '10-bit-immediate)
	(loop for i from 1 to 3
	      do (aset name *opcode-table* (+ opcode i))))
    (aset name *opcode-table* opcode)))
);comment

(defvar *single-step* nil)

(comment
;Run using emulator written with definstruction
(defun main-loop (&optional (starting-pc *pc*))
  (setq *pc* (if (< starting-pc (mask 28.))
		 (set-type starting-pc dtp-even-pc)	;number = word address
		 starting-pc))
  (*catch 'halt
    (do ((opcode)) (nil)
      ;;Instruction fetch
      (raw-mem-read *pc*)
      (setq *instruction* (if (pc-oddp *pc*) (odd-instruction *mem*)
			      (even-instruction *mem*)))
      ;;Instruction decode
      (setq opcode (aref *opcode-table* (instruction-opcode)))
      ;;Possible debug break
      (cond ((or *single-step* (null opcode))
	     (lm-disassemble *pc* 1)
	     (break single-step t)))
      ;;Increment PC and execute instruction
      (setq *pc* (pc-plus-number *pc* 1))
      (*catch 'pclsr
	     (funcall (get opcode 'executor))))))
```

```
);comment

;Run using actual microcode emulator
(defun micro-main-loop (&optional (starting-pc *pc*))
  (setq *pc* (if (< starting-pc (mask 28.))
                 (set-type starting-pc dtp-even-pc)     ;number = word address
                 starting-pc))
  (*catch 'halt
    (do ((opcode)(executor)) (nil)
      ;;Instruction fetch
      (raw-mem-read *pc*)
      (setq *instruction* (if (pc-oddp *pc*) (odd-instruction *mem*)
                              (even-instruction *mem*)))
      ;;Instruction decode
      (setq opcode (instruction-opcode))
      (if (> opcode 375) (setq opcode (instruction-no-operand-opcode)))
      (setq opcode (aref *opcode-table* opcode))
      ;;Possible debug break
      (cond ((or *single-step* (null opcode))
             (lm-disassemble *pc* 1)
             (break single-step)))
      (cond ((null (setq executor (get opcode 'micro-executor)))
             (lm-disassemble *pc* 1)
             (terpri)
             (princ "No micro-executor found.  $p to use SIM executor.")
             (break missing-executor)
             (setq executor (get opcode 'executor))))
      ;;Increment PC and execute instruction
      (setq *pc* (pc-plus-number *pc* 1))
      (aset *pc* *a-memory* 2500)                  ;Kludge for temporary memory control
      (*catch 'pclsr (funcall executor))
      (setq *pc* (aref *a-memory* 2500)))))      ;..
;Excessively simple assembler

(defmacro defmacrocode (pcvar starting-word &body code)
  `(progn (setq ,pcvar (set-type ,starting-word dtp-even-pc))
          . ,(loop for addr upfrom (* 2 starting-word)
                   for inst in code
                   collect `(lm-assemble ,addr ',inst))))

(defmacro defunction (fcnvar starting-word (min-nargs max-nargs rest-arg)
                     constant-list
                     &body code)
  (or max-nargs (setq max-nargs min-nargs))  ;defaults to no optionals
  ;--- What to do about this?  No encoding in entry instruction for
  ;--- a function with no constants!
  (or constant-list (setq constant-list (list *nil*)))
  `(progn 'compile
      ;The pointer to the object points at the entry instruction
     (setq ,fcnvar (set-type ,(+ starting-word (length constant-list) 2)
                             dtp-compiled-function))
      ;dtp-header-i, type=compiled-code, lengths of both parts, interp info
     (aset (set-cdr (set-type
                      ,(+ (1- (length constant-list))    ;Length-3 of Q part
                          (ash (// (+ (length code) 2) 2);Length of non-Q part
                               8))
                      dtp-header-i)
                    8)
           *main-memory* ,starting-word)
      ;list of function name and debug info
     (aset *nil* *main-memory* ,(+ starting-word 1))
      ;constants/value-function cell references in reverse order
      ;--- For now, we assume cell references are just numbers! ---
    ,@(loop for addr downfrom (+ starting-word 1 (length constant-list))
            for const in constant-list
            do (if (zerop (type-field const))
                   (setq const (set-type const dtp-locative)))
            collect `(aset ,const *main-memory* ,addr))
      ;entry instruction
     (aset ,(make-entry-instruction min-nargs max-nargs rest-arg
                                    (1- (length constant-list)))
          *main-memory* ,(+ starting-word 2 (length constant-list)))
      ;The code
    . ,(loop for addr upfrom (1+ (* 2 (+ starting-word 2
                                        (length constant-list))))
             for inst in code
             collect `(lm-assemble ,addr ',inst))))

(defun make-entry-instruction (min-nargs max-nargs rest-arg header-offset)
  (if (> min-nargs max-nargs)
      (ferror nil "min-nargs ~D > max-nargs ~D ?" min-nargs max-nargs))
  (+ header-offset
     (lsh (if (or rest-arg (> max-nargs 4)) 0
              (- (nth max-nargs '(1 3 6 10. 15.))
                 (- max-nargs min-nargs)))
          8)))

;Not called assemble because ncomplr has a global symbol by that name
(defun lm-assemble (halfword-addr code)
  (let ((op (car code)) (arg (cadr code)))
```

```
    (let ((opcode (car (get op 'instruction-data)))
          (format (cadr (get op 'instruction-data)))
          (inst))
      (and opcode (setq inst
                        (if (< opcode 1000) (lsh opcode 8) (+ 377_9 (- opcode 1000)))))
      (selectq format
        (no-operand)
        ((unsigned-immediate-operand signed-immediate-operand constant-operand
          indirect-operand)
         (setq inst (dpb arg 0010 inst)))
        ((signed-pc-relative unsigned-pc-relative)
         (setq inst (dpb (convert-branch-length halfword-addr arg) 0010 inst)))
        (10-bit-immediate-operand
         (setq inst (dpb arg 0010 (+ inst (logand 3_8 arg)))))
        (address-operand
         (setq inst (+ inst
                       (lsh (or (find-position-in-list (cadr code)
                                                       '(arg stack))
                                (ferror nil "~S illegal base pntr" code))
                            7)
                       (logand (if (eq (cadr code) 'stack)
                                   (+ (caddr code) 177)
                                   (caddr code))
                               177))))
        (nil (ferror nil "~S undefined instruction" op))
        (otherwise (ferror nil "~S instruction in bad format ~S" op format)))
      (aset (dpb 1 4002  ;fixnum data type
                 (dpb (ldb 2001 inst) (if (oddp halfword-addr) 4301 4201)
                      (dpb inst (if (oddp halfword-addr) 2020 0020)
                           (aref *main-memory* (// halfword-addr 2)))))
            *main-memory* (// halfword-addr 2))))

;;; Convert branch length to hardware format.
;;; The hardware takes the branch offset, rotates it right one bit, and
;;; adds it to the PC.  Thus there is a carry from the word offset into
;;; the halfword offset, rather than the reverse as you might expect.
;;; This function really is a case where you want to divide by 2 with ASH, not with // !!
(defun convert-branch-length (address length)
  (let* ((word-offset (+ (ash length -1) (if (and (oddp length) (evenp address)) 1 0)))
         (halfword-offset (logxor (logand 1 length) (if (minusp word-offset) 1 0))))
    (+ (ash word-offset 1) halfword-offset)))

(defun lm-disassemble (pc n-insts)
  (loop repeat n-insts
        as inst = (if (pc-oddp pc)
                      (odd-instruction (aref *main-memory* (pointer-field pc)))
                      (even-instruction
                        (aref *main-memory* (pointer-field pc))))
        as op = (aref *opcode-table* (if (= (ldb 1110 inst) 377)
                                         (+ (ldb 0011 inst) 1000)
                                         (ldb 1011 inst)))
        as fmt = (second (get op 'instruction-data))
        as imm = (logand (mask 8) inst)
        do (format t "~&~O(~O) ~O ~A "
                   (pointer-field pc) (if (pc-oddp pc) 1 0)
                   inst op)
           (selectq fmt
             ((unsigned-immediate-operand unsigned-pc-relative) (prin1 imm))
             ((signed-immediate-operand signed-pc-relative)
              (prin1 (- (logxor 200 imm) 200)))
             (10-bit-immediate-operand (prin1 (logand (mask 10.) inst)))
             (address-operand (prin1 (nth (lsh imm -7) '(arg stack)))
                              (tyo #/|)
                              (prin1 (if (< imm 200) imm
                                         (- (logand 177 imm) 177))))
             ((constant-operand constant-pc-relative indirect-operand)
              (format t "~A ~O" fmt imm)))
           (setq pc (pc-plus-number pc 1))))

         (defun inc-pc ()
           (setq *pc* (if (data-type? *pc* dtp-even-pc)
                          (set-type *pc* dtp-odd-pc)
                          (set-type (1+ *pc*) dtp-even-pc))))
;Support routines for instructions
;These would be open-coded                        and        go in one cycle

(defun pushval (val)
  (setq val (set-cdr val cdr-next))
  (aset val *a-memory* (address-add '*stack-pointer* 1))
  (setf (top-of-stack) val)
  (incf *stack-pointer*))

(comment

(defun popval ()
  (prog1 (top-of-stack)
         (setf (top-of-stack) (aref *a-memory*
                                    (address-add '*stack-pointer* -1)))
         (decf *stack-pointer*)))

(defun newtop (val)
```

```
  (setq val (set-cdr val cdr-next))
  (aset val *a-memory* (address-add '*stack-pointer* 0))
  (setf (top-of-stack) val))

(defun next-on-stack ()
  (aref *a-memory* (address-add '*stack-pointer* -1)))

;This is like doing two popval's and then a pushval
(defun pop2push (val)
  (setq val (set-cdr val cdr-next))
  (aset val *a-memory* (address-add '*stack-pointer* -1))
  (setf (top-of-stack) val)
  (decf *stack-pointer*))

(defun pushval-with-cdr (val)
  (aset val *a-memory* (address-add '*stack-pointer* 1))
  (setf (top-of-stack) val)
  (incf *stack-pointer*))


;Helper functions for arithmetic

;These do arithmetic but trap to overflow-bignum-create if the
;result doesn't fit in a fixnum.
;In the simulator this thinks a lot, in the real machine it
;needs to be built in (conditional branch on ALU 32-bit overflow flag).
(defun plus-check-overflow (op1 op2 stack-adjustment)
  (let ((res (+ op1 op2)))
    (or (and (<= -1_31. res) (< res 1_31.))
        (overflow-bignum-create res stack-adjustment))
    res))

(defun minus-check-overflow (op1 op2 stack-adjustment)
  (let ((res (- op1 op2)))
    (or (and (<= -1_31. res) (< res 1_31.))
        (overflow-bignum-create res stack-adjustment))
    res))
;Some simple instructions

(definstruction halt no-operand (*throw 'halt 'halt))

(definstruction push-immed signed-immediate-operand
  (pushval (set-type (instruction-signed-immediate) dtp-fix)))

(definstruction push-local address-operand
  (pushval (local-operand)))

(definstruction pop-local address-operand
  (setf (local-operand) (popval)))

(definstruction movem-local address-operand
  (setf (local-operand) (top-of-stack)))

(definstruction add-immed signed-immediate-operand
  (or (data-type? (top-of-stack) dtp-fix)
      (take-arithmetic-trap 'add 'signed-immed))
  (newtop (set-type (plus-check-overflow (unbox-fixnum (top-of-stack))
                                         (instruction-signed-immediate)
                                         0)
                    dtp-fix)))

(definstruction add-local address-operand
  (or (and (data-type? (top-of-stack) dtp-fix)
           (data-type? (local-operand) dtp-fix))
      (take-arithmetic-trap 'add 'local))
  (newtop (set-type (plus-check-overflow (unbox-fixnum (top-of-stack))
                                         (unbox-fixnum (local-operand))
                                         0)
                    dtp-fix)))

        ;This will be format-3 when I bother simulating those
(definstruction add-stack no-operand
  (or (and (data-type? (top-of-stack) dtp-fix)
           (data-type? (next-on-stack) dtp-fix))
      (take-arithmetic-trap 'add 'stack))
  (pop2push (set-type (plus-check-overflow (unbox-fixnum (top-of-stack))
                                           (unbox-fixnum (next-on-stack))
                                           -1)
                      dtp-fix)))

(definstruction push-constant constant-operand
  (pushval (mem-read (- (frame-function)
                        (instruction-unsigned-immediate)
                        1))))

(definstruction push-specvar indirect-operand
  (pushval (mem-read (mem-read (- (frame-function)
                                  (instruction-unsigned-immediate)
                                  1)
                               'no-evcp))))
```

```
                ;This is the format-3 version, others will exist, too.
(definstruction car-stack no-operand
  (or (data-type? (top-of-stack) dtp-list dtp-locative)
      (take-pre-trap *argtyp-trap-handler*))
  (newtop (mem-read (top-of-stack))))

(definstruction cdr-stack no-operand
  (or (data-type? (top-of-stack) dtp-list dtp-locative)
      (take-pre-trap *argtyp-trap-handler*))
  (mem-read (top-of-stack))
  (cond ((data-type? (top-of-stack) dtp-locative)       ;delayed test for speed
         (newtop *mem*))
        ((cdr-code? *mem* cdr-normal)
         (newtop (mem-read (1+ *vma*))))
        ((cdr-code? *mem* cdr-next)
         (newtop (1+ *vma*)))
        ((cdr-code? *mem* cdr-nil)
         (newtop *nil*))
        (t (ferror nil "Where did this bogus cdr code come from?"))))

(definstruction times-stack no-operand
  (or (and (data-type? (top-of-stack) dtp-fix)
           (data-type? (next-on-stack) dtp-fix))
      (take-arithmetic-trap 'add 'stack))
  ;;--- overflow checking
  (pop2push (set-type (times (unbox-fixnum (top-of-stack))
                             (unbox-fixnum (next-on-stack)))
                      dtp-fix)))

(definstruction branch-zerop signed-pc-relative
  (or (data-type? (top-of-stack) dtp-fix)
      (take-arithmetic-larg-trap 'zerop 'stack))  ;--- or something
  (if (zerop (fixnum-field (top-of-stack)))
      (setq *pc* (pc-add *pc* (instruction-signed-immediate))))
  (popval))
(definstruction branch-not-zerop signed-pc-relative
  (or (data-type? (top-of-stack) dtp-fix)
      (take-arithmetic-larg-trap 'zerop 'stack))  ;--- or something
  (if (not (zerop (fixnum-field (top-of-stack))))
      (setq *pc* (pc-add *pc* (instruction-signed-immediate))))
  (popval))

(definstruction return-stack no-operand ;pseudo format 3
  (common-return-processing (top-of-stack)))

(definstruction popj-no-value no-operand
  (or (data-type? (top-of-stack) dtp-even-pc dtp-odd-pc)
      (ferror nil "popj to non-PC"))
  (setq *pc* (popval)))

#.'   ;heh, heh
(progn 'compile
  .,(loop for nargs from 0 to 5 nconc
      (loop for value-disposition in '(effect value return multiple-value)
            collect
              '(definstruction ,(intern (format nil "CALL-~A-~D"
                                               value-disposition nargs))
                                indirect-operand
                (common-call-processing ',value-disposition ',nargs
                                        (get-elink-operand))))))

(defun get-elink-operand ()
  (mem-read (mem-read (- (frame-function)
                         (instruction-unsigned-immediate)
                         1)
                      'no-evcp)))

(declare (special *stack-buffer-overflow-handler*))

(defun common-call-processing (value-disposition nargs fcn)
  ;;Various pushes that are really overlapped with those two memory cycles
  (pushval (set-type *frame-pointer* dtp-locative))
  (pushval-with-cdr
     (dpb (find-position-in-list value-disposition
                                 '(effect value return multiple-value))
          4202                   ;cdr field
          (set-type (- *stack-pointer* (+ nargs 2)) dtp-locative)))
  (pushval *pc*)
  (pushval (set-type nargs dtp-fix))     ;initial frame-misc-data
  (pushval fcn)                          ;dtp-compiled-function
  (or (data-type? fcn dtp-compiled-function)
      (ferror nil "call of non-function"))
  (setq *pc* (set-type (pointer-field fcn) dtp-odd-pc))
  (setq *frame-pointer* (1+ *stack-pointer*))
  ;;Check for any post-function-entry traps that need to go off.
  ;;Note that this happens -before- copying up the arguments so as to
  ;;take the stack-buffer-overflow trap with a fixed amount of stuff pushed.
  ;;(stack-limit) has to allow for the additional pushage of up to 4 arguments.
  ;;When there are more than four to be pushed, additional explicit checking
  ;;will occur as needed later.
  (if (greater-pointer *stack-pointer* (stack-limit))
      (take-post-trap *stack-buffer-overflow-handler*))
  (resume-common-call-processing nargs))
```

```
;Comes back in here after taking a stack-buffer-overflow trap.
;Writing it this way doesn't really express the control structure
;in the real machine.  See the microcode in the 'stack' file.
(defun resume-common-call-processing (nargs)
  (mem-read *pc*)
  ;;Now the entry instruction is in *mem*.  Perform the fast entry cases.
  (let ((argdesc (nth (ldb 1204 *mem*)
                      '((0 . 777) (0 . 0) (0 . 1) (1 . 1)
                        (0 . 2) (1 . 2) (2 . 2) (0 . 3) (1 . 3) (2 . 3) (3 . 3)
                        (0 . 4) (1 . 4) (2 . 4) (3 . 4) (4 . 4)))))
    (if (or (< nargs (car argdesc)) (> nargs (cdr argdesc)))
        (ferror nil "wrong number of args"))
    ;;Advance the pc to skip over unneeded optional-argument initializations
    (and (not (zerop (ldb 1004 *mem*)))
         (> nargs (car argdesc))
         (setq *pc* (pc-plus-number *pc* (- nargs (car argdesc)))))
    ;;Now copy up the arguments
    (loop for argno from 0 below nargs
          do (pushval (aref *a-memory*
                            (address-add '*frame-pointer*
                                         (- argno (+ 5 nargs))))))))

(declare (special *return-continuation* *return-cleanup*))

(defun common-return-processing (value)
  (setf (temp-1) value)                    ;--- unsafe pointer check
  (cond ((not (zerop (frame-cleanup-bits)))
         (if (data-type? (frame-previous-frame) dtp-nil) ;Really in cleanup fcn
             (ferror nil "Return out top of SG?"))
         (pushval (temp-1))
         (pushval *return-continuation*)       ;PC to return to
         (take-jump-trap *return-cleanup*)))   ;Cleanup then retry
  (or (data-type? (frame-return-pc) dtp-even-pc dtp-odd-pc)
      (ferror nil "Return address not a PC"))
  (setq *pc* (frame-return-pc))
  (setq *stack-pointer* (pointer-field (frame-previous-top)))
  (let ((value-disposition (nth (cdr-field (frame-previous-top))
                                '(effect value return multiple-value))))
    (setq *frame-pointer* (pointer-field (frame-previous-frame)))
    (selectq value-disposition
      (effect (setf (top-of-stack) (aref *a-memory*
                                         (address-add '*stack-pointer* 0))))
      (value (pushval (temp-1)))
      (return (common-return-processing (temp-1)))
      (multiple-value (ferror nil "multiple-value ?")))))

;stacklow is the lowest virtual address that is or will be valid
;in the stack buffer.  Adjust the frame-buffer-underflow-bit of each
;frame in the stack buffer so that the lowest frame has a 1 and the
;rest have a 0.
(defun adjust-frame-buffer-underflow-bits (stacklow)
  (setq stacklow (+ stacklow 5))           ;Frame underhang
  (pushval *frame-pointer*)                ;Going to use this to address int mem
  (setf (temp-2) *frame-pointer*)
  (loop until (lesser-pointer *frame-pointer* stacklow)
        doing (setf (temp-2) *frame-pointer*)
              (setf (frame-buffer-underflow-bit) 0)
              (setq *frame-pointer* (pointer-field (frame-previous-frame)))
        finally (setq *frame-pointer* (temp-2))
                (setf (frame-buffer-underflow-bit) 1))
  (setq *frame-pointer* (pointer-field (popval))))

);comment

;Do this before loading any macrocode!
(initialize-main-memory)
;Trapping

(comment

;data-source can be unsigned-immed, signed-immed, local, stack, or mem
;In the stack case both operands are on the stack, otherwise the
;first operand is (top-of-stack) and the second is specified by data-source.
;I'm not sure how this routine is going to work yet.
(defun take-arithmetic-trap (operation data-source)
  (break arithmetic-trap t))    ;***

;Another trap routine
;res is 1 bit too big to fit in a fixnum
(defun overflow-bignum-create (res stack-adjustment)
  (setq *stack-pointer* (+ *stack-pointer* stack-adjustment))
  (pushval (set-type (abs res) dtp-fix))         ;Truncates to 32 bits
  (pushval (set-type (if (minusp res) 1 0) dtp-fix))
  (take-post-trap *overflow-bignum-create*))

(defun take-pre-trap (pc)
  (setq *pc* (pc-plus-number *pc* -1))           ;Back out of failed instruction
  (take-post-trap pc))

(defun take-post-trap (pc)
```

```
  (pushval *pc*)                                ;Save continuation address (on stack?)
  (take-jump-trap pc))

(defun take-jump-trap (pc)              ;When continuation not to be saved
  (or (numberp pc) (break take-post-trap t))    ;Probably unbound
  (setq *pc* pc)                                ;Jump to trap PC
  (*throw 'pclsr nil))                  ;Start first instruction in trap subr
;;; Macrocode trap routines start at location 30000

;This gets called when a function is being entered and there is not enough
;space left in the stack buffer.  The frame header has been pushed and the
;starting pc is on the stack, however the arguments have not yet been
;copied up into the frame.
;What we have to do is to check for genuine stack overflow,
;dump the lowest stack page out into main memory, adjust the stack limit
;up by one page, and restart the call at the argument-copying point.



(definstruction check-stack-overflow no-operand ;--- dummy ---
  (if (greater-pointer (stack-limit) (- 37777 101))
      (ferror nil "stack overflow")))

(definstruction setup-stack-dump no-operand


  (let ((stacklow (logand (- (stack-limit) 1400) (lognot (1- *page-size*)))))
    (adjust-frame-buffer-underflow-bits (+ stacklow *page-size*))
    (pushval (set-type *frame-pointer* dtp-locative))   ;Temporary needed
    (pushval (set-type (+ stacklow *page-size*) dtp-locative))
    (setq *frame-pointer* (pointer-field stacklow))
        ;--- Also unmap the page from the stack buffer ---
    ))

(definstruction increase-stack-limit no-operand
  (incf (stack-limit) *page-size*))
        ;--- Also remap the page into the stack buffer ---

;This is pclsrable because its state is contained in the top
;two words on the stack and in *frame-pointer*
;Only form of pclsr can be a page fault on the very first cycle
;and after that we need to worry about stack-gc traps.
(definstruction stack-dump no-operand
  (loop until (equal-pointer *frame-pointer* (top-of-stack))
        doing                   ;--- really eight words at a time
          (raw-mem-write *frame-pointer*
                         (aref *a-memory*
                               (address-add '*frame-pointer* 0)))
          (incf *frame-pointer*))
  ;;Now restore state and cleanup stack
  (popval)
  (setq *frame-pointer* (pointer-field (popval))))

(definstruction restart-trapped-call no-operand
  (setq *pc* (popval))
  (resume-common-call-processing (frame-number-of-args)))

(defmacrocode *stack-buffer-overflow-handler* 30000
  ;--- disable interrupts ---
  (check-stack-overflow)        ;--- this is a dummy ---
  (setup-stack-dump)
  (stack-dump)
  (increase-stack-limit)
  ;--- enable interrupts ---
  (restart-trapped-call))

(definstruction setup-stack-load no-operand
  (pushval (set-type *frame-pointer* dtp-locative))     ;Temporary needed
  ;; Compute the new lowest virtual address in the stack buffer.
  ;; What I am doing here is probably not reasonable.
  (let ((stacklow (logand (- (stack-limit) 2000) (lognot (1- *page-size*)))))
    (pushval (set-type (+ stacklow *page-size*) dtp-locative))
    (setq *frame-pointer* (pointer-field stacklow))))

(definstruction finish-stack-load no-operand
        ;--- Also map the page into the stack buffer ---
  (let ((stacklow (logand (- (stack-limit) 2000) (lognot (1- *page-size*)))))
    (decf (stack-limit) *page-size*)
    (adjust-frame-buffer-underflow-bits stacklow)))

;This is pclsrable because its state is contained in the top
;two words on the stack and in *frame-pointer*
;Note that this can pclsr due to transport
(definstruction stack-load no-operand
  (loop until (equal-pointer *frame-pointer* (top-of-stack))
        doing                   ;--- really eight words at a time
          (aset (mem-read *frame-pointer*)
                *a-memory*
                (address-add '*frame-pointer* 0))
          (incf *frame-pointer*))
```

```
;;Now restore state and cleanup stack
(popval)
(setq *frame-pointer* (pointer-field (popval))))

(defmacrocode *return-continuation* 30010
  (return-stack))

(defmacrocode *return-cleanup* 30020
  (setup-stack-load)
  (stack-load)
  (finish-stack-load)
  (popj-no-value))

);comment
;Test routine for instructions with args on the stack and
;possibly an immediate operand
(defun try-inst (inst &rest args)
  (let ((original-sp *stack-pointer*) opcode executor)
    (lm-assemble 0 (if (atom inst) (list inst) inst))
    (loop for arg in args do (pushval arg))
    (setq *instruction* (logand (mask 16.) (raw-mem-read 0)))
    (setq opcode (aref *opcode-table* (instruction-opcode)))
    (setq executor (get opcode 'micro-executor))
    (*catch 'pclsr (funcall executor))
    (let ((*frame-pointer* (1+ original-sp)))
      (pp))
    (setq *stack-pointer* original-sp)))
```

F:>lmach>ucode>ua.lisp.140

```
;;; -*- Mode:Lisp; Package:Micro; Base:8; Lowercase:yes -*-
;;; (c) Copyright 1982, Symbolics, Inc.

; Microcode definitions for the architecture


#M
(declare (cond ((not (status feature lmucode))
                (setq **compiling-ua** t)
                (load 'udcls))))


;Definitions of locations in hardware memories
;Must agree with SIM, which initializes them
(reserve-scratchpad-memory 2400 2410 340 345)

;A-memory constants set up from the Lisp memory during booting
; This is now done by >lmach>sysdf1
;(defareg quote-nil nil *nil*)          ;Initialize these in the simulator
;(defareg quote-t nil *t*)

(defbreg b-quote-nil nil *nil*)         ;Initialize these in the simulator
(defbreg b-quote-t nil *nil*)           ;In the real machine, boot microcode sets them

(defbreg-at-loc stack-limit 344)        ;Used by function-entry microcode


;--- The simulator knows the numeric addresses of these
;--- or, rather, it knows where they used to be!
;(defareg-at-loc stack-low 2403)  ;The lowest virtual address in the stack buffer
;(defareg-at-loc a-stack-overflow 2404) ;stack-limit cannot become > this
;(defareg-at-loc stack-buffer-limit 2405)      ;highest virtual address in stack buffer

(defareg-at-loc a-temp 2406)
(defareg-at-loc a-temp-2 2407)
;2410 and up special purpose temporaries local to particular routines

(defatomicro a-zero (a-constant 0))

;The top-of-stack buffer register on the B side
;Must be in location 360 for the simulator
(defbreg-at-loc top-of-stack 360)

;Temporary storage on the B side
(defbreg-at-loc b-temp 361)
(defbreg-at-loc b-temp-2 362)
(defbreg-at-loc b-temp-3 363)

;If this has type dtp-null, it is empty.  Otherwise it contains the value
;which should be restored on the top of the stack if we pclsr.
;Note that we rely on the ability to write this in parallel with frame-pointer
;(which doesn't care if we give it a data type of dtp-null; it's only 28 bits).
(defareg a-pclsr-top-of-stack (set-type 0 dtp-null))

;B-VMA is (sometimes) a copy of the VMA register.  The transporter does
;not depend on this, but if it changes VMA it also stores the new value
;here.  The data type is indeterminate.  B-VMA exists to make it possible
;to combine the VMA with data from the Abus.
(defbreg-at-loc b-vma 364)
(defbreg array-register-event-count (set-type 0 dtp-fix))
```

```
;;; Note that location 377 gets clobbered by the hardware

;;; Trap support for the real machine

;NOTE WELL: the NPC is not valid during the first microinstruction of a trap
;handler (actually, it always contains the address from which the trap came).
;Thus this first microinstruction must not use anything that compiles into
;an NPC-successor (for example, it must not call a subroutine).

;Micro for the first cycle of a trap handler.
;Finishes the state save by calling for a PUSHJ, which saves
;the original CPC (now in NPC) onto the stack.  The original NPC
;is already on the stack.
(defmicro trap-save ()
  '(microinstruction sequencer push-npc))

;Micro for the first cycle of a trap handler, where we aren't going
;to retry the trapped instruction.
(defmicro trap-no-save ()
  (if (eq *machine-version* 'proto)
      '(microinstruction sequencer pop)))

;Micro for the last two cycles of a trap handler.
;Takes arguments of what else to do in those cycles, that
;seeming clearer than throwing a parallel around the sequence.
;We restore the NPC and the CPC by twice popping the control
;stack into NPC.  In the second cycle we also use NPC as
;as the source for CPC.  Thus the push order is NPC, CPC and
;the pop order is CPC, NPC.
(defmicro trap-restore (cycle-1 cycle-2)
  '(sequential
     (parallel
       ,cycle-1
       (microinstruction sequencer pop-npc spec npc-magic magic 3 magic-mask 3))
     (parallel
       ,cycle-2
       (microinstruction sequencer pop-npc-and-cpc-from-npc
                         spec npc-magic magic 3 magic-mask 3))))

;The same thing broken down into its two component parts
;Note that trap-save will undo the effect of trap-restore-1, if done
;in the immediately-following cycle
(defmicro trap-restore-1 ()
  '(microinstruction sequencer pop-npc spec npc-magic magic 3 magic-mask 3))

(defmicro trap-restore-2 ()
  '(microinstruction sequencer pop-npc-and-cpc-from-npc
                     spec npc-magic magic 3 magic-mask 3))

;;; Macrocode-trap-taking micros

;Back out of a failed instruction, save pc on stack, and jump to specified pc
;Backing out includes clearing the micro stack
;If the second argument is restore-stack, the main stack-pointer is reset to
;its value at the beginning of the macroinstruction, and a-pclsr-top-of-stack
;is respected.
;If the second argument is preserve-stack, stack-pointer remains the same.
(defmicro take-pre-trap (escape-function-name preserve-or-restore-stack)
  '(,(if (eq preserve-or-restore-stack 'preserve-stack) 'sequential 'parallel)
        (assign pc (pc-plus-number pc (b-constant -1)))
        (take-post-trap ,escape-function-name ,preserve-or-restore-stack)))

;Current instruction completed, now save pc on stack and jump to trap pc
(defmicro take-post-trap (escape-function-name preserve-or-restore-stack)
  (selectq preserve-or-restore-stack
    (preserve-stack '(sequential (pushval-with-cdr (set-cdr pc cdr-normal))
                                 (take-jump-trap ,escape-function-name preserve-stack)))
    (restore-stack '(sequential (call restore-stack-pointer)
                                (pushval-with-cdr (set-cdr pc cdr-normal))
                                (take-jump-trap ,escape-function-name preserve-stack)))
    (otherwise (retch "~S should be PRESERVE-STACK or RESTORE-STACK"
                      preserve-or-restore-stack))))

;Pclsr out of current instruction and jump to specified pc
(defmicro take-jump-trap (escape-function-name preserve-or-restore-stack)
  '(parallel (assign pc ,(intern (string-append escape-function-name "-ESCAPE-PC")))
             (jump ,(selectq preserve-or-restore-stack
                      (preserve-stack 'pclsr)
                      (restore-stack 'pclsr-restore-stack)
                      (otherwise (retch "~S should be PRESERVE-STACK or RESTORE-STACK"
                                        preserve-or-restore-stack))))))

;Save continuation pc and jump to trap pc
(defmicro take-jump-trap-with-continuation
          (escape-function-name continuation-name preserve-or-restore-stack)
  (selectq preserve-or-restore-stack
    (preserve-stack '(sequential (pushval ,continuation-name)
                                 (take-jump-trap ,escape-function-name preserve-stack)))
    (restore-stack '(sequential (call restore-stack-pointer)
                                (pushval ,continuation-name)
```

```
                     (take-jump-trap ,escape-function-name preserve-stack)))
 (otherwise (retch "~S should be PRESERVE-STACK or RESTORE-STACK"
                   preserve-or-restore-stack))))

;; We implement several dispatching schemes for binary arithmetic operations
;; This is because at a later date, we may have to trade off dispatch blocks for
;; speed in the floating point case.
;; Arguments are:
;; type - type of instruction (no-operand address-operand signed-immediate-operand)
;; index - the operation index
;; no-operand-version - the symbol for the no-operand version of this instruction
;; float-version - the symbol of the floating point version of this function
;;                 if non-existant, a callout will occur
(defmicro check-binary-arithmetic-operands-fast
          (type index no-operand-version
          &optional float-version fixnum-overflow flonum-fixnum-version)
  (let ((ops (selectq type
               (no-operand '(next-on-stack top-of-stack))
               (address-operand '(address-operand top-of-stack))
               (signed-immediate-operand '(top-of-stack-a macro-signed-immediate))
               (otherwise (retch "~S type instructions not handled" type)))))
    '(check-fixnum-2args ,@ ops
      . ,(selectq type
          (no-operand
           '((((fixnum-fixnum)
              ,(if fixnum-overflow
                   '(goto ,fixnum-overflow)
                   '(signal-error fixnum-overflow)))
             ((fixnum-flonum)
              ,(if float-version
                   '(sequential
                      ;; get NPC straightened out
                      (nop)
                      (call-and-return-to convert-first-fixnum-to-flonum ,float-version))
                   '(parallel (assign arith-operation-index ,index)
                              (jump arith-binary-call-out))) )
             ((flonum-fixnum)
              ,(cond (float-version
                      '(sequential
                         ;; get NPC straightened out
                         (nop)
                         (call-and-return-to convert-fixnum-to-flonum ,float-version)))
                     (flonum-fixnum-version
                      '(goto ,flonum-fixnum-version))
                     (t '(parallel (assign arith-operation-index ,index)
                                   (jump arith-binary-call-out)))))
             ((fixnum-extnum flonum-extnum extnum-extnum)
              (parallel (assign arith-operation-index ,index)
                        (jump arith-binary-extnum-call-out)))
             ((flonum-flonum)
              ,(if float-version
                   '(goto ,float-version)
                   '(parallel (assign arith-operation-index ,index)
                              (jump arith-binary-call-out))))
             ((extnum-fixnum extnum-flonum)
              (parallel (assign arith-operation-index ,index)
                        (jump arith-binary-call-out)))))
          (address-operand
           '((otherwise (parallel (trap-no-save)
                                  (pushval address-operand)
                                  (jump ,no-operand-version)))))
          (signed-immediate-operand
           '((otherwise (parallel (trap-no-save)
                                  (pushval macro-signed-immediate)
                                  (jump ,no-operand-version)))))))))

;; Slower version, which can be used to save dispatches or because you cant use
;; arithmetic trap enable on the same cycle. Doesn't work unless you have
;; defucode'ed at loc and not clear what to do with float-version
(defmicro check-binary-arithmetic-operands-slow
          (type index no-operand-version
          &optional float-version fixnum-overflow)
  no-operand-version fixnum-overflow
  (let ((ops (selectq type
               (no-operand '(next-on-stack top-of-stack))
               (address-operand '(address-operand top-of-stack))
               (signed-immediate-operand '(top-of-stack-a macro-signed-immediate))
               (otherwise (retch "~S type instructions not handled" type)))))
    '(check-fixnum-2args ,@ ops
       (otherwise (sequential
                    ,(selectq type
                       (no-operand nil)
                       (address-operand '(pushval address-operand))
                       (signed-immediate-operand '(pushval macro-signed-immediate)))
                    ,(if float-version
                         '(assign arith-operation-floating-pc ,float-version))
                    (parallel
                      (assign arith-operation-index ,index)
                      ,(if float-version
                           '(jump arith-binary-operand-dispatch-with-float)
                           '(jump arith-binary-extnum-call-out))))))))
```

```
;; Fast version of unary operation dispatches
;; Only for no-operand versions and address-versions

(defmicro check-unary-arithmetic-operation-fast
          (type index no-operand-version &optional float-version fixnum-overflow)
  (let ((source (selectq type
                  (no-operand 'top-of-stack-a)
                  (address-operand 'address-operand)
                  (otherwise (retch "~S type instructions not handled" type)))))
    '(check-fixnum-1arg-a ,source
      . ,(selectq type
          (no-operand
           '(((fixnum-fixnum fixnum-flonum fixnum-extnum)
              ,(if fixnum-overflow
                   '(goto ,fixnum-overflow)
                   '(signal-error fixnum-overflow)))
             ((flonum-fixnum flonum-flonum flonum-extnum)
              ,(if float-version
                   '(goto ,float-version)
                   '(parallel (assign arith-operation-index ,index)
                              (jump arith-unary-call-out))))
             ((extnum-fixnum extnum-flonum extnum-extnum)
              (parallel (assign arith-operation-index ,index)
                        (jump arith-unary-call-out)))))
          (address-operand
           '((otherwise (parallel (trap-no-save)
                                   (pushval address-operand)
                                   (jump ,no-operand-version))))))))))

;;; Accessor micros for the current frame

;The currently executing function
(defatomicro frame-function
  (amem (frame-pointer -1)))

;A fixnum full of various fields
(defatomicro frame-misc-data
  (amem (frame-pointer -2)))

;Caller's return PC
(defatomicro frame-return-pc
  (amem (frame-pointer -3)))

;Top of previous frame = value to restore to (stack-pointer)
;The cdr code of this word is the value disposition
(defatomicro frame-previous-top
  (amem (frame-pointer -4)))

;Base of previous frame = value to restore to (arg-pointer)
(defatomicro frame-previous-frame
  (amem (frame-pointer -5)))


;Fields in frame-misc-data  (these will all be moved around later)

(defatomic-byte-field frame-number-of-args frame-number-of-args
                      frame-misc-data)
(defatomic-byte-field frame-cleanup-bits frame-cleanup-bits
                      frame-misc-data)
(defatomic-byte-field frame-buffer-underflow-bit frame-buffer-underflow-bit
                      frame-misc-data)
(defatomic-byte-field frame-unsafe-reference-bit frame-unsafe-reference-bit
                      frame-misc-data)
(defatomic-byte-field frame-catch-bit frame-catch-bit
                      frame-misc-data)
(defatomic-byte-field frame-bindings-bit frame-bindings-bit
                      frame-misc-data)
(defatomic-byte-field frame-trace-bit frame-trace-bit
                      frame-misc-data)
(defatomic-byte-field frame-bottom-bit frame-bottom-bit
                      frame-misc-data)
(defatomic-byte-field first-part-done frame-first-part-done
                      frame-misc-data)
(defatomic-byte-field frame-lexpr-called frame-lexpr-called
                      frame-misc-data)
(defatomic-byte-field frame-funcalled frame-funcalled
                      frame-misc-data)
(defatomic-byte-field frame-instance-called frame-instance-called
                      frame-misc-data)
(defatomic-byte-field frame-argument-format frame-argument-format
                      frame-misc-data)

(associate-dispatch-cues frame-argument-format *frame-argument-formats*)

;Fields in status bits word for current stack group
(defatomic-byte-field stack-load-started sg-stack-load-started
                      %current-stack-group-status-bits)

;;; Support micros for instructions
;;; These are open-coded and go in one cycle
```

```lisp
;Push argument onto stack
(defmicro pushval (val)
  `(parallel (assign (amem (stack-pointer 1)) (set-cdr ,val cdr-next))
             (assign top-of-stack obus)
             (increment-stack-pointer)))

;Use top of stack as value and pop it
;This uses up both the abus and the bbus
(defmicro popval ()
  `(parallel top-of-stack              ;This is the data source we return
             (assign top-of-stack (amem (stack-pointer -1)))
             (decrement-stack-pointer)))

;Like pushval but replaces the top of stack rather than pushing
(defmicro newtop (val)
  `(parallel (assign (amem (stack-pointer 0)) (set-cdr ,val cdr-next))
             (assign top-of-stack obus)))

;The value below top-of-stack
(defatomicro next-on-stack
  (amem (stack-pointer -1)))

;Top-of-stack on the A side
(defatomicro top-of-stack-a
  (amem (stack-pointer 0)))

;This is like doing two popval's and then a pushval
;I.e. it is how single-cycle two-operand instructions store their result
(defmicro pop2push (val)
  `(parallel (assign (amem (stack-pointer -1)) (set-cdr ,val cdr-next))
             (assign top-of-stack obus)
             (decrement-stack-pointer)))

;Like pushval but doesn't smash the cdr code to cdr-next
(defmicro pushval-with-cdr (val)
  `(parallel (assign (amem (stack-pointer 1)) ,val)
             (assign top-of-stack obus)
             (increment-stack-pointer)))

(defmicro newtop-with-cdr (val cdr)
  `(parallel (assign (amem (stack-pointer 0)) (set-cdr ,val ,cdr))
             (assign top-of-stack obus)))

;Call subroutine defined in SUBPRIM, returns with data available in memory-data
(defmicro memread (addr)
  `(parallel (assign vma ,addr)
             (call memread)
             (declare-memory-timing active-cycle)))     ;i.e. data-cycle when we return

;Like memread but checks write access
(defmicro memread-write (addr)
  `(parallel (assign vma ,addr)
             (call memread-write)
             (declare-memory-timing (next data-cycle))))
```

F:>lmach>ucode>UDCLS.LISP.22

```lisp
; -*- Mode:Lisp; Base:8; Lowercase:yes -*-

; Load this into the compiler when compiling microcode

(princ '#.(format nil "~%;Loading UDCLS (~A)." (namestring (truename infile)))
       msgfiles)

; Load the necessary support files

(load 'sim)
(load 'uu)
(load 'check)
(load 'ul)

(or (boundp '**compiling-ua**) (load 'ua))

(*expr defmicro-wrong-number-of-args)   ;prevent undef fcn warning

(*lexpr fintern)        ;It's in UU
(*lexpr paralyze)       ;..
(*lexpr retch)          ;..

; These are all the functions that can get called by UL-generated code
; Prevent compiler warnings for calling them

(*expr set-pma-from-vma pma-mem-read pma-mem-write simulate-transporter
       rot32 mask32 merge32 pc-readback pc-add rotate-pc-left rotate-pc-right
       instruction-signed-immediate instruction-unsigned-immediate
       instruction-baseno instruction-offset instruction-opcode stack-address
       encode-arithmetic-trap-condition overflow-p
       address-add-fp address-add-sp address-add-xb address-add-macrocode
       aref-amem aref-bmem aref-bmem-0 aset-amem aset-bmem aset-bmem-0
       setq-pc setq-vma setq-fp setq-sp inc-sp dec-sp inc-pma inc-pc inc-macro
       carry28 carry32 16-bit-sign-extend)
```

```
(fixnum (rot32 fixnum fixnum) (merge32 fixnum fixnum fixnum) (mask32 fixnum)
        (pc-readback) (16-bit-sign-extend fixnum)
        (address-add-fp fixnum) (address-add-sp fixnum) (address-add-xb fixnum)
        (address-add-macrocode) (aref-amem fixnum) (aref-bmem fixnum) (aref-bmem-0))
(notype (aset-amem fixnum fixnum) (aset-bmem fixnum fixnum) (aset-bmem0 fixnum)
        (setq-pc fixnum) (setq-vma fixnum) (setq-fp fixnum) (setq-sp fixnum)
        (carry28 fixnum fixnum fixnum) (carry32 fixnum fixnum fixnum))

(special *frame-pointer* *stack-pointer* *xbas* *pc* *vma* *pma* *instruction*
         *a-memory* *b-memory* *byte-r* *byte-s* *type-map*
         *multiply-x* *multiply-y*))

(*lexpr address-add)

(princ "
;Loading of UDCLS complete." msgfiles)

(sstatus feature lmucode)
```

F:>lmach>ucode>uh.lisp.126

```
;;; -*- Mode:Lisp; Package:Micro; Base.8; Lowercase:yes -*-
;;; (c) Copyright 1982, Symbolics, Inc.

; Microcode assembler & linker for the hardware




;;;; Definitions

;There are two structures that represent microcode:
;  micrel -- the "relocatable" representation that is generated by
;            the microcode compiler and stored in files.
;  micabs -- the "absolute" representation used in the linker, which
;            links compiled files to make the final memory image.
;  mic -- the shared part of those two structures (not instantiated by itself)

(defstruct (mic :named :conc-name)
  (code *default-microinstruction*)     ;103-bit number (parity added later)
  (tag nil)                        ;NIL or symbolic tag for this instruction
  (load-time-patches nil)          ;Fields to be filled in by FEP when loading
  (address-constraints nil)        ;Numeric location it must go at, or UNIQUE, or list of locs
  (npc-successor nil)              ;Successor at .+1
  (naf-successor nil)              ;Successor addressed via NAF
  (error-table nil)                ;Args to signal-error, if any
  )

(defstruct (micrel :named :conc-name (:include mic))
  (a-constant nil)                 ;Amem and Bmem constants to be inserted, if any
  (b-constant nil)
  (type-map nil))                  ;Type map (slots are assigned during linking)

(defstruct (micabs :named :conc-name (:include mic))
  (predecessors nil)               ;List of micabs's whose npc-successor is me
  (blocks nil)                     ;List of address blocks that contain me
  (addresses nil)                  ;List of addresses actually stored at
  original-npc-successor           ;For intern-micrel
  original-naf-successor           ;..
  (multiplicity 1))                ;Number of micrel's turned into this micabs

;A successor in a micrel is one of the following:
;       instr - a single successor
;       (SKIP true-instr false-instr) - a skip pair
;       (DISPATCH ((cue...) instr)...) - a dispatch block
;An instr is either a symbolic tag or a micrel structure or NIL meaning drop-through
;drop-through is only allowed in SKIP, not in DISPATCH
;Also the two instr's in a SKIP may be dispatch blocks (not supported at any level now!)
;Later the successor fields of a micabs are changed to something else...

(defmacro pushnew (item list)
  `(or (memq ,item ,list) (push ,item ,list)))

;Associate from the code field to a list of micabs's, in order to merge those
;with identical code, identical successors, and compatible other attributes
(defvar *microinstruction-hash-table* (make-array 27001))      ;Prime bigger than 8K
(defvar *microinstruction-tag-alist*)
(defvar *a-constant-hash-table* (make-equal-hash-table))
(defvar *a-constant-list*)
(defvar *a-constant-address*)
(defconst *a-constant-starting-address* 3000)   ;Or whatever...
(defconst *a-constant-ending-address* 4000)
(defvar *b-constant-hash-table* (make-equal-hash-table))
(defvar *b-constant-list*)
(defvar *b-constant-address*)
```

```
(defconst *b-constant-starting-address* 10)
(defconst *b-constant-ending-address* 300)      ;Leave last 100 locations for microcode
;There are also the a-list *a-memory-values*, *b-memory-values* for initialized variables

(defconst *microinstruction-memory-size* 20000)       ;8K
(defvar *microinstruction-memory* (make-array *microinstruction-memory-size*))
(defvar *address-block-hash-table* (make-equal-hash-table))
(defvar *address-block-list*)
(defvar *unresolved-symbolic-references*)
(defvar *undefined-tag-standin* nil)
(defvar *undefined-opcode-standin* nil)
(defvar *speed-histogram* (make-array 4))

;Hardware parameters
(defconst *skip-increment* 10000)       ;Bit 12 is the skip bit, and 0=true
(defconst *dispatch-increment* 400)     ;Bits 11-8 are the dispatch bits
(defconst *npc-increment* 1)            ;Bits 7-0 are the NPC increment bits
(defconst *npc-modulus* 400)

; This structure represents a block of instructions (possibly partially-full)
; which must be stored together, i.e. with addresses equal except in certain bits.
; The structure is an array of the instructions, with a leader.
; The size of the array is:
;       2 - a skip pair
;       20 - a dispatch block
;       40 - a dispatch block of skip pairs
; For now I give up trying to be more general!
; A block may have a successor, which is another block that must be stored
; in the consecutive address.  Valid successor links are:
;      2 -> 2      20 -> 40      40 -> 40
; because dispatch always takes an explicit address, but skipping doesn't.
; A 1 -> 2 link becomes a 2 -> 2.

(defstruct (address-block :named :array-leader :conc-name (:constructor make-address-block-internal))
                             ;Do not regrind above line into two--editor bug
  kind                    ;Symbolic address-block kind
  (successor nil)         ;Block, if any, that must be at consecutive address
  (predecessor nil)       ;Block, if any, in preceding consecutive address
  (mic-predecessors nil);Microinstructions that must precede this block (skip into it)
  (aliases nil)           ;Blocks, if any, that this is inside of or equivalent to
                          ;Each element is actually a list (block offset)
  (locations nil)         ;Base address list (normally only one element)
  bit-mask)               ;Variable bits
;;;; Hardware Microinstruction Definitions

;Special form for defining fields in microinstruction word
;Defconsts the name to be a byte pointer and also sets up tables
;to drive the translation from plist format
;  name - name of the field
;  n-bits - width
;  bits-over - rightmost bit number
;  display-p - t if is to appear in disassembled instructions (if-set => only if non-default)
;  default - default value for field (0 is the default default)
;  indicator - how it appears in the plist form
;  function - function to call when appears in plist form
;  args - args to that function (after mic, value, and ppss)

(defmacro defu (name n-bits bits-over &optional display-p default indicator
                                                function &rest args)
  (let ((ppss (+ (lsh bits-over 6) n-bits)))
    `(progn 'compile
       (defconst ,name ,ppss)
       ,@(if display-p '((push** '(,(or indicator name) ,ppss
                                      ,@(if (eq display-p 'if-set) '(,default)))
                                  *microinstruction-display-fields*)))
       ,@(if default '((setf (ldb ,ppss *default-microinstruction*) ,default)))
       ,@(if indicator '((push** '(,indicator ,function ,ppss ,@args)
                                  *plist-to-mic-table*)))
       ',name)))

(defmacro push** (val field)
  `(let ((.val. ,val))
     (or (assq (car .val.) ,field)
         (push .val. ,field))))

(defconst *default-microinstruction* 0)          ;Changed by defu's below
(defconst *microinstruction-display-fields* nil);..

;Translation from plist fields to mic
;Each entry is (indicator function byte-pointer . args)
;The function is called with mic, field-value, byte-pointer, and the args.
;Some fields are not in this table and are handled as a special case, typically
;when several fields must be processed together.
;Some fields are not in this table because they aren't used at all at this level.
(defconst *plist-to-mic-table* nil)              ;Changed by defu's below

(defu u-amra 12. 0 t nil amem-read-addr store-amem-read-addr)
(defu u-r-base 2 9 nil 1)
(defu u-r-offset 9 0)
(defu u-amra-sel 2 12. t 3)      ;Default Abus source is frame-pointer
```

```
(defu u-xybus-sel 1 14. t)
(defu u-stkp-count 1 15. if-set 0 stack-pointer store-stack-pointer)

(defu u-amwa 12. 16. t)
(defu u-amwa-byte 10. 16.)
(defu u-lbus-dev-addr 10. 16. nil 1777 lbus-dev-addr store-lbus-dev-addr)
(defu u-w-base 2 25.)
(defu u-w-offset 9 16.)
(defu u-amwa-10 1 26.)
(defu u-amwa-11 1 27.)
(defu u-amwa-sel 2 28. t 3)      ;Default is not to write Amem (u-w-base<1> = 0)

(defu u-seq 2 30. if-set 0)
(defu u-bmra 8 32. t nil bmem-read-addr store-bmem-addr)
(defu u-bmwa 4 40. t 17 bmem-write-addr store-number)
(defu u-bmem-from-xbus 1 44. t nil write-bmem store-choice obus xbus)
(defu u-mem 3 45. if-set 0 mem store-mem-field)

(defu u-spec 5 48. if-set 20 spec store-choice
                             load-byte-r load-byte-e load-stkp load-frmp
                             load-xbas load-control load-special-maps
                             clear-stack-adjustment  ;load-inst on rev-2 dp
                             arithmetic-trap-enb trap-if-type-cond
                             trap-if-type-cond-or-bbus-not-fixnum multiply-and-type-check
                             crocks alub-sign-hack crocks-to-ybus multiply
                             20 addr-from-abus inhibit-page-tags dma
                              address-phtc check-write-access increment-inst ifu-control
                             arithmetic-trap-with-dispatch halt npc-magic awaken-task
                             write-task disable-tasking 36 37)
(defu u-magic 4 53. t nil magic store-number)
(defu u-cond-sel 5 57. t nil condition store-choice
                             not-cdr-0 not-cdr-1 not-cdr-2 not-cdr-3
                             type-condition bbus-not-fixnum alub-0 ybus-31
                             not-gc-condemned-temp not-gc-this-stack not-gc-other-stack
                             equal-pointer
                             not-equal-fixnum not-equal-typed-pointer
                             not-greater-pointer not-greater-fixnum-unsigned
                             alu-31 sequence-break trace-flag-1 trace-flag-2
                             not-lbus-dev-cond mc-cond 26 27
                             30 31 not-ctos-came-from-ifu 33
                             34 35 36 37)
(defu u-cond-func 2 62. if-set 0)
(defu u-alu 4 64. t nil alu store-alu-func)
(defu u-byte-func 2 68. if-set 0)
(defu u-obus-cdr 3 70. t nil force-obus<35-34> store-choice
                             abus bbus bbus<7-6> nil 0 1 2 3)
                                       ;bbus doesn't work on rev-2 DP
(defu u-obus-htype 3 73. t nil force-obus<33-32> store-choice
                             abus bbus bbus<5-4> nil 0 1 2 3)
(defu u-obus-ltype-sel 1 76. t 1 force-obus<31-28> store-bit 0)

(defu u-cpc-sel 2 77. t)
(defu u-npc-sel 1 79. if-set 1)
(defu u-naf 14. 80. t)
(defu u-speed 2 94. t 0 speed store-speed)      ;default is fastest, just to maximize lossage!
(defu u-type-map-sel 6 96. if-set 0 type-map store-type-map)
(defu u-au-func 8 102. if-set 0)
;(defu u-spare 1 110. if-set 0)
;(defu u-parity 1 111. if-set 0)

;NOTE: No knowledge of byte fields in the microinstruction after this point!
;;;; Back end of compiler

(defvar *opcode-offsets*)          ;for 10-bit-immediate-operand expansion

;Given a name and a microinstruction plist, return the corresponding micrel
(defun assemble-microinstruction-plist (name code
                                        &optional address-constraint *opcode-offsets*)
  (let ((default-cons-area working-storage-area))      ;Called inside macro expansion
    (let ((micrel (assemble-microinstruction-plist1 code (list name) 0)))
      (and address-constraint
           (not (symbolp (mic-address-constraints micrel)))     ;NIL or UNIQUE
           (setq address-constraint
                 (append (if (atom address-constraint)
                             (list address-constraint)
                           address-constraint)
                         (if (atom (mic-address-constraints micrel))
                             (list (mic-address-constraints micrel))
                             (mic-address-constraints micrel)))))
      (setf (mic-address-constraints micrel) address-constraint)
      micrel)))

;Subroutine called recursively on successors.  Path and index are for generated tags.
(defun assemble-microinstruction-plist1 (code path index &optional eventual-successor)
  (selectq (car code)
    (microinstruction
      (let ((micrel (make-micrel tag (cond ((plusp index) (append path (list index)))
                                           ((cdr path) path)
                                           (t (car path)))
                                 error-table (get code 'error-table)))
```

```
    (amwa-in-use nil)
    (amwa-11-in-use nil))
;; Store the easy fields first so other things can clobber over individual bits
(loop for (indicator value) on (cdr code) by 'cddr
      do (store-field micrel indicator value t))
(if (get code 'unique)
    (setf (mic-address-constraints micrel) 'unique))
;; Now store the byte-function
(multiple-value-bind (byte-func magic magic-mask cond amwa)
    (choose-byte-func-encoding code)
  (store-number micrel byte-func u-byte-func)
  (and magic (setf (ldb u-magic (mic-code micrel))
                   (logior (logand (ldb u-magic (mic-code micrel))
                                   (lognot magic-mask))
                           magic)))
  (and cond
       (store-number micrel
                     (if (eq cond 'macro)
                         (lsh *opcode-offset* 3)
                         cond)
                     u-cond-sel))
  (when amwa
    (setq amwa-in-use t)
    (store-number micrel amwa u-amwa-byte)))
;; Store the extended B-memory write address
(let ((bmwa (get code 'bmem-write-addr)))
  (when (and bmwa (< bmwa 360))
    (setq amwa-in-use t)
    (store-number micrel bmwa u-amwa)))
              ;Bit 10 is 0, so Amem won't get written
;; Other things that use AMWA
(if (get code 'lbus-dev-addr)
    (setq amwa-in-use t))
(selectq (get code 'stack-pointer)
  ((decrement) (setq amwa-11-in-use 0))
  ((increment) (setq amwa-11-in-use 1)))
(selectq (get code 'ybus)
  ((ybus-crocks-1) (setq amwa-11-in-use 0))
  ((ybus-crocks-2) (setq amwa-11-in-use 1)))
;; Store the a-memory write address wherever it belongs
;; Put it in the a-memory read address if necessary
;; This code had damned well better agree with check-spec-and-magic-fields
(let ((amwa (and (get code 'write-amem) (get code 'amem-write-addr)))
      (amra (get code 'amem-read-addr)))
  (cond ((null amwa)
         ;; Not writing, -except- if memory mapped into Amem
         (if (fieldp code 'amem-write-addr '(bus-address))
             (store-amem-write-addr micrel '(bus-address))))
        ((or (not (memq (get code 'abus) '(nil amem)))  ;Must use AMWA
             (and amra (not (equal amwa amra)))          ;Ditto
             (and (not amwa-in-use)                      ;May use AMWA
                  (or (not (atom amwa))                  ;And no bit-11 conflict
                      (not amwa-11-in-use)
                      (= (lsh amwa -11.) amwa-11-in-use))))
         (store-amem-write-addr micrel amwa))
        (t
         (store-amem-read-addr micrel amwa)      ;Must use AMRA
         (store-number micrel 2 u-amwa-sel)
         (and (listp amwa)                       ;Must crank up the speed
              (not (memq (get code 'speed) '(slow-first-half very-slow)))
              (store-speed micrel 'slow-first-half u-speed)))))
;; If we're supposed to be writing the Lbus, set the bit to tell
;; the temporary memory control to do it
(and (get code 'write-lbus)
     (eq *machine-version* 'proto)
     (store-number micrel 1 u-amwa-10))
;; Store bus select fields
(if (or (fieldp code 'xbus 'bbus) (fieldp code 'ybus 'abus))
    (store-number micrel 1 u-xybus-sel))
(let ((abus (get code 'abus)))
  (selectq abus
    ((stack-pointer frame-pointer)
     (store-number micrel 3 u-amra-sel)
     (store-number micrel (if (eq abus 'stack-pointer) 0 1) u-r-base))
    ((memory-data)
     (store-number micrel 1 u-amra-sel)
     (store-number micrel 2 u-r-base)
     (store-number micrel 000 u-r-offset))
    ((memory-data-force lbus vma map pc)
     (store-number micrel 3 u-amra-sel)
     (store-number micrel 2 u-r-base)
     (store-number micrel (cdr (assq abus '((memory-data-force . 000)
                                            (lbus . 100)
                                            (vma . 200)
                                            (map . 300)
                                            (pc . 400))))
                   u-r-offset))))
(selectq (get code 'bbus)
  (macro-unsigned-immediate (store-number micrel 0 u-bmra))
  (macro-signed-immediate (store-number micrel 4 u-bmra)))
(selectq (get code 'ybus)
```

```
  (ybus-crocks-1 (store-number micrel 0 u-amwa-11))
  (ybus-crocks-2 (store-number micrel 1 u-amwa-11)))
;; Set up cond func
(store-number micrel
   (cond ((getl code '(skip-true-sequence skip-false-sequence return-skip)) 1)
         ((memq 'condition-true (get code 'trap-enables)) 2)
         ((memq 'condition-false (get code 'trap-enables)) 3)
         (t 0))
   u-cond-func)
;; Sequencer controls
(let ((cpc-sel 0) (npc-sel 1) (seq 0) (cpc-not-next nil))
  (selectq (get code 'sequencer)
    ((popj next-instruction) (setq cpc-sel 1 seq 3 cpc-not-next t))
    ((pushj pushj-return-dispatch) (setq seq 1 cpc-not-next t))
    (pop (setq seq 3))
    (pop-npc (setq seq 3 npc-sel 1))     ;spec-func assumed
    (pop-npc-and-cpc-from-npc (setq seq 3 npc-sel 1 cpc-sel 2 cpc-not-next t))
    (push-npc (setq seq 1))
    (dismiss (setq seq 2))
    (take-dispatch (setq cpc-sel 2 cpc-not-next t)))
  ;; NPC comes from NEXT CPC+1 always, except when dispatching or popping into it
  (if (get code 'dispatch) (setq npc-sel 0))
  ;; Now, the good part--the successor instructions
  (let* ((next (successor-instr (or (get code 'next-sequence) eventual-successor)
                                path index nil))
         (must-be-naf-successor
           (or (successor-instr (get code 'trap-sequence) path index 'trap)
               (successor-dispatch (get code 'dispatch-table) path index)
               (successor-dispatch (get code 'arith-trap-dispatch-table) path index)
               (and (or (fieldp code 'sequencer 'pushj)
                        (fieldp code 'sequencer 'pushj-return-dispatch))
                    (get code 'jump-sequence))))
         (skips (let ((true (get code 'skip-true-sequence))
                      (false (get code 'skip-false-sequence)))
                  (and (or true false)
                       (list 'SKIP
                             (if true (successor-instr true path index 'true next)
                                 next)
                             (if false (successor-instr false path index 'false next)
                                 next)))))
         (return-skips (let ((true (get code 'return-true-sequence))
                             (false (get code 'return-false-sequence)))
                         (and (or true false)
                              (list 'SKIP
                                    (if true
                                        (successor-instr true path index 'true next)
                                        next)
                                    (if false
                                        (successor-instr false path index 'false next)
                                        next))))))
    ;; Decide whether to put the skips in the NAF or the NPC
    (if skips
        (cond (must-be-naf-successor
                (setf (mic-npc-successor micrel) skips)
                (setq cpc-sel 2))
              (t (setf (mic-naf-successor micrel) skips))))
    (if must-be-naf-successor
        (setf (mic-naf-successor micrel) must-be-naf-successor))
    ;; Store the normal successor (drop-through or jump or subroutine return)
    ;; in NPC if it has to go there, or NAF if free to choose, or nowhere if
    ;; not going to be used because next instruction reached via skip.
    ;; Prefer the NAF over the NPC if neither is used to avoid introducing
    ;; unnecessary address constraints.
     (and (cond (return-skips                         ;Return address is a pair
                 (setf (mic-npc-successor micrel) return-skips)
                 nil)
                ((fieldp code 'sequencer 'pushj) ;Need a return address always
                 (setf (mic-npc-successor micrel) next)
                 t)
                (skips nil)                           ;Skip substitutes for next
                (cpc-not-next nil)                    ;No successor required
                (must-be-naf-successor                ;NAF in use for something else
                 (setf (mic-npc-successor micrel) next)
                 (setq cpc-sel 2)
                 t)
                (t                                    ;Normal next address
                 (setf (mic-naf-successor micrel) next)
                 t))
          ;; Barf if drop through into nothing
          (null next)
          (not (fieldp code 'spec 'halt))            ;sigh....
          (not (get code 'error-table))  ;a pushj that never popj's
          (ferror nil "Drop into hyperspace at ~S" (mic-tag micrel))))
   (store-number micrel cpc-sel u-cpc-sel)
   (store-number micrel npc-sel u-npc-sel)
   (store-number micrel seq u-seq))
  micrel))
(microsequence
  (assemble-microinstruction-plist1
    (link-microsequence-together (cdr code) eventual-successor) path index))
(otherwise (ferror nil "Where did this alleged microcode come from?"))))
```

```
(defun link-microsequence-together (l eventual-successor)
  (cond ((and (null (cdr l)) (null eventual-successor)) (car l))
        ((get (car l) 'next-sequence)
         (if (cdr l) (ferror nil "Something is wrong, next-sequence inside a sequence"))
         (car l))                              ;jump instead of drop-through
        (t (list* 'microinstruction 'next-sequence
                  (if (cdr l) (link-microsequence-together (cdr l) eventual-successor)
                      eventual-successor)
                  (cdar l)))))               ;Can't use putprop--it's destructive

(defun successor-instr (instr path index term &optional eventual-successor)
  (cond ((atom instr) instr)           ;NIL or a tag or a mic
        ((null term)
         (assemble-microinstruction-plist1 instr path (1+ index) eventual-successor))
        ((zerop index)
         (assemble-microinstruction-plist1 instr (append path (list term)) 0
                                           eventual-successor))
        (t (assemble-microinstruction-plist1 instr (append path (list index term)) 0
                                             eventual-successor))))

;NOTE: For arith, the Abus can't be 3 because that would cause a type trap
;      however, the Bbus can be 3 since it isn't fully type-checked.
(defconst *dispatch-cue-bit-masks*
          (loop for (type cues) in '((arith (0 1 2 3 4 5 6 7 10 11 12 13))
                                     (abus<2-0> (0 1 2 3 4 5 6 7))
                                     (cdr-code (0 1 2 3)))
                collect (cons type (loop for c in cues
                                         summing (lsh 1 c)))))

(defun successor-dispatch (table path index)
  (and table
       (let ((valid-cues (or (cdr (assq (car table) *dispatch-cue-bit-masks*)) 177777))
             (cues-seen (dispatch-table-cues-used (cdr table))))
         (cons 'dispatch
               (loop for clause in (cdr table)
                     collect (list (convert-dispatch-cues (car clause) valid-cues cues-seen)
                                   (successor-instr (cadr clause) path index (car clause))
                                   ))))))

(defun dispatch-table-cues-used (clauses)
  (loop for clause in clauses with res = 0
        unless (eq (car clause) 'otherwise)
          do (loop for cue in (car clause)
                   do (setq res (logior (lsh 1 cue) res)))
        finally (return res)))

(defun convert-dispatch-cues (cues valid-cues cues-used)
  (if (eq cues 'otherwise)
      (loop for i from 0 to 17
            unless (bit-test (lsh 1 i) cues-used)
              when (bit-test (lsh 1 i) valid-cues)
                collect i)
      (loop for cue in cues
            unless (bit-test (lsh 1 cue) valid-cues)
              do (ferror nil "~S invalid dispatch cue" cue))
      cues))

;Display a microinstruction (a mic code)
(defun disassemble-microinstruction (inst)
  (loop for (name ppss default) in *microinstruction-display-fields*
        as val = (ldb ppss inst)
        unless (and default (= val default))
          do (format t "~&  ~A = ~O" name val)))
(defun store-field (mic indicator value &optional no-error &aux entry)
  (cond ((setq entry (assq indicator *plist-to-mic-table*))
         (lexpr-funcall (cadr entry) mic value (cddr entry)))
        ((not no-error)
         (ferror nil "I don't know how to store the ~S field" indicator))))

;Storing routines for particular fields/values

(defun store-number (mic value ppss)
  (setf (ldb ppss (mic-code mic)) value))

(defun store-choice (mic value ppss &rest choices)
  (setf (ldb ppss (mic-code mic))
        (find-position-in-list value choices)))

(defun store-bit (mic ignore ppss bit)
  (setf (ldb ppss (mic-code mic)) bit))

(defun store-alu-func (mic value ppss)
  (store-number mic (or (find-position-in-list value normal-alu-functions)
                        (find-position-in-list value weird-alu-functions))
                ppss))

(defun store-type-map (micrel map ignore)
  (setf (micrel-type-map micrel) map))

(defun store-stack-pointer (mic op enable-ppss)
  (setf (ldb enable-ppss (mic-code mic)) 1)
```

```
  (store-choice mic op u-amwa-11 'decrement 'increment))

(defun store-amem-read-addr (micrel addr &optional ignore)
  (cond ((atom addr)
         (store-number micrel addr u-amra)
         (store-number micrel 0 u-amra-sel))
        ((eq (car addr) 'constant)
         (setf (micrel-a-constant micrel) (cadr addr))
         (store-number micrel 0 u-amra-sel))
        ((eq (car addr) 'macrocode)
         (store-number micrel 2 u-amra-sel)
         (store-number micrel 3 u-r-base)
         (store-number micrel 400 u-r-offset))
        ((eq (car addr) 'bus-address)
         (store-number micrel 1 u-amra-sel))
        (t (store-number micrel 2 u-amra-sel)
           (store-number micrel (find-position-in-list (car addr)
                                  '(stack-pointer frame-pointer xbas))
                                u-r-base)
           (store-number micrel (logand (cadr addr) 377) u-r-offset))))

;This must not clobber the bits that are don't cares for this particular address
;and also may be used for something else
(defun store-amem-write-addr (micrel addr &optional ignore)
  (cond ((atom addr)
         (store-number micrel addr u-amwa)
         (store-number micrel 0 u-amwa-sel))
        ((eq (car addr) 'macrocode)
         (store-number micrel 1 u-amwa-sel)
         (store-number micrel 3 u-w-base)
         (store-number micrel 400 u-w-offset))
        ((eq (car addr) 'bus-address)
         (store-number micrel 3 u-amwa-sel)
         (store-number micrel 1 u-amwa-10))
        (t (store-number micrel 1 u-amwa-sel)
           (store-number micrel (find-position-in-list (car addr)
                                  '(stack-pointer frame-pointer xbas))
                                u-w-base)
           (store-number micrel (logand (cadr addr) 377) u-w-offset))))

(defun store-bmem-addr (micrel addr ppss)
  (cond ((atom addr)
         (store-number micrel addr ppss))
        ((eq (car addr) 'constant)
         (setf (micrel-b-constant micrel) (cadr addr)))))

(defun store-lbus-dev-addr (micrel addr ppss)
  (cond ((listp addr)
         (push '(symbolic-lbus-slot ,(car addr)) (mic-load-time-patches micrel))
         (setq addr (cadr addr))))
  (store-number micrel
                (if (numberp addr) addr
                    (+ (cdr (assq addr '((write-memory . 0)     ;proto only
                                         (write-phta-and-asn . 1)
                                         (write-vma-and-pc . 2) ;tmc only
                                         (write-lru-map . 4)
                                         (write-map-a . 5)
                                         (write-map-b . 6)
                                         (write-both-maps . 7))))
                       37_5))
                ppss))

(defun store-mem-field (micrel mem ppss)
  (store-number micrel
                (or (find-position-in-list mem
                      (selectq *machine-version*
                        (proto '(nil continue write-vma start-cycle))
                        ((tmc tmc5) '(nil microdevice start-read start-write
                                      nil write-vma block-read block-write))))
                    (ferror nil "~S illegal value for mem field" mem))
                ppss))

(defun store-speed (micrel speed ppss)
  (store-number micrel
                (cdr (assq speed '((slow-first-half .  2)
                                   (slow-second-half . 1)
                                   (slow . 1)
                                   (very-slow . 3))))
                ppss))
;;;; Microinstruction linker -- outer module

(defun flush-microcode (*machine-version*)
  (setq *ucode-alist-alist* (delq (assq *machine-version* *ucode-alist-alist*)
                                  *ucode-alist-alist*))
  t)

(defun link-the-microcode (*machine-version*)
  (clear-mic-tables)
  (format t "~&INTERN-LOADED-MICROCODE...")
  (loop for (name plist micrel)
```

```
              in (or (cdr (assq *machine-version* *ucode-alist-alist*))
                     (ferror nil "~S is not a loaded microcode program; ~{~S~^, ~} exist"
                             *machine-version*
                             (or (mapcar 'car *ucode-alist-alist*) '("none"))))
      do (intern-micrel micrel))
  (dolist (phase '(resolve-symbolic-references determine-address-constraints
                   assign-fixed-addresses
                   determine-block-successors determine-other-successors
                   assign-floating-addresses resolve-constants plug-in-successors))
    (format t "~&~S..." phase)
    (funcall phase))
  ;Report unimplemented instructions
  (loop for opcode from 0 to 1777
        as mic = (aref *microinstruction-memory* (* opcode 4))
        as name = (aref *opcode-table* opcode)
        when (and name (eq mic *undefined-opcode-standin*))
          collect name into undef
        finally (cond (undef
                       (format t "~&Defined but unimplemented instructions:~%   ")
                       (format:print-list t "~S" undef))))
  ;Check for overlapping scratchpad memory assignments (because it's so kludgey)
  (setq *a-memory-symbols* (sort *a-memory-symbols* #'(lambda (x y) (< (cdr x) (cdr y)))))
  (setq *b-memory-symbols* (sort *b-memory-symbols* #'(lambda (x y) (< (cdr x) (cdr y)))))
  (loop for (sym . loc) in *a-memory-symbols* and prev = -1 then loc and psym = nil then sym
        when (≤ *a-constant-starting-address* loc)
          when (< loc *a-constant-address*)
            do (format t "~&The symbol ~S overlaps the constants area of A-memory" sym)
        when (= loc prev)
          do (format t "~&Symbols ~S and ~S are both defined at ~O@A" sym psym loc))
  (loop for (sym . loc) in *b-memory-symbols* and prev = -1 then loc and psym = nil then sym
        when (≤ *b-constant-starting-address* loc)
          when (< loc *b-constant-address*)
            do (format t "~&The symbol ~S overlaps the constants area of B-memory" sym)
        when (= loc prev)
          unless (and (memq sym *b-temp-symbols*) (memq psym *b-temp-symbols*))
            do (format t "~&Symbols ~S and ~S are both defined at ~O@B" sym psym loc))
  (setq *need-to-link* nil))

(defun file-linker-report (pathname)
  (with-open-file (standard-output pathname ':direction ':output)
    (linker-summary-report)
    (funcall standard-output ':tyo #\page)
    (linker-detailed-report)))

(defun linker-summary-report ()
  (memory-usage-report)
  (loop with n-micabs =
             (loop for bucket being the array-elements of *microinstruction-hash-table*
                   sum (length bucket))
        for mic being the array-elements of *microinstruction-memory*
        when (null mic) sum 1 into n-free-locs
        else when (eq mic *undefined-tag-standin*) sum 1 into n-undef-tags
        else when (eq mic *undefined-opcode-standin*) sum 1 into n-undef-ops
        else sum (micabs-multiplicity mic) into n-micrels
         and sum 1 into n-micabs-locs
        finally
         (format t "~D microinstructions interned into ~D instructions stored in ~D locations.
There are ~D free locations, ~D undefined-tag halt instructions, and
~D undefined-opcode halt instructions.~%"
                 n-micrels n-micabs n-micabs-locs n-free-locs n-undef-tags n-undef-ops))
  (loop for loc from 0 below *microinstruction-memory-size*
        when (null (aref *microinstruction-memory* loc))
          count (and (zerop (logand loc *skip-increment*))
                     (null (aref *microinstruction-memory* (+ loc *skip-increment*))))
                into n-free-skips
          and when (zerop (logand (* 17 *dispatch-increment*) loc))
                count (loop repeat 20 for loc from loc by *dispatch-increment*
                            always (null (aref *microinstruction-memory* loc)))
                  into n-free-dispatches
       finally (format t "There are ~D free skip blocks (out of 4096)~@
                          and ~D free dispatch blocks (out of 512).~%"
                         n-free-skips n-free-dispatches))
  (format t "Number of microinstructions with speed")
  (dotimes (i 4)
    (format t "~VT~D" (+ 40. (* i 8)) i))
  (terpri)
  (dotimes (i 4)
    (format t "~VT~D" (+ 40. (* i 8)) (aref *speed-histogram* i)))
  (terpri))
(defun linker-detailed-report ()
  (format t "~%Locations of microcode routines' first microinstructions:~2%")
  (format t "~40A ~A~2%" "Symbol" "Locations")
  (loop for (tag . mic) in (sortcar (copylist *microinstruction-tag-alist*) #'string-lessp)
        do (format t "~40A " tag)
           (format:print-list t "~S,'0O" (micabs-addresses mic) "  " "~41X")
           (terpri))
  (format t "~|~%Sharing of separate but identical microinstructions in source code:~2%")
  (format t "~40A ~A~2%" "Representative tag" "Multiplicity from source")
  (loop for (tag . mult)
          in (sort (loop for bucket being the array-elements
                                           of *microinstruction-hash-table*
```

```
                        nconc (loop for mic in bucket
                                    when (> (micabs-multiplicity mic) 1)
                                      collect (cons (mic-tag mic)
                                                    (micabs-multiplicity mic))))
                   #'(lambda (x y)
                       (or (> (cdr x) (cdr y))
                           (and (= (cdr x) (cdr y))
                                (alphalessp (car x) (car y))))))
        do (format t "~40A ~D~%" tag mult))
  (format t "~|~%Microinstructions that had to be stored in more than one cmem location:~2%")
  (format t "~40A ~A~2%" "Representative tag" "Multiplicity in control memory")
  (loop for (tag . mult)
          in (sort (loop for bucket being the array-elements
                                           of *microinstruction-hash-table*
                        nconc (loop for mic in bucket
                                    when (cddr (micabs-addresses mic))
                                      collect (cons (mic-tag mic)
                                                    (length (micabs-addresses mic)))))
                   #'(lambda (x y)
                       (or (> (cdr x) (cdr y))
                           (and (= (cdr x) (cdr y))
                                (alphalessp (car x) (car y))))))
        do (format t "~40A ~D~%" tag mult))
  (format t "~|~%Control-memory map:~2%~10A~35A~10A~A~2%"
          "Location" "Representative tag" "Location" "Representative tag")
  (loop for mic being the array-elements of *microinstruction-memory*
                    using (index loc) with phase = nil
        unless (null mic)
          unless (eq mic *undefined-opcode-standin*) do
            (format t "~5,'0O  ~A" loc (mic-tag mic))
            (if phase (terpri)
                (let* ((curcol (+ 7 (flatc (mic-tag mic))))
                       (destcol (max (+ curcol 1) 45.))
                       (ntabs (// (- (logior destcol 7) curcol) 8)))
                  (loop repeat ntabs
                        do (funcall standard-output ':tyo #\tab))
                  (loop repeat (\ (if (zerop ntabs) (- destcol curcol) destcol) 8)
                        do (funcall standard-output ':tyo #\sp))))
            (setq phase (not phase))
        finally (if phase (terpri))))

(defun memory-usage-report ()
  (send standard-output ':fresh-line)
  (if (boundp '*a-constant-address*)     ;Linker has been run
      (format t "A-memory locations ~O-~O used for constants (~O end of constants area)~%"
              *a-constant-starting-address* (1- *a-constant-address*)
              (1- *a-constant-ending-address*)))
  (format t "A-memory locations")
  (report-a-b-memory-locations *a-memory-symbols*)
  (format t " used for variables~%")
  (if (boundp '*b-constant-address*)     ;Linker has been run
      (format t "B-memory locations ~O-~O used for constants (~O end of constants area)~%"
              *b-constant-starting-address* (1- *b-constant-address*)
              (1- *b-constant-ending-address*)))
  (format t "B-memory locations")
  (report-a-b-memory-locations *b-memory-symbols*)
  (format t " used for variables~%")
  (format t "Type-map locations 0-~O used (77 end of type map)~%"
          (1- (length *type-maps*))))

(defun report-a-b-memory-locations (l)
  (setq l (sort (mapcar #'cdr l) #'<))
  (loop while l
        as loc = (pop l)
        as oldl = loc
        for n upfrom 1
        do (cond ((= n 6)
                  (setq n 0)
                  (send standard-output ':tyo #\cr)
                  (send standard-output ':tyo #\tab)))
           (format t " ~O" loc)
           (loop while l
                 while (or (= (car l) loc) (= (car l) (1+ loc)))
                 do (setq loc (pop l)))
           (or (= loc oldl)
               (format t "-~O" loc))))
;;;; Microinstruction linker -- intern, assign constants

(defun clear-mic-tables ()
  (copy-array-portion *microinstruction-hash-table* 0 0            ;Fill with NIL
                      *microinstruction-hash-table* 0
                        (array-length *microinstruction-hash-table*))
  (copy-array-portion *microinstruction-memory* 0 0                ;Fill with NIL
                      *microinstruction-memory* 0 (array-length *microinstruction-memory*))
  (clrhash-equal *a-constant-hash-table*)
  (setq *a-constant-address* *a-constant-starting-address*)
  (clrhash-equal *b-constant-hash-table*)
  (setq *b-constant-address* *b-constant-starting-address*)
  (dotimes (i 4)
    (aset 0 *speed-histogram* i))
```

```
  (clrhash-equal *address-block-hash-table*)
  (setq *address-block-list* nil)
  (setq *microinstruction-tag-alist* nil))
                ;--- Would also clear type map assignments, but would break simulator

;Given a micrel return a micabs, the canonical representative of all micrels to
;be stored in the same location as it.  This also does constant assignment.
(defun intern-micrel (micrel)
  (let ((code (mic-code micrel)))
    (if (micrel-a-constant micrel)
        (setf (ldb u-amra code) (locate-a-constant (micrel-a-constant micrel))))
    (if (micrel-b-constant micrel)
        (setf (ldb u-bmra code) (locate-b-constant (micrel-b-constant micrel))))
    (if (micrel-type-map micrel)
        (setf (ldb u-type-map-sel code) (assign-type-map (micrel-type-map micrel))))
                                                  ;defined in UL
    (let ((ans (let ((hash (\ code (array-length *microinstruction-hash-table*))))
                 (loop for candidate in (aref *microinstruction-hash-table* hash)
                       when (and (= (mic-code candidate) code)
                                 (compatible-tags (mic-tag candidate) (mic-tag micrel))
                                 (equal (mic-load-time-patches candidate)
                                        (mic-load-time-patches micrel))
                                 (compatible-address-constraints
                                   (mic-address-constraints candidate)
                                   (mic-address-constraints micrel))
                                 (equal-successor (micabs-original-npc-successor candidate)
                                                  (mic-npc-successor micrel))
                                 (equal-successor (micabs-original-naf-successor candidate)
                                                  (mic-naf-successor micrel))
                                 (compatible-error-table-entries (mic-error-table candidate)
                                                                 (mic-error-table micrel)))
                         do (incf (micabs-multiplicity candidate)) and
                         return (merge-tags-and-address-constraints candidate micrel)
                       finally
                         (let ((micabs (make-micabs code code tag (mic-tag micrel)
                                               error-table (mic-error-table micrel)
                                               load-time-patches (mic-load-time-patches micrel)
                                               address-constraints (mic-address-constraints micrel)
                                               npc-successor
                                                 (intern-successor (mic-npc-successor micrel))
                                               original-npc-successor (mic-npc-successor micrel)
                                               naf-successor
                                                 (intern-successor (mic-naf-successor micrel))
                                               original-naf-successor (mic-naf-successor micrel))))
                           (push micabs (aref *microinstruction-hash-table* hash))
                           (incf (aref *speed-histogram* (ldb u-speed code)))
                           (return micabs))))))
      (if (symbolp (mic-tag ans))       ;i.e. not a generated tag
          (push (cons (mic-tag ans) ans) *microinstruction-tag-alist*))
      ans)))

(defun intern-successor (succ)
  (cond ((symbolp succ) succ)                   ;NIL or a tag
        ((atom succ) (intern-micrel succ))      ;a micrel
        ((eq (car succ) 'skip)
         (mapcar #'intern-successor succ))
        ((eq (car succ) 'dispatch)
         (cons 'dispatch
               (loop for (cues mic) in (cdr succ)
                     collect (list cues (intern-successor mic)))))
        (t (ferror nil "Hey!  Who turned out the lights?"))))

;All generated tags are compatible with each other, user doesn't care
(defun compatible-tags (t1 t2)
  (or (eq t1 t2)
      (listp t1)
      (listp t2)))

(defun compatible-address-constraints (c1 c2)
  (cond ((eq c1 'unique) nil)
        ((eq c2 'unique) nil)
        ((null c1) t)
        ((null c2) t)
        ((atom c1) (if (atom c2) (equal c1 c2) (member c1 c2)))
        ((atom c2) (member c2 c1))
        ((< (length c1) (length c2)) (loop for c in c1 always (member c c2)))
        (t (loop for c in c2 always (member c c1)))))
(defun merge-tags-and-address-constraints (into from)
  (let ((c1 (mic-address-constraints into))
        (c2 (mic-address-constraints from)))
    (cond ((null c2))
          ((null c1) (setf (mic-address-constraints into) c2))
          (t (let ((con (if (atom c1) (list c1) c1)))
               (if (atom c2) (or (member c2 c1) (push c2 c1))
                   (loop for c in c2
                         unless (member c c1)
                           do (push c c1)))
               (setf (mic-address-constraints into)
                     (if (null (cdr con)) (car con) con))))))
  (and (listp (mic-tag into))
```

```
      (or (not (listp (mic-tag from)))
          (better-tag (mic-tag from) (mic-tag into)))
      (setf (mic-tag into) (mic-tag from)))
  (setf (mic-error-table into)
        (merge-error-table-entries (mic-error-table into)
                                   (mic-error-table from)))
  into)

(defun better-tag (tag1 tag2)
  (cond ((< (length tag1) (length tag2)) t)
        ((> (length tag1) (length tag2)) nil)
        (t (< (string-length (car tag1)) (string-length (car tag2))))))

(defun equal-successor (s1 s2)
  (cond ((atom s1) (eq s1 s2))
        ((atom s2) nil)
        ((neq (car s1) (car s2)) nil)
        ((eq (car s1) 'skip)
         (and (equal-successor (cadr s1) (cadr s2)) (equal-successor (caddr s1) (caddr s2))))
        ((eq (car s1) 'dispatch)
         (loop for clause1 in (cdr s1) and clause2 in (cdr s2)
               always (and (equal (car clause1) (car clause2))
                           (equal-successor (cadr clause1) (cadr clause2)))))))

(defun locate-a-constant (value)
  (if (numberp value)
      (setq value (logand (mask 36.) value)))
  (cond ((gethash-equal value *a-constant-hash-table*))
        (t (let ((res *a-constant-address*))
             (if (= *a-constant-address* *a-constant-ending-address*)
                 (ferror nil "A-memory constants area overflow"))
             (incf *a-constant-address*)
             (puthash-equal value res *a-constant-hash-table*)
             res))))

(defun locate-b-constant (value)
  (if (numberp value)
      (setq value (logand (mask 34.) value)))
  (cond ((gethash-equal value *b-constant-hash-table*))
        (t (let ((res *b-constant-address*))
             (if (= *b-constant-address* *b-constant-ending-address*)
                 (ferror nil "B-memory constants area overflow"))
             (incf *b-constant-address*)
             (puthash-equal value res *b-constant-hash-table*)
             res))))
;;;; Microinstruction Linker -- fix up after interning everything

;Go through and replace tags and drop-throughs with mics
(defun resolve-symbolic-references ()
  (setq *undefined-tag-standin* (make-micabs tag 'undefined-tag-standin))
  (store-field *undefined-tag-standin* 'spec 'halt)
  (setq *unresolved-symbolic-references* nil)
  (loop for bucket being the array-elements of *microinstruction-hash-table* do
    (loop for mic in bucket do
      (setf (mic-npc-successor mic)
            (resolve-symbolic-successor mic (mic-npc-successor mic) nil))
      (setf (mic-naf-successor mic)
            (resolve-symbolic-successor mic (mic-naf-successor mic) (mic-npc-successor mic)))
      ))
  (cond (*unresolved-symbolic-references*
         (format t "~&The following microcode routines were referenced ~
                    but don't seem defined:")
         (dolist (x *unresolved-symbolic-references*)
           (format t "~& ~S referenced by " (car x))
           (format:print-list t "~S" (cdr x))
           (format t "~&")))))

(defun resolve-symbolic-successor1 (mic succ drop-through)
  (cond ((null succ)
         (or drop-through
             (cerror t nil nil "drop-through successor to ~S, but nothing there!"
                     (mic-tag mic))))
        (t (resolve-symbolic-successor mic succ drop-through))))

(defun resolve-symbolic-successor (mic succ drop-through)
  (cond ((null succ) nil)
        ((symbolp succ)
         (or (cdr (assq succ *microinstruction-tag-alist*))
             (let ((elem (assq succ *unresolved-symbolic-references*)))
               (or elem (push (setq elem (ncons succ)) *unresolved-symbolic-references*))
               (push (mic-tag mic) (cdr elem))
               *undefined-tag-standin*)))
        ((atom succ) succ)              ;A micabs
        ((eq (car succ) 'skip)
         `(skip ,(resolve-symbolic-successor1 mic (cadr succ) drop-through)
                ,(resolve-symbolic-successor1 mic (caddr succ) drop-through)))
        ((eq (car succ) 'dispatch)
         `(dispatch
            . ,(loop for (cues mic2) in (cdr succ)
                     collect `(,cues ,(resolve-symbolic-successor1 mic mic2 nil)))))))
```

```
;;;; Microinstruction linker -- determine address constraints

(defun make-address-block (kind &aux length mask block)
  (selectq kind
    (skip (setq length 2 mask *skip-increment*))
    (dispatch (setq length 20 mask (* 17 *dispatch-increment*)))
    (dispatch-skip (setq length 40 mask (+ (* 17 *dispatch-increment*) *skip-increment*)))
    (otherwise (ferror nil "Huh?")))
  (setq block (make-address-block-internal kind kind :make-array (:length length)))
  (setf (address-block-bit-mask block) mask)
  (push block *address-block-list*)
  block)

(defun intern-address-block (kind alist)
  (setq alist (sortcar alist #'<))             ;Canonical ordering
  (or (gethash-equal alist *address-block-hash-table*)
      (let ((block (make-address-block kind)))
        (puthash-equal alist block *address-block-hash-table*)
        (loop for (pos . mic) in alist
              do (store-into-block mic block pos))
        block)))

(defun store-into-block (mic block pos)
  (aset mic block pos)
  (pushnew block (micabs-blocks mic)))

;Convert the successors that are blocks from the list-structure form used
;in micrels to the address-block defstruct.  Also create predecessor back-links.
(defun determine-address-constraints ()
  (loop for bucket being the array-elements of *microinstruction-hash-table* do
    (loop for mic in bucket do
      (setf (mic-npc-successor mic) (convert-successor (mic-npc-successor mic) mic))
      (setf (mic-naf-successor mic) (convert-successor (mic-naf-successor mic) nil)))))

(defun convert-successor (succ predecessor)
  (cond ((atom succ)                          ;NIL, a tag, or a micabs
         (and succ predecessor
              (pushnew predecessor (micabs-predecessors succ)))
         succ)
        ((eq (car succ) 'skip)
         (let ((block (intern-address-block 'skip
                                            (list (cons 0 (cadr succ))
                                                  (cons 1 (caddr succ))))))
           (if predecessor (pushnew predecessor (address-block-mic-predecessors block)))
           block))
        ((eq (car succ) 'dispatch)
         (if predecessor (ferror nil "read unhappy maknam"))
         (intern-address-block 'dispatch
                               (loop for (cues mic) in (cdr succ) nconc
                                 (loop for cue in cues
                                       collect (cons cue mic)))))
        (t (ferror nil "Hey!  Who turned out the lights?"))))

;Now that all of the blocks have been made, determine their successor relations.
;This may make new blocks, since unlike mics each block is only stored in one place.

;First pass: find all npc (consecutive address) relations between blocks.
; To avoid complications we always make new blocks to act as successors, but
; mark them as aliases of the old blocks so that later we can only instantiate
; one copy, if possible.
(defun determine-block-successors ()
  ;; This loop repeats until no new address blocks are created
  (loop for already-done = nil then previous-address-block-list
        as previous-address-block-list = *address-block-list*
        until (eq *address-block-list* already-done)
        do ;; This loop does each address block that was not done before
        (loop for lst = *address-block-list* then (cdr lst) until (eq lst already-done)
              as block = (car lst)
              ;; Does any mic in this block have an npc successor?
              as npc-successors-exist =
                   (loop for mic being the array-elements of block
                         thereis (and mic (typep (mic-npc-successor mic) 'micabs)))
              as skip-successors-exist =
                   (loop for mic being the array-elements of block
                         thereis (and mic (typep (mic-npc-successor mic) 'address-block)))
              as kind = (address-block-kind block)
              when (or npc-successors-exist skip-successors-exist) do
                (let ((succ (make-address-block
                              (if (and skip-successors-exist (eq kind 'dispatch))
                                  'dispatch-skip kind))))
                  (setf (address-block-predecessor succ) block)
                  (setf (address-block-successor block) succ)
                  (loop for mic being the array-elements of block using (index pos)
                        with skip-step = (if (eq kind 'skip) 1 20)
                        as succl = (and mic (mic-npc-successor mic))
                        when (typep succl 'micabs)
                          do (store-into-block succl succ pos)
                        else when (typep succl 'address-block)
                          do (push (list succ (\ pos skip-step))
                                   (address-block-aliases succl))
                             (loop for succl being the array-elements of succl
```

```
                         and pos upfrom (\ pos skip-step) by skip-step
                         do (store-into-block succl succ pos))))))

;Second pass -- find blocks with npc-predecessor mics that are not in blocks
; and consequently weren't seen in the first pass.  Also find blocks with
; component mics with npc-predecessor mics.  In either case we create a new
; block and make it the predecessor of the found block.  In the first case
; this completes the data structure that tells us what size and shape hole
; we need to find in control memory; in the second case it avoids unnecessarily
; making two copies of a mic.
; However, if the alternative to making two copies of a mic is to create a chain
; of 5 skip blocks in a row, which cannot be located when we have 8K control
; memory, then we would rather duplicate the mic.
(defun determine-other-successors ()
  ;; This loop repeats until no new address blocks are created
  (loop for already-done = nil then previous-address-block-list
        as previous-address-block-list = *address-block-list*
        until (eq *address-block-list* already-done)
        do ;; This loop does each address block that was not done before
        (loop for lst = *address-block-list* then (cdr lst) until (eq lst already-done)
              as block = (car lst)
              as chain-length = (loop as b = block then (address-block-successor b)
                                      while b
                                        while (eq (address-block-kind b) 'skip)
                                          count t)
              as block-predecessors =
                   (loop for mic in (address-block-mic-predecessors block)
                         when (and (null (micabs-blocks mic))
                                   (symbolp (mic-address-constraints mic))) ;NIL or UNIQUE
                           unless (memq mic res)
                             collect mic into res
                         finally (return res))
              as other-predecessors =
                   (loop for mic being the array-elements of block
                         unless (null mic)
                           nconc (loop for mic in (micabs-predecessors mic)
                                       when (symbolp (mic-address-constraints mic))
                                         when (< (+ (max-predecessor-chain-length mic)
                                                    chain-length)
                                                 5)
                                           unless (memq mic res)
                                             collect mic)
                                 into res
                           finally (return res))
              as predb = (address-block-predecessor block)
              with slot do
          ;;--- I'm fairly sure that I don't need to worry about aliases here
          ;; What we want to do is first store all the block-predecessors then
          ;; fill in the available gaps with other-predecessors.  However the
          ;; other-predecessors have stronger address requirements.  So we will
          ;; first do the block-predecessors, which may leave one location left
          ;; over for other-predecessors.  After that, fill in any available holes
          ;; with other-predecessors, or create a new predecessor block.
          (loop for mic in block-predecessors do
            ;; Find a place to put this predecessor, by force if necessary
            (loop doing (multiple-value (predb block)
                          (make-address-block-predecessor block predb))
                  until (loop for pos from 8 below (array-length predb)
                              when (null (aref predb pos))
                                return (setq slot pos))
                  do (setq predb nil))  ;This predb used up, make new one
            (store-into-block mic predb slot))
          ;; If a predecessor exists, and free slots fortuitously exist in the right
          ;; places, fill them with the other-predecessors.  If no predecessor exists,
          ;; and there are other-predecessors, it can't hurt (much!) [sic] to make one.
          (cond (other-predecessors
                 (multiple-value (predb block)
                   (make-address-block-predecessor block predb))
                 (loop for mic in other-predecessors
                       as target = (mic-npc-successor mic)
                       when (loop for succ being the array-elements of block using (index pos)
                                  thereis (and (eq succ target)
                                               (null (aref predb (setq slot pos)))))
                         do (store-into-block mic predb slot)))))))

;Make a block to preceed the given block, if necessary.
;If the second argument is non-NIL (we already have a predecessor available),
;then don't make a new one, except if this block is already located, in which
;case we make a copy of it and a predecessor of the copy.  This is necessary
;when the block's predecessor is a mic at a fixed address.
;If the second argument is NIL, then make a predecessor.  If the block already
;has a predecessor, make a copy of the block so that a second predecessor can exist.
;Two values: the preceding and succeeding blocks.
(defun make-address-block-predecessor (block predb)
  (prog ()
    (if (if (null predb)
            (address-block-predecessor block)
          (or (address-block-locations block)
              (return predb block)))
        (setq block (copy-address-block block)))
    (let ((predb (make-address-block (address-block-kind block))))
      (setf (address-block-successor predb) block)
```

```
    (setf (address-block-predecessor block) predb)
    (return (values predb block)))))

;Copy a block (and its successors) when space preceding the block is overcrowded
(defun copy-address-block (block &aux new)
  (setq new (make-address-block (address-block-kind block)))
  (push (list new 0) (address-block-aliases block))
  (loop for mic being the array-elements of block using (index pos)
        do (store-into-block mic new pos))
  (cond ((address-block-successor block)
         (setq block (copy-address-block (address-block-successor block)))
         (setf (address-block-predecessor block) new)
         (setf (address-block-successor new) block)))
  new)

(defun max-predecessor-chain-length (mic)
  (let ((preds (micabs-predecessors mic)))
    (if (null preds) 1          ;This test is unnecessary in the old loop by coincidence
        (1+ (loop for mic in preds              ;and superfluous in the new
                  maximize (max-predecessor-chain-length mic))))))
;;;; Microinstruction linker -- address assignment

(defun assign-fixed-addresses ()
  (setq *undefined-opcode-standin* (make-micabs tag '*undefined-opcode-standin*))
  (store-field *undefined-opcode-standin* 'spec 'halt)
  ;; Store halts in the dispatch locations for all undefined opcodes
  ;; and all defined but unimplemented opcodes
  (loop with ucode-alist = (cdr (assq *machine-version* *ucode-alist-alist*))
        for i from 0 to 1777            ;Opcode dispatch
        unless (and (= i 376) (eq *machine-version* 'proto))    ;no-operand-subdispatch
          unless (assq (aref *opcode-table* i) ucode-alist)
            do (aset *undefined-opcode-standin* *microinstruction-memory* (lsh i 2)))
  ;; Store any microinstructions that have no freedom of location at all
  (loop for bucket being the array-elements of *microinstruction-hash-table* do
    (loop for mic in bucket
      as con = (mic-address-constraints mic)
      do (cond ((numberp con) (locate-inst mic con))
               ((listp con) (dolist (loc con) (locate-inst mic loc))))))
  ;; Now go fill in any unused reserved locations with a halt instruction
  ;; so that no floating instructions will float into them
  (selectq *machine-version*
    (proto
     (store-default-inst 10000 *undefined-opcode-standin*)      ;Transport trap
     (loop for i from 10010 to 10015     ;Type trap (4 locs), map miss (2 locs)
           do (store-default-inst i *undefined-opcode-standin*))
     (loop for i from 10020 to 10022     ;IFU exceptions?
           do (store-default-inst i *undefined-opcode-standin*)))
    ((tmc tmc5)
     (loop for mem-state from 0 to 30 by 10 do
       (loop for i in '(0 1 4 5 6 7) do
         (store-default-inst (logior 10000 mem-state i) *undefined-opcode-standin*)))
     (store-default-inst 14000 *undefined-opcode-standin*)      ;IFU traps
     (store-default-inst 16000 *undefined-opcode-standin*))
    (otherwise (ferror nil "What are the trap addresses for ~S?" *machine-version*))))

(defun assign-floating-addresses (&aux (freep 0))
  ;; Now pack the address blocks into available free spaces
  (assign-address-blocks)
  ;; Now pack npc-chains of instructions not involving any blocks
  (assign-npc-chains)
  ;; Now assign any remaining instructions arbitrarily
  (loop for bucket being the array-elements of *microinstruction-hash-table* do
        (loop for mic in bucket
              do (setq freep (assign-floating-mic mic freep))))
  (if *unresolved-symbolic-references*
      (setq freep (assign-floating-mic *undefined-tag-standin* freep))))

(defun assign-floating-mic (mic freep)
  (or (micabs-addresses mic)
      (locate-inst mic
                   (loop until (null (aref *microinstruction-memory* freep))
                         do (incf freep)
                            (if (≥ freep *microinstruction-memory-size*)
                                (ferror nil "Gleep! Microinstruction memory overflow"))
                         finally (return freep))))
  freep)

(defun locate-inst (mic loc &aux tem)
  (cond ((null (setq tem (aref *microinstruction-memory* loc)))
         (aset mic *microinstruction-memory* loc)
         (push loc (micabs-addresses mic))
         ;If this is somebody's predecessor, he is now absolutely constrained.
         (let ((succ (mic-npc-successor mic)))
           (cond ((typep succ 'micabs)
                  (locate-inst succ (npc-next-loc loc)))
                 ((typep succ 'address-block)
                  (locate-address-block succ
                                        (logand (npc-next-loc loc)
                                                (lognot (address-block-bit-mask succ)))))))))
```

```
          ((neq tem mic)
           (ferror nil "Two different microinstructions trying to go in same location;~%
                  ~S and ~S"
                  (mic-tag mic) (mic-tag tem)))))

;Note that this does not remember the location nor link to successors
;Use this only for "fake" mic's
(defun store-default-inst (loc mic)
  (or (aref *microinstruction-memory* loc)
      (aset mic *microinstruction-memory* loc)))

(defun npc-next-loc (loc)
  (+ (* (// loc *npc-modulus*) *npc-modulus*)
     (\ (+ loc *npc-increment*) *npc-modulus*)))

;I don't really want to solve the general bin-packing problem, so I guess I will
;just assign the largest blocks first, and assign down from the top of memory,
;and hope for the best.  Doesn't fill holes in big blocks with little blocks!
;--- I'm fairly sure this is going to have to done over in a cleverer way
;    Well, it seems to work, doesn't it....
(defun assign-address-blocks  ()
  ;; Largest blocks first.  But only blocks without predecessors, and not
  ;; unnecessary duplicate aliases, need be located.
  (loop for block in (sort (loop for block in *address-block-list*
                                 when (and (null (address-block-predecessor block))
                                           (null (address-block-aliases block))
                                           (null (address-block-locations block)))
                                   collect block)
                           #'(lambda (b1 b2)
                               (> (address-block-size b1) (address-block-size b2))))
        with disp-freep = (- *microinstruction-memory-size* (* 17 *dispatch-increment*))
        with skip-freep = (- *microinstruction-memory-size* *skip-increment*)
        when (eq (address-block-kind block) 'skip)
          do (setq skip-freep (find-space-for-block block skip-freep))
          else do (setq disp-freep (find-space-for-block block disp-freep))))

(defun address-block-size (block)
  (if (address-block-successor block)
      (+ (array-length block) (address-block-size (address-block-successor block)))
      (array-length block)))

(defun find-space-for-block (block freep)
  (do ((b block (address-block-successor b))
       (bits 0 (logior (address-block-bit-mask b) bits))
       (width 0 (max (array-length b) width))
       (length 0 (1+ length)))
      ((null b)
       (decf freep length)
       (loop when (minusp freep)
               do (error 'microinstruction-memory-overflow
                         ':msg (format nil "Cannot locate chain of ~D blocks" length)
                         ':chain-head block)
             until (loop repeat length for pos upfrom freep
                         always (loop for pos upfrom pos by (logand bits (- bits))
                                      repeat width      ;skip/dispatch bits are adjacent!
                                      always (null (aref *microinstruction-memory* pos))))
             do (decf freep))
       (locate-address-block block freep)
       freep)))

;Locate all of the instructions in this address block, based on loc
;Note that an address-block can get located twice, if it is an npc-successor
;of two mic's both with fixed address constraints.
(defun locate-address-block (block loc)
  (push loc (address-block-locations block))
  (loop for mic being the array-elements of block
        as pos upfrom loc by (if (eq (address-block-kind block) 'skip)
                                 *skip-increment* *dispatch-increment*)
        unless (null mic)
          do (locate-inst mic pos))
  (if (address-block-successor block)
      (locate-address-block (address-block-successor block) (npc-next-loc loc))))

;Find all microinstruction chains that must be in consecutive addresses
;and are not already located (none of them are in blocks and the head of
;the chain is not assigned to a fixed address).  Find places in memory
;to stuff them.
(defun assign-npc-chains ()
  ;; This loop iterates over all unlocated chain heads, longest chains first
  (loop for (length . mic)
            in (sortcar (loop for bucket being the array-elements
                                               of *microinstruction-hash-table*
                              nconc (loop for mic in bucket
                                          when (and (null (micabs-addresses mic))
                                                    (null (micabs-predecessors mic))
                                                    (typep (mic-npc-successor mic) 'micabs))
                                            collect (cons (mic-npc-chain-length mic) mic)))
                        #'>)
        with freep = 0
        do (locate-inst mic (setq freep (find-space-for-chain freep length mic)))
           (incf freep length)))
```

```
(defun mic-npc-chain-length (mic)
  (loop for mic = mic then (mic-npc-successor mic) until (null mic)
        count t))

(defun find-space-for-chain (freep length mic)
  (loop with block-start = nil
        for freep upfrom freep by 1
        when (≥ freep *microinstruction-memory-size*)
          do (error 'microinstruction-memory-overflow
                    ':msg (format nil "Can't locate ~D-entry NPC chain of microinstructions"
                                  length)
                    ':chain-head mic)
        when (null (aref *microinstruction-memory* freep))
          do (cond ((null block-start) (setq block-start freep))
                   ((zerop (logand 377 freep)) (setq block-start freep))
                   ((= (- (1+ freep) block-start) length) (return block-start)))
        else do (setq block-start nil)))

;A debugging function
(defun print-chain (mic-or-block) ;or nil
  (typecase mic-or-block
    (micabs
     (format t "~&MIC: ~A" (mic-tag mic-or-block))
     (print-chain (mic-npc-successor mic-or-block)))
    (address-block
     (format t "~&~A-BLOCK[~O]: "
             (address-block-kind mic-or-block) (array-length mic-or-block))
     (format:print-list standard-output "~A"
                        (loop for mic being the array-elements of mic-or-block
                              collect (if mic (mic-tag mic) "-")))
     (print-chain (address-block-successor mic-or-block)))))

(defflavor microinstruction-memory-overflow (msg chain-head) (error)
  :initable-instance-variables)

(defmethod (microinstruction-memory-overflow :report) (stream)
  (format stream "Gleep! Microinstruction memory overflow~%~A~%The chain is:~%" msg)
  (let ((standard-output stream)
        (prinlength nil))
    (print-chain chain-head)))

(compile-flavor-methods microinstruction-memory-overflow)
;;;; Microinstruction linker -- plug in successor addresses

(defun plug-in-successors ()
  (loop for loc from 0 below *microinstruction-memory-size* with succ
        as mic = (aref *microinstruction-memory* loc)
        unless (null mic)
          do (if (setq succ (mic-naf-successor mic))
                 (store-number mic (get-mic-or-block-address succ) u-naf))
             (if (setq succ (mic-npc-successor mic))
                 (cond ((typep succ 'micabs)
                        (or (eq (aref *microinstruction-memory* (npc-next-loc loc)) succ)
                            (ferror nil "~S's npc-successor isn't there!" (mic-tag mic))))
                       ((typep succ 'address-block)
                        (or (address-block-effectively-at
                              succ
                              (logand (npc-next-loc loc)
                                      (lognot (address-block-bit-mask succ))))
                            (ferror nil "~S's npc-successor isn't there!" (mic-tag mic))))))))

(defun get-mic-or-block-address (x)
  (cond ((typep x 'micabs) (car (micabs-addresses x)))
        ((typep x 'address-block)
         (or (car (address-block-locations x))
             (let ((alias (caar (address-block-aliases x))))
               (+ (get-mic-or-block-address alias)
                  (* (cadar (address-block-aliases x))
                     (logand (address-block-bit-mask alias)
                             (- (address-block-bit-mask alias))))))))))

(defun address-block-effectively-at (block loc)
  (or (memq loc (address-block-locations block))
      (loop for (b offset) in (address-block-aliases block)
            thereis (address-block-effectively-at b
                      (+ (* offset (logand (address-block-bit-mask b)
                                           (- (address-block-bit-mask b))))
                         loc)))))

(defun resolve-constants ()
  (setq *a-constant-list* (resolve-constants1 *a-constant-hash-table*))
  (setq *b-constant-list* (resolve-constants1 *b-constant-hash-table*)))

(defun resolve-constants1 (hash-table)
  (local-declare ((special constants))
    (let ((constants nil))
      (maphash-equal #'(lambda (val loc)
                         (push (cons loc
```

```
                                   (cond ((numberp val) val)
                                         ((and (listp val) (eq (car val) 'build-task-state))
                                          (resolve-task-state (cdr val)))
                                         (t (ferror "~S illegal constant" val))))
                               constants))
                         hash-table)
    constants)))

(defun resolve-task-state (options)
  (let ((cpc nil) (npc nil) (csp 17))
    (loop for (opt val) on options by 'cddr do
      (selectq opt
        (cpc (setq cpc (resolve-cmem-location val)))
        (npc (setq npc (resolve-cmem-location val)))
        (csp (setq csp val))
        (otherwise (ferror "~S illegal in BUILD-TASK-STATE" opt))))
    (or cpc (ferror "CPC not specified in ~S" (cons 'build-task-state options)))
    (or npc (setq npc (dpb (1+ cpc) 0010 cpc)))
    (dpb csp 3404 (dpb npc 1616 cpc))))

(defun resolve-cmem-location (loc &aux mic)
  (cond ((symbolp loc)
         (if (setq mic (cdr (assq loc *microinstruction-tag-alist*)))
             (car (micabs-addresses mic))
           (format error-output "~&WARNING: ~S not found for build-task-state~%" loc)
           0))
        ((numberp loc) loc)
        ((and (listp loc) (eq (car loc) 'npc-successor))
         (setq loc (resolve-cmem-location (cadr loc)))
         (dpb (1+ loc) 0010 loc))
        (t (ferror "~S illegal cmem-location for build-task-state" loc))))
;;;; File interface

(defun new-microcode-version ()
  (let ((si:*system-being-made* (si:find-system-named "MICROCODE"))
        (si:*silent-p* nil))
    (si:increment-compiled-version-1)
    (si:increment-loaded-version-1)))

;--- Someday these might be a MAKE-SYSTEM transformation

(defun compile-the-microcode (*machine-version*)
  (write-the-microcode *machine-version* t))

(defun write-the-microcode (*machine-version*
                            &optional (link-p nil)
                                      (name (string-append *machine-version* "-MIC"))
                                      (version (si:get-system-version "MICROCODE")))
  (or (boundp 'lcold:*most-negative-immediate-number*)
      (lcold:setup-crucial-variables nil))
  (let ((pathname (fs:make-pathname ':host "SYS" ':directory "L-UCODE"
                                    ':name name ':version version)))
    (with-open-file (log (funcall pathname ':new-type "LOG") '(:print))
      (let ((standard-output (make-broadcast-stream log standard-output)))
        (if link-p (link-the-microcode *machine-version*))

        ;; Write out various files
        (write-mic-file (funcall pathname ':new-type "MIC") name version)
        (write-sym-file (funcall pathname ':new-type "SYM") name version)
        (write-err-file (funcall pathname ':new-type "ERR") name version)))))

(defun write-mic-file (pathname name version)
  (with-open-file (stream pathname '(:out :fixnum))
    (let* ((length (min (string-length name) 32.))
           (name16 (make-array (// (1+ length) 2) ':type 'art-16b ':displaced-to name)))
      (funcall stream ':tyo length)
      (funcall stream ':string-out name16))
    (funcall stream ':tyo version)

    ;; Type map
    (let ((ntypes (lsh (length *type-maps*) 6)))
      (format t "~&Type map - ~D locations" ntypes)
      (funcall stream ':tyo 1)
      (funcall stream ':tyo 0)
      (funcall stream ':tyo ntypes)
      (funcall stream ':tyo 1)
      (loop for i from 0 below ntypes
            do (funcall stream ':tyo (aref *type-map* i))))

    ;; A and B memories
    (write-a-b-memory stream 2 *a-memory-values* *a-constant-list* "A")
    (write-a-b-memory stream 3 *b-memory-values* *b-constant-list* "B")

    ;; Control memory
    (loop with length = (array-active-length *microinstruction-memory*)
          with total = 0 with patches
          for start from 0 below length
          as mic = (aref *microinstruction-memory* start)
          do (cond ((null mic))
                   ((null (setq patches (mic-load-time-patches mic))
```

```
                (let ((count (loop for address from start below length
                                   as mic = (aref *microinstruction-memory* address)
                                   while (not (null mic))
                                   while (null (mic-load-time-patches mic))
                                   sum 1)))
                  (incf total count)
                  (funcall stream ':tyo 4)
                  (funcall stream ':tyo start)
                  (funcall stream ':tyo count)
                  (funcall stream ':tyo 7)
                  (loop repeat count
                        for address from start
                        as mic = (aref *microinstruction-memory* address)
                        when (not (null mic))
                          do (loop with val = (mic-code mic)
                                   repeat 7 for ppss from 0020 by 2000
                                   do (funcall stream ':tyo (ldb ppss val))))
                  (incf start (1- count))))
               (t
                ;; Write cmem location that needs to be patched:
                ;; 104 <address> <n-patches> 7 raw-cmem-data patches...
                ;;   1 6-bytes-of-name -- store slot number of card into U AMWA<9:5>
                (incf total 1)
                (funcall stream ':tyo 104)
                (funcall stream ':tyo start)
                (funcall stream ':tyo (length patches))
                (funcall stream ':tyo 7)
                (loop with val = (mic-code mic)
                      repeat 7 for ppss from 0020 by 2000
                      do (funcall stream ':tyo (ldb ppss val)))
                (loop for (type arg) in patches do
                  (selectq type

                  (symbolic-lbus-slot
                   (funcall stream ':tyo 1)
                   (let ((name (string-append (string arg) "      ")))
                     (funcall stream ':tyo (dpb (aref name 1) 1010 (aref name 0)))
                     (funcall stream ':tyo (dpb (aref name 3) 1010 (aref name 2)))
                     (funcall stream ':tyo (dpb (aref name 5) 1010 (aref name 4)))))
                  (otherwise (ferror "~S unknown load-time patch type" type))))))
          finally (format t "~&C mem - ~D locations" total))

    (funcall stream ':tyo 0)))                          ;Mark EOF

(defun write-sym-file (pathname name version)
  (with-open-file (stream pathname '(:out))
    (pkg-bind "MICRO"
      (let ((base 8))
        (format stream ";;; -*-Mode:Lisp;Base:8-*-~%(VERSION ~S ~D.)~%" name version)
        (funcall stream ':string-out "
/(A-MEMORY
")
        (dolist (elem *a-memory-symbols*)
          (funcall stream ':tyo #\sp)
          (prin1 elem stream)
          (funcall stream ':tyo #\cr))
        (funcall stream ':string-out ")
")

        (funcall stream ':string-out "
/(B-MEMORY
")
        (dolist (elem *b-memory-symbols*)
          (funcall stream ':tyo #\sp)
          (prin1 elem stream)
          (funcall stream ':tyo #\cr))
        (funcall stream ':string-out ")
")

        (funcall stream ':string-out "
/(C-MEMORY
")
        (dolist (elem *microinstruction-tag-alist*)
          (funcall stream ':tyo #\sp)
          (prin1 (cons (car elem) (micabs-addresses (cdr elem))) stream)
          (funcall stream ':tyo #\cr))
        (loop for mic being the array-elements of *microinstruction-memory*
              using (index address)
              when (not (null mic))
              do (let ((name (mic-tag mic)))
                   (cond ((and name (not (assq name *microinstruction-tag-alist*)))
                          (funcall stream ':tyo #\sp)
                          (prin1 (list name address) stream)
                          (funcall stream ':tyo #\cr)))))
        (funcall stream ':string-out ")
")))))

(defun write-err-file (pathname name version)
  (with-open-file (stream pathname '(:out))
    (pkg-bind "MICRO"
      (let ((base 8))
```

```
        (format stream ";;; -*-Mode:Lisp;Base:8-*-~%(VERSION ~S ~D.)~%" name version)
        (funcall stream ':string-out "
/(ERROR-TABLE
")
        (loop for mic being the array-elements of *microinstruction-memory*
              using (index address)
              when mic do (let ((err (mic-error-table mic)))
                            (cond (err
                                   (funcall stream ':tyo #\sp)
                                   (prin1 (cons address err) stream)
                                   (funcall stream ':tyo #\cr)))))
        (funcall stream ':string-out ")")))))

(defun write-a-b-memory (stream memory fixed-values constant-list name)
  (let ((mem-data (append fixed-values constant-list nil)))
     (setq mem-data (sortcar mem-data '<))
     (format t "~&~A memory - ~D locations" name (length mem-data))
     (loop while mem-data
           as start = (caar mem-data)
           as count = (loop for address from start
                            for (loc . val) in mem-data
                            while (= loc address)
                            sum 1)
          do (funcall stream ':tyo memory)
             (funcall stream ':tyo start)
             (funcall stream ':tyo count)
             (funcall stream ':tyo 3)          ;36-bits worth
             (loop repeat count
                   as val = (cdar mem-data)
                   do (loop repeat 3 for ppss from 0020 by 2000
                            do (funcall stream ':tyo (ldb ppss val)))
                      (pop mem-data)))))
```

F:>LMach>Ucode>SYSDCL.LISP.64

```
;;; -*- Mode:Lisp; Package:User; Base:8; Lowercase:yes -*-
;;; (c) Copyright 1982, Symbolics, Inc.

; System declaration for L-machine microcode compiler, simulator, and code

(package-declare micro global 4000)

;The microcode system consists of the compiler and the microcode.  I'd like
;to be able to say that all transformations on the microcode depend on having
;the compiler loaded, but there doesn't appear to be a reasonable way to say that.
;(make-system 'microcompiler) can be done manually when necessary.

(defsystem micro
  (:pathname-default "SYS: L-UCODE;")
  ;(:package Micro)
  (:component-systems microcompiler microcode))

(defsystem microcompiler
  (:pathname-default "SYS: L-UCODE;")
  (:module zwei ("ZWEI") :package "Zwei")
  (:module simulator ("SIM"))
  (:module compiler1 ("UU" "CHECK" "UL"))
  (:module compiler2 ("UH"))
  (:module simulator2 ("SIMX"))
  (:module architecture-macros ("UA" "UUX"))
  (:module architecture-defs ("L-SYS; SYSDEF" "L-SYS; SYSDF1")
          :package "Micro")
  (:module instruction-defs ("L-SYS; OPDEF") :package "Micro")
  (:module sprinter ("BETTER-SPRINTER"))
  (:module make-system ("MAKSYS"))
  (:compile-load make-system)
  (:compile-load zwei)
  (:compile-load simulator)
  (:compile-load compiler1 (:fasload simulator make-system))
  (:compile-load compiler2 (:fasload simulator compiler1 make-system))
  (:readfile instruction-defs (:fasload simulator compiler1))
  (:readfile architecture-defs ((:fasload simulator compiler1) (:readfile instruction-defs)))
  (:compile-load simulator2
     ((:fasload simulator compiler1) (:readfile architecture-defs instruction-defs))
     ((:fasload simulator compiler1) (:readfile architecture-defs instruction-defs)))
  (:compile-load architecture-macros ((:fasload simulator compiler1 simulator2)
                                       (:readfile architecture-defs instruction-defs))
                                      ((:fasload simulator compiler1 simulator2)
                                       (:readfile architecture-defs instruction-defs)))
  (:compile-load sprinter))
;Transformations for microcode
;MAKE-SYSTEM isn't as general as it might be, so we need different transformations
;for each machine.

;Transformations for prototype machine (no memory control)
(si:define-simple-transformation :proto-micro-load
        micro:proto-fasload-1 si:file-newer-than-installed-p ("PROTO-MICREL") NIL
        ("Load prototype microcode" "Loading prototype microcode"
         "loaded prototype microcode")
        NIL)
```

```
(si:define-simple-transformation :proto-micro-compile
       micro:proto-compile-file-1 si:file-newer-than-file-p ("LISP") ("PROTO-MICREL")
       ("Compile prototype microcode" "Compiling prototype microcode"
        "compiled prototype microcode")
       t)
(defmacro (:proto-micro-compile-load si:defsystem-macro) (input &optional com-dep load-dep
                                                                          com-cond load-cond)
  `(:proto-micro-load (:proto-micro-compile ,input ,com-dep ,com-cond)
                      ,load-dep ,load-cond))
(defmacro (:proto-micro-compile-load-init si:defsystem-macro) (input add-dep
                                                               &optional com-dep load-dep
                                                               &aux function)
  (setq function
       (let-closed ((si:*additional-dependent-modules*
                     (si:parse-module-components add-dep si:*system-being-defined*)))
         'si:compile-load-init-condition))
  `(:proto-micro-load (:proto-micro-compile ,input ,com-dep ,function) ,load-dep))

;Transformations for #2 machine (temporary memory control)
(si:define-simple-transformation :tmc-micro-load
       micro:tmc-fasload-1 si:file-newer-than-installed-p ("TMC-MICREL") NIL
       ("Load TMC microcode" "Loading TMC microcode" "loaded TMC microcode")
       NIL)
(si:define-simple-transformation :tmc-micro-compile
       micro:tmc-compile-file-1 si:file-newer-than-file-p ("LISP") ("TMC-MICREL")
       ("Compile TMC microcode" "Compiling TMC microcode" "compiled TMC microcode")
       t)
(defmacro (:tmc-micro-compile-load si:defsystem-macro) (input &optional com-dep load-dep
                                                                        com-cond load-cond)
  `(:tmc-micro-load (:tmc-micro-compile ,input ,com-dep ,com-cond)
                    ,load-dep ,load-cond))
(defmacro (:tmc-micro-compile-load-init si:defsystem-macro) (input add-dep
                                                             &optional com-dep load-dep
                                                             &aux function)
  (setq function
       (let-closed ((si:*additional-dependent-modules*
                     (si:parse-module-components add-dep si:*system-being-defined*)))
         'si:compile-load-init-condition))
  `(:tmc-micro-load (:tmc-micro-compile ,input ,com-dep ,function) ,load-dep))

;Transformations for rev-5 temporary memory control
(si:define-simple-transformation :tmc5-micro-load
       micro:tmc5-fasload-1 si:file-newer-than-installed-p ("TMC5-MICREL") NIL
       ("Load TMC5 microcode" "Loading TMC5 microcode" "loaded TMC5 microcode")
       NIL)
(si:define-simple-transformation :tmc5-micro-compile
       micro:tmc5-compile-file-1 si:file-newer-than-file-p ("LISP") ("TMC5-MICREL")
       ("Compile TMC5 microcode" "Compiling TMC5 microcode" "compiled TMC5 microcode")
       t)
(defmacro (:tmc5-micro-compile-load si:defsystem-macro) (input &optional com-dep load-dep
                                                                         com-cond load-cond)
  `(:tmc5-micro-load (:tmc5-micro-compile ,input ,com-dep ,com-cond)
                     ,load-dep ,load-cond))
(defmacro (:tmc5-micro-compile-load-init si:defsystem-macro) (input add-dep
                                                              &optional com-dep load-dep
                                                              &aux function)
  (setq function
       (let-closed ((si:*additional-dependent-modules*
                     (si:parse-module-components add-dep si:*system-being-defined*)))
         'si:compile-load-init-condition))
  `(:tmc5-micro-load (:tmc5-micro-compile ,input ,com-dep ,function) ,load-dep))

;Transformations for production machine (memory control with IFU)
(si:define-simple-transformation :ifu-micro-load
       micro:ifu-fasload-1 si:file-newer-than-installed-p ("IFU-MICREL") NIL
       ("Load IFU microcode" "Loading IFU microcode" "loaded IFU microcode")
       NIL)
(si:define-simple-transformation :ifu-micro-compile
       micro:ifu-compile-file-1 si:file-newer-than-file-p ("LISP") ("IFU-MICREL")
       ("Compile IFU microcode" "Compiling IFU microcode" "compiled IFU microcode")
       t)
(defmacro (:ifu-micro-compile-load si:defsystem-macro) (input &optional com-dep load-dep
                                                                        com-cond load-cond)
  `(:ifu-micro-load (:ifu-micro-compile ,input ,com-dep ,com-cond)
                    ,load-dep ,load-cond))
(defmacro (:ifu-micro-compile-load-init si:defsystem-macro) (input add-dep
                                                             &optional com-dep load-dep
                                                             &aux function)
  (setq function
       (let-closed ((si:*additional-dependent-modules*
                     (si:parse-module-components add-dep si:*system-being-defined*)))
         'si:compile-load-init-condition))
  `(:ifu-micro-load (:ifu-micro-compile ,input ,com-dep ,function) ,load-dep))

;Transformations for simulator
(si:define-simple-transformation :sim-micro-load
       micro:sim-fasload-1 si:file-newer-than-installed-p ("SIM-QFASL") NIL
       ("Load simulated microcode" "Loading simulated microcode"
        "loaded simulated microcode")
       NIL)
```

```
(si:define-simple-transformation :sim-micro-compile
        micro:sim-compile-file-1 si:file-newer-than-file-p ("LISP") ("SIM-QFASL")
        ("Compile simulated microcode" "Compiling simulated microcode"
         "compiled simulated microcode")
        t)
(defmacro (:sim-micro-compile-load si:defsystem-macro) (input &optional com-dep load-dep
                                                                         com-cond load-cond)
  `(:sim-micro-load (:sim-micro-compile ,input ,com-dep ,com-cond)
                    ,load-dep ,load-cond))
(defmacro (:sim-micro-compile-load-init si:defsystem-macro) (input add-dep
                                                              &optional com-dep load-dep
                                                              &aux function)
  (setq function
        (let-closed ((si:*additional-dependent-modules*
                      (si:parse-module-components add-dep si:*system-being-defined*)))
          'si:compile-load-init-condition))
  `(:sim-micro-load (:sim-micro-compile ,input ,com-dep ,function) ,load-dep))
(defsystem microcode
  (:pathname-default "SYS: L-UCODE;")
  (:patchable)                               ;For the sake of %MICROCODE-VERSION
  (:not-in-disk-label)
  (:component-systems tmc-microcode))   ;Load just this version now

(comment ;this doesn't work any more, some of the macros have been diked out
(defsystem proto-microcode
  (:pathname-default "SYS: L-UCODE;")
  (:module call-defs ("FUNCALL"              ;Macro definitions for function calling
                      "FUNCALL2" "CATCH"))   ;defareg's used in FUNCALL3
  (:module call ("FUNCALL1"                  ;Expand the function-call macros
                 "FUNCALL3"))                ;Random function-call routines
  (:module arithmetic-defs "ARITH-ESCAPE")   ;Definitions needed to compile arithmetic
  (:module arithmetic "ARITH")
  (:module multiply-divide ("MULTIPLY" "DIVISION"))
  (:module array ("ARRAY"))
  (:module control ("CONTROL"))
  (:module other-microcode ("BASIC" "BRANCH" "PREDICATE" "SUBPRIM" "SYM" "BIND"
                            "STACK-BUFFER" "SG" "FLAVOR" "IFU"
                            "AMEM-MAP" "PROTO-TRAP" "BITBLT"))
  (:module floating-point ("FLOAT"))
  (:module microcode (call-defs call array other-microcode floating-point))

  (:proto-micro-compile-load call-defs)
  (:proto-micro-compile-load-init call call-defs (:proto-micro-load call-defs)
                                                 (:proto-micro-load call-defs))
  (:proto-micro-compile-load arithmetic-defs)
  (:proto-micro-compile-load multiply-divide (:proto-micro-load arithmetic-defs))
  (:proto-micro-compile-load arithmetic (:proto-micro-load arithmetic-defs multiply-divide))
  (:proto-micro-compile-load array (:proto-micro-load arithmetic-defs multiply-divide))
  (:proto-micro-compile-load control)
  (:proto-micro-compile-load other-microcode (:proto-micro-load control))
  (:proto-micro-compile-load floating-point
                             (:proto-micro-load arithmetic-defs multiply-divide)))
);comment

(defsystem tmc-microcode
  (:pathname-default "SYS: L-UCODE;")
  (:module call-defs ("FUNCALL"              ;Macro definitions for function calling
                      "FUNCALL2" "CATCH"))   ;defareg's used in FUNCALL3
  (:module call ("FUNCALL1"                  ;Expand the function-call macros
                 "FUNCALL3"))                ;Random function-call routines
  (:module arithmetic-defs "ARITH-ESCAPE")   ;Definitions needed to compile arithmetic
  (:module arithmetic "ARITH")
  (:module multiply-divide ("MULTIPLY" "DIVISION"))
  (:module array ("ARRAY"))
  (:module control ("CONTROL"))
  (:module other-microcode ("BASIC" "BRANCH" "PREDICATE" "SUBPRIM" "SYM" "BIND"
                            "STACK-BUFFER" "SG" "FLAVOR" "MAP" "TRAP" "BITBLT"))
  (:module disk "DISK")
  (:module net "NET")
  (:module floating-point ("FLOAT"))
  (:module microcode (call-defs call array other-microcode floating-point))

  (:tmc-micro-compile-load call-defs)
  (:tmc-micro-compile-load-init call call-defs (:tmc-micro-load call-defs)
                                               (:tmc-micro-load call-defs))
  (:tmc-micro-compile-load arithmetic-defs)
  (:tmc-micro-compile-load multiply-divide (:tmc-micro-load arithmetic-defs))
  (:tmc-micro-compile-load arithmetic (:tmc-micro-load arithmetic-defs multiply-divide))
  (:tmc-micro-compile-load array (:tmc-micro-load arithmetic-defs multiply-divide))
  (:tmc-micro-compile-load control)
  (:tmc-micro-compile-load other-microcode (:tmc-micro-load control))
  (:tmc-micro-compile-load disk)
  (:tmc-micro-compile-load net (:tmc-micro-load disk))
  (:tmc-micro-compile-load floating-point (:tmc-micro-load arithmetic-defs multiply-divide)))

(defsystem tmc5-microcode
  (:pathname-default "SYS: L-UCODE;")
  (:module call-defs ("FUNCALL"              ;Macro definitions for function calling
                      "FUNCALL2" "CATCH"))   ;defareg's used in FUNCALL3
  (:module call ("FUNCALL1"                  ;Expand the function-call macros
                 "FUNCALL3"))                ;Random function-call routines
```

```
  (:module arithmetic-defs "ARITH-ESCAPE")       ;Definitions needed to compile arithmetic
  (:module arithmetic "ARITH")
  (:module multiply-divide ("MULTIPLY" "DIVISION"))
  (:module array ("ARRAY"))
  (:module control ("CONTROL"))
  (:module other-microcode ("BASIC" "BRANCH" "PREDICATE" "SUBPRIM" "SYM" "BIND"
                            "STACK-BUFFER" "SG" "FLAVOR" "MAP" "TRAP" "BITBLT"))
  (:module disk "DISK")
  (:module net "NET")
  (:module floating-point ("FLOAT"))
  (:module microcode (call-defs call array other-microcode floating-point))

  (:tmc5-micro-compile-load call-defs)
  (:tmc5-micro-compile-load-init call call-defs (:tmc5-micro-load call-defs)
                                                (:tmc5-micro-load call-defs))
  (:tmc5-micro-compile-load arithmetic-defs)
  (:tmc5-micro-compile-load multiply-divide (:tmc5-micro-load arithmetic-defs))
  (:tmc5-micro-compile-load arithmetic (:tmc5-micro-load arithmetic-defs multiply-divide))
  (:tmc5-micro-compile-load array (:tmc5-micro-load arithmetic-defs multiply-divide))
  (:tmc5-micro-compile-load control)
  (:tmc5-micro-compile-load other-microcode (:tmc5-micro-load control))
  (:tmc5-micro-compile-load disk)
  (:tmc5-micro-compile-load net (:tmc5-micro-load disk))
  (:tmc5-micro-compile-load floating-point
                            (:tmc5-micro-load arithmetic-defs multiply-divide)))

(defsystem ifu-microcode
  (:pathname-default "SYS: L-UCODE;")
  (:module call-defs ("FUNCALL"                  ;Macro definitions for function calling
                      "FUNCALL2" "CATCH"))       ;defareg's used in FUNCALL3
  (:module call ("FUNCALL1"                      ;Expand the function-call macros
                 "FUNCALL3"))                    ;Random function-call routines
  (:module arithmetic-defs "ARITH-ESCAPE")       ;Definitions needed to compile arithmetic
  (:module arithmetic "ARITH")
  (:module multiply-divide ("MULTIPLY" "DIVISION"))
  (:module array ("ARRAY"))
  (:module control ("CONTROL"))
  (:module other-microcode ("BASIC" "BRANCH" "PREDICATE" "SUBPRIM" "SYM" "BIND"
                            "STACK-BUFFER" "SG" "FLAVOR" "MAP" "TRAP" "BITBLT"))
  (:module disk "DISK")
  (:module net "NET")
  (:module floating-point ("FLOAT"))
  (:module microcode (call-defs call array other-microcode floating-point))

  (:ifu-micro-compile-load call-defs)
  (:ifu-micro-compile-load-init call call-defs (:ifu-micro-load call-defs)
                                               (:ifu-micro-load call-defs))
  (:ifu-micro-compile-load arithmetic-defs)
  (:ifu-micro-compile-load multiply-divide (:ifu-micro-load arithmetic-defs))
  (:ifu-micro-compile-load arithmetic (:ifu-micro-load arithmetic-defs multiply-divide))
  (:ifu-micro-compile-load array (:ifu-micro-load arithmetic-defs multiply-divide))
  (:ifu-micro-compile-load control)
  (:ifu-micro-compile-load other-microcode (:ifu-micro-load control))
  (:ifu-micro-compile-load disk)
  (:ifu-micro-compile-load net (:ifu-micro-load disk))
  (:ifu-micro-compile-load floating-point (:ifu-micro-load arithmetic-defs multiply-divide)))

(defsystem sim-microcode
  (:pathname-default "SYS: L-UCODE;")
  (:module call-defs ("FUNCALL"                  ;Macro definitions for function calling
                      "FUNCALL2" "CATCH"))       ;defareg's used in FUNCALL3
  (:module call ("FUNCALL1"                      ;Expand the function-call macros
                 "FUNCALL3"))                    ;Random function-call routines
  (:module arithmetic-defs "ARITH-ESCAPE")       ;Definitions needed to compile arithmetic
  (:module arithmetic "ARITH")
  (:module multiply-divide ("MULTIPLY" "DIVISION"))
  (:module array ("ARRAY"))
  (:module other-microcode ("BASIC" "BRANCH" "PREDICATE" "SUBPRIM" "SYM" "BIND"
                            "STACK-BUFFER" "SG" "FLAVOR" "IFU" "BITBLT"))
  (:module floating-point ("FLOAT"))
  (:module arithmetic-instructions "ARITH")
  (:module microcode (call-defs call array other-microcode floating-point))
  ;I am apparently not permitted by the tastefulness committee to name my files .SIM
  ;(:module test-cases ("FACT.SIM" "FAKE-ARRAY"))

  (:sim-micro-compile-load call-defs)
  (:sim-micro-compile-load-init call call-defs (:sim-micro-load call-defs)
                                               (:sim-micro-load call-defs))
  (:sim-micro-compile-load arithmetic-defs)
  (:sim-micro-compile-load multiply-divide (:sim-micro-load arithmetic-defs))
  (:sim-micro-compile-load arithmetic (:sim-micro-load arithmetic-defs multiply-divide))
  (:sim-micro-compile-load array (:sim-micro-load arithmetic-defs multiply-divide))
  (:sim-micro-compile-load other-microcode)
  (:sim-micro-compile-load floating-point (:sim-micro-load arithmetic-defs multiply-divide))
  ;(:readfile test-cases ;(:fasload microcode)
                          (:fasload call-defs call other-microcode))
  )
```

F:>lmach>ucode>ZWEI.LISP.2

```
;;; -*- Mode:LISP; Package:ZWEI; Base:8; Lowercase: T -*-

(login-eval (set-comtab-return-undo *standard-comtab*
                                    '(#\Hyper-Super-X com-micro-expand-sexp)))

(defcom com-micro-expand-sexp
        "Microexpand S-expression. With region, microexpand region" ()
  (let ((stream (rest-of-interval-stream (point))))
    (let ((form (read stream '*eof*)))
      (and (eq form '*eof*) (barf))
      (micro:better-sprinter (micro:microexpand form))))
  dis-none)
```

F:>lmach>ucode>uux.lisp.6

```
;;; -*- Mode:Lisp; Package:Micro; Base:8; Lowercase:yes -*-
;;; (c) Copyright 1982, Symbolics, Inc.

; This file contains stuff that would be in UU except that it cannot be
; loaded until after the system definition file has been read in

(defconst *unduplicated-data-types*
          (remq 'dtp-fix (remq 'dtp-float *data-types* 15.) 15.))

;The type map for normal arithmetic, which has cond for non-fixnum numbers
;and bad-argument trap for non-numbers.
(defconst *arithmetic-type-map*
  '(((dtp-fix))
    ((dtp-float dtp-extended-number) cond)
    (,(types-other-than '(dtp-fix dtp-float dtp-extended-number)) trap-0)))

;Arithmetic trap dispatches on ABUS<33:32>|BBUS<33:32>
;3 in either field can't happen, if a type check was done
;Unfortunately this isn't really true, since Bbus type checking incomplete
(defconst *arithmetic-trap-dispatch-cues-alist*
          '((extnum-extnum . 0)
            (extnum-fixnum . 1)
            (extnum-flonum . 2)
            (fixnum-extnum . 4)
            (fixnum-fixnum . 5)
            (fixnum-flonum . 6)
            (flonum-extnum . 10)
            (flonum-fixnum . 11)
            (flonum-flonum . 12)))

;Storing into memory
;The type map for normal storing, which simply identifies whether or
;not a pointer is being stored.  This is what enables the gc tag hardware.
(defconst *storing-type-map*
        '(((dtp-null dtp-nil dtp-symbol dtp-extended-number
            dtp-external-value-cell-pointer dtp-locative
            dtp-list dtp-compiled-function dtp-array dtp-closure
            dtp-instance dtp-header-p dtp-even-pc
            dtp-one-q-forward dtp-header-forward dtp-odd-pc dtp-monitor-forward)
           pointer)))

;Element 0 is always the no-trap type map
(if (null *type-maps*)
    (assign-type-map nil))
```

F:>lmach>ucode>uu.lisp.429

```
;;; -*- Mode:Lisp; Package:Micro; Base:8; Lowercase:yes -*-
;;; (c) Copyright 1982, Symbolics, Inc.

;Primitive forms of microcode:
;       (microinstruction field value field value...)
;       (microsequence instruction instruction...)
;         microsequence always contains at least two instructions
;       (microdata place code)
;         place is where in the machine the data is (typically a bus)
;         code is microcode to put it there (instruction or sequence)
;       (microcondition condition sense code)
;         condition is the name of a skip condition in the machine
;         and code is microcode to put a boolean condition into it
;         sense is one of the symbols true, false
;
;For non-primitive forms of microcode, see the defmicros below.
;Particularly important are:
;       (sequential code code code...)
;         Generates a microsequence.  Note that the last piece of code
;         may be a microdata/microcondition and the right thing will happen.
;       (parallel code code code...)
;         Does all the operations in parallel, barfing if that is impossible.
;         When sequences are done "in parallel", the result is a sequence;
;         the first state of a sequence is done in parallel with what comes
;         before it in the 'parallel' form, and the last state is done in
;         parallel with what comes after it.
```

```
;-------------------------------------------------------
;To do: More primitive operations
;       ALU operations need to have word length (28 or 32)
;               (actually I don't think they do)
;       ASSIGN to a byte trashes the cdr code of the word assigned to.
;         Ought to preserve it unless it is bbus or set-cdr-code is done.
;       Can IF inside of a microdata be made to work (turn inside out)??
;       Can (PARALLEL (IF ...) FOO) move the FOO into each arm of cond?
;       Can ASSIGN be table-driven?
;       Semi-open subroutines, where the first instruction is open coded
;        and it calls off to the rest
;-------------------------------------------------------

;;; Variables associated with storing the results

(defvar *ucode-alist-alist* nil)
        ;Each element is (machine-version . alist)
        ;Each element of that alist is (tag microcode assembled-microcode)

(defvar *top-level-code*)       ;For when the compiler fondles ursines

;see *machine-version*

(defvar *need-to-link* nil)     ;Set to T when new microcode defined, to NIL by linker
;;; Debugging Tools

(defvar *microexpand-trace* nil)        ;Set this to T for debugging
(defvar *backtrace* nil)
(defconst non-backtraced-forms '(parallel sequential))

(defprop microinstruction (1 2 2) bs-format)
(defprop microsequence (1 1 2) bs-format)
(defprop microdata (2 2 2) bs-format)
(defprop microcondition (3 2 2) bs-format)
#M (defprop better-sprinter ((dsk lmucode) better-sprinter fasl) autoload)
(declare (*expr better-sprinter))       ;Well, maybe a little better

(defvar ppf)    ;Last input
(defvar ppx)    ;Last output

(defun ppx (&optional (form ppf) (*microexpand-trace* *microexpand-trace*))
  (better-sprinter (setq ppx (microexpand (setq ppf form)))))

(declare (special defucode-alist))      ;defvar'ed later in the file
(defun ppu (defucode)
  (better-sprinter (cadr (assq defucode (cdr (assq *machine-version* *ucode-alist-alist*))))))


#M
(defun retch (format-string &rest args)
  (declare (special args))                      ;For accessibility from breakpoint
  (let ((^w nil) (^r nil) (^q nil))
    (format msgfiles "~&>>Error: ")
    (lexpr-funcall #'format msgfiles format-string args)
    (format msgfiles "~&  Microexpand backtrace: ~{~<~%    ~2:;~A~>~^, ~}~%"
            *backtrace*)
    (break retch t)))

#Q
(defflavor microexpansion-error (format-string format-args backtrace)
                                (sys:no-action-mixin error)
  :initable-instance-variables)
#Q
(defmethod (microexpansion-error :report) (stream)
  (lexpr-funcall #'format stream format-string format-args)
  (format stream "~&  Microexpand backtrace: ~{~<~%    ~2:;~A~>~^, ~}~%" backtrace))
#Q
(compile-flavor-methods microexpansion-error)
#Q
(defprop retch t :error-reporter)
#Q
(defun retch (format-string &rest args)
  (signal 'microexpansion-error ':format-string format-string
                                ':format-args (copylist args)
                                ':backtrace *backtrace*)
  nil)

(eval-when (compile load eval)
(defun fintern (string &rest args)
  (intern (lexpr-funcall #'format nil string args))))
;;; Implementation of micros

(defun microexpand (form)
  (let ((*backtrace* *backtrace*))
    (loop as new-form = (microexpand-1 form)
          when (eq new-form form) return form
          do (setq form new-form))))

(defun microexpand-1 (form &aux tem)
  (cond ((atom form)
```

```
        (cond ((and (symbolp form) (setq tem (get form 'atomic-micro)))
               (push form *backtrace*)
               tem)
              (t form)))
       ((setq tem (get (car form) 'micro))
        (or (memq (car form) non-backtraced-forms)
            (push (car form) *backtrace*))
        (setq tem (funcall tem form))
        (cond (*microexpand-trace*
               (format t "~& Microexpand of:")
               (better-sprinter form)
               (format t "~& into:")
               (better-sprinter tem)))
        tem)
       (t form)))

(defun microexpand-to-parallel (form)
  (let ((*backtrace* *backtrace*))
    (loop as new-form = (microexpand-1 form)
          when (eq new-form form) return form
          do (setq form new-form)
          when (and (not (atom form)) (eq (car form) 'parallel))
            return form)))

(defmacro defmicro (name args &body body)
  `(eval-when (compile load eval)
  #Q (si:record-source-file-name ',name 'defmicro)
     (defun (,name micro) (+form+)
       ,(defmicro-nargs-check args)               ;Check number of arguments
       (let* ,(defmicro-args args)                ;Bind argument variables
         . ,body))))

(eval-when (compile load eval)
(defun defmicro-nargs-check (pattern)             ;Return code to check nargs
  (loop for p in pattern with optional = nil with required = t
        when (eq p '&optional)
          do (setq required nil optional t)
        else when (memq p '(&rest &body))
          return `(and (< (length +form+) ,(1+ nreq))
                       (defmicro-wrong-number-of-args +form+))
        else when (eq p '&aux)
          do (setq required nil optional nil)
        else count optional into nopt
         and count required into nreq
        finally (return `(or (lessp ,nreq (length +form+) ,(+ nreq nopt 2))
                             (defmicro-wrong-number-of-args +form+)))))

(defun defmicro-args (pattern)                    ;Return arg binding let clauses
  (loop for p in pattern with kind = '&required with idx = 0
        when (eq p '&optional)
          do (setq kind '&optional)
        else when (eq p '&aux)
          do (setq kind '&aux)
        else when (memq p '(&rest &body))
          do (setq kind '&rest)
        else do (incf idx)
          and when (atom p)
            collect `(,p ,(selectq kind
                             ((&required &optional) `(nth ,idx +form+))
                             ((&rest) `(nthcdr ,idx +form+))
                             (otherwise nil)))
          else collect `(,(car p)
                         ,(selectq kind
                             ((&required) `(nth ,idx +form+))
                             ((&optional) `(if (nthcdr ,idx +form+)
                                               (nth ,idx +form+)
                                               ,(cadr p)))
                             ((&rest) `(nthcdr ,idx +form+))
                             (otherwise (cadr p))))))

(defun defmicro-wrong-number-of-args (x)
  (fetch "A defmicro was called with too many or too few arguments:~%   ~S" x))
);eval-when

;Expansion is microcode, not Lisp: no backquotes, please.
(defmacro defatomicro (name expansion)
  `(eval-when (compile load eval)
  #Q (si:record-source-file-name ',name 'defatomicro)
     (defprop ,name ,expansion atomic-micro)))

;For internal use from other forms: don't record a source file name
(eval-when (compile load eval)
(defun add-atomicro (name expansion)
  (putprop name expansion 'atomic-micro))
); eval-when (compile load eval)

;;; Primitive micros

(declare (*lexpr paralyze))

(defmicro sequential (&body forms)
  (microsequencize (mapcar #'microexpand forms)))
```

```
(defun microsequencize (list)
  (cond ((null list) nil)
        ((null (cdr list)) (car list))
        ((memq (caar (last list)) '(microdata microcondition))
         (let ((data (car (last list)))
               (*backtrace* (cons '(microsequencize-inside-out) *backtrace*)))
           (let ((code (microsequencize (nconc (nbutlast list)
                                               (ncons (car (last data)))))))
             (if (eq (car data) 'microdata)
                 (make-microdata (cadr data) code)
                 (make-microcondition (cadr data) (caddr data) code)))))
        (t (cons 'microsequence
                 (loop for form in list
                       when (atom form)
                         do (or (null form)
                                (retch "~S where microinstruction expected"
                                       form))
                       else when (eq (car form) 'microinstruction)
                         collect form
                       else when (eq (car form) 'microsequence)
                         append (cdr form)
                       else do (retch "~S where microinstruction expected"
                                      form))))))



(defmicro parallel (&body forms)
  ;Start by expanding and flattening, then merge together instructions
  ;that are supposed to be done in parallel.  If we see a sequence, pick
  ;out its first and last instructions and merge them with the things
  ;before and the things after.
  (microsequencize
    (loop with current = (ncons 'microinstruction)
          for form in (flatten-parallels forms)
          when (atom form)
            do (and form (retch "~S garbage in parallel construction" form))
          else when (eq (car form) 'microsequence)
            when (cddr form)
              collect (merge-instructions current (cadr form)) into res
              and do (setq current (copylist (car (last form))))
              and when (cdddr form)
                    collect (microsequencize (butlast (cddr form))) into res
                  else do nil             ;no middle
            else do (setq current (merge-instructions current (cadr form)))
          else do (setq current (merge-instructions current form))
          finally (return (nconc res (ncons current))))))

(defun flatten-parallels (forms)
  (loop for form in forms
        do (setq form (microexpand-to-parallel form))
        when (and (not (atom form)) (eq (car form) 'parallel))
          nconc (flatten-parallels (cdr form))
        else collect form))

;Smash one instruction with another, and return the result.
;Note that plist-1 is actually modified, because that's what parallel wants.
;Note that either plist can be microdata/microcondition rather than a
;microinstruction plist.  In that case, we want to return a microdata
;as our result.  Both plists being data is illegal, we don't do
;nondeterministic joins.  (You should store one someplace first.)
;I don't know how to merge data and conditions; that could actually be useful.
;By the way, we preserve the order of operations in the plists even
;at the cost of somewhat slower computation, just to make debugging nicer.
(defun merge-instructions (plist-1 plist-2)
  (cond ((eq (car plist-1) 'microdata)
         (cond ((eq (car plist-2) 'microdata)
                (retch "Trying two merge two pieces of data: ~S and ~S"
                       plist-1 plist-2)
                plist-1)
               ((eq (car plist-2) 'microinstruction)
                (merge-instruction-and-data plist-2 plist-1))
               (t (retch "~S invalid - merge-instructions" plist-2))))
        ((eq (car plist-1) 'microcondition)
         (cond ((eq (car plist-2) 'microinstruction)
                (merge-instruction-and-condition plist-2 plist-1))
               (t (retch "~S invalid - merge-instructions" plist-2))))
        ((neq (car plist-1) 'microinstruction)
         (retch "~S invalid - merge-instructions" plist-1))
        ((eq (car plist-2) 'microdata)
         (merge-instruction-and-data plist-1 plist-2))
        ((eq (car plist-2) 'microcondition)
         (merge-instruction-and-condition plist-1 plist-2))
        ((eq (car plist-2) 'microinstruction)
         (let ((xb1 (get plist-1 'xbus)) (yb1 (get plist-1 'ybus))
               (xb2 (get plist-2 'xbus)) (yb2 (get plist-2 'ybus)))
           (if (or (and xb1 (eq xb1 yb2))
                   (and xb2 (eq xb2 yb1)))
               (multiple-value (plist-1 plist-2)
```

```
        (merge-bus-scheduling plist-1 plist-2))))
    (nconc plist-1
           (loop for (prop val2) on (cdr plist-2) by 'cddr with fcn
                 as val1 = (get plist-1 prop)
                 when (not val1)
                   collect prop and collect val2          ;i.e. putprop
                 else when (equal val1 val2)
                   do nil
                 else when (setq fcn (get prop 'merge-fields))
                   do (putprop plist-1 (funcall fcn val1 val2) prop)
                 ;This kludge is because arithmetic-trap-enb has
                 ;two spec codes, one with dispatch and one without.
                 ;Takes care of other hair with magic bits, too.
                 else when (and (memq prop '(spec magic))
                                (merge-spec-magic plist-1 plist-2))
                   do nil  ;already hacked by merge-spec-magic
                 else do (retch "Field conflict: ~S has ~S and ~S"
                                prop val1 val2))))
   (t (retch "~S invalid - merge-instructions" plist-2))))

;Return the same data, but do the instruction in parallel with it
(defun merge-instruction-and-data (instruction data)
  (let ((*backtrace* (cons '(merge-instruction-and-data) *backtrace*)))
    (make-microdata (cadr data) (paralyze (caddr data) instruction))))

;Return the same condition, but do the instruction in parallel with it
(defun merge-instruction-and-condition (instruction condition)
  (let ((*backtrace* (cons '(merge-instruction-and-condition) *backtrace*)))
    (make-microcondition (cadr condition)
                         (caddr condition)
                         (paralyze (cadddr condition) instruction))))

;This is sort of the subr version of parallel, or the map version of merge-instructions.
(defun paralyze (&rest instructions)
  ;If we see a sequence, pick out its first and last instructions
  ;and merge them with the things before and the things after.
  (microsequencize
    (loop with current = (ncons 'microinstruction)
          for instr in instructions
          when (atom instr)
            do (and instr (retch "~S garbage in paralyze" instr))
          else when (eq (car instr) 'microsequence)
            when (cddr instr)
              collect (merge-instructions current (cadr instr)) into res
              and do (setq current (copylist (car (last instr))))
              and when (cdddr instr)
                    collect (microsequencize (butlast (cddr instr))) into res
                  else do nil          ;no middle
            else do (setq current (merge-instructions current (cadr instr)))
          else do (setq current (merge-instructions current instr))
          finally (return (nconc res (ncons current))))))
```

```
(defun merge-spec-magic (plist-1 plist-2
                         &aux spec1 spec2 magic1 magic2 new-spec new-magic)
  (prog ()
    (setq spec1 (get plist-1 'spec) spec2 (get plist-2 'spec)
          magic1 (get plist-1 'magic) magic2 (get plist-2 'magic))
    ;; If the spec fields differ, try to find a common value
    ;; If the spec fields are the same, still some magic-number merging to do
    (cond ((and (memq spec1 '(arithmetic-trap-enb arithmetic-trap-with-dispatch))
                (memq spec2 '(arithmetic-trap-enb arithmetic-trap-with-dispatch)))
           (if (null magic1)
               (retch "Missing magic number field in ~S" plist-1))
           (if (null magic2)
               (retch "Missing magic number field in ~S" plist-2))
           (setq new-spec (if (and (eq spec1 'arithmetic-trap-enb)
                                   (eq spec2 'arithmetic-trap-enb))
                              'arithmetic-trap-enb
                              'arithmetic-trap-with-dispatch)
                 new-magic (logior magic1 magic2)))
          ((and (memq spec1 '(arithmetic-trap-enb arithmetic-trap-with-dispatch))
                (memq spec2 '(trap-if-type-cond
                              trap-if-type-cond-or-bbus-not-fixnum)))
           (setq new-spec spec1
                 new-magic (logior (or magic1 8)
                                   (if (eq spec2 'trap-if-type-cond) 1 3))))
          ((and (memq spec2 '(arithmetic-trap-enb arithmetic-trap-with-dispatch))
                (memq spec1 '(trap-if-type-cond
                              trap-if-type-cond-or-bbus-not-fixnum)))
           (setq new-spec spec2
                 new-magic (logior (or magic2 8)
                                   (if (eq spec1 'trap-if-type-cond) 1 3))))
```

```
          ((and (memq spec1 '(trap-if-type-cond
                              trap-if-type-cond-or-bbus-not-fixnum))
                (memq spec2 '(trap-if-type-cond
                              trap-if-type-cond-or-bbus-not-fixnum)))
           (putprop plist-1 'trap-if-type-cond-or-bbus-not-fixnum 'spec)
           (return t))
          ((and (or (and (eq spec1 'arithmetic-trap-enb) (= magic1 3))
                    (eq spec1 'trap-if-type-cond-or-bbus-not-fixnum))
                (memq spec2 '(multiply multiply-and-type-check)))
           (setq new-spec 'multiply-and-type-check
                 new-magic magic2))
          ((and (or (and (eq spec2 'arithmetic-trap-enb) (= magic2 3))
                    (eq spec2 'trap-if-type-cond-or-bbus-not-fixnum))
                (memq spec1 '(multiply multiply-and-type-check)))
           (setq new-spec 'multiply-and-type-check
                 new-magic magic1))
          ((and (memq spec1 '(multiply multiply-and-type-check))
                (memq spec2 '(multiply multiply-and-type-check)))
           ;; Can ior the fields together except for Xbus read/write conflict
           (if (or (and (bit-test 2 magic1)          ;Magic1 writes from xbus
                        (not (bit-test 2 magic2))    ;Magic2 reads onto xbus
                        (bit-test 4 magic2))
                   (and (bit-test 2 magic2)
                        (not (bit-test 2 magic1))
                        (bit-test 4 magic1)))
               (retch "Multiplier both reading and writing xbus, magic ~O ~O"
                      magic1 magic2))
           (setq new-spec (if (and (eq spec1 'multiply) (eq spec2 'multiply))
                              'multiply
                              'multiply-and-type-check)
                 new-magic (logior magic1 magic2)))
          ((and magic1 magic2 (not (and spec1 spec2 (not (eq spec1 spec2))))
                (zerop (logand (setq spec1 (or (get plist-1 'magic-mask) 17))
                               (logxor magic1 (logior magic1 magic2))))
                (zerop (logand (setq spec2 (or (get plist-2 'magic-mask) 17))
                               (logxor (logior magic1 magic2) magic2))))
           ;; Conflict in magic number field only, and the bits that differ
           ;; are only bits that the magic-mask claims are not cared about.
           (putprop plist-1 (logior magic1 magic2) 'magic)
           (if (= (logior spec1 spec2) 17)
               (remprop plist-1 'magic-mask)
               (putprop plist-1 (logior spec1 spec2) 'magic-mask))
           (return t))
          (t (return nil)))               ;Cannot resolve spec conflict
    ;; Now make any alterations called for
    (putprop plist-1 new-spec 'spec)
    (putprop plist-1 new-magic 'magic)
    (remprop plist-1 'magic-mask)
    (return t)))

;magic-mask better occur after magic in the microinstructions
(defprop magic-mask logior merge-fields)

;Take care of some simple cases of lossage caused by Xbus select and Ybus select
;being the same bit.  plist-1 is the one that can be modified.
(defun merge-bus-scheduling (plist-1 plist-2)
  (cond ((and (eq (get plist-2 'ybus) (get plist-1 'xbus))
              (fieldp plist-2 'condition 'ybus-31)
              (not (get plist-2 'byte-func))
              (not (fieldp plist-2 'spec 'multiply))
              (memq (get plist-2 'alu) '(nil xbus))
              (memq (get plist-1 'alu) '(nil xbus)))
         ;; plist-2 isn't doing anything with Ybus except testing the sign,
         ;; and the ALU is available, so do the sign test there.
         (setq plist-2 (copylist plist-2))
         (remprop plist-2 'ybus)
         (putprop plist-2 'xbus 'alu)
         (putprop plist-2 'alu-31 'condition))
        ((and (eq (get plist-1 'ybus) (get plist-2 'xbus))
              (fieldp plist-1 'condition 'ybus-31)
              (not (get plist-1 'byte-func))
              (not (fieldp plist-1 'spec 'multiply))
              (memq (get plist-1 'alu) '(nil xbus))
              (memq (get plist-2 'alu) '(nil xbus)))
         ;; plist-1 isn't doing anything with Ybus except testing the sign,
         ;; and the ALU is available, so do the sign test there.
         (remprop plist-1 'ybus)
         (putprop plist-1 'xbus 'alu)
         (putprop plist-1 'alu-31 'condition)))
  (values plist-1 plist-2))

(defun (speed merge-fields) (speed1 speed2)
  (cond ((eq speed1 'slow) speed2)               ;slow and we don't care which half
        ((eq speed2 'slow) speed1)
        ((or (eq speed1 'very-slow) (eq speed2 'very-slow)) 'very-slow)
        (t 'very-slow)))                         ;must be both halves slow

;;; Micro and macro for machine-version conditionalization
(defmacro machine-version-case (&body clauses)
  (expand-machine-version-case clauses))
```

```
(defmicro machine-version-case (&body clauses)
  (expand-machine-version-case clauses))

(defun expand-machine-version-case (clauses)
  (loop for clause in clauses do
    (or (= (length clause) 2)
        (ferror nil "~S illegal clause in MACHINE-VERSION-CASE; must be (<ver> <code>)"
                clause))
    (if (or (eq (car clause) 'otherwise)
            (if (atom (car clause))
                (eq *machine-version* (car clause))
                (memq *machine-version* (car clause))))
        (return (cadr clause)))
    finally
      (ferror nil "No clause in MACHINE-VERSION-CASE for ~S" *machine-version*)))
;;; Flow of control micros

;If you want to know what the available tests are, don't look at these lists,
;look at the macros below.  There are more possibilities than you think.

;There are also some IO and GC related skip conditions which I'm leaving out for now

;Skip (choose one of two next instructions)
(eval-when (eval load compile)
(defconst valid-skip-conditions '(              ;Add more as needed...
        ;Comparisons of 28, 32, 34 bit fields (using X-Y-1 ALU function)
        equal-pointer not-equal-fixnum not-equal-typed-pointer
        ;Unsigned comparisons, 28 and 32 bit fields (using X-Y-1 ALU function)
        not-greater-pointer not-greater-fixnum-unsigned
        ;Type filter, cdr-code filter
        type-condition tbus-not-fixnum not-cdr-0 not-cdr-1 not-cdr-2 not-cdr-3
        ;Weird kludges
        ybus-31         ;For division
        alu-31 alub-0 not-lbus-dev-cond mc-cond not-ctos-came-from-ifu
        )))

;One-argument ALU-status condition
(defmacro defalucondition1 (name skip-cond-name sense alu-func)
  (or (memq skip-cond-name valid-skip-conditions)
      (ferror nil "~S not a valid skip condition in ~S" skip-cond-name name))
  (or (memq sense '(true false))
      (ferror nil "~S not a valid skip sense in ~S" sense name))
  `(defmicro ,name (opnd)
     (make-microcondition ',skip-cond-name ',sense
       (get-to-obus32 ,(selectq alu-func
                         (X 'opnd)
                         (X-1 '`(1- ,opnd))
                         (otherwise (ferror "Unrecognized ALU function: ~S -- defalucondition1"
                                            alu-func)))))))

;Two-argument ALU-status condition
(defmacro defalucondition2 (name skip-cond-name sense alu-func reverse-alu-func)
  (or (memq skip-cond-name valid-skip-conditions)
      (ferror nil "~S not a valid skip condition in ~S" skip-cond-name name))
  (or (memq sense '(true false))
      (ferror nil "~S not a valid skip sense in ~S" sense name))
  `(defmicro ,name (x-opnd y-opnd)
     (multiple-value-bind (operand-code operands-reversed)
         (get-to-xbus-and-alub x-opnd y-opnd)
       (make-microcondition ',skip-cond-name
         (if operands-reversed ',(cdr (assq sense '((true . false) (false . true)))) ',sense)
         (alu-paralyze operand-code
                       (alu-microinstruction
                         (if operands-reversed ',reverse-alu-func ',alu-func)))))))

;Commutative two-argument ALU-status condition
(defmacro defalucondition-commutative (name skip-cond-name sense alu-func)
  (or (memq skip-cond-name valid-skip-conditions)
      (ferror nil "~S not a valid skip condition in ~S" skip-cond-name name))
  (or (memq sense '(true false))
      (ferror nil "~S not a valid skip sense in ~S" sense name))
  `(defmicro ,name (x-opnd y-opnd)
     (make-microcondition ',skip-cond-name ',sense
        (alu-paralyze (get-to-xbus-and-alub x-opnd y-opnd)
                      (alu-microinstruction ',alu-func)))))

;Two-argument arithmetic comparisons
(defalucondition-commutative equal-pointer equal-pointer true X-Y-1)
(defalucondition-commutative equal-fixnum not-equal-fixnum false X-Y-1)
(defalucondition-commutative equal-typed-pointer not-equal-typed-pointer false X-Y-1)
(defalucondition-commutative not-equal-pointer equal-pointer false X-Y-1)
(defalucondition-commutative not-equal-fixnum not-equal-fixnum true X-Y-1)
(defalucondition-commutative not-equal-typed-pointer not-equal-typed-pointer true X-Y-1)
(defalucondition2 greater-pointer not-greater-pointer false X-Y-1 X-Y)
(defalucondition2 greater-fixnum-unsigned not-greater-fixnum-unsigned false X-Y-1 X-Y)
(defalucondition2 greater-fixnum not-greater-fixnum-unsigned false X-Y-1-signed X-Y-signed)
(defalucondition2 greater-or-equal-pointer not-greater-pointer false X-Y X-Y-1)
(defalucondition2 greater-or-equal-fixnum-unsigned not-greater-fixnum-unsigned false
                  X-Y X-Y-1)
(defalucondition2 greater-or-equal-fixnum not-greater-fixnum-unsigned false
                  X-Y-signed X-Y-1-signed)
```

```
(defalucondition2 lesser-pointer not-greater-pointer true X-Y X-Y-1)
(defalucondition2 lesser-fixnum-unsigned not-greater-fixnum-unsigned true X-Y X-Y-1)
(defalucondition2 lesser-fixnum not-greater-fixnum-unsigned true X-Y-signed X-Y-1-signed)
(defalucondition2 lesser-or-equal-pointer not-greater-pointer true X-Y-1 X-Y)
(defalucondition2 lesser-or-equal-fixnum-unsigned not-greater-fixnum-unsigned true
                  X-Y-1 X-Y)
(defalucondition2 lesser-or-equal-fixnum not-greater-fixnum-unsigned true
                  X-Y-1-signed X-Y-signed)

;One-argument arithmetic test
(defalucondition1 zero-fixnum not-equal-fixnum false X-1)
(defalucondition1 not-zero-fixnum not-equal-fixnum true X-1)
;These two can be done in either the ALU or the YBUS
;(defalucondition1 minus-fixnum alu-31 true X)
;(defalucondition1 plus-or-zero-fixnum alu-31 false X)
(defmicro minus-fixnum (opnd)
  (let ((data (microexpand opnd)))
    (if (can-get-to-ybus data)
        (make-microcondition 'ybus-31 'true (get-to-ybus data))
        (make-microcondition 'alu-31 'true (get-to-obus32 data)))))

(defmicro plus-or-zero-fixnum (opnd)
  (let ((data (microexpand opnd)))
    (if (can-get-to-ybus data)
        (make-microcondition 'ybus-31 'false (get-to-ybus data))
        (make-microcondition 'alu-31 'false (get-to-obus32 data)))))



  (defalucondition1 minus-or-zero-fixnum not-greater-fixnum-unsigned true X-1)
  (defalucondition1 plus-fixnum not-greater-fixnum-unsigned false X-1)


(defalucondition1 minus-or-zero-fixnum alu-31 true X-1)
(defalucondition1 plus-fixnum alu-31 false X-1)



  (defalucondition1 minus-or-zero-fixnum not-alu-31-or-carry-32 true X-1-signed)
  (defalucondition1 plus-fixnum not-alu-31-or-carry-32 false X-1-signed)
  )

;Logical tests
(defmicro bit-test (x-opnd y-opnd)
  (make-microcondition 'not-equal-fixnum 'true  ;i.e. not -1
    (get-to-obus32 '(lognand ,x-opnd ,y-opnd))))

;Same for 28-bit operands
(defmicro bit-test-pointer (x-opnd y-opnd)
  (make-microcondition 'equal-pointer 'false    ;i.e. not -1
    (get-to-obus32 '(lognand ,x-opnd ,y-opnd))))

(defmicro ldb-bit-test (y-opnd bit-number)
  (make-microcondition 'alub-0 'true
     (paralyze (get-to-ybus y-opnd)
               (if (eq bit-number 'byte-r)
                   ;; Don't care how many bits in the byte, and can't use cond.  Hence byte-s
                   '(microinstruction byte-func (ldb byte-r byte-s))
                   '(microinstruction byte-func (ldb ,(logand (- 40 bit-number) 37) 1))))))

(defmicro bit (byte-field)
  (let ((data (microexpand byte-field)) tem)
    (if (and (eq (car data) 'microdata)
             (eq (cadr data) 'alub)
             (setq tem (get (caddr data) 'byte-func))
             (eq (car tem) 'ldb)
             (equal (caddr tem) 1))
        (make-microcondition 'alub-0 'true (caddr data))
        (retch "~S == ~S is not a single bit datum" byte-field data))))

(defmicro all-ones (computation)
  (make-microcondition 'not-equal-fixnum 'false
    (get-to-obus32 computation)))

;Weird conditions
(defatomicro ybus-31
  (microcondition ybus-31 true nil))

;Alternate name for carry out of bit 31 of ALU
(defatomicro alu-carry
  (microcondition not-greater-fixnum-unsigned false nil))

(defatomicro micro-stack-empty
  (micro-stack-empty-kludge))

(defmicro micro-stack-empty-kludge ()
  (or (eq *machine-version* 'proto)
      (retch "micro-stack-empty doesn't exist any more"))
  '(microcondition not-ctos-came-from-ifu false nil))

(declare (special *cdr-codes* *data-types*))    ;from sysdef
```

```
(defmicro data-type? (val &rest types)
  (make-microcondition 'type-condition 'true
    '(parallel ,(get-to-abus val)
              (microinstruction type-map ((,(copylist types) cond))))))

(defmicro not-data-type? (val &rest types)
  (make-microcondition 'type-condition 'false
    '(parallel ,(get-to-abus val)
              (microinstruction type-map ((,(copylist types) cond))))))

;Merging rules for type maps:
;Note that the trap number overlaps with the pointer and cond bits.
;Thus when merging, anything that specifies trap overrides the pointer
;and cond bits from what it is being merged with.  Also, only one trap
;at a time can be specified; there is a priority ordering which says
;who gets control when both maps specify traps.  Invisible pointers
;have priority over bad type traps.



;trap-2 is invisible pointer (highest priority)
;trap-0 is bad data type
;trap-1, trap-3 not defined yet, so I just stick them in at the end.
(defconst trap-priority-order '(trap-2 trap-0 trap-1 trap-3))

(declare (special *unduplicated-data-types*))   ;in UUX

(defprop type-map merge-type-maps merge-fields)

(defun merge-type-maps (map1 map2)
  (loop with (cond1 cond2 pointer1 pointer2) = nil
        for type in *unduplicated-data-types*
        as out1 = (type-map-lookup type map1)
        as out2 = (type-map-lookup type map2)
        as trap1 = (type-map-trap? out1)
        as trap2 = (type-map-trap? out2)
        as output =
           (cond ((and trap1 trap2) (if (< trap2 trap1) out2 out1))
                 (trap1 out1)
                 (trap2 out2)
                 ((null out1) out2)
                 ((null out2) out1)
                 ((equal out1 out2) out1)
                 (t '(cond pointer)))  ;both is only other possibility
        when output
          unless (loop for ent in map
                       when (equal (cdr ent) output)
                         return (rplacd (last (car ent)) (ncons type)))
            collect (cons (ncons type) output) into map
        unless trap1
          do (if (memq 'cond out1) (setq cond1 t))
             (if (memq 'pointer out1) (setq pointer1 t))
        unless trap2
          do (if (memq 'cond out2) (setq cond2 t))
             (if (memq 'pointer out2) (setq pointer2 t))
        finally
          (if (or (and cond1 cond2) (and pointer1 pointer2))
              (retch "Conflict for cond and//or pointer field: ~S ~S"
                     map1 map2))
          (return map)))

(defun type-map-trap? (out)
  (loop for x in out
        when (find-position-in-list x trap-priority-order)
          return it
        unless (memq x '(cond pointer))
          do (retch "~S -- garbage in type map output ~S" x out)))

(defun type-map-lookup (type map)
  (loop for (types . outputs) in map
        when (memq type types) return outputs))

(defmicro cdr-code? (val cdr)
  (make-microcondition (nth (cond ((numberp cdr) cdr)
                                  ((find-position-in-list cdr *cdr-codes*))
                                  (t (retch "~S invalid cdr code" cdr)))
                            '(not-cdr-0 not-cdr-1 not-cdr-2 not-cdr-3))
                       'false
                       (get-to-abus val)))

(defmicro not-cdr-code? (val cdr)
  (make-microcondition (nth (cond ((numberp cdr) cdr)
                                  ((find-position-in-list cdr *cdr-codes*))
                                  (t (retch "~S invalid cdr code" cdr)))
                            '(not-cdr-0 not-cdr-1 not-cdr-2 not-cdr-3))
                       'true
                       (get-to-abus val)))


(defmicro not (pred)
```

```
(setq pred (microexpand pred))
(or (and (listp pred) (eq (car pred) 'microcondition))
    (ferror nil "Argument to NOT expanded into ~S which is not a microcondition"))
(or (memq (caddr pred) '(true false))
    (ferror nil "Invalid sense in ~S" pred))
`(microcondition ,(cadr pred) ,(if (eq (caddr pred) 'true) 'false 'true)
                 ,(cadddr pred)))

;Put this in the middle of a sequence and it splits the flow into
;one of two paths, which are sequences or single instructions.  If
;there is anything more in the sequence the flow is assumed to rejoin.
;Note that instead of an immediate sequence you may also say "(goto tag)"
;where tag is something defined by a defucode.  If you said "(jump tag)"
;you would get the same effect but one cycle slower.  The assembler copies
;instructions as necessary to implement this.  You may also say (drop-through)
;to avoid getting grossly deep in indentation in the source code.
(defmicro if (pred true false)
  (let* ((test (microexpand pred))
         (skip (cond ((neq (car test) 'microcondition)
                      (retch "~S expanded into ~S, not a valid microcondition"
                             pred test))
                     ((memq (cadr test) valid-skip-conditions) (cadr test))
                     (t (retch "~S invalid skip condition in ~S"
                               (cadr test) pred)))))
    (if (eq (caddr test) 'false) (psetq true false false true))
    (paralyze
      (cadddr test)
      `(microinstruction condition ,skip
                         skip-true-sequence ,(microexpand-if true)
                         skip-false-sequence ,(microexpand-if false)))))

;The value of the skip-xxx-sequence field is a microinstruction, a
;microsequence, a defucode tag, or nil meaning drop-through.
(defun microexpand-if (form)            ;Hacks goto, drop-through which aren't defmicros
  (setq form (microexpand form))        ; however microexpand is known not to complain
  (cond ((and (not (atom form)) (= (length form) 2) (eq (car form) 'goto))
         (cadr form))
        ((equal form '(drop-through))
         nil)
        (t form)))


;Construct a microcondition out of a condition name and some microcode.
;The microcode is expanded now to make life simpler and to make
;the backtracing come out right.
(defun make-microcondition (condition sense code)
  (let ((expcode (microexpand code)))
    (if (or (atom expcode)
            (not (memq (car expcode) '(microinstruction microsequence))))
        (ferror nil "not microinstruction in microcondition: ~S == ~S"
                code expcode))
    (or (memq condition valid-skip-conditions)
        (ferror nil "~S is not a valid skip condition" condition))
    (or (memq sense '(true false))
        (ferror nil "~S is not a valid skip sense" sense))
    `(microcondition ,condition ,sense ,expcode)))
;;; Data type checking and other trapping

;Trap if data type of val is not one of the specified types.
;This is the low-level version that traps to a fixed place, used for
;unbound variable checking and wrong-type-argument barfing.

;Location specifies to the error handler.  It can be a number for a fixed argument;
;NIL for an unspecified place (in which case the first argument of a non-matching
;type will be printed);
;ARRAY for the array argument to various instructions;
;SUBSCRIPT for one (or more) of the subscript argument(s) to an array function;
;TOP-OF-STACK for things like funcall;
;REST-ARG for lexpr-funcall;
;RETURN-PC for returning;
;SELF-MAPPING-TABLE for instance stuff;
;INSTANCE (either self or argument to %INSTANCE-X) ditto;
;INSTANCE-SIZE ditto; INSTANCE-BINDING ditto;
;INSTANCE-HASH-TABLE ditto; INSTANCE-HASH-TABLE-ENTRY ditto;
;ANY for functions with several arguments of like type.
(defmicro check-arg-type (location val &rest types)
  `(parallel ,(get-to-abus val)
             (microinstruction type-map ((,(types-other-than types) trap-0))
                               error-table (wrong-type-argument ,location ,types))))

;For simple cases, specify location as NIL
(defmicro check-data-type (val &rest types)
  `(check-arg-type nil ,val . ,types))

;Generate specified data-type trap if value is of one of the
;specified types.
(defmicro data-type-trap (val trap-name &rest types)
  `(parallel ,(get-to-abus val)
             (microinstruction type-map ((,(copylist types) ,trap-name)))))
```

```
(defun types-other-than (types)
  ;;I feel bad about (check-data-type foo fixnum) trapping everything.
  (loop for type in types
        unless (memq type *unduplicated-data-types*)
          do (retch "You have invalid data type ~S" type))
  (loop for type in *unduplicated-data-types*
        unless (memq type types)
          collect type))

;General "higher-level" traps.  Any condition on the skip condition
;multiplexor may be selected, and true or false may be selected.  If the
;condition is satisfied the machine traps to the next-microinstruction
;address, expressed here as either a goto or a microsequence as with IF.
(defmicro trap-if (pred trap-sequence)
  (if (eq pred 'true)
      (setq pred '(cdr-code? (a-constant 8) 8)))        ;--- Something better?
  (let* ((test (microexpand pred))
         (trap-if 'condition-true)
         (cond (cond ((neq (car test) 'microcondition)
                      (retch "~S expanded to ~S, not a valid microcondition"
                             pred test))
                     ((memq (cadr test) valid-skip-conditions) (cadr test))
                     (t (retch "~S invalid skip condition in ~S"
                               (cadr test) pred)))))
    (if (eq (caddr test) 'false) (setq trap-if 'condition-false))
    `(parallel
       ,(cadddr test)
       (microinstruction condition ,cond
                         trap-enables (,trap-if)
                         trap-sequence ,(microexpand-if trap-sequence)
                         ,@(selectq cond
                             ;;--- This may be over-conservative.  These conditions
                             ;; come out a little bit later than the others.
                             ((alu-31 equal-pointer not-equal-fixnum not-equal-typed-pointer)
                              '(speed slow-second-half)))))))

;Simply eliminate duplicates.  For now, at least, no compatibility issues.
(defun (trap-enables merge-fields) (en1 en2)
  (append en1 (loop for en in en2 unless (memq en en1) collect en)))

;Can have a data type check at the same time as a transporter check
;In that case, the wrong-type-argument prevails.  The error handler can print a different
;message if it finds an illegal data type than one that fails to match.
(defprop error-table merge-error-table-entries merge-fields)

(defun merge-error-table-entries (err1 err2 &optional (error-p t) &aux errt1 errt2)
  (setq errt1 (car err1)
        errt2 (car err2))
  (cond ((equal err1 err2)
         err1)
        ((or (null err2)
             (and (eq errt1 'wrong-type-argument) (eq errt2 'bad-data-type)))
         err1)
        ((or (null err1)
             (and (eq errt1 'bad-data-type) (eq errt2 'wrong-type-argument)))
         err2)
        ((not error-p)
         'no-go)
        (t
         (retch "Error table conflict: ~S and ~S" err1 err2))))

(defun compatible-error-table-entries (err1 err2)
  (neq 'no-go (merge-error-table-entries err1 err2 nil)))
;The type map for normal arithmetic, which has cond for non-fixnum numbers
;and bad-argument trap for non-numbers.
(declare (special *arithmetic-type-map*))       ;in UUX

;;; Micros for arithmetic traps

;2-operand arithmetic instructions use this
(defmicro check-fixnum-2args (a-opnd b-opnd &rest exception-routines)
  (paralyze (get-to-abus a-opnd)
            (get-to-bbus b-opnd)
            `(microinstruction
               type-map ,*arithmetic-type-map*
               trap-enables (type-condition bbus-non-fixnum)
               spec trap-if-type-cond-or-bbus-not-fixnum
               error-table (wrong-type-argument any (:number)))
            (make-arith-dispatch-microinstruction exception-routines)))

;1-operand arithmetic instructions use one of the next two
(defmicro check-fixnum-1arg-a (a-opnd &rest exception-routines)
  (paralyze (get-to-abus a-opnd)
            `(microinstruction
               type-map ,*arithmetic-type-map*
               trap-enables (type-condition)
               spec trap-if-type-cond
               error-table (wrong-type-argument nil (:number)))
            (make-arith-dispatch-microinstruction exception-routines)))
```

```
(defmicro check-fixnum-1arg-b (b-opnd &rest exception-routines)
  (paralyze (get-to-bbus b-opnd)
            '(microinstruction      ;Assume no type-cond bits set in map ----
               trap-enables (type-condition bbus-non-fixnum)
               spec trap-if-type-cond-or-bbus-not-fixnum)
            (make-arith-dispatch-microinstruction exception-routines)))

(defmicro check-fixnum-b (b-opnd &rest exception-routines)
  (paralyze (get-to-bbus b-opnd)
            '(microinstruction  ;Assume no type-cond bits set in map ----
               trap-enables (type-condition bbus-non-fixnum)
               spec trap-if-type-cond-or-bbus-not-fixnum)
            (and exception-routines
                 '(microinstruction
                    next-microaddress ,(microexpand exception-routines)))))

;Trap if opnd is of any of the named types, and do an arithmetic dispatch
;into the trap routine.  This is mainly for EQL.
(defmicro check-data-type-and-dispatch (opnd-and-types &rest exception-routines)
  (let ((opnd (car opnd-and-types))
        (types (cdr opnd-and-types)))
    (paralyze (get-to-abus opnd)
              '(microinstruction
                 type-map ((,types cond))
                 trap-enables (type-condition)
                 spec trap-if-type-cond)
              (make-arith-dispatch-microinstruction exception-routines))))

;Arithmetic trap dispatches on ABUS<33:32>|BBUS<33:32>
;3 in either field can't happen, if a type check was done
;Unfortunately this isn't really true, since Bbus type checking incomplete (use OTHERWISE)
(declare (special *arithmetic-trap-dispatch-cues-alist*))       ;in UUX

;Make up a microinstruction that either dispatches or doesn't depending on
;whether the arithmetic trap exception routines consist of more than
;just an otherwise clause.
;With no exception routines at all, any exception is an error.
;The caller is assumed to provide the trap enables.  Merging will switch
;to spec/arithmetic-trap-enb and supply the magic-number bits as needed.
(defun make-arith-dispatch-microinstruction (exception-routines)
  (let ((disp (expand-dispatch-clauses exception-routines
                                       *arithmetic-trap-dispatch-cues-alist*)))
    (cond ((null disp)
           '(microinstruction trap-sequence error-trap))
          ((and (null (cdr disp)) (eq (caar disp) 'otherwise))
           '(microinstruction trap-sequence ,(cadar disp)))
          ((not (assq 'otherwise disp))          ;Compensate for lack of Bbus type check
           '(microinstruction spec arithmetic-trap-with-dispatch
                              arith-trap-dispatch-table (arith ((3 7 13) error-trap)
                                                               . ,disp)))
          (t '(microinstruction spec arithmetic-trap-with-dispatch
                                arith-trap-dispatch-table (arith . ,disp))))))
;;; "Data Processing"

;Construct a microdata out of a data location and some microcode.
;The microcode is expanded now to make life simpler and to make
;the backtracing come out right.
(defun make-microdata (location code)
  (let ((expcode (microexpand code)))
    (if (or (atom expcode)
            (not (memq (car expcode) '(microinstruction microsequence))))
        (ferror nil "not microinstruction in microdata: ~S == ~S"
                code expcode))
    '(microdata ,location ,expcode)))

;The valid 'places' for data are ABUS, BBUS, XBUS, YBUS, ALUB, and OBUS
;Maybe more will be put in later

;Discard the result of a microdata, just perform the microcode.
(defmicro for-effect (val)
  (setq val (microexpand val))
  (cond ((atom val) val)
        ((eq (car val) 'microdata) (caddr val))
        ((eq (car val) 'microcondition) (cadddr val))
        (t val)))

;Routines which understand the various bus routes

;Put data on obus.  Returns an instruction.
;Note that this is only guaranteed to get the low 32 bits, not the 4 high tag bits
(defun get-to-obus32 (form)
  (let* ((*backtrace* (cons '(get-to-obus32) *backtrace*))
         (data (microexpand form)))
    (if (not (and (not (atom data))
                  (eq (car data) 'microdata)
                  (memq (cadr data) '(abus bbus xbus ybus alub obus))))
        (fetch "Cannot get data onto Obus: ~S == ~S" form data)
        (let ((code (caddr data)))
          (if (eq (cadr data) 'obus)    ;If not already on obus, put it there
              code
```

```
        (paralyze
          code
          (selectq (cadr data)
            (abus '(microinstruction xbus abus
                                     alu xbus))
            (bbus '(microinstruction ybus bbus
                                     byte-func ybus
                                     alu alub))
            (xbus '(microinstruction alu xbus))
            (ybus '(microinstruction byte-func ybus
                                     alu alub))
            (alub '(microinstruction alu alub))))))))

;Same but transfers all the bits (not just low 32)
(defun get-to-obus (form)
  (let* ((*backtrace* (cons '(get-to-obus) *backtrace*))
         (data (microexpand form)))
    (if (not (and (not (atom data))
                  (eq (car data) 'microdata)
                  (memq (cadr data) '(abus bbus xbus ybus alub obus))))
        (retch "Cannot get data onto Obus: ~S == ~S" form data)
        (let ((code (caddr data)))
          (if (eq (cadr data) 'obus)     ;If not already on obus, put it there
              code
              (paralyze
                code
                (selectq (cadr data)
                  (abus '(microinstruction xbus abus
                                           alu xbus
                                           ;force-obus<35-34> abus     ;will default
                                           ;force-obus<33-32> abus     ;will default
                                           ))
                  (bbus '(microinstruction ybus bbus
                                           byte-func ybus
                                           alu alub
                                           force-obus<33-32> bbus))
                  (xbus '(microinstruction alu xbus))
                  (ybus '(microinstruction byte-func ybus
                                           alu alub))
                  (alub '(microinstruction alu alub))))))))

(defun get-to-abus (form)
  (let* ((*backtrace* (cons '(get-to-abus) *backtrace*))
         (data (microexpand form)))
    (if (not (and (not (atom data))
                  (eq (car data) 'microdata)
                  (eq (cadr data) 'abus)))
        (retch "Data not accessible on Abus: ~S == ~S" form data)
        (caddr data))))

(defun get-to-bbus (form)
  (let* ((*backtrace* (cons '(get-to-bbus) *backtrace*))
         (data (microexpand form)))
    (if (not (and (not (atom data))
                  (eq (car data) 'microdata)
                  (eq (cadr data) 'bbus)))
        (retch "Data not accessible on bbus: ~S == ~S" form data)
        (caddr data))))

(defun get-to-xbus (form)
  (let* ((*backtrace* (cons '(get-to-xbus) *backtrace*))
         (data (microexpand form)))
    (cond ((or (atom data) (neq (car data) 'microdata))
           (retch "Not microdata: ~S == ~S" form data))
          ((eq (cadr data) 'xbus)
           (caddr data))
          ((eq (cadr data) 'abus)
           (paralyze (caddr data) '(microinstruction xbus abus)))
          ((eq (cadr data) 'bbus)
           (paralyze (caddr data) '(microinstruction xbus bbus)))
          (t
           (retch "Data not accessible on Xbus: ~S == ~S" form data)))))

(defun get-to-ybus (form)
  (let* ((*backtrace* (cons '(get-to-ybus) *backtrace*))
         (data (microexpand form)))
    (cond ((or (atom data) (neq (car data) 'microdata))
           (retch "Not microdata: ~S == ~S" form data))
          ((eq (cadr data) 'ybus)
           (caddr data))
          ((eq (cadr data) 'abus)
           (paralyze (caddr data) '(microinstruction ybus abus)))
          ((eq (cadr data) 'bbus)
           (paralyze (caddr data) '(microinstruction ybus bbus)))
          (t
           (retch "Data not accessible on Ybus: ~S == ~S" form data)))))

(defun get-to-alub (form)
  (let* ((*backtrace* (cons '(get-to-alub) *backtrace*))
         (data (microexpand form)))
    (cond ((or (atom data)
```

```
           (neq (car data) 'microdata)
           (not (memq (cadr data) '(abus bbus ybus alub))))
       (retch "Data not accessible on ALUB: ~S == ~S" form data))
      ((eq (cadr data) 'alub) (caddr data))           ;Already there
      (t (paralyze                   ;Get it there through shift/mask
           (get-to-ybus data)
           '(microinstruction byte-func ybus))))))

(defun can-get-to-xbus (data)
  (cond ((or (atom data) (neq (car data) 'microdata))
         (retch "Not microdata: ~S" data))
        (t (memq (cadr data) '(xbus abus bbus)))))

(defun can-get-to-ybus (data)
  (cond ((or (atom data) (neq (car data) 'microdata))
         (retch "Not microdata: ~S" data))
        (t (memq (cadr data) '(ybus abus bbus)))))

(defun can-get-to-alub (data)
  (cond ((or (atom data) (neq (car data) 'microdata))
         (retch "Not microdata: ~S" data))
        (t (memq (cadr data) '(alub ybus abus bbus)))))

;First value is code, second is t if form2 is on Xbus, nil if form1 is
(defun get-to-xbus-and-alub (form1 form2)
  (let* ((*backtrace* (cons '(get-to-xbus-and-alub) *backtrace*))
         (data1 (microexpand form1))
         (data2 (microexpand form2)))
    (cond ((or (atom data1)
               (neq (car data1) 'microdata)
               (not (memq (cadr data1) '(abus bbus xbus ybus alub))))
           (retch "Data not accessible: ~S == ~S" form1 data1))
          ((or (atom data2)
               (neq (car data2) 'microdata)
               (not (memq (cadr data2) '(abus bbus xbus ybus alub))))
           (retch "Data not accessible: ~S == ~S" form2 data2))
          ((eq (cadr data1) 'xbus)
           (values (paralyze (caddr data1) (get-to-alub data2)) nil))
          ((memq (cadr data1) '(ybus alub))
           (values (paralyze (get-to-alub data1) (get-to-xbus data2)) t))
          ((eq (cadr data2) 'xbus)
           (values (paralyze (get-to-alub data1) (caddr data2)) t))
          ((memq (cadr data2) '(ybus alub))
           (values (paralyze (get-to-xbus data1) (get-to-alub data2)) nil))
          ((slow-source-p data2)
           (values (paralyze (get-to-xbus data2) (get-to-alub data1)) nil))
          (t    ;Unconstrained, pick arbitrarily
           (values (paralyze (get-to-xbus data1) (get-to-alub data2)) nil)))))

;Regard all off-board sources as slow
(defun slow-source-p (datum)
  (selectq (cadr datum)
    (abus (memq (get (caddr datum) 'abus) '(memory-data ibus memory-data-force vma pc map)))
    (otherwise nil)))

;Test whether a given field of an instruction has a given value
;Should this barf if the field is not specified at all?
(defun fieldp (code field value)
  (or (eq (car code) 'microinstruction)
      (retch "~S not a microinstruction - fieldp" code))
  (equal (get code field) value))

;Change a piece of code according to specified field renamings a-list.
;Renaming something to nil deletes it completely.
(defun modify-code (code changes)
  (or (eq (car code) 'microinstruction)
      (retch "~S not a microinstruction - modify-code" code))
  (cons 'microinstruction
        (loop for (field val) on (cdr code) by 'cddr
              as change = (assq field changes)
              when (not change)
                collect field and collect val
              else when (cadr change)
                collect (cadr change) and collect val)))

;Microcode version of setf
(defmicro assign (original-destination original-source &aux destination source)
  (setq destination (microexpand original-destination)
        source (microexpand original-source))
  (cond ;; WRITE-ONLY REGISTERS
        ((eq destination 'xbas)
         (paralyze (get-to-obus32 source)
                   '(microinstruction spec load-xbas)))
        ;For the temporary memory control, there is an inst register we can write
        ((eq destination 'inst)
         (or (memq *machine-version* '(sim proto))
             (retch "Cannot assign to INST--it only exists inside the IFU!"))
         (paralyze (get-to-obus32 source)
                   '(microinstruction spec clear-stack-adjustment)))  ;code 7

        ((or (atom destination) (neq (car destination) 'microdata))
         (retch "~S == ~S~%is not a description of a valid data destination"
```

```
            original-destination destination))
       ((and (neq source 'array-index-shift-prom)      ;BYTE-R kludge
             (or (atom source)
                 (neq (car source) 'microdata)
                 (not (memq (cadr source) '(abus bbus xbus ybus alub obus)))))
        (retch "~S == ~S~%is not a description of data"
               original-source source))

       ;; A DESTINATIONS
       ((and (eq (cadr destination) 'abus)
             (fieldp (caddr destination) 'abus 'memory-data))
        ;Store into memory by putting source on obus and writing lbus dev
        ;Also must set up the amem-write-addr in case location maps into amem
        ;User is responsible for doing start-memory in parallel with this
        (paralyze (get-to-obus source)
                  (modify-code (caddr destination) '((abus nil) (amem-read-addr nil)))
                  (selectq *machine-version*
                    ((proto sim) '(microinstruction write-lbus obus
                                                    lbus-dev-addr write-memory
                                                    amem-write-addr (bus-address)))
                    (otherwise '(microinstruction amem-write-addr (bus-address))))))
       ((and (eq (cadr destination) 'abus)
             (fieldp (caddr destination) 'abus 'frame-pointer))
        ;Store into frame-pointer by putting the source on the obus and
        ;asserting write-frame-pointer
        (paralyze (get-to-obus32 source)
                  (modify-code (caddr destination) '((abus nil)))
                  '(microinstruction spec load-frmp)))
       ((and (eq (cadr destination) 'abus)
             (fieldp (caddr destination) 'abus 'stack-pointer))
        ;Store into stack-pointer by putting the source on the obus and
        ;asserting write-stack-pointer
        (paralyze (get-to-obus32 source)
                  (modify-code (caddr destination)
                               '((abus nil)))
                  '(microinstruction spec load-stkp)))
;This version for real memory control  (TMC board)
       ((and (eq (cadr destination) 'abus)
             (fieldp (caddr destination) 'abus 'vma))
        (if (memq *machine-version* '(sim proto))
            (retch "There is no VMA register on this machine"))
        ;Store into vma by putting source on obus and doing appropriate mem function
        ;For TMC, data can come from Obus or Memory
        (paralyze (get-to-obus32 source)
                  (modify-code (caddr destination) '((abus nil)))
                  '(microinstruction write-lbus
                                     ,(if (and (memq *machine-version* '(tmc tmc5))
                                               (eq (car source) 'microdata)
                                               (eq (cadr source) 'abus)
                                               (fieldp (caddr source) 'abus 'memory-data))
                                          'memory-data 'obus)
                                     mem write-vma)))
;This version for temporary memory control  (FEP board)
       ((and (memq *machine-version* '(sim proto))
       (eq (cadr destination) 'abus)
       (fieldp (caddr destination) 'abus 'amem)
       (fieldp (caddr destination) 'amem-read-addr 2501))
   ;Store into both hardware VMA and A-memory copy
   (paralyze (get-to-obus32 source)
             (modify-code (caddr destination) '((abus nil)
                                                (amem-read-addr amem-write-addr)))
             '(microinstruction write-amem obus
                                mem write-vma)))
  ((and (eq (cadr destination) 'abus)
        (fieldp (caddr destination) 'abus 'pc))
   (if (memq *machine-version* '(sim proto))
       (retch "There is no PC register on this machine"))
   ;Storing into PC -- for TMC, data can come from Obus or Memory
   (paralyze (get-to-obus32 source)
             (modify-code (caddr destination) '((abus nil)))
             (selectq *machine-version*
               ((tmc)
                '(microinstruction write-lbus ,(if (and (eq (car source) 'microdata)
                                                        (eq (cadr source) 'abus)
                                                        (fieldp (caddr source)
                                                                'abus 'memory-data))
                                                   'memory-data 'obus)
                                   mem microdevice
                                   lbus-dev-addr write-vma-and-pc))
               ((tmc5)
                '(microinstruction write-lbus ,(if (and (eq (car source) 'microdata)
                                                        (eq (cadr source) 'abus)
                                                        (fieldp (caddr source)
                                                                'abus 'memory-data))
                                                   'memory-data 'obus)
                                   mem write-vma
                                   spec ifu-control
                                   magic 8
                                   magic-mask 3))
               (otherwise (retch "Don't know how to assign to PC on ~S yet"
                                 *machine-version*)))))
```

```
((and (eq (cadr destination) 'abus)
      (fieldp (caddr destination) 'abus 'amem))
 ;Store into amem by selecting the appropriate write address, putting
 ;the source on the obus, and asserting write-amem.  Forget the speed
 ;specifier since there is plenty of time for the write address calculation.
 ;If the write address must come from the AMRA field, UH will put the speed back in.
 (paralyze (get-to-obus source)
           (modify-code (caddr destination) '((amem-read-addr amem-write-addr)
                                               (abus nil)
                                               (speed nil)))
           '(microinstruction write-amem obus)))

;; B DESTINATIONS
((and (eq (cadr destination) 'bbus)
      (fieldp (caddr destination) 'bbus 'bmem))
 ;Store into bmem by putting source on xbus if possible, otherwise
 ;on obus, selecting the appropriate write address, and asserting
 ;write-bmem.  Note that putting something on xbus never precludes
 ;later deciding to put it on obus too.  When writing bmem from xbus
 ;the high 4 bits come from abus.
 (let ((code (modify-code (caddr destination)
                          '((bmem-read-addr bmem-write-addr)
                            (bbus nil)))))
   ;If writing the hard-to-write locations, need spec function
   (if (< (get code 'bmem-write-addr) 360)
       (setq code (paralyze code
                            '(microinstruction spec crocks magic 10))))
                              ;AMWA gets plugged in later
   (if (memq (cadr source) '(abus xbus))
       (paralyze (get-to-xbus source)
                 code
                 '(microinstruction write-bmem xbus))
       (paralyze (get-to-obus source)
                 code
                 '(microinstruction write-bmem obus)))))

;; BYTE-R and BYTE-S registers (write-only on proto)
((and (eq (cadr destination) 'alub)                        ;BYTE-S
      (fieldp (caddr destination) 'ybus 'ybus-crocks-2)
      (fieldp (caddr destination) 'byte-func '(ldb 10 5)))
 (paralyze (get-to-obus32 source)
           (modify-code (caddr destination) '((ybus nil) (byte-func nil) (spec nil)))
           '(microinstruction spec load-byte-s)))
((and (eq (cadr destination) 'alub)                        ;BYTE-R
      (fieldp (caddr destination) 'ybus 'ybus-crocks-1)
      (fieldp (caddr destination) 'byte-func '(ldb 10 5)))
 (paralyze (if (eq source 'array-index-shift-prom)
               '(microinstruction magic 10 magic-mask 10)
               (paralyze (get-to-obus32 source)
                         '(microinstruction magic 0 magic-mask.10)))
           (modify-code (caddr destination) '((ybus nil) (byte-func nil) (spec nil)))
           '(microinstruction spec load-byte-r)))

;; ALUB (BYTE) DESTINATIONS
((eq (cadr destination) 'alub)
;; Assign to a byte by putting the byte's word on one bus (A or B)
;; and dpb'ing the byte value into it from the other bus, then assigning
;; the result back into the byte's word.
(let ((background-bus (get (caddr destination) 'ybus))
      (byte-bus (cadr source)))
  (if (not (or (and (eq background-bus 'abus) (eq byte-bus 'bbus))
               (and (eq background-bus 'bbus) (eq byte-bus 'abus))))
      (retch "Storing ~S (on ~S bus) into ~S (on ~S bus)~@
              cannot be done; one must be Abus and the other BBus"
             original-source byte-bus original-destination background-bus)
    (let ((word (make-microdata background-bus
                   (modify-code (caddr destination)
                                '((ybus nil) (byte-func nil)))))
          (rot (second (get (caddr destination) 'byte-func)))
          (siz (third (get (caddr destination) 'byte-func))))
      '(assign ,word ,(make-microdata 'obus
                       (paralyze (get-to-xbus word)
                                 (get-to-ybus source)
                                 '(microinstruction
                                   byte-func (dpb ,(logand 37 (- 40 rot))
                                                  ,siz
                                                  merge)
                                   alu alub
                                   force-obus<33-32> ,background-bus
                                   force-obus<35-34>
                                     ,(if (eq background-bus 'abus) 'abus 0)
                                     )))))))))


  (t (retch "I don't know how to store into this: ~S~% == ~S"
            original-destination destination))))
;Referencing amem via the address arithmetic
;Valid forms for addr are:
```

```
;       (frame-pointer fixnum)
;       (stack-pointer fixnum)
;       (macrocode)
;       fixnum                  ;between 8 and 7777 I guess
;       (constant val)          ;address of constant to be allocated later

(defmicro amem (addr)
  `(microdata abus (microinstruction abus amem
                                      amem-read-addr ,addr
                                      ,@(and (listp addr) (neq (car addr) 'constant)
                                             '(speed slow-first-half)))))

(defatomicro address-operand     ;of a format-2 instruction
  (amem (macrocode)))

;Allow the obus to be referenced explicitly, for convenience in writing
;code which stores into two destinations simultaneously
(defatomicro obus
  (microdata obus (microinstruction)))


;Defining registers in amem or bmem
;These forms define registers at specific locations
;You can use these, but normally they are just used by the SYSDEF stuff

(defmacro defareg-at-loc (name location
                         &optional initial-value (simulator-initial-value initial-value))
  (check-arg location (≤ 8 location 7777) "a 12-bit number")
  `(progn 'compile
     ,@(if initial-value `((add-a-memory-value ,location ,initial-value)))
     ,@(if simulator-initial-value `((aset ,simulator-initial-value *a-memory* ,location)))
     (defprop ,name ,location defareg-at-loc)
     (add-a-memory-symbol ',name ,location)
     #Q (si:record-source-file-name ',name 'defareg-at-loc)
     (eval-when (compile load eval)
       (add-atomicro ',name '(microdata abus (microinstruction abus amem
                                                          amem-read-addr ,location))))))

(defmacro defbreg-at-loc (name location
                         &optional initial-value (simulator-initial-value initial-value))
  (check-arg location (≤ 8 location 377) "an 8-bit number")
  `(progn 'compile
     ,@(if initial-value `((add-b-memory-value ,location ,initial-value)))
     ,@(if simulator-initial-value `((aset ,simulator-initial-value *b-memory* ,location)))
     (defprop ,name ,location defbreg-at-loc)
     (add-b-memory-symbol ',name ,location)
     #Q (si:record-source-file-name ',name 'defbreg-at-loc)
     (eval-when (compile load eval)
       (add-atomicro ',name '(microdata bbus (microinstruction bbus bmem
                                                          bmem-read-addr ,location))))))

;Defining registers at variable locations
;Note that if you do this after doing a defareg-at-loc of the same name, you
;get the same register at the same location.  This can be useful for
;specifying initial values for registers set up by SYSDEF.




(defvar *next-defareg-address*)
(defvar *defareg-limit*)
(defvar *next-defbreg-address*)
(defvar *defbreg-limit*)
(defvar *b-temps-base* 365)          ;Anything from here up is a temporary, possibly
                                     ;overlapped with other temporaries  (see UA)
                                     ;except for the b-temp ... b-temp-3 series

(defmacro reserve-scratchpad-memory (first-a last-a &optional first-b last-b)
  `(eval-when (compile eval)
     (setq *next-defareg-address* ,first-a
           *defareg-limit* ,last-a)
     ,(if first-b
          `(setq *next-defbreg-address* ,first-b
                 *defbreg-limit* ,last-b))))

(defmacro defareg (name &optional initial-value (simulator-initial-value initial-value))
  (let ((location (or (get name 'defareg-at-loc)
                      (prog1 *next-defareg-address*
                             (if (≥ *next-defareg-address* *defareg-limit*)
                                 (ferror nil "Not enough A-memory reserved"))
                             (incf *next-defareg-address*)))))
    `(progn 'compile
       ,@(if initial-value `((add-a-memory-value ,location ,initial-value)))
       ,@(if simulator-initial-value `((aset ,simulator-initial-value *a-memory* ,location)))
       (add-a-memory-symbol ',name ,location)
       #Q (si:record-source-file-name ',name 'defareg)
       (eval-when (compile load eval)
```

```
        (add-atomicro ',name
                      '(microdata abus (microinstruction abus amem
                                                          amem-read-addr ,location)))))))

(defmacro defbreg (name &optional initial-value (simulator-initial-value initial-value))
  (let ((location (or (get name 'defbreg-at-loc)
                      (prog1 *next-defbreg-address*
                             (if (≥ *next-defbreg-address* *defbreg-limit*)
                                 (ferror nil "Not enough B-memory reserved"))
                             (incf *next-defbreg-address*)))))
    (or (< 7 location 377)
        (ferror nil "~O≤B is not a normal B-memory location, you don't want to put ~S there"
                location name))
    '(progn 'compile
       ,@(if initial-value '((add-b-memory-value ,location ,initial-value)))
       ,@(if simulator-initial-value '((aset ,simulator-initial-value *b-memory* ,location)))
       (add-b-memory-symbol ',name ,location)
       #Q (si:record-source-file-name ',name 'defbreg)
       (eval-when (compile load eval)
         (add-atomicro ',name
                       '(microdata bbus (microinstruction bbus bmem
                                                          bmem-read-addr ,location)))))))

;Define B temporaries.  All files' B-temps go in the same memory locations.
(defmacro define-b-temps (&rest names)
  '(progn 'compile
     . ,(loop for name in names as loc upfrom *b-temps-base*
              ;; Note that location 377 cannot be used since it gets clobbered
              when (≥ loc 377) do (ferror "Not enough B-temp space for ~S" name)
              nconc '((add-b-memory-symbol ',name ,loc t)
                      #Q (si:record-source-file-name ',name 'define-b-temps)
                      (eval-when (compile load eval)
                        (add-atomicro ',name '(microdata bbus
                                               (microinstruction bbus bmem
                                                                 bmem-read-addr ,loc))))))))

;These are the values actually to be loaded into the hardware
(defvar *a-memory-values* nil)
(defvar *b-memory-values* nil)

(defun add-a-memory-value (location value &aux tem)
  (if (setq tem (assoc location *a-memory-values*)) (rplacd tem value)
      (push (cons location value) *a-memory-values*)))

(defun add-b-memory-value (location value &aux tem)
  (if (setq tem (assoc location *b-memory-values*)) (rplacd tem value)
      (push (cons location value) *b-memory-values*)))

;These are symbol tables for the debugger
(defvar *a-memory-symbols* nil)
(defvar *b-memory-symbols* nil)
(defvar *b-temp-symbols* nil)

(defun add-a-memory-symbol (name location &aux tem)
  (cond ((setq tem (assq name *a-memory-symbols*))
         (or (= (cdr tem) location)
             (format error-output "~&Warning: ~A defined at both ~O≤A and ~O≤A"
                     name (cdr tem) location))
         (rplacd tem location))
        (t (if (setq tem (rassoc location *a-memory-symbols*))
               (format error-output "~&~S and ~S at same address (~O≤A)"
                       name (car tem) location))
           (push (cons name location) *a-memory-symbols*))))

(defun add-b-memory-symbol (name location &optional temp-p &aux tem)
  (and temp-p (not (memq name *b-temp-symbols*))
       (push name *b-temp-symbols*))
  (cond ((setq tem (assq name *b-memory-symbols*))
         (or (= (cdr tem) location)
             (format error-output "~&Warning: ~A defined at both ~O≤B and ~O≤B"
                     name (cdr tem) location))
         (rplacd tem location))
        (t (and (setq tem (rassoc location *b-memory-symbols*))
                (not (and temp-p (memq (car tem) *b-temp-symbols*)))
                (format error-output "~&~S and ~S at same address (~O≤B)"
                        name (car tem) location))
           (push (cons name location) *b-memory-symbols*))))


;Constants on the A side.
;The final assembly phase will allocate Amem locations for these,
;but for now we just stick the constant in the amem address for the Lispifier
(defmicro a-constant (value)
  '(microdata abus (microinstruction abus amem
                                     amem-read-addr (constant ,(eval value)))))

;Constants on the B side
(defmicro b-constant (value)
  '(microdata bbus (microinstruction bbus bmem
                                     bmem-read-addr (constant ,(eval value)))))

;The base registers for the amem addressing hardware
```

```
(defatomicro frame-pointer
  (microdata abus (microinstruction abus frame-pointer)))

(defatomicro stack-pointer
  (microdata abus (microinstruction abus stack-pointer)))

(defmicro increment-stack-pointer ()
  '(microinstruction stack-pointer increment))

(defmicro decrement-stack-pointer ()
  '(microinstruction stack-pointer decrement))


;Explicit routing kludges (PARALLEL won't rewrite the code to make it compatible)
(defmicro via-xbus (source)
  (make-microdata 'xbus (get-to-xbus source)))

(defmicro via-ybus (source)
  (make-microdata 'ybus (get-to-ybus source)))
;The macro program counter.
;This is a word address, with bit 31 selecting between the two
;halfwords.  The hardware supplies the tag when reading, and
;looks at bit 31 when writing.  The data type field is 60 or 70.

(defatomicro pc
  (pc-kludge))

(defmicro pc-kludge ()
  (selectq *machine-version*
    ((sim proto)
     ;; Use 2500@A, a location kludgily known about...
     '(microdata abus (microinstruction abus amem amem-read-addr 2500)))
    (otherwise
     '(microdata abus (microinstruction abus pc)))))

;To translate the PC into a 32-bit halfword index, rotate it left 1
(defmicro halfword-pc (word-pc)
  '(rotate ,word-pc 1))

;To translate a halfword index into a PC value, rotate it right one place
;then plug 3 into the high-order 2 data-type bits, selecting type 60 or 70.
(defmicro word-pc (halfword-pc)
  (make-microdata 'obus
    (paralyze (get-to-ybus halfword-pc)
              '(microinstruction byte-func (ldb 31. 32.)
                                 alu alub
                                 force-obus<33-32> 3))))  ;dtp-even-pc/dtp-odd-pc

;To translate a word address into a PC which points at the odd (second)
;instruction in that word, all we have to do is set the data type.
(defmicro odd-pc (address)
  '(set-type ,address dtp-odd-pc))

;Translate a word address into a PC which points at the first instruction in that word
(defmicro even-pc (address)
  '(set-type ,address dtp-even-pc))

;This kludge is to avoid conflicts for the magic number field
(defmicro even-pc-except-30-through-28 (address)
  (let ((dtp-code (find-position-in-list 'dtp-even-pc *data-types*)))
    (make-microdata 'obus
      '(parallel ,(get-to-obus32 address)
                 (microinstruction force-obus<33-32> ,(lsh dtp-code -4))
                 (microinstruction magic ,(logand dtp-code 10)
                                   magic-mask 10)))))   ;force-obus<31>

;Predicate for checking "low" bit of PC
(defmicro odd-pc? (pc)
  (make-microcondition 'alub-0 'true
                       (paralyze (get-to-ybus pc)
                                 '(microinstruction byte-func (ldb 1 32.)))))


;Macroinstruction fields that come in on the B side
(defatomicro macro-unsigned-immediate
  (microdata bbus (microinstruction bbus macro-unsigned-immediate)))

(defatomicro macro-signed-immediate
  (microdata bbus (microinstruction bbus macro-signed-immediate)))

;Two words of magic hardware fields
(defatomicro ybus-crocks-1
  (microdata ybus (microinstruction ybus ybus-crocks-1
                                    spec crocks-to-ybus)))

(defatomicro ybus-crocks-2
  (microdata ybus (microinstruction ybus ybus-crocks-2
                                    spec crocks-to-ybus)))
```

F:>LMach>Ucode>NET.LISP.71

```
(defucode service-net-transmit-done
  (assign net-b-temp %net-free-list)
  (parallel (start-memory write physical %net-packet-being-transmitted)
            (assign memory-data (set-type net-b-temp dtp-fix)))
  (assign %net-free-list %net-packet-being-transmitted)
  (assign %net-packet-being-transmitted (b-constant -1))
  (parallel (set-net-status %net-micro-status-idle)
            (jump service-net-idle)))

;;; Read net status, and increment meters. If there was an error, throw the packet
;;; away, and wakeup the regular process
(defucode net-receive-completion
  (start-memory read physical %net-control-address)
  (io-board-bug-delay)
  (nop)
  (assign net-dma-temp memory-data)
  (if (bit-test net-dma-temp (b-constant (get '%nsr-error-mask 'sysconstant)))
      (goto net-receive-error)
      (drop-through))
  (assign net-dma-temp (+ %net-packet-being-received
                          (b-constant (field-word-offset 'ether-packet-final-pointer))))
  (assign net-b-temp %net-memory-address)
  (parallel (start-memory write physical net-dma-temp)
            (assign memory-data net-b-temp))
  ;; Link onto received list
  (assign net-b-temp %net-received-list)
  (parallel (start-memory write physical %net-packet-being-received)
            (assign memory-data (set-type net-b-temp dtp-fix)))
  (assign %net-received-list %net-packet-being-received)
  (assign %net-packet-being-received (b-constant -1))
  (parallel (set-net-status %net-micro-status-idle)
            (jump service-net-idle)))

(defucode net-receive-error
  ;; Increment counters for the exact kind of error we received
  (if (field-bit net-dma-temp %%nsr-crc-error)
      (increment %net-crc-errors)
      (drop-through))
  (if (field-bit net-dma-temp %%nsr-alignment-error)
      (increment %net-alignment-errors)
      (drop-through))
  (if (field-bit net-dma-temp %%nsr-preamble-error)
      (increment %net-preamble-errors)
      (drop-through))
  (if (field-bit net-dma-temp %%nsr-buffer-overflow)
      (increment %net-buffer-overflows)
      (drop-through))
  (jump reset-net-dma))

(defucode net-transmit-collision
  (start-memory read physical %net-control-address)
  (io-board-bug-delay)
  (nop)
  (assign net-dma-temp memory-data)
  ;; Here increment meters
  (increment %net-collisions)

  ;; If we have backed off too many times, fail transmission
  (if (equal-fixnum %net-next-backoff (b-constant (1- (lsh 1 (+ 2 15.)))))
      (goto net-transmit-failure)
      (drop-through))
  ;; Mask for pseudo random number generation
  (assign net-b-temp (logand %net-next-backoff (b-constant (1- (lsh 1 (+ 2 18.))))))

  ;; Kludging is because we dont have a b-temp to read microsecond clock into
  (disable-tasking)
  (parallel (disable-tasking)
            (for-effect (read-lbus-dev 36 8)))
  ;; Backoff is mask & microsecond-clock
  (parallel (declare-memory-timing data-cycle)
            (assign %net-backoff-count (logand memory-data net-b-temp)))
  ;; %net-next-backoff <= (1- (^ 2 n+1))
  (parallel (assign %net-next-backoff (logior (rotate %net-next-backoff 1)
                                              (b-constant 1)))
            (jump start-net-backoff)))

(defucode start-net-backoff
  (set-net-status %net-micro-status-backing-off)
  (parallel (start-memory write physical %net-control-address)
            (assign memory-data (b-constant (get '%nsr-backoff-start 'sysconstant))))
  (parallel (start-net-dma backoff-timer)
            (jump device-service-end)))

(defucode net-transmit-failure
  (parallel (increment %net-transmit-aborts)
            (jump reset-net-dma)))
```

```
(definstl %net-wakeup no-operand
  (wakeup-net-service))

(defucode initialize-net
  (phys-mem-read (a-constant (get 'net-address-1 'virtual-address)))
  (assign %net-address-1 memory-data)
  (phys-mem-read (a-constant (get 'net-address-2 'virtual-address)))
  (parallel (return)
            (assign %net-address-2 memory-data)))

;; This is separate, since we dont have an extra cycle
(defmicro wakeup-receive-end-service ()
  '(parallel (assign service-task-requests
                     (logior service-task-requests
                             (b-constant (byte-mask %%service-receive-end))))
             (wakeup-task %device-service-task)
             ))

;;; This is the receive end of the network
(defmicro check-packet-end ()
  '(if lbus-dev-cond
       (parallel (wakeup-receive-end-service)
                 (jump net-dma-dead))
       (drop-through)))

(defucode net-receive-dma
  ;; Starts with %net-block-pointer pointing to the dest-high
  (parallel (receive-dma %net-block-pointer)
            (check-packet-end))
  (parallel (extra-time-to-drive-lbus)
            (set-net-status %net-micro-status-receiving))
  ;; Task switch
  (parallel (receive-dma %net-block-pointer nil)
            (check-packet-end))
  ;; Rewind pointer to dest-high
  (parallel (extra-time-to-drive-lbus)
            (assign %net-block-pointer (- %net-block-pointer (b-constant 2))))
  (parallel (start-memory read physical %net-block-pointer)
            (assign %net-block-pointer (1+ %net-block-pointer)))
  (parallel (start-memory read physical %net-block-pointer)
            (assign %net-block-pointer (1+ %net-block-pointer)));
  ;; net-dma-temp is the first address word
  (assign net-dma-temp memory-data)
  (if (not (equal-fixnum (ldb memory-data 20 8) %net-address-2))
      (goto address-miss)
      (drop-through))
  (if (not (equal-fixnum net-dma-temp %net-address-1))
      (goto address-miss)
      (goto net-accept-packet)))

;;; Here address comparison failed, check for broadcast or promiscuity
;;; net-dma-temp is the first address word
(defucode address-miss
  (if (ldb-bit-test net-dma-temp 7)
      (goto net-accept-packet)
      (drop-through))
  ;; Here check for promiscuity and goto NET-ACCEPT-PACKET
  (jump net-ignore-packet))

(defucode net-ignore-packet
  (net-control nil t t)
  (set-net-status %net-micro-status-ignoring)
  ;; Task switch
  (increment %net-ignored)
  (terminate-net-dma %net-micro-status-idle))

(defucode net-accept-packet
  (net-control nil t)
  (jump net-header-loop))

;;; Transfer the header into the packet block
(defucode net-header-loop
  (parallel (receive-dma %net-block-pointer)
            (assign %net-block-pointer (1+ %net-block-pointer))
            (check-packet-end))
  (parallel (extra-time-to-drive-lbus)
            (assign %net-word-count (1- %net-word-count))
            (if (not (minus-fixnum obus))
                (goto net-header-loop)
                ;; After the header, the rcv blocks follow directly
                (goto net-block-fetch-loop))))

;;; Fetch next block pointer and count, and dma one word into it.
;;; If there are no blocks left, return with data-overflow error
(defucode net-block-fetch-loop
  (parallel (start-memory read physical %net-block-pointer)
            (assign %net-block-pointer (1+ %net-block-pointer)))
  (parallel (start-memory read physical %net-block-pointer)
            (assign %net-block-pointer (1+ %net-block-pointer)))
  (parallel (assign %net-memory-address memory-data)
            (if (minus-fixnum memory-data)
```

```
              (goto net-data-overflow)
              (drop-through)))
  (parallel (assign %net-word-count (1- memory-data))
            (jump net-block-loop)))

;;; Transfer in all the words in this block until packet end
(defucode net-block-loop
  (parallel (receive-dma %net-memory-address)
            (assign %net-memory-address (1+ %net-memory-address))
            (check-packet-end))
  (parallel (extra-time-to-drive-lbus)
            (assign %net-word-count (1- %net-word-count))
            (if (not (minus-fixnum obus))
                (goto net-block-loop)
                (goto net-block-fetch-loop))))

;; Store additional-flags, in packet we have not dismissed by this point
(defucode net-data-overflow
  ;; Increment a meter
  (terminate-net-dma %net-micro-status-idle t))

(defucode net-dma-dead
  (net-control nil t)
  (jump net-dma-dead))
;;; Transmit side

;; This is separate, since we dont have an extra cycle
(defmicro wakeup-transmit-collision-service ()
  '(parallel (assign service-task-requests
                     (logior service-task-requests
                             (b-constant (byte-mask %%service-transmit-collision))))
             (wakeup-task %device-service-task)
             ))

(defmicro check-transmit-collision ()
  '(if lbus-dev-cond
       (wakeup-transmit-collision-service)
       (drop-through)))

(defucode net-transmit-dma
  (start-memory read physical %net-control-address)
  (io-board-bug-delay)
  (assign %net-memory-address (+ %net-packet-being-transmitted
                                 (b-constant (field-word-offset 'ether-packet-dest-high))))
  (if (field-bit memory-data %%nsr-not-transmitting)
      (goto switch-to-receive)
      (drop-through))
  (parallel (transmit-dma %net-memory-address)
            (assign %net-memory-address (1+ %net-memory-address))
            (check-transmit-collision))
  (set-net-status %net-micro-status-transmitting)
  ;; Task switch
  (assign %net-block-pointer (+ %net-packet-being-transmitted
                                (b-constant
                                  (field-word-offset 'ether-packet-xmt-0-address))))
  (parallel (start-memory read physical %net-block-pointer)
            (assign %net-block-pointer (1+ %net-block-pointer)))
  ;; 4 words, but 1 already done, = 3 - 1 = 2
  (assign %net-word-count (b-constant 2))
  ;; net-dma-temp is the address of the first users block
  (parallel (assign net-dma-temp memory-data)
            (jump net-transmit-block-loop)))

(defucode net-transmit-next-block
  ;; Read this blocks count and the next blocks address
  (parallel (start-memory read physical %net-block-pointer)
            (assign %net-block-pointer (1+ %net-block-pointer)))
  (parallel (start-memory read physical %net-block-pointer)
            (assign %net-block-pointer (1+ %net-block-pointer)))
  (assign %net-word-count (1- memory-data))
  (parallel (assign net-dma-temp memory-data)
            (jump net-transmit-block-loop)))

(defucode net-transmit-block-loop
  (parallel (transmit-dma %net-memory-address)
            (assign %net-memory-address (1+ %net-memory-address))
            (check-transmit-collision))
  (parallel (assign %net-word-count (1- %net-word-count))
            (if (not (minus-fixnum obus))
                (goto net-transmit-block-loop)
                (drop-through)))
  (parallel (assign %net-memory-address net-dma-temp)
            (if (minus-fixnum net-dma-temp)
                (goto net-transmitted-last-word)
                (goto net-transmit-next-block))))

(defucode net-transmitted-last-word
  ;; When started here, the last data word is in the shift register, we want
  ;; to cause it to go to state CRC after this word
  (parallel (transmit-dma %net-memory-address t t)
            (check-transmit-collision))
```

```
  (nop)
  ;; Task switch
  ;; Here the CRC is in the output shift register so check for collision
  (set-net-status %net-micro-status-transmit-done)
  (parallel (transmit-dma %net-memory-address t)
            (check-transmit-collision))
  (parallel (wakeup-net-service)
            (jump net-dma-dead)))

;; Here we want to switch to receive mode if possible
(defucode switch-to-receive
  ;; Change to receive mode
  (parallel (start-memory write physical %net-control-address)
            (assign memory-data (b-constant (get '%nsr-receive-start 'sysconstant))))
  (parallel (assign %net-block-pointer (+ (b-constant
                                            (field-word-offset 'ether-packet-dest-high))
                                         %net-packet-being-received))
            (if (minus-fixnum %net-packet-being-received)
                (jump net-ignore-packet)
                (drop-through)))
  (assign %net-word-count (1- (b-constant 2)))
  ;; [illegible] cs and wait for first receive data
  (net-control nil t)
  (parallel (set-net-status %net-micro-status-receive-wait)
            (jump net-receive-dma)))
;;; %net-backoff-count has the count to back off (units are 12.8 usec)
;;; Check to see if packet is coming in
(defucode backoff-timer
  (start-memory read physical %net-control-address)
  (io-board-bug-delay)
  (nop)
  (if (field-bit memory-data %%nsr-data-valid)
      (goto switch-to-receive)
      (drop-through))
  (net-control nil t)
  (parallel (assign %net-backoff-count (1- %net-backoff-count))
            (if (minus-fixnum obus)
                (drop-through)
                (goto backoff-timer)))
  ;; Here backoff has expired
  (terminate-net-dma %net-micro-status-idle))
;;; This is logically part of the device service stuff
(defucode net-service-loop
  (if (bit %%service-receive-end)
      (parallel (assign %%service-receive-end (b-constant 0))
                (jump net-receive-completion))
      (drop-through))
  (if (bit %%service-transmit-collision)
      (parallel (assign %%service-transmit-collision (b-constant 0))
                (jump net-transmit-collision))
      (drop-through))
  (if (bit %%service-net)
      (dispatch-after-this net-micro-status
                           (assign %%service-net (b-constant 0))
        ;; These are all functionally equivalent, keep hands off dma task
        ((%net-micro-status-transmit-wait %net-micro-status-receiving
          %net-micro-status-transmitting %net-micro-status-ignoring
          %net-micro-status-backing-off)
         (jump device-service-end))
        ((%net-micro-status-idle)
         (goto service-net-idle))
        ((%net-micro-status-reset)
         (assign %net-backoff-count (b-constant -1))
         (assign %net-packet-being-received (b-constant -1))
         (parallel (assign %net-packet-being-transmitted (b-constant -1))
                   (jump reset-net-dma)))
        ((%net-micro-status-receive-wait)
         ;; If we have a packet to transmit, try to
         (if (minus-fixnum %net-transmit-list)
             (jump device-service-end)
             ;; Otherwise, reset and go to idle
             (goto reset-net-dma)))
        ((%net-micro-status-transmit-done)
         (goto service-net-transmit-done))
        )
      (drop-through))
  (jump device-service-end))

(defucode reset-net-dma
  (parallel (start-memory write physical %net-control-address)
            (assign memory-data (b-constant (get '%nsr-error-clear 'sysconstant))))
  (for-effect (service-net-control t))
  (parallel (set-net-status %net-micro-status-idle)
            (jump service-net-idle)))

(defucode service-net-idle
  (parallel (start-memory write physical %net-control-address)
            (assign memory-data (b-constant (get '%nsr-error-clear 'sysconstant))))
  ;; Always prepare a packet to be received into
  (if (minus-fixnum %net-packet-being-received)
```

```
    (parallel
      (assign %net-packet-being-received %net-free-list)
      (if (not (minus-fixnum %net-free-list))
          (sequential
            (phys-mem-read %net-free-list)
            (assign %net-free-list memory-data))
          (drop-through)))
    (drop-through))
  ;; If we can transmit, try to
  (if (minus-fixnum %net-packet-being-transmitted)
      (parallel
        (assign %net-packet-being-transmitted %net-transmit-list)
        (if (minus-fixnum %net-transmit-list)
            (drop-through)
            (sequential
              (parallel (phys-mem-read %net-transmit-list)
                        (assign %net-next-backoff (b-constant (1- (lsh 1 2)))))
              (parallel (assign %net-transmit-list memory-data)
                        (jump start-net-transmitter)))))
      (goto start-net-transmitter))
  ;; Otherwise start receiver if we can
  (if (minus-fixnum %net-packet-being-received)
      (jump device-service-end)
      (drop-through))
  (set-net-status %net-micro-status-receive-wait)
  (assign %net-block-pointer (+ %net-packet-being-received
                                (b-constant (field-word-offset 'ether-packet-dest-high))))
  (assign %net-word-count (1- (b-constant 2)))
  (parallel (start-memory write physical %net-control-address)
            (assign memory-data (b-constant (get '%nsr-receive-start 'sysconstant))))
  (parallel (start-net-dma net-receive-dma)
            (jump device-service-end)))

(defucode start-net-transmitter
  (if (minus-fixnum %net-backoff-count)
      (drop-through)
      (goto start-net-backoff))
  (set-net-status %net-micro-status-transmit-wait)
  (parallel (start-memory write physical %net-control-address)
            (assign memory-data (b-constant (get '%nsr-transmit-start 'sysconstant))))
  (parallel (start-net-dma net-transmit-dma)
            (jump device-service-end)))
;;; Sequencer special functions


;Halt the machine after executing this microinstruction
(defmicro halt (reason)
  reason  ;ignored
  '(microinstruction spec halt))

;Pop a word off of the control stack and put it into NPC
(defmicro popj-into-npc ()
  '(microinstruction sequencer pop-npc spec npc-magic magic 3 magic-mask 3))

;Read the top of the control stack and pop it (also puts it into NPC)
;Read the input to the NPC (taken from the control stack) onto the Lbus
;and do a microdevice read from a nonexistent device to get the Lbus into
;the datapath.  Use the FEP board subdevice 1 as the nonexistent device
;(this drives lbus dev cond from the page tags, but doesn't drive lbus data).
(defmicro pop-control-stack ()
  '(parallel (read-lbus-dev 36 1)
             (microinstruction spec npc-magic magic 1 magic-mask 3 sequencer pop-npc
                               speed very-slow)))

;Write NPC from Obus; use task-dispatch in next cycle to branch there.
;The spec does all the work, but we also need to do a bogus microdevice write
;in order to make bus scheduling happen properly.
;Use subdevice 7 in the FEP board (only subdevices 0-2 exist).
(defmicro long-dispatch (data)
  (paralyze (get-to-obus32 data)
            (selectq *machine-version*
              ((sim proto)
               '(microinstruction spec npc-magic magic 2 magic-mask 3
                                  write-lbus obus lbus-dev-addr #.(+ 36_5 7)))
              (otherwise
               '(microinstruction spec npc-magic magic 2 magic-mask 3 mem microdevice
                                  write-lbus obus lbus-dev-addr #.(+ 36_5 7))))))

;Uses b-temp
(defmicro read-csp ()
  (selectq *machine-version*
    ((sim proto) (fetch "Cannot read CSP on old machine"))
    (otherwise '(sequential
                 (parallel (assign b-temp (read-lbus-dev 36 1))        ;Read dummy device
                           (microinstruction spec npc-magic magic 1 magic-mask 3
                                             speed very-slow))
                 (ldb b-temp 4 16.)))))

;Uses b-temp
```

```
(defmicro read-cur-task-and-csp ()
  (selectq *machine-version*
    ((sim proto) (retch "Cannot read CUR-TASK and CSP on old machine"))
    (otherwise '(sequential
                  (parallel (assign b-temp (read-lbus-dev 36 1))        ;Read dummy device
                            (microinstruction spec npc-magic magic 1 magic-mask 3
                                              speed very-slow))
                  (ldb b-temp 8 16.)))))

;Write into an Lbus device
;NIL may be specified for the data, which means we don't care what's written
(defmicro write-lbus-dev (card subdevice data)
  (setq data (microexpand data))
  (paralyze (and data (get-to-obus data))
            (microexpand '(select-lbus-dev ,card ,subdevice))
            (selectq *machine-version*
              ((sim proto) '(microinstruction write-lbus obus))
              ((tmc tmc5) '(microinstruction
                             write-lbus ,(cond ((null data) 'junk)
                                               ((and (eq (car data) 'microdata)
                                                     (eq (cadr data) 'abus)
                                                     (fieldp (caddr data) 'abus 'memory-data))
                                                'memory-data)
                                               (t 'obus))
                             mem microdevice))
              (otherwise '(microinstruction write-lbus obus mem microdevice)))))

;Read from an Lbus device
(defmicro read-lbus-dev (card subdevice)
  (make-microdata 'abus
    (paralyze (microexpand '(select-lbus-dev ,card ,subdevice))
              (selectq *machine-version*
                ((sim proto) '(microinstruction abus lbus))
                (otherwise '(microinstruction abus lbus mem microdevice
                                              speed slow-second-half))))))
                      ;slow-second-half is because the IO MD latch on the TMC
                      ;does not open until second half, and then the data still
                      ;have to propagate to the DP board and through 8304.
                      ;Need this to avoid GC map parity error.

(defmicro select-lbus-dev (card subdevice)
  (or (and (fixp card) (<= 0 card 37))
      (and (symbolp card) (get card 'symbolic-lbus-slot))
      (retch "~S illegal slot number" card))
  (or (and (fixp subdevice) (<= 0 subdevice 37))
      (retch "~S illegal subdevice number" subdevice))
  '(microinstruction lbus-dev-addr ,(if (symbolp card)
                                        '(,card ,subdevice)
                                        (dpb card 0505 subdevice))))

(defmacro define-lbus-card (name)
  '(eval-when (compile load eval)
     (defprop ,name t symbolic-lbus-slot)))

;Write the control register on the data path
(defmicro write-dp-control (source)
  (paralyze (get-to-obus32 source)
            '(microinstruction spec load-control)))

(defatomicro lbus-dev-cond
  (microcondition not-lbus-dev-cond false nil))
;;; Tasking

(defmicro read-cur-task ()
  (selectq *machine-version*
    ((sim proto) (retch "Cannot read CUR-TASK on old machine"))
    (otherwise '(sequential
                  (parallel (assign b-temp (read-lbus-dev 36 1))        ;Read dummy device
                            (microinstruction spec npc-magic magic 1 magic-mask 3
                                              speed very-slow))
                  (ldb b-temp 4 20.)))))

(defmicro wakeup-task (n)
  (setq n (decode-task-number n))
  '(microinstruction spec awaken-task magic-mask 3
                     magic ,(or (find-position-in-list n '(1 2 5 6))
                                (retch "~S illegal task number here" n))))

(defmicro write-task-state (n value)
  (setq n (decode-task-number n))
  (paralyze (get-to-obus32 value)
            '(microinstruction spec write-task
                               mem microdevice write-lbus obus lbus-dev-addr #.(+ 36_5 7)
                               force-obus<33-32> ,(ldb 0002 n)
                               force-obus<35-34> ,(ldb 0202 n))))

(defun decode-task-number (n)
  (and (symbolp n) (get n 'sysconstant) (setq n (get n 'sysconstant)))
  (or (and (fixp n) (≤ 0 n 17))
      (retch "~S illegal task number here" n))
```

```
n)

(defmicro dismiss ()
  '(microinstruction sequencer dismiss))

;Must be used twice in a row to work
(defmicro disable-tasking ()
  '(microinstruction spec disable-tasking))
;cdr-code-insertion hardware
(declare (special *cdr-codes*))          ;in SIM
(defmicro set-cdr (val cdr)
  (let ((cdr-code
          (if (numberp cdr) cdr (find-position-in-list cdr *cdr-codes*))))
    (or cdr-code (retch "~S undefined cdr code" cdr))
    (make-microdata 'obus
       '(parallel ,(get-to-obus val)
                  (microinstruction force-obus<35-34> ,cdr-code)))))

;data-type-insertion hardware
(declare (special *data-types*))         ;in SIM
(defmicro set-type (val dtp)
  (let ((dtp-code (if (numberp dtp) dtp (find-position-in-list dtp *data-types*))))
    (or dtp-code (retch "~S undefined data type" dtp))
    (make-microdata 'obus
       '(parallel ,(get-to-obus32 val)
                  (microinstruction force-obus<33-32> ,(lsh dtp-code -4))
                  ,(if (not (memq dtp '(dtp-fix dtp-float)))
                       (let ((num (logand 17 dtp-code)))
                         '(microinstruction force-obus<31-28> ,num
                                            magic ,num)))))))

;Set-cdr from a 'variable' rather than a 'constant'
;--- This and the next could be changed to allow background on BBus also
(defmicro merge-cdr (typed-pointer cdr-background)
  (make-microdata 'obus
                  (paralyze (get-to-obus typed-pointer)
                            (get-to-abus cdr-background)
                            '(microinstruction force-obus<35-34> abus))))

;Take low 32 bits from one source and high 4 from another
(defmicro merge-high-tag (typed-pointer tag-background)
  (make-microdata 'obus
                  (paralyze (get-to-obus32 typed-pointer)
                            (get-to-abus tag-background)
                            '(microinstruction force-obus<35-34> abus
                                               force-obus<33-32> abus))))

;Storing into memory
;The type map for normal storing, which simply identifies whether or
;not a pointer is being stored.  This is what enables the gc tag hardware.
(declare (special *storing-type-map*))  ;in UUX

;Store the contents of the currently-addressed memory location, with
;gc tag enabled, and with the cdr code coming from either a constant
;or the cdr field of another source or the same source (if unspecified).
;This is different from assigning to memory-data, because the
;latter is a lower-level operation which does not turn on the gc tagging.
;Note that the data to be stored is normally assumed to be a typed pointer and
;hence must come from the Abus so that it gets to the data type
;logic.
;The following options may be specified:
;        NOT-POINTER      - Value is known not to be a pointer, may come from Bbus
;        BLOCK    - Increment VMA after storing
;        cdr-code-name    - set cdr-code to that
;        (CDR source)     - get cdr code from source (number, cdr-code name, or datum)
;        OBUS-AS-GOOD-AS-ABUS - this kludge says that gc-map looking at abus data
;                              instead of obus data will not hurt anything
;        NO-AMEM          - this kludge says that we won't be writing a mapped-into-amem address
(defmicro store-contents (typed-pointer &rest options
                          &aux (cdr nil) (cdr-inst nil) (not-pointer nil) (block nil)
                               (obus-as-good-as-abus nil) (amem t))
  ;; Parse options
  (dolist (opt options)
    (cond ((eq opt 'not-pointer) (setq not-pointer t))
          ((eq opt 'block) (setq block t))
          ((eq opt 'obus-as-good-as-abus) (setq obus-as-good-as-abus t))
          ((eq opt 'no-amem) (setq amem nil))
          ((memq opt *cdr-codes*)
           (setq cdr (find-position-in-list opt *cdr-codes*)))
          ((and (listp opt) (eq (car opt) 'cdr))
           ;; Decompose into cdr, the obus cdr-field forcing, and cdr-inst, other code.
           (setq cdr (cadr opt))
           (cond ((numberp cdr))
                 ((memq cdr *cdr-codes*)
                  (setq cdr (find-position-in-list cdr *cdr-codes*)))
                ;((eq cdr 'memory-data)) ;this misfeature has been flushed from the hardware
                 ((and (not (atom (setq cdr-inst (microexpand cdr))))
                       (eq (car cdr-inst) 'microdata)
                       (memq (cadr cdr-inst) '(abus bbus)))     ;abus-only on the proto...
                  (setq cdr (cadr cdr-inst)
                        cdr-inst (caddr cdr-inst)))
```

```
                (t (retch "~S not a data source that can feed cdr field" cdr)
                   (setq cdr nil cdr-inst nil))))
             (t (retch "~S not a valid option" opt))))
    (paralyze (cond (not-pointer
                     (get-to-obus typed-pointer))
                    (obus-as-good-as-abus
                     (paralyze
                       (get-to-obus typed-pointer)
                     '(microinstruction type-map ,*storing-type-map*)))
                   (t
                    (paralyze
                      (get-to-abus typed-pointer)
                      '(microinstruction type-map ,*storing-type-map*
                                         xbus abus
                                         alu xbus))))
            (and cdr '(microinstruction force-obus<35-34> ,cdr))
            cdr-inst
            (and amem '(microinstruction amem-write-addr (bus-address)))
            (selectq *machine-version*
              ((sim proto)
               (if block (retch "store-contents block option not implemented"))
               '(microinstruction write-lbus obus
                                  lbus-dev-addr write-memory
                                  trap-enables (map-miss)
                                  mem start-cycle))
              (otherwise
               (microexpand (if (not block)
                                '(start-memory write)
                                '(start-memory write block)))))))

;ALU operations

;You get 16 functions of each kind
;Things depend on XBUS and ALUB not being weird
(defconst normal-alu-functions
          '(xbus alub X+1 X-1 X+Y X-Y X+Y+1 X-Y-1 and ior xor))  ;5 spares

(defconst weird-alu-functions
          '(X+1-overflow X-1-overflow X+Y-overflow X-Y-overflow
            X-Y-signed X-Y-1-signed nand andcy))        ;8 spares

(defun alu-microinstruction (func)
  (cond ((memq func normal-alu-functions)
         '(microinstruction alu ,func))
        ((memq func weird-alu-functions)
         '(microinstruction alu ,func spec arithmetic-trap-enb magic 4))
        (t (retch "~S undefined ALU function" func))))

;Define 1-operand ALU function
;Hair so that ybus operands work, too.
(defmacro defaluop1 (name field ycode &optional other-code)
  '(defmicro ,name (x-opnd)
     (setq x-opnd (microexpand x-opnd))
     (paralyze (if (memq (cadr x-opnd) '(ybus alub))
                   (microexpand (subst x-opnd 'y ',ycode))
                   (make-microdata 'obus
                                   (alu-paralyze (get-to-xbus x-opnd)
                                                 (alu-microinstruction ',field))))
               ',other-code)))

;Define 2-operand ALU function (optional third operand is constant 1)
;If one-operand? is specified it is code for the one-operand case
;otherwise require 2 or 3 operands.
(defmacro defaluop2 (name field
                     &optional commutative? third-operand? one-operand?
                               other-code)
  '(defmicro ,name (x-opnd
                    ,e(if one-operand? '(&optional))
                    y-opnd
                    ,e(if third-operand?
                          (if (not one-operand?)
                              '(&optional one)
                              '(one))))
     ,(if third-operand?
          '(or (null one) (equal one 1)
               (retch "Third operand to ~S must be 1, not ~S" ',name one)))
     ,(let ((two-op-code
             '(make-microdata 'obus
                 (alu-paralyze ,e(if commutative?
                                     '((get-to-xbus-and-alub x-opnd y-opnd))
                                     '((get-to-xbus x-opnd) (get-to-alub y-opnd)))
                               (alu-microinstruction
                                 ,(if (not third-operand?) '',field
                                      '(if one ',third-operand? ',field)))))))
        (if (null other-code)
            (if (not one-operand?) two-op-code
                '(if y-opnd ,two-op-code
                     (subst x-opnd 'arg ',one-operand?)))
            ''(parallel ,,(if (not one-operand?) two-op-code
                              '(if y-opnd ,two-op-code
                                   (subst x-opnd 'arg ',one-operand?)))
```

```
                    ,',other-code)))))

(defaluop1 1+ X+1 (xbus-constant-hack X+Y 1 y))
(defaluop1 1- X-1 (xbus-constant-hack X+Y -1 y))
(defaluop2 + X+Y t X+Y+1)
(defaluop2 - X-Y nil X-Y-1 (xbus-constant-hack X-Y 0 arg))
(defaluop2 commutative-diff X-Y t X-Y-1)
(defaluop2 logand and t)
(defaluop2 lognand nand t)
(defaluop2 logior ior t)
(defaluop2 logxor xor t)
(defaluop2 andc2 andcy nil)

(defaluop1 inc-checking-overflow X+1-overflow
           (xbus-constant-hack X+Y-overflow 1 y)
           (microinstruction trap-enables (overflow)))
(defaluop1 dec-checking-overflow X-1-overflow
           (xbus-constant-hack X+Y-overflow -1 y)
           (microinstruction trap-enables (overflow)))
(defaluop2 add-checking-overflow X+Y-overflow t nil nil
           (microinstruction trap-enables (overflow)))
(defaluop2 sub-checking-overflow X-Y-overflow nil nil nil
           (microinstruction trap-enables (overflow)))

;Used internally: ALU can also feed through xbus or alub

;This piece of hair generates an ALU operation with a constant on
;the xbus and an argument on the alub.  The hair is to decide which
;memory to put the constant in.
(defmacro xbus-constant-hack (alu-op constant y-opnd)
  (setq y-opnd (get-to-alub y-opnd))
  (make-microdata 'obus
    (alu-paralyze y-opnd
                  (get-to-xbus (if (uses-bbus y-opnd) '(a-constant ,constant)
                                                      '(b-constant ,constant)))
                  '(microinstruction alu ,alu-op))))

(defun uses-bbus (instruction)
  (cond ((eq (car instruction) 'microsequence)
         (uses-bbus (car (last instruction))))
        ((eq (car instruction) 'microinstruction)
         (loop for (field value) on (cdr instruction)
               thereis (eq field 'bbus)))
        ((eq (car instruction) 'microdata)
         (uses-bbus (caddr instruction)))
        (t (retch "uses-bbus:  What da fuck is dis? -- ~S" instruction))))




(defun alu-paralyze1 (inst)
  (selectq (car inst)
    ((microinstruction)
     (and (memq (get inst 'alu) '(X+Y X-Y X+Y+1 X-Y-1 X+Y-overflow X-Y-overflow
                                  X-Y-signed X-Y-1-signed))
          (selectq (get inst 'ybus)
            (abus (selectq (get inst 'abus)
                    ((amem) (let ((a (get inst 'amem-read-addr)))
                              (or (atom a) (neq (car a) 'constant))))
                    ((memory-data memory-data-force lbus map) t)
                    (otherwise nil)))           ;bases, vma, pc are fast
            (bbus (selectq (get inst 'bbus)
                    ((bmem) (let ((a (get inst 'bmem-read-addr)))
                              (or (atom a) (neq (car a) 'constant))))
                    (otherwise nil))))  ;macro-immediate's are fast
          (setq inst (paralyze inst '(microinstruction speed slow-second-half))))
     inst)
    ((microsequence)
     (cons 'microsequence (mapcar #'alu-paralyze1 (cdr inst))))
    (otherwise (retch "~S not a microinstruction" inst))))
;;; Support for byte fields

(defmacro byte-mask (ppss)
  (dpb -1
       (cond ((numberp ppss))
             ((not (get ppss 'byte-field))
              (retch "~S not a defined byte field" ppss))
             ((car (get ppss 'byte-field))))
       0))

(defun byte-pp (ppss)
  (lsh ppss -6))

(defun byte-ss (ppss)
  (logand 77 ppss))
```

```
(defun byte-pp-reflected (ppss)
  (logand 37 (- 40 (byte-pp ppss))))

(defun byte-numbers-to-ppss (n-bits bits-over)
  (+ (lsh bits-over 6) n-bits))

(defmacro defatomic-byte-field (name byte-specifier register)
  (let ((*backtrace* (cons '((defatomic-byte-field ,name)) *backtrace*))
        (ppss (if (listp byte-specifier)
                  (byte-numbers-to-ppss (first byte-specifier) (second byte-specifier))
                  (car (get byte-specifier 'byte-field)))))
    (or ppss (ferror nil "~S not defined as a system byte" byte-specifier))
    '(eval-when (compile load eval)
       (defprop ,name (,ppss ,register) byte-field)
       (defatomicro ,name
         ,(make-microdata 'alub
            (paralyze (get-to-ybus register)
                      '(microinstruction
                         byte-func (ldb ,(byte-pp-reflected ppss)
                                        ,(byte-ss ppss)))))))))

(defmacro def-byte-field (name byte-specifier place)
  (let ((*backtrace* (cons '((def-byte-field ,name)) *backtrace*))
        (ppss (if (listp byte-specifier)
                  (byte-numbers-to-ppss (first byte-specifier) (second byte-specifier))
                  (car (get byte-specifier 'byte-field)))))
    (or ppss (ferror nil "~S not defined as a system byte" byte-specifier))
    '(eval-when (compile load eval)
       (defprop ,name (,ppss) byte-field)
       (defmicro ,name (,place)
         (make-microdata 'alub
           (paralyze (get-to-ybus ,place)
                     '(microinstruction
                        byte-func (ldb ,',(byte-pp-reflected ppss)
                                       ,',(byte-ss ppss)))))))))

;Use this to define the a-list of symbolic dispatch cues associated with a field
(defmacro associate-dispatch-cues (field-name enumerated-type-name)
  '(eval-when (compile load eval)
     (defprop ,field-name ,enumerated-type-name enumerated-type-name)))

;Use this to define them as atomicros that are B-constants
(defmacro define-enumerated-value-constants (enumerated-type-name)
  (let ((codes (get enumerated-type-name 'enumerated-type-codes)))
    (if (null codes)
        (ferror nil "~S not declared as an enumerated type" enumerated-type-name))
    '(progn 'compile
       . ,(loop for (code . value) in codes
                collect '(defatomicro ,code
                           (b-constant ,value))))))

;Similar, for word offsets in a defstorage
(defmacro define-storage-word-offset-constants (defstorage-type-name)
  (let ((fields (get defstorage-type-name 'defstorage-fields)))
    (if (null fields)
        (ferror nil "~S not declared as a defstorage type" defstorage-type-name))
    '(progn 'compile
       . ,(loop for field in fields
                collect '(defatomicro ,field
                           (b-constant ,(field-word-offset field)))))))

;Similar for a single constant defined with defsysconstant
(defmacro define-sysconstant (name)
  (or (get name 'sysconstant) (ferror nil "~S not declared with defsysconstant"))
  '(defatomicro ,name
     (b-constant ,(get name 'sysconstant))))

;;; Micros for more direct access to the shift/mask/merge logic
(defmicro rotate (opnd left-amt)
  (make-microdata 'alub
    (paralyze (get-to-ybus opnd)
              '(microinstruction byte-func (ldb ,left-amt 32.)))))

(defmicro ldb (opnd n-bits bits-over &optional background)
  (if (equal background 0) (setq background nil))
  (validate-byte-specifier n-bits bits-over)
  (make-microdata 'alub
    (paralyze (get-to-ybus opnd)
              '(microinstruction
                 byte-func (ldb ,(selectq bits-over
                                   ((byte-r macro) bits-over)
                                   (otherwise (logand 37 (- 40 bits-over))))
                                ,n-bits
                                ,@(if background '(merge))))
              (if background (get-to-xbus background)))))

(defmicro dpb (opnd n-bits bits-over background)
  (if (equal background 0) (setq background nil))
  (validate-byte-specifier n-bits bits-over)
  (make-microdata 'alub
```

```
    (paralyze (get-to-ybus opnd)
              '(microinstruction byte-func (dpb ,bits-over ,n-bits
                                                ,@(if background '(merge))))
             (if background (get-to-xbus background)))))

;Alternate version of LDB used by certain hacks (subprimitives)
;Allows you to take advantage of the fact that bytes split across the
;end of the word work (i.e. it really is a rotate followed by a mask).
(defmicro strange-ldb (opnd n-bits bits-over &optional background)
  (if (equal background 0) (setq background nil))
  (make-microdata 'alub
    (paralyze (get-to-ybus opnd)
              '(microinstruction
                 byte-func (ldb ,(logand 37 (- 40 bits-over))
                                ,n-bits
                                ,@(if background '(merge))))
             (if background (get-to-xbus background)))))

;Ensure that the specified byte lies within the low 32 bits and is otherwise legal.
(defun validate-byte-specifier (n-bits bits-over)
  (or (symbolp n-bits)
      (≤ 1 n-bits 32.)
      (retch "The number of bits, ~S, is not between 1 and 32." n-bits))
  (or (symbolp bits-over)
      (≤ 0 bits-over 31.)
      (retch "The bit position, ~S, is not between 0 and 31." bits-over))
  (or (symbolp n-bits) (symbolp bits-over) (≤ (+ n-bits bits-over) 32.)
      (retch "The byte specified at ~S ~S overlaps the 32-bit word boundary"
             n-bits bits-over)))

;Invoke special hair in the SHFMSK0 PAL
(defmicro complemented-sign-bit (opnd)
  '(parallel (ldb ,opnd 1 31.)
             (microinstruction spec alub-sign-hack)))

;Get a byte by name rather than by bits,bits-over.
(defmicro ldb-field (operand field-name &optional (background 0))
  (multiple-value-bind (n-bits bits-over)
      (decode-byte-field-specifier field-name)
    '(ldb ,operand ,n-bits ,bits-over ,background)))

(defmicro dpb-field (operand field-name background)
  (multiple-value-bind (n-bits bits-over)
      (decode-byte-field-specifier field-name)
    '(dpb ,operand ,n-bits ,bits-over ,background)))

(defmacro ldb-field (operand field-name)
  (let ((ppss (car (get field-name 'byte-field))))
    (or ppss (ferror "~S is not a defined byte field" field-name))
    '(ldb ,ppss ,operand)))

(defmacro dpb-field (operand field-name background)
  (let ((ppss (car (get field-name 'byte-field))))
    (or ppss (ferror "~S is not a defined byte field" field-name))
    '(dpb ,operand ,ppss ,background)))

(defmacro field-mask (field-name)
  (let ((ppss (car (get field-name 'byte-field))))
    (or ppss (ferror "~S is not a defined byte field" field-name))
    (dpb -1 ppss 0)))

(defmicro field-bit (operand field-name)
  (multiple-value-bind (n-bits bits-over)
      (decode-byte-field-specifier field-name)
    (or (= n-bits 1) (retch "~S is not a single-bit field" field-name))
    (make-microcondition 'alub-0 'true
                         (paralyze '(microinstruction
                                      byte-func (ldb ,(logand 37 (- 40 bits-over)) ,n-bits))
                                   (get-to-ybus operand)))))

(defun decode-byte-field-specifier (field-name)
  (let ((ppss (car (get field-name 'byte-field))))
    (or ppss (retch "~S is not a defined byte field" field-name))
    (values (logand 77 ppss)
            (lsh ppss -6))))
;;; Since the proto machine is dead, don't bother checking.
(defatomicro byte-s
  (ldb ybus-crocks-2 5 24.))

(defatomicro byte-r
  (ldb ybus-crocks-1 5 24.))
;;; Multiplication

;Reading out the 32-bit signed product of X and Y registers
(defatomicro mpy-product
  (microdata xbus
             (microinstruction xbus product
                               spec multiply
                               magic 4
                               speed very-slow)))
```

```
;Multiplier input registers here named after the busses they are
;on, rather than the TRW names which are reversed.
;Loading the multiplier is not done with ASSIGN, mainly because
;of the weirdness that it loads from the -high- half of Ybus.

;Writing into the X register, signed or unsigned
(defmicro write-mpy-x (x-source &optional signed)
  (paralyze (get-to-xbus x-source)
            '(microinstruction spec multiply
                               magic ,(if signed 6 2))))

;Writing into the Y register, signed or unsigned
(defmicro write-mpy-y-from-high (y-source &optional signed)
  (paralyze (get-to-ybus y-source)
            '(microinstruction spec multiply
                               magic ,(if signed 11 1))))
;;; Main memory

(defatomicro memory-data
  (microdata abus (microinstruction abus memory-data amem-read-addr (bus-address))))

;The virtual-address register
(defatomicro vma
  (vma-kludge))

;For temporary memory control, cannot read back hardware VMA, so keep copy in A-memory
(defareg-at-loc a-vma-copy 2581)        ;Location kludgily known about...

(defmicro vma-kludge ()
  (if (eq *machine-version* 'proto)
      'a-vma-copy
      '(microdata abus (microinstruction abus vma))))

;Also there is hair in ASSIGN

;Start a memory cycle
;Do this the cycle after loading vma
;The modes argument says what kind of cycle.  It is not used on the proto machine;
;the kind of cycle is determined by what you do in parallel with this.
;See the microcompiler documentation for the modes.
(defmicro start-memory (&rest modes)
  (selectq *machine-version*
    ((sim proto) '(microinstruction trap-enables (map-miss) mem start-cycle))
    ((tmc tmc5)
     (let ((direction nil)
           (physical-address nil)
           (spec nil)
           (dma-device nil)
           (block nil)
           (ifetch nil)
           (inst nil))
       (loop until (null modes)
             as mode = (pop modes)
             do (selectq mode
                  ((read write)
                   (if (null direction)
                       (setq direction mode)
                       (if spec (retch "Conflicting spec funcs: ~S and ~S"
                                       spec 'check-write-access))
                       (setq direction 'read spec 'check-write-access)))
                  (physical
                   (if (null modes) (retch "No physical address specified"))
                   (setq physical-address (pop modes)))
                  (dma
                   (if (null (cdr modes)) (retch "No DMA card//subdevice specified"))
                   (if spec (retch "Conflicting spec funcs: ~S and ~S" spec mode))
                   (setq dma-device (list (pop modes) (pop modes))
                         spec 'dma))
                  ((inhibit-page-tags address-phtc)
                   (if spec (retch "Conflicting spec funcs: ~S and ~S" spec mode))
                   (setq spec mode))
                  (block
                   (setq block t))
                  (instruction-fetch
                   (setq ifetch t))
                  (otherwise (retch "~S unrecognized START-MEMORY mode" mode))))
       (or direction (retch "Neither READ nor WRITE specified in START-MEMORY"))
       (cond ((not physical-address))
             ((null spec) (setq spec 'addr-from-abus))
             ((not (memq spec '(dma inhibit-page-tags)))
              (retch "Conflicting spec funcs: ~S and ~S" spec 'addr-from-abus)))
       (and block spec
            (retch "Combination of block mode and special memory features is illegal"))
       (setq inst (list 'mem (if (not block)
                                 (if (eq direction 'read) 'start-read 'start-write)
                                 (if (eq direction 'read) 'block-read 'block-write))))
       (cond (ifetch
              (if spec (retch "Conflicting spec funcs: ~S and ~S" spec 'ifu-control))
              (setq inst
```

```
              (if (eq *machine-version* 'tmc)
                  (list* 'spec 'ifu-control 'magic 8 'magic-mask 1 inst)
                  (list* 'spec 'ifu-control 'magic 2 'magic-mask 3 inst))))
          (spec
           (setq inst (list* 'spec spec inst))))
      (setq inst (cons 'microinstruction inst))
      (if dma-device
          (setq inst '(parallel (select-lbus-dev ,(car dma-device) ,(cadr dma-device))
                                ,inst)))
      (if physical-address
          ;; Need extra time when taking addr from amem, and cannot use addr-calc
          ;; hardware, in order to get enough address-to-clock setup time
          (let ((addr (get-to-abus physical-address)))
            (or (atom (get addr 'amem-read-addr))
                (eq (car (get addr 'amem-read-addr)) 'constant)
                (retch "~S is too slow as a source of physical address"
                       physical-address))
            (setq inst '(parallel ,addr
                                  ,inst
                                  (microinstruction speed slow-first-half))))
          ;; Need extra time when using the map cache because it isn't fast enough
          (setq inst '(parallel ,inst
                                (microinstruction speed slow-first-half))))
      inst))
    (otherwise (retch "Don't know how to do START-MEMORY on this machine."))))


(defmicro nop ()
  '(microinstruction))

;Use this at a subroutine which is jumped to with the memory going,
;to defeat bogus error messages when you know what you're doing.
;Note: this doesn't distinguish between IO and emulator tasks.
(defmicro declare-memory-timing (&rest states)
  (dolist (state states)
    (or (memq (if (and (listp state) (eq (car state) 'next) (= (length state) 2))
                  (cadr state) state)
              '(active-cycle data-cycle))
        (retch "~S illegal memory timing state: use ACTIVE-CYCLE or DATA-CYCLE" state)))
  '(microinstruction declare-memory-timing ,states))

(defmicro declare-speed (speed)
  (or (memq speed '(slow slow-first-half slow-second-half very-slow))
      (retch "~S not a legal speed name" speed))
  '(microinstruction speed ,speed))

;Allowed transport types are:
;  DATA         all invisibles, error if null or header
;  WRITE        all invisibles, no transport, error if header
;  CDR          only header/body forward invisible, no transport, error if header
;  BIND         evcp not invisible, error if header
;  BIND-WRITE   evcp not invisible, no transport, error if header
;  HEADER       header-forward invisible, transport, other types error
;  HEADER-OR-DATA  same as HEADER but no error if non-header type
;                  does not actually transport any normal-data word it sees
;  NO-TRAP      ? - the A machine uses this in one place, I don't think we need it
;  SCAV         no invisible pointers, no errors, transport
;
;For transport, the type map is:
;  Regular pointer => COND              (enables oldspace check)
;  Invisible-pointer => COND, TRAP-2    (oldspace overrides invisible)
;  Bad type => TRAP-0                   (e.g. unbound-variable error)

(defmicro transport (&optional (transport-type 'data))
  (or (memq transport-type '(data write cdr bind bind-write header header-or-data scav))
      (retch "~S illegal transport-type" transport-type))
  (paralyze (get-to-abus 'memory-data)
            '(microinstruction type-map ,(type-map-for-transport transport-type)
                               trap-enables (transport)
                               error-table (bad-data-type))))

(defconst transporter-type-map-alist nil)

;Note that this function has to be modified if *data-types* is changed!
;--- dtp-monitor-forward not put in yet
(defun type-map-for-transport (transport-type
             #Q &aux #Q (default-cons-area working-storage-area))  ;Sigh....
  (or (cdr (assq transport-type transporter-type-map-alist))
      (let ((invisible-pointer-types
              (selectq transport-type
                ((data write) '(dtp-external-value-cell-pointer dtp-one-q-forward
                                dtp-header-forward dtp-body-forward))
                ((bind bind-write) '(dtp-one-q-forward dtp-header-forward dtp-body-forward))
                ((cdr) '(dtp-header-forward dtp-body-forward))
                ((header header-or-data) '(dtp-header-forward))
                ((scav) nil)))
            (error-types
              (selectq transport-type
                ((data) '(dtp-null dtp-11 dtp-13 dtp-14 dtp-15 dtp-16 dtp-17
                          dtp-header-p dtp-header-i dtp-monitor-forward
                          dtp-72 dtp-73 dtp-74 dtp-75 dtp-76 dtp-77))
```

```
            ((cdr) '(dtp-11 dtp-13 dtp-14 dtp-15 dtp-16 dtp-17
                     dtp-header-p dtp-header-i dtp-monitor-forward
                     dtp-72 dtp-73 dtp-74 dtp-75 dtp-76 dtp-77))
            ((write bind bind-write)
             '(dtp-header-p dtp-header-i dtp-11 dtp-13 dtp-14 dtp-15 dtp-16 dtp-17
               dtp-monitor-forward dtp-72 dtp-73 dtp-74 dtp-75 dtp-76 dtp-77))
            ((header) (types-other-than '(dtp-header-forward dtp-header-p dtp-header-i)))
            ((header-or-data scav) '(dtp-11 dtp-13 dtp-14 dtp-15 dtp-16 dtp-17
                                     dtp-72 dtp-73 dtp-74 dtp-75 dtp-76 dtp-77))))
        (regular-pointer-types
          (selectq transport-type
            ((write bind-write cdr header header-or-data) nil)
            ((data) '(dtp-nil dtp-symbol dtp-extended-number dtp-locative
                      dtp-list dtp-compiled-function dtp-array dtp-closure
                      dtp-instance dtp-even-pc dtp-odd-pc))
            ((bind) '(dtp-null dtp-nil dtp-symbol dtp-extended-number dtp-locative
                      dtp-external-value-cell-pointer
                      dtp-list dtp-compiled-function dtp-array dtp-closure
                      dtp-instance dtp-even-pc dtp-odd-pc))
            ((scav) '(dtp-null dtp-nil dtp-symbol dtp-extended-number dtp-locative
                      dtp-external-value-cell-pointer dtp-one-q-forward dtp-header-forward
                      dtp-list dtp-compiled-function dtp-array dtp-closure
                      dtp-instance dtp-header-p
                      dtp-even-pc dtp-odd-pc)))))
    (let ((map (nconc (and invisible-pointer-types
                           '((,invisible-pointer-types pointer trap-2)))
                      (and regular-pointer-types
                           '((,regular-pointer-types pointer)))
                      (and error-types
                           '((,error-types trap-8))))))
      (push (cons transport-type map) transporter-type-map-alist)
      map))))
```

F:>lmach>ucode>uu.lisp.429

```
;;; Jumping all over the place

;Note that the condition field is also relevant to next-microinstruction
;selection.  The skip-true-sequence and skip-false-sequence fields get boiled
;down to the next-microaddress field, with placing of microinstructions at
;suitable addresses and duplication of microinstructions in some cases.

;Note that IF and DISPATCH may be used at the same time, and in this case the
;IF's skip modifies the NPC rather than the next-microaddress field.  The
;microassembler has to be aware of this and put instructions in the appropriate
;places.

(defmicro call (ucode)
  '(microinstruction sequencer pushj jump-sequence ,ucode))

(defmicro jump (ucode)
  '(microinstruction next-sequence ,ucode))

(defmicro return ()
  '(microinstruction sequencer popj))

(defmicro return-skip (pred)
  (let* ((test (microexpand pred))
         (skip (cond ((neq (car test) 'microcondition)
                      (fetch "~S expanded into ~S, not a valid microcondition"
                             pred test))
                     ((memq (cadr test) valid-skip-conditions) (cadr test))
                     (t (fetch "~S invalid skip condition in ~S"
                               (cadr test) pred)))))
    (or (eq (caddr test) 'true)
        (fetch "~S is a reversed-sense skip condition, illegal in RETURN-SKIP" pred))
    (paralyze (cadddr test)
              '(microinstruction condition ,skip sequencer popj return-skip t))))

;This makes the return address of a call be the pending dispatch.
;This is just for the simulator.  The real hardware can't avoid doing this.
(defmicro call-and-dispatch-upon-return (ucode)
  '(microinstruction sequencer pushj-return-dispatch jump-sequence ,ucode))

(defmicro call-and-return-to (ucode return-to)
  '(microinstruction sequencer pushj jump-sequence ,ucode next-sequence ,return-to))

(defmicro call-and-return-skip (ucode normal-return skip-return)
  '(microinstruction sequencer pushj jump-sequence ,ucode
                     return-true-sequence ,skip-return return-false-sequence ,normal-return))

;Call in combination with a skip
(defmicro call-select (condition true-subroutine false-subroutine)
  '(parallel (microinstruction sequencer pushj)
             (if ,condition
                 ,(if (atom true-subroutine) '(goto ,true-subroutine) true-subroutine)
                 ,(if (atom false-subroutine) '(goto ,false-subroutine) false-subroutine))))
```

```
;Combination of that and call-and-return-to
(defmicro call-select-and-return-to (condition true-subroutine false-subroutine return-to)
  `(parallel (microinstruction sequencer pushj next-sequence ,return-to)
             (if ,condition
                 ,(if (atom true-subroutine) `(goto ,true-subroutine) true-subroutine)
                 ,(if (atom false-subroutine) `(goto ,false-subroutine) false-subroutine))))

;Really ifu & no popj.  Hardware makes the distinction when stack is empty.
(defmicro next-instruction ()
  `(microinstruction sequencer next-instruction))

(defmicro increment-pc ()
  (selectq *machine-version*
    ((tmc) `(microinstruction spec ifu-control magic 1 magic-mask 1))
    ((tmc5) `(microinstruction spec ifu-control magic 3 magic-mask 3))
    (otherwise (retch "I don't know how to do this except on TMC machine"))))

;;; Temporary until real IFU
;;; Takes 2 cycles and can't be done in parallel with other things
;;; Use a subroutine to save microcode space
(defmicro increment-fake-pc ()
  `(call-select (odd-pc? pc)
                (parallel (assign pc (set-type (1+ pc) dtp-even-pc))
                          (return))
                (parallel (assign pc (set-type pc dtp-odd-pc))
                          (return))))

;;; Add an offset to the PC, using the special format of offset used in branch instructions
(defmicro pc-add (base-pc magic-offset)
  `(parallel (+ ,base-pc (rotate ,magic-offset 37))
             (microinstruction force-cbus<33-32> 3)))  ;dtp-even-pc/dtp-odd-pc

;;; Add an offset to the PC, using an ordinary number as the offset
;;; offset can be one argument, or two arguments (the second being 1)
;;; Uses b-temp-3 (but either argument being b-temp-3 is okay)
(defmicro pc-plus-number (base-pc &rest offset)
  `(sequential (assign b-temp-3 (+ (halfword-pc ,base-pc) . ,offset))
               (word-pc b-temp-3)))

;This micro assigns to the PC and does whatever else is necessary to make the
;IFU happy.  For now, just next-instruction.  For the TMC IFU, will start a
;2-word read and wait for the appropriate length of time, then NEXT-INSTRUCTION.
;Other code to be done in parallel with the memory access may be supplied.
(defmicro set-pc (new-pc &optional other-code)
  (selectq *machine-version*
    ((sim proto)
     (if other-code
         `(sequential (assign pc ,new-pc)
                      (parallel ,other-code
                                (next-instruction)))
         `(parallel (assign pc ,new-pc)
                    (next-instruction))))
    ((tmc)
     (if (null other-code)               ;This instruction is completed, PC may advance
         `(parallel
            (assign pc ,new-pc)
            (clear-stack-adjustment)
            (jump ifu-empty-trap-1))
         `(sequential
            (assign vma ,new-pc)         ;Check for page fault first, because the TMC
            (start-memory read)          ;does not have a separate EPC
            (assign pc ,new-pc)          ;Now set PC (and VMA again) for real
            (parallel ,other-code
                      (start-memory read block instruction-fetch))
            (start-memory read block instruction-fetch) ;Active(1)
            (nop)                                    ;Data(1),Active(2)
            (next-instruction))))                    ;Decode(1),Data(2)
    ((tmc5)
     `(sequential
        (assign pc ,new-pc)                          ;Assign to DPC and VMA (leave EPC alone)
        (parallel ,other-code
                  (start-memory read block instruction-fetch))
        (start-memory read block instruction-fetch)     ;Active(1)
        (nop)                                        ;Data(1),Active(2)
        (next-instruction)))                         ;Decode(1),Data(2)
    (otherwise (retch "~S machine version not handled yet" *machine-version*))))

;Set the PC at which execution will restart if this instruction is pclsred
;No instruction fetch is done since that PC will normally not be used
;The PC must be at an even halfword (usually it is an escape function)
;ACCEPT-RESTART-PC must be done in the next cycle (or some later cycle before it's needed)
(defmicro restart-pc (new-pc)
  (selectq *machine-version*
    ((sim proto tmc)                  ;PC will get backed up if pclsr, so advance it
     `(assign pc (odd-pc ,new-pc)))
    ((tmc5 ifu)
     `(assign pc (even-pc-except-38-through-28 ,new-pc)))
    (otherwise (retch "~S machine version not handled yet" *machine-version*))))
```

```
;Accept the restart PC into the EPC from the DPC/IPC, and increment the DPC/IPC past it.
(defmicro accept-restart-pc ()
  (selectq *machine-version*
    ((sim proto tmc) nil)
    ((tmc5 ifu) '(increment-pc))
    (otherwise (retch "~S machine version not handled yet" *machine-version*))))

(defmicro lisp (form)
  '(microinstruction escape-to-lisp ,form))

(defmicro signal-error (&rest code)
  '(error-if true . ,code))

;(trap-if <cond> (signal-error <err>)) but saves an instruction
(defmicro error-if (condition &rest error-code)
  '(parallel (trap-if ,condition (goto error-trap))
             (microinstruction error-table ,(copylist error-code))))

(defmicro signal-error-no-restore-stack (&rest code)
  '(error-no-restore-stack-if true . ,code))

(defmicro error-no-restore-stack-if (condition &rest error-code)
  '(parallel (trap-if ,condition (goto error-trap-no-restore-stack))
             (microinstruction error-table ,(copylist error-code))))

;'field' somehow selects a field
;It can either be a microdata on the alub, using normal field selection, or
;it can be a microdata on the alub which selects one of several special abus
;fields, or it can be one of the following special forms:
;       (cdr-code <a-opnd>)
;       ..more in the future?..
;The value of the dispatch field in the resulting code is the symbol alub or
; one of several special symbols for the special dispatches.
;'clauses' are something like selectq clauses.  car of each one is a
;  list of symbolic or numeric values, cdr of each one is a microcode
;  sequence or a defucode tag, as with IF.
(defmicro dispatch-after-next (field &rest clauses)
  (multiple-value-bind (ufield magic code symbolic-cues-alist)
                   (expand-dispatch-field field)
    '(parallel
       ,code
       (microinstruction
         dispatch ,ufield
         magic ,magic magic-mask 7
         dispatch-table (,ufield .
                         ,(expand-dispatch-clauses clauses symbolic-cues-alist))))))

(defmicro dispatch-after-this (operand this &body clauses)
  '(sequential
     (dispatch-after-next ,operand
       ,@clauses)
     (parallel
       ,this
       (take-dispatch))))

(defun expand-dispatch-field (field &aux efield code tem table alist)
  ;returns dispatch field, magic number field, other microcode, symbolic-cues-alist
  (setq alist (get (or (get (if (symbolp field) field (car field)) 'enumerated-type-name)
                       (and (listp field) (eq (car field) 'ldb-field)
                            (get (caddr field) 'enumerated-type-name)))
                   'enumerated-type-codes))
  (setq efield (microexpand field))
  (setq table '((3404 . abus<31-28>)                          ;2 array registers
                (2604 . abus<25-22>)                          ;3 array-dispatch
                (2204 . abus<21-18>)                          ;4 array-type
                (0003 . abus<2-0>)))                          ;5 function calling
  (cond ((atom efield) (retch "Garbage dispatch field: ~S == ~S" field efield))
        ;;Special forms
        ((eq (car efield) 'cdr-code)
         (values 'cdr-code 1 (get-to-abus (cadr efield)) alist))
        ((not (and (eq (car efield) 'microdata) (eq (cadr efield) 'alub)))
         (retch "Garbage dispatch field: ~S == ~S" field efield))
        ;;Special abus fields
        ((and (fieldp (setq code (caddr efield)) 'ybus 'abus)
              (setq tem (assoc (dpb (- 40 (second (get code 'byte-func)))
                                    0605
                                    (third (get code 'byte-func)))
                               table)))
         (values (cdr tem)
                 (+ (find-position-in-list tem table) 2)
                 (modify-code code '((ybus nil) (byte-func nil)))
                 alist))
        ;;Normal field extraction through alub
        (t (values 'alub 0 code alist))))

(associate-dispatch-cues cdr-code *cdr-codes*)

;Car of clause is list of selectors
;Cdr of clause is body of a sequence, or goto special form like if
(defun expand-dispatch-clauses (clauses symbolic-cues-alist)
  (mapcar #'(lambda (clause)
```

```
            (list (expand-dispatch-cues (car clause) symbolic-cues-alist)
                  (cond ((and (= (length clause) 2)
                              (not (atom (cadr clause)))
                              (eq (caadr clause) 'goto))
                         (cadadr clause))
                        (t (microexpand `(sequential . ,(cdr clause)))))))
        clauses))

(defun expand-dispatch-cues (cues symbolic-cues-alist)
  (if (eq cues 'otherwise) cues
      (loop for cue in cues
            collect (cond ((numberp cue) cue)
                          ((cdr (assq cue symbolic-cues-alist)))
                          (t (fetch "~S unrecognized dispatch cue" cue))))))

;Dispatch only takes effect if this is executed in the following cycle.
(defmicro take-dispatch ()
  `(microinstruction sequencer take-dispatch))  ;i.e. CPC from NPC

;;; Definition of closed microroutines

(defprop defucode "Microcode routine" si:definition-type-name)
(defprop defucode-at-loc defucode zwei:definition-function-spec-type)
(defprop definst defucode zwei:definition-function-spec-type)
(defprop definst1 defucode zwei:definition-function-spec-type)

(declare (*expr microcode-to-lisp-function      ;Suppress compiler warning
                check-microcode))

;;; defucode defines a microroutine which can either be jumped to,
;;; called, or trapped to.  'name' is always a symbol.
;;; The body has an implicit 'sequential'.
(defmacro defucode (name &body body)
  (defucode-1 'defucode name body))

;;; loc is a number which is either a single location or a list of
;;; locations; the first microinstruction will be replicated through
;;; those locations.
(defmacro defucode-at-loc (name loc &body body)
  (defucode-1 'defucode-at-loc name body loc))

;;; definst defines the microcode to execute a particular macroinstruction
;;; It is very much like defucode but stores the microcode in a different table
;;; Put in the (next-instruction) yourself if you need it, or use definst1
(defmacro definst (name format-and-attributes &body body)
  (validate-definst name format-and-attributes)
  (defucode-1 'definst name body (if (atom format-and-attributes) format-and-attributes
                                      (car format-and-attributes))))

;;; Like definst but defines a 1-cycle instruction.  All clauses of the body
;;; are done in parallel, and the (next-instruction) is put in automatically.
(defmacro definst1 (name format-and-attributes &body body)
  `(definst ,name ,format-and-attributes
     (parallel ,@body
               (next-instruction))))

(defun defucode-1 (flavor name body &optional data)
  (let* ((*backtrace* `((,flavor ,name)))
         (microcode (microexpand `(sequential . ,body))))
    (setq *top-level-code* microcode)
    (check-microcode microcode name)
    `(progn 'compile
       ,@(if (eq data '10-bit-immediate-operand)
             (loop for i from 0 below 4
                   nconc (defucode-2 flavor name microcode data i))
             (defucode-2 flavor name microcode data))
       ',name)))

(defun defucode-2 (flavor name microcode data &optional (offset 0) &aux (iname name))
  (and (plusp offset) (setq iname (fintern "~A-~D" name offset)))
  (let ((lisp-name (fintern '|~A-LISPMICROCODE| iname)))
    `(,@(cond ((eq *machine-version* 'sim)
               (nconc (if (eq flavor 'definst)
                          (ncons `(defprop ,iname ,lisp-name micro-executor)))
                      (ncons (microcode-to-lisp-function lisp-name microcode #Q iname)))))
      ,(let ((address-constraint (selectq flavor
                                    (definst (let ((loc (instruction-dispatch-loc name)))
                                               (+ loc (* offset 4))))
                                    (defucode-at-loc data)
                                    (otherwise nil))))
         `(put-ucode ',iname
                     ',microcode
                     ',(if (eq *machine-version* 'sim) lisp-name
                           (assemble-microinstruction-plist iname microcode
                                                            address-constraint offset))
                     ',*machine-version*)))))

(defun put-ucode (tag microcode micrel machine-version)
  (or (si:record-source-file-name tag 'defucode)
      (ferror nil "Sorry, I already did most of it"))
```

```
  (let ((ucode (assq machine-version *ucode-alist-alist*)) tem)
    (or ucode (push (setq ucode (cons machine-version nil)) *ucode-alist-alist*))
    (cond ((setq tem (assq tag (cdr ucode)))
           (setf (cadr tem) microcode)
           (setf (caddr tem) micrel))
          (t (push (list tag microcode micrel) (cdr ucode)))))
  (setq *need-to-link* t)
  tag)

;Due to universal opcodes, this works for both normal and format-3 instructions
(defun instruction-dispatch-loc (name)
  (lsh (car (get name 'instruction-data)) 2))

;;; Reading in of the opcode definitions file

(defmacro defopcode (name opcode format &rest attributes)
  `(defopcodel ',name ',opcode ',format ',attributes))

(defun defopcodel (name opcode format attributes)
  (or (≤ 0 opcode 377)           ;Temporary 8-bit opcodes
      (≤ 1000 opcode 1377)       ;But do have 8 bits of format-3 also
      (ferror nil "Opcode ~O for instruction ~S out of range" opcode name))
  (or (memq format '(unsigned-immediate-operand signed-immediate-operand
                     address-operand no-operand quick-external-call constant-operand
                     indirect-operand lexical-operand instance-operand
                     microcode-operand unsigned-pc-relative signed-pc-relative
                     constant-pc-relative 10-bit-immediate-operand))
      (ferror nil "Format ~S for instruction ~S not recognized" format name))
  (and (bit-test 1000 opcode)
       (neq format 'no-operand)
       (ferror nil "Instruction ~S with opcode ~O must be NO-OPERAND, not ~S"
               name opcode format))
  (loop for attr in attributes do
        (or (memq attr '(needs-stack smashes-stack branch-predict stop-ifu))
            (and (listp attr) (eq (car attr) 'function) (≤ 3 (length attr) 4))
            (and (listp attr) (eq (car attr) 'operand) (= (length attr) 2))
            (ferror nil "Attribute ~S for instruction ~S not recognized" attr name)))
  (putprop name (list* opcode format attributes) 'instruction-data)
  (if (eq format '10-bit-immediate-operand)
      (loop for i from 1 to 3
            do (aset name *opcode-table* (+ opcode i))))
  (aset name *opcode-table* opcode))

(defun validate-definst (name format-and-attributes)
  (let ((format (if (atom format-and-attributes) format-and-attributes
                    (car format-and-attributes)))
        (attributes (if (atom format-and-attributes) nil (cdr format-and-attributes)))
        (data (get name 'instruction-data)))
    (cond ((null data)
           (ferror nil "~S not defined in OPDEFS file" name))
          ((neq format (cadr data))
           (ferror nil "~S in format ~S disagrees with OPDEFS file, which says ~S"
                   name format (cadr data)))
          ;Check attributes that affect the microcode.  I think IFU ones don't.
          ((loop for attrib in '(needs-stack smashes-stack)
                 thereis (neq (not (memq attrib attributes))
                              (not (memq attrib (cddr data)))))
           (ferror nil "Attributes for ~S disagree with OPDEFS file" name)))))

;;; Reading in of the system definitions files

(defun sysconstant-eval-fun (type value)
  (selectq type
    (nil (or (get value 'sysconstant)
             (car (get value 'byte-field))       ;PPSS
             (ferror nil "~S has no DEFSYSCONSTANT nor DEFSYSBYTE value" value)))
    (defsysbyte-limit-value
     (1+ (byte-field-ones value)))
    (defsysbyte-ones
     (byte-field-ones value))
    (defstorage-size
     (get value 'defstorage-size))
    (otherwise
     (ferror nil "Do not understand ~S for ~S" type value))))

(defun byte-field-ones (ref)
  (dpb -1
       (ldb 0006 (car (or (get ref 'byte-field)
                          (ferror nil "~S has no DEFSYSBYTE value" ref))))
       0))

(defmacro defsysconstant (name form)
  (setq form (llc:defsysconstant-eval form #'sysconstant-eval-fun))
  `(putprop ',name ',form 'sysconstant))

(defmacro defsysbyte (name n-bits bits-over)
  (setq n-bits (llc:defsysconstant-eval n-bits #'sysconstant-eval-fun))
  (setq bits-over (llc:defsysconstant-eval bits-over #'sysconstant-eval-fun))
  `(eval-when (compile load eval)
     (putprop ',name '(,(byte-numbers-to-ppss n-bits bits-over)) 'byte-field)))
```

```
;;; (defenumerated list-name (names...) [starting-value] [increment] [endingvalue])
;;;     starting-value defaults 0, increment to 1
;;;     If endingvalue is supplied, it is error-checked
(defmacro defenumerated (list-name code-list &optional (start 0) (increment 1) end)
  (and end (= (length code-list) (// (- end start) increment))
       (ferror nil "~S has ~S codes where ~S are required"
               list-name (length code-list) (// (- end start) increment)))
  `(progn 'compile
          (defconst ,list-name ',code-list)
          (defprop ,list-name
                   ,(loop for code in code-list and prev = 0 then code
                          as value from start by increment
                          unless (eq code prev)          ;kludge for data-types
                            collect `(,code . ,value))
                   enumerated-type-codes)
          ;; sysconstant properties are expected by some embedded expressions
          ,@(loop for code in code-list and prev = 0 then code
                  as value from start by increment
                  unless (eq code prev)          ;kludge for data-types
                    collect `(putprop ',code ',value 'sysconstant))))

;;; (defstorage (structure-name options...)
;;;           fields...) .....
;;;    field = (name n-bits right-hand-bit-number) or a list of subfields.
;;;    Omitting the bit specification gets you a word-filling Lisp object.
;;;    The top-level fields are really words, the rest are packed bytes.
;;;  Options:
;;;    BACKWARDS  (word offsets count down from 0 instead of up from 0)
;;;
;;; For the microassembler, this defines def-byte-field type accessors
;;; for the defined bytes, and assumes that the microprogrammer takes
;;; care of the word offsets.  That will do for the simple structures like arrays.
;;; The offsets do get saved on a word-offset property for possible future use.
(local-declare ((special *defstorage-fields*))
(defmacro defstorage ((structure-name . options) . fields)
  (let ((increment 1)
        (*defstorage-fields* nil))
    (dolist (opt options)
      (selectq opt
        (backwards (setq increment -1))
        (otherwise (ferror nil "DEFSTORAGE ~S - unrecognized option ~S" structure-name opt))))
    `(progn 'compile
          ,@(loop for field in fields as word from 0 by increment
                  nconc (defstorage-fields field word structure-name))
          (defprop ,structure-name ,(length fields) defstorage-size)
          (defprop ,structure-name ,*defstorage-fields* defstorage-fields))))

(defun defstorage-fields (field word structure-name)
  (cond ((or (listp field) (null field))          ;until listp is fixed...
         (if (listp (car field))
             (loop for subfield in field
                   nconc (defstorage-fields subfield word structure-name))
             (defstorage-field field word structure-name)))
        (t (defstorage-field (list field) word structure-name))))

(defun defstorage-field (field word structure-name)
  structure-name ;not used
  (push (car field) *defstorage-fields*)
  (list `(defprop ,(car field) ,word word-offset)
        (and (cdr field)
             `(def-byte-field ,(car field) ,(cdr field) place))))
);local-declare

;Extract word offset for a field; use this inside an a-constant or b-constant form
(defun field-word-offset (name)
  (or (get name 'word-offset)
      (ferror nil "~S has no word-offset; probably not defined with DEFSTORAGE" name)))

(defvar *escape-function-next-pc-location*)

;Define a-memory locations that are used microcode/Lisp communication
;If the microcode wants to initialize these, it can defareg them itself;
;that defareg will get put in the same address.
(defmacro define-magic-locations ((block-name . options) &body slots &aux tem)
  (cond ((setq tem (get (locf options) 'a-memory-address))       ;Interesting to microcode?
         (if (eq block-name 'microcode-escape-routines)
             (setq *escape-function-next-pc-location* tem))
         `(progn 'compile
            (defprop ,block-name ,tem a-memory-block-address)
            . ,(loop for slot in slots as loc upfrom tem
                 collect `(defareg-at-loc ,(if (symbolp slot) slot
                                              (intern (format nil "~A-~A"
                                                              (car slot) (cadr slot))))
                                          ,loc))))
        ((setq tem (get (locf options) 'virtual-address))
         `(progn 'compile
                . ,(loop for slot in slots as loc upfrom tem
                     collect `(defprop ,slot ,loc virtual-address))))))
```

```
;Define a-memory locations that hold PC's of escape functions
;--- Someone needs to store an initial value for the simulator ---
(defmacro define-escape-function (name &body ignore)
  (let ((a-mem-p t))
    (cond ((listp name)
           (dolist (opt (cdr name))
             (selectq opt
               (no-a-memory (setq a-mem-p nil))
               (wired )
               (otherwise (ferror nil "Unknown keyword ~S" opt))))
           (setq name (car name))))
    (and a-mem-p
         (prog1 `(defareg-at-loc ,(intern (string-append name "-ESCAPE-PC"))
                                 ,*escape-function-next-pc-location*)
                (incf *escape-function-next-pc-location*)))))
```

F:>lmach>ucode>UL.LISP.167

```
;;; -*- Mode:Lisp; Package:Micro; Base:8; Lowercase:yes -*-
;;; (c) Copyright 1982, Symbolics, Inc.

; Microcode to Lisp translator (makes Lisp that will run with SIM)




;The order of the defconsts is the order of execution in the Lisp.
(defconst read-phase-fields
        '(abus amem-read-addr bbus bmem-read-addr xbus ybus))

(defconst data-path-fields
        '(alu byte-func))

(defconst force-obus-fields
        '(force-obus<35-34> force-obus<33-32> force-obus<31-28>))

(defconst trap-phase-fields
        '(type-map trap-enables trap-sequence arith-trap-dispatch-table))

(defconst operate-phase-fields
        '(dispatch dispatch-table escape-to-lisp error-table))

(defconst register-write-fields
        '(write-amem amem-write-addr write-bmem bmem-write-addr
          write-lbus lbus-dev-addr mem stack-pointer))

(defconst jump-phase-fields
        '(sequencer jump-sequence next-sequence condition
          skip-true-sequence skip-false-sequence))

(defconst all-over-the-place-fields
        '(spec magic magic-mask declare-memory-timing unique speed))

(defvar *microlisp-function-name*)
(declare (special *backtrace*)) ;In UU
(defvar *microinstruction*)

(defun bletch (format-string &rest args)
  (declare (special args))      ;For accessibility from breakpoint
  (let #M ((^w nil) (^r nil) (^q nil))
       #Q ((msgfiles error-output))
    (format msgfiles "~&>>Error: ")
    (lexpr-funcall #'format msgfiles format-string args)
    (format msgfiles "~&  While compiling microcode to lisp for ~S"
                     *microlisp-function-name*)
    (format msgfiles "~&  Microinstruction: ~S" *microinstruction*)
    (format msgfiles "~&  Microexpand backtrace: ~{~<~%    ~2:;~A~>~^, ~}~%"
                     *backtrace*)
    (break bletch t)))


;selectq with appropriate error processing
(defmacro eselectq (valname val &rest clauses)
  (let ((nil-present (loop for (key) in clauses
                           thereis (or (eq key nil) (and (listp key) (memq nil key))))))
    `(selectq ,val
       ,@clauses
       ,@(and (not nil-present) '(((nil) nil)))
       (otherwise (bletch "~S invalid value for ~S" ,val ',valname)))))

(defun mksetq (var val)
  (and val (ncons `(setq ,var ,val))))

(defun mksetq2 (var1 var2 val)
  (and val (ncons `(setq ,var1 (setq ,var2 ,val)))))
```

```
(defvar *dispatch-destination* nil)

#M
(declare-special squid)
#M
(defun eval-at-load-time (form)
  (cond ((status feature complr)
         (list squid form))
        (t (eval form))))
#Q
(defun eval-at-load-time (form)
  '',(if (and compiler:qc-file-in-progress (not compiler:qc-file-load-flag))
         (cons compiler:eval-at-load-time-marker form)
         (eval form)))

(declare (*expr fieldp)) ;in UU
;Simulation routines for shifter

#M
(declare (fixnum (rot32 fixnum fixnum)
                 (ash32 fixnum fixnum)
                 (merge32 fixnum fixnum fixnum)
                 (mask32 fixnum))
         (special *pc*))                  ;in SIM

(eval-when (eval compile load)
(defun ash32 (value amount)
  (ash (logand value #.(1- 1_32.)) amount))
);eval-when

(defun rot32 (value amount)
  (setq amount (logand 37 amount))
  #M (dpb value (+ (lsh amount 6) (- 40 amount))
          (ldb (+ (lsh (- 40 amount) 6) amount) value))
  #Q (logior (logand (ash32 value amount) #.(1- 1_32.))
             (logand (ash32 value (- amount 40)) (1- (ash 1 amount)))))

(defun mask32 (nbits)
  (1- (ash 1 nbits)))

(defun merge32 (shifted mask unshifted)
  (logior (logand mask shifted)
          (logand (lognot mask) unshifted)))

;More simulation routines.  These are used instead of open-coding
;things so that ncomplr doesn't expand my code by a factor of 100
#M
(declare (muzzled t)             ;Don't give me a hard time about haulong
         (load 'sim)             ;Get certain macros needed below
         (fixnum (address-add-fp fixnum)
                 (address-add-sp fixnum)
                 (address-add-macrocode)
                 (aref-amem fixnum)
                 (aref-bmem fixnum)
                 (aref-bmem-360)
                 (16-bit-sign-extend fixnum))
         (notype (aset-amem fixnum fixnum)
                 (aset-bmem fixnum fixnum)
                 (aset-bmem-360 fixnum)
                 (setq-vma fixnum)
                 (setq-fp fixnum)
                 (setq-sp fixnum)
                 (carry28 fixnum fixnum fixnum)
                 (carry32 fixnum fixnum fixnum)))
(declare (special *frame-pointer* *stack-pointer* *xbas* *pc* *vma* *pma* *instruction*
                  *a-memory* *b-memory* *byte-r* *byte-s* *type-map*
                  *multiply-x* *multiply-y* *last-error-table-entry-seen*))

#M
(declare (*lexpr address-add)
         (*expr even-instruction odd-instruction instruction-opcode
                instruction-unsigned-immediate instruction-signed-immediate
                pc-add instruction-baseno instruction-offset stack-address
                set-pma-from-vma)
         (fixnum (even-instruction fixnum) (odd-instruction fixnum)
                 (instruction-opcode) (instruction-unsigned-immediate)
                 (instruction-signed-immediate) (pc-add fixnum fixnum)
                 (instruction-baseno) (instruction-offset)
                 (stack-address fixnum) (address-add notype fixnum)))

(defun address-add-fp (offset)
  (address-add '*frame-pointer* offset))

(defun address-add-sp (offset)
  (address-add '*stack-pointer* offset))

(defun address-add-xb (offset)
  (address-add '*xbas* offset))
```

```
(defun address-add-macrocode ()
  (address-add (instruction-baseno) (instruction-offset) t))

(defun aref-amem (loc)
  (aref *a-memory* loc))

(defun aref-bmem (loc)
  (aref *b-memory* loc))

(defun aref-bmem-360 ()
  (aref *b-memory* 360))

(defun aset-amem (val loc)
  (aset val *a-memory* loc)
  nil)

(defun aset-bmem (val loc)
  (aset val *b-memory* loc)
  nil)

(defun aset-bmem-360 (val)
  (aset val *b-memory* 360)
  nil)

(defun setq-vma (obus)
  (setq *vma* (pointer-field obus))
  ;Mapping, which really happens in the next cycle
  ;Map miss trap is not simulated, happens when memory-data read or written
  (set-pma-from-vma))

(defun setq-sp (obus)
  (setq *stack-pointer* (pointer-field obus)))

(defun setq-fp (obus)
  (setq *frame-pointer* (pointer-field obus)))

(defun inc-sp ()
  (setq *stack-pointer* (1+ *stack-pointer*)))

(defun dec-sp ()
  (setq *stack-pointer* (1- *stack-pointer*)))

(defun inc-macro ()
  (setq *instruction* (1+ *instruction*)))

;Simulate ALU carry function
(defun carry28 (x y z)
  (bit-test 1_28. (+ (logand #.(1- 1_28.) x) (logand #.(1- 1_28.) y) z)))

(defun carry32 (x y z)
  (bit-test 1_32. (+ (logand #.(1- 1_32.) x) (logand #.(1- 1_32.) y) z)))

;One simulation routine to help with multiplier
(defun 16-bit-sign-extend (n)
  (if (bit-test 1_15. n) (+ 177777_16. n) n))

;Returns a (defun name () --translated-microcode--)
(defun microcode-to-lisp-function (name microcode #Q definition-name)
  (let ((*microlisp-function-name* name))
    `(defun ,name ()
       #Q (declare (sys:function-parent ,definition-name))
       (prog (abus bbus xbus ybus alub obus dispatch alu-output type-map)
         #M (declare (fixnum abus bbus xbus ybus alub obus dispatch alu-output type-map))
         (progn abus bbus xbus ybus alub obus dispatch alu-output type-map)  ;inhibit warning
         (setq type-map 0)       ;Idiot compiler warning in Maclisp, code bug in Lisp Machine
         . ,(microcode-to-lisp microcode)))))

(defun microcode-to-lisp (microcode)
  (cond ((eq (car microcode) 'microsequence)
         (loop for x in (cdr microcode)
               nconc (microcode-to-lisp x)))
        ((eq (car microcode) 'microinstruction)
         (let ((*microinstruction* microcode))
           (microlisp-syntax-check microcode)
           (nconc (microlisp-read-phase microcode)
                  (microlisp-data-path-phase microcode)
                  (microlisp-force-obus-phase microcode)
                  (microlisp-trap-phase microcode)
                  (microlisp-operate-phase microcode)
                  (microlisp-register-write-phase microcode)
                  (microlisp-jump-phase microcode))))
        (t (bletch "Unrecognizable microcode: ~S" microcode))))

(defun microlisp-syntax-check (code)
  (loop for (prop val) on (cdr code) by 'cddr
        unless (or (memq prop read-phase-fields)
                   (memq prop data-path-fields)
                   (memq prop force-obus-fields)
                   (memq prop trap-phase-fields)
                   (memq prop operate-phase-fields)
                   (memq prop register-write-fields)
```

```
                (memq prop jump-phase-fields)
                (memq prop all-over-the-place-fields))
        do (bletch "Unrecognized microcode field: ~S" prop)))

;Generate setqs of the variables abus, bbus, xbus, ubus

(defun microlisp-read-phase (code)
  (nconc
    (mksetq 'abus
      (eselectq abus (get code 'abus)
        (amem
          (let ((addr (get code 'amem-read-addr)))
            (if (and (not (atom addr)) (eq (car addr) 'constant)) (cadr addr)
                '(aref-amem ,(amemaddr addr)))))
        (memory-data '(pma-mem-read))
        (frame-pointer '*frame-pointer*)
        (stack-pointer '*stack-pointer*)
        (vma '*vma*)
        (pc '*pc*)))
    (mksetq 'bbus
      (eselectq bbus (get code 'bbus)
        (bmem
          (let ((addr (get code 'bmem-read-addr)))
            (cond ((and (not (atom addr)) (eq (car addr) 'constant))
                   (cadr addr))
                  ((= addr 360)
                   '(aref-bmem-360))
                  (t '(aref-bmem ,addr)))))
        (macro-signed-immediate '(instruction-signed-immediate))
        (macro-unsigned-immediate '(instruction-unsigned-immediate))))
    (mksetq 'xbus
      (eselectq xbus (get code 'xbus)
        (abus 'abus)
        (bbus 'bbus)
        (product '(* *multiply-x* *multiply-y*))))
    (mksetq 'ybus
      (eselectq ybus (get code 'ybus)
        (abus 'abus)
        (bbus 'bbus)
        ;--- This is really not right, but will do for now I guess
        (ybus-crocks-1 '(ash32 abus -28.))))))

;Generate setqs of the variables alub, alu-output, and obus


(defun microlisp-data-path-phase (code &aux tem)
  (nconc
    (if (setq tem (get code 'byte-func))          ;Using the shifter
        (mksetq 'alub
          (if (eq tem 'ybus) 'ybus
              (make-alub-sign-hack
                (make-merge
                  (make-rot 'ybus (fix-byte-r (second tem)))
                  (if (eq (first tem) 'dpb)      ;rotate-mask
                      (make-rot (make-mask (fix-byte-s (third tem)))
                                (fix-byte-r (second tem)))
                        (make-mask (fix-byte-s (third tem))))
                      (if (eq (fourth tem) 'merge) 'xbus 0))
                    (fieldp code 'spec 'alub-sign-hack)))))
        (mksetq2 'obus 'alu-output
          (eselectq alu (setq tem (get code 'alu))
            (xbus 'xbus)
            (alub 'alub)
            ((X+1 X+1-overflow) '(1+ xbus))
            ((X-1 X-1-overflow) '(1- xbus))
            ((X+Y X+Y-overflow) '(+ xbus alub))
            ((X-Y X-Y-overflow) '(- xbus alub))
            (X+Y+1 '(+ xbus alub 1))
            (X-Y-1 '(- xbus alub 1))
            (X-Y-signed '(- (logxor xbus 1_31.) (logxor alub 1_31.)))
            (X-Y-1-signed '(- (logxor xbus 1_31.) (logxor alub 1_31.) 1))
            (and '(logand xbus alub))
            (nand '(lognot (logand xbus alub)))
            (ior '(logior xbus alub))
            (xor '(logxor xbus alub))
            (andcy '(logand xbus (lognot alub)))))))

    ;Generate calls to merge32, rot32, and mask32 but try to do them at
    ;compile time if possible
    (defun make-mask (n-bits)
      (if (numberp n-bits) (mask32 n-bits) '(mask32 ,n-bits)))

    (defun make-rot (value n-bits)
      (cond ((equal n-bits 0)
             value)
            ((and (numberp value) (numberp n-bits))
             (rot32 value n-bits))
            (t '(rot32 ,value ,n-bits))))
```

```
(defun make-merge (foreground mask background)
  (prog (tem)
    ;;Try to use lsh (ash) right instead of rot left, and open-code
    ;;when doing a simple byte extraction
    (and (numberp mask) (equal background 0)
         (cond ((and (not (atom foreground)) (eq (car foreground) 'rot32))
                (and (numberp (setq tem (caddr foreground)))
                     (or (zerop tem) (<= (haulong mask) tem))
                     (return '(logand ,(if (zerop tem) (cadr foreground)
                                              '(ash32 ,(cadr foreground)
                                                      ,(- tem 32.)))
                                      ,mask))))
               (t (return '(logand ,foreground ,mask)))))
    ;Unoptimizable
    (return '(merge32 ,foreground ,mask ,background))))

(defun make-alub-sign-hack (code hack)
  (if (not hack) code
      '(logxor 1 ,code)))

;Valid forms for addr are:
;       (frame-pointer fixnum)
;       (stack-pointer fixnum)
;       (xbas fixnum)
;       (macrocode)
;       fixnum                  ;between 0 and 7777 I guess
;       (constant value)
(defun amemaddr (addr)
  (cond ((numberp addr) addr)
        ((atom addr) (bletch "Garbage amem address: ~S" addr))
        ((eq (car addr) 'frame-pointer)
         '(address-add-fp ,(cadr addr)))
        ((eq (car addr) 'stack-pointer)
         '(address-add-sp ,(cadr addr)))
        ((eq (car addr) 'xbas)
         '(address-add-xb ,(cadr addr)))
        ((eq (car addr) 'macrocode)
         (if (cdr addr) (bletch "Obsolete amem address: ~S" addr))
         '(address-add-macrocode))
        (t (bletch "Garbage amem address: ~S" addr))))

(defun fix-byte-r (r)
  (cond ((and (fixp r) (>= r 0) (<= r 37)) r)
        ((eq r 'byte-r) '*byte-r*)
        ((eq r 'macro) '(logand 37 (instruction-unsigned-immediate)))
        (t (bletch "Illegal byte rotation: ~S" r))))

(defun fix-byte-s (s)
  (cond ((and (fixp s) (> s 0) (<= s 40)) s)
        ((eq s 'byte-s) '(1+ *byte-s*))
        ((eq s 'macro) '(+ (lsh (logand (instruction-opcode) 3) 3)
                            (logand 7 (lsh (instruction-unsigned-immediate)
                                           -5))
                            1))
        (t (bletch "Illegal byte size: ~S" s))))

  (let ((mask (dpb -1 field 0))
        (pos (lsh field -6))
        (size (logand field 77)))
    (cond ((numberp val)
           (cond ((zerop val) '(logand ,(lognot mask) ,background))
                 ((= val (1- (ash 1 size))) '(logior ,mask ,background))
                 (t '(logior ,(ash32 val pos)
                             (logand ,(lognot mask) ,background)))))
          ((memq val '(abus bbus))
           '(logior (logand ,mask ,val) (logand ,(lognot mask) ,background)))
          ((eq val 'memory-data)
           '(logior (logand ,mask (pma-mem-read))
                    (logand ,(lognot mask) ,background)))
          ((eq val (car hair))
           '(logior (logand ,(lognot mask) ,background)
                    (ash32 (logand ,(cadr hair) ,(caddr hair)) ,(cadddr hair))))
          (t (bletch "~S illegal forcing value--gendpb" val)))))

(defun microlisp-force-obus-phase (code &aux tem)
  (nconc (and (setq tem (get code 'force-obus<31-28>))
              (ncons '(setq obus ,(gendpb tem 3404 'obus nil))))
         (and (setq tem (get code 'force-obus<33-32>))
              (ncons '(setq obus ,(gendpb tem 4002 'obus
                                          '(bbus<5-4> bbus 60 28.)))))
         (and (setq tem (get code 'force-obus<35-34>))
              (ncons '(setq obus ,(gendpb tem 4202 'obus
                                          '(bbus<7-6> bbus 300 28.)))))))
```

```
(defun microlisp-trap-phase (code &aux tem traps handler)
  (setq traps (get code 'trap-enables)
        handler (cond ((setq handler (get code 'trap-sequence))
                       (if (atom handler)
                           `(return (,(microcode-lisp-function-name
                                        handler)))
                           `(progn . ,(microcode-to-lisp handler))))
                      ((setq handler (get code 'arith-trap-dispatch-table))
                       `(caseq-that-works (+ (logand (ash abus -30.) 14) ;ash considered
                                             (logand (ash bbus -32.) 3))        ;harmful...
                          . ,(microlisp-dispatch-clauses handler)))))
  (nconc
    ;; Lower-level traps
    (and (setq tem (get code 'type-map))
         (ncons `(if (zerop (logand
                              (setq type-map
                                    (arraycall fixnum *type-map*
                                               (+ ,(eval-at-load-time
                                                     `(lsh (assign-type-map ',tem) 6))
                                                  (logand (ash abus -28.) 77))))
                              4))
                     (data-type-trap)))) ;---Don't simulate trap yet
    ;; Higher-level traps
    (and handler
         (ncons `(and (or ,(and (memq 'condition-true traps)
                                (lispify-condition code))
                          ,(and (memq 'condition-false traps)
                                `(not ,(lispify-condition code)))
                          ,(and (memq 'type-condition traps)
                                '(bit-test 1 type-map))
                          ,(and (memq 'bbus-non-fixnum traps)
                                '(not (data-type? bbus dtp-fix)))
                          ,(and (memq 'overflow traps)
                                '(overflow-p alu-output)))
                      ,handler)))
    ;;--- traps not done at all:
    ;; transport, any-stack, other-stack, map-miss
    ))

(defun data-type-trap ()
  (cerror T () ':data-type-trap "Data type trap"))

(defvar *type-map* (*array nil 'fixnum 4096.))  ;3 bits per element, cond*4+trap
(defvar *type-maps* nil)
#M (declare (*expr type-map-lookup))    ;in UU

;Note that the Trap bit is complemented
(defconst type-map-encodings
          '((() . 4) ((cond) . 5) ((pointer) . 6) ((cond pointer) . 7)
            ((pointer cond) . 7) ((trap-0) . 0) ((trap-1) . 1)
            ((trap-2 pointer) . 2) ((pointer trap-2) . 2)
            ((trap-3 pointer) . 3) ((pointer trap-3) . 3)))

(defun assign-type-map (map)
  (loop as number = 0 then (1+ number)
        for map1 in *type-maps*
        when (equal-type-maps map map1)
          return number
        finally (or (< number 100) (ferror nil "Gleep!  Out of type maps"))
                (setq *type-maps* (nconc *type-maps* (ncons map)))
                (loop for type in *data-types*
                      as index upfrom (lsh number 6)
                      as outputs = (type-map-lookup type map)
                      do (store (arraycall fixnum *type-map* index)
                                (or (cdr (assoc outputs type-map-encodings))
                                    (ferror nil "~S garbage in type map"
                                            outputs))))
                (return number)))

(defun equal-type-maps (map1 map2)
  (loop for type in *data-types*
        always (equal (type-map-lookup type map1) (type-map-lookup type map2))))

(defun microlisp-operate-phase (code &aux tem)
  (nconc (cond ((setq tem (get code 'dispatch))
                (setq *dispatch-destination* (get code 'dispatch-table))
                (ncons `(setq dispatch ,(dispatch-ldb tem)))))
         (and (setq tem (get code 'escape-to-lisp))
              (ncons tem))
         (and (setq tem (get code 'error-table))
              (ncons `(setq *last-error-table-entry-seen* ',tem)))))

(defun dispatch-ldb (field)
  (eselectq dispatch field
    (cdr-code '(ldb 4202 abus))
    (abus<31-28> '(ldb 3404 abus))
    (abus<25-22> '(ldb 2604 abus))
    (abus<21-18> '(ldb 2204 abus))
    (abus<2-0> '(ldb 0003 abus))
    (alub 'alub)))
```

```
(defun microlisp-register-write-phase (code &aux tem tem1)
  ;First write the memories, then the registers (they might address the memory)
  (nconc (and (get code 'write-amem)
              (ncons '(aset-amem obus
                                 ,(amemaddr (get code 'amem-write-addr)))))
         (and (setq tem (get code 'write-bmem))
              (ncons (if (= (setq tem1 (get code 'bmem-write-addr)) 360)
                         '(aset-bmem-360 ,tem)
                         '(aset-bmem ,tem ,tem1))))
         (and (get code 'write-lbus)
              (symbolp (get code 'lbus-dev-addr))       ;ignore non-simulatable hair....
              (eselectq (get code 'lbus-dev-addr) (get code 'lbus-dev-addr)
                (write-memory (ncons '(pma-mem-write obus)))
                (write-pc (ncons '(setq *pc* obus)))
                (increment-macro-immediate (ncons '(inc-macro)))))
         (and (fieldp code 'mem 'write-vma)
              (ncons '(setq-vma obus)))
         (and (fieldp code 'spec 'increment-pc)
              (ncons '(inc-pc)))
         (and (fieldp code 'spec 'load-frmp)
              (ncons '(setq-fp obus)))
         (and (fieldp code 'spec 'load-stkp)
              (ncons '(setq-sp obus)))
         (and (setq tem (get code 'stack-pointer))
              (ncons (if (eq tem 'increment) '(inc-sp) '(dec-sp))))
         (and (fieldp code 'spec 'load-byte-r)
              (ncons (cond ((zerop (logand 10 (or (get code 'magic) 0)))
                            '(setq *byte-r* (logand 37 obus)))
                           ((get code 'dispatch)
                            '(setq *byte-r* (array-index-shift-prom dispatch)))
                           (t (bletch "byte-r-from-array-disp without dispatch")))))
         (and (fieldp code 'spec 'load-byte-s)
              (ncons '(setq *byte-s* (logand 37 obus))))
         (and (fieldp code 'spec 'load-xbas)
              (ncons '(setq *xbas* (logand 1777 obus))))
         (and (fieldp code 'spec 'load-inst)      ;temporary memory control
              (ncons '(setq *instruction* obus)))
         (and (or (fieldp code 'spec 'multiply)
                  (fieldp code 'spec 'multiply-and-type-check))
              (bit-test 2 (get code 'magic))
              (ncons '(setq *multiply-x*
                            ,(if (bit-test 4 (get code 'magic))
                                 '(16-bit-sign-extend (logand 177777 xbus))
                                 '(logand 177777 xbus)))))
         (and (or (fieldp code 'spec 'multiply)
                  (fieldp code 'spec 'multiply-and-type-check))
              (bit-test 1 (get code 'magic))
              (ncons '(setq *multiply-y*
                            ,(if (bit-test 10 (get code 'magic))
                                 '(16-bit-sign-extend
                                    (logand 177777 (ash32 ybus -16.)))
                                 '(logand 177777 (ash32 ybus -16.))))))))

;If sequencer is take-dispatch then we are supposed to take a dispatch
;deferred from the previous instruction.  The compile-time variable
;*dispatch-destination* and the runtime variable dispatch control this.
;Note that these have to be preserved appropriately through skips.

;If there is a skip on the condition field then we do that.

;Otherwise the sequencer, jump-sequence, and next-sequence fields control
;call/jump/return/next-instruction which turns into Lisp function calling.
;We don't support simultaneous skipping and jumping (yet), except a little for call-select.

;At this level we don't worry about the CPC and NPC registers

(defun microlisp-jump-phase (code &aux jump next)
  (setq jump (get code 'jump-sequence)
        next (get code 'next-sequence))
  (nconc
    (eselectq (get code 'sequencer) (get code 'sequencer)
      ((popj next-instruction) (ncons '(return nil)))   ;next-instruction or return
      (nil (and next (ncons '(return (,(microcode-lisp-function-name next))))))
      ((pushj pushj-return-dispatch)
       (and jump                                 ;could be call-select ...
            (ncons (if next '(progn (,(microcode-lisp-function-name jump))
                                    (,(microcode-lisp-function-name next)))
                       '(,(microcode-lisp-function-name jump))))))
      (take-dispatch
        (ncons '(caseq dispatch                   ;caseq because of numbers
                  . ,(microlisp-dispatch-clauses *dispatch-destination*)))))
    (and (fieldp code 'sequencer 'pushj-return-dispatch)
         (ncons '(caseq dispatch                  ;caseq because of numbers
                  . ,(microlisp-dispatch-clauses *dispatch-destination*))))
    (and (getl code '(skip-true-sequence skip-false-sequence))
         ;;pred gets predicate which is t if we should skip
         (let ((pred (lispify-condition code))
               (pending-disp *dispatch-destination*))
           (let ((skip-code '(cond (,pred
```

```
                                . ,(microlisp-if-branch
                                     (get code 'skip-true-sequence)))
                               (t . ,(let ((*dispatch-destination* pending-disp))
                                       (microlisp-if-branch
                                         (get code 'skip-false-sequence))))))
           (and (not jump) (fieldp code 'sequencer 'pushj)
                (setq skip-code '(prog () ,skip-code)))
           (ncons skip-code)))))

(defun dispatch-cues (cues)
  (cond ((eq cues 'otherwise) t)          ;CASEQ wants T, not OTHERWISE
        ((atom cues)
         (bletch "dispatch cue ~S: must be list or OTHERWISE" cues))
        (t (mapcar #'dispatch-cue cues))))

(defun dispatch-cue (item)
  (cond ((numberp item) item)
        (t (bletch "~S illegal as dispatch cue" item))))

(defun microlisp-dispatch-clauses (table)
  (loop for clause in (cdr table)
        collect (cons (dispatch-cues (car clause))
                      (cond ((atom (cadr clause))       ;goto
                             '((return
                                 (,(microcode-lisp-function-name
                                      (cadr clause))))))
                            (t (microcode-to-lisp (cadr clause)))))))



(defmacro caseq-that-works (value . clauses)
  (if (and (= (length clauses) 1)
           (eq (caar clauses) t))
      '(progn . ,(cdar clauses))
      '(caseq ,value . ,clauses)))

(defun lispify-condition (code &aux tem)
  (selectq (setq tem (get code 'condition))
    (type-condition
     '(bit-test 1 type-map))
    ((not-cdr-0 not-cdr-1 not-cdr-2 not-cdr-3)
     '(not (cdr-code? abus ,(find-position-in-list tem
                               '(not-cdr-0 not-cdr-1 not-cdr-2 not-cdr-3)))))
    (ybus-31
     '(not (zerop (logand 1_31. ybus))))
    (alu-31
     '(not (zerop (logand 1_31. alu-output))))
    (alub-0
     '(not (zerop (logand 1 alub))))
    (otherwise
     (lispify-alu-condition
       tem (get code 'alu)))))

(defun lispify-alu-condition (cond alu)
  (selectq cond
    (equal-pointer
     '(= (logand #.(1- 1_28.) alu-output) #.(1- 1_28.)))
    (not-equal-fixnum
     '(not (= (logand #.(1- 1_32.) alu-output) #.(1- 1_32.))))
    (not-equal-typed-pointer
     '(not (= (logand #.(1- 1_34.) alu-output) #.(1- 1_34.))))
    ((not-greater-pointer not-greater-fixnum-unsigned)
     (let ((op1 'xbus) op2 (op3 0)
           (func (if (eq cond 'not-greater-pointer) 'carry28 'carry32)))
       (setq op2 (selectq alu
                   (X+Y 'alub)
                   (X+Y+1 (setq op3 1) 'alub)
                   ((X-Y-1 X-Y-1-signed) '(lognot alub))
                   ((X-Y X-Y-signed) (setq op3 1) '(lognot alub))
                   (X 0)
                   (X+1 1)
                   (X-1 -1)
                   (otherwise
                    (bletch "~S - bad alu op - lispify-alu-condition" alu))))
       '(not (,func ,op1 ,op2 ,op3))))
    (otherwise (bletch "~S - bad skip cond - lispify-alu-condition" cond))))

(defun microlisp-if-branch (code)
  (cond ((null code) nil)                                  ;drop through
        ((atom code)                                       ;goto
         (ncons '(return (,(microcode-lisp-function-name code)))))
        (t (microcode-to-lisp code))))                     ;immediate code

(defun microcode-lisp-function-name (utag)
  (or (symbolp utag) (bletch "~S - not a tag -- microcode-lisp-function-name"
                             utag))
  (intern (format nil '|~A-LISPMICROCODE| utag)))
```

F:>lmach>ucode>trap.lisp.8

```
;;; -*- Mode:Lisp; Package:Micro; Base:8; Lowercase:yes -*-
;;; (c) Copyright 1982, Symbolics, Inc.

; Microcode for Trap Handling on "real" machine

;Get defmicro and all his hosts
#M
(declare (cond ((not (status feature lmucode))
                (load 'udcls))))

;Invisible-pointer traps
;If transporting was needed, it has happened already
;Time= 2 cycles trapping + 3 cycles here
(defucode-at-loc inviz-trap 10006        ;trap-2 handler
  (parallel
    (trap-save)
    (declare-memory-timing data-cycle)  ;defeat error checking, only used in emulator task
    (assign vma memory-data)
    (if (data-type? memory-data dtp-body-forward)
        ;; Body forward points to header forward
        (sequential
          (start-memory read)
          (assign b-vma (- b-vma vma))          ;Offset into structure
          (machine-version-case
            ((tmc tmc5)
             (sequential
               (assign b-vma (+ memory-data b-vma))      ;Address word in target structure
               (assign vma b-vma)))
            (otherwise
              (assign vma (+ memory-data b-vma)))))      ;Address word in target structure
        (drop-through)))
  (trap-restore
    (start-memory read)
    (assign b-vma vma)))

;Invisible pointer following when VMA advanced one or two words in block read.
;evcp and one-q-forward leave the original sequence intact. the others change
;to a new sequence.

(defucode-at-loc error-trap 10004                ;trap-0 handler
  (parallel (trap-save)
            (lisp (enter-error-handler))
            (if (not (zero-fixnum (sg-nontrappability %current-stack-group-status-bits)))
                (parallel (halt error-in-error-handler) (jump error-trap))
                ;; Fixup the stack first, since we need to push some stuff
                (call-and-return-to restore-stack-pointer error-trap-1))))

(defucode error-trap-no-restore-stack
  (parallel (trap-save)
            (lisp (enter-error-handler))
            (if (not (zero-fixnum (sg-nontrappability %current-stack-group-status-bits)))
                (parallel (halt error-in-error-handler) (jump error-trap))
                (goto error-trap-1))))

;Error trap from block read, VMA advanced one or two words
(defucode-at-loc error-trap-vma-up-1 10014
  (parallel (trap-save)
            (assign vma (- vma (b-constant 1))))
  (parallel (lisp (enter-error-handler))
            (if (not (zero-fixnum (sg-nontrappability %current-stack-group-status-bits)))
                (parallel (halt error-in-error-handler) (jump error-trap))
                ;; Fixup the stack first, since we need to push some stuff
                (call-and-return-to restore-stack-pointer error-trap-1))))

(defucode-at-loc error-trap-vma-up-2 10024
  (parallel (trap-save)
            (assign vma (- vma (b-constant 2))))
  (parallel (lisp (enter-error-handler))
            (if (not (zero-fixnum (sg-nontrappability %current-stack-group-status-bits)))
                (parallel (halt error-in-error-handler) (jump error-trap))
                ;; Fixup the stack first, since we need to push some stuff
                (call-and-return-to restore-stack-pointer error-trap-1))))

(defucode error-trap-1
  ;; If an error occurs, halt
  (assign (sg-halt-on-error %current-stack-group-status-bits) (b-constant 1))
  ;; Push the address of the microinstruction that signalled the error
  (assign b-temp (logand (pop-control-stack) (b-constant 37777)))
  (pushval (set-type b-temp dtp-fix))
  (pushval (set-type vma dtp-locative))
  ;; Make the pc point such as to retry the failed instruction.  The error handler is
  ;; likely as not going to mess with our state anyway.
  ;; The stack was already restored above.
  (take-pre-trap signal-error preserve-stack))
```

```
;Here if IFU needs help fetching instructions
(defucode-at-loc ifu-empty-trap 14000
  (set-pc pc))

;This label is known by PAGE-FAULT.  A fault here prevents backing up the PC.

(machine-version-case ((tmc)
(defucode ifu-empty-trap-1
  (start-memory read block instruction-fetch)
  (start-memory read block instruction-fetch)   ;Active(1)
  (nop)                                        ;Data(1),Active(2)
  (next-instruction)))                         ;Decode(1),Data(2)
 (otherwise nil))
```

F:>lmach>ucode>SYM.LISP.7

```
;;; -*- Mode:LISP; Package:Micro; Base: 8; Lowercase: T -*-
;;; (c) Copyright 1982, Symbolics, Inc.

; Microcode for operations on symbols

#M
(declare (cond ((not (status feature lmucode))
                (load 'udcls))))

(definst symeval no-operand
  (parallel (check-data-type top-of-stack-a dtp-symbol dtp-nil)
            (assign vma (+ top-of-stack-a (b-constant 1)))
            (jump reference-symbol-offset)))

(definst fsymeval no-operand
  (parallel (check-data-type top-of-stack-a dtp-symbol dtp-nil)
            (assign vma (+ top-of-stack-a (b-constant 2)))
            (jump reference-symbol-offset)))

(defucode reference-symbol-offset
  (start-memory read)
  (nop)                                        ;time for the memory
  (parallel (transport data)
            (newtop memory-data)
            (next-instruction)))

(definst value-cell-location no-operand
  (parallel (check-data-type top-of-stack-a dtp-symbol)
            (newtop (set-type (+ top-of-stack-a (b-constant 1))
                              dtp-locative))
            (next-instruction)))

(definst function-cell-location no-operand
  (parallel (check-data-type top-of-stack-a dtp-symbol)
            (newtop (set-type (+ top-of-stack-a (b-constant 2))
                              dtp-locative))
            (next-instruction)))

(definst property-cell-location no-operand
  (parallel (check-data-type top-of-stack-a dtp-symbol dtp-nil)
            (newtop (set-type (+ top-of-stack-a (b-constant 3))
                              dtp-locative))
            (next-instruction)))

(definst package-cell-location no-operand
  (parallel (check-data-type top-of-stack-a dtp-symbol dtp-nil)
            (newtop (set-type (+ top-of-stack-a (b-constant 4))
                              dtp-locative))
            (next-instruction)))

(definst boundp no-operand
  (parallel (check-data-type top-of-stack-a dtp-symbol dtp-nil)
            (assign vma (+ top-of-stack-a (b-constant 1)))
            (jump check-boundp)))

(definst fboundp no-operand
  (parallel (check-data-type top-of-stack-a dtp-symbol dtp-nil)
            (assign vma (+ top-of-stack-a (b-constant 2)))
            (jump check-boundp)))

(defucode check-boundp
  (start-memory read)
  (nop)                                        ;wait for memory cycle
  (parallel (transport write)                  ;This might not be the right kind of transport
            (if (data-type? memory-data dtp-null)
                (parallel (newtop quote-nil)
                          (next-instruction))
                (parallel (newtop quote-t)
                          (next-instruction)))))
```

```
(definst get-pname no-operand
  (parallel (check-data-type top-of-stack-a dtp-symbol dtp-nil)
            (assign vma top-of-stack))
  (start-memory read)
  (nop)                                ;wait for memory cycle
  (parallel (transport header)
            (newtop (set-type memory-data dtp-array))
            (next-instruction)))

(definst set no-operand
  (parallel (check-data-type next-on-stack dtp-symbol)
            (assign vma (1+ next-on-stack)))
  (parallel (start-memory read)        ;read the value cell pointer
            (assign b-temp top-of-stack)
            (decrement-stack-pointer))  ;pop off the value
  (for-effect (pcnval))                ;and the symbol pointer
  (parallel (transport write)          ;Follow any forwarding pointer
            (assign a-temp             ;Merge new data with old cdr code
                    (merge-cdr b-temp memory-data)))
  (parallel (store-contents a-temp)    ;Now write back the new car
            (next-instruction)))
```

;;; -*- Mode:Lisp; Package:Micro; Base:8; Lowercase:yes -*-
;;; (c) Copyright 1982, Symbolics, Inc.

```
;Subprimitives

;Get defmicro and all his hosts
#M
(declare (cond ((not (status feature lmucode))
                (load 'udcls)))
         (*expr get-to-abus get-to-bbus))        ;in UU


;Hardware definitions (these might belong in UU, however they
; are not used by any files other than this one.)

(defmicro cdr-field (opnd &optional background)
  '(parallel ,(get-to-abus opnd)
             (ldb ybus-crocks-1 ,2 ,14. ,background)))

(defmicro high-type-field (opnd &optional background)
  '(parallel ,(get-to-abus opnd)
             (ldb ybus-crocks-1 ,2 ,12. ,background)))

;This gets the high 4 bits of the tag.  The low 4 have to be LDBed separately
(defmicro high-tag-field (opnd &optional background)
  '(parallel ,(get-to-abus opnd)
             (ldb ybus-crocks-1 ,4 ,12. ,background)))

(defmicro low-tag-field (opnd &optional background)
  '(ldb ,opnd 4 28. ,background))

(defmicro pointer-field (opnd &optional background)
  '(ldb ,opnd 28. 8 ,background))

(defmicro set-low-tag-field (opnd background)
  (make-microdata 'obus
     (paralyze (get-to-obus32 opnd)
               '(microinstruction force-obus<31-28> ,background
                                  magic ,background))))

(defmicro dpb-tag-field (tag opnd)
  '(parallel ,(get-to-bbus tag)
             (dpb ,tag 4 28. ,opnd)
             (microinstruction force-obus<35-34> bbus<7-6>
                               force-obus<33-32> bbus<5-4>)))

(defmicro dpb-tag-field-high-only (tag opnd)
  '(parallel ,(get-to-bbus tag)
             ,opnd
             (microinstruction force-obus<35-34> bbus<7-6>
                               force-obus<33-32> bbus<5-4>)))

(defmicro dpb-cdr-field (cdr opnd)
  (if (and (not (atom cdr))
           (eq (car cdr) 'ldb)
           (equal (cddr cdr) '(2 6)))
      (setq cdr (cadr cdr))
      (retch "~S not aligned for dpbing into cdr field, kludge, kludge" cdr))
  '(parallel ,(get-to-bbus cdr)
             ,opnd
             (microinstruction force-obus<35-34> bbus<7-6>)))

(defmicro dpb-type-field (type opnd)
  '(parallel ,(get-to-bbus type)
             (dpb ,type 4 28. ,opnd)
             (microinstruction force-obus<33-32> bbus<5-4>)))
```

```
;Field extraction subprimitives



  (parallel
    ;Get 6-bit type field, rotated right 4 bits in a 32-bit word
    (assign b-temp (high-type-field top-of-stack-a top-of-stack-a))
    (if (data-type? top-of-stack-a dtp-fix dtp-float)
        (parallel (newtop (set-type (dpb b-temp 2 4 0) dtp-fix))
                  (next-instruction))
                    ;This bizarre LDB rotates left 4 then masks to 6 low bits
        (parallel (newtop (set-type (strange-ldb b-temp 6 34) dtp-fix))
                  (next-instruction)))))

(definst1 %pointer (no-operand needs-stack)
  (newtop (set-type (pointer-field top-of-stack) dtp-fix)))

(definst1 %fixnum (no-operand needs-stack)
  (check-data-type top-of-stack-a dtp-float)
  (newtop (set-type top-of-stack dtp-fix)))

(definst1 %flonum (no-operand needs-stack)
  (check-data-type top-of-stack-a dtp-fix)
  (newtop (set-type top-of-stack dtp-float)))

;"Pointer" construction

(definst1 %make-pointer-immed unsigned-immediate-operand
  (newtop (dpb-type-field macro-unsigned-immediate top-of-stack-a)))

(definst %make-pointer-immed-offset unsigned-immediate-operand
  (pop2push (set-type (+ next-on-stack top-of-stack) dtp-fix))
  (parallel (newtop (dpb-type-field macro-unsigned-immediate top-of-stack-a))
            (next-instruction)))

;2 cycles because it takes its damned arguments in the wrong order
;Bits <33:32> can only be DPB'ed from the B side (perhaps they could
;come from the Y bus instead, but that would probably break other things).
(definst %make-pointer no-operand
  (parallel
    (check-data-type next-on-stack dtp-fix)
    (assign b-temp next-on-stack)
    (assign next-on-stack top-of-stack)
    (decrement-stack-pointer))  ;Can't use pop2push in next
  (parallel
    (newtop (dpb-type-field b-temp top-of-stack-a))
    (next-instruction)))

;2 cycles in order to get a fixnum result of the correct sign
(definst %pointer-difference (no-operand needs-stack)
  (parallel
    (assign b-temp (- next-on-stack top-of-stack))
    (if (lesser-pointer next-on-stack top-of-stack)
        (parallel
          (pop2push (set-type (set-low-tag-field b-temp 17) dtp-fix))
          (next-instruction))
        (parallel
          (pop2push (set-type (set-low-tag-field b-temp 0) dtp-fix))
          (next-instruction)))))
```

F:>lmach>ucode>subprim.lisp.321

```
;Accessing memory cells indirect through pointers

(defucode memread                 ;Call with pointer in VMA
  (start-memory read)             ;Return with data in memory-data
  (return))

(defucode memread-write
  (start-memory read write)
  (return))

(definst %p-ldb-immed (10-bit-immediate-operand needs-stack)
  (memread top-of-stack)
  (parallel (newtop (set-type (ldb memory-data macro macro) dtp-fix))
            (next-instruction)))

;This is 5 cycles whereas %p-cdr-code could be done in 4.  Saves opcodes...
(definst %p-tag-ldb-immed (unsigned-immediate-operand needs-stack)
  (memread top-of-stack)
  ;Get 6-bit type field, rotated right 4 bits in a 32-bit word
  (assign b-temp (high-tag-field memory-data memory-data))
  ;Here we assume that the mask generator does the right thing
  ;so that we can LDB out of this byte which straddles a word boundary
  ;The macroinstruction's R in the immediate operand is hacked appropriately.
  (parallel (newtop (set-type (ldb b-temp macro macro) dtp-fix))
            (next-instruction)))
```

```
(definst %p-dpb-immed (10-bit-immediate-operand needs-stack)
  (assign vma top-of-stack)
  (parallel
    (start-memory read write)
    (assign b-temp next-on-stack)
    (decrement-stack-pointer))
  (for-effect (popval))
  (parallel
    (assign memory-data (dpb b-temp macro macro memory-data))
    (start-memory write)
    (next-instruction)))

;9 cycles.  %p-store-cdr-code could be done in 4 cycles.  Saves opcodes...
(definst %p-tag-dpb-immed (unsigned-immediate-operand needs-stack)
  (assign vma top-of-stack)
  (parallel
    (start-memory read write)
    (assign b-temp next-on-stack)
    (decrement-stack-pointer))
  (for-effect (popval))
  (assign a-temp-2 memory-data)         ;for tenporary memory control
  (assign b-temp-2 (high-tag-field a-temp-2 a-temp-2))
  (assign a-temp (strange-ldb b-temp-2 8 34))    ;Rotate left 4, take low 8 bits
  ; Now we have the tag field right-justified, do the user's DPB
  (assign b-temp (dpb b-temp macro macro a-temp))
  ; Re-assemble the memory word and store it back.  Not easy
  ; because everyone in sight is trying to use U AMWA field.
  ; Have to do the low & high tag fields separately.
  (assign b-temp-2 (dpb b-temp 4 28. a-temp-2))
  (assign a-temp b-temp-2)
  (parallel
    (assign memory-data (dpb-tag-field-high-only b-temp a-temp))
    (start-memory write)
    (next-instruction)))

;Leaves TOS wrong
(definst %p-store-contents (no-operand smashes-stack)
  (parallel (memread next-on-stack)      ;--- request write access?
            (decrement-stack-pointer))
  (assign a-temp (merge-cdr top-of-stack memory-data))
  (parallel (store-contents a-temp)
            (decrement-stack-pointer)
            (next-instruction)))

;Leaves TOS wrong
(definst %p-store-cdr-and-contents (no-operand smashes-stack)
  (parallel (assign vma (amem (stack-pointer -2)))      ;Pointer
            (decrement-stack-pointer))
  (parallel (assign b-temp (rotate (amem (stack-pointer 1)) 6)) ;Cdr
            (decrement-stack-pointer))
  (assign a-temp (dpb-cdr-field (ldb b-temp 2 6) (amem (stack-pointer 1)))) ;merge Contents
  (parallel (store-contents a-temp)
            (decrement-stack-pointer)
            (next-instruction)))

;Leaves TOS wrong
(definst %p-store-tag-and-pointer (no-operand needs-stack smashes-stack)
  ; a-temp gets pointer-field, b-temp gets tag-field
  (parallel (assign a-temp top-of-stack)
          - (assign b-temp next-on-stack))
  ; a-temp gets the word to be stored
  (parallel (assign a-temp (dpb-tag-field b-temp a-temp))
            (decrement-stack-pointer))
  ; vma gets address to store it into
  (parallel (assign vma next-on-stack)
            (decrement-stack-pointer))
  ; store it
  (parallel
    (start-memory write)
    (assign memory-data a-temp)
    (decrement-stack-pointer)
    (next-instruction)))

(definst %p-contents-as-locative (no-operand needs-stack)
  (memread top-of-stack)
  (parallel (newtop (set-type memory-data dtp-locative))
            (next-instruction)))

;Args are pointer and offset.  Follow any structure forwarding in the
;header pointed to by the pointer, then return the result plus the
;offset, as a locative.  Offset isn't type checked since not convenient.
;This used to do a data-type check, forcing the base word to really be a header.
;That turned out to be too inconvenient, and the A machine doesn't do it,
;so I flushed it.
(definst %p-structure-offset no-operand
  (parallel (memread next-on-stack)
            (assign b-vma next-on-stack))
  (transport header-or-data)
  (parallel (pop2push (set-type (+ b-vma top-of-stack-a) dtp-locative))
            (next-instruction)))
```

```
(definst follow-structure-forwarding no-operand
  (parallel (memread top-of-stack-a)
            (assign b-vma top-of-stack-a))
  (transport header-or-data)
  (parallel (newtop (pointer-field b-vma top-of-stack-a))
            (next-instruction)))

(definst follow-cell-forwarding no-operand
  (parallel (check-arg-type 8 next-on-stack dtp-locative)
            (assign vma next-on-stack)
            (assign b-vma next-on-stack))
  (start-memory read)
  (if (data-type? top-of-stack-a dtp-nil)
      (parallel (transport bind-write)
                (pop2push (set-type b-vma dtp-locative))
                (next-instruction))
      (parallel (transport write)
                (pop2push (set-type b-vma dtp-locative))
                (next-instruction))))

;Stop the machine.
;For macrocode breakpoints, this must halt before incrementing the PC.  Hence
;SEQUENTIAL rather than PARALLEL.
(definst %halt no-operand
  (sequential (halt %halt)
              (next-instruction)))                   ;Allow manual proceed

;Read the microsecond clock
(definst %microsecond-clock no-operand
  (assign b-temp (set-type (read-lbus-dev 36 0) dtp-fix))
  (parallel (pushval b-temp)
            (next-instruction)))
;;; Bulk memory initialization

;stack-offset                              -4      -3   -2     -1       0
;(%block-store-cdr-and-contents address count cdr contents increment)
;(%block-store-tag-and-pointer  address count tag pointer  increment)
;a-temp holds word to be stored

(definst %block-store-cdr-and-contents (no-operand needs-stack smashes-stack)
  (assign b-temp (dpb (amem (stack-pointer -2)) 2 6 0))          ;Align cdr code
  (parallel                                                      ;Store-data
    (assign a-temp (dpb-cdr-field (ldb b-temp 2 6) (amem (stack-pointer -1))))
    (jump block-store-start)))

(definst %block-store-tag-and-pointer (no-operand needs-stack smashes-stack)
  (assign b-temp (amem (stack-pointer -2)))      ;Tag field
  (assign a-temp (amem (stack-pointer -1)))      ;Pointer field
  (parallel                                      ;Store-data
    (assign a-temp (dpb-tag-field b-temp a-temp))
    (jump block-store-start)))

(defucode block-store-start
  (assign a-temp (merge-high-tag (- a-temp top-of-stack) a-temp)) ;Pre-decrement store-data
  (parallel (assign vma (amem (stack-pointer -4)))                ;First address in block
            (jump block-store-fast-loop)))

;Increment data, store result in memory and back in data.
;The increment must not cross a GC space boundary since the GC-map lookup
;is on the unincremented data.  The address storing into must not be in Amem.
(defmicro store-contents-with-increment (data increment &rest options)
  `(parallel
     (assign ,data (merge-high-tag (+ ,data ,increment) ,data))
     (store-contents obus obus-as-good-as-abus no-amem . ,options)))

(defucode block-store-slow-loop
  ;; Test count
  (if (minus-or-zero-fixnum (amem (stack-pointer -3)))
      (parallel (assign stack-pointer (- stack-pointer (b-constant 5)))
                (next-instruction))
      (drop-through))
  (store-contents-with-increment a-temp top-of-stack block)
  ;;Update arguments
  (assign (amem (stack-pointer -3)) (set-type (1- (amem (stack-pointer -3))) dtp-fix))
  (assign (amem (stack-pointer -4))
          (set-type (1+ (amem (stack-pointer -4))) dtp-locative))
  (parallel (assign (amem (stack-pointer -1))
                    (merge-high-tag (+ (amem (stack-pointer -1)) top-of-stack)
                                    (amem (stack-pointer -1))))
            (jump block-store-slow-loop)))

(defucode block-store-fast-loop
  (if (lesser-fixnum (amem (stack-pointer -3)) (b-constant 8))
      (goto block-store-slow-loop)                              ;Almost done, go slow
      (drop-through))                                           ;Block-write eight words
  (store-contents-with-increment a-temp top-of-stack block)
  (store-contents-with-increment a-temp top-of-stack block)
  (store-contents-with-increment a-temp top-of-stack block)
  (store-contents-with-increment a-temp top-of-stack block)
  (store-contents-with-increment a-temp top-of-stack block)
```

```
  (store-contents-with-increment a-temp top-of-stack block)
  (store-contents-with-increment a-temp top-of-stack block)
  (store-contents-with-increment a-temp top-of-stack block)
  (assign (amem (stack-pointer -3))                              ;Now checkpoint into arguments
          (set-type (- (amem (stack-pointer -3)) (b-constant 8)) dtp-fix))
  (assign (amem (stack-pointer -4))
          (set-type (+ (amem (stack-pointer -4)) (b-constant 8)) dtp-locative))
  (parallel (assign (amem (stack-pointer -1))
                    (merge-high-tag (+ (amem (stack-pointer -1))
                                       (dpb top-of-stack 29. 3 0))      ;i.e. multiply by 8
                                    (amem (stack-pointer -1))))
            (jump block-store-fast-loop)))

;Read an unsynchronized device register.  This relies on the fact that the
;emulator task has its own MD register(s), which can be used as a synchronizer.
;---Take out the forced dtp-fix when we get rid of the rev-1 I/O board, which
;---doesn't always set the data type when reading registers.
(definst %unsynchronized-device-read no-operand
  (memread top-of-stack-a)
  (nop)                                          ;Delay 1 cycle before looking at register
  (parallel (declare-memory-timing data-cycle)  ;Fake out error checking in microcode compiler
            (newtop (set-type memory-data dtp-fix))
            (next-instruction)))

;This interlocks against tasks, but cannot interlock against the FEP
;Unlike the A-machine, pclsring enables interlocking to work even if the
;old value is transported.  Interlocking does not work in the presence
;of forwarding-pointers, however.
(definst store-conditional (no-operand needs-stack)
  (parallel
    (check-arg-type 8 (amem (stack-pointer -2)) dtp-locative)
    (memread-write (amem (stack-pointer -2))))  ;First ensure write access
  (parallel                                      ;Then read it again, interlocked
    (start-memory read)                          ;This won't start if task switch impending
    (disable-tasking))                           ;Prevent task switch before data cycle
  (parallel
    (assign b-temp next-on-stack)                ;Desired old contents
    (assign a-temp top-of-stack)                 ;New contents
    (decrement-stack-pointer)
    (disable-tasking))                           ;Prevent task switch before store started
  (parallel
    (transport)
    (assign b-temp memory-data)
    (if (equal-typed-pointer memory-data b-temp)
        (sequential                              ;Succeed
          (store-contents a-temp (cdr b-temp))
          (parallel
            (pop2push quote-t)
            (next-instruction)))
        (parallel                                ;Fail
          (pop2push quote-nil)
          (next-instruction)))))
```

F:>lmach>ucode>stack-buffer.lisp.67

```
;;; -*- Mode:Lisp; Package:Micro; Base:8; Lowercase:yes -*-
;;; (c) Copyright 1982, Symbolics, Inc.

; Microcode for maintenance of the stack buffer


#M
(declare (cond ((not (status feature lmucode))
                (load 'udcls))))

(declare (special *page-size*)) ;in SIM

;Dump a page out of the stack
;Checks for stack overflow, unmaps the page from the stack buffer, and pushes
;state into the stack, setting stack-load-started.
;       first address to dump
;       last address to dump +1
;This stack state allows the instruction to be pclsred during the dumping process
;After the dumping is complete, the stack-buffer-underflow bits are reset to
;reflect the new bottom frame in the stack, the state is removed, stack-load-started
;is cleared, the new page is mapped into A-memory, and the stack-buffer address and
;limit are adjusted.
;Must not attempt to stack-group-switch while stack-load-started flag is set!
(definst stack-dump no-operand
  (if (not (bit stack-load-started))
      (sequential
        (error-if (greater-or-equal-pointer stack-limit %control-stack-limit)
                  stack-overflow)
        (pushval (set-type %stack-buffer-low dtp-fix))
```

```
        ;;--- Temporary kludge necessary because stacks are arrays, which they
        ;;--- shouldn't be, and hence are not page-aligned
        (if (lesser-pointer top-of-stack %control-stack-low)
            (newtop (set-type %control-stack-low dtp-fix))
            (drop-through))
        (pushval (set-type (+ %stack-buffer-low (b-constant *page-size*)) dtp-fix))
        (parallel (assign b-temp %stack-buffer-low)     ;Unmap old page
                  (assign %stack-buffer-low top-of-stack)
                  (call clear-b-temp-page-from-map-cache))
        (parallel (assign stack-load-started (b-constant 1))
                  (clear-stack-adjustment)))    ;Keep this stack state if pclsr
      (drop-through))
  (parallel (assign xbas next-on-stack)
            (assign vma next-on-stack)
            (call stack-dump-loop))
  (parallel (assign vma (+ %stack-buffer-low (b-constant (* 3 *page-size*))))
            (call map-page-to-stack-buffer))    ;Map new fourth page
  (parallel (decrement-stack-pointer)
            (assign stack-load-started (b-constant 0)))
  (parallel (for-effect (popval))
            (jump adjust-frame-buffer-underflow-bits)))

(defucode stack-dump-loop
  (if (equal-pointer next-on-stack top-of-stack)
      (goto set-stack-buffer-limit)
      ;;Dump 1 word.  For real memory control, can change this to do 8 words in a block
      ;;write, then advance xbas and next-on-stack by 8 instead of 1.  Must be careful
      ;;not to advance state until after guaranteed not to page-fault.
      (sequential
        (store-contents (amem (xbas 0)))
        (parallel (assign next-on-stack (1+ next-on-stack))
                  (assign xbas obus)
                  (assign vma obus)
                  (jump stack-dump-loop)))))

(defucode set-stack-buffer-limit
  ;; Now decide how many pages of stack buffer to use.  Normally 4, unless we are
  ;; close to the end of the stack.
  ;; Maximum frame size is 400 here.  Decrease this to 100 later when compiler detects
  ;; large frames and generates explicit checking instructions
  (assign stack-limit (set-type (+ %stack-buffer-low (b-constant (- 2000 400 1))) dtp-fix))
  (if (greater-pointer stack-limit %control-stack-limit)
      (assign stack-limit %control-stack-limit)
      (drop-through))
  ;; Set %stack-buffer-limit to highest virtual address in stack buffer.
  ;; This 1+ is because the maximum frame size is 400, if it was smaller it could be deleted.
  (assign %stack-buffer-limit (1+ stack-limit))
  (parallel
    (assign %stack-buffer-limit
            (set-type (logior %stack-buffer-limit (b-constant (1- *page-size*))) dtp-fix))
    (return)))


;Stack-buffer loading.  At this point the current frame is not even in
;the stack buffer.


;Find the previous frame and decide how many pages need to be loaded into the
;stack buffer.  We need all of the current frame plus the part of its caller
;that contains our arguments.  Unmap that many pages from the high end, copy
;the pages from main memory into the stack buffer, then map those addresses
;into A-memory.  Adjust the frame-buffer-underflow bits in the newly-loaded
;frames.
;The following state is kept in the stack across pclsrings, protected by stack-load-started.
;       First address to be loaded
;       Next address to be loaded
;       Last address to be loaded+1
(definst stack-load no-operand
  (if (not (bit stack-load-started))
      (sequential
        ;; Read frame-previous-top from memory
        (memread (- frame-pointer (b-constant 4)))
        (assign a-temp (1+ memory-data))        ;Lowest address in frame
        ;; Push state (new %stack-buffer-low, range of memory to be loaded)
        (pushval (set-type (logand a-temp (b-constant (- *page-size*))) dtp-fix))
        (pushval top-of-stack)
        ;;--- Temporary kludge necessary because stacks are arrays, which they
        ;;--- shouldn't be, and hence are not page-aligned
        (if (lesser-pointer top-of-stack %control-stack-low)
            (newtop (set-type %control-stack-low dtp-fix))
            (drop-through))
        (pushval (set-type %stack-buffer-low dtp-fix))
        (parallel (assign stack-load-started (b-constant 1))
                  (clear-stack-adjustment)))    ;Keep this stack state if pclsr
      (drop-through))
  (parallel (assign xbas next-on-stack)
            (call stack-load-loop))
  (parallel (assign stack-load-started (b-constant 0))
            (call stack-load-setup-map))
  (parallel (for-effect (popval))
            (jump adjust-frame-buffer-underflow-bits)))
```

```
;--- Make a temporary debugging test before entering the real stack-load-loop
;--- The original reason for this has been found, but it probably doesn't hurt
;--- to leave the test around for a while.  If the frame-previous-top of a frame
;--- ever gets clobbered, this will cause the machine to halt before the stack
;--- buffer contents get totally trashed.
(defucode stack-load-loop
  (assign b-temp (- top-of-stack next-on-stack))
  (parallel (trap-if (greater-pointer b-temp (a-constant 1400))
                     (halt stack-buffer-fucked-up))
            (jump stack-load-loop-1)))

(defucode stack-load-loop-1
  (if (equal-pointer next-on-stack top-of-stack)
      (parallel (assign stack-pointer (- stack-pointer (b-constant 2)))
                (jump fixup-tos))
      ;;Load 1 word.  For real memory control, can change this to do 8 words in a block
      ;;read, then advance xbas and next-on-stack by 8 instead of 1.  Must be careful
      ;;not to advance state until after guaranteed not to page-fault.
      (sequential
        (assign vma next-on-stack)
        (start-memory read)
        (parallel (assign next-on-stack (1+ next-on-stack))
                  (assign xbas obus))
        (parallel (transport)
                  (assign (amem (xbas -1)) memory-data)
                  (jump stack-load-loop-1)))))

;Loop moving %stack-buffer-low down a page and mapping that page until all the pages
;that were loaded have been processed
;Also as we go, unmap the pages that used to map into the same Amem page (from the
;other end of the stack buffer)
(defucode stack-load-setup-map
  (assign %stack-buffer-low (- %stack-buffer-low (b-constant *page-size*)))
  (parallel (assign vma (+ %stack-buffer-low (b-constant (* 4 *page-size*))))
            (call clear-page-from-map-cache))
  (if (equal-pointer %stack-buffer-low top-of-stack)
      (parallel (assign vma %stack-buffer-low)
                (call-and-return-to map-page-to-stack-buffer set-stack-buffer-limit))
      (parallel (assign vma %stack-buffer-low)
                (call-and-return-to map-page-to-stack-buffer stack-load-setup-map))))


;Adjust the frame-buffer-underflow-bits of all frames in the stack buffer
;so that the lowest completely-in frame has a 1 and the rest have a 0.
;--- Possibilities for bumming this to avoid having to set bits to
;--- zero (saves one cycle per frame).  Remember the frame whose bit
;--- is set, and before dumping clear it.  Thus when loading all the
;--- bits will be loaded as zero, and when dumping we need not clear
;--- any bits since they are already clear.

;Frame field accessors relative to xbas rather than fp

(defatomicro xframe-misc-data
  (amem (xbas -2)))

(defatomicro xframe-previous-top
  (amem (xbas -4)))

(defatomicro xframe-previous-frame
  (amem (xbas -5)))

(defatomic-byte-field xframe-buffer-underflow-bit frame-buffer-underflow-bit
                      xframe-misc-data)

(defatomic-byte-field xframe-bottom-bit frame-bottom-bit
                      xframe-misc-data)

;The code
(defucode adjust-frame-buffer-underflow-bits
  (assign b-temp (+ %stack-buffer-low (b-constant 5)))  ;Frame underhang
  (parallel (assign xbas frame-pointer)
            (assign b-temp-3 obus)
            (jump adjust-frame-buffer-underflow-bits-1)))

(defucode adjust-frame-buffer-underflow-bits-1
  (if (lesser-pointer xframe-previous-frame b-temp)     ;Prev frame not in
      (sequential
        (assign b-temp (1- %stack-buffer-low))
        (if (lesser-pointer xframe-previous-top b-temp) ;This frame not all in
            (assign xbas b-temp-2)                      ;so back up one frame
            (drop-through))
        (parallel
          (assign xframe-buffer-underflow-bit (b-constant 1))
          (return)))
      (if (bit xframe-bottom-bit)
          (return)                                 ;Bottom of stack, all frames in
          (sequential
            (assign xframe-buffer-underflow-bit (b-constant 0))
            (assign b-temp-2 b-temp-3)
            (parallel (assign xbas xframe-previous-frame)
                      (assign b-temp-3 obus)
                      (jump adjust-frame-buffer-underflow-bits-1))))))
```

F:>lmach>ucode>sg.lisp.41

```
;;; -*- Mode:Lisp; Package:Micro; Base:8; Lowercase:yes -*-
;;; (c) Copyright 1982, Symbolics, Inc.

; Microcode for stack groups

;Get defmicro and all his hosts
#M
(declare (cond ((not (status feature lmucode))
                (load 'udcls))))

(reserve-scratchpad-memory 2444 2450 337 340)

(defareg a-stack-group-lock)             ;NIL normally, else how far we have gotten
                                         ; in the process of switching (see the code)
(defareg a-stack-group-entering)         ;stack-group in process of entering
(defareg a-stack-group-leaving)          ;tracks for debugging only
(defareg a-stack-group-argument)         ;Value being conveyed across SG switch
(defbreg b-binding-boundary)             ;Boundary between swapped and unswapped binding stack

(define-enumerated-value-constants *sg-arg-status-codes*)

;This instruction is called by the stack-group-switch primitives, as well as
;from an escape function used for sequence breaks and error traps.
;
;Takes three arguments on the stack:
;       The value to be conveyed
;       The stack group to switch to
;       The new value for SG-STATUS-BITS of this stack group
;Normally the third argument is simply a new value for SG-ARG-STATUS, however
;if higher-order bits are on they get IORed in, allowed nonresumability bits to get set.
;
;Will return with a value on the stack unless the new SG-ARG-STATUS is %SG-ARG-NONE.
;If the new SG-ARG-STATUS is %SG-ARG-BREAK, then the first argument is the PC to
;be used when this SG is resumed, instead of the current PC, and no value is
;to be returned in the stack either.
;
;Also we have (associated with the stack group lock) an indication of how far
;we have progressed, so that this instruction can be pclsred.

;Proceed as follows:
;       If the stack-group lock is already locked, re-enter at appropriate point
;       Error if target stack group not resumable
;       Shuffle the stack to reflect how we want it to be upon return
;         This means leave a slot for the value if necessary, then push the PC
;       Lock the stack-group lock
;       Dump the entire stack buffer
;       Swap the special-variable bindings
;       Dump the stack group state (including FP, SP) into main memory
;       Load the new stack group state from main memory into A-memory, FP, SP
;       Load the stack buffer (for the current frame)
;       Stash the argument in the stack if wanted
;       Unswap the bindings
;       Unlock the stack-group lock
;       Popj

(definst %stack-group-switch (no-operand needs-stack)
  ;; Check for retrying after pclsr
  (parallel
    (dispatch-after-next (ldb a-stack-group-lock 3 0)
              ((0) (goto continue-sg-stack-buffer-dump))
              ((1) (goto continue-sg-swap-out-bindings))
              ((2) (goto sg-dump-state))
              ((3) (goto sg-load-state))
              ((4) (goto continue-sg-stack-buffer-load))
              ((5) (goto continue-sg-swap-in-bindings)))
    (if (not (data-type? a-stack-group-lock dtp-nil))
        (take-dispatch)
        (assign a-stack-group-leaving %current-stack-group)))
  ;; Check resumability of new stack group
  (parallel (check-data-type next-on-stack dtp-array)
            (memread (+ next-on-stack (b-constant (field-word-offset 'sg-nonresumability)))))
  (parallel (transport data)
            (trap-if (not (zero-fixnum (sg-nonresumability memory-data)))
                     (signal-error stack-group-not-resumable)))
  ;; Process arguments and shuffle the stack appropriately
  (assign (sg-arg-status %current-stack-group-status-bits) top-of-stack)
  (parallel (assign %current-stack-group-status-bits
                    (set-type (logior %current-stack-group-status-bits top-of-stack) dtp-fix))
            (decrement-stack-pointer))
  (parallel (assign a-stack-group-entering top-of-stack-a)
            (decrement-stack-pointer))
  (assign a-stack-group-argument top-of-stack-a)
  (if (lesser-or-equal-fixnum-unsigned (sg-arg-status %current-stack-group-status-bits)
                                       %sg-arg-break)
      (if (equal-fixnum (sg-arg-status %current-stack-group-status-bits) %sg-arg-break)
          ;; PC on stack, no value slot under it, pass self as argument
```

```
        (assign a-stack-group-argument %current-stack-group)
        ;; Put PC on stack, no value slot under it
        (newtop pc))
      ;; Normal case, put PC on stack with value slot under it
      (pushval pc))
  ;; Prepare to dump the stack buffer
  (pushval (set-type %stack-buffer-low dtp-fix))        ;First address to dump
  ;;--- Temporary kludge necessary because stacks are arrays, which they
  ;;--- shouldn't be, and hence are not page-aligned
  (if (lesser-pointer top-of-stack %control-stack-low)
      (newtop (set-type %control-stack-low dtp-fix))
      (drop-through))
  (pushval (set-type stack-pointer dtp-fix))            ;Last address to dump+1
  (parallel (assign a-stack-group-lock (set-type (a-constant 8) dtp-fix))
            (clear-stack-adjustment)
            (jump sg-stack-buffer-dump)))

(defucode sg-stack-buffer-dump
  ;; Unmap all of the stack buffer pages
  (assign b-temp %stack-buffer-low)
  (if (lesser-pointer b-temp %stack-buffer-limit)
      (parallel
        (assign %stack-buffer-low (+ %stack-buffer-low (b-constant *page-size*)))
        (call-and-return-to clear-b-temp-page-from-map-cache sg-stack-buffer-dump))
      (goto continue-sg-stack-buffer-dump)))


(defucode continue-sg-stack-buffer-dump
  (parallel (assign xbas next-on-stack)
            (assign vma next-on-stack)
            (call stack-dump-loop))
  ;; Remove stack-dump-loop arguments from the stack
  (assign stack-pointer (- stack-pointer (b-constant 2)))
  ;; There is now nothing mapped into the stack buffer, set it to highest possible pointer
  (assign %stack-buffer-low (set-type (a-constant 1777777777) dtp-fix))
  ;; Prepare to swap the special-variable bindings
  (assign b-binding-boundary (1+ %binding-stack-pointer))
  (parallel
    (assign a-stack-group-lock (set-type (a-constant 1) dtp-fix))
    (jump continue-sg-swap-out-bindings)))

(defucode continue-sg-swap-out-bindings
  (if (equal-pointer b-binding-boundary %binding-stack-low)
      ;; Done whole binding stack
      (goto sg-dump-state)
      (drop-through))
  ;; Read the pointer to the bound location
  (memread (1- b-binding-boundary))
  (parallel (transport)
            (assign b-temp memory-data))
  ;; Read the old contents of the bound location, checking write access
  (memread-write (- b-binding-boundary (a-constant 2)))
  (parallel (transport bind)
            (assign a-temp-2 memory-data))
  ;; Read the current contents of the bound location
  (memread b-temp)
  (parallel (transport bind)
            (assign a-temp memory-data)
            (assign b-temp memory-data))
  ;; Write the old contents there (preserve cdr code)
  (store-contents a-temp-2 (cdr b-temp))
  ;; Store current contents into binding stack (better not pclsr!)
  (parallel (assign vma (- b-binding-boundary (a-constant 2)))
            (assign b-binding-boundary (- b-binding-boundary (a-constant 2))))
  (parallel (store-contents a-temp)
            (jump continue-sg-swap-out-bindings)))

(defucode sg-dump-state
  ;; Dump FP, SP, and the A-mem copy of the stack group state into memory
  ;; If this pclsrs in the middle, it can just start over from the beginning
  (assign a-stack-group-lock (set-type (a-constant 2) dtp-fix))
  ;; Write FP, SP in not-pointer mode to defeat the phantom stack gc that doesn't exist yet
  (assign vma (+ %current-stack-group (b-constant (field-word-offset 'sg-frame-pointer))))
  (store-contents (set-type frame-pointer dtp-locative) block not-pointer)
  (store-contents (set-type stack-pointer dtp-locative) block not-pointer)
  ;; Make sure "active" is cleared in the stored state
  (assign (sg-active-bit %current-stack-group-status-bits) (b-constant 0))
  (assign vma (+ %current-stack-group
                 (b-constant (field-word-offset 'sg-binding-stack-pointer))))
  (store-contents %binding-stack-pointer block)
  (store-contents %catch-block-list block)
  (parallel (store-contents %current-stack-group-status-bits block)
            (jump sg-load-state)))

;Micro to simulate block reads.  Also does transport.  Get a word every 4 cycles.
(defatomicro next-memory-data
  (parallel (declare-memory-timing data-cycle)  ;Coder better get it right...
            (transport data)
            memory-data
            (call start-read-next)))
```

```
;Subroutine for the above
(defucode start-read-next
  (parallel (assign vma (1+ vma))
            (jump memread)))

(defucode sg-load-state
  ;; Load FP, SP, and the A-mem copy of the stack group state from memory
  ;; If this pclsrs in the middle, it can just start over from the beginning
  (parallel
    (assign a-stack-group-lock (set-type (a-constant 3) dtp-fix))
    (call sg-load-state-internal))
  ;; Set up to load the stack buffer.  Load from the beginning of the page
  ;; that includes the beginning of the current frame up to top of stack.
  ;; Read frame-previous-top from memory
  (assign vma (- frame-pointer (b-constant 4)))
  (start-memory read)
  (assign a-stack-group-lock (set-type (a-constant 4) dtp-fix))
  (assign a-temp (set-type (1+ memory-data) 0)) ;Lowest address in frame (don't transport!)
  (pushval (set-type (logand a-temp (b-constant (- *page-size*))) dtp-fix))
  (pushval top-of-stack)
       ;;--- Temporary kludge necessary because stacks are arrays, which they
       ;;--- shouldn't be, and hence are not page-aligned
       (if (lesser-pointer top-of-stack %control-stack-low)
           (newtop (set-type %control-stack-low dtp-fix))
           (drop-through))
  (parallel (pushval (set-type (1- stack-pointer) dtp-fix))  ;First addr not to load
            (clear-stack-adjustment)                       ;Leave in stack if pclsr
            (jump continue-sg-stack-buffer-load)))


(defucode sg-load-state-internal
  (memread (+ a-stack-group-entering (b-constant (field-word-offset 'sg-frame-pointer))))
  (assign frame-pointer next-memory-data)
  (assign stack-pointer next-memory-data)
  (assign %control-stack-low next-memory-data)
  (assign %control-stack-limit next-memory-data)
  (assign %binding-stack-low next-memory-data)
  (assign %binding-stack-limit next-memory-data)
  (assign %binding-stack-pointer next-memory-data)
  (assign %catch-block-list next-memory-data)
  (parallel (declare-memory-timing data-cycle)
            (transport data)
            (assign %current-stack-group-status-bits memory-data))
  (assign %current-stack-group a-stack-group-entering)

  ;; Set the active bit in this SG's stored state, clear other nonresumability bits
  (memread (+ a-stack-group-entering (b-constant (field-word-offset 'sg-active-bit))))
  (parallel (check-data-type memory-data dtp-fix)
            (assign a-temp (andc2 memory-data (b-constant (byte-mask sg-nonresumability)))))
  (parallel (store-contents (set-type (logior a-temp (b-constant (byte-mask sg-active-bit)))
                                      dtp-fix)
                            not-pointer)
            (return)))

(defucode continue-sg-stack-buffer-load
  ;; Load the current frame into the stack buffer, along with the rest of the page
  ;; containing the beginning of the current frame.
  (parallel (assign xbas next-on-stack)
            (call stack-load-loop))
  ;; Decide how much stack buffer to use
  (parallel (assign %stack-buffer-low top-of-stack-a)
            (assign top-of-stack top-of-stack-a)
            (call-and-return-to set-stack-buffer-limit
                                sg-stack-buffer-load-setup-map)))

(defucode sg-stack-buffer-load-setup-map
  ;; Loop mapping all pages that are in the stack buffer
  ;; including those beyond the current end of the stack.
  ;; Contorted way of writing it is to avoid getting too many blocks in a row
  ;; I can't see a reasonable way to share code with normal stack-buffer maintenance
  (newtop (+ top-of-stack-a (b-constant *page-size*)))
  (parallel (assign vma (- top-of-stack-a (b-constant *page-size*)))
            (call map-page-to-stack-buffer))
  (if (lesser-pointer top-of-stack %stack-buffer-limit)
      (jump sg-stack-buffer-load-setup-map)     ;should be goto, but...
      (drop-through))
  ;; Finish loading up those frames, finish popping stack-load-loop's state
  (parallel (for-effect (popval))
            (clear-stack-adjustment)
            (call adjust-frame-buffer-underflow-bits))
  ;; Now stash the argument in the stack, if wanted
  (if (greater-fixnum-unsigned (sg-arg-status %current-stack-group-status-bits)
                               %sg-arg-break)
      (assign next-on-stack a-stack-group-argument)
      (drop-through))

  ;; Set up to swap in the bindings
  (assign b-binding-boundary %binding-stack-low)
  (parallel
    (assign a-stack-group-lock (set-type (a-constant 5) dtp-fix))
    (jump continue-sg-swap-in-bindings)))
```

```
(defucode continue-sg-swap-in-bindings
  (if (greater-pointer b-binding-boundary %binding-stack-pointer)
      ;; Done whole binding stack--we're all done
      (parallel (assign a-stack-group-lock quote-nil)
                (jump popj))
      (drop-through))
  ;; Read the pointer to the bound location
  (memread (1+ b-binding-boundary))
  (parallel (transport)
            (assign b-temp memory-data))
  ;; Read the bound contents of the bound location, checking write access
  (memread-write b-binding-boundary)
  (parallel (transport bind)
            (assign a-temp-2 memory-data))
  ;; Read the current contents of the bound location
  (memread b-temp)
  (parallel (transport bind)
            (assign a-temp memory-data)
            (assign b-temp memory-data))
  ;; Write the bound contents there (preserve cdr code)
  (store-contents a-temp-2 (cdr b-temp))
  ;; Store current contents into binding stack (better not pclsr!)
  (assign vma b-binding-boundary)
  (store-contents a-temp)
  (parallel (assign b-binding-boundary (+ b-binding-boundary (a-constant 2)))
            (jump continue-sg-swap-in-bindings)))
```

F:>lmach>ucode>proto-trap.lisp.1

```
;;; -*- Mode:Lisp; Package:Micro; Base:8; Lowercase:yes -*-
;;; (c) Copyright 1982, Symbolics, Inc.

; Microcode for Trap Handling on "prototype" machine

;Get defmicro and all his hosts
#M
(declare (cond ((not (status feature lmucode))
                (load 'udcls))))

;Invisible-pointer traps
;If transporting was needed, it has happened already
;Time= 2 cycles trapping + 3 cycles here
;+ 3 more because of the temporary memory control
(defucode-at-loc inviz-trap 10012       ;trap-2 handler
  (parallel
    (trap-save)
    (assign vma a-vma-copy)                       ;get the memory-data again
    (assign b-vma a-vma-copy))
  (start-memory read)
  (nop)
  (parallel
    (assign vma memory-data)
    (if (data-type? memory-data dtp-body-forward)
        ;; Body forward points to header forward
        (sequential
          (start-memory read)
          (assign b-vma (- b-vma a-vma-copy))    ;Offset into structure
          (assign vma (+ memory-data b-vma)))    ;Address word in target structure
        (drop-through)))
  (trap-restore
    (start-memory read)
    (assign b-vma a-vma-copy)))

;Halt here if we accidentally popj with 17 in the CSP
(defucode-at-loc no-ifu-present 17774
  (parallel (halt no-ifu-present) (jump no-ifu-present)))

(defucode-at-loc error-trap 10010              ;trap-0 handler
  (parallel (trap-save)
            (lisp (enter-error-handler))
            (if (not (zero-fixnum (sg-halt-on-error %current-stack-group-status-bits)))
                (parallel (halt error-in-error-handler) (jump error-trap))
                ;; Fixup the stack first, since we need to push some stuff
                (call-and-return-to restore-stack-pointer error-trap-1))))

(defucode error-trap-no-restore-stack
  (parallel (trap-save)
            (lisp (enter-error-handler))
            (if (not (zero-fixnum (sg-halt-on-error %current-stack-group-status-bits)))
                (parallel (halt error-in-error-handler) (jump error-trap))
                ;; Fixup the stack first, since we need to push some stuff
                (goto error-trap-1))))
```

```
(defucode error-trap-1
  ;; If an error occurs, halt
  (assign (sg-halt-on-error %current-stack-group-status-bits) (b-constant 1))
  ;; Push the address of the microinstruction that signalled the error
  (assign b-temp (logand (pop-control-stack) (b-constant 37777)))
  (pushval (set-type b-temp dtp-fix))
  (pushval (set-type a-vma-copy dtp-locative))
  ;; Make the pc point such as to retry the failed instruction.  The error handler is
  ;; likely as not going to mess with our state anyway.
  ;; The stack was already restored above.
  (take-pre-trap signal-error preserve-stack))
```

F:>lmach>ucode>PREDICATE.LISP.14

```
;;; -*- Mode:Lisp; Package:Micro; Base:8; Lowercase:yes -*-
;;; (c) Copyright 1982, Symbolics, Inc.

; Microcode for primitive predicates

;Get defmicro and all his hosts
#M
(declare (cond ((not (status feature lmucode))
                (load 'udcls))))

(defucode true1
  (parallel (newtop quote-t)
            (next-instruction)))

(defucode false1
  (parallel (newtop quote-nil)
            (next-instruction)))

(definst eq (no-operand needs-stack)
  (parallel
    (if (equal-typed-pointer top-of-stack next-on-stack)
        (goto true1)
        (goto false1))
    (decrement-stack-pointer)))

(definst eql (no-operand needs-stack)
  (parallel
    (if (equal-typed-pointer top-of-stack next-on-stack)
        (goto true1)
        (goto false1))
    (decrement-stack-pointer)
    (check-data-type-and-dispatch
                        (next-on-stack dtp-float dtp-extended-number)
        ;; If the types differ, simply return nil
        ;; This has the bug that flonum NAN's pass through.
        ((flonum-fixnum extnum-fixnum extnum-flonum flonum-extnum)
         (goto false1))
        ;; If the types are the same, do appropriate comparison
        ;; Due to IEEE standard, non-eq flonums can be equal,
        ;; plus and minus zero for example
        ((flonum-flonum)
         (goto fequal))
        ((extnum-extnum)
         (jump extnum-equal)))))

(definst not no-operand
  (if (data-type? top-of-stack-a dtp-nil)
      (goto true1)
      (goto false1)))

(definst atom no-operand
  (if (data-type? top-of-stack-a dtp-list)
      (goto false1)
      (goto true1)))

;This is the Common Lisp version of LISTP, not the present one
(comment
(definst listp no-operand
  (if (data-type? top-of-stack-a dtp-list dtp-nil)
      (goto true1)
      (goto false1)))
);end comment

(definst floatp no-operand
  (if (data-type? top-of-stack-a dtp-float)
      (goto true1)
      (drop-through))
  (if (not (data-type? top-of-stack-a dtp-extended-number))
      (goto false1)
      (drop-through))
  ;--- Here see if it's an extended-precision float
  (jump false1))
```

```
(definst numberp no-operand
  (if (data-type? top-of-stack-a dtp-fix dtp-float dtp-extended-number)
      (goto true1)
      (goto false1)))

(definst symbolp no-operand
  (if (data-type? top-of-stack-a dtp-symbol dtp-nil)
      (goto true1)
      (goto false1)))

(definst arrayp no-operand
  (if (data-type? top-of-stack-a dtp-array)
      (goto true1)
      (goto false1)))
```

F:>LMach>Ucode>NET.LISP.71

```
;;; -*- Mode:Lisp; Package:Micro; Base:8; Lowercase:yes -*-
;;; (c) Copyright 1982, Symbolics, Inc.

(reserve-scratchpad-memory 2528 2531 314 324)

(associate-dispatch-cues net-micro-status *net-micro-status-codes*)
(define-enumerated-value-constants *net-micro-status-codes*)
(defatomic-byte-field net-micro-status (4 0) %net-micro-status)

(defareg %net-block-pointer)                    ;Pointer to next block
(defareg %net-memory-address)                   ;Address in this block
(defareg %net-word-count)                       ;Word count of this block

;; Packet we are receiving into or -1
(defareg %net-packet-being-received (set-type -1 dtp-fix))

;; Packet we are transmitting or -1
(defareg %net-packet-being-transmitted (set-type -1 dtp-fix))

(defareg %net-control-address)                  ;Address of the control register
(defareg net-dma-temp)

;;; A network unit is 512 bit times, but the board times 128 bit times, so that
;;; we must multiply by 4
(defareg %net-backoff-count)                    ;12us units to back off
(defareg %net-next-backoff)                     ;Mask of units to back off
                                                ;between 2^n-1 where n is
                                                ;the nth retransmission + 2

(defbreg %net-address-1)                        ;Our net address
(defbreg %net-address-2)
(defbreg net-b-temp)

(defmicro set-net-status (net-status-code)
  '(assign %net-micro-status (set-type ,net-status-code dtp-fix)))

;Wakeup the net service task
;This is called in the DMA task usually, but can also be called by the emulator
(defmicro wakeup-net-service ()
  '(parallel (assign service-task-requests
                     (logior service-task-requests
                             (b-constant (byte-mask %%service-net))))
             (wakeup-task %device-service-task)
             ))

(defmicro terminate-net-dma (net-status-code &optional (end-p t))
  '(sequential
     (set-net-status ,net-status-code)
     (net-control nil ,end-p)
     (parallel (wakeup-net-service)
               (jump net-dma-dead))))

(defmicro start-net-dma (location)
  '(write-task-state %net-dma-task
                     (a-constant '(build-task-state cpc ,location
                                                    npc (npc-successor ,location)
                                                    csp 17))))

(defmicro io-board-bug-delay ()
  '(parallel (disable-tasking)
             (declare-memory-timing (next active-cycle))))

(eval-when (compile load eval)
(defun net-buffer-address (dma-p dismiss-p end-p)
  (logior (if dma-p 1 0)
          (if dismiss-p 2 0)
          (if end-p 4 0)
          10))
);eval-when compile load eval
```

```
(defmicro read-net-buffer (&optional (dismiss-p nil) (end-p nil))
  (let ((dev-addr (net-buffer-address nil dismiss-p end-p)))
    `(parallel (extra-time-to-drive-lbus)
               (read-lbus-dev iob ,dev-addr)
               ,(if dismiss-p '(dismiss)))))

(defmicro service-read-net-buffer (&optional (dismiss-p nil) (end-p nil))
  (let ((dev-addr (net-buffer-address nil dismiss-p end-p)))
    `(parallel (extra-time-to-drive-lbus)
               (read-lbus-dev iob ,dev-addr))))

(defmicro service-net-control (&optional (dismiss-p nil) (end-p nil))
  (let ((dev-addr (net-buffer-address nil dismiss-p end-p)))
    `(parallel (write-lbus-dev iob ,dev-addr nil))))

(defmicro transmit-dma (addr &optional (dismiss-p t) (end-p nil))
  (let ((dev-addr (net-buffer-address t dismiss-p end-p)))
    `(parallel (start-memory read physical ,addr dma iob ,dev-addr)
               ,(if dismiss-p '(dismiss)))))

(defmicro receive-dma (addr &optional (dismiss-p t) (end-p nil))
  (let ((dev-addr (net-buffer-address t dismiss-p end-p)))
    `(parallel (start-memory write physical ,addr dma iob ,dev-addr)
               (assign ,addr (1+ ,addr))
               ,(if dismiss-p '(dismiss)))))

(defmicro net-control (&optional (input-p nil) (dismiss-p t) (end-p nil))
  (let ((dev-addr (net-buffer-address nil dismiss-p end-p)))
    `(parallel ,(if input-p
                    '(for-effect (read-lbus-dev iob ,dev-addr))
                    '(write-lbus-dev iob ,dev-addr nil))
               ,(if dismiss-p '(dismiss)))))

(defmicro increment (location &optional (fixnum-p t))
  (if fixnum-p
      `(assign ,location (set-type (1+ ,location) dtp-fix))
      `(assign ,location (1+ ,location))))
```

F:>lmach>ucode>nBITBLT.LISP.22

```
;;; -*- Mode:Lisp; Package:Micro; Base:8; Lowercase:yes -*-
;;; (c) Copyright 1982, Symbolics, Inc.

;;;; BITBLT microcode for 3600

;; The pclsring theory:
;;
;; Reads can be repeated with no harmful effects, writes cannot be (in most cases).
;; State is not permanently updated until a write is consummated.
;; After every write, state should be updated so that if the next memory operation
;; faults and pclsrs, that write will not be repeated (the bitblt row will be shorter).
;; To avoid the overhead of doing this for every write, we have block mode
;; operations that only update the state after writing a block of words.
;;
;; For the block mode things, we use a buffer that can be saved.  See next+1 page.
;;
;; For the short-row things, when the destination is split across two words,
;; we check write access to both words before modifying either of them.
;; No pclsring problems if the operation depends on neither operand.
;;
;; When there is a partial word at the front, do it and then advance the arguments
;; so the bitblt is word aligned in the destination.  When there is a partial word
;; at the end, when we get there the arguments have been advanced.

(reserve-scratchpad-memory 2460 2470 320 330)

(defmicro waiting-for-memory ()                         ;documentation only
  '(nop))

(defmicro abus-array-data (&body body)
  `(parallel
     (transport data)
     (check-data-type memory-data dtp-fix)
     ,@body))
```

```
(defmicro assign-vma-offset (which &rest stuff)
  (selectq which
    (S '(assign vma (+ bb-s-row-addr bb-s-offset ,@stuff)))
    (D '(assign vma (+ bb-d-row-addr bb-d-offset ,@stuff)))
    (S-ahead '(assign vma (+ bb-s-row-addr bb-s-offset-ahead ,@stuff)))
    (otherwise
     (ferror "assign-vma-offset knows about only S and D, not ~S" which))))

(defmicro parallel-with-s-access (offset &body body)
  (make-memory-access 'bb-s-row-addr 'bb-s-offset offset body '(read)))

(defmicro parallel-with-d-access (offset &body body)
  (make-memory-access 'bb-d-row-addr 'bb-d-offset offset body '(read)))

(defmicro parallel-with-d-access-check-write (offset &body body)
  (make-memory-access 'bb-d-row-addr 'bb-d-offset offset body '(read write)))

(eval-when (eval compile load)
(defun make-memory-access (baseaddr offset-sym offset body memory-modes)
  (or (eq offset offset-sym)
      (equal offset '(1+ ,offset-sym))
      (and (eq offset-sym 'bb-s-offset) (eq offset 'bb-s-offset-ahead))
      (ferror "~S is not a recognized offset for ~S" offset offset-sym))
  (let* ((body (reverse body))
         (finally '(abus-array-data ,(car body))))
    (do ((ll (reverse
              '((assign vma ,(if (atom offset)
                                 '(+ ,baseaddr ,offset)
                                 '(+ ,baseaddr ,(second offset) 1)))
                (start-memory ,@memory-modes)
                (waiting-for-memory)))
           (cdr ll))
         (body (cdr body) (cdr body))
         (l))
        ((and (null ll) (null body))
         '(sequential ,@l ,finally))
      (cond ((null ll) (push (car body) l))
            ((null body) (push (car ll) l))
            (T (push '(parallel ,(car ll) ,(car body)) l))))))
);eval-when

(defmicro 31- (operand)
  '(- (b-constant 31.) ,operand))

(defmicro incr-d-offset ()
  '(assign bb-d-offset (1+ bb-d-offset)))

(defmicro decr-d-offset ()
  '(assign bb-d-offset (1- bb-d-offset)))

(defmicro incr-wrap-s-offset ()
  '(sequential
     (parallel
       (assign bb-s-offset (1+ bb-s-offset))
       (assign b-temp-3 obus))
     (if (greater-or-equal-fixnum b-temp-3 bb-s-row-length)
         (parallel
           (lisp (format T "~&>>>Wrapping around on bb-s-offset from ~d."
                         (low32 (tr 'bb-s-offset))))
           (assign bb-s-offset (b-constant 0)))
         (drop-through))))

(defmicro decr-wrap-s-offset ()
  '(parallel
     (assign bb-s-offset (1- bb-s-offset))
     (if (minus-fixnum obus)
         (parallel
           (lisp (format t "~&>>>Decr wrapping around on bb-s-offset"))
           (assign bb-s-offset (1- bb-s-row-length)))
         (drop-through))))

(defmicro incr-wrap-s-offset-ahead ()
  '(sequential
     (parallel
       (assign bb-s-offset-ahead (1+ bb-s-offset))
       (assign b-temp-3 obus))
     (if (greater-or-equal-fixnum b-temp-3 bb-s-row-length)
         (parallel
           (lisp (format T "~&>>>Wrapping around on bb-s-offset from ~d."
                         (low32 (tr 'bb-s-offset-ahead))))
           (assign bb-s-offset-ahead (b-constant 0)))
         (drop-through))))

(defmicro decr-wrap-s-offset-ahead ()
  '(parallel
     (assign bb-s-offset-ahead (1- bb-s-offset))
     (if (minus-fixnum obus)
         (parallel
           (lisp (format t "~&>>>Decr wrapping around on bb-s-offset"))
           (assign bb-s-offset-ahead (1- bb-s-row-length)))
         (drop-through))))
```

```
(defmicro store-word (datum &rest options)
  '(store-contents (set-type ,datum dtp-fix) not-pointer . ,options))

;;---the goddamn simulator compiles
;;     (parallel (assign ...) (return))
;;into
;;     (prog ... (return nil) (setq ...))
(defmicro parallel-with-return (&body stm)
  '(,(if (eq *machine-version* 'sim) 'sequential 'parallel)
    ,@stm
    (return)))

(defmicro via-xbus (source)
  (make-microdata 'xbus (get-to-xbus source)))

(defvar *fp-offset-names* ())

(defmacro def-fp-offsets (&rest names)
  (loop for i upfrom 0
        for name in names
        append '((defatomicro ,name (amem (frame-pointer ,i)))
                 (defprop ,name ,i fp-offset)
                 (or (memq ',name *fp-offset-names*)
                     (push ',name *fp-offset-names*)))
          into foo
        finally (return '(progn 'compile ,@foo))))

;;decode fp offset numbers into symbols.  Debugging only.
(defun dfp (&rest numbers)
  (loop for number in numbers
        collect (loop for name in *fp-offset-names*
                      when (equal (get name 'fp-offset) number)
                      return name
                      finally (return number))))

;; Define arguments/state for BITBLT instructions.  Note that these must be
;; relative to FP, not to the top of the stack, since there might be a
;; saved bitblt-buffer on the stack if the instruction was interrupted.
(def-fp-offsets
  bb-arg-alu bb-arg-width bb-arg-height             ;lisp arg
  bb-arg-from-array bb-arg-from-x bb-arg-from-y     ;lisp arg
  bb-arg-to-array bb-arg-to-x bb-arg-to-y           ;lisp arg
  bb-width                                          ;ucode arg
  bb-s-data-addr                                    ;ucode arg
  bb-s-row-offset                                   ;ucode arg
  bb-s-offset                                       ;ucode arg
  bb-s-bitpos                                       ;ucode arg
  bb-s-row-length                                   ;ucode arg
  bb-d-data-addr                                    ;ucode arg
  bb-d-offset                                       ;ucode arg
  bb-d-bitpos                                       ;ucode arg
  bb-event-count                                    ;ucode arg
  bb-alu-operation                                  ;ucode arg
  )

;;; Some temporaries.

(define-b-temps bb-constant                         ;Value to store or to XOR in
                bb-s-word                           ;temp (source word)
                bb-s-row-addr                       ;start of current source row
                bb-d-row-addr                       ;start of current destination row
                bb-width-b                          ;copy of width on B side (sometimes)
                b-block-size)                       ;number of words in block

(defareg bb-constant-a)                             ;A-side copy of bb-constant
(defareg bb-identity)                               ;Background to dpb into when doing part word
(defareg bb-s-word2)                                ;temp (other source word)
(defareg bb-a-temp)
(defareg bb-s-offset-ahead)                         ;s-offset not finalized yet (if pclsr)
(defareg a-block-size)                              ;number of words in block


;;; Bitblt-buffer hair

(eval-when (compile load eval)
(defconst n-bitblt-buffers 8))

#.'(progn 'compile                                  ;B-memory buffer for block-mode operations
     . ,(loop for i from 0 below n-bitblt-buffers
              collect '(defbreg ,(fintern "BITBLT-BUFFER-~D" i))))

(defmicro bitblt-buffer (i)
  (fintern "BITBLT-BUFFER-~D" i))

;--- this defareg goes in some other file ---
;If this register is non-zero and we pclsr, save-bitblt-buffer must be
;called after restoring the stack pointer.
(defareg bitblt-buffer-active 0)
```

```
;We first compute the result n words at a time into the bitblt-buffer,
;and then store it into the destination (in one case the whole buffer
;is rotated by 1 to 31 bits as it is being stored).
;The bitblt-buffer is "active" while we are storing it into the destination.
;The bitblt buffer must be active while we are modifying the destination,
;since the words copied into the buffer might overlapped with parts of
;the destination we have already modified.
;
;A pclsr while the bitblt-buffer is active will copy it into
;the stack, set first-part-done, and clear bitblt-buffer-active.
;A restart with first-part-done set will proceed normally until it comes time
;to store the bitblt-buffer.  At that time, first-part-done is seen, the
;bitblt-buffer is restored from the stack (replacing the possibly-erroneous
;contents that were just computed), and execution then proceeds normally.
;
;The contents of the bitblt-buffer are assumed to have valid data type tags.
;For now, they could be forced to fixnum, but in the future we may have
;other instructions using this buffer and its save/restore mechanism.
;--- Still need to fix microcompiler to default cdr source from Bbus correctly ---

;Call here if we pclsr with the bitblt-buffer active
(defucode save-bitblt-buffer
  #.'(sequential .
       ,(loop for i from 0 below n-bitblt-buffers
              collect '(pushval-with-cdr (bitblt-buffer ,i))))
  (assign first-part-done (b-constant 1))
  (parallel
    (assign bitblt-buffer-active (b-constant 0))
    (return)))

;Call here when about to start storing the bitblt-buffer
;This is actually a micro so that the first instruction of the routine
;gets open-coded into the caller
;This is hairily bummed to make the normal case go in only one cycle
;(if the trap is not taken then the obus has -1 on it)
(defmicro activate-bitblt-buffer ()
  '(parallel
     (assign bitblt-buffer-active obus)
     (trap-if (bit-test frame-misc-data (b-constant (byte-mask first-part-done)))
              activate-saved-bitblt-buffer)))

;We also need this closed-subroutine version
(defucode activate-bitblt-buffer
  (parallel
    (activate-bitblt-buffer)
    (return)))

(defucode activate-saved-bitblt-buffer
  (parallel
    (trap-save)                                  ;Retry the assign,trap-if upon return
    #.'(sequential
         ,@(loop for i from (1- n-bitblt-buffers) downto 0
                 collect '(parallel
                            (assign (bitblt-buffer ,i) top-of-stack-a)
                            (decrement-stack-pointer)))))
  (parallel
    (assign first-part-done (b-constant 0))
    (return)))

;Call here when done storing the bitblt-buffer
(defucode deactivate-bitblt-buffer
  (parallel
    (assign bitblt-buffer-active (b-constant 0))
    (assign top-of-stack top-of-stack-a)        ;Could have been bashed by activate...
    (return)))

(defmicro read-bb-s-word ()
  '(parallel
     (assign a-temp (+ bb-width-b bb-s-bitpos))
     (call read-bb-s-word1)))

;a-temp has the number of s bits needed relative to bit 0 of the first word
(defucode read-bb-s-word1
  (assign-vma-offset s)
  (parallel
    (assign byte-r (32- bb-s-bitpos))
    (start-memory read))
  (parallel
    (waiting-for-memory)
    (if (lesser-or-equal-fixnum a-temp (b-constant 32.))
        ;;source is entirely within one word
        (parallel-with-return
          (abus-array-data
            (assign bb-s-word (logxor bb-constant (rotate memory-data byte-r)))))
        ;;source is split across two words
        (sequential
          (abus-array-data
            (assign bb-s-word (rotate memory-data byte-r)))
          (incr-wrap-s-offset-ahead)
          (assign-vma-offset s-ahead)
```

```
    (parallel
      (start-memory read)                   ;byte-r is already ok
      )
    (parallel
      (waiting-for-memory)
      (assign byte-s (1- a-temp)))
    (abus-array-data
      (assign bb-s-word (dpb memory-data byte-s byte-r bb-s-word)))
    (parallel-with-return
      (assign bb-s-word (logxor bb-s-word bb-constant-a))))))

;;Assumptions about setup:
;;bb-constant has:
;;  >> for constant operations (0,-1): the constant;
;;  >> for operations dependent only on source or destination (x, ~x, y, ~y):
;;     a 0 for x,y or -1 for ~x,~y;
;;  >> for operations dependent on both s and d: 0  for those using source directly,
;;     and -1 for those that want the source complemented.

(defucode bb-copy-stuff-to-b-side
  (assign bb-s-row-addr (+ bb-s-data-addr b-temp))
  (parallel-with-return
    (assign bb-d-row-addr bb-d-data-addr)))

(defmacro definst-bitblt (name source destination neither both)
  '(definst ,name no-operand
     (parallel (assign b-temp bb-s-row-offset)
               (call bb-copy-stuff-to-b-side))
     (dispatch-after-this (parallel (ldb bb-alu-operation 4 0)
                               ;; Set up constant needed for the most common case
                               (assign bb-constant (via-xbus (b-constant 0)))
                               (assign bb-constant-a (via-xbus (b-constant 0))))
                            (assign bb-width-b bb-width)
       ((0)                     ;0
        (goto ,neither))
       ((1)                     ;x*y
        (parallel (assign bb-identity (a-constant -1))
                  (jump ,both)))
       ((2)                     ;~x*y
        (assign bb-identity (a-constant -1))
        (parallel (assign bb-constant (a-constant -1)) (assign bb-constant-a (a-constant -1))
                  (jump ,both)))
       ((3) (return))           ;y
       ((4)                     ;x*~y
        (parallel (assign bb-identity (a-constant -1))
                  (jump ,both)))
       ((5) (goto ,source))     ;x
       ((6)                     ;x xor y
        (parallel (assign bb-identity (a-constant 0))
                  (jump ,both)))
       ((7)                     ;x+y
        (parallel (assign bb-identity (a-constant 0))
                  (jump ,both)))
       ((8.)                    ;~x*~y
        (assign bb-identity (a-constant -1))
        (parallel (assign bb-constant (a-constant -1)) (assign bb-constant-a (a-constant -1))
                  (jump ,both)))
       ((9.)                    ;~x xor y
        (assign bb-identity (a-constant 0))
        (parallel (assign bb-constant (a-constant -1)) (assign bb-constant-a (a-constant -1))
                  (jump ,both)))
       ((10.)              ;~x
        (parallel (assign bb-constant (a-constant -1)) (assign bb-constant-a (a-constant -1))
                  (jump ,source)))
       ((11.)              ;~x+y
        (assign bb-identity (a-constant 0))
        (parallel (assign bb-constant (a-constant -1)) (assign bb-constant-a (a-constant -1))
                  (jump ,both)))
       ((12.)              ;~y
        (parallel (assign bb-constant (a-constant -1)) (assign bb-constant-a (a-constant -1))
                  (jump ,destination)))
       ((13.)              ;x+~y actually, ~(~x*y)
        (assign bb-identity (a-constant -1))
        (parallel (assign bb-constant (a-constant -1)) (assign bb-constant-a (a-constant -1))
                  (jump ,both)))
       ((14.)              ;~x+~y actually, ~(x*y)
        (parallel (assign bb-identity (a-constant -1))
                  (jump ,both)))
       ((15.)              ;-1
        (parallel (assign bb-constant (a-constant -1)) (assign bb-constant-a (a-constant -1))
                  (jump ,neither))))))

(definst-bitblt %bitblt-short-row
  ubitblt-short-row-source
  ubitblt-short-row-destination
  ubitblt-short-row-neither
  ubitblt-short-row-both)
```

```
(definst-bitblt %bitblt-long-row
  ubitblt-long-row-source
  ubitblt-long-row-destination
  ubitblt-long-row-neither
  ubitblt-long-row-both)

(definst-bitblt %bitblt-long-row-backwards
  ubitblt-long-row-source-backwards
  ubitblt-long-row-destination
  ubitblt-long-row-neither                        ;direction immaterial
  ubitblt-long-row-both-backwards)

(defucode ubitblt-short-row-source
  (read-bb-s-word)
  (assign a-temp (+ bb-width-b bb-d-bitpos))
  (parallel
    (assign byte-s (- a-temp (b-constant 32.) 1))
    (if (lesser-or-equal-fixnum-unsigned a-temp (b-constant 32.))
        ;; destination is entirely within one word
        (parallel-with-d-access bb-d-offset
          (assign byte-s (1- bb-width))
          (assign byte-r bb-d-bitpos)
          (parallel-with-return
            (store-word (dpb bb-s-word byte-s byte-r memory-data))))
        ;; destination is split across two words
        ;; must access-check them both before modifying either
        (sequential
          ;; compute the high byte
          (parallel-with-d-access-check-write (1+ bb-d-offset)
            (assign byte-r bb-d-bitpos)
            (assign a-temp (ldb bb-s-word byte-s byte-r memory-data)))
          ;; compute and store the low byte
          (parallel-with-d-access bb-d-offset
            (assign byte-s (31- bb-d-bitpos))
            (store-word (dpb bb-s-word byte-s byte-r memory-data) block))
          ;; now store the high byte.  This cannot fault
          (parallel-with-return
            (store-word a-temp block))))))

(defucode ubitblt-short-row-destination
  (assign a-temp (+ bb-width-b bb-d-bitpos))
  (parallel
    (assign byte-s (- a-temp (b-constant 32.) 1))
    (if (lesser-or-equal-fixnum-unsigned a-temp (b-constant 32.))
        ;; destination is entirely within one word
        (parallel-with-d-access bb-d-offset
          (assign byte-s (1- bb-width))
          (assign byte-r bb-d-bitpos)
          (parallel-with-return
            (store-word (logxor (dpb bb-constant byte-s byte-r 0) memory-data))))
        ;; destination is split across two words
        ;; must access-check them both before modifying either
        (sequential
          ;; compute the high byte
          (parallel-with-d-access-check-write (1+ bb-d-offset)
            (assign byte-r (a-constant 0))
            (assign a-temp (logxor (ldb bb-constant byte-s byte-r) memory-data)))
          ;; compute and store the low byte
          (parallel-with-d-access bb-d-offset
            (assign byte-s (31- bb-d-bitpos))
            (assign byte-r bb-d-bitpos)
            (store-word (logxor (dpb bb-constant byte-s byte-r 0) memory-data) block))
          ;; now store the high byte.  This cannot fault
          (parallel-with-return
            (store-word a-temp block))))))


;; The alu operation is actually a constant
(defucode ubitblt-short-row-neither
  (assign a-temp (+ bb-width-b bb-d-bitpos))
  (if (lesser-or-equal-fixnum a-temp (b-constant 32.))
      ;; destination is entirely within one word
      (parallel-with-d-access bb-d-offset
        (assign byte-s (1- bb-width))
        (assign byte-r bb-d-bitpos)
        (parallel-with-return
          (store-word (dpb bb-constant byte-s byte-r memory-data))))
      ;; destination is split across two words, but no pclsr problems since doing
      ;; the operation twice produces the same effect
      (sequential
        ;; store the low byte
        (parallel-with-d-access bb-d-offset
          (assign byte-s (31- bb-d-bitpos))
          (assign byte-r bb-d-bitpos)
          (store-word (dpb bb-constant byte-s byte-r memory-data)))
        ;; store the high byte
        (parallel-with-d-access (1+ bb-d-offset)
          (assign byte-s (1- a-temp))
          (assign byte-r (a-constant 0))
          (parallel-with-return
            (store-word (dpb bb-constant byte-s byte-r memory-data)))))))
```

```
;; The alu operation depends upon both source and destination bits
(defucode ubitblt-short-row-both
  (read-bb-s-word)
  (assign a-temp (+ bb-width-b bb-d-bitpos))
  (if (lesser-or-equal-fixnum a-temp (b-constant 32.))
      ;; destination is entirely within one word
      (sequential
        (assign byte-s (1- bb-width))
        (assign byte-r bb-d-bitpos)
        (parallel
          (assign-vma-offset d)
          (jump bb-byte-alu-operation-dispatch)))        ;jcall
      ;; destination is split across two words
      (sequential
        ;; make sure we have write access to the high byte so no pclsr after storing low
        (assign-vma-offset d 1)
        (start-memory read write)
        ;; store the low byte
        (assign byte-s (31- bb-d-bitpos))
        (assign byte-r bb-d-bitpos)
        (parallel
          (assign-vma-offset d)
          (call bb-byte-alu-operation-dispatch))
        ;; store the high byte
        (assign bb-s-word (rotate bb-s-word byte-r))
        (assign byte-s (1- a-temp))
        (assign byte-r (b-constant 0))
        (parallel
          (assign-vma-offset d 1)
          (jump bb-byte-alu-operation-dispatch)))))     ;jcall

;(boole fn x y ...)   if fn is "abcd" then
;         y      0         1          2       3       4       5       6        7
;       | 0  1   0         x*y        ~x*y    y       x*~y    x       x#y      x+y
;   ----------
;     0 | a  c   8         9          10      11      12      13      14       15
;   x   |        ~(x+y)    ~(x#y)     ~x      ~x+y    ~y      x+~y    ~x+~y    -1
;     1 | b  d

;;vma and byte regs have been set up already, for DPB.
;;trashes a-temp-2, b-temp-2, b-temp-3, but not a-temp and b-temp.
(defucode bb-byte-alu-operation-dispatch
  (dispatch-after-this (parallel (start-memory read) (ldb bb-alu-operation 4 0))
                       (parallel
                         (assign b-temp-3 (dpb bb-s-word byte-s byte-r bb-identity))
                         (waiting-for-memory))
     ((1 2) ;;1 x*y logand ;;2 ~x*y     logand
      (parallel-with-return
        (parallel
          (declare-memory-timing data-cycle)
          (abus-array-data
            (store-word (logand memory-data b-temp-3))))))
     ((4 8.) ;;4 ~(~x+y) = x*~y andc2     ;;8 ~(x+y)     = ~x*~y andcb
      (parallel
        (declare-memory-timing data-cycle)
        (abus-array-data
          (assign a-temp-2 memory-data)))
      (assign b-temp-2 (dpb (b-constant -1) byte-s byte-r 0))   ;can't merge this...
      (assign a-temp-2 (logxor a-temp-2 b-temp-2))              ;...with this.
      (parallel-with-return
        (store-word (logand a-temp-2 b-temp-3))))
     ((6 9.) ;;6 x#y logxor  ;;9 ~(x#y)=~x#y logxor
      (parallel-with-return
        (parallel
          (declare-memory-timing data-cycle)
          (abus-array-data
            (store-word (logxor b-temp-3 memory-data))))))
     ((7 11.) ;;7 x+y logior        ;;11 ~x+y logior
      (parallel-with-return
        (parallel
          (declare-memory-timing data-cycle)
          (abus-array-data
            (store-word (logior b-temp-3 memory-data))))))
     ((13. 14.) ;;13 x+~y = ~(~x*y) logand        ;;14 ~x+~y=~(x*y)
      (parallel
        (declare-memory-timing data-cycle)
        (abus-array-data
          (assign a-temp-2 (logand b-temp-3 memory-data))))
      (parallel-with-return
        (store-word (logxor (dpb (b-constant -1) byte-s byte-r 0) a-temp-2))))))


;;vma has been set up already
(defucode bb-word-alu-operation-dispatch        ;commonly 3 cycles (plus 1 for the call)
  (dispatch-after-this (parallel (start-memory read) (ldb bb-alu-operation 4 0))
                       (waiting-for-memory)     ;---want to use this somehow...
     ((1 2)      ;;1 x*y logand           ;;2 ~x*y  logand
      (parallel
        (declare-memory-timing data-cycle)
        (abus-array-data (store-word (logand bb-s-word memory-data)))
        (return)))
```

```
      ((4 8.)      ;;4 x*~y andcb              ;;8 ~(x+y) ~x*~y andcb
       (parallel
         (declare-memory-timing data-cycle)
         (abus-array-data (store-word (andc2 bb-s-word memory-data)))
         (return)))
      ((6 9.)      ;;6 x#y logxor              ;;9 ~(x#y)=~x#y logxor
       (parallel
         (declare-memory-timing data-cycle)
         (abus-array-data (store-word (logxor bb-s-word memory-data)))
         (return)))
      ((7 11.)     ;;7 x+y logior              ;;11 ~x+y logior
       (parallel
         (declare-memory-timing data-cycle)
         (abus-array-data (store-word (logior bb-s-word memory-data)))
         (return)))
      ((13. 14.)   ;;13 x+~y = ~(~x*y)         ;;14 ~x+~y=~(x*y)
       (parallel
         (declare-memory-timing data-cycle)
         (abus-array-data (store-word (lognand bb-s-word memory-data)))
         (return)))))

;;alu depends only on source bits
(defucode ubitblt-long-row-source
  (parallel
    (assign b-temp bb-d-bitpos)
    (if (zero-fixnum bb-d-bitpos)
        (if (zero-fixnum bb-s-bitpos)
            (goto ubitblt-aligned-row-source)
            ;;              SSSSSSSSSSSSSSSSSSSSSSSSSsssssss
            ;;       ddddddddddddddddddddddddddddddddd
            (parallel-with-s-access bb-s-offset
              (assign byte-r (32- bb-s-bitpos))
              (parallel
                (assign bb-s-word2 (logxor bb-constant (rotate memory-data byte-r)))
                (lisp (trace-path #/c))
                (jump ubitblt-d-aligned-row-source))))
        (if (equal-fixnum b-temp bb-s-bitpos)
            ;;SSSSSSSSSSSSSSSSSSSSSSSSSsssssss
            ;;DDDDDDDDDDDDDDDDDDDDDDDDDddddddd
            (sequential
              (parallel-with-s-access bb-s-offset
                (assign b-temp (32- bb-d-bitpos))
                (assign byte-r b-temp)
                (assign bb-s-word (logxor bb-constant (rotate memory-data byte-r))))
              (parallel-with-d-access bb-d-offset
                (assign byte-r bb-d-bitpos)
                (assign byte-s (1- b-temp))
                (store-word (dpb bb-s-word byte-s byte-r memory-data)))
             ;; First partial word done, we are now the aligned case
              (incr-wrap-s-offset)
              (incr-d-offset)
              (assign bb-width (- bb-width b-temp))
              (assign bb-s-bitpos (b-constant 0))
              (parallel
                (assign bb-d-bitpos (b-constant 0))
                (lisp (trace-path #/b))
                (jump ubitblt-aligned-row-source)))
            (if (lesser-fixnum bb-s-bitpos b-temp)
                ;;sssssssssSSSSSSSSSSSSSSSS.......
                ;;         DDDDDDDDDDDDDDDDdddddddddddddddd
                ;;         ← 32-d.bitpos →
                (sequential
                  (parallel-with-s-access bb-s-offset
                    (assign byte-r (32- bb-s-bitpos))
                    (assign b-temp (32- bb-d-bitpos))
                    (assign bb-s-word (logxor bb-constant (rotate memory-data byte-r))))
                  ;;.......sssssssssSSSSSSSSSSSSSSSS
                  (parallel-with-d-access bb-d-offset
                    (assign byte-r bb-d-bitpos)
                    (assign byte-s (1- b-temp))
                    (store-word (dpb bb-s-word byte-s byte-r memory-data)))
                  ;; First partial D word done, some S bits from first word remain
                  (incr-d-offset)
                  ;;rotate s-word further to right by 32-d.bitpos = left by -(32-d.bitpos)
                  ;;SSSSSSSSSSSSSSSS.......sssssssss
                  (assign bb-s-word2 (rotate bb-s-word byte-r))
                  (assign bb-s-bitpos (+ bb-s-bitpos b-temp))
                  (assign bb-width (- bb-width b-temp))
                  (parallel
                    (assign bb-d-bitpos (b-constant 0)))
                    (lisp (trace-path #/d))
                    (jump ubitblt-d-aligned-row-source))
                (sequential
;;The high part of the first source word is not as long as the high part of the
;;first destination word.  So extract the useful part of the first source word,
;;and deposit into it as much of the second source word as needed to fill out the rest
;;of the first destination word. Then position the rest of the second source word
;;appropriately for the inner loop.
```

```
;;                                       <-- 32-s -->
;;        ..................................|SSSSSSSSSSssssssssssssssssssssss
;;                          DDDDDDDDDDDDDDDD DDDDDDDDDDdddddd
(parallel-with-s-access bb-s-offset
  (assign byte-r (32- bb-s-bitpos))
  (assign b-temp-2 bb-s-bitpos)
  (assign bb-s-word (logxor bb-constant (rotate memory-data byte-r))))
(incr-wrap-s-offset-ahead)
;;                          <----- s-d -----> <-- 32-s -->    (32-d)-(32-s)=s-d
;;       sssssssssssssssSSSSSSSSSSSSSSSS|1111111111......................
;;                          DDDDDDDDDDDDDDDD DDDDDDDDDDdddddd
(parallel-with-s-access bb-s-offset-ahead
  (assign byte-r (32- bb-s-bitpos))
  (assign byte-s (- b-temp-2 bb-d-bitpos 1))
  (assign bb-s-word2 (logxor bb-constant memory-data)))
(assign bb-s-word (dpb bb-s-word2 byte-s byte-r bb-s-word))
(parallel
  (assign a-temp (32- bb-d-bitpos))
  (assign b-temp obus))
(parallel-with-d-access bb-d-offset
  (assign byte-r bb-d-bitpos)
  (assign byte-s (1- a-temp))
  (store-word (dpb bb-s-word byte-s byte-r memory-data)))
;; We have now done the first partial D word.  Turn into the d-aligned
;; case, with the source advanced by one word from where it started.
(incr-d-offset)
(assign bb-s-offset bb-s-offset-ahead)
(assign bb-s-bitpos (- b-temp-2 bb-d-bitpos))
(assign byte-r (32- bb-s-bitpos))
(assign bb-s-word2 (rotate bb-s-word2 byte-r))
(assign bb-width (- bb-width b-temp))
(parallel
  (assign bb-d-bitpos (b-constant 0))
  (lisp (trace-path #/e))
  (jump ubitblt-d-aligned-row-source)))))))

(defucode ubitblt-aligned-row-source          ;28 cycles per 8 words
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-fixnum bb-s-row-length b-temp)
            (goto ubitblt-aligned-row-source-slow-loop)
            (sequential
              (parallel
                (assign-vma-offset s)
                (call ubitblt-block-read-8))
              (parallel
                (assign-vma-offset d)
                (call ubitblt-block-write-8))
              (parallel
                (assign bb-s-offset (+ bb-s-offset b-block-size))
                (jump ubitblt-aligned-row-source)))))
      ;;Frob with what's left.  Too bad dispatch blocks are expensive.
      (if (greater-or-equal-fixnum bb-width (b-constant (* 4 32.)))
          (sequential
            (assign b-temp (+ bb-s-offset (b-constant 4)))
            (if (lesser-fixnum bb-s-row-length b-temp)
                (goto ubitblt-aligned-row-source-slow-loop)
                (sequential
                  (parallel
                    (assign-vma-offset s)
                    (call ubitblt-block-read-4))
                  (parallel
                    (assign-vma-offset d)
                    (call ubitblt-block-write-4))
                  (parallel
                    (assign bb-s-offset (+ bb-s-offset b-block-size))
                    (jump ubitblt-aligned-row-source-slow-loop)))))
          (goto ubitblt-aligned-row-source-slow-loop))))

(defucode ubitblt-aligned-row-source-slow-loop              ;18 cycles per word
  (parallel-with-s-access bb-s-offset                        ;4
    (trap-if (lesser-fixnum bb-width (b-constant 32.))
             ubitblt-aligned-row-source-slow-loop-done)
    (waiting-for-memory)
    (assign bb-s-word (logxor bb-constant memory-data)))
  (assign-vma-offset d)                                      ;1
  (store-word bb-s-word)                                     ;1
  (assign bb-width (- bb-width (b-constant 32.)))            ;1
  (incr-wrap-s-offset)                                       ;2
  (parallel                                                  ;1
    (incr-d-offset)
    (lisp (trace-path #/,))
    (jump ubitblt-aligned-row-source-slow-loop)))

;Do last partial word, if any
(defucode ubitblt-aligned-row-source-slow-loop-done
  (if (plus-fixnum bb-width)
      (sequential
```

```
    (parallel-with-s-access bb-s-offset
      (assign bb-s-word (logxor bb-constant memory-data)))
    (parallel-with-d-access bb-d-offset
      (assign byte-r (a-constant 8))
      (assign byte-s (1- bb-width))
      (parallel-with-return
        (store-word (dpb bb-s-word byte-s byte-r memory-data))
        (lisp (trace-path #/2)))))
  (parallel-with-return
    (lisp (trace-path #/1)))))

;bb-s-word2 has the partial previous source word whose address is in bb-s-offset,
;rotated into alignment with the destination
(defucode ubitblt-d-aligned-row-source
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-or-equal-fixnum bb-s-row-length b-temp)
            (goto ubitblt-d-aligned-row-source-slow-loop)
            (sequential
              (parallel
                (assign-vma-offset s 1)
                (call ubitblt-block-read-8))
              (parallel
                (assign-vma-offset d)
                (call ubitblt-d-aligned-block-write-8))
              (parallel
                (assign bb-s-offset (+ bb-s-offset b-block-size))
                (jump ubitblt-d-aligned-row-source)))))
      (if (greater-or-equal-fixnum bb-width (b-constant (* 4. 32.)))
          (sequential
            (assign b-temp (+ bb-s-offset (b-constant 4)))
            (if (lesser-or-equal-fixnum bb-s-row-length b-temp)
                (goto ubitblt-d-aligned-row-source-slow-loop)
                (sequential
                  (parallel
                    (assign-vma-offset s 1)
                    (call ubitblt-block-read-4))
                  (parallel
                    (assign-vma-offset d)
                    (call ubitblt-d-aligned-block-write-4))
                  (parallel
                    (assign bb-s-offset (+ bb-s-offset b-block-size))
                    (jump ubitblt-d-aligned-row-source)))))
          (goto ubitblt-d-aligned-row-source-slow-loop))))

;;Each pass through this loop stores exactly one d word.  Each time through,
;;bb-s-word2 will have the bits to use for the lower part of the d word (already
;;rotated into position), and another s word will be fetched into bb-s-word.
;;Then s-word will get rotated when transferred into s-word2 in preparation for
;;next loop pass.

(defucode ubitblt-d-aligned-row-source-slow-loop        ;13 cycles per word
  (incr-wrap-s-offset-ahead)                             ;2
  (parallel-with-s-access bb-s-offset-ahead              ;4
    (trap-if (lesser-fixnum bb-width (b-constant 32.))
             ubitblt-d-aligned-row-source-done)
    (assign byte-s (1- bb-s-bitpos))
    (assign bb-s-word (logxor bb-constant memory-data)))
  (assign byte-r (- (b-constant 32.) bb-s-bitpos))      ;1
  (assign-vma-offset d)                                  ;1
  (store-word (dpb bb-s-word byte-s byte-r bb-s-word2)) ;1
  (assign bb-width (- bb-width (b-constant 32.)))       ;1
  (incr-d-offset)                                        ;1
  (assign bb-s-offset bb-s-offset-ahead)                 ;1
  (parallel                                              ;1
    (assign bb-s-word2 (rotate bb-s-word byte-r))
    (lisp (trace-path #/.))
    (jump ubitblt-d-aligned-row-source)))

(defucode ubitblt-d-aligned-row-source-done
  (if (plus-fixnum bb-width)
      (sequential
        (assign b-temp (32- bb-s-bitpos))       ;how many bits are valid in bb-s-word2
        (if (lesser-or-equal-fixnum bb-width b-temp)
            ;;we have enough s bits
            (parallel-with-d-access bb-d-offset
              (assign byte-s (1- bb-width))
              (parallel
                (assign byte-r (b-constant 8))
                (assign bb-s-word bb-s-word2))
              (parallel
                (lisp (trace-path #/4))
                (parallel-with-return
                  (store-word (dpb bb-s-word byte-s byte-r memory-data)))))
            ;;need to get another source word
            (sequential
```

```
            (parallel-with-s-access bb-s-offset-ahead
              (assign byte-r (32- bb-s-bitpos))
              (assign byte-s (1- bb-s-bitpos))
              (assign bb-s-word (logxor bb-constant memory-data)))
            (assign bb-s-word (dpb bb-s-word byte-s byte-r bb-s-word2))
            (lisp (trace-path #/5))
            (parallel-with-d-access bb-d-offset
              (assign byte-s (1- bb-width))
              (assign byte-r (a-constant 0))
              (parallel-with-return
                (store-word (dpb bb-s-word byte-s byte-r memory-data))))))
      (parallel
        (lisp (trace-path #/3))
        (return))))

;;alu depends only on destination bits
(defucode ubitblt-long-row-destination
  (if (plus-fixnum bb-d-bitpos)
      (sequential                                      ;frob the first partial word
        (assign b-temp (32- bb-d-bitpos))
        (parallel-with-d-access bb-d-offset
          (assign byte-s (1- b-temp))
          (assign byte-r bb-d-bitpos)
          (store-word (logxor (dpb bb-constant byte-s byte-r 0) memory-data)))
        (incr-d-offset)
        (assign bb-width (- bb-width b-temp))
        (parallel
          (assign bb-d-bitpos (b-constant 0))
          (lisp (trace-path #/b))
          (jump ubitblt-long-row-destination-loop)))
      (machine-version-case
        ((sim) (parallel
                 (lisp (trace-path #/a))
                 (jump ubitblt-long-row-destination-loop)))
        (otherwise (goto ubitblt-long-row-destination-loop)))))

(defucode ubitblt-long-row-destination-loop             ;25 cycles per 8 words
  (if (greater-or-equal-fixnum bb-width (b-constant (* 8. 32.)))
      ;;Fetch a block of words into the buffer
      (sequential
        (parallel
          (assign-vma-offset d)
          (call ubitblt-block-read-8))
        (parallel
          (assign-vma-offset d)
          (call-and-return-to ubitblt-block-write-8
                              ubitblt-long-row-destination-loop)))
      ;;Frob with what's left.  Too bad dispatch blocks are expensive.
      (if (greater-or-equal-fixnum bb-width (b-constant (* 4 32.)))
          (sequential
            (parallel
              (assign-vma-offset d)
              (call ubitblt-block-read-4))
            (parallel
              (assign-vma-offset d)
              (call-and-return-to ubitblt-block-write-4
                                  ubitblt-long-row-destination-slow-loop)))
          (goto ubitblt-long-row-destination-slow-loop))))

(defucode ubitblt-long-row-destination-slow-loop       ;5 cycles per word (bus interference)
  (parallel-with-d-access-check-write bb-d-offset
    (parallel
      (assign bb-width (- bb-width (b-constant 32.)))
      (trap-if (minus-fixnum obus) ubitblt-long-row-destination-done))  ;aborts the assign
    (parallel
      (lisp (trace-path #/,))
      (waiting-for-memory)
      (incr-d-offset))
    (parallel
      (store-word (logxor bb-constant memory-data))
      (jump ubitblt-long-row-destination-slow-loop))))

(defucode ubitblt-long-row-destination-done
  (if (plus-fixnum bb-width)
      (parallel-with-d-access bb-d-offset
        (assign byte-s (1- bb-width))
        (assign byte-r (a-constant 0))
        (parallel-with-return
          (lisp (trace-path #/2))
          (store-word (logxor (dpb bb-constant byte-s byte-r 0) memory-data))))
      (parallel
        (lisp (trace-path #/1))
        (return))))

(defmacro def-bitblt-block-read (name n)
  `(defucode ,name
     (parallel
       (assign a-block-size (b-constant ,n))    ;Used later to advance offsets
       (assign b-block-size obus)
       (start-memory block read))               ;start first word
```

```
    (parallel
      (waiting-for-memory)                        ;waiting for first word
      (start-memory block read))                  ;start second word
    ,@(loop for i from (- n-bitblt-buffers n) below n-bitblt-buffers
            collect '(abus-array-data
                       (assign (bitblt-buffer ,i)
                               (set-type (logxor bb-constant memory-data) dtp-fix))
                      ,(selectq (- n-bitblt-buffers i)
                         (1 '(return))
                         (2 nil)
                         (otherwise '(start-memory block read)))))))

(def-bitblt-block-read ubitblt-block-read-8 8)  ;I suppose this when interned...
(def-bitblt-block-read ubitblt-block-read-4 4)  ;... will subsume this.

(defmacro def-bitblt-block-write (name n)
  '(defucode ,name
    (activate-bitblt-buffer)
    ,@(loop for i from (- n-bitblt-buffers n) below n-bitblt-buffers
            collect '(parallel
                       (store-word (bitblt-buffer ,i) block)
                       (lisp (trace-path #/.))))
    (parallel
      (assign bb-d-offset (+ bb-d-offset b-block-size))
      (call deactivate-bitblt-buffer))
    (parallel-with-return
      (assign bb-width (- bb-width (rotate b-block-size 5)))   ;2^5 = bits-per-word
      )))

(def-bitblt-block-write ubitblt-block-write-8 8)
(def-bitblt-block-write ubitblt-block-write-4 4)

(defmacro def-d-aligned-block-write (name n)
  '(defucode ,name
    (assign byte-s (1- bb-s-bitpos))
    (parallel
      (assign byte-r (- (b-constant 32.) bb-s-bitpos))
      (call activate-bitblt-buffer))
    ,@(loop for i from (- n-bitblt-buffers n) below n-bitblt-buffers
            append '((parallel
                       (store-word (dpb (bitblt-buffer ,i) byte-s byte-r bb-s-word2) block)
                       (lisp (trace-path #/.)))
                     (assign bb-s-word2 (rotate (bitblt-buffer ,i) byte-r))))
    (parallel
      (assign bb-d-offset (+ bb-d-offset b-block-size))
      (call deactivate-bitblt-buffer))
    (parallel-with-return
      (assign bb-width (- bb-width (rotate b-block-size 5)))   ;2^5 = bits-per-word
      )))

(def-d-aligned-block-write ubitblt-d-aligned-block-write-8 8.)
(def-d-aligned-block-write ubitblt-d-aligned-block-write-4 4.)

;;alu depends on neither source ncr destination bits
(defucode ubitblt-long-row-neither
  (if (plus-fixnum bb-d-bitpos)
      (sequential
        (assign b-temp (32- bb-d-bitpos))
        (parallel-with-d-access bb-d-offset
          (assign byte-r bb-d-bitpos)
          (assign byte-s (1- b-temp))
          (store-word (dpb bb-constant byte-s byte-r memory-data)))
        (incr-d-offset)
        (assign bb-width (- bb-width b-temp))
        (parallel
          (assign bb-d-bitpos (b-constant 0))
          (lisp (trace-path #/b))
          (jump ubitblt-long-row-neither-loop)))
      (parallel
        (lisp (trace-path #/a))
        (jump ubitblt-long-row-neither-loop))))

(defucode ubitblt-long-row-neither-loop
  (if (greater-or-equal-fixnum bb-width (b-constant (* 8. 32.)))
      (sequential
        (parallel
          (assign-vma-offset d)
          (call store-block-bb-constant-8))
        (assign bb-d-offset (+ bb-d-offset (b-constant 8.)))
        (parallel
          (assign bb-width (- bb-width (b-constant (* 8. 32.))))
          (jump ubitblt-long-row-neither-loop)))
      (sequential
        (dispatch-after-next (parallel (assign b-block-size (ldb bb-width 3 5))
                                       (ldb bb-width 3 5))
          ((7) (parallel (assign-vma-offset d)
                         (call-and-return-to store-block-bb-constant-7
                                             ubitblt-long-row-neither-finish)))
          ((6) (parallel (assign-vma-offset d)
                         (call-and-return-to store-block-bb-constant-6
                                             ubitblt-long-row-neither-finish)))
```

```
          ((5) (parallel (assign-vma-offset d)
                         (call-and-return-to store-block-bb-constant-5
                                             ubitblt-long-row-neither-finish)))
          ((4) (parallel (assign-vma-offset d)
                         (call-and-return-to store-block-bb-constant-4
                                             ubitblt-long-row-neither-finish)))
          ((3) (parallel (assign-vma-offset d)
                         (call-and-return-to store-block-bb-constant-3
                                             ubitblt-long-row-neither-finish)))
          ((2) (parallel (assign-vma-offset d)
                         (call-and-return-to store-block-bb-constant-2
                                             ubitblt-long-row-neither-finish)))
          ((1) (assign-vma-offset d)
               (parallel
                 (lisp (trace-path #/,))
                 (store-word bb-constant)
                 (jump ubitblt-long-row-neither-finish))))
        (parallel
          (take-dispatch)
          (trap-if (zero-fixnum b-block-size) ubitblt-long-row-neither-finish))))

(defucode ubitblt-long-row-neither-finish
  (assign bb-d-offset (+ bb-d-offset b-block-size))
  (assign bb-width (logand bb-width (b-constant #o37)))
  (if (plus-fixnum bb-width)
      (parallel-with-d-access bb-d-offset
        (assign byte-r (a-constant 0))
        (assign byte-s (1- bb-width))
        (parallel
          (lisp (trace-path #/2))
          (store-word (dpb bb-constant byte-s byte-r memory-data))
          (return)))
      (parallel
        (lisp (trace-path #/1))
        (return))))

(defmacro store-block-bb-constant-routines (n)
  `(progn 'compile
          ,@(loop with s = "STORE-BLOCK-BB-CONSTANT-~d"
                  for i from n downto 1
                  collect `(defucode ,(fintern s i)
                             (parallel
                               (store-word bb-constant block)
                               (lisp (trace-path #/,))
                               ,(if (> i 1)
                                    `(jump ,(fintern s (1- i)))
                                    '(return)))))))

(store-block-bb-constant-routines 8.)

;;alu depends both source and destination bits
(defucode ubitblt-long-row-both
  (parallel
    (assign b-temp bb-d-bitpos)
    (if (zero-fixnum bb-d-bitpos)
        (if (zero-fixnum bb-s-bitpos)
            (goto ubitblt-aligned-row-both)
            (parallel-with-s-access bb-s-offset
              ;;     SSSSSSSSSSSSSSSSSSSSSSSSSSSS.ssss
              ;;dddddddddddddddddddddddddddddddd.
              (assign byte-r (32- bb-s-bitpos))
              (parallel
                (assign bb-s-word (rotate memory-data byte-r))
                (lisp (trace-path #/c))
                (jump ubitblt-d-aligned-row-both))))
        (if (equal-fixnum bb-s-bitpos b-temp)
            (sequential
              (parallel-with-s-access bb-s-offset
                ;;SSSSSSSSSSSSSSSSSSSSSSSSSS.ssssss
                ;;dddddddddddddddddddddddddd.dddddd
                (parallel
                  (assign byte-r (32- bb-s-bitpos))
                  (assign b-temp obus))
                (assign byte-s (31- bb-s-bitpos))
                (assign bb-s-word (logxor bb-constant (ldb memory-data byte-s byte-r))))
              (assign byte-r bb-s-bitpos)
              (parallel
                (assign-vma-offset d)
                ;;ssssssssssssssssssssssssss.ssssss
                ;;DDDDDDDDDDDDDDDDDDDDDDDDDD.dddddd
                (call bb-byte-alu-operation-dispatch))
              ;; First partial word stored, turn into aligned case
              (incr-wrap-s-offset)
              (incr-d-offset)
              (assign bb-width (- bb-width b-temp))
              (assign bb-s-bitpos (b-constant 0))
              (parallel
                (assign bb-d-bitpos (b-constant 0))
                (lisp (trace-path #/b))
                (jump ubitblt-aligned-row-both))
```

```
            (if (lesser-fixnum bb-s-bitpos b-temp)
                (goto ubitblt-long-row-both-s-longer)
                (goto ubitblt-long-row-both-s-shorter))))))

(defucode ubitblt-long-row-both-s-longer
  (assign b-temp (32- bb-d-bitpos))
  (parallel-with-s-access bb-s-offset
    (assign byte-r (32- bb-s-bitpos))
    (assign byte-s (1- b-temp))
    (assign bb-s-word2 memory-data))
  ;;sssSSSSSSSSSSSSSSSSSSS........
  ;;    DDDDDDDDDDDDDDDDDDDDdddddddddddd
  ;;    ←------ b-temp ------→
  (assign bb-s-word (logxor bb-constant (rotate bb-s-word2 byte-r)))
  ;;........sssSSSSSSSSSSSSSSSSSSSS
  (parallel
    (assign byte-r bb-d-bitpos)
    (assign b-temp-2 bb-d-bitpos))
  (parallel
    (assign-vma-offset d)
    ;;ssssssssssssssssssssssss.ssssssss
    ;;    DDDDDDDDDDDDDDDDDDDDDDD.dddddddddddd
    (call bb-byte-alu-operation-dispatch))
  (incr-d-offset)
  ;;Remaining are (32-(s.bitpos+(32-d.bitpos))) = d.bitpos-s.bitpos
  ;;    ←-- 32-d.bitpos ---→ ←-s.bitpos-→
  ;;SSSSssssssssssssssssss.ssssssss
  ;;    ddddddddddddddddddd.dddddddddddd
  (assign byte-r (- b-temp-2 bb-s-bitpos))
  (assign bb-s-bitpos (+ bb-s-bitpos b-temp))
  (assign bb-s-word (rotate bb-s-word2 byte-r))
  (assign bb-width (- bb-width b-temp))
  (parallel
    (assign bb-d-bitpos (b-constant 0))
    (lisp (trace-path #/d))
    (jump ubitblt-d-aligned-row-both)))


;Need two S words to do the first partial D word
(defucode ubitblt-long-row-both-s-shorter
  ;;     ssssssssssssssssssssssss.ssssssss
  ;;dddddddddddddddddddddddddddd.dddd
  (parallel-with-s-access bb-s-offset
    (assign byte-r (32- bb-s-bitpos))
    (assign byte-s (31- bb-s-bitpos))
    ;;     SSSSSSSSSSSSSSSSSSSSSSSS.ssssssss
    ;;dddddddddddddddddddddddddddd.dddd
    (assign bb-s-word (logxor bb-constant (ldb memory-data byte-s byte-r))))
  (incr-wrap-s-offset-ahead)
  ;;    ←--→ s.bitpos-d.bitpos
  ;;...SSSS|ssssssssssssssssssssssss.ssssssss
  ;;    dddd dddddddddddddddddddddddd.dddd
  (parallel-with-s-access bb-s-offset-ahead
    (assign byte-s (- bb-s-bitpos b-temp 1))
    (assign byte-r (32- bb-s-bitpos))
    (assign bb-s-word2 (logxor bb-constant memory-data)))
  ;;...SSSS|SSSSSSSSSSSSSSSSSSSSSSSS.ssssssss
  ;;    dddd dddddddddddddddddddddddd.dddd
  (assign bb-s-word (dpb bb-s-word2 byte-s byte-r bb-s-word))
  (assign byte-r bb-d-bitpos)
  (assign byte-s (31- bb-d-bitpos))
  ;;...ssss|ssssssssssssssssssssssss.ssssssss
  ;;    DDDD DDDDDDDDDDDDDDDDDDDDDDDD.dddd
  (parallel
    (assign-vma-offset d)
    (call bb-byte-alu-operation-dispatch))
  (incr-d-offset)
  (assign bb-s-offset bb-s-offset-ahead)
  ;;...SSSssss|ssssssssssssssssssssssss.ssssssss
  ;;        dddd dddddddddddddddddddddddd.dddd
  (assign byte-r (- b-temp bb-s-bitpos))
  (assign bb-s-bitpos (- bb-s-bitpos b-temp))
  (assign b-temp (32- bb-d-bitpos))
  (assign bb-s-word (logxor (rotate bb-s-word2 byte-r) bb-constant))
  (assign bb-width (- bb-width b-temp))
  (parallel
    (assign bb-d-bitpos (b-constant 0))
    (lisp (trace-path #/e))
    (jump ubitblt-d-aligned-row-both)))


(defucode ubitblt-aligned-row-both
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-fixnum bb-s-row-length b-temp)
            (goto ubitblt-aligned-row-both-slow-loop)
            (sequential
              (parallel
```

```
              (assign-vma-offset s)
              (call ubitblt-block-read-8))
            (parallel
              (assign-vma-offset d)
              (call-and-return-to ubitblt-block-alu-8 ubitblt-aligned-row-both)))))
      ;;Frob with what's left.  Too bad dispatch blocks are expensive.
      (if (greater-or-equal-fixnum bb-width (b-constant (* 4 32.)))
          (sequential
            (assign b-temp (+ bb-s-offset (b-constant 4.)))
            (if (lesser-fixnum bb-s-row-length b-temp)
                (goto ubitblt-aligned-row-both-slow-loop)
                (sequential
                  (parallel
                    (assign-vma-offset s)
                    (call ubitblt-block-read-4))
                  (parallel
                    (assign-vma-offset d)
                    (call-and-return-to ubitblt-block-alu-4
                                        ubitblt-aligned-row-both-slow-loop)))))
          (goto ubitblt-aligned-row-both-slow-loop))))

(defucode ubitblt-aligned-row-both-slow-loop     ;12 cycles per word
  (parallel-with-s-access bb-s-offset            ;4 cycles
    (trap-if (lesser-fixnum bb-width (b-constant 32.))
             ubitblt-aligned-row-both-slow-loop-done)
    (waiting-for-memory)
    (assign bb-s-word (logxor bb-constant memory-data)))
  (parallel                                      ;1+3 cycles
    (assign-vma-offset d)
    (call bb-word-alu-operation-dispatch))
  (assign bb-width (- bb-width (b-constant 32.)))    ;1 cycle
  (incr-wrap-s-offset)                           ;2 cycles
  (parallel                                      ;1 cycle
    (incr-d-offset)
    (lisp (trace-path #/,))
    (jump ubitblt-aligned-row-both)))

(defucode ubitblt-aligned-row-both-slow-loop-done
  (if (plus-fixnum bb-width)
      (sequential
        (parallel-with-s-access bb-s-offset
          (assign byte-r (b-constant 0))
          (assign byte-s (1- bb-width))
          (assign bb-s-word (logxor bb-constant memory-data)))
        (parallel
          (lisp (trace-path #/2))
          (assign-vma-offset d)
          (jump bb-byte-alu-operation-dispatch)))      ;jcall
      (parallel-with-return
        (lisp (trace-path #/1)))))

(defucode ubitblt-block-alu-8
  (dispatch-after-this (ldb bb-alu-operation 4 0)
                       (parallel
                         (assign a-block-size (a-constant 8.))
                         (assign b-block-size (a-constant 8.))
                         (start-memory block read))     ;start first word
    ((1 2) (goto ubitblt-block-logand-8))               ; x*y   ~x*y
    ((4 8.) (goto ubitblt-block-andc2-8))               ; x*~y  ~x*~y
    ((6 9.) (goto ubitblt-block-logxor-8))              ; x xor y, ~x xor y
    ((7 11.) (goto ubitblt-block-logior-8))             ; x+y, ~x+y
    ((13. 14.) (goto ubitblt-block-lognand-8))))        ; ~(~x*y), ~(x*y)

(defucode ubitblt-block-alu-4
  (dispatch-after-this (ldb bb-alu-operation 4 0)
                       (parallel
                         (assign a-block-size (a-constant 4.))
                         (assign b-block-size (a-constant 4.))
                         (start-memory block read))     ;start first word
    ((1 2) (goto ubitblt-block-logand-4))               ; x*y   ~x*y
    ((4 8.) (goto ubitblt-block-andc2-4))               ; x*~y  ~x*~y
    ((6 9.) (goto ubitblt-block-logxor-4))              ; x xor y, ~x xor y
    ((7 11.) (goto ubitblt-block-logior-4))             ; x+y, ~x+y
    ((13. 14.) (goto ubitblt-block-lognand-4))))        ; ~(~x*y), ~(x*y)

(defmacro def-block-aluop (name n alu)
  (if (memq (get (caddr (microexpand `(,alu a-temp b-temp))) 'alu) weird-alu-functions)
      ;; Cannot simultaneously run ALU and store into the bitblt-buffer
      `(defucode ,name
         (parallel
           (waiting-for-memory)                        ;first word already started
           (declare-memory-timing active-cycle))
           (loop for i from (- n-bitblt-buffers n) below n-bitblt-buffers
                 collect `(sequential
                            (abus-array-data
                              (assign b-temp (,alu (bitblt-buffer ,i) memory-data))
                              ,(if (> (- n-bitblt-buffers i) 1)
                                   '(start-memory block read))) ;start next word
```

```
                              (parallel
                                (assign (bitblt-buffer ,i) (set-type b-temp dtp-fix))
                                ,(if (= (- n-bitblt-buffers i) 1)
                                     '(jump ,(fintern "UBITBLT-BLOCK-ALU-WRITE-~d" n)))))))
      ;; Normal case
      '(defucode ,name
         (parallel
           (waiting-for-memory)                    ;first word already started
           (declare-memory-timing active-cycle)
           (start-memory read block))               ;start second word
         ,@(loop for i from (- n-bitblt-buffers n) below n-bitblt-buffers
                 collect '(parallel
                            (abus-array-data
                              (assign (bitblt-buffer ,i) (set-type (,alu (bitblt-buffer ,i)
                                                                          memory-data)
                                                                    dtp-fix)))
                            ,(selectq (- n-bitblt-buffers i)
                               (1 '(jump ,(fintern "UBITBLT-BLOCK-ALU-WRITE-~d" n)))
                               (2 nil)
                               (otherwise '(start-memory block read))) ;start word after next
                            )))))

(def-block-aluop ubitblt-block-logand-8 8 logand)
(def-block-aluop ubitblt-block-logior-8 8 logior)
(def-block-aluop ubitblt-block-logxor-8 8 logxor)
(def-block-aluop ubitblt-block-andc2-8 8 andc2)
(def-block-aluop ubitblt-block-lognand-8 8 lognand)

(def-block-aluop ubitblt-block-logand-4 4 logand)
(def-block-aluop ubitblt-block-logior-4 4 logior)
(def-block-aluop ubitblt-block-logxor-4 4 logxor)
(def-block-aluop ubitblt-block-andc2-4 4 andc2)
(def-block-aluop ubitblt-block-lognand-4 4 lognand)

(defmacro def-block-alu-write (name n)
  '(defucode ,name
     (parallel
       (assign-vma-offset d)
       (call activate-bitblt-buffer))
     ,@(loop for i from (- n-bitblt-buffers n) below n-bitblt-buffers
             collect '(parallel
                        (store-word (bitblt-buffer ,i) block)
                        (lisp (trace-path #/.))))
     (parallel
       (assign bb-d-offset (+ bb-d-offset b-block-size))
       (call deactivate-bitblt-buffer))
     (assign bb-width (- bb-width (rotate b-block-size 5)))      ;2^S = bits-per-word
     (parallel
       (assign bb-s-offset (+ bb-s-offset b-block-size))
       (return))))

(def-block-alu-write ubitblt-block-alu-write-8 8)
(def-block-alu-write ubitblt-block-alu-write-4 4)

;;Each time through the loop, s-word was fetched from memory like
;;          ←-------s.bitpos------→
;;ssssssssss......................
;;and then rotated so it looks like
;;......................ssssssssss
;;←-------s.bitpos------→
;;
;;Each time, another s-word2 gets fetched and deposited into s-word like
;;          |←-------s.bitpos------→
;;          |.......................1111111111
;;2222222222 2222222222222222222222
;;
;;The rotation for the dpb equals the rotation for setup for next loop.

;bb-s-word has the partial previous source word whose address is in bb-s-offset,
;rotated into alignment with the destination, but not xored with bb-constant
(defucode ubitblt-d-aligned-row-both
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-or-equal-fixnum bb-s-row-length b-temp)
            (goto ubitblt-d-aligned-row-both-slow-loop)
            (sequential
              (parallel
                (assign-vma-offset s 1)
                (call ubitblt-rotated-block-read-8))
              (parallel
                (assign-vma-offset d)
                (call-and-return-to ubitblt-block-alu-8 ubitblt-d-aligned-row-both)))))
      ;;Frob with what's left.  Too bad dispatch blocks are expensive.
      (if (greater-or-equal-fixnum bb-width (b-constant (* 4 32.)))
          (sequential
            (assign b-temp (+ bb-s-offset (b-constant 4.)))
            (if (lesser-or-equal-fixnum bb-s-row-length b-temp)
                (goto ubitblt-d-aligned-row-both-slow-loop)
```

```
                (sequential
                  (parallel
                    (assign-vma-offset s 1)
                    (call ubitblt-rotated-block-read-4))
                  (parallel
                    (assign-vma-offset d)
                    (call-and-return-to ubitblt-block-alu-4
                                         ubitblt-d-aligned-row-both-slow-loop)))))
          (goto ubitblt-d-aligned-row-both-slow-loop))))

(defucode ubitblt-d-aligned-row-both-slow-loop              ;17 cycles per word
  (incr-wrap-s-offset-ahead)                                ;2
  (parallel-with-s-access bb-s-offset-ahead                 ;4
    (trap-if (lesser-fixnum bb-width (b-constant 32.))
             ubitblt-d-aligned-row-both-done)
    (assign byte-s (1- bb-s-bitpos))
    (assign bb-s-word2 memory-data))
  (assign byte-r (32- bb-s-bitpos))                         ;1
  (assign bb-s-word (dpb bb-s-word2 byte-s byte-r bb-s-word))      ;1
  (assign bb-s-word (logxor bb-constant-a bb-s-word))              ;1
  (parallel                                                 ;1+3
    (assign-vma-offset d)
    (call bb-word-alu-operation-dispatch))
  (assign bb-width (- bb-width (b-constant 32.)))           ;1
  (incr-d-offset)                                           ;1
  (assign bb-s-offset bb-s-offset-ahead)                    ;1
  (parallel                                                 ;1
    (assign bb-s-word (rotate bb-s-word2 byte-r))
    (lisp (trace-path #/.))
    (jump ubitblt-d-aligned-row-both)))

;;At entry, we have s-word fetched from memory like
;;          <-------s.bitpos------->
;;sssssssss......................
;;but then rotated so it looks like
;;......................sssssssss
;;<-------s.bitpos------->
;;
;;This is to be combined with d-word which looks like
;;....................dddddddddddd
;;                    <---width--->
(defucode ubitblt-d-aligned-row-both-done
  (assign bb-s-word (logxor bb-constant-a bb-s-word))
  (if (plus-fixnum bb-width)
      (sequential
        (assign b-temp (32- bb-s-bitpos))
        (if (lesser-or-equal-fixnum bb-width b-temp)
            ;;we have enough s bits
            ;;<-----s.bitpos---><-----a.temp---->
            ;;..................sssssssssssssss
            ;;....................dddddddddddd
            ;;                    <---width--->
            (sequential
              (assign byte-r (b-constant 0))
              (assign byte-s (1- bb-width))
              (parallel
                (assign-vma-offset d)
                (lisp (trace-path #/4))
                (jump bb-byte-alu-operation-dispatch))) ;jcall
            ;;need to get another source word
            ;;<-----s.bitpos---><-----a.temp---->
            ;;..................sssssssssssssss
            ;;.............dddddddddddddddddddd
            ;;             <--------width------->
            (sequential
              (parallel-with-s-access bb-s-offset-ahead
                (assign byte-r b-temp)
                (assign byte-s (1- bb-s-bitpos))
                (assign bb-s-word2 (logxor memory-data bb-constant)))
              (assign bb-s-word (dpb bb-s-word2 byte-s byte-r bb-s-word))
              (assign byte-r (b-constant 0))
              (assign byte-s (1- bb-width))
              (parallel
                (assign-vma-offset d)
                (lisp (trace-path #/5))
                (jump bb-byte-alu-operation-dispatch)))))      ;jcall
      (parallel-with-return
        (lisp (trace-path #/3)))))

;bb-s-word has the previous source word, rotated but not xored with bb-constant
;3 cycles per word seems to be the best I can do (can't rotate while storing in bitblt-buffer)
;If bb-s-word was xored already, it would take 4 cycles per word here
(defmacro def-bitblt-rotated-block-read (name n)
  `(defucode ,name
     (assign byte-s (1- bb-s-bitpos))
     (parallel
       (assign a-block-size (b-constant ,n))    ;Used later to advance offsets
       (assign b-block-size obus)
       (start-memory block read))               ;start first word
```

```
    (parallel
      (waiting-for-memory)                    ;waiting for first word
      (assign byte-r (32- bb-s-bitpos)))
   ,@(loop for i from (- n-bitblt-buffers n) below n-bitblt-buffers
          append '((abus-array-data
                     (assign bb-s-word2 (dpb memory-data byte-s byte-r bb-s-word)))
                   (parallel
                     (declare-memory-timing data-cycle)      ;MD holds
                     (assign bb-s-word (rotate memory-data byte-r))
                     ,(and (> (- n-bitblt-buffers i) 1)
                           '(start-memory block read)))
                   (parallel
                     (assign (bitblt-buffer ,i)
                             (set-type (logxor bb-constant bb-s-word2) dtp-fix))
                     ,(if (= (- n-bitblt-buffers i) 1)
                          '(return))))))

(def-bitblt-rotated-block-read ubitblt-rotated-block-read-8 8)
(def-bitblt-rotated-block-read ubitblt-rotated-block-read-4 4)

(defucode ubitblt-long-row-source-backwards
  (parallel
    (assign b-temp bb-d-bitpos)
    (if (zero-fixnum bb-d-bitpos)
        (if (zero-fixnum bb-s-bitpos)
            (parallel
              (assign bb-s-offset (1+ bb-s-offset))  ;the loop will decr first, before pclsr
              (lisp (trace-path #/a))
              (jump ubitblt-aligned-row-source-backwards))
            (sequential
              (parallel-with-s-access bb-s-offset
                (assign byte-r (32- bb-s-bitpos))
                (parallel
                  (assign bb-s-word (logxor bb-constant (rotate memory-data byte-r)))
                  (lisp (trace-path #/c))
                  (jump ubitblt-d-aligned-row-source-backwards)))))
        (if (equal-fixnum b-temp bb-s-bitpos)
            (sequential
              (parallel-with-s-access bb-s-offset
                (assign byte-s (1- bb-s-bitpos))
                (assign bb-s-word (logxor memory-data bb-constant)))
              (parallel-with-d-access-check-write bb-d-offset
                (decr-d-offset)
                (parallel
                  (assign byte-r (b-constant 0))
                  (assign bb-s-bitpos (b-constant 0)))
                (store-word (dpb bb-s-word byte-s byte-r memory-data)))
              ;; Now we can turn into the aligned case
              (assign bb-width (- bb-width b-temp))
              (parallel
                (assign bb-d-bitpos (b-constant 0))
                (lisp (trace-path #/b))
                (jump ubitblt-aligned-row-source-backwards)))
            (if (greater-fixnum bb-s-bitpos b-temp)     ;s > d, enough in the current word
                (sequential
                  (parallel-with-s-access bb-s-offset
                    (assign byte-s (1- bb-d-bitpos))
                    (assign byte-r (- b-temp bb-s-bitpos))
                    (assign bb-s-word (logxor bb-constant memory-data)))
                  (parallel-with-d-access-check-write bb-d-offset
                    (assign bb-s-bitpos (- bb-s-bitpos b-temp))
                    (assign bb-d-bitpos (b-constant 0))
                    (store-word (ldb bb-s-word byte-s byte-r memory-data)))
                  (assign bb-s-word (rotate bb-s-word byte-r))
                  (assign bb-width (- bb-width b-temp))
                  (parallel
                    (decr-d-offset)
                    (lisp (trace-path #/d))
                    (jump ubitblt-d-aligned-row-source-backwards)))
                (sequential                      ;s < d, need to fetch another word
                  (parallel-with-s-access bb-s-offset
                    (parallel
                      (assign byte-r (- b-temp bb-s-bitpos))
                      (assign a-temp (- b-temp bb-s-bitpos)))
                    (assign byte-s (1- a-temp))
                    (assign bb-s-word (logxor bb-constant (rotate memory-data byte-r))))
                  (decr-wrap-s-offset-ahead)
                  (parallel-with-s-access bb-s-offset-ahead
                    (assign bb-s-word2 (logxor bb-constant memory-data)))
                  (assign bb-s-word (ldb bb-s-word2 byte-s byte-r bb-s-word))
                  (parallel-with-d-access bb-d-offset
                    (assign byte-r (b-constant 0))
                    (assign byte-s (1- bb-d-bitpos))
                    (store-word (ldb bb-s-word byte-s byte-r memory-data)))
                  (assign bb-s-bitpos (32- a-temp))
                  (assign byte-r a-temp)
                  (assign bb-s-word (rotate bb-s-word2 byte-r))
                  (assign bb-s-offset bb-s-offset-ahead)
                  (assign bb-width (- bb-width b-temp))
                  (assign bb-d-bitpos (b-constant 0))
                  (parallel
```

```
                    (decr-d-offset)
                    (lisp (trace-path #/e))
                    (jump ubitblt-d-aligned-row-source-backwards)))))))

;bb-s-offset is 1+ the "real" value at this point
(defucode ubitblt-aligned-row-source-backwards  ;9 cycles per word
  (decr-wrap-s-offset)                          ;1
  (parallel-with-s-access bb-s-offset           ;4
    (trap-if (lesser-fixnum bb-width (b-constant 32.))
             ubitblt-aligned-row-source-backwards-done)
    (waiting-for-memory)
    (assign bb-s-word (logxor bb-constant memory-data)))
  (assign-vma-offset d)                         ;1
  (store-word bb-s-word)                        ;1
  (assign bb-width (- bb-width (b-constant 32.))) ;1
  (parallel                                     ;1
    (decr-d-offset)
    (lisp (trace-path #/,))
    (jump ubitblt-aligned-row-source-backwards)))

(defucode ubitblt-aligned-row-source-backwards-done
  (if (plus-fixnum bb-width)
      (sequential
        (parallel-with-s-access bb-s-offset
          (assign byte-s (1- bb-width))
          (assign byte-r bb-width)
          (assign bb-s-word (logxor bb-constant (ldb memory-data byte-s byte-r))))
        (parallel-with-d-access bb-d-offset
          (assign byte-r (32- bb-width))
          (parallel-with-return
            (store-word (dpb bb-s-word byte-s byte-r memory-data))
            (lisp (trace-path #/2))))))
      (parallel-with-return
        (lisp (trace-path #/1)))))


;;each time through the loop, bb-s-word has the low part of the previous word
;;rotated to be at the high end of the word.  We use it as background to LDB the
;;high part of the next word into it.

;bb-s-offset is 1+ the "real" value at this point
;could bum one cycle by moving assignment to byte-s out of loop,
;but this should use block mode anyway
(defucode ubitblt-d-aligned-row-source-backwards        ;11 cycles per word
  (decr-wrap-s-offset)                          ;1
  (parallel-with-s-access bb-s-offset           ;4
    (trap-if (lesser-fixnum bb-width (b-constant 32.))
             ubitblt-d-aligned-row-source-backwards-done)
    (assign byte-r (32- bb-s-bitpos))
    (assign bb-s-word2 (logxor bb-constant memory-data)))
  (assign byte-s (31- bb-s-bitpos))             ;1
  (assign-vma-offset d)                         ;1
  (store-word (ldb bb-s-word2 byte-s byte-r bb-s-word)) ;1
  (assign bb-width (- bb-width (b-constant 32.))) ;1
  (decr-d-offset)                               ;1
  (parallel                                     ;1
    (assign bb-s-word (rotate bb-s-word2 byte-r))
    (lisp (trace-path #/.))
    (jump ubitblt-d-aligned-row-source-backwards)))

(defucode ubitblt-d-aligned-row-source-backwards-done
  (parallel
    (assign bb-width-b bb-width)
    (if (plus-fixnum bb-width)
        (if (greater-or-equal-fixnum bb-s-bitpos bb-width-b)
            (parallel-with-d-access bb-d-offset
              (assign byte-r (b-constant 0))
              (assign byte-s (31- bb-width))
              (parallel-with-return
                (store-word (ldb memory-data byte-s byte-r bb-s-word))
                (lisp (trace-path #/4))))
            (sequential
              (parallel-with-s-access bb-s-offset
                (assign byte-r bb-width)
                (assign bb-s-word (rotate bb-s-word byte-r))
                (assign bb-s-word2 (logxor bb-constant memory-data)))
              (parallel
                (assign byte-r (- bb-width-b bb-s-bitpos))
                (assign a-temp obus))
              (assign byte-s (1- a-temp))
              (assign bb-s-word (ldb bb-s-word2 byte-s byte-r bb-s-word))
              (parallel-with-d-access bb-d-offset
                (assign byte-s (1- bb-width))
                (assign byte-r (32- bb-width))
                (parallel-with-return
                  (store-word (dpb bb-s-word byte-s byte-r memory-data))
                  (lisp (trace-path #/5))))))
        (parallel-with-return
          (lisp (trace-path #/3))))))
```

```
(defucode ubitblt-long-row-both-backwards
  (parallel
    (assign b-temp bb-d-bitpos)
    (if (zero-fixnum bb-d-bitpos)
        (if (zero-fixnum bb-s-bitpos)
            (parallel
              (assign bb-s-offset (1+ bb-s-offset))     ;loop will decr first before pclsr
              (lisp (trace-path #/a))
              (jump ubitblt-aligned-row-both-backwards))
            (parallel-with-s-access bb-s-offset
              (assign byte-r (32- bb-s-bitpos))
              (parallel
                (assign bb-s-word (logxor bb-constant (rotate memory-data byte-r)))
                (lisp (trace-path #/c))
                (jump ubitblt-d-aligned-row-both-backwards))))
        (if (equal-fixnum b-temp bb-s-bitpos)
            (sequential
              (parallel-with-s-access bb-s-offset
                (assign byte-s (1- bb-s-bitpos))
                (assign byte-r (b-constant 0))
                (assign bb-s-word (logxor bb-constant memory-data)))
              (parallel
                (assign-vma-offset d)
                (call bb-byte-alu-operation-dispatch))
              (assign bb-width (- bb-width b-temp))
              (assign bb-s-bitpos (b-constant 0))
              (assign bb-d-bitpos (b-constant 0))
              (parallel
                (decr-d-offset)
                (lisp (trace-path #/b))
                (jump ubitblt-aligned-row-both-backwards)))
            (if (greater-fixnum bb-s-bitpos b-temp)     ;s > d, enough in first word
                (sequential
                  (parallel-with-s-access bb-s-offset
                    (parallel
                      (assign byte-r (- b-temp bb-s-bitpos))
                      (assign a-temp obus))     ;this is negative
                    (assign byte-s (1- bb-d-bitpos))
                    (assign bb-s-word (logxor bb-constant (rotate memory-data byte-r))))
                  (assign byte-r (b-constant 0))
                  (parallel
                    (assign-vma-offset d)
                    (call bb-byte-alu-operation-dispatch))
                  (assign bb-s-bitpos (- bb-s-bitpos b-temp))
                  (assign bb-d-bitpos (b-constant 0))
                  (assign bb-width (- bb-width b-temp))
                  (parallel
                    (decr-d-offset)
                    (lisp (trace-path #/d))
                    (jump ubitblt-d-aligned-row-both-backwards)))
                (sequential                     ;s<d, need to fetch another word
                  (parallel-with-s-access bb-s-offset
                    (assign byte-r (- b-temp bb-s-bitpos))
                    (assign bb-s-word (logxor bb-constant (rotate memory-data byte-r))))
                  (decr-wrap-s-offset-ahead)
                  (parallel-with-s-access bb-s-offset-ahead
                    (assign a-temp (- b-temp bb-s-bitpos))
                    (assign byte-s (1- a-temp))
                    (assign bb-s-word2 (logxor bb-constant memory-data)))
                  (assign bb-s-word (ldb bb-s-word2 byte-s byte-r bb-s-word))
                  (assign byte-s (1- bb-d-bitpos))
                  (assign byte-r (b-constant 0))
                  (parallel
                    (assign-vma-offset d)
                    (call bb-byte-alu-operation-dispatch))
                  (parallel
                    (assign a-temp (- b-temp bb-s-bitpos))
                    (assign byte-r obus))
                  (assign bb-s-word (rotate bb-s-word2 byte-r))
                  (assign bb-s-bitpos (32- a-temp))
                  (assign bb-s-offset bb-s-offset-ahead)
                  (assign bb-d-bitpos (b-constant 0))
                  (assign bb-width (- bb-width b-temp))
                  (parallel
                    (decr-d-offset)
                    (lisp (trace-path #/e))
                    (jump ubitblt-d-aligned-row-both-backwards)))))))


;bb-s-offset is 1+ its "real" value
(defucode ubitblt-aligned-row-both-backwards     ;11 cycles per word
  (decr-wrap-s-offset)                           ;1
  (parallel-with-s-access bb-s-offset            ;4
    (trap-if (lesser-fixnum bb-width (b-constant 32.))
             ubitblt-aligned-row-both-backwards-done)
    (waiting-for-memory)
    (assign bb-s-word (logxor bb-constant memory-data)))
  (parallel                                      ;1+3
    (assign-vma-offset d)
    (call bb-word-alu-operation-dispatch))
```

```
  (assign bb-width (- bb-width (b-constant 32.))) ;1
  (parallel                                        ;1
    (decr-d-offset)
    (lisp (trace-path #/,))
    (jump ubitblt-aligned-row-both-backwards)))

(defucode ubitblt-aligned-row-both-backwards-done
  (if (plus-fixnum bb-width)
      (sequential
        (parallel-with-s-access bb-s-offset
          (assign byte-s (1- bb-width))
          (assign byte-r bb-width)
          (assign bb-s-word (logxor bb-constant (ldb memory-data byte-s byte-r))))
        (assign byte-r (32- bb-width))
        (parallel
          (assign-vma-offset d)
          (lisp (trace-path #/2))
          (jump bb-byte-alu-operation-dispatch)))       ;jcall
      (parallel-with-return
        (lisp (trace-path #/1)))))
```

F:>lmach>ucode>nBITBLT.LISP.22

```
;bb-s-offset is 1+ its "real" value
;bb-s-word has the previous word, rotated and xored
(defucode ubitblt-d-aligned-row-both-backwards  ;14 cycles per word
  (decr-wrap-s-offset)                          ;1 cycles
  (parallel-with-s-access bb-s-offset           ;4 cycles
    (trap-if (lesser-fixnum bb-width (b-constant 32.))
             ubitblt-d-aligned-row-both-backwards-done)
    (assign byte-r (32- bb-s-bitpos))
    (assign bb-s-word2 (logxor bb-constant memory-data)))
  (assign byte-s (31- bb-s-bitpos))             ;1
  (assign bb-s-word (ldb bb-s-word2 byte-s byte-r bb-s-word))   ;1 cycle
  (parallel                                     ;1+3 cycles
    (assign-vma-offset d)
    (call bb-word-alu-operation-dispatch))
  (assign bb-s-word (rotate bb-s-word2 byte-r)) ;1
  (assign bb-width (- bb-width (b-constant 32.))) ;1
  (parallel
    (decr-d-offset)                             ;1
    (lisp (trace-path #/.))
    (jump ubitblt-d-aligned-row-both-backwards)))

(defucode ubitblt-d-aligned-row-both-backwards-done
  (parallel
    (assign bb-width-b bb-width)
    (if (plus-fixnum bb-width)
        (if (greater-or-equal-fixnum bb-s-bitpos bb-width-b)
            (sequential
              (assign byte-r bb-width)
              (assign bb-s-word (rotate bb-s-word byte-r))
              (assign byte-s (1- bb-width))
              (assign byte-r (32- bb-width))
              (parallel
                (assign-vma-offset d)
                (lisp (trace-path #/4))
                (jump bb-byte-alu-operation-dispatch))) ;jcall
            (sequential
              (parallel-with-s-access bb-s-offset
                (assign byte-r bb-width)
                (assign bb-s-word (rotate bb-s-word byte-r))
                (assign bb-s-word2 (logxor bb-constant memory-data)))
              (parallel
                (assign byte-r (- bb-width-b bb-s-bitpos))
                (assign a-temp obus))
              (assign byte-s (1- a-temp))
              (assign bb-s-word (ldb bb-s-word2 byte-s byte-r bb-s-word))
              (assign byte-s (1- bb-width))
              (assign byte-r (32- bb-width))
              (parallel
                (assign-vma-offset d)
                (lisp (trace-path #/5))
                (jump bb-byte-alu-operation-dispatch))))       ;jcall
        (parallel-with-return
          (lisp (trace-path #/3))))))

;;code for %decode-bitblt-arrays
;;Take alu from-array to-array
;;Return (s-beg-addr s-beg-bitpos s-row-length s-height s-bits-per-elt
;;        d-beg-addr d-beg-bitpos d-row-length d-height d-bits-per-elt
;;        array-reg-event-count)
```

```
;;args
(defatomicro bbd-alu (amem (stack-pointer -2)))
(defatomicro bbd-s-array (amem (stack-pointer -1)))
(defatomicro bbd-d-array top-of-stack-a)

;; 4 slots for array-setup-2d to return its results
(defatomicro bbd-control (amem (stack-pointer 1)))
(defatomicro bbd-base-pointer (amem (stack-pointer 2)))
(defatomicro bbd-width (amem (stack-pointer 3)))
(defatomicro bbd-height (amem (stack-pointer 4)))

(defatomicro bbd-s-beg-addr      (amem (stack-pointer 5)))
(defatomicro bbd-s-beg-bitpos    (amem (stack-pointer 6)))
(defatomicro bbd-s-row-length    (amem (stack-pointer 7)))
(defatomicro bbd-s-height        (amem (stack-pointer 8)))
(defatomicro bbd-s-bits-per-elt  (amem (stack-pointer 9.)))
(defatomicro bbd-d-beg-addr      (amem (stack-pointer 10.)))
(defatomicro bbd-d-beg-bitpos    (amem (stack-pointer 11.)))
(defatomicro bbd-d-row-length    (amem (stack-pointer 12.)))
(defatomicro bbd-d-height        (amem (stack-pointer 13.)))
(defatomicro bbd-d-bits-per-elt  (amem (stack-pointer 14.)))
(defatomicro bbd-event-count     (amem (stack-pointer 15.)))

(defatomicro bb-alu-depends-on-source
             (b-constant #.(loop for alu in '( 5 10.    ;source
                                              ;3 12.    ;dest
                                              ;0 15.    ;neither
                                              1 2 4 6 7 8. 9. 11. 13. 14.      ;both
                                              )
                                  sum (ash 1 alu))))

(defmicro compute-beg-bitpos (for-what)
  (let ((beg-bitpos (selectq for-what
                      (s 'bbd-s-beg-bitpos)
                      (d 'bbd-d-beg-bitpos)
                      (otherwise (ferror "What is ~S" for-what))))
        (row-length (selectq for-what
                      (s 'bbd-s-row-length)
                      (d 'bbd-d-row-length)
                      (otherwise (ferror "What is ~S" for-what)))))
    `(sequential
       (assign b-low-dividend top-of-stack)
       (assign a-positive-divisor bbd-width)
       (parallel
         (assign b-high-dividend (a-constant 0))
         (assign a-divide-step-count (b-constant 15.)))
       (parallel
         (assign a-negative-divisor (- a-positive-divisor))
         (call divide-subroutine))
       ;; bits per elt setup correctly in byte-r
       (assign ,beg-bitpos (set-type (rotate b-high-dividend byte-r) dtp-fix))
       (assign b-temp (set-type (ldb ,row-length 27. 5 0) dtp-fix))
       (assign bb-a-temp b-temp)
       (mpy-32-32 bb-a-temp b-low-dividend set-b-temp for-effect nil))))

(defmicro set-b-temp (x)
  `(assign b-temp ,x))

(definst %bitblt-decode-arrays no-operand
  ;;See whether the alu operation depends on the source array
  (assign byte-r (32- bbd-alu))
  (parallel
    (assign top-of-stack (a-constant 0))        ;the "subscript"
    (if (ldb-bit-test bb-alu-depends-on-source byte-r)
        (sequential
          (parallel
            (check-arg-type array bbd-s-array dtp-array)
            (assign vma bbd-s-array)
            (assign b-vma bbd-s-array)
            (call array-setup-2d))
          (parallel (assign b-temp bbd-control)
                    (call bbd-bits-per-elt))
          (parallel (assign bbd-s-bits-per-elt (set-type b-temp dtp-fix))
                    (assign byte-r b-temp))
          (assign bbd-s-row-length (set-type (rotate bbd-width byte-r) dtp-fix))
          (compute-beg-bitpos s)
          (assign bbd-s-beg-addr (+ bbd-base-pointer b-temp))
          (assign bbd-s-height bbd-height))
        (sequential
          (assign bbd-s-bits-per-elt (set-type (a-constant 1) dtp-fix))
          (assign bbd-s-row-length (set-type (a-constant 1000000) dtp-fix))
          (assign bbd-s-beg-bitpos (set-type (a-constant 0) dtp-fix))
          (assign bbd-s-beg-addr quote-nil)
          (assign bbd-s-height (set-type (a-constant 1000000) dtp-fix)))))
  ;; decode the destination array
  (assign top-of-stack (b-constant 0))          ;the "subscript
  (parallel
    (check-arg-type array bbd-d-array dtp-array)
    (assign vma bbd-d-array)
    (assign b-vma bbd-d-array)
    (call array-setup-2d))
```

```
  (parallel (assign b-temp bbd-control)
            (assign bbd-event-count bbd-control)
            (call bbd-bits-per-elt))
  (parallel (assign bbd-d-bits-per-elt (set-type b-temp dtp-fix))
            (assign byte-r b-temp))
  (assign bbd-d-row-length (set-type (rotate bbd-width byte-r) dtp-fix))
  (compute-beg-bitpos d)
  (assign bbd-d-beg-addr (+ bbd-base-pointer b-temp))
  (assign bbd-d-height bbd-height)
  ;; Now copy results down over arguments and array-setup-2d work area
  (assign b-temp frame-pointer)
  (assign frame-pointer (+ stack-pointer (b-constant 4)))
  (assign b-temp-2 (+ stack-pointer (b-constant 15.)))
  (parallel
    (assign stack-pointer (- stack-pointer (b-constant 3)))
    (call blt-stack))
  (parallel
    (assign frame-pointer b-temp)
    (assign top-of-stack top-of-stack-a)
    (next-instruction)))

;;take an array-register control word in b-temp, return a decoding of its
;;dispatch type in b-temp.
(defucode bbd-bits-per-elt
  (dispatch-after-this (array-register-dispatch-field b-temp)
                       (nop)
    ((%array-register-dispatch-1-bit)
      (parallel (assign b-temp (set-type (b-constant 0) dtp-fix)) (return)))
    ((%array-register-dispatch-2-bit)
      (parallel (assign b-temp (set-type (b-constant 1) dtp-fix)) (return)))
    ((%array-register-dispatch-4-bit)
      (parallel (assign b-temp (set-type (b-constant 2) dtp-fix)) (return)))
    ((%array-register-dispatch-8-bit)
      (parallel (assign b-temp (set-type (b-constant 3) dtp-fix)) (return)))
    ((%array-register-dispatch-16-bit)
      (parallel (assign b-temp (set-type (b-constant 4) dtp-fix)) (return)))
    ((%array-register-dispatch-word)
      (parallel (assign b-temp (set-type (b-constant 5) dtp-fix)) (return)))
    (otherwise (signal-error unimplemented-or-illegal-array-type))))
```

F:>lmach>ucode>multiply.lisp.32

```
;;; -*- Mode:Lisp; Package:Micro; Base:8; Lowercase:yes -*-
;;; (c) Copyright 1982, Symbolics, Inc.

;Microcode for the multiplier

;Get defmicro and all his hosts
#M
(declare (cond ((not (status feature lmucode))
               (load 'udcls))))

;The following microcode-controllable signals exist:
;       x-twos-complement
;       y-twos-complement
;       x-clk-enable
;       y-clk-enable
;       lsp & msp output-enable (select mpy as Xbus source)
;
;       msp-clk and lsp-clk happen every cycle
;       feed-through is always off
;       right-shift is always on
;       round is always off

;MPY-PRODUCT is a source (on Xbus)
;MPY-X, MPY-X-SIGNED, MPY-Y, MPY-Y-SIGNED are destinations
; Note that the X destinations get the low halfword and the
; Y destinations get the high halfword.
;These destinations are implemented by the micros WRITE-MPY-X
; and WRITE-MPY-Y-FROM-HIGH, which take an optional SIGNED flag.
;Special skips needed:
; ALU-CARRY (out of bit 31, into non-existent bit 32)

;The basic low-level multiply subroutine, as a micro so that the
;locations of the two fixnum arguments and the two fixnum results
;may be varied.  No error checking is included.
;The a-source and b-source arguments are the arguments.

;store-low-product and store-high-product are routines to dispose
; of the results.
;finally is stuff to do in parallel with the last cycle, which
; appears in 4 different copies.
```

```
;Execution time is 9 cycles in most common case, sometimes 12 cycles.
;Usage of temporaries: (not optimized to minimize number of temporaries!)
; a-temp        A swapped (AH)
; a-temp-2      AL x BH then ALxBH + AHxBL
; b-temp        AH x BL
; b-temp-2      B swapped (BL)
; b-temp-3      AH x BH

(defmicro mpy-32-32 (a-source b-source
                     store-low-product store-high-product finally)
 '(sequential
   (assign a-temp (ldb ,a-source 16. 16.))
   (parallel (write-mpy-x a-temp signed)                    ;AH
             (write-mpy-y-from-high ,b-source signed)       ;BH
             (assign b-temp-2 (dpb ,b-source 16. 16. 0)))
   (parallel (assign b-temp-3 mpy-product)                  ;AHxBH
             (write-mpy-y-from-high b-temp-2))              ;BL
   (parallel (assign b-temp mpy-product)                    ;AHxBL
             (if (minus-fixnum mpy-product)
                 (assign b-temp-3 (- b-temp-3 (a-constant 1_16.)))
                 (drop-through)))
   (parallel (write-mpy-x ,a-source)   ;AL
             (write-mpy-y-from-high ,b-source signed)) ;BH
   (parallel (assign a-temp-2 mpy-product)                  ;ALxBH
             (write-mpy-y-from-high b-temp-2)               ;BL
             (if (minus-fixnum mpy-product)
                 (assign b-temp-3 (- b-temp-3 (a-constant 1_16.)))
                 (drop-through)))
   (parallel (assign a-temp-2 (+ b-temp a-temp-2))
             (if alu-carry
                 (assign b-temp-3 (+ b-temp-3 (a-constant 1_16.)))
                 (drop-through)))
   (parallel
     (,store-low-product                          ;Low Product
             (set-type (+ mpy-product (dpb a-temp-2 16. 16. 0)) dtp-fix))
     (if alu-carry
         (parallel
             (,store-high-product
                     (set-type (+ b-temp-3 (ldb a-temp-2 16. 16.) 1) dtp-fix))
             ,finally)
         (parallel
             (,store-high-product
                     (set-type (+ b-temp-3 (ldb a-temp-2 16. 16.)) dtp-fix))
             ,finally)))))

;Multiplication of a 32-bit number by a 16-bit number. (4 cycles)
(defmicro mpy-32-16 (32-bit-number 16-bit-number
                     store-low-product store-high-product finally)
 '(sequential
   (parallel (write-mpy-x ,16-bit-number signed)          ;B
             (write-mpy-y-from-high ,32-bit-number signed)      ;AH
             (assign b-temp (dpb ,32-bit-number 16. 16. 0)))
   (parallel
     (assign b-temp mpy-product)                          ;AH x B
     (write-mpy-y-from-high b-temp)                       ;AL
     (if (plus-or-zero-fixnum mpy-product)
         (parallel
           (,store-low-product
              (set-type (+ mpy-product (dpb b-temp 16. 16. 0)) dtp-fix))
           (if alu-carry
               (parallel
                 (,store-high-product
                       (set-type (1+ (ldb b-temp 16. 16.)) dtp-fix))
                 ,finally)
               (parallel
                 (,store-high-product
                       (set-type (ldb b-temp 16. 16.) dtp-fix))
                 ,finally)))
         (parallel
           (,store-low-product
              (set-type (+ mpy-product (dpb b-temp 16. 16. 0)) dtp-fix))
           (if alu-carry
               (parallel
                 (,store-high-product
                       (set-type (+ (a-constant 177777_16.)
                                    (ldb b-temp 16. 16.)
                                    1)
                                 dtp-fix))
                 ,finally)
               (parallel
                 (,store-high-product
                       (set-type (+ (a-constant 177777_16.)
                                    (ldb b-temp 16. 16.))
                                 dtp-fix))
                 ,finally)))))))
```

```
;;; Arithmetic instructions that use multiplication

(defmicro set-a-temp (x)
  `(assign a-temp ,x))

(defmicro set-next-on-stack (x)
  `(assign next-on-stack ,x))

;Basic fixnum multiply subroutine.  No error checking.
;Takes two fixnums on the stack and returns their double-precision
;product as two fixnums on the stack (low-order result is pushed first).
(defucode 32-bit-multiply
  (mpy-32-32 next-on-stack top-of-stack
             set-next-on-stack newtop
             (return)))

;Instruction version of the above.
(definst %multiply-double (no-operand needs-stack)
  (parallel
    (check-fixnum-2args next-on-stack top-of-stack
      (otherwise (signal-error wrong-type-argument any (:fixnum))))
    (jump 32-bit-multiply)))

;Generic number multiplication.
(definst multiply-stack (no-operand needs-stack)
  (parallel
    ;; This cant be check-binary-arithmetic-operands-fast because that needs
    ;; the spec field
    (check-fixnum-2args next-on-stack top-of-stack
      (otherwise (sequential
                   (trap-no-save)
                   (check-binary-arithmetic-operands-fast no-operand %arith-op-multiply
                                                          multiply-stack fmul))))
    (mpy-32-32 next-on-stack top-of-stack
               pop2push set-a-temp nil))
  ;Now check for overflow.  Having trashed our args we are unpclsrable,
  ;but we can turn into a call-quick-external instruction.
  ;Fortunately the multiplier hardware does SETZ x SETZ correctly.
  ;Overflow occurs if any bits in high word not equal to sign of low word
  (parallel
    (trap-if (not (all-ones (- a-temp (complemented-sign-bit top-of-stack))))
             multiply-overflow)
    (next-instruction)))

;Generic number multiplication with an immediate argument
(definst multiply-immed signed-immediate-operand
  (parallel      ;Must check both args for fixnum to make magic-number win
    (check-binary-arithmetic-operands-fast signed-immediate-operand %arith-op-multiply
                                           multiply-stack fmul)
    (mpy-32-16 top-of-stack-a macro-signed-immediate newtop set-a-temp nil))
  ;Overflow checking
  (parallel
    (trap-if (not (all-ones (- a-temp (complemented-sign-bit top-of-stack))))
             multiply-overflow)
    (next-instruction)))

;;; Here a-temp is the top word of the overflowed result
;;; What we want to do here is convert the 62 bit result to be distributed 31 bits per
;;; word. Note tnat the only special case is setz * setz which will give setz in the top
;;; word and 0 in the bottom.
;;; *** If it is possible do selective deposit, it would be possible to bum a cycle ***
;;; *** Think about this when you have time to breath ***
(defucode multiply-overflow
  (parallel (trap-no-save)
            (assign b-temp (ldb top-of-stack 1 31.)))
  ;; Clear sign bit of the bottom word
  (newtop (set-type (ldb top-of-stack 31. 0) dtp-fix))
  ;; Put sign bit of bottom into sign bit of top 31 bits
  (assign a-temp (dpb b-temp 1 31. a-temp))
  ;; Now rotate it into the bottom bit
  (pushval (set-type (rotate a-temp 1) dtp-fix))
  (take-post-trap multiplicative-fixnum-overflow preserve-stack))
```

F:>lmach>ucode>map.lisp.29

```
;;; -*- Mode:Lisp; Package:Micro; Base:8; Lowercase:yes -*-
;;; (c) Copyright 1982, Symbolics, Inc.

;;; Microcode for Map Cache and Page Tags



;Get defmicro and all his hosts
#M
(declare (cond ((not (status feature lmucode))
                (load 'udcls))))
```

```
;Declared in SYSDF1:
;   %WIRED-VIRTUAL-ADDRESS-HIGH          ;Highest address in wired cold load.
;   %WIRED-PHYSICAL-ADDRESS-LOW          ;First physmem it is stored into.
;   %WIRED-PHYSICAL-ADDRESS-HIGH         ;Last physmem it is stored into.  [not used]

;Do not use any b-temps in this file, as it is best to be able to ignore map
;misses when writing the rest of the microcode.
;b-map-vma must be in the upper 16 B-memory locations to save cycles.

(reserve-scratchpad-memory 2451 2452 375 376)

(defareg a-map-addr)     ;Physical address to map (low 8 bits zero)
(defbreg b-map-vma)      ;Copy of VMA or temporary

(define-sysconstant %page-pht-miss)
(define-sysconstant %page-write-fault)

;; Don't forget!!!  The map write data come from ABUS!  Not OBUS!
(defmicro write-both-maps (a-source)
  `(parallel ,(get-to-abus a-source)
             (write-lbus-dev 37 7 nil)
             (microinstruction speed slow-first-half)))

(defmicro write-lru-map (a-source)
  `(parallel ,(get-to-abus a-source)
             (write-lbus-dev 37 4 nil)
             (microinstruction speed slow-first-half)))

(defmicro write-map-a (a-source)
  `(parallel ,(get-to-abus a-source)
             (write-lbus-dev 37 5 nil)
             (microinstruction speed slow-first-half)))

(defmicro write-map-b (a-source)
  `(parallel ,(get-to-abus a-source)
             (write-lbus-dev 37 6 nil)
             (microinstruction speed slow-first-half)))

;Conditional test valid while writing map
(defatomicro map-load-successful
  (microcondition mc-cond true (microinstruction)))

;Reading page tags
(defmicro page-tag-bit (n)
  (make-microcondition 'not-lbus-dev-cond 'false
                       `(write-lbus-dev 36 ,(dpb n 8302 3) nil)))

;0 if miss, non-zero if hit or vma-phys-addr.  Bits <33:32> of map read data.
(defatomicro map-select-code
  (parallel (microinstruction abus map speed very-slow)
            (ldb ybus-crocks-1 2 12.)))

;Write into the gc-map
(defmicro write-gc-map (adr val)
  (paralyze (get-to-abus adr)
            (get-to-bbus val)
            '(microinstruction spec load-special-maps magic 1)))

;Clear the map cache and the PHTC
;VMA used as a loop counter, called initially with zero in VMA
(defucode clear-map-cache
  ;; Write both maps with -1 (no-match tag)
  (write-both-maps (a-constant -1))
  ;; Mung until no good
  (assign vma (+ vma (b-constant 1_8)))
  (if (lesser-pointer vma (b-constant 1_20.))
      (goto clear-map-cache)
      (drop-through))
  ;; Make sure PHTC address and size, and ASN, are correct
  (write-lbus-dev 37 1 %current-phtc)
  ;; Get lower and upper bounds of PHTC
  (assign a-temp (logand %current-phtc (b-constant -1_16.)))
  (parallel (assign b-temp (dpb (b-constant -1) 12. 0 %current-phtc))
            (jump clear-phtc)))

(defucode clear-phtc
  (parallel
    (start-memory write physical a-temp)
    (assign memory-data (set-type (b-constant -1) dtp-fix)))
  (assign a-temp (1+ a-temp))
  (if (lesser-or-equal-pointer a-temp b-temp)
      (goto clear-phtc)
      (return)))

;Unmap page whose address is in VMA, from both the map cache and the PHTC
(defucode clear-page-from-map-cache
  ;; Clobber both maps, not bothering to check whether they really map that address
  ;; Could read the map and dispatch on bits <33:32>
  (write-both-maps (a-constant -1))
  (start-memory read address-phtc)
```

```
  (assign b-temp (ldb vma 8 20.))                        ;Extract tag field of VMA
  (if (equal-fixnum b-temp (ldb memory-data 8 24.))      ;Compare against PHTC entry
      (parallel
        (start-memory write address-phtc)
        (assign memory-data (set-type (a-constant -1) dtp-fix))
        (return))
      (return)))

;Unmap page whose address is in b-temp, from both tha map cache and the PHTC
(defucode clear-b-temp-page-from-map-cache
  (parallel (assign vma b-temp)
            (jump clear-page-from-map-cache)))

;Change map cache and PHTC to map page in VMA into corresponding stack buffer 0 page
(defucode map-page-to-stack-buffer
  (assign a-temp (logand vma (b-constant 3_8)))               ;Stack buffer page
  (assign a-temp (logior a-temp (b-constant 177760_8)))       ;Physical address
  (assign b-temp (logand (rotate vma 4) (b-constant 377_24.)))  ;VMA tag
  (parallel
    (start-memory write address-phtc)                         ;Write PHTC with value to go in map
    (assign memory-data (set-type (logior a-temp b-temp) dtp-fix)))
  (dispatch-after-this map-select-code                        ;See if map needs to be written
                   (assign a-temp (logior a-temp b-temp))
     ((0) (parallel (write-lru-map a-temp)                    ;Map cache miss
                    (return)))
     ((1) (parallel (write-map-a a-temp)                      ;Replace map A
                    (return)))
     ((2) (parallel (write-map-b a-temp)                      ;Replace map B
                    (return)))
     ((3) (return))))                                         ;Should not get here--ignore


;Map-miss traps here in normal case
(defucode-at-loc map-miss 10001
  ;; Copy VMA to B side while waiting for PHTC entry to come from memory
  (parallel
    (trap-save)
    (assign b-map-vma vma)
    (declare-memory-timing active-cycle))
  ;; Refill map from PHTC entry and see whether VMA tag in PHTC entry matches
  (parallel
    (trap-restore-1)
    (write-lru-map memory-data)
    (if map-load-successful
        (parallel
          (trap-restore-2)        ;exits
          (assign %count-map-reloads (1+ %count-map-reloads)))
        (goto phtc-miss))))

;Come here if page not found in PHTC, with a trap-restore-1 just done
(defucode phtc-miss
  ;; Check for page temporarily mapped into A-memory for stack buffer
  ;; Currently we know that there is only one mappable stack buffer, the main
  ;; stack buffer at 0@A.  The auxiliary one is not mappable.
  (parallel
    (trap-save)            ;undoes trap-restore-1
    (if (greater-or-equal-pointer b-map-vma %stack-buffer-low)
        (if (lesser-or-equal-pointer b-map-vma %stack-buffer-limit)
            (sequential
              (assign a-map-addr (logand b-map-vma (a-constant 3_8)))    ;Which s.b. page
              (parallel (assign a-map-addr (logior a-map-addr (b-constant 177760_8)))
                        (jump map-miss-satisfied)))
            (drop-through))
        (drop-through)))
  ;; Check for permanently-wired portion of virtual memory
  (if (lesser-pointer b-map-vma %wired-virtual-address-high)
      (sequential
        (assign a-map-addr (+ b-map-vma %wired-physical-address-low))
        (parallel (assign a-map-addr (logand a-map-addr (b-constant 177777_8)))
                  (jump map-miss-satisfied)))
      (drop-through))
  ;; Escape to macrocode map miss handler.  Don't leave garbage in the map.
  (write-lru-map (a-constant -1))
  (parallel (assign a-temp %page-pht-miss)
            (jump page-fault)))

;Here with a-map-addr containing the physical page to map to, in bits 23-8
(defucode map-miss-satisfied
  ;; Get VMA tag field properly aligned, and no write-protect
  (assign b-map-vma (logand (rotate vma 4) (b-constant 377_24.)))
  (assign a-map-addr (logior a-map-addr b-map-vma))
  (trap-restore
    ;; Maintain metering counter
    (assign %count-map-reloads (1+ %count-map-reloads))
    ;; Refill least-recently-used map location addressed by VMA
    (write-lru-map a-map-addr)))
```

```
;Map miss while in block read, VMA incremented one or two extra times,
;no PHTC probe in progress.
;For these I am just going to pclsr and try again (could check PHTC first)
(defucode-at-loc map-miss-block1 10011
  (parallel
    (trap-save)
    (assign vma (- vma (b-constant 1))))
  (parallel (assign a-temp %page-pht-miss)
            (jump page-fault)))

(defucode-at-loc map-miss-block2 10021
  (parallel
    (trap-save)
    (assign vma (- vma (b-constant 2))))
  (parallel (assign a-temp %page-pht-miss)
            (jump page-fault)))

;Here if map miss while in block write, or write protect violation
;No proper PHTC probe in progress
(defucode-at-loc map-write-miss 10031
  ;; Read the map to determine which it is
  (parallel
    (trap-save)
    (if (zero-fixnum map-select-code)
        (parallel
          (trap-restore-1)
          (assign b-map-vma vma)
          (jump phtc-miss))
        (parallel
          (assign a-temp %page-write-fault)
          (jump page-fault)))))


;Hardware subprimitives

;Arguments are vma and word to be written
;We must clobber any previous mapping for that virtual page
;Macrocode takes care of any necessary clobbering of PHTC
;The 0 case here is a little bit of overkill; we could simply never touch
;the map when there was a miss, and let a refill from PHTC take care of it.
(definst %map-cache-write (no-operand smashes-stack)
  (parallel
    (check-arg-type 0 next-on-stack dtp-fix)
    (assign vma next-on-stack)
    (decrement-stack-pointer))
  (parallel
    (dispatch-after-this map-select-code
                         (check-arg-type 1 (amem (stack-pointer 1)) dtp-fix)
      ((0) (if (all-ones (amem (stack-pointer 1)))            ;Map cache miss.  Clearing?
               (parallel (decrement-stack-pointer)             ;Clearing--leave alone
                         (next-instruction))
               (parallel (write-lru-map (amem (stack-pointer 1))) ;Writing--put into LRU map
                         (decrement-stack-pointer)
                         (next-instruction))))
      ((1) (parallel (write-map-a (amem (stack-pointer 1)))     ;Original TOS to map A
                     (decrement-stack-pointer)
                     (next-instruction)))
      ((2) (parallel (write-map-b (amem (stack-pointer 1)))     ;Original TOS to map B
                     (decrement-stack-pointer)
                     (next-instruction)))
      ((3) (parallel (decrement-stack-pointer)                  ;Should not get here--ignore
                     (next-instruction))))))

;Use the PHTC hashbox to read an entry.  Arg is virtual address.
(definst %phtc-read no-operand
  (parallel
    (check-arg-type 0 top-of-stack-a dtp-fix)
    (assign vma top-of-stack-a))
  (start-memory read address-phtc)
  (nop)
  (parallel
    (transport data)                           ;Crash here if no data typa tag
    (newtop memory-data)
    (next-instruction)))

;Use the PHTC hashbox to write an entry.  Args are virtual address and entry.
(definst %phtc-write (no-operand smashes-stack)
  (parallel
    (check-arg-type 0 next-on-stack dtp-fix)
    (assign vma next-on-stack)
    (decrement-stack-pointer))
  (parallel
    (check-arg-type 1 (amem (stack-pointer 1)) dtp-fix)
    (start-memory write address-phtc)
    (assign memory-data (amem (stack-pointer 1)))
    (decrement-stack-pointer)
    (next-instruction)))

;Write into the PHTC address, size, ASN register
(definst %phtc-setup (no-operand needs-stack smashes-stack)
  (parallel
```

```
    (check-fixnum-1arg-b top-of-stack)
    (write-lbus-dev 37 1 top-of-stack)
    (assign %current-phtc top-of-stack)
    (decrement-stack-pointer)
    (next-instruction)))

;Set up address for page tag
;You had better have disabled tasking in the previous cycle
(defmicro address-page-tag (phys-addr)
  '(start-memory read physical ,phys-addr inhibit-page-tags))

;Write into the page reference tag from t or nil
(definst %reference-tag-write (no-operand smashes-stack)
  (assign a-temp next-on-stack)                      ;Move address to faster memory
  (parallel
    (decrement-stack-pointer)
    (disable-tasking)
    (if (data-type? top-of-stack-a dtp-nil)
        (sequential
          (parallel (check-arg-type 0 a-temp dtp-fix)
                    (address-page-tag a-temp))
          (parallel (write-lbus-dev 36 21 nil)
                    (decrement-stack-pointer)
                    (next-instruction)))
        (sequential
          (parallel (check-arg-type 0 a-temp dtp-fix)
                    (address-page-tag a-temp))
          (parallel (write-lbus-dev 36 31 nil)
                    (decrement-stack-pointer)
                    (next-instruction))))))

;Read reference tag as t or nil
(definst %reference-tag-read no-operand
  (parallel
    (disable-tasking)
    (assign a-temp top-of-stack-a))                  ;Move address to faster memory
  (parallel
    (check-arg-type 0 a-temp dtp-fix)
    (address-page-tag a-temp))
  (if (page-tag-bit 1)
      (goto true1)
      (goto false1)))

;Write into the GC tag from t or nil
(definst %gc-tag-write (no-operand smashes-stack)
  (assign a-temp next-on-stack)                      ;Move address to faster memory
  (parallel
    (disable-tasking)
    (decrement-stack-pointer)
    (if (data-type? top-of-stack-a dtp-nil)
        (sequential
          (parallel (check-arg-type 0 a-temp dtp-fix)
                    (address-page-tag a-temp))
          (parallel (write-lbus-dev 36 01 nil)
                    (decrement-stack-pointer)
                    (next-instruction)))
        (sequential
          (parallel (check-arg-type 0 a-temp dtp-fix)
                    (address-page-tag a-temp))
          (parallel (write-lbus-dev 36 11 nil)
                    (decrement-stack-pointer)
                    (next-instruction))))))

;Read GC tag as t or nil
(definst %gc-tag-read no-operand
  (parallel
    (disable-tasking)
    (assign a-temp top-of-stack-a))                  ;Move address to faster memory
  (parallel
    (check-arg-type 0 a-temp dtp-fix)
    (address-page-tag a-temp))
  (if (page-tag-bit 0)
      (goto true1)
      (goto false1)))

;Scan the reference tags, returning NIL or the physical address of the first page
;whose tag is not set.  As we pass over each tag which is set, clear it.
;No time available for type checking the second argument
(definst %scan-reference-tags (no-operand needs-stack)
  (parallel
    (check-arg-type 0 next-on-stack dtp-fix)
    (if (greater-or-equal-fixnum-unsigned next-on-stack top-of-stack)
        (parallel (pop2push quote-nil)
                  (next-instruction))
        (drop-through)))
  (parallel
    (assign a-temp next-on-stack)                    ;Move address to faster memory
    (disable-tasking))
  (address-page-tag a-temp)
  (parallel
```

```
    (if (not (page-tag-bit 1))
        (parallel (pop2push next-on-stack)
                  (next-instruction))
        (drop-through))
    (disable-tasking))
  (address-page-tag a-temp)
  (parallel (assign next-on-stack (+ next-on-stack (b-constant *page-size*)))
            (write-lbus-dev 36 21 nil)
            (jump %scan-reference-tags)))

;Scan the GC tags, returning NIL or the physical address of the first page whose tag is set.
;This is bummed for speed (2 cycles per page).
(definst %scan-gc-tags (no-operand needs-stack)
  (parallel
    (check-fixnum-2args next-on-stack top-of-stack)
    (assign a-temp next-on-stack))                    ;Move address to faster memory
  (parallel
    (assign b-temp (- top-of-stack-a (b-constant *page-size*)))
    (disable-tasking)
    (jump scan-gc-tags-loop)))

(defucode scan-gc-tags-loop
  ;; First cycle emits physical address, checks for done
  (parallel
    (address-page-tag a-temp)
    (if (greater-or-equal-fixnum-unsigned a-temp b-temp)
        ;; Doing last location (do it differently to avoid reading random address)
        (if (page-tag-bit 0)
            (parallel (pop2push (set-type a-temp dtp-fix))
                      (next-instruction))
            (parallel (pop2push quote-nil)
                      (next-instruction)))
        (drop-through)))
  ;; Second cycle tests the tag bit, increments address, disables tasking after next
  (parallel
    (assign a-temp (+ a-temp (b-constant *page-size*)))
    (disable-tasking)
    (if (page-tag-bit 0)
        (parallel (pop2push (set-type (- a-temp (b-constant *page-size*)) dtp-fix))
                  (next-instruction))
        (goto scan-gc-tags-loop))))

;Write into the gc map.  Args are virtual address and contents (including odd parity).
(definst %gc-map-write (no-operand needs-stack smashes-stack)
  (parallel
    (check-fixnum-2args next-on-stack top-of-stack)
    (decrement-stack-pointer))
  (parallel
    (write-gc-map top-of-stack-a top-of-stack)
    (decrement-stack-pointer)
    (next-instruction)))
```

F:>lmach>ucode>IFU.LISP.56

```
;;; -*- Mode:Lisp; Package:Micro; Base:8; Lowercase:yes -*-
;;; (c) Copyright 1982, Symbolics, Inc.

; Microcode for IFU simulation

;Get defmicro and all his hosts
#M
(declare (cond ((not (status feature lmucode))
                (load 'udcls))))

(reserve-scratchpad-memory 2440 2444)
(defareg a-instruction)                         ;Current instruction
(defareg a-break-pc 0)                          ;Stop before executing instruction here

(defucode main-loop
  (parallel (assign vma pc)                     ;Fetch instruction (pair)
            (assign b-temp pc)
            (check-data-type pc dtp-even-pc dtp-odd-pc)
            ;; Increment PC, start memory, take appropriate instruction halfword,
            ;; and halt if macrocode breakpoint reached
            (if (data-type? pc dtp-even-pc)
                (sequential (parallel
                              (start-memory read)
                              (assign pc (set-type pc dtp-odd-pc)))
                            (if (equal-typed-pointer b-temp a-break-pc)
                                (parallel
                                  (assign a-instruction (ldb memory-data 16. 0))
                                  (halt breakpoint))
                                (assign a-instruction (ldb memory-data 16. 0))))
                (sequential (parallel
                              (start-memory read)
                              (assign pc (set-type (1+ pc) dtp-even-pc)))
```

```
                    (if (equal-typed-pointer b-temp a-break-pc)
                        (parallel
                          (assign a-instruction (ldb memory-data 16. 16.))
                          (halt breakpoint))
                        (assign a-instruction (ldb memory-data 16. 16.))))))
  (assign b-temp (logand (rotate a-instruction 26.)     ;(ldb 8 8) then shift left 2
                         (b-constant 377_2)))
  (parallel
    (long-dispatch b-temp)                          ;Can't overlap with byte operation above
    (call-and-return-to main-loop-1 main-loop)))

(defucode main-loop-1
  (parallel
    (assign inst (ldb a-instruction 8 0))
    (take-dispatch)))

(defucode-at-loc no-operand-subdispatch 376_2
  (assign b-temp (dpb a-instruction 9 2 (b-constant 1000_2)))
  (long-dispatch b-temp)
  (take-dispatch))
```

F:>lmach>ucode>funcall3.lisp.61

```
;;; -*- Mode:Lisp; Package:Micro; Base:8; Lowercase:yes -*-
;;; (c) Copyright 1982, Symbolics, Inc.

; Microcode for function call/return (part 4)
; This file contains function return & housekeeping instructions

;--- use fast-blt-stack rather than blt-stack, but make it take
;--- its argument in xbas so we don't have to save and restore FP

;Get defmicro and all his hosts
#M
(declare (cond ((not (status feature lmucode))
                (load 'udcls))))


;;; Function Return

;Temporary registers local to these routines
(reserve-scratchpad-memory 2420 2424)

(defareg a-temp-prev-frame)
(defareg a-temp-misc-data)

;Typical of a class of single value returning instructions which try
;to use a quick path through the code if no special conditions occur.
;
;Care is needed in dealing with the PC.  If we page fault on an instruction
;fetch, the current frame had better be one that we are supposed to be
;returning from, the top of the stack had better be the value being returned,
;and the PC had better point at a RETURN-STACK instruction.
;With the real IFU, the EPC remains pointing at the original return-stack.
;On the PROTO machine and the simulator, no page faults can occur.
;With the TMC, writing the PC cannot be undone, so we avoid page
;faults by not pre-fetching the instructions being returned to,
;losing some time.
;On the TMC5.

(definst return-stack (no-operand needs-stack)
  (keep-function-history return)
  (parallel (check-arg-type return-pc frame-return-pc dtp-even-pc dtp-odd-pc)
            (assign pc frame-return-pc))
  (sequential   ;--- make this parallel when you are trying to make the machine fast
                ;--- I would suggest putting lognand into the non-wierd alu functions
    (trap-if (not-zero-fixnum frame-cleanup-bits)
             ;Must escape to the slower, more general return microcode.
             (parallel (trap-no-save)
                       (assign a-temp (set-type (b-constant 1) dtp-fix))
                       (assign b-temp obus)
                       (jump general-return)))
    (machine-version-case
      ((ifu tmc5) (start-memory read block instruction-fetch))
      (otherwise nil)))
  (parallel (assign stack-pointer frame-previous-top)
            (dispatch-after-this (cdr-code frame-previous-top)
                          (assign frame-pointer frame-previous-frame)
              ((0)      ;Ignore
               (parallel (assign top-of-stack top-of-stack-a)
                         (next-instruction)))
              ((1)      ;Stack
               (parallel (pushval top-of-stack)
                         (next-instruction)))
              ((2)      ;Return
               (parallel (pushval top-of-stack)
                         (clear-stack-adjustment)
                         (jump return-stack)))
```

```
((3)      ;Multiple
 (pushval top-of-stack)
 (parallel (pushval (set-type (b-constant 1) dtp-fix))
           (next-instruction))))))

;The more general, multiple-value-returning instruction
(definst return-n unsigned-immediate-operand
  ;--- insert code here to look at all the values and do unsafe-ptr checks
  (parallel (assign a-temp (set-type macro-unsigned-immediate dtp-fix))
            (assign b-temp obus)
            (jump general-return)))

;The even more general one, returning a variable number of values
;The count is on the stack, i.e. it is a multiple group
(definst return-multiple no-operand
  ;--- insert code here to look at all the values and do unsafe-ptr checks
  (parallel (check-arg-type top-of-stack top-of-stack-a dtp-fix)
            (assign a-temp top-of-stack-a)
            (assign b-temp obus)
            (decrement-stack-pointer)
            (jump general-return)))

;Values to be returned are on the stack
;Values on the stack have already been filtered for unsafe pointers
;The top-of-stack register need not be valid
;a-temp and b-temp have the number of values
;The PC is irrelevant since if we trap, we will change the PC to point
;to a return-multiple instruction, and push the number of values onto the stack.
;This is necessary since we can get here from a variety of different,
;incompatible return instructions, and we don't know how to restore their
;arguments so that they can be used to retry the return operation.
;We cannot do instruction prefetching on the code being returned to,
;because the page fault would happen with the pc inconsistent with fp/sp.
(defucode general-return
  ;; The general idea is to blt the values down from the top of the returning
  ;; frame to the top of the caller frame, then check whether the caller
  ;; frame needs to brought into the stack buffer.  But we start by dispatching
  ;; on the value disposition which affects whether or not we blt all the
  ;; values down as well as what to do about the PC.
  (keep-function-history return)
  (dispatch-after-this (cdr-code frame-previous-top)
       ;; Xct-next: Check for exceptions other than stack buffer underflow
       (trap-if (bit-test frame-misc-data
                          (b-constant (logxor (byte-mask frame-buffer-underflow-bit)
                                              (byte-mask frame-cleanup-bits))))
                general-return-cleanup)
    ((0)         ;Ignore
     (parallel (check-arg-type return-pc frame-return-pc dtp-even-pc dtp-odd-pc)
               (assign pc frame-return-pc))
     (assign stack-pointer frame-previous-top)
     (assign top-of-stack top-of-stack-a)
     (if (not (bit frame-buffer-underflow-bit))
         (parallel (assign frame-pointer frame-previous-frame)
                   (next-instruction))
         (sequential (assign frame-pointer frame-previous-frame)
                     (take-post-trap reload-stack-buffer preserve-stack))))
    ((1)         ;Stack
     (parallel (check-arg-type return-pc frame-return-pc dtp-even-pc dtp-odd-pc)
               (assign pc frame-return-pc))
     (if (zero-fixnum a-temp)
         ;; Returning no values.  Return nil (rather than error!)
         (assign top-of-stack quote-nil)
         ;; Return first value
         (sequential
           (assign stack-pointer (- stack-pointer b-temp))
           (assign top-of-stack (amem (stack-pointer 1)))))
     (assign stack-pointer frame-previous-top)
     (if (not (bit frame-buffer-underflow-bit))
         (sequential (assign frame-pointer frame-previous-frame)
                     (parallel (pushval top-of-stack)
                               (next-instruction)))
         (sequential (assign frame-pointer frame-previous-frame)
                     (pushval top-of-stack)
                     (take-post-trap reload-stack-buffer preserve-stack))))
    ((2)         ;Return
     (parallel (assign a-temp-misc-data frame-misc-data)
               (call blt-values-down))
     (assign frame-pointer a-temp-prev-frame)
     (if (not (bit-test a-temp-misc-data
                        (b-constant (byte-mask frame-buffer-underflow-bit))))
         ;Now return from caller's frame to his caller
         (goto general-return)
         ;Reload stack buffer, then popj to RETURN-MULTIPLE instruction
         (sequential
           (pushval (set-type a-temp dtp-fix))         ;Number of values returning
           (take-jump-trap-with-continuation reload-stack-buffer
                                             return-multiple-escape-pc
                                             preserve-stack))))
```

```
((3)        ;Multiple
 (parallel (check-arg-type return-pc frame-return-pc dtp-even-pc dtp-odd-pc)
           (assign pc frame-return-pc))
 (parallel (assign a-temp-misc-data frame-misc-data)
           (call bit-values-down))
 (assign frame-pointer a-temp-prev-frame)
 (if (not (bit-test a-temp-misc-data
                    (b-constant (byte-mask frame-buffer-underflow-bit))))
     ;;Now finish off by storing number of values returned
     (parallel (pushval (set-type a-temp dtp-fix))
               (next-instruction))
     ;;Reload stack buffer, then popj
     (sequential
       (pushval (set-type a-temp dtp-fix))  ;Number of values returning
       (take-jump-trap-with-continuation reload-stack-buffer pc preserve-stack))))))

;Here if a frame being deallocated needs some cleanup, typically popping
;of associated binding and data stack frames, or checking of potentially
;unsafe pointers.  The cleanup may involve calling a macrocode routine
;and arranging for it to return to an appropriate PC.
;If an error signalled here, the PC may not be meaningful (due to d-return)
;Note that if we go back around to general-return a-temp and b-temp must still be valid
(defucode general-return-cleanup
  (parallel
    (trap-no-save)
    (if (bit frame-catch-bit)
        (goto catch-cleanup)
        (drop-through)))

  (if (bit frame-bindings-bit)
      (sequential
        (parallel
          (pushval (set-type a-temp dtp-fix))   ;Number of values returning
          (clear-stack-adjustment))             ;Leave this in the stack if we trap
        (restart-pc return-multiple-escape-pc)  ;PC -> RETURN-MULTIPLE instruction in
        (parallel                               ; case of a page fault
          (accept-restart-pc)
          (call frame-cleanup-bind-stack-unwind))
        (parallel (assign a-temp top-of-stack)  ;Retrieve number of values
                  (assign b-temp top-of-stack)
                  (decrement-stack-pointer)
                  (jump general-return)))
      (drop-through))

  (if (bit frame-bottom-bit)
      (sequential                               ;Return one value from stack group
        (if (zero-fixnum a-temp)
            ;Returning no values.  Return nil (rather than error!)
            (pushval quote-nil)
            ;Return first value
            (sequential (assign xbas (- stack-pointer b-temp))
                        (pushval (amem (xbas 1)))))
        (take-jump-trap stack-group-exhausted preserve-stack))
      (drop-through))

  (if (bit frame-trace-bit)
      (sequential
        (pushval (set-type a-temp dtp-fix))     ;Make values a multiple group
        (signal-error-no-restore-stack return-from-traced-frame))
      (drop-through))

  ;Some unknown frame-cleanup bit was set
  (pushval (set-type a-temp dtp-fix))           ;Make values a multiple group
  (signal-error-no-restore-stack garbage-in-frame-cleanup-bits))

;Get rid of a catch block in this frame, then try to return again
;Preserve a-temp and b-temp (for general-return)
(defucode catch-cleanup
  (assign xbas %catch-block-list)               ;Inspect the catch block
  (if (equal-typed-pointer (amem (xbas 0))      ;catch-block-tag
                           b-quote-t)           ;unwind-protect  (--- change tag later ---)
      (sequential
        (parallel
          (pushval (set-type a-temp dtp-fix))   ;Number of values returning
          (clear-stack-adjustment))             ;Leave this in the stack if we trap
        (restart-pc return-multiple-escape-pc)  ;RETURN-MULTIPLE instruction pair
        (parallel (accept-restart-pc)
                  (assign a-catch-nwords (1+ a-temp))
                  (jump catch-close-1)))        ;Run cleanup handler then retry return
      (drop-through))
  ;Not an unwind-protect.  Simply unthread it from the list and continue
  (parallel (assign %catch-block-list (amem (xbas 3)))  ;catch-block-previous
            (assign b-temp-2 obus))
  (if (data-type? %catch-block-list dtp-nil)
      (parallel (assign frame-catch-bit (b-constant 0))
                (jump general-return))
      (if (lesser-pointer b-temp-2 frame-pointer)
          (parallel (assign frame-catch-bit (b-constant 0))
                    (jump general-return))
          (goto catch-cleanup))))               ;more catch blocks in this frame
```

```
;Subroutine of general-call for case where all values may be needed
;Simply sets up the correct arguments for blt-stack
;Returns with correct value in stack-pointer
;and a-temp-prev-frame having what belongs in frame-pointer
;Here the number of values is in a-temp and b-temp rather than
;on the top of the stack
(defucode blt-values-down
  (assign a-temp-2 frame-previous-top)
  (assign a-temp-prev-frame frame-previous-frame)
  (parallel (assign frame-pointer (- stack-pointer b-temp))
            (assign b-temp-2 stack-pointer))
  (parallel (assign stack-pointer a-temp-2)
            (jump blt-stack)))

;Some words are to be pushed into the stack.  frame-pointer points before
;the first of them and b-temp-2 points at the last of them.
;frame-pointer is smashed.
;3 cycles per word moved plus 3 cycles of overhead.
;Could be sped up to 2 cycles per if we had two counters that addressed Amem.
(defucode blt-stack
  (assign frame-pointer (1+ frame-pointer))
  (if (greater-pointer frame-pointer b-temp-2) (return)
      (parallel (pushval-with-cdr (amem (frame-pointer 0)))
                (jump blt-stack))))

;Fast version of above, using unrolled loop
;Some words are to be pushed into the stack.  frame-pointer points before
;the first of them and b-temp-2 points at the last of them.
;frame-pointer, a-temp2 are smashed.
;Time to move N words = 2+N  (1<N<9)
;  N=0 => 2.  N=1 => 4.  N>8 => 11(N/8)+time(N mod 8)  (-3 if N mod 8 = 0)
;35 control memory locations.
(defucode fast-blt-stack
  (parallel     ;Negative number of words to do, minus one to make ALU happy
    (assign a-temp-2 (set-type (- frame-pointer b-temp-2 1) dtp-77))
    (if (equal-pointer frame-pointer b-temp-2) (return)
        (parallel
          (if (minus-fixnum (+ a-temp-2 (b-constant 8) 1))
              (sequential       ;More than 8 words, move 8 and retry
                (parallel
                  (pushval-with-cdr (amem (frame-pointer 1)))
                  (call fast-blt-stack-8))
                (parallel
                  (assign frame-pointer (+ frame-pointer (b-constant 8)))
                  (jump fast-blt-stack)))
              (parallel         ;Less than 8 words, move 1 and dispatch
                (pushval-with-cdr (amem (frame-pointer 1)))
                (take-dispatch)))
          (dispatch-after-next (ldb a-temp-2 3 0)
            ((6) (return))                                       ;1
            ((5) (parallel (pushval-with-cdr (amem (frame-pointer 2)))   ;2
                           (return)))
            ((4) (pushval-with-cdr (amem (frame-pointer 2)))     ;3
                 (parallel (pushval-with-cdr (amem (frame-pointer 3)))
                           (return)))
            ((3) (pushval-with-cdr (amem (frame-pointer 2)))     ;4
                 (pushval-with-cdr (amem (frame-pointer 3)))
                 (parallel (pushval-with-cdr (amem (frame-pointer 4)))
                           (return)))
            ((2) (pushval-with-cdr (amem (frame-pointer 2)))     ;5
                 (pushval-with-cdr (amem (frame-pointer 3)))
                 (pushval-with-cdr (amem (frame-pointer 4)))
                 (parallel (pushval-with-cdr (amem (frame-pointer 5)))
                           (return)))
            ((1) (pushval-with-cdr (amem (frame-pointer 2)))     ;6
                 (pushval-with-cdr (amem (frame-pointer 3)))
                 (pushval-with-cdr (amem (frame-pointer 4)))
                 (pushval-with-cdr (amem (frame-pointer 5)))
                 (parallel (pushval-with-cdr (amem (frame-pointer 6)))
                           (return)))
            ((0) (pushval-with-cdr (amem (frame-pointer 2)))     ;7
                 (pushval-with-cdr (amem (frame-pointer 3)))
                 (pushval-with-cdr (amem (frame-pointer 4)))
                 (pushval-with-cdr (amem (frame-pointer 5)))
                 (pushval-with-cdr (amem (frame-pointer 6)))
                 (parallel (pushval-with-cdr (amem (frame-pointer 7)))
                           (return)))
            ((7) (goto fast-blt-stack-8)))))))                 ;8

(defucode fast-blt-stack-8
  (pushval-with-cdr (amem (frame-pointer 2)))
  (pushval-with-cdr (amem (frame-pointer 3)))
  (pushval-with-cdr (amem (frame-pointer 4)))
  (pushval-with-cdr (amem (frame-pointer 5)))
  (pushval-with-cdr (amem (frame-pointer 6)))
  (pushval-with-cdr (amem (frame-pointer 7)))
  (parallel (pushval-with-cdr (amem (frame-pointer 8)))
            (return)))
```

```
(definst popj no-operand
  (parallel (check-arg-type top-of-stack top-of-stack-a dtp-even-pc dtp-odd-pc)
            (set-pc top-of-stack-a
                    (for-effect (popval)))))

;Top N stock locations to be preserved, squeeze return PC out from under there
;--- This can be written better when blt-stack is changed to use xbas
(definst popj-n unsigned-immediate-operand
  (assign xbas (- stack-pointer macro-unsigned-immediate))
  (parallel (check-arg-type nil (amem (xbas 0)) dtp-even-pc dtp-odd-pc)
            (assign a-temp-2 (amem (xbas 0))))
  (parallel (assign a-temp frame-pointer))
  (parallel (assign frame-pointer (- stack-pointer macro-unsigned-immediate))
            (assign b-temp-2 stack-pointer))
  (parallel (assign stack-pointer (1- frame-pointer))
            (call blt-stack))
  (assign frame-pointer a-temp)
  (set-pc a-temp-2))  ;Set PC after all side-effects out of way, in case pg flt

;Multiple at top of stack to be preserved, squeeze return PC out from under
;--- This can be written better when blt-stack is changed to use xbas
(definst popj-multiple (no-operand needs-stack)
  (assign xbas (- stack-pointer top-of-stack 1))
  (parallel (check-arg-type nil (amem (xbas 0)) dtp-even-pc dtp-odd-pc)
            (assign a-temp-2 (amem (xbas 0))))
  (parallel (assign a-temp frame-pointer))
  (parallel (assign frame-pointer (- stack-pointer top-of-stack 1))
            (assign b-temp-2 stack-pointer))
  (parallel (assign stack-pointer (1- frame-pointer))
            (call blt-stack))
  (assign frame-pointer a-temp)
  (set-pc a-temp-2))  ;Set PC after all side-effects out of way, in case pg flt


;Instructions for picking up multiple values left in the stack

;For now, the only one I will do is the one for a fixed number of
;values, not the multiple-value-list, &optional, and &rest ones.

;The values and the number of them are on the stack.

;Take specified number of values.  Adjust the size of the block of values
;on the stack, and get rid of the values count.
(definst take-values unsigned-immediate-operand
  (parallel
    (check-arg-type top-of-stack top-of-stack-a dtp-fix)
    (if (equal-fixnum top-of-stack-a macro-unsigned-immediate)
        ;Have right number of values, just flush count and exit
        (parallel (for-effect (popval))
                  (next-instruction))
        (drop-through)))
  (parallel
    (assign b-temp (- top-of-stack-a macro-unsigned-immediate))
    (decrement-stack-pointer)
    (if (plus-or-zero-fixnum obus)      ;-or-zero to make ALU happy
        ;Have too many values, flush extraneous ones and the count
        (sequential     ;Pop extraneous values
          (assign stack-pointer (- stack-pointer b-temp))
          (parallel (assign top-of-stack (amem (stack-pointer 0)))
                    (next-instruction)))
        ;Not enough values, push some NILs
        (goto push-missing-values))))

;Push (minus b-temp) nils
;This takes two cycles per nil, and could be bummed to take 9/8 cycle
(defucode push-missing-values
  (parallel (assign b-temp (1+ b-temp))
            (if (plus-or-zero-fixnum obus)
                (parallel (pushval quote-nil)
                          (next-instruction))
                (parallel (pushval quote-nil)
                          (jump push-missing-values)))))

;;; The more general, slower calling code (more than 4 arguments,
;;; variable number of arguments, restarting from trapped call)

;This instruction starts up a call in the current frame.  Normally there
;will be nothing pushed after the frame header, but there could be an
;environment or other extra arguments.
(definst restart-trapped-call no-operand
  (dispatch-after-next frame-argument-format
    ((%frame-arguments-normal) (goto general-call-1))
    ((%frame-arguments-lexpr) (goto restart-lexpr-funcall))
    ((%frame-arguments-instance) (goto method-call-1))
    ((%frame-arguments-lexpr-instance) (goto restart-lexpr-method-call)))
  (parallel
    (assign a-nargs frame-number-of-args)
    (assign b-temp frame-number-of-args)
    (take-dispatch)))
```

```
;Current frame is all set up and a-nargs has the number of arguments.
;Perform the call
(defucode general-call-1
  (parallel (trap-if (not-data-type? frame-function dtp-compiled-function)
                     general-call-funny-function)
            (function-entry-instruction-fetch frame-function))
                ;Last place to page fault.  Point PC after the entry instr, not
                ;setting it until we are guaranteed there will be no page fault.
                ;If caller gave many args, only slow case of callee applies
                ;Otherwise dispatch to appropriate code for number of args

  (dispatch-after-next (ldb a-nargs 3 0)
    ((0) (goto call-indirect-disp-0))
    ((1) (goto call-indirect-disp-1))
    ((2) (goto call-indirect-disp-2))
    ((3) (goto call-indirect-disp-3))
    ((4) (goto call-indirect-disp-4)))
  (parallel
    (trap-if (greater-fixnum a-nargs (b-constant 4))
             (parallel
               (trap-no-save)
               (declare-memory-timing data-cycle)       ;compiler check is conservative
               (if (zero-fixnum (entry-instruction-dispatch memory-data))
                   (sequential
                     (keep-function-history call)
                     (next-instruction))
                   (signal-error-no-restore-stack wrong-number-of-arguments))))
    (take-dispatch)))

;Same when entering a method.  The first two arguments have already been pushed into
;the callee's frame.
(defucode method-call-1
  (parallel (trap-if (not-data-type? frame-function dtp-compiled-function)
                     general-call-funny-function)
            (function-entry-instruction-fetch frame-function))
                ;Last place to page fault.  Point PC points after the entry instr.
                ;If caller gave many args, only slow case of callee applies
                ;Otherwise dispatch to appropriate code for number of args
                ;Note that the first two "arguments" (self and self-mapping-table)
                ;have already been received.
  ;; Same timing comment applies as above
  (dispatch-after-next (ldb a-nargs 2 0)
    ((0) (call-indirect-part-3 2 t))
    ((1) (call-indirect-part-3 3 t))
    ((2) (call-indirect-part-3 4 t)))
  (parallel
    (trap-if (greater-fixnum a-nargs (b-constant 2))
             (parallel
               (trap-no-save)
               (declare-memory-timing data-cycle)       ;compiler check is conservative
               (if (zero-fixnum (entry-instruction-dispatch memory-data))
                   (sequential
                     (keep-function-history call)
                     (next-instruction))
                   (signal-error-no-restore-stack wrong-number-of-arguments))))
    (take-dispatch)))


;;; Lexpr calling

;restart-trapped-call will come back here.  This is analogous to general-call-1.
(defucode restart-lexpr-funcall
  (parallel (trap-if (not-data-type? frame-function dtp-compiled-function)
                     general-call-funny-function)
            (function-entry-instruction-fetch frame-function))
                ;Last place to page fault.  Point PC after the entry instr.
  (nop)
  (keep-function-history call)
  (dispatch-after-next (entry-instruction-dispatch memory-data)
     ((0) (next-instruction))                   ;Callee will do it himself
     ;Here callee does not want a rest argument.  So this is either too
     ;many arguments, or need to call a support routine to pop some
     ;arguments off the list, which is known not to be NIL.
     ;Put in b-temp the maximum number of spread arguments the callee wants.
     ((1) (lexpr-funcall-fast 0 b-temp))
     ((2 3) (lexpr-funcall-fast 1 b-temp))
     ((4 5 6) (lexpr-funcall-fast 2 b-temp))
     ((7 10 11 12) (lexpr-funcall-fast 3 b-temp))
     ((13 14 15 16 17) (lexpr-funcall-fast 4 b-temp)))
                ;Check for space in stack buffer
  (parallel (trap-if (greater-pointer stack-pointer stack-limit)
                     (take-jump-trap stack-buffer-overflow-handler preserve-stack))
            (take-dispatch)))
```

```
;Same for case where a method is being invoked and hence the first two "arguments" are there
(defucode restart-lexpr-method-call
  (parallel (trap-if (not-data-type? frame-function dtp-compiled-function)
                     general-call-funny-function)
            (function-entry-instruction-fetch frame-function))
               ;Last place to page fault.  Point PC after the entry instr.
  (nop)
  (keep-function-history call)
  (dispatch-after-next (entry-instruction-dispatch memory-data)
     ((0) (next-instruction))                       ;Callee will do it himself
     ;Here callee does not want a rest argument.  So this is either too
     ;many arguments, or need to call a support routine to pop some
     ;arguments off the list, which is known not to be NIL.
     ;Put in b-temp the maximum number of spread arguments the callee wants.
     ((1 2 3 4 5 7 8 11. 12.)                      ;Must have at least 2 required arguments
      (signal-error-no-restore-stack wrong-number-of-arguments))
     ((6) (lexpr-funcall-fast 0 b-temp))
     ((9. 10.) (lexpr-funcall-fast 1 b-temp))
     ((13. 14. 15.) (lexpr-funcall-fast 2 b-temp)))
               ;Check for space in stack buffer
  (parallel (trap-if (greater-pointer stack-pointer stack-limit)
                     (take-jump-trap stack-buffer-overflow-handler preserve-stack))
            (take-dispatch)))

;Need to pull some more arguments, and caller uses the fast entry sequence, so
;the PC isn't valid yet.
(defucode lexpr-funcall-fast-trap
  (restart-pc restart-trapped-call-escape-pc)
  (parallel (accept-restart-pc)
            (jump pull-lexpr-args-no-restore-sp)))

;Come back here with stack containing number of unsupplied arguments and return PC
;in the case where there weren't enough elements in the rest arg to satisfy the
;number of spread arguments the callee wants.  Turn into a normal call.
;A couple of cycles could be bummed out of this code with some care.
(definst un-lexpr-funcall no-operand
  (assign b-temp (1+ next-on-stack))     ;Number of stack words to flush
  (pushval frame-pointer)
  (assign b-temp-2 stack-pointer)        ;Last word to preserve
  (assign frame-pointer (- top-of-stack (a-constant 6)))       ;-> rest arg, last to flush
  (parallel
    (assign stack-pointer (- frame-pointer b-temp))            ;where that moves to
    (call blt-stack))                    ;Squeeze out the extra spread args and the rest arg
  (parallel
    (assign frame-pointer (- top-of-stack-a b-temp))    ;Restore fp
    (decrement-stack-pointer))           ; and restore sp
  (assign a-temp frame-number-of-args)  ;Correct the frame's arg count
  (assign b-temp (- a-temp b-temp))
  (assign frame-number-of-args b-temp)
  (assign frame-lexpr-called (b-constant 0))
  (parallel                              ;Clean stack and jump to restart PC
    (assign next-on-stack top-of-stack-a)
    (decrement-stack-pointer)
    (jump popj)))


;;; Buncha random instructions

(definst push-n-nils unsigned-immediate-operand        ;1+2 cycles per NIL
  (parallel (assign b-temp (- (a-constant 0) macro-unsigned-immediate))
            (jump push-missing-values)))

(definstl fixup-tos no-operand                         ;1 cycle
  (assign top-of-stack (amem (stack-pointer 0))))

(definst pop-n unsigned-immediate-operand              ;2 cycles
  (parallel (assign stack-pointer (- stack-pointer macro-unsigned-immediate))
            (jump fixup-tos)))

(definst pop-n-save-1 (unsigned-immediate-operand needs-stack)  ;2 cycles
  (assign stack-pointer (- stack-pointer macro-unsigned-immediate))
  (parallel (assign (amem (stack-pointer 0)) top-of-stack)
            (next-instruction)))



(definst pop-n-save-m (unsigned-immediate-operand needs-stack) ;7+3M cycles
  (parallel (assign a-temp frame-pointer)
            (decrement-stack-pointer))
  (parallel (assign frame-pointer (- stack-pointer macro-unsigned-immediate))
            (assign b-temp-2 stack-pointer))
  (parallel (assign stack-pointer (- frame-pointer top-of-stack))
            (call blt-stack))
  (parallel (assign frame-pointer a-temp)
            (next-instruction)))

(definst pop-multiple-save-n unsigned-immediate-operand
  (parallel (assign a-temp frame-pointer))
  (parallel (assign frame-pointer (- stack-pointer macro-unsigned-immediate 1))
            (assign b-temp-2 stack-pointer))            ;Range to save
```

```
  (assign b-temp (1+ (amem (frame-pointer 0))))          ;Size of multiple
  (parallel (assign stack-pointer (- frame-pointer b-temp))
            (call blt-stack))
  (parallel (assign frame-pointer a-temp)
            (next-instruction)))

(definst pop-n-save-multiple (unsigned-immediate-operand needs-stack)
  (parallel (assign a-temp frame-pointer))
  (parallel (assign frame-pointer (- stack-pointer top-of-stack 1))
            (assign b-temp-2 stack-pointer))              ;Range to save
  (parallel (assign stack-pointer (- frame-pointer macro-unsigned-immediate))
            (call blt-stack))
  (parallel (assign frame-pointer a-temp)
            (next-instruction)))

(definst pop-multiple-save-multiple (no-operand needs-stack)
  (parallel (assign a-temp frame-pointer))
  (parallel (assign frame-pointer (- stack-pointer top-of-stack 1))
            (assign b-temp-2 stack-pointer))              ;Range to save
  (assign b-temp (1+ (amem (frame-pointer 0))))          ;Size of multiple
  (parallel (assign stack-pointer (- frame-pointer b-temp))
            (call blt-stack))
  (parallel (assign frame-pointer a-temp)
            (next-instruction)))
;;; -*- Mode:Lisp; Package:Micro; Base:8; Lowercase:yes -*-
;;; (c) Copyright 1982, Symbolics, Inc.

; Microcode for function call/return (part 3)
; This file contains the instructions that functions
; with more than 4 arguments use to pick up their args.

;Get defmicro and all his hosts
#M
(declare (cond ((not (status feature lmucode))
                (load 'udcls))))


;Random disorganized local register definitions
(reserve-scratchpad-memory 2410 2413)

(defareg a-nargs)
(defareg a-min-args)
(defareg a-max-args)

(define-b-temps b-save-fp b-nargs)

;Note: a simplified version of this code exists at TAKE-REST-ARG.  Keep them consistent.
(defmicro general-take-args (min-args max-args optional-args? rest-arg?)
  '(sequential
     ;Check for lexpr and method calls
     (dispatch-after-next frame-argument-format
       ((%frame-arguments-normal)
         ,@(general-take-args-internal min-args max-args optional-args? rest-arg? nil))

       ((%frame-arguments-lexpr)
         (pushval ,(or min-args '(b-constant 0)))       ;Number of required arguments
         (parallel
           (pushval (set-type ,(if max-args              ;Number of optional arguments
                                   '(- ,max-args top-of-stack-a)
                                   '(b-constant 0))
                              dtp-fix))
           ,(if rest-arg?
                '(call require-args-lexpr-rest)          ;Returns if exact match, stack popped
                '(jump require-args-lexpr-no-rest)))
         ,@(if rest-arg?
               (general-take-args-internal min-args max-args optional-args? t nil)))

       ((%frame-arguments-instance)
         (assign a-nargs (+ a-nargs (b-constant 2)))
         ,@(general-take-args-internal min-args max-args optional-args? rest-arg? t))

       ((%frame-arguments-lexpr-instance)
         (pushval ,(or min-args '(b-constant 0)))       ;Number of required arguments
         (parallel
           (pushval (set-type ,(if max-args              ;Number of optional arguments
                                   '(- ,max-args top-of-stack-a)
                                   '(b-constant 0))
                              dtp-fix))
           ,(if rest-arg?
                '(call require-args-lexpr-instance-rest) ;Returns if exact match, stack popped
                '(jump require-args-lexpr-instance-no-rest)))
         ,@(if rest-arg?
               '((assign a-nargs (+ a-nargs (b-constant 2)))
                 ,@(general-take-args-internal min-args max-args optional-args? t t)))))
     ;Get number of arguments supplied
     (parallel
       (assign a-nargs frame-number-of-args)
       (assign b-nargs frame-number-of-args)
       (take-dispatch))))
```

```
;Entered with b-nargs containing frame-number-of-args, a-nargs containing that
;or that+2 in the method case.
(eval-when (eval load compile)
(defun general-take-args-internal (min-args max-args optional-args? rest-arg? method?
                                   &aux (b-side-reg 'b-nargs))
  ;Check for wrong number of args, increment PC by the number of optional
  ;arguments that were supplied, put the number of arguments to be
  ;copied in the b-side register indicated by b-side-reg, leave the
  ;number of arguments supplied in b-nargs, and do all this in the
  ;minimum number of cycles.
  '(,@(if (not optional-args?)
          (cond ((not rest-arg?)
                 '((error-if (not-equal-fixnum a-nargs ,min-args) wrong-number-of-arguments)))
                ((not min-args)
                 (setq b-side-reg nil)          ;Nothing but a rest argument
                 nil)
                ((not method?)
                 (setq b-side-reg min-args)     ;Copy all the spread args
                 '((error-if (lesser-fixnum a-nargs ,min-args) wrong-number-of-arguments)))
                (t (setq b-side-reg 'b-temp-2)
                   '((assign b-temp-2 (- ,min-args (a-constant 2)))     ;2 args already copied
                     (error-if (lesser-fixnum a-nargs ,min-args) wrong-number-of-arguments))))
        '(,@(cond
              ((not rest-arg?)
               '((error-if (greater-fixnum a-nargs ,max-args) wrong-number-of-arguments)
                 ,@(cond (min-args
                          '((parallel
                              (assign b-temp-2 (- a-nargs ,min-args))
                              (error-if (lesser-fixnum-unsigned a-nargs ,min-args)
                                        wrong-number-of-arguments))
                            (assign pc (pc-plus-number pc b-temp-2))))
                         ((not method?)
                          '((assign pc (pc-plus-number pc b-nargs))))
                         (t
                          '((assign b-temp-2 a-nargs)
                            (assign pc (pc-plus-number pc b-temp-2)))))))
              ((not min-args)
               (setq b-side-reg 'b-temp-2)
               '((parallel
                   (assign b-temp-2 a-nargs)
                   (if (greater-fixnum a-nargs ,max-args)
                       (sequential              ;rest arg present
                         (assign b-temp-2 ,max-args)
                         (assign pc (pc-plus-number pc b-temp-2 1)))
                       (assign pc (pc-plus-number pc b-temp-2))))
                 ,@(if method? '((assign b-temp-2 (- b-temp-2 (a-constant 2)))))))
              (t (setq b-side-reg 'b-temp-2)
               '((parallel
                   (assign b-temp-2 a-nargs)
                   (if (greater-fixnum a-nargs ,max-args)
                       (sequential              ;rest arg present
                         (parallel (assign b-temp-2 ,max-args)
                                   (assign a-max-args ,max-args))
                         (assign b-temp-3 (- a-max-args ,min-args))
                         (assign pc (pc-plus-number pc b-temp-3 1)))
                       (sequential
                         (parallel
                           (assign b-temp-3 (- a-nargs ,min-args))
                           (error-if (lesser-fixnum-unsigned a-nargs ,min-args)
                                     wrong-number-of-arguments))
                         (assign pc (pc-plus-number pc b-temp-3)))))
                 ,@(if method? '((assign b-temp-2 (- b-temp-2 (a-constant 2))))))))))
;We are now committed to completing the instruction (PC changed)
;However we cannot prefetch the next instruction, because that might
;take a page fault and this instruction still has side-effects to do.
;Make a-temp -> last argument, save the frame-pointer in b-save-fp
(parallel (assign a-temp (- frame-pointer (b-constant 6)))
          (assign b-save-fp frame-pointer))
;Copy up the arguments that were supplied, or some prefix of them.
;blt-stack wants first-1 in frame-pointer, last in b-temp-2
;b-nargs still has the number of arguments in the caller's frame
,(cond ((eq b-side-reg 'b-nargs)    ;Copy all the arguments
        '(parallel (assign frame-pointer (- a-temp b-nargs))
                   (assign b-temp-2 a-temp)
                   (call blt-stack)))
       ((not (null b-side-reg))     ;Copy some of the arguments
        '(sequential
           (parallel (assign frame-pointer (- a-temp b-nargs)))
           (parallel (assign b-temp-2 (+ frame-pointer ,b-side-reg))
                     (assign a-temp obus)
                     (call blt-stack)))))
;Now handle rest argument if necessary.  a-temp -> last normal arg
;If there are missing optionals, the defaulting of the rest arg will
;be done by macrocode.  But if there are no optionals we do it here.
,(if rest-arg?
     ;Restore frame pointer, then decide whether there is a rest argument and push it
     '(sequential
        (parallel (assign frame-pointer (set-type b-save-fp dtp-null))
                  (assign a-pclsr-top-of-stack (set-type b-save-fp dtp-null)))
        (parallel
```

```
        (assign b-temp-2 (- a-nargs ,max-args 1))
        (if (lesser-or-equal-fixnum-unsigned a-nargs ,max-args)
            ,(if optional-args?
                 '(next-instruction)
                 '(parallel (pushval quote-nil)
                            (next-instruction)))
            (if (bit frame-lexpr-called)
                (if (zero-fixnum b-temp-2)
                    ;; Exactly as many spread arguments as wanted, pass the rest arg
                    (parallel (pushval (amem (frame-pointer -6)))  ;Copy up rest arg
                              (next-instruction))
                    ;; More spread arguments than wanted, rest arg points into them
                    (sequential
                      ;; Adjust cdr-code so normal rest argument list in the stack
                      ;; tails off into lexpr arg
                      (assign (amem (frame-pointer -7))
                              (set-cdr (amem (frame-pointer -7)) cdr-normal))
                      (parallel (pushval (set-type (1+ a-temp) dtp-list))
                                (next-instruction))))
                ;; Rest argument points into the arguments in the stack
                (sequential
                   (assign (amem (frame-pointer -6))
                           (set-cdr (amem (frame-pointer -6)) cdr-nil))
                   (parallel (pushval (set-type (1+ a-temp) dtp-list))
                             (next-instruction))))))
    ;Restore frame-pointer and exit
    '(parallel (assign frame-pointer (set-type b-save-fp dtp-null))
               (assign a-pclsr-top-of-stack (set-type b-save-fp dtp-null))
               (next-instruction))))))

(definst take-n-args unsigned-immediate-operand
  (general-take-args macro-unsigned-immediate nil nil nil))

(definst take-n-args-rest unsigned-immediate-operand
  (general-take-args macro-unsigned-immediate macro-unsigned-immediate nil t))

;The operand is the number of normal arguments to be skipped before taking
;the rest argument.  Take NIL if there aren't that many.
;The code here is a simplified copy of general-take-args since we are only taking one.
;The number of arguments has already been checked and found to be legal.
;In the event of a lexpr-call, the require-args instruction will already
;have set up the rest arg properly.  We still have to check the number
;of arguments in order to locate the rest arg.
(definst take-rest-arg unsigned-immediate-operand
  ;; Get number of normal, spread arguments in a-nargs
  (dispatch-after-next frame-argument-format
    ((%frame-arguments-normal)
     (parallel (assign a-nargs frame-number-of-args)
               (jump take-rest-arg-1)))
    ((%frame-arguments-lexpr)
     (assign a-temp (1- a-temp))
     (parallel (assign a-nargs (1- frame-number-of-args))
               (jump take-rest-arg-lexpr-1)))
    ((%frame-arguments-instance)
     (assign a-nargs (+ frame-number-of-args (b-constant 2)))
     (parallel (error-if (lesser-fixnum-unsigned macro-unsigned-immediate (a-constant 2))
                         function-is-not-a-method)
               (jump take-rest-arg-1)))
    ((%frame-arguments-lexpr-instance)
     (assign a-temp (1- a-temp))
     (assign a-nargs (+ frame-number-of-args (b-constant 1)))
     (parallel (error-if (lesser-fixnum-unsigned macro-unsigned-immediate (a-constant 2))
                         function-is-not-a-method)
               (jump take-rest-arg-lexpr-1))))
  ;; a-temp gets pointer to last argument+1
  (parallel
    (assign a-temp (- frame-pointer (b-constant 5)))
    (take-dispatch)))

(defucode take-rest-arg-1
  (parallel
    ;Get the number of arguments that go into the rest arg
    (assign b-temp (- a-nargs macro-unsigned-immediate 1))
    ;Enough arguments for the rest argument to be embedded in the args?
    (if (greater-fixnum-unsigned a-nargs macro-unsigned-immediate)
        (sequential     ;Yes, return pointer into caller's copy of args
          (assign (amem (frame-pointer -6)) (set-cdr (amem (frame-pointer -6)) cdr-nil))
          (parallel
            (pushval (set-type (- a-temp b-temp 1) dtp-list))
            (next-instruction)))
        (parallel (pushval quote-nil)
                  (next-instruction)))))

;Note that when we get here a-nargs includes only the spread arguments.
;This is different from how general-take-args does it.
(defucode take-rest-arg-lexpr-1
  (parallel
    ;Get the number of arguments that go into the rest arg
    (assign b-temp (- a-nargs macro-unsigned-immediate 1))
    ;Enough arguments for the rest argument to be embedded in the args?
    (if (greater-fixnum-unsigned a-nargs macro-unsigned-immediate)
```

```
    (sequential                         ;Yes, return pointer into caller's copy of args
      (assign (amem (frame-pointer -7)) (set-cdr (amem (frame-pointer -7)) cdr-normal))
      (parallel
        (pushval (set-type (- a-temp b-temp 1) dtp-list))
        (next-instruction)))
    ;Get here if there were exactly the desired number of spread arguments.  There
    ;can't be fewer, because either the desired number is 0 or a require-args
    ;instruction has been executed previously.
    (parallel (pushval (amem (frame-pointer -6)))
              (next-instruction)))))

(definst take-n-optional-args unsigned-immediate-operand
  (general-take-args nil macro-unsigned-immediate t nil))

(definst take-n-optional-args-rest unsigned-immediate-operand
  (general-take-args nil macro-unsigned-immediate t t))

(definst take-m-required-n-optional-args
                                (unsigned-immediate-operand needs-stack smashes-stack)
  (sequential
    (parallel                            ;Get argument out of the way first
      (assign a-pclsr-top-of-stack top-of-stack)
      (decrement-stack-pointer))
    (general-take-args top-of-stack macro-unsigned-immediate t nil)))

(definst take-m-required-n-optional-args-rest
                                (unsigned-immediate-operand needs-stack smashes-stack)
  (sequential
    (parallel                            ;Get argument out of the way first
      (assign a-pclsr-top-of-stack top-of-stack)
      (decrement-stack-pointer))
    (general-take-args top-of-stack macro-unsigned-immediate t t)))

;Check the number of arguments
;The stack contains the number of required arguments and the number of optional arguments
;The immediate operand contains the number of rest arguments (1 or 0)
;In the case of a lexpr-call, this fixes things up so take-arg doesn't have to check.
;---If you're interested in optimizing things, change this into
;---two instructions, one with and one without a rest argument,
;---and avoid the need to copy arg count to B side.  Could either
;---pass one of the operands through immediate, or use no-operand form.
;This says needs-stack although in fact it doesn't currently.
(definst require-args (unsigned-immediate-operand needs-stack smashes-stack)
  (dispatch-after-next frame-argument-format
    ((%frame-arguments-normal)
      (goto require-args-1))
    ((%frame-arguments-lexpr)
      (if (not-zero-fixnum macro-unsigned-immediate)
          (goto require-args-lexpr-rest)
          (goto require-args-lexpr-no-rest)))
    ((%frame-arguments-instance)
      (parallel
        (assign b-temp (+ frame-number-of-args (b-constant 2)))
        (jump require-args-1)))
    ((%frame-arguments-lexpr-instance)
      (if (not-zero-fixnum macro-unsigned-immediate)
          (goto require-args-lexpr-instance-rest)
          (goto require-args-lexpr-instance-no-rest))))
  (parallel
    (assign b-temp frame-number-of-args)         ;Copy arg count to B side
    (take-dispatch)))

(defucode require-args-1
  (parallel (error-if (lesser-fixnum-unsigned b-temp next-on-stack)
                      wrong-number-of-arguments)
            (decrement-stack-pointer))
  (if (zero-fixnum macro-unsigned-immediate)
      (sequential
        (assign a-temp (+ top-of-stack-a top-of-stack)) ;Maximum number of arguments
        (parallel                                       ;No rest argument
          (error-if (greater-fixnum-unsigned b-temp a-temp)
                    wrong-number-of-arguments)
          (decrement-stack-pointer)
          (next-instruction)))
      (parallel                                 ;Has rest argument
        (decrement-stack-pointer)
        (next-instruction))))

;This function was lexpr-called.


(defucode require-args-lexpr-no-rest
  ;This function does not take a rest argument.
  (assign b-temp (+ next-on-stack top-of-stack))
  ;Need to pull some arguments out of the rest arg then try again
  (parallel
    (assign b-temp (- b-temp frame-number-of-args))
    (if (lesser-fixnum-unsigned b-temp frame-number-of-args)
        (signal-error wrong-number-of-arguments)
        (goto pull-lexpr-args))))
```

```
(defucode require-args-lexpr-instance-no-rest
  ;This function does not take a rest argument.
  (assign b-temp (+ next-on-stack top-of-stack))
  ;Already got two of them
  (assign b-temp (- b-temp (a-constant 2)))
  ;Need to pull some arguments out of the rest arg then try again
  (parallel
    (assign b-temp (- b-temp frame-number-of-args))
    (if (lesser-fixnum-unsigned b-temp frame-number-of-args)
        (signal-error wrong-number-of-arguments)
        (goto pull-lexpr-args))))

(defucode require-args-lexpr-rest
  ;This function takes a rest argument.  What we want to do is adjust the
  ;number of spread arguments so that it matches the number we want.
  (parallel (assign b-temp (+ next-on-stack top-of-stack 1))
            (decrement-stack-pointer))
  (if (equal-fixnum frame-number-of-args b-temp)
      (parallel (decrement-stack-pointer)          ;Exact match
                (assign top-of-stack top-of-stack-a)  ;in case called from general-take-args
                (next-instruction))
      (drop-through))
  (parallel
    (trap-if (greater-fixnum-unsigned b-temp frame-number-of-args)
             ;Not enough spread arguments.  Pull some out of the rest arg and try again
             require-args-lexpr-trap)
    (decrement-stack-pointer)
    (next-instruction)))

(defucode require-args-lexpr-instance-rest
   ;This function takes a rest argument.  What we want to do is adjust the
   ;number of spread arguments so that it matches the number we want.
   (parallel (assign b-temp (+ next-on-stack top-of-stack 1))
             (decrement-stack-pointer))
   ;Already got two of them
   (assign b-temp (- b-temp (a-constant 2)))
   ;If exact match, no need to fixup.  Note this can return to general-take-args code.
   (if (equal-fixnum frame-number-of-args b-temp)
       (parallel (decrement-stack-pointer)          ;Exact match
                 (assign top-of-stack top-of-stack-a)  ;in case called from general-take-args
                 (next-instruction))
       (drop-through))
   (parallel
     (trap-if (greater-fixnum-unsigned b-temp frame-number-of-args)
              ;Not enough spread arguments.  Pull some out of the rest arg and try again
              require-args-lexpr-trap)
     (decrement-stack-pointer)
     (next-instruction)))

;Trap through here instead of going directly to pull-lexpr-args in order to speed
;up the normal case.
(defucode require-args-lexpr-trap
  (parallel (trap-no-save)
            (assign b-temp (- b-temp frame-number-of-args 1))
            (jump pull-lexpr-args)))

;b-temp has 1- the number of arguments to be pulled out of the rest arg.
;First open space in the stack for them, then call a support routine to
;do the cars and cdrs.  The support routine will retry in one of two
;different ways depending on whether the rest arg is exhausted
(defucode pull-lexpr-args
  (call-and-return-to restore-stack-pointer pull-lexpr-args-no-restore-sp))

(defucode pull-lexpr-args-no-restore-sp
  (assign b-temp-2 (+ frame-number-of-args b-temp 1))
  (assign frame-number-of-args b-temp-2)
  (pushval (set-type (1+ b-temp) dtp-fix))                 ;Argument to support routine
  (assign b-temp-2 (- frame-pointer (b-constant 6)))       ;Bottom word to move (lexpr arg)
  (assign b-temp-2 (set-type (- stack-pointer b-temp-2) 0))     ;Number of words to move-1
  (assign frame-pointer (+ frame-pointer b-temp 1))        ;Shift frame upwards
  (parallel (assign stack-pointer (+ stack-pointer b-temp 1))
            (assign b-temp-3 obus)
            (jump pull-lexpr-args-loop)))

;3 cycles per word moved.  Probably not worth improving.
(defucode pull-lexpr-args-loop
  (assign xbas (- stack-pointer b-temp 1))
  (parallel (assign (amem (stack-pointer 0)) (amem (xbas 0)))
            (decrement-stack-pointer))
  (parallel (assign b-temp-2 (1- b-temp-2))
            (if (minus-fixnum obus)
                (sequential (assign stack-pointer b-temp-3)
                            (take-pre-trap pull-lexpr-args preserve-stack))
                (goto pull-lexpr-args-loop))))

;Take a single argument from the caller, by number, and push it on the stack
;Note that if we were lexpr-called, either all the arguments are there (and
;maybe some more), or else we turned into a non-lexpr-call, when a require-args
;was done (it must be done before using this instruction).
(definst take-arg unsigned-immediate-operand
```

```
   ;Get the distance down from the last argument+1, negated
   (assign b-temp (- macro-unsigned-immediate frame-number-of-args))
   ;Get address of desired argument+6
   (assign xbas (+ frame-pointer b-temp))
   ;Return it (but test for case where we were called as a method, first arg is #2)
   (if (bit frame-instance-called)
       (parallel (pushval (amem (xbas -7)))
                 (next-instruction))
       (parallel (pushval (amem (xbas -5)))
                 (next-instruction))))

;OPTIONAL-ARG-SUPPLIED-P -- takes an immediate argument and pushes T if
;more than that many arguments were supplied, or NIL if they were not,
;i.e. the immediate operand is the zero-origin argument number.
;This is used to bind "flag variables", as in "&OPTIONAL (FOO BAR FOO-P)".
;This takes two cycles to execute.
(definst optional-arg-supplied-p unsigned-immediate-operand
  (if (lesser-fixnum-unsigned macro-unsigned-immediate frame-number-of-args)
      (parallel
        (pushval quote-t)
        (next-instruction))
      (parallel
        (pushval quote-nil)
        (next-instruction))))
```

F:>lmach>ucode>FUNCALL1.LISP.25

```
;;; -*- Mode:Lisp; Package:Micro; Base:8; Lowercase:yes -*-
;;; (c) Copyright 1982, Symbolics, Inc.

; Microcode for function call/return (part 2)
; This file expands into the various call instructions
; It is a separate file so macros can run compiled in the compiler

;Get defmicro and all his hosts
#M
(declare (cond ((not (status feature lmucode))
                (load 'udcls)
                (load 'funcall))))

;Trap handlers defined in SIM
(declare (special *stack-buffer-overflow-handler*))

#M
(declare (*expr funny-function-trap-lispmicrocode funcall-funny-function-trap-lispmicrocode))
                ;in FUNCALL

;Having defined all the micros, now create all the CALL instructions
;and their common defucode routines
#.'   ;heh, heh
(progn 'compile
  .,(loop for nargs in '(0 1 2 3 4 N)
      collect '(defucode ,(intern (format nil "CALL-INDIRECT-~D" nargs))
                 (call-indirect-part-2 ,nargs))
      collect '(defucode ,(intern (format nil "CALL-INDIRECT-DISP-~D" nargs))
                 (call-indirect-part-3 ,nargs))
      nconc
        (loop for value-disposition in '(ignore stack return multiple)
              collect
                '(definst ,(intern (format nil "CALL-~D-~A"
                                           nargs value-disposition))
                          ,(if (eq nargs 'N) '(indirect-operand needs-stack)
                               '(indirect-operand))
                   (call-indirect ,value-disposition ,nargs)))))

;Also the FUNCALL versions
#.'   ;heh, heh
(progn 'compile
  .,(loop for nargs in '(0 1 2 3 4 N NI)
      collect '(defucode ,(intern (format nil "FUNCALL-STACK-~D" nargs))
                 (funcall-stack-part-2 ,nargs))
      nconc
        (loop for value-disposition in '(ignore stack return multiple)
              collect
                '(definst ,(intern (format nil "FUNCALL-~D-~A"
                                           nargs value-disposition))
                          ,(selectq nargs
                             (NI 'unsigned-immediate-operand)
                             (N '(no-operand needs-stack))
                             (otherwise 'no-operand))
                   (funcall-stack ,value-disposition ,nargs)))))

;Also the LEXPR-FUNCALL versions
#.'   ;heh, heh
(progn 'compile
  .,(loop for value-disposition in '(ignore stack return multiple)
          collect
            '(definst ,(intern (format nil "LEXPR-FUNCALL-~A" value-disposition))
                      unsigned-immediate-operand
               (lexpr-funcall ,value-disposition))
```

```
        collect
         `(definst ,(intern (format nil "LEXPR-FUNCALL-N-~A" value-disposition))
                   (no-operand needs-stack)
            (lexpr-funcall-n ,value-disposition))))
```

F:>lmach>ucode>funcall.lisp.142

```
;;; -*- Mode:Lisp; Package:Micro; Base:8; Lowercase:yes -*-
;;; (c) Copyright 1982, Symbolics, Inc.

; Microcode for function call/return
; This file contains just macro definitions for funcall1
; (in a separate file so they get compiled)

;Get defmicro and all his hosts
#M
(declare (cond ((not (status feature lmucode))
                (load 'udcls))))

#M
(declare (*lexpr retch)         ;in UU
         (*expr get-to-abus get-to-ubus make-microdata) ;in UU
         (*expr call-indirect-disp-0-lispmicrocode      ;in FUNCALL1.
                call-indirect-disp-1-lispmicrocode
                call-indirect-disp-2-lispmicrocode
                call-indirect-disp-3-lispmicrocode
                call-indirect-disp-4-lispmicrocode))

(def-byte-field entry-instruction-dispatch %%entry-instruction-args-dispatch source)

;;; Function call and return -- basic instructions

;Trap handlers defined in STACK-BUFFER
(declare (special *stack-buffer-overflow-handler*))

;This micro makes all the different versions of the machine look the same, even though
;they are totally different in every detail.  The argument is a dtp-compiled-function
;(presume that we will trap if it isn't).  End up setting the PC to point at the
;first instruction of it, setting the VMA to point at it, starting a memory read,
;and starting an instruction fetch.  On the TMC we must be careful to be able to back
;out if there is a page fault, and there are field-conflict problems.  On the TMC
;and the TMC5, we don't get to do a double-word instruction fetch because the following
;cycle is using the spec field.
;
;This micro generates a multiple-instruction sequence, so be careful what you
;put in parallel with it.
(defmicro function-entry-instruction-fetch (function)
  (selectq *machine-version*
    ((sim proto)
     `(sequential (parallel
                    ,(get-to-obus32 function)   ;Can't write VMA and Amem at same time
                    (assign b-temp obus))
                  (assign vma b-temp)
                  (parallel
                    (start-memory read instruction-fetch)
                    (assign pc (odd-pc vma)))))
    ((tmc)
     `(sequential (assign vma ,function)
                  (start-memory read)          ;Take page fault if any
                  (assign pc (odd-pc vma))      ;Now that it's safe, set PC
                  (start-memory read instruction-fetch)))      ;Now read same loc again
    ((tmc5)
     `(sequential (parallel                    ;Load VMA, load PC, force to odd halfword
                    (assign vma ,function)
                    (microinstruction spec ifu-control magic 1 magic-mask 3))
                  (start-memory read block instruction-fetch)))
    (otherwise (retch "function-entry-instruction-fetch needs to be written for ~S"
                      *machine-version*))))

;This micro stores a return-pc.  On the TMC5 and IFU it takes an extra 1/2 cycle
;because the PC has to be incremented.  I don't see any way around this since it
;is really essential that the return-pc be the real PC to return to, not the PC
;of the call instruction.
;Kludge: if pushing on the stack, sp assumed to be incremented in parallel
(defmicro store-return-pc (place)
  (let ((place2 (if (equal place '(amem (stack-pointer 1))) '(amem (stack-pointer 0)) place)))
    (selectq *machine-version*
      ((sim proto tmc) `(assign ,place (set-cdr pc 0)))
      ((tmc5 ifu) `(parallel (assign ,place (set-cdr (odd-pc (via-ubus pc)) 0))
                             (if (minus-fixnum pc)       ;Already odd, must increment
                                 (assign ,place2 (set-cdr (even-pc (1+ pc)) 0))
                                 (drop-through))))
      (otherwise (retch "store-return-pc needs to be written for ~S" *machine-version*)))))


;---Function call/return history kludge, to allow debugging of transfers to randomness
;---Choose one of the two following definitions, to turn it on or off

;Off
(defmicro keep-function-history (ignore)
  nil)
```

```
;On
(comment
(defmicro keep-function-history (op)
  (selectq op
    (return '(call keep-function-return-history))
    (call '(sequential
            (call keep-function-call-history)
            (parallel (nop)                         ;More cmem address freedom
                      (declare-memory-timing (next data-cycle)))))
    (call-funny '(call keep-funny-function-call-history))
    (otherwise (retch "~S illegal type of function op" op))))

(defareg-at-loc function-history-pointer 2700 1777772702) ;Address of next history pair
(defareg-at-loc fhist-temp 2701)
;Locations 2702 through 2741 inclusive contain pairs as follows
;   function. cdr=0 for call, cdr=1 for return
;   frame-pointer.

(defucode keep-function-call-history
  (assign fhist-temp vma)
  (assign vma function-history-pointer)
  (store-contents frame-function block not-pointer (cdr 0))
  (store-contents (set-type frame-pointer dtp-locative) block not-pointer)
  (if (greater-pointer vma (b-constant 1777772741))
      (assign function-history-pointer (b-constant 1777772702))
      (assign function-history-pointer vma))
  (parallel (assign vma fhist-temp)
            (jump memread)))                        ;Restore MD

(defucode keep-funny-function-call-history
  (assign vma function-history-pointer)
  (store-contents frame-function block not-pointer (cdr 0))
  (store-contents (set-type frame-pointer dtp-locative) block not-pointer)
  (if (greater-pointer vma (b-constant 1777772741))
      (assign function-history-pointer (b-constant 1777772702))
      (assign function-history-pointer vma))
  (return))

(defucode keep-function-return-history
  (assign fhist-temp vma)
  (assign vma function-history-pointer)
  (store-contents frame-function block not-pointer (cdr 1))
  (store-contents (set-type frame-pointer dtp-locative) block not-pointer)
  (if (greater-pointer vma (b-constant 1777772741))
      (assign function-history-pointer (b-constant 1777772702))
      (assign function-history-pointer vma))
  (parallel (assign vma fhist-temp)
            (return)))
);end comment

;Note that we now increment the stack pointer as we go, rather than
;doing arithmetic on it at the end.
;Nargs is a number from 0 to 4, or N, meaning that it is on the stack.
(defmicro call-indirect (value-disposition nargs)
  '(sequential
     ,@(if (eq nargs 'N)          ;Fooey, pop extra argument off the stack
           '((parallel
               (assign a-pclsr-top-of-stack top-of-stack)
               (decrement-stack-pointer))))
               ;Start read of pointer to function cell
     (assign vma (- frame-function macro-unsigned-immediate 1))
               ;Push previous-frame base pointer
     (parallel (start-memory read)
               (assign (amem (stack-pointer 1))
                       (set-cdr (set-type frame-pointer dtp-locative) 0)))
               ;Push previous-frame top pointer (-> arguments-1)
               ;Cdr code is the value disposition
     (parallel
       (assign (amem (stack-pointer 2))
               (set-cdr (set-type (- stack-pointer
                                     ,(if (eq nargs 'N)
                                          'top-of-stack
                                          '(b-constant ,nargs)))
                                  dtp-locative)
                        ,(find-position-in-list value-disposition
                                                '(ignore stack return multiple))))
       (increment-stack-pointer)
       (jump ,(intern (format nil "CALL-INDIRECT-~D" nargs))))))
               ;Join common code for all value dispositions this nargs

(defmicro call-indirect-part-2 (nargs)
  '(sequential
               ;Start read of function cell
     (parallel (declare-memory-timing data-cycle)
               (transport)
               (check-data-type memory-data dtp-locative)
               (assign vma memory-data)
               (increment-stack-pointer))
               ;Store return pc
     (parallel (start-memory read)
               (store-return-pc (amem (stack-pointer 1)))       ;sp+3
```

```
                (increment-stack-pointer))
                 ;Store misc fields word (just has nargs now)
      (parallel (assign (amem (stack-pointer 1)) ;sp+4
                        (set-cdr (set-type ,(if (eq nargs 'N) 'top-of-stack
                                                '(b-constant ,nargs))
                                           dtp-fix) 0))
                (increment-stack-pointer))
                 ;Store the function, check type, set PC, start read of entry instr
      (parallel (transport)
                (trap-if (not-data-type? memory-data dtp-compiled-function)
                         funny-function-trap)
                (assign (amem (stack-pointer 1)) (set-cdr memory-data 0)) ;sp+5
                (increment-stack-pointer)
                (function-entry-instruction-fetch memory-data))
                 ;Point frame-pointer at first argument slot in new frame
     ;Now cannot pclsr, so we can clear a-pclsr-top-of-stack
      (parallel (assign frame-pointer (set-type (1+ stack-pointer) dtp-null))
                (assign a-pclsr-top-of-stack (set-type (1+ stack-pointer) dtp-null))
                (jump ,(intern (format nil "CALL-INDIRECT-DISP-~D" nargs))))))

(defmicro call-indirect-part-3 (nargs &optional method-case)    ;restart-trapped-call enters
 '(sequential
   (keep-function-history call)
   (parallel
     (declare-memory-timing data-cycle)
     ,(if (numberp nargs)
          '(sequential  ;Dispatch on entry instruction
             (dispatch-after-next (entry-instruction-dispatch memory-data)
                  . ,(nargs-dispatch-clauses nargs (if method-case 2 0)))
                  ;Check for space in stack buffer
             (parallel (trap-if (greater-pointer stack-pointer stack-limit)
                           (take-jump-trap stack-buffer-overflow-handler preserve-stack))
                       (take-dispatch)))
          '(sequential
             (error-no-restore-stack-if
               (not (zero-fixnum (entry-instruction-dispatch memory-data)))
               wrong-number-of-arguments)
             (parallel (trap-if (greater-pointer stack-pointer stack-limit)
                           (take-jump-trap stack-buffer-overflow-handler preserve-stack))
                       (next-instruction)))))))

;Trap here if calling something other than a dtp-compiled-function.
;The function was just read from memory and has not yet been pushed on the stack,
;and the frame-pointer has not yet been set up.  Otherwise the new stack frame
;is all built.  We have not yet checked for stack-overflow, but that can be omitted
;since this stack frame is very small, and we will check when we enter the escape
;function (or whatever we end up calling).
(defucode funny-function-trap
  ;Make the new frame current, and clear pclsr top-of-stack flag
  (parallel
    (trap-no-save)
    (declare-memory-timing (next data-cycle))   ;Fake out error-check
    (assign frame-pointer (set-type (+ stack-pointer (b-constant 2)) dtp-null)) ;sp+6
    (assign a-pclsr-top-of-stack (set-type (+ stack-pointer (b-constant 2)) dtp-null)))
  ;Store the random function into this frame
  (parallel (assign (amem (stack-pointer 1)) (set-cdr memory-data 0))    ;sp+5
            (increment-stack-pointer)
            (clear-stack-adjustment)
            ;Check for special cases
            (if (data-type? memory-data dtp-symbol)
                (goto funcall-symbol)
                (goto funny-function-trap-1))))

;Same, for case where we were doing funcall
(defucode funcall-funny-function-trap
  ;Make the new frame current, and clear pclsr top-of-stack flag
  (parallel
    (trap-no-save)
    (assign frame-pointer (set-type (+ stack-pointer (b-constant 2)) dtp-null)) ;sp+6
    (assign a-pclsr-top-of-stack (set-type (+ stack-pointer (b-constant 2)) dtp-null)))
  ;Store the random function into this frame
  (parallel (assign (amem (stack-pointer 1)) (amem (xbas 1)))    ;sp+5
            (increment-stack-pointer)
            (clear-stack-adjustment)
            ;Check for special cases
            (if (data-type? (amem (xbas 1)) dtp-symbol)
                (goto funcall-symbol)
                (goto funny-function-trap-1))))

;Same for restarting a call (general-call-1)
(defucode general-call-funny-function
  ;Check for special cases
  (parallel
    (trap-no-save)
    (if (data-type? frame-function dtp-symbol)
        (goto funcall-symbol)
        (goto funny-function-trap-1))))

;Here after the frame has been completely set up (all cases can join)
;Handle any microcode dispatching, otherwise trap out to macrocode
;Special code added here to allow breakpointing on calling various objects
(defucode funny-function-trap-1
```

```
  (keep-function-history call-funny)
  (if (data-type? frame-function dtp-instance)
      (goto funcall-instance)
      ;Not a special case, go trap out to the interpreter
      ;(if (bit frame-instance-called)
      ;    (take-jump-trap call-funny-method preserve-stack)
      ;    (take-jump-trap call-funny-function preserve-stack))
      (if (data-type? frame-function dtp-closure)
          (goto funcall-closure)
          (if (data-type? frame-function dtp-list)
              (goto funcall-list)
              (if (data-type? frame-function dtp-array)
                  (goto funcall-array)
                  (goto funcall-random))))))

(defucode funcall-closure
      (if (bit frame-instance-called)
          (take-jump-trap call-funny-method preserve-stack)
          (take-jump-trap call-funny-function preserve-stack)))

(defucode funcall-list
      (if (bit frame-instance-called)
          (take-jump-trap call-funny-method preserve-stack)
          (take-jump-trap call-funny-function preserve-stack)))

(defucode funcall-array
      (if (bit frame-instance-called)
          (take-jump-trap call-funny-method preserve-stack)
          (take-jump-trap call-funny-function preserve-stack)))

(defucode funcall-random
      (if (bit frame-instance-called)
          (take-jump-trap call-funny-method preserve-stack)
          (take-jump-trap call-funny-function preserve-stack)))

;Here when calling a symbol.  Get its function cell without trapping out to microcode
;---Bum one cycle out of this when temporary memory control flushed---
(defucode funcall-symbol
  (restart-pc restart-trapped-call-escape-pc)    ;in case of page fault
  (parallel (accept-restart-pc)
            (assign vma (+ frame-function (b-constant 2))))
  (parallel (increment-stack-pointer)
            (call reference-symbol-offset))
  (parallel (assign frame-function (popval))
            (jump restart-trapped-call)))

;Make the dispatch table for function entru oiven number of args supplied.
(defmacro ass= (a b) '(assoc ,a ,b))                ;Fucking Maclisp

(defun nargs-dispatch-clauses (nargs args-already-there)
  (let ((exactly (cdr (ass= nargs '((0 1) (1 3) (2 6) (3 10.) (4 15.)))))
        (too-few (cdr (ass= nargs '((0 3 5 6 8 9 10. 12. 13. 14. 15.)
                                    (1 6 9 10. 13. 14. 15.)
                                    (2 10. 14. 15.)
                                    (3 15.)))))
        (too-many (cdr (ass= nargs '((1 1)
                                     (2 1 2 3)
                                     (3 1 2 3 4 5 6)
                                     (4 1 2 3 4 5 6 7 8 9 10.)))))
        (optionals (cdr (ass= nargs '((0 (0 2) (0 4) (0 7) (0 11.))
                                      (1 (0 2) (0 4) (1 5) (0 7) (1 8)
                                         (0 11.) (1 12.))
                                      (2 (0 4) (1 5) (0 7) (1 8) (2 9)
                                         (0 11.) (1 12.) (2 13.))
                                      (3 (0 7) (1 8) (2 9)
                                         (0 11.) (1 12.) (2 13.) (3 14.))
                                      (4 (0 11.) (1 12.) (2 13.) (3 14.)))))))
    (or exactly (retch "~S illegal value of nargs" nargs))
    '(((0) (next-instruction))                ;The slow case
      ,@(and too-few '((,too-few
                         (signal-error-no-restore-stack wrong-number-of-arguments))))
      ,@(and too-many '((,too-many
                          (signal-error-no-restore-stack wrong-number-of-arguments))))
      (,exactly                               ;Copy this many arguments
        (parallel (sequential
                    . ,(loop for i downfrom (- nargs args-already-there) above 0
                         collect '(pushval (amem (frame-pointer ,(- -5 i))))))
                  (next-instruction)))
      . ,(loop for (n-required disp-code) in optionals
           collect '((,disp-code)
                     ,(if (< n-required args-already-there)
                          '(signal-error-no-restore-stack wrong-number-of-arguments)
                          '(parallel
                             (sequential
                               ,@(loop for i downfrom (- nargs args-already-there) above 0
                                   collect
                                     (if (> (+ i args-already-there) n-required)
                                         (selectq *machine-version*
                                           ((sim proto)
                                            '(sequential
```

```
                          (increment-fake-pc)
                          (pushval (amem (frame-pointer ,(- -5 i))))))
                       (otherwise
                        '(parallel
                          (increment-pc)
                          (pushval (amem (frame-pointer ,(- -5 i)))))))
                     '(pushval (amem (frame-pointer ,(- -5 i))))))
               ,@(if (≥ args-already-there n-required)
                     ;; Cannot do (increment-pc) and (next-instruction)
                     ;; in parallel.  So take extra time in case
                     ;; where all args were optional and some supplied.
                     '((nop)))
              (next-instruction)))))))

;;; Funcall (with a variable function)
;;; The code is analogous to the above, but written separately because
;;; we aren't overlapping with function-cell fetch.

;nargs is a number from 0 to 4 or N (on stack) or NI (immediate)
(defmicro funcall-stack (value-disposition nargs)
  '(sequential
               ;Push previous-frame top pointer (-> function-1)
               ;Cdr code is the value disposition
               ;Pushed out of order, note.
               ;Also note that for -N variant, TOS is number of args
               ; and there are allowed to be 4 or fewer args
     ,@(if (eq nargs 'N)        ;Fooey, pop extra argument off the stack
           '((parallel
               (assign a-pclsr-top-of-stack top-of-stack)
               (decrement-stack-pointer))))
     (parallel
       (assign (amem (stack-pointer 2))
               (set-cdr (set-type (- stack-pointer
                                     ,(selectq nargs
                                        (N 'top-of-stack)
                                        (NI 'macro-unsigned-immediate)
                                        (otherwise '(b-constant ,nargs)))
                                     1)
                                  dtp-locative)
                        ,(find-position-in-list value-disposition
                                                '(ignore stack return multiple))))
       (assign xbas obus)
       (increment-stack-pointer)
       (jump ,(intern (format nil "FUNCALL-STACK-~D" nargs))))))
               ;Join common code independent of value disposition

(defmicro funcall-stack-part-2 (nargs)
  '(sequential
               ;Push previous-frame base pointer
     (parallel
       (assign (amem (stack-pointer 0))
               (set-cdr (set-type frame-pointer dtp-locative) 0))
       (increment-stack-pointer))
               ;Store return PC
     (parallel
       (store-return-pc (amem (stack-pointer 1)))
       (increment-stack-pointer))
               ;Store misc fields word
     (parallel
       (assign (amem (stack-pointer 1))
               (set-cdr (set-type
                          ,(selectq nargs
                             (N '(+ (a-constant ,(byte-mask frame-funcalled))
                                    top-of-stack))
                             (NI '(+ (a-constant ,(byte-mask frame-funcalled))
                                     macro-unsigned-immediate))
                             (otherwise '(a-constant ,(+ (byte-mask frame-funcalled)
                                                         nargs))))
                          dtp-fix)
                        0))
       (increment-stack-pointer))
               ;Store function, check type, set PC, start read of entry instr
     (parallel
       (assign (amem (stack-pointer 1)) (set-cdr (amem (xbas 1)) 0))
       (trap-if (not-data-type? (amem (xbas 1)) dtp-compiled-function)
               funcall-funny-function-trap)
       (increment-stack-pointer)
       (function-entry-instruction-fetch (amem (xbas 1))))
               ;Point frame-pointer at first argument slot in new frame
     ;Now, having set the PC, we can clear a-pclsr-top-of-stack
     (parallel (assign frame-pointer (set-type (1+ stack-pointer) dtp-null))
               (assign a-pclsr-top-of-stack (set-type (1+ stack-pointer) dtp-null))
               (jump ,(selectq nargs
                        (NI 'call-indirect-disp-N)
                        (N 'funcall-stack-N-dispatch)
                        (otherwise
                          (intern (format nil "CALL-INDIRECT-DISP-~D" nargs))))))))
               ;Join common code with call case

;For funcall with a variable number of arguments, decide which case we are
(defucode funcall-stack-N-dispatch
```

```
(dispatch-after-next (ldb top-of-stack 3 0)
  ((0) (goto call-indirect-disp-0))
  ((1) (goto call-indirect-disp-1))
  ((2) (goto call-indirect-disp-2))
  ((3) (goto call-indirect-disp-3))
  ((4) (goto call-indirect-disp-4)))
(parallel
  (trap-if (greater-fixnum-unsigned top-of-stack (a-constant 4))
           (parallel (trap-no-save)
                     (jump call-indirect-disp-n)))
  (take-dispatch)))
;;; Lexpr-funcall (with a variable function, and a list of args)
;;; The code is analogous to the above, but written separately because
;;; I am a turd.
;;; The number of spread args is in macro-unsigned-immediate
(defmicro lexpr-funcall (value-disposition)
  '(sequential
     ;Save original top-of-stack in case we jump off to funcall-stack-n
     (assign a-pclsr-top-of-stack top-of-stack-a)
     (assign top-of-stack (1+ macro-unsigned-immediate))
     (lexpr-funcall-part-1 ,value-disposition)))

;The number of args (spread plus 1 rest) is on the stack
(defmicro lexpr-funcall-n (value-disposition)
  '(sequential
     (parallel (check-arg-type top-of-stack top-of-stack-a dtp-fix)
               (assign a-pclsr-top-of-stack top-of-stack)
               (decrement-stack-pointer))
     (lexpr-funcall-part-1 ,value-disposition)))

;Here top-of-stack has the total number of arguments (spread plus the list)
;and the top thing on the stack (top-of-stack-a) is the list
(defmicro lexpr-funcall-part-1 (value-disposition)
                ;Push previous-frame top pointer (-> function-1)
                ;Cdr code is the value disposition
                ;Pushed out of order. note.
  '(parallel
     (assign (amem (stack-pointer 2))
             (set-cdr (set-type (- stack-pointer top-of-stack 1) dtp-locative)
                      ,(find-position-in-list value-disposition
                                              '(ignore stack return multiple))))
     (assign xbas obus)
     (increment-stack-pointer)
     (jump lexpr-funcall-part-2)))
                ;Join common code independent of value disposition

;This is used below to handle the case where the callee uses the fast entry instruction
(defmicro lexpr-funcall-fast (nargs-wanted &optional (nargs-place 'top-of-stack))
  '(parallel
     (error-no-restore-stack-if
       (lesser-fixnum-unsigned (a-constant ,nargs-wanted) ,nargs-place)
       wrong-number-of-arguments)
     (assign b-temp (- (a-constant ,nargs-wanted) ,nargs-place))
     (jump lexpr-funcall-fast-trap)))

(defucode lexpr-funcall-part-2
  (sequential
                ;First see if the rest arg is nil, to avoid dealing with
                ;fencepost errors later.  If it is, flush it and turn into
                ;normal funcall.
    (parallel
      (check-arg-type rest-arg (amem (stack-pointer -1)) dtp-list dtp-nil)
      (if (data-type? (amem (stack-pointer -1)) dtp-nil)
          (sequential           ;Squeeze rest arg out of stack, turn into funcall-n-dest
            (assign (amem (stack-pointer 0)) (amem (stack-pointer 1)))
            (parallel (assign top-of-stack (1- top-of-stack))
                      (decrement-stack-pointer)
                      (jump funcall-stack-n)))
          (drop-through)))
                ;Push previous-frame base pointer
     (parallel
       (assign (amem (stack-pointer 0))
               (set-cdr (set-type frame-pointer dtp-locative) 0))
       (increment-stack-pointer))
                ;Store return PC
     (parallel
       (store-return-pc (amem (stack-pointer 1)))
       (increment-stack-pointer))
                ;Store misc fields word
     (parallel
       (assign (amem (stack-pointer 1))
               (set-cdr (set-type (+ (a-constant (+ (byte-mask frame-funcalled)
                                                    (byte-mask frame-lexpr-called)))
                                      top-of-stack)      ;Number of args including rest arg
                                   dtp-fix)
                        0))
       (increment-stack-pointer))
                ;Store function, check type, set PC, start read of entry instr
     (parallel
       (assign (amem (stack-pointer 1)) (set-cdr (amem (xbas 1)) 0))
       (trap-if (not-data-type? (amem (xbas 1)) dtp-compiled-function)
```

```
              funcall-funny-function-trap)
     (increment-stack-pointer)
     (function-entry-instruction-fetch (amem (xbas 1))))
              ;Point frame-pointer at first argument slot in new frame
   (parallel (assign frame-pointer (1+ stack-pointer))
             (assign a-pclsr-top-of-stack (set-typo (1+ stack-pointer) dtp-null))
             (keep-function-history call))
              ;Dispatch on entry instruction, maybe do some work for callee
   (dispatch-after-next (entry-instruction-dispatch memory-data)
     ((0) (next-instruction))                    ;Callee will do it himself
     ;Here callee does not want a rest argument.  So this is either too
   ;many arguments, or need to call a support routine to pop some
   ;arguments off the list, which is known not to be NIL.
   ;Put in b-temp the maximum number of spread arguments the callee wants.
   ((1) (lexpr-funcall-fast 0))
   ((2 3) (lexpr-funcall-fast 1))
   ((4 5 6) (lexpr-funcall-fast 2))
   ((7 10 11 12) (lexpr-funcall-fast 3))
   ((13 14 15 16 17) (lexpr-funcall-fast 4)))
            ;Check for space in stack buffer
  (parallel (trap-if (greater-pointer stack-pointer stack-limit)
                     (take-jump-trap stack-buffer-overflow-handler preserve-stack))
            (take-dispatch)))
```

F:>lmach>ucode>FLOAT.LISP.33

```
;;; -*- Mode:Lisp; Package:Micro; Base:8; Lowercase:yes -*-
;;; (c) Copyright 1982, Symbolics, Inc.

;;;; Flonum microcode for 3600

;;; Denormalized number representation:




(define-enumerated-value-constants *flonum-operations*)


;;; Structure of "single" flonums
;;; |1|--8---|-----23------|
;;; |S| expt | frac        |
;;;  31<30:23>---<22:0>----

(defsysbyte single-frac 23. 0)
(defsysbyte single-N-bit 1 23.)
(defsysbyte single-expt 8. 23.)
(defsysbyte single-sign 1 31.)
(defsysbyte single-except-sign 31. 0)

(eval-when (eval compile load)
(defconst single-expt-max (field-mask single-expt))
(defconst single-expt-bias 127.)
(defconst single-expt-bias-adjust 192.)
);eval-when eval compile load

;;; Structure of internal significand ("frac")
;;; ...          -----23---- --3--
;;; ... V N . xxxxxxxxxxL G R S
;;; ...2726   --<25:3>--- 2 1 0

;;; Where V is overflow bit, N is normalized bit, L is least-significant
;;; bit of the significand, G is guard bit, R is rounding bit, and
;;; S is sticky right-shift bit.

(defsysbyte frac-S-bit 1 0)
(defsysbyte frac-grs 3 0)
(defsysbyte frac-round-dispatch 4 0)           ;LGRS
(defsysbyte frac-L-bit 1 3)
(defsysbyte frac-field 23. 3)
(defsysbyte frac-field-denormalized 23. 4)      ;an extra bit over, since it has no N bit
(defsysbyte frac-normalize-dispatch 4 23.)      ;highest bit is N
(defsysbyte frac-N-bit 1 26.)
(defsysbyte frac-V-bit 1 27.)

;;; Some common constants, abbreviated here.
(defmacro define-side-constants (side &rest list)
  `(progn 'compile
          ,@(loop for n in list
                  collect `(defatomicro ,(fintern "~d=~a" n side)
                                        (,(fintern "~a-CONSTANT" side) ,n)))))
(define-side-constants a 0 1 -1)
(define-side-constants b 1 2 30. 31. -1)
```

```
;;;; flonum-operating-mode

(defsysbyte rounding-mode 2 1)
(def-byte-field rounding-mode-with-inexact (3 1) rounding-mode-mumble)

;;inexact-result must be to immediate left of rounding mode. See single-round-z.

(eval-when (eval compile load)

(defmacro def-rounding-mode-names (&rest pairs)
  (let* ((rm-names (loop for (name doc) in pairs
                         collect (fintern "ROUNDING-MODE-~a" name)))
         (rm-with-inexact (append rm-names
                                  (loop for name in rm-names
                                        collect (fintern "~a-INEXACT" name)))))
    `(progn 'compile
          (defenumerated *rounding-mode-names* ,rm-names)
          (defenumerated *rounding-mode-names-with-inexact* ,rm-with-inexact)
          (defconst *flonum-rounding-mode-doc-alist*
                    ',(loop for (() doc) in pairs
                            for name in rm-names
                            collect `(,doc . ,name))))))

(def-rounding-mode-names
  (nearest "Nearest")
  (zero "toward zero")
  (plus "plus infinity")
  (minus "minus infinity")
  )

(associate-dispatch-cues rounding-mode *rounding-mode-names*)
(associate-dispatch-cues rounding-mode-with-inexact *rounding-mode-names-with-inexact*)
(define-enumerated-value-constants *rounding-mode-names*)
(define-enumerated-value-constants *rounding-mode-names-with-inexact*)
)

(defconst *flonum-trap-names*
          '((inexact-result "Inexact Result")
            (invalid-operation "Invalid Operation")
            (overflow "Overflow")
            (underflow "Underflow")
            (division-by-zero "Division by zero")))

(defmacro def-several-bytes (prefix collection start names)
  `(progn 'compile
          ,@(loop for name in names
                  for index = start then (1+ index)
                  collect `(defsysbyte ,(fintern "~a-~a" prefix name) 1 ,index))
          ,@(and collection
                 `((defsysbyte.,collection ,(length names) ,start)))))

(def-several-bytes trap-enable trap-enables 3
  (inexact-result invalid-operation overflow underflow division-by-zero))

(def-several-bytes flag flag-bits 8.
  (inexact-result invalid-operation overflow underflow division-by-zero))

(def-several-bytes signal () 13.
  (inexact-result invalid-operation overflow underflow division-by-zero))

(def-byte-field infinity-mode (1 18.) infinity-mode-mumble)
(defenumerated *infinity-mode-names* (infinity-mode-affine infinity-mode-projective))
(associate-dispatch-cues infinity-mode *infinity-mode-names*)
(defconst *infinity-mode-doc-alist*
          '(("Affine" . infinity-mode-affine)
            ("Projective" . infinity-mode-projective)))

;;;These forms, e.g. (flag-invalid-operation), all take 2 cycles, but they
;;;get called only in exceptional cases anyway.
#.`(progn 'compile
     ,@(loop for condition in '("INVALID-OPERATION" "OVERFLOW" "UNDERFLOW" "DIVISION-BY-ZERO")
             as flag-name = (fintern "FLAG-~a" condition)
             collect `(defmicro ,flag-name ()
                        `(parallel
                           (assign b-temp (dpb-field 1ea ,',flag-name 0))
                           (call flag-flonum-operating-mode)))
             as signal-name = (fintern "SIGNAL-~a" condition)
             collect `(defmicro ,signal-name ()
                        `(parallel
                           (assign b-temp (dpb-field 1ea ,',signal-name 0))
                           (call flag-flonum-operating-mode)))))

;;This uses a b-side constant because it gets called all the bloody time, and wants
;;not to take 2 cycles.
(defmicro flag-inexact-result ()
  `(assign flonum-operating-mode
           (logior flonum-operating-mode (b-constant (field-mask flag-inexact-result)))))

(defmicro signal-inexact-result ()
  `(assign flonum-operating-mode
           (logior flonum-operating-mode (b-constant (field-mask signal-inexact-result)))))
```

```
(defmicro flag-inexact-result-and-return ()
  '(parallel
     (flag-inexact-result)
     (return)))

(defmicro signal-inexact-result-and-trap ()
  '(flonum-trap-to-macrocode (signal-inexact-result) fadd-operation))
;;;; Some general utility micros

;;This should be '(parallel (assign ,loc ,val) (if (fixnum-zero obus) ,@clauses))
;;Except that fixnum-zero uses an alu operation.
;;Of course, we have to do it this way anyway since we can't check alu output for
;;zeroness, just for -1ness.
(defmicro if-zero-fixnum-assignment (pair &body clauses)
  (if (not (= (length pair) 2))
      (ferror () "Bad (loc val) pair in ~s"
              '(if-zero-fixnum-assignment ,pair ,@clauses)))
  (let ((loc (first pair)) (val (second pair)))
    '(sequential
       (assign ,loc ,val)
       (if (zero-fixnum ,loc)
           ,@clauses))))

(defmicro if-minus-fixnum-assignment (pair &body clauses)
  (if (not (= (length pair) 2))
      (ferror () "Bad (loc val) pair in ~s"
              '(if-zero-fixnum-assignment ,pair ,@clauses)))
  (let ((loc (first pair)) (val (second pair)))
    '(parallel
       (assign ,loc ,val)
       (if (minus-fixnum obus)
           ,@clauses))))

(defmicro ldb-regs (operand)
  '(ldb ,operand byte-s byte-r))

(defmicro flonum-trap-to-macrocode (set-condition operation)
  '(sequential
     ,set-condition
     (parallel
       (pushval (set-type ,operation dtp-fix))
       (jump push-z-and-trap-to-macrocode))))
;;; Some temporaries.

(reserve-scratchpad-memory 2413 2420)

(define-b-temps leave-space-for-division-1
                leave-space-for-division-2
                x-expt          ;wants to be on B side because of (ldb-field next-on-stack)
                x-frac          ;wants to be on B side because of (dpb-field next-on-stack)
                y-sign          ;wants to be opposite next-on-stack.
                z-frac)         ;on B because it gets replaced by byte operations on itself.

(defareg y-expt)                ;wants to be on A side because of  (ldb-field top-of-stack),
                                ;also must be on different side from x-expt.
(defareg y-frac)                ;wants to be on A side because of  (dpb-field top-of-stack),
                                ;also must be on different side from x-frac.
(defareg z-sign)                ;not importantly, see pack-and-return-z
(defareg z-expt)                ;probably on A because of hair in pack-and-return-z
(defareg expt-diff)
;;;; Some FADD micros
(defmicro fadd-adjust-y ()      ;7 cycles
  '(sequential
     (assign z-expt x-expt)
     (assign byte-r 0@a)
     (assign byte-s (1- expt-diff))
     (if (zero-fixnum (ldb-regs y-frac))
         (sequential
           (assign byte-r (- expt-diff))
           (parallel
             (assign byte-s (- 31@b expt-diff))
             (if (minus-fixnum obus)
                 ;;shifting to oblivion
                 (assign y-frac 0@a)
                 (assign y-frac (ldb-regs y-frac)))))
         (sequential
           (assign byte-r (- expt-diff))
           (parallel
             (assign byte-s (- 31@b expt-diff))
             (if (minus-fixnum obus)
                 (assign y-frac (a-constant (field-mask frac-S-bit)))
                 (assign y-frac (logior (ldb-regs y-frac)
                                        (b-constant (field-mask frac-S-bit))))))))))

(defmicro fadd-adjust-x-neg ()                  ;7 cycles
  '(sequential
    (assign z-expt y-expt)
    (assign byte-r 0@a)
    (assign byte-s (- -1@b expt-diff))
    (if (zero-fixnum (ldb-regs x-frac))
```

```
        (sequential
          (assign byte-r expt-diff)
          (parallel
            (assign byte-s (+ 31eb expt-diff))
            (if (minus-fixnum obus)
                (assign x-frac 0aa)
                (assign x-frac (ldb-regs x-frac)))))
        (sequential
          (assign byte-r expt-diff)
          (parallel
            (assign byte-s (+ 31eb expt-diff))
            (if (minus-fixnum obus)
                (assign x-frac (a-constant (field-mask frac-S-bit)))
                (assign x-frac (logior (ldb-regs x-frac)
                                       (a-constant (field-mask frac-S-bit)))))))))))

(defmicro right-shift-z-by-1 ()         ;3 cycles
  '(sequential
     (assign z-expt (1+ z-expt))
     (if (field-bit z-frac frac-S-bit)
       (assign z-frac (logior 1ea (ldb z-frac 31. 1)))
       (assign z-frac (ldb z-frac 31. 1)))))

(defmicro pack-and-return-z ()          ;4 cycles
  '(sequential
     (assign b-temp (ldb-field z-frac frac-field))
     (assign b-temp (dpb-field z-expt single-expt b-temp))
     (assign b-temp (dpb-field b-temp single-except-sign z-sign))
     (parallel
       (pop2push (set-type b-temp dtp-float))
       (next-instruction))))
;;When z-expt ≤ 0, denormalize z-frac by right shifting -<z-expt> + 1 bits.
;;Costs 1 cycle in normal case.
(defmicro check-underflow (operation)
  '(if (plus-fixnum z-expt)
       (drop-through)
       (sequential
         (if (field-bit flonum-operating-mode trap-enable-underflow)
           (flonum-trap-to-macrocode (signal-underflow) ,operation)
           ;;Ok, if z-expt is -n, we want to sticky-right-shift z-frac by n+1 bits.
           (sequential
             (flag-underflow)
             (call normalize-z)
             (assign byte-r 0aa)
             (assign byte-s (- 2eb z-expt))
             (if (zero-fixnum (ldb-regs z-frac))
                 (sequential
                   (assign byte-r (- z-expt 1eb))
                   (parallel
                     (assign byte-s (+ 30eb z-expt))
                     (if (minus-fixnum obus)
                         (assign z-frac 0aa)
                         (assign z-frac (ldb-regs z-frac)))))
                 (sequential
                   (assign byte-r (- z-expt 1eb))
                   (parallel
                     (assign byte-s (+ 30eb z-expt))
                     (if (minus-fixnum obus)
                         (assign z-frac (a-constant (field-mask frac-S-bit)))
                         (assign z-frac (logior (ldb-regs z-frac)
                                                (a-constant (field-mask frac-S-bit))))))))
             (assign z-expt 0aa)))))

;;Invalid-Operation if storing a unnormalized (but not denormalized) result.
;;  This is the case if N=0 and expt≠0
;;Overflow if expt ≥ single-expt-max
;;Costs 2 cycles in the normal case.
(defmicro check-invalid-and-overflow (operation)
 '(if (field-bit z-frac frac-N-bit)
    (if (lesser-fixnum z-expt (b-constant single-expt-max))
        (drop-through)



        (flonum-trap-to-macrocode (signal-overflow) ,operation))
    ;;Here, we have an unnormalized fraction.  It's denormalized (and hence, ok)
    ;;if its expt is zero.
    (if (zero-fixnum z-expt)
        (drop-through)
;;;; Flonum add/subtract
(defucode fadd
  (parallel
    (trap-no-save)
    (assign y-sign top-of-stack)
    (jump fadd-common)))

(defucode fsub
  (parallel
    (trap-no-save)
```

```
    (assign y-sign (logxor -1ea top-of-stack))
    (jump fadd-common)))

(defucode fadd-common
  (if-zero-fixnum-assignment (x-expt (ldb-field next-on-stack single-expt))
    (assign x-frac (dpb-field next-on-stack frac-field-denormalized 0))
    (if (equal-fixnum x-expt (a-constant single-expt-max))
        (goto fadd-inf-or-nan)
        (assign x-frac (+ (b-constant (field-mask frac-N-bit))
                          (dpb-field next-on-stack frac-field 0)))))
  (if-zero-fixnum-assignment (y-expt (ldb-field top-of-stack single-expt))
    (assign y-frac (dpb-field top-of-stack frac-field-denormalized 0))
    (if (equal-fixnum y-expt (b-constant single-expt-max))
        (goto fadd-to-inf-or-nan)
        (sequential
          (assign b-temp (dpb-field top-of-stack frac-field
                                    (a-constant (field-mask frac-N-bit))))
          (assign y-frac b-temp))))
  ;;Adjust
  (if-zero-fixnum-assignment (expt-diff (- x-expt y-expt))
    (assign z-expt x-expt)
    (if (minus-fixnum expt-diff)
        (fadd-adjust-x-neg)
        (fadd-adjust-y)))
  ;;Check signs
  (if (not (minus-fixnum (logxor y-sign next-on-stack)))
    ;;signs the same, add magnitudes
    (sequential
      (assign z-sign y-sign)
      (assign z-frac (+ x-frac y-frac))
      (if (field-bit z-frac frac-V-bit)
          (right-shift-z-by-1)
          (if (zero-fixnum z-frac)
              (goto fadd-resulted-in-zero)
              (drop-through))))
    ;;signs differ, subtract magnitudes
    (sequential
      (if (plus-or-zero-fixnum y-sign)
          (assign z-frac (- y-frac x-frac))
          (assign z-frac (- x-frac y-frac)))
      (if (zero-fixnum z-frac)
          (goto fadd-resulted-in-zero)            ;check for true zero vs. underflow
          (if (minus-fixnum z-frac)
              (sequential
                (assign z-frac (- z-frac))
                (assign z-sign (a-constant (field-mask single-sign))))
              (assign z-sign 0ea)))
      ;;Check whether input operands had been normalized
      (assign b-temp (logior x-frac y-frac))
      (if (field-bit b-temp frac-N-bit)
          (call normalize-z)
          (drop-through))))
  (check-underflow fadd-operation)
  (call single-round-z)
  (check-invalid-and-overflow fadd-operation)
  (pack-and-return-z))
;;;; Normalization
;;; Shift up to 4 bits at a whack.  We try to pipeline something useful
;;; with take-dispatch, hence some of the hair here.  Below, * represents
;;;a microcycle. (xxx;yyy) represents xxx and yyy done in parallel.

;;; Main                                Aux
;;; * Select dispatch                   * Select dispatch
;;; * Take dispatch                     * (Assign expt; Take dispatch, same as at left)
;;;    0:    * (assign frac; jump aux)
;;;    1-7:  * Assign frac
;;;          * (Assign expt; return)
;;;    8-15: * Return

;;; We parallel


(defmicro z-normalize-steps (num)
  `(sequential
     (assign z-frac (rotate z-frac ,num))
     (assign z-expt (- z-expt (b-constant ,num)))))

;; This is a micro so it can be shared between normalize-z and normalize-z-aux
;; next is the "next" that follows dispatch-after-next
(defmicro normalize-z-dispatch (next)
  `(parallel
     (dispatch-after-next (ldb-field z-frac frac-normalize-dispatch)
       ;;Dispatching on N.xxx
       ((0)              ;0000
        (parallel
          (assign z-frac (rotate z-frac 4))
          (jump normalize-z-aux)))
       ((1)              ;0001
        (parallel
          (z-normalize-steps 3)
          (return)))
```

```
      ((2 3)             ;801x
       (parallel
         (z-normalize-steps 2)
         (return)))
      ((4 5 6 7)         ;01xx
       (parallel
         (z-normalize-steps 1)
         (return))))
    (if (greater-or-equal-fixnum-unsigned (ldb-field z-frac frac-normalize-dispatch)
                                          (a-constant #o13))
        (parallel ,next (return))
        (parallel ,next (take-dispatch)))))

(defucode normalize-z
  (normalize-z-dispatch ()))

(defucode normalize-z-aux
  (normalize-z-dispatch
    (assign z-expt (- z-expt (b-constant 4)))))
;;;; Rounding

(defmicro increment-z-frac-L-bit ()
  '(sequential
     (assign z-frac (+ z-frac (a-constant (field-mask frac-L-bit))))
     (if (field-bit z-frac frac-V-bit)
         (right-shift-z-by-1)
         (drop-through))))

;;We dispatch on rounding mode combined with the inexact-result-trap-enable bit,
;;so we don't have to screw around deciding whether to trap.

(defucode single-round-z
  (if (equal-fixnum (rounding-mode-with-inexact flonum-operating-mode)
                    rounding-mode-nearest)
      ;;round z to nearest, don't try to trap on Inexact-Result
      ;;We can't pull the IF/DISPATCH hack here because z-frac comes from B side,
      ;;as must the internally-generated constant for (if (zero-fixnum alub) ...)
     (dispatch-after-this (ldb-field z-frac frac-round-dispatch)
                          (nop)
      :: dispatching on LGRS: Signal Inexact-Result unless GRS=0,
      :: do nothing further when GRS < 4.  When GRS=4, make the L bit zero
      ::  (i.e., 0100 ok, 1100 add 1 in L position).  Otherwise, add 1 in L.
      ((0 10) ;0000, 1000
       (return))
      ((1 2 3 4 #o11 #o12 #o13)          ;0001, 001x, 0100, 1001, 101x
       (flag-inexact-result-and-return))
      ((5 6 7 14 15 16 17)     ;01xx, 11xx
       (increment-z-frac-L-bit)
       (flag-inexact-result-and-return)))
     (drop-through))
  (dispatch-after-this (rounding-mode-with-inexact flonum-operating-mode)
                       (nop)
    ;;rounding-mode-nearest is taken care of by the IF above
    ((rounding-mode-nearest-inexact)     ;do trap on inexact result
     (dispatch-after-this (ldb-field z-frac frac-round-dispatch)
                          (nop)
      ((0 10)            ;0000, 1000
       (return))
      ((1 2 3 4 #o11 #o12 #o13)          ;0001, 001x, 0100, 1001, 101x
       (signal-inexact-result-and-trap))
      ((5 6 7 14 15 16 17)       ;01xx, 11xx
       (increment-z-frac-L-bit)
       (signal-inexact-result-and-trap))))
    ((rounding-mode-zero)
     (if (not-zero-fixnum (ldb-field z-frac frac-grs))
         (flag-inexact-result-and-return)
         (return)))
    ((rounding-mode-zero-inexact)
     (if (not-zero-fixnum (ldb-field z-frac frac-grs))
         (signal-inexact-result-and-trap)
         (return)))
    ((rounding-mode-plus)
     (if (plus-fixnum z-sign)
         (goto single-round-z-up-nosignal)
         (goto single-round-z-down-nosignal)))
    ((rounding-mode-plus-inexact)
     (if (plus-fixnum z-sign)
         (goto single-round-z-up-signal)
         (goto single-round-z-down-signal)))
    ((rounding-mode-minus)
     (if (plus-fixnum z-sign)
         (goto single-round-z-down-nosignal)
         (goto single-round-z-up-nosignal)))
    ((rounding-mode-minus-inexact)
     (if (plus-fixnum z-sign)
         (goto single-round-z-down-signal)
         (goto single-round-z-up-signal)))))

(defucode single-round-z-up-nosignal
  (if (zero-fixnum (ldb-field z-frac frac-grs))
      (return)
```

```
        (sequential
          (increment-z-frac-L-bit)
          (flag-inexact-result-and-return))))
  (defucode single-round-z-up-signal
    (if (zero-fixnum (ldb-field z-frac frac-grs))
        (return)
        (sequential
          (increment-z-frac-L-bit)
          (signal-inexact-result-and-trap))))

  (defucode single-round-z-down-nosignal
    (if (zero-fixnum (ldb-field z-frac frac-grs))
        (flag-inexact-result-and-return)
        (return)))
  (defucode single-round-z-down-signal
    (if (zero-fixnum (ldb-field z-frac frac-grs))
        (signal-inexact-result-and-trap)
        (return)))
```

---

```
;;;; fadd exceptional cases
;;Might as well save a ucode space word everywhere, as well.
(defucode flag-flonum-operating-mode
  (parallel
    (assign flonum-operating-mode
            (logior flonum-operating-mode b-temp))
    (return)))

(defucode fadd-resulted-in-zero
  (if (equal-fixnum (ldb-field flonum-operating-mode rounding-mode)
                    rounding-mode-minus)
      (assign z-sign (a-constant (field-mask single-sign)))
      (assign z-sign 0a))
  ;;If either operand was normalized after binary point alignment, set the exponent
  ;;to minimum value, i.e., true zero.  If neither was, leave the expt alone, so
  ;;an Underflow trap will occur when storing the result is attempted.
  (assign b-temp (logior x-frac y-frac))
  (if (field-bit b-temp frac-N-bit)
      (parallel
        (pop2push (set-type z-sign dtp-float))
        (next-instruction))
      (if (zero-fixnum b-temp)                          ;both operands were zero
          (parallel
            (pop2push (set-type z-sign dtp-float))
            (next-instruction))
          (flonum-trap-to-macrocode (signal-underflow) fadd-operation))))

(defucode push-z-and-trap-to-macrocode
  (pushval (set-type z-frac dtp-fix))
  (pushval (set-type z-expt dtp-fix))
  (pushval (set-type z-sign dtp-fix))
  (jump trap-to-macrocode))

(defucode fadd-inf-or-nan
  (flonum-trap-to-macrocode (signal-invalid-operation) fadd-operation))

(defucode fadd-to-inf-or-nan
  (flonum-trap-to-macrocode (signal-invalid-operation) fadd-operation))

(defucode trap-to-macrocode                              ;--- someone should write this
  (signal-error-no-restore-stack floating-point-trap-to-macrocode))
;;; Scaling

;If there is any exception, we just trap to the macrocoded ash, which is perhaps wrong
(defucode ash-float
  ;; First check for exceptional cases
  (if (zero-fixnum (ldb-field next-on-stack single-except-sign))        ;0.0 or -0.0
      (parallel
        (pop2push next-on-stack)
        (next-instruction))
      (drop-through))
  (if (zero-fixnum (ldb-field next-on-stack single-expt))
      (goto ash-overflow)
      (drop-through))
  (if (equal-fixnum (ldb-field next-on-stack single-expt) (b-constant single-expt-max))
      (goto ash-overflow)
      (drop-through))
  ;; Scale the exponent
  (assign b-temp (+ (ldb-field next-on-stack single-expt) top-of-stack))
  (if (plus-fixnum b-temp)
      (if (lesser-fixnum b-temp (a-constant single-expt-max))
          (parallel
            (pop2push (set-type (dpb-field b-temp single-expt next-on-stack) dtp-float))
            (next-instruction))
          (goto ash-overflow))                          ;exponent overflow
      (goto ash-overflow)))                             ;exponent underflow
```

---

```
;          5          4          3          2          1          0
;       321.987654321.98765432|1.987654321.987654321.987654321.
;       n.....................|...grsn.......................grx     without V
;       654321.987654321.9876|54321.
;       .987654321.987654321.|
```

```
;           n.......................|..grsn.......................grs     with V
;           654321.987654321.98765|4321.
;           1.987654321.987654321.|
;           321.987654321.98765432|1.987654321.987654321.987654321.
;             5         4         3         2         1         0

(defsysbyte fmul-lo-lost 26. 0)
(defsysbyte fmul-lo-take 6 26.)
(defsysbyte fmul-hi-take 21. 0)
(defsysbyte fmul-hi-put 21. 6)
(defsysbyte fmul-hi-V-bit 1 21.)

(defsysbyte fmul-lo-lost-V 27. 0)
(defsysbyte fmul-lo-take-V 5. 27.)
(defsysbyte fmul-hi-take-V 22. 0)
(defsysbyte fmul-hi-put-V 22. 5)

(defatomicro fmul-hi-part expt-diff)
(defatomicro fmul-lo-part b-low-dividend)

;;to pass to mpy-32-32 which wants routines
(defmicro fmul-store-hi-part (x)
  `(assign fmul-hi-part ,x))
(defmicro fmul-store-lo-part (x)
  `(assign fmul-lo-part ,x))

(defucode fmul
  (parallel (if-zero-fixnum-assignment (x-expt (ldb-field next-on-stack single-expt))
                (assign x-frac (dpb-field next-on-stack frac-field-denormalized 0))
                (if (equal-fixnum x-expt (a-constant single-expt-max))
                    (goto fmul-inf-or-nan)
                    (assign x-frac (+ (b-constant (field-mask frac-N-bit))
                                      (dpb-field next-on-stack frac-field 0)))))
            (trap-no-save))
  (if-zero-fixnum-assignment (y-expt (ldb-field top-of-stack single-expt))
    (assign y-frac (dpb-field top-of-stack frac-field-denormalized 0))
    (if (equal-fixnum y-expt (b-constant single-expt-max))
        (goto fmul-to-inf-or-nan)
        (sequential
          (assign b-temp (dpb-field top-of-stack frac-field
                                    (a-constant (field-mask frac-N-bit))))
          (assign y-frac b-temp))))
  (assign z-sign (logxor top-of-stack next-on-stack))
  (mpy-32-32 y-frac x-frac
                  fmul-store-lo-part fmul-store-hi-part
                  ())
  (if (field-bit fmul-hi-part fmul-hi-V-bit)
    (sequential
      (assign z-expt (+ x-expt y-expt 1))
      (if (zero-fixnum (ldb-field fmul-lo-part fmul-lo-lost-V))
          (assign z-frac (ldb-field fmul-lo-part fmul-lo-take-V))
          (assign z-frac (logior 1@a (ldb-field fmul-lo-part fmul-lo-take-V))))
      (assign z-frac (dpb-field fmul-hi-part fmul-hi-put-V z-frac)))
    (sequential
      (assign z-expt (+ x-expt y-expt))
      (if (zero-fixnum (ldb-field fmul-lo-part fmul-lo-lost))
          (assign z-frac (ldb-field fmul-lo-part fmul-lo-take))
          (assign z-frac (logior 1@a (ldb-field fmul-lo-part fmul-lo-take))))
      (assign z-frac (dpb-field fmul-hi-part fmul-hi-put z-frac))))
  (if (not-zero-fixnum z-frac)
      (sequential
        (assign z-expt (- z-expt (b-constant single-expt-bias)))
        (check-underflow fmul-operation))
      (assign z-expt 0a1))
  (call single-round-z)
  (check-invalid-and-overflow fmul-operation)
  (pack-and-return-z))

(defucode fmul-inf-or-nan
  (flonum-trap-to-macrocode (signal-invalid-operation) fmul-operation))
(defucode fmul-to-inf-or-nan
  (flonum-trap-to-macrocode (signal-invalid-operation) fmul-operation))
;;divisor is top-of-stack (b) moved to y
;;dividend is next-on-stack (a) moved to x

;             5         4         3         2         1         0
;          321.987654321.98765432|1.987654321.987654321.987654321.
;              n................|.....!grs?.......................!     ;dividend, upper
;              321.987654321.9876|54321.
;              7654321.987654321.|
;                                |
;          321.987654321.98765432|1.987654321.987654321.987654321.     ;divisor
;             5         4         3         2         1         0

(defsysbyte fdiv-hi-take 17. 6)          ;dividend
(defsysbyte fdiv-lo-put 6 26.)
(eval-when (eval compile load)
(defconst fdiv-hi-N-bit (ash 1 17.))
)
```

```
(defucode fdiv
  ;;hack the divisor
  (parallel
    (if-zero-fixnum-assignment (y-expt (ldb-field top-of-stack single-expt))
        (goto fdiv-by-zero-or-denorm)
        (if (equal-fixnum y-expt (b-constant single-expt-max))
            (goto fdiv-by-inf-or-nan)
            (sequential
              (assign a-positive-divisor (ldb-field top-of-stack single-frac))
              (assign a-positive-divisor
                      (logior a-positive-divisor (b-constant (field-mask single-N-bit))))
              (assign a-negative-divisor (- a-positive-divisor)))))
    (trap-no-save))
  ;;hack the dividend
  (if-zero-fixnum-assignment (x-expt (ldb-field next-on-stack single-expt))
    ;; Divisor is normal, but dividend is zero or denormalized
    (if (zero-fixnum (ldb-field next-on-stack single-frac))
         ;; Zero divided by non-zero is zero, with xor of operands' signs
         (sequential
           (assign b-temp (dpb-field (b-constant 0) single-except-sign top-of-stack-a))
           (parallel (pop2push (set-type (logxor next-on-stack b-temp) dtp-float))
                     (next-instruction)))
         ;; Dividend is denormalized
         (goto fdiv-into-denorm))
    ;; Dividend and divisor are normal
    (if (equal-fixnum x-expt (a-constant single-expt-max))
        (goto fdiv-into-inf-or-nan)
        (sequential
          (assign b-high-dividend
                  (logior (ldb-field next-on-stack fdiv-hi-take)
                          (b-constant fdiv-hi-N-bit)))
          (assign b-low-dividend (dpb-field next-on-stack fdiv-lo-put 0)))))
  (parallel
    ;;15. = 32./2-1, see call to divide-routine in the DIVISION file.
    ;;consider shifting operands to reduce this to 24./2-1 somehow.
    (assign a-divide-step-count (a-constant 15.))
    (call divide-subroutine))  ;leave quo in b-low-dividend, and rem in b-high-dividend.
  ;;if there was a remainder, set the sticky bit for rounding; and move to z-frac for
  ;;single-round-z.
  ;;---figure a good way to fold this in with the rounding??
  (if (not-zero-fixnum b-high-dividend)
      (assign z-frac (logior b-low-dividend (a-constant (field-mask frac-S-bit))))
      (assign z-frac b-low-dividend))
  ;;If quotient N-bit is zero, then left-shift quo by 1 and decr its expt
  (if (field-bit b-low-dividend frac-N-bit)
    (assign z-expt (- x-expt y-expt))
    (sequential
      (assign z-expt (- x-expt y-expt 1))
      (assign z-frac (rotate z-frac 1))))
  (assign z-expt (+ z-expt (b-constant single-expt-bias)))
  (assign z-sign (logxor next-on-stack top-of-stack))
  (check-underflow fdiv-operation)
  (call single-round-z)
  (check-invalid-and-overflow fdiv-operation)
  (pack-and-return-z))

(defucode fdiv-by-zero-or-denorm
  (flonum-trap-to-macrocode (signal-invalid-operation) fdiv-operation))
(defucode fdiv-by-inf-or-nan
  (flonum-trap-to-macrocode (signal-invalid-operation) fdiv-operation))
(defucode fdiv-into-denorm
  (flonum-trap-to-macrocode (signal-invalid-operation) fdiv-operation))
(defucode fdiv-into-inf-or-nan
  (flonum-trap-to-macrocode (signal-invalid-operation) fdiv-operation))
;;; Convert fixnum on top of stack to flonum on top of stack
;;;Traps to macrocode aren't really going to work, yet.

(eval-when (eval compile load)
(defconst *setz-as-flonum*                          ;setz here being -1_31.
          (dpb-field 1 single-sign
                     (dpb-field (+ single-expt-bias 31.) single-expt 0)))
);eval-when eval-compile-load

(defucode convert-fixnum-to-flonum
  (if (minus-fixnum top-of-stack)
      (if (zero-fixnum (ldb top-of-stack 31. 0))          ;setz?
          (parallel
            (newtop (set-type (b-constant *setz-as-flonum*) dtp-float))
            (return))
          (sequential
            (assign z-sign (b-constant 1_31.))
            (assign b-temp (- top-of-stack))))
      (if (zero-fixnum top-of-stack)
          (parallel
            (newtop (set-type (b-constant 0) dtp-float))
            (return))
          (sequential
            (assign z-sign (b-constant 0))
            (assign b-temp top-of-stack))))
  (if (zero-fixnum (ldb b-temp 4 27.))            ;the bits above frac-n-bit
```

```
    ;;they are zero, no sweat
    (sequential
      (assign z-expt (b-constant (+ single-expt-bias 26.)))   ;26. is how far to shift 1 → N
      (assign z-frac b-temp))
    ;;some bits up there, need to shift right by 4 to clear them
    (sequential
      (assign z-expt (b-constant (+ single-expt-bias 26. 4))) ;yes
      (if (zero-fixnum (ldb b-temp 4 0))       ;is sticky bit adjustment necessary?
          (assign z-frac (ldb b-temp 28. 4))  ;no
          (assign z-frac (logior (ldb b-temp 28. 4) (a-constant 1))))))
(call normalize-z)                          ;bum a couple cycles here somehow?
(call single-round-z)
(assign b-temp (ldb-field z-frac frac-field))
(assign b-temp (dpb-field z-expt single-expt b-temp))
(assign b-temp (dpb-field b-temp single-except-sign z-sign))
(parallel
  (newtop (set-type b-temp dtp-float))
  (return)))
;;; Compare flonums: Returns positive number if the first is greater than the second
;;; negative number if the second is greater than the first, and 0 if they are equal
(defucode flonum-compare
  (if (zero-fixnum (ldb-field next-on-stack single-expt))
      (assign x-frac (dpb-field next-on-stack single-frac 0))
      (assign x-frac next-on-stack))
  (if (zero-fixnum (ldb-field top-of-stack-a single-expt))
      (assign y-frac (dpb-field top-of-stack-a single-frac 0))
      (assign y-frac top-of-stack-a))
  (if (equal-fixnum (ldb-field next-on-stack single-expt) (b-constant single-expt-max))
      (goto compare-first-inf-or-nan)
      (drop-through))
  (if (equal-fixnum (ldb-field top-of-stack-a single-expt) (b-constant single-expt-max))
      (goto compare-second-inf-or-nan)
      (drop-through))
  ;; This crap is because of signed magnitude lossage
  (if (minus-fixnum x-frac)
      (if (minus-fixnum y-frac)
          ;; Both negative, larger if xfrac < y-frac
          (parallel (pop2push (set-type (- y-frac x-frac) dtp-fix))
                    (return))
          ;; First is negative, second is positive
          (parallel (pop2push (set-type (b-constant -1) dtp-fix))
                    (return)))
      (if (minus-fixnum y-frac)
          ;; First is positive, second is negative
          (parallel (pop2push (set-type (b-constant 1) dtp-fix))
                    (return))
          ;; Both positive larger if x-frac > y-frac
          (parallel (pop2push (set-type (- x-frac y-frac) dtp-fix))
                    (return)))))

(defucode fgreaterp
  (parallel (nop) (trap-no-save))             ;Cannot call in first cycle after trap
  (call flonum-compare)
  (if (plus-fixnum top-of-stack-a)
      (goto true1)
      (goto false1)))

(defucode flessp
  (parallel (nop) (trap-no-save))             ;Cannot call in first cycle after trap
  (call flonum-compare)
  (if (minus-fixnum top-of-stack-a)
      (goto true1)
      (goto false1)))

(defucode fequal
  (parallel (nop) (trap-no-save))             ;Cannot call in first cycle after trap
  (call flonum-compare)
  (if (zero-fixnum top-of-stack-a)
      (goto true1)
      (goto false1)))

;;; Signum of flonums:
;;; (This is not the SIGNUM function, since it returns a fixnum, not a flonum)
(defucode fsignum
  (if (zero-fixnum (ldb-field top-of-stack-a single-except-sign))
      (parallel (newtop (set-type (b-constant 0) dtp-fix))
                (return))
      (drop-through))
  (if (equal-fixnum (ldb-field top-of-stack-a single-expt) (b-constant single-expt-max))
      (goto signum-inf-or-nan)
      (drop-through))
  (if (minus-fixnum top-of-stack-a)
      (parallel (newtop (set-type (b-constant -1) dtp-fix))
                (return))
      (parallel (newtop (set-type (b-constant 1) dtp-fix))
                (return))))

;;; These could be bummed one cycle if fsignum was not signum, but just returned
;;; the argument except with zero
(defucode fplusp
```

```
  (parallel (nop) (trap-no-save))                  ;Cannot call in first cycle after trap
  (call fsignum)
  (if (plus-fixnum top-of-stack)
      (goto true1)
      (goto false1)))

(defucode fminusp
  (parallel (nop) (trap-no-save))                  ;Cannot call in first cycle after trap
  (call fsignum)
  (if (minus-fixnum top-of-stack)
      (goto true1)
      (goto false1)))

(defucode fzerop
  (parallel (nop) (trap-no-save))                  ;Cannot call in first cycle after trap
  (call fsignum)
  (if (zero-fixnum top-of-stack)
      (goto true1)
      (goto false1)))

(defucode minus-flonum
  (parallel (trap-no-save)
            (if (equal-fixnum (ldb-field top-of-stack-a single-expt)
                              (b-constant single-expt-max))
                (goto minus-inf-or-nan)
                (drop-through)))
  (parallel (newtop (set-type (logxor (b-constant (field-mask single-sign))
                                      top-of-stack-a)
                              dtp-float))
            (next-instruction)))
```

F:>lmach>ucode>flavor.lisp.25

```
;;; -*- Mode:Lisp; Package:Micro; Base:8; Lowercase:yes -*-
;;; (c) Copyright 1982, Symbolics, Inc.

; Microcode for flavors

;Get defmicro and all his hosts
#M
(declare (cond ((not (status feature lmucode))
               (load 'udcls))))

(reserve-scratchpad-memory 2452 2460 345 351)

;Data on the most recently used mapping table (an ART-1EB array)
(defbreg b-cached-mapping-table)
(defareg a-cached-mapping-table-address)
(defareg a-cached-mapping-table-size)

(defatomicro self
  (amem (frame-pointer 0)))

(defatomicro self-mapping-table
  (amem (frame-pointer 1)))

(definst push-instance-variable-ordered unsigned-immediate-operand
  (parallel (check-arg-type instance self dtp-instance)
            (memread (+ self macro-unsigned-immediate)))
  (parallel (transport data)
            (pushval memory-data)
            (next-instruction)))

(definst movem-instance-variable-ordered (unsigned-immediate-operand needs-stack)
  (parallel (check-arg-type instance self dtp-instance)
            (memread (+ self macro-unsigned-immediate)))
  (parallel (transport write)              ;Follow any forwarding pointer
            (assign a-temp                 ;Merge new data with old cdr code
                    (merge-cdr top-of-stack memory-data)))
  (parallel (store-contents a-temp)        ;Now write back the new car
            (next-instruction)))

(definst pop-instance-variable-ordered (unsigned-immediate-operand needs-stack)
  (parallel (check-arg-type instance self dtp-instance)
            (assign vma (+ self macro-unsigned-immediate)))
  (parallel (start-memory read)
            (assign b-temp top-of-stack))
  (for-effect (popval))
  (parallel (transport write)              ;Follow any forwarding pointer
            (assign a-temp                 ;Merge new data with old cdr code
                    (merge-cdr b-temp memory-data)))
  (parallel (store-contents a-temp)        ;Now write back the new car
            (next-instruction)))

(definst1 push-address-instance-variable-ordered unsigned-immediate-operand
  (check-arg-type instance self dtp-instance)
  (pushval (set-type (+ self macro-unsigned-immediate) dtp-locative)))

;8 cycles if the mapping table is already encached
;Additional 11 cycles to encache it if necessary
;Would be 7 cycles with no range check and assumed simple array format, thus no encaching
```

```
(definst push-instance-variable unsigned-immediate-operand
  (parallel
    (check-arg-type self-mapping-table self-mapping-table dtp-array)
    (call-select (equal-typed-pointer self-mapping-table b-cached-mapping-table)
                 fast-mapping-table-lookup slow-mapping-table-lookup))
  (start-memory read)
  (nop)
  (parallel (transport data)
            (pushval memory-data)
            (next-instruction)))

(definst movem-instance-variable (unsigned-immediate-operand needs-stack)
  (parallel
    (check-arg-type self-mapping-table self-mapping-table dtp-array)
    (call-select (equal-typed-pointer self-mapping-table b-cached-mapping-table)
                 fast-mapping-table-lookup slow-mapping-table-lookup))
  (start-memory read)
  (nop)
  (parallel (transport write)           ;Follow any forwarding pointer
            (assign a-temp              ;Merge new data with old cdr code
                  (merge-cdr top-of-stack memory-data)))
  (parallel (store-contents a-temp)     ;Now write back the new car
            (next-instruction)))

(definst pop-instance-variable (unsigned-immediate-operand needs-stack)
  (parallel
    (check-arg-type self-mapping-table self-mapping-table dtp-array)
    (call-select (equal-typed-pointer self-mapping-table b-cached-mapping-table)
                 fast-mapping-table-lookup slow-mapping-table-lookup))
  (parallel (start-memory read)
            (assign b-temp top-of-stack))
  (for-effect (popval))
  (parallel (transport write)           ;Follow any forwarding pointer
            (assign a-temp              ;Merge new data with old cdr code

                  (merge-cdr b-temp memory-data)))
  (parallel (store-contents a-temp)     ;Now write back the new car
            (next-instruction)))

(definst push-address-instance-variable unsigned-immediate-operand
  (parallel
    (check-arg-type self-mapping-table self-mapping-table dtp-array)
    (call-select (equal-typed-pointer self-mapping-table b-cached-mapping-table)
                 fast-mapping-table-lookup slow-mapping-table-lookup))
  (parallel (pushval (set-type vma dtp-locative))
            (next-instruction)))

(defucode slow-mapping-table-lookup
  (parallel (check-arg-type self-mapping-table self-mapping-table dtp-array)
            (assign vma self-mapping-table)
            (assign b-vma self-mapping-table)
            (call array-setup-1d-zero))
 ;(trap-if (not-zero-fixnum top-of-stack) (signal-error "Index offset not handled"))
 ;(trap-if (not-equal-fixnum (array-register-dispatch-field (amem (stack-pointer 1)))
 ;                           %array-register-dispatch-16-bit)
 ;          (signal-error "Mapping table must be art-16b"))
 (assign a-cached-mapping-table-address (amem (stack-pointer 2)))
 (assign a-cached-mapping-table-size (amem (stack-pointer 3)))
 (assign b-cached-mapping-table self-mapping-table)
 (parallel (assign top-of-stack top-of-stack-a)
           (jump fast-mapping-table-lookup)))

(defucode fast-mapping-table-lookup
 ;; Divide the instance-variable number by 2 and access the art-16b array
 (assign vma (+ a-cached-mapping-table-address (rotate macro-unsigned-immediate 37)))
 ;; Range-check the instance-variable number
 (parallel (start-memory read)
           (error-if (greater-or-equal-fixnum-unsigned macro-unsigned-immediate
                                                       a-cached-mapping-table-size)
                   mapping-table-out-of-bounds))
 ;; Extract the appropriate halfword, put instance-variable address into VMA
 (parallel
   (check-arg-type instance self dtp-instance)
   (assign b-temp self)
   (if (ldb-bit-test macro-unsigned-immediate 0)                ;oddp
       (machine-version-case
         ((tmc tmc5) (sequential
                       (assign a-temp memory-data)
                       (assign vma (+ b-temp (ldb a-temp 20 20)))))
         (otherwise (assign vma (+ b-temp (ldb memory-data 20 20)))))
       (machine-version-case
         ((tmc tmc5) (sequential
                       (assign a-temp memory-data)
                       (assign vma (+ b-temp (ldb a-temp 20 0)))))
         (otherwise (assign vma (+ b-temp (ldb memory-data 20 0)))))))
 ;This could check for instance-variable-number out of range, but that would
 ;require accessing another field in the instance descriptor.  The flavor system
 ;is not supposed to let that happen.  But instance variable zero is really
 ;accessed when an instance variable is deleted or only existed at compile time.
 (parallel
   (error-if (equal-pointer vma b-temp) instance-variable-zero-referenced)
   (return)))
```

```
(define-storage-word-offset-constants instance-descriptor)

;; VMA has the address of an instance.  Return its size in a-temp.
(defucode instance-size
  (start-memory read)                              ;Fetch instance-descriptor
  (nop)
  (parallel (transport header)
            (machine-version-case
              ((tmc tmc5) (sequential
                            (assign a-temp memory-data)
                            (assign vma (+ a-temp %instance-descriptor-size))))
              (otherwise (assign vma (+ memory-data %instance-descriptor-size))))
            (call memread))
  (parallel (declare-memory-timing data-cycle)
            (check-arg-type instance-size memory-data dtp-fix)
            (assign a-temp memory-data)
            (return)))

(definst %instance-ref unsigned-immediate-operand
  (parallel (check-arg-type instance top-of-stack-a dtp-instance)
            (assign vma top-of-stack-a)
            (call instance-size))
  (error-if (greater-fixnum-unsigned macro-unsigned-immediate a-temp)
            illegal-subscript)
  (parallel (assign vma (+ top-of-stack-a macro-unsigned-immediate))
            (jump newtopmem)))

(definst %instance-loc unsigned-immediate-operand
  (parallel (check-arg-type instance top-of-stack-a dtp-instance)
            (assign vma top-of-stack-a)
            (call instance-size))
  (error-if (greater-fixnum-unsigned macro-unsigned-immediate a-temp)
            illegal-subscript)
  (parallel (newtop (set-type (+ top-of-stack-a macro-unsigned-immediate) dtp-locative))
            (next-instruction)))

(definst %instance-set unsigned-immediate-operand
  (parallel (check-arg-type instance top-of-stack-a dtp-instance)
            (assign vma top-of-stack-a)
            (call instance-size))
  (error-if (greater-fixnum-unsigned macro-unsigned-immediate a-temp)
            illegal-subscript)
  (parallel (assign vma (+ top-of-stack-a macro-unsigned-immediate))
            (decrement-stack-pointer)
            (jump popmem)))

(defareg a-instance-descriptor)
(defareg a-hash-table)
(defbreg b-message)
(defbreg b-self)
(defareg a-hash-table-limit)

;Come here when calling a function that turns out to be an instance
(defucode funcall-instance
  (restart-pc restart-trapped-call-escape-pc)          ;in case of page fault
  (parallel (accept-restart-pc)
            (assign vma frame-function)                ;Get the instance descriptor
            (assign b-vma frame-function))
  (start-memory read)
  (if (not (bit first-part-done))
      (sequential
        (parallel (transport header)
                  (assign a-instance-descriptor memory-data))
        (assign vma (+ a-instance-descriptor %instance-descriptor-bindings))
        (parallel
          (start-memory read)
          (assign frame-function (set-type b-vma dtp-instance))) ;follow-structure-forwarding
        (pushval (set-type (a-constant 1) dtp-fix))     ;Index of instance variable slot
        (parallel
          (pushval memory-data)                         ;Bindings list
          (transport data)
          (check-arg-type instance-binding-table memory-data dtp-list dtp-nil)
          (if (data-type? memory-data dtp-list)
              (parallel
                (assign frame-misc-data
                  (logior frame-misc-data (b-constant (+ (byte-mask frame-instance-called)
                                                         (byte-mask first-part-done)))))
                (clear-stack-adjustment)
                (jump funcall-instance-binding-loop))
              (parallel
                (assign frame-misc-data
                  (logior frame-misc-data (b-constant (+ (byte-mask frame-instance-called)
                                                         (byte-mask first-part-done)))))
                (clear-stack-adjustment)
                (jump funcall-instance-part-2)))))
      (parallel                                         ;Here when restarting after pcler
        (transport header)
        (assign a-instance-descriptor memory-data)
        (jump funcall-instance-binding-loop))))

(defucode funcall-instance-binding-loop
  (parallel (assign vma top-of-stack-a)
```

```
    (if (not (data-type? top-of-stack-a dtp-list))
        (goto funcall-instance-part-2)          ;Pclsred after binding-loop finished
        (drop-through)))
  (start-memory read)
  (assign b-self frame-function)
  (parallel (transport)
        (check-arg-type instance-binding memory-data dtp-fix dtp-locative)
        (assign b-temp memory-data)
        (assign a-hash-table memory-data)
        (if (data-type? memory-data dtp-fix)
            ;; Skip over some instance variable slots
            (assign next-on-stack (set-type (+ next-on-stack b-temp) dtp-fix))
            ;; Bind this cell
            (sequential
              (pushval (set-type (+ b-self next-on-stack)
                                 dtp-external-value-cell-pointer))
              (parallel
                (assign vma a-hash-table)
                (call bind-top-of-stack-closure))
              (assign next-on-stack (set-type (1+ next-on-stack) dtp-fix)))))
  ;; a-hash-table still has the word from memory, check the cdr code to see if we're done
  (parallel (newtop (set-type (1+ top-of-stack) dtp-list))
        (if (cdr-code? a-hash-table cdr-next)
            (goto funcall-instance-binding-loop)
            (parallel
              (newtop quote-nil)                ;Flag that we're done binding
              (jump funcall-instance-part-2)))))

;At this point, all of the bindings have been done, two words have been pushed on the
;stack (but their contents is garbage), and first-part-done is set.  Find the
;hash table for the flavor.  (The non-hash-table case has been punted since
;SELF is not a special variable and would not get bound.)
(defucode funcall-instance-part-2
  ;; Set a-hash-table to the hash table
  (memread (+ a-instance-descriptor %instance-descriptor-function))
  (parallel (transport)
        (check-arg-type instance-hash-table memory-data dtp-array)
        (assign a-hash-table memory-data))
  ;; Find the first argument (the message keyword), put it in b-message
  (if (not (bit frame-lexpr-called))
      (sequential
        (error-if (lesser-fixnum-unsigned frame-number-of-args (b-constant 1))
                  wrong-number-of-arguments)
        (assign b-temp frame-number-of-args)
        (assign xbas (- frame-pointer b-temp))
        (assign b-message (amem (xbas -5))))
      (if (greater-or-equal-fixnum-unsigned frame-number-of-args (b-constant 2))
          (sequential
            (assign b-temp frame-number-of-args)
            (assign xbas (- frame-pointer b-temp))
            (assign b-message (amem (xbas -5))))
          (sequential
            (memread (amem (frame-pointer -6)))
            (parallel (transport)
                      (assign b-message memory-data)))))
  ;; The hash-table is a short-leader array, with a 1-word prefix and a 4-word leader
  ;; The first 3 elements are: mask, undefined-message-handler, gc-generation-number
  (assign vma (+ a-hash-table (b-constant 5)))           ;Get the mask
  (start-memory read)
  (assign a-hash-table (+ a-hash-table (b-constant (+ 1 4 3)))) ;Start of actual hash
  (parallel (check-arg-type instance-hash-table-entry memory-data dtp-fix)
        (assign a-temp memory-data)
        (assign b-temp memory-data))
  (assign b-temp-2 (+ a-temp (dpb b-temp 31. 1 8)))      ;mask times 3
  (assign a-hash-table-limit (+ a-hash-table b-temp-2))
  (parallel
    (assign b-temp (logand b-message a-temp))            ;mask symbol with mask
    (assign a-temp obus))
  (assign b-temp-2 (+ a-temp (dpb b-temp 31. 1 8)))      ;multiply that by 3, use as hash
  (parallel (assign vma (+ a-hash-table b-temp-2))
        (assign b-temp obus)
        (jump funcall-instance-hash-loop)))

(defucode funcall-instance-hash-loop
  (parallel
    (start-memory read)
    (trap-if (greater-pointer b-temp a-hash-table-limit)
             (parallel
               (trap-no-save)
               (assign vma a-hash-table)
               (assign b-temp a-hash-table)
               (jump funcall-instance-hash-loop))))
  (assign b-self frame-function)
  (parallel (trap-if (data-type? memory-data dtp-nil)
                     (goto funcall-instance-hash-miss))
            (assign a-temp memory-data))
  (if (equal-typed-pointer a-temp b-message)
      (goto funcall-instance-hash-win)
      (parallel
        (assign vma (+ vma (b-constant 3)))
```

```
        (assign b-temp obus)
        (jump funcall-instance-hash-loop))))

(defucode funcall-instance-hash-miss
  (parallel (trap-no-save)
            (assign self-mapping-table quote-nil))
  (memread (- a-hash-table (b-constant 2)))                ;Get miss handler
  (parallel (transport)
            (assign frame-function mcmory-data))
  (assign self b-self)
  (parallel (assign first-part-done (b-constant 8))
            (jump restart-trapped-call)))

(defucode funcall-instance-hash-win
  (memread (1+ vma))                                       ;Get the mapping table
  (parallel (transport)
            (assign self-mapping-table memory-data))
  ;; If it pclsrs here, self-mapping-table isn't a list so it won't
  ;; think it's a binding list and go try to do bindings
  (memread (1+ vma))                                       ;Get the method
  (parallel (transport)
            (assign frame-function memory-data))
  ;Cannot pclsr any more, finish up
  (assign self b-self)
  (parallel (assign first-part-done (b-constant 8))
            (jump restart-trapped-call)))
```

F:>lmach>ucode>DIVISION.LISP.34

```
;;; -*- Mode:Lisp; Package:Micro; Base:8; Lowercase:yes -*-
;;; (c) Copyright 1982, Symbolics, Inc.

; Microcode for division

;Get defmicro and all his hosts
#M
(declare (cond ((not (status feature lmucode))
                (load 'udcls))))

;Temporary storage

(reserve-scratchpad-memory 2434 2437)

(defareg a-positive-divisor)           ;Magnitude of divisor
(defareg a-negative-divisor)           ;2's-complement of that
(defareg a-divide-step-count)          ;Number of bits over 2 minus 1 (counts down)

(define-b-temps b-high-dividend        ;Ends up with remainder
                b-low-dividend)        ;Ends up with quotient

;Given dividend and divisor on the stack, set up internal variables
(defmicro integer-divide-setup (index &optional float-version)
  '(sequential
     (parallel
       (check-binary-arithmetic-operands-fast no-operand ,index nil ,float-version)
       (assign b-low-dividend next-on-stack)
       (if (minus-fixnum next-on-stack)
           (assign b-low-dividend (- next-on-stack))
           (drop-through)))
     (parallel (assign b-high-dividend (b-constant 8))
               (call divisor-setup))))

;TRUNC2 instruction takes dividend and divisor on the stack,
;returns truncated quotient and remainder on the stack.
;--- This code needs to be bummed, it wastes 5 whole cycles ---
(definst trunc2 no-operand
  (integer-divide-setup %arith-op-divide)
  (call trunc2-internal)
  (assign next-on-stack                          ;Quotient
        (set-cdr (set-type b-low-dividend dtp-fix) cdr-next))
  (parallel
    (newtop (set-type b-high-dividend dtp-fix)) ;Remainder
    (next-instruction)))

;;; This is necessary because for floating point calculating remainder is expensive.
;;; Therefore the compiler generates calls to these instructions if possible
(definst quotient-stack no-operand
  (integer-divide-setup %arith-op-divide fdiv)
  (call trunc2-internal)
  (parallel (pop2push (set-type b-low-dividend dtp-fix))
            (next-instruction)))

(definst remainder-stack no-operand
  (integer-divide-setup %arith-op-remainder)
  (call trunc2-internal)
  (parallel (pop2push (set-type b-high-dividend dtp-fix))
            (next-instruction)))

(defucode trunc2-internal
  (call divide-subroutine)             ;Do the division
```

```
;Now compute results, using truncate mode
(if (plus-or-zero-fixnum next-on-stack)          ;Check sign of dividend
    (if (plus-or-zero-fixnum top-of-stack-a)     ; and of divisor
        (return)
        (parallel (assign b-low-dividend (- b-low-dividend))
                  (return)))
    (sequential
      (if (plus-or-zero-fixnum top-of-stack-a)
          (assign b-low-dividend (- b-low-dividend))
          (error-if (minus-fixnum b-low-dividend)
                    unimplemented-arithmetic))          ;---
      (parallel (assign b-high-dividend (- b-high-dividend))
                (return)))))

;Given divisor at the top of the stack, and dividend already set up,
;finish setting up the division.
(defucode divisor-setup
  (parallel (assign a-positive-divisor top-of-stack-a)
            (if (minus-fixnum top-of-stack-a)
                (assign a-positive-divisor (- top-of-stack-a))
                (drop-through)))
  (parallel (assign a-negative-divisor (- a-positive-divisor)))
  (parallel (assign a-divide-step-count (a-constant 15.))
            (return)))                    ;15=32/2-1, see call to divide-routine

;Do 32 divide steps in a loop unrolled n-steps ways, 2 cycles per bit.
;DIVIDE-n-ADD-b is the nth (from the end) step for when we should add,
; because we subtracted too much last time, where b (0 or 1) is the
; next bit to shift in from the low half of the dividend.
;DIVIDE-n-SUB-b is the step for when we should subtract.
;DIVIDE-n-Q1 is the second cycle of the step, with a quotient bit of 1.
;DIVIDE-n-Q0 is the second cycle with a quotient bit of 0.

(defmacro divide-routine (n-steps)
  `(progn 'compile
     . ,(loop for step downfrom n-steps above 0
          collect
           `(defucode ,(fintern "DIVIDE-~D-SUB-0" step)
              (parallel
                (assign b-high-dividend
                        (+ a-negative-divisor (dpb b-high-dividend 31. 1 0)))
                (if (minus-fixnum obus)
                    (goto ,(fintern "DIVIDE-~D-Q0" step))
                    (goto ,(fintern "DIVIDE-~D-Q1" step)))))
          collect
           `(defucode ,(fintern "DIVIDE-~D-SUB-1" step)
              (parallel
                (assign b-high-dividend
                        (+ a-negative-divisor (dpb b-high-dividend 31. 1 0) 1))
                (if (minus-fixnum obus)
                    (goto ,(fintern "DIVIDE-~D-Q0" step))
                    (goto ,(fintern "DIVIDE-~D-Q1" step)))))
          collect
           `(defucode ,(fintern "DIVIDE-~D-ADD-0" step)
              (parallel
                (assign b-high-dividend
                        (+ a-positive-divisor (dpb b-high-dividend 31. 1 0)))
                (if (minus-fixnum obus)
                    (goto ,(fintern "DIVIDE-~D-Q0" step))
                    (goto ,(fintern "DIVIDE-~D-Q1" step)))))
          collect
           `(defucode ,(fintern "DIVIDE-~D-ADD-1" step)
              (parallel
                (assign b-high-dividend
                        (+ a-positive-divisor (dpb b-high-dividend 31. 1 0) 1))
                (if (minus-fixnum obus)
                    (goto ,(fintern "DIVIDE-~D-Q0" step))
                    (goto ,(fintern "DIVIDE-~D-Q1" step)))))
          collect
           `(defucode ,(fintern "DIVIDE-~D-Q0" step)
              ,@(if (= step 1)
                    `((parallel
                        (assign a-divide-step-count (1- a-divide-step-count))
                        (if (minus-fixnum obus)
                            (sequential
                              ;Remainder correction
                              (assign b-high-dividend
                                      (+ b-high-dividend a-positive-divisor))
                              (parallel
                                (assign b-low-dividend
                                        (dpb b-low-dividend 31. 1 0))
                                (return)))
                            (drop-through)))))
              (parallel
                (assign b-low-dividend (dpb b-low-dividend 31. 1 0))
                (if ybus-31
                    (goto ,(fintern "DIVIDE-~D-ADD-1"
                                    (if (> step 1) (1- step) n-steps)))
                    (goto ,(fintern "DIVIDE-~D-ADD-0"
                                    (if (> step 1) (1- step) n-steps))))))
```

```
          collect
           '(defucode ,(fintern "DIVIDE-~D-Q1" step)
              ,@(if (= step 1)
                   '((parallel
                        (assign a-divide-step-count (1- a-divide-step-count))
                        (if (minus-fixnum obus)
                            (parallel
                              (assign b-low-dividend
                                      (1+ (dpb b-low-dividend 31. 1 0)))
                              (return))
                            (drop-through)))))
              (parallel
                (assign b-low-dividend (1+ (dpb b-low-dividend 31. 1 0)))
                (if ybus-31
                    (goto ,(fintern "DIVIDE-~D-SUB-1"
                                    (if (> step 1) (1- step) n-steps)))
                    (goto ,(fintern "DIVIDE-~D-SUB-0"
                                    (if (> step 1) (1- step) n-steps))))))))

;For the simulator, make it small and slow
(divide-routine 2)

;This does the first step and enters the loop at the appropriate point
;The first step is different in that the dividend is not shifted beforehand.
;The first step is also different in that if it produces a quotient bit of 1
;there is divide overflow (unsigned quotient doesn't fit in 32 bits).
;For integer division, this only happens when the divisor is zero,
;or when dividing setz by -1 (overflow to bignum)
(defucode divide-subroutine
  (parallel
    (assign b-high-dividend (+ a-negative-divisor b-high-dividend))
    (if (minus-fixnum obus)
        (parallel
      (assign b-low-dividend (dpb b-low-dividend 31. 1 0))
      (if ybus-31
          (goto DIVIDE-2-ADD-1)      ;2: see divide-routine macro above
          (goto DIVIDE-2-ADD-0)))    ;..
    (signal-error divide-by-zero))))        ;---?
```

F:>lmach>ucode>disk.lisp.56

```
;;; -*- Mode:Lisp; Package:Micro; Base:8; Lowercase:yes -*-
;;; (c) Copyright 1982, Symbolics, Inc.

;;; Microcode for the disk

;To do:
; Save control memory by subroutinizing more, including the nops
; Add network to device service task

(reserve-scratchpad-memory 2518 2514 351 356)

;Do not use define-b-temps here, since this microprogram runs asynchronously
;with the emulator task


;;; "Hardware" definitions

;%device-service-task -- low-priority task started at device-service-loop
;%disk-dma-task -- high-priority task started by service task when required

(define-lbus-card iob)


;;; Current state of the disk tasks

;This register contains the physical address of the next word to be transferred
;It can be looked at by macrocode (after a disk transfer)
;The sign bit is 0 if this is the last DAP, 1 if more addresses follow (data chaining)
(defareg %disk-memory-address)
(defatomicro disk-memory-address %disk-memory-address)  ;synonym without the %

;This register contains the number of words remaining to be transferred, minus 2,
;before advancing to the next DAP.  For the last DAP, this is the number of words
;remaining in the block, minus 3 for a write or read-compare, or 4 for a read.
;Note: this register must be in the top 16 B registers to avoid having to
;make disk-new-dap two cycles slower, which is undesirable since it runs
;in a high-priority task.
(defbreg-at-loc disk-word-count 376)

(defareg %disk-dcw-address)     ;Physical address of the first word in the
                                ;DCW command block currently being executed

(defareg disk-dap-address)      ;Address from which the next DAP will be fetched

(defbreg current-disk-dcw)      ;Copy of DCW currently being executed

(defbreg current-disk-dcw2)     ;Second word of current DCW
                                ;For transfer commands, this is the desired sector header
```

```
(defareg %disk-sector-max-tries (set-type 28. dtp-fix))
(defareg disk-sector-tries)       ;Counts header compares to detect "search error", maybe
                                  ;due to disk heads being positioned wrong.

(defareg %disk-command-address)  ;Physical address of disk command register
(defareg %disk-status-address)   ;Physical address of disk status register

(defbreg disk-command-val1)       ;First command to issue (search or transfer)
                                  ;Also used generally to hold disk status and as temporary
(defbreg disk-command-val2)       ;Second command to issue (transfer: write or read-compare)
(defbreg disk-command-stop)       ;Value to store to stop it (no start bit)

(defareg disk-temp)               ;Temporary for read-disk-status-to-val1

(defareg %disk-wakeup)            ;Normally NIL, set to T by wakeup DCW, stop DCW, or error

(defareg %disk-micro-status)      ;A fixnum which is the state of the microcode tasks
                                  ;Used both for intercommunication between the 2 micro
                                  ;tasks and for communication with the Lisp-coded driver

(defatomic-byte-field disk-micro-status (4 8) %disk-micro-status)
(associate-dispatch-cues disk-micro-status *disk-micro-status-codes*)
(define-enumerated-value-constants *disk-micro-status-codes*)

(associate-dispatch-cues %%dcw-micro-command *dcw-micro-commands*)

(defareg service-task-requests 0)        ;Bits for each function required
(defatomic-byte-field %%service-disk (1 0) service-task-requests)
                                         ;DMA task done; ready for next DCW
;;; Regular net service
(defatomic-byte-field %%service-net (1 1) service-task-requests)
;;; Receive end service
(defatomic-byte-field %%service-receive-end (1 2) service-task-requests)
;;; Abnormal transmit termination
(defatomic-byte-field %%service-transmit-collision (1 3) service-task-requests)

;Wakeup the disk driver macrocode
;This is called in the service task
(defmicro wakeup-driver ()
  '(parallel (assign %disk-wakeup quote-t)
             (call set-sequence-break)))

;Wakeup the disk service task
;This is called in the DMA task usually, but can also be called by the emulator
(defmicro wakeup-disk-service ()
  '(parallel (assign service-task-requests
                     (logior service-task-requests (b-constant (byte-mask %%service-disk))))
             (wakeup-task %device-service-task)))

;Set the state of the disk DMA task.  Hardware will wake it up.
(defmicro start-disk-dma (location)
  '(write-task-state %disk-dma-task
                     (a-constant '(build-task-state cpc ,location
                                                    npc (npc-successor ,location)
                                                    csp 17))))

;Dismiss in both the CPU and the IOB, when not starting a dma cycle
(defmicro dismiss-disk-task ()
  '(parallel (write-lbus-dev iob 4 nil)
             (dismiss)))

;Same, with task-acknowledge (prevent overrrun)
(defmicro dismiss-disk-task-and-ack (&optional end-flag)
  '(parallel (write-lbus-dev iob ,(if end-flag 6 2) nil)
             (dismiss)))

;Space-saver
(defmicro phys-mem-read (address)
  '(parallel (start-memory read physical ,address)
             (call phys-mem-read-delay)
             (declare-memory-timing (next data-cycle))))

(defucode phys-mem-read-delay
  (return))

;Terminate the disk DMA task (called in that task).  This is used for
;both normal and error termination.  Sets %disk-micro-status to its
;argument, awakens the service task, kills the disk dma task assignment,
;and dismisses (looping a little until the dismiss takes effect).
;This also clears control tag, while leaving the rest of the command
;register, and the error status, intact.  We must store into %disk-micro-status
;before awakening the service task, since we might enter this microsequence
;with a dismiss of the DMA task already pending.
(defmicro terminate-disk-dma (disk-status-code)
  '(sequential
     (parallel
       (extra-time-to-drive-lbus)                  ;Needed by many callers, save typing
       (assign %disk-micro-status (set-type ,disk-status-code dtp-fix)))
     (parallel
       (wakeup-disk-service)
       (jump terminate-disk-dma))))
```

```
(defucode terminate-disk-dma
  (parallel
    (dismiss)
    (write-lbus-dev iob 5 nil)                 ;Clear task assignment, control tag
    (jump terminate-disk-dma)))                ;Keep stabbing until the blood flows

;The ICB is slow to drive the write-data onto the bus
;Put the extra time in the first half so it occurs before the clock
;We want the ecc bits to be set up at the memory before the clock (write command)
(defmicro extra-time-to-drive-ibus ()
  '(microinstruction speed slow-first-half))

;It's slow for microdevice reads, too, for the same reason
(defatomicro read-disk-buffer
  (parallel
    (read-lbus-dev iob 0)
    (declare-speed slow-first-half)))

;This kludge is to compensate for the fact that the disk status register is not
;synchronized with the Lbus clock.  There is no safe way to read a consistent
;set of bits, however we can read whatever we get as long as we don't put it
;in a place that has parity checking.
;Result ends up in the disk-command-vall B-register (low 28 bits only)
(defmicro read-disk-status-to-vall ()
  '(parallel
     (start-memory read physical %disk-status-address)
     (call read-disk-status-to-vall)))

(defucode read-disk-status-to-vall
  (parallel
    (declare-memory-timing active-cycle)
    (assign disk-temp frame-pointer))          ;Save register while awaiting memory
  (assign frame-pointer memory-data)           ;Capture and synchronize memory data
  (assign disk-command-vall frame-pointer)     ;Store result
  (parallel (assign frame-pointer disk-temp)
            (return)))
;;; Disk DMA task.

;This micro generates the search for sector header at the front of a DMA routine
;Entered the first time with the disk idle, future times with the disk reading
;5 cycles per wakeup if sector not found
;1 cycle (plus body) when sector found
(defmacro define-disk-search-ucode (tag &body body)
  (or (eq (car body) 'goto) (setq body '(sequential . ,body)))
  '(defucode ,tag
     ;; Stop the disk state machine if it is running
     (parallel
       (start-memory write physical %disk-command-address)
       (assign memory-data disk-command-stop))
     ;; Start the hardware searching for the next sector header
     (parallel
       (start-memory write physical %disk-command-address)
       (assign memory-data disk-command-vall))
     ;; Dismiss until the header has been read
     (parallel
       (dismiss-disk-task)
       ;; Stop if too many tries without a header match
       (assign disk-sector-tries (1- disk-sector-tries))
       (if (minus-fixnum obus)
           (terminate-disk-dma %disk-micro-status-search-error)
           (nop)))
     ;; Come back here on next wakeup, with header in disk buffer register
     ;; If header matches, drop through; otherwise keep searching
     (if (not-equal-fixnum current-disk-dcw2 read-disk-buffer)
         (goto ,tag)
         ,body)))

;Call here when a DAP has been exhausted and we need to start transferring
;at a new address.  Haven't dismissed yet after transferring the last word
;in the old DAP's block of addresses.  Dismisses and returns on next wakeup,
;with address and word count set up from new DAP.  Skips upon return if
;this was not the last DAP.
;We use up 6 cycles instead of the usual 2 per wakeup.
(defucode disk-new-dap
  (nop)                                        ;Wait for memory to be unbusy
  (parallel                                    ;Fetch first word of DAP
    (start-memory read physical disk-dap-address)
    (assign disk-dap-address (1+ disk-dap-address)))
  (parallel                                    ;Fetch second word of DAP
    (start-memory read physical disk-dap-address)
    (assign disk-dap-address (1+ disk-dap-address)))
  (parallel
    (dismiss-disk-task)
    (assign disk-word-count memory-data))
  (parallel
    (assign disk-memory-address memory-data)
    (return-skip (minus-fixnum memory-data)))) ;Test chain bit
```

```
;Read routine.  Use this for both 32-bit and 36-bit reads.
(define-disk-search-ucode disk-read
  ;; Wait for first data word in sector
  (dismiss-disk-task-and-ack)
  (if (minus-fixnum disk-memory-address)
      (goto disk-read-loop)
      (goto disk-read-loop-last)))

;DMA transfer loop, when this is not the last DAP
(defucode disk-read-loop
  ;; First cycle: increment MA, start memory
  (parallel
    (start-memory write physical disk-memory-address dma iob 3)
    (assign disk-memory-address (1+ disk-memory-address))
    (dismiss)
    (if lbus-dev-cond
        (terminate-disk-dma %disk-micro-status-disk-error)
        (drop-through)))
  ;; Second cycle: count down WC.
  (parallel
    (extra-time-to-drive-lbus)
    (assign disk-word-count (1- disk-word-count))
    (if (minus-fixnum obus)
        (parallel
          ;; First cycle for last word in this DAP.  Transfer then fetch next DAP.
          ;; We don't check for disk-error here, but if there is one we'll
          ;; notice it soon enough.
          (start-memory write physical disk-memory-address dma iob 1)
          (assign disk-memory-address (1+ disk-memory-address))
          (call-and-return-skip disk-new-dap disk-read-loop-last disk-read-loop))
        (goto disk-read-loop))))

;DMA transfer loop, when this is the last DAP
(defucode disk-read-loop-last
  ;; First cycle: increment MA, start memory
  (parallel
    (start-memory write physical disk-memory-address dma iob 3)
    (assign disk-memory-address (1+ disk-memory-address))
    (dismiss)
    (if lbus-dev-cond
        (terminate-disk-dma %disk-micro-status-disk-error)
        (drop-through)))
  ;; Second cycle: count down WC.
  (parallel
    (extra-time-to-drive-lbus)
    (assign disk-word-count (1- disk-word-count))
    (if (minus-fixnum obus)
        (goto disk-read-drain)
        (goto disk-read-loop-last))))

;Here to read the last 3 words
(defucode disk-read-drain
  ;; Transfer last word with end flag, then 2 more drain words which
  ;; the disk sends before it stops
  (parallel
    (start-memory write physical disk-memory-address dma iob 7)
    (assign disk-memory-address (1+ disk-memory-address))
    (dismiss)
    (if lbus-dev-cond
        (terminate-disk-dma %disk-micro-status-disk-error)
        (drop-through)))
  (parallel
    (extra-time-to-drive-lbus)
    (nop))
  (parallel
    (start-memory write physical disk-memory-address dma iob 7)
    (assign disk-memory-address (1+ disk-memory-address))
    (dismiss)
    (if lbus-dev-cond
        (terminate-disk-dma %disk-micro-status-disk-error)
        (drop-through)))
  (parallel
    (extra-time-to-drive-lbus)
    (nop))
  (parallel
    (start-memory write physical disk-memory-address dma iob 7)
    (assign disk-memory-address (1+ disk-memory-address))
    (dismiss)
    (if lbus-dev-cond
        (terminate-disk-dma %disk-micro-status-disk-error)
        (drop-through)))
  (parallel
    (extra-time-to-drive-lbus)
    (nop))
  ;; Wake up here when state machine stops, after reading ECC
  (terminate-disk-dma %disk-micro-status-end-read))
;Write routine.  Use this for both 32-bit and 36-bit writes.
;6 cycles the first time through
(define-disk-search-ucode disk-write
  ;; Stop the disk state machine
  (parallel
```

```
    (start-memory write physical %disk-command-address)
    (assign memory-data disk-command-stop))
  ;; Switch disk over to write operation, then feed first word without dismissing
  (parallel
    (start-memory write physical %disk-command-address)
    (assign memory-data disk-command-val2)
    (jump disk-write-startup)))

;For first DMA transfer when writing, must not check state machine aliveness since
;it hasn't sent us any wakeups yet.  Must decide whether this is last (and first) DAP.
(defucode disk-write-startup
  ;; Increment MA, start memory to fetch first word of write data
  (parallel
    (start-memory read physical disk-memory-address dma iob 3)
    (assign disk-memory-address (1+ disk-memory-address))
    (dismiss)
    (if (minus-fixnum obus)
        (goto disk-write-loop-1)
        (goto disk-write-loop-last-1))))

;DMA transfer loop, not last DAP
(defucode disk-write-loop
  ;; First cycle: increment MA, start memory
  (parallel
    (start-memory read physical disk-memory-address dma iob 3)
    (assign disk-memory-address (1+ disk-memory-address))
    (dismiss)
    (if lbus-dev-cond
        (terminate-disk-dma %disk-micro-status-disk-error)
        (goto disk-write-loop-1))))

(defucode disk-write-loop-1
  ;; Second cycle: count down WC.
  (parallel
    (assign disk-word-count (1- disk-word-count))
    (if (minus-fixnum obus)
        (parallel
          ;; Transfer last word and fetch new DAP
          (start-memory read physical disk-memory-address dma iob 1)
          (assign disk-memory-address (1+ disk-memory-address))
          (call-and-return-skip disk-new-dap disk-write-loop-last disk-write-loop))
        (goto disk-write-loop))))

;DMA transfer loop, last DAP
(defucode disk-write-loop-last
  ;; First cycle: increment MA, start memory
  (parallel
    (start-memory read physical disk-memory-address dma iob 3)
    (assign disk-memory-address (1+ disk-memory-address))
    (dismiss)
    (if lbus-dev-cond
        (terminate-disk-dma %disk-micro-status-disk-error)
        (goto disk-write-loop-last-1))))

(defucode disk-write-loop-last-1
  ;; Second cycle: count down WC.
  (parallel
    (assign disk-word-count (1- disk-word-count))
    (if (minus-fixnum obus)
        (goto disk-write-drain)
        (goto disk-write-loop-last))))

;Transfer last two words in sector with end flag
(defucode disk-write-drain
  (parallel (start-memory read physical disk-memory-address dma iob 7)
            (assign disk-memory-address (1+ disk-memory-address))
            (dismiss)
            (if lbus-dev-cond
                (terminate-disk-dma %disk-micro-status-disk-error)
                (drop-through)))
  (nop)
  (parallel (start-memory read physical disk-memory-address dma iob 7)
            (assign disk-memory-address (1+ disk-memory-address))
            (dismiss)
            (if lbus-dev-cond
                (terminate-disk-dma %disk-micro-status-disk-error)
                (drop-through)))
  (nop)
  ;; Wake up here when state machine has swallowed last word
  (dismiss-disk-task)
  (nop)
  ;; Wake up here when state machine stops, after writing ECC
  (terminate-disk-dma %disk-micro-status-end-write))

;Read-compare routine.  Use this for both 32-bit and 36-bit reads.
;This is a hybrid of read and write
(define-disk-search-ucode disk-read-compare
  ;; Stop the disk state machine
  (parallel
    (start-memory write physical %disk-command-address)
    (assign memory-data disk-command-stop))
  ;; Switch disk over to read/compare operation, then feed first word without dismissing
  (parallel
```

```
    (start-memory write physical %disk-command-address)
    (assign memory-data disk-command-val2)
    (jump disk-read-compare-startup)))

;For first DMA transfer, must not check state machine aliveness since
;it hasn't sent us any wakeups yet.  Must decide whether this is last (and first) DAP.
(defucode disk-read-compare-startup
  ;; Increment MA, start memory to fetch first word of data
  (parallel
    (start-memory read physical disk-memory-address dma iob 3)
    (assign disk-memory-address (1+ disk-memory-address))
    (dismiss)
    (if (minus-fixnum obus)
        (goto disk-read-compare-loop-1)
        (goto disk-read-compare-loop-last-1))))

;DMA transfer loop, not last DAP
(defucode disk-read-compare-loop
  ;; First cycle: increment MA, start memory
  (parallel
    (start-memory read physical disk-memory-address dma iob 3)
    (assign disk-memory-address (1+ disk-memory-address))
    (dismiss)
    (if lbus-dev-cond
        (terminate-disk-dma %disk-micro-status-disk-error)
        (goto disk-read-compare-loop-1))))

(defucode disk-read-compare-loop-1
  ;; Second cycle: count down WC.
  (parallel
    (assign disk-word-count (1- disk-word-count))
    (if (minus-fixnum obus)
        (parallel
          ;; Transfer last word and fetch new DAP
          (start-memory read physical disk-memory-address dma iob 1)
          (assign disk-memory-address (1+ disk-memory-address))
          (call-and-return-skip disk-new-dap
                                disk-read-compare-loop-last disk-read-compare-loop))
        (goto disk-read-compare-loop))))

;DMA transfer locp, last DAP
(defucode disk-read-compare-loop-last
  ;; First cycle: increment MA, start memory
  (parallel
    (start-memory read physical disk-memory-address dma iob 3)
    (assign disk-memory-address (1+ disk-memory-address))
    (dismiss)
    (if lbus-dev-cond
        (terminate-disk-dma %disk-micro-status-disk-error)
        (goto disk-read-compare-locp-last-1))))

(defucode disk-read-compare-loop-last-1
  ;; Second cycle: count down WC.
  (parallel
    (assign disk-word-count (1- disk-word-count))
    (if (minus-fixnum obus)
        (goto disk-read-compare-drain)
        (goto disk-read-compare-loop-last))))

;Transfer last two words in sector with end flag
(defucode disk-read-compare-drain
  (parallel
    (start-memory read physical disk-memory-address dma iob 7)
    (assign disk-memory-address (1+ disk-memory-address))
    (dismiss)
    (if lbus-dev-cond
        (terminate-disk-dma %disk-micro-status-disk-error)
        (drop-through)))
  (nop)
  (parallel
    (start-memory read physical disk-memory-address dma iob 7)
    (assign disk-memory-address (1+ disk-memory-address))
    (dismiss)
    (if lbus-dev-cond
        (terminate-disk-dma %disk-micro-status-disk-error)
        (drop-through)))
  (nop)
  ;; Wake up here when state machine has swallowed last word
  (dismiss-disk-task)
  (nop)
  ;; Wake up here when state machine stops, after reading ECC
  (terminate-disk-dma %disk-micro-status-end-read-compare))

;Write-all command.  Wait for an index pulse then go start writing.
(defucode disk-write-all
  (call-and-return-to start-read-or-write-all disk-write-startup))

;Read-all command.  Wait for an index pulse then start reading.
(defucode disk-read-all
  (call start-read-or-write-all)
  (dismiss-disk-task)
  (if (minus-fixnum disk-memory-address)
```

```
      (goto disk-read-loop)
      (goto disk-read-loop-last)))

;Since index pulse is narrow, we actually loop in this high-priority task
(defucode start-read-or-write-all
  ;; Loop until Index is true
  (read-disk-status-to-val1)
  (if (field-bit disk-command-val1 %%dsr-index)
      (drop-through)
      (goto start-read-or-write-all))
  ;; Start up the disk state machine.  By the time it gets going we should
  ;; be near the trailing edge of Index.
  (parallel
    (start-memory write physical %disk-command-address)
    (assign memory-data disk-command-val2)
    (return)))


;Sector-wait command  (used for seek-wait)
;Service task starts hardware in Sector Wait command.  We wakeup immediately
;and then again at the beginning of the next sector
(defucode disk-sector-wait
  (dismiss-disk-task)
  (nop)
  ;; Wake up here when state machine sees sector pulse
  (terminate-disk-dma %disk-micro-status-end-sector-wait))


;Read-header command
;Service task starts hardware in Read command, we awaken immediately
;and then again when sector header found
;--- This is pretty much guaranteed to cause an overrun...what to do?
(defucode disk-read-header
  (dismiss-disk-task)
  (nop)
  ;; Do a DMA write of the header into the DCW list (in the immediate arg of the read-header)
  (start-memory write physical disk-dap-address dma iob 1)
  (terminate-disk-dma %disk-micro-status-end-write))
;;; Service task
;--- for now, only serves the disk.  Add the network later.

(defucode device-service-loop
  ;; Scan requests for service
  (if (bit %%service-disk)
      ;; Disk service  (DMA task not running now)
      (dispatch-after-this disk-micro-status
                           (assign %%service-disk (b-constant 0))
        ((%disk-micro-status-idle %disk-micro-status-in-sector %disk-micro-status-stop)
         (jump device-service-end)) ;Use jump rather than goto to save space
        ((%disk-micro-status-search-error %disk-micro-status-disk-error
          %disk-micro-status-ecc-done)
         (parallel (wakeup-driver)
                   (jump device-service-end)))
        ((%disk-micro-status-start)
         (goto fetch-disk-dcw))
        ((%disk-micro-status-end-sector-wait)
         (jump disk-seek-wait)) ;Use jump rather than goto to save space
        ((%disk-micro-status-end-write)
         (call-and-return-to check-disk-status next-disk-dcw))
        ((%disk-micro-status-end-read)
         (call check-disk-status)
         (parallel
           (trap-if (not (field-bit disk-command-val1 %%dsr-ecc-ok)) disk-error-detected)
           (jump next-disk-dcw)))
        ((%disk-micro-status-end-read-compare)
         (call check-disk-status)
         (trap-if (field-bit disk-command-val1 %%dsr-compare-error) disk-error-detected)
         (parallel
           (trap-if (not (field-bit disk-command-val1 %%dsr-ecc-ok)) disk-error-detected)
           (jump next-disk-dcw)))
        (otherwise
         (goto device-service-end)))     ;Ignore any garbage status
      ;; No requests for service
      (goto net-service-loop)))

;; If no requests, dismiss.  If more requests have come in, go do them without
;; dismissing.  Check must be in same cycle as dismiss to avoid hazard.
(defucode device-service-end
  (parallel
    (trap-if (not-zero-fixnum service-task-requests)
             device-service-loop)
    (dismiss))
  (nop)                                  ;Wait two cycles for dismiss
  (jump device-service-loop))

;Read disk status register.  Die if error, and return status in disk-command-val1.
;Note that the control stack can remain pushed spuriously if an error is detected.
;This is not a problem since there are no magic locations in this task's control stack.
(defucode check-disk-status
  (read-disk-status-to-val1)
  (parallel
```

```
    (trap-if (bit-test (a-constant (get '%dsr-error-mask 'sysconstant)) disk-command-val1)
             disk-error-detected)
    (return)))

(defucode disk-error-detected
  (assign %disk-micro-status (set-type %disk-micro-status-disk-error dtp-fix))
  (parallel (wakeup-driver)
            (jump device-service-end)))

;; Do next DCW after the one we just did
(defucode next-disk-dcw
  (parallel
    (assign %disk-dcw-address (+ %disk-dcw-address (ldb-field current-disk-dcw %%dcw-length)))
    (jump fetch-disk-dcw)))

;; Do DCW whose address has been set up
(defucode fetch-disk-dcw
  ;; Start fetch of first word
  (parallel (start-memory read physical %disk-dcw-address)
            (assign disk-dap-address (1+ %disk-dcw-address)))
  ;; Start fetch of second word
  (parallel (start-memory read physical disk-dap-address)
            (assign disk-dap-address (1+ disk-dap-address)))
  ;; Store the DCW away.  Cannot be overlapped with dispatch due to damnable field conflicts
  (assign current-disk-dcw memory-data)
  (assign current-disk-dcw2 memory-data)
  ;; Decode the DCW
  (dispatch-after-this (ldb-field current-disk-dcw %%dcw-micro-command)
       ;; Initialize micro status
       (assign %disk-micro-status (set-type %disk-micro-status-in-sector dtp-fix))
    ((%dcw-u-nop)
     (goto next-disk-dcw))
    ((%dcw-u-stop)
     (sequential
       (assign %disk-micro-status (set-type %disk-micro-status-stop dtp-fix))
       (parallel (wakeup-driver)
                 (jump device-service-end))))
    ((%dcw-u-wakeup)
     (parallel (wakeup-driver)
               (jump next-disk-dcw)))
    ((%dcw-u-goto)
     (parallel
       (assign %disk-dcw-address current-disk-dcw2)
       (jump fetch-disk-dcw)))
    ((%dcw-u-head)
     (goto disk-head-select))
    ((%dcw-u-seek-wait)
     (goto disk-seek-wait))
    ((%dcw-u-read-header)
     (start-disk-dma disk-read-header)
     (parallel (start-memory write physical %disk-command-address)
               (assign memory-data current-disk-dcw2)
               (jump device-service-end)))
    ((%dcw-u-read)
     (parallel (start-disk-dma disk-read)
               (jump start-disk-transfer)))
    ((%dcw-u-write)
     (parallel (start-disk-dma disk-write)
               (jump start-disk-transfer)))
    ((%dcw-u-read-compare)
     (parallel (start-disk-dma disk-read-compare)
               (jump start-disk-transfer)))
    ((%dcw-u-read-all)
     (parallel (start-disk-dma disk-read-all)
               (jump start-disk-transfer)))
    ((%dcw-u-write-all)
     (parallel (start-disk-dma disk-write-all)
               (jump start-disk-transfer)))
    ((%dcw-u-ecc)
     (start-disk-dma disk-ecc)
     (parallel (start-memory write physical %disk-command-address)
               (assign memory-data current-disk-dcw2)
               (jump device-service-end)))
    (otherwise                    ;Die if garbage seen
     (sequential
       (assign %disk-micro-status (set-type %disk-micro-status-stop dtp-fix))
       (parallel (wakeup-driver)
                 (jump device-service-end))))))

;Transfer DCWs come here.  The state of the DMA task has been set.
(defucode start-disk-transfer
  ;; Start fetch of third word (command)
  (parallel (start-memory read physical disk-dap-address)
            (assign disk-dap-address (1+ disk-dap-address)))
  ;; Start fetch of first DAP
  (parallel (start-memory read physical disk-dap-address)
            (assign disk-dap-address (1+ disk-dap-address)))
  ;; Stash command
  (assign disk-command-val1 memory-data)
  ;; Complete fetch of first DAP
  (assign disk-word-count memory-data)
```

```
  (parallel (start-memory read physical disk-dap-address)
            (assign disk-dap-address (1+ disk-dap-address)))
  (assign disk-command-stop (logand disk-command-val1
                                    (a-constant (lognot (field-mask %%dcr-busy)))))
  (assign disk-memory-address memory-data)
  ;; Screw around for 2 extra cycles because of conflicts for AMWA
  (assign disk-sector-tries (ldb-field current-disk-dcw %%dcw-dcr-command))
  (assign disk-sector-tries (dpb-field disk-sector-tries %%dcr-command disk-command-val1))
  (assign disk-command-val2 disk-sector-tries)
  (assign disk-sector-tries %disk-sector-max-tries)
  (parallel (start-memory write physical %disk-command-address)
            (assign memory-data disk-command-stop)      ;Wake up and go to sleep
            (jump device-service-end)))

;Check whether seek has completed immediately and at every sector pulse thereafter
(defucode disk-seek-wait
  (parallel (assign %disk-micro-status (set-type %disk-micro-status-in-sector dtp-fix))
            (call check-disk-status))
  (if (field-bit disk-command-val1 %%dsr-on-cylinder)
      (goto next-disk-dcw)
      (drop-through))
  (start-disk-dma disk-sector-wait)
  (parallel (start-memory write physical %disk-command-address)
            (assign memory-data current-disk-dcw2)
            (jump device-service-end)))

;Head select -- need to twiddle tag bit up and down
(defucode disk-head-select
  ;; Write bus, with tag bit turned off
  (parallel (start-memory write physical %disk-command-address)
            (assign memory-data current-disk-dcw2))
  ;; Write again, with tag bit turned on
  (assign disk-command-val1 (logior (a-constant (field-mask %%dcr-head-tag))
                                    current-disk-dcw2))
  (parallel (start-memory write physical %disk-command-address)
            (assign memory-data disk-command-val1)
            ;; Delay a microsecond or so by checking for error status
            (call check-disk-status))
  ;; Clear tag bit, leaving same value on bus
  (parallel (start-memory write physical %disk-command-address)
            (assign memory-data current-disk-dcw2)
            (jump next-disk-dcw)))

;Error correction computation.  We have to do the word counting here.
;Do it in %disk-memory-address so when we're done the macrocode can read it.
;First, have to take 335-72 wakeups to recycle the ecc code (335 is the
;ecc code field size of 42987 divided by 128, 72 is the sector size
;divided by 128).  The state machine takes care of the extra bits for
;the remainder of 42987/128, minus the 32 bits already clocked when the
;ecc was read at the end of the sector and the 64 bits already clocked
;when the prefix was read.
;The -4 is because if %disk-memory-address starts out negative the state
;machine will still process 3 128-bit chunks before it sees the end flag.
(defucode disk-ecc
  (parallel (assign %disk-memory-address (set-type (b-constant (- 335. 72. 4)) dtp-fix))
            (dismiss-disk-task)
            (jump disk-ecc-loop-1)))

(defucode disk-ecc-loop-1
  (if (minus-fixnum %disk-memory-address)
      ;; Finished recycling code, start counting words of data field
      ;; Start at -3 because we will wake up twice while two more 128-bit
      ;; chunks are passed over, and if we stop after the first word, that
      ;; is word 0.
      (parallel (assign %disk-memory-address (set-type (b-constant -3) dtp-fix))
                (dismiss-disk-task-and-ack end-flag)
                (jump disk-ecc-loop-2))
      (drop-through))
  ;; Wakes up here
  (parallel (assign %disk-memory-address (set-type (1- %disk-memory-address) dtp-fix))
            (dismiss-disk-task-and-ack)
            (jump disk-ecc-loop-1)))

;Now run and count words, until state machine stops or full sector size has been scanned.
(defucode disk-ecc-loop-2
  (if (greater-or-equal-fixnum %disk-memory-address (b-constant 290.))
      (terminate-disk-dma %disk-micro-status-ecc-done)  ;Uncorrectable error
      (drop-through))
  ;; Wakes up here
  (parallel (assign %disk-memory-address (set-type (1+ %disk-memory-address) dtp-fix))
            (dismiss-disk-task-and-ack)
            (if lbus-dev-cond        ;Was this a complete word, or did st mach stop?
                (terminate-disk-dma %disk-micro-status-ecc-done)        ;Correctable error
                (goto disk-ecc-loop-2))))

;;; Initialization--maybe some day the microcode loader can take care of this?
;;; In the meantime the startup microcode should call this subroutine

(defucode disk-initialize
  (parallel
    (write-task-state %device-service-task
```

```
;;; -*- Mode:Lisp; Package:Micro; Base:8; Lowercase:yes -*-
;;; (c) Copyright 1982, Symbolics, Inc.

;;; Microcode for master control

;Get defmicro and all his hosts
#M
(declare (cond ((not (status feature lmucode))
                (load 'udcls))))

(define-sysconstant main-stack-buffer-address)
(define-sysconstant auxiliary-stack-buffer-address)

(reserve-scratchpad-memory 2514 2520)

(defareg current-dp-control)            ;Copy of dp-control register (can't read back)
(defareg a-page-fault-address)          ;VMA of last page fault (for debugging)
(defareg a-page-fault-micro-pc)         ;Micro-PC of last page fault (for debugging)

;If this register is non-zero and we pclsr, save-bitblt-buffer must be
;called after restoring the stack pointer.
(defareg bitblt-buffer-active 0)

;Start the machine here
(defucode-at-loc start 1                ;105 FOOBAR
  (assign b-quote-t quote-t)            ;These are needed on the B side
  (parallel
    (assign b-quote-nil quote-nil)
    (call disk-initialize))             ;Initialize other tasks
  ;; Initialize virtual address map
  (parallel (assign vma (a-constant 0))
            (call clear-map-cache))
  ;; Initialize flags
  (assign a-pclsr-top-of-stack (set-type (b-constant 0) dtp-null))
  (assign bitblt-buffer-active (b-constant 0))
  (assign stack-load-started (b-constant 0))
  (assign current-dp-control (b-constant 0))
  (assign a-stack-group-lock quote-nil)
  (assign b-cached-mapping-table quote-nil)
  (assign %stack-buffer-low (set-type (b-constant 0) dtp-fix))  ;do this in macrocode later...
  (assign %stack-buffer-limit (set-type (b-constant 0) dtp-fix))



  (call switch-to-auxiliary-stack-buffer)
  (parallel (pushval function-system-startup)   ;Call this function to start up
            (call funcall-0-ignore))            ;Build frame header, set PC
  ;; Mark this frame as the bottom frame so we trap if it tries to return
  (parallel
    (assign frame-misc-data (logior frame-misc-data     ;Cause trap on return
                                    (b-constant (+ (byte-mask frame-buffer-underflow-bit)
                                                   (byte-mask frame-bottom-bit)))))
    (call initialize-net))                      ;Initialize the network
  (parallel
    (assign frame-previous-frame quote-nil)     ;No back-pointer in this frame
    (jump pclsr)))                              ;Adjust CSP and take instruction dispatch
;;; Pclsr

;Come here with new PC (to escape to) loaded.  Clear the micro stack, reset the
;main stack, and return to the main loop (eventually the IFU dispatch address)
(defucode pclsr-restore-stack
  (call-and-return-to restore-stack-pointer pclsr))

(defucode pclsr
  ;; Pop stack until clear.  If not in emulator task, halt.
  ;; Don't pop control-stack simultaneous with test, it would cause SQ NEXT INST
  ;; to come on spuriously if stack was already clear.
  (if (not-zero-fixnum (read-cur-task))
      ;; Not in emulator task
      (halt pclsr-in-io-task)
      ;; In emulator task, check csp left in b-temp as by-product
      (if (equal-fixnum (ldb b-temp 4 16.) (a-constant 17))
          ;; Stack is empty, exit
          (parallel (assign a-pclsr-top-of-stack (set-type (a-constant 0) dtp-null))
                    (jump pclsr-done))          ;Must make sure above flag is clear
          ;; Stack not empty, pop and try again
          (parallel
            (for-effect (pop-control-stack))
            (jump pclsr)))))

(defucode pclsr-done
  (if (not-zero-fixnum bitblt-buffer-active)
      (goto save-bitblt-buffer)
      (next-instruction)))

;Restore stack-pointer to its value at the start of this macroinstruction,
;clobbering top-of-stack (but no temporaries!)
(defucode restore-stack-pointer
  (assign top-of-stack (logior (a-constant -1_4) stack-adjustment))
  (if (ldb-bit-test top-of-stack 3)
```

```
      (assign stack-pointer (- stack-pointer top-of-stack))
      (assign stack-pointer (- stack-pointer (ldb top-of-stack 3 0))))
   (if (not (data-type? a-pclsr-top-of-stack dtp-null))
      (parallel (assign top-of-stack-a a-pclsr-top-of-stack)
                (return))
      (return)))

;;; Multiple stack-buffer primitives

;Discard the state of the auxiliary stack buffer and resume the saved state
;of the main stack buffer.  If %sequence-break-pending is set, trap immediately.
(definst %resume-main-stack-buffer no-operand
  (error-if (not (equal-pointer %current-stack-buffer auxiliary-stack-buffer-address))
            illegal-instruction)
  (if (not-data-type? %sequence-break-pending dtp-nil)
      (parallel (assign %sequence-break-pending quote-nil)
                (call set-sequence-break))
      (drop-through))
  (assign %control-stack-low %other-control-stack-low)
  (assign %control-stack-limit %other-control-stack-limit)
  (assign %binding-stack-low %other-binding-stack-low)
  (assign %binding-stack-limit %other-binding-stack-limit)
  (assign %binding-stack-pointer %other-binding-stack-pointer)
  (assign %catch-block-list %other-catch-block-list)
  (assign %current-stack-group-status-bits %other-stack-group-status-bits)
  (assign pc %other-pc)          ;No instruction fetch since page fault must be deferred
  (assign frame-pointer %other-frame-pointer)
  (assign stack-pointer %other-stack-pointer)
  (parallel
    (assign %current-stack-buffer (set-type main-stack-buffer-address dtp-fix))
    (assign b-temp obus)
    (call set-stack-buffer))
  (parallel
    (assign top-of-stack top-of-stack-a)
    (jump set-stack-buffer-limit)))

;Explicit switch to aux sb.
;Stack contains function, args, count of args.  All popped upon return, no values
;returned unless they are pushed "by hand" before resuming.
(definst %funcall-in-auxiliary-stack-buffer (no-operand needs-stack)
  ;; Perform context switch and pop our arguments
  (assign a-temp (- stack-pointer top-of-stack 1))      ;Address of the function
  (parallel
    (assign vma (ldb a-temp 18. 0 main-stack-buffer-address))   ;Translate to physical address
    (decrement-stack-pointer)
    (call switch-to-auxiliary-stack-buffer))
  (parallel
    (assign %other-stack-pointer (- %other-stack-pointer top-of-stack 1))
    (jump %funcall-in-auxiliary-stack-buffer1)))

(defucode %funcall-in-auxiliary-stack-buffer1
  ;; Copy function, args, count into new stack, then perform a function call
  (parallel
    (start-memory read block)
    (assign top-of-stack (1- top-of-stack)))
  (if (greater-fixnum top-of-stack (a-constant -2))
      (sequential
        (parallel
          (assign (amem (stack-pointer 1)) memory-data)
          (increment-stack-pointer))
        (parallel
          (assign vma (ldb vma 18. 0 main-stack-buffer-address))
          (jump %funcall-in-auxiliary-stack-buffer1)))
      (parallel
        (assign (amem (stack-pointer 1)) memory-data)
        (increment-stack-pointer)
        (assign top-of-stack memory-data)
        (call funcall-n-ignore)))
  ;; Mark this frame as the bottom frame so we trap if it tries to return
  (assign frame-misc-data (logior frame-misc-data        ;Cause trap on return
                                  (b-constant (+ (byte-mask frame-buffer-underflow-bit)
                                                 (byte-mask frame-bottom-bit)
                                                 (byte-mask frame-trace-bit)))))
  (parallel
    (assign frame-previous-frame quote-nil)     ;No back-pointer in this frame
    (next-instruction)))

;Subroutine to save the main stack buffer's context and select the auxiliary buffer,
;giving it a freshly-created small control stack, and no binding stack
;This control stack resides in virtual=physical space.
(defucode switch-to-auxiliary-stack-buffer
  ;; State save
  (assign %other-pc pc)
  (assign %other-frame-pointer frame-pointer)
  (assign %other-stack-pointer stack-pointer)
  (assign %other-control-stack-low %control-stack-low)
  (assign %other-control-stack-limit %control-stack-limit)
  (assign %other-binding-stack-low %binding-stack-low)
  (assign %other-binding-stack-limit %binding-stack-limit)
  (assign %other-binding-stack-pointer %binding-stack-pointer)
  (assign %other-catch-block-list %catch-block-list)
```

```
(assign %other-stack-group-status-bits %current-stack-group-status-bits)
;; Set up new state
(assign %control-stack-low (set-type auxiliary-stack-buffer-address dtp-locative))
(assign %control-stack-limit (set-type (+ %control-stack-low (b-constant 1400))
                                        dtp-locative))
(assign %binding-stack-low (set-type (b-constant 0) dtp-locative))
(assign %binding-stack-limit %binding-stack-low)
  (assign %binding-stack-pointer %binding-stack-low)
  (assign %catch-block-list quote-nil)
  (assign %current-stack-group-status-bits
          (set-type (a-constant (field-mask sg-halt-on-error)) dtp-fix))
  (assign frame-pointer (set-type (b-constant 0) dtp-null))     ;I guess...
  (assign stack-pointer (1- %control-stack-low))
  (assign stack-limit %control-stack-limit)
  (parallel
    (assign %current-stack-buffer (set-type auxiliary-stack-buffer-address dtp-fix))
    (assign b-temp obus)
    (jump set-stack-buffer)))

;Tell the hardware to use the stack buffer whose address is in b-temp
(defucode set-stack-buffer
  (parallel
    (write-dp-control (ldb b-temp 2 10. current-dp-control))
    (assign current-dp-control obus)
    (return)))
;;; Sequence Break

;Set the sequence break flag in the hardware.  This is usually called in an I/O task.
(defucode set-sequence-break
  (parallel
    (write-dp-control (dpb (b-constant 1) 1 2 current-dp-control))
    (assign current-dp-control obus)
    (return)))

;Sequence break is deferred if we are already in the auxiliary stack buffer.
;Otherwise switch stack buffers and call the function SEQUENCE-BREAK with no args.
;There is guaranteed always to be enough extra room in the main stack buffer
;to do the necessary pushes for this.  We don't use an escape function because
;there are no pclsring issues, we want to store the real pc in %other-pc,
;and it would save at most one control-memory location.
;Note that the hardware ensures that the EPC is not incremented past the
;instruction that would have been executed next were it not for the sequence break.
;In the TMC5 the DPC gets incremented, however.
(defucode-at-loc sequence-break 16000
  ;; Clear the flag in the hardware
  (parallel
    (write-dp-control (dpb (b-constant 0) 1 2 current-dp-control))
    (assign current-dp-control obus))
  ;; Defer if already on aux buffer
  (if (equal-pointer %current-stack-buffer auxiliary-stack-buffer-address)
      (parallel (assign %sequence-break-pending quote-t)
                (jump ifu-empty-trap))            ;Recycle fake IFU by loading PC
    (drop-through))
  ;; Go call the sequence-break handler
  (machine-version-case
    ((tmc5 ifu)                                 ;Function call will advance the return PC
     (assign pc (pc-plus-number pc (b-constant -1))))   ;so decrement it to cancel that out
    (otherwise nil))
  (pushval function-sequence-break)
  (parallel
    (pushval (set-type (a-constant 0) dtp-fix)) ;No arguments
    (jump %funcall-in-auxiliary-stack-buffer)))
;;; Page fault trap-out

;Come here if there is a page fault, with the referencing address in VMA,
;and the fault type (%page-pht-miss or %page-write-fault) in a-temp.
;We will do a "take-pre-trap restore-stack" then call PAGE-FAULT with two
;arguments, on the auxiliary stack buffer, whether or not we were already there.
;The macrocode is in charge of figuring our whether this was a "recursive" page fault.
;There is guaranteed always to be enough extra room in the main stack buffer
;to do the necessary pushes for this.


(defucode page-fault
  ;; Save debugging information.  Storing micro-pc takes two cycles because of
  ;; AMWA conflict and also because valid NPC needed for following call.
  (assign b-temp (logand (pop-control-stack) (b-constant 37777)))
  (assign a-page-fault-micro-pc (set-type b-temp dtp-fix))
  (parallel
    (assign a-page-fault-address vma)
    ;; Restore sp to its state at the start of the instruction
    (call restore-stack-pointer))
  ;; Push funcall block for entering the page-fault macrocode
  (pushval function-page-fault)
  (pushval (set-type vma dtp-fix))
  (pushval (set-type a-temp dtp-fix))
  (pushval (set-type (a-constant 2) dtp-fix))    ;2 args
  ;; Restore pc to its state at start of instruction (now that vma is saved)
  (machine-version-case
    ((ifu tmc5) nil)                          ;Hardware takes care of it
```

```
  ((tmc)
   (if (equal-pointer a-page-fault-micro-pc
                      (b-constant '(build-task-state cpc ifu-empty-trap-1 npc 0 csp 0)))
       (drop-through)              ;Kludge: don't back up PC if fault on inst fetch
       (assign pc (pc-plus-number pc (b-constant -1))))))
;; Call the function, switching to auxiliary stack buffer if not already there
(call-select-and-return-to
              (equal-pointer %current-stack-buffer auxiliary-stack-buffer-address)
              funcall-n-ignore %funcall-in-auxiliary-stack-buffer
              pclsr))

;Temporary for debugging.  If you see this, it isn't here.
(definst %hack no-operand
  (nop)
  (nop)
  (nop)
  (next-instruction))
```

F:>lmach>ucode>CATCH.LISP.10

```
;;; -*- Mode:Lisp; Package:Micro; Base:8; Lowercase:yes -*-
;;; (c) Copyright 1982, Symbolics, Inc.

; Microcode for catch/throw/unwind-protect instructions

;Get defmicro and all his hosts
#M
(declare (cond ((not (status feature lmucode))
                (load 'udcls))))

;Initialize %catch-block-list to nil (temporary kludge)
; This is now done by >lmach>sysdf1
;(defareg %catch-block-list *nil*)

;Temporaries
(reserve-scratchpad-memory 2424 2430)

(defareg a-catch-pc)
(defareg a-catch-nwords)

;PUSHVAL without setting the top-of-stack register
(defmicro pushval1 (val)
  `(parallel (assign (amem (stack-pointer 1)) (set-cdr ,val cdr-next))
             (increment-stack-pointer)))

;This micro writes the code for the catch-block-creation instructions
(defmicro catch-open (value-disposition &optional unwind-protect-hair)
  (setq value-disposition (find-position-in-list value-disposition
                                                 '(ignore stack return multiple)))
  `(sequential
     ;; The tag is already in the stack.  Now push the PC, BSP, and thread.
     (if (not-zero-fixnum macro-unsigned-immediate)
         (pushval1 (pc-add pc macro-unsigned-immediate))
         ;; Offset of zero means pop offset off the stack, and push PC back on.
         ,(if (not unwind-protect-hair)
              '(newtop (pc-add pc top-of-stack))
              ;; Hairy case for unwind-protect, twiddle the stack
              '(sequential
                 (parallel
                   (assign b-temp next-on-stack)
                   (assign next-on-stack top-of-stack))
                 (newtop (pc-add pc b-temp)))))
     (pushval %binding-stack-pointer)
     (pushval-with-cdr (set-cdr %catch-block-list ,value-disposition))
     ;; Now link up to the list and set the flag bit in the frame
     (assign %catch-block-list
             (set-type (- stack-pointer (b-constant 3)) dtp-locative))
     (parallel (assign frame-catch-bit (b-constant 1))
               (next-instruction))))

(definst catch-open-ignore (unsigned-pc-relative needs-stack)
  (catch-open ignore))

(definst catch-open-stack (unsigned-pc-relative needs-stack)
  (catch-open stack))

(definst catch-open-return (unsigned-pc-relative needs-stack)
  (catch-open return))

(definst catch-open-multiple (unsigned-pc-relative needs-stack)
  (catch-open multiple))

;---This uses T as the magic tag meaning unwind-protect.  This is temporary.
(definst unwind-protect-open unsigned-pc-relative
  (sequential (pushval quote-t)
              (catch-open ignore t)))


;Closing off the current catch block.  We are given a number of words at
;the top of the stack to be preserved.  Everything between them and the
;base of the catch block is removed from the stack, the binding stack
```

```
;is unwound if necessary, the block is unthreaded, bits in the frame
;header are cleared as necessary.  Now if the catch block was an unwind-protect,
;the cleanup handler is pushj'ed to; otherwise the instruction simply returns.

(definst catch-close unsigned-immediate-operand
  (parallel (assign a-catch-nwords macro-unsigned-immediate)
            (jump catch-close-1)))

(definst catch-close-multiple no-operand
  (parallel (check-arg-type top-of-stack top-of-stack-a dtp-fix)
            (assign a-catch-nwords (1+ top-of-stack-a))
            (jump catch-close-1)))

;a-catch-nwords has the number of words to be preserved at the top of the stack
(defucode catch-close-1
  ;; Make the catch block addressable.  Assume it resides in the current frame.
  (assign xbas %catch-block-list)
  ;; --- First we should fool around with unsafe pointers to the stack
  ;; Pop the binding stack since that can pclsr
  (assign b-temp (amem (xbas 2)))
  (if (not-equal-pointer b-temp %binding-stack-pointer)
      (call pop-binding-stack-to-b-temp)
            ;restore xbas?
      (drop-through))
  ;; Copy out the parts of the catch block that we will need
  (assign b-temp (amem (xbas 0)))                ;Catch tag
  (if (equal-typed-pointer b-temp quote-t)       ;unwind-protect
      (sequential
        (parallel
          (assign a-catch-pc (amem (xbas 1)))    ;Cleanup handler address
          (call catch-close-2))
        (pushval pc)                             ;Now pushj to cleanup handler
        (assign pc a-catch-pc)                   ;Don't use set-pc.  We must not pclsr
        (nop)                                    ;and try to close the catch over again.
        (next-instruction))                      ;Set the PC first, then take any page fault.
      (goto catch-close-2)))

;Blt down the stack (cannot pclsr after this point)
(defucode catch-close-2
  (assign b-temp frame-pointer)                  ;Save FP used as a temporary
  (assign b-temp-2 stack-pointer)                ;Last word to save
  (assign frame-pointer (- b-temp-2 a-catch-nwords))    ;First word to save-1
  (assign stack-pointer (1- %catch-block-list)) ;Flush stack down to base of block
  (parallel
    (assign %catch-block-list (amem (xbas 3)))   ;Unthread this catch block
    (call blt-stack))
  (parallel
    (assign frame-pointer b-temp)                ;Restore FP
    (if (data-type? %catch-block-list dtp-locative)
        (if (greater-or-equal-pointer %catch-block-list b-temp)
            (return)                             ;Still some catch blocks in this frame
            (drop-through))
        (drop-through)))
  (parallel
    (assign frame-catch-bit (b-constant 0))      ;No more blocks this frame, clear bit
    (return)))
```

F:>lmach>ucode>

```
; -*- Mode:Lisp; Base:8; Lowercase:yes -*-

; Bogus Microcode for testing that various things are possible
; Not all of this will work in the simulator

;Get defmicro and all his hosts
(declare (cond ((not (status feature lmucode))
                (load 'udcls))))

;Micro for the first cycle of a trap handler.
;Finishes the state save by calling for a PUSHJ, which saves
;the original CPC (now in NPC) onto the stack.  The original NPC
;is already on the stack.
(defmicro trap-save ()
  '(microinstruction control-stack pushj))

;Micro for the last two cycles of a trap handler.
;Takes arguments of what else to do in those cycles, that
;seeming clearer than throwing a parallel around the sequence.
;We restore the NPC and the CPC by twice popping the control
;stack into NPC.  In the second cycle we also use NPC as
;as the source for CPC.  Thus the push order is NPC, CPC and
;the pop order is CPC, NPC.
(defmicro trap-restore (cycle-1 cycle-2)
  `(sequential
     (parallel
       ,cycle-1
       (microinstruction control-stack popj npc ctos))
     (parallel
       ,cycle-2
       (microinstruction control-stack popj npc ctos cpc npc))))
```

```
;Invisible-pointer traps
;If transporting was needed, it has happened already
;Time= 2 cycles trapping + 3 cycles here
(defucode inviz-trap
  (parallel
    (trap-save)
    (assign vma memory-data)
    (assign b-trans-vma memory-data))
  (trap-restore
    (memory-map read)   ;Gurkh!  Sometimes needed to write here?????  <---
    (nop)))


;Map-miss trap
;Hardware started memory reference to first level hash table in trapped
;cycle; so the data are available in the first cycle of the trap handler,
;since trapping inserted an extra clock which drove the memory pipeline.
;This is too early since we aren't ready for it that fast.
;Time = 2 cycles trapping + 4 cycles here in most favorable case.
;It's 4 cycles rather than 3 because Abus is a bottleneck (VMA, MD).
(defucode map-miss-trap
  (parallel
    (trap-save)
    (assign b-map-temp (ldb vma 16. 8)))        ;With address space ID?
  (parallel
    (increment-pma)
    (if (equal-fixnum memory-data b-map-temp)   ;Match pht key?
        (trap-restore (write-map-from memory-data)  ;Yes, and VMA still set up
                      (map-metering))           ;Spare cycle for metering
      xxxxxx)))         ;Well, go off and search second level

;Disk DMA task.




;The following control registers are set up by the background
;service task, based on the command list in main memory set up
;by Lisp code.  At the same time the hardware control registers
;are (all?) set up.  The background service task also bashes the
;DMA task state to start it up at the right place for read or write.
;When the DMA task is done, it wakes up the background task which
;can tell what happened by looking at the control registers.




(defareg a-disk-ma 3000)          ;Address of next word to transfer
(defareg a-disk-wc 3001)          ;Number of words to transfer (minus 3)
(defareg a-disk-header 3002)      ;Header value being sought
(defareg a-disk-timeout 3003)     ;Number of header tries before punting
                                  ; (maybe heads are positioned wrong)

(defareg a-disk-search-cmd 3004);Tell hardware to search for header

;Search subroutine.  Returns after reading the header of the desired sector.
;Eats shit and dies if header not found after timeout (does not return).
(defucode disk-search
  (assign b-temp (io-bus-data disk-data))   ;---Read Lbus directly into DP??
                                            ;---Or use extended B memory??
  (if (equal-fixnum a-disk-header b-temp)
      (return)                  ;Header found.  Let caller dismiss.
      (drop-through))
  (parallel
    (dismiss)
    (assign (io-bus-data disk-control) a-disk-search-cmd))      ;Try again
  (parallel
    (assign a-disk-timeout (1- a-disk-timeout))
    (if alu-carry               ;Not yet counted to -1
        (goto disk-search)      ;Wake up back at disk-search
        (eat-shit-and-die))))   ;On next wakeup, actually

;Read routine.  Initially entered via gratuitous wakeup.  Call search
;routine which will return with disk entering data area.
;Most wakeups are only for 2 cycles, except at the start of the wrong
;sector we remain active for 4 cycles, and at the start of the right
;sector we remain active for 5 cycles.  These could each be decreased
;by 1 as noted above, and could be decreased more I guess by having
;separate search routines for read and write.
(defucode disk-read
  (dismiss)                     ;Until start of sector
  (call disk-search)
  (dismiss)
  (jump disk-read-loop))

;Here for each data word
```

```
(defucode disk-read-loop
  (parallel
    (assign pma a-disk-ma)
    (dma-read disk)
    (assign a-disk-ma (1+ a-disk-ma))
    (dismiss))
  (parallel
    (assign a-disk-wc (1- a-disk-wc))
    (if alu-carry              ;Not yet counted to -1
        (goto disk-read-loop)  ;Wake up back there
        (goto disk-read-last-3))))

;Here for the third to last data word
(defucode disk-read-last-3
  (parallel
    (assign pma a-disk-ma)
    (dma-read disk)
    (assign a-disk-ma (1+ a-disk-ma))
    (io-bus-stop-signal)       ;Tell disk to stop reading after next word
    (dismiss))
  (nop)
  (parallel                    ;Swallow last data word
    (assign pma a-disk-ma)
    (dma-read disk)
    (assign a-disk-ma (1+ a-disk-ma))
    (dismiss))
  (nop)
  ;Here we have the ECC word and the state machine has stopped
  ;Since we aren't doing any double-buffered control registers hacks,
  ;we simply stop and let the background task look at the hardware
  ;registers and decide what to do.
    (parallel
      (awaken-task background-service-task)
      (dismiss))
    (nop)
;Kernel of biting from main memory to TV
;This involves no rotation or alu function, just straight copy
;used e.g. to update a screen image.

;TV epoch corresponds to 5 microcode cycles in this version
;If a TV epoch can correspond to 6 cycles (i.e. we use all fast
; microinstructions) things are much easier.


(defucode tv-copy-kernel
  (parallel (assign pma a-tv-pma)                   ;Uses Abus
            (assign memory-data b-templ)            ;Uses B,X,O busses
            (increment-pma))
  (parallel (assign memory-data b-temp2)            ;Store 2nd word in TV
            (memory-map read))                      ;Start next memory read
  (assign a-tv-pma (+ a-tv-pma (b-constant 2)))    ;Memory active, inc pma
  (parallel (assign b-templ memory-data)            ;Stash first word from mem
            (increment-pma))
  (parallel (assign b-templ memory-data)            ;Uses A, X busses
            (increment-pma)))
            ;Here we have to be able to increment the VMA by 2
            ;Must happen entirely in the MC because there is no
            ;cycle with abus free to use DP adder to increment it.
            ;If increment-pma carries into the page bits of the VMA,
            ;this will work.

;There is some confusion about increment-pma here.  Generally it
;is assumed to increment pma and vma both.  But since we are
;leaving the read address in VMA, and switching PMA back and forth
;between a direct load from Abus and mapping from VMA, it's clear
;that this increment-pma really should split in several different
;memory-control functions.

;Cycle  Address Bus            Data Bus
;1      TV address             Write data 1
;2      Memory Address         Write data 2    -- address bus conflict? --
;3      nil                    nil
;4      Memory Address+1       Read data 1
;5      nil                    Read data 2

;In cycle 2 the address bus wants to be the memory address so that
;the read can get started, it also wants to be the TV address+1
;for writing into the TV (except the TV doesn't actually need to
;look at this anyway).
;Also Memory Address+1 needs to come out in cycle 3, not 4,
;since the memory is interleaved rather than page-mode.
;;; -*- Mode:Lisp; Package:Micro; Base:8; Lowercase:yes -*-
;;; (c) Copyright 1982, Symbolics, Inc.

; Microcode for branch instructions
```

```
;Get defmicro and all his hosts
#M
(declare (cond ((not (status feature lmucode))
                (load 'udcls))))

;These are branches the compiler knows about initially

(definst branch signed-pc-relative
  (set-pc (pc-add pc macro-signed-immediate)))

;This gets an offset from memory.  Would it be better to get a PC?
(definst long-branch constant-pc-relative
  (assign vma (- frame-function macro-unsigned-immediate 1))
  (start-memory read)
  (assign b-temp pc)
  (parallel (check-data-type memory-data dtp-fix)
            (machine-version-case
              ((tmc tmc5)
               (sequential (assign a-temp memory-data)
                           (set-pc (pc-add b-temp a-temp))))
              (otherwise (set-pc (pc-add b-temp memory-data))))))

(definst branch-false signed-pc-relative
  (if (data-type? top-of-stack-a dtp-nil)
      (set-pc (pc-add pc macro-signed-immediate)
              (for-effect (popval)))
      (parallel
        (for-effect (popval))
        (next-instruction))))

(definst branch-true signed-pc-relative
  (if (not (data-type? top-of-stack-a dtp-nil))
      (set-pc (pc-add pc macro-signed-immediate)
              (for-effect (popval)))
      (parallel
        (for-effect (popval))
        (next-instruction))))

(definst branch-false-else-pop signed-pc-relative
  (if (data-type? top-of-stack-a dtp-nil)
      (goto branch)
      (parallel
        (for-effect (popval))
        (next-instruction))))

(definst branch-true-else-pop signed-pc-relative
  (if (not (data-type? top-of-stack-a dtp-nil))
      (goto branch)
      (parallel
        (for-effect (popval))
        (next-instruction))))

(definst branch-false-and-pop signed-pc-relative
  (if (data-type? top-of-stack-a dtp-nil)
      (set-pc (pc-add pc macro-signed-immediate)
              (for-effect (popval)))
      (next-instruction)))

(definst branch-true-and-pop signed-pc-relative
  (if (not (data-type? top-of-stack-a dtp-nil))
      (set-pc (pc-add pc macro-signed-immediate)
              (for-effect (popval)))
      (next-instruction)))
;This is a random selection of other branches

(comment  ;The compiler doesn't want to use these yet

;Note: can't test zero simultaneous with popval due to xbus conflict
;Okay since instruction has to take two cycles even if it doesn't branch
(definst branch-zerop (signed-pc-relative needs-stack)
  (parallel
    (check-fixnum-1arg-b top-of-stack
      (otherwise (signal-error unimplemented-arithmetic)))    ;---
    (if (zero-fixnum top-of-stack)
        (set-pc (pc-add pc macro-signed-immediate)
                (for-effect (popval)))
        (parallel
          (for-effect (popval))
          (next-instruction)))))

(definst branch-not-zerop (signed-pc-relative needs-stack)
  (parallel
    (check-fixnum-1arg-b top-of-stack
      (otherwise (signal-error unimplemented-arithmetic)))    ;---
    (if (not-zero-fixnum top-of-stack)
        (set-pc (pc-add pc macro-signed-immediate)
                (for-effect (popval)))
        (parallel
          (for-effect (popval))
          (next-instruction)))))
```

```
(definst branch-greater-or-equal (signed-pc-relative needs-stack)
  (parallel
    (check-fixnum-2args next-on-stack top-of-stack
      (otherwise (signal-error unimplemented-arithmetic)))   ;---
    (decrement-stack-pointer)
    (if (greater-or-equal-fixnum next-on-stack top-of-stack)
        (set-pc (pc-add pc macro-signed-immediate)
                (for-effect (popval)))
        (parallel
          (for-effect (popval))
          (next-instruction)))))

(definst branch-eq (signed-pc-relative needs-stack)
  (parallel
    (decrement-stack-pointer)
    (if (equal-typed-pointer next-on-stack top-of-stack)
        (set-pc (pc-add pc macro-signed-immediate)
                (for-effect (popval)))
        (parallel
          (for-effect (popval))
          (next-instruction)))))

(definst branch-not-eq (signed-pc-relative needs-stack)
  (parallel
    (decrement-stack-pointer)
    (if (not-equal-typed-pointer next-on-stack top-of-stack)
        (set-pc (pc-add pc macro-signed-immediate)
                (for-effect (popval)))
        (parallel
          (for-effect (popval))
          (next-instruction)))))

);end comment
```

F:>lmach>ucode>bitblt-block-mode.lisp.1

```
; -*- Mode:Lisp; Package:Micro; Base:8; Lowercase:yes -*-
;;;; BITBLT microcode for 3600

(defmicro waiting-for-memory ()                    ;documentation only, I guess.
  '(nop))

(defmicro abus-array-data (&body body)
  '(parallel
     (check-data-type memory-data dtp-fix)       ;this traps forwarding pointers, right?
     ,@body))

(defmicro assign-vma-offset (which &rest stuff)
  (selectq which
    (S '(assign vma (+ bb-s-row-addr bb-s-offset ,@stuff)))
    (D '(assign vma (+ bb-d-data-addr bb-d-offset ,@stuff)))
    (otherwise
     (ferror () "assign-vma-offset knows about only S and D, not ~s" which))))

(defmicro parallel-with-s-access (offset &body body)
  (make-memory-access 'bb-s-row-addr 'bb-s-offset offset body))
(defmicro parallel-with-d-access (offset &body body)
  (make-memory-access 'bb-d-data-addr 'bb-d-offset offset body))

(eval-when (eval compile load)
(defun make-memory-access (baseaddr offset-sym offset body)
  (if (or (eq offset offset-sym)
          (equal offset '(1+ ,offset-sym)))
      ()
      (ferror () "~s is not a recognized offset for ~s" offset offset-sym))
  (let* ((body (reverse body))
         (finally '(abus-array-data ,(car body))))
    (do ((ll (reverse
               '((assign vma ,(if (atom offset)
                                  '(+ ,baseaddr ,offset)
                                  '(+ ,baseaddr ,(second offset) 1)))
                 (start-memory read)
                 (waiting-for-memory)))
             (cdr ll))
         (body (cdr body) (cdr body))
         (l))
        ((and (null ll) (null body))
         '(sequential ,@l ,finally))
      (cond ((null ll) (push (car body) l))
            ((null body) (push (car ll) l))
            (T (push '(parallel ,(car ll) ,(car body)) l))))))
```

```
);eval-when

;;---hair these up appropriately
(defmicro 32- (operand)
  '(- (b-constant 32.) ,operand))
(defmicro 31- (operand)
  '(- (b-constant 31.) ,operand))

(defmicro dispatch-after-this (operand this &body clauses)
  '(sequential
     (dispatch-after-next ,operand
      ,@clauses)
     (parallel
       (take-dispatch)
       ,this)))

(defmicro dispatch-after-gen (dispatching-on var-and-indices-and-bod &rest clauses)
  (let* ((var-and-indices (first var-and-indices-and-bod))
         (bod (second var-and-indices-and-bod))
         (var (first var-and-indices))
         (indices (rest1 var-and-indices)))
    '(dispatch-after-next ,dispatching-on
       ,@(loop for index in indices
               collect '((,index) ,(progv (list var) (list index) (eval bod))))
       ,@clauses)))

(defmicro incr-d-offset ()
  '(assign bb-d-offset (1+ bb-d-offset)))
(defmicro decr-d-offset ()
  '(assign bb-d-offset (1- bb-d-offset)))

(defmicro incr-wrap-s-offset ()
  '(sequential
     (assign bb-s-offset (1+ bb-s-offset))
     (if (greater-or-equal-fixnum bb-s-offset bb-s-row-length)
         (parallel
           (lisp (format T "~&>>>Wrapping around on bb-s-offset from ~d."
                         (low32 (tr 'bb-s-offset))))
           (assign bb-s-offset (b-constant 0)))
         (drop-through))))

(defmicro decr-wrap-s-offset ()
  '(parallel
     (assign bb-s-offset (1- bb-s-offset))
     (if (minus-fixnum obus)
         (parallel
           (lisp (cerror T () () ">>>Decr wrapping around on bb-s-offset"))
           (assign bb-s-offset (1- bb-s-row-length)))
         (drop-through))))

(defmicro store-word (datum)
  '(store-contents (set-type ,datum dtp-fix) () T))

(defmicro parallel-with-return (&body stm)
  '(,(if (eq *machine-version* 'sim) 'sequential 'parallel)
    ,@stm
    (return)))
;;This is incompatible with modularity
(defmacro reserve-bitblt-scratchpad-memory (a-start b-start &rest stuff)
  (loop with a-loc = a-start and b-loc = b-start
        for (name side) in stuff
        when (eq side 'a)
          collect '(defareg-at-loc ,name ,a-loc 0) into forms
          and do (incf a-loc)
        when (eq side 'b)
          collect '(defbreg-at-loc ,name ,b-loc 0) into forms
          and do (incf b-loc)
        finally (return
                  '(progn 'compile
                     (reserve-scratchpad-memory ,a-start ,(1- a-loc)
                                                ,b-start ,(1- b-loc))
                     ,@forms))))

(defvar *fp-offset-names* ())

(defmacro def-fp-offsets (&rest names)
  (loop for i upfrom 0
```

```
        for name in names
        append '((defatomicro ,name (amem (frame-pointer ,i)))
                 (remprop ',name 'defareg-at-loc)
                 (remprop ',name 'defbreg-at-loc)
                 (defprop ,name ,i fp-offset)
                 (or (memq ',name *fp-offset-names*)
                     (push ',name *fp-offset-names*)))
          into foo
        finally (return '(progn 'compile ,@foo))))

;;decode fp offset numbers into symbols.  Debugging only.
(defun dfp (&rest numbers)
  (loop for number in numbers
        collect (loop for name in *fp-offset-names*
                      when (equal (get name 'fp-offset) number)
                      return name
                      finally (return number))))

(def-fp-offsets
  bb-arg-alu bb-arg-width bb-arg-height              ;lisp arg
  bb-arg-from-array bb-arg-from-x bb-arg-from-y ;lisp arg
  bb-arg-to-array bb-arg-to-x bb-arg-to-y         ;lisp arg
  bb-width-a                                          ;ucode arg
  bb-s-data-addr                                      ;ucode arg
  bb-s-row-offset                                     ;ucode arg
  bb-s-offset-a                                       ;ucode arg
  bb-s-bitpos                                         ;ucode arg
  bb-s-row-length                                     ;ucode arg
  bb-d-data-addr                                      ;ucode arg
  bb-d-offset-a                                       ;ucode arg
  bb-d-bitpos                                         ;ucode arg
  bb-event-count                                      ;ucode arg
  bb-alu-operation                                    ;ucode arg
  )

;;; Some temporaries.

(reserve-bitblt-scratchpad-memory 2658 372
  (bb-width b)                                        ;copied from arg on A side
  (bb-s-offset b)                                     ;..
  (bb-d-offset b)                                     ;..
  (bb-constant b)                                     ;..
  (bb-s-word b)                                       ;temp
  (a-temp-3 a)                                        ;temp
  (bb-constant-a a)                                   ;temp
  (bb-identity a)                                     ;temp
  (bb-s-word2 a)                                      ;temp
  (bb-s-row-addr a)                                   ;temp
  )
(defmicro read-bb-s-word ()
  '(parallel
     (assign a-temp (+ bb-width bb-s-bitpos))
     (call read-bb-s-word1)))

;;Assumptions about setup:
;;bb-constant has:
;;  >> for constant operations (0,-1): the constant;
;;  >> for operations dependent only on source or destination (x, ~x, y, ~y):
;;     a 0 for x,y or -1 for ~x,~y;
;;  >> for operations dependent on both s and d: 0  for those using source directly,
;;     and -1 for those that want the source complemented.

(defucode read-bb-s-word1
  (assign-vma-offset s)
  (parallel
    (assign byte-r (32- bb-s-bitpos))
    (start-memory read))
  (parallel
    (waiting-for-memory)
    (if (lesser-or-equal-fixnum a-temp (b-constant 32.))
        ;;source is entirely within one word
        (parallel-with-return
          (abus-array-data
            (assign bb-s-word (logxor bb-constant (rotate memory-data byte-r)))))
        ;;source is split across two words
        (sequential
          (abus-array-data
            (assign bb-s-word (rotate memory-data byte-r)))
          (assign-vma-offset s 1)
          (parallel
            (start-memory read)                     ;byte-r is already ok
            )
          (parallel
            (waiting-for-memory)
            (assign byte-s (1- a-temp)))
          (abus-array-data
            (assign bb-s-word (dpb memory-data byte-s byte-r bb-s-word)))
          (parallel-with-return
            (assign bb-s-word (logxor bb-s-word bb-constant-a)))))))
```

```
(defucode bb-copy-stuff-to-b-side
  (assign b-temp bb-s-row-offset)
  (assign bb-s-row-addr (+ bb-s-data-addr b-temp))
  (assign bb-s-offset bb-s-offset-a)
  (parallel
    (assign bb-d-offset bb-d-offset-a)
    (return)))

(defmacro defucode-bitblt (name source destination neither both)
  '(defucode ,name
     (parallel (assign bb-width bb-width-a)
               (call bb-copy-stuff-to-b-side))
     (dispatch-after-this (ldb bb-alu-operation 4 0)
                          (parallel (assign bb-constant (a-constant 0)) ;assumption, for the
                                    (assign bb-constant-a (a-constant 0)))    ;common case
      ((0)                        ;0
       (goto ,neither))
      ((1)                        ;x*y
       (parallel (assign bb-identity (a-constant -1))
                 (jump ,both)))
      ((2)                        ;~x*y
       (assign bb-identity (a-constant -1))
       (parallel (assign bb-constant (a-constant -1)) (assign bb-constant-a (a-constant -1))
                 (jump ,both)))
      ((3) (return))              ;y
      ((4)                        ;x*~y
       (parallel (assign bb-identity (a-constant -1))
                 (jump ,both)))
      ((5) (goto ,source))        ;x
      ((6)                        ;x xor y
       (parallel (assign bb-identity (a-constant 0))
                 (jump ,both)))
      ((7)                        ;x+y
       (parallel (assign bb-identity (a-constant 0))
                 (jump ,both)))
      ((8.)                       ;~x*~y
       (assign bb-identity (a-constant -1))
       (parallel (assign bb-constant (a-constant -1)) (assign bb-constant-a (a-constant -1))
                 (jump ,both)))
      ((9.)                       ;~x xor y
       (assign bb-identity (a-constant 0))
       (parallel (assign bb-constant (a-constant -1)) (assign bb-constant-a (a-constant -1))
                 (jump ,both)))
      ((10.)              ;~x
       (parallel (assign bb-constant (a-constant -1)) (assign bb-constant-a (a-constant -1))
                 (jump ,source)))
      ((11.)              ;~x+y
       (assign bb-identity (a-constant 0))
       (parallel (assign bb-constant (a-constant -1)) (assign bb-constant-a (a-constant -1))
                 (jump ,both)))
      ((12.)              ;~y
       (parallel (assign bb-constant (a-constant -1)) (assign bb-constant-a (a-constant -1))
                 (jump ,destination)))
      ((13.)              ;x+~y actually, ~(~x*y)
       (assign bb-identity (a-constant -1))
       (parallel (assign bb-constant (a-constant -1)) (assign bb-constant-a (a-constant -1))
                 (jump ,both)))
      ((14.)              ;~x+~y actually, ~(x*y)
       (parallel (assign bb-identity (a-constant -1))
                 (jump ,both)))
      ((15.)              ;-1
       (parallel (assign bb-constant (a-constant -1)) (assign bb-constant-a (a-constant -1))
                 (jump ,neither))))))

(defucode-bitblt ubitblt-short-row
  ubitblt-short-row-source
  ubitblt-short-row-destination
  ubitblt-short-row-neither
  ubitblt-short-row-both)
(defucode-bitblt ubitblt-long-row
  ubitblt-long-row-source
  ubitblt-long-row-destination
  ubitblt-long-row-neither
  ubitblt-long-row-both)
(defucode-bitblt ubitblt-long-row-backwards
  ubitblt-long-row-source-backwards
  ubitblt-long-row-destination
  ubitblt-long-row-neither                        ;direction immaterial
  ubitblt-long-row-both-backwards)

;;; These should eventually be folded back into defucode-bitblt
(definst %bitblt-short-row no-operand
  (jump ubitblt-short-row))

(definst %bitblt-long-row no-operand
  (jump ubitblt-long-row))

(definst %bitblt-long-row-backwards no-operand
  (jump ubitblt-long-row-backwards))

(definst %bitblt-decode-arrays no-operand
```

```
(jump ubitblt-decode-arrays))
(defucode ubitblt-short-row-source
  (read-bb-s-word)
  (assign a-temp (+ bb-width bb-d-bitpos))
  (if (lesser-or-equal-fixnum a-temp (b-constant 32.))
      ;;destination is entirely within one word
      (parallel-with-d-access
        bb-d-offset
        (assign byte-s (1- bb-width))
        (assign byte-r bb-d-bitpos)
        (parallel-with-return
          (store-word (dpb bb-s-word byte-s byte-r memory-data))))
      ;;destination is split across two words
      (sequential
        ;;store the low byte
        (parallel-with-d-access
          bb-d-offset
          (assign byte-s (31- bb-d-bitpos))
          (assign byte-r bb-d-bitpos)
          (store-word (dpb bb-s-word byte-s byte-r memory-data)))
        ;;store the high byte, using ldb into md as background
        (parallel-with-d-access
          (1+ bb-d-offset)
          (assign byte-s (1- a-temp))
          (assign byte-r bb-d-bitpos)
          ;;byte-r is ok
          (parallel-with-return
            (store-word (ldb bb-s-word byte-s byte-r memory-data))
            )))))

(defucode ubitblt-short-row-destination
  (assign a-temp (+ bb-width bb-d-bitpos))
  (if (lesser-or-equal-fixnum a-temp (b-constant 32.))
      ;;destination is entirely within one word
      (sequential
        (parallel-with-d-access
          bb-d-offset
          (assign byte-s (1- bb-width))
          (assign byte-r bb-d-bitpos)
          (assign a-temp-2 memory-data))
        (assign b-temp (dpb bb-constant byte-s byte-r (a-constant 0)))
        (parallel-with-return
          (store-word (logxor b-temp a-temp-2))))
      ;;destination is split across two words
      (sequential
        ;;munge the low byte
        (parallel-with-d-access
          bb-d-offset
          (assign byte-s (31- bb-d-bitpos))
          (assign byte-r bb-d-bitpos)
          (assign a-temp-2 memory-data))
        (assign b-temp (dpb bb-constant byte-s byte-r (a-constant 0)))
        (store-word (logxor b-temp a-temp-2))
        ;;munge the high byte
        (parallel-with-d-access
          (1+ bb-d-offset)
          (assign byte-s (1- a-temp))
          (assign byte-r (a-constant 0))
          (assign a-temp-2 memory-data))
        (assign b-temp (ldb bb-constant byte-s byte-r))
        (parallel-with-return
          (store-word (logxor b-temp a-temp-2))))))
;;the alu operation is actually a constant
(defucode ubitblt-short-row-neither
  (assign a-temp (+ bb-width bb-d-bitpos))
  (parallel
    (if (lesser-or-equal-fixnum a-temp (b-constant 32.))
        ;;destination is entirely within one word
        (parallel-with-d-access
          bb-d-offset
          (assign byte-s (1- bb-width))
          (assign byte-r bb-d-bitpos)
          (parallel
            (store-word (dpb bb-constant byte-s byte-r memory-data))
            (return)))
        ;;destination is split across two words
        (sequential
          ;;store the low byte
          (parallel-with-d-access
            bb-d-offset
            (assign byte-s (31- bb-d-bitpos))
            (assign byte-r bb-d-bitpos)
            (store-word (dpb bb-constant byte-s byte-r memory-data)))
          ;;store the high byte
          (parallel-with-d-access
            (1+ bb-d-offset)
            (assign byte-s (1- a-temp))
            (assign byte-r (b-constant 0))
            (parallel
              (store-word (dpb bb-constant byte-s byte-r memory-data))
              (return)))))))
```

```
;;the alu operation depends upon both source and destination bits
(defucode ubitblt-short-row-both
  (read-bb-s-word)
  (assign a-temp (+ bb-width bb-d-bitpos))
  (assign-vma-offset d)
  (if (lesser-or-equal-fixnum a-temp (b-constant 32.))
      ;;destination is entirely within one word
      (sequential
        (assign byte-s (1- bb-width))
        (parallel
          (assign byte-r bb-d-bitpos)
          (jump bb-byte-alu-operation-dispatch)))          ;jcall
      ;;destination is split across two words
      (sequential
        ;;store the low byte
        (assign byte-s (31- bb-d-bitpos))
        (parallel
          (assign byte-r bb-d-bitpos)
          (call bb-byte-alu-operation-dispatch))
        ;;store the high byte
        (assign bb-s-word (rotate bb-s-word byte-r))
        (assign byte-s (1- a-temp))
        (assign-vma-offset d 1)
        (parallel
          (assign byte-r (b-constant 0))
          (jump bb-byte-alu-operation-dispatch)))))        ;jcall
;(boole fn x y ...)   if fn is "abcd" then
;         y    0        1        2      3      4      5      6      7
;      | 0 1   0        x*y      ~x*y   y      x*~y   x      x#y    x+y
;  -----------
;    0 | a c   8        9        10     11     12     13     14     15
;  x   |       ~(x+y)   ~(x#y)   ~x     ~x+y   ~y     x+~y   ~x+~y  -1
;    1 | b d

;;vma and byte regs have been set up already, for DPB.
;;trashes b-temp, a-temp-2, b-temp-2, but not a-temp.
(defucode bb-byte-alu-operation-dispatch
  (dispatch-after-this (parallel (start-memory read) (ldb bb-alu-operation 4 0))
                       (parallel
                         (assign b-temp (dpb bb-s-word byte-s byte-r bb-identity))
                         (waiting-for-memory))
    ((1 2) ;;1 x*y logand ;;2 ~x*y     logand
     (parallel-with-return
       (parallel
         (declare-memory-timing data-cycle)
         (abus-array-data
           (store-word (logand memory-data b-temp))))))
    ((4 8.) ;;4 ~(~x+y) = x*~y andc2     ;;8 ~(x+y)     = ~x*~y andcb
     (parallel
       (declare-memory-timing data-cycle)
       (abus-array-data
         (assign a-temp-2 memory-data)))
     (assign b-temp-2 (dpb (b-constant -1) byte-s byte-r 0))    ;can't merge this...
     (assign a-temp-2 (logxor a-temp-2 b-temp-2))               ;...with this.
     (parallel-with-return
       (store-word (logand a-temp-2 b-temp))))
    ((6 9.) ;;6 x#y logxor  ;;9 ~(x#y)=~x#y logxor
     (parallel-with-return
       (parallel
         (declare-memory-timing data-cycle)
         (abus-array-data
           (store-word (logxor b-temp memory-data))))))
    ((7 11.) ;;7 x+y logior       ;;11 ~x+y logior
     (parallel-with-return
       (parallel
         (declare-memory-timing data-cycle)
         (abus-array-data
           (store-word (logior b-temp memory-data))))))
    ((13. 14.) ;;13 x+~y = ~(~x*y) lognand        ;;14 ~x+~y=~(x*y)
     (parallel
       (declare-memory-timing data-cycle)
       (abus-array-data
         (assign a-temp-2 (logand b-temp memory-data))))
     (parallel-with-return
       (store-word (logxor (dpb (b-constant -1) byte-s byte-r 0) a-temp-2))))
    (otherwise (goto cant-happen))))
;;vma has been set up already
(defucode bb-word-alu-operation-dispatch        ;commonly 3 cycles (plus 1 for the call)
  (dispatch-after-this (parallel (start-memory read) (ldb bb-alu-operation 4 0))
                       (waiting-for-memory)      ;---want to use this somehow...
    ((1 2)      ;;1 x*y logand              ;;2 ~x*y  logand
     (parallel
       (declare-memory-timing data-cycle)
       (abus-array-data (store-word (logand bb-s-word memory-data)))
       (return)))
    ((4 8.)     ;;4 x*~y andcb              ;;8 ~(x+y) ~x*~y andcb
     (parallel
       (declare-memory-timing data-cycle)
       (abus-array-data (store-word (andc2 bb-s-word memory-data)))
       (return)))
```

```
        ((6 9.)     ;;6 x#y logxor          ;;9 ~(x#y)=~x#y logxor
         (parallel
           (declare-memory-timing data-cycle)
           (abus-array-data (store-word (logxor bb-s-word memory-data)))
           (return)))
        ((7 11.)    ;;7 x+y logior          ;;11 ~x+y logior
         (parallel
           (declare-memory-timing data-cycle)
           (abus-array-data (store-word (logior bb-s-word memory-data)))
           (return)))
        ((13. 14.)  ;;13 x+~y = ~(~x*y)     ;;14 ~x+~y=~(x*y)
         (parallel
           (declare-memory-timing data-cycle)
           (abus-array-data (assign a-temp-2 (logand bb-s-word memory-data))))
         (parallel
           (store-word (logxor (b-constant -1) a-temp-2))
           (return)))
        (otherwise (goto cant-happen))))
;;alu depends only on source bits
(defucode ubitblt-long-row-source
  (parallel
    (assign b-temp bb-d-bitpos)
    (if (zero-fixnum bb-d-bitpos)
        (if (zero-fixnum bb-s-bitpos)
            (parallel
              (assign bb-s-offset (1- bb-s-offset))     ;bb-aligned-row-source will increment first
              (lisp (trace-path #/a))
              (jump ubitblt-aligned-row-source))
            ;;                    SSSSSSSSSSSSSSSSSSSSSSSSSsssssss
            ;;       dddddddddddddddddddddddddddddddd
            (parallel-with-s-access
              bb-s-offset
              (assign byte-r (32- bb-s-bitpos))
              (parallel
                (assign bb-s-word (logxor bb-constant (rotate memory-data byte-r)))
                (lisp (trace-path #/c))
                (jump ubitblt-d-aligned-row-source))))
        (if (equal-fixnum b-temp bb-s-bitpos)
            ;;SSSSSSSSSSSSSSSSSSSSSSSSSsssssss
            ;;DDDDDDDDDDDDDDDDDDDDDDDDDddddddd
            (sequential
              (parallel-with-s-access
                bb-s-offset
                (assign a-temp (32- bb-d-bitpos))
                (assign byte-r a-temp)
                (assign bb-s-word (logxor bb-constant (rotate memory-data byte-r))))
              (parallel-with-d-access
                bb-d-offset
                (assign byte-r bb-d-bitpos)
                (assign byte-s (1- a-temp))
                (store-word (dpb bb-s-word byte-s byte-r memory-data)))
              (incr-d-offset)
              (parallel
                (assign bb-width (- bb-width a-temp))
                (lisp (trace-path #/b))
                (jump ubitblt-aligned-row-source)))
            (if (lesser-fixnum bb-s-bitpos b-temp)
                ;;sssssssssSSSSSSSSSSSSSSSS.......
                ;;         DDDDDDDDDDDDDDDDdddddddddddddddd
                ;;         ← 32-d.bitpos →
                (sequential
                  (parallel-with-s-access
                    bb-s-offset
                    (assign byte-r (32- bb-s-bitpos))
                    (parallel
                      (assign b-temp (32- bb-d-bitpos))
                      (assign a-temp cbus))
                  (assign bb-s-word (logxor bb-constant (rotate memory-data byte-r))))
                  ;;.......sssssssssSSSSSSSSSSSSSSSS
                  (parallel-with-d-access
                    bb-d-offset
                    (assign byte-r bb-d-bitpos)
                    (assign byte-s (1- b-temp))
                    (store-word (dpb bb-s-word byte-s byte-r memory-data)))
                  (incr-d-offset)
                  ;;rotate s-word further to right by 32-d.bitpos
                  ;;SSSSSSSSSSSSSSSS.......sssssssss
                  (assign byte-r bb-d-bitpos)   ;or left by -(32-d.bitpos)
                  (assign bb-s-word (rotate bb-s-word byte-r))
                  (assign bb-width (- bb-width a-temp))
                  (parallel
                    (assign bb-s-bitpos (+ bb-s-bitpos b-temp))
                    (lisp (trace-path #/d))
                    (jump ubitblt-d-aligned-row-source)))
                (sequential
;;The high part of the first source word is not as long as the high part of the
;;first destination word.  So extract the useful part of the first source word,
;;and deposit into it as much of the second source word as needed to fill out the rest
;;of the first destination word. Then position the rest of the second source word
;;appropriately for the inner loop.
```

```
                    ;;                                      ←- 32-s -→
                    ;;      ................................|SSSSSSSSSSsssssssssssssssssssss
                    ;;                      DDDDDDDDDDDDDDDD DDDDDDDDDDdddddd
                    (parallel-with-s-access
                      bb-s-offset
                      (assign byte-r (32- bb-s-bitpos))
                      (assign b-temp bb-s-bitpos)
                      (assign bb-s-word (logxor bb-constant (rotate memory-data byte-r))))
                    (incr-wrap-s-offset)
                    ;;                      ←----- s-d -----→ ←- 32-s -→    (32-d)-(32-s)=s-d
                    ;;      sssssssssssssssSSSSSSSSSSSSSSSS|1111111111.....................
                    ;;                      DDDDDDDDDDDDDDDD DDDDDDDDDDdddddd
                    (parallel-with-s-access
                      bb-s-offset
                      (assign byte-r (32- bb-s-bitpos))
                      (assign byte-s (- b-temp bb-d-bitpos 1))
                      (assign bb-s-word2 (logxor bb-constant memory-data)))
                    (assign bb-s-word (dpb bb-s-word2 byte-s byte-r bb-s-word))
                    (assign bb-s-bitpos (- b-temp bb-d-bitpos))
;;alu depends only on source bits
(defucode ubitblt-long-row-source
  (parallel
    (assign b-temp bb-d-bitpos)
    (if (zero-fixnum bb-d-bitpos)
        (if (zero-fixnum bb-s-bitpos)
            (parallel
              (assign bb-s-offset (1- bb-s-offset))     ;bb-aligned-row-source will increment first
              (lisp (trace-path #/a))
              (jump ubitblt-aligned-row-source))
            ;;              SSSSSSSSSSSSSSSSSSSSSSSSSSSSsssssss
            ;;      dddddddddddddddddddddddddddddddd
            (parallel-with-s-access
              bb-s-offset
              (assign byte-r (32- bb-s-bitpos))
              (parallel
                (assign bb-s-word (logxor bb-constant (rotate memory-data byte-r)))
                (lisp (trace-path #/c))
                (jump ubitblt-d-aligned-row-source))))
        (if (equal-fixnum b-temp bb-s-bitpos)
            ;;SSSSSSSSSSSSSSSSSSSSSSSSSsssssss
            ;;DDDDDDDDDDDDDDDDDDDDDDDDDddddddd
            (sequential
              (parallel-with-s-access
                bb-s-offset
                (assign a-temp (32- bb-d-bitpos))
                (assign byte-r a-temp)
                (assign bb-s-word (logxor bb-constant (rotate memory-data byte-r))))
              (parallel-with-d-access
                bb-d-offset
                (assign byte-r bb-d-bitpos)
                (assign byte-s (1- a-temp))
                (store-word (dpb bb-s-word byte-s byte-r memory-data)))
              (incr-d-offset)
              (parallel
                (assign bb-width (- bb-width a-temp))
                (lisp (trace-path #/b))
                (jump ubitblt-aligned-row-source)))
            (if (lesser-fixnum bb-s-bitpos b-temp)
                ;;sssssssssSSSSSSSSSSSSSSSS.......
                ;;          DDDDDDDDDDDDDDDDdddddddddddddddd
                ;;          ← 32-d.bitpos -→
                (sequential
                  (parallel-with-s-access
                    bb-s-offset
                    (assign byte-r (32- bb-s-bitpos))
                    (parallel
                      (assign b-temp (32- bb-d-bitpos))
                      (assign a-temp cbus))
                  (assign bb-s-word (logxor bb-constant (rotate memory-data byte-r))))
                  ;;.......sssssssssSSSSSSSSSSSSSSSS
                  (parallel-with-d-access
                    bb-d-offset
                    (assign byte-r bb-d-bitpos)
                    (assign byte-s (1- b-temp))
                    (store-word (dpb bb-s-word byte-s byte-r memory-data)))
                  (incr-d-offset)
                  ;;rotate s-word further to right by 32-d.bitpos
                  ;;SSSSSSSSSSSSSSSS.......ssssssss
                  (assign byte-r bb-d-bitpos)   ;or left by -(32-d.bitpos)
                  (assign bb-s-word (rotate bb-s-word byte-r))
                  (assign bb-width (- bb-width a-temp))
                  (parallel
                    (assign bb-s-bitpos (+ bb-s-bitpos b-temp))
                    (lisp (trace-path #/d))
                    (jump ubitblt-d-aligned-row-source)))
                (sequential
;;The high part of the first source word is not as long as the high part of the
;;first destination word.  So extract the useful part of the first source word,
;;and deposit into it as much of the second source word as needed to fill out the rest
;;of the first destination word. Then position the rest of the second source word
;;appropriately for the inner loop.
```

```
::                                                    ←- 32-s -→
::       ...................................|SSSSSSSSSSsssssssssssssssssssss
::                              DDDDDDDDDDDDDDDD DDDDDDDDDDdddddd
(parallel-with-s-access
  bb-s-offset
   (assign byte-r (32- bb-s-bitpos))
   (assign b-temp bb-s-bitpos)
   (assign bb-s-word (logxor bb-constant (rotate memory-data byte-r))))
(incr-wrap-s-offset)
::                              ←----- s-d -----→ ←- 32-s -→    (32-d)-(32-s)=s-d
::       sssssssssssssssSSSSSSSSSSSSSSSS|1111111111.....................
::                              DDDDDDDDDDDDDDDD DDDDDDDDDDdddddd
(parallel-with-s-access
  bb-s-offset
   (assign byte-r (32- bb-s-bitpos))
   (assign byte-s (- b-temp bb-d-bitpos 1))
   (assign bb-s-word2 (logxor bb-constant memory-data)))
(assign bb-s-word (dpb bb-s-word2 byte-s byte-r bb-s-word))
(assign bb-s-bitpos (- b-temp bb-d-bitpos))
(assign a-temp (32- bb-d-bitpos))
(assign bb-width (- bb-width a-temp))
(parallel-with-d-access
  bb-d-offset
   (assign byte-r bb-d-bitpos)
   (assign byte-s (1- a-temp))
   (store-word (dpb bb-s-word byte-s byte-r memory-data)))
(incr-d-offset)
(assign byte-r (32- bb-s-bitpos))
(parallel
   (assign bb-s-word (rotate bb-s-word2 byte-r))
   (lisp (trace-path #/e))
   (jump ubitblt-d-aligned-row-source))))))))
(defucode ubitblt-aligned-row-source
  (if (greater-or-equal-fixnum bb-width (a-constant (* 8. 32.)))
      ;;Fetch a block of words onto the block of amem past top of stack, and move sp there.
      (sequential
        (assign b-temp (+ bb-s-offset (a-constant 8.)))
        (if (greater-or-equal-fixnum b-temp bb-s-row-length)
            (goto ubitblt-aligned-row-source-slow-loop)
            (sequential
              (assign-vma-offset s 1)
              (parallel
                (assign a-temp (b-constant 8.))
                (assign b-temp obus)
                (start-memory block read))                 ;start first word
              (parallel
                (waiting-for-memory)                       ;waiting for first word
                (start-memory block read)                  ;start second word
                (call ubitblt-block-read-push-8))
              (parallel
                (assign-vma-offset d)
                (call ubitblt-block-write-pop-8))
              (parallel
                (assign bb-s-offset (+ bb-s-offset (a-constant 8.)))
                (jump ubitblt-aligned-row-source)))))
     ;;Frob with what's left.  Too bad dispatch blocks are expensive.
     (if (greater-or-equal-fixnum bb-width (a-constant (* 4 32.)))
         (sequential
           (assign b-temp (+ bb-s-offset (a-constant 4)))
           (if (greater-or-equal-fixnum b-temp bb-s-row-length)
               (goto ubitblt-aligned-row-source-slow-loop)
               (sequential
                 (assign-vma-offset s 1)
                 (parallel
                   (assign a-temp (b-constant 4))
                   (assign b-temp obus)
                   (start-memory block read))  ;start first word
                 (parallel
                   (waiting-for-memory)                    ;waiting for first word
                   (start-memory block read)               ;start second word
                   (call ubitblt-block-read-push-4))
                 (parallel
                   (assign-vma-offset d)
                   (call ubitblt-block-write-pop-4))
                 (parallel
                   (assign bb-s-offset (+ bb-s-offset (a-constant 4)))
                   (jump ubitblt-aligned-row-source-slow-loop)))))
         (goto ubitblt-aligned-row-source-slow-loop))))

(defucode ubitblt-aligned-row-source-slow-loop  ;9 cycles per word
  (parallel
    (assign bb-width (- bb-width (a-constant 32.)))     ;1 cycle
    (trap-if (minus-fixnum obus) ubitblt-aligned-row-source-slow-loop-done))
  (incr-wrap-s-offset)                              ;2
  (parallel-with-s-access                           ;3
    bb-s-offset
    (assign bb-s-word (logxor bb-constant memory-data)))
  (assign-vma-offset d)                             ;1
  (store-word bb-s-word)                            ;1
  (parallel                                         ;1
```

```
    (incr-d-offset)
    (lisp (trace-path #/,))
    (jump ubitblt-aligned-row-source-slow-loop)))

(defucode ubitblt-aligned-row-source-slow-loop-done
  (trap-no-save)
  (if (plus-fixnum bb-width)
      (sequential
        (incr-wrap-s-offset)
        (parallel-with-s-access
          bb-s-offset
          (assign bb-s-word (logxor bb-constant memory-data)))
        (parallel-with-d-access
          bb-d-offset
          (assign byte-r (a-constant 0))
          (assign byte-s (1- bb-width))
          (parallel-with-return
            (store-word (dpb bb-s-word byte-s byte-r memory-data))
            (lisp (trace-path #/2)))))
      (parallel-with-return
        (lisp (trace-path #/1)))))

;;Each pass through this loop stores exactly one d word.  Each time through,
;;bb-s-word will have the bits to use for the lower part of the d word (already
;;rotated into position), and another s word will be fetched into bb-s-word2.
;;Then s-word2 will get rotated when transferred into s-word in preparation for
;;next loop pass.

(defucode ubitblt-d-aligned-row-source
  (if (greater-or-equal-fixnum bb-width (a-constant (* 8. 32.)))
      ;;Fetch a block of words onto the block of amem past top of stack, and move sp there.
      (sequential
        (assign b-temp (+ bb-s-offset (a-constant 8.)))
        (if (greater-or-equal-fixnum b-temp bb-s-row-length)
            (goto ubitblt-d-aligned-row-source-slow-loop)
            (sequential
              (assign-vma-offset s 1)
              (parallel
                (assign a-temp (b-constant 8.))
                (assign b-temp obus)
                (start-memory block read))                    ;start first word
              (parallel
                (waiting-for-memory)                          ;waiting for first word
                (start-memory block read)                     ;start second word
                (call ubitblt-block-read-push-8))
              (parallel
                (assign-vma-offset d)
                (call ubitblt-d-aligned-block-write-pop-8))
              (parallel
                (assign bb-s-offset (+ bb-s-offset (a-constant 8.)))
                (jump ubitblt-d-aligned-row-source)))))
      (if (greater-or-equal-fixnum bb-width (a-constant (* 4. 32.)))
          (sequential
            (assign b-temp (+ bb-s-offset (a-constant 4)))
            (if (greater-or-equal-fixnum b-temp bb-s-row-length)
                (goto ubitblt-d-aligned-row-source-slow-loop)
                (sequential
                  (assign-vma-offset s 1)
                  (parallel
                    (assign a-temp (b-constant 4.))
                    (assign b-temp obus)
                    (start-memory block read))                ;start first word
                  (parallel
                    (waiting-for-memory)                              ;waiting for first word
                    (start-memory block read)                 ;start second word
                    (call ubitblt-block-read-push-4))
                  (parallel
                    (assign-vma-offset d)
                    (call ubitblt-d-aligned-block-write-pop-4))
                  (parallel
                    (assign bb-s-offset (+ bb-s-offset (a-constant 4.)))
                    (jump ubitblt-d-aligned-row-source)))))
          (goto ubitblt-d-aligned-row-source-slow-loop))))

(defmacro def-d-aligned-block-write-pop (name n)
  `(defucode ,name
     (assign byte-s (1- bb-s-bitpos))
     (assign byte-r (- (b-constant 32.) bb-s-bitpos))
     ,@(loop for i from n downto 1
             append `((parallel
                        (assign memory-data (dpb (amem (stack-pointer ,(- (- n i))))
                                                 byte-s byte-r bb-s-word))
                        (start-memory block write)
                        (lisp (trace-path #/.)))
                      (assign bb-s-word (rotate (amem (stack-pointer ,(- (- n i)))) byte-r))))
     (assign stack-pointer (- stack-pointer b-temp))
     (assign first-part-done (b-constant 0))
     (assign bb-d-offset (+ bb-d-offset a-temp))
     (parallel-with-return
       (assign bb-width (- bb-width (rotate a-temp 5))) ;2^5 = bits-per-word
       )))
```

```
(def-d-aligned-block-write-pop ubitblt-d-aligned-block-write-pop-8 8.)
(def-d-aligned-block-write-pop ubitblt-d-aligned-block-write-pop-4 4.)

(defucode ubitblt-d-aligned-row-source-slow-loop
  (parallel
    (assign bb-width (- bb-width (a-constant 32.)))
    (trap-if (minus-fixnum obus) ubitblt-d-aligned-row-source-done))    ;aborts the assign
  (incr-wrap-s-offset)
  (assign-vma-offset s)
  (parallel
    (assign byte-s (1- bb-s-bitpos))
    (start-memory read))
  (parallel
    (assign byte-r (- (b-constant 32.) bb-s-bitpos))
    (waiting-for-memory))
  (abus-array-data
    (assign bb-s-word2 (logxor bb-constant memory-data)))
  (assign-vma-offset d)
  (store-word (dpb bb-s-word2 byte-s byte-r bb-s-word))
  (incr-d-offset)
  (parallel
    (assign bb-s-word (rotate bb-s-word2 byte-r))
    (lisp (trace-path #/.))
    (jump ubitblt-d-aligned-row-source)))

(defucode ubitblt-d-aligned-row-source-done
  (trap-no-save)
  (if (plus-fixnum bb-width)
      (sequential
        (assign a-temp (32- bb-s-bitpos))       ;how many bits are valid in bb-s-word
        (if (lesser-or-equal-fixnum bb-width a-temp)
            ;;we have enough s bits
            (parallel-with-d-access
              bb-d-offset
              (assign byte-s (1- bb-width))
              (assign byte-r (a-constant 0))
              (parallel
                (lisp (trace-path #/4))
                (parallel-with-return
                  (store-word (dpb bb-s-word byte-s byte-r memory-data)))))
            ;;need to get another source word
            (sequential
              (incr-wrap-s-offset)
              (parallel-with-s-access
                bb-s-offset
                (assign byte-r (32- bb-s-bitpos))
                (assign byte-s (1- bb-s-bitpos))
                (assign bb-s-word2 (logxor bb-constant memory-data)))
              (assign bb-s-word (dpb bb-s-word2 byte-s byte-r bb-s-word))
              (lisp (trace-path #/5))
              (parallel-with-d-access
                bb-d-offset
                (assign byte-s (1- bb-width))
                (assign byte-r (a-constant 0))
                (parallel-with-return
                  (store-word (dpb bb-s-word byte-s byte-r memory-data)))))))
      (parallel
        (lisp (trace-path #/3))
        (return))))
;;alu depends only on destination bits
(defucode ubitblt-long-row-destination
  (if (bit first-part-done)
      (goto ubitblt-long-row-destination-pcler-restart)
      (if (plus-fixnum bb-d-bitpos)
          (sequential                              ;frob the first partial word
            (assign a-temp (32- bb-d-bitpos))
            (assign byte-r bb-d-bitpos)
            (parallel-with-d-access
              bb-d-offset
              (assign byte-s (1- a-temp))
              (assign b-temp (dpb bb-constant byte-s byte-r (a-constant 0)))
              (store-word (logxor b-temp memory-data)))
            (incr-d-offset)
            (parallel
              (assign bb-width (- bb-width a-temp))
              (lisp (trace-path #/b))
              (jump ubitblt-long-row-destination-loop)))
          (parallel
            (lisp (trace-path #/a))              ;---this debug crap costs a cycle here,
            (jump ubitblt-long-row-destination-loop)))))        ;---should be goto, not jump.

(defucode ubitblt-long-row-destination-loop
  (if (greater-or-equal-fixnum bb-width (a-constant (* 8. 32.)))
      ;;Fetch a block of words onto the block of amem past top of stack, and move sp there.
      (sequential
        (assign-vma-offset d)
        (parallel
          (assign a-temp (b-constant 8.))
          (assign b-temp obus)
          (start-memory block read))             ;start first word
```

```
    (parallel
      (waiting-for-memory)                          ;waiting for first word
      (start-memory block read)                     ;start second word
      (call ubitblt-block-read-push-8))
    (parallel
      (assign-vma-offset d)
      (call-and-return-to ubitblt-block-write-pop-8
                          ubitblt-long-row-destination-loop)))
  ;;Frob with what's left.  Too bad dispatch blocks are expensive.
  (if (greater-or-equal-fixnum bb-width (a-constant (* 4 32.)))
      (sequential
        (assign-vma-offset d)
        (parallel
          (assign a-temp (b-constant 4))
          (assign b-temp obus)
          (start-memory block read))                ;start first word
        (parallel
          (waiting-for-memory)                      ;waiting for first word
          (start-memory block read)                 ;start second word
          (call ubitblt-block-read-push-4))
        (parallel
          (assign-vma-offset d)
          (call-and-return-to ubitblt-block-write-pop-4
                              ubitblt-long-row-destination-slow-loop)))
      (goto ubitblt-long-row-destination-slow-loop))))

;;Write this when pclsring can happen
(defucode ubitblt-long-row-destination-pclsr-restart
  (lisp (tell-the-simulator-that-it-is-supposed-to-halt-the-machine))
  (halt bitblt-pclsring-now-yet-written))

(defucode ubitblt-long-row-destination-slow-loop
  (parallel
    (assign bb-width (- bb-width (a-constant 32.)))
    (trap-if (minus-fixnum obus) ubitblt-long-row-destination-done))    ;aborts the assign
  (lisp (trace-path #/,))
  (parallel-with-d-access
    bb-d-offset
    (incr-d-offset)
    (parallel
      (store-word (logxor bb-constant memory-data))
      (jump ubitblt-long-row-destination-slow-loop))))

(defucode ubitblt-long-row-destination-done
  (trap-no-save)
  (if (plus-fixnum bb-width)
      (sequential
        (assign byte-r (a-constant 8))
        (parallel-with-d-access
          bb-d-offset
          (assign byte-s (1- bb-width))
          (assign b-temp (dpb bb-constant byte-s byte-r (a-constant 8)))
          (parallel
            (lisp (trace-path #/2))
            (parallel-with-return
              (store-word (logxor b-temp memory-data))))))
      (parallel
        (lisp (trace-path #/1))
        (return))))
(defmacro def-block-read-push (name n)
  `(defucode ,name
     ,@(loop for i from n downto 1
             collect `(parallel
                        (declare-memory-timing data-cycle)
                        (check-data-type memory-data dtp-fix)
                        (assign (amem (stack-pointer ,i))
                                (logxor bb-constant memory-data))
                        ,(when (> i 2) '(start-memory block read))))
     (assign first-part-done (b-constant 1))
     (parallel-with-return
       (assign stack-pointer (+ stack-pointer b-temp)))))

(def-block-read-push ubitblt-block-read-push-8 8)       ;I suppose this when interned...
(def-block-read-push ubitblt-block-read-push-4 4)       ;... will subsume this.

(defmacro def-block-write-pop (name n)
  `(defucode ,name
     ,@(loop for i from n downto 1
             collect `(parallel
                        (assign memory-data (amem (stack-pointer ,(- (- n i)))))
                        (start-memory block write)
                        (lisp (trace-path #/.))))
     (assign stack-pointer (- stack-pointer b-temp))
     (assign first-part-done (b-constant 8))
     (assign bb-d-offset (+ bb-d-offset a-temp))
     (parallel-with-return
       (assign bb-width (- bb-width (rotate a-temp 5))) ;2^5 = bits-per-word
       )))
(def-block-write-pop ubitblt-block-write-pop-8 8)
(def-block-write-pop ubitblt-block-write-pop-4 4)
```

```
;;alu depends on neither source nor destination bits
(defucode ubitblt-long-row-neither
  (if (plus-fixnum bb-d-bitpos)
      (sequential
        (assign a-temp (32- bb-d-bitpos))
        (parallel-with-d-access
          bb-d-offset
          (assign byte-r bb-d-bitpos)
          (assign byte-s (1- a-temp))
          (store-word (dpb bb-constant byte-s byte-r memory-data)))
        (incr-d-offset)
        (parallel
          (assign bb-width (- bb-width a-temp))
          (lisp (trace-path #/b))
          (jump ubitblt-long-row-neither-loop)))
      (parallel
        (lisp (trace-path #/a))
        (jump ubitblt-long-row-neither-loop))))

(defucode ubitblt-long-row-neither-loop
  (if (greater-or-equal-fixnum bb-width (a-constant (* 8. 32.)))
      (sequential
        (parallel
          (assign-vma-offset d)
          (call store-block-bb-constant-8))
        (assign bb-d-offset (+ bb-d-offset (a-constant 8.)))
        (parallel
          (assign bb-width (- bb-width (a-constant (* 8. 32.))))
          (jump ubitblt-long-row-neither-loop)))
      (sequential
        (dispatch-after-next (parallel (assign a-temp (ldb bb-width 3 5))
                                       (ldb bb-width 3 5))
           ((7) (parallel (assign-vma-offset d)
                          (call-and-return-to store-block-bb-constant-7
                                              ubitblt-long-row-neither-finish)))
           ((6) (parallel (assign-vma-offset d)
                          (call-and-return-to store-block-bb-constant-6
                                              ubitblt-long-row-neither-finish)))
           ((5) (parallel (assign-vma-offset d)
                          (call-and-return-to store-block-bb-constant-5
                                              ubitblt-long-row-neither-finish)))
           ((4) (parallel (assign-vma-offset d)
                          (call-and-return-to store-block-bb-constant-4
                                              ubitblt-long-row-neither-finish)))
           ((3) (parallel (assign-vma-offset d)
                          (call-and-return-to store-block-bb-constant-3
                                              ubitblt-long-row-neither-finish)))
           ((2) (parallel (assign-vma-offset d)
                          (call-and-return-to store-block-bb-constant-2
                                              ubitblt-long-row-neither-finish)))
           ((1) (assign-vma-offset d)
                (parallel
                  (lisp (trace-path #/,))
                  (store-word bb-constant)
                  (jump ubitblt-long-row-neither-finish)))
           (otherwise (goto cant-happen)))
        (if (zero-fixnum a-temp)
            (goto ubitblt-long-row-neither-finish)
            (take-dispatch)))))

(defucode ubitblt-long-row-neither-finish
  (assign bb-d-offset (+ bb-d-offset a-temp))
  (assign bb-width (logand bb-width (a-constant #o37)))
  (if (plus-fixnum bb-width)
      (parallel-with-d-access
        bb-d-offset
        (assign byte-r (a-constant 0))
        (assign byte-s (1- bb-width))
        (parallel
          (lisp (trace-path #/2))
          (store-word (dpb bb-constant byte-s byte-r memory-data))
          (return)))
      (parallel
        (lisp (trace-path #/1))
        (return))))

(defmacro store-block-bb-constant-routines (n)
  `(progn 'compile
          ,@(loop with s = "STORE-BLOCK-BB-CONSTANT-~d"
                  for i from n downto 1
                  collect `(defucode ,(fintern s i)
                             (parallel
                               (assign memory-data (set-type bb-constant dtp-fix))
                               ,(if (> i 1)
                                    '(start-memory block write)
                                    '(start-memory write))
                               (lisp (trace-path #/,))
                               ,(if (> i 1)
                                    `(jump ,(fintern s (1- i)))
                                    '(return)))))))
```

```
(store-block-bb-constant-routines 8.)

;;alu depends both source and destination bits
(defucode ubitblt-long-row-both
  (parallel
    (assign b-temp bb-d-bitpos)
    (if (zero-fixnum bb-d-bitpos)
        (if (zero-fixnum bb-s-bitpos)
            (parallel
              (lisp (trace-path #/a))
              (assign bb-s-offset (1- bb-s-offset))     ;bb-aligned-row-both will increment first
              (jump ubitblt-aligned-row-both))
            (parallel-with-s-access
              bb-s-offset
              ;;    SSSSSSSSSSSSSSSSSSSSSSSSSSS.ssss
              ;;ddddddddddddddddddddddddddddddd.
              (assign byte-r (32- bb-s-bitpos))
              (parallel
                (assign bb-s-word (logxor bb-constant (rotate memory-data byte-r)))
                (lisp (trace-path #/c))
                (jump ubitblt-d-aligned-row-both))))
        (if (equal-fixnum bb-s-bitpos b-temp)
            (sequential
              (parallel-with-s-access
                bb-s-offset
                ;;SSSSSSSSSSSSSSSSSSSSSSSSSS.ssssss
                ;;dddddddddddddddddddddddddd.dddddd
                (parallel
                  (assign byte-r (32- bb-s-bitpos))
                  (assign a-temp obus))
                (assign byte-s (31- bb-s-bitpos))
                (assign bb-s-word (logxor bb-constant (ldb memory-data byte-s byte-r))))
              (assign byte-r bb-s-bitpos)
              (parallel
                (assign-vma-offset d)
                ;;ssssssssssssssssssssssssss.ssssss
                ;;DDDDDDDDDDDDDDDDDDDDDDDDDD.dddddd
                (call bb-byte-alu-operation-dispatch))
              (incr-d-offset)
              (parallel
                (assign bb-width (- bb-width a-temp))
                (lisp (trace-path #/b))
                (jump ubitblt-aligned-row-both)))
            (if (lesser-fixnum bb-s-bitpos b-temp)
                (goto ubitblt-long-row-both-s-longer)
                (goto ubitblt-long-row-both-s-shorter))))))

(defucode ubitblt-long-row-both-s-longer
  (assign a-temp (32- bb-d-bitpos))
  (parallel-with-s-access
    bb-s-offset
    (assign byte-r (32- bb-s-bitpos))
    (assign byte-s (1- a-temp))
    (assign bb-s-word2 (logxor bb-constant memory-data)))
  ;;ssssSSSSSSSSSSSSSSSSSSSS........
  ;;    DDDDDDDDDDDDDDDDDDDDdddddddddddd
  ;;    ←----- a-temp ------→
  (assign bb-s-word (rotate bb-s-word2 byte-r))
  ;;........ssssSSSSSSSSSSSSSSSSSSSS
  (assign byte-r bb-d-bitpos)
  (parallel
    (assign-vma-offset d)
    ;;ssssssssssssssssssssssss.ssssssss
    ;;    DDDDDDDDDDDDDDDDDDDD.dddddddddddd
    (call bb-byte-alu-operation-dispatch))
  (incr-d-offset)
  ;;Remaining are (32-(s.bitpos+(32-d.bitpos))) = d.bitpos-s.bitpos
  ;;    ←-- 32-d.bitpos ----→ ←-s.bitpos-→
  ;;SSSSssssssssssssssssssss.ssssssss
  ;;    dddddddddddddddddddd.dddddddddddd
  (assign b-temp bb-s-bitpos)
  (assign byte-r (- bb-d-bitpos b-temp))
  (assign bb-s-word (rotate bb-s-word2 byte-r))
  (assign bb-width (- bb-width a-temp))
  (parallel
    (assign bb-s-bitpos (+ b-temp a-temp))
    (lisp (trace-path #/d))
    (jump ubitblt-d-aligned-row-both)))

(defucode ubitblt-long-row-both-s-shorter
  ;;    ssssssssssssssssssssssss.ssssssss
  ;;dddddddddddddddddddddddddddd.dddd
  (parallel-with-s-access
    bb-s-offset
    (assign byte-r (32- bb-s-bitpos))
    (assign byte-s (31- bb-s-bitpos))
    ;;    SSSSSSSSSSSSSSSSSSSSSSSS.ssssssss
    ;;dddddddddddddddddddddddddddd.dddd
    (assign bb-s-word (logxor bb-constant (ldb memory-data byte-s byte-r))))
  (incr-wrap-s-offset)
  ;;    ←--→ s.bitpos-d.bitpos
  ;;...SSSS|ssssssssssssssssssssssss.ssssssss
```

```
;;   dddd dddddddddddddddddddddddd.dddd
(assign b-temp bb-d-bitpos)
(parallel-with-s-access
  bb-s-offset
  (assign byte-s (- bb-s-bitpos b-temp 1))
  (assign byte-r (32- bb-s-bitpos))
  (assign bb-s-word2 (logxor bb-constant memory-data)))
;;...SSSS|SSSSSSSSSSSSSSSSSSSSSSSS.ssssssss
;;   dddd dddddddddddddddddddddddd.dddd
(assign bb-s-word (dpb bb-s-word2 byte-s byte-r bb-s-word))
(assign byte-r bb-d-bitpos)
(assign byte-s (31- bb-d-bitpos))
;;...ssss|ssssssssssssssssssssssss.ssssssss
;;   DDDD DDDDDDDDDDDDDDDDDDDDDDDD.dddd
(parallel
  (assign-vma-offset d)
  (call bb-byte-alu-operation-dispatch))
(incr-d-offset)
;;...SSSssss|ssssssssssssssssssssssss.ssssssss
;;      dddd dddddddddddddddddddddddd.dddd
(assign a-temp (32- bb-d-bitpos))           ;Try to find some more cleverness here.
(assign bb-width (- bb-width a-temp))
(assign b-temp bb-d-bitpos)
(assign byte-r (- b-temp bb-s-bitpos))
(assign bb-s-bitpos (- bb-s-bitpos b-temp))
(parallel
  (assign bb-s-word (rotate bb-s-word2 byte-r))
  (lisp (trace-path #/e))
  (jump ubitblt-d-aligned-row-both)))

(defucode ubitblt-aligned-row-both
  (if (greater-or-equal-fixnum bb-width (a-constant (* 8. 32.)))
      ;;Fetch a block of words onto the block of amem past top of stack, and move sp there.
      (sequential
        (assign b-temp (+ bb-s-offset (a-constant 8.)))
        (if (greater-or-equal-fixnum b-temp bb-s-row-length)
            (goto ubitblt-aligned-row-both-slow-loop)
            (sequential
              (assign-vma-offset s 1)
              (parallel
                (assign a-temp (b-constant 8.))
                (assign b-temp obus)
                (start-memory block read))          ;start first word
              (parallel
                (waiting-for-memory)                ;waiting for first word
                (start-memory block read)           ;start second word
                (call ubitblt-block-read-push-8))
              (assign-vma-offset d)
              (dispatch-after-this (ldb bb-alu-operation 4 0)
                                   (parallel
                                     (assign a-temp (a-constant 8.))
                                     (assign b-temp (a-constant 8.))
                                     (start-memory block read)) ;start first word
                ((1 2)      ;; x*y   ~x*y
                 (goto ubitblt-block-logand-8))
                ((4 8.)     ;; x*~y  ~x*~y
                 (goto ubitblt-block-andc2-8))
                ((6 9.)     ;; x xor y, ~x xor y
                 (goto ubitblt-block-logxor-8))
                ((7 11.)    ;; x+y, ~x+y
                 (goto ubitblt-block-logior-8))
                ((13. 14.)  ;; ~(~x*y), ~(x*y)
                 (goto ubitblt-block-lognand-8))
                (otherwise (goto cant-happen))))))
      ;;Frob with what's left.  Too bad dispatch blocks are expensive.
      ;;(if (greater-or-equal-fixnum bb-width (a-constant (* 4 32.))) ...)
      (goto ubitblt-aligned-row-both-slow-loop)))

(defmacro def-block-aluop (name n alu &optional complement)
  `(defucode ,name
     ,@(loop for i from n downto 1
             append `((parallel
                        (declare-memory-timing active-cycle)    ;wait for first word
                        (waiting-for-memory)
                        (assign b-temp-2 (amem (stack-pointer ,(- (- n i)))))))
                     ,@(if (not complement)
                           `((parallel
                               (abus-array-data (assign (amem (stack-pointer ,i))
                                                        (,alu b-temp-2 memory-data)))
                               ,(when (> i 1)
                                  `(start-memory block read)   ;start next word
                                  )))
                           `((abus-array-data (assign a-temp-2
                                                      (,alu b-temp-2 memory-data)))
                             (parallel
                               (assign (amem (stack-pointer ,i))
                                       (logxor a-temp-2 (b-constant -1)))
                               ,(when (> i 1)
                                  `(start-memory block read)
                                  ))))))
    (parallel
```

```
    (assign stack-pointer (+ stack-pointer b-temp))
    (jump ,(fintern "UBITBLT-BLOCK-ALU-WRITE-~d" n)))))

(def-block-aluop ubitblt-block-logand-8 8 logand)
(def-block-aluop ubitblt-block-logior-8 8 logior)
(def-block-aluop ubitblt-block-logxor-8 8 logxor)
(def-block-aluop ubitblt-block-andc2-8 8 andc2)
(def-block-aluop ubitblt-block-lognand-8 8 logand complement)

(defmacro def-block-alu-write (name n)
  `(defucode ,name
     (assign-vma-offset d)
     ,@(loop for i from n downto 1
             collect `(parallel
                        (assign memory-data (amem (stack-pointer ,(- (- n i)))))
                        (start-memory block write)
                        (lisp (trace-path #/.))))
     (assign stack-pointer (- stack-pointer (rotate b-temp 1)))
     (assign first-part-done (b-constant 0))
     (assign bb-d-offset (+ bb-d-offset a-temp))
     (assign bb-width (- bb-width (rotate a-temp 5)))   ;2^5 = bits-per-word
     (parallel
       (assign bb-s-offset (+ bb-s-offset a-temp))
       (jump ubitblt-aligned-row-both))))

(def-block-alu-write ubitblt-block-alu-write-8 8)

(defucode ubitblt-aligned-row-both-slow-loop     ;11 cycles per word, or 12 for nand
  (parallel                                      ;1 cycle
    (assign bb-width (- bb-width (a-constant 32.)))
    (trap-if (minus-fixnum obus) ubitblt-aligned-row-both-slow-loop-done))
  (incr-wrap-s-offset)                           ;2 cycles
  (parallel-with-s-access                        ;3 cycles
    bb-s-offset
    (assign bb-s-word (logxor bb-constant memory-data)))
  (parallel                                      ;1+3 cycles, or 1+4 for nand
    (assign-vma-offset d)
    (call bb-word-alu-operation-dispatch))
  (parallel                                      ;1 cycle
    (incr-d-offset)
    (lisp (trace-path #/,))
    (jump ubitblt-aligned-row-both)))

(defucode ubitblt-aligned-row-both-slow-loop-done
  (if (plus-fixnum bb-width)
      (sequential
        (incr-wrap-s-offset)
        (parallel-with-s-access
          bb-s-offset
          (assign byte-r (b-constant 0))
          (assign byte-s (1- bb-width))
          (assign bb-s-word (logxor bb-constant memory-data)))
        (parallel
          (lisp (trace-path #/2))
          (assign-vma-offset d)
          (jump bb-byte-alu-operation-dispatch)))      ;jcall
      (parallel-with-return
        (lisp (trace-path #/1)))))

;;Each time through the loop, s-word was fetched from memory like
;;          <-------s.bitpos------->
;;ssssssssss.......................
;;and then rotated so it looks like
;;.......................ssssssssss
;;<-------s.bitpos------->
;;
;;Each time, another s-word2 gets fetched and deposited into s-word like
;;          |<-------s.bitpos------->
;;          |.......................1111111111
;;2222222222 2222222222222222222222
;;
;;The rotation for the dpb equals the rotation for setup for next loop.

(defucode ubitblt-d-aligned-row-both
  (parallel
    (assign bb-width (- bb-width (a-constant 32.)))
    (trap-if (minus-fixnum obus) ubitblt-d-aligned-row-both-done))      ;aborts assign
  (incr-wrap-s-offset)
  (parallel-with-s-access
    bb-s-offset
    (assign byte-r (32- bb-s-bitpos))
    (assign byte-s (1- bb-s-bitpos))
    (assign bb-s-word2 (logxor bb-constant memory-data)))
  (assign bb-s-word (dpb bb-s-word2 byte-s byte-r bb-s-word))
  (parallel
    (assign-vma-offset d)
    (call bb-word-alu-operation-dispatch))
  (incr-d-offset)
  (parallel
    (assign bb-s-word (rotate bb-s-word2 byte-r))
    (lisp (trace-path #/.))
    (jump ubitblt-d-aligned-row-both)))
```

```
;;At entry, we have s-word fetched from memory like
;;         ←-------s.bitpos-------→
;;sssssssss.......................
;;but then rotated so it looks like
;;.......................sssssssss
;;←-------s.bitpos-------→
;;
;;This is to be combined with d-word which looks like
;;.....................ddddddddddd
;;                     ←---width--→
(defucode ubitblt-d-aligned-row-both-done
  (trap-no-save)
  (if (plus-fixnum bb-width)
      (sequential
        (assign a-temp (32- bb-s-bitpos))
        (if (lesser-or-equal-fixnum bb-width a-temp)
            ;;we have enough s bits
            ;;←-----s.bitpos---→←-----a.temp---→
            ;;..................ssssssssssssss
            ;;.....................ddddddddddd
            ;;                     ←---width--→
            (sequential
              (assign byte-r (b-constant 0))
              (assign byte-s (1- bb-width))
              (parallel
                (assign-vma-offset d)
                (lisp (trace-path #/4))
                (jump bb-byte-alu-operation-dispatch))) ;jcall
            ;;need to get another source word
            ;;←-----s.bitpos---→←-----a.temp---→
            ;;..................ssssssssssssss
            ;;.............ddddddddddddddddddd
            ;;             ←--------width------→
            (sequential
              (incr-wrap-s-offset)
              (parallel-with-s-access
                bb-s-offset
                (assign byte-r a-temp)
                (assign byte-s (1- bb-s-bitpos))
                (assign bb-s-word2 (logxor memory-data bb-constant)))
              (assign bb-s-word (dpb bb-s-word2 byte-s byte-r bb-s-word))
              (assign byte-r (b-constant 0))
              (assign byte-s (1- bb-width))
              (parallel
                (assign-vma-offset d)
                (lisp (trace-path #/5))
                (jump bb-byte-alu-operation-dispatch)))))        ;jcall
      (parallel-with-return
        (lisp (trace-path #/3)))))
(defucode ubitblt-long-row-source-backwards
  (parallel
    (assign b-temp bb-d-bitpos)
    (if (zero-fixnum bb-d-bitpos)
        (if (zero-fixnum bb-s-bitpos)
            (parallel
              (assign bb-s-offset (1+ bb-s-offset))     ;the loop will decr first
              (lisp (trace-path #/a))
              (jump ubitblt-aligned-row-source-backwards))
            (sequential
              (parallel-with-s-access
                bb-s-offset
                (assign byte-r (32- bb-s-bitpos))
                (parallel
                  (assign bb-s-word (logxor bb-constant (rotate memory-data byte-r)))
                  (lisp (trace-path #/c))
                  (jump ubitblt-d-aligned-row-source-backwards)))))
        (if (equal-fixnum b-temp bb-s-bitpos)
            (sequential
              (parallel-with-s-access
                bb-s-offset
                (assign byte-s (1- bb-s-bitpos))
                (assign byte-r (b-constant 0))
                (assign bb-s-word (logxor memory-data bb-constant)))
              (parallel-with-d-access
                bb-d-offset
                (decr-d-offset)
                (assign bb-width (- bb-width bb-s-bitpos))
                (parallel
                  (store-word (dpb bb-s-word byte-s byte-r memory-data))
                  (lisp (trace-path #/b))
                  (jump ubitblt-aligned-row-source-backwards))))
            (if (greater-fixnum bb-s-bitpos b-temp)     ;s > d, enough in the current word
                (sequential
                  (parallel-with-s-access
                    bb-s-offset
                    (assign bb-width (- bb-width bb-d-bitpos))  ;has to be done somewhere
                    (assign bb-s-word (logxor bb-constant memory-data)))
                  (parallel-with-d-access
                    bb-d-offset
                    (assign byte-s (1- bb-d-bitpos))
```

```
                (assign byte-r (- b-temp bb-s-bitpos))
                (store-word (ldb bb-s-word byte-s byte-r memory-data)))
              (assign bb-s-word (rotate bb-s-word byte-r))
              (assign bb-s-bitpos (- bb-s-bitpos b-temp))
              (parallel
                (decr-d-offset)
                (lisp (trace-path #/d))
                (jump ubitblt-d-aligned-row-source-backwards)))
            (sequential                     ;s < d, need to fetch another word
              (parallel-with-s-access
                bb-s-offset
                (assign byte-r (- b-temp bb-s-bitpos))
                (assign bb-s-word (logxor bb-constant (rotate memory-data byte-r))))
              (decr-wrap-s-offset)
              (parallel-with-s-access
                bb-s-offset
                (assign a-temp (- b-temp bb-s-bitpos))
                (assign byte-s (1- a-temp))
                (assign bb-s-word2 (logxor bb-constant memory-data)))
              (assign bb-s-word (ldb bb-s-word2 byte-s byte-r bb-s-word))
              (parallel-with-d-access
                bb-d-offset
                (assign byte-r (b-constant 0))
                (assign byte-s (1- bb-d-bitpos))
                (store-word (ldb bb-s-word byte-s byte-r memory-data)))
              (assign bb-width (- bb-width bb-d-bitpos))
              (assign bb-s-bitpos (32- a-temp))
              (assign byte-r a-temp)
              (assign bb-s-word (rotate bb-s-word2 byte-r))
              (parallel
                (decr-d-offset)
                (lisp (trace-path #/e))
                (jump ubitblt-d-aligned-row-source-backwards))))))))
(defucode ubitblt-aligned-row-source-backwards  ;8 cycles per word
  (parallel                                     ;1
    (assign bb-width (- bb-width (a-constant 32.)))
    (trap-if (minus-fixnum obus) ubitblt-aligned-row-source-backwards-done))
  (decr-wrap-s-offset)                          ;1
  (parallel-with-s-access                       ;3
    bb-s-offset
    (assign bb-s-word (logxor bb-constant memory-data)))
  (assign-vma-offset d)                         ;1
  (store-word bb-s-word)                        ;1
  (parallel                                     ;1
    (decr-d-offset)
    (lisp (trace-path #/,))
    (jump ubitblt-aligned-row-source-backwards)))

(defucode ubitblt-aligned-row-source-backwards-done
  (trap-no-save)
  (if (plus-fixnum bb-width)
      (sequential
        (decr-wrap-s-offset)
        (parallel-with-s-access
          bb-s-offset
          (assign byte-s (1- bb-width))
          (assign byte-r bb-width)
          (assign bb-s-word (logxor bb-constant (ldb memory-data byte-s byte-r))))
        (parallel-with-d-access
          bb-d-offset
          (assign byte-r (- (a-constant 32.) bb-width))
          (parallel-with-return
            (store-word (dpb bb-s-word byte-s byte-r memory-data))
            (lisp (trace-path #/2)))))
      (parallel-with-return
        (lisp (trace-path #/1)))))
;;each time through the loop, bb-s-word has the low part of the previous word
;;rotated to be at the high end of the word.  We use it as background to LDB the
;;high part of the next word into it.

(defucode ubitblt-d-aligned-row-source-backwards        ;9 cycles per word
  (parallel                                     ;1 cycle
    (assign bb-width (- bb-width (a-constant 32.)))     ;assign is aborted if trap occurs
    (trap-if (minus-fixnum obus) ubitblt-d-aligned-row-source-backwards-done))
  (decr-wrap-s-offset)                          ;1
  (parallel-with-s-access                       ;3
    bb-s-offset
    (assign byte-r (32- bb-s-bitpos))
    (assign byte-s (31- bb-s-bitpos))
    (assign bb-s-word2 (logxor bb-constant memory-data)))
  (assign-vma-offset d)                         ;1
  (store-word (ldb bb-s-word2 byte-s byte-r bb-s-word)) ;1
  (decr-d-offset)                               ;1
  (parallel                                     ;1
    (assign bb-s-word (rotate bb-s-word2 byte-r))
    (lisp (trace-path #/.))
    (jump ubitblt-d-aligned-row-source-backwards)))

(defucode ubitblt-d-aligned-row-source-backwards-done
  (trap-no-save)
```

```
    (if (plus-fixnum bb-width)
        (if (greater-or-equal-fixnum bb-s-bitpos bb-width)
            (parallel-with-d-access
              bb-d-offset
              (assign byte-r (b-constant 0))
              (assign byte-s (- (a-constant 31.) bb-width))
              (parallel-with-return
                (store-word (ldb memory-data byte-s byte-r bb-s-word))
                (lisp (trace-path #/4))))
            (sequential
              (decr-wrap-s-offset)
              (parallel-with-s-access
                bb-s-offset
                (assign byte-r bb-width)
                (assign bb-s-word (rotate bb-s-word byte-r))
                (assign bb-s-word2 (logxor bb-constant memory-data)))
              (parallel
                (assign byte-r (- bb-width bb-s-bitpos))
                (assign a-temp obus))
              (assign byte-s (1- a-temp))
              (assign bb-s-word (ldb bb-s-word2 byte-s byte-r bb-s-word))
              (parallel-with-d-access
                bb-d-offset
                (assign byte-s (1- bb-width))
                (assign byte-r (- (a-constant 32.) bb-width))
                (parallel-with-return
                  (store-word (dpb bb-s-word byte-s byte-r memory-data))
                  (lisp (trace-path #/5))))))
        (parallel-with-return
          (lisp (trace-path #/3)))))
(defucode ubitblt-long-row-both-backwards
  (parallel
    (assign b-temp bb-d-bitpos)
    (if (zero-fixnum bb-d-bitpos)
        (if (zero-fixnum bb-s-bitpos)
            (parallel
              (assign bb-s-offset (1+ bb-s-offset))      ;loop will decr first
              (lisp (trace-path #/a))
              (jump ubitblt-aligned-row-both-backwards))
            (parallel-with-s-access
              bb-s-offset
              (assign byte-r (32- bb-s-bitpos))
              (parallel
                (assign bb-s-word (logxor bb-constant (rotate memory-data byte-r)))
                (lisp (trace-path #/c))
                (jump ubitblt-d-aligned-row-both-backwards))))
        (if (equal-fixnum b-temp bb-s-bitpos)
            (sequential
              (parallel-with-s-access
                bb-s-offset
                (assign byte-s (1- bb-s-bitpos))
                (assign byte-r (b-constant 0))
                (assign bb-s-word (logxor bb-constant memory-data)))
              (assign-vma-offset d)
              (parallel
                (decr-d-offset)
                (start-memory read)
                (call bb-byte-alu-operation-dispatch))
              (parallel
                (assign bb-width (- bb-width bb-s-bitpos))
                (lisp (trace-path #/b))
                (jump ubitblt-aligned-row-both-backwards)))
            (if (greater-fixnum bb-s-bitpos b-temp)      ;s > d, enough in first word
                (sequential
                  (parallel-with-s-access
                    bb-s-offset
                    (parallel
                      (assign byte-r (- b-temp bb-s-bitpos))
                      (assign a-temp obus))      ;this is negative
                    (assign byte-s (1- bb-d-bitpos))
                    (assign bb-s-word (logxor bb-constant (rotate memory-data byte-r))))
                  (assign byte-r (b-constant 0))
                  (parallel
                    (assign-vma-offset d)
                    (call bb-byte-alu-operation-dispatch))
                  (assign bb-width (- bb-width bb-d-bitpos))
                  (assign b-temp bb-d-bitpos)
                  (assign bb-s-bitpos (- bb-s-bitpos b-temp))
                  (parallel
                    (decr-d-offset)
                    (lisp (trace-path #/d))
                    (jump ubitblt-d-aligned-row-both-backwards)))
                (sequential                              ;s<d, need to fetch another word
                  (parallel-with-s-access
                    bb-s-offset
                    (assign byte-r (- b-temp bb-s-bitpos))
                    (assign bb-s-word (logxor bb-constant (rotate memory-data byte-r))))
                  (decr-wrap-s-offset)
                  (parallel-with-s-access
                    bb-s-offset
```

```
            (assign a-temp (- b-temp bb-s-bitpos))
            (assign byte-s (1- a-temp))
            (assign bb-s-word2 (logxor bb-constant memory-data)))
          (assign bb-s-word (ldb bb-s-word2 byte-s byte-r bb-s-word))
          (assign byte-s (1- bb-d-bitpos))
          (assign byte-r (b-constant 0))
          (parallel
            (assign-vma-offset d)
            (call bb-byte-alu-operation-dispatch))
          (assign bb-width (- bb-width bb-d-bitpos))
          (assign b-temp bb-d-bitpos)
          (parallel
            (assign b-temp (- b-temp bb-s-bitpos))
            (assign byte-r obus))
          (assign bb-s-word (rotate bb-s-word2 byte-r))
          (assign bb-s-bitpos (- (a-constant 32.) b-temp))
          (parallel
            (decr-d-offset)
            (lisp (trace-path #/e))
            (jump ubitblt-d-aligned-row-both-backwards))))))))
(defucode ubitblt-aligned-row-both-backwards    ;18 cycles per word
  (parallel                                     ;1
    (assign bb-width (- bb-width (a-constant 32.)))
    (trap-if (minus-fixnum obus) ubitblt-aligned-row-both-backwards-done))
  (decr-wrap-s-offset)                          ;1
  (parallel-with-s-access                       ;3
    bb-s-offset
    (assign bb-s-word (logxor bb-constant memory-data)))
  (parallel                                     ;1+3
    (assign-vma-offset d)
    (call bb-word-alu-operation-dispatch))
  (parallel                                     ;1
    (decr-d-offset)
    (lisp (trace-path #/,))
    (jump ubitblt-aligned-row-both-backwards)))

(defucode ubitblt-aligned-row-both-backwards-done
  (if (plus-fixnum bb-width)
      (sequential
        (decr-wrap-s-offset)
        (parallel-with-s-access
          bb-s-offset
          (assign byte-s (1- bb-width))
          (assign byte-r bb-width)
          (assign bb-s-word (logxor bb-constant (ldb memory-data byte-s byte-r))))
        (assign byte-r (- (a-constant 32.) bb-width))
        (parallel
          (assign-vma-offset d)
          (lisp (trace-path #/2))
          (jump bb-byte-alu-operation-dispatch)))        ;jcall
      (parallel-with-return
        (lisp (trace-path #/1)))))
(defucode ubitblt-d-aligned-row-both-backwards  ;13 cycles per word
  (parallel                                     ;1 cycle
    (assign bb-width (- bb-width (a-constant 32.)))
    (trap-if (minus-fixnum obus) ubitblt-d-aligned-row-both-backwards-done))
  (decr-wrap-s-offset)                          ;1 cycles
  (parallel-with-s-access                       ;3 cycles
    bb-s-offset
    (assign byte-s (31- bb-s-bitpos))
    (assign byte-r (32- bb-s-bitpos))
    (assign bb-s-word2 (logxor bb-constant memory-data)))
  (assign bb-s-word (ldb bb-s-word2 byte-s byte-r bb-s-word))   ;1 cycle
  (parallel                                     ;1+3 cycles
    (assign-vma-offset d)
    (call bb-word-alu-operation-dispatch))
  (decr-d-offset)                               ;1
  (parallel
    (assign bb-s-word (rotate bb-s-word2 byte-r))       ;1
    (lisp (trace-path #/.))
    (jump ubitblt-d-aligned-row-both-backwards)))

(defucode ubitblt-d-aligned-row-both-backwards-done
  (trap-no-save)
  (if (plus-fixnum bb-width)
      (if (greater-or-equal-fixnum bb-s-bitpos bb-width)
          (sequential
            (assign byte-r bb-width)
            (assign bb-s-word (rotate bb-s-word byte-r))
            (assign byte-s (1- bb-width))
            (assign byte-r (- (a-constant 32.) bb-width))
            (parallel
              (assign-vma-offset d)
              (lisp (trace-path #/4))
              (jump bb-byte-alu-operation-dispatch)))    ;jcall
          (sequential
            (decr-wrap-s-offset)
            (parallel-with-s-access
              bb-s-offset
              (assign byte-r bb-width)
```

```
          (assign bb-s-word (rotate bb-s-word byte-r))
          (assign bb-s-word2 (logxor bb-constant memory-data)))
        (parallel
          (assign byte-r (- bb-width bb-s-bitpos))
          (assign a-temp obus))
        (assign byte-s (1- a-temp))
        (assign bb-s-word (ldb bb-s-word2 byte-s byte-r bb-s-word))
        (assign byte-s (1- bb-width))
        (assign byte-r (- (a-constant 32.) bb-width))
        (parallel
          (assign-vma-offset d)
          (lisp (trace-path #/5))
          (jump bb-byte-alu-operation-dispatch)))) ;jcall
    (parallel-with-return
      (lisp (trace-path #/3)))))

;;code for %decode-bitblt-arrays
;;Take alu from-array to-array
;;Return (s-beg-addr s-beg-bitpos s-row-length s-height s-bits-per-elt
;;        d-beg-addr d-beg-bitpos d-row-length d-height d-bits-per-elt
;;        array-reg-event-count)

;;args
(defatomicro bbd-alu (amem (stack-pointer -2)))
(defatomicro bbd-s-array (amem (stack-pointer -1)))
(defatomicro bbd-d-array top-of-stack-a)

;; 4 slots for array-setup-2d to return its results
(defatomicro bbd-control (amem (stack-pointer 1)))
(defatomicro bbd-base-pointer (amem (stack-pointer 2)))
(defatomicro bbd-width (amem (stack-pointer 3)))
(defatomicro bbd-height (amem (stack-pointer 4)))

(defatomicro bbd-s-beg-addr     (amem (stack-pointer 5)))
(defatomicro bbd-s-beg-bitpos   (amem (stack-pointer 6)))
(defatomicro bbd-s-row-length   (amem (stack-pointer 7)))
(defatomicro bbd-s-height       (amem (stack-pointer 8)))
(defatomicro bbd-s-bits-per-elt (amem (stack-pointer 9.)))
(defatomicro bbd-d-beg-addr     (amem (stack-pointer 10.)))
(defatomicro bbd-d-beg-bitpos   (amem (stack-pointer 11.)))
(defatomicro bbd-d-row-length   (amem (stack-pointer 12.)))
(defatomicro bbd-d-height       (amem (stack-pointer 13.)))
(defatomicro bbd-d-bits-per-elt (amem (stack-pointer 14.)))
(defatomicro bbd-event-count    (amem (stack-pointer 15.)))

(defatomicro bb-alu-depends-on-source
        (b-constant #.(loop for alu in '( 5 10.    ;source
                                          ;3 12.    ;dest
                                          ;0 15.    ;neither
                                          1 2 4 6 7 8. 9. 11. 13. 14.      ;both
                                          )
                            sum (ash 1 alu))))

(defmicro compute-beg-bitpos (for-what)
  (let ((beg-bitpos (selectq for-what
                      (s 'bbd-s-beg-bitpos)
                      (d 'bbd-d-beg-bitpos)
                      (otherwise (ferror "What is ~S" for-what))))
        (row-length (selectq for-what
                      (s 'bbd-s-row-length)
                      (d 'bbd-d-row-length)
                      (otherwise (ferror "What is ~S" for-what)))))
    '(sequential
       (assign b-low-dividend top-of-stack)
       (assign a-positive-divisor bbd-width)
       (parallel
         (assign b-high-dividend (a-constant 0))
         (assign a-divide-step-count (b-constant 15.)))
       (parallel
         (assign a-negative-divisor (- a-positive-divisor))
         (call divide-subroutine))
       ;; bits per elt setup correctly in byte-r
       (assign ,beg-bitpos (set-type (rotate b-high-dividend byte-r) dtp-fix))
       (assign b-temp (set-type (ldb ,row-length 27. 5 0) dtp-fix))
       (assign a-temp b-temp)
       (mpy-32-32 a-temp b-low-dividend set-b-temp for-effect nil))))

(defmicro set-b-temp (x)
  '(assign b-temp ,x))

(defucode ubitblt-decode-arrays
  ;;see whether the alu operation depends on the source array
  (assign byte-r (32- bbd-alu))
  (if (ldb-bit-test bb-alu-depends-on-source byte-r)
      (sequential
        (assign top-of-stack (b-constant 0))    ;the "subscript"
        (parallel
          (check-arg-type array bbd-s-array dtp-array)
          (assign vma bbd-s-array)
          (assign b-vma bbd-s-array)
          (call array-setup-2d))
```

```
        (parallel (assign b-temp bbd-control)
                  (assign bbd-event-count bbd-control)
                  (call bbd-bits-per-elt))
        (parallel (assign bbd-s-bits-per-elt b-temp)
                  (assign byte-r b-temp))
        (assign bbd-s-row-length (rotate bbd-width byte-r))
        (compute-beg-bitpos s)
        (assign bbd-s-beg-addr (+ bbd-base-pointer b-temp))
        (assign bbd-s-height bbd-height))
      (assign bbd-event-count array-register-event-count))
    (assign top-of-stack (b-constant 0))
    (parallel
      (check-arg-type array bbd-d-array dtp-array)
      (assign vma bbd-d-array)
      (assign b-vma bbd-d-array)
      (call array-setup-2d))
  (parallel
    (assign bbd-event-count (ldb bbd-event-count 28. 0))
    (assign b-temp obus))                     ;move to b side
  (if (not-equal-pointer b-temp bbd-control)  ;assuming event count is low 28. bits
      (goto ubitblt-decode-arrays)            ;an event happened, go retry
      (drop-through))
  (parallel (assign b-temp bbd-control)
            (call bbd-bits-per-elt))
  (parallel (assign bbd-d-bits-per-elt b-temp)
            (assign byte-r b-temp))
  (assign bbd-d-row-length (rotate bbd-width byte-r))
  (compute-beg-bitpos d)
  (assign bbd-d-beg-addr (+ bbd-base-pointer b-temp))
  (assign bbd-d-height bbd-height)
  ;;well, I guess we'd better not get pclsr'd here.
  (parallel (assign xbas (+ stack-pointer (b-constant 5)))
            (assign b-temp-2 obus))
  (assign stack-pointer (+ stack-pointer (b-constant -3)))
  (parallel
    (assign b-temp (b-constant 11.))
    (jump bbd-finish-loop)))

(defucode bbd-finish-loop
  (parallel
    (assign b-temp (1- b-temp))
    (if (minus-fixnum obus) (return) (drop-through)))
  (pushval (set-type (amem (xbas 0)) dtp-fix))
  (parallel
    (assign b-temp-2 (1+ b-temp-2))
    (assign xbas obus)
    (jump bbd-finish-loop)))

;;take an array-register control word in top-of-stack, return a decoding of its
;;dispatch type in top-of-stack.

(defucode bbd-bits-per-elt
  (dispatch-after-this (array-register-dispatch-field b-temp)
                       (nop)
    ((%array-register-dispatch-1-bit)
      (parallel (assign b-temp (set-type (b-constant 0) dtp-fix)) (return)))
    ((%array-register-dispatch-2-bit)
      (parallel (assign b-temp (set-type (b-constant 1) dtp-fix)) (return)))
    ((%array-register-dispatch-4-bit)
      (parallel (assign b-temp (set-type (b-constant 2) dtp-fix)) (return)))
    ((%array-register-dispatch-8-bit)
      (parallel (assign b-temp (set-type (b-constant 3) dtp-fix)) (return)))
    ((%array-register-dispatch-16-bit)
      (parallel (assign b-temp (set-type (b-constant 4) dtp-fix)) (return)))
    ((%array-register-dispatch-word)
      (parallel (assign b-temp (set-type (b-constant 5) dtp-fix)) (return)))
    (otherwise (signal-error unimplemented-or-illegal-array-type))))
;;; -*- Mode:Lisp; Package:Micro; Base:8; Lowercase:yes -*-
;;; (c) Copyright 1982, Symbolics, Inc.

;;;; BITBLT microcode for 3600


;; Reads can be repeated with no harmful effects, writes cannot be (in most cases).
;; State is not permanently updated until a write is consummated.
;; After every write, state should be updated so that if the next memory operation
;; faults and pclsrs, that write will not be repeated (the bitblt row will be shorter).
;; To avoid the overhead of doing this for every write, we have block mode
;; operations that only update the state after writing a block of words.
;;
;; For the block mode things, we use a buffer that can be saved.  See next+1 page.
;;
;; For the short-row things, when the destination is split across two words,
;; we check write access to both words before modifying either of them.
;; No pclsring problems if the operation depends on neither operand.
;;
;; When there is a partial word at the front, do it and then advance the arguments
;; so the bitblt is word aligned in the destination.  When there is a partial word
;; at the end, when we get there the arguments have been advanced.

(reserve-scratchpad-memory 2460 2470 320 330)
```

```
(defmicro waiting-for-memory ()                            ;documentation only.
  '(nop))

(defmicro abus-array-data (&body body)
  '(parallel
     (transport data)
     (check-data-type memory-data dtp-fix)
     ,@body))

(defmicro assign-vma-offset (which &rest stuff)
  (selectq which
    (S '(assign vma (+ bb-s-row-addr bb-s-offset ,@stuff)))
    (D '(assign vma (+ bb-d-row-addr bb-d-offset ,@stuff)))
    (S-ahead '(assign vma (+ bb-s-row-addr bb-s-offset-ahead ,@stuff)))
    (otherwise
     (ferror "assign-vma-offset knows about only S and D, not ~S" which))))

(defmicro parallel-with-s-access (offset &body body)
  (make-memory-access 'bb-s-row-addr 'bb-s-offset offset body '(read)))

(defmicro parallel-with-d-access (offset &body body)
  (make-memory-access 'bb-d-row-addr 'bb-d-offset offset body '(read)))

(defmicro parallel-with-d-access-check-write (offset &body body)
  (make-memory-access 'bb-d-row-addr 'bb-d-offset offset body '(read write)))

(eval-when (eval compile load)
(defun make-memory-access (baseaddr offset-sym offset body memory-modes)
  (or (eq offset offset-sym)
      (equal offset '(1+ ,offset-sym))
      (and (eq offset-sym 'bb-s-offset) (eq offset 'bb-s-offset-ahead))
      (ferror "~S is not a recognized offset for ~S" offset offset-sym))
  (let* ((body (reverse body))
         (finally '(abus-array-data ,(car body))))
    (do ((ll (reverse
               '((assign vma ,(if (atom offset)
                                  '(+ ,baseaddr ,offset)
                                  '(+ ,baseaddr ,(second offset) 1)))
                 (start-memory ,@memory-modes)
                 (waiting-for-memory)))
             (cdr ll))
         (body (cdr body) (cdr body))
         (l))
        ((and (null ll) (null body))
         '(sequential ,@l ,finally))
      (cond ((null ll) (push (car body) l))
            ((null body) (push (car ll) l))
            (T (push '(parallel ,(car ll) ,(car body)) l))))))
);eval-when


;Note that these are *not* analogous to 1-
(defmicro 32- (operand)
  '(- (b-constant 32.) ,operand))
(defmicro 31- (operand)
  '(- (b-constant 31.) ,operand))

(defmicro incr-d-offset ()
  '(assign bb-d-offset (1+ bb-d-offset)))

(defmicro decr-d-offset ()
  '(assign bb-d-offset (1- bb-d-offset)))

(defmicro incr-wrap-s-offset ()
  '(sequential
     (parallel
       (assign bb-s-offset (1+ bb-s-offset))
       (assign b-temp-3 obus))
     (if (greater-or-equal-fixnum b-temp-3 bb-s-row-length)
         (parallel
           (lisp (format T "~&>>>Wrapping around on bb-s-offset from ~d."
                         (low32 (tr 'bb-s-offset))))
           (assign bb-s-offset (b-constant 0)))
         (drop-through))))

(defmicro decr-wrap-s-offset ()
  '(parallel
     (assign bb-s-offset (1- bb-s-offset))
     (if (minus-fixnum obus)
         (parallel
           (lisp (format t "~&>>>Decr wrapping around on bb-s-offset"))
           (assign bb-s-offset (1- bb-s-row-length)))
         (drop-through))))

(defmicro incr-wrap-s-offset-ahead ()
  '(sequential
     (parallel
       (assign bb-s-offset-ahead (1+ bb-s-offset))
       (assign b-temp-3 obus))
```

```
    (if (greater-or-equal-fixnum b-temp-3 bb-s-row-length)
        (parallel
          (lisp (format T "~&>>>Wrapping around on bb-s-offset from ~d."
                        (low32 (tr 'bb-s-offset-ahead))))
          (assign bb-s-offset-ahead (b-constant 0)))
        (drop-through))))

(defmicro decr-wrap-s-offset-ahead ()
  '(parallel
     (assign bb-s-offset-ahead (1- bb-s-offset))
     (if (minus-fixnum obus)
         (parallel
           (lisp (format t "~&>>>Decr wrapping around on bb-s-offset"))
           (assign bb-s-offset-ahead (1- bb-s-row-length)))
         (drop-through))))

(defmicro store-word (datum &rest options)
  '(store-contents (set-type ,datum dtp-fix) not-pointer . ,options))

;;---the goddamn simulator compiles
;;    (parallel (assign ...) (return))
;;into
;;    (prog ... (return nil) (setq ...))
(defmicro parallel-with-return (&body stm)
  '(,(if (eq *machine-version* 'sim) 'sequential 'parallel)
    ,@stm
    (return)))

(defvar *fp-offset-names* ())

(defmacro def-fp-offsets (&rest names)
  (loop for i upfrom 0
        for name in names
        append '((defatomicro ,name (amem (frame-pointer ,i)))
                 (defprop ,name ,i fp-offset)
                 (or (memq ',name *fp-offset-names*)
                     (push ',name *fp-offset-names*)))
          into foo
        finally (return '(progn 'compile ,@foo))))

;;decode fp offset numbers into symbols.  Debugging only.
(defun dfp (&rest numbers)
  (loop for number in numbers
        collect (loop for name in *fp-offset-names*
                      when (equal (get name 'fp-offset) number)
                      return name
                      finally (return number))))

;; Define arguments/state for BITBLT instructions.  Note that these must be
;; relative to FP, not to the top of the stack, since there might be a
;; saved bitblt-buffer on the stack if the instruction was interrupted.
(def-fp-offsets
  bb-arg-alu bb-arg-width bb-arg-height             ;lisp arg
  bb-arg-from-array bb-arg-from-x bb-arg-from-y     ;lisp arg
  bb-arg-to-array bb-arg-to-x bb-arg-to-y           ;lisp arg
  bb-width                                          ;ucode arg
  bb-s-data-addr                                    ;ucode arg
  bb-s-row-offset                                   ;ucode arg
  bb-s-offset                                       ;ucode arg
  bb-s-bitpos                                       ;ucode arg
  bb-s-row-length                                   ;ucode arg
  bb-d-data-addr                                    ;ucode arg
  bb-d-offset                                       ;ucode arg
  bb-d-bitpos                                       ;ucode arg
  bb-event-count                                    ;ucode arg
  bb-alu-operation                                  ;ucode arg
  )

;;; Some temporaries.

(define-b-temps bb-constant                         ;Value to store or to XOR in
                bb-s-word                           ;temp (source word)
                bb-s-row-addr                       ;start of current source row
                bb-d-row-addr                       ;start of current destination row
                bb-width-b                          ;copy of width on B side (sometimes)
                b-block-size)                       ;number of words in block

(defareg bb-constant-a)                             ;A-side copy of bb-constant
(defareg bb-identity)                               ;Background to dpb into when doing part word
(defareg bb-s-word2)                                ;temp (other source word)
(defareg bb-a-temp)
(defareg bb-s-offset-ahead)                         ;s-offset not finalized yet (if pclsr)
(defareg a-block-size)                              ;number of words in block
;;; Bitblt-buffer hair

(eval-when (compile load eval)
(defconst n-bitblt-buffers 8))

#.'(progn 'compile                                  ;B-memory buffer for block-mode operations
    . ,(loop for i from 0 below n-bitblt-buffers
             collect '(defbreg ,(fintern "BITBLT-BUFFER-~D" i))))
```

```
(defmicro bitblt-buffer (i)
  (fintern "BITBLT-BUFFER-~D" i))

;We first compute the result n words at a time into the bitblt-buffer,
;and then store it into the destination (in one case the whole buffer
;is rotated by 1 to 31 bits as it is being stored).
;The bitblt-buffer is "active" while we are storing it into the destination.
;The bitblt buffer must be active while we are modifying the destination,
;since the words copied into the buffer might overlapped with parts of
;the destination we have already modified.
;
;A pclsr while the bitblt-buffer is active will copy it into
;the stack, set first-part-done, and clear bitblt-buffer-active.
;A restart with first-part-done set will proceed normally until it comes time
;to store the bitblt-buffer.  At that time, first-part-done is seen, the
;bitblt-buffer is restored from the stack (replacing the possibly-erroneous
;contents that were just computed), and execution then proceeds normally.
;
;The contents of the bitblt-buffer are assumed to have valid data type tags.
;For now, they could be forced to fixnum, but in the future we may have
;other instructions using this buffer and its save/restore mechanism.
;--- Still need to fix microcompiler to default cdr source from Bbus correctly ---

;Call here if we pclsr with the bitblt-buffer active
(defucode save-bitblt-buffer
  #.'(sequential .
       ,(loop for i from 0 below n-bitblt-buffers
              collect '(pushval-with-cdr (bitblt-buffer ,i))))
  (assign first-part-done (b-constant 1))
  (parallel
    (assign bitblt-buffer-active (b-constant 0))
    (return)))

;Call here when about to start storing the bitblt-buffer
;This is actually a micro so that the first instruction of the routine
;gets open-coded into the caller
;This is hairily bummed to make the normal case go in only one cycle
;(if the trap is not taken then the obus has -1 on it)
(defmicro activate-bitblt-buffer ()
  '(parallel
     (assign bitblt-buffer-active obus)
     (trap-if (bit-test frame-misc-data (b-constant (byte-mask first-part-done)))
              activate-saved-bitblt-buffer)))

;We also need this closed-subroutine version
(defucode activate-bitblt-buffer
  (parallel
    (activate-bitblt-buffer)
    (return)))

(defucode activate-saved-bitblt-buffer
  (parallel
    (trap-save)
    #.'(sequential                                  ;Retry the assign,trap-if upon return
         ,@(loop for i from (1- n-bitblt-buffers) downto 0
                 collect '(parallel
                            (assign (bitblt-buffer ,i) top-of-stack-a)
                            (decrement-stack-pointer)))))
  (parallel
    (assign first-part-done (b-constant 0))
    (return)))

;Call here when done storing the bitblt-buffer
(defucode deactivate-bitblt-buffer
  (parallel
    (assign bitblt-buffer-active (b-constant 0))
    (assign top-of-stack top-of-stack-a)          ;Could have been bashed by activate...
    (return)))
(defmicro read-bb-s-word ()
  '(parallel
     (assign a-temp (+ bb-width-b bb-s-bitpos))
     (call read-bb-s-word1)))

;a-temp has the number of s bits needed relative to bit 0 of the first word
(defucode read-bb-s-word1
  (assign-vma-offset s)
  (parallel
    (assign byte-r (32- bb-s-bitpos))
    (start-memory read))
  (parallel
    (waiting-for-memory)
    (if (lesser-or-equal-fixnum a-temp (b-constant 32.))
        ;;source is entirely within one word
        (parallel-with-return
          (abus-array-data
            (assign bb-s-word (logxor bb-constant (rotate memory-data byte-r)))))
        ;;source is split across two words
        (sequential
          (abus-array-data
            (assign bb-s-word (rotate memory-data byte-r)))
```

```
      (incr-wrap-s-offset-ahead)
      (assign-vma-offset s-ahead)
      (parallel
        (start-memory read)                    ;byte-r is already ok
        )
      (parallel
        (waiting-for-memory)
        (assign byte-s (1- a-temp)))
      (abus-array-data
        (assign bb-s-word (dpb memory-data byte-s byte-r bb-s-word)))
      (parallel-with-return
        (assign bb-s-word (logxor bb-s-word bb-constant-a)))))))
;;Assumptions about setup:
;;bb-constant has:
;;  >> for constant operations (0,-1): the constant;
;;  >> for operations dependent only on source or destination (x, ~x, y, ~y):
;;     a 0 for x,y or -1 for ~x,~y;
;;  >> for operations dependent on both s and d: 0  for those using source directly,
;;     and -1 for those that want the source complemented.

(defucode bb-copy-stuff-to-b-side
  (assign bb-s-row-addr (+ bb-s-data-addr b-temp))
  (parallel-with-return
    (assign bb-d-row-addr bb-d-data-addr)))

(defmacro definst-bitblt (name source destination neither both)
  `(definst ,name no-operand
     (parallel (assign b-temp bb-s-row-offset)
               (call bb-copy-stuff-to-b-side))
     (dispatch-after-this (parallel (ldb bb-alu-operation 4 0)
                               ;; Set up constant needed for the most common case
                               (assign bb-constant (via-xbus (b-constant 0)))
                               (assign bb-constant-a (via-xbus (b-constant 0))))
                             (assign bb-width-b bb-width))
       ((0)                           ;0
        (goto ,neither))
       ((1)                           ;x*y
        (parallel (assign bb-identity (a-constant -1))
                  (jump ,both)))
       ((2)                           ;~x*y
        (assign bb-identity (a-constant -1))
        (parallel (assign bb-constant (a-constant -1)) (assign bb-constant-a (a-constant -1))
                  (jump ,both)))
       ((3) (return))                 ;y
       ((4)                           ;x*~y
        (parallel (assign bb-identity (a-constant -1))
                  (jump ,both)))
       ((5) (goto ,source))           ;x
       ((6)                           ;x xor y
        (parallel (assign bb-identity (a-constant 0))
                  (jump ,both)))
       ((7)                           ;x+y
        (parallel (assign bb-identity (a-constant 0))
                  (jump ,both)))
       ((8.)                          ;~x*~y
        (assign bb-identity (a-constant -1))
        (parallel (assign bb-constant (a-constant -1)) (assign bb-constant-a (a-constant -1))
                  (jump ,both)))
       ((9.)                          ;~x xor y
        (assign bb-identity (a-constant 0))
        (parallel (assign bb-constant (a-constant -1)) (assign bb-constant-a (a-constant -1))
                  (jump ,both)))
       ((10.)                ;~x
        (parallel (assign bb-constant (a-constant -1)) (assign bb-constant-a (a-constant -1))
                  (jump ,source)))
       ((11.)                ;~x+y
        (assign bb-identity (a-constant 0))
        (parallel (assign bb-constant (a-constant -1)) (assign bb-constant-a (a-constant -1))
                  (jump ,both)))
       ((12.)                ;~y
        (parallel (assign bb-constant (a-constant -1)) (assign bb-constant-a (a-constant -1))
                  (jump ,destination)))
       ((13.)                ;x+~y actually, ~(~x*y)
        (assign bb-identity (a-constant -1))
        (parallel (assign bb-constant (a-constant -1)) (assign bb-constant-a (a-constant -1))
                  (jump ,both)))
       ((14.)                ;~x+~y actually, ~(x*y)
        (parallel (assign bb-identity (a-constant -1))
                  (jump ,both)))
       ((15.)                ;-1
        (parallel (assign bb-constant (a-constant -1)) (assign bb-constant-a (a-constant -1))
                  (jump ,neither))))))

(definst-bitblt %bitblt-short-row
  ubitblt-short-row-source
  ubitblt-short-row-destination
  ubitblt-short-row-neither
  ubitblt-short-row-both)
```

```
(definst-bitblt %bitblt-long-row
  ubitblt-long-row-source
  ubitblt-long-row-destination
  ubitblt-long-row-neither
  ubitblt-long-row-both)

(definst-bitblt %bitblt-long-row-backwards
  ubitblt-long-row-source-backwards
  ubitblt-long-row-destination
  ubitblt-long-row-neither                              ;direction immaterial
  ubitblt-long-row-both-backwards)
(defucode ubitblt-short-row-source
  (read-bb-s-word)
  (assign a-temp (+ bb-width-b bb-d-bitpos))
  (parallel
    (assign byte-s (- a-temp (b-constant 32.) 1))
    (if (lesser-or-equal-fixnum-unsigned a-temp (b-constant 32.))
        ;; destination is entirely within one word
        (parallel-with-d-access bb-d-offset
          (assign byte-s (1- bb-width))
          (assign byte-r bb-d-bitpos)
          (parallel-with-return
            (store-word (dpb bb-s-word byte-s byte-r memory-data))))
        ;; destination is split across two words
        ;; must access-check them both before modifying either
        (sequential
          ;; compute the high byte
          (parallel-with-d-access-check-write (1+ bb-d-offset)
            (assign byte-r bb-d-bitpos)
            (assign a-temp (ldb bb-s-word byte-s byte-r memory-data)))
          ;; compute and store the low byte
          (parallel-with-d-access bb-d-offset
            (assign byte-s (31- bb-d-bitpos))
            (store-word (dpb bb-s-word byte-s byte-r memory-data) block))
          ;; now store the high byte.  This cannot fault
          (parallel-with-return
            (store-word a-temp block))))))

(defucode ubitblt-short-row-destination
  (assign a-temp (+ bb-width-b bb-d-bitpos))
  (parallel
    (assign byte-s (- a-temp (b-constant 32.) 1))
    (if (lesser-or-equal-fixnum-unsigned a-temp (b-constant 32.))
        ;; destination is entirely within one word
        (parallel-with-d-access bb-d-offset
          (assign byte-s (1- bb-width))
          (assign byte-r bb-d-bitpos)
          (parallel-with-return
            (store-word (logxor (dpb bb-constant byte-s byte-r 0) memory-data))))
        ;; destination is split across two words
        ;; must access-check them both before modifying either
        (sequential
          ;; compute the high byte
          (parallel-with-d-access-check-write (1+ bb-d-offset)
            (assign byte-r (a-constant 0))
            (assign a-temp (logxor (ldb bb-constant byte-s byte-r) memory-data)))
          ;; compute and store the low byte
          (parallel-with-d-access bb-d-offset
            (assign byte-s (31- bb-d-bitpos))
            (assign byte-r bb-d-bitpos)
            (store-word (logxor (dpb bb-constant byte-s byte-r 0) memory-data) block))
          ;; now store the high byte.  This cannot fault
          (parallel-with-return
            (store-word a-temp block))))))
;; The alu operation is actually a constant
(defucode ubitblt-short-row-neither
  (assign a-temp (+ bb-width-b bb-d-bitpos))
  (if (lesser-or-equal-fixnum a-temp (b-constant 32.))
      ;; destination is entirely within one word
      (parallel-with-d-access bb-d-offset
        (assign byte-s (1- bb-width))
        (assign byte-r bb-d-bitpos)
        (parallel-with-return
          (store-word (dpb bb-constant byte-s byte-r memory-data))))
      ;; destination is split across two words, but no pclsr problems since doing
      ;; the operation twice produces the same effect
      (sequential
        ;; store the low byte
        (parallel-with-d-access bb-d-offset
          (assign byte-s (31- bb-d-bitpos))
          (assign byte-r bb-d-bitpos)
          (store-word (dpb bb-constant byte-s byte-r memory-data)))
        ;; store the high byte
        (parallel-with-d-access (1+ bb-d-offset)
          (assign byte-s (1- a-temp))
          (assign byte-r (a-constant 0))
          (parallel-with-return
            (store-word (dpb bb-constant byte-s byte-r memory-data)))))))
```

```
;; The alu operation depends upon both source and destination bits
(defucode ubitblt-short-row-both
  (read-bb-s-word)
  (assign a-temp (+ bb-width-b bb-d-bitpos))
  (if (lesser-or-equal-fixnum a-temp (b-constant 32.))
      ;; destination is entirely within one word
      (sequential
        (assign byte-s (1- bb-width))
        (assign byte-r bb-d-bitpos)
        (parallel
          (assign-vma-offset d)
          (jump bb-byte-alu-operation-dispatch)))        ;jcall
      ;; destination is split across two words
      (sequential
        ;; make sure we have write access to the high byte so no pclsr after storing low
        (assign-vma-offset d 1)
        (start-memory read write)
        ;; store the low byte
        (assign byte-s (31- bb-d-bitpos))
        (assign byte-r bb-d-bitpos)
        (parallel
          (assign-vma-offset d)
          (call bb-byte-alu-operation-dispatch))
        ;; store the high byte
        (assign bb-s-word (rotate bb-s-word byte-r))
        (assign byte-s (1- a-temp))
        (assign byte-r (b-constant 0))
        (parallel
          (assign-vma-offset d 1)
          (jump bb-byte-alu-operation-dispatch)))))     ;jcall
;(boole fn x y ...)   if fn is "abcd" then
;        y    0      1      2      3     4      5     6      7
;       | 0  1  0    x*y    ~x*y   y     x*~y   x     x#y    x+y
;    ----------
;    0 | a  c   8    9      10     11    12     13    14     15
;  x   |           ~(x+y)  ~(x#y)  ~x    ~x+y   ~y    x+~y   ~x+~y  -1
;    1 | b  d

;;vma and byte regs have been set up already, for DPB.
;;trashes a-temp-2, b-temp-2, b-temp-3, but not a-temp and b-temp.
(defucode bb-byte-alu-operation-dispatch
  (dispatch-after-this (parallel (start-memory read) (ldb bb-alu-operation 4 0))
                       (parallel
                         (assign b-temp-3 (dpb bb-s-word byte-s byte-r bb-identity))
                         (waiting-for-memory))
     ((1 2) ;;1 x*y logand ;;2 ~x*y     logand
      (parallel-with-return
        (parallel
          (declare-memory-timing data-cycle)
          (abus-array-data
            (store-word (logand memory-data b-temp-3))))))
     ((4 8.) ;;4 ~(~x+y) = x*~y andc2     ;;8 ~(x+y)    = ~x*~y andcb
      (parallel
        (declare-memory-timing data-cycle)
        (abus-array-data
          (assign a-temp-2 memory-data)))
      (assign b-temp-2 (dpb (b-constant -1) byte-s byte-r 0))     ;can't merge this...
      (assign a-temp-2 (logxor a-temp-2 b-temp-2))                ;...with this.
      (parallel-with-return
        (store-word (logand a-temp-2 b-temp-3))))
     ((6 9.) ;;6 x#y logxor  ;;9 ~(x#y)=~x#y logxor
      (parallel-with-return
        (parallel
          (declare-memory-timing data-cycle)
          (abus-array-data
            (store-word (logxor b-temp-3 memory-data))))))
     ((7 11.) ;;7 x+y logior        ;;11 ~x+y logior
      (parallel-with-return
        (parallel
          (declare-memory-timing data-cycle)
          (abus-array-data
            (store-word (logior b-temp-3 memory-data))))))
     ((13. 14.) ;;13 x+~y = ~(~x*y) lognand        ;;14 ~x+~y=~(x*y)
      (parallel
        (declare-memory-timing data-cycle)
        (abus-array-data
          (assign a-temp-2 (logand b-temp-3 memory-data))))
      (parallel-with-return
        (store-word (logxor (dpb (b-constant -1) byte-s byte-r 0) a-temp-2))))))
;;vma has been set up already
(defucode bb-word-alu-operation-dispatch        ;commonly 3 cycles (plus 1 for the call)
  (dispatch-after-this (parallel (start-memory read) (ldb bb-alu-operation 4 0))
                       (waiting-for-memory)     ;---want to use this somehow...
    ((1 2)     ;;1 x*y logand          ;;2 ~x*y  logand
     (parallel
       (declare-memory-timing data-cycle)
       (abus-array-data (store-word (logand bb-s-word memory-data)))
       (return)))
    ((4 8.)    ;;4 x*~y andcb            ;;8 ~(x+y) ~x*~y andcb
```

```
  (parallel
    (declare-memory-timing data-cycle)
    (abus-array-data (store-word (andc2 bb-s-word memory-data)))
    (return)))
 ((6 9.)     ;;6 x#y logxor          ;;9 ~(x#y)=~x#y logxor
  (parallel
    (declare-memory-timing data-cycle)
    (abus-array-data (store-word (logxor bb-s-word memory-data)))
    (return)))
 ((7 11.)    ;;7 x+y logior          ;;11 ~x+y logior
  (parallel
    (declare-memory-timing data-cycle)
    (abus-array-data (store-word (logior bb-s-word memory-data)))
    (return)))
 ((13. 14.)  ;;13 x+~y = ~(~x*y)     ;;14 ~x+~y=~(x*y)
  (parallel
    (declare-memory-timing data-cycle)
    (abus-array-data (store-word (lognand bb-s-word memory-data)))
    (return)))))
;;alu depends only on source bits
(defucode ubitblt-long-row-source
  (parallel
    (assign b-temp bb-d-bitpos)
    (if (zero-fixnum bb-d-bitpos)
        (if (zero-fixnum bb-s-bitpos)
            (goto ubitblt-aligned-row-source)
            ;;             SSSSSSSSSSSSSSSSSSSSSSSSSsssssss
            ;;      dddddddddddddddddddddddddddddddd
            (parallel-with-s-access bb-s-offset
              (assign byte-r (32- bb-s-bitpos))
              (parallel
                (assign bb-s-word2 (logxor bb-constant (rotate memory-data byte-r)))
                (lisp (trace-path #/c))
                (jump ubitblt-d-aligned-row-source))))
        (if (equal-fixnum b-temp bb-s-bitpos)
            ;;SSSSSSSSSSSSSSSSSSSSSSSSSsssssss
            ;;DDDDDDDDDDDDDDDDDDDDDDDDDddddddd
            (sequential
              (parallel-with-s-access bb-s-offset
                (assign b-temp (32- bb-d-bitpos))
                (assign byte-r b-temp)
                (assign bb-s-word (logxor bb-constant (rotate memory-data byte-r))))
              (parallel-with-d-access bb-d-offset
                (assign byte-r bb-d-bitpos)
                (assign byte-s (1- b-temp))
                (store-word (dpb bb-s-word byte-s byte-r memory-data)))
              ;; First partial word done, we are now the aligned case
              (incr-wrap-s-offset)
              (incr-d-offset)
              (assign bb-width (- bb-width b-temp))
              (assign bb-s-bitpos (b-constant 0))
              (parallel
                (assign bb-d-bitpos (b-constant 0))
                (lisp (trace-path #/b))
                (jump ubitblt-aligned-row-source)))
            (if (lesser-fixnum bb-s-bitpos b-temp)
                ;;ssssssssSSSSSSSSSSSSSSSS.......
                ;;         DDDDDDDDDDDDDDDDDDdddddddddddddddd
                ;;         ← 32-d.bitpos →
                (sequential
                  (parallel-with-s-access bb-s-offset
                    (assign byte-r (32- bb-s-bitpos))
                    (assign b-temp (32- bb-d-bitpos))
                    (assign bb-s-word (logxor bb-constant (rotate memory-data byte-r))))
                  ;;.......ssssssssSSSSSSSSSSSSSSSS
                  (parallel-with-d-access bb-d-offset
                    (assign byte-r bb-d-bitpos)
                    (assign byte-s (1- b-temp))
                    (store-word (dpb bb-s-word byte-s byte-r memory-data)))
                  ;; First partial D word done, some S bits from first word remain
                  (incr-d-offset)
                  ;;rotate s-word further to right by 32-d.bitpos = left by -(32-d.bitpos)
                  ;;SSSSSSSSSSSSSSSS.......ssssssss
                  (assign bb-s-word2 (rotate bb-s-word byte-r))
                  (assign bb-s-bitpos (+ bb-s-bitpos b-temp))
                  (assign bb-width (- bb-width b-temp))
                  (parallel
                    (assign bb-d-bitpos (b-constant 0)))
                    (lisp (trace-path #/d))
                    (jump ubitblt-d-aligned-row-source))
                (sequential
;;The high part of the first source word is not as long as the high part of the
;;first destination word.  So extract the useful part of the first source word,
;;and deposit into it as much of the second source word as needed to fill out the rest
;;of the first destination word. Then position the rest of the second source word
;;appropriately for the inner loop.
                  ;;                                    ←- 32-s -→
                  ;;      ................................|SSSSSSSSSSSssssssssssssssssssssss
                  ;;                        DDDDDDDDDDDDDDDD DDDDDDDDDDdddddd
                  (parallel-with-s-access bb-s-offset
```

```
  (assign byte-r (32- bb-s-bitpos))
  (assign b-temp-2 bb-s-bitpos)
  (assign bb-s-word (logxor bb-constant (rotate memory-data byte-r))))
-(incr-wrap-s-offset-ahead)
 ::                      <------ s-d -----> <-- 32-s -->    (32-d)-(32-s)=s-d
 ::       ssssssssssssssssSSSSSSSSSSSSSSSSS|1111111111......................
 ::                       DDDDDDDDDDDDDDDD DDDDDDDDDDdddddd
 (parallel-with-s-access bb-s-offset-ahead
   (assign byte-r (32- bb-s-bitpos))
   (assign byte-s (- b-temp-2 bb-d-bitpos 1))
   (assign bb-s-word2 (logxor bb-constant memory-data)))
 (assign bb-s-word (dpb bb-s-word2 byte-s byte-r bb-s-word))
 (parallel
   (assign a-temp (32- bb-d-bitpos))
   (assign b-temp cbus))
 (parallel-with-d-access bb-d-offset
   (assign byte-r bb-d-bitpos)
   (assign byte-s (1- a-temp))
   (store-word (dpb bb-s-word byte-s byte-r memory-data)))
 ;; We have now done the first partial D word.  Turn into the d-aligned
 ;; case, with the source advanced by one word from where it started.
 (incr-d-offset)
 (assign bb-s-offset bb-s-offset-ahead)
 (assign bb-s-bitpos (- b-temp-2 bb-d-bitpos))
 (assign byte-r (32- bb-s-bitpos))
 (assign bb-s-word2 (rotate bb-s-word2 byte-r))
 (assign bb-width (- bb-width b-temp))
 (parallel
   (assign bb-d-bitpos (b-constant 0))
   (lisp (trace-path #/e))
   (jump ubitblt-d-aligned-row-source))))))))

(defucode ubitblt-aligned-row-source              ;28 cycles per 8 words
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-fixnum bb-s-row-length b-temp)
            (goto ubitblt-aligned-row-source-slow-loop)
            (sequential
              (parallel
                (assign-vma-offset s)
                (call ubitblt-block-read-8))
              (parallel
                (assign-vma-offset d)
                (call ubitblt-block-write-8))
              (parallel
                (assign bb-s-offset (+ bb-s-offset b-block-size))
                (jump ubitblt-aligned-row-source)))))
      ;;Frob with what's left.  Too bad dispatch blocks are expensive.
      (if (greater-or-equal-fixnum bb-width (b-constant (* 4 32.)))
          (sequential
            (assign b-temp (+ bb-s-offset (b-constant 4)))
            (if (lesser-fixnum bb-s-row-length b-temp)
                (goto ubitblt-aligned-row-source-slow-loop)
                (sequential
                  (parallel
                    (assign-vma-offset s)
                    (call ubitblt-block-read-4))
                  (parallel
                    (assign-vma-offset d)
                    (call ubitblt-block-write-4))
                  (parallel
                    (assign bb-s-offset (+ bb-s-offset b-block-size))
                    (jump ubitblt-aligned-row-source-slow-loop)))))
          (goto ubitblt-aligned-row-source-slow-loop))))

(defucode ubitblt-aligned-row-source-slow-loop          ;10 cycles per word
  (parallel-with-s-access bb-s-offset                    ;4
    (trap-if (lesser-fixnum bb-width (b-constant 32.))
             ubitblt-aligned-row-source-slow-loop-done)
    (waiting-for-memory)
    (assign bb-s-word (logxor bb-constant memory-data)))
  (assign-vma-offset d)                                  ;1
  (store-word bb-s-word)                                 ;1
  (assign bb-width (- bb-width (b-constant 32.)))        ;1
  (incr-wrap-s-offset)                                   ;2
  (parallel                                              ;1
    (incr-d-offset)
    (lisp (trace-path #/,))
    (jump ubitblt-aligned-row-source-slow-loop)))

;Do last partial word, if any
(defucode ubitblt-aligned-row-source-slow-loop-done
  (if (plus-fixnum bb-width)
      (sequential
        (parallel-with-s-access bb-s-offset
          (assign bb-s-word (logxor bb-constant memory-data)))
        (parallel-with-d-access bb-d-offset
          (assign byte-r (a-constant 0))
          (assign byte-s (1- bb-width))
          (parallel-with-return
```

```
      (store-word (dpb bb-s-word byte-s byte-r memory-data))
      (lisp (trace-path #/2)))))
(parallel-with-return
  (lisp (trace-path #/1)))))

;bb-s-word2 has the partial previous source word whose address is in bb-s-offset,
;rotated into alignment with the destination
(defucode ubitblt-d-aligned-row-source
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-or-equal-fixnum bb-s-row-length b-temp)
            (goto ubitblt-d-aligned-row-source-slow-loop)
            (sequential
              (parallel
                (assign-vma-offset s 1)
                (call ubitblt-block-read-8))
              (parallel
                (assign-vma-offset d)
                (call ubitblt-d-aligned-block-write-8))
              (parallel
                (assign bb-s-offset (+ bb-s-offset b-block-size))
                (jump ubitblt-d-aligned-row-source)))))
      (if (greater-or-equal-fixnum bb-width (b-constant (* 4. 32.)))
          (sequential
            (assign b-temp (+ bb-s-offset (b-constant 4)))
            (if (lesser-or-equal-fixnum bb-s-row-length b-temp)
                (goto ubitblt-d-aligned-row-source-slow-loop)
                (sequential
                  (parallel
                    (assign-vma-offset s 1)
                    (call ubitblt-block-read-4))
                  (parallel
                    (assign-vma-offset d)
                    (call ubitblt-d-aligned-block-write-4))
                  (parallel
                    (assign bb-s-offset (+ bb-s-offset b-block-size))
                    (jump ubitblt-d-aligned-row-source)))))
          (goto ubitblt-d-aligned-row-source-slow-loop))))

;;Each pass through this loop stores exactly one d word.  Each time through,
;;bb-s-word2 will have the bits to use for the lower part of the d word (already
;;rotated into position), and another s word will be fetched into bb-s-word.
;;Then s-word will get rotated when transferred into s-word2 in preparation for
;;next loop pass.

(defucode ubitblt-d-aligned-row-source-slow-loop        ;13 cycles per word
  (incr-wrap-s-offset-ahead)                              ;2
  (parallel-with-s-access bb-s-offset-ahead               ;4
    (trap-if (lesser-fixnum bb-width (b-constant 32.))
             ubitblt-d-aligned-row-source-done)
    (assign byte-s (1- bb-s-bitpos))
    (assign bb-s-word (logxor bb-constant memory-data)))
  (assign byte-r (- (b-constant 32.) bb-s-bitpos))       ;1
  (assign-vma-offset d)                                   ;1
  (store-word (dpb bb-s-word byte-s byte-r bb-s-word2))  ;1
  (assign bb-width (- bb-width (b-constant 32.)))         ;1
  (incr-d-offset)                                         ;1
  (assign bb-s-offset bb-s-offset-ahead)                  ;1
  (parallel                                               ;1
    (assign bb-s-word2 (rotate bb-s-word byte-r))
    (lisp (trace-path #/.))
    (jump ubitblt-d-aligned-row-source)))

(defucode ubitblt-d-aligned-row-source-done
  (if (plus-fixnum bb-width)
      (sequential
        (assign b-temp (32- bb-s-bitpos))        ;how many bits are valid in bb-s-word2
        (if (lesser-or-equal-fixnum bb-width b-temp)
            ;;we have enough s bits
            (parallel-with-d-access bb-d-offset
              (assign byte-s (1- bb-width))
              (parallel
                (assign byte-r (b-constant 0))
                (assign bb-s-word bb-s-word2))
              (parallel
                (lisp (trace-path #/4))
                (parallel-with-return
                  (store-word (dpb bb-s-word byte-s byte-r memory-data)))))
            ;;need to get another source word
            (sequential
              (parallel-with-s-access bb-s-offset-ahead
                (assign byte-r (32- bb-s-bitpos))
                (assign byte-s (1- bb-s-bitpos))
                (assign bb-s-word (logxor bb-constant memory-data)))
              (assign bb-s-word (dpb bb-s-word byte-s byte-r bb-s-word2))
              (lisp (trace-path #/5))
              (parallel-with-d-access bb-d-offset
                (assign byte-s (1- bb-width))
                (assign byte-r (a-constant 0))
                (parallel-with-return
                  (store-word (dpb bb-s-word byte-s byte-r memory-data))))))))
```

```
    (parallel
      (lisp (trace-path #/3))
      (return))))
;;alu depends only on destination bits
(defucode ubitblt-long-row-destination
  (if (plus-fixnum bb-d-bitpos)
      (sequential                                       ;frob the first partial word
        (assign b-temp (32- bb-d-bitpos))
        (parallel-with-d-access bb-d-offset
          (assign byte-s (1- b-temp))
          (assign byte-r bb-d-bitpos)
          (store-word (logxor (dpb bb-constant byte-s byte-r 8) memory-data)))
        (incr-d-offset)
        (assign bb-width (- bb-width b-temp))
        (parallel
          (assign bb-d-bitpos (b-constant 8))
          (lisp (trace-path #/b))
          (jump ubitblt-long-row-destination-loop)))
      (machine-version-case
        ((sim) (parallel
                 (lisp (trace-path #/a))
                 (jump ubitblt-long-row-destination-loop)))
        (otherwise (goto ubitblt-long-row-destination-loop)))))

(defucode ubitblt-long-row-destination-loop             ;25 cycles per 8 words
  (if (greater-or-equal-fixnum bb-width (b-constant (* 8. 32.)))
      ;;Fetch a block of words into the buffer
      (sequential
        (parallel
          (assign-vma-offset d)
          (call ubitblt-block-read-8))
        (parallel
          (assign-vma-offset d)
          (call-and-return-to ubitblt-block-write-8
                              ubitblt-long-row-destination-loop)))
      ;;Frob with what's left.  Too bad dispatch blocks are expensive.
      (if (greater-or-equal-fixnum bb-width (b-constant (* 4 32.)))
          (sequential
            (parallel
              (assign-vma-offset d)
              (call ubitblt-block-read-4))
            (parallel
              (assign-vma-offset d)
              (call-and-return-to ubitblt-block-write-4
                                  ubitblt-long-row-destination-slow-loop)))
          (goto ubitblt-long-row-destination-slow-loop))))

(defucode ubitblt-long-row-destination-slow-loop        ;5 cycles per word (bus interference)
  (parallel-with-d-access-check-write bb-d-offset
    (parallel
      (assign bb-width (- bb-width (b-constant 32.)))
      (trap-if (minus-fixnum obus) ubitblt-long-row-destination-done))  ;aborts the assign
    (parallel
      (lisp (trace-path #/,))
      (waiting-for-memory)
      (incr-d-offset))
    (parallel
      (store-word (logxor bb-constant memory-data))
      (jump ubitblt-long-row-destination-slow-loop))))

(defucode ubitblt-long-row-destination-done
  (if (plus-fixnum bb-width)
      (parallel-with-d-access bb-d-offset
        (assign byte-s (1- bb-width))
        (assign byte-r (a-constant 8))
        (parallel-with-return
          (lisp (trace-path #/2))
          (store-word (logxor (dpb bb-constant byte-s byte-r 8) memory-data))))
      (parallel
        (lisp (trace-path #/1))
        (return))))

(defmacro def-bitblt-block-read (name n)
  `(defucode ,name
     (parallel
       (assign a-block-size (b-constant ,n))     ;Used later to advance offsets
       (assign b-block-size obus)
       (start-memory block read))                ;start first word
     (parallel
       (waiting-for-memory)                      ;waiting for first word
       (start-memory block read))                ;start second word
     ,@(loop for i from (- n-bitblt-buffers n) below n-bitblt-buffers
             collect `(abus-array-data
                        (assign (bitblt-buffer ,i)
                                (set-type (logxor bb-constant memory-data) dtp-fix))
                        ,(selectq (- n-bitblt-buffers i)
                           (1 '(return))
                           (2 nil)
                           (otherwise '(start-memory block read)))))))
```

```
(def-bitblt-block-read ubitblt-block-read-8 8)  ;I suppose this when interned...
(def-bitblt-block-read ubitblt-block-read-4 4)  ;... will subsume this.

(defmacro def-bitblt-block-write (name n)
  `(defucode ,name
     (activate-bitblt-buffer)
     ,@(loop for i from (- n-bitblt-buffers n) below n-bitblt-buffers
             collect `(parallel
                        (store-word (bitblt-buffer ,i) block)
                        (lisp (trace-path #/.))))
     (parallel
       (assign bb-d-offset (+ bb-d-offset b-block-size))
       (call deactivate-bitblt-buffer))
     (parallel-with-return
       (assign bb-width (- bb-width (rotate b-block-size 5)))   ;2^5 = bits-per-word
       )))

(def-bitblt-block-write ubitblt-block-write-8 8)
(def-bitblt-block-write ubitblt-block-write-4 4)

(defmacro def-d-aligned-block-write (name n)
  `(defucode ,name
     (assign byte-s (1- bb-s-bitpos))
     (parallel
       (assign byte-r (- (b-constant 32.) bb-s-bitpos))
       (call activate-bitblt-buffer))
     ,@(loop for i from (- n-bitblt-buffers n) below n-bitblt-buffers
             append `((parallel
                        (store-word (dpb (bitblt-buffer ,i) byte-s byte-r bb-s-word2) block)
                        (lisp (trace-path #/.)))
                      (assign bb-s-word2 (rotate (bitblt-buffer ,i) byte-r))))
     (parallel
       (assign bb-d-offset (+ bb-d-offset b-block-size))
       (call deactivate-bitblt-buffer))
     (parallel-with-return
       (assign bb-width (- bb-width (rotate b-block-size 5)))   ;2^5 = bits-per-word
       )))

(def-d-aligned-block-write ubitblt-d-aligned-block-write-8 8.)
(def-d-aligned-block-write ubitblt-d-aligned-block-write-4 4.)

;;alu depends on neither source nor destination bits
(defucode ubitblt-long-row-neither
  (if (plus-fixnum bb-d-bitpos)
      (sequential
        (assign b-temp (32- bb-d-bitpos))
        (parallel-with-d-access bb-d-offset
          (assign byte-r bb-d-bitpos)
          (assign byte-s (1- b-temp))
          (store-word (dpb bb-constant byte-s byte-r memory-data)))
        (incr-d-offset)
        (assign bb-width (- bb-width b-temp))
        (parallel
          (assign bb-d-bitpos (b-constant 0))
          (lisp (trace-path #/b))
          (jump ubitblt-long-row-neither-loop)))
      (parallel
        (lisp (trace-path #/a))
        (jump ubitblt-long-row-neither-loop))))

(defucode ubitblt-long-row-neither-loop
  (if (greater-or-equal-fixnum bb-width (b-constant (* 8. 32.)))
      (sequential
        (parallel
          (assign-vma-offset d)
          (call store-block-bb-constant-8))
        (assign bb-d-offset (+ bb-d-offset (b-constant 8.)))
        (parallel
          (assign bb-width (- bb-width (b-constant (* 8. 32.))))
          (jump ubitblt-long-row-neither-loop)))
      (sequential
        (dispatch-after-next (parallel (assign b-block-size (ldb bb-width 3 5))
                                       (ldb bb-width 3 5))
          ((7) (parallel (assign-vma-offset d)
                         (call-and-return-to store-block-bb-constant-7
                                             ubitblt-long-row-neither-finish)))
          ((6) (parallel (assign-vma-offset d)
                         (call-and-return-to store-block-bb-constant-6
                                             ubitblt-long-row-neither-finish)))
          ((5) (parallel (assign-vma-offset d)
                         (call-and-return-to store-block-bb-constant-5
                                             ubitblt-long-row-neither-finish)))
          ((4) (parallel (assign-vma-offset d)
                         (call-and-return-to store-block-bb-constant-4
                                             ubitblt-long-row-neither-finish)))
          ((3) (parallel (assign-vma-offset d)
                         (call-and-return-to store-block-bb-constant-3
                                             ubitblt-long-row-neither-finish)))
          ((2) (parallel (assign-vma-offset d)
                         (call-and-return-to store-block-bb-constant-2
                                             ubitblt-long-row-neither-finish)))
          ((1) (assign-vma-offset d)
```

```
                    (parallel
                      (lisp (trace-path #/,))
                      (store-word bb-constant)
                      (jump ubitblt-long-row-neither-finish))))
        (parallel
          (take-dispatch)
          (trap-if (zero-fixnum b-block-size) ubitblt-long-row-neither-finish)))))

(defucode ubitblt-long-row-neither-finish
  (assign bb-d-offset (+ bb-d-offset b-block-size))
  (assign bb-width (logand bb-width (b-constant #o37)))
  (if (plus-fixnum bb-width)
      (parallel-with-d-access bb-d-offset
        (assign byte-r (a-constant 0))
        (assign byte-s (1- bb-width))
        (parallel
          (lisp (trace-path #/2))
          (store-word (dpb bb-constant byte-s byte-r memory-data))
          (return)))
      (parallel
        (lisp (trace-path #/1))
        (return))))

(defmacro store-block-bb-constant-routines (n)
  '(progn 'compile
          ,@(loop with s = "STORE-BLOCK-BB-CONSTANT-~d"
                  for i from n downto 1
                  collect '(defucode ,(fintern s i)
                             (parallel
                               (store-word bb-constant block)
                               (lisp (trace-path #/,))
                               ,(if (> i 1)
                                    '(jump ,(fintern s (1- i)))
                                    '(return)))))))

(store-block-bb-constant-routines 8.)
;;alu depends both source and destination bits
(defucode ubitblt-long-row-both
  (parallel
    (assign b-temp bb-d-bitpos)
    (if (zero-fixnum bb-d-bitpos)
        (if (zero-fixnum bb-s-bitpos)
            (goto ubitblt-aligned-row-both)
            (parallel-with-s-access bb-s-offset
              ;;      SSSSSSSSSSSSSSSSSSSSSSSSSSSS.ssss
              ;;dddddddddddddddddddddddddddddddd.
              (assign byte-r (32- bb-s-bitpos))
              (parallel
                (assign bb-s-word (rotate memory-data byte-r))
                (lisp (trace-path #/c))
                (jump ubitblt-d-aligned-row-both))))
        (if (equal-fixnum bb-s-bitpos b-temp)
            (sequential
              (parallel-with-s-access bb-s-offset
                ;;SSSSSSSSSSSSSSSSSSSSSSSSSS.ssssss
                ;;dddddddddddddddddddddddddd.dddddd
                (parallel
                  (assign byte-r (32- bb-s-bitpos))
                  (assign b-temp obus))
                (assign byte-s (31- bb-s-bitpos))
                (assign bb-s-word (logxor bb-constant (ldb memory-data byte-s byte-r))))
              (assign byte-r bb-s-bitpos)
              (parallel
                (assign-vma-offset d)
                ;;ssssssssssssssssssssssssss.ssssss
                ;;DDDDDDDDDDDDDDDDDDDDDDDDDD.dddddd
                (call bb-byte-alu-operation-dispatch))
              ;; First partial word stored, turn into aligned case
              (incr-wrap-s-offset)
              (incr-d-offset)
              (assign bb-width (- bb-width b-temp))
              (assign bb-s-bitpos (b-constant 0))
              (parallel
                (assign bb-d-bitpos (b-constant 0))
                (lisp (trace-path #/b))
                (jump ubitblt-aligned-row-both)))
            (if (lesser-fixnum bb-s-bitpos b-temp)
                (goto ubitblt-long-row-both-s-longer)
                (goto ubitblt-long-row-both-s-shorter))))))

(defucode ubitblt-long-row-both-s-longer
  (assign b-temp (32- bb-d-bitpos))
  (parallel-with-s-access bb-s-offset
    (assign byte-r (32- bb-s-bitpos))
    (assign byte-s (1- b-temp))
    (assign bb-s-word2 memory-data))
  ;;ssssSSSSSSSSSSSSSSSSSSSS........
  ;;    DDDDDDDDDDDDDDDDDDDDdddddddddddd
  ;;    <------ b-temp ------>
  (assign bb-s-word (logxor bb-constant (rotate bb-s-word2 byte-r)))
  ;;........ssssSSSSSSSSSSSSSSSSSSSS
  (parallel
```

```
    (assign byte-r bb-d-bitpos)
    (assign b-temp-2 bb-d-bitpos))
  (parallel
    (assign-vma-offset d)
    ;;sssssssssssssssssssssssss.ssssssss
    ;;     DDDDDDDDDDDDDDDDDDDDD.ddddddddddd
    (call bb-byte-alu-operation-dispatch))
  (incr-d-offset)
  ;;Remaining are (32-(s.bitpos+(32-d.bitpos))) = d.bitpos-s.bitpos
  ;;     <-- 32-d.bitpos ---> <-s.bitpos->
  ;;SSSSssssssssssssssssssssss.ssssssss
  ;;     dddddddddddddddddddd.ddddddddddd
  (assign byte-r (- b-temp-2 bb-s-bitpos))
  (assign bb-s-bitpos (+ bb-s-bitpos b-temp))
  (assign bb-s-word (rotate bb-s-word2 byte-r))
  (assign bb-width (- bb-width b-temp))
  (parallel
    (assign bb-d-bitpos (b-constant 0))
    (lisp (trace-path #/d))
    (jump ubitblt-d-aligned-row-both)))
;Need two S words to do the first partial D word
(defucode ubitblt-long-row-both-s-shorter
  ;;     ssssssssssssssssssssssssss.ssssssss
  ;;ddddddddddddddddddddddddddddd.dddd
  (parallel-with-s-access bb-s-offset
    (assign byte-r (32- bb-s-bitpos))
    (assign byte-s (31- bb-s-bitpos))
    ;;     SSSSSSSSSSSSSSSSSSSSSSSSS.ssssssss
    ;;ddddddddddddddddddddddddddddd.dddd
    (assign bb-s-word (logxor bb-constant (ldb memory-data byte-s byte-r))))
  (incr-wrap-s-offset-ahead)
  ;;   <---> s.bitpos-d.bitpos
  ;;...SSSS|ssssssssssssssssssssssss.ssssssss
  ;;   dddd ddddddddddddddddddddddddd.dddd
  (parallel-with-s-access bb-s-offset-ahead
    (assign byte-s (- bb-s-bitpos b-temp 1))
    (assign byte-r (32- bb-s-bitpos))
    (assign bb-s-word2 (logxor bb-constant memory-data)))
  ;;...SSSS|SSSSSSSSSSSSSSSSSSSSSSSS.ssssssss
  ;;   dddd ddddddddddddddddddddddddd.dddd
  (assign bb-s-word (dpb bb-s-word2 byte-s byte-r bb-s-word))
  (assign byte-r bb-d-bitpos)
  (assign byte-s (31- bb-d-bitpos))
  ;;...ssss|ssssssssssssssssssssssss.ssssssss
  ;;   DDDD DDDDDDDDDDDDDDDDDDDDDDDDD.dddd
  (parallel
    (assign-vma-offset d)
    (call bb-byte-alu-operation-dispatch))
  (incr-d-offset)
  (assign bb-s-offset bb-s-offset-ahead)
  ;;...SSSssss|ssssssssssssssssssssssss.ssssssss
  ;;      dddd ddddddddddddddddddddddddd.dddd
  (assign byte-r (- b-temp bb-s-bitpos))
  (assign bb-s-bitpos (- bb-s-bitpos b-temp))
  (assign b-temp (32- bb-d-bitpos))
  (assign bb-s-word (logxor (rotate bb-s-word2 byte-r) bb-constant))
  (assign bb-width (- bb-width b-temp))
  (parallel
    (assign bb-d-bitpos (b-constant 0))
    (lisp (trace-path #/e))
    (jump ubitblt-d-aligned-row-both)))
(defucode ubitblt-aligned-row-both
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-fixnum bb-s-row-length b-temp)
            (goto ubitblt-aligned-row-both-slow-loop)
            (sequential
              (parallel
                (assign-vma-offset s)
                (call ubitblt-block-read-8))
              (parallel
                (assign-vma-offset d)
                (call-and-return-to ubitblt-block-alu-8 ubitblt-aligned-row-both)))))
      ;;Frob with what's left.  Too bad dispatch blocks are expensive.
      (if (greater-or-equal-fixnum bb-width (b-constant (* 4 32.)))
          (sequential
            (assign b-temp (+ bb-s-offset (b-constant 4.)))
            (if (lesser-fixnum bb-s-row-length b-temp)
                (goto ubitblt-aligned-row-both-slow-loop)
                (sequential
                  (parallel
                    (assign-vma-offset s)
                    (call ubitblt-block-read-4))
                  (parallel
                    (assign-vma-offset d)
                    (call-and-return-to ubitblt-block-alu-4
                                        ubitblt-aligned-row-both-slow-loop)))))
          (goto ubitblt-aligned-row-both-slow-loop))))
```

```
(defucode ubitblt-aligned-row-both-slow-loop     ;12 cycles per word
  (parallel-with-s-access bb-s-offset            ;4 cycles
    (trap-if (lesser-fixnum bb-width (b-constant 32.))
             ubitblt-aligned-row-both-slow-loop-done)
    (waiting-for-memory)
    (assign bb-s-word (logxor bb-constant memory-data)))
  (parallel                                      ;1+3 cycles
    (assign-vma-offset d)
    (call bb-word-alu-operation-dispatch))
  (assign bb-width (- bb-width (b-constant 32.)))      ;1 cycle
  (incr-wrap-s-offset)                           ;2 cycles
  (parallel                                      ;1 cycle
    (incr-d-offset)
    (lisp (trace-path #/,))
    (jump ubitblt-aligned-row-both)))

(defucode ubitblt-aligned-row-both-slow-loop-done
  (if (plus-fixnum bb-width)
      (sequential
        (parallel-with-s-access bb-s-offset
          (assign byte-r (b-constant 0))
          (assign byte-s (1- bb-width))
          (assign bb-s-word (logxor bb-constant memory-data)))
        (parallel
          (lisp (trace-path #/2))
          (assign-vma-offset d)
          (jump bb-byte-alu-operation-dispatch)))       ;jcall
      (parallel-with-return
        (lisp (trace-path #/1)))))
(defucode ubitblt-block-alu-8
  (dispatch-after-this (ldb bb-alu-operation 4 0)
                       (parallel
                         (assign a-block-size (a-constant 8.))
                         (assign b-block-size (a-constant 8.))
                         (start-memory block read))     ;start first word
    ((1 2) (goto ubitblt-block-logand-8))               ; x*y   ~x*y
    ((4 8.) (goto ubitblt-block-andc2-8))               ; x*~y  ~x*~y
    ((6 9.) (goto ubitblt-block-logxor-8))              ; x xor y, ~x xor y
    ((7 11.) (goto ubitblt-block-logior-8))             ; x+y, ~x+y
    ((13. 14.) (goto ubitblt-block-lognand-8))))        ; ~(~x*y), ~(x*y)


(defucode ubitblt-block-alu-4
  (dispatch-after-this (ldb bb-alu-operation 4 0)
                       (parallel
                         (assign a-block-size (a-constant 4.))
                         (assign b-block-size (a-constant 4.))
                         (start-memory block read))     ;start first word
    ((1 2) (goto ubitblt-block-logand-4))               ; x*y   ~x*y
    ((4 8.) (goto ubitblt-block-andc2-4))               ; x*~y  ~x*~y
    ((6 9.) (goto ubitblt-block-logxor-4))              ; x xor y, ~x xor y
    ((7 11.) (goto ubitblt-block-logior-4))             ; x+y, ~x+y
    ((13. 14.) (goto ubitblt-block-lognand-4))))        ; ~(~x*y), ~(x*y)

(defmacro def-block-aluop (name n alu)
  (if (memq (get (caddr (microexpand '(,alu a-temp b-temp))) 'alu) weird-alu-functions)
      ;; Cannot simultaneously run ALU and store into the bitblt-buffer
      '(defucode ,name
         (parallel
           (waiting-for-memory)                   ;first word already started
           (declare-memory-timing active-cycle))
         ,@(loop for i from (- n-bitblt-buffers n) below n-bitblt-buffers
                 collect '(sequential
                            (abus-array-data
                              (assign b-temp (,alu (bitblt-buffer ,i) memory-data))
                              ,(if (> (- n-bitblt-buffers i) 1)
                                   '(start-memory block read))) ;start next word
                            (parallel
                              (assign (bitblt-buffer ,i) (set-type b-temp dtp-fix))
                              ,(if (= (- n-bitblt-buffers i) 1)
                                   '(jump ,(fintern "UBITBLT-BLOCK-ALU-WRITE-~d" n)))))))
      ;; Normal case
      '(defucode ,name
         (parallel
           (waiting-for-memory)                   ;first word already started
           (declare-memory-timing active-cycle)
           (start-memory read block))             ;start second word
         ,@(loop for i from (- n-bitblt-buffers n) below n-bitblt-buffers
                 collect '(parallel
                            (abus-array-data
                              (assign (bitblt-buffer ,i) (set-type (,alu (bitblt-buffer ,i)
                                                                         memory-data)
                                                                   dtp-fix)))
                            ,(selectq (- n-bitblt-buffers i)
                               (1 '(jump ,(fintern "UBITBLT-BLOCK-ALU-WRITE-~d" n)))
                               (2 nil)
                               (otherwise '(start-memory block read))) ;start word after next
                            )))))

(def-block-aluop ubitblt-block-logand-8 8 logand)
(def-block-aluop ubitblt-block-logior-8 8 logior)
```

```
(def-block-aluop ubitblt-block-logxor-8 8 logxor)
(def-block-aluop ubitblt-block-andc2-8 8 andc2)
(def-block-aluop ubitblt-block-lognand-8 8 lognand)

(def-block-aluop ubitblt-block-logand-4 4 logand)
(def-block-aluop ubitblt-block-logior-4 4 logior)
(def-block-aluop ubitblt-block-logxor-4 4 logxor)
(def-block-aluop ubitblt-block-andc2-4 4 andc2)
(def-block-aluop ubitblt-block-lognand-4 4 lognand)

(defmacro def-block-alu-write (name n)
  '(defucode ,name
     (parallel
       (assign-vma-offset d)
       (call activate-bitblt-buffer))
     ,@(loop for i from (- n-bitblt-buffers n) below n-bitblt-buffers
             collect '(parallel
                        (store-word (bitblt-buffer ,i) block)
                        (lisp (trace-path #/.))))
     (parallel
       (assign bb-d-offset (+ bb-d-offset b-block-size))
       (call deactivate-bitblt-buffer))
     (assign bb-width (- bb-width (rotate b-block-size 5)))     ;2^5 = bits-per-word
     (parallel
       (assign bb-s-offset (+ bb-s-offset b-block-size))
       (return))))

(def-block-alu-write ubitblt-block-alu-write-8 8)
(def-block-alu-write ubitblt-block-alu-write-4 4)

;;Each time through the loop, s-word was fetched from memory like
;;         ←-------s.bitpos------→
;;ssssssssss......................
;;and then rotated so it looks like
;;......................ssssssssss
;;←-------s.bitpos-------→
;;
;;Each time, another s-word2 gets fetched and deposited into s-word like
;;          |←-------s.bitpos------→
;;          |......................1111111111
;;2222222222 2222222222222222222222
;;
;;The rotation for the dpb equals the rotation for setup for next loop.

;bb-s-word has the partial previous source word whose address is in bb-s-offset,
;rotated into alignment with the destination, but not xored with bb-constant
(defucode ubitblt-d-aligned-row-both
  (if (greater-or-equal-fixnum bb-width (b-constant (* 8. 32.)))
      ;;Fetch a block of words into the buffer
      (sequential
        (assign b-temp (+ bb-s-offset (b-constant 8.)))
        (if (lesser-or-equal-fixnum bb-s-row-length b-temp)
            (goto ubitblt-d-aligned-row-both-slow-loop)
            (sequential
              (parallel
                (assign-vma-offset s 1)
                (call ubitblt-rotated-block-read-8))
              (parallel
                (assign-vma-offset d)
                (call-and-return-to ubitblt-block-alu-8 ubitblt-d-aligned-row-both)))))
      ;;Frob with what's left.  Too bad dispatch blocks are expensive.
      (if (greater-or-equal-fixnum bb-width (b-constant (* 4 32.)))
          (sequential
            (assign b-temp (+ bb-s-offset (b-constant 4.)))
            (if (lesser-or-equal-fixnum bb-s-row-length b-temp)
                (goto ubitblt-d-aligned-row-both-slow-loop)
                (sequential
                  (parallel
                    (assign-vma-offset s 1)
                    (call ubitblt-rotated-block-read-4))
                  (parallel
                    (assign-vma-offset d)
                    (call-and-return-to ubitblt-block-alu-4
                                        ubitblt-d-aligned-row-both-slow-loop)))))
          (goto ubitblt-d-aligned-row-both-slow-loop))))

(defucode ubitblt-d-aligned-row-both-slow-loop               ;17 cycles per word
  (incr-wrap-s-offset-ahead)                                  ;2
  (parallel-with-s-access bb-s-offset-ahead                   ;4
    (trap-if (lesser-fixnum bb-width (b-constant 32.))
             ubitblt-d-aligned-row-both-done)
    (assign byte-s (1- bb-s-bitpos))
    (assign bb-s-word2 memory-data))
  (assign byte-r (32- bb-s-bitpos))                           ;1
  (assign bb-s-word (dpb bb-s-word2 byte-s byte-r bb-s-word))     ;1
  (assign bb-s-word (logxor bb-constant-a bb-s-word))             ;1
  (parallel                                                   ;1+3
    (assign-vma-offset d)
```

```
      (call bb-word-alu-operation-dispatch))
    (assign bb-width (- bb-width (b-constant 32.)))       ;1
    (incr-d-offset)                                        ;1
    (assign bb-s-offset bb-s-offset-ahead)                 ;1
    (parallel                                              ;1
      (assign bb-s-word (rotate bb-s-word2 byte-r))
      (lisp (trace-path #/.))
      (jump ubitblt-d-aligned-row-both)))

;;At entry, we have s-word fetched from memory like
;;          ←-------s.bitpos-------→
;;sssssssss......................
;;but then rotated so it looks like
;;.......................sssssssss
;;←-------s.bitpos-------→
;;
;;This is to be combined with d-word which looks like
;;.....................ddddddddddd
;;                     ←---width--→
(defucode ubitblt-d-aligned-row-both-done
  (assign bb-s-word (logxor bb-constant-a bb-s-word))
 (if (plus-fixnum bb-width)
     (sequential
       (assign b-temp (32- bb-s-bitpos))
       (if (lesser-or-equal-fixnum bb-width b-temp)
           ;;we have enough s bits
           ;;←-----s.bitpos---→←-----a.temp---→
           ;;...................sssssssssssssss
           ;;......................ddddddddddd
           ;;                      ←---width--→
           (sequential
             (assign byte-r (b-constant 8))
             (assign byte-s (1- bb-width))
             (parallel
               (assign-vma-offset d)
               (lisp (trace-path #/4))
               (jump bb-byte-alu-operation-dispatch))) ;jcall
           ;;need to get another source word
           ;;←-----s.bitpos---→←-----a.temp---→
           ;;...................sssssssssssssss
           ;;.............ddddddddddddddddddddd
           ;;             ←--------width-------→
           (sequential
             (parallel-with-s-access bb-s-offset-ahead
               (assign byte-r b-temp)
               (assign byte-s (1- bb-s-bitpos))
               (assign bb-s-word2 (logxor memory-data bb-constant)))
             (assign bb-s-word (dpb bb-s-word2 byte-s byte-r bb-s-word))
             (assign byte-r (b-constant 8))
             (assign byte-s (1- bb-width))
             (parallel
               (assign-vma-offset d)
               (lisp (trace-path #/5))
               (jump bb-byte-alu-operation-dispatch)))))       ;jcall
     (parallel-with-return
       (lisp (trace-path #/3)))))

;bb-s-word has the previous source word, rotated but not xored with bb-constant
;3 cycles per word seems to be the best I can do (can't rotate while storing in bitblt-buffer)
;If bb-s-word was xored already, it would take 4 cycles per word here
(defmacro def-bitblt-rotated-block-read (name n)
  `(defucode ,name
     (assign byte-s (1- bb-s-bitpos))
     (parallel
       (assign a-block-size (b-constant ,n))    ;Used later to advance offsets
       (assign b-block-size obus)
       (start-memory block read))               ;start first word
     (parallel
       (waiting-for-memory)                     ;waiting for first word
       (assign byte-r (32- bb-s-bitpos)))
     ,@(loop for i from (- n-bitblt-buffers n) below n-bitblt-buffers
             append `((abus-array-data
                        (assign bb-s-word2 (dpb memory-data byte-s byte-r bb-s-word)))
                      (parallel
                        (declare-memory-timing data-cycle)      ;MD holds
                        (assign bb-s-word (rotate memory-data byte-r))
                        ,(and (> (- n-bitblt-buffers i) 1)
                              '(start-memory block read)))
                      (parallel
                        (assign (bitblt-buffer ,i)
                                (set-type (logxor bb-constant bb-s-word2) dtp-fix))
                        ,(if (= (- n-bitblt-buffers i) 1)
                             '(return)))))))

(def-bitblt-rotated-block-read ubitblt-rotated-block-read-8 8)
(def-bitblt-rotated-block-read ubitblt-rotated-block-read-4 4)

(defucode ubitblt-long-row-source-backwards
  (parallel
    (assign b-temp bb-d-bitpos)
    (if (zero-fixnum bb-d-bitpos)
        (if (zero-fixnum bb-s-bitpos)
```

```
    (parallel
      (assign bb-s-offset (1+ bb-s-offset))  ;the loop will decr first, before pcisr
      (lisp (trace-path #/a))
      (jump ubitblt-aligned-row-source-backwards))
    (sequential
      (parallel-with-s-access bb-s-offset
        (assign byte-r (32- bb-s-bitpos))
        (parallel
          (assign bb-s-word (logxor bb-constant (rotate memory-data byte-r)))
          (lisp (trace-path #/c))
          (jump ubitblt-d-aligned-row-source-backwards)))))
(if (equal-fixnum b-temp bb-s-bitpos)
    (sequential
      (parallel-with-s-access bb-s-offset
        (assign byte-s (1- bb-s-bitpos))
        (assign bb-s-word (logxor memory-data bb-constant)))
      (parallel-with-d-access-check-write bb-d-offset
        (decr-d-offset)
        (parallel
          (assign byte-r (b-constant 0))
          (assign bb-s-bitpos (b-constant 0)))
        (store-word (dpb bb-s-word byte-s byte-r memory-data)))
      ;; Now we can turn into the aligned case
      (assign bb-width (- bb-width b-temp))
      (parallel
        (assign bb-d-bitpos (b-constant 0))
        (lisp (trace-path #/b))
        (jump ubitblt-aligned-row-source-backwards)))
    (if (greater-fixnum bb-s-bitpos b-temp)     ;s > d, enough in the current word
      (sequential
        (parallel-with-s-access bb-s-offset
          (assign byte-s (1- bb-d-bitpos))
          (assign byte-r (- b-temp bb-s-bitpos))
          (assign bb-s-word (logxor bb-constant memory-data)))
        (parallel-with-d-access-check-write bb-d-offset
          (assign bb-s-bitpos (- bb-s-bitpos b-temp))
          (assign bb-d-bitpos (b-constant 0))
          (store-word (ldb bb-s-word byte-s byte-r memory-data)))
        (assign bb-s-word (rotate bb-s-word byte-r))
        (assign bb-width (- bb-width b-temp))
        (parallel
          (decr-d-offset)
          (lisp (trace-path #/d))
          (jump ubitblt-d-aligned-row-source-backwards)))
      (sequential                               ;s < d, need to fetch another word
        (parallel-with-s-access bb-s-offset
          (parallel
            (assign byte-r (- b-temp bb-s-bitpos))
            (assign a-temp (- b-temp bb-s-bitpos)))
          (assign byte-s (1- a-temp))
          (assign bb-s-word (logxor bb-constant (rotate memory-data byte-r))))
        (decr-wrap-s-offset-ahead)
        (parallel-with-s-access bb-s-offset-ahead
          (assign bb-s-word2 (logxor bb-constant memory-data)))
        (assign bb-s-word (ldb bb-s-word2 byte-s byte-r bb-s-word))
        (parallel-with-d-access bb-d-offset
          (assign byte-r (b-constant 0))
          (assign byte-s (1- bb-d-bitpos))
          (store-word (ldb bb-s-word byte-s byte-r memory-data)))
        (assign bb-s-bitpos (32- a-temp))
        (assign byte-r a-temp)
        (assign bb-s-word (rotate bb-s-word2 byte-r))
        (assign bb-s-offset bb-s-offset-ahead)
        (assign bb-width (- bb-width b-temp))
        (assign bb-d-bitpos (b-constant 0))
        (parallel
          (decr-d-offset)
          (lisp (trace-path #/e))
          (jump ubitblt-d-aligned-row-source-backwards)))))))
;bb-s-offset is 1+ the "real" value at this point
(defucode ubitblt-aligned-row-source-backwards  ;9 cycles per word
  (decr-wrap-s-offset)                          ;1
  (parallel-with-s-access bb-s-offset           ;4
    (trap-if (lesser-fixnum bb-width (b-constant 32.))
             ubitblt-aligned-row-source-backwards-done)
    (waiting-for-memory)
    (assign bb-s-word (logxor bb-constant memory-data)))
  (assign-vma-offset d)                         ;1
  (store-word bb-s-word)                        ;1
  (assign bb-width (- bb-width (b-constant 32.))) ;1
  (parallel                                     ;1
    (decr-d-offset)
    (lisp (trace-path #/,))
    (jump ubitblt-aligned-row-source-backwards)))

(defucode ubitblt-aligned-row-source-backwards-done
  (if (plus-fixnum bb-width)
      (sequential
        (parallel-with-s-access bb-s-offset
          (assign byte-s (1- bb-width))
```

```
    (assign byte-r bb-width)
    (assign bb-s-word (logxor bb-constant (ldb memory-data byte-s byte-r))))
  (parallel-with-d-access bb-d-offset
    (assign byte-r (32- bb-width))
    (parallel-with-return
      (store-word (dpb bb-s-word byte-s byte-r memory-data))
      (lisp (trace-path #/2)))))
(parallel-with-return
  (lisp (trace-path #/1)))))

;;each time through the loop, bb-s-word has the low part of the previous word
;;rotated to be at the high end of the word.  We use it as background to LDB the
;;high part of the next word into it.

;bb-s-offset is 1+ the "real" value at this point
;could bum one cycle by moving assignment to byte-s out of loop,
;but this should use block mode anyway
(defucode ubitblt-d-aligned-row-source-backwards        ;11 cycles per word
  (decr-wrap-s-offset)                                ;1
  (parallel-with-s-access bb-s-offset                 ;4
    (trap-if (lesser-fixnum bb-width (b-constant 32.))
             ubitblt-d-aligned-row-source-backwards-done)
    (assign byte-r (32- bb-s-bitpos))
    (assign bb-s-word2 (logxor bb-constant memory-data)))
  (assign byte-s (31- bb-s-bitpos))                   ;1
  (assign-vma-offset d)                               ;1
  (store-word (ldb bb-s-word2 byte-s byte-r bb-s-word)) ;1
  (assign bb-width (- bb-width (b-constant 32.))) ;1
  (decr-d-offset)                                     ;1
  (parallel                                           ;1
    (assign bb-s-word (rotate bb-s-word2 byte-r))
    (lisp (trace-path #/.))
    (jump ubitblt-d-aligned-row-source-backwards)))

(defucode ubitblt-d-aligned-row-source-backwards-done
  (parallel
    (assign bb-width-b bb-width)
    (if (plus-fixnum bb-width)
        (if (greater-or-equal-fixnum bb-s-bitpos bb-width-b)
            (parallel-with-d-access bb-d-offset
              (assign byte-r (b-constant 0))
              (assign byte-s (31- bb-width))
              (parallel-with-return
                (store-word (ldb memory-data byte-s byte-r bb-s-word))
                (lisp (trace-path #/4))))
            (sequential
              (parallel-with-s-access bb-s-offset
                (assign byte-r bb-width)
                (assign bb-s-word (rotate bb-s-word byte-r))
                (assign bb-s-word2 (logxor bb-constant memory-data)))
              (parallel
                (assign byte-r (- bb-width-b bb-s-bitpos))
                (assign a-temp obus))
              (assign byte-s (1- a-temp))
              (assign bb-s-word (ldb bb-s-word2 byte-s byte-r bb-s-word))
              (parallel-with-d-access bb-d-offset
                (assign byte-s (1- bb-width))
                (assign byte-r (32- bb-width))
                (parallel-with-return
                  (store-word (dpb bb-s-word byte-s byte-r memory-data))
                  (lisp (trace-path #/5))))))
        (parallel-with-return
          (lisp (trace-path #/3))))))
    (assign b-temp bb-d-bitpos)
    (if (zero-fixnum bb-d-bitpos)
        (if (zero-fixnum bb-s-bitpos)
            (parallel
              (assign bb-s-offset (1+ bb-s-offset))     ;loop will decr first before pcler
              (lisp (trace-path #/a))
              (jump ubitblt-aligned-row-both-backwards))
            (parallel-with-s-access bb-s-offset
              (assign byte-r (32- bb-s-bitpos))
              (parallel
                (assign bb-s-word (logxor bb-constant (rotate memory-data byte-r)))
                (lisp (trace-path #/c))
                (jump ubitblt-d-aligned-row-both-backwards))))
        (if (equal-fixnum b-temp bb-s-bitpos)
            (sequential
              (parallel-with-s-access bb-s-offset
                (assign byte-s (1- bb-s-bitpos))
                (assign byte-r (b-constant 0))
                (assign bb-s-word (logxor bb-constant memory-data)))
              (parallel
                (assign-vma-offset d)
                (call bb-byte-alu-operation-dispatch))
              (assign bb-width (- bb-width b-temp))
              (assign bb-s-bitpos (b-constant 0))
              (assign bb-d-bitpos (b-constant 0))
              (parallel
                (decr-d-offset)
                (lisp (trace-path #/b))
```

```
      (jump ubitblt-aligned-row-both-backwards)))
  (if (greater-fixnum bb-s-bitpos b-temp)      ;s > d, enough in first word
      (sequential
        (parallel-with-s-access bb-s-offset
          (parallel
            (assign byte-r (- b-temp bb-s-bitpos))
            (assign a-temp obus))      ;this is negative
          (assign byte-s (1- bb-d-bitpos))
          (assign bb-s-word (logxor bb-constant (rotate memory-data byte-r))))
        (assign byte-r (b-constant 0))
        (parallel
          (assign-vma-offset d)
          (call bb-byte-alu-operation-dispatch))
        (assign bb-s-bitpos (- bb-s-bitpos b-temp))
        (assign bb-d-bitpos (b-constant 0))
        (assign bb-width (- bb-width b-temp))
        (parallel
          (decr-d-offset)
          (lisp (trace-path #/d))
          (jump ubitblt-d-aligned-row-both-backwards)))
      (sequential                        ;s<d, need to fetch another word
        (parallel-with-s-access bb-s-offset
          (assign byte-r (- b-temp bb-s-bitpos))
          (assign bb-s-word (logxor bb-constant (rotate memory-data byte-r))))
        (decr-wrap-s-offset-ahead)
        (parallel-with-s-access bb-s-offset-ahead
          (assign a-temp (- b-temp bb-s-bitpos))
          (assign byte-s (1- a-temp))
          (assign bb-s-word2 (logxor bb-constant memory-data)))
        (assign bb-s-word (ldb bb-s-word2 byte-s byte-r bb-s-word))
        (assign byte-s (1- bb-d-bitpos))
        (assign byte-r (b-constant 0))
        (parallel
          (assign-vma-offset d)
          (call bb-byte-alu-operation-dispatch))
        (parallel
          (assign a-temp (- b-temp bb-s-bitpos))
          (assign byte-r obus))
        (assign bb-s-word (rotate bb-s-word2 byte-r))
        (assign bb-s-bitpos (32- a-temp))
        (assign bb-s-offset bb-s-offset-ahead)
        (assign bb-d-bitpos (b-constant 0))
        (assign bb-width (- bb-width b-temp))
        (parallel
          (decr-d-offset)
          (lisp (trace-path #/e))
          (jump ubitblt-d-aligned-row-both-backwards)))))))

;bb-s-offset is 1+ its "real" value
;bb-s-word has the previous word, rotated and xored
(defucode ubitblt-d-aligned-row-both-backwards  ;14 cycles per word
  (decr-wrap-s-offset)                          ;1 cycles
  (parallel-with-s-access bb-s-offset           ;4 cycles
    (trap-if (lesser-fixnum bb-width (b-constant 32.))
             ubitblt-d-aligned-row-both-backwards-done)
    (assign byte-r (32- bb-s-bitpos))
    (assign bb-s-word2 (logxor bb-constant memory-data)))
  (assign byte-s (31- bb-s-bitpos))             ;1
  (assign bb-s-word (ldb bb-s-word2 byte-s byte-r bb-s-word))   ;1 cycle
  (parallel                                     ;1+3 cycles
    (assign-vma-offset d)
    (call bb-word-alu-operation-dispatch))
  (assign bb-s-word (rotate bb-s-word2 byte-r)) ;1
  (assign bb-width (- bb-width (b-constant 32.))) ;1
  (parallel
    (decr-d-offset)                             ;1
    (lisp (trace-path #/.))
    (jump ubitblt-d-aligned-row-both-backwards)))

(defucode ubitblt-d-aligned-row-both-backwards-done
  (parallel
    (assign bb-width-b bb-width)
    (if (plus-fixnum bb-width)
        (if (greater-or-equal-fixnum bb-s-bitpos bb-width-b)
            (sequential
              (assign byte-r bb-width)
              (assign bb-s-word (rotate bb-s-word byte-r))
              (assign byte-s (1- bb-width))
              (assign byte-r (32- bb-width))
              (parallel
                (assign-vma-offset d)
                (lisp (trace-path #/4))
                (jump bb-byte-alu-operation-dispatch))) ;jcall
            (sequential
              (parallel-with-s-access bb-s-offset
                (assign byte-r bb-width)
                (assign bb-s-word (rotate bb-s-word byte-r))
                (assign bb-s-word2 (logxor bb-constant memory-data)))
              (parallel
                (assign byte-r (- bb-width-b bb-s-bitpos))
                (assign a-temp obus))
```

```
      (assign byte-s (1- a-temp))
      (assign bb-s-word (ldb bb-s-word2 byte-s byte-r bb-s-word))
      (assign byte-s (1- bb-width))
      (assign byte-r (32- bb-width))
      (parallel
        (assign-vma-offset d)
        (lisp (trace-path #/5))
        (jump bb-byte-alu-operation-dispatch))))        ;jcall
(parallel-with-return
  (lisp (trace-path #/3))))))

;;code for %decode-bitblt-arrays
;;Take alu from-array to-array
;;Return (s-beg-addr s-beg-bitpos s-row-length s-height s-bits-per-elt
;;        d-beg-addr d-beg-bitpos d-row-length d-height d-bits-per-elt
;;        array-reg-event-count)

;;args
(defatomicro bbd-alu (amem (stack-pointer -2)))
(defatomicro bbd-s-array (amem (stack-pointer -1)))
(defatomicro bbd-d-array top-of-stack-a)

;; 4 slots for array-setup-2d to return its results
(defatomicro bbd-control (amem (stack-pointer 1)))
(defatomicro bbd-base-pointer (amem (stack-pointer 2)))
(defatomicro bbd-width (amem (stack-pointer 3)))
(defatomicro bbd-height (amem (stack-pointer 4)))

(defatomicro bbd-s-beg-addr      (amem (stack-pointer 5)))
(defatomicro bbd-s-beg-bitpos    (amem (stack-pointer 6)))
(defatomicro bbd-s-row-length    (amem (stack-pointer 7)))
(defatomicro bbd-s-height        (amem (stack-pointer 8)))
(defatomicro bbd-s-bits-per-elt  (amem (stack-pointer 9.)))
(defatomicro bbd-d-beg-addr      (amem (stack-pointer 10.)))
(defatomicro bbd-d-beg-bitpos    (amem (stack-pointer 11.)))
(defatomicro bbd-d-row-length    (amem (stack-pointer 12.)))
(defatomicro bbd-d-height        (amem (stack-pointer 13.)))
(defatomicro bbd-d-bits-per-elt  (amem (stack-pointer 14.)))
(defatomicro bbd-event-count     (amem (stack-pointer 15.)))

(defatomicro bb-alu-depends-on-source
             (b-constant #.(loop for alu in '( 5 10.    ;source
                                              ;3 12.    ;dest
                                              ;0 15.    ;neither
                                              1 2 4 6 7 8. 9. 11. 13. 14.        ;both
                                              )
                          sum (ash 1 alu))))

(defmicro compute-beg-bitpos (for-what)
  (let ((beg-bitpos (selectq for-what
                      (s 'bbd-s-beg-bitpos)
                      (d 'bbd-d-beg-bitpos)
                      (otherwise (ferror "What is ~S" for-what))))
        (row-length (selectq for-what
                      (s 'bbd-s-row-length)
                      (d 'bbd-d-row-length)
                      (otherwise (ferror "What is ~S" for-what)))))
    `(sequential
       (assign b-low-dividend top-of-stack)
       (assign a-positive-divisor bbd-width)
       (parallel
         (assign b-high-dividend (a-constant 0))
         (assign a-divide-step-count (b-constant 15.)))
       (parallel
         (assign a-negative-divisor (- a-positive-divisor))
         (call divide-subroutine))
       ;; bits per elt setup correctly in byte-r
       (assign ,beg-bitpos (set-type (rotate b-high-dividend byte-r) dtp-fix))
       (assign b-temp (set-type (ldb ,row-length 27. 5 0) dtp-fix))
       (assign bb-a-temp b-temp)
       (mpy-32-32 bb-a-temp b-low-dividend set-b-temp for-effect nil))))

(defmicro set-b-temp (x)
  `(assign b-temp ,x))

(definst %bitblt-decode-arrays no-operand
  ;;See whether the alu operation depends on the source array
  (assign byte-r (32- bbd-alu))
  (parallel
    (assign top-of-stack (a-constant 0))        ;the "subscript"
    (if (ldb-bit-test bb-alu-depends-on-source byte-r)
        (sequential
          (parallel
            (check-arg-type array bbd-s-array dtp-array)
            (assign vma bbd-s-array)
            (assign b-vma bbd-s-array)
            (call array-setup-2d))
          (parallel (assign b-temp bbd-control)
                    (call bbd-bits-per-elt))
          (parallel (assign bbd-s-bits-per-elt (set-type b-temp dtp-fix))
                    (assign byte-r b-temp))
```

```
        (assign bbd-s-row-length (set-type (rotate bbd-width byte-r) dtp-fix))
        (compute-beg-bitpos s)
        (assign bbd-s-beg-addr (+ bbd-base-pointer b-temp))
        (assign bbd-s-height bbd-height))
      (sequential
        (assign bbd-s-bits-per-elt (set-type (a-constant 1) dtp-fix))
        (assign bbd-s-row-length (set-type (a-constant 1000000) dtp-fix))
        (assign bbd-s-beg-bitpos (set-type (a-constant 0) dtp-fix))
        (assign bbd-s-beg-addr quote-nil)
        (assign bbd-s-height (set-type (a-constant 1000000) dtp-fix)))))
;; decode the destination array
  (assign top-of-stack (b-constant 0))          ;the "subscript
  (parallel
    (check-arg-type array bbd-d-array dtp-array)
    (assign vma bbd-d-array)
    (assign b-vma bbd-d-array)
    (call array-setup-2d))
  (parallel (assign b-temp bbd-control)
            (assign bbd-event-count bbd-control)
            (call bbd-bits-per-elt))
  (parallel (assign bbd-d-bits-per-elt (set-type b-temp dtp-fix))
            (assign byte-r b-temp))
  (assign bbd-d-row-length (set-type (rotate bbd-width byte-r) dtp-fix))
  (compute-beg-bitpos d)
  (assign bbd-d-beg-addr (+ bbd-base-pointer b-temp))
  (assign bbd-d-height bbd-height)
  ;; Now copy results down over arguments and array-setup-2d work area
  (assign b-temp frame-pointer)
  (assign frame-pointer (+ stack-pointer (b-constant 4)))
  (assign b-temp-2 (+ stack-pointer (b-constant 15.)))
  (parallel
    (assign stack-pointer (- stack-pointer (b-constant 3)))
    (call blt-stack))
  (parallel
    (assign frame-pointer b-temp)
    (assign top-of-stack top-of-stack-a)
    (next-instruction)))

;;take an array-register control word in b-temp, return a decoding of its
;;dispatch type in b-temp.
(defucode bbd-bits-per-elt
  (dispatch-after-this (array-register-dispatch-field b-temp)
                       (nop)
    ((%array-register-dispatch-1-bit)
      (parallel (assign b-temp (set-type (b-constant 0) dtp-fix)) (return)))
    ((%array-register-dispatch-2-bit)
      (parallel (assign b-temp (set-type (b-constant 1) dtp-fix)) (return)))
    ((%array-register-dispatch-4-bit)
      (parallel (assign b-temp (set-type (b-constant 2) dtp-fix)) (return)))
    ((%array-register-dispatch-8-bit)
      (parallel (assign b-temp (set-type (b-constant 3) dtp-fix)) (return)))
    ((%array-register-dispatch-16-bit)
      (parallel (assign b-temp (set-type (b-constant 4) dtp-fix)) (return)))
    ((%array-register-dispatch-word)
      (parallel (assign b-temp (set-type (b-constant 5) dtp-fix)) (return)))
    (otherwise (signal-error unimplemented-or-illegal-array-type))))

 ;;; -*- Mode:LISP; Package:Micro; Base:8; Lowercase: T -*-
 ;;; (c) Copyright 1982, Symbolics, Inc.

 ;;; Binding stack stuff

 ;Address operand: special variable value cell
 ;Stack operand: value to bind it to
 (definst bind-specvar indirect-operand
   (assign vma (- frame-function macro-unsigned-immediate 1))
   (parallel (start-memory read)
             (assign b-temp (1+ %binding-stack-pointer)))
   (error-if (greater-pointer b-temp %binding-stack-limit)
             bind-stack-overflow)
   (parallel (transport)                                 ;Pick up pointer to value cell
             (assign vma memory-data)
             (jump bind-top-of-stack)))

 ;First arg: locative to cell to bind
 ;Second arg: value to bind it to
 (definst bind-locative no-operand
   (assign b-temp (1+ %binding-stack-pointer))
   (error-if (greater-pointer b-temp %binding-stack-limit)
             bind-stack-overflow)
   (parallel (check-data-type next-on-stack dtp-locative)
             (assign vma next-on-stack)
             (call bind-top-of-stack))
   (parallel (for-effect (popval))
             (next-instruction)))

 ;;; Stack overflow must have been checked by here, and b-temp has (1+ %binding-stack-pointer)
 ;;; vma has locative to bound cell
 ;;; new-value will be popped off the stack
 (defucode bind-top-of-stack
```

```
  (parallel (start-memory read)                    ;read previous value
            (if (bit frame-bindings-bit)           ;a-temp gets eventual second binding word
                (parallel (assign a-temp (set-cdr (set-type vma dtp-locative) 1))
                          (jump bind-top-of-stack-1))
                (parallel (assign a-temp (set-cdr (set-type vma dtp-locative) 0))
                          (jump bind-top-of-stack-1)))))

(defucode bind-top-of-stack-1
  (parallel (declare-memory-timing data-cycle)
            (transport bind)                       ;transport previous value
            (assign a-temp-2 memory-data)
            (assign b-temp-3 memory-data))
  (parallel (assign b-temp-2 vma)                  ;b-temp-2 => value cell
            (assign vma b-temp))                   ;vma => binding stack
  (store-contents a-temp-2 block)                  ;write to binding stack
  (store-contents a-temp block)
  (parallel
    (assign top-of-stack next-on-stack)            ;pop stack
    (decrement-stack-pointer)
    (assign vma b-temp-2))                         ;write new value into value cell
  (store-contents (amem (stack-pointer 1)) (cdr b-temp-3))     ;preserving cell's cdr code
  (assign frame-bindings-bit (b-constant 1))     ;finalize binding (can't pclsr any more)
  (parallel (assign %binding-stack-pointer (+ %binding-stack-pointer (b-constant 2)))
            (next-instruction)))

;Called by funcall-instance-binding-loop (and closure processing if that were in microcode)
(defucode bind-top-of-stack-closure
  (assign b-temp (1+ %binding-stack-pointer))
  (error-if (greater-pointer b-temp %binding-stack-limit)
            bind-stack-overflow)
  (parallel (start-memory read)                    ;read previous value
            (if (bit frame-bindings-bit)           ;a-temp gets eventual second binding word
                (parallel (assign a-temp (set-cdr (set-type vma dtp-locative) 3))
                          (jump bind-top-of-stack-1))
                (parallel (assign a-temp (set-cdr (set-type vma dtp-locative) 2))
                          (jump bind-top-of-stack-1)))))

 (defmicro more-bindings-flag (opnd)              ;low bit of cdr field
   `(parallel ,(get-to-abus opnd)
              (ldb ybus-crocks-1 1 14.)))

 ;;; 0) Verify stack level
 ;;; 1) Pop locative
 ;;; 2) Pop old value
 ;;; 3) Transport-bind the current-value and write old-value
 ;;; returns locative in a-temp-2 so that you can check cdr-code
 ;;; must preserve b-temp
 (defmicro call-unbind-1 (&optional return)
   `(parallel (assign vma %binding-stack-pointer)
              (assign b-temp-2 %binding-stack-pointer)
              ,(if return `(call-and-return-to unbind-1 ,return)
                          `(call unbind-1))))

 (defucode unbind-1
   (parallel (start-memory read)
             (error-if (greater-pointer %binding-stack-low b-temp-2)
                       bind-stack-underflow))
   (error-if (not (bit frame-bindings-bit)) unbind-too-many)
   (parallel (transport)
             (assign a-temp-2 memory-data))       ;a-temp-2 gets locative to value cell
   (memread (1- %binding-stack-pointer))
   (parallel (transport bind)
             (assign a-temp memory-data))         ;a-temp gets old value (or evcp or null)
   (memread a-temp-2)
   (parallel (transport bind-write)               ;Follow forwards but no EVCP's
             (assign b-temp-2 memory-data))
   (store-contents a-temp (cdr b-temp-2))         ;Store back old value, preserving cell's cdr
   (if (not (bit (more-bindings-flag a-temp-2))) ;Now finalize (cannot pclsr any more)
       (assign frame-bindings-bit (b-constant 0))
       (drop-through))
   (parallel (assign %binding-stack-pointer (- %binding-stack-pointer (b-constant 2)))
             (return)))

 (definst unbind-n unsigned-immediate-operand
   (if (not (bit first-part-done))
       (sequential
         (pushval (set-type (1- macro-unsigned-immediate) dtp-fix))
         (parallel (assign first-part-done (b-constant 1))
                   (clear-stack-adjustment)
                   (jump unbind-n-loop)))
       (goto unbind-n-loop)))

 (defucode unbind-n-loop
   (call-unbind-1)
   (parallel
     (assign top-of-stack-a (1- top-of-stack-a))
     (assign top-of-stack obus)
     (if (minus-fixnum obus)
         (parallel
           (assign first-part-done (b-constant 0))
           (decrement-stack-pointer)
```

```
          (jump fixup-tos))
        (goto unbind-n-loop))))

(defucode frame-cleanup-bind-stack-unwind
  (if (bit frame-bindings-bit)
      (call-unbind-1 frame-cleanup-bind-stack-unwind)
      (return)))

(defucode pop-binding-stack-to-b-temp
  (if (equal-pointer %binding-stack-pointer b-temp)
      (return)
      (call-unbind-1 pop-binding-stack-to-b-temp)))

(definst1 %save-binding-stack-level no-operand
  (pushval %binding-stack-pointer))

;If you want to save one control-memory location, make this "smashes-stack"
;and recompile all Lisp code.
(definst %restore-binding-stack-level no-operand
  (parallel (check-data-type top-of-stack-a dtp-locative)
            (assign b-temp top-of-stack-a))
  (parallel (for-effect (popval))
            (jump pop-binding-stack-to-b-temp)))

;;; -*- Mode:Lisp; Package:Micro; Base:8; Lowercase:yes -*-
;;; (c) Copyright 1982, Symbolics, Inc.

; Microcode definitions for the most basic instructions

;Get defmicro and all his hosts
#M
(declare (cond ((not (status feature lmucode))
                (load 'udcls))))


;;; Some simple instructions

(definst1 push-immed signed-immediate-operand
  (pushval (set-type macro-signed-immediate dtp-fix)))

(definst1 push-local address-operand
  (pushval address-operand))

(definst push-address-local address-operand
  (if (bit-test (a-constant 1_7) macro-signed-immediate)
      ;Stack-relative
      (parallel (pushval (set-type (+ stack-pointer macro-signed-immediate 1)
                                   dtp-locative))
                (next-instruction))
      ;Frame-relative
      (parallel (pushval (set-type (+ frame-pointer macro-signed-immediate)
                                   dtp-locative))
                (next-instruction))))

;There is a multiple group at the top of the stack, and its size
;needs to get added to our operand.  We then go that deep in the
;stack and retrieve a word.
(definst push-from-beyond-multiple unsigned-immediate-operand
  (assign b-temp (+ top-of-stack-a macro-unsigned-immediate 1))
  (assign xbas (- stack-pointer b-temp))
  (parallel (pushval (amem (xbas 0)))
            (next-instruction)))

;Access the constant as memory, even though it is stored in A-memory, because
;there tends to be an invisible pointer there.
(definst push-microcode-escape-constant unsigned-immediate-operand
  (parallel
    (assign vma (+ (a-constant (+ (get 'microcode-escape-constants 'a-memory-block-address)
                                  (get 'a-memory-virtual-address 'sysconstant)))
                   macro-unsigned-immediate))
    (jump pushmem)))

(definst1 pop-local (address-operand needs-stack)
  (assign address-operand (popval)))

(definst1 movem-local (address-operand needs-stack)
  (assign address-operand top-of-stack))

(definst1 ldb-immed 10-bit-immediate-operand
  (check-fixnum-1arg-a top-of-stack-a
    (otherwise (take-post-trap ldb-escape preserve-stack)))
  (newtop (set-type (ldb top-of-stack-a macro macro) dtp-fix)))

(definst1 dpb-immed (10-bit-immediate-operand needs-stack)
  (check-fixnum-2args next-on-stack top-of-stack
    (otherwise (take-post-trap dpb-escape preserve-stack)))
  (pop2push (set-type (dpb next-on-stack macro macro top-of-stack) dtp-fix)))

(definst lsh-stack (no-operand needs-stack)
  (parallel
    (check-fixnum-2args next-on-stack top-of-stack)
```

```
  (if (minus-fixnum top-of-stack)
      ;Shift right by LDBing
      (parallel
        (assign byte-s (+ (a-constant 37) top-of-stack))      ;Bytesize-1
        (if (minus-fixnum obus)
            ;Shifted away--result is zero
            (parallel (pop2push (set-type (a-constant 0) dtp-fix))
                      (next-instruction))
            (sequential
              (assign byte-r (+ (a-constant 37) top-of-stack 1)) ;Rotate
              (parallel
                (pop2push (set-type (ldb next-on-stack byte-s byte-r)
                                    dtp-fix))
                (next-instruction)))))
      ;Shift left by DPBing
      (parallel
        (assign byte-s (- (a-constant 37) top-of-stack))      ;Bytesize-1
        (if (minus-fixnum obus)
            ;Shifted away--result is zero
            (parallel (pop2push (set-type (a-constant 0) dtp-fix))
                      (next-instruction))
            (sequential
              (assign byte-r top-of-stack)                     ;Rotate
              (parallel
                (pop2push (set-type (dpb next-on-stack byte-s byte-r 0)
                                    dtp-fix))
                (next-instruction)))))))

  (definst rot-stack (no-operand needs-stack)
    (assign byte-r top-of-stack)              ;Truncates to 5 bits
    (parallel
      (check-fixnum-2args next-on-stack top-of-stack)
      (pop2push (set-type (rotate next-on-stack byte-r) dtp-fix))
      (next-instruction)))

;;; Memory reference instructions

;Put something in vma and jump here.  This pushes the contents of memory
;as the result of the instruction.
(defucode pushmem
  (start-memory read)
  (nop)
  (parallel (transport)
            (pushval memory-data)
            (next-instruction)))

;Put something in vma and jump here.  This puts the contents of memory
;on the top of the stack (replacing an operand).
(defucode newtopmem
  (start-memory read)
  (nop)
  (parallel (transport)
            (newtop memory-data)
            (next-instruction)))

;Put something in VMA and jump here.  This pushes the contents of the location
;pointed to by that location.
(defucode pushmemind
  (start-memory read)
  (nop)
  (parallel (transport)
            (assign vma memory-data)
            (jump pushmem)))

;Put address in VMA and jump here.  Top of stack is popped and stored into
;that memory location, leaving the location's cdr code unchanged.
;Touch memory-data only once, for the sake of the temporary memory control.
(defucode popmem
  (parallel (start-memory read)        ;Read in case of invz, store-data to B side
            (assign b-temp top-of-stack-a))
  (for-effect (popval))                ;Pop stack, adjust top-of-stack register
  (parallel (transport write)          ;Follow any forwarding pointer
            (assign a-temp             ;Merge new data with old cdr code
                    (merge-cdr b-temp memory-data)))
  (parallel (store-contents a-temp)    ;Now write back the new car
            (next-instruction)))

;indirect version of popmem
(defucode popmemind
  (start-memory read)
  (nop)
  (parallel (transport)
            (assign vma memory-data)
            (jump popmem)))


(definst push-constant constant-operand
  (parallel (assign vma (- frame-function macro-unsigned-immediate 1))
            (jump pushmem)))

(definst push-indirect indirect-operand
```

```
  (parallel (assign vma (- frame-function macro-unsigned-immediate 1))
            (jump pushmemind)))

(definst pop-indirect (indirect-operand needs-stack)
  (parallel (assign vma (- frame-function macro-unsigned-immediate 1))
            (jump popmemind)))

(definst movem-indirect (indirect-operand needs-stack)
  (parallel (pushval top-of-stack)
            (jump pop-indirect)))
;;; List Processing

                ;This is the format-3 version, others will exist, too.
(definst car no-operand
  (parallel (check-data-type top-of-stack-a dtp-list dtp-locative dtp-nil)
            (assign vma top-of-stack-a)
            (if (data-type? top-of-stack-a dtp-nil)
                (parallel (newtop quote-nil) (next-instruction))
                (goto newtopmem))))

;Note that this assumes that the storage allocator does not allow
;a 2-word cons to lie across a page boundary.  (Or the MC does hair????---)
(definst cdr no-operand
  (parallel
    (check-data-type top-of-stack-a dtp-list dtp-locative dtp-nil)      ;[1]
    (assign vma top-of-stack-a)
    (if (data-type? top-of-stack-a dtp-nil)
        (parallel (newtop quote-nil) (next-instruction))                ;[2]
        (sequential
          (start-memory read)                                           ;[2]
          (if (data-type? top-of-stack-a dtp-locative)                  ;[3]
              (parallel (transport)                                     ;[4]
                        (newtop memory-data)
                        (next-instruction))
              (parallel
                (transport cdr)                                         ;[4]
                ;Can't do this with temporary memory control
                ;(increment-pma)
                (if (cdr-code? memory-data cdr-next)
                    (parallel
                      (newtop (set-type (1+ vma) dtp-list))             ;[5]
                      (next-instruction))
                    (parallel
                      (assign vma (1+ vma))                             ;[5]
                      (take-dispatch)))
                (dispatch-after-next (cdr-code memory-data)
                  ((cdr-nil) (parallel (newtop quote-nil)               ;[6]
                                       (next-instruction)))
                  ((cdr-normal)
                   ;Extra code inserted for temporary memory control
                   (start-memory read)          ;vma has been incremented
                   (nop)
                   ;End extra code
                   (parallel (transport)
                             (newtop memory-data)
                             (next-instruction)))
                  (otherwise (signal-error bad-cdr-code))))))))

;Cdr timings:
;  cdr of nil                  2 cycles
;  cdr of locative             4 cycles
;  cdr of list, cdr-next       5 cycles
;  cdr of list, cdr-nil        6 cycles
;  cdr of list, cdr-normal     6 cycles
;This is about as fast as it can go without using a 4-way skip,
;which would make all the list cases 5 cycles.


;This version returns no value.  Rather than provide versions that
;return one or the other of the arguments, we will just let the
;compiler worry about it.
(definst rplaca no-operand                ;format 3
  (parallel (check-data-type next-on-stack dtp-list dtp-locative)
            (assign vma next-on-stack)
            (jump rplacal)))

(defucode rplacal
  (parallel (start-memory read)
            (assign b-temp top-of-stack-a)
            (decrement-stack-pointer))
  (for-effect (popval))                   ;Adjust stack during memory wait
  (parallel (transport write)             ;Follow any forwarding pointer
            (assign a-temp                ;Merge new data with old cdr code
                (merge-cdr b-temp memory-data)))
  (parallel (store-contents a-temp)       ;Now write back the new car
            (next-instruction)))

(definst rplacd no-operand
  (parallel (check-data-type next-on-stack dtp-list dtp-locative)
            (assign vma next-on-stack)
            (if (data-type? next-on-stack dtp-locative)
```

```
                (goto rplacaif
                (drop-through)))
   (parallel (start-memory read)
             (assign a-temp top-of-stack-a)
             (decrement-stack-pointer))
   (for-effect (popval))                ;Adjust stack during memory wait
   (parallel (transport cdr)            ;Follow any forwarding pointer
             ;Can't do with temporary memory control
             ;(increment-pma)           ;Access cdr cell
             (if (cdr-code? memory-data cdr-normal)
               (sequential
                 ;Extra code inserted for temporary memory control
                 (assign vma (1+ vma))
                 (parallel              ;Note second cell not transported
                   (store-contents a-temp cdr-nil)
                   (next-instruction))
                 );extra parenthesis for temporary memory control (slow RPU)
               (drop-through)))
;; This is the abnormal case.  Trap out to macrocode to allocate a new
;; 2-word cons cell and forward the old one to it.  But first, check
;; for rplacd'ing something to nil, which we can do.
(if (not (data-type? a-temp dtp-nil))
    (take-post-trap rplacd-escape restore-stack)
    (drop-through))
(assign vma (amem (stack-pointer 1))) ;PMA was already changed, restart
(start-memory read write)
(nop)
(parallel (assign memory-data (set-cdr memory-data cdr-nil))
          (start-memory write)
          (next-instruction)))
```

F:>lmach>ucode>array.lisp.94

```
;;; -*- Mode:Lisp; Package:Micro; Base:8; Lowercase:yes -*-
;;; (c) Copyright 1982, Symbolics, Inc.

; Simple array referencing/storing microcode

; These are written assuming that AS-1 and related instructions
; are known by the compiler to destroy the TOS register.  The cases
; where this matters are both rare and easily recognized in the
; final-assembly phase; it doesn't seem worth spending either time
; or hardware to fix this architectural messiness.

; This is written assuming the presence of the mapping prom on the
; input to the R register, so that the index can be shifted right
; before adding to the base address, when accessing a byte array.
; Removing this from the hardware would simply make byte arrays one
; cycle slower.

; Note: we depend on the maximum number of bits in an array subscript
; to be 27.  This is because when LDB'ing out the word-offset part we
; have to use a fixed byte-size, and when DPB'ing the byte-offset part
; we can't afford to have bits rotated around from the high end come in
; at the bottom (this is because we have to use ROTATE rather than DPB
; due to a conflict for the magic-number field when loading BYTE-R.)
; The limitation to 27 bits is only serious for bit arrays, which can
; be a maximum of 16 megabytes long.

; We assume that instruction pclsring can set back the stack-pointer.

; I made storing into a Q-type array do a read pause write rather
; than just a write.  This costs one extra cycle, but allows there
; to be an invisible pointer in the array.  (In fact, putting an
; invisible pointer there does not work in the A machine, but I
; suspect the MAR is going to be implemented with invisible pointers
; in the L.)  This also means that Q-list arrays do not need a separate
; dispatch code.

;Get defmicro and all his hosts
#M
(declare (muzzled t)    ;bitches about haulong
         (cond ((not (status feature lmucode))
                (load 'udcls)
                (loop while nil)
                (format nil "~(~<~>~)" nil))))

;More kludges for temporary memory control
(reserve-scratchpad-memory 2430 2434)
```

```
(defareg a-memory-data)         ;Save memory-data here until we have the real
                                ;memory control which doesn't require such exquisite timing
(defareg a-array-base)          ;Used in 2-D array code
(defareg a-index-offset)        ;..

;Define the basics of the array format, see <LMARCH>DATA third page
;The definitions are in SYSDEF now.

;Set up the symbolic names of the field values for dispatching
(associate-dispatch-cues array-dispatch-field *array-dispatch-codes*)
(associate-dispatch-cues array-register-dispatch-field *array-register-dispatch-codes*)
(associate-dispatch-cues array-type-field *array-type-codes*)

;We need symbolic sources for setting up array registers
(define-enumerated-value-constants *array-register-dispatch-codes*)
(define-enumerated-value-constants *array-dispatch-codes*)

;Hardware simulation

;Given an array-dispatch-field or array-register-dispatch-field,
;generates the 40-reflected byte rotate
;which will extract the word part of the subscript.
;This is only allowed to depend on the low 3 bits of the field,
;due to PAL pinout limitations.
(defun array-index-shift-prom (dispatch)
  (nth (logand 7 dispatch) '(33 34 35 36 37 0 0 0)))
;;;--- New scheme of things ---

;;;Subroutines on this page are called to decode an array, except in the
;;;special optimized cases which are open-coded.

;;;Decode a 1-dimensional array.  Entered with the array in the vma and b-vma
;;;(it has been type-checked) and the subscript in the top-of-stack
;;;register.  Returns with the following stored off the end of the stack:
;;;     (amem (stack-pointer 1))    Control word, as used with array registers
;;;                                 This encodes the format of array elements
;;;     (amem (stack-pointer 2))    Base pointer
;;;     (amem (stack-pointer 3))    Upper bound
;;;top-of-stack contains the subscript which has been adjusted by the
;;;index-offset and lower bound, if any.  Thus this is a zero-origin
;;;subscript relative to the base pointer.  The subscript has been
;;;checked against the lower bound if it is non-zero, so that an
;;;unsigned comparison against the upper bound will do all necessary
;;;bounds checking.  top-of-stack is not copied into top-of-stack-a.
;;;Since the state is all stored off the end of the stack, this is
;;;freely pclsrable.
;;;See also array-setup-nd, for n-dimensional arrays.

;Micro to make the source code more concise
(defmicro array-setupx (type-code)
  '(parallel
     (assign (array-register-dispatch-field (amem (stack-pointer 1))) ,type-code)
     (return)))

(defucode array-setup-1d
  ;Fetch first word of array prefix
  (parallel (start-memory read)
            (assign (amem (stack-pointer 1)) array-register-event-count))
  (parallel (nop)                   ;Time for memory
            (jump array-setup-1d-a)))

;Similar but initializes the subscript in TOS to zero during free time
(defucode array-setup-1d-zero
  ;Fetch first word of array prefix
  (parallel (start-memory read)
            (assign (amem (stack-pointer 1)) array-register-event-count))
  (parallel (assign top-of-stack (set-type (b-constant 0) dtp-fix))
            (jump array-setup-1d-a)))

;Similar for when stuff has already been fetched from memory
(defucode array-setup-1d-mem
  (parallel (assign (amem (stack-pointer 1)) array-register-event-count)
            (jump array-setup-1d-a)))

(defucode array-setup-1d-a
  ;Extract length from header, assuming fast case, and dispatch on kind
  (parallel
    (declare-memory-timing data-cycle)  ;entered with cycle in progress
    (transport header)
    (assign a-memory-data memory-data)) ;temporary memory control
  (parallel
    (assign (amem (stack-pointer 3))
            (set-type (array-normal-length-field a-memory-data) dtp-fix))
    (dispatch-after-next (array-dispatch-field a-memory-data)
      ((%array-dispatch-1-bit) (array-setupx %array-register-dispatch-1-bit))
      ((%array-dispatch-2-bit) (array-setupx %array-register-dispatch-2-bit))
      ((%array-dispatch-4-bit) (array-setupx %array-register-dispatch-4-bit))
      ((%array-dispatch-8-bit) (array-setupx %array-register-dispatch-8-bit))
      ((%array-dispatch-16-bit) (array-setupx %array-register-dispatch-16-bit))
      ((%array-dispatch-word) (array-setupx %array-register-dispatch-word))
      ((%array-dispatch-boolean) (array-setupx %array-register-dispatch-boolean))
```

```
      ((%array-dispatch-leader) array-setup-with-leader)  ;Short array with leader
      ((%array-dispatch-short-indirect) array-setup-short-indirect) ;Displaced or indirect
      ((%array-dispatch-long) array-setup-long)         ;General long form
      (otherwise (signal-error unimplemented-or-illegal-array-type))))
  ;Set basepointer to word containing first array element, assuming fast case
  (parallel (assign (amem (stack-pointer 2))
                    (set-type (1+ vma) dtp-locative))
            (take-dispatch)))

(defucode array-setup-with-leader
  ;Find the correct length and base address, dispatch on type
  (assign b-temp-2                  ;Can't overlap this due to # conflict
          (+ b-vma (array-leader-length-field a-memory-data) 1))
    ;--- Above conflict might be fixed by exploiting the fact(?)
    ;--- that b-vma already contains a dtp-locative tag, so that
    ;--- we need only set the high part of the type field.
    ;--- Would have to add a new macro for this.
  (parallel
    (assign (amem (stack-pointer 3))
            (set-type (array-short-length-field a-memory-data) dtp-fix))
    (dispatch-after-next (array-type-field a-memory-data)
      ((art-1b) (array-setupx %array-register-dispatch-1-bit))
      ((art-2b) (array-setupx %array-register-dispatch-2-bit))
      ((art-4b) (array-setupx %array-register-dispatch-4-bit))
      ((art-8b art-string) (array-setupx %array-register-dispatch-8-bit))
      ((art-16b art-fat-string) (array-setupx %array-register-dispatch-16-bit))
      ((art-q art-q-list) (array-setupx %array-register-dispatch-word))
      ((art-boolean) (array-setupx %array-register-dispatch-boolean))
      (otherwise (signal-error unimplemented-or-illegal-array-type))))
  (parallel
    (assign (amem (stack-pointer 2))
            (set-type b-temp-2 dtp-locative))
    (take-dispatch)))

(defucode array-setup-short-indirect
  ;Error if negative subscript
  (parallel
    (error-if (minus-fixnum top-of-stack) illegal-subscript)
    (assign b-temp a-memory-data))               ;To free up AMWA in cycle after next
  ;Get the length
  (assign (amem (stack-pointer 3))
          (set-type (array-short-indirect-length-field a-memory-data)
                    dtp-fix))
  ;Get the index offset and add it in to the subscript and upper bound
  (parallel     ;This instruction can't be flushed, t-o-s .ne. t-o-s-a
    (assign a-temp (array-short-indirect-offset-field b-temp))
    (assign b-temp obus))
  (assign (amem (stack-pointer 3))
          (set-type (+ (amem (stack-pointer 3)) b-temp) dtp-fix))
  (assign top-of-stack
          (set-type (+ a-temp top-of-stack) dtp-fix))
  ;Advance to second word of prefix (indirect pointer or displace
  ;address), and copy first word for dispatch in next cycle
  (parallel
    (assign b-temp-2 a-memory-data)
    ;temporary memory control can't do this
    ;(increment-pma)
    )
  ;For temporary memory control, read second word the slow way
  (assign vma (1+ vma))
  (start-memory read)
  (nop)
  (assign a-memory-data memory-data)     ;temporary memory control
  ;Decide whether displaced or indirect.  dispatch assuming displaced.
  (parallel
    (if (data-type? a-memory-data dtp-locative dtp-fix)
        (parallel (assign (amem (stack-pointer 2)) a-memory-data)
                  (take-dispatch))
        (parallel (assign (amem (stack-pointer 2)) a-memory-data)
                  (call-and-dispatch-upon-return array-setup-1d-indirect)))
    (dispatch-after-next (array-type-field b-temp-2)
      ((art-1b) (array-setupx %array-register-dispatch-1-bit))
      ((art-2b) (array-setupx %array-register-dispatch-2-bit))
      ((art-4b) (array-setupx %array-register-dispatch-4-bit))
      ((art-8b art-string) (array-setupx %array-register-dispatch-8-bit))
      ((art-16b art-fat-string) (array-setupx %array-register-dispatch-16-bit))
      ((art-q art-q-list) (array-setupx %array-register-dispatch-word))
      ((art-boolean) (array-setupx %array-register-dispatch-boolean))
      (otherwise (signal-error unimplemented-or-illegal-array-type)))))

(defucode array-setup-long
  ;Rewrite this code later when temporary memory control is flushed
  ;Advance to second word of prefix (indirect pointer/base address)
  ;and copy first word for later dispatch.  b-temp must be left around for 2d-array-index
  (parallel
    (assign b-temp a-memory-data)
    ;temporary memory control can't do this
    ;(increment-pma)
    )
  ;For temporary memory control, read second word the slow way
  (assign vma (1+ vma))
```

```
(start-memory read)
(nop)
;Decide whether it's indirect pointer or base address and stash it
(parallel
  (assign (amem (stack-pointer 2)) memory-data)
  (if (data-type? memory-data dtp-locative dtp-fix)
      ;In this case there is no index offset
      (sequential
        ;Get the length the slow way
        (assign vma (1+ vma))
        (start-memory read)
        (dispatch-after-next (array-type-field b-temp)
          ((art-1b) (array-setupx %array-register-dispatch-1-bit))
          ((art-2b) (array-setupx %array-register-dispatch-2-bit))
          ((art-4b) (array-setupx %array-register-dispatch-4-bit))
          ((art-8b art-string) (array-setupx %array-register-dispatch-8-bit))
          ((art-16b art-fat-string) (array-setupx %array-register-dispatch-16-bit))
          ((art-q art-q-list) (array-setupx %array-register-dispatch-word))
          ((art-boolean) (array-setupx %array-register-dispatch-boolean))
          (otherwise (signal-error unimplemented-or-illegal-array-type)))
        (parallel
          (assign (amem (stack-pointer 3)) memory-data)
          (take-dispatch)))
      ;Indirect case, with index offset
      (sequential
        ;Get the length the slow way
        (assign vma (1+ vma))
          (start-memory read)
          ;Error if negative subscript
          (error-if (minus-fixnum top-of-stack) illegal-subscript)
          (assign b-temp-2 memory-data)
          ;Get the index offset and add it in to the subscript and upper bound
          (assign vma (1+ vma))
          (start-memory read)
          (nop)
          (assign a-memory-data memory-data)
          (assign (amem (stack-pointer 3))
                  (set-type (+ a-memory-data b-temp-2) dtp-fix))
          (dispatch-after-next (array-type-field b-temp)
            ((art-1b) (array-setupx %array-register-dispatch-1-bit))
            ((art-2b) (array-setupx %array-register-dispatch-2-bit))
            ((art-4b) (array-setupx %array-register-dispatch-4-bit))
            ((art-8b art-string) (array-setupx %array-register-dispatch-8-bit))
            ((art-16b art-fat-string) (array-setupx %array-register-dispatch-16-bit))
            ((art-q art-q-list) (array-setupx %array-register-dispatch-word))
            ((art-boolean) (array-setupx %array-register-dispatch-boolean))
            (otherwise (signal-error unimplemented-or-illegal-array-type)))
          (parallel
            (assign top-of-stack
                    (set-type (+ a-memory-data top-of-stack) dtp-fix))
            (call-and-dispatch-upon-return array-setup-1d-indirect))))))

;This is a modified version of the above (array-setup-1d-a) which handles the
;recursion into a short-indirect array.  We only want the corrected
;base address and any associated index offset.
;The A-machine sometimes checks the length of the two arrays
;against each other; we will never do that and assume things
;were correctly set up by make-array, and that no one adjusts
;the size of an indirected-to array downward.  The check is
;very difficult when the array types differ.
(defucode array-setup-1d-indirect
  (parallel (check-arg-type array (amem (stack-pointer 2)) dtp-array)
            (assign vma (amem (stack-pointer 2)))
            (assign b-vma (amem (stack-pointer 2))))
  ;Fetch first word of array prefix
  (parallel (start-memory read)
            (assign (amem (stack-pointer 1)) array-register-event-count))
  (nop)                                    ;Time for memory
  ;Dispatch on kind
  (parallel
    (transport header)
    (assign a-memory-data memory-data)          ;temporary memory control
    (dispatch-after-next (array-dispatch-field memory-data)
      ((%array-dispatch-1-bit %array-dispatch-2-bit %array-dispatch-4-bit
        %array-dispatch-8-bit %array-dispatch-16-bit %array-dispatch-word
        %array-dispatch-boolean) (return))       ;Arrays of the first kind
      ((%array-dispatch-short-2d) (return))      ;Base address same as first kind
      ((%array-dispatch-leader)                  ;Short array with leader
       ;Adjust base address
       (assign b-temp-2          ;Can't overlap this due to # conflict
             (+ b-vma (array-leader-length-field a-memory-data) 1))
       (parallel
         (assign (amem (stack-pointer 2))
                 (set-type b-temp-2 dtp-locative))
         (return)))
      ((%array-dispatch-short-indirect)          ;Displaced or indirect
       ;Error if negative subscript
       (parallel
         (error-if (minus-fixnum top-of-stack) illegal-subscript)
         (assign b-temp-2 a-memory-data))                ;To free up AMWA in next cycle
       ;Get the index offset and add it in to the subscript and upper bound
```

```
(parallel
  (assign a-temp (array-short-indirect-offset-field b-temp-2))
  (assign b-temp-2 obus))
(assign (amem (stack-pointer 3))
        (set-type (+ (amem (stack-pointer 3)) b-temp-2) dtp-fix))
(parallel
  (assign top-of-stack (set-type (+ a-temp top-of-stack) dtp-fix))
  ;temporary memory control can't do this
  ;(increment-pma)
  )
;For temporary memory control, read second word the slow way
(assign vma (1+ vma))
(start-memory read)
(nop)
;Decide whether displaced or indirect.
(parallel
  (assign a-memory-data memory-data)     ;temporary memory control
  (if (data-type? memory-data dtp-locative dtp-fix)
      (parallel (assign (amem (stack-pointer 2)) a-memory-data)
                (return))
      (parallel (assign (amem (stack-pointer 2)) a-memory-data)
                (jump array-setup-1d-indirect)))))       ;Indirect, loop
((%array-dispatch-long %array-dispatch-long-multidimensional)     ;General long form
 ;Note that we don't care how many dimensions the indirected-to array has.
 ;Rewrite this code later when temporary memory control is flushed
 ;Advance to second word of prefix (indirect pointer/base address)
   ;temporary memory control can't do this
   ;(increment-pma)
 ;For temporary memory control, read second word the slow way
 (assign vma (1+ vma))
 (start-memory read)
 (nop)
 ;Decide whether it's indirect pointer or base address and stash it
 (parallel
   (assign (amem (stack-pointer 2)) memory-data)
   (if (data-type? memory-data dtp-locative dtp-fix)
       ;In this case there is no index offset
       (sequential
         ;Get the length the slow way
         (assign vma (1+ vma))
         (start-memory read)
         (nop)
         (parallel
           (assign (amem (stack-pointer 3)) memory-data)
           (return)))
       ;Indirect case, with index offset
       (sequential
         ;Get the length the slow way
         (assign vma (1+ vma))
         (start-memory read)
         ;Error if negative subscript
         (error-if (minus-fixnum top-of-stack) illegal-subscript)
         (assign b-temp-2 memory-data)
         ;Get the index offset and add it in to the subscript and upper bound
         (assign vma (1+ vma))
         (start-memory read)
         (nop)
         (assign a-memory-data memory-data)
         (assign (amem (stack-pointer 3))
                 (set-type (+ a-memory-data b-temp-2) dtp-fix))
         (parallel
           (assign top-of-stack
                   (set-type (+ a-memory-data top-of-stack) dtp-fix))
           (jump array-setup-1d-indirect))))))
(otherwise (signal-error unimplemented-or-illegal-array-type))))
;Set basepointer to word containing first array element, assuming fast case
(parallel (assign (amem (stack-pointer 2))
                  (set-type (1+ vma) dtp-locative))
          (take-dispatch)))

;Set up an array leader as a "Q" array.  If no leader, make it zero
;long since some things call this to test for the presence of a leader.
;Things that really want a leader will then get an error.
;top-of-stack is not touched, since indirection and offset don't
;apply to leaders.
(defucode array-setup-leader
  ;Fetch first word of array prefix
  (parallel (start-memory read)
            (assign (amem (stack-pointer 1)) array-register-event-count))
  ;Set up type as Q
  (assign (array-register-dispatch-field (amem (stack-pointer 1)))
          %array-register-dispatch-word)
  ;Dispatch on kind
  (parallel
    (transport header)
    (assign b-temp memory-data)
    ;Initialize length to zero, assuming no leader is present
    (assign (amem (stack-pointer 3)) (set-type (b-constant 0) dtp-fix))
    (dispatch-after-next (array-dispatch-field memory-data)
      ((%array-dispatch-1-bit %array-dispatch-2-bit %array-dispatch-4-bit
        %array-dispatch-8-bit %array-dispatch-16-bit %array-dispatch-word
```

```
     %array-dispatch-boolean) (return))         ;Arrays of the first kind
    ((%array-dispatch-leader)                   ;Short array with leader
     (parallel
       (assign (amem (stack-pointer 3))
               (set-type (array-leader-length-field b-temp) dtp-fix))
       (return)))
    ((%array-dispatch-short-indirect %array-dispatch-short-2d) (return))  ;no leader
    ((%array-dispatch-long %array-dispatch-long-multidimensional)
     (assign (amem (stack-pointer 3))            ;Long array, may have leader
             (set-type (array-long-leader-length-field b-temp) dtp-fix))
     (parallel
       (assign (amem (stack-pointer 2))
               (set-type (+ vma (array-long-prefix-length-field b-temp)) dtp-fix))
       (return)))
    (otherwise (signal-error unimplemented-or-illegal-array-type))))
  ;Set basepointer to word containing first leader element, assuming fast case
  (parallel (assign (amem (stack-pointer 2))
                    (set-type (1+ vma) dtp-locative))
            (take-dispatch)))

;Setup an array as if it were 1-dimensional, no matter how many dimensions
;it really has
(defucode array-setup-force-1d
  ;Fetch first word of array prefix
  (parallel (start-memory read)
            (assign (amem (stack-pointer 1)) array-register-event-count))
  (nop)                      ;time for memory
  ;Extract length from header, assuming fast case, and dispatch on kind
  (parallel
    (declare-memory-timing data-cycle)  ;entered with cycle in progress
    (transport header)
    (assign a-memory-data memory-data)) ;temporary memory control
  (parallel
    (assign (amem (stack-pointer 3))
            (set-type (array-normal-length-field a-memory-data) dtp-fix))
    (dispatch-after-next (array-dispatch-field a-memory-data)
      ((%array-dispatch-1-bit) (array-setupx %array-register-dispatch-1-bit))
      ((%array-dispatch-2-bit) (array-setupx %array-register-dispatch-2-bit))
      ((%array-dispatch-4-bit) (array-setupx %array-register-dispatch-4-bit))
      ((%array-dispatch-8-bit) (array-setupx %array-register-dispatch-8-bit))
      ((%array-dispatch-16-bit) (array-setupx %array-register-dispatch-16-bit))
      ((%array-dispatch-word) (array-setupx %array-register-dispatch-word))
      ((%array-dispatch-boolean) (array-setupx %array-register-dispatch-boolean))
      ((%array-dispatch-leader) array-setup-with-leader)  ;Short array with leader
      ((%array-dispatch-short-indirect) array-setup-short-indirect) ;Displaced or indirect
      ((%array-dispatch-long %array-dispatch-long-multidimensional) array-setup-long)
      ((%array-dispatch-short-2d) array-setup-short-2d-as-1d)
      (otherwise (signal-error unimplemented-or-illegal-array-type))))
  ;Set basepointer to word containing first array element, assuming fast case
  (parallel (assign (amem (stack-pointer 2))
                    (set-type (1+ vma) dtp-locative))
            (take-dispatch)))

(defucode array-setup-short-2d-as-1d
  ;; Must compute length by multiplication
  (assign b-temp (array-columns-field a-memory-data))
  (write-mpy-x b-temp unsigned)
  (assign b-temp (dpb a-memory-data 9 16. 0))   ;array-rows-field in left half
  (write-mpy-y-from-high b-temp unsigned)
  (dispatch-after-next (array-type-field a-memory-data)
    ((art-1b) (array-setupx %array-register-dispatch-1-bit))
    ((art-2b) (array-setupx %array-register-dispatch-2-bit))
    ((art-4b) (array-setupx %array-register-dispatch-4-bit))
    ((art-8b art-string) (array-setupx %array-register-dispatch-8-bit))
    ((art-16b art-fat-string) (array-setupx %array-register-dispatch-16-bit))
    ((art-q art-q-list) (array-setupx %array-register-dispatch-word))
    ((art-boolean) (array-setupx %array-register-dispatch-boolean))
    (otherwise (signal-error unimplemented-or-illegal-array-type)))
  (parallel
    (assign (amem (stack-pointer 3)) (set-type mpy-product dtp-fix))
    (take-dispatch)))

;;; 1-dimensional array-accessing instructions

;Format 3: Array and subscript on the stack
(definst ar-1 (no-operand needs-stack)
  ;First step is to check operand types and fetch array header
  (parallel (check-arg-type array next-on-stack dtp-array)
            (assign vma next-on-stack)
            (assign b-vma next-on-stack))
  (parallel (start-memory read)
            (check-arg-type subscript top-of-stack-a dtp-fix)
            (jump ar-1-common)))

;Format 1: Array on the stack, subscript as unsigned immediate argument
(definst ar-1-immed unsigned-immediate-operand
  ;First step is to check operand types and fetch array header
  (parallel (check-arg-type array top-of-stack-a dtp-array)
            (assign vma top-of-stack-a)
            (assign b-vma top-of-stack-a))
  (parallel (start-memory read)
```

```
        (pushval macro-unsigned-immediate)
        (jump ar-1-common)))

;Format 2: Array on the stack, subscript in local variable
(definst ar-1-local address-operand
  ;First step is to check operand types and fetch array header
  (parallel (check-arg-type array top-of-stack-a dtp-array)
            (assign vma top-of-stack-a)
            (assign b-vma top-of-stack-a))
  (parallel (start-memory read)
            (check-arg-type subscript address-operand dtp-fix)
            (pushval address-operand)
            (jump ar-1-common)))

;This micro is used inside the dispatch table below.  Must be defined
;first due to 1-pass microcompiler.
(defmicro ar-1-ucode (byte-size &optional boolean-hack (bounds 'a-temp))
  '(array-ucode-read ,byte-size ,boolean-hack top-of-stack ,bounds pop2push))

;This is the version for the slow case
(defmicro ar-1-hair (byte-size &optional boolean-hack (bounds '(amem (stack-pointer 3))))
  '(array-ucode-read ,byte-size ,boolean-hack top-of-stack ,bounds pop2push))

;Microcode shared with array registers, see below
(defmicro array-ucode-read (byte-size boolean-hack index bounds result)
 '(sequential
   ;Run the memory, start read, check bounds
   (parallel
     (start-memory read)
     ,@(and bounds
            '((check-fixnum-b ,index)           ;Error if bad
              (error-if (lesser-or-equal-fixnum-unsigned ,bounds ,index)
                        illegal-subscript))))
   ;Set up byte-r register from low bits of index
   ,(if (eq byte-size 'Word) '(nop)
       '(assign byte-r
                (- (a-constant 40)
                   (rotate ,index ,(1- (haulong byte-size)))
                   ;(dpb ,index                          ;byte source
                   ;     ,(- 6 (haulong byte-size))      ;ss
                   ;     ,(1- (haulong byte-size))       ;pp
                   ;     0)                              ;no merge
                   )))

   ;Extract answer and return it as result of instruction
   ,(if (not boolean-hack)
       '(parallel (transport data)      ;Even if byte, in case of MAR invz
                  (,result
                   ,(if (eq byte-size 'Word)
                        'memory-data
                        '(set-type (ldb memory-data ,byte-size byte-r)
                                   dtp-fix)))
                  (next-instruction))
       '(if (ldb-bit-test memory-data byte-r)
            (parallel (,result quote-t) (next-instruction))
            (parallel (,result quote-nil) (next-instruction))))))

;Common microcode for all AR-1 instructions
;Memory is reading array header.  top-of-stack register has subscript.
;Weird hacks:
;There are two arguments on the stack (in some cases one was put there bogusly
; and must be popped off again if we pcler out).
;array-index-shift-prom is a function of current dispatch
; and gives the proper left rotation to extract the word part
; of the index.
;The byte length for the word part of the index is 27.  This
; makes the maximum array size 1/2 of virtual memory, which is plenty.

(defucode ar-1-common
  (parallel (nop)                                   ;Time for memory cycle
            (declare-memory-timing active-cycle))
  ;Extract length from header, assuming fast case
```

The machine also provides several special-case dispatches, which were added to speed up various critical operations. The dispatch-after-next micro recognizes these automatically; they need *not* be *programmed specially*. When one of the special-case fields of the Abus is dispatched upon, the byte-extraction hardware is left free, allowing a different byte to be operated on simultaneously, or avoiding the usurpation of microinstruction fields used to control both byte extraction and other things. See the hardware documentation for a list of the special-case fields.

take–dispatch *Micro* dispatch–after–next only takes effect if take–dispatch is executed in the following cycle. In the hardware, dispatching works by storing the address of the selected clause in the NPC register, and take–dispatch means to take the next microinstruction from the address in the NPC.

long–dispatch *address* *Micro*

Jump to the control-memory address given by the low 14 bits of the datum, *address*. The address is stored in the NPC register and the jump only happens if take–dispatch is used in the following cycle. long–dispatch allows dispatches on more than 4 bits to be done, although usually more slowly. Currently the dispatch clauses must be defined with defucode–at–loc.

5.4 Traps trap–if *predicate true* *Micro*

If *predicate* is true, take the next microinstruction from *true*; otherwise take the next microinstruction normally (either from the normal successor or under the control of any other flow-of-control micros done in parallel). The *true* clause is exactly like an if clause (of course (drop–through) is almost useless here).

The difference between trap–if and if is threefold: It is legal to do trap–if in parallel with other flow-of-control micros, most commonly next–instruction. If the *predicate* is true, the side-effects of the current microinstruction are suppressed. If the trap is taken, the current microinstruction takes twice as long to execute as it normally would.

A very important thing to note is that trapping pushes the NPC register onto the microcode subroutine stack. Thus trap–if is not equivalent to an if and a goto. The trap handler should either discard the saved NPC by using the trap–no–save micro, or use the trap–save micro to save the rest of the machine state (the CPC), in which case the trap–restore micro may be used to retry the trapped microinstruction.

Traps are used to program exception cases while allowing the normal case to run at maximum speed, with no overhead for checking for the exception.

```
;Dispatch to appropriate accessing routine
(parallel (transport header)
          (assign a-temp (array-normal-length-field memory-data))
          (assign byte-r array-index-shift-prom)
          (dispatch-after-next (array-dispatch-field memory-data)
            ((%array-dispatch-1-bit) (ar-1-ucode 1))
            ((%array-dispatch-2-bit) (ar-1-ucode 2))
            ((%array-dispatch-4-bit) (ar-1-ucode 4))
            ((%array-dispatch-8-bit) (ar-1-ucode 8))
            ((%array-dispatch-16-bit) (ar-1-ucode 16.))
            ((%array-dispatch-word) (ar-1-ucode Word))
            ((%array-dispatch-boolean) (ar-1-ucode 1 t))
            ((%array-dispatch-leader) (goto ar-1-with-leader))
            ((%array-dispatch-short-indirect) (goto ar-1-hair))       ;all others
            ((%array-dispatch-long) (goto ar-1-hair))
            (otherwise (signal-error unimplemented-or-illegal-array-type))))
;Set VMA to word containing array element, assuming fast case,
;but leave B-VMA pointing to the original array header.
(parallel (assign vma (+ vma (ldb top-of-stack 27. byte-r) 1))
          (take-dispatch)))

;AR-1 of a short 1-dimensional array that has a leader.
;3 cycles slower than fast case
(defucode ar-1-with-leader
  ;For temporary memory control, must retrieved goddamn memory data
  ;which there weren't the data paths to save earlier
  (assign vma b-vma)
  (start-memory read)
  (nop)
  (assign a-memory-data memory-data)
  ;Point vma at the first data word in the array
  (assign vma a-memory-data)  ;Kludge for temporary memory control (field overlap)
  (assign vma (+ (array-leader-length-field vma) b-vma 1))
```

```
 ;Dispatch on the array type field
 (parallel (assign a-temp (array-short-length-field a-memory-data))
           (assign byte-r array-index-shift-prom)
           (dispatch-after-next (array-type-field a-memory-data)
             ((art-1b) (ar-1-ucode 1))
             ((art-2b) (ar-1-ucode 2))
             ((art-4b) (ar-1-ucode 4))
             ((art-8b art-string) (ar-1-ucode 8))
             ((art-16b art-fat-string) (ar-1-ucode 16.))
             ((art-q art-q-list) (ar-1-ucode Word))
             ((art-boolean) (ar-1-ucode 1 t))
             (otherwise (signal-error unimplemented-or-illegal-array-type))))
 ;Point vma at the addressed data word
 (parallel (assign vma (+ vma (ldb top-of-stack 27. byte-r)))
           (take-dispatch)))

;Hairier cases of AR-1.
(defucode ar-1-hair
  (parallel (assign vma b-vma)                    ;Find out everything about this array
            (call-and-return-to array-setup-1d ar-1-hair-a)))

(defucode ar-1-hair-a
  (parallel
    (assign byte-r array-index-shift-prom)
    (dispatch-after-next
          (array-register-dispatch-field (amem (stack-pointer 1)))
      ((%array-register-dispatch-1-bit) (ar-1-hair 1))
      ((%array-register-dispatch-2-bit) (ar-1-hair 2))
      ((%array-register-dispatch-4-bit) (ar-1-hair 4))
      ((%array-register-dispatch-8-bit) (ar-1-hair 8))
      ((%array-register-dispatch-16-bit) (ar-1-hair 16.))
      ((%array-register-dispatch-word) (ar-1-hair Word))
      ((%array-register-dispatch-boolean) (ar-1-hair 1 t))
      (otherwise (signal-error unimplemented-or-illegal-array-type))))
   ;Set the VMA
   (parallel
     (assign vma (+ (amem (stack-pointer 2)) (ldb top-of-stack 27. byte-r)))
     (take-dispatch)))
;1-dimensional array-storing instructions

;Format 3: Value, array, and subscript on the stack
(definst as-1 (no-operand needs-stack smashes-stack)
  ;First step is to check operand types and fetch array header
  (parallel (check-arg-type array next-on-stack dtp-array)
            (assign vma next-on-stack)
            (assign b-vma next-on-stack))
  (parallel (start-memory read)
            (check-arg-type subscript top-of-stack-a dtp-fix)
            (jump as-1-common)))

;Format 1: Value and array on the stack, subscript as unsigned immediate
(definst as-1-immed (unsigned-immediate-operand smashes-stack)
  ;First step is to check operand types and fetch array header
  (parallel (check-arg-type array top-of-stack-a dtp-array)
            (assign vma top-of-stack-a)
            (assign b-vma top-of-stack-a))
  (parallel (start-memory read)
            (pushval macro-unsigned-immediate)
            (jump as-1-common)))

;Format 2: Value and array on the stack, subscript in local variable
(definst as-1-local (address-operand smashes-stack)
  ;First step is to check operand types and fetch array header
  (parallel (check-arg-type array top-of-stack-a dtp-array)
            (assign vma top-of-stack-a)
            (assign b-vma top-of-stack-a))
  (parallel (start-memory read)
            (check-arg-type subscript address-operand dtp-fix)
            (pushval address-operand)
            (jump as-1-common)))

;This micro is used inside the dispatch table below.  Must be defined
;first due to 1-pass microcompiler.
;Note that since there are three values on the stack and
;we don't return any values the stack-pointer gets decremented three times.
(defmicro as-1-ucode (byte-size &optional boolean-hack (bounds 'a-temp))
 `(parallel
    (decrement-stack-pointer)
    (array-ucode-write ,byte-size ,boolean-hack top-of-stack
                       ,bounds next-on-stack))) ;after stack-pointer decremented

;This is the version for the slow case
;--- This biter has to know that bounds checking in array-ucode-write
;--- happens in the first microcycle, hence *BEFORE* the
;--- decrement-stack-pointer that is done in parallel.
(defmicro as-1-hair (byte-size &optional boolean-hack (bounds '(amem (stack-pointer 3))))
 `(parallel
    (decrement-stack-pointer)
    (array-ucode-write ,byte-size ,boolean-hack top-of-stack
                       ,bounds next-on-stack)))        ;..
```

```
;Common microcode with array registers, see below
(defmicro array-ucode-write (byte-size boolean-hack index bounds value)
 `(sequential
   ;Run the memory, start read of word to be stored into, check bounds and subscript type
   ;Note: page fault can happen later, when write-data stored
   ;We can't check write-access here due to conflict for spec field
   (parallel
     (start-memory read)
     ,@(and bounds
            `((check-fixnum-b ,index)               ;Error if bad
              (error-if (lesser-or-equal-fixnum-unsigned ,bounds ,index)
                        illegal-subscript))))
   (parallel
     ;Get value to be stored into b-temp if numeric, a-temp if pointer
     ;Next line commented out, see "Okay, I give in" below.
     ;(assign ,(if (eq byte-size 'Word) 'a-temp 'b-temp) ,value)
     (assign b-temp ,value)
     ;Type-check value if byte array
     ,(if (and (neq byte-size 'Word) (not boolean-hack))
          `(check-arg-type 0 ,value dtp-fix))
     ;If boolean array, take extra cycle to get desired store data
     ,(if boolean-hack
          `(if (data-type? ,value dtp-nil)
               (assign b-temp (b-constant 0))
               (assign b-temp (b-constant 1))))
     ;Set up byte-r register from low bits of index
     ,(if (neq byte-size 'Word)
          `(assign byte-r
                   (rotate ,index ,(1- (haulong byte-size)))
                   ;(dpb ,index                              ;byte source
                   ;     ,(- 6 (haulong byte-size))          ;ss
                   ;     ,(1- (haulong byte-size))           ;pp
                   ;     0)                                  ;no merge
                   ))
     (decrement-stack-pointer))
   ;Merge result into word read from memory and write it back.
   (parallel ,(if (eq byte-size 'Word)
                  `(sequential
                      ;Okay, I give in.  Take an extra cycle.  This allows transporting
                      ;in order to make it possible to set the MAR in an array, and also
                      ;makes it possible to preserve the cdr-code, for art-q-list arrays.
                      ;(MC ABUS to cdr-code feature could be used to preserve the cdr-code
                      ;for arrays that are known not to be in A-memory)
                      ;--- Maybe consider changing this back?
                      ;--- Maybe an extra dispatch code which MARs an entire array?
                      (parallel (transport write)
                                (assign a-temp (merge-cdr b-temp memory-data)))
                      (store-contents a-temp))
                  `(assign memory-data
                           (merge-cdr (set-type (dpb b-temp
                                                     ,byte-size
                                                     byte-r
                                                     memory-data)
                                                dtp-fix)
                                      memory-data)))
             (start-memory write)
             (decrement-stack-pointer)
             (next-instruction))))

;Common processing for AS-1.
;Value, array, and subscript on the stack, array header being fetched.
(defucode as-1-common
  (parallel (nop)                                   ;Time for memory cycle
            (declare-memory-timing active-cycle))
  ;Extract length from header, assuming fast case
  ;Dispatch to appropriate storing routine
  (parallel (transport header)
            (assign a-temp (array-normal-length-field memory-data))
            (assign byte-r array-index-shift-prom)
            (dispatch-after-next (array-dispatch-field memory-data)
              ((%array-dispatch-1-bit) (as-1-ucode 1))
              ((%array-dispatch-2-bit) (as-1-ucode 2))
              ((%array-dispatch-4-bit) (as-1-ucode 4))
              ((%array-dispatch-8-bit) (as-1-ucode 8))
              ((%array-dispatch-16-bit) (as-1-ucode 16.))
              ((%array-dispatch-word) (as-1-ucode Word))
              ((%array-dispatch-boolean) (as-1-ucode 1 t))
              ((%array-dispatch-leader) (goto as-1-with-leader))
              ((%array-dispatch-short-indirect) (goto as-1-hair))       ;all others
              ((%array-dispatch-long) (goto as-1-hair))
              (otherwise (signal-error unimplemented-or-illegal-array-type))))
  ;Set VMA to word containing array element, assuming fast case,
  ;but leave B-VMA pointing at the original array header.
  (parallel (assign vma (+ vma (ldb top-of-stack 27. byte-r) 1))
            (take-dispatch)))

;AS-1 of a short 1-dimensional array that has a leader.
;3 cycles slower than fast case
(defucode as-1-with-leader
  ;For temporary memory control, must retrieved goddamn memory data
  ;which there weren't the data paths to save earlier
```

```
  (assign vma b-vma)
  (start-memory read)
  (nop)
  (assign a-memory-data memory-data)
  ;Point vma at the first data word in the array
  (assign vma a-memory-data)  ;Kludge for temporary memory control (field overlap)
  (assign vma (+ (array-leader-length-field vma) b-vma 1))
  ;Dispatch on the array type field
  (parallel (assign a-temp (array-short-length-field a-memory-data))
            (assign byte-r array-index-shift-prom)
            (dispatch-after-next (array-type-field a-memory-data)
              ((art-1b) (as-1-ucode 1))
              ((art-2b) (as-1-ucode 2))
              ((art-4b) (as-1-ucode 4))
              ((art-8b art-string) (as-1-ucode 8))
              ((art-16b art-fat-string) (as-1-ucode 16.))
              ((art-q art-q-list) (as-1-ucode Word))
              ((art-boolean) (as-1-ucode 1 t))
              (otherwise (signal-error unimplemented-or-illegal-array-type))))
  ;Point VMA at the addressed data word
  (parallel (assign vma (+ vma (ldb top-of-stack 27. byte-r)))
            (take-dispatch)))

;Hairier cases of AS-1.
(defucode as-1-hair
  (parallel (assign vma b-vma)                    ;Find out everything about this array
            (call-and-return-to array-setup-1d as-1-hair-a)))

(defucode as-1-hair-a
  (parallel
    (assign byte-r array-index-shift-prom)
    (dispatch-after-next
          (array-register-dispatch-field (amem (stack-pointer 1)))
      ((%array-register-dispatch-1-bit) (as-1-hair 1))
      ((%array-register-dispatch-2-bit) (as-1-hair 2))
      ((%array-register-dispatch-4-bit) (as-1-hair 4))
      ((%array-register-dispatch-8-bit) (as-1-hair 8))
      ((%array-register-dispatch-16-bit) (as-1-hair 16.))
      ((%array-register-dispatch-word) (as-1-hair Word))
      ((%array-register-dispatch-boolean) (as-1-hair 1 t))
      (otherwise (signal-error unimplemented-or-illegal-array-type))))
  ;Set the VMA
  (parallel
     (assign vma (+ (amem (stack-pointer 2))
                    (ldb top-of-stack 27. byte-r)))
     (take-dispatch)))
;;; Array leaders

;Format 1: Array on the stack, subscript as unsigned immediate argument
(definst array-leader-immed unsigned-immediate-operand
  (parallel (check-arg-type array top-of-stack-a dtp-array)
            (assign vma top-of-stack-a)
            (assign b-vma top-of-stack-a)
            (call array-setup-leader))
  (assign vma (+ (amem (stack-pointer 2)) macro-unsigned-immediate))
  (array-ucode-read Word nil macro-unsigned-immediate
                    (amem (stack-pointer 3)) newtop))

;Format 3: Array and subscript on the stack
(definst array-leader (no-operand needs-stack)
  (parallel (check-arg-type array next-on-stack dtp-array)
            (assign vma next-on-stack)
            (assign b-vma next-on-stack)
            (call array-setup-leader))
  (assign vma (+ (amem (stack-pointer 2)) top-of-stack))
  (array-ucode-read Word nil top-of-stack (amem (stack-pointer 3)) pop2push))

;Format 3: Value, array, and subscript on the stack
(definst store-array-leader (no-operand needs-stack smashes-stack)
  (parallel (check-arg-type array next-on-stack dtp-array)
            (assign vma next-on-stack)
            (assign b-vma next-on-stack)
            (call array-setup-leader))
  (parallel (decrement-stack-pointer)
            (assign vma (+ (amem (stack-pointer 2)) top-of-stack)))
  (array-ucode-write Word nil top-of-stack (amem (stack-pointer 4)) next-on-stack))

;Format 1: Value and array on the stack, subscript as unsigned immediate
(definst store-array-leader-immed (unsigned-immediate-operand smashes-stack)
  (parallel (check-arg-type array top-of-stack-a dtp-array)
            (assign vma top-of-stack-a)
            (assign b-vma top-of-stack-a)
            (call array-setup-leader))
  (assign vma (+ (amem (stack-pointer 2)) macro-unsigned-immediate))
  (array-ucode-write Word nil macro-unsigned-immediate
                     (amem (stack-pointer 3)) next-on-stack))
;;; Accessing of arbitrary arrays as if they were 1-dimensional, and ALOC

(definst %1d-aref (no-operand needs-stack)
  ;First step is to check operand types and fetch array header
```

```
  (parallel (check-arg-type array next-on-stack dtp-array)
            (assign vma next-on-stack)
            (assign b-vma next-on-stack)
            (call-and-return-to array-setup-force-1d ar-1-hair-a)))

(definst %1d-aset (no-operand needs-stack smashes-stack)
  (parallel (check-arg-type array next-on-stack dtp-array)
            (assign vma next-on-stack)
            (assign b-vma next-on-stack)
            (call-and-return-to array-setup-force-1d as-1-hair-a)))

(definst %1d-aloc (no-operand needs-stack)
  (parallel (check-arg-type array next-on-stack dtp-array)
            (assign vma next-on-stack)
            (assign b-vma next-on-stack)
            (call-and-return-to array-setup-force-1d ap-1-hair-a)))

(definst ap-1 (no-operand needs-stack)
  (parallel (check-arg-type array next-on-stack dtp-array)
            (assign vma next-on-stack)
            (assign b-vma next-on-stack)
            (call-and-return-to array-setup-1d ap-1-hair-a)))

(definst ap-leader (no-operand needs-stack)
  (parallel (check-arg-type array next-on-stack dtp-array)
            (assign vma next-on-stack)
            (assign b-vma next-on-stack)
            (call-and-return-to array-setup-leader ap-1-hair-a)))

(defucode ap-1-hair-a
  (if (equal-fixnum (array-register-dispatch-field (amem (stack-pointer 1)))
                    %array-register-dispatch-word)
      (parallel
        (pop2push (set-type (+ (amem (stack-pointer 2)) top-of-stack) dtp-locative))
        (next-instruction))
      (signal-error locative-to-non-word-array)))

;;; Decoding 2-dimensional arrays
;;; Same as array-setup-1d except (amem (stack-pointer 3)) gets the width
;;; and (amem (stack-pointer 4)) gets the height

(defucode array-setup-2d
  ;Fetch first word of array prefix
  (parallel (start-memory read)
            (assign (amem (stack-pointer 1)) array-register-event-count))
  (nop)       ;Time for memory
  ;Copy header because of temporary memory control
  (parallel -
    (transport header)
    (assign a-memory-data memory-data)) ;temporary memory control
  ;Dispatch on kind, copy header to B side
  (parallel
    (assign b-temp a-memory-data)
    (dispatch-after-next (array-dispatch-field a-memory-data)
      ((%array-dispatch-short-2d)
       (assign (amem (stack-pointer 3)) (set-type (array-rows-field b-temp) dtp-fix))
       (parallel
         (assign (amem (stack-pointer 4)) (set-type (array-columns-field b-temp) dtp-fix))
         (return)))
      ((%array-dispatch-long-multidimensional)
       (error-if (not-equal-fixnum (array-dimensions-field a-memory-data) (b-constant 2))
                 unimplemented-or-illegal-array-type)
       (assign b-temp (1- (array-long-prefix-length-field a-memory-data)))
       (parallel                                   ;Save pointer to last word in prefix
         (assign (amem (stack-pointer 4)) (set-type (+ vma b-temp) dtp-locative))
         (call array-setup-long))
       ;; Now (amem (stack-pointer 3)) has the overall length and
       ;; (amem (stack-pointer 4)) has the address of the width -- convert to W and H
       ;; This could certainly be more modular...but can't use the stack here
       (memread (amem (stack-pointer 4)))
       (assign a-positive-divisor memory-data)
       (assign a-negative-divisor (- a-positive-divisor))
       (assign b-low-dividend (amem (stack-pointer 3)))
       (assign b-high-dividend (b-constant 0))
       (assign (amem (stack-pointer 3)) a-positive-divisor)
       (parallel (assign a-divide-step-count (a-constant 15.))
                 (call divide-subroutine))          ;15=32/2-1
       (parallel (assign (amem (stack-pointer 4)) (set-type b-low-dividend dtp-fix))
                 (return)))
      (otherwise (signal-error unimplemented-or-illegal-array-type))))
  ;Set basepointer to word containing first array element, assuming fast case
  (parallel (assign (amem (stack-pointer 2))
                    (set-type (1+ vma) dtp-locative))
            (take-dispatch)))

;;; 2-dimensional array referencing
;;; Don't use the decode routine on previous page to avoid extra mpy and div

;Call with stack containing array and 2 subscripts
;Return with stack popped once and "linear" subscript in top-of-stack (B side only)
;Return with a-memory-data containing array header word, a-array-base containing data address
;This microcode checks array type, dimensionality, subscript type, and bounds
```

```
(defmicro 2d-array-index ()
  '(parallel (check-arg-type array (amem (stack-pointer -2)) dtp-array)
             (assign vma (amem (stack-pointer -2)))
             (assign b-vma (amem (stack-pointer -2)))
             (call 2d-array-index)))

(defucode 2d-array-index
  (parallel (start-memory read)
            (check-arg-type subscript top-of-stack-a dtp-fix))
  (check-arg-type subscript next-on-stack dtp-fix)
  (parallel (transport header)
            (assign b-temp memory-data)
            (assign a-memory-data memory-data))
  (if (equal-fixnum (array-dispatch-field a-memory-data) %array-dispatch-short-2d)
      (goto 2d-array-index-short)
      (drop-through))
  (error-if (not-equal-fixnum (array-dispatch-field a-memory-data)
                              %array-dispatch-long-multidimensional)
            unimplemented-or-illegal-array-type)
  (error-if (not-equal-fixnum (array-dimensions-field a-memory-data) (b-constant 2))
            unimplemented-or-illegal-array-type)
  (assign b-temp-2 (1- (array-long-prefix-length-field a-memory-data)))
  (assign top-of-stack (a-constant 0))          ;accumulate index offset here
  (parallel (assign a-temp-2 (set-type (+ vma b-temp-2) dtp-locative))  ;last wd in prefix
            (call array-setup-long))             ;Slower than necessary, but...
  (assign a-memory-data b-temp)                  ;Restore array header
  (assign a-array-base (amem (stack-pointer 2)))        ;Base pointer
  (assign a-index-offset top-of-stack)
  (parallel (assign vma a-temp-2)                ;Get the number of rows
            (call pushmem))
  (parallel (pushval next-on-stack)              ;times the second subscript
            (call 32-bit-multiply))
  (error-if (not (all-ones (- top-of-stack (complemented-sign-bit next-on-stack))))
            illegal-subscript)                   ;multiply overflowed
       ;--- this bounds checking probably has bugs in it ---
       ;--- who cares, the array format is going to change anyway ---
  (assign b-temp-2 (amem (stack-pointer -3)))
  (parallel (assign top-of-stack (+ next-on-stack b-temp-2))     ;add first subscript
            (error-if (minus-fixnum obus) illegal-subscript)     ;check for overflow in add
            (decrement-stack-pointer))
  (parallel (error-if (greater-or-equal-fixnum-unsigned top-of-stack (amem (stack-pointer 2)))
                      illegal-subscript)
            (decrement-stack-pointer))
  (parallel (assign top-of-stack (+ top-of-stack a-index-offset))
            (decrement-stack-pointer)
            (return)))

(defucode 2d-array-index-short
  ;; Short, fast case.  Data follow header immediately
  (assign a-array-base (set-type (1+ b-vma) dtp-locative))
  ;; Check bounds
  (error-if (greater-or-equal-fixnum-unsigned next-on-stack (array-rows-field b-temp))
            illegal-subscript)
  (error-if (greater-or-equal-fixnum-unsigned top-of-stack-a (array-columns-field b-temp))
            illegal-subscript)
  ;; Column-major order so multiply second subscript by first dimension
  ;; Doing 9x9 unsigned multiply with no overflow possible, so open-code for speed
  (assign b-temp-2 (dpb b-temp 9 16. 0))                 ;array-rows-field in left half
  (parallel (write-mpy-x top-of-stack-a unsigned)
            (write-mpy-y-from-high b-temp-2 unsigned))
  (parallel (assign top-of-stack (set-type (+ next-on-stack mpy-product) dtp-fix))
            (decrement-stack-pointer)
            (return)))

(definst ar-2 (no-operand)
  (2d-array-index)
  ;Dispatch on the array type field
  (parallel (assign byte-r array-index-shift-prom)
            (dispatch-after-next (array-type-field a-memory-data)
              ((art-1b) (ar-1-ucode 1 nil nil))
              ((art-2b) (ar-1-ucode 2 nil nil))
              ((art-4b) (ar-1-ucode 4 nil nil))
              ((art-8b art-string) (ar-1-ucode 8 nil nil))
              ((art-16b art-fat-string) (ar-1-ucode 16. nil nil))
              ((art-q art-q-list) (ar-1-ucode Word nil nil))
              ((art-boolean) (ar-1-ucode 1 t nil))
              (otherwise (signal-error unimplemented-or-illegal-array-type))))
  ;Point vma at the addressed data word
  (parallel (assign vma (+ a-array-base (ldb top-of-stack 27. byte-r)))
            (take-dispatch)))

(definst as-2 (no-operand smashes-stack)
  (2d-array-index)
  ;Dispatch on the array type field

  (parallel (assign byte-r array-index-shift-prom)
            (dispatch-after-next (array-type-field a-memory-data)
              ((art-1b) (as-1-ucode 1 nil nil))
              ((art-2b) (as-1-ucode 2 nil nil))
              ((art-4b) (as-1-ucode 4 nil nil))
              ((art-8b art-string) (as-1-ucode 8 nil nil))
```

```
                ((art-16b art-fat-string) (as-1-ucode 16. nil nil))
                ((art-q art-q-list) (as-1-ucode Word nil nil))
                ((art-boolean) (as-1-ucode 1 t nil))
                (otherwise (signal-error unimplemented-or-illegal-array-type))))
  ;Point VMA at the addressed data word
  (parallel (assign vma (+ a-array-base (ldb top-of-stack 27. byte-r)))
            (take-dispatch)))


(definst ap-2 (no-operand)
  (2d-array-index)
  (parallel (pop2push (set-type (+ a-array-base top-of-stack) dtp-locative))
            (next-instruction)))
;;; Array register accessing instructions


;flavor is write, pushval, or newtop
(defmicro array-register-ucode (flavor)
   ;Get control word, dispatch, check event count, set byte-r
   ;Note that the xct-next cycle is buried inside the IF
  '(parallel
     (assign byte-r array-index-shift-prom)
     (increment-macro-immediate)
     (dispatch-after-next (array-register-dispatch-field address-operand)
       ,@(loop for n from 0 below 7
               collect '((,n) (,(if (eq flavor 'write)
                                    'array-register-ucode-write
                                    'array-register-ucode-read)
                               ,(nth n '(1 2 4 8 16. q q q 1))
                               ,(= n 10)
                               ,flavor)))
       (otherwise (signal-error unimplemented-case-in-array-register)))
     (if (equal-pointer address-operand array-register-event-count)
         ;Set the VMA.  Can't type-check the subscript yet (spec field busy)
         (parallel
           (assign vma (+ address-operand (ldb top-of-stack 27. byte-r)))
           (increment-macro-immediate)
           (take-dispatch))
         ;Need to trap out and re-decode array, something has changed
         (goto array-register-recompute))))

(defmicro array-register-ucode-read (byte-size boolean-hack result)
  '(array-ucode-read ,byte-size ,boolean-hack
                     top-of-stack address-operand ,result))

(defmicro array-register-ucode-write (byte-size boolean-hack ignore)
  '(array-ucode-write ,byte-size ,boolean-hack
                      top-of-stack address-operand next-on-stack))

(definst fast-aref-pop (address-operand needs-stack)    ;Subscript on stack, popped
  (array-register-ucode newtop))

(definst fast-aref-nopop (address-operand needs-stack)  ;Subscript on stack, left there
  (array-register-ucode pushval))

                                                   ;Value and subscript on stack, popped
(definst fast-aset (address-operand needs-stack smashes-stack)
  (array-register-ucode write))

;Setting up array registers

;Leave array on the stack, and push control word, base pointer,
;upper bound, and lower bound
(definst setup-1d-array-sequential no-operand
  ;Call the standard array decoding stuff, get first three words on stack
  (parallel (check-arg-type array top-of-stack-a dtp-array)
            (assign vma top-of-stack-a)
            (assign b-vma top-of-stack-a)
            (call array-setup-1d-zero))
  ;Advance the stack-pointer to leave it on the stack
  (assign stack-pointer (+ stack-pointer (b-constant 3)))
  ;Also push the lower bound
  (parallel (pushval top-of-stack)
            (next-instruction)))

;Same as above but don't push lower bound
;Leaves TOS incorrect
(definst setup-1d-array (no-operand smashes-stack)
  ;Call the standard array decoding stuff, get first three words on stack
  (parallel (check-arg-type array top-of-stack-a dtp-array)
            (assign vma top-of-stack-a)
            (assign b-vma top-of-stack-a)
            (call array-setup-1d-zero))
  ;Now if the lower bound is non-zero, either factor it into the base
  ;pointer or set it to work the slow way.  For now always the slow way
  (if (zero-fixnum top-of-stack)
      (drop-through)
```

```
    (assign (array-register-dispatch-field (amem (stack-pointer 1)))
            (b-constant 7)))
  (parallel (assign stack-pointer (+ stack-pointer (b-constant 3)))
            (next-instruction)))

;Set up an array register, with upper and lower bounds, for a subset
;of an array defined by standard from and to arguments (either can
;be nil, which means use the extreme end of the array).
;---This assumes the array is always zero origin, in its error checking
;---of the bounds.  I'm not sure whether that is a feature or a bug,
;---there seems to be some general fuzzy thinking here.
;---I'm also not sure what happens if have to use "slow array register" here
(definst setup-1d-array-from-to no-operand
  ;Call the standard array decoding stuff, get first three words on stack
  ;and get the index-offset in top-of-stack
  (parallel (check-arg-type array (amem (stack-pointer -2)) dtp-array)
            (assign vma (amem (stack-pointer -2)))
            (assign b-vma (amem (stack-pointer -2)))
            (call array-setup-1d-zero))
  ;Apply index offset to upper and lower bounds, plug them in to array reg
  (parallel
    (check-arg-type subscript (amem (stack-pointer 0)) dtp-nil dtp-fix)
    (if (data-type? (amem (stack-pointer 0)) dtp-fix)
        (sequential
          (parallel
            (assign b-temp (+ (amem (stack-pointer 0)) top-of-stack))
            ;This check is because we will be using unsigned comparison later
            (error-if (minus-fixnum obus) illegal-subscript))
          ;This check is for TO being specified as off the end of the array
          (error-if (lesser-fixnum (amem (stack-pointer 3)) b-temp)
                    illegal-subscript)
          (assign (amem (stack-pointer 3)) (set-type b-temp dtp-fix)))
        ;If TO not specified, use array's upper bound
        (drop-through)))
  (parallel
    (check-arg-type subscript (amem (stack-pointer -1)) dtp-nil dtp-fix)
    (if (data-type? (amem (stack-pointer -1)) dtp-fix)
        (sequential
          (error-if (minus-fixnum (amem (stack-pointer -1))) illegal-subscript)
          (assign (amem (stack-pointer 4))
                  (set-type (+ (amem (stack-pointer -1)) top-of-stack)
                            dtp-fix)))
        ;If FROM not specified, use array's lower bound
        (assign (amem (stack-pointer 4)) top-of-stack)))
  ;Also leave the index offset on the stack, for programs that want to
  ;know what their index into the array really is (e.g. string-search)
  (assign stack-pointer (+ stack-pointer (b-constant 4)))
  (parallel (pushval top-of-stack)
            (next-instruction)))

);end comment
```

F:>lmach>ucode>arith-escape.lisp.1

```
;;; -*- Mode:Lisp; Package:Micro; Base:8; Lowercase:yes -*-
;;; (c) Copyright 1982, Symbolics, Inc.

;; Microcode for arithmetic exception cases
;; This is a DEFS file for the rest of the arithmetic stuff

;Get defmicro and all his hosts
#M
(declare (cond ((not (status feature lmucode))
                (load 'udcls))))

(define-enumerated-value-constants arithmetic-binary-operation-indices)
(define-enumerated-value-constants arithmetic-unary-operation-indices)
(define-enumerated-value-constants *header-number-types*)

(reserve-scratchpad-memory 2470 2474)
(defareg arith-operation-index)
(defareg arith-operation-floating-pc)

;; Here top-of-stack is the operation-index and the b side is next-on-stack
(defucode arith-binary-extnum-call-out
  (parallel (check-data-type top-of-stack-a
                             dtp-extended-number dtp-fix dtp-float)
            (jump arith-binary-call-out)))

;; Build call out frame:
;; SP(0): PC; SP(1): TABLE; SP(2): IND-1; SP(3): IND-2; SP(4): Temp(eventually table)
;; SP(5): ARG-2; SP(6): ARG-1; SP(7): Operation index; SP(8): Temp(eventually pc)
(defucode arith-binary-call-out
  ;; Shift the arguments up by 2 stack locations
  (pushval next-on-stack)
  (pushval next-on-stack)
  ;; Push unused slot (table)
  (pushval quote-nil)
  ;; Push type index for arg-2
  (parallel (pushval (amem (stack-pointer -2)))
```

```
          (call %numeric-dispatch-index))
  ;; Push type index for arg-1
  (parallel (pushval (amem (stack-pointer -2)))
          (call %numeric-dispatch-index))
  ;; Cant do this earlier for PCLSR reasons
  (assign (amem (stack-pointer -5)) (set-type arith-operation-index dtp-fix))
  ;; If arg-2 has bigger index than arg-1, interchange the arguments [leave indices alone]
  (if (greater-fixnum next-on-stack top-of-stack)
      (sequential (assign b-temp (amem (stack-pointer -3)))
                  (assign (amem (stack-pointer -3)) (amem (stack-pointer -4)))
                  (assign (amem (stack-pointer -4)) b-temp))
      (drop-through))
  (pushval arithmetic-binary-operation-dispatch)
  (take-post-trap arith-binary-escape preserve-stack)
  )

;; Build call out frame:
;; SP(0): PC; SP(1): IND-1; SP(2): Operation-index; SP(3): TABLE;
;; SP(4): ARG; SP(5): Temp(Eventual function); SP(6): Temp(eventual pc)
(defucode arith-unary-call-out
  ;; Leave room for eventual function
  (pushval quote-nil)
  ;; Push a copy of the argument
  (pushval (amem (stack-pointer -1)))
  ;; Push the table number
  (pushval arithmetic-unary-operation-dispatch)
  ;; Push the operation index
  (pushval (set-type arith-operation-index dtp-fix))
  ;; Push the argument type index
  (parallel (pushval (amem (stack-pointer -2)))
          (call %numeric-dispatch-index))
  (take-post-trap arith-unary-escape preserve-stack)
  )

(defatomic-byte-field header-subtype-of-md %%header-subtype-field memory-data)

;; Takes argument on stack, pushes corresponding index on the stack
;; Error checking is for when this is an instruction
(definst %numeric-dispatch-index no-operand
  (parallel (check-data-type top-of-stack-a dtp-fix dtp-float dtp-extended-number)
          (if (data-type? top-of-stack-a dtp-fix)
              (parallel (newtop (set-type (b-constant 0) dtp-fix))
                        (next-instruction))
              (drop-through)))
  (parallel
    (if (data-type? top-of-stack-a dtp-float)
        (parallel (newtop (set-type (b-constant 1) dtp-fix))
                  (next-instruction))
        (drop-through))
    (assign vma top-of-stack-a))
  (start-memory read)
  (nop)
  (parallel (transport header)
          (assign top-of-stack (+ header-subtype-of-md (b-constant 2))))
  (parallel (newtop (set-type top-of-stack dtp-fix))
          (next-instruction)))
;; Convert next-on-stack to flonums
(defucode convert-first-fixnum-to-flonum
  (parallel (call convert-fixnum-to-flonum)
          (assign a-temp (popval)))
  (parallel (return)
          (pushval a-temp)))
```

F:>LMACH>UCODE>ARITH.LISP.61

```
;;; -*- Mode:Lisp; Package:Micro; Base:8; Lowercase:yes -*-
;;; (c) Copyright 1982, Symbolics, Inc.

;; Microcode for arithmetic primitives

;Get defmicro and all his hosts
#M
(declare (cond ((not (status feature lmucode))
                (load 'udcls))))


;; Binary operations
(definstI add-immed signed-immediate-operand
  (check-binary-arithmetic-operands-fast signed-immediate-operand %arith-op-add
                                         add-stack fadd add-overflow)
  (newtop (set-type
            (add-checking-overflow top-of-stack-a macro-signed-immediate)
           dtp-fix)))

(definstl add-local (address-operand needs-stack)
  (check-binary-arithmetic-operands-fast address-operand %arith-op-add add-stack
                                         fadd add-overflow)
  (newtop (set-type (add-checking-overflow address-operand top-of-stack)
                  dtp-fix)))
```

```
(definstl add-stack (no-operand needs-stack)
  (check-binary-arithmetic-operands-fast no-operand %arith-op-add add-stack
                                         fadd add-overflow)
  (pop2push (set-type (add-checking-overflow next-on-stack top-of-stack)
                      dtp-fix)))

(definstl sub-immed signed-immediate-operand
  (check-binary-arithmetic-operands-fast signed-immediate-operand %arith-op-subtract
                                         sub-stack fsub)
  (newtop (set-type
            (sub-checking-overflow top-of-stack-a macro-signed-immediate)
           dtp-fix)))

(definstl sub-local (address-operand needs-stack)
  (check-binary-arithmetic-operands-fast address-operand %arith-op-subtract
                                         sub-stack fsub)
  (newtop (set-type (sub-checking-overflow top-of-stack address-operand)
                    dtp-fix)))

(definstl sub-stack (no-operand needs-stack)
  (check-binary-arithmetic-operands-fast no-operand %arith-op-subtract sub-stack fsub)
  (pop2push (set-type (sub-checking-overflow next-on-stack top-of-stack)
                      dtp-fix)))

;;; This is trapped to via fixnum-fixnum overflow in an add instruction
(defucode add-overflow
  (parallel (pop2push (set-type (+ next-on-stack top-of-stack) dtp-fix))
            (trap-no-save))
  (take-post-trap additive-fixnum-overflow preserve-stack))

;;; This is trapped to via fixnum-fixnum overflow in an subtract instruction
(defucode sub-overflow
  (parallel (pop2push (set-type (- next-on-stack top-of-stack) dtp-fix))
            (trap-no-save))
  (take-post-trap additive-fixnum-overflow preserve-stack))

(definstl logand-stack (no-operand needs-stack)
  (check-binary-arithmetic-operands-fast no-operand %arith-op-logand logand-stack)
  (pop2push (set-type (logand next-on-stack top-of-stack) dtp-fix)))

(definstl logior-stack (no-operand needs-stack)
  (check-binary-arithmetic-operands-fast no-operand %arith-op-logior logior-stack)
  (pop2push (set-type (logior next-on-stack top-of-stack) dtp-fix)))

(definstl logxor-stack (no-operand needs-stack)
  (check-binary-arithmetic-operands-fast no-operand %arith-op-logxor logxor-stack)
  (pop2push (set-type (logxor next-on-stack top-of-stack) dtp-fix)))
;; Binary predicates
(definst lessp (no-operand needs-stack)
  (parallel
    (check-binary-arithmetic-operands-fast no-operand %arith-op-lessp lessp flessp)
    (decrement-stack-pointer)
    (if (lesser-fixnum next-on-stack top-of-stack)
        (goto true1)
        (goto false1))))

(definst greaterp (no-operand needs-stack)
  (parallel
    (check-binary-arithmetic-operands-fast no-operand %arith-op-greaterp greaterp fgreaterp)
    (decrement-stack-pointer)
    (if (greater-fixnum next-on-stack top-of-stack)
        (goto true1)
        (goto false1))))

(definst equal-number (no-operand needs-stack)
  (parallel
    (check-binary-arithmetic-operands-fast no-operand
                                           %arith-op-equal-number equal-number fequal)
    (decrement-stack-pointer)
    (if (equal-fixnum next-on-stack top-of-stack)
        (goto true1)
        (goto false1))))

;;; Unary predicates
(definst zerop (no-operand needs-stack)
  (parallel
    (check-unary-arithmetic-operation-fast no-operand %arith-op-zerop zerop
                                           fzerop)
    (if (zero-fixnum top-of-stack)
        (goto true1)
        (goto false1))))

(definst plusp (no-operand needs-stack)
  (parallel
    (check-unary-arithmetic-operation-fast no-operand %arith-op-plusp plusp
                                           fplusp)
    (if (plus-fixnum top-of-stack)
        (goto true1)
        (goto false1))))
```

```
(definst minusp (no-operand needs-stack)
  (parallel
    (check-unary-arithmetic-operation-fast no-operand %arith-op-minusp minusp
                                            fminusp)
    (if (minus-fixnum top-of-stack)
        (goto true1)
        (goto false1))))

(definst fixp no-operand
  (if (data-type? top-of-stack-a dtp-fix)
      (goto true1)
      (drop-through))
  (if (not (data-type? top-of-stack-a dtp-extended-number))
      (goto false1)
      (drop-through))
  (memread top-of-stack-a)
  (parallel (transport header)
            (if (equal-fixnum header-subtype-of-md %header-type-bignum)
                (goto true1)
                (goto false1))))
;; Unary operations
(definst1 unary-minus no-operand
  (check-unary-arithmetic-operation-fast no-operand %arith-op-minus unary-minus
                                          minus-flonum minus-overflow)
  (newtop (set-type (sub-checking-overflow (b-constant 0) top-of-stack-a)
                    dtp-fix)))

(defucode minus-overflow
  (parallel (newtop (set-type (- (b-constant 0) top-of-stack-a) dtp-fix))
            (trap-no-save))
  (take-post-trap additive-fixnum-overflow preserve-stack))
;;; (%add-bignum-digits a b c) does a signed addition of a b and c
;;; returning two values. The first is a 31 bit sum and the second is
;;; the next higher 32 bits of the sum. This is accomplished by doing an
;;; unsigned addition, and then compensating for the sign extension of negative
;;; arguments
(definst %add-bignum-digits (no-operand needs-stack)
  (parallel (check-fixnum-2args next-on-stack top-of-stack
                (otherwise (signal-error wrong-type-argument any (:fixnum))))
            (assign b-temp (+ next-on-stack top-of-stack))
            (if alu-carry
                (parallel (assign b-temp-2 (- (b-constant 1)
                                              (ldb top-of-stack-a 1 31.)))
                          (jump add-bignum-digits-internal)
                          (decrement-stack-pointer))
                (parallel (assign b-temp-2 (- (ldb top-of-stack-a 1 31.)))
                          (jump add-bignum-digits-internal)
                          (decrement-stack-pointer)))))

;;; (%sub-bignum-digits a b c) does a signed addition of a b and subtracts c
;;; returning two values. The first is a 31 bit sum and the second is
;;; the next higher 32 bits of the sum. This is accomplished by doing an
;;; unsigned addition, and then compensating for the sign extension of negative
;;; arguments
(definst %sub-bignum-digits (no-operand needs-stack)
  (parallel (check-fixnum-2args next-on-stack top-of-stack
                (otherwise (signal-error wrong-type-argument any (:fixnum))))
            (assign b-temp (- next-on-stack top-of-stack))
            (if alu-carry
                (parallel (assign b-temp-2 (ldb top-of-stack-a 1 31.))
                          (jump add-bignum-digits-internal)
                          (decrement-stack-pointer))
                (parallel (assign b-temp-2 (+ (ldb top-of-stack-a 1 31.)
                                              (b-constant -1)))
                          (jump add-bignum-digits-internal)
                          (decrement-stack-pointer)))))

(defucode add-bignum-digits-internal
  (parallel (assign b-temp-2 (- b-temp-2 (ldb top-of-stack-a 1 31.)))
            (decrement-stack-pointer))
  (parallel (check-fixnum-1arg-a top-of-stack-a
                (otherwise (signal-error wrong-type-argument any (:fixnum))))
            (assign b-temp (+ b-temp top-of-stack-a))
            (if alu-carry
                (assign b-temp-2 (1+ b-temp-2))
                (drop-through)))
  (parallel (assign b-temp-2 (- b-temp-2 (ldb top-of-stack-a 1 31.)))
            (decrement-stack-pointer)
            (jump pack-bignum-digits)))

(defucode pack-bignum-digits
  (pushval (set-type (ldb b-temp 31. 0) dtp-fix))
  (assign a-temp (rotate b-temp 1))                  ;Sign bit is bottom bit of top word
  ;; These could be the same instruction, but there is a AMWA, DPB conflict
  (assign a-temp (set-type (dpb b-temp-2 31. 1 a-temp) dtp-fix))
  (parallel (pushval a-temp)
            (next-instruction)))

(defatomicro negative-result
  (microcondition alu-31 true nil))
```

```
;;; (%lshc-bignum-digits a b shift) performs a LSHC on the bignum digits.
;;; The higher digit of the result of shifting (b,a) up is the value returned.
(definst %lshc-bignum-digits (no-operand needs-stack)
  (parallel (check-fixnum-2args next-on-stack top-of-stack
              (otherwise (signal-error wrong-type-argument any (:fixnum))))
            (assign a-temp top-of-stack)
            (decrement-stack-pointer))
  (assign byte-r (- a-temp (b-constant 31.)))
  (parallel (assign byte-s (1- a-temp))
            (if negative-result
                (parallel (check-fixnum-1arg-a next-on-stack
                            (otherwise (signal-error wrong-type-argument any (:fixnum))))
                          (assign b-temp-2 (b-constant 0)))
                (parallel (check-fixnum-1arg-a next-on-stack
                            (otherwise (signal-error wrong-type-argument any (:fixnum))))
                          (assign b-temp-2 (ldb next-on-stack byte-s byte-r)))))
  (parallel (assign byte-s (- (b-constant 30.) a-temp))
            (if negative-result
                (parallel (pop2push (set-type b-temp-2 dtp-fix))
                          (next-instruction))
                (drop-through)))
  (assign byte-r a-temp)
  (parallel (pop2push (set-type (dpb top-of-stack-a byte-s byte-r b-temp-2) dtp-fix))
            (next-instruction)))

;;; (%multiply-bignum-digits x y) multiplies the bignum digits x and y and returns
;;; two digits which are the double precision product
(definst %multiply-bignum-digits (no-operand needs-stack)
  (check-fixnum-2args next-on-stack top-of-stack
    (otherwise (signal-error wrong-type-argument any (:fixnum))))
  (call 32-bit-multiply)                                  ;TOS is high order word
  (parallel (assign b-temp-2 top-of-stack-a)      ;
            (decrement-stack-pointer))
  (parallel (assign b-temp top-of-stack-a)                          ;Low bits
            (decrement-stack-pointer)
            (jump pack-bignum-digits)))

;;; (%divide-bignum-digits low high x) concatenates two 31 bignum digits
;;; to form a positive 62 bit number, and divides it by another positive
;;; 31 bit digit. Returns the quotient and the remainder
(definst %divide-bignum-digits (no-operand needs-stack)
  (parallel (check-fixnum-2args next-on-stack top-of-stack
              (otherwise (signal-error wrong-type-argument any (:fixnum))))
            (assign a-positive-divisor (popval)))
  (assign a-negative-divisor (- a-positive-divisor))
  (assign a-divide-step-count (a-constant 15.)) ; See divide routine (32 steps)
  (parallel (assign b-low-dividend next-on-stack)
            (check-fixnum-1arg-a next-on-stack
              (otherwise (signal-error wrong-type-argument any (:fixnum)))))
  ;; Low bit of high is the high bit of low
  (assign b-low-dividend (dpb top-of-stack-a 1 31. b-low-dividend))
  (parallel (assign b-high-dividend (ldb top-of-stack 30. 1))
            (call divide-subroutine))
  ;; Quotient is in b-low-dividend, remainder in b-high-dividend
  (assign next-on-stack                                   ;Quotient
          (set-cdr (set-type b-low-dividend dtp-fix) cdr-next))
  (parallel
    (newtop (set-type b-high-dividend dtp-fix)) ;Remainder
    (next-instruction)))

;;; Arithmetic Shift

;7 cycles to shift left
;5 cycles to shift right
(definst ash-stack (no-operand needs-stack)
  (parallel
    (check-binary-arithmetic-operands-fast no-operand %arith-op-ash ash-stack
                                           nil nil ash-float)
    (if (minus-or-zero-fixnum top-of-stack)
        ;; Shift right by LDBing
        (sequential
          (assign byte-r top-of-stack)                             ;Right rotate
          ;; Get word full of sign bits
          (assign b-temp (- (ldb next-on-stack 1 31.)))
          (parallel
            (assign byte-s (+ (a-constant 31.) top-of-stack))    ;Bytesize-1
            (if (minus-fixnum obus)
                ;; Shifted away--result is all sign bits
                (parallel (pop2push (set-type b-temp dtp-fix))
                          (next-instruction))
                ;; Normal result
                (parallel
                  (pop2push (set-type (ldb next-on-stack byte-s byte-r b-temp)
                                      dtp-fix))
                  (next-instruction)))))
        ;; Shift left by DPBing
        (sequential
          (assign byte-s top-of-stack)                            ;N discarded bits+1-1
          (parallel
            (assign byte-r (1+ top-of-stack))
            (if (minus-fixnum next-on-stack)
```

```
;; Argument is negative
;; Check that discarded bits and new sign bit are all ones
(if (all-ones (ldb next-on-stack byte-s byte-r (b-constant -1)))
    (sequential
      (assign byte-r top-of-stack)                      ;Left rotate
      (parallel                                         ;N kept bits-1
        (assign byte-s (- (a-constant 31.) top-of-stack))
        (if (greater-or-equal-fixnum-unsigned (a-constant 31.) top-of-stack)
            (parallel
              (pop2push (set-type (dpb next-on-stack byte-s byte-r 0)
                                  dtp-fix))
              (next-instruction))
            (goto ash-overflow))))                      ;Shift count too large
    (goto ash-overflow))                                ;Result is bignum
;; Argument is positive
;; Check that discarded bits and new sign bit are all zero
(if (zero-fixnum (ldb next-on-stack byte-s byte-r))
    (sequential
      (assign byte-r top-of-stack)                      ;Left rotate
      (parallel                                         ;N kept bits-1
        (assign byte-s (- (a-constant 31.) top-of-stack))
        (if (greater-or-equal-fixnum-unsigned (a-constant 31.) top-of-stack)
            (parallel
              (pop2push (set-type (dpb next-on-stack byte-s byte-r 0)
                                  dtp-fix))
              (next-instruction))
            (goto ash-overflow))))                      ;Shift count too large
    (goto ash-overflow))))))))                          ;Result is bignum
(defucode ash-overflow
  (parallel (assign arith-operation-index %arith-op-ash)
            (jump arith-binary-call-out)))
```

```
;;; -*- Mode:Lisp; Package:Micro; Base:8; Lowercase:yes -*-
;;; (c) Copyright 1982, Symbolics, Inc.

; Microcode for A-memory map on the Rev.1 FEP board

;Get defmicro and all his hosts
#M
(declare (cond ((not (status feature lmucode))
                (load 'udcls))))

;Write the Amem map.  Address must have been set up in VMA previously.
;Must use slowest speed so Lbus is stable during write pulse to RAM
;Also data must not come from pass-around path (it won't if you just wrote vma).
(defmicro write-amem-map (data)
  `(parallel (write-lbus-dev 36 3 ,data)
             ,(microinstruction speed 3)))

(defucode clear-amem-map
  (parallel (assign a-temp (- a-temp (b-constant 1_8)))
            (if (minus-fixnum obus) (return) (drop-through)))
  (assign b-temp (ldb a-temp 2 18.))
  (assign vma a-temp)
  (parallel (write-amem-map b-temp)
            (jump clear-amem-map)))

(defucode setup-amem-map                       ;Set up the direct-mapped part
  (assign b-temp (ldb a-temp 2 18. (b-constant 14)))
  (assign vma a-temp)
  (write-amem-map b-temp)
  (assign a-temp (+ a-temp (b-constant 1_8)))
  (if (ldb-bit-test a-temp 21.)
      (return)
      (goto setup-amem-map)))

;Write a-temp into the amem-map.  A subroutine only due to field conflicts
;and also the need to write the VMA.
;NOTE WELL: When writing the amem-map, the data must not come from the
;pass-around path, because that doesn't give enough time for the Lbus to
;be stable before the write pulse (running a slow cycle doesn't make the
;pass-around path faster, since it is a negative delay from the end of
;first half.)  This is all crocks for the temporary memory control.
(defucode write-amem-map
  (assign vma a-temp)                ;Clears pass-around path
  (parallel (write-amem-map a-temp)
            (return)))

;Unmap page whose address (low 8 bits zero!) is in b-temp, smashing a-temp, vma
(defucode unmap-page-from-amem
  (assign a-temp (ldb b-temp 2 18.))
  (assign vma b-temp)                ;Clears pass-around path
  (parallel (write-amem-map a-temp)
            (return)))
```

MICROCODE BITS

Amem microcode data.

```
0:   000000000000 000000000000 000000000000 000000000000
4:   000000000000 000000000000 000000000000 000000000000
```

```
10:  000000030000 000000000000 000000000000 000000000000
14:  000000000000 000000000000 000000000000 000000000000
20:  000000000000 000000000000 000000000000 000000000000
24:  000000000000 000000000000 000000000000 000000000000
30:  000000000000 000000000000 000000000000 000000000000
34:  000000000000 000023000090 000000000000 000000000000
40:  000000000000 000000000000 000000000000 000000000000
44:  000000000000 000000000000 000000000000 000000000000
50:  000000000000 000000000000 000000000000 000000000000
54:  000000000000 000000000000 000000000000 000000000000
60:  000000036000 000000000000 000000000000 000000000000
64:  030002300000
```

Bmem microcode data.

```
 0:  000000003000 000000000020 000000000000 000000000000
 4:  030000020000 000000000000 000000000020 000000000000
10:  030000000010 000000040216 000000000000 000000000002
14:  000000000203 000000000040 000000000204 000000000037
20:  000000010000 000000000001 000000001400 000077770000
24:  037700000000 017740000000 020000000000 177777777777
30:  000000000235 000000000231 031700000000 000040000000
34:  000000400030 000000000177 000000000035 000400000000
40:  000000020000 000000000400 000000377777 000000007777
44:  000000017400 000000100016 000000040030 000000040036
50:  000000000006 000000000014 000000000007 000000000005
54:  000000000442 000000000012 177777777775 000000000403
60:  000000000011 000000057766 000000000017 000000000013
64:  000000003200 000000037777 000077777400 000004000000
70:  177777600000 000000001077 001777774000 000000005100
74:  001777770000 000000004100 000000050000 000000000770
```

Cmem microcode data.

```
  0:  0000003220000000310360006377631000 0004032620000004140420006070202201
  2:  0040543620000003200360002003220004 0041256620000003200360002003220004
  4:  0000003220000000310350006377631000 0040177232142007207375246777602462
  6:  0040177632142007207375246777602462 000165322000400020035000505202403
 10:  0040000265142006200000034037020000 0441105220014062106035006377612000
 12:  0000552610302002600363500420031000 000337522006600010350006377602405
 14:  0060004233010000200017002077720377 0000335221000000200350003000332400
 16:  0002343221000000200360003000332400 0002345521000000200350003000332400
 20:  0001166520002000205377016377631000 0001740620142002160020006035012000
 22:  0002345221000000200360003000332400 0002344621000000200350003020332403
 24:  0001052620002000205377006377631000 0002343621000000200350003000332403
 26:  0000334621000000200360003000332400 0000475521000000200350003000332400
 30:  0001161220010000205360006377603044 0020621220012000030377106377642425
 32:  0040617220000000200360000511320000 000263522001454210332206377602526
 34:  0000003220000000310360006377631000 0022135520012000030457046377630000
 36:  0000555620000000201360006102431000 0040900272142036503377076777712000
 40:  0001165520002000205377016377631000 0000000273142001600000032000052000
 42:  0040766520142006200360504003221376 0042233232006000200360002077220375
 44:  0001166520002000205377016377631000 0000000273142101600000032000052000
 46:  0042335210000002607360006777631000 0442113232020004146015006064012000
 50:  0001166520002000205377016377631000 0000000273142201600000032000052000
 52:  0067355633012000200000003000360000 0067366633012000200000003000350000
 54:  0001165520002000205377016377631000 0000000273142301600000032000052000
 56:  0001770632000200000000506377631000 0001264632002004140057046064431000
 60:  0001047620002000205377006377631000 0000615232002004140057046064431000
 62:  0340005260000000203360036777702406 0441703632024004146017246064012000
 64:  0001050620002000205377006377631000 0040475220000004140500006055120000
 66:  0001053320142006200257506251242417 0002134620002000000350506377631000
 70:  0001051220002000205377006377631000 0001754620002000000350506377631000
 72:  0001415520002000000360506377631000 0004116620002000000350506377631000
 74:  0001051620002000205377006377631000 0004132220002000000350506377631000
 76:  0040547620002000205417106377720377 0040214622092000350437000501520377
100:  0000003220000000310360006377631000 0441343632024004146135246025212000
102:  0441344632024004146135246065212000 0003377220012572100377006377643036
104:  0000000220000000310360006377631000 0001262620020000200363400501402065
106:  0042641220000540232350025103502521 0001067633000000200000003000302000
110:  0000003220000000310360006377631000 0007355633002000200000503000331000
112:  0007365533002000200000503000331000 0020537610012000200357106377630000
114:  0000003220000000310360006377631000 0000363220010000205360406377602016
116:  0000717211012002600360503000530000 0001004621000000200000003000331000
120:  0000000220000000310360006377631000 0001535220010000205352046377632200
122:  0000111621000000200000003000302024 0000000262002000200377032000031000
124:  0000003220000000310360006377631000 0400225620000000203350000514412000
```

```
126: 0401324620000030200360000514412000 0042227222032000213352246777602525
130: 0000000220000000310360006377631000 0000065621000000200000003000302104
132: 0001352621000000200000003000302104 0000243621000000200000003000302104
134: 0000000220000000310360006377631000 0001527621000000200000003000302104
136: 0000055521000000200000003000302104 0062643220016572100377146377661016
140: 0000000220000000310360006377631000 0062643620016572100377146377661016
142: 0062644620016572100377146377661016 0062645220016572100377146377661016
144: 0000000220000000310360006377631000 0062645520016572100377146377661015
146: 0062645520016572100377146377661016 0062647220016572100377146377661016
150: 0000000220000000310360006377631000 0062647620016572100377146377661016
152: 0052550520016572100377146377661016 0001443221000000200000003000302105
154: 0000000220000000310360006377631000 0001445521000000200000003000302105
156: 0031550632002004140157046065431000 0001106632002004140157046065431000
160: 0000000220000000310360006377631000 0001551232002004140157046065431000
162: 0021107232002004140157046065431000 0002053620000000000350006377602405
164: 0000000220000000310360006377631000 0042500221000000200000003000323400
166: 0042502221000000200000003000323400 0441736632024004146117246065012000
170: 0000000220000000310360006377631000 0441737232024004146117246065012000
172: 0004235233002000200360543000331000 0040405220004000045360002077620377
174: 0000000220000000310360006377631000 0004045221000000200000003000302200
176: 0002222621000000200000003000302200 0001332632024004140077246064642462
200: 0000000220000000310360006377631000 0000501620004000200000006377671000
202: 0001751220004000200000006377671000 0000655220004000200000006377671000
204: 0000000220000000310360006377631000 0002137620004000200000006377671000
206: 0401247620142007200157306377652000 0042651220140460200360006006461376
210: 0000000220000000310360006377631000 0042651620140460200360006006461376
212: 0001565621000000200000003000302247 0002003220002000205377046377631000
214: 0000000220000000310360006377631000 0000155233000000200000003000302406
216: 0002056330000000200000003000302415 0000107233000000200000003000302416
220: 0000000220000000310360006377631000 0004240233002000200377003000331000
222: 0000721611212032600350703000530000 0004460233000000200000003000302470
224: 0000000220000000310360006377631000 1100713220000000200420000501412000
226: 0040057620004000200050000515021014 0040061220004000200050000515021014
230: 0000000220000000310360006377631000 0040062620004000200050000515021014
232: 0000327622002000200015203000331000 0002107620160000200321206371072200
234: 0000000220000000310360006377631000 0040000264400000203377076777602405
236: 0000251220000004140660006072612000 0000000260000000303600036377602512
240: 0000000220000000310360006377631000 0000507220000000000360006377603005
242: 0000166620000000000360006377603005 0000341220000000000360006377603005
244: 0000000220000000310360006377631000 0000644620000000000360006377603005
246: 0000227662000000000360006377603005 0000551220000000000360006377603005
250: 0000000220000000310360006377631000 0001441620000000200360000431602104
252: 0041537232142370600360002003060003 0042211632142000200020006326660007
254: 0000000220000000310360006377631000 0040710632142000200020006326660007
256: 0042213232142000200020006326660014 0040711232142000200020006326660014
260: 0000000220000000310360006377631000 0041225620000004140550016065720000
262: 0040003272022000203360436777602406 0042332620000004140520006071221001
264: 0000000220000000310360006377631000 0041540620142370600360002003060003
266: 0041723220000000200417006377720377 0041723620000000200417006377720377
270: 0000000220000000310360006377631000 0041705220000000200417006377720377
272: 0040735220000000200417006377720377 0040167220000000200417006377720377
274: 0000000220000000310360006377631000 0041657220000000200417006377720377
276: 0040765220000000200417006377720377 0041667220000000200417006377720377
300: 0000000220000000310360006377631000 0041724620000000200417006377720377
302: 0047467620000000200417006377720377 0041725220000000200417006377720377
304: 0000000220000000310360006377631000 0041725620000000200417006377720377
306: 0051516620012000200377042202221011 0062261220012000200377042202221011
310: 0000000220000000310360006377631000 0062261620012000200377042202221011
312: 0062262620012000200377042202221011 0062263220012000200377042202221011
314: 0000000220000000310360006377631000 0061517220012000200377042202221011
316: 0062264620012000200377042202221011 0062264620012000200377042202221011
320: 0000000220000000310360006377631000 0062265220012000200377042202221011
322: 0050503520012000200377042202221011 0062266620012000200377042202221011
324: 0000000220000000310360006377631000 0060606620012000200377042202221011
326: 0050505620012000200377042202221011 0006642633000000200000003000303005
330: 0000000220000000310360006377631000 0002107233000000200000003000303007
332: 0000303233000000200000003000303034 0021225220010000040377046377631000
334: 0000000220000000310360006377631000 0024415220012000030377306377602405
336: 0024416220012000030377306377602406 0024347220012000030377306377602405
340: 0000000220000000310360006377631000 0024350220012000030377306377602405
342: 0024417220012000030377306377602406 0024420220012000030377306377602405
344: 0000000220000000310360006377631000 0024421220012000030377306377602405
346: 0024422220012000030377306377602406 0024423220012000030377306377602406
350: 0000000220000000310360006377631000 0024424220012000030377306377602405
352: 0024425220012000030377306377602406 0024426220012000030377306377602406
354: 0000000220000000310360006377631000 0440000272142007203377276777612000
```

| | | |
|---|---|---|
| 356: | 004000026014210760337707677612000 | 0360170620010000207377000501402406 |
| 360: | 0000000220000000310360006377631000 | 0360171220010000207377000501402406 |
| 362: | 0360171620010000207377000501402406 | 0360172620010000207377000501402406 |
| 364: | 0000000220000000310360006377631000 | 0360173220010000207377000501402406 |
| 366: | 0360173620010000207377000501402406 | 0361351620010000207377000501402406 |
| 370: | 0000000220000000310360006377631000 | 0002655220140461200360006377652000 |
| 372: | 0002655220140461200360006377652000 | 0002655220140461200360006377652000 |
| 374: | 0000000220000000310360006377631000 | 0002655220140461200360006377652000 |
| 376: | 0000207620142370600375240514431000 | 0000210620142370600375240514431000 |
| 400: | 0041161620016000205360006377621377 | 0040000272142016603377076777712000 |
| 402: | 0000105633000000200000003000332200 | 0001405232002000200362500405431000 |
| 404: | 0041161220016000205360006377621377 | 0062660620012572100377006377620377 |
| 406: | 0043403220140460200360006004661376 | 0020000251016002203017073000302406 |
| 410: | 0040000261000003200000003300323400 | 0000000260000003201360035352331000 |
| 412: | 0003357620010000200361640503402416 | 0001565521000000200000003000332400 |
| 414: | 0000000273002000200000233000331000 | 0002410620000540201360006360631000 |
| 416: | 0023533620150540200351356015442106 | 0040355232142007207375305777602462 |
| 420: | 0003007220014542100360206377603045 | 0040355532142007207375306777602462 |
| 422: | 0400451620142003200377300501412000 | 00427166200004640233360024101602015 |
| 424: | 0042057220014000200020006377620000 | 00427172200004640233360024101602015 |
| 426: | 0440447220014002106035046377612000 | 1602717620000440200420000513212000 |
| 430: | 0000000262002000200377032700031000 | 0222721620016550200437046377612000 |
| 432: | 0001774620312000200117206377672200 | 0002727220006540200377346377671000 |
| 434: | 0000222223002090200017003000331000 | 0002732620006540200377346377671000 |
| 436: | 0002733220005540200377346377671000 | 0040702620000000200540006377620003 |
| 440: | 0040000262002000200417032700120377 | 0060511620012000202020646377661021 |
| 442: | 0040140622002000202037006377731000 | 0002736620140461203363046377631000 |
| 444: | 0041162620016000205350006377621377 | 0001424620142000200377004072202413 |
| 446: | 0001425220142000200377004072202413 | 0022737220012576010377006377603043 |
| 450: | 0000000220000000310360006377631000 | 0022737220012570010377006377603043 |
| 452: | 0000112620010000200360400513202455 | 0001116620164370600157246377642462 |
| 454: | 0000000220000000310360006377631000 | 0000147620164370600157246377642462 |
| 456: | 5142221220000000200360006377620000 | 0000337620142005200041346377631000 |
| 460: | 0000000220000000310360006377631000 | 0000717211412002600350503000530000 |
| 462: | 0000000260000000201360036366331000 | 0022737620150541200361346377642414 |
| 464: | 0000000220000000310360006377631000 | 0020000272110340203377072000432200 |
| 466: | 0041577220000000200360000507020003 | 0041577620000000200350000507020003 |
| 470: | 0000000220000000310360006377631000 | 0041600620000000200350000507020003 |
| 472: | 0041601220000000200360000507020003 | 0042741220006600200360002203021014 |
| 474: | 0000000220000000310360006377631000 | 0042743220006600200360002203021014 |
| 476: | 0042744620006600200360002203021014 | 0042745220006600200360002203021014 |
| 500: | 0002636620012000200020006377603005 | 1140200620142000000437006370320377 |
| 502: | 0062251620010000205377346377661014 | 0062255220010000205377346377661014 |
| 504: | 0004113520012000203600063776300000 | 0021554620152000000377006370403046 |
| 506: | 0002747220000470200377006377631000 | 0001444621400000200009003000302105 |
| 510: | 0000051620012000020360006377630000 | 0401625520024000200377240514412000 |
| 512: | 0401626620024000200377240514412000 | 0401627220024000200377240514412000 |
| 514: | 0023155200000000200360000501531000 | 0401127220024000200377240514412000 |
| 516: | 0400425620024000200377240514412000 | 0400645220024000200377240514412000 |
| 520: | 0001215520000000200360000501431000 | 0401130620024000200377240514412000 |
| 522: | 0400427220024000200377240514412000 | 0400645620024000200377240514412000 |
| 524: | 0001357220300000200360000501431000 | 0040000272002000207377276777631000 |
| 526: | 0201161220000000205360006377612000 | 0201134620000000205360006377612000 |
| 530: | 0000000220000000310350006377631000 | 0004062220000000200400006377603005 |
| 532: | 0002747620006600200360000525602527 | 0040767220004000040350002077620377 |
| 534: | 0000000220900000310360096377631000 | 0440040632024004146115206065012000 |
| 536: | 0440341232024004146115206065012000 | 0000720611012002600360543000530000 |
| 540: | 0663537220016550200376256377621001 | 0042170620000000202360006377631000 |
| 542: | 0002015520000000200740006377612000 | 0000721611612002600360703000530000 |
| 544: | 0663537220016550200376256377621001 | 0042171220000000202360006377631000 |
| 546: | 0407647620142370600140006377652000 | 0000000273000000200000003200012000 |
| 550: | 0663537220016550200376256377621001 | 0040142622002000202037006377631000 |
| 552: | 0040434620000000276417006377720377 | 0040435220000000276417006377720377 |
| 554: | 0663537220016550200376256377621001 | 0000000251000002600000033000332200 |
| 556: | 0040435520000000276417006377720377 | 0040436620000000276417006377720377 |
| 560: | 2141166620010000205360016377621000 | 0200000261000000200000033000312000 |
| 562: | 0040437220000000276417006377720377 | 0042751620004470000377006377660377 |
| 564: | 2141166520010000205360016377621000 | 2200407222002000200377000501412000 |
| 566: | 0040000260142005200360534003021376 | 0040743220000000200360002002020004 |
| 570: | 2140607620010000205360006377621000 | 0040743620000000200350002002020004 |
| 572: | 0004606220012000030377006377643050 | 0004236233002000200350603000331000 |
| 574: | 2140000251010002600000033000321000 | 0041267632142007203377306777602462 |
| 576: | 0020217620012000200360500507242434 | 0021562620012000200360500507242434 |
| 600: | 0041037620016000205360005377621377 | 0062752620012560200377046377622373 |
| 602: | 0062753220012560200377046377622374 | 0001276633020000200004003000302406 |

| | | |
|---|---|---|
| 604: | 0043540620140460200350006005061376 | 0031277233020000200004003000302406 |
| 606: | 00034132200165530200353446377602516 | 0001737620142370600140006377652000 |
| 610: | 0053205520152570200350006050061376 | 0001737620142370600140006377652000 |
| 612: | 0001507620000000200350000430032400 | 0001624620000000200360000420402145 |
| 614: | 0260155620112650200320006377651376 | 0002177620000000201360026101031000 |
| 616: | 0002200620000000201360026101031000 | 0002201220000000201360026101031000 |
| 620: | 0044154120140000200350006014661376 | 0040000320102050200200006377651376 |
| 622: | 0002201620000000201360026101031000 | 0000553520012000200037046377643034 |
| 624: | 1143747620016540200350006377620000 | 0000522620012000200037046377643034 |
| 626: | 0042235620006000012360006377621011 | 0042237620006000012360006377621011 |
| 630: | 0000000220000000310360006377631000 | 0042241220006000012360006377621011 |
| 632: | 0040121620006000012360006377621011 | 0040727220006000012360006377621011 |
| 634: | 0000000220000000310360006377631000 | 0040122620006000012360006377621011 |
| 636: | 0041314620006000012360006377621011 | 0042233620006000012360006377621011 |
| 640: | 0044145520140000200350006014661376 | 0040000320102050200140000502061376 |
| 642: | 0042234620006000012360006377621011 | 0040035220006000012360006377621015 |
| 644: | 0044152120140000200350006014661376 | 0040000320102050200140000502061376 |
| 646: | 0041046520006000012360006377621021 | 0000000260000000200350030507403001 |
| 650: | 0044115120140000200360006014661376 | 0000000320012000200352540501431000 |
| 652: | 0022753520155540200374646170052000 | 0040541632002000207375046777631000 |
| 654: | 0044153120140000200350006014661376 | 0040000320102050200140000502061376 |
| 656: | 0040542632000000207375046777631000 | 0000543222002000200015243000331000 |
| 660: | 0044115520140000200350006014661376 | 0040000320102050200140000502061376 |
| 662: | 0022754620150540200377046033003006 | 0002123620000004140520006071202200 |
| 664: | 0004521222000000200377000500131000 | 5642755620000440200360006377620377 |
| 666: | 0001174520010000205362546377602455 | 1141436620102370000437006377720377 |
| 670: | 0004622222000000200377000500131000 | 0024263233010000200377003000303051 |
| 672: | 0024255233010000200377003000303056 | 0441005232142007207377306777612000 |
| 674: | 0000000220000000310360006377631000 | 0001745220000000200360000430430000 |
| 676: | 0042761220000000200360000507020000 | 0002337220024000200377100501602407 |
| 700: | 0000437635050034071360206370432400 | 0000005220000000200350000432202106 |
| 702: | 0440000272142007203377336777612000 | 0001557621400002000000003000332400 |
| 704: | 1243753520000440200360006377620000 | 0001565621400002000000003000332400 |
| 706: | 0001555621400002000000003000332400 | 0001571221400002000000003000332400 |
| 710: | 1243751620000440200360006377620000 | 0001573621400002000000003000332400 |
| 712: | 0001572621400002000000003000332400 | 0001572621400002000000003000332400 |
| 714: | 1243757620000440200360006377620000 | 0001572621400002000000003000332400 |
| 716: | 0001575621400002000000003000332400 | 0001575621400002000000003000332400 |
| 720: | 1243755520000440200360006377620000 | 0001575621400002000000003000332400 |
| 722: | 0001575621400002000000003000332400 | 0001576621400002000000003000332400 |
| 724: | 1243026520000440200360006377620000 | 0001576521400002000000003000332400 |
| 726: | 0001576621400002000000003000332400 | 0001576621400002000000003000332400 |
| 730: | 1243025620000440200360006377620000 | 0001570621400002000000003000332400 |
| 732: | 0000377620142370600375300514431000 | 0000400620142370600375300514431000 |
| 734: | 0041163220016000205360006377621377 | 0001455220042002200360004377642406 |
| 736: | 0001455520042002200360004377642406 | 0041031220024000200377000503220377 |
| 740: | 0003370520006540200360006377671000 | 0000000262002000200360530523531000 |
| 742: | 1701655520000000200420000506012000 | 0441104620016002106035006377652000 |
| 744: | 0003371620006540200360006377671000 | 000125262001000030360706377630000 |
| 746: | 0340353520000000207360006777602104 | 0340364620000000207360006777602105 |
| 750: | 0003372620006540200360006377671000 | 0344766220000000207360006777602106 |
| 752: | 0001115520142006200376544035042511 | 0441661232022004146135246055212000 |
| 754: | 0003373220006540200360006377671000 | 0441661632022004146135246055212000 |
| 756: | 0021426520012000200377340503642413 | 0000630620054001200077106377672400 |
| 760: | 0002357621000002000000003000302201 | 0000631220054001200077106377672400 |
| 762: | 0000631620054001200077106377672400 | 0000632620054001200077106377672400 |
| 764: | 0001653222002000200360000505231000 | 0002224632004000200360000406402032 |
| 766: | 0044232220142004200140006056460377 | 0001431232000000200360002001403005 |
| 770: | 0000000220000000310360006377631000 | 000276722000640351360006362631000 |
| 772: | 0004204220000000205420006377602455 | 0340037220000000207360006777602406 |
| 774: | 0000000220000000310360006377631000 | 0340375620000000207360006777602407 |
| 776: | 0006045620012000200042406377631000 | 0040557232142007207375346777602462 |
| 1000: | 0000000220000000310360006377631000 | 0040557632142007207375346777602462 |
| 1002: | 0023001620150540200377046031203006 | 0000000260004000203350036377632200 |
| 1004: | 0000000220000000310360006377631000 | 0003551620000470200360006377642015 |
| 1006: | 0000032520000470200360006377642015 | 0001770622002000200376102000231000 |
| 1010: | 0000000220000000310360006377631000 | 2702410620000440200360006377612000 |
| 1012: | 0053527620016530200377006377620377 | 0440930620014002106035106377612000 |
| 1014: | 0000000220000000310360006377631000 | 0000020260012000200351070503402416 |
| 1016: | 0340000260000000203360035777602406 | 0060425220012000020206463776610 15 |
| 1020: | 0000000220000000310350006377631000 | 0040031620000000206360006377631000 |
| 1022: | 0040074620000000206360006377631000 | 0053603462001257210037704637762 1011 |
| 1024: | 0000000220000000310360006377631000 | 0053005220012572100377046377621011 |
| 1026: | 0053642620012572100377046377621016 | 0063644620012572100377046377621016 |
| 1030: | 0000000220000000310360006377631000 | 0063546520012572100377046377621016 |
| 1032: | 0053650620012572100377046377621016 | 0040031220400000200377040501420001 |

| | | |
|---|---|---|
| 1034: | 0000000220000000310360006377631000 | 0401551232024004140157246065412000 |
| 1036: | 0401551232024004140157246065412000 | 0040764620000000242360006377631000 |
| 1040: | 0000000220000000310360006377631000 | 0042173520000000242360006377631000 |
| 1042: | 0040556532002000200362540402631000 | 0200000273142170600000032077752000 |
| 1044: | 0000000220000000310360006377631000 | 0042656620000000200420006377622002 |
| 1046: | 0041536532142370600350002001660003 | 0001610620122030160000006377603037 |
| 1050: | 0000000220000000310360006377631000 | 0050651620012000010360746377661011 |
| 1052: | 0062350520012000010360746377661015 | 0062351220012000010360746377661015 |
| 1054: | 0000000220000000310360006377631000 | 0050465620012000010360746377661015 |
| 1056: | 0061131220012000010360746377661015 | 0060335620012000010360746377661021 |
| 1060: | 0000000220000000310360006377631000 | 0062241620012000010360746377661021 |
| 1062: | 0064073220012000010350745377661021 | 0441001232142003203377306777612000 |
| 1064: | 0000000220000000310360006377631000 | 0442316632142003203377306777612000 |
| 1066: | 0047776222002000213376506777602010 | 0000000275002000200017072077731000 |
| 1070: | 0000000220000000310360006377631000 | 0042141620000000276360006377631000 |
| 1072: | 0042163520000000276360006377631000 | 0042164620000000275360006377631000 |
| 1074: | 0000003220000000310360006377631000 | 0042165220000000276360006377631000 |
| 1076: | 0042165520000000276360006377631000 | 0040440620003000276360006377631000 |
| 1100: | 0000000220000000310360006377631000 | 0042206620000000276350006377631000 |
| 1102: | 0021141632010000200017006377602406 | 0021114632010000200017006377602406 |
| 1104: | 0000000220000000310360006377631000 | 0041537620142370600350002001660003 |
| 1106: | 0002011620006500200377046377671000 | 0003026100040002003500000501412000 |
| 1110: | 0000000220000000310360006377631000 | 0021411232010000200017006377602430 |
| 1112: | 0220720511412002600360543000530000 | 0203012620000470203360006377642523 |
| 1114: | 0000000220000000310360006377631000 | 0000771232002004140037046064231000 |
| 1116: | 0000405632002004140037046064231000 | 0040000262002000200400530523520000 |
| 1120: | 0000000220000000310360006377631000 | 0043015220006500200350000515021014 |
| 1122: | 0043015520065002003500000515021014 | 0061175620010000205377406377661020 |
| 1124: | 0000000220000000310360006377631000 | 0361376620010000205377406377661020 |
| 1126: | 0060525520010000205377406377661020 | 0060526620010000205377406377661020 |
| 1130: | 0000000220000000310360006377631000 | 0060527220010000205377406377661020 |
| 1132: | 0060315220010000205377406377661020 | 0062602620010000205377406377661020 |
| 1134: | 0000000220000000310360006377631000 | 0060527620010000205377406377661020 |
| 1136: | 0062051520010000205377406377651020 | 0062047620010000205377406377661020 |
| 1140: | 2141173220000000205360016377620000 | 0026671320017570203360006377642405 |
| 1142: | 0046555620010020205360006377620000 | 0061437220010000205377406377661020 |
| 1144: | 2141173220000000205360016377620000 | 0026671320017570200350006377642406 |
| 1146: | 0040000251010002600000032000020000 | 0061777620010000205377406377661020 |
| 1150: | 2141173220000000205360016377620000 | 0026671320017570200350006377642405 |
| 1152: | 0041134520010000205350006377720000 | 0050564620010000205377406377661020 |
| 1154: | 0000000220000000310360006377631000 | 0060317220010000205377406377661020 |
| 1156: | 0062000620010000205377406377651020 | 0061510620010000205377406377661020 |
| 1160: | 0000000220000000310360006377631000 | 0060276620010000205377406377661020 |
| 1162: | 0051203520010000205377406377661020 | 0064407220010000205377406377661020 |
| 1164: | 0000000220000000310360006377631000 | 0042216620400030200377040501420377 |
| 1166: | 0001475220000000200360000522431000 | 0043017220010572100352046377621011 |
| 1170: | 0000000220000000310360006377631000 | 0043415220010572100352046377621011 |
| 1172: | 0041110620000000414046000605472000 | 0004264233010000200360003000303051 |
| 1174: | 0000000220000000310360006377631000 | 0040575220020000200350742202221011 |
| 1176: | 0003021220016530200363506377602002 | 0000713620020000200036300501442406 |
| 1200: | 1060072673004003500017032000023400 | 1140361220000000200360006377620377 |
| 1202: | 0021501611016002440377003000530000 | 0020332611016002440377003000530000 |
| 1204: | 1041574673004003500000232000020000 | 0002067620022000200037406377642414 |
| 1206: | 0002070620022000200037406377642414 | 0063022620150540200351346072260000 |
| 1210: | 1060073273006003500017032000063400 | 0043023220006600200620006377621011 |
| 1212: | 0043023520005500200620006377621011 | 0040360520142006200361044003021376 |
| 1214: | 1041575273006003500000232000020000 | 0040021220142006200377044050021376 |
| 1216: | 0400452620164001200377240501412000 | 1142044620142000000437006370720377 |
| 1220: | 1041573320042007530020206377660000 | 0062726620000602570437046377631000 |
| 1222: | 0000000260142002050377074015402514 | 0000772620002000000377046377631000 |
| 1224: | 0000000220000000310360006377631000 | 0020421620152000000377006371003046 |
| 1226: | 0002031620004004140360006067602104 | 0000721211012002600360603000530000 |
| 1230: | 0000000220000000310360006377631000 | 0002033222002000200361340524631000 |
| 1232: | 0000555622002000200361340524631000 | 0042227622002000213362346777602525 |
| 1234: | 0000000220000000310360006377631000 | 0001141233102360200017002000031000 |
| 1236: | 0040000260000000200600036377621017 | 0000715633002000200017043000331000 |
| 1240: | 0000000220000000310360006377631000 | 0000115620022000200361140512202451 |
| 1242: | 0440255632024004146075146064612000 | 0063025220156540200377046050061376 |
| 1244: | 0000000220000000310360006377631000 | 0063025220156540200377046050061376 |
| 1246: | 1243027220000440200360006377620000 | 0041001620000000002360006377621011 |
| 1250: | 0000000220000000310360006377631000 | 0041003220000000002360006377621011 |
| 1252: | 0000724622002000200057146377631000 | 0041603220000000002360006377621021 |
| 1254: | 0000000220000000310360006377631000 | 0042272620000000002350006377621021 |
| 1256: | 0041503620000000002360006377621021 | 0041604620000000002360006377621021 |
| 1260: | 0000000220000000310360006377631000 | 0002217232002004140137046065231000 |
| 1262: | 0001541232002004140137046065231000 | 0002217632002004140137046065231000 |

```
1264: 0000000220000000310360006377631000 0001541632002004140137046065231000
1266: 0053030662015054020036134607226037? 0043031220010572100360406377620375
1270: 0000000220000000310360006377631000 0440073632024004146077246064612000
1272: 6103031621000440070360003000312000 0020401220012000200037006377603005
1274: 0000000220000000310360006377631000 0004213220154000205377206055072200
1276: 0004214220154000205377206055072200 0021107620014000030377046377631000
1300: 1040347273142001510000032000060000 0001331632024004140057246064442462
1302: 0000703522002000200360540524431000 0040736632002000207375106777631000
1304: 1040347673142101510000032000060000 0040737232002000207375106777631000
1306: 0000737622002000200015303000331000 0000352620000000200420006377631000
1310: 1040350673142201510000032000060000 0002073620000000200360000421002102
1312: 0000000250002002600377132000431000 1140000260000000243360036777720001
1314: 1040351273142301510000032000060000 0002072620000000200360000421002147
1316: 0023033620150541200377406377603006 0341311620200000203377146777620001
1320: 1040351673142007520017032077760377 0004207220000004140640005072412000
1322: 0020547220012000010361346377642417 0044210220010000205360546377621377
1324: 1040352673142107520017032077760377 0001040610010002600361100420202100
1326: 0063423220152570200037046050061376 0063423220152570200037046050061376
1330: 1040353273142207520017032077760377 0023035220010470200360600524042523
1332: 0001300632002000200360500405431000 0004076232002000200360500405431000
1334: 1040353673142307520017032077760377 0001625220022001730361040522602513
1336: 0004200220142370600375340514431000 0004201220142370600375340514431000
1340: 0642054620000000205500006377620000 0001334632024004140157246065442462
1342: 0001337232024004140157246065442462 0002127220000000030360006377602141
1344: 0642105220000000205500006377620000 0440446620016002106035046377652000
1346: 0023405220150540200361346015442106 0023405220150540200361346015442106
1350: 0642065220000000205500006377620000 0041265632142003203377306777642462
1352: 0440365632022004146115206065012000 0440366632022004146115206065012000
1354: 0642105520000000205500006377620000 0000634620054001200077146377672400
1356: 0000635220054001200077146377672400 0000635620054001200077146377672400
1360: 0642007620000000205500016377620000 0044265220010000205360006377620002
1362: 0000636620054001200077146377672400 0043041620006600200360006377621011
1364: 0642007620000000205500016377620000 0044266220010000205360006377620002
1366: 0043042620005500200360006377621011 0043043220006600200360006377621011
1370: 0000000220000000310360006377631000 0043043620006600200360006377621011
1372: 0043044620006600200360006377621011 0043045220006600200360006377621011
1374: 0000000220000000310360006377631000 0043045620006600200360006377621011
1376: 0043046620006600200360006377621011 0061663220012000200377042203221015
1400: 0041010620016000205360006377621377 0043761620006600200360006377621021
1402: 0020722611212002600377003000530000 0001730633102360200017043000331000
1404: 0041011220016000205360006377621377 0042243220005090012377046377671000
1406: 0000107633002000200017503000331000 0040236620006000200360002204021020
1410: 0041011620016000205360006377621377 0040235620006000200350002204021020
1412: 0042054620006000200360002204021020 0040237220006000200360002204021020
1414: 0041012520016000205360006377621377 0040237620005000200360002204021020
1416: 0000403232002000201362764101002015 0040141622002000202037006377631000
1420: 0041013220016000205360006377621377 0040757220000000200360000501621374
1422: 0002111220042002200360000501442414 0040154610002005202377202277631000
1424: 0041013620016000205360006377621377 0003716620142006070361044002402106
1426: 0001453620042002200360000501442463 0001454620042002200360000501442463
1430: 0041014620016000205360006377621377 0441005232164005207377246777612000
1432: 0441671620014002106035146377612000 0000743232000000200360002002003032
1434: 0041015220016000205360006377621377 0200000273142006000000032077752000
1436: 0041041220000000200360000511620000 0002175620142007200157306377602462
1440: 0041015620016000205360006377621377 0000745620006000020360006377602100
1442: 0004427220006000020360006377602105 0040622620004000212360000524002520
1444: 0041016520016000205360006377621377 0040703220004000212360000524002520
1446: 0041422620004000212360300524002520 0040541220004000212360000524002520
1450: 0041017220016000205360006377621377 0041347620004000212360000524002520
1452: 0040415520142000200020006371560001 0003047620016570010360646377602406
1454: 0041017620016000205360006377621377 0003050620016570010360646377602406
1456: 0002017635042004201377146370431000 0032021236042004201377146370431000
1460: 0041020620016000205350006377621377 0001071236042004201377146370431030
1462: 0001071636042004201377146370431000 0002023236042004201377146370431000
1464: 0041021220016000205360006377621377 0002023636042004201377146370431000
1466: 0002025236042004201377146370431000 0002025636042004201377146370431000
1470: 0041021620016000205360006377621377 0001072636042004201377146370431000
1472: 0001073236042004201377146370431000 0002030636042004201377146370431000
1474: 0041022620016000205360006377621377 0002031236042004201377146370431000
1476: 0000341636042004201377146370431000 0003413236042004201377146370431000
1500: 0041023220016000205360006377621377 0000354636042004201377146370431000
1502: 0063051620000602570377100501631000 0063052620000602570377100501631000
1504: 0041023620016000205360006377621377 0063053220000602570377100501631000
1506: 0063053620000602570377100501631000 0063054620000602570377100501631000
1510: 0041024620016000205360006377621377 0440030272164005203377276777612000
```

| | | |
|---|---|---|
| 1512: | 0062273620012000000377440501461015 | 0062275220012000000377440501461015 |
| 1514: | 0041025220016000205360006377621377 | 0004226220000000200600000514003006 |
| 1516: | 0002111620000000200500000514003006 | 0002112620000000200600000514003005 |
| 1520: | 0001060522002000200377000500131000 | 0442133632142007203377246777612000 |
| 1522: | 0441145632142007203377246777612000 | 0440000272142003203377336777652000 |
| 1524: | 0001061222002000200377000500131000 | 0003654620140461200403046377603035 |
| 1526: | 0000003260142004200157336350231000 | 0001121220012004145375746057643034 |
| 1530: | 0001061622002000200377000500131000 | 0021501611416002440377003000530000 |
| 1532: | 0020332611416002440377003000530000 | 0003056620140460200377506001231000 |
| 1534: | 0001062622002000200377000500131000 | 0003057220140460200377506001231000 |
| 1536: | 0003057620140460200377506001231000 | 0003060620140460200377506001231000 |
| 1540: | 0001502611016002440360003000530000 | 0003061220140460200377506001231000 |
| 1542: | 0001511620000000200420006377632400 | 0000000260000600200360030403212000 |
| 1544: | 0001502611216002440360003000530000 | 0041217622002000213376546777602010 |
| 1546: | 0041220622002000213376546777602010 | 0041221222002000213376546777602010 |
| 1550: | 0001502611416002440360003000530000 | 0023061620156540200377046072052000 |
| 1552: | 0003511220000000200360000506012000 | 0002313620000000200360000506012000 |
| 1554: | 0001502611616002440360003000530000 | 0002314620000000200360000506012000 |
| 1556: | 0002003520000000200350000506012000 | 0002004620000000200360000506012000 |
| 1560: | 0040100620000000200360000500020000 | 0000721211412002600360603000530000 |
| 1562: | 0023062620010600010361706377642416 | 0023063220010600010361706377642416 |
| 1564: | 0040101220000000200360000500020000 | 0023063620010600010361706377642416 |
| 1566: | 0023064620010600010361706377642416 | 0023065220010600010361706377642416 |
| 1570: | 0040101620000000200360000500020000 | 0023065620010600010361706377642416 |
| 1572: | 0002256620000000200350000431002101 | 0001243222002000200360540501431000 |
| 1574: | 0040102620000000200360000500020000 | 0002244620010000200360600524002523 |
| 1576: | 0023656616016537600377100501631000 | 0002071220004001720360030405202025 |
| 1600: | 0000000220000000310360006377631000 | 0000143620142370600360000514442462 |
| 1602: | 0003066620140460160360006004402407 | 0060000272010002170000036377760377 |
| 1604: | 0000000220000000310360006377631000 | 0001117222002000200120506377631000 |
| 1606: | 0000325220000000200360000525412000 | 0007040620000000200360000525412000 |
| 1610: | 0000000220000000310360006377631000 | 0000015620000000200360000525412000 |
| 1612: | 0000372620000000200360000525412000 | 0001466620142006200037046075642416 |
| 1614: | 0000000220000000310360006377631000 | 0001467220142006200037046075642416 |
| 1616: | 0001467620142006200037046075642416 | 0001470620142006200037046075642416 |
| 1620: | 0000000220000000310360006377631000 | 0000356622002000200377044377602406 |
| 1622: | 0000357222002000200377044377602406 | 0041073620142006200377104050021376 |
| 1624: | 0000000220000000310360006377631000 | 0020506620012000200037046377602406 |
| 1626: | 0022230620150004200057046360202406 | 0021326620150004200057046360202406 |
| 1630: | 0000000220000000310360006377631000 | 0442303632020004146135246065212000 |
| 1632: | 0442304632020004146135246065212000 | 0001635611000002600000003000332200 |
| 1634: | 0000000220000000310360006377631000 | 0000023220010000205360546377602016 |
| 1636: | 5401401220000000205360007377712000 | 5401401620000000205360007377712000 |
| 1640: | 0000000220000000310360006377631000 | 5401402620000000205360007377712000 |
| 1642: | 5401403220000000205360007377712000 | 5401403620000000205360007377712000 |
| 1644: | 0000000220000000310360006377631000 | 5401404620000000205360007377712000 |
| 1646: | 0047417220142006070361044003021376 | 0040773220000000200440006377621015 |
| 1650: | 0000000220000000310360006377631000 | 0040300620000000400600006377622373 |
| 1652: | 0001715620142006200360504002402106 | 0043075620004640233360024102602520 |
| 1654: | 0000000220000000310360006377631000 | 0004237233002000200360703000331000 |
| 1656: | 0000341220002000000540506377602462 | 0040374620000000222360006377602406 |
| 1660: | 0000000220000000310360006377631000 | 0440521232024004146055106064412000 |
| 1662: | 0023100620150540200377046030003006 | 0000767622002000200376342200031000 |
| 1664: | 0000000220000000310360006377631000 | 0000767622002000200376342200031000 |
| 1666: | 0000000263002000200017073000331000 | 0007362620002000205377206377631000 |
| 1670: | 0000000220000000310360006377631000 | 0023441220156540200360506027642022 |
| 1672: | 0040000260142007603377076777612000 | 0000717611212002600361043000530000 |
| 1674: | 0000000220000000310360006377631000 | 0041222632002000207375146777631000 |
| 1676: | 0041223232002000207375146777631000 | 0000505622002000200015343000331000 |
| 1700: | 0000000220000000310360006377631000 | 0063660620010572100377046377621016 |
| 1702: | 0063552620010572100377046377621016 | 0063664620010572100377046377621016 |
| 1704: | 0000000220000000310360006377631000 | 0063666620010572100377046377621016 |
| 1706: | 0004035522002000200006506377631000 | 0004620222002000200000506377631000 |
| 1710: | 0000000220000000310360006377631000 | 0007457220000000200360000503403005 |
| 1712: | 0007463220000000200360000503403005 | 0002346620000004140500006071002101 |
| 1714: | 0000000220000000310360006377631000 | 0000661620000000201740026101012000 |
| 1716: | 0040747632002000207377246777631000 | 0040750632002000207377246777631000 |
| 1720: | 0000000220000000310360006377631000 | 0040751232002000207377246777631000 |
| 1722: | 0040751632002000207377246777631000 | 0040752632002000207377246777631000 |
| 1724: | 0000000220000000310360006377631000 | 0040753232002000207377246777631000 |
| 1726: | 0040252632002000207377246777631000 | 0000000260000000200360032276602200 |
| 1730: | 0000000220000000310360006377631000 | 0023110620012600010360746377642417 |
| 1732: | 0023113220012600010360746377642417 | 0060533620150004200377004340620377 |
| 1734: | 0000000220000000310360006377631000 | 0060626620010000200377440501461021 |
| 1736: | 0040016620000000200360000504021373 | 0000573620024000200157306377602460 |
| 1740: | 0000000220000000310360006377631000 | 0004150620024000200157306377602460 |

| | | |
|---|---|---|
| 1742: | 000030062000000004006000637763 1000 | 120311652000044020036000637760 2105 |
| 1744: | 000757523200200020002000050143 1000 | 000072563200200020036054040543 1000 |
| 1746: | 044767163202400020337724677761 2000 | 000156062000000020036000042140 2151 |
| 1750: | 000000022000000031036000637763 1000 | 000066462014200020002000607307 2200 |
| 1752: | 004000026014230760337707677761 2000 | 002072261161200260037700300053 0000 |
| 1754: | 000000022000000031036000637763 1000 | 004276422000000020036000207772 0000 |
| 1756: | 020461362000000020036000247761 2000 | 004274022014200620036050400302 1376 |
| 1760: | 000155322001200004036000637763 0000 | 000004662014200620036050400050 2106 |
| 1762: | 044002762001600210603510637765 2000 | 004151462000000020036000050622 0002 |
| 1764: | 000000022000000031036000637763 1000 | 040045322016437060015724637765 2000 |
| 1766: | 040011362016437060015724637765 2000 | 040045462016437060015724637765 2000 |
| 1770: | 000000022000000031036000637763 1000 | 040023662016437060015724637765 2000 |
| 1772: | 040045062016437060015724637765 2000 | 040023762016437060015724637765 2000 |
| 1774: | 000000022000000031036000637763 1000 | 040003562016437060015724637765 2000 |
| 1776: | 040045122016437060015724637765 2000 | 000125522200200020002314637763 1000 |
| 2000: | 000000022000000031036000637763 1000 | 006311722001655020037604637762 2000 |
| 2002: | 000015122014237060015730637763 1000 | 000024762014237060015730637763 1000 |
| 2004: | 000000022000000031036000637763 1000 | 000175562014237060015730637763 1000 |
| 2006: | 000025162014237060015730637763 1000 | 000001462000000020044000637763 0000 |
| 2010: | 000000022000000031036000637763 1000 | 000027522000000020044000637763 0000 |
| 2012: | 004000027200000020736003677760 2406 | 000461622000000020036000050740 3001 |
| 2014: | 000000022000000031036000637763 1000 | 000402723200200020036050040023 1000 |
| 2016: | 000000027500200020001707200003 1000 | 000311762014046020037730600143 1000 |
| 2020: | 000000022000000031036000637763 1000 | 004004721100000260236000200023 1000 |
| 2022: | 004134661100000260236000200023 1000 | 004023061100000260236000200023 1000 |
| 2024: | 000000022000000031036000637763 1000 | 004152551100000260236000200023 1000 |
| 2026: | 004206361100000260236000200023 1000 | 004073551100000260236000200023 1000 |
| 2030: | 000000022000000031036000637763 1000 | 004233061100000260236000200023 1000 |
| 2032: | 004113261100000260236000200023 1000 | 004025761100000260236000200023 1000 |
| 2034: | 000000022000000031036000637763 1000 | 004154321100000260236000200023 1000 |
| 2036: | 004044521100000260236000200023 1000 | 004173561100000260236000200023 1000 |
| 2040: | 000000022000000031036000637763 1000 | 004051361100000260236000200023 1000 |
| 2042: | 004177361100000260236000200023 1000 | 004067061100000260236000200023 1000 |
| 2044: | 000000022000000031036000637763 1000 | 004223121100000260236000200023 1000 |
| 2046: | 004111761100000260236000200023 1000 | 004011121100000260236000200023 1000 |
| 2050: | 000000022000000031036000637763 1000 | 004140661100009260236000200023 1000 |
| 2052: | 004026161100000260236000200023 1000 | 004171521100000260236000200023 1000 |
| 2054: | 000000022000000031036000637763 1000 | 004060121100000260236000200023 1000 |
| 2056: | 004211661100000260236000200023 1000 | 004076561100000260236000200023 1000 |
| 2060: | 000000022000000031036000637763 1000 | 000345122000660020036000637760 2416 |
| 2062: | 000346322000660020036000637760 2416 | 044055523202200414607514606461 2000 |
| 2064: | 000000022000000031036000637763 1000 | 040414663202400414017534606561 2000 |
| 2066: | 040414763202400414017534606561 2000 | 004000026000000020000003300032 1003 |
| 2070: | 000000022000000031036000637763 1000 | 004000026000000020000003300032 1004 |
| 2072: | 004000026000000020000003300032 1005 | 004000026000000020000003300032 1006 |
| 2074: | 000000022000000031036000637763 1000 | 004000026000000020000003300032 1007 |
| 2076: | 004000026000000020000003300032 1010 | 004436652000400020202000637760 2104 |
| 2100: | 000000022000000031036000637763 1000 | 000160761000200260036050042043 1000 |
| 2102: | 002312662015257020036104602004 2106 | 044121322001400210603520637761 2000 |
| 2104: | 000000022000000031036000637763 1000 | 044121462001400210603520637761 2000 |
| 2106: | 000155663200000020036000042140 3035 | 004121052000000020536000637772 0377 |
| 2110: | 000000022000000031036000637763 1000 | 000000027202200020036417040020 2001 |
| 2112: | 170000025100000360000003200001 2000 | 006057762001200000037704637766 1015 |
| 2114: | 000000022000000031036000637763 1000 | 006141462001200000037704637766 1015 |
| 2116: | 006077722001200000037704637766 1015 | 004013522000000025242000637772 0377 |
| 2120: | 000000022000000031036000637763 1000 | 004013562000000025242000637772 0377 |
| 2122: | 004013662000000025242000637772 0377 | 004013722000000025242000637772 0377 |
| 2124: | 000000022000000031036000637763 1000 | 004013762000000025242000637772 0377 |
| 2126: | 000313262000654020037750637767 1000 | 000313322000654020037750637767 1000 |
| 2130: | 000000022000000031036000637763 1000 | 000346522014046020036000600004 2513 |
| 2132: | 000051522000000020036000040600 2523 | 044230163214200720337730677761 2000 |
| 2134: | 000000022000000031036000637763 1000 | 044114363214200720337730677761 2000 |
| 2136: | 044114463214200720337730677761 2000 | 044015063214200720337730677761 2000 |
| 2140: | 000000022000000031036000637763 1000 | 004102562001600020536000637762 1377 |
| 2142: | 004102662001600020536000637762 1377 | 004102722001600020536000637762 1377 |
| 2144: | 000000022000000031036000637763 1000 | 004102762001600020536000637762 1377 |
| 2146: | 000072522200200020036050052363 1000 | 004445062200200021337660677760 2010 |
| 2150: | 000000022000000031036000637763 1000 | 004201662200200021337660677760 2010 |
| 2152: | 034065362020000020337704677760 2407 | 034224522020000020337704677760 2407 |
| 2154: | 000000022000000031036000637763 1000 | 002313522001256020037700637764 2100 |
| 2156: | 002313662001256020037700637764 2100 | 002313722001256020037700637764 2100 |
| 2160: | 000000022000000031036000637763 1000 | 002313762001256020037700637764 2100 |
| 2162: | 000202162001200020005710637764 3034 | 000202262001200020005710637764 3034 |
| 2164: | 000000022000000031036000637763 1000 | 000202722001200020005710637764 3034 |
| 2166: | 000202762001200020005710637764 3034 | 000037723300400020001704300037 1000 |
| 2170: | 000000022000000031036000637763 1000 | 006441262011005020036134050206 1376 |

| | | |
|---|---|---|
| 2172: | 004170722014237060614000637765200 0 | 004124262014237060614000637765200 0 |
| 2174: | 000000022000000031036000637763100 0 | 004054062014237060614000637765200 0 |
| 2176: | 004007762014237060614000637765200 0 | 004174322014237060614000637765200 0 |
| 2200: | 000000022000000031036000637763100 0 | 004130462014237060614000637765200 0 |
| 2202: | 004056062014237060614000637765200 0 | 004174362014237060614000637765200 0 |
| 2204: | 000000022000000031036000637763100 0 | 004130522014237060614000637765200 0 |
| 2206: | 004056122014237060614000637765200 0 | 000114762014237060037500051443100 0 |
| 2210: | 000000022000000031036000637763100 0 | 000056263200200414001704606403100 0 |
| 2212: | 000021323200200414001704606403100 0 | 004004162000600020601700637767100 0 |
| 2214: | 000000022000000031036000637763100 0 | 040173322001400210003534637761200 0 |
| 2216: | 040173362001400210003534637761200 0 | 002731762001400002007704637763000 0 |
| 2220: | 000000022000000031036000637763100 0 | 004163462000000414044000606452000 0 |
| 2222: | 000012462000000020036000043140210 3 | 000115122000400020536000637763220 0 |
| 2224: | 000000022000000031036000637763100 0 | 000115162000400020536000637763220 0 |
| 2226: | 000115322000400020536000637763220 0 | 000115562000400020536000637763220 0 |
| 2230: | 000000022000000031036000637763100 0 | 000115722000400020536000637763220 0 |
| 2232: | 000116662000400020536000637763220 0 | 000153122000000414070000607300251 1 |
| 2234: | 000000022000000031036000637763100 0 | 004407022000000000044000637762102 1 |
| 2236: | 000423122000000020036000200060243 4 | 000072161101200260036070300053000 0 |
| 2240: | 000000022000000031036000637763100 0 | 004075561001000260036040207702037 4 |
| 2242: | 034436622000000020336000677760240 6 | 034145322000000020336000677760240 6 |
| 2244: | 000000022000000031036000637763100 0 | 006132162001600001237704637762101 5 |
| 2246: | 000163722002200020036114050140240 6 | 000227722000000035036000637763100 0 |
| 2250: | 000000022000000031036000637763100 0 | 000220462000000035036000637763100 0 |
| 2252: | 000220522000000035036000637763100 0 | 000171262000000035036000637763100 0 |
| 2254: | 000000022000000031036000637763100 0 | 000220762000000035036000637763100 0 |
| 2256: | 000046162014200320015730637764246 2 | 000046662014200320015730637764246 2 |
| 2260: | 000000022000000031036000637763100 0 | 000176762014200320015730637764246 2 |
| 2262: | 000414022014200320015730637764246 2 | 000175662014200320015730637764246 2 |
| 2264: | 000000022000000031036000637763100 0 | 000071761161200260036104300053000 0 |
| 2266: | 044071463202000414611520606501200 0 | 044071523202000414611520606501200 0 |
| 2270: | 000000022000000031036000637763100 0 | 004013322000000020242000637762000 0 |
| 2272: | 000406422000000020036000220020220 0 | 006014462001000020037704220322101 5 |
| 2274: | 000000022000000031036000637763100 0 | 006205322001000020037704220322101 5 |
| 2276: | 006315122015654020036124607226037 7 | 006461322001200020003700637766037 7 |
| 2300: | 000000022000000031036000637763100 0 | 004206122000000020036000200012200 0 |
| 2302: | 000232762014200620037704400760240 6 | 000111162000000020044000637760243 0 |
| 2304: | 000000022000000031036000637763100 0 | 000105362014200620025750624144241 7 |
| 2306: | 004000027502400020001707207772037 7 | 004163062000400020036000220402102 0 |
| 2310: | 000000022000000031036000637763100 0 | 004234722000400020036000220402102 0 |
| 2312: | 004014522000400020036000220402102 0 | 004014562000400020036000220402102 0 |
| 2314: | 000000022000000031036000637763100 0 | 004163322000400020036000220402102 0 |
| 2316: | 004163362000400020036000220402102 0 | 004141163214200720737504677760246 2 |
| 2320: | 000000022000000031036000637763100 0 | 004131122000000020236000637763100 0 |
| 2322: | 004214562000000020236000637763100 0 | 004214662000000020236000637763100 0 |
| 2324: | 000000022000000031036000637763100 0 | 004443322000000020236000637763100 0 |
| 2326: | 004214722000000020236000637763100 0 | 004427022000000020236000637763100 0 |
| 2330: | 000000022000000031036000637763100 0 | 004215062000000020236000637763100 0 |
| 2332: | 004443422000000020236000637763100 0 | 004215122000000020236000637763100 0 |
| 2334: | 000000022000000031036000637763100 0 | 004215162000000020236000637763100 0 |
| 2336: | 004215262000000020236000637763100 0 | 004215462000000020236000637763100 0 |
| 2340: | 000000022000000031036000637763100 0 | 004215562000000020236000637763100 0 |
| 2342: | 004215762000000020236000637763100 0 | 004216122000000020236000637763100 0 |
| 2344: | 000000022000000031036000637763100 0 | 004216162000000020236000637763100 0 |
| 2346: | 004066122000000020236000637763100 0 | 004153162000000020236000637763100 0 |
| 2350: | 000000022000000031036000637763100 0 | 004153262000000020236000637763100 0 |
| 2352: | 004153322000000020236000637763100 0 | 004153362000000020236000637763100 0 |
| 2354: | 000000022000000031036000637763100 0 | 004665362000000020236000637763100 0 |
| 2356: | 004052322000000020236000637763100 0 | 004216662000000020236000637763100 0 |
| 2360: | 000000022000000031036000637763100 0 | 004216722000000020236000637763100 0 |
| 2362: | 004216762000000020236000637763100 0 | 004025562000000020236000637763100 0 |
| 2364: | 000000022000000031036000637763100 0 | 004201722000000020236000637763100 0 |
| 2366: | 004217162000000020236000637763100 0 | 004147362000000020236000637763100 0 |
| 2370: | 000000022000000031036000637763100 0 | 004022522000000020236000637763100 0 |
| 2372: | 004227122000000020236000637763100 0 | 004042762000000020236000637763100 0 |
| 2374: | 000000022000000031036000637763100 0 | 004131762000000020236000637763100 0 |
| 2376: | 004132122000000020236000637763100 0 | 004132262000000020236000637763100 0 |
| 2400: | 000000022000000031036000637763100 0 | 004176262000000020236000637763100 0 |
| 2402: | 004217662000000020236000637763100 0 | 004132322000090020236000637763100 0 |
| 2404: | 000000022000000031036000637763100 0 | 004104722000000020236000637763100 0 |
| 2406: | 004220722000000020236000637763100 0 | 004131662000000020236000637763100 0 |
| 2410: | 000000022000000031036000637763100 0 | 004422722014200620036254403702000 1 |
| 2412: | 002065562001000020025740637764241 4 | 004000027214217660337707677771200 0 |
| 2414: | 000000022000000031036000637763100 0 | 000207322000400020035000050140240 6 |
| 2416: | 000000026001200020036057050340241 6 | 000150322014200020003704410560240 6 |

| | | |
|---|---|---|
| 2420: | 0000003220000000310360006377631000 | 0040000260000000320336003677702406 |
| 2422: | 0440730632024004146035046064212000 | 0000000273002000200172720000031000 |
| 2424: | 0000000220000000310360006377631000 | 0001731632002004140117046065031000 |
| 2426: | 0001342632002004140117046065031000 | 0001732632002004140117046065031000 |
| 2430: | 0000000220000000310360006377631000 | 0001343232002004140117046065031000 |
| 2432: | 0024217220016000030457006377630000 | 0024547220016000030457006377630000 |
| 2434: | 0000000220000000310360006377631000 | 0021654620016000030457006377630000 |
| 2436: | 0040000273142007200017132077760000 | 0003161620006600201360024101002511 |
| 2440: | 0003000220000000310360006377631000 | 0003162620006600201360024101002511 |
| 2442: | 0003163220005600201360024101002511 | 0440534632024004146057246064412000 |
| 2444: | 0000000220000000310360006377631000 | 0041457232002000207375206777631000 |
| 2446: | 0341460632002000207375206777631000 | 0000611620010000205360606377602454 |
| 2450: | 0000000220000000310360006377631000 | 0043163520140460200360006004461376 |
| 2452: | 0043164620140460200360006004461376 | 0041705620000004140540006065520000 |
| 2454: | 0000000220000000310360006377631000 | 0042074620000000272360005377631000 |
| 2456: | 0042075220000000272360006377631000 | 0042075520000000272360006377631000 |
| 2460: | 0000000220000000310360006377631000 | 0042076620000000272360006377631000 |
| 2462: | 0042077220000000272360006377631000 | 0042077620000000272360006377631000 |
| 2464: | 0000000220000000310360006377631000 | 0042101220000000272360006377631000 |
| 2466: | 0042075220000000272360006377631000 | 0042075620000000272360006377631000 |
| 2470: | 0002300220000000310360006377631000 | 0042076620000000272360005377631000 |
| 2472: | 0042077220000000272360006377631000 | 0042077620000000272360006377631000 |
| 2474: | 0000300220000000310360006377631000 | 0042100620000000272360006377631000 |
| 2476: | 0042101220000000272360006377631000 | 0044206220000000272360006377631000 |
| 2500: | 0000000220000000310360006377631000 | 0044245220000000272360006377631000 |
| 2502: | 0042142620000000272360006377631000 | 0042143220600000272360006377631000 |
| 2504: | 0000000220000000310360006377631000 | 0001331232024004140037246064242462 |
| 2506: | 0061656620020000721023276360232100 | 0060517620020000721023276360232100 |
| 2510: | 0000000220000000310360006377631000 | 0003165220140460200377506000031000 |
| 2512: | 0003165620140460200377506000031000 | 0003166620140460200377506000031000 |
| 2514: | 0000000220000000310360906377631000 | 0003157220140460200377506000031000 |
| 2516: | 0003172620140460200377506000031000 | 0000000260024000200157336377642460 |
| 2520: | 0000000220000000310360006377631000 | 0023173220150541200377506377603006 |
| 2522: | 0023173620150541200377506377603005 | 0023175220150541200377506377603006 |
| 2524: | 0000000220000000310360006377631000 | 0004220220010000200043106377630000 |
| 2526: | 0001307620142000200377104071002406 | 0000000275200000341360036361603016 |
| 2530: | 0000000220000000310360006377631000 | 0040121220006000012360006377602406 |
| 2532: | 0003175620006600200037046377671000 | 0041637620000000200360002077220374 |
| 2534: | 0000000220000000310360006377631000 | 0001261220010000040042546377630000 |
| 2536: | 0001703232002000200360600405431000 | 0044242232022000243377046777602406 |
| 2540: | 0000000220000000310360006377631000 | 0000550620000004140620006072212000 |
| 2542: | 0000777620010000020362706377630000 | 0000000260000000200360032000612000 |
| 2544: | 0000300220000000310360006377631000 | 0003323220142006200021345130002006 |
| 2546: | 0004436216000004201360006370402247 | 0000003616000004201360006370402247 |
| 2550: | 0000000220000000310360006377631000 | 0441671220016002106035146377652000 |
| 2552: | 0040604620012000200360642202221011 | 0040605220012000200360642202221011 |
| 2554: | 0000000220000000310360006377631000 | 0040606620012000200350642202221011 |
| 2556: | 0042302620012000200360642202221011 | 0041146620012000200360642202221011 |
| 2560: | 0000000220000000310360006377631000 | 0040701620000007570377106377620000 |
| 2562: | 0062210620000002570477106377631000 | 0062211220000002570477106377631000 |
| 2564: | 0000000220000000310360006377631000 | 0062212620000002570477106377631000 |
| 2566: | 0062213520000002570477106377631000 | 0062214620000002570477106377631000 |
| 2570: | 0000000220000000310360006377631000 | 0062215220000002570477106377631000 |
| 2572: | 0062215520000002570477106377631000 | 0000342623002000200017003000331000 |
| 2574: | 0000000220000000310360006377631000 | 0001067223002000200017003000331000 |
| 2576: | 0001070623002000200017003000331000 | 0040712620102050200360000501461376 |
| 2600: | 0000000220000000310360006377631000 | 0003263620000000201360026102431000 |
| 2602: | 0003263620000000201360026102431000 | 0002203620000000201360026102431000 |
| 2604: | 0003000220000000310360006377631000 | 0000762620000000201360026102431000 |
| 2606: | 0003263620000000201360026102431000 | 0200000273142070600000032077752000 |
| 2610: | 0000000220000000310360006377631000 | 0001333632024004140137246065242462 |
| 2612: | 0001336632024004140137246065242462 | 0000761220010000200022546377602000 |
| 2614: | 0000000220000000310360006377631000 | 0041055232002000213374706777602523 |
| 2616: | 0042136632002000213374706777602524 | 0001557620142007600037046377602406 |
| 2620: | 0000000220000000310360006377631000 | 0021327260153140150377036000202406 |
| 2622: | 0040265220000000201360006370420000 | 0041405620142006200361044002221376 |
| 2624: | 0000000220000000310360006377631000 | 0023201220150540200377306310003006 |
| 2626: | 0000627220050001200077106377672400 | 0021744620152000000377006370203046 |
| 2630: | 0000000220000000310360006377631000 | 0060341220012000000360646377661011 |
| 2632: | 0060471620012000000360646377661011 | 0060471620012000000360646377661011 |
| 2634: | 0000000220000000310360006377631000 | 0060341220012000000360646377661011 |
| 2636: | 0060471620012000000360646377661011 | 0062342620012000000360646377661015 |
| 2640: | 0000000220000000310360006377631000 | 0060700620012000000360646377661015 |
| 2642: | 0060263220012000000360646377661015 | 0060245220012000000360646377661015 |
| 2644: | 0000000220000000310360006377631000 | 0060774620012000000360646377661015 |
| 2646: | 0060775620012000000360646377661015 | 0060470620012000000360646377661015 |

```
2650: 0000000220000000310360006377631000 0061627620012000000360646377661015
2652: 0061327620012000000360646377661015 0061335220012000000360646377661015
2654: 0000000220000000310360006377631000 0024204220010000205037106377602455
2656: 0000516620142000200037006000231000 0401075220142007200377300514452000
2660: 0000000220000000310360006377631000 0401075620142007200377300514452000
2662: 0401076620142007200377300514452000 0401077220142007200377300514452000
2664: 0000000220000000310360006377631000 0401077620142007200377300514452000
2666: 0401100620142007200377300514452000 0401101220142007200377300514452000
2670: 0000000220000000310360006377631000 0400303620142007200377300514452000
2672: 0401101620142007200377300514452000 0401102620142007200377300514452000
2674: 0000000220000000310360006377631000 0401103220142007200377300514452000
2676: 0400304620142007200377300514452000 0441031632022004146055106064412000
2700: 0000000220000000310360006377631000 0000000273002000200001073000331000
2702: 0001456620000000200360000403212000 0000000260000000201360036360331000
2704: 0000000220000000310360006377631000 0440531220014002106035246377612000
2706: 0440532620014002106035246377612000 0401032632024004140155306065412000
2710: 0000000220000000310360006377631000 0401033232024004140155306065412000
2712: 0000115620020000200363300512202451 0040555632002000200360600402631000
2714: 0000000220000000310360006377631000 0000717211212002600360503000530000
2716: 0061136620012000000377106377661015 0000703620006000200360000524412000
2720: 0000000220000000310360006377631000 0001105620142002205363606110072200
2722: 0004043622002000200257046377631000 0041120632012000200350402077220375
2724: 0000000220000000310360006377631000 0001443621200000200000003000302105
2726: 0040511220024000200377000503260377 0023515220012560200377046377642001
2730: 0000000220000000310360006377631000 0000000260022000200377070404402022
2732: 1142153620000000202360006377620000 1142155220000000202360006377620000
2734: 0000000220000000310360006377631000 1140500620000000202360006377620000
2736: 0001653620016000030440006377630000 0001226616000004201360006370432200
2740: 0000000220000000310360006377631000 0001227216000004201360006370432200
2742: 0001227616000004201360006370432200 0001230616000004201360006370432200
2744: 0000000220000000310360006377631000 0001231216000004201360006370432200
2746: 0001231616000004201360006370432200 0001232616000004201360006370432200
2750: 0000000220000000310360006377631000 0001233216000004201360006370432200
2752: 0001233616000004201360006370432200 0001234616000004201360006370432200
2754: 0000000220000000310360006377631000 0001235216000004201360006370432200
2756: 0001235616000004201360006370432200 0001236616000004201360006370432200
2760: 0000000220000000310360006377631000 0001237216000004201360006370432200
2762: 0001237616000004201360006370432200 0001240616000004201360006370432200
2764: 0000000220000000310360006377631000 0001241216000004201360006370432200
2766: 0001241616000004201360006370432200 0047776222002000213376646777602010
2770: 0000000220000000310360006377631000 0340701220200000203377106777602406
2772: 0060517220010000200177046377621012 0001123220020000200361100501432200
2774: 0000000220000000310360006377631000 0062237220012000012360746377661021
2776: 0062240620012000012360746377661021 0023210620010600010360746377642417
3000: 0000000220000000310360006377631000 0023211220010600010360746377642417
3002: 0042245621000000202360003000332400 0041655621000000202360003000332400
3004: 0000000220000000310360006377631000 0040075221000000202350003000332400
3006: 0040275621000000202360003000332400 0040726621000000202360003000332400
3010: 0000000220000000310360006377631000 0040110621000000202360003000332400
3012: 0000555232004000200360000410002040 0000900260010000200360570421002104
3014: 0000000220000000310360006377631000 0000721611412002600350703000530000
3016: 0040131620000000200360000512620003 0040213520000004146560006071621377
3020: 0000000220000000310360006377631000 0000305620000000200360000420202144
3022: 0642007220000000205500006377620002 0001447220142370600375040514431000
3024: 0000000220000000310360006377631000 1243213620142440000437006370120377
3026: 0400617620024000200157246377612000 0400457220024000200157246377612000
3030: 0000000220000000310350006377631000 0400457620024000200157246377612000
3032: 0400463620024000200157246377612000 0404106620024000200157246377612000
3034: 0000000220000000310360006377631000 0404137220024000200157246377612000
3036: 0400467220024000200157246377612000 0400467620024000200157246377612000
3040: 0000000220000000310360006377631000 0401323620024000200157246377612000
3042: 0404144620024000200157246377612000 0400471620024000200157246377612000
3044: 0000000220000000310360006377631000 0003214620000600200360000524212000
3046: 0003215220006540200360006377602406 0000116622002000200377100501431000
3050: 0000000220000000310360006377631000 0003216620006540200360006377602413
3052: 0003217220006540200360006377602413 0003517220006540200360006377602413
3054: 0000000220000000310360006377631000 0003217620006540200360006377602417
3056: 0000000260000000201360036354331000 0002410520000640201360006362631000
3060: 0000000220000000310360006377631000 1044161720000001700377006377620377
3062: 0002061562000000200360002001202200 0003221220006540200360006377602517
3064: 0000000220000000310360006377631000 0060001220010000200377042002420002
3066: 0060001620010000200377042002420002 0040411222002000206240700515231000
3070: 0000000220000000310360006377631000 0041325622002000206240700515231000
3072: 0020176620112370000377006377603046 0020616620112370000377006377603046
3074: 0000000220000000310360006377631000 0040000272142006503377076777712000
```

| | | |
|---|---|---|
| 3076: | 0041766620002000002360506377631000 | 0040424620002000002360506377631000 |
| 3100: | 0000000220000000310360006377631000 | 0041760620002000002360506377631000 |
| 3102: | 00251704620152000200020506000260377 | 0000340620000000200360000432002105 |
| 3104: | 0000000220000000310360006377631000 | 0441145232164005203377246777612000 |
| 3106: | 0001602610012002600360600421230000 | 0001602610012002600360600421230000 |
| 3110: | 0000000220000000310360006377631000 | 0001602610012002600360600421230000 |
| 3112: | 0001602610012002600360600421230000 | 0001602610012002600360600421230000 |
| 3114: | 0000000220000000310360006377631000 | 0441133232020004146075146064612000 |
| 3116: | 0041601632142007207375106777602462 | 0026571260017570200377076377742406 |
| 3120: | 0000000220000000310360006377631000 | 0404146632022004140175346065612000 |
| 3122: | 0404147632022004140175346065612000 | 0000000260012000200360630503402416 |
| 3124: | 0000000220000000310360006377631000 | 0023221620150540200377306320093006 |
| 3126: | 0005366220010004140375746067643034 | 0001272620042007570057306377602406 |
| 3130: | 0000000220000000310360006377631000 | 0001273220042007570057306377602406 |
| 3132: | 0001273620042007570057306377602406 | 0001274620042007570057306377602406 |
| 3134: | 0000000220000000310360006377631000 | 0000365220102030200376440522231000 |
| 3136: | 0041663632002000207375246777631000 | 0041664632002000207375246777631000 |
| 3140: | 0000000220000000310360006377631000 | 0041665232002000207375246777631000 |
| 3142: | 0041665532002000207375246777631000 | 0020057237050004200017042000032400 |
| 3144: | 0000000220000000310360006377631000 | 0441211232024004146015006064012000 |
| 3146: | 0020566520012000200077006377602412 | 0020567220012000200077006377602412 |
| 3150: | 0000000220000000310360006377631000 | 0020567620012000200077006377602412 |
| 3152: | 0020571220012000200077006377602412 | 1704223220000000200360000501412000 |
| 3154: | 0000000220000000310360006377631000 | 0000433620142006200037046360002415 |
| 3156: | 0000433620142006200037046360002415 | 0000433620142006200037046360002415 |
| 3160: | 0000000220000000310360006377631000 | 0001007220142006200037046360002415 |
| 3162: | 00362274620012000202377040501461015 | 1243224620000440350360006377720000 |
| 3164: | 0000000220000000310360006377631000 | 1243225220000440350360006377720000 |
| 3166: | 0060244620016000010377106377661021 | 0043225620140460200360006005061376 |
| 3170: | 0000000220000000310360006377631000 | 0004221220022004140276506072603017 |
| 3172: | 0001555620000000030360006377612000 | 0040000273142001200000032077760377 |
| 3174: | 0000000220000000310360006377631000 | 0000007211000002600360003000131000 |
| 3176: | 0000007611000002600360003000131000 | 0000011211000002600360003000131000 |
| 3200: | 0000000220000000310360006377631000 | 0000011611000002600360003000131000 |
| 3202: | 0000012611000002600350003000131000 | 0000013211000002600360003000131000 |
| 3204: | 0000000220000000310360006377631000 | 0000013611000002600360003000131000 |
| 3206: | 0060441232010000200377042000620003 | 2200407222002000200377000501412000 |
| 3210: | 0000000220000000310360006377631000 | 0042163220000000252360006377631000 |
| 3212: | 0042235620000000252360006377631000 | 0040120620000000252360006377631000 |
| 3214: | 0000000220000000310360006377631000 | 00040430620000000252360006377631000 |
| 3216: | 0046653620000000252360006377631000 | 0000336620000000200360000430231000 |
| 3220: | 0000000220000000310360006377631000 | 0041757220000000002360006377603005 |
| 3222: | 0041757620000000002360006377603005 | 1101636620000000200360000501412000 |
| 3224: | 0000000220000000310360006377631000 | 0007014620062001200361040526042530 |
| 3226: | 0063231220000602570377104377602407 | 0063231620000602570377104377602407 |
| 3230: | 0000000220000000310360006377631000 | 0004025222002000200377000506431000 |
| 3232: | 0441212620016002106035206377652000 | 0441213620016002106035206377652000 |
| 3234: | 0000000220000000310360006377631000 | 0002260622002000200360502203231000 |
| 3236: | 0002263622002000200360502203231000 | 0002267222002000200360502203231000 |
| 3240: | 0000000220000000310360006377631000 | 0003232620140460200360006002642417 |
| 3242: | 0003233211004402200017002000042455 | 00000000320003001720500036377632200 |
| 3244: | 0000000220000000310360006377631000 | 0040533620000000205360006377620374 |
| 3246: | 0000376620002000205457046377632200 | 4603233620000440200360002000412000 |
| 3250: | 0000000220000000310360006377631000 | 4603234620000440200360002000412000 |
| 3252: | 6143031620000440070360003000322001 | 0000717211612002600360503000530000 |
| 3254: | 0000000220000000310360006377631000 | 0001253220142002160040006035002407 |
| 3256: | 4543547220000440200360006377620000 | 0001445221600000200000003000302105 |
| 3260: | 0000000220000000310360006377631000 | 004117362000000020550006377621377 |
| 3262: | 0001373620000000200360000522202007 | 0000265636050004201360206370432400 |
| 3264: | 0000000220000000310360006377631000 | 0000267236050004201360206370432400 |
| 3266: | 0000267635050004201360206370432400 | 0000271236050004201360206370432400 |
| 3270: | 0000000220000000310360006377631000 | 0040000265142006200017074037020000 |
| 3272: | 0003237220012560200363346377632200 | 0003237620140460200360006003452000 |
| 3274: | 0000000220000000310360006377631000 | 0000233222002000200157006377631000 |
| 3276: | 0000233622002000200157006377631000 | 0000234622002000200157006377631000 |
| 3300: | 0000000220000000310360006377631000 | 0000235222002000200157006377631000 |
| 3302: | 0440057620014002106035306377612000 | 0440071220014002106035306377612000 |
| 3304: | 0000000220000000310350006377631000 | 1140017620142000000437006370520377 |
| 3306: | 0000720611212002600360543000530000 | 0040000261000000200000033000322000 |
| 3310: | 0000000220000000310360006377631000 | 0021303620152000000377006370603046 |
| 3312: | 0441337632022004146035046064212000 | 000177722200200020015043000331000 |
| 3314: | 0000000220000000310360006377631000 | 0045733232002000203377246777631000 |
| 3316: | 0050453620012000200020640501461021 | 0043241220004640233360004102202520 |
| 3320: | 0000000220000000310360006377631000 | 0401733220016002100035346377652000 |
| 3322: | 0401733620016002100035346377652000 | 0023241620016560200376206377642101 |

```
3324: 0000000220000000310360006377631000 0000000260142006050361074000402514
3326: 0043243220140460202350006005561376 0001043624542006200377044037102406
3330: 0000000220000000310360006377631000 0063553220016530200377046377660001
3332: 6143031620000440200360006377621377 0000117620000004140660005072631000
3334: 0000000220000000310360006377631000 0000620610002000030360506377631000
3336: 0022313220110170205377046377642406 0001423620142006200057046037002407
3340: 0000000220000000310360006377631000 0000561620000000201360006370402140
3342: 0400000272024004140177276055612000 0040215620142000200160006072260377
3344: 0000000220000000310360006377631000 0040217220142000200160006072260377
3346: 5342057620000000200360020501622000 5342060620000000200360000501622000
3350: 0000000220000000310360006377631000 0200000273142030600000003207775200 0
3352: 0004447620000000201360006370402240 0004447620000000201360006370402241
3354: 0000000220000000310360006377631000 0004447620000000201360006370402242
3356: 0004447620000000201360006370402243 0004447620000000201360006370402245
3360: 0000000220000000310360006377631000 0004447620000000201360006370402251
3362: 0004447620000000201360006370402252 0004447620000000201360006370402253
3364: 0000000220000000310360006377631000 0004447620000000201360006370402254
3366: 0002514223002000200000203000331000 0004447620000000201360006370402255
3370: 0000000220000000310360006377631000 0002500223002000200000203000331000
3372: 0002502223002000200000203000331000 0004447620000000201360006370402256
3374: 0000000220000000310360006377631000 0004447620000000201360006370402257
3376: 0004623222002000200523100507403005 0004624222002000200523100507403005
3400: 0000000220000000310360006377631000 0004625222002000200523100507403005
3402: 0004626222002000200523100507403005 0001655220142370600375100514431000
3404: 0000000220000000310360006377631000 0040000260142006200351074002021376
3406: 0001055620006000010377046377671000 0001057220006000010377046377671000
3410: 0000000220000000310360006377631000 0000651220006000010377046377671000
3412: 0000052620006000010377046377671000 0060000260010000200377532203021014
3414: 0000000220000000310360006377631000 0042250620000000200360000501420377
3416: 0000401222002000200037006377631000 0000544620000000200360000420602102
3420: 0000000220000000310360006377631000 0003246620140460260377006007231000
3422: 0002141220000000201360006370402424 0042225622002000213360446777602525
3424: 0000000220000000310360006377631000 0041615620000000200000003000321003
3426: 0041616620000000200000003000321003 0041617220000000200000003000321003
3430: 0000000220000000310360006377631000 0041034620000000200000003000321003
3432: 0041617620000000200000003000321003 0041620620000000200000003000321004
3434: 0000000220000000310360006377631000 0041621220000000200000003000321004
3436: 0041035220000000200000003000321004 0041621620000000200000003000321004
3440: 0000000220000000310360006377631000 0041622620000000200000003000321005
3442: 0041035620000000200000003000321005 0041623220000000200000003000321005
3444: 0000000220000000310360006377631000 0041036620000000200000003000321006
3446: 0041623620000000200000003000321006 0041037220000000200000003000321007
3450: 0000000220000000310360006377631000 0000546620000000200360000420602146
3452: 0001625220000000201360026101231000 0001547220142007200157306377642462
3454: 0000000220000000310360006377631000 0002243620142007200157306377642462
3455: 0000034620142007200157306377642462 0000760520142007200157305377642462
3460: 0000000220000000310360006377631000 0002045220000000200360002203002464
3462: 0001045620000000200360002203002464 0000151620000000200360002203002464
3464: 0000000220000000310360006377631000 0002270620000000200360002203002464
3466: 0002347620000000200360002203002464 0002055620000000200360002203002464
3470: 0000000220000000310360006377631000 0042357220000004140420006064320000
3472: 0000637220050001200061346377672400 0000640620050001200061346377672400
3474: 0000000220000000310360006377631000 0020437636050004071377046370442406
3476: 0001257620160000200021206371072200 0002660622002000200377042077031000
3500: 0000000220000000310360006377631000 0042325221000000670000003000321370
3502: 0041645221000000670000003000321370 0041645621000000670000003000321370
3504: 0000000220000000310360006377631000 0047151621000000670000003000321371
3506: 0041650621000000670000003000321371 0047151621000000670000003000321371
3510: 0000000220000000310360006377631000 0041651221000000670000003000321371
3512: 0047151621000000670000003000321371 0041651621000000670000003000321371
3514: 0000000220000000310360006377631000 0046653621000000670000003000321372
3516: 0045553521000000670000003000321372 0046653621000000670000003000321372
3520: 0000000220000000310360006377631000 0046653621000000670000003000321372
3522: 0046653621000000670000003000321372 0046653621000000670000003000321372
3524: 0000000220000000310360006377631000 0046653621000000670000003000321372
3526: 0000422620000000403600063776021 05 0044607220004000200020006377621000
3530: 0000000220000000310360006377631000 0044610220004000200020006377621000
3532: 0042051232142007207375146777602462 0004234233002000200361043000331000
3534: 0000000220000000310360006377631000 0004573232002000200377040523431000
3536: 0040000260142207603377076777612000 0441446632020004146055106054412000
3540: 0000000220000000310360006377631000 0060130660015142100361030523621376
3542: 0401450632022004140155306065412000 0401451232022004140155306065412000
3544: 0000000220000000310360006377631000 0060773620012000200020646377661021
3546: 0060226620012000200020646377661021 0042113632002000207375306777631000
3550: 0000000220000000310360006377631000 0042114632002000207375306777631000
3552: 0042115232002000207375306777631000 0042115632002000207375306777631000
```

```
3554: 00000002200000003103600063776310 00 00237066201565402003626460324424 30
3556: 00015266200000002003602005016120 00 00622732200120000023770405014610 15
3560: 00000002200000003103600063776310 00 00617672200120000023770405014610 15
3562: 00015152320020041400770460646310 00 00010416320020041400770460646310 00
3564: 00000002200000003103600063776310 00 00032532200165702000400063776024 10
3566: 00032536200165702000400063776024 10 00032546200165702000400063776024 10
3570: 00000002200000003103600063776310 00 00032552200165702000400063776024 10
3572: 00032556200165702000400063776024 10 00032566200165702000400063776024 10
3574: 00000002200000003103600063776310 00 00032572200165702000400063776024 10
3576: 00032576200165702000400063776024 10 00032606200165702000400063776024 10
3600: 00000002200000003103600063776310 00 00032612200165702000400063776024 10
3602: 00032616200165702000400063776024 10 00032626260165702000400063776024 10
3604: 00000002200000003103600063776310 00 00432632200006402323600261026025 21
3606: 00432636200006402323600261026025 21 04412216320240041460372460642120 00
3610: 00000002200000003103600063776310 00 00232646200105000103770063776030 43
3612: 42032656200004202003600063776120 00 00400326200000041405200060653200 00
3614: 00000002200000003103600063776310 00 00432666200005517213600363710120 00
3616: 00013306320240041400172460640424 62 00042262200000002005200005140030 06
3620: 00000002200000003103600063776310 00 00021116200000002005200005140030 06
3622: 00021126200000002005200005140030 06 00400002721420002037707410562000 04
3624: 00000002200000003103600063776310 00 00217516200000003513600063600321 00
3626: 00003736320000002003600020016030 32 00644122201100502003610405020613 76
3630: 00000002200000003103600063776310 00 00604416320100002003771020006200 03
3632: 00207226110120026003770030005300 00 00017456220020002003605000523031 000
3634: 00000002200000003103600063776310 00 46032676200004402003600005060120 00
3636: 22000312220020002003770405014120 00 22000312220020002003770405014120 00
3640: 00000002200000003103600063776310 00 22000312220020002003770405014120 00
3642: 22000312220020002003770405014120 00 22000312220020002003770405014120 00
3644: 00000002200000003103600063776310 00 22000312220020002003770405014120 00
3646: 22004072220020002003770405014120 00 22004072220020002003770405014120 00
3650: 00000002200000003103600063776310 00 22004072220020002003770405014120 00
3652: 22004072220020002003770405014120 00 22004072220020002003770405014120 00
3654: 00000002200000003103600063776310 00 00235572200165502003770463776422 01
3656: 00010576220020000003605022032310 00 00603456330120002000170020777203 77
3660: 00000002200000003103600063776310 00 00020356200420012003770405014310 00
3662: 00006236200100002003624405240025 24 04405306200160021060352463776520 00
3664: 00000002200000003103600063776310 00 04405316200160021060352463776520 00
3666: 00041466320020041401770460655310 00 00041476320020041401770460655310 00
3670: 00000002200000003103600063776310 00 00602736200100002003770420012200 02
3672: 00602746200100002003770420012200 02 00007206116120026003605430005300 00
3674: 00000002200000003103600063776310 00 04404166320240041461372460652120 00
3676: 04404172320240041461372460652120 00 00000002720240041401772760656424 62
3700: 00000002200000003103600063776310 00 00000002731420016000170720000310 00
3702: 00223132200500022053770463776424 06 00401036200000000203600063776213 74
3704: 00000002200000003103600063776310 00 00423316200000000203600063776213 74
3706: 00013332320240041401172460650424 62 00013356320240041401172460650424 62
3710: 00000002200000003103600063776310 00 02000002731420106000002032077752 000
3712: 00006752200000002003600043060210 0 00003316200000002003600005110022 00
3714: 00000002200000003103600063776310 00 00012552200040000400571063776710 00
3716: 00005352100100000303605405000300 00 00015252100100000303605405000300 00
3720: 00000002200000003103600063776310 00 00215016112160024403770030005300 00
3722: 00203326112160024403770030005300 00 00015126200200002003747005256120 00
3724: 00000002200000003103600063776310 00 00400002612000002033600367776120 00
3726: 04041456320200041401753460656120 00 04041476320200041401753460656120 00
3730: 00000002200000003103600063776310 00 00404716200060000103600063776210 11
3732: 00404716200050000103600063776210 11 00413152200060000103600063776210 11
3734: 00000002200000003103600063776310 00 00413156200060000103600063776210 11
3736: 00403412200050000103600063776210 11 00401666200060000103600063776210 11
3740: 00000002200000003103600063776310 00 00414216200060000103600063776210 11
3742: 00414132200060000103600063776210 15 00402455200060000103600063776210 15
3744: 00000002200000003103600063776310 00 00414136200060000103600063776210 15
3746: 00442532200050000103600063776210 15 00442542200060000103600063776210 15
3750: 00000002200000003103600063776310 00 00422236200060000103600063776210 15
3752: 00414346200060000103600063776210 15 00432716200246002003774463776603 77
3754: 00000002200000003103600063776310 00 00404326200060000103600063776210 21
3756: 00407766200050000103600063776210 21 00400366200060000103500063776210 21
3760: 00000002200000003103600063776310 00 17043166200000002003600005060120 00
3762: 17043402200000002003600005060120 00 17046172200000002003600005060120 00
3764: 00000002200000003103600063776310 00 00405566320020002003607004026310 00
3766: 00405566320020002003607004026310 00 00007212112120026003605030005300 00
3770: 00000002200000003103600063776310 00 00207336200100002001172063776120 00
3772: 00002016200000002013600261034310 00 17222576201500002000005460320520 00
3774: 00000002200000003103600063776310 00 00042252200000002003600004034024 45
3776: 00023052220020002000151030003310 00 00412652320020002033773067776310 00
```

```
4000: 000665362000000031036000637763100 00412672320020002033773067776310 00
```

```
4000: 00066536200000003103600C6377631000 00412672320020002033773067776310 00
4002: 10466712731423705200170320777603 77 04415452320220041460150960640120 00
4004: 10420417200000001203770063776203 77 00422755200420022003600065014603 77
4006: 00404176200000002013600063716030 06 00005366200000000205350006377602430
4010: 32432226201424421600200060150200 00 00005372200000000205360006377602430
4012: 11412056201420000004370063711203 77 00421452220020002023761020002310 00
4014: 00000002731023302000170320000310 00 00400272220026002023761020002310 00
4016: 00421476220020002023761020002310 00 00412046220020002023761020002310 00
4020: 31400002730020002000170320000200 00 00421532220020002023761020002310 30
4022: 00421566220020002023761020002310 00 00632756201505402003613463600500 00
4024: 11400002750020002000170320000200 00 00420132200040002123600005220025 10
4026: 00407466200040002123600005220025 10 00412636200040002123600005220025 10
4030: 11415346220020002004370020777203 77 00420152200040002123600005220025 10
4032: 00401172200040002123600005220025 10 00420572200040002123500005220025 10
```

| | | |
|---|---|---|
| 4226: | 0441657632020004146035046064212000 | 0044175232002000207375346777631000 |
| 4230: | 0000000220000000310360006377631000 | 0044176632002000207375346777631000 |
| 4232: | 0044202232002000207375346777631000 | 0044203232002000207375346777631000 |
| 4234: | 0000000220000000310360006377631000 | 0020722611412002600377003000530000 |
| 4236: | 0040555632002000200362400402631000 | 0003336620012572100440006377602410 |
| 4240: | 0000000220000000310360006377631000 | 0003337220012572100440006377602410 |
| 4242: | 0003563220012572100440006377602410 | 0003565220012572100440006377602410 |
| 4244: | 0000000220000000310360006377631000 | 0000367222002000200377040503031000 |
| 4246: | 0001353222002000200377040503031000 | 0001006632002000200360500400031000 |
| 4250: | 0000000220000000310360006377631000 | 0003341220014542100364246377602421 |
| 4252: | 0003575220014542100364246377602421 | 0067423220116050200037046377661376 |
| 4254: | 0000000220000000310360006377631000 | 0063031220010000200377002077620377 |
| 4256: | 0004061220000000200360006377602142 | 0040333220000004140540006071422373 |
| 4260: | 0000000220000000310360006377631000 | 0021250620012000010360546377642416 |
| 4262: | 0021251220012000010360546377642416 | 0021251620012000010360546377642416 |
| 4264: | 0030000220000000310360006377631000 | 0022127620012000040377046377631000 |
| 4266: | 0022127620012000040377046377631000 | 0061254620014000205377406377661020 |
| 4270: | 0000000220000000310360006377631000 | 0064407220014000205377406377661020 |
| 4272: | 000015232022000200377000421502106 | 0002317620000000200360006377602407 |
| 4274: | 0000000220000000310360006377631000 | 0002033620000000200360000405602524 |
| 4276: | 0021501611616002440377003000530000 | 0020332611616002440377003000530000 |
| 4300: | 0000000220000000310360006377631000 | 0004351220000000200360006377631000 |
| 4302: | 0006653620000000200360006377631000 | 0006653620000000200360006377631000 |
| 4304: | 0000000220000000310360006377631000 | 0004251220000000200360006377631000 |
| 4306: | 0004252220000000200360006377631000 | 0007423620000000200360006377631000 |
| 4310: | 0000000220000000310360006377631000 | 0001775620000000200360006377631000 |
| 4312: | 0001770620000000200360006377631000 | 0000665220000000200360006377631000 |
| 4314: | 0000000220000000310360006377631000 | 0001523620000000200360006377631000 |
| 4316: | 0000665620000000200360006377631000 | 0004344620000000200360006377631000 |
| 4320: | 0000000220000000310360006377631000 | 0001524620000000200360006377631000 |
| 4322: | 0200566620000000200360006377631000 | 0001261620000000200360006377631000 |
| 4324: | 0000000220000000310360006377631000 | 0001716620000000200360006377631000 |
| 4326: | 0001771220000000200360006377631000 | 0004614220000000200360006377631000 |
| 4330: | 0000000220000000310360006377631000 | 0000667220000000200360006377631000 |
| 4332: | 0004615220000000200360006377631000 | 0000667620000000200360006377631000 |
| 4334: | 0000000220000006310360006377631000 | 0001771620000000200360006377631000 |
| 4336: | 0002311620000000200360006377631000 | 0000270620000000200360006377631000 |
| 4340: | 0000000220000000310360006377631000 | 0003547220000000200360006377631000 |
| 4342: | 0000253220000000200360006377631000 | 0000253620000000200360006377631000 |
| 4344: | 0000000220000000310360006377631000 | 0003547220000000200360006377631000 |
| 4346: | 0001752620000000200360006377631000 | 0006653620000000200360006377631000 |
| 4350: | 0000000220000000310360006377631000 | 0006653620000000200360006377631000 |
| 4352: | 0006653620000000200360006377631000 | 0006653620000000200360006377631000 |
| 4354: | 0000000220000000310360006377631000 | 0003547220000000200360006377631000 |
| 4356: | 0000404620000000200360006377631000 | 0001045220000000200360006377631000 |
| 4360: | 0000000220000000310360006377631000 | 0000270620000000200360006377631000 |
| 4362: | 0001503620000000200360006377631000 | 0001465620000000200360006377631000 |
| 4364: | 0000000220000000310360006377631000 | 0002173220000000200360006377631000 |
| 4366: | 0006653620000000200360006377631000 | 0003547220000000200360006377631000 |
| 4370: | 0000000220000000310360006377631000 | 0002175220000000200360006377631000 |
| 4372: | 0000473620000000200360006377631000 | 0000455220000000200360006377631000 |
| 4374: | 0000000220000000310360006377631000 | 0000246620000000200360006377631000 |
| 4376: | 0002012620000000200360006377631000 | 0001772620000000200360006377631000 |
| 4400: | 4442656620000440205360006377620000 | 0000421220000000200360006377631000 |
| 4402: | 0002117220000000200360006377631000 | 0002050620000000200360006377631000 |
| 4404: | 4442657220000440205360006377620000 | 0001054620000000200360006377631000 |
| 4406: | 0007201620000000200360006377631000 | 0001301620000000200360006377631000 |
| 4410: | 4343220520000000205360006377620377 | 0000704620000000200360006377631000 |
| 4412: | 0000705220000000200360006377631000 | 0002043620000000200360006377631000 |
| 4414: | 4143220620000440205360006377620377 | 0006653620000000200360006377631000 |
| 4416: | 0001417620000000200360006377631000 | 0001535620000000200360006377631000 |
| 4420: | 2540221220004000205360006377620377 | 0063345620000602170420006377631000 |
| 4422: | 0063346620000602170420006377631000 | 0000613222002000200377040514631000 |
| 4424: | 2641167620010000205361046377620000 | 0063347220000602170420006377631000 |
| 4426: | 0000613622002000200377040514631000 | 0063347620000602170420006377631000 |
| 4430: | 2641167620010000205360546377620000 | 0063350620000602170420006377631000 |
| 4432: | 0063351220000602170420006377631000 | 0063351620000602170420006377631000 |
| 4434: | 2641170620010000205361046377620000 | 0021522620012000200377000501402406 |
| 4436: | 0440067220016002106035306377652000 | 0440070620016002106035306377652000 |
| 4440: | 2641170620010000205360546377620000 | 0004243220000004570377046377631000 |
| 4442: | 0042221621000000200000003000320377 | 0040076621000000200000003000320377 |
| 4444: | 2641171220002000205377006377620000 | 0040051221000000200000003000320377 |
| 4446: | 0040410622002000206240400515231000 | 0041325222002000206240400515231000 |
| 4450: | 2540000251010002600001072000020000 | 0003352620016540200362105377602530 |
| 4452: | 0040474620012000200362042202221011 | 0007776235600000341360006361603002 |

| | | |
|---|---|---|
| 4454: | 2540000251010002600000572000020000 | 0043353220140460200360006000061376 |
| 4456: | 0007776235600000341360006361603014 | 0007776235600000341360006361603015 |
| 4460: | 2640000251010002600000632000020000 | 0020477620010000200377100513402455 |
| 4462: | 0000721211612002600360603000530000 | 0001306620000004140740006063402030 |
| 4464: | 2640000251010002600000732000020000 | 0003353620140460200360006000452000 |
| 4466: | 0042126610004002600360002077020374 | 0042351620000000000360006377621011 |
| 4470: | 0000000220000000310360006377631000 | 0042352620000000000360006377621011 |
| 4472: | 0044067220000000000360006377621015 | 0040211220000000000360006377621021 |
| 4474: | 0000000220000000310360006377631000 | 0040341220000000000360006377621021 |
| 4476: | 0040614620000000000360006377621021 | 0040544620000000000360006377621021 |
| 4500: | 0000000220002000310360006377631000 | 0040650620000000000360006377621021 |
| 4502: | 0040166620000000000360006377621021 | 0044066220000000000360006377621021 |
| 4504: | 0000000220000000310360006377631000 | 0040471620000000000360006377621021 |
| 4506: | 0041442620000000000360006377621021 | 0040431220000000000360006377621021 |
| 4510: | 0000000220000000310360006377631000 | 0000515620006000200360540524471000 |
| 4512: | 0001121620002000205375746377631000 | 0004233233002000200360503000331000 |
| 4514: | 0000000220000000310360006377631000 | 0043357220004640232360024101602015 |
| 4516: | 0043360620004640232360024101602015 | 0040000261142002200017234330020000 |
| 4520: | 0000000220000000310350006377631000 | 0002216624542006200377044037002406 |
| 4522: | 0000513232000000200360000400003042 | 0062037220012000002350646377661015 |
| 4524: | 0000000220000000310350006377631000 | 0060723620012000002360646377661015 |
| 4526: | 0061473220012000002360546377661015 | 0061662620012000002360646377661015 |
| 4530: | 0000000220000000310360006377631000 | 0061761220012000002360646377661015 |
| 4532: | 0061605220012000002360646377661015 | 0060425620012000002360646377661015 |
| 4534: | 0000000220000000310360006377631000 | 0001111220000000200360000431202102 |
| 4536: | 0040601620000000200420006377720000 | 0000000273002000200017032000031000 |
| 4540: | 0000000220000000310360006377631000 | 0007145222002000200360502204231000 |
| 4542: | 0000473622002000200360502204231000 | 0002174622002000200360502204231000 |
| 4544: | 0000000220000000310360006377631000 | 0007653622002000200360502204231000 |
| 4546: | 0000474622002000200360502204231000 | 0007665622002000200360502204231000 |
| 4550: | 0000000220000000310360006377631000 | 0007647622002000200360502204231000 |
| 4552: | 0000235522002000200360502204231000 | 0000431622002000200360502204231000 |
| 4554: | 0000000220000000310360006377631000 | 0000603622002000200360502204231000 |
| 4556: | 0000605622002000200360502204231000 | 0000152622002000200360502204231000 |
| 4560: | 0000000220000000310360006377631000 | 0000153222002000200360502204231000 |
| 4562: | 0000103220060000010360006377602406 | 0000033620006000010350006377602406 |
| 4564: | 0000000220000000310360006377631000 | 0001056620006000010360006377602406 |
| 4566: | 0000775220006000010360006377602406 | 0001127620006000010360006377602406 |
| 4570: | 0000000220000000310360006377631000 | 0000250620006000010360006377602406 |
| 4572: | 0001131620006000010360006377602406 | 0001271220042007570057006377602406 |
| 4574: | 0000000220000000310360006377631000 | 0000231620006000010360006377602417 |
| 4576: | 0002232620010000200360600524202524 | 0023361220150540200361346036052000 |
| 4600: | 0007746620004000200020006377602104 | 0023361220150540200361346036052000 |
| 4602: | 1303361620000440200360006377602400 | 0040060620004000200060002203021014 |
| 4604: | 0000000261000000200000033000302104 | 0040063220004000200060002203021014 |
| 4606: | 0040064620004000200060002203021014 | 0401753232020004140155306065412000 |
| 4610: | 0140141220000000200420006377620000 | 0401753632020004140155306065412000 |
| 4612: | 0000115222002000200015143000331000 | 0000000251004002200000033000302406 |
| 4614: | 0000000220000000310360006377631000 | 0004627220012000200040006377643034 |
| 4616: | 0004630220012000200040006377643034 | 0063631220152000200057106000360000 |
| 4620: | 0000000220000000310360006377631000 | 0002340620000004140740006063402521 |
| 4622: | 0002052220042001200257506377631000 | 0200000261000000200000032077712000 |
| 4624: | 0000000220000000310360006377631000 | 0001702632002000200360604377602026 |
| 4626: | 0026671260017130200377076377632200 | 0024267232010000200377102000602430 |
| 4630: | 0000000220000000310360006377631000 | 0020444632010000200377102000602430 |
| 4632: | 0004216220012000304400063776300000 | 0004461220012000304400063776300000 |
| 4634: | 0000000220000000310360006377631000 | 0020071620012000200360642203242406 |
| 4636: | 0021632620012000200360642203242406 | 0002334620004000030360006377631000 |
| 4640: | 0000000220000000310360006377631000 | 0042324621000000200000003000321370 |
| 4642: | 0042325621000000200000003000321370 | 0047151621000000200000003000321371 |
| 4644: | 0000000220000000310360006377631000 | 0047151621000000200000003000321371 |
| 4646: | 0047151621000000200000003000321371 | 0047151621000000200000003000321371 |
| 4650: | 0000000220000000310360006377631000 | 0047151621000000200000003000321371 |
| 4652: | 0047151621000000200000003000321371 | 0047151621000000200000003000321371 |
| 4654: | 0000000220000000310360006377631000 | 0001501620006000200017006377771000 |
| 4656: | 0041722620000000200420006377720377 | 0000344633042001200000003000342406 |
| 4660: | 0000000220000000310360006377631000 | 0000717611412002600361043000530000 |
| 4662: | 0003515632000000070360000511003005 | 0040104620000000200400006377620000 |
| 4664: | 0000000220000000310360006377631000 | 0047537220000000200400006377620000 |
| 4666: | 0041741620000000200400006377620001 | 0002220620142004200020006104042430 |
| 4670: | 0000000220000000310360006377631000 | 0023364620016560200377106377631000 |
| 4672: | 0040770610000002607360006777630000 | 0000002620142370600375200514431000 |
| 4674: | 0000000220000000310360006377631000 | 0000003220142370600375200514431000 |
| 4676: | 0040000272020000203377176777602407 | 0002333620000003170377046377671000 |
| 4700: | 0040000260000000200400036377620000 | 0042231622002000213374706777602526 |

| | | |
|---|---|---|
| 4702: | 0042074220010000201362044364220377 | 0007575232002000200021040501431000 |
| 4704: | 0001216620000000200360000501431000 | 0400473620164370600377240514452000 |
| 4706: | 0004256233000000200360003000303051 | 0004262233000000200360003000303052 |
| 4710: | 0000000220000000310360006377631000 | 0004261233000000200360003000303053 |
| 4712: | 0004260233000000200360003000303054 | 0004257233000000200360003000303055 |
| 4714: | 0000000220000000310360006377631000 | 0000511232002000200023500400431000 |
| 4716: | 0001135620142370600377300514431000 | 0000473620142370600377300514431000 |
| 4720: | 0000000220000000310360006377631000 | 0402235220164001200157246377652000 |
| 4722: | 0400114620164001200157246377652000 | 0400471220164001200157246377652000 |
| 4724: | 0000000220000000310360006377631000 | 0401317220164001200157246377652000 |
| 4726: | 0041123620000000212360006377602525 | 0041124620000000212360006377602525 |
| 4730: | 0000000220000000310350006377631000 | 0041125220000000212350006377602525 |
| 4732: | 2301523220000000200460000501612000 | 0041566210000000200000003000322001 |
| 4734: | 0000000220000000310360006377631000 | 0340000261200000203360036777602406 |
| 4736: | 0040273220000004140400006064120000 | 0003373620006540200360006377671000 |
| 4740: | 1141653220004000200360000505220000 | 0000000000000000000000000000000000 |
| 4742: | 0000000000000000000000000000000000 | 0000000000000000000000000000000000 |
| 4744: | 0000000220000000310360006377631000 | 0000000000000000000000000000000000 |
| 4746: | 0000000000000000000000000000000000 | 0000000000000000000000000000000000 |
| 4750: | 0000000220000000310360006377631000 | 0000000000000000000000000000000000 |
| 4752: | 0000000000000000000000000000000000 | 0000000000000000000000000000000000 |
| 4754: | 0000000220000000310360006377631000 | 0000000000000000000000000000000000 |
| 4756: | 0000000000000000000000000000000000 | 0000000000000000000000000000000000 |
| 4760: | 0000000220000000310360006377631000 | 0000000000000000000000000000000000 |
| 4762: | 0000000000000000000000000000000000 | 0000000000000000000000000000000000 |
| 4764: | 0000000220000000310360006377631000 | 0000000000000000000000000000000000 |
| 4766: | 0000000000000000000000000000000000 | 0000000000000000000000000000000000 |
| 4770: | 0000000220000000310360006377631000 | 0000000000000000000000000000000000 |
| 4772: | 0000000000000000000000000000000000 | 0000000000000000000000000000000000 |
| 4774: | 0000000220000000310360006377631000 | 0000000000000000000000000000000000 |
| 4776: | 0000000000000000000000000000000000 | 0000000000000000000000000000000000 |
| 5000: | 0062410620016550200377006377760377 | 0000000000000000000000000000000000 |
| 5002: | 0000000000000000000000000000000000 | 0000000000000000000000000000000000 |
| 5004: | 4064162720016550700377006377760377 | 0000000261000000200000032000002200 |
| 5006: | 0000000000000000000000000000000000 | 0000000000000000000000000000000000 |
| 5010: | 1242412620000440200360006377620000 | 0000000000000000000000000000000000 |
| 5012: | 0000000000000000000000000000000000 | 0000000000000000000000000000000000 |
| 5014: | 1044075720006540700377006377660000 | 0000000261000000200000032000002200 |
| 5016: | 0000000000000000000000000000000000 | 0000000000000000000000000000000000 |
| 5020: | 1044120320006500700377006377660000 | 0000000261000000200000032000002200 |
| 5022: | 0000000000000000000000000000000000 | 0000000000000000000000000000000000 |
| 5024: | 1044120720003470700377006377620000 | 0000000261000000200000032000002201 |
| 5026: | 0000000000000000000000000000000000 | 0000000000000000000000000000000000 |
| 5030: | 1064164720010573700377006377720377 | 0000000261000000200000032000002201 |
| 5032: | 0000000000000000000000000000000000 | 0000000000000000000000000000000000 |
| 5034: | 1064157720012573700377006377720377 | 0000000261000000200000032000002200 |
| 5036: | 0000000000000000000000000000000000 | 0000000000000000000000000000000000 |
| 5040: | 1064165720016541700377006377720377 | 0000000261000000200000032000002200 |
| 5042: | 0000000000000000000000000000000000 | 0000000000000000000000000000000000 |
| 5044: | 1542410620000440200350006377620000 | 0000000000000000000000000000000000 |
| 5046: | 0000000000000000000000000000000000 | 0000000000000000000000000000000000 |
| 5050: | 4743235220000440200360006377620000 | 0000000000000000000000000000000000 |
| 5052: | 0000000000000000000000000000000000 | 0000000000000000000000000000000000 |
| 5054: | 3642765520000440200360006377620000 | 0000000000000000000000000000000000 |
| 5056: | 0000000000000000000000000000000000 | 0000000000000000000000000000000000 |
| 5060: | 3542412620000440200360006377620000 | 0000000000000000000000000000000000 |
| 5062: | 0000000000000000000000000000000000 | 0000000000000000000000000000000000 |
| 5064: | 3442412620000440200360006377620000 | 0000000000000000000000000000000000 |
| 5066: | 0000000000000000000000000000000000 | 0000000000000000000000000000000000 |
| 5070: | 3342412620000440200360006377620000 | 0000000000000000000000000000000000 |
| 5072: | 0000000000000000000000000000000000 | 0000000000000000000000000000000000 |
| 5074: | 0000000220000000310360006377631000 | 0000000000000000000000000000000000 |
| 5076: | 0000000000000000000000000000000000 | 0000000000000000000000000000000000 |
| 5100: | 0000000220000000310360006377631000 | 0000000000000000000000000000000000 |
| 5102: | 0000000000000000000000000000000000 | 0000000000000000000000000000000000 |
| 5104: | 0000000220000000310360006377631000 | 0000000000000000000000000000000000 |
| 5106: | 0000000000000000000000000000000000 | 0000000000000000000000000000000000 |
| 5110: | 0000000220000000310360006377631000 | 0000000000000000000000000000000000 |
| 5112: | 0000000000000000000000000000000000 | 0000000000000000000000000000000000 |
| 5114: | 0000000220000000310360006377631000 | 0000000000000000000000000000000000 |
| 5116: | 0000000000000000000000000000000000 | 0000000000000000000000000000000000 |
| 5120: | 0000000220000000310360006377631000 | 0000000000000000000000000000000000 |
| 5122: | 0000000000000000000000000000000000 | 0000000000000000000000000000000000 |
| 5124: | 0000000220000000310360006377631000 | 0000000000000000000000000000000000 |
| 5126: | 0000000000000000000000000000000000 | 0000000000000000000000000000000000 |
| 5130: | 0000000220000000310360006377631000 | 0000000000000000000000000000000000 |

| | | |
|---|---|---|
| 5132: | 0000000000000000000000000000000000 | 0000000000000000000000000000000000 |
| 5134: | 0000000220000000310360006377631000 | 0000000000000000000000000000000000 |
| 5136: | 0000000000000000000000000000000000 | 0000000000000000000000000000000000 |
| 5140: | 0000000220000000310360006377631000 | 0000000000000000000000000000000000 |
| 5142: | 0000000000000000000000000000000000 | 0000000000000000000000000000000000 |
| 5144: | 0000000220000000310360006377631000 | 0000000000000000000000000000000000 |
| 5146: | 0000000000000000000000000000000000 | 0000000000000000000000000000000000 |
| 5150: | 0000000220000000310360006377631000 | 0000000000000000000000000000000000 |
| 5152: | 0000000000000000000000000000000000 | 0000000000000000000000000000000000 |
| 5154: | 0000000220000000310350006377631000 | 0000000000000000000000000000000000 |
| 5156: | 0000000000000000000000000000000000 | 0000000000000000000000000000000000 |
| 5160: | 0000000220000000310360006377631000 | 0000000000000000000000000000000000 |
| 5162: | 0000000000000000000000000000000000 | 0000000000000000000000000000000000 |
| 5164: | 0000000220000000310360006377631000 | 0000000000000000000000000000000000 |
| 5166: | 0000000000000000000000000000000000 | 0000000000000000000000000000000000 |
| 5170: | 0000000220000000310360006377631000 | 0000000000000000000000000000000000 |
| 5172: | 0000000000000000000000000000000000 | 0000000000000000000000000000000000 |
| 5174: | 0000000220000000310360006377631000 | 0000000000000000000000000000000000 |
| 5176: | 0000000000000000000000000000000000 | 0000000000000000000000000000000000 |
| 5200: | 1064155673004003700017032077720377 | 0000000000000000000000000000000000 |
| 5202: | 0000000000000000000000000000000000 | 0000000000000000000000000000000000 |
| 5204: | 1064160673006003700017032077720377 | 0000000000000000000000000000000000 |
| 5206: | 0000000000000000000000000000000000 | 0000000000000000000000000000000000 |
| 5210: | 1064112273006002700000532000060000 | 0000000000000000000000000000000000 |
| 5212: | 0000000000000000000000000000000000 | 0000000000000000000000000000000000 |
| 5214: | 1044075273020001700017032077720377 | 0000000000000000000000000000000000 |
| 5216: | 0020000000000000000000000000000000 | 0000000000000000000000000000000000 |
| 5220: | 1044114673022001700017032077720377 | 0000000000000000000000000000000000 |
| 5222: | 0000000000000000000000000000000000 | 0000000000000000000000000000000000 |
| 5224: | 1044113273024001700017032077720377 | 0000000000000000000000000000000000 |
| 5226: | 0000000000000000000000000000000000 | 0000000000000000000000000000000000 |
| 5230: | 1041430720042002120377000501460377 | 0001271620042007570057006377602406 |
| 5232: | 0000000000000000000000000000000000 | 0000000000000000000000000000000000 |
| 5234: | 1044071320000601700557006377620377 | 0066516620012000200140506377660377 |
| 5236: | 0000000000000000000000000000000000 | 0000000000000000000000000000000000 |
| 5240: | 0642007620000000205500016377620377 | 0063365220156540200362546031060001 |
| 5242: | 0000000000000000000000000000000000 | 0000000000000000000000000000000000 |
| 5244: | 0641356620000000205500016377620376 | 0004111120000006000360006377602430 |
| 5246: | 0020000320150320605377006377602431 | 0000000000000000000000000000000000 |
| 5250: | 0641356620000000205500016377620376 | 0004111520000006000360006377602430 |
| 5252: | 0020000320150320605377006377602431 | 0000000000000000000000000000000000 |
| 5254: | 0641356620000000205500016377620376 | 0020000251010002600017032077702431 |
| 5256: | 0000000000000000000000000000000000 | 0000000000000000000000000000000000 |
| 5260: | 0000000220000000310360006377631000 | 0000000000000000000000000000000000 |
| 5262: | 0000000000000000000000000000000000 | 0000000000000000000000000000000000 |
| 5264: | 0000000220000000310360006377631000 | 0000000000000000000000000000000000 |
| 5266: | 0000000000000000000000000000000000 | 0000000000000000000000000000000000 |
| 5270: | 0000000220000000310360006377631000 | 0000000000000000000000000000000000 |
| 5272: | 0000000000000000000000000000000000 | 0000000000000000000000000000000000 |
| 5274: | 0000000220000000310360006377631000 | 0000000000000000000000000000000000 |
| 5276: | 0000000000000000000000000000000000 | 0000000000000000000000000000000000 |
| 5300: | 1046671320000470120377006377620377 | 0023265220010600010377006377603043 |
| 5302: | 0000000000000000000000000000000000 | 0000000000000000000000000000000000 |
| 5304: | 0002001220002000000377006377631000 | 0000000000000000000000000000000000 |
| 5306: | 0000000000000000000000000000000000 | 0000000000000000000000000000000000 |
| 5310: | 1044107720006601700377006377660377 | 0001441220002000000377006377631000 |
| 5312: | 0000000000000000000000000000000000 | 0000000000000000000000000000000000 |
| 5314: | 1044163720000601700557006377620377 | 0066546620012000200140506377660377 |
| 5316: | 0000000000000000000000000000000000 | 0000000000000000000000000000000000 |
| 5320: | 1044071720000601700557006377620377 | 0066550620012000200140506377660377 |
| 5322: | 0000000000000000000000000000000000 | 0000000000000000000000000000000000 |
| 5324: | 0000000220000000310350006377631000 | 0000000000000000000000000000000000 |
| 5326: | 0000000000000000000000000000000000 | 0000000000000000000000000000000000 |
| 5330: | 0000000220000000310350006377631000 | 0000000000000000000000000000000000 |
| 5332: | 0000000000000000000000000000000000 | 0000000000000000000000000000000000 |
| 5334: | 0000000220000000310360006377631000 | 0000000000000000000000000000000000 |
| 5336: | 0000000000000000000000000000000000 | 0000000000000000000000000000000000 |
| 5340: | 0641355220000000205500006377620377 | 0000000000000000000000000000000000 |
| 5342: | 0000000000000000000000000000000000 | 0000000000000000000000000000000000 |
| 5344: | 0641355620000000205500006377620377 | 0000000000000000000000000000000000 |
| 5346: | 0000000000000000000000000000000000 | 0000000000000000000000000000000000 |
| 5350: | 0642007620000000205500016377620377 | 0064246220010000205377006377620002 |
| 5352: | 0000000000000000000000000000000000 | 0000000000000000000000000000000000 |
| 5354: | 0642007620000000205500016377620377 | 0064247220010000205377006377720002 |
| 5356: | 0000000000000000000000000000000000 | 0000000000000000000000000000000000 |
| 5360: | 0642010620000000205500016377620377 | 0044142520000005000360006377620001 |

```
5362: 0060000320150320605377006377620002 0000000000000000000000000000000000
5364: 0642010620000000205500016377620377 0044143520000005000360006377620001
5366: 0060000320150320605377006377620002 0000000000000000000000000000000000
5370: 0642010620000000205500016377620377 0063365220156540200362546031060001
5372: 0000000000000000000000000000000000 0000000000000000000000000000000000
5374: 0642005620000000205500016377620377 0063365220156540200362546031060001
5376: 0000000000000000000000000000000000 0000000000000000000000000000000000
5400: 0001476611016002440360503000530000 0000000000000000000000000000000000
5402: 0000000000000000000000000000000000 0000000000000000000000000000000000
5404: 0001476611216002440360503000530000 0000000000000000000000000000000000
5406: 0000000000000000000000000000000000 0000000000000000000000000000000000
5410: 0001476611416002440360503000530000 0000000000000000000000000000000000
5412: 0000000000000000000000000000000000 0000000000000000000000000000000000
5414: 0001476611616002440360503000530000 0000000000000000000000000000000000
5416: 0000000000000000000000000000000000 0000000000000000000000000000000000
5420: 0001477211016002440361043000530000 0000000000000000000000000000000000
5422: 0000000000000000000000000000000000 0000000000000000000000000000000000
5424: 0001477211216002440361043000530000 0000000000000000000000000000000000
5426: 0000000000000000000000000000000000 0000000000000000000000000000000000
5430: 0001477211416002440361043000530000 0000000000000000000000000000000000
5432: 0000000000000000000000000000000000 0000000000000000000000000000000000
5434: 0001477211616002440361043000530000 0000000000000000000000000000000000
5436: 0000000000000000000000000000000000 0000000000000000000000000000000000
5440: 0001477611016002440360543000530000 0000000000000000000000000000000000
5442: 0000000000000000000000000000000000 0000000000000000000000000000000000
5444: 0001477611216002440360543000530000 0000000000000000000000000000000000
5446: 0000000000000000000000000000000000 0000000000000000000000000000000000
5450: 0001477611416002440360543000530000 0000000000000000000000000000000000
5452: 0000000000000000000000000000000000 0000000000000000000000000000000000
5454: 0001477611616002440360543000530000 0000000000000000000000000000000000
5456: 0000000000000000000000000000000000 0000000000000000000000000000000000
5460: 0001500611016002440360603000530000 0000000000000000000000000000000000
5462: 0000000000000000000000000000000000 0000000000000000000000000000000000
5464: 0001500611216002440360603000530000 0000000000000000000000000000000000
5466: 0000000000000000000000000000000000 0040000260000000201360036371120001
5470: 0001500611416002440360603000530000 0002221222002000200364200516031000
5472: 0003252620140460200360006005042526 0021345220010000200377640512242004
5474: 0001500611616002440360603000530000 0003245220004600200037046377671000
5476: 0020000273050002200017172000042407 0002221222002000200364200516031000
5500: 0001501211016002440360703000530000 0006640632004000200360000407602037
5502: 0002312620000000200360006377631000 0001257220000000200360006377631000
5504: 0001501211216002440360703000530000 0000501222002000200377000500131000
5506: 0021175220010000205377346377642464 0040143220004000200360002204021020
5510: 0001501211416002440360703000530000 0022253220010000205377346377642464
5512: 0040146620004000200360002204021020 0021122620010000205377346377642464
5514: 0001501211616002440360703000530000 0043147220004000200360002204021020
5516: 0024540220010000205377346377642464 0047665620004000200360002204021020
5520: 0000501222002000200377000500131000 0024546220010000205377346377642464
5522: 0041275620000000030360006377621373 0040343220000000030360006377621373
5524: 0001750622002000200377000500131000 0063115232050576170020006377642407
5526: 0063115532050576170020006377642407 0020000260012000200157336377603005
5530: 0000654622002000200377000500131000 0000000273002000200001372000031000
5532: 0000000261000000200000032077702201 0003010620000470200360006377642414
5534: 0002137222002000200377000500131000 0000000261000000200000032000002200
5536: 0000000261000000200000032000002200 0047575220142006200360504002021376
5540: 1140501622002000200377000500120000 0000343621000000200000003000302023
5542: 0003151620005540200377106377671000 0003152620006540200377106377671000
5544: 1141751222002000200377000500120000 0003153220006540200377106377671000
5546: 0003153620006540200377106377671000 0003154620006540200377106377671000
5550: 1140655222002000200377000500120000 0003155220006540200377106377671000
5552: 0003155620006540200377106377671000 0003156620006540200377106377671000
5554: 1142137622002000200377000500120000 0003157220006540200377106377671000
5556: 0003157620006540200377106377671000 0003160620006540200377106377671000
5560: 0000000220000000310360006377631000 0003161220006540200377106377671000
5562: 0000000000000000000000000000000000 0000000000000000000000000000000000
5564: 0000000220000000310360006377631000 0000000000000000000000000000000000
5566: 0000000000000000000000000000000000 0000000000000000000000000000000000
5570: 0000000220000000310360006377631000 0000000000000000000000000000000000
5572: 0000000000000000000000000000000000 0000000000000000000000000000000000
5574: 0000000220000000310360006377631000 0000000000000000000000000000000000
5576: 0021310632050002200377140501442407 0000000261000000200000032077702200
5600: 1062041720010570120037006377620377 0062307620152000200940506000360000
5602: 0000000000000000000000000000000000 0000000000000000000000000000000000
5604: 1062041720012570120037006377620377 0062307620150000200041346000360000
5606: 0000000000000000000000000000000000 0000000000000000000000000000000000
```

| | | |
|---|---|---|
| 5610: | 1042041720000000120377006377620377 | 0002002620000000200360016377631000 |
| 5612: | 0042257220000000200440006377720000 | 0000000000000000000000000000000000 |
| 5614: | 1042041722002000120417000507120377 | 0021005620012000200360500507242434 |
| 5616: | 0000000000000000000000000000000000 | 0000000000000000000000000000000000 |
| 5620: | 1042041722002000120377000501520377 | 0000005620012000000360746377602406 |
| 5622: | 0000000300000000000000000000000000 | 0000000000000000000000000000000000 |
| 5624: | 0000000220000000310360006377631000 | 0000000000000000000000000000000000 |
| 5626: | 0000000000000000000000000000000000 | 0043401220000470200360006377660000 |
| 5630: | 0000000220000000310360006377631000 | 0000000000000000000000000000000000 |
| 5632: | 0000000273002000200001072000031000 | 0040211620000000200360006377631000 |
| 5634: | 5042755220000440200360006377620000 | 0040212620000000200360006377631000 |
| 5636: | 0041345620000000200360006377631000 | 0061521232010000200377042077620377 |
| 5640: | 0041375220000000200420016377621013 | 0044123520100030200520500514061023 |
| 5642: | 0040000320000000200620006377621011 | 0000000261000000200000032077702200 |
| 5644: | 0041375220000000200420016377621013 | 0044074120100030200520500514061023 |
| 5646: | 0040000320000000200620006377621011 | 0000000000000000000000000000000000 |
| 5650: | 0041375220000000200420016377621013 | 0044074520100030200520500514061023 |
| 5652: | 0040000320000000200620006377621011 | 0000000000000000000000000000000000 |
| 5654: | 0060652620012000000360646377660376 | 0063036633050576170017042000031000 |
| 5656: | 0003447220016540200377346377643010 | 0000000000000000000000000000000000 |
| 5660: | 0000000220000000310360006377631000 | 0000000000000000000000000000000000 |
| 5662: | 0000000000000000000000000000000000 | 0000000000000000000000000000000000 |
| 5664: | 0000000220000000310360006377631000 | 0003451220016540200377346377643010 |
| 5666: | 0003453220016540200377346377643010 | 0000000000000000000000000000000000 |
| 5670: | 0000000260022001730361070522602513 | 0000000000000000000000000000000000 |
| 5672: | 0000000000000000000000000000000000 | 0000000000000000000000000000000000 |
| 5674: | 0000000260022001730360570522602513 | 0004056222002000200000506377631000 |
| 5676: | 0002221222002000200364200516031000 | 0020755220012000000360506377642417 |
| 5700: | 0044155120140000200360006014661376 | 0040000320102050200020000502061376 |
| 5702: | 0045741220006000200360002203021016 | 0000000000000000000000000000000000 |
| 5704: | 0040047620004000200020006377620377 | 0000000000000000000000000000000000 |
| 5706: | 0046743220006000200360002203021016 | 0000000000000000000000000000000000 |
| 5710: | 0003714620140460200360006005442106 | 0046744620006000200360002203021016 |
| 5712: | 0046745220006000200360002203021016 | 0003177220142474200157306360231000 |
| 5714: | 0003716620140460200360006005442106 | 0003363220006600200360000507402436 |
| 5716: | 0023000620150540200377006360003006 | 0001303232002000200360500405431000 |
| 5720: | 0026571320017530200363506377602002 | 1203745220000440200360006377602017 |
| 5722: | 0003240620010640351362044360602406 | 0042637620142543200361346377660377 |
| 5724: | 0024215220016000200377000501430000 | 0000301220006000200020006377602000 |
| 5726: | 0006753220002000040377106377631000 | 0003206620140460200360006006242526 |
| 5730: | 0000000220000000310360006377631000 | 0000000220000000310360006377631000 |
| 5732: | 0000000273002000200000532000031000 | 0042326620000000200360002000020001 |
| 5734: | 0000000220000000310360006377631000 | 0000000000000000000000000000000000 |
| 5736: | 0000000273002000200017132077731000 | 0000000000000000000000000000000000 |
| 5740: | 5344034220000000201360006370421375 | 0000000000000000000000000000000000 |
| 5742: | 0066761220012000200360500507060000 | 0000000000000000000000000000000000 |
| 5744: | 1147575220000000200020000501520000 | 0000000000000000000000000000000000 |
| 5746: | 0021053220012000200257406377642414 | 0000000000000000000000000000000000 |
| 5750: | 5341150620000000205360006377620000 | 0000000000000000000000000000000000 |
| 5752: | 0040000260142006200360534002021376 | 0000000000000000000000000000000000 |
| 5754: | 0021563620016000040377006377630000 | 0000000261000000200000032000002201 |
| 5756: | 0040000261000000200000032077720377 | 0000000000000000000000000000000000 |
| 5760: | 0000000220000000310360006377631000 | 0000000000000000000000000000000000 |
| 5762: | 0000000000000000000000000000000000 | 0000000000000000000000000000000000 |
| 5764: | 0000000220000000310360006377631000 | 0001731232002000200362400405431000 |
| 5766: | 0003040620006600200360000524402522 | 0063106620010572100377046377621015 |
| 5770: | 0000000220000000310360006377631000 | 0000000000000000000000000000000000 |
| 5772: | 0063005620012572100377046377621015 | 0000000000000000000000000000000000 |
| 5774: | 0000000220000000310360006377631000 | 0000000000000000000000000000000000 |
| 5776: | 0063006620012572100377046377621015 | 0043163620140460200360006004461376 |
| 6000: | 0000000220000000310360006377631000 | 0000535622002000200361300503231000 |
| 6002: | 0003215620006540200360006377602406 | 0000731222002000200351400503431000 |
| 6004: | 0000000220000000310360006377631000 | 0003067232002000201362724101402015 |
| 6006: | 0007776220000000200360006377631000 | 0004113520012000020350546377630000 |
| 6010: | 0000000220000000310360006377631000 | 0060315620010000205377406377661020 |
| 6012: | 0001755220002000000360506377631000 | 0061667620010000205377346377661014 |
| 6014: | 0000000220000000310360006377631000 | 0061202620010000205377346377661014 |
| 6016: | 0000000251014002600000233000330000 | 0000000273002000200001072077731000 |
| 6020: | 0000000220000000310360006377631000 | 0020000273012000200017432077702414 |
| 6022: | 0000123620000000200360000503402413 | 0002221222002000200364200516031000 |
| 6024: | 0000000220000000310360006377631000 | 0003437220000600200360000524602027 |
| 6026: | 0007776220000000200360006377631000 | 0003605220000600200350000525002031 |
| 6030: | 0000000220000000310360006377631000 | 0000053632002000200360700405431000 |
| 6032: | 0047015220006000200360000515021016 | 0047015520006000200360000515021016 |
| 6034: | 0000000220000000310360006377631000 | 0043147220010572100363206377621011 |
| 6036: | 0043147620010572100363205377621011 | 0043765620010572100353206377621011 |

| | | |
|---|---|---|
| 6040: | 0000000220000000310360006377631000 | 0043773620010572100363206377621011 |
| 6042: | 0000000260000000200360030403602201 | 0000000253002007600017072077731000 |
| 6044: | 0000000220000000310360006377631000 | 0041137220000000200360000503020000 |
| 6046: | 0000000260000000200360036377631000 | 0000000260000000200360036377631000 |
| 6050: | 0000000220000000310360006377631000 | 0000000260000000200360036377631000 |
| 6052: | 0052125650157570200377076050161376 | 0001165236050004205350206377632400 |
| 6054: | 0000000220000000310360006377631000 | 0000000260000000200360036377631000 |
| 6056: | 2400000251002002600017232077712000 | 0063150620156540200361246072260377 |
| 6060: | 0000000220000000310360006377631000 | 0040503620000000200600006377620377 |
| 6062: | 0043034620006600200360006377620375 | 0000551616000004201360006370402246 |
| 6064: | 0000000220000000310360006377631000 | 0001607222002000200360500503231000 |
| 6066: | 0042641620000540232360026103602521 | 0001400620000000000360006377602417 |
| 6070: | 0000000220000000310360006377631000 | 0000000260012000020362576377630000 |
| 6072: | 0001775220000000200360006377631000 | 0001310632042002200377040501431000 |
| 6074: | 0000000220000000310360006377631000 | 0021310632050002200377040501403047 |
| 6076: | 0022056620012000200257506377603005 | 0040000275142006200017074075720377 |
| 6100: | 0000000220000000310360006377631000 | 0003033220000600200360000524202526 |
| 6102: | 0007041232004000200360000407202035 | 0000000260000000200360036377631000 |
| 6104: | 0000000220000000310360006377631000 | 0000000260000000200360036377631000 |
| 6106: | 0000000260000000200360036377631000 | 0000000260000000200360036377631000 |
| 6110: | 0000000220000000310360006377631000 | 0000000260000000200360036377631000 |
| 6112: | 0000000260000000200360036377631000 | 0000000260000000200360036377631000 |
| 6114: | 0000000220000000310360006377631000 | 0000000260000000200360036377631000 |
| 6116: | 0000474620000000200360006377631000 | 0060313220010000205377406377661020 |
| 6120: | 0000000220000000310360006377631000 | 0060313620010000205377406377661020 |
| 6122: | 0001263233000000070000003020302406 | 0007051620012000200077146377643012 |
| 6124: | 0000000220000000310360006377631000 | 0007052620012000200077146377643012 |
| 6126: | 0007053220012000200077146377643012 | 0007053620012000200077146377643012 |
| 6130: | 0000000220000000310360006377631000 | 0007054620012000200077146377643012 |
| 6132: | 0060523620010000205377346377661014 | 0060524620010000205377346377661014 |
| 6134: | 0000000220000000310360006377631000 | 0001244620004000200360000503402416 |
| 6136: | 0001245220004000200360000503402416 | 0001245620004000200360000503402416 |
| 6140: | 0000000220000000310360006377631000 | 0001246620004000200360000503402416 |
| 6142: | 0001247220004000200360000503402416 | 0000000260000000200360036377631000 |
| 6144: | 0000000220000000310360006377631000 | 0000744620000000200640006377603005 |
| 6146: | 0000744620000000200640006377603007 | 0007133220000000200640006377603005 |
| 6150: | 0000000220000000310360006377631000 | 0007133220000000200640006377603007 |
| 6152: | 0000745220000000200640006377603005 | 0000745220000000200640006377603007 |
| 6154: | 0000000220000000310360006377631000 | 0000000260012000200360570421002104 |
| 6156: | 0003223620010572100362606377602015 | 0021520632050002200377140503642407 |
| 6160: | 0000000220000000310360006377631000 | 0007431620022000200362000404402022 |
| 6162: | 0000000260022000200362070404402022 | 0000657620010000200257506377643004 |
| 6164: | 0000000220000000310360006377631000 | 0000000000000000000000000000000000 |
| 6166: | 0000660620010000200257506377643004 | 0000000260000000200360036377631000 |
| 6170: | 0000000220000000310360006377631000 | 0000000000000000000000000000000000 |
| 6172: | 0000000260000000200360036377631000 | 0041547632002000200352540405431000 |
| 6174: | 0000000220000000310360006377631000 | 0000000000000000000000000000000000 |
| 6176: | 0043201620006600200360000524402522 | 0043202620006600200360000524402522 |
| 6200: | 0000000220000000310360006377631000 | 0004043620162000200257046337003007 |
| 6202: | 0000000009000000000000000000000000 | 0000000000000000000000000000000000 |
| 6204: | 0000000220000000310360006377631000 | 0002353620142006200360504000402513 |
| 6206: | 0000000000000000000000000000000000 | 0000000000000000000000000000000000 |
| 6210: | 0000000220000000310360006377631000 | 0000000000000000000000000000000000 |
| 6212: | 0000000000000000000000000000000000 | 0000000000000000000000000000000000 |
| 6214: | 0000000220000000310360006377631000 | 0062253620010000205377346377661014 |
| 6216: | 0060241620012000200020646377661021 | 0001243222002000200360500501431000 |
| 6220: | 0000000220000000310360006377631000 | 0001765620000000200360000503003005 |
| 6222: | 0000000000000000000000000000000000 | 0000000000000000000000000000000000 |
| 6224: | 0000000220000000310360006377631000 | 0000000000000000000000000000000000 |
| 6226: | 0001765620000000200360000503003007 | 0021734632050002200377146377642407 |
| 6230: | 0000000220000000310360006377631000 | 0021432632050002200377146377642407 |
| 6232: | 0021735232050002200377146377642407 | 0021433232050002200377146377642407 |
| 6234: | 0000000220000000310360006377631000 | 0047575220142006200360504002021376 |
| 6236: | 0040761620000000200040000421222003 | 0020205220012000200377340503442413 |
| 6240: | 0000000220000000310360006377631000 | 0023073220150540200377506020003006 |
| 6242: | 0023071620150540200377506020003006 | 0023075220150540200377506020003006 |
| 6244: | 0000000220000000310360006377631000 | 0000000000000000000000000000000000 |
| 6246: | 0023073520150540200377506020003006 | 0000000000000000000000000000000000 |
| 6250: | 0000000220000000310360006377631000 | 0000000000000000000000000000000000 |
| 6252: | 0000000000000000000000000000000000 | 0000000000000000000000000000000000 |
| 6254: | 0000000220000000310360006377631000 | 0000043621000000200000003000332400 |
| 6256: | 0007127220000000200360002077602447 | 0000000000000000000000000000000000 |
| 6260: | 0000000220000000310360006377631000 | 0000000000000000000000000000000000 |
| 6262: | 0000000000000000000000000000000000 | 0000000000000000000000000000000000 |
| 6264: | 0000000220000000310360006377631000 | 0003037220000470200377506377631000 |

```
6266:  0001030620012000200361640503402416 0000000000000000000000000000000000
6270:  0000000220000000310360006377631000 0000000000000000000000000000000000
6272:  0007135233000000200000002000002100 0000000000000000000000000000000000
6274:  0000000220000000310360006377631000 0007136633000000200000002000002100
6276:  0007137233000000200000002000002100 0007137633000000200000002000002100
6300:  0000000220000000310360006377631000 0022765220012560200377046377602105
6302:  0002655620000470200377406377631000 0000000000000000000000000000000000
6304:  0000000220000000310360006377631000 0000000000000000000000000000000000
6306:  0042654620000470200360006377660000 0000000000000000000000000000000000
6310:  0000000220000000310360006377631000 0040000275024000200001332000060000
6312:  0061176620010000205377346377661014 0061177620010000205377346377661014
6314:  0000000220000000310360006377631000 0061201620010000205377346377661014
6316:  0064516620010000205377346377651014 0040063620004000200060000515021014
6320:  0000000220000000310360006377631000 0060443220150000200037006072260377
6322:  0063141220156540200361246072260000 0042305521400000200360002276221371
6324:  0000000220000000310360006377631000 0042305621400000200350002276221371
6326:  0042305621400000200360002276221371 0042305621400000200360002276221371
6330:  0000000220000000310360006377631000 0042305621400000200360002276221371
6332:  0042305621400000200360002276221371 0042305621400000200360002276221371
6334:  0000000220000000310360006377631000 0042305621400000200350002276221371
6335:  0042305521400000200360002276221371 0042305621400000200360002276221371
6340:  0000000220000000310360006377631000 0042305621400000200360002276221371
6342:  0042305621400000200360002276221371 0040556632002000200362500402631000
6344:  0000000220000000310360006377631000 0040556632002000200362500402631000
6346:  0040556632002000200362500402631000 0004447620000000201360006370402250
6350:  0000000220000000310360006377631000 0040000261000000200000033000322371
6352:  0003623620162000200257506367603007 0007057220162000200257506367603007
6354:  0000000220000000310360006377631000 0007057620162000200257506367603007
6356:  0007057220162000200257506367603007 0000000000000000000000000000000000
6360:  0000000220000000310360006377631000 0000000000000000000000000000000000
6362:  0000000000000000000000000000000000 0000000000000000000000000000000000
6364:  0000000220000000310360006377631000 0007061220162000200257506367603007
6366:  0000671620012000000361046377602416 0000673220012000000361046377602416
6370:  0000000220000000310360006377631000 0000000000000000000000000000000000
6372:  0000674620012000000361046377602416 0000000260000000200360036377631000
6374:  0000000220000000310360006377631000 0000000000000000000000000000000000
6376:  0022746620154604200137246360202434 0022745620154604200137246360202434
6400:  0000000220000000310360006377631000 0000503220000000200360000503203005
6402:  0001142620162000200257306051403007 0040623220004000212360000524002520
6404:  0000000220000000310360006377631000 0040623220004000212360000524002520
6406:  0000000261000000200000033000302200 0040000261000000200000033000321372
6410:  0000000220000000310360006377631000 0043356620004640232360024101602015
6412:  0043357620004640232360024101602015 0000000261000000200000033000302201
6414:  0000000220000000310360006377631000 0002203220000000201350026102431000
6416:  0003206620140460200360006006242526 0000000273000000200000032077703005
6420:  0000000220000000310360006377631000 0001765520000000200600006377603005
6422:  0001765620000000200600006377603007 0001436622002000200020506377631000
6424:  0000000220000000310360006377631000 0001436622002000200020506377631000
6426:  0001436622002000200020506377631000 0001436622002000200020506377631000
6430:  0000000220000000310360006377631000 0001301232002000200360500405431000
6432:  0022333220012000020377046377630000 0022355620012000040377046377630000
6434:  0000000220000000310360006377631000 0003431220016540200361246377602413
6436:  0003433220016540200361246377602413 0003011220000470200350006377642417
6440:  0000000220000000310360006377631000 0040133620000000202420036377720000
6442:  0001545622002000200015003000331000 0000033220162000200257306041203007
6444:  0000000220000000310360006377631000 0040000273142004200017074011020000
6446:  0000520620020000200377640512243033 0003067232004640201360024100402015
6450:  0000000220000000310360006377631000 1141427220000000222360006377602406
6452:  1141341620000000222360006377602406 1707233220000000200360000513012000
6454:  0000000220000000310360006377631000 0003477220006600200357706377671000
6456:  0003204620006600200357706377671000 0003513220006600200357706377671000
6460:  0000000220000000310360006377631000 0003205220006600200357706377671000
6462:  0007231220012000200077146377643012 0007231620012000200077146377643012
6464:  0000000220000000310360006377631000 0021452620014000200377340503442413
6466:  0007545221000000200000002000002200 0001153620004000205360006377632200
6470:  0000000220000000310360006377631000 0001156620004000205360006377632200
6472:  0000000261000000200000032000002201 0022746620154604200137246360202435
6474:  0000000220000000310360006377631000 0022745620154604200137246360202435
6476:  0040056620000000201360006371603006 0040554622002000213362346777602525
6500:  0000000220000000310360006377631000 0062751220012570222377046377602406
6502:  0040521620012000200360540524002520 0001044620004000200376200400271000
6504:  0000000220000000310360006377631000 0002656620000000200360006377631000
6506:  0002355211200002600360000501432200 0002355211600002600360000501432200
6510:  0000000220000000310360006377631000 0001530616000004201360006370402246
6512:  0002635621000000200000003000302200 0000043621000000200000002000032400
6514:  0000000220000000310360006377631000 0022301220012000020377006377630000
```

```
6516:  0062637232050576170360002077642407 0062677233050576170000002077742407
6520:  0000000220000000310360006377631000 0063113632050576170020006377642407
6522:  0063114632050576170020006377642407 0063067632050576170140006377642407
6524:  0000600220000000310360006377631000 0007252632004000200360000407002034
6526:  0000990261009000200000033000302200 0000000261000000200000033000302200
6530:  0000000220000000310360006377631000 0000000261000000200000033000302200
6532:  0000000261000000200000033000302200 0000000260030000200360036377631000
6534:  0000000220000000310360006377631000 0000000260000000200360036377631000
6536:  0000000260000000200360036377631000 0000000260000000200350036377631000
6540:  0000000220000000310360006377631000 0000000260000000200360036377631000
6542:  0000000260000000200360036377631000 0000000260000000200360036377631000
6544:  0000000220000000310360006377631000 0000000260000000200360036377631000
6546:  0001301620022001730360544377602513 0001301620022001730360540522602513
6550:  0000000220000000310360006377631000 0000000273002000200017072077731000
6552:  0000000273000000200000032077703005 1203445220000440200360006377602406
6554:  0000000220000000310360006377631000 0000000320004001720360030405202025
6556:  0001741220000000200360000501412000 0000000260000000200360032000402430
6560:  0000000220000000310360006377631000 0043163620140460200360006004461376
6562:  0022635620012560200377646377642003 0002763220000470200377446377631000
6564:  0000000220000000310360006377631000 0000000000000000000000000000000000
6566:  0000000000900000000000000000000000 0000000000000000000000000000000000
6570:  0000000220000000310360006377631000 0000000000000000000000000000000000
6572:  0063107220010572100377046377621015 0063143220156540200361246072260000
6574:  0000000220000000310360006377631000 0000000000000000000000000000000000
6576:  0043163620140460200360006004461376 0003477220006600200357706377671000
6600:  0000000220000000310360006377631000 0003513220006600200357706377671000
6602:  0000000000000000000000000000000000 0000000000000000000000000000000000
6604:  0000000220000000310360006377631000 0042715620004640233360024101602015
6606:  0000000000000000000000000000000000 0000090000000000000000000000000000
6610:  0000000220000000310360006377631000 0000000003000000000000000000000000
6612:  0000003000000000000000000000000000 0000000000000000000000000000000000
6614:  0000000220000000310360006377631000 0000000000000000000000000000000000
6616:  0000000000000000000000003000000000 0400000260164370620157276377652000
6620:  0000000220000000310360006377631000 0060314620010000265377406377661020
6622:  0000000000000000000000000000000000 0000000000000000000000000000000000
6624:  0000000220000000310360006377631000 0000000000000000000000000000000000
6626:  0042242620006000010360006377621011 0040662622002000213376646777602010
6630:  0000000220000000310360006377631000 0040663222002000213376646777602010
6632:  0040563522002000213376646777602010 0002354620142006200360504000602513
6634:  0000000220000000310360006377631000 0043551220006600200357706377671000
6636:  0043302620005500200357706377671000 0001635220002000020377146377631000
6640:  0000000220000000310360006377631000 0063027620150540200361346072260377
6642:  0000000275000000200000032077702415 0003177620142474200157306360231000
6644:  0000000220000000310360006377631000 0000000000000000000000000000000000
6646:  0041206632002000213361346777602406 0000000000000000000000000000000000
6650:  0000000220000000310360006377631000 0000000000000000000000000000000000
6652:  0047233220022000070363702277421376 0000000000000000000000000000000000
6654:  0000000220000000310360006377631000 0001007620022000200257306377643007
6656:  0062773620016540200377046377661015 0000000000000000000000000000000000
6660:  0000000220000000310360006377631000 0000000000000000000000000000000000
6662:  0000000000000000000000000000000000 0000000000000000000000000000000000
6664:  0000000220000000310360006377631000 0063275220016540200377046377621015
6666:  0062775220016540200377046377661015 0000000000000000000000000000000000
6670:  0000000220000000310360006377631000 0000000000000000000000000000000000
6672:  0062777220016540200377046377661015 0000000000000000000000000000000000
6674:  0000000220000000310360006377631000 0000630620050001200077166377672400
6676:  0000631220050001200077106377672400 0000631620050001200077106377672400
6700:  0000000220000000310360006377631000 0000632620050001200077106377672400
6702:  0000205633000000200000003000302405 0000000000000000000000000000000000
6704:  0000000220000000310360006377631000 0000000000000000000000000000000000
6706:  0040727620000000350360000501420377 0000030000000000000000000000000000
6710:  0000000220000000310360006377631000 0007344632004000200360000407402036
6712:  0054447620000000721360036360232100 0007345620012000200077146377643012
6714:  0000000220000000310360006377631000 0007346620012000200077146377643012
6716:  0007347220012000200077146377643012 0007347620012000200077146377643012
6720:  0000000220000000310360006377631000 0007350620012000200077146377643012
6722:  0007351220012000200077146377643012 0007351620012000200077146377643012
6724:  0000000220000000310360006377631000 0001125620020004140342146063402530
6726:  0001000620000000040360006377602105 0040554622002000213362346777602525
6730:  0000000220000000310360006377631000 0003577220010572100361246377602416
6732:  0003601220010572100361246377602416 0003603220010572100361246377602416
6734:  0000000220000000310360006377631000 0002246620000000200360006377631000
6736:  0000306620000000200360006377631000 0002247220000000200360026377631000
6740:  0000000220000000310360006377631000 0000307220000000200360006377631000
6742:  0000207320001400200360006377603005 0000000260000000200360036377631000
6744:  0000000220000000310360006377631000 0040215220000000202360006377631000
```

```
6746: 0020653220010000200137246377642434 0020000260150004200157336360203007
6750: 0000000220000000310360006377631000 0042317620000000200000003000321000
6752: 0006571320001400200360006377603005 0060312620014000200037006377720377
6754: 0000000220000000310360006377631000 0060521620014000200037006377720377
6756: 0000000260000000200360036377731000 0000000000000000000000000000000000
6760: 0000000220000000310360006377631000 0000054637050004200360003000332400
6762: 0000000000000000000000000000000000 0000055237050004200360003000332400
6764: 0000000220000000310360006377631000 0000055637050004200360003000332400
6766: 0000055637050004200360003000332400 0000057237050004200360003000332400
6770: 0000000220000000310360006377631000 0000000000000000000000000000000000
6772: 1042041722002000110040506377620377 0022757220012600010361706377642406
6774: 0000000220000000310360006377631000 0000000000000000000000000000000000
6776: 0002642620000000200400013000312000 0040753620022000200363542277421376
7000: 0000000220000000310360006377631000 0000000000000000000000000000000000
7002: 0006571320001070200377306377631000 0020000260012000200137276377603005
7004: 0000000220000000310360006377631000 0000000000000000000000000000000000
7006: 0063475220155570200360546050061376 0000000000000000000000000000000000
7010: 0000000220000000310360006377631000 0000000000000000000000000000000000
7012: 0006671220000000310360006377631000 0000000000000000000000000000000000
7014: 0000000220000000310360006377631000 0000000000000000000000000000000000
7016: 0004204220010000205020606377632200 0000000000000000000000000000000000
7020: 0000000220000000310360006377631000 0000000000000006000000000000000000
7022: 0001166620004000205375756377671000 0204462220000000200420006377612000
7024: 0000000220000000310360006377631000 0000000000000000000000000000000000
7026: 0002642620016530200363516377602002 0060331220000000721420006360232100
7030: 0000000220000000310360006377631000 0000000000000000000000000000000000
7032: 0044132520142000200240006026661011 0025733320007540200377506377671000
7034: 0000000220000000310360006377631000 0000000000000000000000000000000000
7036: 0044113620142006200360504003121376 0000000000000000000000000000000000
7040: 0000000220000000310360006377631000 0000000000000000000000000000000000
7042: 0001354620142004200020016003443007 0000603233002000200000543000331000
7044: 0000000220000000310360006377631000 0000000000000000000000000000000000
7046: 0006571320001400200360006377603005 0000000000000000000000000000000000
7050: 0000000220000000310360006377631000 0000000000000000000000000000000000
7052: 0001375620000000205360016377602000 0001551632010004140104106071002000
7054: 0000000220000000310360006377631000 0000000000000000000000000000000000
7056: 0004053220000000205440016377602104 0043427220140460200360006005661376
7060: 0000000220000000310360006377631000 0000000000000000000000000000000000
7062: 0002122620142006200037006260603011 0000000000000000000000000000000000
7064: 0000000220000000310360006377631000 0000000000000000000000000000000000
7066: 0002123220142006200037006260603011 0000000000000000000000000000000000
7070: 0000000220000000310360006377631000 0000000000000000000000000000000000
7072: 0002110620102260200377000507031000 0000000000000000000000000000000000
7074: 0000000220000000310360006377631000 0000000000000000000000000000000000
7076: 0003013620000470200360006377642524 0000000000000000000000000000000000
7100: 0000000220000000310360006377631000 0000000000000000000000000000000000
7102: 0004137520140000200360006027642022 0000000320000000200360006377631000
7104: 0000000220000000310360006377631000 0000000000000000000000000000000000
7106: 0001354620142004200020016004043007 0000603233002000200000503000331000
7110: 0000000220000000310360006377631000 0000000000000000000000000000000000
7112: 0041504620000000205360006377620001 0000000000000000000000000000000000
7114: 0000000220000000310360006377631000 0000000000000000000000000000000000
7116: 0060222620150004200201746260660377 0000000000000000000000000000000000
7120: 0000000220000000310360006377631000 0000000000000000000000000000000000
7122: 0050223220150004200201746260660377 0000000000000000000000000000000000
7124: 0000000220000000310360006377631000 0000000000000000000000000000000000
7126: 0040373220162000200121606206460377 0000000000000000000000000000000000
7130: 0000000220000000310360006377631000 0000000000000000000000000000000000
7132: 0040000262002000213376636777602010 0000000000000000000000000000000000
7134: 0000000220000000310360006377631000 0000000000000000000000000000000000
7136: 0003634620140460200360006006442022 0000000000000000000000000000000000
7140: 0000000220000000310360006377631000 0000000000000000000000000000000000
7142: 0003636620140460200360006006442022 0000000000000000000000000000000000
7144: 0000000220000000310360006377631000 0000000000000000000000000000000000
7146: 0003640620140460200360006006442022 0000000000000000000000000000000000
7150: 0000000220000000310360006377631000 0000000000000000000000000000000000
7152: 0004176120100030200360006377642013 0000000320142006200360504000002513
7154: 0000000220000000310360006377631000 0000000000000000000000000000000000
7156: 0000000250000000200360036377631000 0000000000000000000000000000000000
7160: 0000000220000000310360006377631000 0000000000000000000000000000000000
7162: 0005167220000000200360006377631000 0000000000000000000000000000000000
7164: 0000000220000000310360006377631000 0000000000000000000000000000000000
7166: 0000000000000000000000000000000000 0000000000000000000000000000000000
7170: 0000000220000000310360006377631000 0000000000000000000000000000000000
7172: 0042133220102050200020006377661376 0000000000000000000000000000000000
7174: 0000000220000000310360006377631000 0000000000000000000000000000000000
7176: 0042177220004000232360014100202015 0043226620004640232360024100602015
```

```
7200: 0000000220000000310360006377631000 0000000000000000000000000000000000
7202: 0000000000000000000000000000000000 0000000000000000000000000000000000
7204: 0000000220000000310360006377631000 0000000000000000000000000000000000
7206: 0000000000000000000000000000000000 0000000000000000000000000000000000
7210: 0000000220000000310360006377631000 0000000000000000000000000000000000
7212: 0000000000000000000000000000000000 0000000000000000000000000000000000
7214: 0000000220000000310360006377631000 0000000000000000000000000000000000
7216: 0000000000000000000000000000000000 0000000000000000000000000000000000
7220: 0000000220000000310360006377631000 0000000000000000000000000000000000
7222: 0000000000000000000000000000000000 0000000000000000000000000000000000
7224: 0000000220000000310360006377631000 0000000000000000000000000000000000
7226: 0042177220004000232360014100202015 0043227620004640232360024100602015
7230: 0000000220000000310360006377631000 0000000000000000000000000000000000
7232: 0000105620010000200362050400002000 0001353620000000200420006377602000
7234: 0000000220000000310360006377631000 0000000000000000000000000000000000
7236: 0003435220016540200361246377602413 0000000000000000000000000000000000
7240: 0000000220000000310360006377631000 0000000000000000000000000000000000
7242: 0001354620142004200020016003443007 0000503233002000200000503000331000
7244: 0000000220000000310360006377631000 0000000000000000000000000000000000
7246: 0000000000000000000000000000000000 0000000000000000000000000000000000
7250: 0000000220000000310360006377631000 0000000000000000000000000000000000
7252: 0000000000000000000000000000000000 0000000000000000000000000000000000
7254: 0000000220000000310360006377631000 0001354620142004200020016003443007
7256: 0000603233002000200001043000331000 0000000000000000000000000000000000
7260: 0000000220000000310360006377631000 0000000000000000000000000000000000
7262: 0000000000000000000000000000000000 0000000000000000000000000000000000
7264: 0000000220000000310360006377631000 0001354620142004200020016003443007
7266: 0000603233002000200000543000331000 0000000000000000000000000000000000
7270: 0000000220000000310360006377631000 0000000000000000000000000000000000
7272: 0000000000000000000000000000000000 0000000000000000000000000000000000
7274: 0000000220000000310360006377631000 0000000000000000000000000000000000
7276: 0642006620000000205500016377621001 0041407220000000200360000512420002
7300: 0000000220000000310360006377631000 0004053220000000205440016377602104
7302: 0043417220006600200000002000020000 0000000000000000000000000000000000
7304: 0000000220000000310360006377631000 0000000000000000000000000000000000
7306: 0000000000000000000000000000000000 0000000000000000000000000000000000
7310: 0000000220000000310360006377631000 0000000000000000000000000000000000
7312: 0041407620000000202360006377631000 0000000000000000000000000000000000
7314: 0000000220000000310360006377631000 0000000000000000000000000000000000
7316: 0200000261000000200000032000012000 0000000320004000205360006377632200
7320: 0000000220000000310360006377631000 0000000000000000000000000000000000
7322: 0041166620000000205360016377620000 1722410620156540200360506032052000
7324: 0000000220000000310360006377631000 0000000000000000000000000000000000
7326: 0044463220000000200420016377620001 0040132622002000000377044377620016
7330: 0000000220000000310360006377631000 0000000000000000000000000000000000
7332: 0000716532000000200360000511003034 0000000000000000000000000000000000
7334: 0000000220000000310360006377631000 0000000000000000000000000000000000
7336: 0001003620000000200420006377631000 0000000000000000000000000000000000
7340: 0000000220000000310360006377631000 0000000000000000000000000000000000
7342: 0042177220004000233360014100202015 0043316620004640233360024100602015
7344: 0000000220000000310360006377631000 0000000000000000000000000000000000
7346: 0026671320013170200077006377602410 0000634620050001200077146377672400
7350: 0000000220000000310360006377631000 0000000000000000000000000000000000
7352: 0026671320013170200077006377602410 0000635220050001200077146377672400
7354: 0000000220000000310360006377631000 0026671320013170200077006377602410
7356: 0000535620050001200077146377672400 0000000000000000000000000000000000
7360: 0000000220000000310360006377631000 0000000000000000000000000000000000
7362: 0000000000000000000000000000000000 0000000000000000000000000000000000
7364: 0000000220000000310360006377631000 0000000000000000000000000000000000
7366: 0026671320013170200077006377602410 0000636620050001200077146377672400
7370: 0000000220000000310360006377631000 0000000000000000000000000000000000
7372: 0000105233000000200000003000302406 0000000000000000000000000000000000
7374: 0000000220000000310360006377631000 0000000000000000000000000000000000
7376: 0000705620142000200037506267231000 0000000000000000000000000000000000
7400: 0000000220000000310360006377631000 0000000000000000000000000000000000
7402: 0000706620142000200037506267231000 0000000000000300300000000000000000
7404: 0000000220000000310360006377631000 0000000000000000000000000000000000
7406: 0000707220142000200037506267231000 0000000000000000000000000000000000
7410: 0000000220000000310360006377631000 0000000000000000000000000000000000
7412: 0003013220000470200360006377642523 0000000000000000000000000000000000
7414: 0000000220000000310360006377631000 0000000000000000000000000000000000
7416: 0004076120100030200360006377642026 0000000320142006200350504000202513
7420: 0000000220000000310360006377631000 0000000000000000000000000000000000
7422: 4604100120140440200377106033402430 0000000320000000200350002000402430
7424: 0000000220000000310360006377631000 0000000000000000000000000000000000
7426: 0000000000000000000000000000000000 0007613233000000200000003000302406
```

| | | |
|---|---|---|
| 7430: | 0000000220000000310360006377631000 | 0000000000000000000000000000000000 |
| 7432: | 0024110520156570200377506032203004 | 0000000260012000200360730503402416 |
| 7434: | 0000000220000000310360006377631000 | 0000000000000000000000000000000000 |
| 7436: | 0024110120155570200377506032203004 | 0000000260000000200360036377631000 |
| 7440: | 0000000220000000310360006377631000 | 0000000000000000000000000000000000 |
| 7442: | 0000000000000000000000000000000000 | 0004031220000300200360000511402016 |
| 7444: | 0000000220000000310360006377631000 | 0000000000000000000000000000000000 |
| 7446: | 0003617220000000200360016377631000 | 0003457220006600200360006377602416 |
| 7450: | 0000000220000000310360006377631000 | 0000000000000000000000000000000000 |
| 7452: | 0004464220000000200360016377631000 | 0024376220150000200376444052032812 |
| 7454: | 0000000220000000310360006377631000 | 0000000000000000000000000000000000 |
| 7456: | 0001375520000000205360016377602000 | 0001551632010004140104106071002000 |
| 7460: | 0000000220000000310360006377631000 | 0000000000000000000000000000000000 |
| 7462: | 1062041720010570110037046377660000 | 0060601620152000200057106000350000 |
| 7464: | 0000000220000000310360006377631000 | 0000000000000000000000000000000000 |
| 7466: | 0000000000000000000000000000000000 | 0006671220000000310360006377631000 |
| 7470: | 0000000220000000310360006377631000 | 0001354620142004200020016004043007 |
| 7472: | 0000603233002000200000503000331000 | 0000000000000000000000000000000000 |
| 7474: | 0000000220000000310360006377631000 | 0001354620142004200020016004043007 |
| 7476: | 0000603233002000200001043000331000 | 0000000000000000000000000000000000 |
| 7500: | 0000000220000000310360006377631000 | 0001354620142004200020016004043007 |
| 7502: | 0000603233002000200000543000331000 | 0000000000000000000000000000000000 |
| 7504: | 0000000220000000310360006377631000 | 0040063620004000200060000515021014 |
| 7506: | 0000000000000000000000000000000000 | 0000000000000000000000000000000000 |
| 7510: | 0000000220000000310360006377631000 | 0040063620004000200060000515021014 |
| 7512: | 0000000000000000000000000000000000 | 0000000000000000000000000000000000 |
| 7514: | 0000000220000000310360006377631000 | 0040065220004000200060000515021014 |
| 7516: | 0000000000000000000000000000000000 | 0000000000000000000000000000000000 |
| 7520: | 0000000220000000310360006377631000 | 0040065220004000200060000515021014 |
| 7522: | 0000000000000000000000000000000000 | 0000000000000000000000000000000000 |
| 7524: | 0000000220000000310360006377631000 | 0043670620010572100353206377621011 |
| 7526: | 0000000000000000000000000000000000 | 0000000000000000000000000000000000 |
| 7530: | 0000000220000000310360006377631000 | 0642011220000000320550016377620377 |
| 7532: | 0044463220000000200420016377620001 | 0000423232002000000377042002231000 |
| 7534: | 0000000220000000310360006377631000 | 0000000260000000200360036377631000 |
| 7536: | 0045721220000000200000013000321001 | 0000677220010000030360406377631000 |
| 7540: | 0000000220000000310360006377631000 | 0064516620010000205377346377651014 |
| 7542: | 0000000000000000000000000000000000 | 0000000000000000000000000000000000 |
| 7544: | 0000000220000000310360006377631000 | 0064516620010000205377346377661014 |
| 7546: | 0000000000000000000000000000000000 | 0000000000000000000000000000000000 |
| 7550: | 0000000220000000310360006377631000 | 0064544620010000205377346377661014 |
| 7552: | 0000000000000000000000000000000000 | 0000000000000000000000000000000000 |
| 7554: | 0000000220000000310360006377631000 | 0064544620010000205377346377661014 |
| 7556: | 0000000000000000000000000000000000 | 0000000000000000000000000000000000 |
| 7560: | 0000000220000000310360006377631000 | 0064230220010000205377406377661020 |
| 7562: | 0000000000000000000000000000000000 | 0000000000000000000000000000000000 |
| 7564: | 0000000220000000310360006377631000 | 0000000000000000000000000000000000 |
| 7566: | 0000000000000000000000000000000000 | 0000000000000000000000000000000000 |
| 7570: | 0000000220000000310360006377631000 | 0000000000000000000000000000000000 |
| 7572: | 0000000000000000000000000000000000 | 0000000000000000000000000000000000 |
| 7574: | 0000000220000000310360006377631000 | 0000000000000000000000000000000000 |
| 7576: | 0000000000000000000000000000000000 | 0000000000000000000000000000000000 |
| 7600: | 0000000220000000310360006377631000 | 0000000000000000000000000000000000 |
| 7602: | 0000000000000000000000000000000000 | 0000000000000000000000000000000000 |
| 7604: | 0000000220000000310360006377631000 | 0000000000000000000000000000000000 |
| 7606: | 0000000000000000000000000000000000 | 0000000000000000000000000000000000 |
| 7610: | 0000000220000000310360006377631000 | 0000000000000000000000000000000000 |
| 7612: | 0000000000000000000000000000000000 | 0000000000000000000000000000000000 |
| 7614: | 0000000220000000310360006377631000 | 0026671320157140200364206032442430 |
| 7616: | 0026671320157140200360546024242430 | 0020254620110040200041346377642430 |
| 7620: | 0000000220000000310360006377631000 | 0000000000000000000000000000000000 |
| 7622: | 0000000000000000000000000000000000 | 0000000000000000000000000000000000 |
| 7624: | 0000000220000000310360006377631000 | 0000000000000000000000000000000000 |
| 7626: | 0000000000000000000000000000000000 | 0000000000000000000000000000000000 |
| 7630: | 0000000220000000310360006377631000 | 0040405220000000045360016377620377 |
| 7632: | 0001375620010000205361116377602000 | 0003717620142006200360504002502106 |
| 7634: | 0000000220000000310360006377631000 | 0041137620000000040360016377620377 |
| 7636: | 0007425620142006200360514002402106 | 0041305620000000200417006377720377 |
| 7640: | 0000000220000000310360006377631000 | 0000000000000000000000000000000000 |
| 7642: | 0003617220000000200360016377631000 | 0003457220006600200360006377602416 |
| 7644: | 0000000220000000310360006377631000 | 0000000000000000000000000000000000 |
| 7646: | 0000000000000000000000000000000000 | 0000000000000000000000000000000000 |
| 7650: | 0000000220000000310360006377631000 | 0000000000000000000000000000000000 |
| 7652: | 0000000000000000000000000000000000 | 0000000000000000000000000000000000 |
| 7654: | 0000000220000000310360006377631000 | 0000000000000000000000000000000000 |
| 7656: | 0000000000000000000000000000000000 | 0000000000000000000000000000000000 |

| | | |
|---|---|---|
| 7660: | 0000000220000000310360006377631000 | 0000000000000000000000000000000000 |
| 7662: | 0000000000000000000000000000000000 | 0000000000000000000000000000000000 |
| 7664: | 0000000220000000310360006377631000 | 0000000000000000000000000000000000 |
| 7666: | 0000000000000000000000000000000000 | 0000000000000000000000000000000000 |
| 7670: | 0000000220000000310360006377631000 | 0000000000000000000000000000000000 |
| 7672: | 0000000000000000000000000000000000 | 0000000000000000000000000000000000 |
| 7674: | 0000000220000000310360006377631000 | 0007467620000000200360016377631000 |
| 7676: | 0041726620000000200420006377622000 | 0000000000000000000000000000000000 |
| 7700: | 0000000220000000310360006377631000 | 0000000000000000000000000000000000 |
| 7702: | 0000000000000000000000000000000000 | 0000000000000000000000000000000000 |
| 7704: | 0000000220000000310360006377631000 | 0000000000000000000000000000000000 |
| 7706: | 0000000000000000000000000000000000 | 0000000000000000000000000000000000 |
| 7710: | 0000000220000000310360006377631000 | 0001552620000000200360010403602200 |
| 7712: | 0001410620000000200360000420002143 | 0000000000000000000000000000000000 |
| 7714: | 0000000220000000310360006377631000 | 0000000000000000000000000000000000 |
| 7716: | 0000000000000000000000000000000000 | 0042636620012600200020006377720000 |
| 7720: | 0000000220000000310360006377631000 | 0000000000000000000000000000000000 |
| 7722: | 0000000000000000000000000000000000 | 0001163636050004205360206377632400 |
| 7724: | 0000000220000000310360006377631000 | 0026671320017560200377046377642103 |
| 7726: | 0141553220000000205360016377620377 | 0040000260000000200417036377720377 |
| 7730: | 0000000220000000310360006377631000 | 0000000000000000000000000000000000 |
| 7732: | 0000000000000000000000000000000000 | 0000437636050004071360206370432400 |
| 7734: | 0000000220000000310360006377631000 | 0026671320017560200377046377642103 |
| 7736: | 0141553220000000205360016377620377 | 0040000260000000200417036377720377 |
| 7740: | 0000000220000000310360006377631000 | 0062223220010000205377416377661020 |
| 7742: | 0064604220010000205377416377661020 | 0043652620010572100362046377621011 |
| 7744: | 0000000220000000310360006377631000 | 0000000000000000000000000000000000 |
| 7746: | 0000000000000000000000000000000000 | 0061177220010000205377346377661014 |
| 7750: | 0000000220000000310360006377631000 | 0061433620010000205377356377661014 |
| 7752: | 0064212220010000205377416377661020 | 0064544620010000205377346377661014 |
| 7754: | 0000000220000000310360006377631000 | 0000000000000000000000000000000000 |
| 7756: | 0000000000000000000000000000000000 | 0000000000000000000000000000000000 |
| 7760: | 0000000220000000310360006377631000 | 0000000000000000000000000000000000 |
| 7762: | 0000000000000000000000000000000000 | 0000000000000000000000000000000000 |
| 7764: | 0000000220000000310360006377631000 | 0061765220014000205377356377661014 |
| 7766: | 0064212220010000205377416377661020 | 0040065220004000200060000515021014 |
| 7770: | 0000000220000000310360006377631000 | 0000000000000000000000000000000000 |
| 7772: | 0000000000000000000000000000000000 | 0000000000000000000000000000000000 |
| 7774: | 0000000220000000310360006377631000 | 0000000000000000000000000000000000 |
| 7776: | 0000000000000000000000000000000000 | 0000000000000000000000000000000000 |
| 10000: | 0000000220000000310360006377631000 | 0001706620000000200720016377632200 |
| 10002: | 0000000000000000000000000000000000 | 0000000000000000000000000000000000 |
| 10004: | 0023405220150540200361356015442106 | 0000000220000000310360006377631000 |
| 10006: | 0703362620000440205360016377612000 | 0000000220000000310360006377631000 |
| 10010: | 0000000220000000310360006377631000 | 0000675620012000205361056377632200 |
| 10012: | 0000000000000000000000000000000000 | 0000000000000000000000000000000000 |
| 10014: | 0000553220012000205361056377632200 | 0000000220000000310360006377631000 |
| 10016: | 0000000220000000310360006377631000 | 0000000220000000310360006377631000 |
| 10020: | 0000000220000000310360006377631000 | 0000675620012000205360556377632200 |
| 10022: | 0000000000000000000000000000000000 | 0000000000000000000000000000000000 |
| 10024: | 0000563620012000205360556377632200 | 0000000220000000310360006377631000 |
| 10026: | 0000000220000000310360006377631000 | 0000000220000000310350006377631000 |
| 10030: | 0000000220000000310360006377631000 | 0063107620150540160361356015072300 |
| 10032: | 0000000000000000000000000000000000 | 0000000000000000000000000000000000 |
| 10034: | 0000000220000000310360006377631000 | 0000000220000000310360006377631000 |
| 10036: | 0000000220000000310360006377631000 | 0000000220000000310360006377631000 |
| 10040: | 0001165620010000205360556377602445 | 0201115220000000030360016377612000 |
| 10042: | 0201115220000000020360016377612000 | 0201115220000000200360010420012000 |
| 10044: | 0201115220000000200360010420212000 | 0201115220000000200360010420412000 |
| 10046: | 0201115220000000200360010420612000 | 0201115220000000200360010421012000 |
| 10050: | 0201115220000000200360010421212000 | 0201776620000000200360000421412000 |
| 10052: | 0001161220000000205360016377602407 | 0042002621000000200000013000320377 |
| 10054: | 0065671320153140150377006000260377 | 0044042220000000200440006377620375 |
| 10056: | 0000305220000000200360016377631000 | 0002600221000000200000013000302206 |
| 10060: | 0044551220022000200363652277421376 | 0004447620000000200360002276602200 |
| 10062: | 0641166620010000205362656377620377 | 0222043320151140200351346057252000 |
| 10064: | 0002135220142006200377004020002106 | 0001253620000004140400016070002200 |
| 10066: | 0003237220000000205360016377603005 | 0001063210002000200360500500031000 |
| 10070: | 0062341720151140200361346056461376 | 0044113520000000420360006377621374 |
| 10072: | 0040000320000000030360006377621373 | 0642011220000000205500016377620000 |
| 10074: | 0044463220000000200420012003620001 | 0000125232002000000377042003431000 |
| 10076: | 0006671320013572100360006377602410 | 0026671320013170200057006377602410 |
| 10100: | 0000633220050001200077106377672400 | 0027133610010002600377052001032200 |
| 10102: | 0041166620000000205360016377620004 | 0000277220000000200360000507012000 |
| 10104: | 0066671320011200200017106377720377 | 0066671320013570200377006377760002 |

| | | |
|---|---|---|
| 10106: | 0020000260010000200017036377742432 | 0003617220000000200360016377631000 |
| 10110: | 0000734620000000200360016377631000 | 0000707620142000200037506267231000 |
| 10112: | 0042716221000000200000013000320376 | 0042716221000000200000013000320376 |
| 10114: | 0000202632000000200360002076602470 | 0041375220000000200520016377621011 |
| 10116: | 0044122520100030200360006377661023 | 0000000320000000200600000514003005 |
| 10120: | 0041375220000000200520016377621011 | 0044072120100030200360006377661023 |
| 10122: | 0000000320000000200600000514003005 | 0041375220000000200520016377621011 |
| 10124: | 0044072520100030200360006377661023 | 0000000320000000200600000514003005 |
| 10126: | 0065671320017560202377106377602102 | 0046671320141460200360006005661376 |
| 10130: | 0204205220000000200360000501612000 | 0063366633012000200000013000360000 |
| 10132: | 0006671320011172100360006377602410 | 0000157620012000200522400501431000 |
| 10134: | 0542011220000000205500016377620377 | 0044463220000000200420012003620001 |
| 10136: | 0040442622002000000377044377620011 | 0066671320153570200377046100020377 |
| 10140: | 0065671320153570200377046105620000 | 0001270620142004200057046104031000 |
| 10142: | 0000511232002000200023610400431000 | 0043425620000000200400006377620000 |
| 10144: | 0027133610010002600377110501632200 | 0000771622002000200377040506031000 |
| 10146: | 0026671320017140200360006377602410 | 0004376620012000200522400501431000 |
| 10150: | 0001166620012000205360556377602455 | 0200731620000000200360002277612000 |
| 10152: | 0040243222002000200417010501520377 | 0000000261000000200000033000302406 |
| 10154: | 0064407220010000205377416377661020 | 0002271620142370600157306377631000 |
| 10156: | 0064407220010000205377416377661020 | 0040061620004000200060002203021014 |
| 10160: | 0064407220010000205377416377661020 | 0041347220004000200360002204021020 |
| 10162: | 0000227222002000200360600516031000 | 0000227222002000200360700516031000 |
| 10164: | 0043047220006600200360006377621021 | 0043047220006600200360006377621021 |
| 10166: | 0064407220010000205377416377661020 | 0041631220004000200360002204021020 |
| 10170: | 0043047220006600200360006377621021 | 0043047220006600200360006377621021 |
| 10172: | 0000227222002000200362640516031000 | 0000077222002000200360500516031000 |
| 10174: | 0040445622002000213362306777602525 | 0000000260000000200360036377631000 |
| 10176: | 0042633620000540200360006377620001 | 0040000260000000201360036371002406 |
| 10200: | 0040000260142006200360534037020001 | 0000000000000000000000000000000000 |
| 10202: | 0000000260000000200360036377631000 | 0000000260000000200360036377631000 |
| 10204: | 0000000260000000200360036377631000 | 0000000000000000000000000000000000 |
| 10206: | 0000000260000000200360036377631000 | 0000000260000000200360036377631000 |
| 10210: | 0000000260000000200360036377631000 | 0000000260000000200360036377631000 |
| 10212: | 0000000260000000200360036377631000 | 0000000260000000200360036377631000 |
| 10214: | 0000000260000000200360036377631000 | 0064407220010000205377416377661020 |
| 10216: | 0051517620012000200377042202221011 | 0000227222002000200364200516031000 |
| 10220: | 0003615220142000200257506371031000 | 0003615220142000200257506371031000 |
| 10222: | 0041435620000000202350006377631000 | 0040333620000000202360006377731000 |
| 10224: | 0000077222002000200360540516031000 | 0000000272002000200020536377631000 |
| 10226: | 0000227222002000200362440516031000 | 0040000260000000200400036377620000 |
| 10230: | 0006671320001400200360006377603005 | 0000227222002000200363140516031000 |
| 10232: | 0044413620102050200360000502061376 | 0003340620012572100440006377602410 |
| 10234: | 0003573220012572100440006377602410 | 0064407220010000205377416377661020 |
| 10236: | 0062267620012000200377042203221015 | 0000000000000000000000000000000000 |
| 10240: | 0000077222002000200360600516031000 | 0000077222002000200360700516031000 |
| 10242: | 0041612620000000200000003000321002 | 0004102120140000200360006036052000 |
| 10244: | 0021555320017550200376206377630000 | 0062037620010000200377440501461021 |
| 10246: | 0000000000000000000000000000000000 | 0062037620010000200377440501461021 |
| 10250: | 0000000000000000000000000000000000 | 0066671320017170122377006377602406 |
| 10252: | 0020616620112370000377006377603046 | 0066671320017170122377006377702406 |
| 10254: | 1141436620102370000437006377720377 | 0004106120140000200360006036052000 |
| 10256: | 0021565320017560200376206377630000 | 0000000260000000200360036377631000 |
| 10260: | 0000000000000000000000000000000000 | 0000000260000000200360036377631000 |
| 10262: | 0000000000000000000000000000000000 | 0000000260000000200360036377631000 |
| 10264: | 0064407220010000205377416377661020 | 0062055220012000000377040501461015 |
| 10266: | 0000000000000000000000000000000000 | 0040000260142006200360534037020001 |
| 10270: | 0000000000000000000000000000000000 | 0040000260142006200360534037020001 |
| 10272: | 0000000000000000000000000000000000 | 0000000260000000200360036377631000 |
| 10274: | 0000000000000000000000000000000000 | 5341742620000000201360006370421375 |
| 10276: | 0064410220010000205377416377661020 | 0040605620012000200360642202221011 |
| 10300: | 0064410220010000205377416377661020 | 0001266620142370600140006377642462 |
| 10302: | 0000000000000000000000000000000000 | 0006671320001400200360006377603005 |
| 10304: | 0000000000000000000000000000000000 | 0066671320017170122377006377620003 |
| 10306: | 0020616620112370000377006377603046 | 0066671320017170122377006377720003 |
| 10310: | 1141436620102370000437006377720377 | 0064410220010000205377416377661020 |
| 10312: | 0042303220012000200360642202221011 | 0026671320017140200360006377602410 |
| 10314: | 0004400220012000200522400501431000 | 0061660620010000205377416377661020 |
| 10316: | 0040327232002000207375006777631000 | 0061660620010000205377416377661020 |
| 10320: | 0041461232002000207375206777631000 | 0064410220010000205377416377661020 |
| 10322: | 0041147220012000200360642202221011 | 0000000000000000000000000000000000 |
| 10324: | 0006671320011172100360006377602410 | 0000160620012000200522400501431000 |
| 10326: | 0006671320013572100360006377602410 | 0000627620050001200077306377672400 |
| 10330: | 0066671320013170200377046377760377 | 0003367220006540200360006377671000 |
| 10332: | 5241555320001440205360006377621377 | 0041371220000000202360006377631000 |
| 10334: | 0000000000000000000000000000000000 | 0000227222002000200360500516031000 |

| | | |
|---|---|---|
| 10336: | 0000000000000000000000000000000000 | 0000227222002000200362540516031000 |
| 10340: | 0000000000000000000000000000000000 | 0000227222002000200361040516031000 |
| 10342: | 0000000000000000000000000000000000 | 0000227222002000200360540516031000 |
| 10344: | 0000000000000000000000000000000000 | 0007141220000000200360006377631000 |
| 10346: | 0000000000000000000000000000000000 | 0000227222002000200360600516031000 |
| 10350: | 0000000000000000000000000000000000 | 0000227222002000200362400516031000 |
| 10352: | 0000000000000000000000000000000000 | 0000227222002000200362500516031000 |
| 10354: | 0040405220000000045350016377620377 | 0002251220012000020360546377630000 |
| 10356: | 0000000000000000000000000000000000 | 0066671320017170122377006377602406 |
| 10360: | 0020616620112370000377006377603046 | 0000000000000000000000000000000000 |
| 10362: | 0066671320017170122377006377702406 | 1141436620102370000437006377720377 |
| 10364: | 0000000000000000000000000000000000 | 0006671320013572100360006377602410 |
| 10366: | 0026671320013170200057006377602410 | 0000633620050001200077106377672400 |
| 10370: | 0004464220000000200360016377631000 | 0024376220150000200376444052002012 |
| 10372: | 0060447620010000200377512204021020 | 0060000260152000200377534371221011 |
| 10374: | 0007776220000000200360006377631000 | 0060447620010000200377512204021020 |
| 10376: | 0060000260152000200377534371221011 | 0000000000000000000000000000000000 |
| 10400: | 0060447620010000200377512204021020 | 0060000260152000200377534371221011 |
| 10402: | 0060447620010000200377512204021020 | 0060000260152000200377534371221011 |
| 10404: | 0060447620010000200377512204021020 | 0061605620152000200377504371221011 |
| 10406: | 0060447620010000200377512204021020 | 0061605520152000200377504371221011 |
| 10410: | 0060375320017560202377046377642456 | 0044224220000004140550006071621377 |
| 10412: | 0001166620006000205360016377602104 | 2304431220000000200360000501412000 |
| 10414: | 0004121520000002600360006377602410 | 0002277720013572100360706377602410 |
| 10416: | 0004174520140000200376446036031000 | 0000000332002000200360540402631000 |
| 10420: | 0001167620000000200360017377731000 | 0042740222002000200417002277720377 |
| 10422: | 0044073120100030200360006377661023 | 0040000320000000206640000515203004 |
| 10424: | 0044073520100030200360006377661023 | 0040000320000000206640000515203003 |
| 10426: | 0004124520102136000360000501442430 | 0020000320150320605377006377632200 |
| 10430: | 0004125520102136000360000501442430 | 0020000320150320605377006377632200 |
| 10432: | 0000305220142002205363616110142406 | 0021105620016000200377000430402142 |
| 10434: | 0002317620006000020360016377631000 | 0002062620000000030360006377602406 |
| 10436: | 0002317620006000020360016377631000 | 0002062620000000030360006377602406 |
| 10440: | 0002317620012000020360616377630000 | 0040000260002000030417076377620000 |
| 10442: | 0044464222002000213376556777602010 | 0043625522002000213376506777602010 |
| 10444: | 0002071620142000200137016357631000 | 0001211633002000200377302077631000 |
| 10446: | 0001166620010000205360556377602406 | 1100000260000000200360030501412000 |
| 10450: | 1201135320001040200360000501412000 | 0023407220016550200376306377602406 |
| 10452: | 0001166620010000205362656377602445 | 1100131220016002100363740501412000 |
| 10454: | 0060241220010000200377450501461015 | 0062040620010000200377440501461021 |
| 10456: | 1704076532002001600420502000612000 | 0000000310004002600350002000432200 |
| 10460: | 0060573320013200252360642202221011 | 0040763220004000200360002204021020 |
| 10462: | 0002071620000000200360010507403001 | 0000000272002000200377332001031000 |
| 10464: | 0002071620000000200360010507403001 | 0003326620006540200377246377671000 |
| 10466: | 5501747321001440205360003000312000 | 0041360620000000202360006377631000 |
| 10470: | 5501747321001440205360003000312000 | 0041361220000000202360006377631000 |
| 10472: | 5501747321001440205360003000312000 | 0041361620000000202360006377631000 |
| 10474: | 5501747321001440205360003000312000 | 0041362620000000202360006377631000 |
| 10476: | 5501747321001440205360003000312000 | 0041363220000000202360006377631000 |
| 10500: | 5501747321001440205360003000312000 | 0041363620000000202360006377631000 |
| 10502: | 0064077120140000160360006015032300 | 1140000320000000200360005377620001 |
| 10504: | 0064077520140000160360006015032300 | 0000000320022000200377040501402406 |
| 10506: | 0004100120000002200360006377602430 | 0060000332000002170360002000631000 |
| 10510: | 0001166620004000205360016377632200 | 0200732620000000200360002277612000 |
| 10512: | 0004126520100010200360006377642410 | 0002300720013572100350546377602410 |
| 10514: | 0066671320017170122377006377620003 | 0002311620000000200350006377631000 |
| 10516: | 0066671320017170122377006377620004 | 0041721220000000200420006377720377 |
| 10520: | 0004127520140000200360006035052000 | 0021565320017560200376206377630000 |
| 10522: | 0004130520140000200360006036052000 | 0021565320017560200376206377630000 |
| 10524: | 0004131520140000200360006036052000 | 0021565320017560200376206377630000 |
| 10526: | 0061660620012000000360656377661015 | 0041103632142007207375006777602462 |
| 10530: | 0061660620012000000360656377661015 | 0042336632142007207375206777602462 |
| 10532: | 5241747721001440205360003000322001 | 0041357620000000202360006377631000 |
| 10534: | 5241747721001440205360003000322001 | 0041364620000000202360006377631000 |
| 10536: | 5241747721001440205360003000322001 | 0041365220000000202360006377631000 |
| 10540: | 5241747721001440205360003000322001 | 0041365620000000202360006377631000 |
| 10542: | 5241747721001440205360003000322001 | 0041366620000000202360006377631000 |
| 10544: | 5241747721001440205360003000322001 | 0041367220000000202360006377631000 |
| 10546: | 5241747721001440205360003000322001 | 0041367620000000202360006377631000 |
| 10550: | 5241747721001440205360003000322001 | 0041370620000000202360006377631000 |
| 10552: | 0046671320017170122360006377620003 | 0003547220000000200360006377631000 |
| 10554: | 0046671320017170122360006377620003 | 0041721620000000200420006377720377 |
| 10556: | 0004100120140000200377046033431000 | 0021411232010000200017016377602430 |
| 10560: | 0004100120140000200377046033431000 | 0000000320000000200360002000612000 |
| 10562: | 0002221222002000200360600516031000 | 0002221222002000200360700516031000 |
| 10564: | 0002111620000000200360000514203006 | 0002112620000000200360000514203006 |

| | | |
|---|---|---|
| 10566: | 004002362000000020636000637763100 0 | 004113352000000020636000637763100 0 |
| 10570: | 000211162000000020036000051420300 6 | 000211262000000020036000051420300 6 |
| 10572: | 000222122200200020036264051603100 0 | 000007722200200020036050051603100 0 |
| 10574: | 000051462200200020036134052563100 0 | 000000026000000020036003637763100 0 |
| 10576: | 004000026000000020136003637132000 1 | 004000026000000020136003637120240 6 |
| 10600: | 004000026014200620036107403702000 1 | 000000000000000000000000000000000 0 |
| 10602: | 000000026002200020036207040440202 2 | 000743162002200020036200040440202 2 |
| 10604: | 000000026000000020036003637763100 0 | 000000000000000000000000000000000 0 |
| 10606: | 000020732000140020036000637760300 5 | 000020732000140020036000637760300 5 |
| 10610: | 000020732000140020036000637760300 5 | 000020732000140020036000637760300 5 |
| 10612: | 000020732000140020036000637760300 5 | 000020732000140020036000637760300 5 |
| 10614: | 000020732000140020036000637760300 5 | 044000027202000020337717677761200 0 |
| 10616: | 044000027202000020337733677761200 0 | 000222122200200020036420051603100 0 |
| 10620: | 000145162014200020025750637063100 0 | 000145162014200020025750637063100 0 |
| 10622: | 004131362000000020236000637763100 0 | 004024052000000020236000637773100 3 |
| 10624: | 000007722200200020036054051603100 0 | 000000027200200020002107637763100 0 |
| 10626: | 000222122200200020036244051603100 0 | 000000026300200020001703300033100 0 |
| 10630: | 000000026100000020000003200000220 0 | 000222122200200020036314051603100 0 |
| 10632: | 000107462000600020036000050140240 6 | 000460122300200020000050300033100 0 |
| 10634: | 000460322300200020001700300033100 0 | 000413353210221160036000200064243 0 |
| 10636: | 000000031000400260036000200043220 0 | 000000000000000000000000000000000 0 |
| 10640: | 000007722200200020036060051603100 0 | 000007722200200020036070051603100 0 |
| 10642: | 004161322000000020000000300032100 2 | 000410312014000020036000603605200 0 |
| 10644: | 002156532001756020037620637763000 0 | 000422622000000020036000051420300 6 |
| 10646: | 000000000000000000000000000000000 0 | 000422622000000020036000051420300 6 |
| 10650: | 000000000000000000000000000000000 0 | 006667132001717012237700637760240 6 |
| 10652: | 002174462015200000037700637020304 6 | 006667132001717012237700637770240 6 |
| 10654: | 114020062014200000043700637032037 7 | 000410552014000020036000603605200 0 |
| 10656: | 002156532001756020037620637763000 0 | 002020732001317020003700637760300 5 |
| 10660: | 000214361600000420136000637040224 6 | 002020732001317020003704637760300 5 |
| 10662: | 000214361600000420136000637040224 6 | 000020732000140020036000637760300 5 |
| 10664: | 000000000000000000000000000000000 0 | 006154662001000020537740637766102 0 |
| 10666: | 000000000000000000000000000000000 0 | 004000026014200620036107403702000 1 |
| 10670: | 000000000000000000000000000000000 0 | 004000026014200620036107403702000 1 |
| 10672: | 000000000000000000000000000000000 0 | 000000026000000020036003637763100 0 |
| 10674: | 000000003000000000300000000000000 0 | 534142322000000020136000637042137 5 |
| 10676: | 000000000000000000000000000000000 0 | 002307122015054020037750602000300 6 |
| 10700: | 000413453210221160036000200064243 0 | 000000031000400260036000200043220 0 |
| 10702: | 000000000000000000000000000000000 0 | 000657132000140020036000637760300 5 |
| 10704: | 000000000000000000000000000000000 0 | 006667132001717012237700637762000 3 |
| 10706: | 002174462015200000037700637020304 6 | 006667132001717012237700637772000 3 |
| 10710: | 114020062014200000043700637032037 7 | 170413552000000160036000050501200 0 |
| 10712: | 000000031000400260036000200043220 0 | 000004522300200020000000300033100 0 |
| 10714: | 000410013210213220036000200064243 0 | 000000031000200260037710200043100 0 |
| 10716: | 000231762001000020004001050143100 0 | 000167361000200003037724050003100 0 |
| 10720: | 000231762001000020004001050143100 0 | 000167461000200003037724050003100 0 |
| 10722: | 002020732015114020036134603605200 0 | 002156526001756020037623637763000 0 |
| 10724: | 000405462300200020000000300033100 0 | 000000000000000000000000000000000 0 |
| 10726: | 000002562300200020000050300033100 0 | 000000000000000000000000000000000 0 |
| 10730: | 000335662000654020036000637767100 0 | 000000000000000000000000000000000 0 |
| 10732: | 524155532000144020536000637762137 7 | 004137262000000020236000637763100 0 |
| 10734: | 000000000000000000000000000000000 0 | 000222122200200020036050051603100 0 |
| 10736: | 000000000000000000000000000000000 0 | 000222122200200020036254051603100 0 |
| 10740: | 000000000000000000000000000000000 0 | 000222122200200020036104051603100 0 |
| 10742: | 000000000000000000000000000000000 0 | 000222122200200020036054051603100 0 |
| 10744: | 000000000000000000000000000000000 0 | 000000026100000020000003200000220 0 |
| 10746: | 000000000000000000000000000000000 0 | 000222122200200020036060051603100 0 |
| 10750: | 000000000000000000000000000000000 0 | 000222122200200020036240051603100 0 |
| 10752: | 000000000000000000000000000000000 0 | 000222122200200020036250051603100 0 |
| 10754: | 002355522001653020037574637764210 2 | 002667132001756020037704637764210 3 |
| 10756: | 020155322000000020536000637761200 0 | 006667132001717012237700637760240 6 |
| 10760: | 002174462015200000037700637020304 6 | 000000000000000000000000000000000 0 |
| 10762: | 006667132001717012237700637770240 6 | 114020062014200000043700637032037 7 |
| 10764: | 000000000000000000000000000000000 0 | 000002562300200020001700300033100 0 |
| 10766: | 002667132001756020037704637764210 3 | 004324362014046020236000600566137 6 |
| 10770: | 000000000000000000000000000000000 0 | 000657623200200020036300040263100 0 |
| 10772: | 000150722001200020537575637764303 4 | 230461122000000020036000050161200 3 |
| 10774: | 004201362000400021236000052200201 2 | 002231762001200003045731637760240 6 |
| 10776: | 000000025000200003037727050003100 0 | 000000000000000000000000000000000 0 |
| 11000: | 002231762001200003045731637760240 5 | 000000025000200003037727050003100 0 |
| 11002: | 002231762001200003045731637760240 6 | 000000025000200003037727050093100 0 |
| 11004: | 002231762001200003045731637760240 5 | 000020025000200003037727050003100 3 |
| 11006: | 002231762001200003045731637760240 5 | 000000025000200003037727050303100 0 |
| 11010: | 002231762001200003045731637760240 6 | 000000025000200003037727050003100 0 |
| 11012: | 004137562001200020536205637762000 0 | 002347122001256020037700637764200 1 |

| | | |
|---|---|---|
| 11014: | 00066713200135702023600063776424453 | 21432672201404602004200060000021000 |
| 11016: | 00441055201000302023600063776610223 | 00000003201420072000773063776024461 |
| 11020: | 00441071201000302023600063776610223 | 00000000320003000200360000637763100 |
| 11022: | 00066713200135721003600063776024100 | 00013132200000000200440006377602410 |
| 11024: | 00066713200131702003600063776430234 | 00032036200165702000200063776024100 |
| 11026: | 00066713200131702003600063776430234 | 00032032200165702000200063776024100 |
| 11030: | 00020032200100002053640563776020000 | 00234252200165302003770063776020000 |
| 11032: | 00223176200100002000571105014310000 | 00016726100020000303772405000310000 |
| 11034: | 00223176200100002000571105014310000 | 00016732100020000303772405000310000 |
| 11036: | 00223176200100002000571105014310000 | 00016752100020000303772405000310000 |
| 11040: | 00223176200100002000571105014310000 | 00016756100020000303772405000310000 |
| 11042: | 00223176200100002000571105014310000 | 00016766100020000303772405000310000 |
| 11044: | 00223176200100002000571105014310000 | 00016772100020000303772405000310000 |
| 11046: | 00223176200100002000571105014310000 | 00016776100020000303772405000310000 |
| 11050: | 00223176200100002000571105014310000 | 00017006100020000303772405000310000 |
| 11052: | 00223176200100002000571105014310000 | 00017012100020000303772405000310000 |
| 11054: | 00223176200100002000571105014310000 | 00017016100020000303772405000310000 |
| 11056: | 00423176200000002003600104212220003 | 45031406200024400303770463776021005 |
| 11060: | 00001055220020002004370104000020000 | 00037146201420060703610440024021006 |
| 11062: | 00011666200000002053600163776024007 | 24013746200000002004400063776120000 |
| 11064: | 00020616200000002053600163776024055 | 00415212320040002003600020776203777 |
| 11066: | 00066713200010702003770063776310000 | 00011132200000002004400063776120000 |
| 11070: | 00066713200010702003770063776310000 | 00011136200000002004400063776120000 |
| 11072: | 00041215201000202003770063776310000 | 00021407200175702003770053776430003 |
| 11074: | 00034276200000002003600163776310000 | 00075752220020002000370006501531000 |
| 11076: | 00002432200000002003600163776310000 | 00402166201420002001600060722603777 |
| 11100: | 00002432200000002003600163776310000 | 00014256201420002003770040722024013 |
| 11102: | 00020716200000002003600163776310000 | 00427136200004702003600063776603777 |
| 11104: | 00002432200000002003600163776310000 | 00015616220020002002370063776310000 |
| 11106: | 00002432200000002003600163776310000 | 00015616200240002002370063776030006 |
| 11110: | 00002432200000002003600163776310000 | 00044532200000002003600063776310000 |
| 11112: | 00002432200000002003600163776310000 | 00044522200000002003600063776310000 |
| 11114: | 00002432200000002003600163776310000 | 00044542200000002003600063776310000 |
| 11116: | 00004235200000002003600163776310000 | 00603312200000007214200063602321000 |
| 11120: | 00074552200000002003600163776310000 | 00432776200046002323600241006020015 |
| 11122: | 00074552200000002003600163776310000 | 00000402620000000201360026101031000 |
| 11124: | 00005332200000002003600163776310000 | 00424106200056002003600063776200000 |
| 11126: | 00005332200000002003600163776310000 | 00424126200004702003600063776600000 |
| 11130: | 00005332200000002003600163776310000 | 00424106200065402003600063776200000 |
| 11132: | 00020116200000002003600163776310000 | 00024106200056002003770063776710000 |
| 11134: | 00020116200000002003600163776310000 | 00024126200004702003770063776310000 |
| 11136: | 00020116200000002003600163776310000 | 00024106200065402003770063776710000 |
| 11140: | 00427162210000002000000130003203776 | 00015716214000002000000003000332400 |
| 11142: | 00223176200120000203770163776310000 | 00000002600000000303500363776024006 |
| 11144: | 00015072200020002053757563776310000 | 23046122200000002003600005016120000 |
| 11146: | 00041125201400002003770460310310000 | 00000003200000002003600063776310000 |
| 11150: | 00404732200000002123600163776020011 | 00220655660015142100376576377603031 |
| 11152: | 00405767200111721023606463776210111 | 00014152200000002003600063776310000 |
| 11154: | 00405047200111721023606463776210111 | 00602472200120000003606463776610015 |
| 11156: | 00465773200111721023606463776210111 | 00014166200000002003600063776310000 |
| 11160: | 00405053200111721023606463776210111 | 00602512200120000003606463776610015 |
| 11162: | 00022212220020002003606005160310000 | 00022212220020002003607005160310000 |
| 11164: | 00006472200000002003600005142030006 | 00006476200000002003600005142030006 |
| 11166: | 00402352000000002063600063776310000 | 00411336200000002063600063776310000 |
| 11170: | 00017165200000002003600005142030005 | 00017112200000002003600005142030006 |
| 11172: | 00022212220020002003626405160310000 | 00000772220020002003605005160310000 |
| 11174: | 00030032200004702003600063776420031 | 00000002600000002003600363776310000 |
| 11176: | 00400002600000002013600363715200001 | 00400002600000002013600363714024006 |
| 11200: | 00400002601420062003605740370200001 | 00000000000000000000000000000000000 |
| 11202: | 00000002600220002003620704044020022 | 00074316200220002003620004044020022 |
| 11204: | 00000002600000002003600363776310000 | 00000000000000000000000000000000000 |
| 11206: | 00466536210000006700000030003213772 | 00002073200014002003600063776030005 |
| 11210: | 00002073200014002003600063776030005 | 00002073200014002003600063776030005 |
| 11212: | 00002073200014002003600063776030005 | 00002073200014002003600063776030005 |
| 11214: | 00002073200014002003600063776030005 | 04400002720200002033771767776120000 |
| 11216: | 04400002720200002033773367776120000 | 00022212220020002003642005160310000 |
| 11220: | 00012072201420002002575063704310000 | 00012072201420002002575063704310000 |
| 11222: | 00402426200000002023600063776310000 | 00415426200000002023600063777310000 |
| 11224: | 00000772220020002003605405160310000 | 00000002720020002000205763776310000 |
| 11226: | 00022212220020002003624405160310000 | 00027602230020000700170030003310000 |
| 11230: | 00421626200000002023600063776310000 | 00022212220020002003631405160310000 |
| 11232: | 00644132201100502003605405020613776 | 00021206200100002003605405020024100 |
| 11234: | 00021216200100002003605405020024100 | 00405747200111721023606463776210111 |
| 11236: | 00014172200000002003600063776310000 | 00000000000000000000000000000000000 |
| 11240: | 00000772220020002003606005160310000 | 00000772220020002003607005160310000 |
| 11242: | 00416136200000002000000030003210002 | 00041035201400002003600060360520000 |

| | | |
|---|---|---|
| 11244: | 0021555320017560200376206377630000 | 0000646620000000200360000514203006 |
| 11246: | 0000000000000000000000000000000000 | 0001707620000000200360000514203006 |
| 11250: | 0000000000000000000000000000000000 | 0066671320017170122377006377602406 |
| 11252: | 0021564620152000000377006370403046 | 0066671320017170122377006377702406 |
| 11254: | 1140017620142000000437006370520377 | 0004105120140000200360006036052000 |
| 11256: | 0021555320017560200376206377630000 | 0020207320013170200037006377603007 |
| 11260: | 0002143616000004201360006370402246 | 0020207320013170200037046377603007 |
| 11262: | 0002143616000004201360006370402246 | 0000207320001400200360006377603005 |
| 11264: | 0000000000000000000000000000000000 | 0060753220010000205377416377661020 |
| 11266: | 0060476620010000200377502204021020 | 0040000260142006200360574037020001 |
| 11270: | 0000000000000000000000000000000000 | 0040000260142006200360574037020001 |
| 11272: | 0000000000000000000000000000000000 | 0000000260000000200360036377631000 |
| 11274: | 0000000000000000000000000000000000 | 0040610620000000200360010504221376 |
| 11276: | 0002125220000000303600063776 02420 | 0003123220006600200360006377602415 |
| 11300: | 0040571720011172102360646377621011 | 0041420620006000010360006377621015 |
| 11302: | 0000000000000000000000000000000000 | 0006671320001400200360006377603005 |
| 11304: | 0000000000000000000000000000000000 | 0066671320017170122377006377620003 |
| 11306: | 0021564620152000000377006370403046 | 0056671320017170122377006377720003 |
| 11310: | 1140017620142000000437006370520377 | 0040575720011172102360646377621011 |
| 11312: | 0001421220000000200360006377631000 | 0004063220010000200360540502002410 |
| 11314: | 0040757720011172102360646377621011 | 0040053220006000010360006377621015 |
| 11316: | 0002317620012000020360016377631000 | 0000000260000000303600363776 02406 |
| 11320: | 0040610620000000200360010504221376 | 0002124620000000303600063776 02420 |
| 11322: | 0046653620000000212360016377603000 | 0004566620000004140700006063012000 |
| 11324: | 0002307220010000200360540502002410 | 0000000000000000000000000000000000 |
| 11326: | 0004411220010000200360540502002410 | 0000000000000000000000000000000000 |
| 11330: | 0064154220110650200020546377661376 | 0000000000000000000000000000000000 |
| 11332: | 5241555320001440205360006377621377 | 0041371620000000202360006377631000 |
| 11334: | 0000000000000000000000000000000000 | 0002221222002000200360500516031000 |
| 11336: | 0000000000000000000000000000000000 | 0002221222002000200362540516031000 |
| 11340: | 0000000000000000000000000000000000 | 0002221222002000200351040516031000 |
| 11342: | 0000000000000000000000000000000000 | 0002221222002000200350540516031000 |
| 11344: | 0000000000000000000000000000000000 | 0000000261000000200000032000002200 |
| 11346: | 0000000000000000000000000000000000 | 0002221222002000200360600516031000 |
| 11350: | 0000000000000000000000000000000000 | 0002221222002000200362400516031000 |
| 11352: | 0000000000000000000000000000000000 | 0002221222002000200352500516031000 |
| 11354: | 0000716632000000200360000511003034 | 0046653620000000212360016377603001 |
| 11356: | 0000000260000004140720036063212000 | 0066671320017170122377006377602406 |
| 11360: | 0021564620152000000377066370403046 | 0000000000000000000000000000000000 |
| 11362: | 0066671320017170122377006377702406 | 1140017620142000000437006370520377 |
| 11364: | 0000000000000000000000000000000000 | 0004037220010000200360540502002410 |
| 11366: | 0000423620000000200360010523232200 | 0000201221000000200000003000302205 |
| 11370: | 0000000000000000000000000000000000 | 0001552620000000200350010403002201 |
| 11372: | 0024376220150000200376444052002012 | 0000000000000000000000000000000000 |
| 11374: | 0007776220000000200360006377631000 | 0063365533012000200000013000360000 |
| 11376: | 0002306620010000200360540502002410 | 0000000000000000000000000000000000 |
| 11400: | 0063365633012000200000013000360000 | 0002117620010000200360540502002410 |
| 11402: | 0063366633012000200000013000360000 | 0003337620012572100440006377602410 |
| 11404: | 0063365533012000200000013000360000 | 0002121220010000200360540502002410 |
| 11406: | 0063366533012000200000013000360000 | 0003566620012572100440006377602410 |
| 11410: | 0060130720015142100361000523621376 | 0040325632002000207375006777631000 |
| 11412: | 0060130720015142100361000523621376 | 0041457632002000207375206777631000 |
| 11414: | 0022317620012000020377056377631000 | 0061277620012000030377046377720000 |
| 11416: | 0022317620012000020377056377631000 | 0000000260000000303500363776 02406 |
| 11420: | 0022317620012000020377056377631000 | 0000000260000000303600363776 02406 |
| 11422: | 0001166620002000205377056377631000 | 2301065220000000200420000501412000 |
| 11424: | 0001166620002000205377056377631000 | 2301055620000000200420003501412000 |
| 11426: | 0002754720017560200377045377643033 | 0063003620016530200377006377620377 |
| 11430: | 1704167520102215400360000501452000 | 0020000320154320605377006377632200 |
| 11432: | 1704171120102215400360000501452000 | 0020000320154320605377006377632200 |
| 11434: | 1042041720000000110540006377620377 | 0044222220142006200157306007660000 |
| 11436: | 0004141520000001600420006377602430 | 0000000310204002600360002000432200 |
| 11440: | 0542011220000000205500016377620000 | 0041554620102330200020004377660017 |
| 11442: | 0044172520140000200360006014661376 | 0040000320102050200140000502061376 |
| 11444: | 0044116120140000200360006014661376 | 0040000320102050200140000502061376 |
| 11446: | 0022071620012000200360510507242434 | 0900125632142370600377242001431000 |
| 11450: | 0022071620012000200360510507242434 | 0000127232142370600377242002631000 |
| 11452: | 0022071620012000200360510507242434 | 0040126632142370600377244377620006 |
| 11454: | 0022071620012000200360510507242434 | 0040127632142370600377244377620013 |
| 11456: | 0006671320011172100360006377602410 | 0000156620012000200522400501431000 |
| 11460: | 0005671320011172100360006377602410 | 0000157220012000200522400501431000 |
| 11462: | 0000000000000000000000000000000000 | 0000000000000000000000000000000000 |
| 11464: | 0000000000000000000000000000000000 | 0000000000000000000000000000000000 |
| 11466: | 0000000000000000000000000000000000 | 0000000000000000000000000000000000 |
| 11470: | 0000000000000000000000000000000000 | 0000000000000000000000000000000000 |

| | | |
|---|---|---|
| 11472: | 0000000000000000000000000000000000 | 0000000000000000000000000000000000 |
| 11474: | 0000000000000000000000000000000000 | 0000000000000000000000000000000000 |
| 11476: | 0000000000000000000000000000000000 | 0000000000000000000000000000000000 |
| 11500: | 0000000000000000000000000000000000 | 0000000000000000000000000000000000 |
| 11502: | 0000000000000000000000000000000000 | 0000000000000000000000000000000000 |
| 11504: | 0000000000000000000000000000000000 | 0000000000000000000000000000000000 |
| 11506: | 0000000000000000000000000000000000 | 0000000000000000000000000000000000 |
| 11510: | 0000000000000000000000000000000000 | 0000000000000000000000000000000000 |
| 11512: | 0000000000000000000000000000000000 | 0000000000000000000000000000000000 |
| 11514: | 0000000000000000000000000000000000 | 0000000000000000000000000000000000 |
| 11516: | 0000000000000000000000000000000000 | 0000000000000000000000000000000000 |
| 11520: | 0000000000000000000000000000000000 | 0000000000000000000000000000000000 |
| 11522: | 0000000000000000000000000000000000 | 0000000000000000000000000000000000 |
| 11524: | 0000000000000000000000000000000000 | 0000000000000000000000000000000000 |
| 11526: | 0000000000000000000000000000000000 | 0000000000000000000000000000000000 |
| 11530: | 0000000000000000000000000000000000 | 0000000000000000000000000000000000 |
| 11532: | 0000000000000000000000000000000000 | 0000000000000000000000000000000000 |
| 11534: | 0000000000000000000000000000000000 | 0000000000000000000000000000000000 |
| 11536: | 0000000000000000000000000000000000 | 0000000000000000000000000000000000 |
| 11540: | 0000000000000000000000000000000000 | 0000000000000000000000000000000000 |
| 11542: | 0000000000000000000000000000000000 | 0000000000000000000000000000000000 |
| 11544: | 0000000000000000000000000000000000 | 0000000000000000000000000000000000 |
| 11546: | 0000000000000000000000000000000000 | 0000000000000000000000000000000000 |
| 11550: | 0000000000000000000000000000000000 | 0000000000000000000000000000000000 |
| 11552: | 0000000000000000000000000000000000 | 0000000000000000000000000000000000 |
| 11554: | 0000000000000000000000000000000000 | 0000000000000000000000000000000000 |
| 11556: | 0000000000000000000000000000000000 | 0000000000000000000000000000000000 |
| 11560: | 0000000000000000000000000000000000 | 0000000000000000000000000000000000 |
| 11562: | 0023405220150540200361356015442106 | 0023405220150540200361356015442106 |
| 11564: | 0000002600000000200360035377631000 | 0000002600000000200360036377631000 |
| 11566: | 0000000000000000000000000000000000 | 0000000000000000000000000000000000 |
| 11570: | 0000002600000000200360036377631000 | 0000002600000000200360036377631000 |
| 11572: | 0023405220150540200361356015442106 | 0023405220150540200361356015442106 |
| 11574: | 0001307220000004140740006063402027 | 0000002600000000200360036377631000 |
| 11576: | 0000002600000000200360036377731000 | 0000002600000000200360036377631000 |
| 11600: | 0040000260142006200360634037020001 | 0000000000000000000000000000000000 |
| 11602: | 0000000260022000200362070404402022 | 0007431620022000200352000404402022 |
| 11604: | 0000207320001400200360006377603005 | 0000000000000000000000000000000000 |
| 11606: | 0040000261000000200000033000321372 | 0000207320001400200360006377603005 |
| 11610: | 0000207320001400200360006377603005 | 0000207320001400200360006377603005 |
| 11612: | 0000207320001400200360006377603005 | 0000207320001400200360006377603005 |
| 11614: | 0000207320001400200360006377603005 | 0000000000000000000000000000000000 |
| 11616: | 0000000000000000000000000000000000 | 0023405220150540200361356015442106 |
| 11620: | 0001207220142000200257506370431000 | 0001207220142000200257506370431000 |
| 11622: | 0041544520000000202360006377631000 | 0040507620000000202350006377731000 |
| 11624: | 0023405220150540200361356015442106 | 0000000272002000200020636377631000 |
| 11626: | 0023405220150540200361356015442106 | 0001340623002000200017003000331000 |
| 11630: | 0006571320001400200360006377603005 | 0023405220150540200361356015442106 |
| 11632: | 0001713620006000200360000501402406 | 0004600223002000200000503000331000 |
| 11634: | 0004602223002000200017003000331000 | 0000000000000000000000000000000000 |
| 11636: | 0000000000000000000000000000000000 | 0000000000000000000000000000000000 |
| 11640: | 0023405220150540200361356015442106 | 0023405220150540200351356015442106 |
| 11642: | 0041614620000000200000003000321002 | 0004104120140000200360006036052000 |
| 11644: | 0021555320017550200376206377630000 | 0000002600000000200360035377631000 |
| 11646: | 0000000000000000000000000000000000 | 0000002600000000200360036377631000 |
| 11650: | 0000000000000000000000000000000000 | 0066571320017170122377006377602406 |
| 11652: | 0021303620152000000377006370603046 | 0066571320017170122377006377702406 |
| 11654: | 1142044620142000000437006370720377 | 0000000000000000000000000000000000 |
| 11656: | 0000000000000000000000000000000000 | 0020207320013170200037006377603007 |
| 11660: | 0002143516000004201360006370402246 | 0020207320013170200037046377603007 |
| 11662: | 0002143616000004201360006370402246 | 0000207320001400200360006377603005 |
| 11664: | 0000000000000000000000000000000000 | 0060752620010000205377416377661020 |
| 11666: | 0060476620010000200377502204021020 | 0040000260142006200360634037020001 |
| 11670: | 0000000000000000000000000000000000 | 0040000260142006200360634037020001 |
| 11672: | 0000000000000000000000000000000000 | 0000002600000000200360035377631000 |
| 11674: | 0000000000000000000000000000000000 | 5344550220000000201360006370421375 |
| 11676: | 0000000000000000000000000000000000 | 0003121220006600200360006377602415 |
| 11700: | 0000000000000000000000000000000000 | 0000000000000000000000000000000000 |
| 11702: | 0000000000000000000000000000000000 | 0006671320001400200350006377603005 |
| 11704: | 0000000000000000000000000000000000 | 0066571320017170122377006377620003 |
| 11706: | 0021303620152000000377006370603046 | 0066571320017170122377006377720003 |
| 11710: | 1142044620142000030437006370720377 | 0000000000000000000000000000000000 |
| 11712: | 0000000000000000000000000000000000 | 0000044623002000200000003000331000 |
| 11714: | 0000000000000000000000000000000000 | 0000000000000000000000000000000000 |
| 11716: | 0000000000000000000000000000000000 | 0000000000000000000000000000000000 |
| 11720: | 0000000000000000000000000000000000 | 0000000000000000000000000000000000 |

| | | |
|---|---|---|
| 11722: | 0000000000000000000000000000000000 | 0000000000000000000000000000000000 |
| 11724: | 0004576623002000200000003000331000 | 0000000000000000000000000000000000 |
| 11726: | 0000025223002000200000503000331000 | 0000000000000000000000000000000000 |
| 11730: | 00033555200965540200360006377671000 | 0000000000000000000000000000000000 |
| 11732: | 5241555320001440205360006377621377 | 0041373220000000202360006377631000 |
| 11734: | 0000000000000000000000000000000000 | 0023405220150540200361356015442106 |
| 11736: | 0000000000000000000000000000000000 | 0023405220150540200361356015442106 |
| 11740: | 0000000000000000000000000000000000 | 0023405220150540200361356015442106 |
| 11742: | 0000000000000000000000000000000000 | 0023405220150540200361356015442106 |
| 11744: | 0000000000000000000000000000000000 | 0023405220150540200361356015442106 |
| 11746: | 0000000000000000000000000000000000 | 0023405220150540200361356015442106 |
| 11750: | 0000000000000000000000000000000000 | 0023405220150540200361356015442106 |
| 11752: | 0000000000000000000000000000000000 | 0023405220150540200361356015442106 |
| 11754: | 0004020232000000200360010511003041 | 0001172620012000205360706377631000 |
| 11756: | 0000000000000000000000000000000000 | 0066671320017170122377006377602406 |
| 11760: | 0021303620152000000377006370603046 | 0000000000000000000000000000000000 |
| 11762: | 0066671320017170122377006377702406 | 1142044620142000000437006370720377 |
| 11764: | 0000000000000000000000000000000000 | 0000025223002000200017003000331000 |
| 11766: | 0000000000000000000000000000000000 | 0000000000000000000000000000000000 |
| 11770: | 0000000000000000000000000000000000 | 0004464232002000200360550402631000 |
| 11772: | 0003625620140460200376546007631000 | 0000000000000000000000000000000000 |
| 11774: | 0004464220000000200360016377631000 | 0002065720141460200376546004231000 |
| 11776: | 0024376220150000200376444052002012 | 0000000000000000000000000000000000 |
| 12000: | 0000000000000000000000000000000000 | 0000000000000000000000000000000000 |
| 12002: | 0000000000000000000000000000000000 | 0000000000000000000000000000000000 |
| 12004: | 0000000000000000000000000000000000 | 0000000000000000000000000000000000 |
| 12006: | 0000000000000000000000000000000000 | 0000000000000000000000000000000000 |
| 12010: | 0000000000000000000000000000000000 | 0000000000000000000000000000000000 |
| 12012: | 0000000000000630000000000000000000 | 0000000000000000000000000000000000 |
| 12014: | 0000000000000000000000000000000000 | 0000000000000000000000000000000000 |
| 12016: | 0000000000000000000000000000000000 | 0000000000000000000000000000000000 |
| 12020: | 0000000000000000000000000000000000 | 0000000000000000000000000000000000 |
| 12022: | 0000000000000000000000000000000000 | 0000000000000000000000000000000000 |
| 12024: | 0000000000000000000000000000000000 | 0000000000000000000000000000000000 |
| 12026: | 0000000000000000000000000000000000 | 0000000000000000000000000000000000 |
| 12030: | 0000000000000000000000000000000000 | 0000000000000000000000000000000000 |
| 12032: | 0000000000000000000000000000000000 | 0000000000000000000000000000000000 |
| 12034: | 0000000000000000000000000000000000 | 0000000000000000000000000000000000 |
| 12036: | 0000000000000000000000000000000000 | 0000000000000000000000000000000000 |
| 12040: | 0000000000000000000000000000000000 | 0000000000000000000000000000000000 |
| 12042: | 0000000000000000000000000000000000 | 0000000000000000000000000000000000 |
| 12044: | 0000000000000000000000000000000000 | 0000000000000000000000000000000000 |
| 12046: | 0000000000000000000000000000000000 | 0000000000000000000000000000000000 |
| 12050: | 0000000000000000000000000000000000 | 0000000000000000000000000000000000 |
| 12052: | 0000000000000000000000000000000000 | 0000000000000000000000000000000000 |
| 12054: | 0000000000000000000000000000000000 | 0000000000000000000000000000000000 |
| 12056: | 0000000000000000000000000000000000 | 0000000000000000000000000000000000 |
| 12060: | 0000000000000000000000000000000000 | 0000000000000000000000000000000000 |
| 12062: | 0000000000000000000000000000000000 | 0000000000000000000000000000000000 |
| 12064: | 0000000000000000000000000000000000 | 0000000000000000000000000000000000 |
| 12066: | 0000000000000000000000000000000000 | 0000000000000000000000000000000000 |
| 12070: | 0000000000000000000000000000000000 | 0000000000000000000000000000000000 |
| 12072: | 0000000000000000000000000000000000 | 0000000000000000000000000000000000 |
| 12074: | 0000000000000000000000000000000000 | 0000000000000000000000000000000000 |
| 12076: | 0000000000000000000000000000000000 | 0000000000000000000000000000000000 |
| 12100: | 0000000000000000000000000000000000 | 0000000000000000000000000000000000 |
| 12102: | 0000000000000000000000000000000000 | 0000000000000000000000000000000000 |
| 12104: | 0000000000000000000000000000000000 | 0000000000000000000000000000000000 |
| 12106: | 0000000000000000000000000000000000 | 0000000000000000000000000000000000 |
| 12110: | 0000000000000000000000000000000000 | 0000000000000000000000000000000000 |
| 12112: | 0000000000000000000000000000000000 | 0000000000000000000000000000000000 |
| 12114: | 0000000000000000000000000000000000 | 0000000000000000000000000000000000 |
| 12116: | 0000000000000000000000000000000000 | 0000000000000000000000000000000000 |
| 12120: | 0000000000000000000000000000000000 | 0000000000000000000000000000000000 |
| 12122: | 0000000000000000000000000000000000 | 0000000000000000000000000000000000 |
| 12124: | 0000000000000000000000000000000000 | 0000000000000000000000000000000000 |
| 12126: | 0000000000000000000000000000000000 | 0000000000000000000000000000000000 |
| 12130: | 0000000000000000000000000000000000 | 0000000000000000000000000000000000 |
| 12132: | 0000000000000000000000000000000000 | 0000000000000000000000000000000000 |
| 12134: | 0000000000000000000000000000000000 | 0000000000000000000000000000000000 |
| 12136: | 0000000000000000000000000000000000 | 0000000000000000000000000000000000 |
| 12140: | 0000000000000000000000000000000000 | 0000000000000000000000000000000000 |
| 12142: | 0000000000000000000000000000000000 | 0000000000000000000000000000000000 |
| 12144: | 0000000000000000000000000000000000 | 0000000000000000000000000000000000 |
| 12146: | 0000000000000000000000000000000000 | 0000000000000000000000000000000000 |
| 12150: | 0000000000000000000000000000000000 | 0000000000000000000000000000000000 |

| | | |
|---|---|---|
| 12152: | 0000000000000000000000000000000000 | 0000000000000000000000000000000000 |
| 12154: | 0000000000000000000000000000000000 | 0000000000000000000000000000000000 |
| 12156: | 0000000000000000000000000000000000 | 0000000000000000000000000000000000 |
| 12160: | 0000000000000000000000000000000000 | 0000000000000000000000000000000000 |
| 12162: | 0000227222002000200360600516031000 | 0000227222002000200360700516031000 |
| 12164: | 0002111620000000200360000514203006 | 0002112620000000200350000514203006 |
| 12166: | 0000351620000000200360006377631000 | 0003151562000000200360006377631000 |
| 12170: | 0002111620000000200360000514203006 | 0002112620000000200360000514203006 |
| 12172: | 0000227222002000200362640516031000 | 0006671320001400200360006377603005 |
| 12174: | 0007776220000300200360006377631000 | 0000000260000000200360036377631000 |
| 12176: | 0000000000000000000000000000000000 | 0000000000000000000000600000000000 |
| 12200: | 0040000260142006200360734037020001 | 0000000000000000000000000000000000 |
| 12202: | 0000000260022000200362070404402022 | 0007431620022000200362000404402022 |
| 12204: | 0000000260000000200360036377631000 | 0000000000000000000000000000000000 |
| 12206: | 0046653621000000670000003000321372 | 0041647621000000670000003000321371 |
| 12210: | 0000207320001400200360006377603005 | 0000207320001400200360006377603005 |
| 12212: | 0000207320001400200360006377603005 | 0000207320001400200360006377603005 |
| 12214: | 0000207320001400200360006377603005 | 0400227620000000200360000501612000 |
| 12216: | 0440000272016002103377336777652000 | 0000227222002000200364200516031000 |
| 12220: | 0000406620042001200257506377631000 | 0000406620042001200257506377631000 |
| 12222: | 0040512620000000202360006377631000 | 0042005220000000202360006377731000 |
| 12224: | 0060346633012000200000502000050000 | 0000000272002000200020736377631000 |
| 12226: | 0000227222002000200362440516031000 | 0000000000000000000000000000000000 |
| 12230: | 0000000000000000000000000000000000 | 0000227222002000200363140516031000 |
| 12232: | 0000000000000000000000000000000000 | 0000000000000000000000000000000000 |
| 12234: | 0000000000000000000000000000000000 | 0000000000000000000000000000000000 |
| 12236: | 0000000000000000000000000000000000 | 0000000000000000000000000000000000 |
| 12240: | 0006671320001400200360006377603005 | 0006671320001400200360006377603005 |
| 12242: | 0041033620000000200000003000321002 | 0004104520140000200360006036052000 |
| 12244: | 0021555320017560200376206377630000 | 0004226220000000200360000514203006 |
| 12246: | 0000000000000000000000000000000000 | 0004226220000000200360000514203006 |
| 12250: | 0000000000000000000000000000000000 | 0066671320017170122377006377602406 |
| 12252: | 0020421620152000000377006371003046 | 0066671320017170122377006377702406 |
| 12254: | 1141205520142000000437006371120377 | 0000000000000000000000000000000000 |
| 12256: | 0000000000000000000000000000000000 | 0020207320013170200037006377603034 |
| 12260: | 0002143616000004201360006370402246 | 0020207320013170200037046377603034 |
| 12262: | 0002143616000004201360006370402246 | 0000207320001400200360006377603005 |
| 12264: | 0000000000000000000000000000000000 | 0060751620010000205377416377661020 |
| 12266: | 0060476620010000200377502204021020 | 0040000260142006200360734037020001 |
| 12270: | 0000000000000000000000000000000000 | 0040000260142006200360734037020001 |
| 12272: | 0000000000000000000000000000000000 | 0000000260000000200360036377631000 |
| 12274: | 0000000000000000000000000000000000 | 0000000000000000000000000000000000 |
| 12276: | 0000000000000000000000000000000000 | 0004101520100030200377506377631000 |
| 12300: | 0000000320000000200360006377631000 | 0000000000000000000000000000000000 |
| 12302: | 0000000000000000000000000000000000 | 0006671320001400200360006377603005 |
| 12304: | 0000000000000000000000000000000000 | 0066671320017170122377006377620003 |
| 12306: | 0020421620152000000377006371003046 | 0066671320017170122377006377720003 |
| 12310: | 1141205620142000000437006371120377 | 0000000000000000000000000000000000 |
| 12312: | 0000000000000000000000000000000000 | 0000000000000000000000000000000000 |
| 12314: | 0000000000000000000000000000000000 | 0000000000000000000000000000000000 |
| 12316: | 0000000000000000000000000000000000 | 0000000000000000000000000000000000 |
| 12320: | 0000000000000000000000000000000000 | 0000000000000000000000000000000000 |
| 12322: | 0000000000000000000000000000000000 | 0000000000000000000000000000000000 |
| 12324: | 0000000000000000000000000000000000 | 0000000000000000000000000000000000 |
| 12326: | 0000000000000000000000000000000000 | 0000000000000000000000000000000000 |
| 12330: | 0000000000000000000000000000000000 | 0000000000000000000000000000000000 |
| 12332: | 0000000000000000000000000000000000 | 0000000000000000000000000000000000 |
| 12334: | 0000000000000000000000000000000000 | 0000227222002000200360500516031000 |
| 12336: | 0000000000000000000000000000000000 | 0000227222002000200362540516031000 |
| 12340: | 0000000000000000000000000000000000 | 0000227222002000200361040516031000 |
| 12342: | 0000000000000000000000000000000000 | 0000227222002000200360540516031000 |
| 12344: | 0000000000000000000000000000000000 | 0000000000000000000000000000000000 |
| 12346: | 0000000000000000000000000000000000 | 0000227222002000200360600516031000 |
| 12350: | 0000000000000000000000000000000000 | 0000227222002000200362400516031000 |
| 12352: | 0000000000000000000000000000000000 | 0000227222002000200362500516031000 |
| 12354: | 0041137620000000040360016377620377 | 0043425620000000200400010400020000 |
| 12356: | 0044405221010000200002042000020000 | 0066671320017170122377006377602406 |
| 12360: | 0020421620152000000377006371003046 | 0000000000000000000000000000000000 |
| 12362: | 0066671320017170122377006377702406 | 1141205620142000000437006371120377 |
| 12364: | 0000000000000000000000000000000000 | 0000000000000000000000000000000000 |
| 12366: | 0000000000000000000000000000000000 | 0000000000000000000000000000000000 |
| 12370: | 0000000000000000000000000000000000 | 0004376222002000200376500402431000 |
| 12372: | 0000000000000000000000000000000000 | 0000000000000000000000000000000000 |
| 12374: | 0004464220000000200360016377631000 | 0024376220150000200376444052002012 |
| 12376: | 0000000000000000000000000000000000 | 0000000000000000000000000000000000 |

| | | |
|---|---|---|
| 12400: | 0000000000000000000000000000000000 | 0000000000000000000000000000000000 |
| 12402: | 0000000000000000000000000000000000 | 0000000000000000000000000000000000 |
| 12404: | 0000000000000000000000000000000000 | 0000000000000000000000000000000000 |
| 12406: | 0000000000000000000000000000000000 | 0000000000000000000000000000000000 |
| 12410: | 0000000000000000000000000000000000 | 0000000000000000000000000000000000 |
| 12412: | 0000000000000000000000000000000000 | 0000000000000000000000000000000000 |
| 12414: | 0000000000000000000000000000000000 | 0000000000000000000000000000000000 |
| 12416: | 0000000000000000000000000000000000 | 0000000000000000000000000000000000 |
| 12420: | 0000000000000000000000000000000000 | 0000000000000000000000000000000000 |
| 12422: | 0000000000000000000000000000000000 | 0000000000000000000000000000000000 |
| 12424: | 0000000000000000000000000000000000 | 0000000000000000000000000000000000 |
| 12426: | 0000000000000000000000000000000000 | 0000000000000000000000000000000000 |
| 12430: | 0000000000000000000000000000000000 | 0000000000000000000000000000000000 |
| 12432: | 0000000000000000000000000000000000 | 0000000000000000000000000000000000 |
| 12434: | 0000000000000000000000000000000000 | 0000000000000000000000000000000000 |
| 12436: | 0000000000000000000000000000000000 | 0000000000000000000000000000000000 |
| 12440: | 0000000000000000000000000000000000 | 0000000000000000000000000000000000 |
| 12442: | 0000000000000000000000000000000000 | 0000000000000000000000000000000000 |
| 12444: | 0000000000000000000000000000000000 | 0000000000000000000000000000000000 |
| 12446: | 0000000000000000000000000000000000 | 0000000000000000000000000000000000 |
| 12450: | 0000000000000000000000000000000000 | 0000000000000000000000000000000000 |
| 12452: | 0000000000000000000000000000000000 | 0000000000000000000000000000000000 |
| 12454: | 0000000000000000000000000000000000 | 0000000000000000000000000000000000 |
| 12456: | 0000000000000000000000000000000000 | 0000000000000000000000000000000000 |
| 12460: | 0000000000000000000000000000000000 | 0000000000000000000000000000000000 |
| 12462: | 0000000000000000000000000000000000 | 0000000000000000000000000000000000 |
| 12464: | 0000000000000000000000000000000000 | 0000000000000000000000000000000000 |
| 12466: | 0000000000000000000000000000000000 | 0000000000000000000000000000000000 |
| 12470: | 0000000000000000000000000000000000 | 0000000000000000000000000000000000 |
| 12472: | 0000000000000000000000000000000000 | 0000000000000000000000000000000000 |
| 12474: | 0000000000000000000000000000000000 | 0000000000000000000000000000000000 |
| 12476: | 0000000000000000000000000000000000 | 0000000000000000000000000000000000 |
| 12500: | 0000000000000000000000000000000000 | 0000000000000000000000000000000000 |
| 12502: | 0000000000000000000000000000000000 | 0000000000000000000000000000000000 |
| 12504: | 0000000000000000000000000000000000 | 0000000000000000000000000000000000 |
| 12506: | 0000000000000000000000000000000000 | 0000000000000000000000000000000000 |
| 12510: | 0000000000000000000000000000000000 | 0000000000000000000000000000000000 |
| 12512: | 0000000000000000000000000000000000 | 0000000000000000000000000000000000 |
| 12514: | 0000000000000000000000000000000000 | 0000000000000000000000000000000000 |
| 12516: | 0000000000000000000000000000000000 | 0000000000000000000000000000000000 |
| 12520: | 0000000000000000000000000000000000 | 0000000000000000000000000000000000 |
| 12522: | 0000000000000000000000000000000000 | 0000000000000000000000000000000000 |
| 12524: | 0000000000000000000000000000000000 | 0000000000000000000000000000000000 |
| 12526: | 0000000000000000000000000000000000 | 0000000000000000000000000000000000 |
| 12530: | 0000000000000000000000000000000000 | 0000000000000000000000000000000000 |
| 12532: | 0000000000000000000000000000000000 | 0000000000000000000000000000000000 |
| 12534: | 0000000000000000000000000000000000 | 0000000000000000000000000000000000 |
| 12536: | 0000000000000000000000000000000000 | 0000000000000000000000000000000000 |
| 12540: | 0000000000000000000000000000000000 | 0000000000000000000000000000000000 |
| 12542: | 0000000000000000000000000000000000 | 0000000000000000000000000000000000 |
| 12544: | 0000000000000000000000000000000000 | 0000000000000000000000000000000000 |
| 12546: | 0000000000000000000000000000000000 | 0000000000000000000000000000000000 |
| 12550: | 0000000000000000000000000000000000 | 0000000000000000000000000000000000 |
| 12552: | 0000000000000000000000000000000000 | 0000000000000000000000000000000000 |
| 12554: | 0000000000000000000000000000000000 | 0000000000000000000000000000000000 |
| 12556: | 0000000000000000000000000000000000 | 0000000000000000000000000000000000 |
| 12560: | 0000000000000000000000000000000000 | 0000000000000000000000000000000000 |
| 12562: | 0006671320001400200360006377603005 | 0006671320001400200360006377603005 |
| 12564: | 0043327220006540200420006377621021 | 0043333220006540200420006377621021 |
| 12566: | 0000000000000000000000000000000000 | 0000000000000000000000000000000000 |
| 12570: | 0043327220006540200420006377621021 | 0043333220006540200420006377621021 |
| 12572: | 0006671320001400200360006377603005 | 0006671320001400200360006377603005 |
| 12574: | 0007776220000000200360006377631000 | 0000000260000000200360036377631000 |
| 12576: | 0000000000000000000000000000000000 | 0000000000000000000000000000000000 |
| 12600: | 0040000260142006200362574037020001 | 0000000000000000000000000000000000 |
| 12602: | 0000656620010000200257506377643004 | 0000557220010000200257506377643004 |
| 12604: | 0000207320001400200360006377603005 | 0000000000000000000000000000000000 |
| 12606: | 0040000261000000200000033000321372 | 0047151621000000670000003000321371 |
| 12610: | 0000207320001400200360006377603005 | 0000207320001400200360006377603005 |
| 12612: | 0000207320001400200360006377603005 | 0000207320001400200360006377603005 |
| 12614: | 0000207320001400200360006377603005 | 0000000000000000000000000000000000 |
| 12616: | 0000000000000000000000000000000000 | 0006671320001400200360006377603005 |
| 12620: | 0000406620042001200257506377631000 | 0000406620042001200257506377631000 |
| 12622: | 0042157220000000202360006377631000 | 0042327220000000202360006377731000 |
| 12624: | 0060346633012000200000502000060000 | 0000000272002000200022576377631000 |
| 12626: | 0006671320001400200360006377603005 | 0000000000000000000000000000000000 |

| | | |
|---|---|---|
| 12630: | 0000000000000000000000000000000000 | 0006671320001400200360006377603005 |
| 12632: | 0000000000000000000000000000000000 | 0000000000000000000000000000000000 |
| 12634: | 0000000000000000000000000000000000 | 0000000000000000000000000000000000 |
| 12636: | 0000000000000000000000000000000000 | 0000000000000000000000000000000000 |
| 12640: | 0006571320001400200360006377603005 | 0005671320001400200360006377603005 |
| 12642: | 0040000260000000200000033000321002 | 0000000000000000000000000000000000 |
| 12644: | 0000000000000000000000000000000000 | 0060241220010000200377450501461015 |
| 12646: | 0060625620010000200377440501461021 | 0060241220010000200377450501461015 |
| 12650: | 0060625620010000200377440501461021 | 0066671320017170122377006377602406 |
| 12652: | 0002311620000000200360006377631000 | 0066671320017170122377006377702406 |
| 12654: | 0041717620000000200420006377720377 | 0000000000000000000000000000000000 |
| 12656: | 0000000000000000000000000000000000 | 0020207320013170200037006377603034 |
| 12660: | 0002143516000004201360006370402246 | 0020207320013170200037046377603034 |
| 12662: | 0002143516000004201360006370402246 | 0000207320001400200360006377603005 |
| 12664: | 0000000000000000000000000000000000 | 0060751220010000205377416377661020 |
| 12666: | 0060476620010000200377502204021020 | 0040000260142006200362574037020001 |
| 12670: | 0000000000000000000000000000000000 | 0040000260142006200362574037020001 |
| 12672: | 0000000000000000000000000000000000 | 0000000260000000200360036377631000 |
| 12674: | 0000000000000000000000000000000000 | 0000000000000000000000000000000000 |
| 12676: | 0000000000000000000000000000000000 | 0023070520150540200377506020003006 |
| 12700: | 0000000000000000000000000000000000 | 0000000000000000000000000000000000 |
| 12702: | 0000000000000000000000000000000000 | 0006671320001400200360006377603005 |
| 12704: | 0000000000000000000000000000000000 | 0066671320017170122377006377620003 |
| 12706: | 0002311620000000200360006377631000 | 0066671320017170122377006377720003 |
| 12710: | 0041720620000000200420006377720377 | 0000000000000000000000000000000000 |
| 12712: | 0000000000000000000000000000000000 | 0000000000000000000000000000000000 |
| 12714: | 0000000000000000000000000000000000 | 0000000000000000000000000000000000 |
| 12716: | 0000000000000000000000000000000000 | 0000000000000000000000000000000000 |
| 12720: | 0000000000000000000000000000000000 | 0000000000000000000000000000000000 |
| 12722: | 0000000000000000000000000000000000 | 0000000000000000000000000000000000 |
| 12724: | 0000000000000000000000000000000000 | 0000000000000000000000000000000000 |
| 12726: | 0000000000000000000000000000000000 | 0000000000000000000000000000000000 |
| 12730: | 0000000000000000000000000000000000 | 0000000000000000000000000000000000 |
| 12732: | 0000000000000000000000000000000000 | 0000000000000000000000000000000000 |
| 12734: | 0000000000000000000000000000000000 | 0060345233010000200017002077720377 |
| 12736: | 0000000000000000000000000000000000 | 0006671320001400200360006377603005 |
| 12740: | 0000000000000000000000000000000000 | 0006671320001400200360006377603005 |
| 12742: | 0000000000000000000000000000000000 | 0006671320001400200360006377603005 |
| 12744: | 0000000000000000000000000000000000 | 0000000000000000000000000000000000 |
| 12746: | 0000000000000000000000000000000000 | 0006671320001400200360006377603005 |
| 12750: | 0000000000000000000000000000000000 | 0006671320001400200360006377603005 |
| 12752: | 0000000000000000000000000000000000 | 0006671320001400200360006377603005 |
| 12754: | 0023411220016560200375746377642104 | 0000000000000000000000000000000000 |
| 12756: | 0000000000000000000000000000000000 | 0066671320017170122377006377602406 |
| 12760: | 0002311620000000200360006377631000 | 0000000000000000000000000000000000 |
| 12762: | 0065671320017170122377006377702406 | 0041717220000000200420006377720377 |
| 12764: | 0000000000000000000000000000000000 | 0000000000000000000000000000000000 |
| 12766: | 0000000000000000000000000000000000 | 0000000000000000000000000000000000 |
| 12770: | 0000000000000000000000000000000000 | 0041474622002000213376506777602010 |
| 12772: | 0000000000000000000000000000000000 | 0000000000000000000000000000000000 |
| 12774: | 0004464220000000200360016377631000 | 0002065720141060200376546004031000 |
| 12776: | 0002065720141460200376546004231000 | 0024376220150000200376444052002012 |
| 13000: | 0000000000000000000000000000000000 | 0000000000000000000000000000000000 |
| 13002: | 0000000000000000000000000000000000 | 0000000000000000000000000000000000 |
| 13004: | 0000000000000000000000000000000000 | 0000000000000000000000000000000000 |
| 13006: | 0000000000000000000000000000000000 | 0000000000000000000000000000000000 |
| 13010: | 0000000000000000000000000000000000 | 0000000000000000000000000000000000 |
| 13012: | 0000000000000000000000000000000000 | 0000000000000000000000000000000000 |
| 13014: | 0000000000000000000000000000000000 | 0000000000000000000000000000000000 |
| 13016: | 0000000000000000000000000000000000 | 0000000000000000000000000000000000 |
| 13020: | 0000000000000000000000000000000000 | 0000000000000000000000000000000000 |
| 13022: | 0000000000000000000000000000000000 | 0000000000000000000000000000000000 |
| 13024: | 0000000000000000000000000000000000 | 0000000000000000000000000000000000 |
| 13026: | 0000000000000000000000000000000000 | 0000000000000000000000000000000000 |
| 13030: | 0000000000000000000000000000000000 | 0000000000000000000000000000000000 |
| 13032: | 0000000000000000000000000000000000 | 0000000000000000000000000000000000 |
| 13034: | 0000000000000000000000000000000000 | 0000000000000000000000000000000000 |
| 13036: | 0000000000000000000000000000000000 | 0000000000000000000000000000000000 |
| 13040: | 0000000000000000000000000000000000 | 0000000000000000000000000000000000 |
| 13042: | 0000000000000000000000000000000000 | 0000000000000000000000000000000000 |
| 13044: | 0000000000000000000000000000000000 | 0000000000000000000000000000000000 |
| 13046: | 0000000000000000000000000000000000 | 0000000000000000000000000000000000 |
| 13050: | 0000000000000000000000000000000000 | 0000000000000000000000000000000000 |
| 13052: | 0000000000000000000000000000000000 | |

Type microcode data.

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 0: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 40: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 100: | 0 | 0 | 0 | 0 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 140: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 200: | 0 | 6 | 6 | 6 | 6 | 6 | 6 | 6 | 6 | 0 | 6 | 0 | 0 | 0 | 0 | 0 | 4 | 4 | 4 | 4 | 4 | 4 | 4 | 4 | 4 | 4 | 4 | 4 | 4 | 4 | 4 | 4 |
| 240: | 4 | 4 | 4 | 4 | 4 | 4 | 4 | 4 | 4 | 4 | 4 | 4 | 4 | 4 | 4 | 4 | 6 | 2 | 2 | 2 | 2 | 4 | 0 | 0 | 6 | 0 | 0 | 0 | 0 | 0 | 0 | 0 |
| 300: | 6 | 6 | 6 | 6 | 6 | 6 | 6 | 6 | 6 | 4 | 6 | 4 | 4 | 4 | 4 | 4 | 4 | 4 | 4 | 4 | 4 | 4 | 4 | 4 | 4 | 4 | 4 | 4 | 4 | 4 | 4 | 4 |
| 340: | 4 | 4 | 4 | 4 | 4 | 4 | 4 | 4 | 4 | 4 | 4 | 4 | 4 | 4 | 4 | 4 | 6 | 6 | 6 | 6 | 4 | 4 | 6 | 4 | 6 | 6 | 4 | 4 | 4 | 4 | 4 | 4 |
| 400: | 0 | 0 | 0 | 0 | 0 | 0 | 0 | 0 | 0 | 0 | 0 | 0 | 0 | 0 | 0 | 0 | 4 | 4 | 4 | 4 | 4 | 4 | 4 | 4 | 4 | 4 | 4 | 4 | 4 | 4 | 4 | 4 |
| 440: | 0 | 0 | 0 | 0 | 0 | 0 | 0 | 0 | 0 | 0 | 0 | 0 | 0 | 0 | 0 | 0 | 0 | 2 | 2 | 2 | 2 | 0 | 0 | 0 | 0 | 0 | 0 | 0 | 0 | 0 | 0 | 0 |
| 500: | 0 | 0 | 0 | 0 | 0 | 0 | 0 | 4 | 0 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 540: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 600: | 0 | 0 | 0 | 0 | 0 | 0 | 0 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 640: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 700: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 740: | 4 | 4 | 4 | 4 | 4 | 4 | 4 | 4 | 4 | 4 | 4 | 4 | 4 | 4 | 4 | 4 | 4 | 4 | 4 | 4 | 5 | 4 | 4 | 4 | 4 | 4 | 4 | 4 | 4 | 4 | 4 | 4 |
| 1000: | 0 | 0 | 0 | 5 | 0 | 0 | 0 | 0 | 0 | 0 | 0 | 0 | 0 | 0 | 0 | 0 | 4 | 4 | 4 | 4 | 4 | 4 | 4 | 4 | 4 | 4 | 4 | 4 | 4 | 4 | 4 | 4 |
| 1040: | 5 | 5 | 5 | 5 | 5 | 5 | 5 | 5 | 5 | 5 | 5 | 5 | 5 | 5 | 5 | 5 | 0 | 0 | 0 | 0 | 0 | 0 | 0 | 0 | 0 | 0 | 0 | 0 | 0 | 0 | 0 | 0 |
| 1100: | 0 | 0 | 0 | 0 | 0 | 0 | 0 | 0 | 0 | 0 | 0 | 0 | 0 | 0 | 0 | 0 | 4 | 4 | 4 | 4 | 4 | 4 | 4 | 4 | 4 | 4 | 4 | 4 | 4 | 4 | 4 | 4 |
| 1140: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1200: | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 1240: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 1300: | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 1340: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 1400: | 0 | 0 | 0 | 0 | 0 | 0 | 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1440: | 0 | 0 | 0 | 0 | 0 | 0 | 0 | 0 | 0 | 0 | 0 | 0 | 0 | 0 | 0 | 0 | 0 | 2 | 2 | 2 | 2 | 0 | 0 | 0 | 0 | 0 | 0 | 0 | 0 | 0 | 0 | 0 |
| 1500: | 4 | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 1540: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 1600: | 0 | 0 | 0 | 0 | 0 | 6 | 0 | 0 | 0 | 0 | 0 | 0 | 0 | 0 | 0 | 0 | 5 | 5 | 5 | 5 | 5 | 5 | 5 | 5 | 5 | 5 | 5 | 5 | 5 | 5 | 5 | 5 |
| 1640: | 0 | 0 | 0 | 0 | 0 | 0 | 0 | 0 | 0 | 0 | 0 | 0 | 0 | 0 | 0 | 0 | 0 | 2 | 2 | 2 | 2 | 0 | 0 | 0 | 0 | 0 | 0 | 0 | 0 | 0 | 0 | 0 |
| 1700: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1740: | 0 | 0 | 0 | 0 | 0 | 0 | 0 | 0 | 0 | 0 | 0 | 0 | 0 | 0 | 0 | 0 | 0 | 0 | 0 | 2 | 0 | 0 | 4 | 4 | 0 | 0 | 0 | 0 | 0 | 0 | 0 | 0 |
| 2000: | 0 | 6 | 0 | 0 | 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2040: | 0 | 0 | 0 | 0 | 0 | 0 | 0 | 0 | 0 | 0 | 0 | 0 | 0 | 0 | 0 | 0 | 0 | 2 | 2 | 2 | 2 | 0 | 0 | 0 | 0 | 0 | 0 | 0 | 0 | 0 | 0 | 0 |
| 2100: | 0 | 0 | 0 | 0 | 0 | 0 | 0 | 0 | 0 | 0 | 4 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2140: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2200: | 4 | 4 | 4 | 4 | 4 | 4 | 4 | 4 | 4 | 0 | 4 | 0 | 0 | 0 | 0 | 0 | 4 | 4 | 4 | 4 | 4 | 4 | 4 | 4 | 4 | 4 | 4 | 4 | 4 | 4 | 4 | 4 |
| 2240: | 4 | 4 | 4 | 4 | 4 | 4 | 4 | 4 | 4 | 4 | 4 | 4 | 4 | 4 | 4 | 4 | 4 | 2 | 2 | 2 | 2 | 4 | 0 | 0 | 4 | 0 | 0 | 0 | 0 | 0 | 0 | 0 |
| 2300: | 6 | 6 | 6 | 6 | 6 | 6 | 6 | 6 | 6 | 0 | 6 | 0 | 0 | 0 | 0 | 0 | 4 | 4 | 4 | 4 | 4 | 4 | 4 | 4 | 4 | 4 | 4 | 4 | 4 | 4 | 4 | 4 |
| 2340: | 4 | 4 | 4 | 4 | 4 | 4 | 4 | 4 | 4 | 4 | 4 | 4 | 4 | 4 | 4 | 4 | 6 | 6 | 2 | 2 | 2 | 4 | 0 | 0 | 6 | 0 | 0 | 0 | 0 | 0 | 0 | 0 |
| 2400: | 4 | 4 | 4 | 4 | 4 | 4 | 4 | 4 | 4 | 0 | 4 | 0 | 0 | 0 | 0 | 0 | 4 | 4 | 4 | 4 | 4 | 4 | 4 | 4 | 4 | 4 | 4 | 4 | 4 | 4 | 4 | 4 |
| 2440: | 4 | 4 | 4 | 4 | 4 | 4 | 4 | 4 | 4 | 4 | 4 | 4 | 4 | 4 | 4 | 4 | 4 | 4 | 2 | 2 | 2 | 4 | 0 | 0 | 4 | 0 | 0 | 0 | 0 | 0 | 0 | 0 |
| 2500: | 0 | 0 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2540: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2600: | 0 | 4 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2640: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2700: | 5 | 4 | 4 | 4 | 4 | 4 | 4 | 4 | 4 | 0 | 4 | 0 | 0 | 0 | 0 | 0 | 4 | 4 | 4 | 4 | 4 | 4 | 4 | 4 | 4 | 4 | 4 | 4 | 4 | 4 | 4 | 4 |
| 2740: | 4 | 4 | 4 | 4 | 4 | 4 | 4 | 4 | 4 | 4 | 4 | 4 | 4 | 4 | 4 | 4 | 4 | 2 | 2 | 2 | 2 | 4 | 0 | 0 | 4 | 0 | 0 | 0 | 0 | 0 | 0 | 0 |
| 3000: | 4 | 4 | 4 | 4 | 4 | 4 | 4 | 4 | 4 | 0 | 4 | 0 | 0 | 0 | 0 | 0 | 4 | 4 | 4 | 4 | 4 | 4 | 4 | 4 | 4 | 4 | 4 | 4 | 4 | 4 | 4 | 4 |
| 3040: | 4 | 4 | 4 | 4 | 4 | 4 | 4 | 4 | 4 | 4 | 4 | 4 | 4 | 4 | 4 | 4 | 4 | 4 | 4 | 2 | 4 | 4 | 4 | 4 | 4 | 4 | 0 | 0 | 0 | 0 | 0 | 0 |
| 3100: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 3140: | 4 | 4 | 4 | 4 | 4 | 4 | 4 | 4 | 4 | 4 | 4 | 4 | 4 | 4 | 4 | 4 | 0 | 0 | 0 | 0 | 0 | 0 | 0 | 0 | 0 | 0 | 0 | 0 | 0 | 0 | 0 | 0 |
| 3200: | 4 | 4 | 4 | 4 | 4 | 4 | 4 | 4 | 4 | 4 | 4 | 4 | 4 | 4 | 4 | 4 | 5 | 5 | 5 | 5 | 5 | 5 | 5 | 5 | 5 | 5 | 5 | 5 | 5 | 5 | 5 | 5 |
| 3240: | 5 | 5 | 5 | 5 | 5 | 5 | 5 | 5 | 5 | 5 | 5 | 5 | 5 | 5 | 5 | 5 | 4 | 4 | 4 | 4 | 4 | 4 | 4 | 4 | 4 | 4 | 4 | 4 | 4 | 4 | 4 | 4 |
| 3300: | 4 | 4 | 4 | 4 | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 3340: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 3400: | 4 | 5 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 3440: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 3500: | 4 | 4 | 4 | 5 | 4 | 4 | 4 | 4 | 4 | 4 | 4 | 4 | 4 | 4 | 4 | 4 | 5 | 5 | 5 | 5 | 5 | 5 | 5 | 5 | 5 | 5 | 5 | 5 | 5 | 5 | 5 | 5 |
| 3540: | 5 | 5 | 5 | 5 | 5 | 5 | 5 | 5 | 5 | 5 | 5 | 5 | 5 | 5 | 5 | 5 | 4 | 4 | 4 | 4 | 4 | 4 | 4 | 4 | 4 | 4 | 4 | 4 | 4 | 4 | 4 | 4 |
| 3600: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 3640: | 5 | 5 | 5 | 5 | 5 | 5 | 5 | 5 | 5 | 5 | 5 | 5 | 5 | 5 | 5 | 5 | 4 | 4 | 4 | 4 | 4 | 4 | 4 | 4 | 4 | 4 | 4 | 4 | 4 | 4 | 4 | 4 |
| 3700: | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 3740: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 4000: | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 4040: | 5 | 5 | 5 | 5 | 5 | 5 | 5 | 5 | 5 | 5 | 5 | 5 | 5 | 5 | 5 | 5 | 4 | 4 | 4 | 4 | 4 | 4 | 4 | 4 | 4 | 4 | 4 | 4 | 4 | 4 | 4 | 4 |
| 4100: | 0 | 0 | 0 | 0 | 4 | 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4140: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4200: | 4 | 4 | 4 | 4 | 4 | 4 | 4 | 4 | 4 | 0 | 4 | 0 | 0 | 0 | 0 | 0 | 4 | 4 | 4 | 4 | 4 | 4 | 4 | 4 | 4 | 4 | 4 | 4 | 4 | 4 | 4 | 4 |
| 4240: | 4 | 4 | 4 | 4 | 4 | 4 | 4 | 4 | 4 | 4 | 4 | 4 | 4 | 4 | 4 | 4 | 4 | 4 | 4 | 2 | 2 | 4 | 0 | 0 | 4 | 0 | 0 | 0 | 0 | 0 | 0 | 0 |
| 4300: | 0 | 0 | 0 | 0 | 4 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4340: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4400: | 0 | 5 | 0 | 0 | 4 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4440: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| 4500: | 4 | 4 | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 4540: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 4600: | 4 | 4 | 4 | 4 | 4 | 5 | 4 | 4 | 4 | 4 | 4 | 4 | 4 | 4 | 4 | 4 | 5 | 5 | 5 | 5 | 5 | 5 | 5 | 5 | 5 | 5 | 5 | 5 | 5 | 5 | 5 | 5 |
| 4640: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 4700: | 4 | 4 | 4 | 4 | 4 | 4 | 4 | 4 | 4 | 4 | 4 | 4 | 4 | 4 | 4 | 4 | 5 | 5 | 5 | 5 | 5 | 5 | 5 | 5 | 5 | 5 | 5 | 5 | 5 | 5 | 5 | 5 |
| 4740: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 5000: | 0 | 0 | 0 | 4 | 0 | 0 | 0 | 0 | 0 | 0 | 0 | 0 | 0 | 0 | 0 | 0 | 5 | 5 | 5 | 5 | 5 | 5 | 5 | 5 | 5 | 5 | 5 | 5 | 5 | 5 | 5 | 5 |
| 5040: | 4 | 4 | 4 | 4 | 4 | 4 | 4 | 4 | 4 | 4 | 4 | 4 | 4 | 4 | 4 | 4 | 0 | 0 | 0 | 0 | 0 | 0 | 0 | 0 | 0 | 0 | 0 | 0 | 0 | 0 | 0 | 0 |
| 5100: | 0 | 0 | 0 | 4 | 0 | 0 | 0 | 0 | 0 | 0 | 0 | 0 | 0 | 0 | 0 | 0 | 4 | 4 | 4 | 4 | 4 | 4 | 4 | 4 | 4 | 4 | 4 | 4 | 4 | 4 | 4 | 4 |
| 5140: | 4 | 4 | 4 | 4 | 4 | 4 | 4 | 4 | 4 | 4 | 4 | 4 | 4 | 4 | 4 | 4 | 0 | 0 | 0 | 0 | 0 | 0 | 0 | 0 | 0 | 0 | 0 | 0 | 0 | 0 | 0 | 0 |
| 5200: | 4 | 4 | 4 | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 5240: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 5300: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5340: | 0 | 0 | 0 | 0 | 0 | 0 | 0 | 0 | 0 | 0 | 0 | 0 | 0 | 0 | 0 | 0 | 4 | 0 | 0 | 0 | 0 | 0 | 0 | 0 | 4 | 0 | 0 | 0 | 0 | 0 | 0 | 0 |
| 5400: | 0 | 0 | 0 | 0 | 0 | 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5440: | 0 | 0 | 0 | 0 | 0 | 0 | 0 | 0 | 0 | 0 | 0 | 0 | 0 | 0 | 0 | 0 | 0 | 2 | 2 | 2 | 2 | 0 | 0 | 0 | 0 | 0 | 0 | 0 | 0 | 0 | 0 | 0 |
| 5500: | 0 | 6 | 6 | 6 | 6 | 6 | 7 | 6 | 6 | 0 | 6 | 0 | 0 | 0 | 0 | 0 | 4 | 4 | 4 | 4 | 4 | 4 | 4 | 4 | 4 | 4 | 4 | 4 | 4 | 4 | 4 | 4 |
| 5540: | 4 | 4 | 4 | 4 | 4 | 4 | 4 | 4 | 4 | 4 | 4 | 4 | 4 | 4 | 4 | 4 | 6 | 2 | 2 | 2 | 2 | 4 | 0 | 0 | 6 | 0 | 0 | 0 | 0 | 0 | 0 | 0 |
| 5600: | 0 | 5 | 0 | 0 | 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5640: | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5700: | 4 | 4 | 4 | 4 | 4 | 4 | 4 | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 |
| 5740: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 6000: | 4 | 4 | 4 | 4 | 4 | 4 | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 6040: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 6100: | 4 | 4 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| 6140: | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |

MICROCODE COMPILER

1. Introduction

This document is both to explain the underlying concepts of the microcode compiler and to serve as reference documentation on how to write microcode. The first part of this document explains the philosophy of the microcode compiler and is largely independent of the hardware. The second part describes the microcode operations available; in some sense this constitutes documentation of the hardware, however the reader is assumed to be familiar with the hardware at least at the block-diagram level.

1.1 Structure of the Compiler

The 3600 microcode compiler consists of a front end, a checker, two back ends, and a linker. The input to the compiler is written in a *microcode source language*, which has Lisp-like syntax but the semantics of microcode. This language is considerably higher level than the actual microcode executed by the machine, but is in no sense a high-level or general-purpose language; it is impossible to program in it without general knowledge of the microcode architecture of the machine. The purpose of the microcode source language is to provide a more comfortable syntax, to take care of some elementary bookkeeping, and to provide extensive error checking so that the microprogrammer's knowledge of the microcode architecture need not be perfect for her to program effectively.

The *front end* converts the microcode source language into a primitive form. This primitive form is horizontal microcode expressed in symbolic form, rather than as a bit string; it is a list of microinstructions, where each microinstruction is a list of microinstruction fields and values for those fields. To look at it in another way, each primitive symbolic microinstruction is a list of machine operations to be performed in parallel, and these machine operations are the primitive ones actually implemented by the hardware, rather than any higher-level abstractions that the programmer would use. An effort was made to keep the symbolic microinstructions close to the actual microinstructions executed by the machine, so that the "smarts" of the compiler would be in the front end, and the back end would simply be a trivial transformation from symbolic microinstructions to their actual bit encodings. However, there are some decisions that are difficult to make in the front end, because they require global knowledge. These decisions are made in the back end, which means that the symbolic microinstruction is not identical to the real microinstruction. For example, choices between two different ways of encoding the same function are made in the back end. A few additional minor "unrealities" in the symbolic microinstruction are there to simplify the simulator.

The front end is essentially a macro expander. The microcode written by the user consists of nested expressions in the style of Lisp; the car of an expression is the name of a macro that defines the operation to be performed. The microcode source language will be discussed in detail later.

The *checker* checks the primitive symbolic microcode output by the front end for legality. It checks for unknown symbolic field names, for unknown symbolic field values, for dependencies between fields. The symbolic microcode is not perfectly horizontal: there are dependencies between fields. To take some examples, reading the output of a memory requires specifying an address for that memory, many operations are "modulated" by the *magic number* field, and some combinations of fields are not allowed by the hardware. The main purpose of the checker is to detect bugs in the front end (the macros are many in number and possibly user-written). This checker is partly table-driven and partly ad-hoc; it was written in whatever way seemed most convenient at the time.

The front end also does some checking; whenever two things are done in parallel it checks that they are consistent. Part of this check is simply to assure that the same symbolic microinstruction field is not given two different values, and part of the check involves machine-dependent knowledge of how to encode parallel operations. Of course the front end also checks for trivial syntactic errors such as using an undefined macro, using a macro with the wrong number of arguments, etc. Most error messages seen by the user will be from the front end.

One *back end* translates symbolic microcode into Lisp functions to simulate its action, running within a simulator environment which runs in both Maclisp and the Lisp Machine. The simulator allows microcode to be debugged with the same editing and debugging tools as Lisp programs. The simulator is deficient in certain details, mostly having to do with memory and I/O, but simulates the microcode that executes the compiled Lisp instruction set very well.

The other back end translates into the actual microcode executed by the machine. This consists of translating symbolic microinstruction fields into the appropriate bit strings, packing the fields together, and making certain decisions when there are overlapping fields in the hardware and/or multiple ways of encoding a symbolic operation.

The *linker* combines separately-compiled microcode modules into an almost-complete image of the hardware memories. Constants are assigned to addresses. Microinstructions are also assigned to addresses; this is a complex process because there are several relationships between the addresses of multiple microinstructions: the hardware microinstruction has only a single successor address field, whereas in general two successors are required (e.g. the address of a subroutine and the address it should return to, or the address of the normal successor and the address of a trap handler which receives control in exceptional cases); the microcode to execute a macroinstruction must be at a certain address determined by the Instruction Fetch Unit; the *skip* and *dispatch* features involve tables of microinstructions located in a block of addresses. The linker makes multiple copies of a microinstruction when necessary to satisfy these constraints, and merges together microinstructions that come from different places in the source code but turn out to execute the same machine operations. The linker generates a symbol table for the microcode debugger, and a variety of report files showing how addresses were assigned.

1.2 Level of Sophistication

The 3600 microcode compiler is primarily analytic rather than synthetic. In other words, it does little *planning* or *scheduling* of the use of hardware resources, and its input is not a general-purpose programming language, but one whose primitives correspond closely to the hardware. It takes a program written by a human and analyzes it to make sure that it will work (the human has not out-smarted himself).

The compiler does no scheduling (arrangement of machine operations in time). The programmer must explicitly say which operations are to be done in parallel and which operations are to be done sequentially. The compiler will then say whether or not this "schedule" will work, but it has no idea whether or not this "schedule" is the most optimal one. The compiler knows all the hardware reasons why two operations cannot be done in parallel (e.g. they might require two different data words to be present on a single data path at the same time, or they might require a single microinstruction field to contain two different values). It would be much too difficult (for this project) to write a program which could schedule the performance-critical microcode as well as human ingenuity can.

Things are somewhat simplified because the hardware does some very low-level scheduling. One example of this is that all read/write memories contain pass-around paths so that a value may be written into the memory and read back correctly in the immediately-following microinstruction (even if it has not yet really been stored into the memory). This means that neither the compiler nor the programmer needs to worry about scheduling issues across multiple microinstructions, but only within a single microinstruction.

The microcode compiler has about the same lack of intelligence in the space domain as in the time domain. The programmer generally has to have a good idea of which data paths in the machine his microcode is using. The programmer must choose explicitly whether variables and constants reside in the A memory or the B memory (the machine can access one A-memory location and one B-memory location simultaneously, but not two locations in the same memory.) The compiler does not take a high-level description of what is to be done and map it onto the data paths. However, the situation is not hopeless. The compiler does make the simplest data-path planning decisions on its own; for instance it will take advantage of the symmetries of the ALU. This will be discussed in detail later. In addition, if the programmer mistakenly tries to use the data paths in an impossible way, the compiler will detect this.

1.3 Macros and Micros

The source file for a microcode module is a file full of Lisp forms, much like the source file for a Lisp program. There are certain *defining forms*, which are Lisp forms (macros, actually) that define microcode subroutines or other microcode-related things. Inside of a Lisp form that defines a microcode subroutine appears some actual microcode (in the source language form). This microcode could be written directly in the primitive, symbolic microinstruction form, however it is invariably written in a higher-level form, in terms of *micros*. Micros are the macros expanded by the front end of the microcode compiler. They are called micros to distinguish them from normal Lisp macros.

The syntax of the microcode source language is as follows. A valid form (or expression) is one of a primitive — A primitive is a list whose `car` is the name of one of the primitive operations defined in the next chapter, and whose `cdr` is the appropriate arguments to that operation.

the invocation of a micro
: This is a list whose car is the name of a micro and whose cdr is interpreted in a way defined by that micro.

a symbol
: The symbol must be defined as an *atomic micro*. Most atomic micros are used the way variables are used in Lisp. The phrase *atomic micro* is usually abbreviated to *atomicro*.

Note that the Lisp concept of *evaluation* does not apply to the microcode language, even though it looks much like Lisp. A microcode form is processed by *expanding* it into another form, if it is the invocation of a micro or an atomic micro, or by converting it into hardware microcode, if it is a primitive.

The compiler comes with a large number of micros pre-defined. These micros embody knowledge about the hardware architecture (how to get the machine to do things) and about the software architecture implemented by the microcode (conventions about storage layout, names of fields in data structures, etc.) The predefined micros include the usual set of control-structure operations, some additional control operations corresponding to the hardware, and data operations corresponding to all the data manipulations the hardware is able to perform.

There is a defining form (defmicro, a Lisp macro) which can be used to define new micros. Its body is a Lisp program which sees the invocation of the micro and computes a new microcode form to serve as its expansion. The front end works by calling the Lisp program associated with each micro it sees, until everything has been expanded into primitives. There are other defining forms for atomic micros.

1.4

1.5 Running the Compiler

On a Lisp machine, load the file `F:>LMach>Ucode>SYSDCL.LISP` then do `(make-system 'micro)`. This will load the compiler, the simulator, and the microcode. The source files for everything are on the `F:>LMach>Ucode>` directory.

The micro system consists of two components: microcompiler, the compiler and simulator; and microcode, the microcode proper. To compile microcode, just use the Lisp compiler, or make-system.

The variable *enable-ul* enables translation of microcode into Lisp code for the simulator. It is nil by default. The variable *enable-uh* enables translation of microcode into hardware instructions. It is t by default.

When using the simulator, microcode is compiled into Lisp functions, using the normal Lisp compiler, and these Lisp functions are run with the aid of support functions in the microcompiler system. When using the real hardware, microcode is compiled into linkable microcode (in normal `QFASL` files). These files are loaded and the microcode is then processed by the following functions:

link-the-microcode
: Build a microcode memory image out of all of the microcode that has been loaded.

linker-summary-report

Print a summary of the results of the most recent link-the-microcode. This consists mainly of how many locations were used.

linker-detailed-report

Print a detailed listing of the results of the most recent link-the-microcode. This includes complete symbol tables and maps of control memory.

file-linker-report *pathname*

Write a file named *pathname* containing the output from linker-summary-report and linker-detailed-report.

write-the-microcode &optional *name version*

Write the results of the most recent link-the-microcode into a set of microcode binary files (see below). The files are written to F:>LMach>Ucode>*name*.*type*.*version*

*name* defaults to NORMAL; *type* is different for each output file; *version* defaults to the major version number of the microcode system, which is incremented each time it is compiled.

*version* also appears as the contents of the A-memory location named %microcode-version-number.

compile-the-microcode

Link the microcode and then write it. Note that (at least currently) compile-the-microcode does not actually compile the microcode source files; use make-system for that.

The :load-ucode command in the *L Console* program calls compile-the-microcode if necessary, and then loads the newest microcode binary files.

1.5.1 Microcode Binary Files

The microcode is stored in three files, with types MIC, SYM, and ERR.

MIC This file contains the load image for the microcode memories in the machine. It is a sequence of 16-bit bytes, as follows:

First, the microcode version number.

Following that, a sequence of load blocks. Each block starts with a memory number, a starting address, a number of entries, and the number of 16-bit bytes per entry. The entries (data words to be loaded into consecutive addresses) follow. Each data word occupies an integral number of 16-bit bytes, e.g. 3 bytes for 36-bit words.

The memory numbers are:

1 - type map
2 - A memory
3 - B memory
4 - C memory

SYM This file contains the symbol table, as a series of Lisp lists, each having an identifying symbol in its car. These symbols are:

version The microcode version number is the cadr of the list.

a-memory The rest of the list is an a-list associating symbols with A-memory addresses.

b-memory The rest of the list is an a-list associating symbols with B-memory addresses.

c-memory The rest of the list is an a-list associating microinstruction names with *lists of* control-memory addresses. A microinstruction can be stored in more than location when address constraints so dictate. A microinstruction name is either a symbol (specified with defucode or definst) or a list, which is one path from a symbol-named microinstruction to here. When there can be multiple paths to a microinstruction (because identical microinstructions from different sources were merged by the linker), only one path is remembered.

ERR This file contains the error table, which is read by the Lisp system during loading. It tells the error handler how to interpret error traps from the microcode. The format is similar to the SYM file. Valid cars of lists are:

version The microcode version number is the cadr of the list.

error-table The rest of the list is an a-list associating control-memory locations to error codes, specified by the signal-error micro, for example.

2. Primitives

A micro expands either into another micro expression or into one of four primitives. These primitives are *statements* (a single microcode operation), *sequences* (a list of statements to be performed sequentially), *data* (representing the location of data in the machine), and *predicate* (a special kind of data used as a conditional test).

The output of the micro expansion phase consists of pieces of microcode (something like separate Lisp functions). Each piece of microcode is either a statement or a sequence. Along with the microcode itself is declarative information such as its name or the fact that its purpose is to execute a certain macrocode instruction.

We will discuss the primitives first, even though the microprogrammer normally never uses the primitives directly, but always programs in terms of the predefined micros and new micros that she writes.

2.1 Statements

A *statement* is a single microinstruction. The symbolic form of a statement is a list
    (microinstruction *field value field value*...)
The *fields* and *values* are a symbolic representation of the machine microinstruction. The actual microinstruction is simplified somewhat, and made more fully horizontal, to simplify the macros.

For example, the microinstruction

```
(microinstruction abus amem
                  amem-read-addr (stack-pointer 0)
                  xbus abus
                  alu X+1
                  write-amem obus
                  amem-write-addr (stack-pointer 0)
                  write-bmem obus
                  bmem-write-addr 4)
```

specifies that the A-memory location addressed by the stack pointer, with an offset of zero (i.e. the top of the stack), is to be incremented by one and stored back into itself, and also into location 4 in the B memory. Data is to be routed from A memory into the ALU via the Abus and the Xbus.

2.2 Sequences

A *sequence* is an ordered list of microinstructions to be performed one at a time. The symbolic form of a sequence is a list (microsequence *statement statement*...)

2.3 Data

A *datum* represents a word of bits on some data path in the machine. The exact location in the machine is specified, along with a microinstruction that arranges for the desired data to appear at that place when it is executed. This primitive serves the place of expressions in conventional languages. Thus, a micro that represents an expression with a value expands into a datum, while a micro that represents an imperative command with no value expands into a statement or a sequence.

The symbolic representation of a datum is a list (microdata *place statement*)

The machine does not execute data; it only executes statements. In other words, the microcode language is a statement language, not an applicative expression language, and the flow of data must be programmed explicitly, with the programmer naming temporary storage locations where they are required. Thus data only appear as intermediate operations during the microcode expansion process. When a datum is used as an argument to a micro (for instance, one that takes two data and adds them together in the ALU), the datum's *place* tells the micro how to generate data-routing microcode, and the datum's *statement* is merged into the generated microinstruction and executed in parallel.

A datum may also be used as the first argument to the assign micro, in which case the datum designates a place into which bits will be stored, rather than a place from which bits will be retrieved. This generality increases the symmetry of the source language.

It is also allowed to have a sequence (rather than a single microinstruction) inside a datum. This is useful if it takes several sequential machine operations to make the desired datum accessible. However, use of this feature is likely to cause non-intuitive behavior, since something that syntactically appears to be a statement, but contains such a datum, will really be a sequence. In applicative constructs involving data, the order in which operations are written usually is determined by esthetics rather than by the order necessary for things to work. Normally an expression is executed in a single microinstruction (i.e. evaluated in parallel), and so the order of operations makes no difference. But if a datum in the expression has a sequence buried inside it, the expression will necessarily be executed in multiple microinstructions, and it might not be obvious which things were done in parallel.

2.4 Predicates

A *predicate* represents a true-or-false condition that can be tested. In the 3600 all such conditions appear on a single condition multiplexor, whose output may be used to divert the flow of control with either a skip or a trap.

The symbolic representation of a predicate is much like a datum; a list

`(microcondition` *condition-name sense statement*`)`

*condition-name* is the name of a testable condition in the hardware. *sense* is the symbol true or the symbol false. false indicates that the negation of the hardware condition is represented. Predicates may only be used as arguments to condition-testing micros (such as if, not, or trap-if).

3. Combining Forms

There are two combining forms, which can be used to combine several microcode expressions into one. The expressions being combined will usually be statements (or forms that expand into statements), but it also makes sense for them to be sequences. A datum or a condition may be combined with statements or sequences, which makes a new datum or condition whose microinstruction part is combined.

sequential *form1 form2 ...* *Micro*

The argument forms are to be executed sequentially. To make life easier for micros, if any of the forms is nil it is ignored.

parallel *form1 form2 ...* *Micro*

The argument forms are to be executed simultaneously, in parallel. This form will expand into a single microinstruction, unless one of the forms is a sequence. In that case, the forms written before the sequence will be done in parallel with the first microinstruction in the sequence, and the forms written after the sequence will be done in parallel with the last microinstruction in the sequence. Thus the order of arguments to parallel does matter. When microcode is written with this in mind, it will usually be more readable anyway—the parallel clauses will "flow" naturally.

For example,

```
(parallel form1
          form2
          (sequential form3a form3b form3c)
          form4)
```

is equivalent to

```
(sequential (parallel form1
                      form2
                      form3a)
            form3b
            (parallel form3c
                      form4))
```

To make life easier for micros, if any of the forms is nil it is ignored.

Microcode is usually written in such a way that correct execution does not depend on which combining form is chosen; this only affects speed. (Of course, not everything can be done instantaneously, and so correct execution may be impossible with parallel; the compiler detects this.)

The control-structure micros, such as conditionals and dispatches, are something like combining forms in that their arguments are microinstructions. They will be described below.

for-effect *datum* *Micro*

Convert a datum into a statement. This is useful when the datum has side-effects in its microinstruction part (typically popping the stack), but the value is not needed.

4. Defining Forms defucode *name body...*

Define a microcode routine which is named *name*. The *body* forms are implicitly combined with sequential. The microcode routine may be reached by a jump, a subroutine call, or a trap, using *name*.

defucode-at-loc *name loc body...*

This is like defucode, but requires that the microcode be stored at a particular address. *loc* is either a number or a list of numbers. The first microinstruction of the body will be stored at that location, or at all of those locations. defucode-at-loc is used to set up things like trap handlers whose addresses are known by the hardware.

definst *name attributes body...*

Define the microcode routine to execute a particular macroinstruction. *name* is the name of the macroinstruction. *attributes* is either a list whose first element is the format of the macroinstruction and whose remaining elements are its other attributes, or a symbol which is the format, in the common case where there are no other attributes. The format and attributes are checked against the Opdef file; that is the file which tells the compiler what the macroinstruction set is. Formats and attributes are further described below (page 14).

definst is essentially defucode-at-loc, except the location is automatically computed by looking up *name* in the opcode table. You must explicitly put a (next-instruction) at the end of the microcode if it is needed.

definst1 *name attributes body...*

A version of definst for macroinstructions that can be executed in a single machine cycle. The *body* forms are combined with parallel rather than sequential, and (next-instruction) is automatically appended to the body.

defareg-at-loc *name location* &optional *initial-value simulator-initial-value*
Define *name* to be the word in A-memory at address *location*. If *initial-value* is supplied, it is a Lisp expression to compute a number to be stored there. *simulator-initial-value* defaults to *initial-value* but allows a different value to be stored when using the simulator (usually it is conceptually the same value but is computed in a different way.)

defareg *name* &optional *initial-value simulator-initial-value*
Like defareg-at-loc but the system chooses the location. If *name* has been previously defined at a specific location, then the same location is used; this is useful because the Sysdef file defines a number of A-memory variables at specific locations which are used for communication between microcode and Lisp code. If *name* has not been previously defined at a specific location, a location is assigned from a free pool set up by reserve-scratchpad-memory.

defbreg-at-loc *name location* &optional *initial-value simulator-initial-value*
Like defareg-at-loc but for B memory.

defbreg *name location* &optional *initial-value simulator-initial-value*
Like defareg but for B memory.

reserve-scratchpad-memory *first-a last-a* &optional *first-b last-b*
Establish an area of A-memory, and optionally of B-memory, in which variables are to be allocated by defareg and defbreg. A reserve-scratchpad-memory form should be put at the front of each microcode file. This kludge is necessary because locations have to be assigned at compile time (rather than when the microcode is linked) for the sake of the simulator.

defmicro *name args body...*
This is much like the Lisp defmacro, but defines a micro. The last *body* form should evaluate to a microcode form (a micro invocation or a primitive.) *Note well*: the *body* is not microcode; it is Lisp code that constructs microcode.

*args* may include the keywords &optional, &rest, &body, and &aux. The defmacro feature that *args* may include more general patterns, not just variables, is *not* supported currently. Optional arguments may have default values (which are Lisp forms to be evaluated, if the argument was not supplied, to produce a piece of microcode to use as the argument).

defatomicro *name expansion*
Define *name* to expand, when it appears by itself as a microcode expression, into *expansion*. Note that *expansion* is a microcode expression, *not* a Lisp form to be evaluated to produce a microcode expression.

defatomic-byte-field *name byte-specifier register*
Define *name* to be an atomicro which expands into a datum representing a byte of the datum *register*. The byte is specified by *byte-specifier*, which is either a symbol, or a list of *n-bits* and *bits-over*. A symbol must be the name of a byte defined in the Sysdef file as part of the machine architecture. *n-bits* is the width of the byte in bits. *bits-over* is the position of the byte in bits from the right-hand end of the word (in other words it is the bit number of the least-significant bit in the byte).

def-byte-field *name byte-specifier var*
Define *name* to be a micro which takes an operand as its argument and expands into a datum representing a byte of that operand. *byte-specifier* is the same as in defatomic-byte-field. *var* is the dummy variable to be bound to the operand.

associate-dispatch-cues *field-name enumerated-type-name*
Declare that the byte field named *field-name* contains values of an enumerated type defined by (defenumerated *enumerated-type-name* ...) in the Sysdef file. A dispatch (see dispatch-after-next, page 18) on the field will allow the symbolic names of the enumerated type values to be used as dispatch cues.

define-enumerated-value-constants *enumerated-type-name*
Declare an enumerated type defined by (defenumerated *enumerated-type-name* ...) in the Sysdef file. Each symbolic value of this type is defined to be an atomicro which expands into a B-memory constant containing the numeric code for that value. This allows symbolic values to be deposited into fields in data structures.

define-storage-word-offset-constants *defstorage-type-name*
Make available to the microcode the symbolic names for the words in a system data structure defined in the Sysdef file. Each word offset is defined to be an atomicro which expands into a B-memory constant containing the numeric value.

4.1 Macroinstruction Attributes

The following are the macroinstruction formats currently allowed:

unsigned-immediate-operand
The instruction includes an 8-bit immediate constant, which is unsigned. The atomicro to pick up the operand is macro-unsigned-immediate.

signed-immediate-operand
The instruction includes an 8-bit immediate constant, which is a 2's-complement signed number. The atomicro to pick up the operand is macro-signed-immediate.

10-bit-immediate-operand
The instruction includes a 10-bit immediate constant; the extra two bits are taken out of the opcode. This format is used for certain byte-manipulation instructions only.

address-operand
The instruction addresses the current stack frame; one bit selects between a positive 7-bit displacement from frame-pointer or a negative-or-zero 7-bit displacement from stack-pointer. The atomicro to pick up the operand is address-operand.

no-operand
The instruction has no direct operand (usually some operands will be passed on the stack).

quick-external-call
The instruction includes an 8-bit unsigned immediate constant to be interpreted as an index in the system-wide table of quick-external functions.

constant-operand
The instruction includes an 8-bit unsigned immediate constant which is a negative index into the constants table of the current function.

indirect-operand
The instruction includes an 8-bit unsigned immediate constant which is a negative index into the constants table of the current function. The addressed word contains a locative pointer to the value cell or function cell whose contents are the operand.

lexical-operand
The instruction includes an 8-bit unsigned immediate constant whose interpretation is not yet fully defined.

microcode-operand
The instruction includes an 8-bit unsigned immediate constant which is an index into the system-wide table of constants and microcode-communication variables.

unsigned-pc-relative
The instruction includes an 8-bit unsigned immediate constant which is a PC-offset (see the pc-add micro, page 41) to be used for branching.

signed-pc-relative
The instruction includes an 8-bit signed immediate constant which is a PC-offset (see the pc-add micro, page 41) to be used for branching.

constant-pc-relative
Identical to constant-operand except that the addressed constant is to be used as an offset from the PC for branching. (See the pc-add micro, page 41.)

After the format in a definst, any number of attributes may be specified. The following are the currently-defined attributes (more will undoubtedly be added in the future):

needs-stack
The top-of-stack register must be valid when this instruction is entered.

smashes-stack
This instruction leaves the top-of-stack register invalid.

branch-predict
The IFU should assume that this instruction branches and take the next instruction from the branch target. The format must be signed-pc-relative.

stop-ifu
The IFU should cease referencing memory until told what to do next.

(function *name n-arguments n-values*)
This instruction implements the Lisp function named *name* when called with *n-arguments* arguments. *n-values* values are returned on the stack. *n-values* may be omitted and defaults to 1; 0 is commonly specified for functions mainly used for their side-effects. The arguments are passed on the stack except that if the format is not no-operand then the last argument is the operand. Multiple instructions may have function attributes for the same function; the compiler will choose the appropriate instruction in context.

(operand *type-of-operand*)
Additional information about the operand, used by the disassembler to print it in a nicer format than just a number. The current list of operand types is:

data-type An immediate data type code, as used by %make-pointer.

byte-pointer An immediate byte pointer, as used by ldb.

argument-number
The sequence number of an argument; 0 is the first argument. This is used by argument-taking instructions.

instance-variable
A reference to an instance variable (mapped or unmapped).

5. Flow of Control

Several of these micros use the concept of *normal successor*. The normal successor of a microinstruction is that microinstruction which is executed immediately afterwards, in the absence of any flow-of-control micros. Only microinstructions embedded in sequences have normal successors (note that defucode implicitly wraps sequential around its body, thus all microinstructions in the body except the last have a normal successor).

5.1 Jumps and Subroutines jump *ucode* — *Micro*
Take the next microinstruction from the routine named *ucode*.

call *ucode* — *Micro*
Take the next microinstruction from the routine named *ucode* and save as the subroutine return address the normal successor of the current microinstruction.

call-and-dispatch-upon-return *ucode* — *Micro*
A combination of call and take-dispatch (see page 19). The subroutine's return address is made to be the dispatch set up in the previous microinstruction. In the hardware this is the same as call; a separate name is provided to make the microprogram easier to read, and for the benefit of the simulator.

call-and-return-to *ucode return-to* — *Micro*
Take the next microinstruction from the routine named *ucode*, and save *return-to* as the subroutine return address.

return — *Micro*
Take the next microinstruction from the saved subroutine return address, and pop the subroutine return stack. Each task has 16 stack locations.

next-instruction — *Micro*
Take the next microinstruction from the address supplied by the Instruction Fetch Unit. The current microinstruction is the last to be executed on behalf of the current macroinstruction; the next microinstruction will either start the next macroinstruction, handle a trap or sequence break, or idle waiting for the IFU to become ready.

In the hardware next-instruction and return are identical operations; when the outermost subroutine in the emulator task returns, the hardware does a next-instruction operation. The two names for this operation are to make the microprogram more readable. It is entirely legal to call a macroinstruction-execution microroutine as a subroutine.

5.2 Conditionals if *predicate true false* — *Micro*

Test the *predicate*; if it is true, take the next microinstruction from *true*, otherwise take the next microinstruction from *false*. The available predicate micros are described in section 6.3, page 27.

Each clause (*true* or *false*) may be a microcode expression, the form (goto *tag*) which means the microcode routine named *tag*, or the form (drop-through) which means the normal successor of the current microinstruction. If a clause is a microcode expression, its normal successor is the if's normal successor, i.e. it rejoins the normal flow of control.

Using (jump *tag*) as a clause is equivalent to (goto *tag*) except that it is one cycle slower, because it generates a microinstruction that does nothing except a jump, as opposed to goto, which arranges to transfer control directly to the named routine (in some cases this may involve making a copy of that routine; the linker takes care of this).

Compare if with trap-if (page 19).

call-select *condition true-subroutine false-subroutine* — *Micro*

A combination of if and call. The *condition* is tested and in the next cycle control passes to *true-subroutine* if it was true or *false-subroutine* if it was false. In either case a return address is pushed on the microcode subroutine stack.

5.3 Dispatching dispatch-after-next *field clauses...* — *Micro*

Select one of the *clauses* according to the value of *field*. The current microinstruction's immediate successor may then use the take-dispatch micro to transfer control to the selected clause. Note that dispatch-after-next and if may be used simultaneously, which provides a way to make the taking of the dispatch optional.

The car of a clause is the condition under which that clause will be selected. This can be a list of symbolic or numeric values for *field*, or the special symbol otherwise. The cdr of a clause is a list of microcode expressions; sequentially is implicitly wrapped around them. As a special case, (goto *tag*) is allowed in dispatch clauses; it works the same way as in if. (drop-through) is not allowed; its meaning is unclear because of the "after next" nature of dispatching.

Symbolic *field* values that appear in the car of a dispatch clause are defined with the associate-dispatch-cues defining form (see page 13).

*field* selects a field of up to 4 bits in the data path, thus dispatches may select among up to 16 possibilities. Normally the byte-extraction hardware is used to select the field (see the ldb micro, page 30). *field* may also be an invocation of the cdr-code micro, allowing a 4-way dispatch on the cdr code of an Abus source.

signal-error *error-code...* *Micro*

Abort the current macroinstruction and exit to the error handler, passing the symbolic error message specified by the *error-code* arguments.

signal-error-no-restore-stack *error-code...* *Micro*

Identical to signal-error except that the stack-pointer remains at its current setting. signal-error would restore it to its value at the start of the macroinstruction.

error-if *condition error-code...* *Micro*

If *condition* is true, trap to the error handler, passing the symbolic error message specified by the *error-code* arguments. This is equivalent to

```
(trap-if condition (signal-error error-code...))
```

but saves a control-memory location.

error-no-restore-stack *condition error-code...* *Micro*

Identical to error-if except that the stack-pointer remains at its current setting. error-if would restore it to its value at the start of the macroinstruction.

check-arg-type *location datum type1 type2...* *Micro*

Trap if the data type of *datum* is not one of the types listed. *datum* must be an Abus source. No trap handler is specified; the trap always goes to a fixed location (trap 0 in the type map is used). This micro is typically used by instructions and subroutines to check the types of their arguments. The trap-0 microcode normally passes control to the Lisp error handler.

*location* is a symbolic specification of where *datum* came from. It is passed along in the error code and used by the error handler to format the error message, to locate the offending datum, and to replace it with a new value if the instruction is retried. In many cases an error is detected by a subroutine used in common by several instructions which get their arguments from different places. The *location* provides a symbolic specification which the error handler uses, in combination with the particular instruction that was being executed, to find the physical location of *datum*.

*location* should be one of the following:

| | |
|---|---|
| *a number* | One of the arguments to the function implemented by the instruction; 0 specifies the first argument. |
| **nil** | One of the arguments to the function implemented by the instruction, but it is not specified which one. The error handler will test the arguments and select the first one whose data type does not match the types specified. |
| **array** | The array argument to an array-manipulating instruction. Whether this is the first or second argument depends on the instruction. |
| **subscript** | One (or more) of the subscript arguments to an array-manipulating instruction. |
| **top-of-stack** | The top value on the stack (i.e. the last argument). This is used by the **funcall** instructions, for example. |
| **rest-arg** | The rest-argument being passed by a **lexpr-funcall** instruction. |
| **return-pc** | The current frame's return PC (PC of its caller). |

self-mapping-table
The instance-variable mapping table in the current frame. This is an implicit argument to the instance-variable accessing instructions.

instance The instance argument to an instance-variable accessing instruction. This can be either an explicit argument or an implicit one (self in the current frame), depending on the particular instruction.

instance-size
instance-binding
instance-hash-table
instance-hash-table-entry
Various attributes of the instance argument (see instance just above).

any Any one of the arguments to a function that takes several arguments all of the same type.

check-data-type *datum type1 type2...* *Micro*
Trap if the data type of *datum* is not one of the types listed. *datum* must be an Abus source. No trap handler is specified; the trap always goes to a fixed location (trap 0 in the type map is used). check-data-type is the same as check-arg-type with a *location* of nil.

data-type-trap *datum trap-name type1 type2...* *Micro*
Trap if the data type of *datum* is not one of the types listed. *datum* must be an Abus source. This is the same as check-data-type except that you may specify which of the type map traps to use (trap-0, trap-1, trap-2, or trap-3) and no automatic error-table entry is made.

The following micros are essentially special cases of trap-if usually used in generic arithmetic macroinstructions.

check-fixnum-2args *a-opnd b-opnd clauses...* *Micro*
*a-opnd* is an Abus operand and *b-opnd* is a Bbus operand. The data types of these two operands are checked. If both are fixnums, execution proceeds normally. If either is not a number, a trap-0 to the error handler occurs. If both are numbers, but they are not both fixnums, one of the clauses is selected as the trap handler. The clauses look like dispatch clauses. If only an otherwise clause is present, no dispatch occurs (i.e. memory is not wasted for a dispatch block of 16 identical microinstructions). The valid selection keys are as follows:

flonum-flonum Both operands are flonums (immediate floating-point numbers).

fixnum-flonum *a-opnd* is a fixnum and *b-opnd* is a flonum.

flonum-fixnum *a-opnd* is a flonum and *b-opnd* is a fixnum.

extnum-extnum Both operands are extended numbers (anything other than fixnum or flonum, including bignums, rationals, extended-precision floating-point, complex, or what have you.)

fixnum–extnum
extnum–fixnum
flonum–extnum
extnum–flonum These are analogous.

fixnum–fixnum Both operands are fixnums, but a trap occurred anyway. This happens if overflow checking is enabled and an overflow occurs (see add–checking–overflow, page 26).

If *b-opnd* is an extended number, it does not get fully type-checked; the trap handler should check the type again with check–data–type. This is because the hardware only has full data type checking capability on the Abus. It only checks *b-opnd* for being a fixnum; anything not a fixnum will trap and dispatch. Thus it is possible for the otherwise clause to be reached with *b-opnd* having a random data type, and for an *xxx*–extnum clause to be reached with *b-opnd* having something whose data type is not dtp–extended–number.

check–fixnum–1arg–a *a-opnd clauses...* *Micro*

Analogous to check–fixnum–2args when there is only one operand and it is on the Abus. If dispatching into a set of trap handlers is used, the dispatch hardware will still think it is dispatching on two arguments; write the dispatch selectors in the clauses appropriately.

check–fixnum–1arg–b *b-opnd clauses* *Micro*

Analogous to check–fixnum–2args when there is only one operand and it is on the Bbus. If dispatching into a set of trap handlers is used, the dispatch hardware will still think it is dispatching on two arguments; write the dispatch selectors in the clauses appropriately.

Beware! The "condition" bit in the type map is spuriously enabled to cause a trap. Thus check–fixnum–1arg–b should not be paralleled with the data–type? predicate, nor with transport or store–contents.

check–fixnum–b *b-opnd &optional trap-handler* *Micro*

Trap if *b-opnd* is not a fixnum; it must be a Bbus operand. *trap-handler* defaults to signal a data-type error; it may be specified as a microcode expression to handle the trap, or as nil to allow the trap handler to be supplied by something else in the instruction (typically a trap–if). This latter feature is used by array referencing, which simultaneously checks that the subscript is within bounds and that it is a fixnum—this would normally be done with trap–if and check–data–type, but check–data–type requires its operand to be on the Abus.

Beware! The "condition" bit in the type map is spuriously enabled to cause a trap. Thus check–fixnum–b should not be paralleled with the data–type? predicate, nor with transport or store–contents.

check-data-type-and-dispatch (*a-opnd types...*) *clauses...* *Micro*

If the data type of *a-opnd* is one of the *types* named, take a trap. The trap handler is obtained by dispatching into *clauses* as with check-fixnum-1arg-a. Note that the trap occurs if the operand is of the specified type(s), not if it fails to be of the specified type(s)—this is the opposite of check-data-type. This micro is probably used only by the eql function (it is a different combination of the same primitives that the other micros above use).

5.5 Delay nop *Micro*

A microinstruction that does nothing. This is useful when an explicit delay is required (usually in connection with main memory).

5.6 Trap Handlers

There are two kinds of traps, and the trap handler is entered slightly differently depending on which kind occurs. Low-level traps trap to fixed addresses and save both NPC and CPC, permitting the trapped microinstruction to be retried. NPC is automatically pushed on the microcode subroutine stack by the hardware. CPC is saved in NPC where it is available to be saved by the trap handler (see the trap-save micro below.)

The rest of the traps, such as those generated by trap-if and check-fixnum-2args, trap to a trap handler whose address is freely specifiable, and do not save NPC. Thus the trapped microinstruction cannot be retried. However its address is still available to be saved by trap-save.

trap-save *Micro*

Finish the state save initiated by the trapping hardware, by pushing NPC onto the stack. NPC contains the original CPC, i.e. the address of the microinstruction that traps. NPC at the time of the trap has already been pushed onto the stack. This micro should be included in the first microinstruction of any trap handler that may retry the trapped microinstruction, or that needs to know where it came from.

trap-no-save *Micro*

Pop the saved NPC off the stack. This micro is included in the first microinstruction of a trap handler that is not going to retry and does not want extra words on the stack. Most commonly trap-no-save is used when a trap is being used as a simple jump.

trap-restore *cycle-1 cycle-2* *Micro*

Return from a trap handler and retry the microinstruction that trapped. Since this takes two cycles, trap-restore takes two arguments, which are microcode to be executed in parallel with the restore. First the saved CPC is popped into NPC. Then the saved NPC is popped into NPC and simultaneously CPC is loaded from NPC.

6. Machine Operations

This chapter documents a host of micros that provide access to the various features of the machine. Many of these micros deal with data manipulation and hence expand into a datum rather than a statement; in other words they are used in an applicative style rather than the imperative style of most of the micros described above.

6.1 A and B memory a–constant *value* — *Micro*

*value* is a Lisp form to be evaluated; its value must be an integer. The a–constant micro expands into a datum which is an A-memory location containing that integer.

b–constant *value* — *Micro*

*value* is a Lisp form to be evaluated; its value must be an integer. The b–constant micro expands into a datum which is a B-memory location containing that integer.

amem *address* — *Micro*

A datum which is an A-memory location as specified by *address*, which may be any of the following:

*location* — An integer between 0 and 7777 is an absolute address. Normally defareg is used to give symbolic names to A-memory locations, rather than using explicit numbers.

(frame–pointer *offset*)
(stack–pointer *offset*)
(xbas *offset*) — The specified base register is added to the specified offset (an 8-bit signed integer) to compute the address.

(macrocode) — The address field of the current macroinstruction specifies a base register and an offset. Normally the address–operand atomicro is used for this.

stack–pointer — *Atomicro*

The stack-pointer register. This is a 28-bit up/down counting register, the low 10 bits of which also serve as a base register for A-memory addresses.

frame–pointer — *Atomicro*

The frame-pointer register. This is a 28-bit register, the low 10 bits of which also serve as a base register for A-memory addresses.

xbas — *Atomicro*

The extra base register (this can only be written, not read). This is a 10-bit base register for A-memory addresses.

increment–stack–pointer — *Micro*

Add one to the stack-pointer.

decrement-stack-pointer *Micro*

Subtract one from the stack-pointer.

stack-adjustment *Atomicro*

A 4-bit register which increments and decrements in parallel with the stack-pointer, and is zeroed at the start of each macroinstruction. This makes it possible to restore the stack-pointer when aborting a trapped macroinstruction; see section 7.5, page 49.

clear-stack-adjustment *Micro*

Zero the stack-adjustment register. This is used when a complex macroinstruction reaches an intermediate point to which it can be aborted, usually together with the first-part-done flag.

6.2 Arithmetic/Logic Unit

A variety of micros are provided to perform arithmetic and logical operations on 1, 2, or 3 operands (in the 3-operand case, the third operand must be the constant 1; thus x+y+1 and x-y-1 may be computed.) The compiler allows more flexibility about the sources of these operands than is usual. The hardware takes one ALU operand from the Xbus and the other from the Ybus (via the shifter and AluB). Usually Xbus comes from Abus and Ybus comes from Bbus, however the reverse is also possible and in addition Xbus and Ybus each have a special source (Xbus may come from the multiplier, Ybus may come from the "crocks".)

The compiler allows either operand to a 2-operand ALU micro to come from either bus, provided only that the two operands come from different busses so that the operation is physically realizable. The exception is subtraction, for which the hardware is deficient: the minuend must come from the Xbus and the subtrahend from the AluB; thus it is not possible to extract a byte and subtract something from it (one could, however, add a negative constant to it.)

The compiler allows the operand to a 1-operand ALU micro to come from either bus; in the cases where the hardware is deficient the compiler will turn it into the 2-operand case, supplying a constant 0 operand on the other bus.

Thus usually the programmer need only be careful to avoid trying to do an ALU operation on two Abus operands or two Bbus operands; the other vagaries of the hardware will be hidden by the compiler.

Note that ALU operations are on 32 bits. The output-tagging feature (see section 6.7, page 32) must be used to add a data-type tag.

When no ALU operation is being performed, but a datum is simply being moved from one place to another, the compiler will generate the appropriate microinstruction to pass the datum unchanged through the ALU and to pass the tag around the ALU; thus all 36 bits will be moved.

1+ *opnd* *Micro*

Add 1 to *opnd*.

1- *opnd* *Micro*

Subtract 1 from *opnd*.

+ *opnd opnd* &optional *opnd* *Micro*

Take the sum of two operands. If three operands are used, the third must be the constant 1.

- *opnd* &optional *opnd opnd* *Micro*

With one operand, take the 2's-complement (negation). With two operands, take the difference. With three operands, the third must be the constant 1 and the result is the difference, minus one.

commutative-diff *opnd opnd* &optional *opnd* *Micro*

The same as - except that the compiler is permitted to interchange the operands, reversing the sign of the result. This is normally used only when all you care about the result is whether or not it is zero.

logand *opnd opnd* *Micro*

Bit-by-bit logical and.

logior *opnd opnd* *Micro*

Bit-by-bit logical inclusive or.

logxor *opnd opnd* *Micro*

Bit-by-bit logical exclusive or.

lognand *opnd opnd* *Micro*

The complement of logand.

andc2 *opnd1 opnd2* *Micro* logand with *opnd2* complemented.

inc-checking-overflow *opnd* *Micro*

1+ with overflow checking enabled. See check-fixnum-2args (page 21).

dec-checking-overflow *opnd* *Micro*

1- with overflow checking enabled.

add-checking-overflow *opnd opnd* *Micro*

+ with overflow checking enabled. The 3-operand case is not allowed because the hardware cannot handle it.

sub-checking-overflow *opnd opnd* *Micro*

- with overflow checking enabled. The 1-operand and 3-operand cases are not allowed because the hardware cannot handle them. (The 1-operand case may be simulated by using a constant 0 as the first operand.)

6.3 Predicates

The micros in this section expand into conditions which may be used with if and trap-if. Almost all of them use the ALU and have the same constraints (or lack of constraints) on their operands as the arithmetic and logical micros in the previous section.

not *predicate* *Micro*

Reverse the sense of *predicate*, which must expand into a microcondition primitive.

The following predicates operate on 28-bit unsigned numbers (virtual addresses):

equal-pointer *x y* *Micro*
True if the low 28 bits of *x* and *y* are equal.

not-equal-pointer *x y* *Micro*
True if the low 28 bits of *x* and *y* are not equal.

greater-pointer *x y* *Micro*
True if *x* is greater than *y* in the low 28 bits.

greater-or-equal-pointer *x y* *Micro*
True if *x* is greater than *y* in the low 28 bits, or they are equal.

lesser-pointer *x y* *Micro*
True if *x* is less than *y* in the low 28 bits.

lesser-or-equal-pointer *x y* *Micro*
True if *x* is less than *y* in the low 28 bits, or they are equal.

The following predicates operate on 32-bit signed 2's-complement numbers (fixnums):

equal-fixnum *x y* *Micro*
True if the low 32 bits of *x* and *y* are equal.

not-equal-fixnum *x y* *Micro*
True if the low 32 bits of *x* and *y* are not equal.

greater-fixnum *x y* *Micro*
True if *x* is strictly greater than *y* as a 32-bit 2's-complement number.

greater-or-equal-fixnum *x y* *Micro*
True if *x* is not less than *y* as a 32-bit 2's-complement number.

lesser-fixnum *x y* *Micro*
True if *x* is strictly less than *y* as a 32-bit 2's-complement number.

lesser-or-equal-fixnum *x y* *Micro*
True if *x* is not greater than *y* as a 32-bit 2's-complement number.

zero-fixnum *x* *Micro*
True if the low 32 bits of *x* are zero.

not-zero-fixnum *x* *Micro*
True if not all the low 32 bits of *x* are zero.

minus-fixnum *x* *Micro*
True if bit 31 of *x* is 1 (i.e. *x* is negative as a 32-bit 2's-complement number).

minus-or-zero-fixnum *x* *Micro*
True if *x* is negative or zero as a 32-bit 2's-complement number.

plus-fixnum *x* *Micro*
True if *x* is strictly greater than zero as a 32-bit 2's-complement number.

plus-or-zero-fixnum *x* *Micro*
True if *x* is greater than or equal to zero as a 32-bit 2's-complement number, i.e. bit 31 of *x* is 0.

bit-test *x y* *Micro*
Like the bit-test Lisp function, this is true if there is some bit position (among the low 32 bits) in which *x* and *y* are both 1.

ldb-bit-test *opnd bit-number* *Micro*
True if the *bit-number*'th bit from the least-significant end of *opnd* is 1. *bit-number* is either a number between 0 and 31. or the symbol byte-r.

bit *byte-field* *Micro*
*byte-field* must be a datum that is 1 bit wide. The condition is true if the bit is 1. (bit *x*) is the same as (zero-fixnum *x*), when *x* is a 1-bit field, but leaves the ALU free and is a little faster.

all-ones *x* *Micro*
True if the low 32 bits of *x* are *all* 1 (*x* is -1 as a 32-bit 2's complement number).

The following predicates operate on 32-bit unsigned integers. There is no such data type in Lisp, but unsigned numbers are used internally in some parts of the microcode, such as floating point. Some of the predicates listed above (equal-fixnum for example) are equally meaningful for signed and unsigned integers.

greater-fixnum-unsigned *x y* *Micro*
True if *x* is greater than *y* as a 32-bit unsigned integer.

greater-or-equal-fixnum-unsigned *x y* *Micro*
True if *x* is greater than *y* as a 32-bit unsigned integer or they are equal.

lesser-fixnum-unsigned *x y* *Micro*
True if *x* is less than *y* as a 32-bit unsigned integer.

lesser-or-equal-fixnum-unsigned *x y* *Micro*
True if *x* is less than *y* as a 32-bit unsigned integer or they are equal.

The following predicates operate on typed pointers, which are 34 bits (either 2 bits of type and 32 bits of data or 6 bits of type and 28 bits of address).

equal-typed-pointer *x y* *Micro*
True if the low 34 bits of *x* and *y* are equal.

not-equal-typed-pointer *x y* *Micro*
True if the low 34 bits of *x* and *y* are not equal.

The following predicates are miscellaneous.

ybus-31 *Atomicro*

True if the sign bit of the Y bus is 1. This is used by the microcode for division, but probably is not useful for anything else. This predicate must be parallel'ed with something that puts data on the Y bus.

alu-carry *Atomicro*

True if there is a carry out of bit 31 of the ALU. This is useful when doing multiple-word integer arithmetic. This predicate must be parallel'ed with something that does an ALU operation.

micro-stack-empty *Atomicro*

True if this is the emulator task and the control stack is empty.
[This only exists in the pre-prototype hardware.]

data-type? *operand types...* *Micro*

True if *operand* (which must be an Abus source) has a data type whose name is one of the specified *types*.

not-data-type? *operand types...* *Micro*

True if *operand* (which must be an Abus source) has a data type whose name is not one of the specified *types*.

cdr-code? *operand code* *Micro*

True if *operand* (which must be an Abus source) has the specified cdr code. *code* may be either the name of a cdr code or a number from 0 to 3.

not-cdr-code? *operand code* *Micro*

True if *operand* (which must be an Abus source) does not have the specified cdr code. *code* may be either the name of a cdr code or a number from 0 to 3.

See also odd-pc? (page 41), lbus-dev-cond (page 36), and sequence-break (page 34).

6.4 Storing Results assign *destination source* *Micro*

*source* is any datum, and *destination* is a datum that can be stored into. A statement is generated to store *source* into *destination*. assign knows how to store into all the memories and registers in the machine, and also knows how to store into byte fields in a register or memory location. Note however that assign is not usually used with main memory, because of garbage collector storage conventions; see store-contents (page 38).

obus *Atomicro*

A datum that stands for whatever is on the Obus (the output from the data path). This is useful shorthand when storing the result of the same computation into more than one place simultaneously.

6.5 Shifter byte-mask *ppss*

A Lisp function that converts a byte pointer to an integer containing 1 bits in the selected byte and 0 bits elsewhere. This function is useful in connection with the a-constant and b-constant micros.

ldb *operand n-bits bits-over* &optional *background* *Micro*

Expands into a datum which represents a byte extracted from *operand*. *n-bits* is the width of the byte. *bits-over* is the bit number of the least significant bit in the byte (in other words, the number of bits between the byte and the least-significant end of *operand*). If *background* is specified, it is a datum which supplies the bits of the result outside of the byte; normally these bits are 0. If *background* is the number 0, that is the same as no background.

*n-bits* is a number from 1 to 40, or the symbol byte–s, or the symbol macro. byte–s means that the byte–s register contains one less than the number of bits. macro means that the macroinstruction specifies the byte size.

*bits-over* is a number from 0 to 37, or the symbol byte–r, or the symbol macro. byte–r means that the byte–r register contains the number of bits of left rotation (40 minus the *bits-over*). macro means that the macroinstruction specifies the left rotation.

Not all combinations of non-numeric values for *n-bits* and *bits-over* are supported by the hardware; the compiler will complain if you try to do something illegal.

strange–ldb *operand n-bits bits-over* &optional *background* *Micro*

This is the same as ldb except with some error-checking turned off. This allows you to use bytes that cross the word boundary and exploit what the hardware does in this case. (The hardware acts as if it first rotates right by *bits-over* and then masks with a mask *n-bits* wide.)

dpb *operand n-bits bits-over background* *Micro*

Expands into a datum which represents the result of depositing the low bits of *operand* into a byte in *background*. *n-bits* is the width of the byte and *bits-over* is its position. *background* is either an operand or the number 0, which means that the bits in the result outside of the byte field should be 0.

*n-bits* is a number from 1 to 40, or the symbol byte–s, or the symbol macro. byte–s means that the byte–s register contains one less than the number of bits. macro means that the macroinstruction specifies the byte size.

*bits-over* is a number from 0 to 37, or the symbol byte–r, or the symbol macro. byte–r means that the byte–r register contains *bits-over* (the number of bits of left rotation). macro means that the macroinstruction specifies the byte position.

Not all combinations of non-numeric values for *n-bits* and *bits-over* are supported by the hardware; the compiler will complain if you try to do something illegal.

rotate *operand amount* *Micro*

Rotate *operand* (as a 32-bit number) left by *amount* places. *amount* may be a number from 0 to 37 or the symbol byte–r.

complemented–sign–bit *operand* *Micro*

A 1-bit byte which is the complement of bit 31 of *operand*. The background is always 0. Thus the result is 0 if *operand* is negative, or 1 if *operand* is positive or zero.

byte-r *Atomicro*

A 5-bit register which can be used as a source of left-rotation for the byte hardware. byte-r can be written from the Obus in the usual manner, or the special statement

```
(assign byte-r (array-index-shift-prom))
```

may be done in parallel with a dispatch-after-next to load byte-r with a function of the field being dispatched upon. This feature is provided specifically to speed up the accessing of packed arrays of bytes and is probably not generally useful.

byte-s *Atomicro*

A 5-bit register which can be used as a source of byte-size-minus-1 for the byte hardware.

6.6 Multiplier write-mpy-x *source* &optional *signed* *Micro*

Writes the low 16 bits of *source* into the X register of the multiplier. If *signed* is non-nil, bit 15 of *source* is taken to be a 2's-complement sign bit; otherwise the X register is unsigned. *source* comes in through the Xbus.

write-mpy-y-from-high *source* &optional *signed* *Micro*

Writes bits 31-16 (the high 16 bits of a fixnum) of *source* into the Y register of the multiplier. If *signed* is non-nil, bit 31 of *source* is a 2's-complement sign bit; otherwise the Y register is unsigned. *source* comes in through the Ybus, thus it may be shifted (with ldb, dpb, or rotate) simultaneously. The multiplier sees the unshifted data.

mpy-product *Atomicro*

The 32-bit product of the X and Y registers. This is an unsigned fixnum if both X and Y were unsigned; otherwise it is a signed fixnum. mpy-product is read onto the Xbus. The product may be read in the immediately following microinstruction after loading one or both of the multiplier's input registers; the mpy-product atomicro includes the necessary timing specification.

6.7 Output Tagging

These micros control the tag fields of the output from the ALU. When an ALU operation is performed, the tag fields are indeterminate unless these micros are used. When the ALU is just used to pass an Abus or Bbus source, the tag fields come from that source.

set-cdr *operand cdr* *Micro*

Expands into a datum which represents *operand* with its cdr code set to *cdr*. *cdr* may be the symbolic name of a cdr code or a number from 0 to 3.

set-type *operand type* *Micro*

Expands into a datum which represents *operand* with its data type set to *type*, which must be the symbolic name of a data type. If *type* is dtp-fix or dtp-float, 32 bits of *operand* are used; otherwise only 28 bits of *operand* appear in the output.

merge-cdr *operand cdr-background* *Micro*

A 36-bit datum which consists of the cdr-code field of *cdr-background* and the type and pointer fields of *operand*.

See section 7.4, page 48 for some other related micros.

6.8 Special Sequencer Controls halt *reason* *Micro*

Stop the machine after executing this microinstruction. *reason* is put in a table for the FEP to use.

popj-into-npc *Micro*

Pops the top word off the control stack and puts it into the NPC register.

pop-control-stack *Micro*

Pops the top word off the control stack and returns it as a datum; also puts it into the NPC register. Only the low 14 bits of the datum are valid. The rest contain other things; however a ldb operation to mask it off cannot be paralled with pop-control-stack due to hardware limitations. It is possible to mask it off by loganding it with a b-constant.

csp *Atomicro*

The control-stack pointer. This is a 4-bit read-only register. It takes two 2 cycles to read it.

The long-dispatch micro, which writes into the NPC register from the data path, also comes under this category. See page 19.

6.9 Datapath Control Register write-dp-control *datum* *Micro*

Write *datum* into the control register on the DP board. The bits in this register control various random things:

| | |
|---|---|
| bits 1-0 | The stack base. This supplies bits 11-10 of the A-memory address when the address is computed as an offset from stack-pointer, frame-pointer, or xbas. |
| bit 2 | The sequence break flag. This is a testable condition and also if it is 1 the IFU traps instead of supplying the next instruction. |
| bits 3,4 | Trace flags 1,2. These are testable conditions with no special hardware features. |

sequence-break *Atomicro*

A predicate which is true if the sequence break flag is on.

trace-flag-1 *Atomicro*

A predicate which is true if trace flag 1 is on.

trace-flag-2 *Atomicro*

A predicate which is true if trace flag 2 is on.

6.10 Lbus Microdevices

These micros provide primitive microdevice operations. Usually each device will have specific micros for its operations defined in terms of these.

read-lbus-dev *card subdevice* *Micro*

A datum which is a word read from the specified microdevice. *subdevice* is a 5-bit number. *card* selects a card and is either a 5-bit backplane slot number or a symbolic card name, in which case the FEP determines the backplane slot number when the microcode is loaded.

write-lbus-dev *card subdevice datum* *Micro*

Write *datum* into the specified microdevice. *subdevice* is a 5-bit number. *card* selects a card and is either a 5-bit backplane slot number or a symbolic card name, in which case the FEP determines the backplane slot number when the microcode is loaded.

select-lbus-dev *card subdevice* *Micro*

Select a microdevice without doing anything to it. This is normally used internally by other micros. *subdevice* is a 5-bit number. *card* selects a card and is either a 5-bit backplane slot number or a symbolic card name, in which case the FEP determines the backplane slot number when the microcode is loaded.

lbus-dev-cond *Atomicro*

A predicate which is true if the Lbus Dev Cond line on the bus is asserted. A read-lbus-dev or write-lbus-dev should be done in parallel to select a device.

6.11 Main Memory

Accessing memory requires interacting with virtual address mapping and with the garbage collector (since the garbage collector "watches" data pass between processor and main memory). Invisible pointers are also implemented here.

"Main memory" actually is anything on the Lbus that behaves like memory. This includes main memory itself, TV memory, and the control registers of "memory-mapped" I/O devices. The A memory in the datapath can also masquerade as main memory; the virtual address map can specify, instead of a physical address, one of the 16 physical pages of A memory.

Conceptually there are two registers, vma (which holds a virtual address) and memory-data (which holds data passing to or from memory). Actually the memory is addressed by physical addresses; the physical address to be referenced may be the result of mapping the contents of vma from virtual to physical, which is the usual case, or may come directly from the Abus. This mapping is implemented by tables in main memory, cached in a hardware map cache. Furthermore if bits 28-24 of vma are all 1's, vma contains a 24-bit physical address and the map is bypassed.

memory-data is not really a register, but represents the processor end of two pipelines, one going into memory and one coming out of memory.

In general, the timing of a memory cycle is:

1) Load the virtual address into vma.
2) Start the memory. If writing, simultaneously output the data to be written. This microinstruction traps if there is a map cache miss.
3) One microinstruction of delay while the memory read is active.
4) The memory read data are available as an operand. This microinstruction traps if there is a bad data type, an invisible pointer, or a transporter trap.

memory-data *Atomicro*

A datum which represents data read from memory. Assigning to this stores into memory; however usually store-contents (see page 38) should be used instead.

vma *Atomicro*

A datum which represents the 28-bit virtual address register. Assigning to vma stores a new address into the register but does not automatically start a memory cycle.

start-memory *modes...* *Micro*

Start a memory cycle. The *modes* specified control the type of cycle to be started. Some *mode* symbols are followed by arguments. The following symbols may be used as modes:

read Start a read.

write Start a write. Either read or write must be specified. If both are specified, a read is started but write-access is checked in the map. If a write is started, the data to be written must be computed and placed on the Obus in parallel with this start-memory.

physical *addr*.

Take *addr* as the physical address, instead of mapping the virtual address in vma. *addr* must be an Abus source.

dma *card subdevice*

Start a DMA cycle. The data read from memory or written to memory goes to/comes from an Lbus device instead of the processor data path. *card* and *subdevice* address the Lbus device; see select-lbus-dev (page 36). Must be used in combination with physical.

inhibit-page-tags

Prevent the page tags from noticing this cycle. Must be used in combination with physical.

address-phtc

Get the physical address by mapping the contents of vma through the page-hash-table-cache hash box instead of the normal map. This mode can also be turned on automatically: when a map cache miss occurs, the hardware does

```
(start-memory read address-phtc)
```

instead of whatever start-memory was originally programmed, and traps to appropriate microcode.

block Start or continue a block memory operation. This may not be used with any of the other modifiers except read or write, may not be used with both read and write, and may only be used by the emulator task. block causes vma to be incremented, changes the reporting of map misses, and allows a new memory operation to be started every cycle.

declare-memory-timing *state* *Micro*

Declare that the current microinstruction (everything paralleled with the declare-memory-timing) occurs with a memory read in *state*, which is either active-cycle or data-cycle. The microcode compiler follows the timing of memory reads and gives an error message if memory-data is accessed at a time when it is not valid. This micro is provided to turn off such error messages when the compiler cannot follow the timing (for example, when a subroutine is called with a memory cycle already started). Be sure that you know what you are doing, and don't turn off error messages that are telling you about genuine errors.

store-contents *value* &optional *cdr* *not-a-pointer* *Micro*

Store *value* into the currently-addressed memory location (the location vma points to, which in most cases will just have been read to check for invisible pointers). store-contents puts the word to be stored on the Obus and does a (start-memory write) to cause it to be stored. If other memory modes than just write are required, an explicit start-memory may be paralleled with the store-contents.

If *cdr* is unspecified or nil, the cdr code comes from *value*; otherwise *cdr* is a number from 0 to 3, the name of a cdr code, or a data source whose cdr code is to be used (usually memory-data, when the location being stored into has just been read and its cdr code is to be preserved).

If *not-a-pointer* is unspecified or nil, *value* is a Lisp datum; it is decoded by the type map and the GC map (consequently it must be an Abus source) to see whether it is a pointer and if so what it points at. This may cause GC page tags to be set and may cause a gc-write-trap if a pointer to a stack is being stored.

If *not-a-pointer* is t, *value* is simply stored; for system storage conventions to be met, *value* must be guaranteed to have a non-pointer data type (typically fixnum). This case is identical with assigning to memory-data, except for the cdr-code control and the automatic (start-memory write).

memread *address* *Micro*

Assigns *address* to vma and calls a subroutine which starts a read and returns with the data available in memory-data. Use this if you don't have anything useful to overlap with the wait for memory; it will conserve control memory locations.

transport &optional *type* *Micro*

Use this before or at the same time as picking up data read from memory. memory-data is read onto the Abus and decoded by the type and GC maps. A trap occurs if the word read from memory is an invisible pointer, has an invalid data type, or is a pointer to oldspace. The trap handler may restart the memory reference using a new address (e.g. if an invisible pointer is followed); in this case the new address will be stored into vma and b-vma, and the microinstruction containing the transport will be reexecuted. (b-vma is purely a software convention.)

*type* specifies the type of transport desired. It must be one of the following symbols:

data This is the default. The word read from memory is going to be used as data (i.e. as a Lisp object.) All invisible pointers are followed, oldspace pointers are detected, and an error occurs if the data type is null (unbound variable) or header (internal data structure scaffolding not valid as a Lisp object).

write The memory read was only done in preparation for a write. All invisible pointers are followed, but no oldspace checking is done and there is no error if a null pointer is detected. A header type causes an error.

cdr The car of a cons is being accessed by the cdr function, not as data but only to check its cdr code. Only header-forward and body-forward invisible pointers are followed and there is no oldspace check. A header type causes an error.

header The word read from memory is expected to be the header of a structure. Header-forward invisible pointers are followed, an oldspace check is done, and data types illegal as headers signal an error.

bind The memory location is a cell being bound (e.g. a special-variable value cell). All invisible pointers except external-value-cell-pointer are followed, an oldspace check is done, and a header type causes an error (a null type does not).

bind–write The memory location is a cell whose binding is being restored. All invisible pointers except external-value-cell-pointer are followed, no oldspace check is done, and a header type causes an error (a null type does not).

scav The memory reference is being performed by the scavenger. An oldspace check is done, but there are no invisible pointers and no data type error checks.

Data type errors are signalled via trap-0 from the type map. Invisible pointer following uses trap-2. If there is an invisible pointer to oldspace, the oldspace trap takes priority; the invisible pointer will be followed when the transport is retried after the garbage collector has had its say.

b–vma *Atomicro*

By software convention, b–vma (a B-memory location) sometimes contains a copy of the vma register. The transporter does not depend on the contents of b–vma, but if it changes vma it also stores the new value into b–vma. The data type is indeterminate. b–vma exists to make it possible to combine (add or compare) the address in vma with data from the Abus.

Instruction Fetch Unit

As explained in the Flow of Control chapter, a subroutine return from the outermost microcode subroutine in the emulator task transfers control to the address supplied by the Instruction Fetch Unit (IFU). This is usually written (next-instruction), although (return) is the same. The address is either the address of the microcode to execute the next macroinstruction, derived from its opcode, or the address of a trap routine (to handle a cache miss, page turn, or sequence break). If the IFU is not ready with the next address, it causes the processor to wait.

In addition to this dispatching feature, the IFU maintains current macroinstruction and program counter (PC) registers. The low 8 bits of the current macroinstruction are accessible on the data path as an operand, may also be used in the A-memory address calculation, and may be incremented.

macro-unsigned-immediate *Atomicro*
A datum containing the macroinstruction immediate field in bits 7-0, zero in bits 31-8, and fixnum data-type in bits 33-32. This is a Bbus source.

macro-signed-immediate *Atomicro*
A datum containing the macroinstruction immediate field in bits 7-0, a copy of bit 7 in bits 31-8, and fixnum data-type in bits 33-32. This is a Bbus source.

increment-macro-immediate *Micro*
Adds one to bits 7-0 of the current macroinstruction. This is useful when it addresses a multi-word A-memory operand.

There are two macroinstructions per 36-bit word. Consequently the PC must specify a word address and a halfword-select bit. The PC is represented as a 28-bit word address with a data type tag field of 60 (dtp-even-pc) for the even halfword or 70 (dtp-odd-pc) for the odd halfword. The PC hardware is capable of incrementing in this format. This form of PC is called a *word-pc*; another useful form is simply a 29-bit halfword address, called a *halfword-pc*. The encodings of dtp-even-pc and dtp-odd-pc and the high bits supplied when the PC register is read are chosen in such a way that conversion between halfword-PC and word-PC may be done in a single microinstruction using the existing data paths (basically rotating a 32-bit word by one bit position). This facilitates arithmetic on PC values.

pc *Atomicro*
The current PC, i.e. the address of the next macroinstruction after the one currently executing. This is a word-pc.

Assigning to pc is usually done with the set-pc micro (see below), which knows how to get the IFU working on the new instruction stream. In any case assigning to pc also assigns to vma.

halfword-pc *word-pc* *Micro*
Translates a word-pc into a halfword-pc. The halfword PC appears at one of the inputs to the ALU, so a number may be added to it in the same microinstruction.

word-pc *halfword-pc* *Micro*
Translates a halfword-pc into a word-pc.

odd-pc *word-address* *Micro*

Translates *word-address* into a pc (word-pc) that points at the second instruction in that word.

odd-pc? *pc* *Micro*

A predicate which is true if the operand *pc* points to the second instruction in a word (false if it points to the first instruction).

pc-plus-number *base-pc offset* *Micro*

Add *offset*, a positive or negative number of halfwords, to *base-pc*, a word-pc value. This micro expands into a datum which is the resulting word-pc value, and takes 2 cycles to execute.

pc-add *base-pc magic-offset* *Micro*

Add *magic-offset*, a halfword offset in the magic hardware-dependent format used by branch instructions, to *base-pc* and return the resulting word-pc. Unlike pc-plus-number this takes only one cycle to execute.

*magic-offset*, arithmetically shifted right by one bit, is the word offset and is added to the 28-bit pointer field of *base-pc*. The least-significant bit of *magic-offset* is the halfword select; it is added to the halfword-select bit of *base-pc*, however there is no carry from this addition into the word address. Furthermore, if *magic-offset* is negative, there is a carry into the halfword select addition which has the effect of complementing the least-significant bit of *magic-offset*.

set-pc *new-pc* &optional *other-code* *Micro*

Assign *new-pc* (a word-pc value) to the hardware PC register, synchronize with the IFU, and do a (next-instruction). If *other-code* is specified, it is microcode to be executed in parallel with the wait for the IFU.

increment-pc *Micro*

Advances the hardware PC (and the IFU) to the next instruction.

increment-fake-pc *Micro*

Advances the simulated PC to the next instruction; takes 2 cycles.

Tasking cur-task *Atomicro*

The current task number. This is a 4-bit read-only register. It takes two 2 cycles to read it.

dismiss *Micro*

Dismiss the current task. It will execute one more microinstruction and then stop executing until it is awakened again.

wakeup-task *n* *Micro*

Wake the specified task. *n* must be the number of a software-awakened task: 1, 2, 5, or 6.

write-task-state *n value* *Micro*

Write the saved state of task *n* (a constant number from 0 to 17, or a Bbus source whose low 4 bits are used) with the 32-bit datum *value*.

7. Architectural Stuff

This chapter describes micros which implement the Lisp architecture.

7.1 The Stack

The top few pages of the Lisp stack, including the entirety of the current frame, are stored in a part of A memory known as the stack buffer. The stack-pointer and frame-pointer registers contain the virtual addresses of the top of the stack and the current frame, respectively; these same registers, used as A-memory base registers, address the A-memory locations containing those virtual addresses.

The stack may also be addressed as normal virtual memory; references to those pages currently residing in the stack buffer are automatically redirected to A memory.

The top word of the stack is duplicated in a B-memory location. This makes it possible to feed the top two words on the stack, or the top word on the stack and some location in the current frame, into the ALU as a pair of operands.

top-of-stack *Atomicro*

The B-memory location containing the top word on the stack.

top-of-stack-a *Atomicro*

The A-memory location containing the top word on the stack. This is a more concise way of saying (amem (stack-pointer 0)).

next-on-stack *Atomicro*

The A-memory location containing the next-to-top word on the stack. This is a more concise way of saying (amem (stack-pointer -1)).

address-operand *Atomicro*

The A-memory location addressed by the current macroinstruction. This is a more concise way of saying (amem (macro)).

The following micros are used to maintain the stack, taking care of the convention that the top word is stored in both A and B memories.

pushval *value* *Micro*

Pushes *value* onto the stack, with a cdr code of cdr-next. The stack-pointer is incremented. This is the standard way to store the result of an instruction (when there are no arguments to be popped off).

newtop *value* *Micro*

Puts *value* into the top of the stack, with a cdr code of cdr-next. The previous top of the stack is replaced, and the stack-pointer does not change. This is the standard way to store the result of an instruction that pops one argument and pushes one result.

pop2push *value* *Micro*

Effectively pops the stack twice and then does a pushval, but does it all in a single microinstruction. This is the standard way to store the result of a microinstruction that pops two arguments and pushes one result.

popval *Micro*

Expands into a datum which is the word on the top of the stack (as a Bbus source). As a side-effect, the stack is popped; i.e. the stack-pointer is decremented and the B-memory top-of-stack register is updated.

pushval-with-cdr *value* *Micro*

Identical to pushval except that *value*'s cdr code is preserved (pushval always sets the cdr code of the stack location to cdr-next). *value* will normally be a set-cdr expression.

newtop-with-cdr *value* *Micro*

Identical to newtop except that *value*'s cdr code is preserved (newtop always sets the cdr code of the stack location to cdr-next). *value* will normally be a set-cdr expression.

7.2 Standard A and B Registers

A large number of registers are set up by the Sysdf1 file and will not be discussed here. a-temp, a-temp-2, b-temp, b-temp-2, b-temp-3, and b-temp-4 are general-purpose temporary locations. Other A & B registers set up by UA are too specialized to bother with here.

7.3 The Current Stack Frame

The atomicros in this section define various fields in the header of the current stack frame.

frame-function *Atomicro*

The currently-executing function.

frame-misc-data *Atomicro*

A fixnum full of various fields. Accessors for these fields are defined below.

frame-return-pc *Atomicro*

The return PC of this frame's caller.

frame-previous-top *Atomicro*

The address of the top of the previous frame; this is put into stack-pointer when the current frame returns. The cdr code of this word is the value disposition code.

frame-previous-frame *Atomicro*
The address of the previous frame; this is put into frame-pointer when the current frame returns.

Fields in frame-misc-data.

frame-number-of-args *Atomicro*
The number of arguments supplied when this frame was called.

frame-cleanup-bits *Atomicro*
If this field is not zero, extra work needs to be done when this frame returns or is thrown through.

frame-buffer-underflow-bit *Atomicro*
1 if the previous frame is not entirely in the stack buffer.

frame-unsafe-reference-bit *Atomicro*
1 if there are pointers to this frame.

frame-catch-bit *Atomicro*
1 if there are catches or unwind-protects in this frame.

frame-bindings-bit *Atomicro*
1 if there is a frame on the binding stack associated with this frame.

frame-trace-bit *Atomicro*
1 if a trap to the debugger is requested when this frame is unwound (either by return or by throw).

frame-bottom-bit *Atomicro*
1 if this is the bottom frame in its stack; trap and do a stack-group-return if this frame tries to return.

first-part-done *Atomicro*
1 if an instruction running in this frame was trapped out of and is in an intermediate state (a few instructions look at this flag).

frame-lexpr-called *Atomicro*
1 if this frame was called via apply or lexpr-funcall. The caller's copy of the arguments includes a list of arguments.

frame-funcalled *Atomicro*
1 if this frame was called via funcall or a similar operation; the caller's copy of the arguments is in a slightly different place.

frame-instance-called *Atomicro*
1 if this frame contains a method called by sending a message to an instance. The first two local slots in the frame contain self and self-mapping-table.

frame-argument-format *Atomicro*
A 2-bit field consisting of frame-lexpr-called and frame-instance-called.

7.4 Tag Manipulation

The micros described in this section are used to implement the subprimitive instructions that manipulate the tag field in a Lisp "pointer." They are complicated by the fact that the tag field is of variable width: 8 bits normally, but 4 bits in fixnums and fionums.

cdr-field *operand* &optional *background* *Micro*

A 2-bit datum which is the cdr code of *operand*, an Abus source. If *background* is specified, it supplies the rest of the bits, as in ldb.

high-type-field *operand* &optional *background* *Micro*

A 2-bit datum which is the high 2 bits of the type field of *operand*, an Abus source. To extract all 6 type bits, you must use low-tag-field separately and then combine the results. If *background* is specified, it supplies the rest of the bits, as in ldb.

high-tag-field *operand* &optional *background* *Micro*

A 4-bit datum which is the cdr code and high type bits of *operand*, an Abus source. If *background* is specified, it supplies the rest of the bits, as in ldb.

low-tag-field *operand* &optional *background* *Micro*

A 4-bit datum which is the low 4 type bits of *operand*, an Abus source. To extract all 6 type bits, you must use high-type-field separately and then combine the results. If *background* is specified, it supplies the rest of the bits, as in ldb.

pointer-field *operand* &optional *background* *Micro*

A 28-bit datum which is the pointer field of *operand*, an Abus source. If *background* is specified, it supplies the rest of the bits, as in ldb.

dpb-tag-field *tag pointer* *Micro*

A 36-bit datum containing *tag* in its tag field and *pointer* in its pointer field. *tag* is an 8-bit Bbus source and *pointer* is a 28-bit Abus source.

dpb-tag-field-high-only *tag fixnum* *Micro*

Like dpb-tag-field but only the high 4 bits of the tag come from *tag*; *fixnum* supplies the low 32 bits of the result. Note that the low 4 bits of *tag* are ignored and bits 7-4 are used.

set-low-tag-field *operand tag* *Micro*

A 32-bit datum containing *operand* in its low 28 bits and the constant number *tag* in its high 4 bits (the low 4 bits of the tag field).

dpb-cdr-field *tag operand* *Micro*

A 36-bit datum consisting of *operand* (an Abus source) with its cdr-code field replaced by *tag*. The hardware takes the cdr-code from bits 7-6 of Bbus, so *tag* is required to be a datum which extracts those bits from a Bbus source or the micro will signal an error.

dpb-type-field *tag pointer* *Micro*

A 34-bit datum consisting of *tag* in the data type field and *pointer* in the pointer field. *tag* is a 6-bit Bbus source. *pointer* is a 28-bit Abus source.

7.5 Traps

These micros implement trapping out from microcode to macrocode. This includes doing something with the current PC, possibly resetting stack-pointer to its value at the beginning of the macroinstruction, emptying the microcode subroutine return stack, setting PC to point to the first macroinstruction of the trap handler, and re-entering macroinstruction processing. The trap handler is always an escape function, defined in the Sysdf1 file.

Aborting a macroinstruction is called *pclsring* in the microcode, by analogy with the corresponding issue in the ITS operating system. Think of it as a neologism with the same historical status as *cdr*.

take-pre-trap *escape-function-name stack-control* *Micro*

Back out of the current instruction and trap to an escape function. *stack-control* is preserve-stack to leave stack-pointer alone or restore-stack to undo any pushes or pops that may have been done by this macroinstruction. The PC is decremented and saved on the stack, with a cdr code of cdr-normal as a clue to the debugger. The escape function may exit by popj'ing to that PC.

take-post-trap *escape-function-name stack-control* *Micro*

Trap to an escape function, logically after the current macroinstruction (the PC is not decremented). *stack-control* is preserve-stack to leave stack-pointer alone or restore-stack to undo any pushes or pops that may have been done by this macroinstruction. The PC is saved on the stack, with a cdr code of cdr-normal as a clue to the debugger. The escape function may exit by popj'ing to that PC.

take-jump-trap *escape-function-name stack-control* *Micro*

Trap to an escape function without saving the current PC. *stack-control* is preserve-stack to leave stack-pointer alone or restore-stack to undo any pushes or pops that may have been done by this macroinstruction.

take-jump-trap-with-continuation *escape-function-name continuation stack-control* *Micro*

Trap to an escape function, pushing the datum *continuation* on the stack as its return PC, with a cdr code of cdr-next. *stack-control* is preserve-stack to leave stack-pointer alone or restore-stack to undo any pushes or pops that may have been done by this macroinstruction.

a-pclsr-top-of-stack *Atomicro*

This A-memory location is used (by software convention) to assist in the restoration of the stack when pclsring (aborting a macroinstruction). If the contents of this register has type tag dtp-null, it is empty and has no effect. Otherwise it contains the value which should be restored on the top of the stack if we pclsr. This is used by macroinstructions which pop an argument off the stack and push something else on (smashing the argument) before they are sure that their execution will complete successfully.

FEP PROGRAM

F:>LMach>Fep>defword.111.15

```
;;;-*- Mode: Lil; Package:Lil; Base:8.; Lowercase: T -*-
```

```
;;; requires STREAM-DEFS to be loaded first.

(defstreamfunction print-word ((word byte-ptr) (wd word-description)) standard-output)

(deftype value-names* (array string *))
(deftype field-description-type (structure ()
                                  (name string)
                                  (print-name boole)
                                  (ss byte)
                                  (pp word)
                                  (n-value-names word)
                                  (value-names value-names*)))
(deftype field-description (pointer field-description-type auto-dereference t))
(defatommacro NULL-field-description '(make-null-pointer field-description))

(deftype pointer-to-word-description (pointer word-description))        ;for funcall-for-value
(deftype word-description-type (array field-description *))
(deftype word-description (pointer word-description-type auto-dereference t))
(defatommacro NULL-word-description '(make-null-pointer word-description))

(deflilmacro defword (name ignore &body field-descriptions)
  (loop with pp with ss with value-names
        for (type field-name . fd-rest) in field-descriptions
        for field-number upfrom 0
        do (if (listp field-name)
               (setq print-name (if (second field-name) 'true 'false)
                     field-name (or (second field-name) (first field-name)))
             (setq print-name 'true))
        do (selectq type
             (:byte (setq pp (second fd-rest)
                          ss (first  fd-rest)
                          value-names (nthcdr 2 fd-rest)))
             (:bit (setq pp (first fd-rest)
                         ss 1
                         value-names (and (cdr fd-rest)
                                          (list (third fd-rest) (second fd-rest)))))
             (otherwise (warn "~&~A is an unknown field type in defword ~A" type name)))
        collect `(make-pointer field-description
                   (constant field-description-type
                             name ,(string field-name)
                             print-name ,print-name
                             pp ,pp
                             ss ,ss
                             n-value-names ,(length value-names)
                             value-names
                             (constant value-names*
                                       ,@(loop for vn in value-names
                                               collect (if vn
                                                           `,(string vn)
                                                         'NULL-string))
                                       ,@(if value-names () '(NULL-string)))))
        into field-descriptions
        finally (return `(defconst ,name word-description
                          (make-pointer word-description
                             (constant word-description-type
                               ,@field-descriptions
                               NULL-field-description))))))
```

F:>lmach>fep>Shared-definitions.lisp.7

```
;;;-*- Package: LIL; Mode: Lisp; Package:Lil; Base: 8; Lowercase: Yes -*-

;;; Table of console-program/fep commands.
(defconst *fcn-to-opcode-mappings*
;;;             Fep function name                        Lisp function name   In prom
         '((010 process-read-version                     read-version              T)
           (110 process-write-bytes                      write-bytes               T)
           (112 process-read-bytes                       read-bytes                T)
           (114 process-write-words                      write-words               T)
```

```
(116 process-read-words              read-words              T)
(120 process-goto                    goto                    T)
;; Don't change the assignments of any functions above this line.
(200 process-write-lbus              write-lbus              NIL)
(202 process-write-lbus-and-ecc      write-lbus-and-ecc      NIL)
(204 process-read-lbus               read-lbus               NIL)
(206 process-read-lbus-and-ecc       read-lbus-and-ecc       NIL)
(210 process-write-lbus-block        write-lbus-block        NIL)
(212 process-read-lbus-block         read-lbus-block         NIL)
(214 process-write-fixnums           write-fixnums           NIL)
(216 process-read-fixnums            read-fixnums            NIL)
;(220 process-write-cmem-wd          write-cmem-wd           NIL)
(222 process-write-uir               write-uir               NIL)
(224 process-read-uir                read-uir                NIL)
(226 process-write-cmem              write-cmem              NIL)
(230 process-write-cmem-and-parity   write-cmem-and-parity   NIL)
(232 process-read-cmem               read-cmem               NIL)
(234 process-write-amem              write-amem              NIL)
(236 process-read-amem               read-amem               NIL)
(240 process-read-amem-and-parity    read-amem-and-parity    NIL)
(242 process-write-bmem              write-bmem              NIL)
(244 process-read-bmem               read-bmem               NIL)
(246 process-read-bmem-and-parity    read-bmem-and-parity    NIL)
(250 process-write-type-map          write-type-map          NIL)
(252 process-write-type-map-and-parity write-type-map-and-parity NIL)
(254 process-read-type-map           read-type-map           NIL)
(256 process-write-gc-map            write-gc-map            NIL)
(260 process-write-gc-map-and-parity write-gc-map-and-parity NIL)
(262 process-read-gc-map             read-gc-map             NIL)
(264 process-write-cpc               write-cpc               NIL)
(266 process-read-cpc                read-cpc                NIL)
(270 process-write-npc               write-npc               NIL)
(272 process-read-npc                read-npc                NIL)
(274 process-write-byte-r            write-byte-r            NIL)
(276 process-read-byte-r             read-byte-r             NIL)
(300 process-write-byte-s            write-byte-s            NIL)
(302 process-read-byte-s             read-byte-s             NIL)
(304 process-write-stack-pointer     write-stack-pointer     NIL)
(306 process-read-stack-pointer      read-stack-pointer      NIL)
(310 process-write-frame-pointer     write-frame-pointer     NIL)
(312 process-read-frame-pointer      read-frame-pointer      NIL)
(314 process-write-xbas              write-xbas              NIL)
(316 process-read-xbas               read-xbas               NIL)
(320 process-read-obus               read-obus               NIL)
(322 process-write-md                write-md                NIL)
(324 process-read-md                 read-md                 NIL)
(326 process-write-vma               write-vma               NIL)
(330 process-read-vma                read-vma                NIL)
(332 process-write-pc                write-pc                NIL)
(334 process-read-pc                 read-pc                 NIL)
(336 process-read-asn                read-asn                NIL)
(340 process-read-crocks             read-crocks             NIL)
(350 process-reset-lbus              reset-lbus              NIL)
(351 process-reset-3600              reset-3600              NIL)
(352 process-read-lbus-board-id      read-lbus-board-id      NIL)
(353 process-read-fep-board-id       read-fep-board-id       NIL)
(354 process-read-fep-paddle-id      read-fep-paddle-id      NIL)
(355 process-read-opc                read-opc                NIL)
(356 process-read-ctos               read-ctos               NIL)
(357 process-write-cur-task          write-cur-task          NIL)
(360 process-read-cur-task           read-cur-task           NIL)
(361 process-write-cstk              write-cstk              NIL)
(362 process-write-cstk-and-parity   write-cstk-and-parity   NIL)
(363 process-read-cstk               read-cstk               NIL)
(364 process-write-csp               write-csp               NIL)
(365 process-read-csp                read-csp                NIL)
(366 process-write-comm-var          write-comm-var          NIL)
(367 process-read-comm-var           read-comm-var           NIL)
(370 process-start-machine           start-machine           NIL)
(371 process-step-machine            step-machine            NIL)
(372 process-stop-machine            stop-machine            NIL)
```

```
        (373 process-restore-state                    restore-state                 NIL)
        (374 process-discard-state                    discard-state                 NIL)
        (400 process-kludge-status                    kludge-status                 NIL)
        (401 process-send-kludge-mini-bytes           send-kludge-mini-bytes        NIL)
        (402 process-send-kludge-mini-words           send-kludge-mini-words        NIL)
        (403 process-send-kludge-mini-longs           send-kludge-mini-longs        NIL)
        (404 process-send-kludge-char                 send-kludge-char              NIL)
        (405 process-kludge-receive-chars             kludge-receive-chars          NIL)))

(defun crack-fep-command-args (name args)
  (let* ((length (+ 2 (loop for (arg type) in args
                            sum (selectq type (byte 1) (word 2) (addr 3) (long 4)))))
         (array (make-array length ':type 'art-8b ':area working-storage-area))
         (opcode (fep-op-number-from-name name)))
    (if (null opcode) (ferror "FEP command ~A is not defined." name))
    (loop for (arg type) in '((,opcode word) . ,args)
          with code = nil
          for index = 0 then (+ index this-len)
          for this-len = (selectq type (byte 1) (word 2) (addr 3) (long 4))
          do (if (numberp arg)
                 (loop repeat this-len
                       for ppss upfrom #o0010 by #o1000
                       for i upfrom index
                       do (setf (aref array i) (ldb ppss arg)))
               (push '(let ((temp ,arg))
                        ,@(loop repeat this-len
                                for ppss upfrom #o0010 by #o1000
                                for i upfrom index
                                collect '(setf (aref array ,i) (ldb ,ppss temp))))
                     code))
          finally (return opcode length array code))))

(defun fep-op-number-from-name (name)
  (loop for (n fep-name console-name) in *fcn-to-opcode-mappings*
        if (string-equal (string name) (string console-name)) return n
        finally (ferror "No fep op for ~A" name)))

(defun fep-op-number-from-process-function (name)
  (loop for (n fep-name console-name) in *fcn-to-opcode-mappings*
        if (string-equal (string name) (string fep-name)) return n
        finally (ferror "No fep op for ~A" name)))

(defconst *spy-bus-locations*
 '((SPY-CMEM 100)                              ;13 bytes of control-memory read/write data
                                               ;Writes the CMEM WD registers, reads the UIR
   (SPY-SQ-BOARD-ID 116)                       ;Read board ID prom (indexed by U AMRA)
   (SPY-SQ-CTL 116)                            ;Write SQ control register (2 bytes)
   (SPY-SQ-STATUS 120)                         ;Read SQ status (2 bytes)
   (SPY-NEXT-CPC 122)                          ;Read NEXT CPC lines (2 bytes)
   (SPY-OPC 126)                               ;Read micro PC history memory (2 bytes)
   (SPY-TASK 124)                              ;Read current task number
   (SPY-CTOS-HIGH 125)                         ;Read bits 14,15 of CTOS
   (SPY-SQ-STATUS2 125)                        ;Misc status bits
   (SPY-MC-CONTROL 140)                        ;Write only
   (SPY-MC-ID 140)                             ;ID indexed by low 5 bits of SPY-MC-CONTROL
   (SPY-MC-ERROR-STATUS 141)
   (SPY-ECC-SYNDROME 142)                      ;6-0 inverted syndrome bits, 7 error flag
   (SPY-ECC-ADDRESS 143)                               ;1-0 ADDR<1-0>, 7-2 ADDR<23-18>
   (SPY-MC-STATUS 144)
   (SPY-NET-SELECT 150)
   (SPY-NET-CONTROL 151)

   (SPY-DMA-HIGH-ADDRS 214)
   (SPY-DMA-CONTROLLER 220)

   (FEP-BOARD-ID-CONTROL 341)
   (FEP-SERIAL-DMA-AND-CLOCK-CTL 343)
   (FEP-DMA-CONTROL 344)
   (FEP-PROC-CONTROL 345)
   (FEP-LBUS-CONTROL 350)
   (FEP-PADDLE-ID-PROM 240)
   (FEP-BOARD-ID-PROM 300)
```

```
    (MPSC-0-A 200)
    (MPSC-0-B 201)
    (MPSC-1-A 204)
    (MPSC-1-B 205)

    (SPY-LBUS-CONTROL 350)                          ;Lbus control
    (FEP-SERIAL-BAUD-RATE-0 354)
    (FEP-SERIAL-BAUD-RATE-1 356)

    (FEP-HSB-CONTROL 360)
    (FEP-HSB-DATA 362)
    (FEP-HSB-POINTER 364)
    (P-PORT 370)))

(defun eval-spy-symbol (symbol)
  (let ((pair (ass 'string-equal symbol *spy-bus-locations*)))
    (if pair (cadr pair)
      (ferror "Failed to find a definition for spy bus location ~A." symbol))))
;;; These are variables in the fep program that the debugging console program
;;; may want to access.
(defconst *console-communication-variables*
          '((*MACHINE-RUNNING* BOOLE)
            (*UPDATE-STATUS* BOOLE)
            (*SAVE-STATE* BOOLE)
            (*READ-STATE* BOOLE)
            (*SAVED-SQ-STATUS* SQ-STATUS)
            (*UIR-SAVED* BOOLE)
            (*SEQUENCER-SAVED* BOOLE)
            (*IO-MD-SAVED* BOOLE)
            (*EMU-MD-PAIR-SAVED* BOOLE)
            (*VMA-SAVED* BOOLE)
            (*PHTA-ASN-SAVED* BOOLE)))
;;; 'this put into the compiler.
#+cadr
(eval-when (compile eval load)
  compiler:(DEFMIC sys:%SEND-BYTES 730
            (UB-LOC CHECKSUM-SEED NUMBER-OF-BYTES ART-8B-ARRAY STARTING-IDX) T)
  compiler:(DEFMIC sys:%RECEIVE-BYTES
                 731 (UB-LOC CHECKSUM-SEED NUMBER-OF-BYTES ART-8B-ARRAY STARTING-IDX) T))

;;; Rotate a 16 bit quantity left one bit.  (Frequently defined elsewhere.)
(remprop 'rot-1-16 ':source-file-name)
(defmacro rot-1-16 (value) `(let ((val ,value)) (dpb val #o0117 (lsh val -15.))))
```

F:>lmach>fep>Fep-macros.lisp.9

```
;;; -*- Mode:LISP; Package:LIL; Base:8; Lowercase:Yes -*-
;;; (c) Copyright 1982, Symbolics, Inc.

;This module knows about words containing various bit fields
;Entries:
; DEFWORD - define a "data type" and its fields
; BUILD - a macro that allows words to be constructed
; FIELD - a macro that allows words to be taken apart

;Options is a list of options, as follows:
;        :COMMA - put commas between fields (otherwise there are two spaces)

;A word description is a list of field descriptions
;A field description is generally:
;      (type name args...)
;The field name is a string, used on input and output, or a list
;(input-name output-name); output-name may be omitted and no field name is typed out.
;The input-name is used on input and in the BUILD macro.
;The field name may also be (input-name output-name default-value)
;which is sometimes more convenient than specifying the default value
;with a NIL in the possibilities list, and allows the default for input to
;still get typed out.

;Specifically one of the following:
```

```
;      (:BIT name bit-number true-string false-string)
;        If either string is NIL or omitted, the bit is ignored in that state,
;        which is considered to be the default.
;        If both strings are omitted, the bit is typed out as 1 or 0
;      (:BYTE name n-bits bits-over value-strings...)
;        If there are no value strings, the byte is typed out numerically.
;        Otherwise the value strings are for consecutive byte values starting
;        with 0.  NIL means the default value (nothing is typed out).
;        T means to type the corresponding number (no symbol exists.)
;        Running off the end of the list of value strings is the same as T.
;      (:CASE n-bits bits-over clauses...)
;        Selects the clause corresponding to the value of the specified byte field
;        A clause is a list of field descriptions.
;         -- Restrictions: no default field values from case clauses in BUILD,
;            because it doesn't know which case it is.  Also BUILD can't deal with
;            name conflicts between fields in different case clauses.
;      (:PRINT string)
;        Constant string, mainly useful inside of :CASE
;      (:ADDRESS segment-variable n-bits bits-over)
;        The byte specified, or the whole word if n-bits and bits-over are omitted,
;        is printed as an address in the specified segment.
;Trivial support

(defun byte (bits bits-over)
  (if (> bits 77) (ferror nil "Byte field too wide (maximum of 63. bits)"))
  (+ (lsh bits-over 6) bits))

#+Cadr                                              ;Gratitous incompatibility
(compiler:add-optimizer byte optimize-if-constant-args)
(defun optimize-if-constant-args (form)
  (if (loop for x in (cdr form) always (constant-form-p x))
      (list 'quote (eval form))
      form))

(remprop 'constant-form-p 'source-file-name)    ;inhibit warnings...
(defun constant-form-p (form)
  (or (numberp form) (stringp form) (eq form t) (eq form nil)
      (and (listp form) (eq (car form) 'quote))))
;(defmacro defword (type-name options &rest description)
;  '(eval-when (compile load eval)
;     (defprop ,type-name (,options . ,description) word-description)))

;;; This is the macro that is called by actual LIL code
(defmacro lil-defwords (&rest type-names)
  (pkg-bind #.(pkg-name package)
    (cons 'progn
          (loop for type-name in type-names
                append (let ((n-bits (get-defword-length type-name))
                             type)
                         (if (> n-bits 32.)
                             '((deftype ,type-name (array byte ,(// (+ 7 n-bits) 8.))
                                 default-mode ref)
                               (deftype ,(fintern "~A-PTR" type-name) (pointer ,type-name)))
                               ;; If ≤ 32 bits, then make a union type structure.
                               (cond ((≤ n-bits 8.) (setq type 'byte))
                                     ((< n-bits 16.) (setq type 'word))
                                     (t (setq type 'long)))
                               '((deftype ,type-name ,type allow-arithmetic t)))))))
;E.g. (BUILD MICROINSTRUCTION CPC NAF NAF LOC)
; here the CPC field gets NAF, a constant, and the NAF field gets LOC, a variable.
; A variable is any symbol not a constant.  Any list is an expression to be evaluated.
(defmacro lil-build (type &rest fields)
  (multiple-value-bind (def iorm andcam runtime) (crack-fields type fields)
    (let* ((leng (get-defword-length type))
           (mask (1- (ash 1 leng)))
           (andm (logxor andcam mask)))
      (setq def (logior iorm (logand andm def)))
      (if (≤ leng 32.)
          ;; If it's one of the ones that fit in a longword
          (loop with val = def
```

```
              for (pos siz field) in runtime
              do (setq val '(dpb ,field ,(+ (lsh pos 6) siz) ,val))
              finally (return val))
        ;; if it won't fit in a longword, then the type is simply an array type
        (let ((val '(constant ,type
                    ,@(loop repeat (// (+ leng 7) 8)
                            for ppss upfrom #o0010 by #o1000
                            collect (ldb ppss def)))))
          (when runtime
            (setq val '(let ((temp ,val))
                        ,@(loop for (pos siz field) in runtime
                                collect '(insert-uword-field ,pos ,siz temp ,field))
                        temp)))
          val)))))

(defun maybe-swap-bytes (wd)
  (if *bdlc* wd
    (logior (logand 77600377 (ash wd -8.))
            (logand 37700177400 (ash wd 8)))))

(defmacro lil-change (type item &rest fields)
  (multiple-value-bind (def iorm andcam runtime) (crack-fields type fields)
    (ignore def)
    (let* ((leng (get-defword-length type))
           (mask (1- (ash 1 leng)))
           (andm (logxor andcam mask)))
      (setq iorm (maybe-swap-bytes iorm)
            andm (maybe-swap-bytes andm))
      (if (> leng 32.) (ferror nil "I can't change ~As." type))
      (setq item (cond ((and (zerop iorm) (zerop andcam)) item)
                       ((zerop iorm) '(LOGAND ,ANDM ,ITEM))
                       ((zerop andcam) '(LOGIOR ,IORM ,ITEM))
                       (t '(LOGIOR ,IORM (LOGAND ,ANDM ,ITEM)))))
      (loop with val = item
            for (pos siz field) in runtime
            do (setq val '(dpb ,field ,(+ (lsh pos 6) siz) ,val))
            finally (return val)))))

(defmacro lil-alter (type-name word &rest f-v-pairs &aux descl options)
  (if (neq type-name 'microinstruction) (ferror nil "not till size unresolved arrays..."))
  (multiple-value (options descl) (get-defword-description type-name))
  '(progn
     ,@(loop for (name val) on f-v-pairs by 'cddr
             for desc = (or (find-desc-for-named-field name descl)
                            (ferror nil "~S undefined field name in a ~S" name type-name))
             for nval = (selectq (car desc)
                          (:bit (or (byte-value-lookup val (cdddr desc) 1) val  ;?? suck
                                    (ferror nil "~S not a defined field value." val)))
                          (:byte (or (byte-value-lookup val (cddddr desc)) val  ;?? suck
                                     (ferror nil "~S not a defined field value." val)))
                          (OTHERWISE (FERROR NIL "Can't handle this descriptor: ~S" DESC)))
             collect (multiple-value-bind (p s) (get-field-p-s type-name name)
                       '(insert-uword-field ,p ,s ,word ,nval)))))
      ;Routine to "crack" the fields of a word.
      ;Returns the following values.
      ; First the "defaults" as a bignum
      ; Second, a mask of the bits forced true.
      ; Third, a mask of the bits forced off
      ; A list of (pos siz val) triplets for field values that aren't known at compile time.
      (defun crack-fields (type-name fields
                           &aux descl options (iorm 0) (andcam 0) (default 0) runtime tem)
        (multiple-value (options descl) (get-defword-description type-name))
        ;First pass--fill in the defaults for this type of word
        (dolist (desc descl)
          (selectq (car desc)
            (:bit (if (or (and (listp (cadr desc)) (eq (caddr (cadr desc)) 1))
                          (and (> (length desc) 3)          ;If default value of bit is 1
                               (null (cadddr desc))))
                      (setq default (logior (ash 1 (caddr desc)) default))))
            (:byte (if (and (listp (cadr desc)) (cddadr desc))
                       (setq default (dpb (caddr (cadr desc))
                                          (byte (caddr desc) (cadddr desc)) default))
```

```
            (loop for val in (cdr (cddddr desc))
                  as n upfrom 1
                  when (null val)
                    return (setq default (dpb n (byte (caddr desc) (cadddr desc))
                                              default)))))
    (:case )))        ;Can't be handled reasonably
;Second pass--collect all the constant fields into WORD
(loop for (name val) on fields by 'cddr
      as desc = (find-desc-for-named-field name descl)
      when (null desc)
        do (ferror nil "~S undefined field name in a ~S" name type-name)
      else do
        (selectq (car desc)
          (:bit (if (and (atom val) (setq tem (byte-value-lookup val (cdddr desc) 1)))
                    (if (zerop tem)
                        (setq andcam (logior andcam (ash 1 (caddr desc))))
                      (setq iorm (logior iorm (ash 1 (caddr desc)))))
                  (push '(,(caddr desc) 1 ,val) runtime)))
          (:byte (let* ((siz (caddr desc))
                        (pos (cadddr desc))
                        (msk (1- (ash 1 siz))))
                   (cond ((and (atom val) (setq tem (byte-value-lookup val (cddddr desc))))
                          (setq iorm (logior iorm (ash tem pos)))
                          (setq andcam (logior andcam (ash (logxor tem msk) pos))))
                         (t (push '(,pos ,siz ,val) runtime)))))
          (otherwise (ferror nil "Can't handle this descriptor: ~S" desc))))
(values default iorm andcam runtime))
(defun get-field-p-s (type-name field-name &aux descl options desc)
  (multiple-value (options descl) (get-defword-description type-name))
  (or (setq desc (find-desc-for-named-field field-name descl))
      (ferror nil "~S is not a field of a ~S" field-name type-name))
  (selectq (car desc)
    (:bit (values (caddr desc) 1))
    (:byte (values (cadddr desc) (caddr desc)))
    (otherwise (ferror nil "Can't handle this descriptor: ~S" desc))))

(defun find-desc-for-named-field (name descl)
  (prog find-desc-for-named-field ()
    (dolist (desc descl)
      (cond ((eq (car desc) ':case)
             (dolist (descl (cdddr desc))
               (if (setq desc (find-desc-for-named-field name descl))
                   (return-from find-desc-for-named-field desc))))
            ((eq (car desc) ':print))
            ((string-equal (if (listp (cadr desc)) (caadr desc) (cadr desc)) name)
             (return-from find-desc-for-named-field desc))))))

(defun byte-value-lookup (val possibilities &optional backwards)
  (cond ((or (numberp val) (listp val)) val)
        ((loop for poss in possibilities as n upfrom 0
               when (if (or (eq poss nil) (eq poss t)) (eq val poss)
                        (string-equal val poss))
                 return (if backwards (- backwards n) n)))
        (t nil)))

;;; This returns the length of a DEFWORD defined word
(defun get-defword-length (word-name)
  (multiple-value-bind (ignore descl) (get-defword-description word-name)
    (if (null descl) (ferror "~&~A has not been defined by DEFWORD." word-name))
    (loop for field in (cdr descl)
          maximize (selectq (car field)
                     (:bit (1+ (third field)))
                     (:byte (+ (third field) (fourth field)))
                     (otherwise 0)))))

;;; This gets the defword description given the word name
(deff get-defword-description 'user:get-defword-description)
```

```
(defconst *sysdfl* (with-open-file (stream "F:>LMach>sysdfl.lisp")
                     (loop with eof = (ncons nil)
                           for form = (read stream eof)
                           until (eq form eof)
                           collect form)))

(defconst *sysdef* (with-open-file (stream "F:>LMach>Sysdef.lisp")
                     (loop with eof = (ncons nil)
                           for form = (read stream eof)
                           until (eq form eof)
                           collect form)))

(defmacro define-sysdfl-atommacros (&body forms)
  `(progn 'compile
     ,@(loop for (area . locs) in forms
             append (loop for name in locs
                          for sys-name = (if (atom name) name (car name))
                          for lil-name = (if (atom name) name (cadr name))
                          collect `(defatommacro ,lil-name
                                     ',(sysdfl-symeval area sys-name))))))

(defun sysdfl-symeval (area sym-name)
  (loop for (type a-name . locs) in *sysdfl*
        do (if (and (eq type 'define-magic-locations)
                    (eq (car a-name) area))
               (let ((offset (getl a-name '(a-memory-address virtual-address)))
                     (addr (loop for loc in locs
                                 for i upfrom 0
                                 do (if (eq sym-name (if (atom loc) loc (cadr loc)))
                                        (return i)))))
                 (if (and offset addr)
                     (return (+ addr (cadr offset))))))
        finally (ferror "Couldn't find value in sysdfl for ~A." sym-name)))

(defmacro define-sysconstant (&body names)
  `(progn 'compile
     ,@(loop for name in names
             for sys-name = (if (atom name) name (car name))
             for lil-name = (if (atom name) name (cadr name))
             collect `(defatommacro ,lil-name ',(sysdef-symeval sys-name)))))

(defun sysdef-symeval (name)
  (loop named top
        for (type . body) in *sysdef*
        do (selector type string-equal
             ("defsysconstant"
               (if (string-equal name (car body)) (return (cadr body))))
             ("defsysbyte"
               (if (string-equal name (car body))
                   (return (+ (second body) (lsh (third body) 6)))))
             ("defenumerated"
               (let (;(e-name (first body))
                     (fields (second body))
                     (start (or (third body) 0))
                     (increment (or (fourth body) 1)))
                 (loop for field in fields
                       for i upfrom start by increment
                       do (when (string-equal field name)
                            (return-from top i)))))
             ("defstorage" )
             (otherwise (ferror "Unknown sysdef field type ~A." type)))
           finally (ferror "No sysdef definition found for ~A." name)))

;;; Returns a triplet of (word-offset, field size in bits, field offset in bits.)
(defun sysdef-defstorage-symeval (name)
  (loop named top
        for (type . body) in *sysdef*
        do (when (string-equal type "defstorage")
             (loop for fields in (cdr body)
                   for word upfrom 0
```

```
  for val = (sysdef-defstorage-symeval-1 name word fields)
                do (if val (return-from top val))))))

(defun sysdef-defstorage-symeval-1 (name offset fields)
  (if (atom (first fields))
      (if (string-equal name (first fields))
          (list offset (second fields) (third fields)))
    (loop for field in fields
          for val = (sysdef-defstorage-symeval-1 name offset field)
          do (if val (return val)))))

(defmacro lil-remote-load-field (name pointer)
  (let* ((osp (sysdef-defstorage-symeval name))
         (offset (first osp))
         (size (second osp))
         (pos (third osp)))
    (if (or (null size) (null pos))
        `(read-fixnum-from-lbus (+ ,offset ,pointer))
      `(ldb ,(+ size (lsh pos 6)) (read-fixnum-from-lbus (+ ,offset ,pointer))))))

;;; -*- Package: USER; Mode: LISP; Base: 8 -*-
;;; (c) Copyright 1982, Symbolics, Inc.

(DEFVAR *DEFWORD-ALIST* ())                           ;a list of word definitions

;;; Just add the definition to the alist first removing any previous definition
(EVAL-WHEN (COMPILE LOAD EVAL)
(DEFUN ADD-DEFWORD-DESCRIPTION (FORM)
  (SETQ *DEFWORD-ALIST*
        (CONS FORM (DELQ (ASS 'STRING-EQUAL (CAR FORM) *DEFWORD-ALIST*)
                         *DEFWORD-ALIST*)))))

(DEFUN GET-DEFWORD-DESCRIPTION (NAME)
  (DECLARE (RETURN-LIST OPTIONS DESCL))
  (LET ((RESULT (ASS 'STRING-EQUAL NAME *DEFWORD-ALIST*)))
    (IF (NULL RESULT) (FERROR "~S not defined with DEFWORD" NAME))
    (VALUES (CADR RESULT) (CDDR RESULT))))

;;; Use this to define a new "word".
(DEFMACRO DEFWORD (NAME OPTIONS &BODY BODY)
  `(EVAL-WHEN (LOAD EVAL)
     (ADD-DEFWORD-DESCRIPTION '(,NAME ,OPTIONS ,@BODY))))


;Options is a list of options, as follows:
;       :COMMA - put commas between fields (otherwise there are two spaces)

;A word description is a list of field descriptions
;A field description is generally:
;       (type name args...)
;The field name is a string, used on input and output, or a list
;(input-name output-name); output-name may be omitted and no field name is typed out.
;The input-name is used on input and in the BUILD macro.
;The field name may also be (input-name output-name default-value)
;which is sometimes more convenient than specifying the default value
;with a NIL in the possibilities list, and allows the default for input to
;still get typed out.

;Specifically one of the following:
;       (:BIT name bit-number true-string false-string)
;         If either string is NIL or omitted, the bit is ignored in that state,
;         which is considered to be the default.
;         If both strings are omitted, the bit is typed out as 1 or 0
;       (:BYTE name n-bits bits-over value-strings...)
;         If there are no value strings, the byte is typed out numerically.
;         Otherwise the value strings are for consecutive byte values starting
;         with 0.  NIL means the default value (nothing is typed out).
;         T means to type the corresponding number (no symbol exists.)
;         Running off the end of the list of value strings is the same as T.
;       (:CASE n-bits bits-over clauses...)
;         Selects the clause corresponding to the value of the specified byte field
;         A clause is a list of field descriptions.
;          -- Restrictions: no default field values from case clauses in BUILD,
;             because it doesn't know which case it is.  Also BUILD can't deal with
;             name conflicts between fields in different case clauses.
;       (:PRINT string)
;         Constant string, mainly useful inside of :CASE
;       (:TERPRI)
;         Advance to next line
;       (:ADDRESS segment-variable n-bits bits-over)
;         The byte specified, or the whole word if n-bits and bits-over are omitted,
;         is printed as an address in the specified segment.
```

```
;;; FEP Status stuff

(DEFWORD FEP-SER-DMA-CONTROL (:COMMA)
        (:BYTE A-DMA 2 0 "Xmit A" "Rcv A" "Xmit B" "Rcv B")     ;Operation to DMA
        (:BYTE B-DMA 2 2 "Xmit A" "Rcv A" "Xmit B" "Rcv B")
        (:BIT  RX2-CLK 4 "Rx2 External")                        ;Channel A of second MPSC
        (:BIT  (TX2-CL1) 6 "Tx2 External"))

(DEFWORD FEP-DMA-MODE (:COMMA)
        (:BYTE CHANNEL 2 0)
        (:BYTE DIRECTION 2 2 "Verify" "Write" "Read" "Illegal")
        (:BIT (AUTO-INIT) 4 "Auto initialize")
        (:BIT (COUNT-DOWN) 5 "Decrement")
        (:BYTE (MODE) 2 6 "Demand" "Single" "Block" "Cascade"))

(DEFWORD FEP-DMA-COMMAND (:COMMA)
        (:BIT MEMORY-TO-MEMORY 0 "Enable")
        (:BIT CH-0-ADDRESS-HOLD 1 "Hold")
        (:BIT CONTROLLER-ENABLE 2 "Disable")
        (:BIT TIMING 3 "Compressed")
        (:BIT PRIORITY 4 "Rotating" "Fixed")
        (:BIT SELECTION 5 "Extended" "Late")
        (:BIT DREQ 6 "Active low" "Active high")
        (:BIT DACK 7 "Active low" "Active high"))

(DEFWORD FEP-HSB-CONTROL (:COMMA)
        (:BIT (SPY-DMA-ENB) 0 "Spy DMA Enb" "¬Spy DMA Enb")
        (:BIT (WRITE-TO-DEV) 1 "Write to dev" "Read from dev")
        (:BIT (DRIVE-BUSY) 2 "Drive busy")
        (:BIT (INT-ENB) 3 "Int Enb")
        (:BIT (COUNT-UP) 4 "Count up" "Count down")
        (:BIT (BUSY) 5 "Busy")
        (:BIT (NOT-SPY-DMA-BUSY) 6 NIL "Spy DMA busy")
        (:BIT (DMA-SETUP) 7 "DMA setup"))

(DEFWORD FEP-LBUS-CONTROL-REV-1 (:COMMA)
        (:BIT (ECC-DIAG) 0 "ECC Diag")
        (:BIT (DOORBELL-INT-ENB) 1 "Doorbell Int Enb")
        (:BIT (SPECIAL-LOAD-MD) 2 "Special Load-MD")
        (:BIT (OBUS-TO-LBUS) 3 "Obus to Lbus")
        (:BIT (TASK-3-REQ) 8 "Task 3 Req")
        (:BIT (DOORBELL) 9 "Doorbell"))

(DEFWORD FEP-LBUS-CONTROL (:COMMA)
        (:BIT (ECC-DIAG) 0 "ECC Diag")
        (:BIT (DOORBELL-INT-ENB) 1 "Doorbell Int Enb")
        (:BIT (USE-UNC-DATA) 2 "Use Uncorrected Data")
        (:BIT (IGN-DOUBLE-ECC) 3 "Ignore Double ECC Error")
        (:BIT (TASK-3-REQ) 8 "Task 3 Req")
        (:BIT (DOORBELL) 9 "Doorbell")
        (:BIT (NOT-BUSY) 10. NIL "Lbus Buffer Busy")
        (:BIT (SOME-PAR-ERR) 11. "Lbus Buffer Some Parity Error"))

(DEFWORD FEP-BOARD-ID-CONTROL-REV-1 (:COMMA)
        (:BIT (CONTINUITY) 0 "Continuity")
        (:BIT (NOT-ID-REQ) 1 NIL "Lbus ID Req")
        (:BYTE ID-ADR 5 2))

(DEFWORD FEP-BOARD-ID-CONTROL (:COMMA)
        (:BIT (CONTINUITY) 0 "Continuity")
        (:BIT (NOT-ID-REQ) 1 NIL "Lbus ID Req")
        (:BIT (HALF-SPEED) 7 "Half Speed"))

(DEFWORD FEP-PROC-CONTROL (:COMMA)
        (:BIT (POWER-RESET) 0 "Lbus Power Reset")
        (:BIT (LBUS-RESET) 1 "Lbus Reset")
        (:BIT (NOT-CLEAR-ERRORS) 2 NIL "Clear Errors")
        (:BIT (NOT-INT-ENB) 3 NIL "FEP Int Enable")
        (:BIT (KEPT-ALIVE) 4 "Kept Alive")
        (:BIT (NOT-POWER-RESET-READBACK) 5 NIL "Lbus Power Reset (on bus)")
        (:BIT (NOT-LBUS-RESET-READBACK) 6 NIL "Lbus Reset (on bus)")
        (:BIT (RAM-PARITY-ERROR) 7 "FEP Ram Par Err"))

; Control register bits (SPY-SQ-CTL)

(DEFWORD SQ-CTL (:COMMA)
        (:BIT (RUN) 0 "Run" "¬Run")
        (:BIT (STEP) 1 "Step")
        (:BIT (ENABLE-DP) 2 "Enable-DP" "Disable-DP")
        (:BIT (ENABLE-SQ) 3 "Enable-SQ" "Disable-SQ")  ;This bit is inverted in the hardware
        (:BIT (ENABLE-CMEM) 4 "Enable-Cmem" "Disable-Cmem")
        (:BIT (CMEM-WRITE) 5 "Cmem-Write")
        (:BIT (ENABLE-TRAP) 6 "Enable-Trap")
        (:BIT (ENABLE-ERRHALT) 7 "Enable-Errhalt")
        (:BIT (ENABLE-TASK) 8 "Enable-Task")
        (:CASE 1 8 ((:BYTE "Forced-Task" 4 9)) ())
        (:BIT (ENABLE-WP) 13. "Enable-RAM-WP" "Disable-RAM-WP"))

; Status bits (SPY-SQ-STATUS)
```

```
(DEFWORD SQ-STATUS (:COMMA)
        (:BIT (SPARE-LOST) 0 "Spare-error-bit?")
        (:BIT (GC-MAP-LOST) 1 "GC-Map-parity-error")
        (:BIT (TYPE-MAP-LOST) 2 "Type-map-parity-error")
        (:BIT (PAGE-TAG-LOST) 3 "Page-Tag-parity-error")
        (:BIT (AMEM-LOST) 4 "A-memory-parity-error")
        (:BIT (BMEM-LOST) 5 "B-memory-parity-error")
        (:BIT (MC-LOST) 6 "MC-error (map, ifu, or main mem)")
        (:BIT (AU-LOST) 7 "AU-error")
        (:BIT (HALTED) 8 "Microcode-halted")
        (:BIT (CTOS1-LOST) 9 "CTOS-low-parity-error")
        (:BIT (CTOS2-LOST) 10. "CTOS-high-parity-error")
        (:BIT (TSKM-LOST) 11. "Task-state-memory-parity-error")
        (:BIT (UIR-PAR-EVEN) 12. "Control-memory-parity-error")
        (:BIT (CTOS-CAME-FROM-IFU) 13. "CTOS-came-from-IFU")
        (:BIT (TSK-STOP) 14. "TSK-STOP (sequencer stopped)")   ;Basically ERRHALT or -RUN
        (:BIT (-ERRHALT) 15. NIL "Errhalt-Sync")       ;rev.3 only
        ;; More status bits (SPY-SQ-STATUS2)
        (:BIT (NOT-MC-WAIT) 18. NIL "MC Wait")
        (:BIT (TASK-SWITCH) 19. "Task Switch"))
;Microinstruction definition
;For now we don't try to do anything fancy with field overlapping, just use
;the bit names in the prints
;Want to exploit conditionals and subroutines later
(DEFWORD MICROINSTRUCTION ()
        (:BYTE AMRA 12. 0)
        (:BYTE AMRA-SEL 2 12. NIL "Lbus addr" "Base+Offset" "Base//Memory//MC//Bus device")
        (:BIT (STKP-COUNT) 15. "Count STKP")   ;a clear case for more hair in FORMAT...
        (:BYTE AMWA 12. 16.)
        (:BYTE (AMWA-SEL AMWA-SEL 3) 2. 28. NIL "Base+Offset" "Same as read"
                                        "Memory//MC//Bus device//nothing")
        (:BYTE BMRA 8 32.)
        (:BYTE (BMWA BMWA 17) 4 40.)
        (:BIT BMEM-FROM-XBUS 44. "Bmem←Xbus" "Bmem←Obus")
        (:TERPRI)
        (:BYTE MEM 3 45. NIL "Microdevice" "Read" "Write"
                        "Reserve" "Load VMA" "Block Read" "Block Write")
        (:BYTE SPEC 5 48. "Load R" "Load S" "Load STKP" "Load FRMP"
                        "Load XBAS" "Load DP Ctl" "Write TYPE//GC mem" "Clear Stack Offset"
                        "Arithmetic Trap Enable" "Trap if Type Cond"
                          "Trap if Type Cond or Bbus not Fixnum" "Multiply with Type Check"
                        "Magic Crocks" "ALUB Sign Hack" "Crocks to Ybus" "Multiply"
                        NIL "Addr From Abus" "Inhibit Page Tags" "DMA"
                          "Use PHTA" "Check Write Access" T "IFU Control"
                        "Arithmetic Trap Enable with Dispatch" "Halt" "NPC Magic"
                          "Awaken Task"
                        "Write Task" "Disable Tasking" T T)
        (:BYTE MAGIC 4 53.)
        (:BYTE COND 5 57. "Cdr=0" "Cdr=1" "Cdr=2" "Cdr=3"
                        "Type Cond" "Bbus not Fixnum" "ALUB<0>" "YBUS<31>"
                        "-GC Condemned Temp" "-GC This Stack" "-GC Other Stack"
                          "ALU<27-0>=0"
                        "ALU<31-0>=0" "ALU<33-0>=0" "-Carry<28>" "-Carry<32>"
                        "ALU<31>" "Sequence Break" "Trace Flag 1" "Trace Flag 2"
                        "-Lbus Dev Cond" "MC Cond" T T T T "-CTOS came from IFU" T
                        T T T T)
        (:BYTE COND-FUNC 2 62. NIL "Skip if false" "Trap if true" "Trap if false")
        (:TERPRI)
        (:BYTE ALU 4 64.            ;---For now leave out the weird ones
              "Xbus" "AluB" "X+1" "X-1" "X+Y" "X-Y" "X+Y+1" "X-Y-1" "AND" "IOR" "XOR")
        (:BYTE BYTE-FUNC 2 68. NIL "Magic# Kludges" "R=0 S=COND" "General")
        (:BYTE XYBUS-SEL 1 14. "A→X B→Y" "A→Y B→X")
        (:BIT OBUS-LTYPE 76. NIL "Magic#")
        (:BYTE OBUS-HTYPE 3 73. "Abus" "Bbus" "Bbus<5-4>" T
                        "Const 0" "Const 1" "Const 2" "Const 3")
        (:BYTE OBUS-CDR 3 70. "Abus" "Bbus" "Bbus<7-6>" T
                        "Const 0" "Const 1" "Const 2" "Const 3")
        (:BYTE TYPE-MAP-SEL 6 96. NIL)
        (:BYTE AU-OP 8 102. NIL)
        (:TERPRI)
        (:BYTE SEQ 2 30. NIL "Pushj" "Dismiss" "Popj")
        (:BYTE CPC 2 77. "NAF" "CTOS" "NPC" T)
        (:BYTE (NPC NPC 1) 1 79. "Dispatch" "Next CPC+1")
        (:BYTE NAF 14. 80.)
        (:BYTE (SPEED SPEED 3) 2 94.)           ;default to slowest speed
        (:BIT SPARE 110. SPARE-BIT-110)
        (:BIT PARITY 111. PARITY))

      (DEFWORD C-MEM-ADDRESS ()
        (:ADDRESS LCONS:*C-MEM-SEGMENT*))

      (DEFWORD OPC-HISTORY ()
        (:BIT (TASK-SWITCH) 15. "Task-Switch" NIL)
        (:BIT (NOT-NOP) 14. NIL "Nop")
        (:ADDRESS LCONS:*C-MEM-SEGMENT* 14. 0))
```

```
;NOTE NOTE NOTE NOTE NOTE NOTE
;Bits 0,3 are complemented in the rev-1, rev-1A, rev-2 hardware
;Bits 0,1,3 are complemented in the rev-5 hardware
(DEFWORD MC-CONTROL (:COMMA)     ;The default value needs to be zero for some code to work
        (:BIT (ECC-DRIVE-DISABLE) 0 "Disable MC to LBUS<42:36>" NIL)
        (:BIT (ECC-CORRECT-DISABLE) 1 "Disable memory error correction" NIL)
        (:BIT (OBUS-TO-LBUS) 2 "Force Obus onto Lbus" NIL)
        (:BIT (ERROR-RESET) 3 "Clear error registers" NIL)
        (:BIT (MAP-A-DISABLE) 4 "Map A Disable" NIL)
        (:BIT (MAP-B-DISABLE) 5 "Map B Disable" NIL)
        (:BIT (SPECIAL-LOAD-MD) 6 "Force LBUS write data into MD" NIL)
        ;bit 7 spare
        )

(DEFWORD MC-ERROR-STATUS (:COMMA)
        (:BIT (DOUBLE-BIT-ERROR) 0 "Double bit error" NIL)
        (:BIT (MAP-A-PARITY-ERROR) 1 "Map A parity error" NIL)
        (:BIT (MAP-B-PARITY-ERROR) 2 "Map B parity error" NIL)
        (:BIT (DOUBLE-MAP-HIT) 3 "Hit in both map A and map B" NIL))
(DEFWORD MC-STATUS (:COMMA)
        (:BIT ADDR-IN-AMEM 0)
        (:BYTE VMA-MD-OFFSET 2 1)
        (:BIT VMA-FOR-MD-0 3)
        (:BIT IFU-EMPTY 4))
(DEFWORD NET-STATUS (:COMMA)
  (:BYTE "Task:" 4 0.)
  (:BIT (CPU-RCV-ENABLE) 4. "CPU receive enable" "CPU transmit enable")
  (:BYTE "Input byte count:" 2 5.)
  (:BIT (BACKOFF-ENABLED) 7. "Backoff enabled")
  (:BIT (BUFFER-OVERFLOW) 8. "Buffer overflow")
  (:BIT (NET-COLLISION) 9. "Net collision")
  (:BIT (PREAMBLE-ERROR) 10. "Preamble error")
  (:BIT (ALIGNMENT-ERROR) 11. "Alignment error")
  (:BIT (CRC-ERROR) 12. "CRC error")
  (:BIT (PKT-RECEIVED) 13. "Packet received")
  (:BIT (CABLE-BUSY) 14. "Cable busy")
  (:BIT (XMT-REQUEST) 15. "Transmit request")
  (:BIT (RECEIVE-CLK) 16. "Receive clock")
  (:BIT (RECEIVE-DATA) 17. "Receive data")
  (:BIT (DATA-VALID) 18. "Data valid")
  (:BIT (COLLISION-DETECT) 19. "Collision detect")
  (:BIT (TEST-CABLE-BUSY) 20. "Cable busy(test)")
  (:BIT (TRANSMIT-CLK) 21. NIL "Transmit clock")
  (:BIT (TRANSMIT-DATA) 22. "Transmit data")
  (:BIT (CRC-DATA) 23. "CRC data")
  (:BIT (NET-START) 24. NIL "Net start")
  (:BIT (WAIT-FOR-PKT) 25. NIL "Wait for packet")
  (:BIT (PREAMBLE-0) 26. NIL "Preamble 0")
  (:BIT (PREAMBLE-1) 27. NIL "Preamble 1")
  (:BYTE "Transmit state:" 2 28.)
  (:BIT (PKT-BEING-TRANSMITTED) 30. NIL "Packet being transmitted")
  (:BIT (PREAMBLE-DATA) 31. "Preamble data")
  )
(DEFWORD NET-DIAG (:COMMA)
  (:BIT (RECEIVE-CLOCK) 16. "RCV Clock")
  (:BIT (RECEIVE-DATA) 17. "Data 1")
  (:BIT (DATA-VALID) 18. "Data Valid")
  (:BIT (COLLISION) 19. "Collision")
  (:BIT (BUSY) 20. "Busy")
  (:BIT (TRANSMIT-CLOCK) 21. NIL "XMT Clock")
  )

(DEFWORD VD-DIAG (:COMMA)
  (:BYTE "Display Nibble:" 8. 0)
  (:BYTE "DMAG:" 2 8. "UPC" "AR" "TOS" "D")
  (:BIT (LAR) 10. "Load AR")
  (:BYTE "Stack:" 2 11. "Pop" "Push" "Nop" "Nop")
  (:BIT (ZERO) 13. NIL "Zero")
  (:BIT (INC) 14. "Increment")
  (:BIT (SYNC-DATA) 15. "Sync data"))
(DEFWORD VD-STATUS (:COMMA)
  (:BIT (VD-BOW-MODE) 0 "BOW Mode")
  (:BIT (VSYNC-TASK-ENABLE) 1 "VSync Task enable")
  (:BIT (VSEQ-ENABLE) 2 "Sequencer enable")
  (:BIT (VSEQ-RUN) 3 "Sequencer run")
  (:BIT (VWAKEUP) 6 "Wakeup")
  (:BIT (VSEQ-STEP) 7 "Single step")
  (:BIT (VSYNC) 8. "Vertical Sync")
  (:BIT (HSYNC) 9. "Horizontal Sync")
  (:BIT (BLANK) 10. "Blanking")
  (:BIT (AUDIO-CYCLE) 11. "Audio cycle")
  (:BIT (DISPLAY-CYCLE) 12. "Display cycle")
  (:BIT (REFRESH-CYCLE) 13. NIL "Refresh cycle")
  (:BIT (LPTR-CYCLE) 14. NIL "Line pointer cycle")
  (:BIT (PROC-CYCLE) 15. NIL "Processor cycle")
  (:BYTE "Sync address:" 11. 16.)
  (:BYTE "Sync inst:" 4 27. "JZero" "Cond JSB PL" "Jump MAP" "Cond jump PL"
         "Push//Cond LD CTR" "Cond JSB R//PL" "Cond jump VEC" "Cond Jump R//PL"
         "Repeat Loop, CTR≠0" "Repeat PL, CTR≠0" "Cond RET" "Cond jump PL & Pop"
```

```
        "Load CTR" "Test end loop" "Continue" "Three way branch")
    (:BIT (RLD-L) 31. NIL "Sync CC")
    )
;;; Register formats

(DEFWORD DISK-COMMAND (:COMMA)
    (:BYTE BUS 11. 0)
    (:BIT (DBUS-IN) 11. "Bus from disk")
    (:BIT (UNIT-TAG) 12. "Unit tag")
    (:BIT (CYL-TAG) 13. "Cyl tag")
    (:BIT (HEAD-TAG) 14. "Head tag")
    (:BIT (CONTROL-TAG) 15. "Control tag")
    (:BYTE UNIT 4 16.)
    (:BIT (TAG-4) 18. "Fujitsu tag-4")
    (:BIT (TAG-5) 19. "Fujitsu tag-5")
    (:BYTE CMD 4 20. "Read-36" "Read-32" "Read-8" 3
                     4 5 "Await-sector" "Error-correct"
                     "Write-36" "Write-32" 12 13
                     "Read//compare-36" "Read//compare-32" "Write-all" 17)
    (:BIT (START) 24. "Start")
    (:BYTE TASK 4 25.)
    (:BIT (FEP-USING-DISK) 29. "FEP using disk")
    (:BIT (36-BIT-MODE) 30. "36-bit-mode" "32-bit-mode")
    (:BIT (SPARE) 31. "spare-bit-31"))

(DEFWORD DISK-ECC (:COMMA)
    (:BYTE ERROR-PATTERN 11. 0)
    (:BYTE BIT-NUMBER 5 11.))

(DEFWORD DISK-DIAG (:COMMA)
    (:BIT READ-CLK 0)
    (:BIT SERVO-CLK 1)
    (:BIT READ-DATA 2)
    (:BIT INDEX 3)
    (:BIT SECTOR 4))

(DEFWORD DISK-RPS (:COMMA)
    (:BYTE UNIT-0-POS 4 0)
    (:BYTE UNIT-1-POS 4 4)
    (:BYTE UNIT-2-POS 4 10)
    (:BYTE UNIT-3-POS 4 14))

(DEFWORD DISK-STATUS (:COMMA)
    (:BIT (READY) 0 "Ready" "Not ready")
    (:BIT (ON-CYLINDER) 1 "On cylinder" "Off cylinder")
    (:BIT (SEEK-ERROR) 2 "Seek error")
    (:BIT (FAULT) 3 "Fault")
    (:BIT (READ-ONLY) 4 "Read-only")
    (:BIT (ADDRESS-MARK) 5 "Address-mark")
    (:BIT INDEX 6)
    (:BIT SECTOR 7)
    (:BIT READ-CLK 8)
    (:BIT SERVO-CLK 9)
    (:BIT READ-DATA 10.)
    (:BIT (PADDLE-DISABLE) 11. "Paddle disable" "Paddle enable")
    (:BIT (DISK-ERROR) 12. "Disk error")
    (:BIT (SELECT-ERROR) 13. "Select error")
    (:BIT (OVERRUN) 14. "Overrun")
    (:BIT (ECC=ZERO) 15. "ECC=0" "ECC≠0")
    (:BIT READ-COMPARE 16.)
    (:BIT END-FLAG 17.)
    (:BIT BUF-BUSY 18.)
    (:BIT WAKEUP 19.)
    (:BIT WRITE-DATA 20.)
    (:BIT (NOT-SET-DONE NIL 0) 21. NIL "Set done")
    (:BYTE (U-FUNC) 2 22. NIL "Stop if ECC=0" "Err if start block" "Func set done")
    (:BIT (NOT-IDLE) 24. "STM not idle" "STM Idle")
    (:BIT NEXT-STATE-0 25.)
    (:BIT (ADVANCE-STATE) 26. "Advance state")
    (:BYTE U-STATE 5 27.))

(DEFWORD IOB-PADDLE-ENB (:COMMA)
    (:BIT ID-ENABLE 0)
    (:BIT DISK-DISABLE 1)
    (:BIT NET-DISABLE 2)
    (:BIT POWER-OK 3))

(DEFWORD DISK-UCODE (:COMMA)              ;Bottom 2 bytes registered, top byte not
    (:BYTE U-STATE 5 0)
    (:BIT CLOCK-SEL 5 "Read" "Servo")
    (:BIT (READ-GATE) 6 "Read gate")
    (:BIT (WRITE-GATE) 7 "Write gate")
    (:BYTE U-WAIT-SEL 2 10 "3 bits" "End word" "Read data=1" "Start block")
    (:CASE 1 7                  ;Conditional on write gate
        ((:BYTE U-DATA-SEL 2 12 "ECC feedback" "Read data//ECC" 2 "Clear ECC"))
        ((:BYTE U-DATA-SEL 2 12 "Write 1" 1 "Write data" "Write ECC")))
    (:BIT (DATA-FIELD) 14 "Data field")
    (:BIT (WAKEUP) 15 "Wakeup")
    (:BYTE (U-FUNC) 2 16 NIL "Stop if ECC=0" "Err if start block" "Set done")
```

```
(:BYTE WORD-LENGTH 4 20
       "128" "124" "104" "100" "96" "92" "72" "68"
       "64" "60" "40" "36" "32" "28" "8" "4")
(:BYTE NEXT-STATE-CTL 2 24 0 1 "Skip if end" 3))
       ;and 2 unused spare bits
;;; -*- Mode: LIL; Package: LIL; Base: 8; Lowercase: Yes -*-

(set-default-psect code)

  ;;
;;;;;; F:>LMach>Fep>defs.lil.7
  ;;

(deftype slong long allow-arithmetic t)

(deftype boole-ptr (pointer boole))
(deftype byte-ptr (pointer byte))
(deftype word-ptr (pointer word))
(deftype long-ptr (pointer long))
(deftype slong-ptr (pointer slong))
(deftype address-pointer (pointer address))

(deftype *boole-array (array boole *) volatile t)
(deftype *byte-array (array byte *) volatile t)
(deftype *word-array (array word *) volatile t)
(deftype *long-array (array long *) volatile t)
(deftype *slong-array (array slong *) volatile t)
(deftype *address-array (array address *) volatile t)

(deftype *boole-array-ptr (pointer *boole-array))
(deftype *byte-array-ptr (pointer *byte-array))
(deftype *word-array-ptr (pointer *word-array))
(deftype *long-array-ptr (pointer *long-array))
(deftype *slong-array-ptr (pointer *slong-array))
(deftype *address-array-ptr (pointer *address-array))

#+BDLC (progn (defmacro ->slong ( long) `(coerce slong (rotr ,long 16.)))
              (defmacro <-slong (slong) `(coerce  long (rotr ,slong 16.))))
#-BDLC (progn (defmacro ->slong ( long) `(coerce slong (rot-16-32 ,long)))
              (defmacro <-slong (slong) `(coerce  long (rot-16-32 ,slong)))
              (defmacro rot-16-32 (num)
                `(+ (rotr (logand (long (rotr (word ,num) 8.)) 177777) 16.)
                    (logand (long (rotr (word (rotr ,num 16.)) 8.)) 177777))))

(defmacro defvar (name type &optional (init () init-p))
;  (unless init-p
;    (warn "~&Variable ~S not inited.  You may lose with parity problems." name))
  (if (or (symbolp type)
          (and (listp type) (eq (first type) 'array)))
      `(defglobal ,name ,type psect data ,@(if init `(init ,init)))
    (ferror "Defvar of ~A has garbage type." name)))

(defmacro defconst (name type &optional init)
  (if (not (symbolp type)) (ferror "Defconst of ~A has garbage type." name)
    (if (null init) (ferror "Defconst of ~A not given an initial value")
      `(defglobal ,name ,type psect code init ,init))))


(defmacro defvar&initfun (name args &body vars)
  (loop for (var type init) on vars by 'cdddr
        unless (null type)
        collect `(defvar ,var ,type ,init) into defvars
        collect `(setq ,var ,init) into setqs
        finally (return `(progn ,@defvars
                                (defun ,name ,args
                                 ,@setqs)))))

(defmacro defvar&initarrayfun (name args &body arrays)
  (loop for (array type init) on arrays by 'cdddr
        unless (null type)
```

```
    collect '(defvar ,array ,type ()) into defvars
    collect '(loop for (i word) upfrom 0 below (array-length ,array)
                 do (setf (aref ,array i) ,init)) into loops
    finally (return '(progn ,@defvars
                            (defun ,name ,args
                              ,@loops)))))

(defmacro def-io (name type)
  '(defglobal ,name ,type address ,(eval-spy-symbol name) psect fep-io volatile t))

(defmacro defatommacros (&rest pairs)
  '(progn ,@(loop for (name value) in pairs
                  collect '(defatommacro ,name ,value))))

(deftype clock-value long allow-arithmetic t)
  ;;
;;;;;; F:>lmach>fep>system-support.lil.67
  ;;

(defmacro cbytes (type string length)
  '(constant ,type
             ,@(loop for ch being the array-elements of string
                     collect ch)
             ,@(loop repeat (- length (string-length string))
                     collect 0)))

(defmacro ptr-incf (ptr type &optional (amount 1))
  '(ptr-incf-decf ,ptr ,type + ,amount))
(defmacro ptr-decf (ptr type &optional (amount 1))
  '(ptr-incf-decf ,ptr ,type - ,amount))
(defmacro ptr-incf-decf (ptr type sign amount)
  '(setq ,ptr (coerce ,type (,sign (coerce long ,ptr) ,amount))))

(defmacro ptr-rel (ptr type relative-amount)
  '(coerce ,type (+ (coerce long ,ptr) ,relative-amount)))

(defmacro boole-= (a b) '(if ,a ,b (not ,b)))
(defmacro boole-≠ (a b) '(if ,a (not ,b) ,b))

(defmacro temporary  (kludge real) real kludge)
(defmacro temporary2 (kludge real) kludge real)
(defmacro for-safety (&rest forms) '(progn ,@forms))

(defmacro evenp (n) '(zerop (logand ,n 1)))
(defmacro oddp (n) '(not (evenp ,n)))
(defmacro bit-test (a b) '(≠ (logand ,a ,b) 0))
(deflispmacro when)
(deflispmacro unless)

(deflispmacro import-defwords lil-defwords)
(deflispmacro build lil-build)
(deflispmacro change lil-change)
(deflispmacro alter lil-alter)

(import-defwords sq-ctl sq-status microinstruction
                 mc-control mc-status mc-error-status
                 fep-board-id-control fep-proc-control
                 fep-lbus-control fep-hsb-control
                 fep-ser-dma-control fep-dma-mode fep-dma-command)

(deflispmacro define-sysdf1-atommacros)
(deflispmacro define-sysconstant)
(deflispmacro remote-load-field lil-remote-load-field)

(defmacro define-sysconstants (&rest constants)
  '(progn ,@(loop for constant in constants collect '(define-sysconstant ,constant))))

;;; These work,  but they suck.
(defmacro make-mask (nbits &optional offset)
  (if offset '(lshl (1- (lshl 1 ,nbits)) ,offset)
    '(1- (lshl 1 ,nbits))))
```

```
(defmacro dpb (val ppss word &aux pp ss)
  (if (listp ppss)
      (if (eq (car ppss) 'byte)
          (setq pp (third  ppss)
                ss (second ppss))
        (ferror "Bad ppss ~A to ldb/dpb" ppss))
    (setq pp '(lshr ,ppss 6)
          ss '(logand ,ppss 77)))
  '(logior (logand ,word (lognot (lshl (1- (lshl 1 (word ,ss)))
                                        (word ,pp))))
           (lshl (logand ,val (1- (lshl 1 (word ,ss))))
                 (word ,pp))))

(defmacro dpb-ior (val ppss word &aux pp ss)
  (if (listp ppss)
      (if (eq (car ppss) 'byte)
          (setq pp (third  ppss)
                ss (second ppss))
        (ferror "Bad ppss ~A to ldb/dpb" ppss))
    (setq pp '(lshr ,ppss 6)
          ss '(logand ,ppss 77)))
  '(logior ,word (lshl (logand ,val (1- (lshl 1 (word ,ss))))
                       (word ,pp))))

(defmacro ldb (ppss word &aux pp ss)
  (if (listp ppss)
      (if (eq (car ppss) 'byte)
          (setq pp (third  ppss)
                ss (second ppss))
        (ferror "Bad ppss ~A to ldb/dpb" ppss))
    (setq pp '(lshr ,ppss 6)
          ss '(logand ,ppss 77)))
  '(logand (lshr ,word (word ,pp))
           (1- (lshl 1 (word ,ss)))))

(defmacro ldb-test (ppss word &aux pp ss)
  (if (listp ppss)
      (if (eq (car ppss) 'byte)
          (setq pp (third  ppss)
                ss (second ppss))
        (ferror "Bad ppss ~A to ldb/dpb" ppss))
    (setq pp '(lshr ,ppss 6)
          ss '(logand ,ppss 77)))
  '(bit-test (lshl (1- (lshl 1 ,ss)) ,pp) ,word))

(defmacro dpb-ior-typed (type value ppss word)
  '(,type (logior (lshl (,type ,value) (lshr (word ,ppss) 6))
                  (,type ,word))))

(defmacro ldb-typed (type ppss word)
  '(,type (logand (,type (lshr ,word (lshr (word ,ppss) 6)))
                  (1- (lshl (,type 1) (logand (word ,ppss) 77))))))

(defmacro ldb-test-typed (type ppss word)
  '(bit-test (,type (lshl (1- (lshl 1 (logand (word ,ppss) 77)))
                          (lshr (word ,ppss) 6)))
             (,type ,word)))

;;; Here just for LMach compatibility
(defmacro ash (val count)
  (if (not (numberp count))
      (ferror nil "ASH macro was not given a numeric shift count.")
    (if (minusp count)
        '(ashr ,val ,(- count))
      '(ashl ,val ,count))))

(defmacro lsh (val count)
  (if (not (numberp count))
      (ferror nil "LSH macro was not given a numeric shift count.")
    (if (minusp count)
        '(lshr ,val ,(- count))
      '(lshl ,val ,count))))
```

```
(defmacro set-fields (object &rest pairs)
  '(progn ,@(loop for (field value) on pairs by 'cddr
                  collect (if (listp field)
                              (do ((ans value '(setf (,(car fields) ,object) ,ans))
                                   (fields field (cdr fields)))
                                  ((null fields) ans))
                            '(setf (,field ,object) ,value)))))

(defmacro member (thing 'items)
  (loop with gensym = (gensym)
        for item in items collect '(= ,gensym ,item) into clauses
finally (return '(let ((,gensym ,thing))
                           (or ,@clauses)))))

(defmacro externals (&rest forms)
  '(progn ,@(loop for (fun . args) in forms
                  collect '(external ,fun ,(loop for arg in args
                                                 collect '(,arg ,arg))))))

(defmacro let*-globally (lambda-list &body body)
  (loop for (var val) in lambda-list
        as gensym = (gensym)
        collect '(,gensym (prog1 ,var (setq ,var ,val))) into bindings
        collect '(setq ,var ,gensym) into unbindings
        finally (return '(let* ,bindings
                           (prog1 (progn ,@body)
                                  ,@(reverse unbindings))))))

(defmacro let-globally (lambda-list &body body)
  (loop for (var val) in lambda-list
        as gensym = (gensym)
        collect '(,gensym ,var) into savings
        nconc   '(,var ,val) into bindings
        collect '(setq ,var ,gensym) into unbindings
        finally (return '(let ,savings
                           (psetq ,@bindings)
                           (prog1 (progn ,@body)
                                  ,@(reverse unbindings))))))

(defmacro funcall-for-value ((type pointer-type) fun &rest args)
  (let ((gensym (gensym)))
    '(let (((,gensym ,type)))
       (funcall ,fun (make-pointer ,pointer-type ,gensym) ,@args)
       ,gensym)))

(defmacro without-interrupts (&rest forms)
  '(progn ,@forms))

(defatommacro TIME-as-long '(coerce long TIME))

(deftype event-channel (pointer event-mask))
(deftype event-mask long allow-arithmetic t)

(defatommacro +INF '#.(1- 1_31.))  ;big enough

(external (grab-spy-bus boole) ((no-hang-p boole)))
(external ungrab-spy-bus ())

(defmacro with-spy-bus-grabbed (&body body)
  '(progn (grab-spy-bus false)
          (prog1 (progn ,@body)
                 (ungrab-spy-bus))))

(defmacro spy-write (where val) '(setq ,where ,val))
(defmacro fep-write-io-word (where val) '(setq ,where ,val))
(defmacro spy-read (where) where)
(defmacro fep-read-io-word (where) where)
```

```
;This module is in charge of the SQ board

; Spy Address definitions
(def-io spy-cmem microinstruction)              ;13 bytes of control-memory read/write data
                                                ;Writes the CMEM WD registers, reads the UIR
(def-io spy-sq-board-id byte)                   ;Read board ID prom (indexed by U AMRA)
(def-io spy-sq-ctl (array byte 2))              ;Write SQ control register (2 bytes)
(def-io spy-sq-status (array byte 2))           ;Read SQ status (2 bytes)
(def-io spy-next-cpc (array byte 2))            ;Read NEXT CPC lines (2 bytes)
(def-io spy-opc (array byte 2))                 ;Read micro PC history memory (2 bytes)
(def-io spy-task byte)                          ;Read current task number
(def-io spy-ctos-high byte)                     ;Read bits 14,15 of CTOS
(def-io spy-sq-status2 byte)                    ;Misc status bits

(def-io fep-board-id-control fep-board-id-control)
(def-io fep-serial-dma-and-clock-ctl fep-ser-dma-control)
(def-io fep-dma-control byte)
(def-io fep-proc-control fep-proc-control)
(def-io fep-lbus-control fep-lbus-control)

(def-io spy-dma-controller dma-controller)
(def-io spy-dma-high-addrs (array byte 4))

(def-io fep-paddle-id-prom (array byte 40))
(def-io fep-board-id-prom (array byte 40))

(def-io mpsc-0-a mpsc)
(def-io mpsc-0-b mpsc)
(def-io mpsc-1-a mpsc)
(def-io mpsc-1-b mpsc)
(def-io fep-serial-baud-rate-0 word)
(def-io fep-serial-baud-rate-1 word)

(def-io spy-net-select byte)
(def-io spy-net-control byte)

(def-io fep-hsb-control fep-hsb-control)
(def-io fep-hsb-data word)
(def-io fep-hsb-pointer word)

(def-io p-port word)

(deftype 6bytes (array byte 6))
(deftype hsb-ethernet-address-type 6bytes)

;;; Lbus related defs (the OFFICIAL file is SCRC:<LFEP>ADDRS.TEXT
; 0:  1774000 - 1774007,  1000000 - 1001777   Reserved for console program
; 1:  1774010 - 1774017,  1002000 - 1003777   Reserved for loader/dumper
; 2:  1774020 - 1774027,  1004000 - 1005777   Reserved for system communications area
; 3:  1774030 - 1774037,  1006000 - 1007777   Reserved for FEP random reads/writes
; 4:  1774040 - 1774047,  1010000 - 1011777   Reserved for FEP manipulation of display memory.
; 5:  1774050 - 1774057,  1012000 - 1013777   Reserved for FEP maniputlation of IO board regs.
; 6:  1774060 - 1774067,  1014000 - 1015777   Reserved for FEP slow disk loading

(defatommacros
  (lbus-map-slot-for-console-program          0)
  (lbus-map-slot-for-loader-dumper            1)
  (lbus-map-slot-for-system-communication     2)
  (lbus-map-slot-for-random-fep-read-write    3)
  (lbus-map-slot-for-fep-display-memory       4)
  (lbus-map-slot-for-iob-regs                 5)
  (lbus-map-slot-for-slow-disk-loading        6)
  )

(defatommacro log-lbus-page-size '8.)
(defatommacro lbus-page-size '(lshl 1 log-lbus-page-size))
(defatommacro lbus-address-offset-mask '(1- lbus-page-size))
(defmacro lbus-address-page   (address) '(ldb-typed word #o1020 ,address))
(defmacro lbus-address-offset (address) '(ldb-typed word #o0010 ,address))
```

```
(deftype lbus-word (structure (preserve-order t)
                     (data long)
                     (ecc+high word))
  default-mode ref)
(deftype lbus-word-ptr (pointer lbus-word))

(deftype lbus-map-slot (structure (preserve-order t)
                         (address word)
                         (ecc+high word)
                         (data slong))
  volatile t)
(deftype lbus-map-slot-ptr (pointer lbus-map-slot))

(deftype lbus-data-page (array slong lbus-page-size)
  volatile t)
(deftype lbus-data-page-ptr (pointer lbus-data-page))

(defmacro long-into-lbus-word (val &optional (dtp 1))
  '(let (((wd lbus-word)))
     (setf (data wd) ,val)
     (setf (ecc+high wd) ,dtp)
     wd))
 ;;
;;;;;; F:>LMach>Fep>string-defs.lil.21
 ;;

(defatommacro ENTIRE-STRING -1)
(defatommacro STRING-SEARCH-FAILED -1)

(deftype string (pointer string-type auto-dereference t))
(defatommacro NULL-string '(make-null-pointer string))
(deftype string-type-header (structure ()
                              (constant-string? boole)
                              (string-length word);active length
                              (string-size word)  ;allocated
                              ))
(deftype string-type (structure (include string-type-header)
                       (string-bytes *byte-array)))

(defmacro string-constant (string)
  '(make-pointer string
                 (constant string-type
                           constant-string? true
                           string-length  ,(string-length string)
                           string-size ,(string-length string)
                           string-bytes (constant
                                          *byte-array
                                          ,@(loop for ch being the array-elements
                                                  of string collect ch)
                                          ,@(if (zerop (string-length string))
                                                '(0)
                                              ())))))
(defmacro cstring (&rest rest) '(string-constant ,@rest))
 ;;
;;;;;; F:>LMach>Fep>process-defs.lil.19
 ;;

(deftype process-state (enumeration
                         running runnable stopped waiting logging-out))

(deftype process (pointer process-type auto-dereference t))
(defatommacro NULL-process '(make-null-pointer process))
(deftype process-type-header (structure ()
                               (next-process-link process)
                               (prev-process-link process)
                               (process-name string)
                               (initial-function long)
                               (process-state process-state)
                               (whostate string)
                               (last-whostate string)
                               (flush-routine long)
                               (real-flush-routine long)
```

```
                              (flush-arg-1 long)
                              (flush-arg-2 long)
                              (flush-arg-3 long)
                              (flush-arg-4 long)
                              (binding-list bind-block)
                              (saved-stack-ptr long)))
(deftype process-type (structure (include process-type-header)
                          (process-stack (array long *))))

(deftype bind-block (pointer bind-block-type auto-dereference t))
(defatommacro NULL-bind-block '(make-null-pointer bind-block))
(deftype bind-block-type (structure ()
                            (next-bind-block bind-block)
                            (size word)
                            (ptr long)
                            (val long)))

(defmacro with-var-bound (var-ptr &body body)
  `(let (((bbt bind-block-type)))
     (set-fields bbt
                 next-bind-block (binding-list current-process)
                 size (type-size-instance @,var-ptr)
                 ptr (coerce long ,var-ptr)
                 val (coerce long @,var-ptr))
     (setf (binding-list current-process) (make-pointer bind-block bbt))
     (prog1
       (progn ,@body)
       (swap-bind-block-value (make-pointer bind-block bbt))
       (setf (binding-list current-process) (next-bind-block bbt)))))

(external swap-bind-block-value ((bind-block bind-block)))

(defmacro process-wait (whostate function &rest arguments)
  `(,(nth (length arguments)
          '(process-wait-0
            process-wait-1
            process-wait-2
            process-wait-3
            process-wait-4))
    ,whostate
    ,function
    ,@(loop for arg in arguments
            collect `(coerce long ,arg))))

(defmacro process-run-function (name function &rest arguments)
  `(process-run-function-aux
     ,name
     ,function
     (word ,(length arguments))
     ,@(loop for arg in arguments
             collect `(coerce long ,arg))
     ,@(loop for i upfrom (length arguments) below 4
             collect '(long 0))))

(external deschedule ())
(external process-wait-0 ((ws string) (fun long)))
(external process-wait-1 ((ws string) (fun long) (a1 long)))
(external process-wait-2 ((ws string) (fun long) (a1 long) (a2 long)))
(external process-wait-3 ((ws string) (fun long) (a1 long) (a2 long) (a3 long)))
(external process-wait-4 ((ws string) (fun long) (a1 long) (a2 long) (a3 long)
                          (a4 long)))
(external (process-run-function-aux process) ((name string)
                                              (function long) (numargs word)
                                              (arg1 long) (arg2 long)
                                              (arg3 long) (arg4 long)))

(external process-sleep ((interval long)))
```

```
;;
;;;;;; F:>LMach>Fep>stream-defs.lil.9
;;

;;; Note to implementers: functions get SELF as their first argument.

(external init-streams ())
(external (allocate-stream stream) ((size long)))
(external return-stream ((stream stream)))

(defmacro defstreamfunction (function arg-specs optional-stream)
  (let* ((function-name (if (listp function) (car function) function))
         (sfunction-name (intern (format nil "STREAM-~A" function-name) "LIL"))
         (sfunction (if (listp function) `(,sfunction-name ,@(cdr function)) sfunction-name))
         (args (mapcar #'car arg-specs)))
    `(progn (defmacro ,function-name (,@args &optional (stream ',optional-stream))
              (list ',sfunction-name ,@args stream))
            (external ,sfunction (,@arg-specs (stream stream))))))

(defstreamfunction tyo ((char byte)) standard-output)
(defstreamfunction (tyi byte) () standard-input)
(defstreamfunction (kbd-tyi-no-hang boole) () standard-input)
(defstreamfunction (tyi-eof byte) ((eof-option boole mode ref)) standard-input)
(defstreamfunction terpri () standard-output)
(defstreamfunction fresh-line () standard-output)
(external stream-close ((stream stream)))

(defstreamfunction print-octal ((number long)) standard-output)
(defstreamfunction print-number ((number word) (base word)) standard-output)
(defstreamfunction print-string ((string string)) standard-output)
(defstreamfunction print-substring ((string string) (from word) (to word)) standard-output)
(defstreamfunction print-bytes ((bp byte-ptr) (max-chars word)) standard-output)

(deftype stream-ptr (pointer stream))
(deftype stream (pointer stream-type auto-dereference t))
(defatommacro NULL-stream '(make-null-pointer stream))
(deftype stream-type (structure ()
                       (x-pos word)
                       (y-pos word)
                       (for-tyo long)
                       (for-tyi-eof long)
                       (for-tyi-no-hang long)
                       (for-close long)
                       (for-terpri-or-fresh-line long)
                       ))
;;
;;;;;; F:>lmach>fep>FORMAT.lil.1
;;

(defmacro format (stream string . args)
  (if (stringp stream) (ferror nil "You forgot the stream as first arg to FORMAT.")
    (if (eq stream 't) (setq stream 'standard-output))
    `(progn
       ,@(loop with from = 0
               for to = (string-search-char #/~ string from)
               when (or (not to) (≠ from to))
               collect `(print-string ,(substring string from to) ,stream)
               while to
               collect (selector (aref string (1+ to)) char-equal
                         (#/X `(tyo #\space ,stream))
                         (#/% `(terpri ,stream))
                         (#/& `(fresh-line ,stream))
                         (#/C `(tyo ,(pop args) ,stream))
                         (#/O `(print-octal ,(pop args) ,stream))
                         (#/D `(print-number ,(pop args) 10. ,stream))
                         (#/A `(print-string ,(pop args) ,stream))
                         (#/S `(progn (tyo #/" ,stream)
                                      (print-string ,(pop args) ,stream)
                                      (tyo #/" ,stream)))
                         (#/Z `(print-substring ,(pop args)
                                                ,(pop args) ,(pop args)
                                                ,stream))
```

```
                    (#/B '(print-bytes ,(pop args) ,(pop args) ,stream))
                    (#/W '(print-word (coerce *byte-array-ptr ,(pop args))
                                      ,(pop args) ,stream))
                    (#/U '(stream-print-microinstruction ,(pop args) ,stream))
                    (otherwise (ferror nil "Bad character ~C in format string"
                                       (aref string (1+ to)))))
          do (setq from (+ to 2))
          while (< from (string-length string))))))

(defmacro fdebug (mask mask-name string . args)
  (if (member mask-name
              #+BDLC '()                    ;FEP working pretty well these days
              #-BDLC '()                    ;it works in the omnibyte
              )
      '(if (≠ (logand ,mask ,mask-name) 0)
           (format debug-io ,string . ,args))
    '(setq junk junk)))
  ;;
;;;;;; F:>LMach>Fep>network-defs.lil.29
  ;;


  ;;
;;;;;;  Parameters
  ;;

(defatommacro n-general-drivers '10.)

(defatommacro length-gpkt-hardware-prefix  '20.)
(defatommacro length-gpkt-other-ncp-fields '20.)

(defatommacro length-gdrv-other-ncp-fields '20.)
  ;;
;;;;;;  General packet definition
  ;;

(deftype gpkt (pointer gpkt-type auto-dereference t))
(defatommacro NULL-gpkt '(make-null-pointer gpkt))
(deftype
  gpkt-type-header
  (structure (preserve-order t)
    (gpkt-type-header-bytes (array byte 0))       ;place holder for copy
    (gpkt-error-message string)
    (gpkt-user-link gpkt)
    (gpkt-xmit-link gpkt)
    (gpkt-on-a-user-list?  boole)
    (gpkt-on-an-xmit-list? boole)
    (header-byte-format byte-format)
    (data-byte-format   byte-format)
    (gpkt-user-flags word)
    (* (union (gpkt-user-byte-pointer word)
              (gpkt-allocated-size word)
              (gpkt-transmit-size word)))
    (* (union (gpkt-user-byte-count word)
              (gpkt-receive-time clock-value)
              (gpkt-xmit-time clock-value)))
    (* (union
         (gpkt-other-ncp-fields (array byte length-gpkt-other-ncp-fields))
         (gpkt-other-ncp-fields-words (array word 0))))
    (gpkt-hardware-prefix  (array byte length-gpkt-hardware-prefix))))

 (deftype gpkt-type
   (structure (include gpkt-type-header preserve-order t)
     (* (union (gpkt-data-bytes (array byte *))
               (gpkt-data-words (array word *))
               (gpkt-data-longs (array long *))))))

 (deftype byte-format (enumeration bf-internal
                                   bf-bytes bf-bytes-backwards
                                   bf-words-lr bf-words-rl))
```

```
;;
;;;;;;  network driver support
;;

(deftype general-driver (pointer general-driver-type auto-dereference t))
(defatommacro NULL-general-driver '(make-null-pointer general-driver))
(deftype
  general-driver-type
  (structure ()
    (gdrv-xmit-list gpkt)
    (gdrv-xmit-tail gpkt)
    (gdrv-current-output-pkt gpkt)
    (gdrv-statistics network-statistics-type)
    (* (union
         (gdrv-other-ncp-fields (array byte length-gdrv-other-ncp-fields))
         (* (sequence
              (send-an-ethernet-packet long)
              (ethernet-address (array byte 6))

              (send-a-chaos-packet long)
              (chaos-address word)
              (chaos-subnet word)
              (chaos-driver-number+1 word)
              ))
         ))
    ))

;;
;;;;;;  Statisicts structure
;;
 (deftype network-statistics-type
          (structure
            ()
            (packets-in           long)
            (packets-out          long)
            (packets-aborted      long)
            (packets-lost         long)
            (packets-crc-error    long)
            (packets-ram-error    long)
            (packets-bitc-error   long)
            (packets-other-reject long)
            ))

 (defmacro network-meter (driver field . increment)
   '(incf (,field (gdrv-statistics ,driver)) . ,increment))
 ;;
;;;;;; F:>LMach>Fep>ethernet-defs.lil.18
 ;;

(defmacro etherword (word)
  #-BDLC word
  #+BDLC '(rotr (word ,word) 8.))

(defatommacros
  (ether-type$Xerox-PUP                  '(etherword #x+0200))
  (ether-type$Xerox-NS                   '(etherword #x+0600))
  (ether-type$DOD-Internet               '(etherword #x+0800))
  (ether-type$CHAOS                      '(etherword #x+0804))
  (ether-type$ADDRESS-RESOLUTION         '(etherword #x+0501))
  )

(defatommacros
  (ether-length$Xerox-PUP                1)
  (ether-length$Xerox-NS                 6)
  (ether-length$DOD-Internet             4)
  (ether-length$CHAOS                    2)
  )

(defatommacros
  (ether-ares-op$request '(etherword 1))
  (ether-ares-op$reply   '(etherword 2)))
```

```
(deftype ethernet-address-resolution-block
  (structure ()
    (* (union (earb-bytes (array byte 12.))
              (earb-words (array word 06.))
              (earb-longs (array long 03.))))))
(deftype ethernet-address-ptr (pointer ethernet-address-array-type))
(deftype ethernet-address-array-type (array byte 6))

(deftype ethernet-association-entry
  (structure ()
    (eae-protocol word)                   ;protocol being talked
    (eae-length word)                     ;length of address in the protocol
    (eae-receiver long)                   ;routine to receive a packet
    (eae-pa-offset word)                  ;offset into gdrv to protocol address
    ))

(deftype ethernet-translation-entry
  (structure ()
    (ete-protocol word)
    (ete-ethernet-address ethernet-address-array-type)
    (ete-protocol-address ethernet-address-resolution-block)
    ))
  ;;
;;;;;; F:>LMach>Fep>chaos-defs.lil.38
  ;;

  ;;
;;;;;;  NCP parameters
  ;;

(defatommacro chaos-max-conns 10)
(defatommacro max-subnet '54)

  ;;
;;;;;;  Global states
  ;;

(defatommacro UNKNOWN-CHAOS-ADDRESS -1)
(defatommacro WAIT-FOREVER -1)
(defatommacro FOREVER '+INF)

  ;;
;;;;;;  Parameters
  ;;

(defatommacro DEFAULT-WINDOW-SIZE 5.)
(defatommacro maximum-window-size 20.)

  ;;
;;;;;;  CHAOS Packet opcodes
  ;;

(defatommacros
  (rfc-op 001)                            ;request for connection
  (opn-op 002)                            ;accept a connection
  (cls-op 003)                            ;close a connection
  (fwd-op 004)                            ;signal forwarding
  (ans-op 005)                            ;answer a simple connection
  (sns-op 006)                            ;sense a connection
  (sts-op 007)                            ;give status of a connection
  (rut-op 010)                            ;distribute routing information
  (los-op 011)                            ;you are losing
  (lsn-op 012)                            ;listen for a request
  (mnt-op 013)                            ;maintenance
  (eof-op 014)                            ;"end of file"
  (unc-op 015)                            ;uncontrolled
  (brd-op 016)                            ;broadcast request

  (MAX-OP 017)                            ;always last non-data
```

```
 (dat-op 200)                           ;8.bit data
 (dwd-op 300)                           ;16.bit data
 )

 ;;
;;;;;; CHAOS connection states
 ;;

(deftype connection-state (enumeration
                            inactive-state
                            open-state
                            rfc-sent-state
                            answered-state
                            cls-received-state
                            los-received-state
                            host-down-state
                            listening-state
                            rfc-received-state
                            foreign-state
                            brd-sent-state
                            brd-received-state
                            ))
 ;;
;;;;;; packet definitions.
 ;;

(defatommacro max-longs-per-pkt 126.)
(defatommacro max-words-per-pkt 252.)
(defatommacro max-bytes-per-pkt 504.)
(defatommacro max-data-longs-per-pkt 122.)
(defatommacro max-data-words-per-pkt 244.)
(defatommacro max-data-bytes-per-pkt 488.)
(defatommacro first-data-long-in-pkt 4.)  ;offset in longs
(defatommacro first-data-word-in-pkt 8.)  ;offset in words
(defatommacro first-data-byte-in-pkt 16.) ;offset in bytes

(deftype pkt-ptr (pointer pkt))         ;yup !!!!
(deftype pkt (pointer pkt-type auto-dereference t))
(defatommacro NULL-pkt '(make-null-pointer pkt))
(deftype pkt-type
  (structure (include gpkt-type-header preserve-order t)
    (* (union
         (pkt-longs (array long max-longs-per-pkt))
         (pkt-words (array word max-words-per-pkt))
         (pkt-bytes (array byte max-bytes-per-pkt))
         (* (sequence
              (* (union
                   (pkt-header-longs (array long first-data-long-in-pkt))
                   (pkt-header-words (array word first-data-word-in-pkt))
                   (pkt-header-bytes (array byte first-data-byte-in-pkt))
                   (* (sequence
                        #+BDLC (pkt-mbz byte)
                        (pkt-opcode byte)
                        #-BDLC (pkt-mbz byte)
                        (pkt-nbytes word)
                        (* (union
                             (* (sequence
                                  (pkt-dest-port long)
                                  (pkt-src-port  long)))
                             (* (sequence
                                  (pkt-dest-address   word)
                                  (pkt-dest-index-num word)
                                  (pkt-src-address    word)
                                  (pkt-src-index-num  word)))
                             (* #+BDLC (sequence
                                         (pkt-dest-host-num byte)
                                         (pkt-dest-subnet   byte)
                                         (pkt-dest-idx      byte)
                                         (pkt-dest-uniq     byte)
                                         (pkt-src-host-num  byte)
                                         (pkt-src-subnet    byte)
                                         (pkt-src-idx       byte)
```

```
                        (pkt-src-uniq      byte))
                #-BDLC (sequence
                        (pkt-dest-subnet   byte)
                        (pkt-dest-host-num byte)
                        (pkt-dest-uniq     byte)
                        (pkt-dest-idx      byte)
                        (pkt-src-subnet    byte)
                        (pkt-src-host-num  byte)
                        (pkt-src-uniq      byte)
                        (pkt-src-idx       byte))
                )))
            (pkt-num word)
            (pkt-ack-num word)))))
   (* (union
       (* (sequence
           (pkt-first-data-word word)
           (pkt-second-data-word word)))
       (pkt-data-longs (array long max-data-longs-per-pkt))
       (pkt-data-words (array word max-data-words-per-pkt))
       (pkt-data-bytes (array byte max-data-bytes-per-pkt)))))))))
;;;LispM compatibility
(defmacro pkt-link (pkt) '(coerce pkt (gpkt-user-link ,pkt)))

;;;user friendliness
(defmacro pkt-error (pkt) '(gpkt-error-message ,pkt))
 ;;
;;;;;; connection definitions
 ;;

(deftype conn (pointer conn-type auto-dereference t))
(defatommacro NULL-conn '(make-null-pointer conn))
(deftype
  conn-type
  (structure ()
    (conn-error-message string)
    (conn-error-conn boole)
    (local-window-size   word)
    (foreign-window-size word)
    (state connection-state)
    (connection-needs-status boole)
    (* (union (* (sequence (foreign-port        long)))
              (* (sequence (foreign-address     word)
                           (foreign-index-num   word)))
              (* #+BDLC (sequence (foreign-host-num     byte)
                                  (foreign-subnet       byte)
                                  (foreign-idx          byte)
                                  (foreign-uniq         byte))
                 #-BDLC (sequence (foreign-subnet       byte)
                                  (foreign-host-num     byte)
                                  (foreign-uniq         byte)
                                  (foreign-idx          byte))
                 )))
    (* (union (* (sequence (local-port          long)))
              (* (sequence (local-address       word)
                           (local-index-num     word)))
              (* #+BDLC (sequence (local-host-num       byte)
                                  (local-subnet         byte)
                                  (local-idx            byte)
                                  (local-uniq           byte))
                 #-BDLC (sequence (local-subnet         byte)
                                  (local-host-num       byte)
                                  (local-uniq           byte)
                                  (local-idx            byte))
                 )))
    (read-pkts      pkt)
    (read-pkts-last pkt)
    (received-pkts  pkt)

    (pkt-num-read word)
    (pkt-num-received word)
```

```
    (pkt-num-acked word)
    (time-last-received clock-value)
    (auto-status-threshold word)
      ;set to window size when acking is done (data or
      ;STS pkt goes out).  DECFed by 3 for each packet
      ;read.  If this hits zero or below, an STS is generated.

    (stream-input-pkt pkt)
    (pkt-receive-event-mask    event-mask)
    (pkt-receive-event-channel event-channel)

    (send-pkts        pkt)
    (send-pkts-last   pkt)
    (send-pkts-length word)
    (pkt-num-sent     word)
    (send-pkt-acked   word)
    (window-available word)

    (stream-output-pkt pkt)
    (pkt-xmit-event-mask    event-mask)
    (pkt-xmit-event-channel event-channel)

    ))

;;; more user friendliness

(defmacro conn-error (conn) '(conn-error-message ,conn))


(deftype server-alist-entry (structure ()
                              (server-contact-name string)
                              (server-run-routine  long)))

(deftype chaos-stream-character-set (enumeration cscs-lispm cscs-supdup cscs-telnet))

(deftype chaos-stream (pointer chaos-stream-type auto-dereference t))
(defmacro NULL-chaos-stream '(make-null-pointer chaos-stream))
(deftype chaos-stream-type (structure (include stream-type)
                             (conn-for-stream conn)
                             (character-set chaos-stream-character-set)))


  ;;
;;;;;; F:>LMach>Fep>iob-defs.lil.1
  ;;

;;; Definitions for the L-Machine IO Board

(defatommacro *disk-command-offset* 0)        ;read/write
(defatommacro *disk-ecc-offset* 1)            ;read
(defatommacro *disk-status-offset* 2)         ;read/write diagnostic
(defatommacro *disk-rps-offset* 3)            ;read
(defatommacro *net-status-offset* 4)          ;read/write
(defatommacro *net-diag-offset* 5)            ;write
(defatommacro *vd-status-offset* 6)           ;read/write
(defatommacro *vd-diag-offset* 7)             ;read
(defatommacro *paddle-offset* 10)             ;read/write
(defatommacro *pio-status-offset* 11)         ;read/write
(defatommacro *pio-data-offset* 12)           ;read/write

(defatommacro *sync-memory-offset* 1_17.)
(defatommacro *display-memory-offset* 1_18.)
(defatommacro *display-data-offset* 4000)

(defmacro fep-read-disk-status ()
  '(setq *last-fep-read-disk-status* (read-iob-reg *disk-status-offset*)))
  ;;
;;;;;; F:>LMach>Fep>disk-defs.lil.30
  ;;

(deftype filename-name (array byte 32.))
(deftype filename-type (array byte 4.))
```

```
(deftype page-state (enumeration ps-read ps-write ps-error))
(deftype disk-mode (enumeration dm-character dm-byte dm-word dm-long dm-36bit dm-block))
(deftype disk-direction (enumeration dd-read dd-write dd-update))

(deftype filename (structure ()
                    (name filename-name)
                    (type filename-type)
                    (version long)))

(defmacro cfilename (string)
  (let* ((ft (string-search-char #/. string))
         (tv (string-search-char #/. string (1+ ft)))
         (name (substring string 0 ft))
         (type (substring string (1+ ft) tv))
         (ver  (let* ((ibase 10.)) (read-from-string (substring string (1+ tv))))))
    '(constant filename
              name (cfilename-name ,name)
              type (cfilename-type ,type)
              version ,ver)))

(defmacro cfilename-name (string) '(cbytes filename-name ,string 32.))
(defmacro cfilename-type (string) '(cbytes filename-type ,string 4))

(defmacro header-type-to-long (header-type)
  (loop with long = 0
        for ch being the array-elements of header-type
        do (setq long (+ (ash long 8) ch))
        finally (return long)))

  ;;
;;;;;;  Data stucture of disk pages (these need SLONGing)
  ;;

;;; raw, just data
(deftype disk-data (pointer disk-data-type auto-dereference t))
(defatommacro NULL-disk-data '(make-null-pointer disk-data))
(deftype disk-data-type (structure ()
                          (* (union
                               (disk-longs  (array long  290.))
                               (disk-words  (array word  580.))
                               (disk-bytes  (array byte 1160.))
                               (disk-slongs (array slong 290.))
                               (* (sequence
                                    (disk-header-longs (array long 2))
                                    (* (union
                                         (disk-data-longs  (array long  288.))
                                         (disk-data-words  (array word  576.))
                                         (disk-data-bytes  (array byte 1152.))
                                         (disk-data-slongs (array slong 288.))  ;sigh
                                         ))))))))

(defatommacro page-size '(type-size disk-data-type))
(defatommacro page-data-size '(type-size (disk-data-longs disk-data-type)))

;;; everything else starts with one of these
(deftype disk-page-header (structure (preserve-order t)
                            (check-header-1 slong)
                            (check-header-2 slong)
                            (type slong)
                            (header-version slong)
                            (npages slong)
                            (TAD-written slong)
                            (sequence-number slong)
                            ))

(deftype disk-LABL (pointer disk-LABL-type auto-dereference t))
(defatommacro NULL-disk-LABL '(make-null-pointer disk-LABL))
(deftype disk-LABL-type (structure (include disk-page-header
                                            preserve-order t)
                          (ncylinders slong)
                          (nheads slong)
```

```
                    (npages-per-track slong)
                    (creation-info (array byte 32.))
                    (pack-name (array byte 32.))
                    (comment (array byte 96.))
                    (dpn-of-root-directory slong)
                    (pack-id slong)
                    ))

(defatommacro npages-mask #.(- 1_24. 1))
(defmacro pmap? (pmap-npages) '(not (zerop (logand 1_24. ,pmap-npages))))
(deftype pmap-entry (structure (preserve-order t)
                    (npages slong)
                    (dpn    slong)))

(deftype disk-FEPF (pointer disk-FEPF-type auto-dereference t))
(defatommacro NULL-disk-FEPF '(make-null-pointer disk-FEPF))
(deftype disk-FEPF-type (structure (include disk-page-header
                                            preserve-order t)
                    (owning-dir-seq slong)
                    (file-version slong)
                    (file-type filename-type)
                    (creation-info (array byte 32.))
                    (file-name filename-name)
                    (comment (array byte 96.))
                    (byte-length slong)
                    (bits slong)
                    (number-of-entries slong)
                    (page-map (array pmap-entry 0))

   ))

  (deftype FEPD-entry-ptr (pointer FEPD-entry auto-dereference t))
  (deftype FEPD-entry (structure (preserve-order t)
                    (name filename-name)
                    (type filename-type)
                    (version slong)
                    (header-dpn slong)))

  (deftype disk-FEPD (pointer disk-FEPD-type auto-dereference t))
  (defatommacro NULL-disk-FEPD '(make-null-pointer disk-FEPD))
  (deftype disk-FEPD-type (structure (include disk-page-header
                                              preserve-order t)
                    (dir-data-page-num slong)
                    (* (array slong #.(- 14 6 -1)))
                    (nentries slong)
                    (entries (array FEPD-entry 22))
                    ))
 ;;
;;;;;;  Internal representations (these do not need slongs)
 ;;

(deftype dpn-and-count (structure ()
                    (dpn long)
                    (count long)))

(deftype file-stream (pointer file-stream-type auto-dereference t))
(defatommacro NULL-file-stream '(make-null-pointer file-stream))
(deftype file-stream-type (structure ()
                    (error-message string)
                    (filename filename)
                    (mode disk-mode)
                    (direction disk-direction)
                    (disk-unit word)
                    (file-header-dpn long)
                    (file-header-page disk-page)
                    (inferior-page-map-dpn long)
                    (inferior-page-map-page disk-page)
                    (current-dpn long)
                    (current-disk-page disk-page)
                    (current-block-number long)
                    (desired-block-number long)
                    (current-byte-offset word)
                    (current-mode-offset word)
                    ))
```

```
(deftype disk-page-ptr (pointer disk-page))
(defatommacro NULL-disk-page '(make-null-pointer disk-page))
(deftype disk-page (pointer disk-page-type auto-dereference t))
(deftype disk-page-type (structure ()
                        (error-message string)
                        (next-disk-page-link disk-page)
                        (disk-unit word)
                        (dpn long)
                        (usage-count word)
                        (page-state page-state)
                        (page-needs-writing boole)
                        (header-type long)      ;labl, fepf, etc
                        (* (union
                             (disk-data disk-data)
                             (disk-LABL disk-LABL)
                             (disk-FEPF disk-FEPF)
                             (disk-FEPD disk-FEPD)
                             ))
                        ))
  ;;
;;;;;; F:>LMach>Fep>load-world-defs.lil.3
  ;;

(deftype boot-status (enumeration
                      bs-success
                      bs-no-boot-status
                      bs-power-not-ok

                      bs-microcode-unit-select-error
                      bs-microcode-open-error
                      bs-microcode-file-error
                      bs-microcode-verify-error

                      bs-world-unit-select-error
                      bs-world-open-error
                      bs-world-file-verify-error
                      bs-world-file-error

                      bs-sparse-verify-error
                      bs-load-initial-error
                      bs-load-maps-error
                      bs-preload-load-error
                      bs-phtc-setup-error
                      ))

(deftype load-map-entry (structure ()
                         (starting-vma     long)
                         (number-of-words  long)
                         (file-page-number long)
                         (disk-page-number long)))
(deftype load-map-array (pointer load-map-array-type))
(deftype load-map-array-type (array load-map-entry *))

  ;;
;;;;;; F:>LMach>Fep>defword.lil.3
  ;;

(defstreamfunction print-word ((word *byte-array-ptr) (wd word-description)) standard-output)

(deftype value-names* (array string *))
(deftype field-description-type (structure ()
                                 (name string)
                                 (print-name boole)
                                 (ss byte)
                                 (pp word)
                                 (n-value-names word)
                                 (value-names value-names*)))
(deftype field-description (pointer field-description-type auto-dereference t))
(defatommacro NULL-field-description '(make-null-pointer field-description))
```

```
(deftype word-description-type (array field-description *))
(deftype word-description (pointer word-description-type auto-dereference t))
(defatommacro NULL-word-description '(make-null-pointer word-description))

(defmacro defword (name ignore &body field-descriptions)
  (loop with pp with ss with value-names
        for (type field-name . fd-rest) in field-descriptions
        for field-number upfrom 0
        do (if (listp field-name)
               (setq print-name (if (second field-name) 'true 'false)
                     field-name (or (second field-name) (first field-name)))
             (setq print-name 'true))
        do (selectq type
             (:byte (setq pp (second fd-rest)
                          ss (first  fd-rest)
                          value-names (nthcdr 2 fd-rest)))
             (:bit (setq pp (first fd-rest)
                         ss 1
                         value-names (and (cdr fd-rest)
                                          (list (third fd-rest) (second fd-rest)))))
             (otherwise (warn "~&~A is an unknown field type in defword ~A" type name)))
        collect '(make-pointer field-description
                               (constant field-description-type
                                         name ,(string field-name)
                                         print-name ,print-name
                                         pp ,pp
                                         ss ,ss
                                         n-value-names ,(length value-names)
                                         value-names
                                         (constant value-names*
                                                   ,@(loop for vn in value-names
                                                           collect (if vn
                                                                       ',(string vn)
                                                                     'NULL-string))
                                                   ,@(if value-names () '(NULL-string)))))
        into field-descriptions
        finally (return '(defconst ,name word-description
                           (make-pointer word-description
                              (constant word-description-type
                                 ,@field-descriptions
                                 NULL-field-description))))))

;;;; Gross & ugly
;These are local to the command decoder
(deftype command-dispatch-table-entry (structure () (cmd-code word) (cmd-fcn address)))
(deftype command-dispatch-table (array command-dispatch-table-entry *))

;;; Stuff for display hacking
(deftype font (structure ()
               (char-height word)
               (char-width word)
               (raster-height word)
               (raster-width word)
               (baseline word)
               (bytes (array byte 1)))          ;Address will fit in a word
  default-mode ref)
(deftype font-ptr (pointer font))

(deftype window (structure ()
                 (x-offset word)
                 (y-offset word)
                 (height word)
                 (width word)
                 (cursor-x word)
                 (cursor-y word)
                 (vsp word))
  default-mode ref)

(deftype sync-program (structure ()
                       (words-per-line word)
                       (video-field-lines word)
```

```
                    (n-words word)
                    (sync (array word 2000)))
  default-mode ref)

(deftype mpsc                                  ;Hardware MPSC register
  (structure ()
    (data byte)
    (* byte)
    (control byte))
  volatile t)
(deftype mpsc-ptr (pointer mpsc))

(deftype dma-controller
        (structure ()
          (kbd-address byte)                       ;0
          (kbd-count byte)                         ;1
          (* (array byte 6))                       ;2-7 other devices
          (status^command byte)                    ;10 read-status / write command
          (write-request byte)                     ;11 software request feature
          (write-single-mask byte)                 ;12 write single channel mask bit
          (write-mode byte)                        ;13 write channels mode bits
          (clear-flip-flop byte)                   ;14 clear byte pointer ff
          (read-temp^master-clear byte)            ;15 temp reg on read, master clear
          (illegal byte)                           ;16 unused
          (write-all-masks byte))                  ;17 low 4 bits write mask / channel
  volatile t)

(deftype tv-fcn (enumeration alu-setz alu-xor alu-seta))
;;; Macros for Machine &co.
;;; Macro to create a SQ-CTL with the specified parts enabled.  If parts = T, then
;;; *SQ-CTL-WHILE-RUNNING* is used, otherwise, only the bits specified.  Tasking
;;; issues are dealt with in "WRITE-SQ-CTL".
(defilmacro parts-enable (&rest parts)
  (if (and (= (length parts) 1)
           (eq (car parts) t))
      '*sq-ctl-while-running*
    (loop with parts-list = nil
          for part in parts
          do (if (neq part 'uir)
                 (let ((enable (get '(nil dp enable-dp sq enable-sq cmem enable-cmem
                                      trap enable-trap errhalt enable-errhalt
                                      task enable-task wp enable-wp) part)))
                   (if (null enable) (ferror nil "Illegal partname in ~A" parts))
                   (push 1 parts-list) (push enable parts-list)))
          finally (return `(build sq-ctl ,@parts-list)))))

(defilmacro step-machine (parts)
  `(write-sq-ctl-to-step-machine (parts-enable . ,(second parts))))

(defilmacro spy-read16 (var)
  `(let (((low word) (aref ,var 0))
         ((high word) (aref ,var 1)))
     (dpb high #o1010 low)))

(defilmacro spy-write16 (var val)
  `(progn (setf (aref ,var 0) (byte (ldb #o0010 ,val)))
          (setf (aref ,var 1) (byte (ldb #o1010 ,val)))))

;BUILD MICROINSTRUCTION with MD as Abus source
;If there is an MC board, this reads the IO MD
(defilmacro md-microinstruction (&rest fields)
  `(build microinstruction amra-sel 3 amra 2100 . ,fields))

;;; Temporarly "bind" MC-CONTROL
(defilmacro with-special-mc-control (fields &body body)
  `(let ((saved-mc-control *last-mc-control*))
     (write-mc-control (change mc-control saved-mc-control . ,fields))
     ,(if body `(prog1 (progn ,@body) (write-mc-control saved-mc-control))
        `(write-mc-control saved-mc-control))))
```

```
(deflilmacro with-lbus-ecc-diag-mode (&body forms)
  `(prog1 (progn (mc-ecc-diag-mode true)
                 ,@forms)
          (mc-ecc-diag-mode false)))

;;; Temporarly "bind" task
(deflilmacro with-task (task &body body)
  `(let ((saved-task (read-task)))
     (disturb-sequencer)  ; do this now.  If it happend during "body" we would lose
     (write-task-ignoring-state-saving ,task)
     ,(if body `(prog1 (progn ,@body) (write-task-ignoring-state-saving saved-task))
        `(write-task-ignoring-state-saving saved-task))))


(comment "Hack to read the EXT files into the end of the current buffer."
  (loop with ostream = zwei:(interval-stream-into-bp (interval-last-bp *interval*))
        for name in '("Print-things" "Global-variables" "Fep-utils"
                      "Process")
        for pname = (fs:merge-pathname-defaults name (send zwei:*interval* ':pathname) "Ext")
        do (with-open-file (istream  pname)
             (let* ((truename (send istream ':truename))
                    (creation (get (fs:file-properties truename) ':creation-date))
                    (date (time:print-universal-time creation nil)))

               (format ostream "~2&;;; ~A,  created on ~A."
                       (send truename ':string-for-printing) date)
               (stream-copy-until-eof istream ostream)))))

;;; F:>lmach>fep>print-things.ext.13,  created on 11/14/82 18:08:54.
(EXTERNAL STREAM-PRINT-NUMBER ((N WORD) (BASE WORD) (STREAM STREAM)))
(EXTERNAL STREAM-PRINT-OCTAL ((N LONG) (STREAM STREAM)))
(EXTERNAL STREAM-PRINT-STRING ((STRING STRING) (STREAM STREAM)))
(EXTERNAL STREAM-PRINT-SUBSTRING
          ((STRING STRING) (FROM WORD) (TO WORD) (STREAM STREAM)))
(EXTERNAL STREAM-PRINT-BYTES ((BP BYTE-PTR) (MAX-BYTES WORD) (STREAM STREAM)))
(EXTERNAL STREAM-PRINT-WORD
          ((WORD *BYTE-ARRAY-PTR) (WD WORD-DESCRIPTION) (STREAM STREAM)))
(EXTERNAL STREAM-PRINT-LBUS-WORD ((WD LBUS-WORD) (STREAM STREAM)))
(EXTERNAL STREAM-PRINT-BYTE-ARRAY ((ARRY *BYTE-ARRAY-PTR) (NBITS WORD) (STREAM STREAM)))
(EXTERNAL STREAM-PRINT-MICROINSTRUCTION
          ((ARRY MICROINSTRUCTION MODE REF) (STREAM STREAM)))

;;; F:>lmach>fep>global-variables.ext.12,  created on 11/14/82 19:04:51.
(DEFGLOBAL MEMORY-AS-BYTES (ARRAY BYTE 0) EXTERNAL T)
(DEFGLOBAL MEMORY-AS-WORDS (ARRAY WORD 0) EXTERNAL T)
(DEFGLOBAL MEMORY-AS-LONGS (ARRAY LONG 0) EXTERNAL T)
(DEFGLOBAL MEMORY-AS-SLONGS (ARRAY SLONG 0) EXTERNAL T)
(DEFGLOBAL LBUS-MAP (ARRAY LBUS-MAP-SLOT 376) EXTERNAL T)
(DEFGLOBAL LBUS-DATA (ARRAY LBUS-DATA-PAGE 376) EXTERNAL T)
(DEFGLOBAL QUOTE-T LBUS-WORD EXTERNAL T)
(DEFGLOBAL QUOTE-NIL LBUS-WORD EXTERNAL T)
(DEFGLOBAL REMOTE-CONSOLE-LBUS-MAP-SLOT LBUS-MAP-SLOT EXTERNAL T)
(DEFGLOBAL REMOTE-CONSOLE-LBUS-DATA-PAGE LBUS-DATA-PAGE EXTERNAL T)
(DEFGLOBAL LBUS-MAP-SLOT WORD EXTERNAL T)
(DEFGLOBAL BOOT-STATUS BOOT-STATUS EXTERNAL T)
(DEFGLOBAL LOAD-MAP-ARRAY LOAD-MAP-ARRAY EXTERNAL T)
(DEFGLOBAL INITIAL-MAP-ARRAY LOAD-MAP-ARRAY EXTERNAL T)
(DEFGLOBAL CURRENT-PROCESS PROCESS EXTERNAL T)
(DEFGLOBAL STANDARD-INPUT STREAM EXTERNAL T)
(DEFGLOBAL STANDARD-OUTPUT STREAM EXTERNAL T)
(DEFGLOBAL TERMINAL-IO STREAM EXTERNAL T)
(DEFGLOBAL DEBUG-IO STREAM EXTERNAL T)
(DEFGLOBAL DRIVER-TABLE (ARRAY GENERAL-DRIVER N-GENERAL-DRIVERS) EXTERNAL T)
(DEFGLOBAL NUMBER-OF-ALIVE-ETHERNET-INTERFACES WORD EXTERNAL T)
(DEFGLOBAL NUMBER-OF-ALIVE-CHAOS-INTERFACES WORD EXTERNAL T)
(DEFGLOBAL EA-TABLE (ARRAY ETHERNET-ASSOCIATION-ENTRY 12) EXTERNAL T)
(DEFGLOBAL ET-TABLE (ARRAY ETHERNET-TRANSLATION-ENTRY 36) EXTERNAL T)
(DEFGLOBAL NUMBER-OF-ETHERNET-TRANSLATIONS WORD EXTERNAL T)
(DEFGLOBAL NUMBER-OF-ETHERNET-PROTOCOLS WORD EXTERNAL T)
(DEFGLOBAL *IOB-BOARD-NUMBER* BYTE EXTERNAL T)
(DEFGLOBAL *IOB-BOARD-BASE* LONG EXTERNAL T)
```

```
(DEFGLOBAL *LAST-FEP-READ-DISK-STATUS* LONG EXTERNAL T)
(DEFGLOBAL DISK-PAGE-LIST DISK-PAGE EXTERNAL T)
(DEFGLOBAL JUNK-EM EVENT-MASK EXTERNAL T)
(DEFGLOBAL JUNK LONG EXTERNAL T)
(DEFGLOBAL TIME CLOCK-VALUE EXTERNAL T)

;;; F:>lmach>fep>fep-utils.EXT.22, created on 11/17/82 08:09:04.
(EXTERNAL (READ-IOB-REG LONG) ((REG LONG)))
(EXTERNAL WRITE-IOB-REG ((REG LONG) (VAL LONG)))
(EXTERNAL (READ-LBUS-LONG LONG) ((ADDR LONG)))
(EXTERNAL (READ-LBUS LBUS-WORD) ((ADDR LONG)))
(EXTERNAL WRITE-LBUS-LONG ((ADDR LONG) (DATUM LONG)))
(EXTERNAL WRITE-LBUS ((ADDR LONG) (LBW LBUS-WORD))
(EXTERNAL (LISP-NULL BOOLE) ((VAL LBUS-WORD)))
(EXTERNAL (INSERT-ODD-PARITY LONG) ((VAL LONG) (NBITS LONG)))
(EXTERNAL PUT-ODD-PARITY-ON-UWORD ((UWORD MICROINSTRUCTION MODE REF)))
(EXTERNAL (EXTRACT-FIELD WORD) ((P WORD) (S WORD) (ARRY *BYTE-ARRAY-PTR)))
(EXTERNAL INSERT-FIELD ((P WORD) (S WORD) (ARRY *BYTE-ARRAY-PTR) (BYTE LONG)))
(EXTERNAL INSERT-UWORD-FIELD
          ((P WORD) (S WORD) (UWORD MICROINSTRUCTION MODE REF) (BYTE LONG)))
(EXTERNAL WRITE-VMEM ((ADR LONG) (VAL LBUS-WORD)))
(EXTERNAL WRITE-VMEM-LONG ((ADR LONG) (VAL LONG)))
(EXTERNAL WRITE-AMEM-LONG ((ADR LONG) (VAL LONG)))
(EXTERNAL (READ-VMEM LBUS-WORD) ((ADR LONG)))
(EXTERNAL (READ-AMEM-LONG LONG) ((ADR LONG)))

;;; F:>lmach>fep>process.ext.10, created on 11/13/82 15:27:24.
(DEFGLOBAL ONCE-PER-SCHEDULER-FUNCTIONS-QUEUE (ARRAY LONG 24) EXTERNAL T)
(DEFGLOBAL ALL-PROCESSES PROCESS EXTERNAL T)
(DEFGLOBAL OPSFQ-ACTIVE-LENGTH WORD EXTERNAL T)
(DEFGLOBAL CURRENT-ONCE-PER-SCHEDULER-FUNCTION LONG EXTERNAL T)
(DEFGLOBAL IN-THE-SCHEDULER-P BOOLE EXTERNAL T)
(DEFGLOBAL LAST-RESTORED-USER-STACK-POINTER LONG EXTERNAL T)
(DEFGLOBAL BAD-PROCESS-STATES LONG EXTERNAL T)
(DEFGLOBAL SAVED-SCHEDULER-STACK-POINTER LONG EXTERNAL T)
(EXTERNAL INIT-PROCESSES NIL)
(EXTERNAL (PROCESS-RUN-FUNCTION-AUX PROCESS)
          ((NAME STRING) (FUNCTION LONG)
                         (NUMARGS WORD)
                         (ARG1 LONG)
                         (ARG2 LONG)
                         (ARG3 LONG)
                         (ARG4 LONG)))
(EXTERNAL PROCESS-RUN-FUNCTION-WALL NIL)
(EXTERNAL DESTROY-PROCESS ((P PROCESS)))
(EXTERNAL LOGOUT NIL)
(EXTERNAL ADD-ONCE-PER-SCHEDULER-FUNCTION ((NEW-FUN LONG)))
(EXTERNAL ONCE-PER-SCHEDULER-FUNCTIONS NIL)
(EXTERNAL DESCHEDULE NIL)
(EXTERNAL DESCHEDULE-INTERNAL ((NEW-STATE PROCESS-STATE)))
(EXTERNAL PROCESS-WAIT-0 ((WHOSTATE STRING) (FUNCTION LONG)))
(EXTERNAL PROCESS-WAIT-1 ((WHOSTATE STRING) (FUNCTION LONG) (FLUSH-ARG-1 LONG)))
(EXTERNAL PROCESS-WAIT-2
          ((WHOSTATE STRING) (FUNCTION LONG) (FLUSH-ARG-1 LONG) (FLUSH-ARG-2 LONG)))
(EXTERNAL PROCESS-WAIT-3
          ((WHOSTATE STRING) (FUNCTION LONG)
                             (FLUSH-ARG-1 LONG)
                             (FLUSH-ARG-2 LONG)
                             (FLUSH-ARG-3 LONG)))
(EXTERNAL PROCESS-WAIT-4
          ((WHOSTATE STRING) (FUNCTION LONG)
                             (FLUSH-ARG-1 LONG)
                             (FLUSH-ARG-2 LONG)
                             (FLUSH-ARG-3 LONG)
                             (FLUSH-ARG-4 LONG)))
(EXTERNAL (PROCESS-FUNCALL-0 BOOLE) NIL)
(EXTERNAL (PROCESS-FUNCALL-1 BOOLE) NIL)
(EXTERNAL (PROCESS-FUNCALL-2 BOOLE) NIL)
(EXTERNAL (PROCESS-FUNCALL-3 BOOLE) NIL)
(EXTERNAL (PROCESS-FUNCALL-4 BOOLE) NIL)
```

```
(EXTERNAL PROCESS-START-0 NIL)
(EXTERNAL PROCESS-START-1 NIL)
(EXTERNAL PROCESS-START-2 NIL)
(EXTERNAL PROCESS-START-3 NIL)
(EXTERNAL PROCESS-START-4 NIL)
(EXTERNAL SCHEDULER NIL)
(EXTERNAL SWAP-BINDING-LIST-VALUES ((BB BIND-BLOCK)))
(EXTERNAL SWAP-BIND-BLOCK-VALUE ((BB BIND-BLOCK)))
(EXTERNAL PROCESS-SLEEP ((INTERVAL LONG)))
(EXTERNAL (PROCESS-SLEEP1 BOOLE) ((FINAL-TIME LONG)))


;;;-*- Mode: Lil; Package:Lil; Base:8.; Lowercase: T -*-

(include "Types-and-macros")

; Reference section 2.5 in Knuth

; FREE BLOCKS:

;       |----------------|---|
;       | N/2 (size)     | 0 |
;       |----------------|---|
;       |   forward  link    |
;       |--------------------|
;       |   backward link    |
;       |--------------------|
;       |                    |
;       |      N - 4         |
;       |      longs         |
;       |                    |
;       |----------------|---|
;       | N/2 (size)     | 0 |
;       |----------------|---|


;  ALLOCATED BLOCKS

;       |----------------|---|
;       | N/2 (size)     | 1 |
;       |----------------|---|
;       |                    |
;       |      N - 3         |
;       |  allocated longs   |
;       |                    |
;       |--------------------|
;       |    process ID      |  ;;; allocated, not implemented
;       |--------------------|
;       | N/2 (size)     | 1 |
;       |----------------|---|

;;; note: N/2 catenated with the flag bit gives N or N+1

(defglobal free-storage (array long 0) psect nil address 0)
(defvar fsm-available-header long 0)
(defvar fsm-low-address-from-init  long 0)
(defvar fsm-high-address-from-init long 0)
(defvar fsm-attempted-bad-frees long 0)

(deflilmacro free-sto (idx) `(aref free-storage ,idx))

(deflilmacro fsm-size (idx) `(free-sto ,idx))
(deflilmacro fsm-fwd  (idx) `(free-sto (+ ,idx 1)))
(deflilmacro fsm-bck  (idx) `(free-sto (+ ,idx 2)))
(deflilmacro fsm-top (idx) `(+ ,idx (fsm-size ,idx)))
(deflilmacro fsm-mark! (idx) `(incf (free-sto ,idx)))
(deflilmacro fsm-unmark! (idx) `(decf (free-sto ,idx)))

(deflilmacro fsm-in-use? (idx) `(oddp (free-sto ,idx)))
(deflilmacro fsm-free? (idx) `(evenp (free-sto ,idx)))
```

```
(defun fsm-init ((low  long) (high long))
  (setq fsm-attempted-bad-frees 0)
  (setq low  (lshr (+ low 3) 2)
        high (lshr    high   2))
  (setq low (logand (1+ low) -2)
        high (logand high -2))                          ;these MUST be even
  (loop with (zero long) = 0
        for (idx long) upfrom low below high
        do (setf (free-sto idx) zero))
  (setq fsm-available-header low)
  (setf (free-sto (+ low  3)) -1)
  (setf (free-sto (- high 1)) -1)
  (setf (free-sto (- high 2)) -1)         ;always allocate in double longs
  (setq low  (+ low  4)
        high (- high 2))
  (setq fsm-low-address-from-init  low)   ;yes, put it here
  (setq fsm-high-address-from-init high)
  (setf (fsm-size     low)   (- high low))
  (setf (free-sto (1- high)) (- high low))
  (setf (fsm-fwd fsm-available-header) low)
  (setf (fsm-bck fsm-available-header) low)
  (setf (fsm-fwd low) fsm-available-header)
  (setf (fsm-bck low) fsm-available-header)
  )
(defun (fsm-allocate long) ((size long))
  (if (minusp size)
      (long 0)
    (setq size (logand (lshr (+ size 4_2 3) 2) -2))
    (loop for (maybe long) = (fsm-fwd fsm-available-header) then (fsm-fwd maybe)
          when (= maybe fsm-available-header)
          return (long 0)
          when (and (fsm-free? maybe)
                    (≥ (fsm-size maybe) size))
          return
          (lshl (1+ (let ((maybe-size (fsm-size maybe))
                          (maybe-top (fsm-top maybe)))
                      (if (> maybe-size (+ size 10.))
                          ;; divide current block
                          (let ((ret-idx (- maybe-top size))
                                (new-maybe-size (- maybe-size size)))
                            (setf (fsm-size maybe)        new-maybe-size)
                            (setf (free-sto (1- ret-idx)) new-maybe-size)
                            (setf (fsm-size ret-idx)        (1+ size))
                            (setf (free-sto (1- maybe-top)) (1+ size))
                            ret-idx)
                        ;; use entire block
                        (fsm-mark! maybe)
                        (fsm-mark! (1- maybe-top))
                        (setf (fsm-fwd (fsm-bck maybe)) (fsm-fwd maybe))
                        (setf (fsm-bck (fsm-fwd maybe)) (fsm-bck maybe))
                        maybe))
                2))))

(defun fsm-free ((old long))
  (setq old (1- (lshr old 2)))
  (if (fsm-free? old)
      (incf fsm-attempted-bad-frees)
    (fsm-unmark! old)
    ;; check lower region
    (if (fsm-free? (1- old))
        (setq old (let* ((lower (- old (free-sto (1- old))))
                         (lower-fwd (fsm-fwd lower))
                         (lower-bck (fsm-bck lower)))
                    (setf (fsm-fwd lower-bck) lower-fwd)
                    (setf (fsm-bck lower-fwd) lower-bck)
                    (setf (fsm-size lower) (+ (fsm-size lower) (fsm-size old)))
                    lower)))
    ;; check upper
    (let ((upper (fsm-top old))
```

```
(if (fsm-free? upper)
    (let* ((upper-fwd (fsm-fwd upper))
           (upper-bck (fsm-bck upper)))
      (setf (fsm-fwd upper-bck) upper-fwd)
      (setf (fsm-bck upper-fwd) upper-bck)
      (setf (fsm-size old) (+ (fsm-size old) (fsm-size upper))))))
;; link it on to the fron of the available list
(setf (free-sto (1- (fsm-top old))) (fsm-size old))
(setf (fsm-fwd old) (fsm-fwd fsm-available-header))
(setf (fsm-bck old)         fsm-available-header)
(setf (fsm-bck (fsm-fwd fsm-available-header)) old)
(setf (fsm-fwd fsm-available-header) old)))
#-bdlc (progn

(include "Types-and-macros")

(defun fsm-report-state ()
  (format t "~%Reporting free storage state →~I")
  (format t "~%FSM-AVAILABLE-HEADER is ~O ↓~I"
          (lshl fsm-available-header 2))
  (format t "~%LOW is ~O, HIGH is ~O"
          (lshl fsm-low-address-from-init 2)
          (lshl fsm-high-address-from-init 2))
  (format t "~%Free blocks pool →~I")
  (loop for (next long) = (fsm-fwd fsm-available-header) then (fsm-fwd next)
        until (= next fsm-available-header)
        do (progn (format t "~%→~I")
                  (format t "  Block at ~O; linkages →~I" (lshl next 2))
                  (if (fsm-in-use? next)
                      (format t "~%    HELP!!!  This block thinks it's in use."))
                  (fsm-report-block-linkages next)
                  ))
  (format t "~%Chaining through memory →~I")
  (loop for (addr long) = fsm-low-address-from-init
        then (+ addr (fsm-size addr)
                (if (fsm-in-use? addr) (long -1) 0))
        until
        (≥ addr fsm-high-address-from-init)
        do_(progn (format t "~%→~I  Start= ~O, Size: ~O, Top: ~O"
                          (lshl addr 2)
                          (lshl (fsm-size addr) 2)
                          (lshl (+ addr (logand (fsm-size addr) -2)) 2))
                  (if (fsm-in-use? addr)
                      (format t "~%    It is in use.")
                    (format t "~%    It is free;  linkages →~I")
                    (fsm-report-block-linkages addr)))
        finally
        (if (> addr fsm-high-address-from-init)
            (format t "~%Free storage did not end at the top.")))
  (format t "~%Done.")
  )

(defun fsm-report-block-linkages ((block long))
  (let ((top (logand (fsm-top block) -2)))
    (format t "~%    size(b) fwd(b) bck(b) top-1(b) top: ~O ~O ~O ~O ~O"
            (lshl (fsm-size block) 2)
            (lshl (fsm-fwd  block) 2)
            (lshl (fsm-bck  block) 2)
            (lshl (free-sto (1- top)) 2)
            (lshl top 2))))

)
;;;-*- Mode: Lil; Package:Lil; Base:8.; Lowercase: T -*-

(include "Types-and-macros")

(external (fsm-allocate long) ((size long)))
(external fsm-free ((old long)))
```

```
(defun (make-string string) ((size word))
  (let ((string (temporary
                 (coerce string (fsm-allocate
                                 (+ size (type-size string-type-header))))
                 (alloc string size #'fsm-allocate))))
    (if (not (null string))
        (progn (setf (constant-string? string) false)
               (setf (string-length string) size)
               (setf (string-size   string) size)))
    string))

(defun return-string ((string string))
  (if (and (not (null string)) (not (constant-string? string)))
      (temporary (fsm-free (coerce long string))
                 (free string string #'fsm-free))))
(defun (substring string) ((string string) (from word) (to word))
  (setq to (if (= to ENTIRE-STRING)
               (string-length string)
               (min to (string-length string))))
  (let ((new-string (make-string (- to from))))
    (loop for (new-idx word) upfrom 0
          and (old-idx word) upfrom from below to
          do (setf (aref (string-bytes new-string) new-idx)
                   (aref (string-bytes string) old-idx)))
    new-string))

(defun (substring-after-char string) ((char byte) (string string))
  (let (((idx word) (string-search-char char string 0 ENTIRE-STRING)))
    (if (= idx STRING-SEARCH-FAILED)
        (temporary NULL-string (cstring ""))
        (substring string (1+ idx) ENTIRE-STRING))))

(defun (string-search-char word) ((char byte) (string string)
                                  (from word) (to word))
  (%string-search-char char string from (if (= to ENTIRE-STRING)
                                            (string-length string)
                                          (min to (string-length string)))))

(defun (string-reverse-search-char word) ((char byte) (string string)
                                          (from word) (to word))
  (setq from (if (= from entire-string)
                 (string-length string)
               (min (string-length string) from)))
  (loop for (idx word) downfrom (1- from) to to
        when (= char (aref (string-bytes string) idx))
        return idx
        finally (return STRING-SEARCH-FAILED)))

(defun (string-search-not-char word) ((char byte) (string string)
                                      (from word) (to word))
  (setq to (if (= to ENTIRE-STRING)
               (string-length string)
               (min to (string-length string))))
  (loop for (idx word) upfrom from below to
        when (≠ char (aref (string-bytes string) idx))
        return idx
        finally (return STRING-SEARCH-FAILED)))

(defun (string-reverse-search-not-char word) ((char byte) (string string)
                                              (from word) (to word))
  (setq from (if (= from ENTIRE-STRING)
                 (string-length string)
               (min (string-length string) from)))
  (loop for (idx word) downfrom (1- from) to to
        when (≠ char (aref (string-bytes string) idx))
        return idx
        finally (return STRING-SEARCH-FAILED)))

(defun (string-search word) ((key string) (string string)
                             (from word) (to word))
```

```
(setq to (- (if (= to ENTIRE-STRING)
                (string-length string)
                (min to (string-length string)))
            (string-length key)))
(if (≤ from to)
    (loop with (key-len word) = (string-length key)
          with (chl byte) = (aref (string-bytes key) 0)
          for (from word) = (%string-search-char chl string from to)
          when (= from STRING-SEARCH-FAILED)
          return from
          when (%string-equal key 0 string from key-len)
          return from
          do (incf from)
          )
    STRING-SEARCH-FAILED))

(defun (%string-search-char word) ((char byte) (string string)
                                   (from word) (to word))
  (loop with (char byte) = char
        with (bp byte-ptr)
        = (make-pointer byte-ptr (aref (string-bytes string) from))
        for (i word) upfrom from below to
        when (= char @bp)
        return i
        do (ptr-incf bp byte-ptr (type-size byte))
        finally (return STRING-SEARCH-FAILED)))

(defun (%string-equal boole) ((key string) (keybeg word)
                              (string string) (strbeg word)
                              (keylen word))
  (loop repeat keylen
        with (keyptr byte-ptr)
            = (make-pointer byte-ptr (aref (string-bytes key) keybeg))
        with (strptr byte-ptr)
            = (make-pointer byte-ptr (aref (string-bytes string) strbeg))
        always (= @keyptr @strptr)
        do (ptr-incf keyptr byte-ptr (type-size byte))
           (ptr-incf strptr byte-ptr (type-size byte))
           ))

(defun (string-to-based-number word) ((string string) (from word) (to word)
                                      (base word))
  (setq to (if (= to ENTIRE-STRING)
               (string-length string)
             (min to (string-length string))))
  (loop with (ans word) = 0
        for (i word) upfrom from below to
        do (setq ans (+ (* ans base) (aref (string-bytes string) i) (- #/0)))
        finally (return ans)))

;;;-*- Mode: Lil; Package:Lil; Base:8.; Lowercase: T -*-

(include "Types-and-macros")

(external (fsm-allocate long) ((size long)))
(external fsm-free ((old long)))

(defvar once-per-scheduler-functions-queue (array long 20.) ())

(defvar&initfun init-processes ()
  current-process () NULL-process              ;() means defined elsewhere
  all-processes process NULL-process
  opsfq-active-length word 0
  current-once-per-scheduler-function long 0
  in-the-scheduler-p boole false
  last-restored-user-stack-pointer long 0
  bad-process-states long 0
  )

(defun (process-run-function-aux process) ((name string)
                                           (function long) (numargs word)
                                           (arg1 long) (arg2 long)
                                           (arg3 long) (arg4 long))
```

```
(let ((p (coerce process (fsm-allocate (+ (type-size process-type-header)
                                          (* 250. 4))))))
  (if (null p)
      p
    (let (((sp word) 250.)
          ((a6 long)))
      (setf (aref (process-stack p) (1- sp))
            #'process-run-function-wall);simulate...
      (setq sp (1- sp))                   ;...a call
      (setq sp (1- sp))                   ;simulate...
      (setq a6 (coerce long (make-pointer long-ptr (aref (process-stack p) sp))))
      (setq sp (- sp 15.))                ;...a link a6,#-15.*4
      (setf (aref (process-stack p) (+ sp 14.)) a6)  ;simulate movem #377777,(a7)
      (set-fields p
                  saved-stack-ptr     (coerce long (make-pointer long-ptr
                                                    (aref (process-stack p) sp)))
                  process-name        name
                  initial-function    function
                  process-state       runnable
                  whostate            "Wait initial run."
                  last-whostate       NULL-string
                  flush-routine       (select numargs
                                        (0 #'process-start-0)
                                        (1 #'process-start-1)
                                        (2 #'process-start-2)
                                        (3 #'process-start-3)
                                        (4 #'process-start-4))
                  real-flush-routine  function
                  flush-arg-1         arg1
                  flush-arg-2         arg2
                  flush-arg-3         arg3
                  flush-arg-4         arg4
                  binding-list        NULL-bind-block
                  )
       (setf (prev-process-link p) NULL-process)
       (if (not (null all-processes))
           (setf (prev-process-link all-processes) p))
       (setf (next-process-link p) all-processes)
       (setq all-processes p)
       p))))

(defun process-run-function-wall ()
  (funcall (flush-routine current-process))
  (logout))

(defun destroy-process ((p process))
  (fsm-free (coerce long p)))
(defun logout ()
  (deschedule-internal logging-out))

(defun add-once-per-scheduler-function ((new-fun long))
  (setf (aref once-per-scheduler-functions-queue opsfq-active-length) new-fun)
  (incf opsfq-active-length))

(defun once-per-scheduler-functions ()
  (loop for (i word) upfrom 0 below opsfq-active-length
        do (funcall (setq current-once-per-scheduler-function
                          (aref once-per-scheduler-functions-queue i)))
        finally (setq current-once-per-scheduler-function 0)
             ))
;;; system-dependeint-context-switch pushes all current regs on the
;;; stack, then saves the stack away in the pointer provided for
;;; stashing, then sets the stack to new stack value, pops regs (off
;;; of that stack) and returns.
(external system-dependent-context-switch ((new-sp long) (slot-for-old long-ptr)))

(deftype pointer-to-process (pointer process))

(defvar saved-scheduler-stack-pointer long -1)
```

```
(defun deschedule ()
  (deschedule-internal runnable))

(defun deschedule-internal ((new-state process-state))
  (setf (process-state current-process) new-state)
  (system-dependent-context-switch
    saved-scheduler-stack-pointer
    (make-pointer long-ptr (saved-stack-ptr current-process)))
  )

(deflilmacro defprocess-wait-functions (ignore)
  (loop for (fun flush-routine this starter)
        in '((process-wait-0 process-funcall-0 flush-arg-0 process-start-0)
             (process-wait-1 process-funcall-1 flush-arg-1 process-start-1)
             (process-wait-2 process-funcall-2 flush-arg-2 process-start-2)
             (process-wait-3 process-funcall-3 flush-arg-3 process-start-3)
             (process-wait-4 process-funcall-4 flush-arg-4 process-start-4))
        as args = '() then '(,@args (,this long))
        as sets = '() then '(,@sets (setf (,this self) ,this))
        as cals = '() then '(,@cals (,this self))
        collect '(defun ,fun ((whostate string) (function long) ,@args)
                   (let ((self current-process))
                     (setf (whostate current-process) whostate)
                     ,@sets
                     (setf (real-flush-routine self) function)
                     (setf (flush-routine self) #',flush-routine)
                     (deschedule-internal waiting)))
        into process-waits
        collect '(defun (,flush-routine boole) ()
                   (let (((retval boole))
                         (self current-process))
                     (funcall (real-flush-routine self)
                              (make-pointer boole-ptr retval)
                              ,@cals)
                    retval))
        into flush-routines
        collect '(defun ,starter ()
                   (let ((self current-process))
                     (funcall (real-flush-routine self) ,@cals)))
        into starters
        finally (return '(progn ,@process-waits ,@flush-routines ,@starters))))

(defprocess-wait-functions this-arg-here-so-zmacs-wont-barf-when-reading-file)

(defun scheduler ()
  (setq in-the-scheduler-p true)
  (setq current-process NULL-process)
  (setq TIME 0)
  (loop do
        (once-per-scheduler-functions)
        (loop for (p process) = all-processes then next-p
              until (null p)
              as (next-p process) = (next-process-link p)
              if (select (process-state p)
                   (runnable true)
                   (waiting (let-globally ((current-process p))
                              (funcall-for-value (boole boole-ptr) (flush-routine p))))
                   (stopped false)
                   (otherwise (incf bad-process-states)
                              (setf (process-state p) stopped)
false))
        do (when (= (process-state p) waiting)
             (setf (last-whostate p) (whostate p)))
           (setf (process-state p) running)
           (let*-globally ((current-process p)
                           (in-the-scheduler-p false))
             (swap-binding-list-values (binding-list p))
             (setq last-restored-user-stack-pointer (saved-stack-ptr p))
             (system-dependent-context-switch
               (saved-stack-ptr p)
               (make-pointer long-ptr saved-scheduler-stack-pointer))
```

```
            (swap-binding-list-values (binding-list p)))
          (if (= (process-state p) logging-out)
              (progn (if (null (prev-process-link p))
                         (setq all-processes next-p)
                       (setf (next-process-link (prev-process-link p))
                             next-p))
                     (if (not (null next-p))
                         (setf (prev-process-link next-p)
                               (prev-process-link p)))
                     (destroy-process p)))
        )
    (incf TIME)
    ))

(defun swap-binding-list-values ((bb bind-block))
  (loop until (null bb)
        do (swap-bind-block-value bb)
           (setq bb (next-bind-block bb))))

(defun swap-bind-block-value ((bb bind-block))
  (let ((ptr (ptr bb))
        (val-bb (val bb)))
    (select (size bb)
      (1                 (setf (val bb) (long @(coerce byte-ptr ptr)))
                         (setf @(coerce byte-ptr ptr) (byte val-bb)))
      (2                 (setf (val bb) (long @(coerce word-ptr ptr)))
                         (setf @(coerce word-ptr ptr) (word val-bb)))
      (otherwise         (setf (val bb) (long @(coerce long-ptr ptr)))
                         (setf @(coerce long-ptr ptr) (long val-bb)))
      )))
(defun process-sleep ((interval long))
  (process-wait (cstring "Sleep") #'process-sleep1 (+ (coerce long TIME) interval)))
(defun (process-sleep1 boole) ((final-time long))
  (≥ (coerce long TIME) final-time))
;;;-*- Mode: Lil; Package:Lil; Base:8.; Lowercase: T -*-

(include "Types-and-macros")

(externals ((fsm-allocate long) long)
           (fsm-free long)
           )

(defun init-streams ()
  (setq terminal-io NULL-stream)
  (setq standard-output NULL-stream)
  (setq standard-input NULL-stream)
  (setq debug-io NULL-stream)
  )

(defun (allocate-stream stream) ((size long))
  (let ((stream (coerce stream (fsm-allocate size))))
    (unless (null stream)
      (set-fields stream
                  x-pos 0
                  y-pos 0
                  for-tyo #'stream-no-operation-standin
                  for-tyi-eof #'stream-no-operation-standin
                  for-tyi-no-hang #'stream-no-operation-standin
                  for-close #'stream-no-operation-standin
                  for-terpri-or-fresh-line #'stream-no-operation-standin
                  ))
    stream))

(defun return-stream ((stream stream))
  (unless (null stream)
    (fsm-free (coerce long stream))))

(defun stream-no-operation-standin ()
  (let (((a byte)))
    (setq a 0)))
```

```
(defun stream-tyo ((char byte) (stream stream))
  (unless (null stream)
    (funcall (for-tyo stream) stream char)))

(defun (stream-tyi byte) ((stream stream))
  (let (((ignore boole)))
    (stream-tyi-eof ignore stream)))

(defun (stream-kbd-tyi-no-hang boole) ((stream stream))
  (if (null stream)
      true
    (funcall-for-value (boole boole-ptr) (for-tyi-no-hang stream) stream)))

(defun (stream-tyi-eof byte) ((eof-option boole mode ref) (stream stream))
  (setq eof-option false)
  (if (null stream)
      (progn (setq eof-option true)
             (byte -1))
    (funcall-for-value (byte byte-ptr) (for-tyi-eof stream)
                       stream (make-pointer boole-ptr eof-option))))

(defun stream-close ((stream stream))
  (unless (null stream)
    (funcall (for-close stream) stream)))

(defun stream-terpri ((stream stream))
  (unless (null stream)
    (funcall (for-terpri-or-fresh-line stream) stream true)))

(defun stream-fresh-line ((stream stream))
  (unless (null stream)
    (funcall (for-terpri-or-fresh-line stream) stream false)))
```

F:>lmach>fep>print-things.lil.10 Page 1

```
;;;-*- Mode: Lil; Package:Lil; Base:8.; Lowercase: T -*-

(include "Types-and-macros" "Fep-utils.ext")

(defun stream-print-number ((n word) (base word) (stream stream))
  (if (< n 0) (progn (tyo #/- stream) (setq n (- n))))
  (let (((digit byte) (byte (\ n base)))
        ((rest word) (// n base)))
    (if (≠ 0 rest) (stream-print-number rest base stream))
    (tyo (+ #/0 digit) stream)))

(defun stream-print-octal ((n long) (stream stream))
  (loop with (print-p boole) = false
        for (i word) from (// 32. 3) downto 0
        do (let (((digit byte) (byte (logand (lshr n (* i 3)) 7))))
             (cond ((or (≠ 0 digit) print-p)
                    (tyo (+ digit #/0) stream)
                    (setq print-p true))))
        finally (if (not print-p) (tyo #/0 stream))))

(defun stream-print-string ((string string) (stream stream))
  (loop for (i word) upfrom 0 below (string-length string)
        do (tyo (aref (string-bytes string) i) stream)))

(defun stream-print-substring ((string string) (from word) (to word) (stream stream))
  (loop for (i word) upfrom from below to
        do (tyo (aref (string-bytes string) i) stream)))

(defun stream-print-bytes ((bp byte-ptr) (max-bytes word) (stream stream))
  (loop with (bp byte-ptr) = bp
        repeat max-bytes
        as (char byte) = @bp
        do (ptr-incf bp byte-ptr (type-size byte))
```

```
        ;until (zerop char)
        do (tyo char stream)
           ))

(defun stream-print-word ((word *byte-array-ptr) (wd word-description) (stream stream))
  (loop initially (format stream "~&")
        with (comma boole) = false
        for (i word) upfrom 0
        as (fd field-description) = (aref @wd i)
        until (null fd)
        as (start-bit word) = (pp fd)
        as (value long) = (loop with (\ word) = (\ start-bit 8.)
                                for (idx word) upfrom (// start-bit 8.)
                                as (byte byte) = (aref @word idx)
                                for (value long) first (logand (long (lshr byte \)) #o377)
                                 then (+ value (lshl (logand (long byte) #o377) lshl))
                                for (lshl word) first (- 8 \) then (+ lshl 8)
                                when (≥ lshl (ss fd))
                                return (logand value (- -1 (lshl -1 (ss fd)))))
        as (print-something boole) = false
        as (value-name string) = NULL-string
        as (print-value-in-octal boole) = false
        do (cond ((and (≥ value 0) (< value (n-value-names fd)))
                  (setq value-name (aref (value-names fd) value))
                  (unless (null value-name) (setq print-something true)))
                 (T (setq print-something true)
                    (setq print-value-in-octal true)))
        when print-something
        do (when comma (format stream ", "))
           (setq comma true)
           (when (print-name fd) (format stream "~A " (name fd)))
           (unless (null value-name) (format stream "~A" value-name))
           (when print-value-in-octal (format stream "~O" value))
           ))
;;; Internal types.  Just to get the bit order correct.
(deftype 48bits (array byte 6))
(deftype p-48bits (pointer 48bits))

(defun stream-print-lbus-word ((wd lbus-word) (stream stream))
  (let (((arry 48bits)))
    (loop for (i word) below 4
          for (v long) = (data wd) then (lsh v -8)
          do (setf (aref arry i) (byte (ldb #o0010 v))))
    (setf (aref arry 4) (byte (ldb #o0010 (ecc+high wd))))
    (setf (aref arry 5) (byte (ldb #o1010 (ecc+high wd))))
    (stream-print-byte-array
      (coerce *byte-array-ptr (make-pointer p-48bits arry)) 44. stream)))


;This takes a byte array and a bit count, and prints the low nbits of the byte
;array as a single octal number.
(defun stream-print-byte-array ((arry *byte-array-ptr) (nbits word) (stream stream))
  (let* ((number-of-top-bits (\ nbits 3))
         (adjusted-nbits (- nbits number-of-top-bits))
         (top-bits (extract-field adjusted-nbits number-of-top-bits arry))
         (print-zeros false))
    (unless (zerop top-bits)
      (stream-print-number top-bits 8 stream)
      (setq print-zeros true))
    (loop for (i word) from (- adjusted-nbits 3) downto 0 by 3
          for (field word) = (extract-field i 3 arry)
          do (unless (zerop field) (setq print-zeros true))
             (if print-zeros (stream-print-number field 8. stream)))))

(defun stream-print-microinstruction ((arry microinstruction mode ref) (stream stream))
  (stream-print-byte-array (coerce *byte-array-ptr (make-pointer microinstruction-ptr arry))
                           112. stream))
```

F:>lmach>fep>global-variables.lil.14

```
;;;-*- Mode: Lil; Package:Lil; Base:8.; Lowercase: T -*-

(include "Types-and-macros")

(defglobal memory-as-bytes  (array byte  0) psect absolute address 0)
(defglobal memory-as-words  (array word  0) psect absolute address 0)
(defglobal memory-as-longs  (array long  0) psect absolute address 0)
(defglobal memory-as-slongs (array slong 0) psect absolute address 0)

(defglobal lbus-map  (array lbus-map-slot  254.) address #o1774000 psect absolute)
(defglobal lbus-data (array lbus-data-page 254.) address #o1000000 psect absolute)

;;; These two are just here for speed (sigh...)
(defglobal remote-console-lbus-map-slot lbus-map-slot address #o1774000 psect absolute)
(defglobal remote-console-lbus-data-page lbus-data-page address #o1000000 psect absolute)

(defvar lbus-map-slot word 1)                   ;This controls read-lbus &co.

(defvar boot-status boot-status bs-no-boot-status)

(defvar load-map-array load-map-array (make-null-pointer load-map-array))
(defvar initial-map-array load-map-array (make-null-pointer load-map-array))

(defvar quote-t lbus-word ())
(defvar quote-nil lbus-word ())

(defvar current-process process NULL-process)

(defvar standard-input  stream NULL-stream)
(defvar standard-output stream NULL-stream)
(defvar terminal-io     stream NULL-stream)
(defvar debug-io        stream NULL-stream)

(defvar driver-table (array general-driver n-general-drivers) nil)

(defvar number-of-alive-ethernet-interfaces word 0)
(defvar number-of-alive-chaos-interfaces word 0)

(defvar ea-table (array ethernet-association-entry 10.) nil)
(defvar et-table (array ethernet-translation-entry 30.) nil)

(defvar number-of-ethernet-translations word 0)
(defvar number-of-ethernet-protocols word 0)
(defvar *iob-board-number* byte 10)
(defvar *iob-board-base* long 10_19.)

(defvar *last-fep-read-disk-status* long 0)

(defvar disk-page-list disk-page NULL-disk-page)

(defvar junk-em event-mask 0)

(defvar junk long 0)

(defvar TIME clock-value 0)
```

F:>lmach>fep>68K-context-switch.68k.1

```
;;; -*- Mode: 68K; Package: Lil; Base: 8. -*-

;;; (defun system-dependent-context-switch (new-stack pointer-for-old) ...)

(module (system-dependent-context-switch psect code address 2000)

system-dependent-context-switch
        (words 047126 #.(* -15. 4)) ;(link ra6 #.(* -15. 4))
        (moveml (% 077777) (@ ra7)) ;everything but the stack pointer
```

```
(movel (@D 10 ra6) ra0)      ;second arg: pointer for old stack
(movel ra7 (@ ra0))
(movel (@D 14 ra6) ra7)      ;first arg:
(moveml (@ ra7) (% 077777))
(unlk ra6)
(rts)
)
```

F:>lmach>fep>network.lil.4 Page 1

```
;;;-*- Mode: Lil; Package:Lil; Base:8.; Lowercase: T -*-

(include "Types-and-macros")

(external (fsm-allocate long) ((size long)))
(external fsm-free ((old long)))
(external return-string ((s string)))

  ;;
;;;;;;  Actual code
  ;;

(defun gpkt-copy-header ((old gpkt) (new gpkt))
  (loop for (i word) upfrom 0 below (type-size gpkt-type-header)
        do (setf (aref (gpkt-type-header-bytes new) i)
                 (aref (gpkt-type-header-bytes old) i))))

(defun (allocate-gpkt gpkt) ((size word))
  (let ((pkt (temporary (coerce gpkt (fsm-allocate
                                      (+ size (type-size gpkt-type-header))))
                        (alloc gpkt #'fsm-allocate))))
    (if (not (null pkt))
        (set-fields pkt
                    gpkt-allocated-size          size
                    gpkt-error-message           NULL-string
                    gpkt-xmit-link               NULL-gpkt
                    gpkt-user-link               NULL-gpkt
                    gpkt-on-a-user-list?         false
                    gpkt-on-an-xmit-list?        false
                    header-byte-format           bf-internal
                    data-byte-format             bf-internal
                    gpkt-receive-time            TIME
                    ))
    pkt))

(defun (make-error-gpkt gpkt) ((error-message string))
  (let ((pkt (allocate-gpkt 0)))
    (if (null pkt)
        (return-string error-message)
      (setf (gpkt-error-message pkt) error-message))
    pkt))

(defun return-gpkt ((pkt gpkt))
  (unless (null pkt)
    (unless (null (gpkt-error-message pkt))
      (return-string (gpkt-error-message pkt)))
    (fsm-free (coerce long pkt))))

(defun return-gpkt-if-not-on-a-user-list ((pkt gpkt))
  (unless (null pkt)
    (if (gpkt-on-a-user-list? pkt)
        (setf (gpkt-on-an-xmit-list? pkt) false)
      (return-gpkt pkt))))

(defun return-gpkt-if-not-on-an-xmit-list ((pkt gpkt))
  (unless (null pkt)
    (if (gpkt-on-an-xmit-list? pkt)
        (setf (gpkt-on-a-user-list? pkt) false)
      (return-gpkt pkt))))
```

```
(defun return-gpkt-list ((pkt gpkt))
  (unless (null pkt)
    (loop as (next gpkt) = (gpkt-user-link pkt)
          do (return-gpkt pkt)
          until (null (setq pkt next)))))

(defun return-gpkt-list-if-not-on-an-xmit-list ((pkt gpkt))
  (unless (null pkt)
    (loop as (next gpkt) = (gpkt-user-link pkt)
          do (return-gpkt-if-not-on-an-xmit-list pkt)
          until (null (setq pkt next)))))

(defun return-gpkt-xmit-list ((pkt gpkt))
  (unless (null pkt)
    (loop as (next gpkt) = (gpkt-xmit-link pkt)
          do (return-gpkt-if-not-on-a-user-list pkt)
          until (null (setq pkt next)))))

(defun init-network ()
  (initialize-general-drivers)
  ;; maybe more stuff will go here in the future
  )

(defun initialize-general-drivers ()
  (loop for (i word) from 0 below n-general-drivers
        do (setf (aref driver-table i) NULL-general-driver))
  (setq number-of-alive-ethernet-interfaces 0)
  (setq number-of-alive-chaos-interfaces 0))

(defun (create-general-driver general-driver) ((size word))
  (let ((drv (temporary (coerce general-driver (fsm-allocate size))
                        (alloc general-driver #'fsm-allocate))))
    (if (not (null drv))
        (progn
          #.(loop for (field ival)
                  in '((gdrv-xmit-list  NULL-gpkt)
                       (gdrv-xmit-tail  NULL-gpkt)
                       (gdrv-current-output-pkt NULL-gpkt))
                  collect '(setf (,field drv) ,ival) into setfs
                  finally (return '(progn ,@setfs)))
          (reset-network-statistics drv)
          (cgd-clear-ethernet-fields drv)
          (cgd-clear-chaosnet-fields drv)))
    drv
    ))

(defun destroy-general-driver ((drv general-driver))
  ;;; do some other things here too
  (fsm-free (coerce long drv)))

(defun reset-network-statistics ((drv general-driver))
  (set-fields (gdrv-statistics drv)
              packets-in           0
              packets-out          0
              packets-aborted      0
              packets-lost         0
              packets-crc-error    0
              packets-ram-error    0
              packets-bitc-error   0
              packets-other-reject 0
              ))

(defun finish-general-driver ((drv general-driver))
  (fgd-finish-ethernet-fields drv)
  (fgd-finish-chaosnet-fields drv)
  (loop for (i word) upfrom 0
        until (null (aref driver-table i))
        finally (setf (aref driver-table i) drv))
  )
```

```
(defun cant-send-an-ethernet-packet ((drv general-driver)
                                     (pkt gpkt)
                                     (ethernet-address byte-ptr))
  (return-gpkt-if-not-on-a-user-list pkt))

(defun cgd-clear-ethernet-fields ((drv general-driver))
  (setf (send-an-ethernet-packet drv) #'cant-send-an-ethernet-packet))

(defun fgd-finish-ethernet-fields ((drv general-driver))
  (if (≠ (send-an-ethernet-packet drv) #'cant-send-an-ethernet-packet)
      (incf number-of-alive-ethernet-interfaces)))

(defun cant-send-a-chaos-packet ((drv general-driver)
                                 (pkt gpkt)
                                 (chaos-address word))
  (return-gpkt-if-not-on-a-user-list pkt))

(defun cgd-clear-chaosnet-fields ((drv general-driver))
  (setf (send-a-chaos-packet drv) #'cant-send-a-chaos-packet))

(defun fgd-finish-chaosnet-fields ((drv general-driver))
  (if (≠ (send-a-chaos-packet drv) #'cant-send-a-chaos-packet)
      (incf number-of-alive-chaos-interfaces)))

(defun add-pkt-to-driver-queue ((pkt gpkt) (drv general-driver))
  (setf (gpkt-xmit-link pkt) NULL-gpkt)
  (without-interrupts
    (if (null (gdrv-xmit-tail drv))
        (setf (gdrv-xmit-list drv) pkt)
        (setf (gpkt-xmit-link (gdrv-xmit-tail drv)) pkt))
    (setf (gdrv-xmit-tail drv) pkt)
    (setf (gpkt-on-an-xmit-list? pkt) true))
  )

;;; This does not 'declare' it off the xmit list.  The driver must
;;; do an explicit (return-current-output-pkt drv) in order to
;;; 'declare' it off the xmit list
(defun (get-pkt-from-driver-queue gpkt) ((drv general-driver))
  (setf (gdrv-current-output-pkt drv)
        (without-interrupts
          (let ((pkt (gdrv-xmit-list drv)))
            (unless (null pkt)
              (when (null (setf (gdrv-xmit-list drv) (gpkt-xmit-link pkt)))
                (setf (gdrv-xmit-tail drv) NULL-gpkt))
              (setf (gpkt-xmit-time pkt) TIME))
            pkt))))

(defun return-current-output-pkt ((drv general-driver))
  (unless (null (gdrv-current-output-pkt drv))
    (return-gpkt-if-not-on-a-user-list (gdrv-current-output-pkt drv))
    (setf (gdrv-current-output-pkt drv) NULL-gpkt)))
```

F:>lmach>fep>ethernet-config.lil.3 Page 1

```
;;;-*- Mode: Lil; Package:Lil; Base:8.; Lowercase: T -*-

(include "Types-and-macros")

(deflilmacro defethernet-protocols (&rest forms)
  (loop
    for n upfrom 0
    for name in forms
    as  specials = (intern (string-append "ETHER-TRANS-ADD-" name "-SPECIALS") 'lil)
    and receiver = (intern (string-append "RECEIVE-" name "-PACKET-FROM-HARDWARE")
                           'lil)
    and protocol = (intern (string-append "ETHER-TYPE$" name) 'lil)
    and length   = (intern (string-append "ETHER-LENGTH$" name) 'lil)
```

```
    and addr-ref = (intern (string-append name "-ADDRESS") 'lil)
    collect '(progn (external ,specials ())
                    (external ,receiver ()))
    into defs
    collect '(progn (setf (eae-protocol (aref ea-table ,n)) ,protocol)
                    (setf (eae-length (aref ea-table ,n)) ,length)
                    (setf (eae-receiver (aref ea-table ,n)) #',receiver)
                    (setf (eae-pa-offset (aref ea-table ,n))
                          (- (structure-offset ,addr-ref general-driver)
                             (structure-offset gdrv-other-ncp-fields general-driver)))
                    )
    into setfs
    finally (return '(progn ,@defs
                            (defun config-ethernet ()
                              (setq number-of-ethernet-translations 0)
                              ,@setfs
                              (setq number-of-ethernet-protocols ,n))))))

(defethernet-protocols
  chaos
  ;DOD-Internet
  ;Xerox-PUP
  )

;;;-*- Mode: Lil; Package:Lil; Base:8.; Lowercase: T -*-

(include "Types-and-macros")
(include "network.EXT")

(defvar *edebug* word 0)

(defun receive-ethernet-packet-from-hardware ((drv general-driver)
                                              (pkt gpkt)
                                              (protocol word))
  ;(fdebug 100000 *edebug* "~%Receive ethernet packet from hardware...")
  (loop for (i word) upfrom 0 below number-of-ethernet-protocols
        if (= protocol (eae-protocol (aref ea-table i)))
        do (funcall (eae-receiver (aref ea-table i)) drv pkt)
           (return)
        finally (if (= protocol ether-type$address-resolution)
                    (receive-address-resolution-packet drv pkt)
                  (network-meter drv packets-other-reject)
                  (return-gpkt pkt))))

(defun transmit-ethernet-packet ((drv general-driver)
                                 (pkt gpkt)
                                 (protocol word)
                                 (earb ethernet-address-resolution-block
                                       mode ref))
  ;(fdebug 040000 *edebug* "~%transmit ethernet packet...")
  (let (((length word) (loop for (i word)
                             upfrom 0
                             below number-of-ethernet-protocols
                             when (= protocol (eae-protocol (aref ea-table i)))
                             return (eae-length (aref ea-table i))
                             finally (return 0))))
    (if (zerop length)
        (return-gpkt-if-not-on-a-user-list pkt)
      (loop for (j word) upfrom 0 below number-of-ethernet-translations
            when (and (= protocol (ete-protocol (aref et-table j)))
                      (loop for (k word) upfrom 0 below length
                            always (= (aref (earb-bytes earb) k)
                                      (aref (earb-bytes
                                              (ete-protocol-address
                                                (aref et-table j)))
                                            k))))
            do (progn (funcall (send-an-ethernet-packet drv)
                               drv pkt protocol
                               (make-pointer
                                 ethernet-address-ptr
                                 (ete-ethernet-address (aref et-table j))))
```

```
              (return))
      finally (progn (return-gpkt-if-not-on-a-user-list pkt)
                     (request-ethernet-translation
                       drv protocol length earb))))))

(deftype ares-pkt (pointer ares-pkt-type auto-dereference t))
(deftype ares-pkt-type (structure (include gpkt-type-header
                                            preserve-order t)
                       (ares-pkt-protocol word)
                       (ares-pkt-length   word)
                       (ares-pkt-opcode   word)
                       (ares-pkt-sea ethernet-address-array-type)
                       (ares-pkt-tea ethernet-address-array-type)
                       (ares-pkt-*pa (array byte #.(+ 10. 10.)))))

(defun receive-address-resolution-packet ((drv general-driver) (pkt gpkt))
  ;(fdebug 020000 *edebug* "~%receive address resolution packet...")
  ;(when (bit-test 010000 *edebug*) (show-addr-tran-pkt pkt))
  (loop with (ares-pkt ares-pkt) = (coerce ares-pkt pkt)
        with (protocol word) = (ares-pkt-protocol ares-pkt)
        with (length word) = (etherword (ares-pkt-length ares-pkt))
        for (i word) upfrom 0 below number-of-ethernet-protocols
        when (and (= protocol (eae-protocol (aref ea-table i)))
                  (loop repeat length
                        for (j word) upfrom (eae-pa-offset (aref ea-table i))
                        for (k word) upfrom length
                        always (= (aref (gdrv-other-ncp-fields drv) j)
                                  (aref (ares-pkt-*pa ares-pkt) k))))
        do (network-meter drv packets-in)
           (handle-address-resolution-packet drv pkt protocol length)
           (return)
        finally (return-gpkt pkt)))

(defun handle-address-resolution-packet ((drv general-driver) (pkt gpkt)
                                          (protocol word) (length word))
  ;(fdebug 004000 *edebug* "~%handle address resolution packet")
  (let ((pkt (coerce ares-pkt pkt)))
    (loop for (i word) upfrom 0 below number-of-ethernet-translations
          until (and (= protocol (ete-protocol (aref et-table i)))
                     (loop for (j word) upfrom 0 below length
                           always (= (aref (earb-bytes
                                             (ete-protocol-address
                                               (aref et-table i))) j)
                                     (aref (ares-pkt-*pa pkt) j))))
          finally
            (when (< i (array-length et-table))
              ;; maybe add new entry
              (if (≥ i number-of-ethernet-translations)
                  (loop for (j word) upfrom 0 below length
                        do (setf (aref (earb-bytes
                                         (ete-protocol-address
                                           (aref et-table i))) j)
                                 (aref (ares-pkt-*pa pkt) j))
                        finally
                          (setf (ete-protocol (aref et-table i)) protocol)
                          (incf number-of-ethernet-translations)
                          ))
              ;; reset ethernet address in case it changed !!
              (loop for (j word) upfrom 0 below 6
                    do (setf (aref (ete-ethernet-address (aref et-table i)) j)
                             (aref (ares-pkt-sea pkt) j)))))
    (if (= (ares-pkt-opcode pkt) ether-ares-op$request)
        (return-gpkt (coerce gpkt pkt))
      (setf (ares-pkt-opcode pkt) ether-ares-op$reply)
      (setf (ares-pkt-tea pkt) (ares-pkt-sea pkt))
      (setf @(make-pointer ethernet-address-ptr (ares-pkt-sea pkt))
            @(coerce ethernet-address-ptr (make-pointer byte-ptr
                                             (aref (ethernet-address drv) 0))))
```

```
  (loop for (sender word) upfrom 0 below length
        for (target word) upfrom length
        do (swapf (aref (ares-pkt-*pa pkt) target)
                  (aref (ares-pkt-*pa pkt) sender)))
  (funcall (send-an-ethernet-packet drv)
           drv pkt (word ether-type$ADDRESS-RESOLUTION)
           (make-pointer ethernet-address-ptr (ares-pkt-tea pkt)))
  )))

(defun show-addr-tran-pkt ((pkt gpkt))
  (let ((pkt (coerce ares-pkt pkt)))
    (format t "~%Protocol: ~O" (ares-pkt-protocol pkt))
    (format t "~%From: <~O,~O,~O,~O,~O,~O>,<"
            (aref (ares-pkt-sea pkt) 0)
            (aref (ares-pkt-sea pkt) 1)
            (aref (ares-pkt-sea pkt) 2)
            (aref (ares-pkt-sea pkt) 3)
            (aref (ares-pkt-sea pkt) 4)
            (aref (ares-pkt-sea pkt) 5))
    (loop for (i word) upfrom 0 below (etherword (ares-pkt-length pkt))
          unless (zerop i)
          do (tyo #/,)
          do (format t "~O" (aref (ares-pkt-*pa pkt) i)))
    (format t ">~%To:   <~O,~O,~O,~O,~O,~O>,<"
            (aref (ares-pkt-tea pkt) 0)
            (aref (ares-pkt-tea pkt) 1)
            (aref (ares-pkt-tea pkt) 2)
            (aref (ares-pkt-tea pkt) 3)
            (aref (ares-pkt-tea pkt) 4)
            (aref (ares-pkt-tea pkt) 5))
    (loop with (l word) = (etherword (ares-pkt-length pkt))
          repeat l
          for (i word) upfrom l
          unless (= i l)
          do (tyo #/,)
          do (format t "~O" (aref (ares-pkt-*pa pkt) i)))
    (format t ">")
    ))
(defun request-ethernet-translation ((drv general-driver)
                                      (protocol word) (length word)
                                      (earb ethernet-address-resolution-block
                                            mode ref))

  ;(fdebug 002020 *edebug* "~%request ethernet translation")
  (let* ((pkt (coerce ares-pkt (allocate-gpkt (type-size ares-pkt-type))))
         (offset (loop for (i word) upfrom 0 below number-of-ethernet-protocols
                       when (= protocol (eae-protocol (aref ea-table i)))
                       return (eae-pa-offset (aref ea-table i))
                       finally (return 0))))
    (cond ((null pkt))
          ((zerop offset) (return-gpkt (coerce gpkt pkt)))
          (T
           (setf (ares-pkt-protocol pkt) protocol)
           (setf (ares-pkt-length   pkt) (etherword length))
           (setf (ares-pkt-opcode   pkt) ether-ares-op$REQUEST)
           (setf @(make-pointer ethernet-address-ptr (ares-pkt-sea pkt))
                 @(coerce ethernet-address-ptr
                          (make-pointer byte-ptr (aref (ethernet-address drv) 0))))
           (loop for (i word) upfrom 0 below length
                 for (offset word) upfrom offset
                 do (setf (aref (ares-pkt-*pa pkt) i)
                          (aref (gdrv-other-ncp-fields drv) offset)))
           (loop for (i word) upfrom 0 below length
                 for (j word) upfrom length
                 do (setf (aref (ares-pkt-*pa pkt) j)
                          (aref (earb-bytes  earb) i)))
           (let (((eaat ethernet-address-array-type)))
             (loop for (i word) upfrom 0 below 6 do (setf (aref eaat i) -1))
             ;(show-addr-tran-pkt pkt)
             (setf (gpkt-transmit-size pkt) (- (type-size ares-pkt-type)
                                               (type-size gpkt-type-header)))
```

```
(funcall (send-an-ethernet-packet drv)
         drv pkt (word ether-type$ADDRESS-RESOLUTION)
         (make-pointer ethernet-address-ptr eaat)))))))
```

F:>lmach>fep>chaos-ncp.111.10 Page 1

```
;;;-*- Mode: Lil; Package:Lil; Base:8.; Lowercase: T -*-

;known bugs:
;  If send-string can't allocate a packet, it writes into rom
;  Same with send-string-buffered

(include "Types-and-macros")
(include "string.EXT" "network.EXT" "fsm.EXT")

(deflilmacro unswapped-pkt-num (pkt)
  '(aref (gpkt-other-ncp-fields-words ,pkt) 0))

(external add-once-per-scheduler-function ((function-to-add long)))

  ;;
;;;;;;  The CHAOS NCP, system side of things.  User stuff in CHAOS-USER
  ;;

  ;;
;;;;;;  Kludges
  ;;

(defatommacro fix-this-someday '(setq junk 0))

  ;;
;;;;;;  NCP constants
  ;;

(defatommacro WORST-ROUTING-COST #o1000)
(defatommacro host-down-timeout (* 60. 100.))
(defatommacros
  (   age-routing-table-interval (*  60. 4))
  (  status-connections-interval (// 60. 3))
  ( packet-repeat-delay-interval (// 60. 20.))
  (    sense-connections-interval (*  60. 5))
  (  do-retransmissions-interval (// 60. 2))
  (timeout-pending-rfcs-interval (*  60. 5))
  (  send-routing-table-interval (*  60. 15.))
  )

  ;;
;;;;;;  Support macros
  ;;

(defmacro pkt-nwords (pkt)
  '(+ first-data-word-in-pkt (lsh (1+ (pkt-nbytes ,pkt)) -1)))

(defmacro pktnum-< (a b)
  '(minusp (word (- ,a ,b))))
(defmacro pktnum-<= (a b)
  '(<= (word (- ,a ,b) 0)))
(defmacro pktnum-≤ (a b)
  '(≤ (word (- ,a ,b)) 0))

(defmacro pktnum-> (a b)
  '(not (pktnum-≤ ,a ,b)))

(defmacro pktnum-1+ (a)
  '(logand #o177777 (1+ ,a)))
(defmacro pktnum-incf (form)
  '(setf ,form (word (1+ ,form))))

(defmacro pktnum-- (a b)
  '(logand 177777 (- ,a ,b)))
```

```
  ;;
;;;;;;  Initialize all variables
  ;;

(defvar&initfun init-chaos-globals ()
  my-address word -1                          ;my main chaos address
  uniquizer byte  0                           ;connection uniquizer
  chaos-packet-input-list pkt NULL-pkt
  chaos-packet-input-tail pkt NULL-pkt
  pending-rfc-list pkt NULL-pkt
  pending-rfc-tail pkt NULL-pkt
  nservers word 0
  cb-next-time-to-age-routing-table    clock-value 0
  cb-next-time-to-send-routing-table   clock-value 0
  cb-next-time-to-status-connections   clock-value 0
  cb-next-time-to-sense-connections    clock-value 0
  cb-next-time-to-timeout-pending-rfcs clock-value 0
  cb-next-time-to-do-retransmissions   clock-value 0
  )

(defvar&initarrayfun init-chaos-tables ()
  connection-table (array conn chaos-max-conns) NULL-conn
  routing-table    (array word max-subnet)      0
  cost-table       (array word max-subnet)      WORST-ROUTING-COST
  )

(defun init-chaos-drivers ()
  (loop for (i word) upfrom 0 below n-general-drivers
        as (drv general-driver) = (aref driver-table i)
        if (and (not (null drv))
                (= (send-a-chaos-packet drv) #'cant-send-a-chaos-packet))
        do
        (if (= my-address -1)
            (setq my-address
                  #+BDLC (chaos-address drv)
                  #-BDLC (rotr (word (chaos-address drv)) 8.)
                  ))
        (setf (chaos-subnet drv) (progn #-BDLC (ldb-typed word #o0010 (chaos-address drv))
                                        #+BDLC (ldb-typed word #o1010 (chaos-address drv))))
        (setf (chaos-driver-number+1 drv) (1+ i))
        (setf (aref routing-table (chaos-subnet drv)) (1+ i))
        ))

(defun init-chaos-ncp ()
  (init-chaos-globals)
  (init-chaos-tables)
  (init-chaos-drivers)
  (add-once-per-scheduler-function #'step-chaos-background)
  )

;;;5 types: BF-INTERNAL, BF-BYTES, BF-BYTES-BACKWARDS, BF-WORDS-LR, BF-WORDS-RL

(defun make-chaos-packet-safe ((pkt pkt) (header byte-format) (data byte-format))
  (make-chaos-packet-header-safe pkt bf-internal)
  (make-chaos-packet-data-safe   pkt data)
  (make-chaos-packet-header-safe pkt header))

(defun make-chaos-packet-safe-for-me ((pkt pkt))
  (make-chaos-packet-header-safe pkt bf-internal)
  (make-chaos-packet-data-safe   pkt bf-internal))

;;; header tends towards bf-words-**, and should be BDLC independent
(defun make-chaos-packet-header-safe ((pkt pkt) (new-bf byte-format))
  (let* ((sav-bf new-bf)
         (old-bf (header-byte-format pkt)))
    (select old-bf
      (bf-internal (setq old-bf bf-words-rl))
      (bf-bytes    (setq old-bf #+BDLC bf-words-rl #-BDLC bf-words-lr)))
    (select new-bf
      (bf-internal (setq new-bf bf-words-rl))
      (bf-bytes    (setq new-bf #+BDLC bf-words-rl #-BDLC bf-words-lr)))
```

```
    (if (= new-bf old-bf)
        (swap-chaos-pkt-portion pkt 8. 16.))
    (setf (header-byte-format pkt) sav-bf)))

;;; data is sad.  If I figure it out, I'll describe it
;;; bf-words are probably done wrong here, but well enough for byte streams
(defun make-chaos-packet-data-safe ((pkt pkt) (new-bf byte-format))
  (let* ((sav-bf new-bf)
         (old-bf (data-byte-format pkt))
         (int-bf (chaos-data-format pkt)))
    ;; collapse to bytes or bytes-backwards
    (if (= old-bf bf-internal) (setq old-bf int-bf))
    (if (= new-bf bf-internal) (setq new-bf int-bf))
    (setq old-bf
          (select old-bf
            (bf-words-rl #+BDLC bf-bytes #-BDLC bf-bytes-backwards)
            (bf-words-lr #+BDLC bf-bytes-backwards #-BDLC bf-bytes)
            (otherwise old-bf)))
    (setq new-bf
          (select new-bf
            (bf-words-rl #+BDLC bf-bytes #-BDLC bf-bytes-backwards)
            (bf-words-lr #+BDLC bf-bytes-backwards #-BDLC bf-bytes)
            (otherwise new-bf)))
    (if (= new-bf old-bf)
        (swap-chaos-pkt-portion pkt 16. (+ 16. (logand (pkt-nbytes pkt) #o7777))))
    (setf (data-byte-format pkt) sav-bf)))

(defun (chaos-data-format byte-format) ((pkt pkt))
  (if (or (member (pkt-opcode pkt) '(opn-op sts-op rut-op sns-op))
          (≥ (only8 (pkt-opcode pkt)) dwd-op))
      bf-words-rl
    bf-bytes))

(defun swap-chaos-pkt-portion ((pkt pkt) (beg word) (end word))
  (loop for (i word) upfrom beg by 2 below end
        do (swapf (aref (pkt-bytes pkt) i)
                  (aref (pkt-bytes pkt) (1+ i)))))

  ;;
;;;;;;  Interface from the hardware driver
  ;;

(defun receive-chaos-packet-from-hardware ((drv general-driver)
                                           (pkt pkt))
  (make-chaos-packet-header-safe pkt bf-internal)
  ;(format debug-io"~%Packet in:")(describe-chaos-pkt pkt)
  (if (and (≥ (gpkt-allocated-size pkt) first-data-byte-in-pkt)
           (zerop (pkt-mbz pkt))
           (≥ (gpkt-allocated-size pkt) (+ first-data-byte-in-pkt
                                           (ldb-typed word #o0014 (pkt-nbytes pkt)))))
      (progn (network-meter drv packets-in)
             (setf (aref routing-table (chaos-subnet drv))
                   (chaos-driver-number+1 drv))
             (setf (aref cost-table (chaos-subnet drv)) 13.)
             (if (or (zerop (pkt-dest-address pkt))
                     (= (pkt-dest-address pkt)
                        (rotr (chaos-address drv) #+BDLC 8 #-BDLC 8)))
                 (if (not (null (setq pkt (assure-pkt-size pkt))))
                     (without-interrupts
                       (setf (pkt-nbytes pkt) (ldb-typed word #o0014 (pkt-nbytes pkt)))
                       (if (null chaos-packet-input-tail)
                           (setq chaos-packet-input-list pkt)
                         (setf (pkt-link chaos-packet-input-tail) pkt))
                       (setq chaos-packet-input-tail pkt)))
               (transmit-pkt pkt)))
    (network-meter drv packets-other-reject)
    (return-pkt pkt)))

  ;;
;;;;;;  Addition of servers
  ;;
```

```
(defvar server-alist (array server-alist-entry 10.) ())

(defun add-chaos-server ((contact string) (routine long))
  (setf (server-contact-name (aref server-alist nservers)) contact)
  (setf (server-run-routine  (aref server-alist nservers)) routine)
  (incf nservers))

  ;;
;;;;;;  Simple packet hacking
  ;;

(defun (allocate-pkt pkt) ()
  (let ((pkt (coerce pkt (allocate-gpkt max-bytes-per-pkt))))
    (unless (null pkt)
      (set-fields pkt
                  gpkt-user-byte-pointer 0
                  gpkt-user-byte-count   max-data-bytes-per-pkt
                  pkt-mbz 0                         ;make damn sure it's zero
                  pkt-nbytes 0                      ;nothing there yet
                  ))
    pkt))

(defun (make-error-pkt pkt) ((error-message string))
  (coerce pkt (make-error-gpkt error-message)))

(defun (assure-pkt-size pkt) ((pkt pkt))  ;fix this someday, this has several bugs
  (let ((new-pkt (allocate-pkt)))
    (unless (null new-pkt)
      (gpkt-copy-header (coerce gpkt pkt) (coerce gpkt new-pkt))
      (setf (pkt-header-longs new-pkt) (pkt-header-longs pkt))
      (loop for (i word) upfrom 0 below (ldb-typed word #o0014 (pkt-nbytes pkt))
            do (setf (aref (pkt-data-bytes new-pkt) i)
                     (aref (pkt-data-bytes     pkt) i))))
    (return-pkt pkt)
    new-pkt))

(defun return-pkt ((pkt pkt))
  (return-gpkt (coerce gpkt pkt)))

(defun return-pkt-if-not-on-a-user-list ((pkt pkt))
  (return-gpkt-if-not-on-a-user-list (coerce gpkt pkt)))
(defun return-pkt-if-not-on-an-xmit-list ((pkt pkt))
  (return-gpkt-if-not-on-an-xmit-list (coerce gpkt pkt)))

(defun return-pkt-list ((pkt pkt))
  (return-gpkt-list (coerce gpkt pkt)))
(defun return-pkt-list-if-not-on-an-xmit-list ((pkt pkt))
  (return-gpkt-list-if-not-on-an-xmit-list (coerce gpkt pkt)))

(defun (pkt-string string) ((pkt pkt))
  (let ((string (make-string (pkt-nbytes pkt))))
    (loop for (i word) upfrom 0 below (pkt-nbytes pkt)
          do (setf (aref (string-bytes string) i)
                   (aref (pkt-data-bytes  pkt) i)))
    string))

(defun set-pkt-string ((pkt pkt) (string string))
  (%set-pkt-string pkt 0 string 0 (string-length string)))

(defun %set-pkt-string ((pkt pkt) (pktfrm word)
                         (string string) (from word) (to word))
  (loop with (pktlen word) = (min max-data-bytes-per-pkt (- to from))
        for  (i      word) upfrom pktfrm below pktlen
        for  (j      word) upfrom from
        do (setf (aref (pkt-data-bytes  pkt) i)
                 (aref (string-bytes string) j))
        finally (setf (pkt-nbytes pkt) i)))

  ;;
;;;;;;  Simple connection hacking
  ;;
```

```
(defun (may-transmit boole) ((conn conn))
  (and (= (state conn) open-state)
       (plusp (window-available conn))))

(defun (data-available boole) ((conn conn))
  (not (null (read-pkts conn))))

(defun (finished-p boole) ((conn conn))
  (or (≥ (window-available conn) (foreign-window-size conn))
      (= (state conn) open-state)))

(defun (finish boole) ((conn conn))
  (process-wait "net finish" #'finished-p conn)
  (= (state conn) open-state)
  )

  ;;
;;;;;;  Simple packet/connection interactions
  ;;

(defun send-string ((conn conn) (string string))
  (loop with (strlen word) = (string-length string)
        for (i word) upfrom 0 by max-data-bytes-per-pkt below strlen
        for (pkt pkt) = (allocate-pkt)
        do (progn (%set-pkt-string pkt 0 string i strlen)
                  (send-pkt conn pkt dat-op))))

(defun send-string-buffered ((conn conn) (string string))
  (loop with (strlen word) = (string-length string)
        for  (i      word) upfrom 0 by max-data-bytes-per-pkt below strlen
        for  (pkt    pkt) = (stream-output-pkt conn)
        then (progn (send-pkt conn pkt dat-op) (allocate-pkt))
        do (setf (stream-output-pkt conn) NULL-pkt)
        do (%set-pkt-string pkt (pkt-nbytes pkt) string i strlen)
        finally (if (= (pkt-nbytes pkt) max-data-bytes-per-pkt)
                    (send-pkt conn pkt dat-op)
                    (setf (stream-output-pkt conn) pkt))))

  ;;
;;;;;;  Hairier connection routines
  ;;

(defun (make-error-connection conn) ((error-message string))
  (let ((conn (coerce conn (fsm-allocate (type-size conn-type)))))
    (if (not (null conn))
        (set-fields conn
                    conn-error-message  error-message
                    conn-error-conn             true
                    ))
    conn))

(defun (make-connection conn) ()
  (loop for (idx word) upfrom 0 below chaos-max-conns
        when (null (aref connection-table idx))
        return
        (let ((conn (temporary (coerce conn (fsm-allocate
                                              (type-size conn-type)))
                                (alloc conn #'fsm-allocate))))
          (if (not (null conn))
              (progn
                (set-fields conn
                            conn-error-message  NULL-string
                            conn-error-conn     false
                            local-window-size   0
                            foreign-window-size 0
                            state               inactive-state
                            foreign-port        0
                            local-address       my-address
                            local-idx           (byte idx)
                            local-uniq          (if (zerop (incf uniquizer))
                                                    (incf uniquizer)
                                                  uniquizer)
```

```
                                read-pkts           NULL-pkt
                                read-pkts-last      NULL-pkt
                                received-pkts       NULL-pkt

                                pkt-num-read        -1
                                pkt-num-received    -1
                                pkt-num-acked       -1
                                time-last-received  TIME
                                auto-status-threshold       8

                                stream-input-pkt    NULL-pkt
                                pkt-receive-event-mask      8
                                pkt-receive-event-channel   (make-pointer event-channel
                                                                          junk-em)

                                send-pkts           NULL-pkt
                                send-pkts-last      NULL-pkt
                                pkt-num-sent        8
                                send-pkt-acked      8
                                window-available    8

                                stream-output-pkt   NULL-pkt
                                pkt-xmit-event-mask 8
                                pkt-xmit-event-channel      (make-pointer event-channel
                                                                          junk-em)
                                )
                    (setf (aref connection-table idx) conn)))
             conn)
           finally
           (return NULL-conn)))

(defun remove-conn ((conn conn))
  (if (not (null conn))
      (progn
        (if (conn-error-conn conn)
            (if (not (null (conn-error-message conn)))

(return-string (conn-error-message conn)))
          (free-all-read-pkts conn)
          (free-all-received-pkts conn)
          (free-all-send-pkts conn)
          (setf (aref connection-table (local-idx conn)) NULL-conn))
        (temporary (fsm-free (coerce long conn))
                   (free conn conn #'fsm-free)))))

(defun free-all-read-pkts ((conn conn))
  (let ((head (read-pkts conn)))
    (setf (read-pkts      conn) NULL-pkt)
    (setf (read-pkts-last conn) NULL-pkt)
    (return-pkt-list head)))

(defun free-all-received-pkts ((conn conn))
  (let ((head (received-pkts conn)))
    (setf (received-pkts conn) NULL-pkt)
    (return-pkt-list head)))

(defun free-all-send-pkts ((conn conn))
  (let ((head (send-pkts conn)))
    (setf (send-pkts      conn) NULL-pkt)
    (setf (send-pkts-last conn) NULL-pkt)
    (return-pkt-list-if-not-on-an-xmit-list head)))

  ;;
;;;;;;  Hairier packet/connection interactions
  ;;

(defun (send-pkt-ok? boole) ((conn conn))
  (or (not (member (state conn) '(open-state rfc-sent-state)))
      (may-transmit conn)))
```

```
(defun (send-pkt boole) ((conn conn) (pkt pkt) (opcode byte))
  (if (and (or (≥ opcode dat-op)
               (= opcode eof-op))
           (progn (or (send-pkt-ok? conn)       ;may get called from sched
                      (process-wait "Net out" #'send-pkt-ok? conn))
                  (= (state conn) open-state)))
      (progn (setf (pkt-opcode pkt) opcode)
             (decf (window-available conn))
             (transmit-normal-pkt conn pkt true)
             true)
      (progn (return-pkt pkt)
             false)))

(defun send-unc-pkt ((conn conn) (pkt pkt)
                     (num word) (ack-num word))
  (setf (pkt-num     pkt) num)
  (setf (pkt-ack-num pkt) ack-num)
  (transmit-normal-pkt conn pkt false))

(defun send-listen-pkt ((conn conn) (pkt pkt))
  (if (≠ (state conn) inactive-state)
      (return-pkt pkt)
    (setf (state conn) listening-state)
    (loop for (pp pkt-ptr) = (make-pointer pkt-ptr pending-rfc-list)
          then (make-pointer pkt-ptr (pkt-link rfc-pkt))
          as (rfc-pkt pkt) = @pp
          until (null rfc-pkt)
          when (contact-names-equal rfc-pkt pkt)
          do
               (return-pkt pkt)
               (setf @pp (pkt-link rfc-pkt))
               (rfc-meets-lsn conn rfc-pkt)
               (return)
          finally (setf (send-pkts conn) pkt))))

(defun fast-answer-string ((contact string) (answer string))
  (fast-response-string contact answer ans-op 0))
(defun fast-reject-string ((contact string) (reason string))
  (fast-response-string contact reason cls-op 0))
(defun fast-forward-string ((contact string) (message string) (new-host word))
  (fast-response-string contact message fwd-op new-host))

(defun fast-response-string ((contact string) (response string)
                             (opcode byte) (ack-field word))
  (loop for (pp pkt-ptr) = (make-pointer pkt-ptr pending-rfc-list)
        then (make-pointer pkt-ptr (pkt-link pkt))
        as (pkt pkt) = @pp
        until (null pkt)
        when (contact-matches-rfc contact pkt)
        do
             (setf @pp (pkt-link pkt))
             (set-pkt-string pkt response)
             (setf (pkt-opcode pkt) opcode)
             (swapf (pkt-dest-port pkt) (pkt-src-port pkt))
             (setf (pkt-ack-num pkt) ack-field)
             (transmit-pkt pkt)
             (return)
             ))


(defun (get-next-pkt pkt) ((conn conn) (no-hang-p boole))
   (or no-hang-p
       (get-next-pkt-ok? conn)
       (process-wait "Net in" #'get-next-pkt-ok? conn))
   (let ((pkt (read-pkts conn)))
     (if (null pkt)
         (if (not (member (state conn) '(open-state foreign-state)))
             (setq pkt (make-error-pkt
                         "Connection in bad state to return a packet.")))
```

```
      (if (null (setf (read-pkts conn) (pkt-link pkt)))
          (setf (read-pkts-last conn) NULL-pkt))
      (if (not (member (state conn) '(open-state rfc-received-state foreign-state)))
          (setf (state conn) inactive-state))
      (if (= unc-op (pkt-opcode pkt))
          (progn (setf (pkt-num-read conn) (pkt-num pkt))
                 (if (and (= (state conn) open-state)
                          (≤ (decf (auto-status-threshold conn)) 3))
                     (transmit-sts conn))))
      (set-fields pkt
                  gpkt-user-byte-pointer 0
                  gpkt-user-byte-count (pkt-nbytes pkt))
      )
    pkt))

(defun (get-next-pkt-ok? boole) ((conn conn))
  (or (not (null (read-pkts conn)))
      (not (member (state conn) '(open-state foreign-state)))))

  ;;
;;;;;;  Transmit side of things
  ;;

(defun transmit-normal-pkt ((conn conn) (pkt pkt) (needs-acking boole))
  (setf (pkt-link pkt) NULL-pkt)
  (if needs-acking
      (progn (setf (unswapped-pkt-num pkt)
                   (setf (pkt-num pkt)
                         (setf (pkt-num-sent conn)
                               (pktnum-1+ (pkt-num-sent conn)))))
             (setf (pkt-num-acked conn)
                   (setf (pkt-ack-num pkt)
                         (pkt-num-read conn)))
             (setf (auto-status-threshold conn) (local-window-size conn))
             (if (null (send-pkts-last conn))
                 (setf (send-pkts conn) pkt)
               (setf (pkt-link (send-pkts-last conn)) pkt))
             (setf (send-pkts-last conn) pkt)
             (setf (gpkt-on-a-user-list? pkt) true))
    (setf (gpkt-on-a-user-list? pkt) false))
  (transmit-pkt-for-conn conn pkt))

(defun transmit-sts ((conn conn))
  (transmit-sts-pkt conn (allocate-pkt)))
(defun transmit-sts-pkt ((conn conn) (pkt pkt))
  (unless (null pkt)
    (setf (pkt-opcode pkt) sts-op)
    (setf (pkt-nbytes pkt) 4)
    (setf (pkt-num pkt) (pkt-num-sent conn))
    (setf (pkt-num-acked conn)
          (setf (pkt-ack-num pkt)
                (pkt-num-read conn)))
    (setf (pkt-second-data-word pkt) (local-window-size conn))
    (setf (pkt-first-data-word pkt) (pkt-num-received conn))
    (transmit-normal-pkt conn pkt false)))

(defun transmit-sns ((conn conn))
  (transmit-sns-pkt conn (allocate-pkt)))
(defun transmit-sns-pkt ((conn conn) (pkt pkt))
  (unless (null pkt)
    (setf (pkt-opcode pkt) sns-op)
    (setf (pkt-nbytes pkt) 4)
    (setf (pkt-num-acked conn)
          (setf (pkt-ack-num pkt)
                (pkt-num-read conn)))
    (transmit-normal-pkt conn pkt false)))

(defun transmit-pkt-for-conn ((conn conn) (pkt pkt))
  (setf (pkt-dest-port pkt) (foreign-port conn))
  (setf (pkt-src-port  pkt) (local-port   conn))
  ;(format debug-io"~%TPFC:") (describe-chaos-pkt pkt)
  (transmit-pkt pkt))
```

```
(defun transmit-pkt ((pkt pkt))
  (make-chaos-packet-header-safe pkt bf-internal)
  ;(format debug-io"~%Packet out:")(describe-chaos-pkt pkt)
  (let* ((subnet (word (pkt-dest-subnet pkt)))
         (Idest (pkt-dest-address pkt))
         ((route word) 0)
         ((driver-index+1 word) (cond ((≥ subnet max-subnet) (word 0))
                                      ((≤ (setq route (aref routing-table subnet))
                                          n-general-drivers)
                                       route)
                                      ((≥ (setq Idest route
                                                subnet (lshr idest 8))
                                          max-subnet)
                                       0)
                                      ((≤ (setq route (aref routing-table subnet))
  n-general-drivers)
                                       route)
                                      (T 0)))
         (drv (if (zerop driver-index+1)
                  NULL-general-driver
                (aref driver-table (1- driver-index+1)))))
    (if (null drv)
        (return-pkt-if-not-on-a-user-list pkt)
      (setf (gpkt-transmit-size pkt) (+ 16. (ldb-typed word #o0014 (pkt-nbytes pkt))))
      (funcall (send-a-chaos-packet drv) drv pkt Idest))))

(defun transmit-los-pkt ((pkt pkt) (string string))
  (setf (pkt-opcode pkt) los-op)
  (set-pkt-string pkt (if (null string)
                          "Reason not supplied."
                        string))
  (swapf (pkt-dest-port pkt) (pkt-src-port pkt))
  (transmit-pkt pkt))

  ;;
;;;;;;  Receive side of things.
  ;;

(defun cb-process-received-packets ()
  (loop for (pkt pkt) = chaos-packet-input-list
        until (null pkt)
        do (without-interrupts
             (if (null (setq chaos-packet-input-list (pkt-link pkt)))
                 (setf chaos-packet-input-tail NULL-pkt)))
           (make-chaos-packet-safe-for-me pkt)
           ;(describe-chaos-pkt pkt)
           (setf (pkt-link pkt) NULL-pkt)
           (let ((opcode (pkt-opcode pkt)))
             (cond ((minusp opcode) (receive-eof-or-dat pkt))
                   ((or (zerop opcode)
                        (≥ opcode max-op))
                    (transmit-los-pkt
                      pkt "I don't understand your opcode."))
                   (T #.(loop for (opcode handler)
                                  in '((rfc-op receive-rfc)
                                       (opn-op receive-opn)
                                       (cls-op receive-cls)
                                       (fwd-op receive-fwd)
                                       (ans-op receive-ans)
                                       (sns-op receive-sns)
                                       (sts-op receive-sts)
                                       (rut-op receive-rut)
                                       (los-op receive-los)
                                       (lsn-op return-pkt)
                                       (mnt-op return-pkt)
                                       (eof-op receive-eof-or-dat)
                                       (unc-op receive-unc)
                                       (brd-op receive-brd)
                                       (otherwise return-pkt))
```

```
                          collect '(,opcode (,handler pkt))
                          into select-items
                          finally (return
                                     '(select opcode ,@select-items))
                    )))))


  ;;
;;;;;; Packet reception
  ;;

(defun (find-conn-for-pkt conn) ((pkt pkt))
  (let* ((idx (pkt-dest-idx pkt))
         (conn (if (and (≥ idx 0)
                        (< idx chaos-max-conns))
                   (aref connection-table idx)
                  NULL-conn)))
    (if (and (not (null conn))
             (= (pkt-dest-address pkt) (local-address   conn))
             (= (pkt-src-address  pkt) (foreign-address conn))
             (if (zerop (foreign-idx conn))
                 (and (= (state conn) rfc-sent-state)
                      (member (pkt-opcode pkt)
                              '(opn-op ans-op cls-op fwd-op sns-op)))
               (= (pkt-src-index-num pkt) (foreign-index-num conn)))
             (or (= (pkt-dest-index-num pkt) (local-index-num conn))
                 (and (= (pkt-opcode pkt) rfc-op)
                      (member (state conn) '(open-state rfc-received-state))))
             )
        (progn (setf (time-last-received conn) TIME)
               conn)
      NULL-conn)))

(defun give-pkt-to-conn ((conn conn) (pkt pkt))
  ;(format debug-io"~%Giving packet (~O) to connection." (coerce long pkt))
  ;(describe-chaos-pkt pkt)
  (setf (pkt-link pkt) NULL-pkt)
  (if (null (read-pkts-last conn))
      (progn (setf (read-pkts conn) pkt)
             (setf @(pkt-receive-event-channel conn)
                   (logior @(pkt-receive-event-channel conn)
                           (pkt-receive-event-mask conn))))
    (setf (pkt-link (read-pkts-last conn)) pkt))
  (setf (read-pkts-last conn) pkt))
(defun receive-rfc ((pkt pkt))
  (cond ((loop for (rfc-pkt pkt) = pending-rfc-list
               then (pkt-link rfc-pkt)
               when (null rfc-pkt)
               return false
               when (and (= (pkt-src-index-num pkt) (pkt-src-index-num rfc-pkt))
                         (= (pkt-src-address   pkt) (pkt-src-address   rfc-pkt))
                         (= (pkt-dest-address  pkt) (pkt-dest-address  rfc-pkt)))
               return true)
         (return-pkt pkt))                  ;duplicate unhandled rfc
        ((loop with (conn conn)
               for (i word) upfrom 0 below chaos-max-conns
               if (not (null (setq conn (aref connection-table i))))
               do (cond ((and (= (state conn) listening-state)
                              (contact-names-equal pkt (send-pkts conn)))
                         (free-all-send-pkts conn)  ;flush the LSN
                         (rfc-meets-lsn conn pkt)
                         (return true))
                        ((and (member (state conn) '(rfc-received-state open-state))
                              (= (pkt-src-index-num pkt) (foreign-index-num conn))
                              (= (pkt-src-address   pkt) (foreign-address conn))
                              (= (pkt-dest-address  pkt) (local-address conn)))
                         (setf (time-last-received conn) TIME)
                         (return-pkt pkt) ;duplicate rfc for conn
                         (return true)))
               finally (return false)))
```

```
   ;;; may we should check known server functions??
   (T
    (if (null pending-rfc-list)
        (setq pending-rfc-list pkt)
      (setf (pkt-link pending-rfc-tail) pkt))
    (setq pending-rfc-tail pkt)
    (fire-up-a-server pkt))))

(defun receive-opn ((pkt pkt))
  ;(format debug-io"~%Receiving OPN packet...")
  (let ((conn (find-conn-for-pkt pkt)))
    (if (null conn)
        (transmit-los-pkt pkt "I don't have a connection for your OPN.")
      ;(format debug-io"found a connection for it...")
      (if (= (state conn) rfc-sent-state)
          (progn (setf (state conn) open-state)
                 ;(format debug-io"it was in RFC sent...")
                 (setf (foreign-index-num conn) (pkt-src-index-num pkt))
                 (setf (pkt-num-received conn)
                       (setf (pkt-num-read conn)
                             (pkt-num pkt)))
                 (process-sts-like-pkt conn pkt)))
      ;(format debug-io"Transmitting STS...")
      (transmit-sts-pkt conn pkt))))

(defun receive-cls ((pkt pkt))
  (let ((conn (find-conn-for-pkt pkt)))
    (if (null conn)
        (return-pkt pkt)
      (setf (state conn) cls-received-state)
      (give-pkt-to-conn conn pkt))))

(defun receive-fwd ((pkt pkt))
  (let ((conn (find-conn-for-pkt pkt)))
    (if (or (null conn)
            (≠ (state conn) rfc-sent-state)
            (null (send-pkts conn)))
        (return-pkt pkt)
      ;;bash conn and RFC in place, let retransmit take care of the rest
      (setf (foreign-address conn)
            (setf (pkt-dest-address (send-pkts conn))
                  (pkt-ack-num pkt))))))
(defun receive-ans ((pkt pkt))
  (let ((conn (find-conn-for-pkt pkt)))
    (if (or (null conn)
            (≠ (state conn) rfc-sent-state))
        (return-pkt pkt)
      (setf (state conn) answered-state)
      (give-pkt-to-conn conn pkt))))

(defun receive-sns ((pkt pkt))
  (let ((conn (find-conn-for-pkt pkt)))
    (if (null conn)
        (transmit-los-pkt pkt "You just SNSed a non-existent connection.")
      (receipt conn (pkt-ack-num pkt))
      (if (pktnum-> (pkt-num pkt) (send-pkt-acked conn))
          (setf (send-pkt-acked conn) (pkt-num pkt)))
      (transmit-sts-pkt conn pkt))))

(defun receive-sts ((pkt pkt))
  (let ((conn (find-conn-for-pkt pkt)))
    (if (null conn)
        (transmit-los-pkt pkt "You just STSed a non-existent connection.")
      (process-sts-like-pkt conn pkt)
      (return-pkt pkt)
      (retransmit-for-conn conn))))

(defun receive-rut ((pkt pkt))
  (loop with (gateway word) = (pkt-src-address pkt)
        for (i word) upfrom 0 by 2 below (// (pkt-nbytes pkt) 2)
        for (subnet word) = (aref (pkt-data-words pkt) i)
```

```
        for (cost word) = (aref (pkt-data-words pkt) (1+ i))
        do (if (and (not (zerop subnet))
                    (< subnet max-subnet)
                    (> cost 17.)
                    (< cost (aref cost-table subnet)))
               (progn (setf (aref cost-table   subnet) cost)
                      (setf (aref routing-table subnet) gateway))))
  (return-pkt pkt))

(defun receive-los ((pkt pkt))
  (let ((conn (find-conn-for-pkt pkt)))
    (if (or (null conn) (≠ (state conn) open-state))
        (return-pkt pkt)
      (setf (state conn) los-received-state)
      (give-pkt-to-conn conn pkt))))

(defun receive-unc ((pkt pkt))
  fix-this-someday
  (return-pkt pkt))
(defun receive-brd ((pkt pkt))
  fix-this-someday
  (return-pkt pkt))

(defun receive-eof-or-dat ((pkt pkt))
  (setf (pkt-link pkt) NULL-pkt)
  (let ((conn (find-conn-for-pkt pkt)))
    (cond ((null conn)
           (transmit-los-pkt pkt "No connection for data packet."))
          ((≠ (state conn) open-state)
           (transmit-los-pkt pkt "My connection is not open."))
          ((pktnum-> (pkt-num pkt) (+ (pkt-num-read conn)
                                      (local-window-size conn)))
           ;(describe-chaos-pkt pkt)(format debug-io"~%Packet out of window.")
           (return-pkt pkt))                ;out of window
          ((progn (receipt conn (pkt-ack-num pkt))
                  (if (pktnum-> (pkt-num pkt) (send-pkt-acked conn))
                      (setf (send-pkt-acked conn) (pkt-num pkt)))
                  (pktnum-≤ (pkt-num pkt) (pkt-num-received conn)))
           ;(describe-chaos-pkt pkt)(format debug-io"~%Already have it.")
           (transmit-sts-pkt conn pkt))    ;already received it
          ((= (pkt-num pkt) (pktnum-1+ (pkt-num-received conn)))
           (loop do (give-pkt-to-conn conn pkt)
;(format debug-io"~%Given to conn.")
                    (pktnum-incf (pkt-num-received conn))
                    (setq pkt (received-pkts conn))
                 until (or (null pkt)
                           (≠ (pkt-num pkt)
                              (pktnum-1+ (pkt-num-received conn))))
                 ;do (format debug-io"~%Pulled another off of received-pkts")
                 do (setf (received-pkts conn) (pkt-link pkt))))
          (T
           ;(describe-chaos-pkt pkt)(format debug-io"~%REOD, splicing...")
           (loop for (pp pkt-ptr) = (make-pointer pkt-ptr (received-pkts conn))
                 then (make-pointer pkt-ptr (pkt-link @pp))
                 if (null @pp)
                 do (setf @pp pkt)
                    ;(format debug-io"on the end.")
                    (return)
                 if (= (pkt-num pkt) (pkt-num @pp))
                 do (return-pkt pkt)       ;duplicate on out of order list
                    ;(format debug-io"duplicate.")
                    (return)
                 if (pktnum-< (pkt-num pkt) (pkt-num @pp))
                 do (setf (pkt-link pkt) @pp)
                    (setf @pp pkt)
                    ;(format debug-io"in the middle.")
                    (return)
                 ))
          )))
```

```
  ;;
;;;;;; Other connection/packet interaction functions
  ;;

(defun process-sts-like-pkt ((conn conn) (pkt pkt))
  (receipt conn (pkt-first-data-word pkt))
  (setf (foreign-window-size conn) (pkt-second-data-word pkt))
  (if (pktnum-> (pkt-num pkt) (send-pkt-acked conn))
      (setf (send-pkt-acked conn) (pkt-num pkt)))
  (update-window-available conn))

(defun receipt ((conn conn) (ack-lev word))
  (loop for (pkt pkt) = (send-pkts conn)
        until (or (null pkt) (pktnum-< ack-lev (unswapped-pkt-num pkt)))
        do (setf (send-pkts conn) (pkt-link pkt))
           (decf (send-pkts-length conn))
           ;(format debug-io"~%rpinoaxl ~O" (coerce long pkt))
           (without-interrupts (return-pkt-if-not-on-an-xmit-list pkt))
        finally (if (null (send-pkts conn))
                    (setf (send-pkts-last conn) NULL-pkt))))

(defun update-window-available ((conn conn))
  (let ((old-available (window-available conn)))
    (if (and (plusp
               (setf (window-available conn)
                     (max old-available
                          (- (foreign-window-size conn)
                             (pktnum-- (pkt-num-sent conn)
                                       (send-pkt-acked conn))))))
             (zerop old-available))
        (setf @(pkt-xmit-event-channel conn)
              (logior @(pkt-xmit-event-channel conn)
                      (pkt-xmit-event-mask conn))))))

(defun retransmit-for-conn ((conn conn))
  (loop for (pkt pkt) = (send-pkts conn) then (pkt-link pkt)
        until (null pkt)
        if (and (not (gpkt-on-an-xmit-list? pkt))
                (≥ TIME (+ (gpkt-xmit-time pkt) packet-repeat-delay-interval)))
        do (make-chaos-packet-header-safe pkt bf-internal)
           (setf (pkt-num-acked conn)
                 (setf (pkt-ack-num pkt)
                       (pkt-num-read conn)))
           (transmit-pkt pkt)))

(defun (contact-matches-rfc boole) ((contact string) (rfc pkt))
  (and (or (and (> (pkt-nbytes rfc) (string-length contact))
                (= (aref (pkt-data-bytes rfc) (string-length contact)) #\space))
           (= (pkt-nbytes rfc) (string-length contact)))
       (loop for (i word) upfrom 0 below (string-length contact)
             always (= (aref (pkt-data-bytes rfc) i)
                       (aref (string-bytes contact) i)))))

(defun (contact-names-equal boole) ((rfc-pkt pkt) (lsn-pkt pkt))
  (let ((lsn-nbytes (pkt-nbytes lsn-pkt)))
    (and (≥ (pkt-nbytes rfc-pkt) lsn-nbytes)
         (or (= (pkt-nbytes rfc-pkt) lsn-nbytes)
             (= (aref (pkt-data-bytes rfc-pkt) lsn-nbytes) #\space))
         (loop for (i word) upfrom 0 below lsn-nbytes
               always (= (aref (pkt-data-bytes rfc-pkt) i)
                         (aref (pkt-data-bytes lsn-pkt) i))))))

(defun rfc-meets-lsn ((conn conn) (pkt pkt))      ;pkt is the rfc
  (setf (pkt-link pkt) NULL-pkt)
  (set-fields conn
              foreign-port  (pkt-src-port pkt)
              local-address (pkt-dest-address pkt)
              foreign-window-size 1
              (pkt-num-read pkt-num-received pkt-num-acked) (pkt-num pkt)
              (read-pkts read-pkts-last) pkt
```

```
    state rfc-received-state
          time-last-received TIME
          )
  (setf @(pkt-receive-event-channel conn)
        (logior @(pkt-receive-event-channel conn)
                (pkt-receive-event-mask conn))))

(defun fire-up-a-server ((pkt pkt))
  (loop for (i word) upfrom 0 below nservers
        as (contact string) = (server-contact-name (aref server-alist i))
        when (contact-matches-rfc contact pkt)
        do
             (funcall (server-run-routine (aref server-alist i)))
             (return)
             ))

  ;;
;;;;;;  Chaos background 'process'
  ;;

(defvar cb-wakeup-time clock-value 0)

(defmacro cb-wait (time-variable n-ticks)
  `(setq cb-wakeup-time (min cb-wakeup-time
                              (setq ,time-variable (+ TIME ,n-ticks)))))
(defmacro cb-do-if-time-has-passed (time-var &rest forms)
  `(if (< TIME ,time-var)
       (setq cb-wakeup-time (min cb-wakeup-time ,time-var))
     ,@forms))

(defun step-chaos-background ()
  (setq cb-wakeup-time FOREVER)
  (cb-process-received-packets)
  (cb-send-stream-output-packets)
  (cb-maybe-age-routing-table)
  (cb-maybe-send-routing-table)
  (cb-maybe-status-connections)
  (cb-maybe-sense-connections)
  (cb-maybe-timeout-pending-rfcs)
  (cb-maybe-do-retransmissions)
  )

(defun cb-maybe-age-routing-table ()
  (cb-do-if-time-has-passed
    cb-next-time-to-age-routing-table
    (loop for (subnet word) upfrom 0 below max-subnet
          do (if (< (aref cost-table subnet) WORST-ROUTING-COST)
                 (incf (aref cost-table subnet))))
    (cb-wait cb-next-time-to-age-routing-table age-routing-table-interval)))

(defun cb-maybe-send-routing-table ()
  (cb-do-if-time-has-passed
    cb-next-time-to-send-routing-table
    (if (≥ number-of-alive-chaos-interfaces 2)
        (loop with (pkt pkt)
              for (drvidx word) upfrom 0 below n-general-drivers
              for (drv general-driver) = (aref driver-table drvidx)
              when (and (not (null drv))
                        (= (send-a-chaos-packet drv)
                           #'cant-send-a-chaos-packet))
              do (if (null (setq pkt (allocate-pkt)))
                     (return)
                   (setf (pkt-opcode pkt) rut-op)
                   (setf (pkt-src-address pkt)
                         #+BDLC (chaos-address drv)
                         #-BDLC (rotr (chaos-address drv) 8)
                         )
                   (setf (pkt-dest-address pkt) 0)
                   (loop with (pktidx word) = 0
                         with (my-cost word) = (aref cost-table (chaos-subnet drv))
                         for (subnet word) upfrom 1 below max-subnet
```

```
                    for (cost word) = (aref cost-table subnet)
                    when (< cost WORST-ROUTING-COST)
                    do (progn (setf (aref (pkt-data-words pkt) pktidx) subnet)
                              (setf (aref (pkt-data-words pkt) (1+ pktidx))
                                    (+ cost my-cost))
                              (incf pktidx 2))
                    finally (setf (pkt-nbytes pkt) (* pktidx 2)))
              (transmit-pkt pkt))))
    (cb-wait cb-next-time-to-send-routing-table send-routing-table-interval)))

(defun cb-maybe-status-connections ()
  (cb-do-if-time-has-passed
    cb-next-time-to-status-connections
    (loop for (i word) upfrom 0 below chaos-max-conns
          for (conn conn) = (aref connection-table i)
  if (and (not (null conn))
                  (= (state conn) open-state)
                  (connection-needs-status conn)
                  (≠ (pkt-num-acked conn) (pkt-num-received conn)))
          do (transmit-sts conn))
    (cb-wait cb-next-time-to-status-connections status-connections-interval)))

(defun cb-maybe-sense-connections ()
  (cb-do-if-time-has-passed
    cb-next-time-to-sense-connections
    (loop for (i word) upfrom 0 below chaos-max-conns
          for (conn conn) = (aref connection-table i)
          if (and (not (null conn))
                  (= (state conn) open-state))
          if (≥ (- TIME (time-last-received conn)) host-down-timeout)
          do (setf (state conn) host-down-state)
          else do (transmit-sns conn)
          )
    (cb-wait cb-next-time-to-sense-connections sense-connections-interval)))

(defun cb-maybe-timeout-pending-rfcs ()
  (cb-do-if-time-has-passed
    cb-next-time-to-timeout-pending-rfcs
    (loop with (pp pkt-ptr) = (make-pointer pkt-ptr pending-rfc-list)
          as (pkt pkt) = @pp
          until (null pkt)
          if (> (- TIME (gpkt-receive-time pkt)) #.(* 60. 20.))   ;20 seconds
          do
             ;(format debug-io"~%Timing out a RFC:") (describe-chaos-pkt pkt)
             (setf @pp (pkt-link pkt))
             (return-pkt pkt)
          else do (setq pp (make-pointer pkt-ptr (pkt-link pkt)))
          )
    (cb-wait cb-next-time-to-timeout-pending-rfcs timeout-pending-rfcs-interval)))

(defun cb-maybe-do-retransmissions ()
  (cb-do-if-time-has-passed
    cb-next-time-to-do-retransmissions
    (loop for (i word) upfrom 0 below chaos-max-conns
          as (conn conn) = (aref connection-table i)
          if (and (not (null conn))
                  (member (state conn) '(open-state rfc-sent-state)))
          if (> (- TIME (time-last-received conn)) host-down-timeout)
          do (setf (state conn) host-down-state)
          else do (retransmit-for-conn conn))
    (cb-wait cb-next-time-to-do-retransmissions do-retransmissions-interval)))

(defun cb-send-stream-output-packets ()
  (loop with (pkt pkt)
        for (i word) upfrom 0 below chaos-max-conns
        as (conn conn) = (aref connection-table i)
        if (and (not (null conn))
                (may-transmit conn)
                (not (null (prog1 (setq pkt (stream-output-pkt conn))
                                  (setf (stream-output-pkt conn) NULL-pkt)))))
        do (send-pkt conn pkt dat-op)
        ))
```

```
(defmacro only8 (byte) `(logand (word ,byte) #o377))

(defun describe-chaos-pkt ((pkt pkt))
  (format debug-io"~%Chaos packet description: ")
  (make-chaos-packet-safe-for-me pkt)
  (setf (pkt-nbytes pkt) (logand (pkt-nbytes pkt) #o7777))
  (let ((op (only8 (pkt-opcode pkt))))
    (format debug-io"~%Opcode = ~O = ~A"
            op
            (select op
              (rfc-op "Request for connection")
              (opn-op "Open the connection")
              (cls-op "Close connection")
              (fwd-op "Forward the request")
              (ans-op "Answer to simple request")
              (sns-op "Sensing the connection")
              (sts-op "Status of connection")
              (rut-op "Routing information")
              (los-op "Losing connection")
              (mnt-op "Maintenance")
              (eof-op "End of file marker")
              (unc-op "Uncontrolled packet")
              (brd-op "Broadcast request")
              (otherwise
               (cond ((< op dat-op) "Unknown opcode")
                     ((≥ op dwd-op) "Word data")
                     (T "Byte data")))))
    (format debug-io"~%Length: ~O. bytes" (pkt-nbytes pkt))
    (format debug-io"~%To:   ~O,~O~%From: ~O,~O"
            (pkt-dest-address pkt)
            (pkt-dest-index-num pkt)
            (pkt-src-address pkt)
            (pkt-src-index-num pkt))
    (format debug-io"~%Packet number: ~O~%Ack    number: ~O"
            (pkt-num pkt)
            (pkt-ack-num pkt))
    (show-chaos-packet-data pkt op)
    ;(return-gpkt (coerce gpkt pkt))
    ))

(defun show-chaos-packet-data ((pkt pkt) (op word))
  (select op
    ((rfc-op cls-op fwd-op ans-op los-op dat-op)
     (show-chaos-data-string pkt (select op
                                   (rfc-op "Contact name")
                                   (cls-op "Close message")
                                   (fwd-op "Forward info")
                                   (ans-op "Answer string")
                                   (los-op "Loss message")
                                   (dat-op "Byte data")
                                   (otherwise NULL-string))))
;    (rut-op (show-chaos-routing-packet pkt))
    (otherwise (setq op op))))

(defun show-chaos-data-string ((pkt pkt) (s string))
  (format debug-io"~%~%~A: " s)
  (loop for (i word) upfrom 0 below (pkt-nbytes pkt)
        do (tyo (aref (pkt-data-bytes pkt) i))))

(defun show-chaos-routing-packet ((pkt pkt))
  (format debug-io"~%~%Routing information:")
  (loop for (i word) upfrom 0 by 2 below (// (pkt-nbytes pkt) 2)
        do (format debug-io "~%Subnet ~O with cost ~O"
                   (aref (pkt-data-words pkt) i)
                   (aref (pkt-data-words pkt) (1+ i)))))
```

F:>lmach>fep>chaos-user.lil.6

```
;;;-*- Mode: Lil; Package:Lil; Base:8.; Lowercase: T -*-

(include "Types-and-macros")
(include "string.EXT" "chaos-ncp.EXT")

(defatommacro do-something-nasty-here '(setq junk junk))

  ;;
;;;;;;  User end of the CHAOS protocol
  ;;

(defun (address-parse word) ((name string) (number word))
  (if (null name)
      number
      number))

(defun (connect conn) ((name string)
                       (number word)
                       (contact-name string)
                       (window-size word)
                       (timeout long))
  (let ((real-address (address-parse name number)))
    (if (= real-address UNKNOWN-CHAOS-ADDRESS)
        (make-error-connection "Not a known address.")
      (let ((conn (open-connection real-address contact-name window-size)))
        (cond ((null conn)
               (make-error-connection "Could not allocate a connection."))
              ((conn-error-conn conn) conn)
              ((progn
                 (wait conn rfc-sent-state timeout "Net connect")
                 (= (state conn) open-state))
               conn)
              (T
               (progl (make-error-connection
                        (select (state conn)
                          (rfc-sent-state "Host not responding.")
                          (answered-state "Received an ANS instead of an OPN.")
                          (cls-received-state
                           (let* ((pkt (get-next-pkt conn false))
                                  (str (pkt-string pkt))
                                  (reason
                                    (if (zerop (string-length str))
                                        (progl "Host rejected connection without giving a reason."
                                               (return-string str))
                                      str)))
                             (return-pkt pkt)
                             str))
                          (otherwise "Connection went to bad state.")))
                      (remove-conn conn))))))))

(defun (simple pkt) ((name string)
                     (number word)
                     (contact-name string)
                     (timeout long))
  (let ((real-address (address-parse name number)))
    (if (= real-address UNKNOWN-CHAOS-ADDRESS)
        (make-error-pkt "Not a known address.")
      (let ((conn (open-connection real-address contact-name 1)))
        (cond ((null conn)
               (make-error-pkt "Could not allocate a connection."))
              ((conn-error-conn conn)
               (progl (make-error-pkt (conn-error-message conn))
                      (setf (conn-error-message conn) NULL-string)
                      (remove-conn conn)))
              ((progn (wait conn rfc-sent-state timeout "Net simple")
                      (= (state conn) answered-state))
```

```
            (prog1 (get-next-pkt conn false)
                   (remove-conn conn)))
           (T
            (prog1 (make-error-pkt
                     (select (state conn)
(rfc-sent-state "Host not responding.")
                     (cls-received-state
                      (let ((pkt (get-next-pkt conn false)))
                        (prog1 (pkt-string pkt)
                               (return-pkt pkt))))
                     (open-state "Received an OPN instead of an ANS.")
                     (otherwise "Connection went into a bad state.")))
                   (remove-conn conn)))))))

  ;;
;;;;;; Server functions.
  ;;

(defun (listen conn) ((contact-name string)
                      (window-size word)
                      (wait-for-rfc boole))
  (let ((conn (make-connection))
        (pkt  (allocate-pkt)))
    (if (or (null conn) (null pkt))
        (progn (if (not (null conn)) (remove-conn conn))
               (if (not (null pkt))  (return-pkt  pkt))
               NULL-conn)
      (setf (local-window-size conn) window-size)
      (set-pkt-string pkt contact-name)
      (send-listen-pkt conn pkt)
      (if (and wait-for-rfc (= (state conn) listening-state))
          (wait conn listening-state WAIT-FOREVER "Net Listen"))
      conn)))

(defun accept ((conn conn))
  (if (= (state conn) rfc-received-state)
      (progn (if (not (null (read-pkts conn)))
                 (return-pkt (get-next-pkt conn false)))
             (let ((pkt (allocate-pkt)))
               (setf (state conn) open-state)
               (setf (time-last-received conn) TIME)
               (setf (pkt-opcode pkt) opn-op)
               (setf (pkt-nbytes pkt) 4)
               (setf (pkt-second-data-word pkt) (local-window-size conn))
               (setf (pkt-first-data-word pkt) (pkt-num-read conn))
               (transmit-normal-pkt conn pkt true)))
      do-something-nasty-here
      ))

(defun reject ((conn conn) (reason string))
  (if (= (state conn) rfc-received-state)
      (close conn reason)
      do-something-nasty-here
      )
  (remove-conn conn))

(defun answer-string ((conn conn) (answer string))
  (if (= (state conn) rfc-received-state)
      (let ((pkt (allocate-pkt)))
        (set-pkt-string pkt answer)
        (setf (pkt-opcode pkt) ans-op)
        (transmit-normal-pkt conn pkt false))
      do-something-nasty-here
      )
  (remove-conn conn))

(defun answer ((conn conn) (pkt pkt))
  (if (= (state conn) rfc-received-state)
      (progn (setf (pkt-opcode pkt) ans-op)
             (transmit-normal-pkt conn pkt false))
```

```
      do-something-nasty-here
      )
  (remove-conn conn))

(defun forward ((conn conn) (pkt pkt) (host word))
  (if (= (state conn) rfc-received-state)
      (progn (setf (pkt-opcode pkt) fwd-op)
             (setf (pkt-ack-num pkt) host)
             (transmit-normal-pkt conn pkt false))
      do-something-nasty-here
      )
  (remove-conn conn))

(defun close ((conn conn) (reason string))
(select (state conn)
  ((rfc-received-state open-state)
   (let ((pkt (allocate-pkt)))
     (setf (pkt-opcode pkt) cls-op)
     (set-pkt-string pkt reason)
     (transmit-normal-pkt conn pkt false))))
(remove-conn conn))
(defun (open-connection conn) ((address word)
                               (contact-name string)
                               (window-size word))
  (let ((conn (make-connection))
        (pkt  (allocate-pkt)))
    (if (or (null conn) (null pkt))
        (progn (if (not (null conn)) (remove-conn conn))
               (if (not (null pkt))  (return-pkt  pkt))
               NULL-conn)
      (setf (local-window-size conn) (max 1 (min window-size maximum-window-size)))
      (setf (foreign-address conn) address)
      (temporary (setq junk junk)
                 (setf (contact-name conn) (copy-string contact-name)))

      (setf (pkt-opcode pkt) rfc-op)
      (set-pkt-string pkt contact-name)
      (setf (pkt-dest-address pkt) address)

      (transmit-normal-pkt conn pkt true)
      (setf (state conn) rfc-sent-state)
      (setf (time-last-received conn) TIME)
      conn)))

(defun (wait boole) ((conn conn) (old-state connection-state)
                     (timeout long) (who-state string))
  (let (((final-time long) (if (= timeout WAIT-FOREVER)
                               FOREVER
                             (+ TIME-as-long timeout))))
    (loop if (≠ (state conn) old-state)
          return true
          if (≥ TIME-as-long final-time)
          return false
          do (process-wait who-state #'wait1
                           conn (long (coerce byte old-state)) final-time))))

(defun (wait1 boole) ((conn conn)
                      (old-state long)
                      (final-time long))
  (or (≠ (state conn) (coerce connection-state (byte old-state)))
      (≥ TIME-as-long final-time)))
(defun (chaos-stream-input-available-p boole) ((conn conn))
  (or (not (null (stream-input-pkt conn)))
      (loop unless (get-next-pkt-ok? conn)
            return false
            as (pkt pkt) = (get-next-pkt conn true)
            if (null pkt)
            return true
            if (or (zerop (pkt-nbytes pkt))
                   (not (bit-test (byte 200) (pkt-opcode pkt))))
```

```
            do (return-pkt pkt)
            else do
            (setf (stream-input-pkt conn) pkt)
            (return true))))

(defun (chaos-tyi-eof byte) ((stream chaos-stream) (eof-option boole mode ref))
  (setq eof-option false)
  (let (((conn conn))
        ((pkt pkt)))
    (if (or (null stream)
            (null (setq conn (conn-for-stream stream)))
            (progn (or (chaos-stream-input-available-p conn)
                       (process-wait "Chaos tyi" #'chaos-stream-input-available-p conn))
                   (null (setq pkt (stream-input-pkt conn)))))
        (progn (setq eof-option true) (byte -1))
      (prog1 (aref (pkt-data-bytes pkt) (gpkt-user-byte-pointer pkt))
             (incf (gpkt-user-byte-pointer pkt))
             (when (zerop (decf (gpkt-user-byte-count pkt)))
               (setf (stream-input-pkt conn) NULL-pkt)
               (return-pkt pkt))))))
(defun (chaos-stream-output-available-p boole) ((conn conn))
  (loop if (not (member (state conn) '(open-state rfc-sent-state)))
        return true                          ;illegal is actually true
        as (pkt pkt) = (stream-output-pkt conn)
        if (null pkt)
        do (setq pkt (setf (stream-output-pkt conn) (allocate-pkt)))
        if (null pkt)
        return false
        if (> (gpkt-user-byte-count pkt) 0)
        return true
        unless (send-pkt-ok? conn)
        return false
        do (setf (stream-output-pkt conn) NULL-pkt)
           (send-pkt conn pkt dat-op)))

(defun chaos-tyo ((stream chaos-stream) (char byte))
  (unless (null stream)
    (incf (x-pos stream))
    (let ((conn (conn-for-stream stream)))
      (unless (null conn)
        (or (chaos-stream-output-available-p conn)
            (process-wait "Chaos tyo" #'chaos-stream-output-available-p conn))
        (let ((pkt (stream-output-pkt conn)))
          (when (and (member (state conn) '(open-state rfc-sent-state))
                     (not (null pkt))
                     (> (gpkt-user-byte-count pkt) 0))
            (setf (aref (pkt-data-bytes pkt) (gpkt-user-byte-pointer pkt)) char)
            (incf (gpkt-user-byte-pointer pkt))
            (decf (gpkt-user-byte-count pkt))
            (incf (pkt-nbytes pkt))
            ))))))
(defun (chaos-make-stream stream) ((conn conn))
  (let ((stream (coerce chaos-stream (allocate-stream (type-size chaos-stream-type)))))
    (unless (null stream)
      (set-fields stream
                  for-tyo #'chaos-tyo
                  for-tyi-eof #'chaos-tyi-eof
                  for-tyi-no-hang #'chaos-tyi-no-hang
                  for-close #'chaos-stream-close
                  for-terpri-or-fresh-line #'chaos-stream-terpri-or-fresh-line
                  conn-for-stream conn
                  character-set cscs-lispm
                  ))
    (coerce stream stream)))

(defun (chaos-tyi-no-hang boole) ((stream chaos-stream))
  (or (null stream)
      (let ((conn (conn-for-stream stream)))
        (or (null conn)
            (chaos-stream-input-available-p conn)))))
```

```
(defun chaos-stream-close ((stream chaos-stream))
  (unless (null stream)
    (let ((conn (conn-for-stream stream)))
      (setf (conn-for-stream stream) NULL-conn)
      (remove-conn conn))))

(defun chaos-stream-terpri-or-fresh-line ((stream chaos-stream) (always-terpri? boole))
  (unless (null stream)
    (when (or always-terpri? (≠ (x-pos stream) 0))
      (incf (y-pos stream))
      (setf (x-pos stream) 0)
      (select (character-set stream)
        (cscs-lispm (chaos-tyo stream #\cr))
        (cscs-supdup (chaos-tyo stream #o207))  ;%TDCRL
        (cscs-telnet (chaos-tyo stream #o15)
                     (chaos-tyo stream #o12))))))
;;;-*- Mode: Lil; Package:Lil; Base:8.; Lowercase: T -*-

(include "Types-and-macros")
(include "string.EXT" "network.EXT" "chaos-ncp.EXT" "chaos-user.EXT")

(defun status-server ()
  (let ((string (make-string 488.)))
    (if (not (null string))
        (progn
          (loop with (host-name string) = (cstring "68K Development")
                for (i word) upfrom 0 below (string-length host-name)
                until (≥ i 32.)
                do (setf (aref (string-bytes string) i)
                         (aref (string-bytes host-name) i))
                finally
                   (loop for (i word) upfrom i below 32.
                         do (setf (aref (string-bytes string) i) 0))
                   (setf (string-length string) 32.))
          (loop with (si word) = (string-length string)
                for (i word) upfrom 0 below n-general-drivers
                as (drv general-driver) = (aref driver-table i)
                if (and (not (null drv))
                        (≠ (send-a-chaos-packet drv) #'cant-send-a-chaos-packet))
                do
                   (setf (aref (string-bytes string) (+ si 0))
                         (byte (chaos-subnet drv)))
                   (setf (aref (string-bytes string) (+ si 1)) 1)
                   (setf (aref (string-bytes string) (+ si 2)) 16.)
                   (setf (aref (string-bytes string) (+ si 3)) 0)
                   (setq si (+ si 4))
                   #.(loop for field in '(packets-in packets-out packets-aborted
                                         packets-lost packets-crc-error
                                         packets-ram-error
                                         packets-bitc-error
                                         packets-other-reject)
                           collect
                           '(setq si (status-server-put-long
                                       string si (,field (gdrv-statistics drv))))
                           into setqs
                           finally (return '(progn ,esetqs)))
                finally
                   (setf (string-length string) si)
                   (fast-answer-string (cstring "STATUS") string)
                   (return-string string))))))

(defun (status-server-put-long word) ((string string) (si word) (val long))
  (loop for (i word) upfrom 0 below 4
        for (v long) = val then (lshr v 8)
        do (setf (aref (string-bytes string) (+ si i)) (byte v)))
  (+ si 4))

(defun uptime-server ()
  (let ((string (make-string 4)))
    (if (not (null string))
```

```
    (progn (loop for (i word) upfrom 0 below 4
                 for (t long) = (coerce long TIME) then (lshr t 8)
                 do (setf (aref (string-bytes string) i) (byte t)))
           (fast-answer-string (cstring "UPTIME") string)
           (return-string string)))))


(defun no-telnet-or-supdup-server ()
  (let ((reason (cstring "Remote login to the 68K development system??")))
    (fast-reject-string (cstring "TELNET") reason)
    (fast-reject-string (cstring "SUPDUP") reason)
    ))

(defun forwarding-name-server ()
  (fast-forward-string (cstring "NAME") (cstring "NAME") 17402))

(defun echo-server ()
   (process-run-function (cstring "Echo Server") #'echo-server-1))

(defun echo-server-1 ()
  (let ((conn (listen (cstring "ECHO") 3 true)))
    (unless (null conn)
      (if (null (conn-error-message conn))
          (progn
            (accept conn)
            (loop for (pkt pkt) = (get-next-pkt conn false)
                  if (or (null pkt) (not (null (pkt-error pkt))))
                  do (if (not (null pkt)) (return-pkt pkt))
                     (return)
                  while (send-pkt conn pkt dat-op)))
        (remove-conn conn)))))

(defun forwarding-supdup-server ()
  (process-run-function (cstring "FSUPDUP Server") #'fsupdup-server-1))
(defun fsupdup-server-1 ()
  (let* ((conn1 (listen (cstring "SUPDUP") 3 true))
         (conn2 (connect
                  NULL-string 1440
                  (cstring "SUPDUP") 3
                  (* 60. 10. 10.))))
    (if (and (not (null conn1))
             (not (conn-error-conn conn1))
             (not (null conn2))
             (not (conn-error-conn conn2)))
       (loop initially (accept conn1)
             with (pkt1 pkt) = NULL-pkt
             with (pkt2 pkt) = NULL-pkt
             while (and (= (state conn1) open-state)
                        (= (state conn2) open-state))
             if (null pkt1) do (setq pkt1 (get-next-pkt conn1 true))
             if (null pkt2) do (setq pkt2 (get-next-pkt conn2 true))
             do (cond ((null pkt1))
                      ((not (null (pkt-error pkt1)))
                       (return-pkt pkt1)
                       (setq pkt1 NULL-pkt))
                      ((may-transmit conn2)
                       (send-pkt conn2 pkt1 (pkt-opcode pkt1))
                       (setq pkt1 NULL-pkt)))
                (cond ((null pkt2))
                      ((not (null (pkt-error pkt2)))
                       (return-pkt pkt2)
                       (setq pkt2 NULL-pkt))
                      ((may-transmit conn1)
                       (send-pkt conn1 pkt2 (pkt-opcode pkt2))
                       (setq pkt2 NULL-pkt)))
             do (process-sleep 60.)
             finally (if (not (null pkt1)) (return-pkt pkt1))
                     (if (not (null pkt2)) (return-pkt pkt2))
                     ))
   (if (not (null conn1)) (remove-conn conn1))
   (if (not (null conn2)) (remove-conn conn2))
   ))
```

```
(defun dump-routing-table-server ()
  (let ((string (make-string 448.)))
    (if (not (null string))
        (loop for (i word) upfrom 0 below max-subnet
              for (j word) upfrom 0 by 4
              do (setf (aref (string-bytes string) (+ j 0))
                       (byte (aref routing-table i)))
                 (setf (aref (string-bytes string) (+ j 1))
                       (byte (lshr (aref routing-table i) 8)))
                 (setf (aref (string-bytes string) (+ j 2))
                       (byte (aref cost-table i)))
                 (setf (aref (string-bytes string) (+ j 3))
                       (byte (lshr (aref cost-table i) 8)))
              finally
                 (setf (string-length string) j)
(fast-answer-string "DUMP-ROUTING-TABLE" string)
                (return-string string)
                ))))
;;;-*- Mode: Lil; Package:Lil; Base:8.; Lowercase: T -*-

(include "Types-and-macros")
(include "fsm.EXT" "string.EXT")

(external %issue-disk-page-read  ((dp disk-page)))
(external %issue-disk-page-write ((dp disk-page)))

(defun init-disk ()
  (setq disk-page-list NULL-disk-page)
  )
(defun (disk-slow-\ long) ((dividend long) (divisor long))
  (word (disk-slow-//-\ dividend divisor false)))
(defun (disk-slow-// long) ((dividend long) (divisor long))
  (disk-slow-//-\ dividend divisor true))

(defun (disk-slow-//-\ long) ((dividend long) (divisor long) (return-quotient boole))
  (loop with (quotient long) = 0
        with (remainder long) = dividend
        for (subtractor long) first divisor then (lshr subtractor 1)
        for (bit long)
        first (loop for (bit long) first 1 then (progn (setq subtractor (lshl subtractor 1))
                                                       (lshl bit 1))
                    while (< subtractor dividend)
                    finally (return bit))
        then (lshr bit 1)
        until (< remainder divisor)
        while (≠ bit 0)
        when (≤ subtractor remainder)
        do (setq remainder (- remainder subtractor))
           (setq quotient (+ quotient bit))
        finally (return (if return-quotient quotient remainder))))

(defun (disk-slow-* long) ((a long) (b long))
  (loop with (ans long) = 0
        when (bit-test a 1)
        do (setq ans (+ ans b))
        until (zerop a)
        do (setq a (lshr a 1))
           (setq b (lshl b 1))
        finally (return ans)))
  ;;
;;;;;;  Ground up approach at first
  ;;

(defun (allocate-disk-data-raw disk-data) ()
  (coerce disk-data (fsm-allocate page-size)))
(defun return-disk-data-raw ((dd disk-data))
  (unless (null dd) (fsm-free (coerce long dd))))

(defun (allocate-disk-page-raw disk-page) ()
  (coerce disk-page (fsm-allocate (type-size disk-page-type))))
(defun return-disk-page-raw ((dp disk-page))
  (unless (null dp) (fsm-free (coerce long dp))))
```

```
(defun (allocate-file-stream-raw file-stream) ()
  (coerce file-stream (fsm-allocate (type-size file-stream-type))))
(defun return-file-stream-raw ((fs file-stream))
  (unless (null fs) (fsm-free (coerce long fs))))

  ;;
;;;;;;  One level up, not so raw
  ;;

(defilmacro allocate-disk-data () '(allocate-disk-data-raw))
(defilmacro return-disk-data   (dd) '(return-disk-data-raw ,dd))

(defun (allocate-disk-page disk-page) ((disk-unit word) (dpn long)
                                       (header-type long))
  (let ((dp (allocate-disk-page-raw)))
    (unless (null dp)
      (set-fields dp
                  error-message NULL-string
                  disk-unit disk-unit
                  dpn dpn
                  usage-count 1
                  page-state ps-read
                  page-needs-writing false
                  header-type header-type
                  disk-data NULL-disk-data)
      (without-interrupts
        (setf (next-disk-page-link dp) disk-page-list)
        (setq disk-page-list dp)))
    dp))

(defun (allocate-disk-page-preload disk-page) ((disk-unit word)
                                               (dpn long)
                                               (header-type long))
  (let ((dp (allocate-disk-page disk-unit dpn header-type)))
    (unless (null dp) (ensure-disk-data dp))
    dp))

(defun (allocate-disk-page-for-write disk-page) ((disk-unit word)
                                                 (dpn long)
                                                 (header-type long))
  (let ((dp (allocate-disk-page disk-unit dpn header-type)))
    (unless (null dp) (setf (page-state dp) ps-write))
    dp))

(defun (allocate-disk-page-for-write-preload disk-page) ((disk-unit word)
                                                         (dpn long)
                                                         (header-type long))
  (let ((dp (allocate-disk-page-for-write disk-unit dpn header-type)))
    (unless (null dp) (ensure-disk-data dp))
    dp))

(defun return-disk-page ((dp disk-page))
  (unless (null dp)
    (if (= (page-state dp) ps-write)
        (force-disk-page dp))            ;force a write
    (if (zerop (decf (usage-count dp)))
(loop for (dpp disk-page-ptr)
             =    (make-pointer disk-page-ptr disk-page-list)
             then (make-pointer disk-page-ptr
                                (next-disk-page-link maybe-dp))
             as (maybe-dp disk-page) = @dpp
             until (= dp maybe-dp)
             finally (setf @dpp (next-disk-page-link maybe-dp))
                     (return-disk-data (disk-data dp))
                     (return-disk-page-raw dp)))))

(defun force-disk-page ((dp disk-page))
  (when (and (not (null dp))
             (null (error-message dp))
             (= (page-state dp) ps-write)
             (page-needs-writing dp)
             (not (null (disk-data dp))))
```

```
    (%issue-disk-page-write dp)
    (setf (page-needs-writing dp) false)))
(defun (allocate-file-stream file-stream) ()
  (let ((fs (allocate-file-stream-raw)))
    (unless (null fs)
      (set-fields fs
                  error-message NULL-string
                  filename (cfilename "..0")
                  mode dm-block
                  direction dd-read
                  disk-unit 0
                  file-header-dpn -1
                  file-header-page NULL-disk-page
                  inferior-page-map-dpn -1
                  inferior-page-map-page NULL-disk-page
                  current-dpn -1
                  current-disk-page NULL-disk-page
                  current-block-number 0
                  desired-block-number 0
                  current-byte-offset 0
                  current-mode-offset 0
                  ))
    fs))

(defun (error-file-stream file-stream) ((error-message string))
  (let ((fs (allocate-file-stream)))
    (if (not (null fs))
        (setf (error-message fs) error-message))
    fs))

(defun return-file-stream ((fs file-stream))
  (unless (null fs)
    ;;; needs more work.  Fix output close to fix directory
    (unless (null (error-message fs)) (return-string (error-message fs)))
    (unless (null (file-header-page fs)) (return-disk-page (file-header-page fs)))
    (unless (null (inferior-page-map-page fs))
      (return-disk-page (inferior-page-map-page fs)))
    (unless (null (current-disk-page fs))
      (return-disk-page (current-disk-page fs)))
    (return-file-stream-raw fs)
    ))
(defun (ensure-disk-data boole) ((dp disk-page))
  (and (not (null dp))
       (null (error-message dp))
       (or (not (null (disk-data dp)))
           (and (not (null (setf (disk-data dp) (allocate-disk-data))))
                (progn
                  (select (page-state dp)
                    (ps-read
                     (%issue-disk-page-read dp))
                    (ps-write
                     (loop with (dd disk-data) = (disk-data dp)
                           for (i word)
                           upfrom 0 below (// page-size (type-size long))
                           do (setf (aref (disk-data-longs dd) i) 0))))
                  true)))))

(defun (ensure-header-data boole) ((fs file-stream))
  (and (ensure-header-page fs)
       (ensure-disk-data (file-header-page fs))
       ))

(defun (ensure-header-page boole) ((fs file-stream))
  (and (not (null fs))
       (null (error-message fs))
       (or (not (null (file-header-page fs)))
           (not (null (setf (file-header-page fs)
                            (find-dpn (disk-unit fs) (file-header-dpn fs)
                                      (header-type-to-long "FEFS"))))))
       ))
```

```
(defun (ensure-data-page boole) ((fs file-stream))
  (and (ensure-header-data fs)
       (progn (when (= (current-byte-offset fs) page-data-size)
                (incf (desired-block-number fs))
                (set-fields fs
                            current-byte-offset 0
                            current-mode-offset 0
                            ))
              (when (≠ (current-block-number fs) (desired-block-number fs))
                (when (not (null (current-disk-page fs)))
                  (return-disk-page (current-disk-page fs)))
                (set-fields fs
                            current-disk-page NULL-disk-page
                            current-block-number (desired-block-number fs)))
              true)
       (or (not (null (current-disk-page fs)))
           (let ((dpn (dpn (d&c-for-block fs (current-block-number fs)))))
             (and (≠ dpn -1)
                  (not (null (setf (current-disk-page fs)
                                   (find-dpn (disk-unit fs) dpn
                                             (header-type-to-long "DATA"))))))))
       (ensure-disk-data (current-disk-page fs))
       ))
  ;;
;;;;;;
  ;;

(defun (find-DPN disk-page) ((disk-unit word) (dpn long) (header-type long))
  (loop for (dp disk-page) = disk-page-list then (next-disk-page-link dp)
        if (null dp)
        return
           (allocate-disk-page disk-unit dpn header-type)
        if (and (= disk-unit (disk-unit dp))
                (= dpn (dpn dp)))
        return (progn (incf (usage-count dp))
                      dp)))

(defun (get-LABL-block disk-page) ()
  (let ((dp (find-DPN 0 0 (header-type-to-long "LABL"))))
    (unless (null dp) (ensure-disk-data dp))
    dp))

(defun (get-root-directory file-stream) ()
  (let* ((fs NULL-file-stream)
         (labl NULL-disk-page)
         (labl-page NULL-disk-LABL))
    (unless (null (setq labl (get-LABL-block)))
      (unless (null (setq labl-page (disk-LABL labl)))
        (unless (null (setq fs (allocate-file-stream)))
          (set-fields fs
                      filename (cfilename "ROOT-DIRECTORY.DIR.1")
                      mode dm-block
                      direction dd-read
                      disk-unit 0
                      file-header-dpn (<-slong (dpn-of-root-directory labl-page))
                      ))))
    (unless (null labl) (return-disk-page labl))
    fs))

(defun (make-d&c dpn-and-count) ((dpn long) (count long))
  (let (((d&c dpn-and-count)))
    (set-fields d&c
                dpn dpn
                count count)
    d&c))

(defun (d&c-for-block dpn-and-count) ((fs file-stream) (page-offset long))
  (if (ensure-header-page fs)
      (d&c-for-block-from-FEPF fs (file-header-page fs) page-offset)
    (make-d&c -1 0)))
```

```
(defun (d&c-for-block-from-FEPF dpn-and-count) ((fs file-stream)
                                                (fepf-page disk-page)
                                                (offset long))
  (ensure-disk-data fepf-page)
  (let ((fepf (disk-fepf fepf-page))
        (offset offset))                  ;avoid compiler misfeature
    (if (null fepf)
        (make-d&c -1 0)
      (loop for (i word) upfrom 0 below (word (<-slong (number-of-entries fepf)))
            as (npages long) = (<-slong (npages (aref (page-map fepf) i)))
            as (npages-only long) = (logand npages npages-mask)
            if (< offset npages-only)
            return (let ((dpn (<-slong (dpn (aref (page-map fepf) i)))))
                     (if (not (pmap? npages))
                         (make-d&c (+ offset dpn) (- npages-only offset))
                       (ensure-inferior-pmap fs dpn)
                       (d&c-for-block-from-FEPF
                         fs (inferior-page-map-page fs) offset)))
            do (setq offset (- offset npages-only))
            finally (return (make-d&c -1 0))))))

(defun ensure-inferior-pmap ((fs file-stream) (dpn long))
(when (≠ dpn (inferior-page-map-dpn fs))
  (if (not (null (inferior-page-map-page fs)))
      (return-disk-page (inferior-page-map-page fs)))
  (setf (inferior-page-map-dpn fs) dpn)
  (setf (inferior-page-map-page fs)
        (find-DPN (disk-unit fs) dpn (header-type-to-long "FEPF")))))
  ;;
;;;;;;
  ;;

;current-byte-offset in dm-36bit mode points to byte with least
;significant byte of datum in it.  Values go as 0, 4, 9., 13., ...

(defun set-filepos-and-mode ((fs file-stream) (filepos long) (mode disk-mode))
  (unless (null fs)
    (when (null (error-message fs))
      (let* ((item-size (word (select mode
                                ((dm-character dm-byte) 8.)
                                (dm-word 16.)
                                (dm-long 32.)
                                (dm-36bit 36.)
                                (dm-block (* 256. 36.)))))
             (bits-per-page (* (type-size (disk-data-bytes disk-data)) 8))
             (items-per-page (// bits-per-page item-size))
             (block-num (disk-slow-// filepos items-per-page))
             (mode-offset (word (disk-slow-\ filepos items-per-page)))
             (byte-offset (// (* mode-offset item-size) 8)))    ;works for dm-36bit!!
        (set-fields fs
                    mode mode
                    desired-block-number block-num
                    current-mode-offset mode-offset
                    current-byte-offset byte-offset)))))

(defun set-filepos-relative ((fs file-stream) (relative-filepos long) (mode disk-mode))
  (set-filepos-and-mode fs (+ (read-filepos fs mode) relative-filepos) mode))

(defun (read-filepos long) ((fs file-stream) (mode disk-mode))
  (if (and (not (null fs)) (null (error-message fs)))
      (let* ((item-size (word (select mode
                                ((dm-character dm-byte) 8.)
                                (dm-word 16.)
                                (dm-long 32.)
                                (dm-36bit 36.)
                                (dm-block (* 256. 36.)))))
             (bits-per-page (* (type-size (disk-data-bytes disk-data)) 8))
             (items-per-page (// bits-per-page item-size)))
        (+ (disk-slow-* (desired-block-number fs) items-per-page)
           (current-mode-offset fs)))
    0))
```

```
(defun (get-next-page disk-page) ((fs file-stream))
  (if (ensure-data-page fs)
      (progn (setf (current-byte-offset fs) page-data-size)
             (setf (current-mode-offset fs) 1)
             (current-disk-page fs))
    NULL-disk-page))

(defun (disk-tyi-8 byte) ((fs file-stream))
  (if (ensure-data-page fs)
      (prog1 (aref (disk-data-bytes (disk-data (current-disk-page fs)))
                   (current-mode-offset fs))
             (incf (current-mode-offset fs))
             (incf (current-byte-offset fs) (type-size byte)))
    -1))

(defun (disk-tyi-16 word) ((fs file-stream))
  (if (ensure-data-page fs)
      (prog1 (aref (disk-data-words (disk-data (current-disk-page fs)))
                   (current-mode-offset fs))
             (incf (current-mode-offset fs))
             (incf (current-byte-offset fs) (type-size word)))
    -1))

(defun (disk-tyi-32 long) ((fs file-stream))
  (if (ensure-data-page fs)
      (prog1 (<-slong (aref (disk-data-slongs (disk-data (current-disk-page fs)))
      (current-mode-offset fs)))
                (incf (current-mode-offset fs))
                (incf (current-byte-offset fs) (type-size long)))
      -1))

  (defun (disk-tyi-36-data long) ((fs file-stream))
    (data (disk-tyi-36 fs)))

  (deftype disk-tyi-36-4-bytes (structure ()
                                 (* (union (the-array (array byte 4))
                                           (the-slong slong)))))
  (defun (disk-tyi-36 lbus-word) ((fs file-stream))
    (let (((lbw lbus-word)))
      (if (ensure-data-page fs)
          (let* (((dt36-4b disk-tyi-36-4-bytes))
                 (dd (disk-data (current-disk-page fs)))
                 (cbo (current-byte-offset fs)))
            (loop for (i word) upfrom 0 below 4
                  for (cbo+i word) upfrom cbo
                  do (setf (aref (the-array dt36-4b) i)
                           (aref (disk-data-bytes dd) cbo+i)))
            (let* ((the-long (<-slong (the-slong dt36-4b)))
                   (the-byte (aref (disk-data-bytes dd) (+ cbo 4))))
              (if (evenp (current-mode-offset fs))
                  (progn (set-fields lbw
                                     data     the-long
                                     ecc+high the-byte)
                         (incf (current-byte-offset fs) 4))
                (progn (set-fields lbw
                                   data (rotr (logior (logand the-long -1_4)
                                                      (logand (long the-byte) #o17))
                                              4)
                                   ecc+high (rotr the-byte 4))
                       (incf (current-byte-offset fs) 5)))
              (setf (ecc+high lbw) (logand (ecc+high lbw) #o17))
              (incf (current-mode-offset fs))))
        (set-fields lbw
                    data -1
                    ecc+high -1))
      lbw))
```

```
;;;-*- Mode: Lil; Package:Lil; Base:8.; Lowercase: T -*-

(include "Types-and-macros")
(include "string.EXT" "disk-raw.EXT")

(defun (valid-pathname? boole) ((filename string))
   (let ((fl (string-length filename))
        ((entry word)) ((name-type word)) ((type-ver word)))
    (and (not (null filename))
         (≥ (string-length filename) 4)
         (= (aref (string-bytes filename) 0) #/>)
         (progn (setq entry  (string-reverse-search-char #/> filename fl 0))
                (≠ (setq name-type (string-search-char #/. filename (1+ entry) fl))
                   STRING-SEARCH-FAILED))
         (progn
           (setq type-ver (string-search-char #/. filename (1+ name-type) fl))
           (or (= type-ver STRING-SEARCH-FAILED)
               (loop for (i word) upfrom (1+ type-ver) below fl
                     as (char byte) = (aref (string-bytes filename) i)
                     always (and (≥ char #/0) (≤ char #/9))))
           ))))

(defun (open-file file-stream) ((filename string) (dm disk-mode) (dd disk-direction))
  (if (not (valid-pathname? filename))
      (error-file-stream (cstring "Illegal filename."))
    (let* ((entry (1+ (string-reverse-search-char #/> filename entire-string 0)))
           (dir (open-dir filename 0 entry)))
      (if (not (null (error-message dir)))
          dir                                    ;already has the error message in it
        (open-file-within-dir dir true
                              filename entry (string-length filename)
                              dm dd)))))

(defun (open-file-within-dir file-stream) ((dir file-stream)
                                           (close-dir-when-finished? boole)
                                           (filename string)
                                           (entry word)
                                           (end word)
                                           (dm disk-mode)
                                           (dd disk-direction))
  (let* ((first-dot  (string-search-char #/. filename entry end))
         (second-dot (string-search-char #/. filename (1+ first-dot) end))
         (version (if (= second-dot STRING-SEARCH-FAILED)
                      (word 0)
                    (string-to-based-number filename (1+ second-dot) end 10.))))
    (if (= second-dot STRING-SEARCH-FAILED) (setq second-dot end))
    (open-entry-within-dir dir close-dir-when-finished?
                           filename entry first-dot
                           filename (1+ first-dot) second-dot
                           version
                           dm dd
                           )))

(defun (open-entry-within-dir file-stream) ((dir file-stream)
                                            (close-dir-when-finished? boole)
                                            (entry-name string)
                                            (entry-beg word)
                                            (entry-end word)
                                            (type-name string)
                                            (type-beg word)
                                            (type-end word)
                                            (version long)
                                            (dm disk-mode)
                                            (dd disk-direction))
  (let* ((dpn (get-entry-info dir
                              entry-name entry-beg entry-end
                              type-name type-beg type-end
                              version))
         (fs (if (= dpn -1)
                 (error-file-stream (cstring "File not found."))
               (let ((fs (allocate-file-stream)))
```

```
(unless (null fs)
                   (set-fields fs
                              error-message NULL-string
                              mode dm
                              direction dd
                              disk-unit (disk-unit dir)
                              file-header-dpn dpn
                              file-header-page NULL-disk-page
                              inferior-page-map-dpn -1
                              inferior-page-map-page NULL-disk-page
                              current-disk-page NULL-disk-page
                              current-block-number 0
                              )
                   (set-filepos-and-mode fs 0 dm))
                 fs))))
   (if close-dir-when-finished? (close-file-stream dir))
   fs))

(defun (open-dir file-stream) ((filename string) (start word) (end word))
  (loop for (dir file-stream) = (get-root-directory)
        then (open-entry-within-dir dir true
                                    filename this-entry next->
                                    (cstring "DIR") 0 3
                                    1
                                    dm-block dd-read)
        for (this-entry word) = (1+ start) then (1+ next->)
        as (next-> word) = (string-search-char #/> filename this-entry end)
        until (= next-> STRING-SEARCH-FAILED)
        finally (return dir)))

(defun (get-entry-info long) ((dir file-stream)
                              (entry-name string)
                              (entry-beg word)
                              (entry-end word)
                              (type-name string)
                              (type-beg word)
                              (type-end word)
                              (version long))
  (temporary (setf (desired-block-number dir) 0)
             (set-file-pointer dir 0))
  (loop with (dpn long) = -1
        with (hversion long) = -1
        with (found-it boole) = false
        until found-it
        as (dir-page disk-page) = (get-next-page dir)
        until (or (null dir-page) (not (null (error-message dir-page))))
        as (fepd disk-fepd) = (disk-fepd dir-page)
        do (loop until found-it
                 for (i word) upfrom 0 below (word (<-slong (nentries fepd)))
                 as (entry-ptr FEPD-entry-ptr) = (make-pointer
                                                  FEPD-entry-ptr
                                                  (aref (entries fepd) i))
                 if (dir-entry-matches entry-ptr
                                       entry-name entry-beg entry-end
                                       type-name  type-beg  type-end
                                       version)
                 do (cond ((= version (<-slong (version entry-ptr)))
                           (setq dpn (<-slong (header-dpn entry-ptr)))
                           (setq found-it true))
                          ((and (zerop version)
                                (> (<-slong (version entry-ptr)) hversion))
                           (setq dpn (<-slong (header-dpn entry-ptr)))
                           (setq hversion (<-slong (version entry-ptr)))))
                 )
        finally (return dpn)))

(deflilmacro char-= (a b)
  '(let* (((a byte) ,a)
          ((b byte) ,b))
     (if (and (≥ a #/a) (≤ a #/z))
         (setq a (- a (- #/a #/A))))
```

```
    (if (and (≥ b #/a) (≤ b #/z))
        (setq b (- b (- #/a #/A))))
    (= a b)))

(defun (dir-entry-matches boole) ((ep FEPD-entry-ptr)
                                  (entry-name string)
                                  (entry-beg word)
                                  (entry-end word)
                                  (type-name string)
                                  (type-beg word)
                                  (type-end word)
                                  (version long))
  (and (or (zerop version) (= version (<-slong (version ep))))
       (loop for (i word) upfrom type-beg below type-end
             for (j word) upfrom 0 below (array-length (type ep))
             always (char-= (aref (string-bytes type-name) i)
                            (aref (type ep) j)))
       (loop for (i word) upfrom entry-beg below entry-end
             for (j word) upfrom 0 below (array-length (name ep))
             always (char-= (aref (string-bytes entry-name) i)
                            (aref (name ep) j)))
       ))

(defun close-file-stream ((fs file-stream))
  (return-file-stream fs))                    ;'tis true
;-*- Mode:68K; Package:USER; Base:8. -*-
;;; This is the assembly code for the fep hack

;(psect prom address #o77400000)
(psect code)
(module (asm-hack psect code address 0)
        (external main)

start   (reset)                         ;reset io
        (movel (% 406000) ra7)          ;Put sp down below rom stack area
        (jmp main))


;;;-*- Mode: Lil; Package:Lil; Base:8.; Lowercase: T -*-

(include "Types-and-macros")

(external (read-amem lbus-word) ((adr long)))
(external write-amem ((adr long) (val lbus-word)))

(define-sysconstant dtp-nil dtp-fix)

#-BDLC (ferror "~%These utils are for the real fep, stupid.")

(defun (read-iob-reg long) ((reg long))
  (let-globally ((lbus-map-slot lbus-map-slot-for-iob-regs))
    (read-lbus-long (+ *iob-board-base* reg))))

(defun write-iob-reg ((reg long) (val long))
  (let-globally ((lbus-map-slot lbus-map-slot-for-iob-regs))
    (write-lbus-long (+ *iob-board-base* reg) val)))

(defun (read-lbus-long long) ((addr long))
  (setq (address (aref lbus-map lbus-map-slot)) (lbus-address-page addr))
  (<-slong (aref (aref lbus-data lbus-map-slot) (lbus-address-offset addr))))

(defun (read-lbus lbus-word) ((addr long))
  (let (((lbw lbus-word)))
    (setq (address (aref lbus-map lbus-map-slot)) (lbus-address-page addr))
    (setf (data lbw) (<-slong (aref (aref lbus-data lbus-map-slot)
                                    (lbus-address-offset addr))))
    (setf (ecc+high lbw) (ecc+high (aref lbus-map lbus-map-slot)))
    lbw))

(defun write-lbus-long ((addr long) (datum long))
  (setq (address (aref lbus-map lbus-map-slot))(lbus-address-page addr))
  (setq (ecc+high (aref lbus-map lbus-map-slot)) (lsh dtp-fix -4))      ;really dtp-fix
  (setf (aref (aref lbus-data lbus-map-slot) (lbus-address-offset addr)) (->slong datum)))
```

```
(defun write-lbus ((addr long) (lbw lbus-word))
  (setq (address (aref lbus-map lbus-map-slot)) (lbus-address-page addr))
  (setq (ecc+high (aref lbus-map lbus-map-slot)) (ecc+high lbw))
  (setf (aref (aref lbus-data lbus-map-slot) (lbus-address-offset addr))
        (->slong (data lbw))))

(defun (lisp-null boole) ((val lbus-word))
  (and (= (lsh dtp-nil -4) (logand (ecc+high val) 3))
       (= (logand dtp-nil 17) (lsh (data val) -28.))))

(defun (insert-odd-parity long) ((val long) (nbits long))
  (setq val (logand val (make-mask nbits)))
  (loop with (parity long) = val
        for (shift-count long) = 1 then (+ shift-count shift-count)
        until (≥ shift-count nbits)
        do (setq parity (logxor parity (ashr parity shift-count)))
        finally (setq parity (logand 1 (logxor parity 1)))
                (return (logior val (ashl parity nbits)))))

(defun put-odd-parity-on-uword ((uword microinstruction mode ref))
  (format t "~&Before parity ~U" uword)
  (alter microinstruction uword parity 0)
  (format t ", with parity clear ~U" uword)
  (loop with (parity byte) = 1                    ;odd
        for (i word) below (array-length uword)
        do (setq parity (logxor parity (aref uword i)))
        finally (loop repeat 3                    ;log 8 (base 2)
                      for (shc byte) = 4 then (lshr shc 1)
                      do (setq parity (logxor parity (lshr parity shc)))
                      finally (alter microinstruction uword parity (progn parity))))
  (format t ", finally ~U." uword))

(defun (extract-field word) ((p word) (s word) (arry *byte-array-ptr))
  (loop with (first-byte word) = (// p 8.)
        with (last-byte word) =  (// (1- (+ p s)) 8.)
        with (byte long) = 0
        for (i word) from first-byte to last-byte
        for (bits-rotated word) upfrom 0 by 8.
        do (setq byte (logior (logand (long (aref @arry i)) #o377)
                              (rotr byte 8.)))
        finally (return (word (logand (make-mask s)
                                      (rotl byte (- bits-rotated (\ p 8.))))))))

(defun insert-field ((p word) (s word) (arry *byte-array-ptr) (byte long))
  (loop for (siz word) = s then (- siz (- 8. pos)) until (≤ siz 0)
        for (pos word) = (\ p 8.) then 0
        for (val long) = (lshl (long byte) (\ p 8.)) then (lshr val 8.)
        for (i word) upfrom (// p 8.)
        for (mask byte) = (byte (make-mask (min siz (- 8 pos)) pos))
        do ;(format t "~&insrt p=~o, s=~o, v=~o, result =~o" pos siz val
           (setf (aref @arry i) (logior (logand (byte val) mask)
                                        (logand (aref @arry i) (lognot mask))))))

(defun insert-uword-field ((p word) (s word) (uword microinstruction mode ref) (byte long))
  (insert-field
    p s (coerce *byte-array-ptr (make-pointer microinstruction-ptr uword)) byte))

(defun write-vmem ((adr long) (val lbus-word))
  (setq adr (logand adr #.(1- 1_28.)))
  (cond ((< adr (temporary #o1777770000 sym:a-memory-virtual-address))
         (write-lbus adr val))
        ((< adr (+ (temporary #o1777770000 sym:a-memory-virtual-address) 10000))
         (setq adr (logand 7777 adr))
         (write-amem adr val))
        ))

(defun write-vmem-long ((adr long) (val long))
  (write-vmem adr (long-into-lbus-word val)))

(defun write-amem-long ((adr long) (val long))
  (write-amem adr (long-into-lbus-word val)))
```

```
(defun (read-vmem lbus-word) ((adr long))
  (setq adr (logand adr #.(1- 1_28.)))
  (cond ((< adr (temporary #o1777770000 sym:a-memory-virtual-address))
         (read-lbus adr))
        ((< adr (+ (temporary #o1777770000 sym:a-memory-virtual-address) 10000))
         (setq adr (logand 7777 adr))
         (read-amem adr))
        (t (let (((lbw lbus-word)))
             (set-fields lbw
                         data -1
                         ecc+high -1)
             lbw))
        ))

(defun (read-amem-long long) ((adr long))
  (data (read-amem adr)))

;;;-*- Mode: Lil; Package:Lil; Base:8.; Lowercase: T -*-

(include "Types-and-macros")

(defconst hsb-chaos-address word 24441)
(defconst hsb-ethernet-address 6bytes (constant 6bytes 8 0 5 0 0 1))

;;;-*- Base: 8; Mode: Lil; Package: Lil; Base:8.; Lowercase: T -*-

(include "Types-and-macros")
(include "network.EXT" "ethernet.EXT" "hsb-config.EXT" "fep-utils.EXT")

(defvar *hsb-debug* word 0)

(external add-once-per-scheduler-function ((new-fun long)))

(define-sysconstants
  %dcr-com-read8

  %%dcr-unit-tag
  %%dcr-cylinder-tag
  %%dcr-head-tag
  %%dcr-control-tag
  %%dcr-unit

  %%dcr-command
  %%dcr-busy
  %%dcr-fep

  %%disk-header-sector
  %%disk-header-head
  %%disk-header-cylinder
  %%disk-header-pack
  %%disk-header-parity

  %%dsr-ready
  %%dsr-on-cylinder
  %%dsr-seek-error
  %%dsr-device-check
  %%dsr-read-only
  %%dsr-address-mark

  %%dsr-state-machine-error
  %%dsr-select-error
  %%dsr-overrun
  %%dsr-ecc-ok
  %%dsr-compare-error
  %dsr-error-mask
  )

;;; ability
(defvar fep-net-enabled boole true)
(defvar fep-using-net   boole false)

;;; usage
(defvar hsb-in-use boole false)

;;; ownership
(deftype who-has-hsb (enumeration nobody-has-hsb
                                  disk-has-hsb
                                  net-xmit-has-hsb
                                  net-recv-has-hsb
                                  outside-has-hsb))
(defvar who-has-hsb who-has-hsb nobody-has-hsb)
```

```
;;; desired ownership
(defvar disk-wants-hsb     boole false)
(defvar net-xmit-wants-hsb boole false)
(defvar net-recv-wants-hsb boole false)
(defvar outside-wants-hsb  boole false)

;;; for fep-dma-from-device-finish
(defvar fdfd-saved-count-up boole true)
(defvar fdfd-saved-buffer-idx word 0)

;;; internal disk state
(deftype hsb-disk-state (enumeration hds-wait-for-user-request
                                     hds-wait-for-seek
                                     hds-wait-for-hsb-access
                                     hds-wait-for-hsb-dma-complete
                                     ))
(defvar hsb-disk-state hsb-disk-state hds-wait-for-user-request)

(deftype hsb-disk-error (enumeration hde-no-error
                                     hde-select-error
                                     hde-seek-error
                                     hde-disk-error

                                     hde-bogus-disk-header
                                     hde-track-out-of-sync
                                     hde-too-many-sector-tries
                                     hde-too-many-ecc-retries
                                     ))
(defvar hsb-disk-error hsb-disk-error hde-no-error)

(defun init-hsb-for-dcp ()
  (setq *iob-board-number* 10)
  (setq *iob-board-base* (lshl (long *iob-board-number*) 19.))
  (init-hsb-outside)
  (init-hsb-network)
  (init-hsb-disk)
  (abort-hsb-dma-transfer)
  (setq hsb-in-use false)
  (setq who-has-hsb nobody-has-hsb)
  (add-once-per-scheduler-function #'step-hsb))

(defvar pending-outside-hsb-request-count word 0)
(defvar *spy-bus-available-to-outside* boole false)

(defun init-hsb-outside ()
  (setq outside-wants-hsb false)
  (setq pending-outside-hsb-request-count 0)
  (setq *spy-bus-available-to-outside* false)
  )

(deftype hsb-network-driver (pointer hsb-network-driver-type auto-dereference t))
(defatommacro NULL-hsb-network-driver '(make-null-pointer hsb-network-driver))
(deftype hsb-network-driver-type
  (structure (include general-driver-type)
    (a-structure-must-have-one-or-more-elements word)
    ))

(defvar the-hsb-network-driver hsb-network-driver NULL-hsb-network-driver)

(defun init-hsb-network ()
  (fdebug 1 *hsb-debug* "~%Initializing hsb network driver")
  (let ((hsb-net (coerce hsb-network-driver
                         (create-general-driver
                           (type-size hsb-network-driver-type)))))
    (fdebug 1 *hsb-debug* "~%hsb network driver is at ~O" (coerce long hsb-net))
    (setq the-hsb-network-driver hsb-net)
    (unless (null hsb-net)
      (set-fields hsb-net
                  send-an-ethernet-packet #'send-an-ethernet-packet-to-hsb
                  send-a-chaos-packet #'send-a-chaos-packet-to-hsb
                  chaos-address hsb-chaos-address
                  )
      (setf @(coerce ethernet-address-ptr
                     (make-pointer byte-ptr (aref (ethernet-address hsb-net) 0)))
            @(coerce ethernet-address-ptr
                     (make-pointer byte-ptr (aref hsb-ethernet-address 0))))
      (fdebug 1 *hsb-debug* "~%finishing hsb network driver")
      (finish-general-driver (coerce general-driver hsb-net))
      (fdebug 1 *hsb-debug* "~%HSB network driver initialized")
      ))
  (setq fep-net-enabled true)
  (setq fep-using-net true))
```

```
(defvar&initfun init-hsb-disk-globals ()
  longs-per-disk-page word (// (type-size disk-data-type) 4)
  hsb-dma-pointer-for-disk word (- (type-size disk-data-type))
  fep-hsb-disk-page disk-page NULL-disk-page
  fep-disk-tries-until-give-up word 32.
  hsb-counter-disk-start-dma long 0
  hsb-counter-finish-disk-dma long 0
  hsb-counter-too-many-sector-tries long 0
  hsb-counter-ecc-errors long 0
  hsb-counter-sector-wait-no-timeout long 0
  hsb-counter-sector-n-1-found long 0
  )

(defun init-hsb-disk ()
  (init-hsb-disk-globals)
  (init-disk-error-history)
  (setq hsb-disk-state hds-wait-for-user-request)
  (setq hsb-disk-error hde-no-error)
  )

(defun step-hsb ()
  (select who-has-hsb
    (net-xmit-has-hsb (step-hsb-net-xmit))
    (net-recv-has-hsb (step-hsb-net-recv)))
  (step-hsb-disk)
  (bid-for-hsb-access)
  (when (and hsb-in-use
             (= who-has-hsb net-recv-has-hsb)
             (or disk-wants-hsb net-xmit-wants-hsb outside-wants-hsb))
    (abort-hsb-dma-transfer))
  (unless hsb-in-use  ;; net-recv  -> net-xmit  ->  disk  ->  net-recv  ,etc.
    (if outside-wants-hsb
        (give-hsb-to-outside)
      (setq *spy-bus-available-to-outside* false)       ;outside doesn't want it
      (select who-has-hsb
        ((nobody-has-hsb net-recv-has-hsb) (cond (net-xmit-wants-hsb (give-hsb-to-net-xmit))
                                                 (disk-wants-hsb     (give-hsb-to-disk))
                                                 (net-recv-wants-hsb (give-hsb-to-net-recv))))
        (net-xmit-has-hsb (cond (disk-wants-hsb     (give-hsb-to-disk))
                                (net-recv-wants-hsb (give-hsb-to-net-recv))
                                (net-xmit-wants-hsb (give-hsb-to-net-xmit))))
        (disk-has-hsb     (cond (net-recv-wants-hsb (give-hsb-to-net-recv))
                                (net-xmit-wants-hsb (give-hsb-to-net-xmit))
                                (disk-wants-hsb     (give-hsb-to-disk))))))))

(defun bid-for-hsb-access ()
  (setq outside-wants-hsb (> pending-outside-hsb-request-count 0))
  (setq disk-wants-hsb (and (= hsb-disk-error hde-no-error)
                            (not (null fep-hsb-disk-page))
                            (= hsb-disk-state hds-wait-for-hsb-access)))
  (setq net-xmit-wants-hsb (and fep-net-enabled
                                fep-using-net
                                (not (null (gdrv-xmit-list the-hsb-network-driver)))))
  (setq net-recv-wants-hsb fep-net-enabled))

(defun give-hsb-to-outside ()
  (setq *spy-bus-available-to-outside* true)
  (setq who-has-hsb outside-has-hsb)
  (setq hsb-in-use true))

(defun request-spy-bus ()                        ;must have matching unrequest
  (incf pending-outside-hsb-request-count))

(defun unrequest-spy-bus ()
  (ungrab-spy-bus))

(defun (grab-spy-bus boole) ((no-hang-p boole)) ;must have matching ungrab
  (incf pending-outside-hsb-request-count)
  (if (or *spy-bus-available-to-outside*
          no-hang-p
          (progn (process-wait "Grab spy bus" #'grab-spy-bus-1)
                 true))
      true
    (decf pending-outside-hsb-request-count)    ;couldn't get it
    false))

(defun (grab-spy-bus-1 boole) ()
  *spy-bus-available-to-outside*)

(defun ungrab-spy-bus ()
  (when (zerop (decf pending-outside-hsb-request-count))
    (setq hsb-in-use false)
    (setq who-has-hsb nobody-has-hsb)))
```

```
(defun give-hsb-to-disk ()
  (fdebug 100000 *hsb-debug* "~%Giving HSB to disk.")
  (setq who-has-hsb disk-has-hsb)
  (step-hsb-disk))                                  ;does actual activation

(defun give-hsb-to-net-xmit ()
  (fdebug 100000 *hsb-debug* "~%Giving HSB to net xmit.")
  (setq who-has-hsb net-xmit-has-hsb)
  (let ((pkt (get-pkt-from-driver-queue (coerce general-driver the-hsb-network-driver))))
    (if (null pkt)
        (setq who-has-hsb nobody-has-hsb)
      (fdebug 2 *hsb-debug*
              "~%Found a packet to xmit on HSB [~O]"
              (coerce long pkt))
      (net-fep-transmit-pkt pkt))))

(defun give-hsb-to-net-recv ()
  (fdebug 100000 *hsb-debug* "~%Giving HSB to net recv.")
  (setq who-has-hsb net-recv-has-hsb)
  (net-fep-receive-pkt))

  ;;
;;;;;;  Utilities
  ;;

(externals ((disk-slow-\  long) long long)
           ((disk-slow-// long) long long))

(defun disk-spy-select ()
  (spy-write spy-net-select *iob-board-number*))

(defun (fep-disk-select-unit string) ((unit word))
  (disk-spy-select)
  (fep-write-disk-command (dpb-ior-typed long unit %%dcr-unit
                                         (dpb-ior-typed long 0 %%dcr-unit-tag
                                                        0)))
  (fep-write-disk-command (dpb-ior-typed long unit %%dcr-unit
                                         (dpb-ior-typed long 1 %%dcr-unit-tag
                                                        0)))
  (fep-write-disk-command (dpb-ior-typed long unit %%dcr-unit
                                         (dpb-ior-typed long 1 %%dcr-unit-tag
                                                        0)))
  (let ((sts (fep-read-disk-status)))
    (cond ((ldb-test-typed long %%dsr-select-error sts) (cstring "Select error"))
          ((ldb-test-typed long %%dsr-ready sts) NULL-string)   ;no string is good string
          (T (cstring "Drive not ready")))))

(defun fep-write-disk-command-no-fep ((val long))
  (write-iob-reg *disk-command-offset* val))
(defun fep-write-disk-command ((val long))
  (write-iob-reg *disk-command-offset* (dpb-ior-typed long 1 %%dcr-fep val)))
(defun fep-write-disk-command1 ((val long))
  (fep-write-disk-command (dpb-ior-typed long *fep-disk-unit* %%dcr-unit
                                         (dpb-ior-typed long 1 %%dcr-unit-tag val))))

(defun (fep-build-sector-header long) ((pack word) (cyl word) (head word) (sector word))
  (let (((header long) (dpb-ior-typed long pack %%disk-header-pack
                                      (dpb-ior-typed long cyl %%disk-header-cylinder
                                                     (dpb-ior-typed long head %%disk-header-head
                                                                    (dpb-ior-typed long sector
                                                                                   %%disk-header-sector
                                                                                   0))))))
    (dpb-ior-typed long (logxor (fep-disk-compute-parity32 header) 1)
                   %%disk-header-parity header)))

(defun (fep-disk-compute-parity32 long) ((n32 long))
  (let* ((n16 (logxor (word n32) (word (rotr n32 16.))))
         (n08 (logxor n16 (lshr n16 8)))
         (n04 (logxor n08 (lshr n08 4)))
         (n02 (logxor n04 (lshr n04 2)))
         (n01 (logxor n02 (lshr n02 1))))
    (logand n01 1)))

(defatommacro n-sectors 16.)                        ;temp until units are table driven
(defatommacro n-heads 10.)                          ;temp until units are table driven
```

```
 ;;
;;;;;;  Here for disk hacking
 ;;

(defvar hsb-disk-error-history (array hsb-disk-error 16.) ())
(defvar disk-error-history-count word 0)
(defun init-disk-error-history ()
  (setq disk-error-history-count 0)
  (loop for (i word) upfrom 0 to 16.
        do (setf (aref hsb-disk-error-history i) hde-no-error)))

(defun push-disk-error ((hde hsb-disk-error))
  (setq hsb-disk-error hde)
  (setf (aref hsb-disk-error-history (\ disk-error-history-count 16.)) hde)
  (incf disk-error-history-count))

(defun fep-clear-hsb-disk-error ()
  (setq hsb-disk-error hde-no-error)
  (setq hsb-disk-state hds-wait-for-user-request))

(defun try-to-fix-hsb-disk-error ()                ;fix this later
  (unless (null fep-hsb-disk-page)
    (setf (error-message fep-hsb-disk-page)
          (cstring "Disk error during read."))
    (setq fep-hsb-disk-page NULL-disk-page)))

(defvar last-fep-read-disk-status long 0)
(defun fep-check-disk-error ()
  (let ((sts (fep-read-disk-status)))
    (setq last-fep-read-disk-status sts)
    (if (bit-test %dsr-error-mask sts)
        (push-disk-error hde-disk-error))))

(defun step-hsb-disk ()
  (if (= hsb-disk-error hde-no-error)
      (try-to-fix-hsb-disk-error)
    (select hsb-disk-state
      (hds-wait-for-user-request (when (not (null fep-hsb-disk-page))
                                   (fep-disk-select-and-seek)
                                   (setq hsb-disk-state hds-wait-for-seek)))
      (hds-wait-for-seek (when (fep-disk-seek-completed-ok?)
                           (fep-disk-select-head)
                           (setq hsb-disk-state hds-wait-for-hsb-access)))
      (hds-wait-for-hsb-access (when (= who-has-hsb disk-has-hsb)
                                 (setq fep-disk-tries-until-give-up 32.)
                                 (fep-disk-search-for-sector-n-1)
                                 (fep-disk-start-dma)
                                 (setq hsb-disk-state hds-wait-for-hsb-dma-complete)))
      (hds-wait-for-hsb-dma-complete
       (when (fep-disk-dma-complete-ok?)
         (cond ((fep-disk-header-match?)
                (fep-finish-disk-dma)
                (cond ((ldb-test %%dsr-ecc-ok (fep-read-disk-status))
                       (setq fep-hsb-disk-page NULL-disk-page
                             hsb-disk-state hds-wait-for-user-request
                             hsb-in-use false))
                      ((progn (incf hsb-counter-ecc-errors)
                              (zerop (decf fep-disk-tries-until-give-up)))
                       (push-disk-error hde-too-many-ecc-retries)
                       (setq hsb-in-use false))
                      (T (fep-disk-start-dma))))
               ((= hsb-disk-error hde-no-error)
                (setq hsb-in-use false))
               ((zerop (decf fep-disk-tries-until-give-up))
                (incf hsb-counter-too-many-sector-tries)
                (push-disk-error hde-too-many-sector-tries)
                (setq hsb-in-use false))
               (T (fep-disk-start-dma)))))      ;try again
     )))

(defvar *fep-disk-pack-id* word 0)
(defvar *fep-disk-unit* word 0)
(defvar *fep-disk-sect* word 0)
(defvar *fep-disk-head* word 0)
(defvar *fep-disk-cyl*  word 0)
(defvar *fep-disk-expected-header* long 0)

(defun fep-disk-select-and-seek ()
  (disk-spy-select)
  (let* ((dp fep-hsb-disk-page)
         (dpn (dpn dp))
         (cyl-head-sect (logand dpn #.(1- 1_26.)))
         (cyl-head (word (disk-slow-// cyl-head-sect n-sectors))))
    (setq *fep-disk-unit* (word (lshr dpn 26.))
          *fep-disk-sect* (word (disk-slow-\  cyl-head-sect n-sectors))
          *fep-disk-head* (word (disk-slow-\  cyl-head n-heads))
          *fep-disk-cyl*  (word (disk-slow-// cyl-head n-heads))
          *fep-disk-expected-header* (fep-build-sector-header
                                      *fep-disk-pack-id* *fep-disk-cyl*
                                      *fep-disk-head* *fep-disk-sect*)
          )
```

```
    (fep-write-disk-command  0)
    (fep-write-disk-command1 0)
    (fep-write-disk-command1 0)
    (if (ldb-test-typed long %%dsr-select-error (fep-read-disk-status))
        (push-disk-error hde-select-error)
      (fep-write-disk-command1 *fep-disk-cyl*)
      (fep-write-disk-command1 (dpb-ior-typed long 1 %%dcr-cylinder-tag *fep-disk-cyl*))
      (fep-write-disk-command1 *fep-disk-cyl*)
      )))

(defun (fep-disk-seek-completed-ok? boole) ()
  (let ((sts (fep-read-disk-status)))
    (if (ldb-test-typed long %%dsr-seek-error sts)
        (progn (push-disk-error hde-seek-error)
               false)
      (ldb-test-typed long %%dsr-on-cylinder sts))))

(defun fep-disk-select-head ()
  (fep-write-disk-command1 *fep-disk-head*)
  (fep-write-disk-command1 (dpb-ior-typed long 1 %%dcr-head-tag *fep-disk-head*))
  (fep-write-disk-command1 *fep-disk-head*)
  (fep-check-disk-error))

(defun fep-disk-search-for-sector-n-1 ()
  (spy-write spy-net-control 0)
  (loop with (sector-n-1 long) = (fep-build-sector-header
                                   *fep-disk-pack-id* *fep-disk-cyl*
                                   *fep-disk-head* (\ (+ *fep-disk-sect* n-sectors -1)
                                                      n-sectors))
        with (n-1-low word) = (word sector-n-1)
        with (n-1-high word) = (word (rotr sector-n-1 16.))
        with (command long) = (dpb-ior (long *fep-disk-unit*) %%dcr-unit
                                (dpb-ior 1 %%dcr-unit-tag
                                  (dpb-ior %dcr-com-read8 %%dcr-command
                                    (dpb-ior 1 %%dcr-control-tag
                                      (dpb-ior 1 %%dcr-busy
                                        0)))))
        repeat 32.
        until (loop initially (fep-start-hsb-dma-from-device-macro true true -2)
                              (fep-write-disk-command1 command)
                    repeat 250.
                    when (and (bit-test (build fep-hsb-control not-spy-dma-busy 1)
                                        (spy-read fep-hsb-control))
                              (progn (fep-write-io-word fep-hsb-control
                                                        (build fep-hsb-control
                                                               write-to-dev 1
                                                               not-spy-dma-busy 0))
                                     (fep-hsb-setup-macro true -2)
                                     (incf hsb-counter-sector-wait-no-timeout)
                                     true))
                    return (and (= (fep-read-io-word fep-hsb-data) n-1-low)
                                (= (fep-read-io-word fep-hsb-data) n-1-high)
                                (progn (incf hsb-counter-sector-n-1-found) true))
                    finally (fep-write-io-word fep-hsb-control
                                               (build fep-hsb-control
                                                      write-to-dev 1
                                                      not-spy-dma-busy 0))
                            (return true)       ;don't waste time timing out
                    )))

(defun fep-disk-start-dma ()
  (spy-write spy-net-control 0)
  (incf hsb-counter-disk-start-dma)
  (fep-start-hsb-dma-from-device true true hsb-dma-pointer-for-disk)
  (fep-write-disk-command1
    (dpb-ior-typed long *fep-disk-unit* %%dcr-unit
           (dpb-ior-typed long 1 %%dcr-unit-tag
                  (dpb-ior-typed long %dcr-com-read8 %%dcr-command
                         (dpb-ior-typed long 1 %%dcr-control-tag
                                (dpb-ior-typed long 1 %%dcr-busy
                                       0)))))))

(defun (fep-disk-dma-complete-ok? boole) ()
  (and (fep-hsb-dma-finished?)
       (progn (fep-finish-hsb-dma-from-device)
              true)))

(defvar last-disk-actual-header long 0)
(defun (fep-disk-header-match? boole) ()
  (fep-hsb-setup true hsb-dma-pointer-for-disk)
  (let* ((low-word  (fep-read-hsb))
         (high-word (fep-read-hsb))
         (disk-actual-header (dpb-ior-typed long high-word #o2020
                                (dpb-ior-typed long (ldb-typed long #o0020 low-word)
                                               #o0020 0))))
    (setq last-disk-actual-header disk-actual-header)
    (or (= disk-actual-header *fep-disk-expected-header*)
        (progn (cond ((ldb-test-typed long #o3601 disk-actual-header)
                      (push-disk-error hde-bogus-disk-header))
                     ((= (ldb-typed long #o3006 disk-actual-header)
                         (ldb-typed long #o3006 *fep-disk-expected-header*))
                      (push-disk-error hde-track-out-of-sync))
```

```
                  false))))

(defun fep-finish-disk-dma ()
  (incf hsb-counter-finish-disk-dma)
  (fep-hsb-to-array (make-pointer word-ptr
                                  (aref (disk-words (disk-data fep-hsb-disk-page)) 0))
                    (* longs-per-disk-page 2)))

  ;;
;;;;;;  Actual network hacking functions
  ;;

(defun net-spy-select ()
  (spy-write spy-net-select *iob-board-number*))

(defun net-fep-transmit-pkt ((pkt gpkt))
  (fdebug 040000 *hsb-debug* "~%NET-FEP-TRANSMIT-PKT...")
  (let* ((len (gpkt-transmit-size pkt))
         (bp (* len -2)))
    (net-spy-select)
    (spy-write spy-net-control 202)
    (fep-array-to-hsb-portion true (- bp 2)
                              (make-pointer word-ptr (aref (gpkt-data-words pkt) -7))
                              len)
    (fep-start-hsb-dma-to-device true true bp)))

(defun step-hsb-net-xmit ()
  (when (fep-hsb-dma-finished?)
    (fep-finish-hsb-dma-to-device)
    (return-current-output-pkt (coerce general-driver the-hsb-network-driver))
    (network-meter the-hsb-network-driver packets-out)
    (setq hsb-in-use false)))

(defun net-fep-receive-pkt ()
  (fdebug 010000 *hsb-debug* "~%NET-FEP-RECEIVE-PKT...")
  (net-spy-select)
  (spy-write spy-net-control 206)
  (spy-write spy-net-control 206)                    ;hardware bug, need to do twice
  (fep-start-hsb-dma-from-device true false 0))

(defun step-hsb-net-recv ()
  (when (fep-hsb-dma-finished?)
    (net-fep-process-received-pkt (fep-finish-hsb-dma-from-device))
    (setq hsb-in-use false)))

(defun net-fep-process-received-pkt ((size word))
  (if (< size (+ 6 6 2 46. 4))                      ;minimal ethernet packet
      (network-meter the-hsb-network-driver packets-other-reject)
    (let (((6bytes 6bytes)))
      (fep-hsb-portion-to-array true 0
                                (coerce word-ptr (make-pointer byte-ptr (aref 6bytes 0))) 3)
      (fdebug 004000 *hsb-debug* "~%Source read from hsb")
      (when (or (loop for (j word) downfrom 5 to 0
                      always (= (aref (ethernet-address the-hsb-network-driver) j)
                                (aref 6bytes j)))
                (loop for (j word) upfrom 0 below 6
                      always (= (aref 6bytes j) -1)))
        (fdebug 004000 *hsb-debug* "~%Packet for me.")
        (let* ((size (- size 6 6 4))                ;don't need dst,src,crc
               (pkt (allocate-gpkt (- size 2))))     ;type isn't part of the allocation
          (if (null pkt)
              (network-meter the-hsb-network-driver packets-other-reject)
            (fdebug 004000 *hsb-debug* "...packet is at ~O" (coerce long pkt))
            (fep-hsb-portion-to-array true (+ 6 6)      ;skip dst,src
                                      (make-pointer word-ptr (aref (gpkt-data-words pkt) -1))
                                      (// (1+ size) 2)) ;word count
            (fdebug 004000 *hsb-debug*
                    "~%NET-FEP-RECEIVE-PKT-CONTINUED: HSB-TO-ARRAY complete.")
            (receive-ethernet-packet-from-hardware
              (coerce general-driver the-hsb-network-driver)
              pkt
              (aref (gpkt-data-words pkt) -1))))))))

  ;;
;;;;;;  Program access to the High Speed Buffer
  ;;

(deflilmacro fep-hsb-setup-macro (count-up buffer-idx)
  `(progn (fep-write-io-word fep-hsb-control
                             (build fep-hsb-control
                                    write-to-dev 1
                                    not-spy-dma-busy 0
                                    count-up ,(if count-up "Up" "Down")))
          (fep-write-io-word fep-hsb-pointer ,buffer-idx)))

(defun fep-hsb-setup ((count-up boole) (buffer-idx word))
  (setq hsb-in-use true)
  (fep-hsb-setup-macro count-up buffer-idx))
```

```
(defun (fep-read-hsb word) ()
  (setq hsb-in-use true)
  (fep-read-io-word fep-hsb-data))
(defun fep-write-hsb ((datum word))
  (setq hsb-in-use true)
  (fep-write-io-word fep-hsb-data datum))

(defun fep-clear-hsb ()
  (fep-hsb-setup true 0)
  (loop repeat 1_11. do (fep-write-io-word fep-hsb-data 0)))

(defun fep-array-to-hsb-portion ((count-up boole) (buffer-idx word)
                                 (array-ptr word-ptr) (len word))
  (setq hsb-in-use true)
  (fep-hsb-setup count-up buffer-idx)
  (fep-array-to-hsb array-ptr len))

(defun fep-array-to-hsb ((array-ptr word-ptr) (len word))
  (setq hsb-in-use true)
  (loop with (array-ptr word-ptr) = array-ptr
        repeat len
        do (fep-write-io-word fep-hsb-data @array-ptr)
           (ptr-incf array-ptr word-ptr (type-size word))))

(defun fep-hsb-portion-to-array ((count-up boole) (buffer-idx word)
                                 (array-ptr word-ptr) (len word))
  (setq hsb-in-use true)
  (fep-hsb-setup count-up buffer-idx)
  (fep-hsb-to-array array-ptr len))

(defun fep-hsb-to-array ((array-ptr word-ptr) (len word))
  (setq hsb-in-use true)
  (loop with (array-ptr word-ptr) = array-ptr
        repeat len
        do (setf @array-ptr (fep-read-io-word fep-hsb-data))
           (ptr-incf array-ptr word-ptr (type-size word))))

  ;;
;;;;;;  DMA hackery
  ;;

(defun (fep-hsb-dma-finished? boole) ()
  (bit-test (build fep-hsb-control not-spy-dma-busy 1)
            (spy-read fep-hsb-control)))

(defun fep-start-hsb-dma-to-device ((count-up boole) (drive-spy-dma-busy-p boole)
                                    (buffer-idx word))
  (setq hsb-in-use true)
  (fdebug 000400 *hsb-debug* "~%fep-dma-to-device...")
  (fep-write-io-word fep-hsb-pointer buffer-idx)
  (fep-write-io-word fep-hsb-control (build fep-hsb-control not-spy-dma-busy 0
                                                             dma-setup 1))
  (fep-write-io-word fep-hsb-control (build fep-hsb-control not-spy-dma-busy 0
                                                             dma-setup 1
                                                             spy-dma-enb 1
                                                             write-to-dev 1))
  (fep-write-io-word fep-hsb-control
                     (logior (build fep-hsb-control not-spy-dma-busy 0
                                                    dma-setup 1
                                                    spy-dma-enb 1
                                                    write-to-dev 1)
                             (if count-up
                                 (build fep-hsb-control not-spy-dma-busy 0
                                                        count-up 1) 0)
                             (if drive-spy-dma-busy-p
                                 (build fep-hsb-control not-spy-dma-busy 0
                                                        drive-busy 1) 0))))

(defun fep-finish-hsb-dma-to-device ()
  (setq hsb-in-use true)
  (fep-write-io-word fep-hsb-control (build fep-hsb-control not-spy-dma-busy 0 write-to-dev 1)))

(deflilmacro fep-start-hsb-dma-from-device-macro (count-up drive-spy-dma-busy-p buffer-idx)
  '(progn (fep-write-io-word fep-hsb-pointer (+ ,buffer-idx (if ,count-up -1 0)))
          (fep-write-io-word fep-hsb-control (build fep-hsb-control not-spy-dma-busy 0
                                                                     dma-setup 1))
          (fep-write-io-word fep-hsb-control
                             (logior (build fep-hsb-control not-spy-dma-busy 0
                                                            dma-setup 1
                                                            spy-dma-enb 1)
                                     (if ,count-up
                                         (build fep-hsb-control not-spy-dma-busy 0
                                                                count-up 1) 0)
                                     (if ,drive-spy-dma-busy-p
                                         (build fep-hsb-control not-spy-dma-busy 0
                                                                drive-busy 1) 0)))))

(defun fep-start-hsb-dma-from-device ((count-up boole) (drive-spy-dma-busy-p boole)
                                      (buffer-idx word))
```

```
  (setq hsb-in-use true)
  (fep-start-hsb-dma-from-device-macro count-up drive-spy-dma-busy-p buffer-idx)
  (setq fdfd-saved-count-up count-up)
  (setq fdfd-saved-buffer-idx buffer-idx))

(defun (fep-finish-hsb-dma-from-device word) ()
  (setq hsb-in-use true)
  (fep-write-io-word fep-hsb-control
                     (build fep-hsb-control not-spy-dma-busy 0 write-to-dev 1))
  (let ((ptr (fep-read-io-word fep-hsb-pointer)))
    (logand 3777 (if fdfd-saved-count-up
                     (- ptr fdfd-saved-buffer-idx -1)
                   (- fdfd-saved-buffer-idx ptr)))))

(defun abort-hsb-dma-transfer ()
  (setq hsb-in-use false)
  (fep-write-io-word fep-hsb-control
                     (build fep-hsb-control not-spy-dma-busy 0 write-to-dev 1)))

  ;;
;;;;;;  Interface to the outside world
  ;;

(defun send-an-ethernet-packet-to-hsb ((drv hsb-network-driver)
                                       (pkt gpkt)
                                       (protocol word)
                                       (addr ethernet-address-ptr))
  (fdebug 000010 *hsb-debug* "~%send-an-ethernet-packet-to-hsb...")
  (setf (aref (gpkt-data-words pkt) -1) protocol)
  (setf @(coerce ethernet-address-ptr
                 (make-pointer byte-ptr (aref (gpkt-data-bytes pkt) -14.)))
        @addr)
  (setf @(coerce ethernet-address-ptr
                 (make-pointer byte-ptr (aref (gpkt-data-bytes pkt) -08.)))
        @(coerce ethernet-address-ptr
                 (make-pointer byte-ptr (aref hsb-ethernet-address 0))))
  (setf (gpkt-transmit-size pkt) (+ (// (max (1+ (gpkt-transmit-size pkt)) 46.) 2)
                                    1 3 3))
  (add-pkt-to-driver-queue pkt (coerce general-driver drv))
  )

(external make-chaos-packet-safe ((pkt gpkt)
                                  (header byte-format)
                                  (data byte-format)))

(defun send-a-chaos-packet-to-hsb ((drv hsb-network-driver)
                                   (pkt gpkt)
                                   (chaddr word))
  (fdebug 000004 *hsb-debug* "~%send-a-chaos-packet-to-hsb...")
  (make-chaos-packet-safe pkt bf-bytes bf-bytes)
  (let (((earb ethernet-address-resolution-block)))
    (setf (aref (earb-words earb) 0) chaddr)
    (transmit-ethernet-packet (coerce general-driver drv) pkt
                              ether-type$CHAOS earb)))

;These vars are used to keep track of which program is currently loaded into the fep

(defvar *fep-program-loaded* ())              ;module currently loaded
(defvar *fep-program-start-address* -1)       ;start address of load prog loaded

;On an abort, this form tries to force the fep back into the rom
(defmacro with-fep-program (program &body body)
  `(let ((.fep-program-aborted. t))
     (unwind-protect
       (progn (assure-fep-program-loaded ,program)
              ,@body
              (setq .fep-program-aborted. nil))
       (if .fep-program-aborted. (force-fep-into-rom)))))

;Interface routines to the rest of the L-console system
(defun cached-read (adr)
  (let ((number (// adr *cached-page-size*))
        (word (\ adr *cached-page-size*)))
    (aref (find-cached-page number) word)))

(defun cached-write (adr val)
  (let* ((number (// adr *cached-page-size*))
         (word (\ adr *cached-page-size*))
         (page (find-cached-page number)))
    (check-arg-type val :fix)
    (setf (aref page word) val)
    ;(setf (cached-page-writtenp page) t)
    val))
```

```
(defun flush-page-cache (write-backp invalidatep)
  (loop for page being the array-elements of *cached-page-table* using (index entry)
        for page-valid = (and page (neq page 't))
        ;; for all non-nil entrys possibly write back, possibly invalidate
        when page
          do (if (and (neq page 't) write-backp (cached-page-writtenp page))
                 (swap-out-cached-page page))
             ;; Page was non-nil, see if we should invalidate it
             (setf (aref *cached-page-table* entry) (not invalidatep))
             ;; If we had a page, return it
             (if (neq page 't) (deallocate-resource 'cached-page page)))
  ;; No good reason to do this here... It just seems appropriate.
  (if invalidatep (setq *fep-program-loaded* nil)))

(defun clear-cached-page-table ()
  (loop for page being the array-elements of *cached-page-table* using (index entry)
        for page-valid = (and page (neq page 't))
        when (and page (neq page 't))
          do (deallocate-resource 'cached-page page)
        do (setf (aref *cached-page-table* entry) nil)))

(defun deallocate-cached-page-list (page-list)
  (loop for page in page-list
        do (deallocate-resource 'cached-page page)))

(defun swap-out-cached-page-list (page-list)
  (loop for page in page-list
        do (swap-out-cached-page page)))

(defun collect-cached-page-list ()
  (loop for page being the array-elements of *cached-page-table*
        when (and page (neq page 't)) collect page))

(defun clear-cached-amem ()
  (fillarray *cached-amem* 'nil))

(defun swap-out-cached-amem (amem-array)
  (loop for i from 0 below (array-active-length amem-array)
        for element = (aref amem-array i)
        when element do (write-amem i element)))

(defun collect-cached-amem ()
  (let ((copy (make-array (array-active-length *cached-amem*) ':type 'art-q)))
    (copy-array-contents *cached-amem* copy)
    copy))               ;just return a copy


;Makes sure that the correct program in loaded in the FEP and then starts it.
(defun assure-fep-program-loaded (symbol)
  (let ((module (get symbol ':68k-object-code)))
    (if (null module) (ferror nil "~&The symbol ~A has no compiled code." symbol))
    (if (neq module *fep-program-loaded*)
        (setq *fep-program-start-address* (asm68k:fep-load-module module t)))
    (setq *fep-program-loaded* module)
    (fep-jump *fep-program-start-address*)))
```

```
;;; -*- Mode: LIL; Package: LIL; Base: 8 -*-

(include "Types-and-macros")
(include "fsm.EXT" "fep-utils.EXT" "machine.EXT")

(deftype memory-type (enumeration vmem amem bmem cmem type-map display-mem gc-map))
(deftype location-type (structure ()
                    (value long)
                    (mem-type memory-type)))

(defmacro location-and-mem-type (value mem-type)
  '(let (((lt location-type)))
     (set-fields lt value ,value mem-type ,mem-type)
     lt))

(defatommacro *point-stack-size* 8)

(defvar somebody-already-debugging? boole false)

(defvar *input-buffer* (array byte 40.) ())
(defvar *input-buffer-pointer* word 0)
(defvar *input-buffer-limit* word 0)
(defvar *rubout-in-progress* boole false)
(defvar *default-memory* memory-type vmem)
(defvar *point* location-type ())
(defvar *point-open?* boole false)
(defvar *point-stack* (array location-type *point-stack-size*) ())
(defvar *point-stack-pointer* word 0)
(defvar *tab-point* location-type ())
(defvar *tab-point-valid* boole false)
(defvar *symbolic-typeout-mode* boole true)
(defvar *debug-long* long 0)
(defvar *debug-lbus-word* lbus-word ())
(defvar *debug-microinstruction* microinstruction ())

(defun init-debugger ()
  (setq somebody-already-debugging? false)
  (setq *input-buffer-pointer* 0)
  (setq *input-buffer-limit* 0)
  (setq *rubout-in-progress* false)
  (setq *default-memory* vmem)
  (setq *point* (location-and-mem-type 0 vmem))
  (setq *point-open?* false)
  (loop for (i word) upfrom 0 below *point-stack-size*
        do (setf (aref *point-stack* i) *point*))
  (setq *point-stack-pointer* 0)
  (setq *tab-point* *point*)
  (setq *tab-point-valid* false)
  (setq *symbolic-typeout-mode* true)
  )

(defun debug ((stream stream))
  (if somebody-already-debugging?
      (format stream "~&Sorry, somebody already using debugger.")
    (let*-globally ((somebody-already-debugging? true))
      (with-var-bound (make-pointer stream-ptr standard-input)
        (with-var-bound (make-pointer stream-ptr standard-output)
          (setq standard-input  stream
                standard-output stream)
          (format t "~&Entering debugger.")
          (debug-top-level)
          (format t "~&Exiting debugger."))))))

(defun (debug-tyi byte) ()
  (let (((char byte)))
    (cond (*rubout-in-progress* -1)
          ((= *input-buffer-pointer* *input-buffer-limit*)
           (prog1 (aref *input-buffer* *input-buffer-pointer*)
                  (incf *input-buffer-pointer*)))
          ((member (setq char (tyi)) '(#\rubout #o177)) ;lispm or ascii
           (debug-start-rubout))
```

```
  (T (incf *input-buffer-limit*)
            (incf *input-buffer-pointer*)
            (setf (aref *input-buffer* *input-buffer-pointer*) char)
            (tyo char)
            char))))

(defun (debug-start-rubout byte) ()
  (setq *rubout-in-progress* true)
  (setq *input-buffer-pointer* 0)
  (unless (zerop *input-buffer-limit*) (tyo #/\))
  (loop with (char byte)
        unless (zerop *input-buffer-limit*)
        do (tyo (aref *input-buffer* *input-buffer-limit*))
           (when (zerop (decf *input-buffer-limit*))
             (tyo #/\))
        do (setq char (tyi))
        while (member char '(#\rubout #o177))
        finally (unless (zerop *input-buffer-limit*) (tyo #/\))
                (setf (aref *input-buffer* *input-buffer-limit*) char)
                (incf *input-buffer-limit*)
                (tyo char)
                (return char)))

(defvar *selected-memory* memory-type vmem)
(defvar *scratch-value-1* long 0)
(defvar *scratch-value-2* long 0)
(defvar *scratch-value-1-valid* boole false)
(defvar *scratch-value-2-valid* boole false)
(defvar *arith-operator* byte #/+)

(defun debug-reset-state ()
  (setq *rubout-in-progress* false)
  (setq *selected-memory* *default-memory*)
  (setq *scratch-value-1* 0)
  (setq *scratch-value-2* 0)
  (setq *scratch-value-1-valid* false)
  (setq *scratch-value-2-valid* false)
  (setq *arith-operator* #/+)
  )

(defun debug-finish-arithmetic ()
  (cond ((not *scratch-value-1-valid*)
         (setq *scratch-value-1* *scratch-value-2*
               *scratch-value-1-valid* *scratch-value-2-valid*))
        (*scratch-value-2-valid*
         (setq *scratch-value-1*
               (select *arith-operator*
                 (#/- (- *scratch-value-1* *scratch-value-2*))
                 (#/+ (+ *scratch-value-1* *scratch-value-2*))
                 (#/* (* (word *scratch-value-1*) (word *scratch-value-2*)))))))
  (setq *scratch-value-2* 0)
  (setq *scratch-value-2-valid* false))

(defun debug-top-level ()
  (loop as (first-time-through boole) first true then false
        as (char byte) = (debug-tyi)
        if (or *rubout-in-progress* first-time-through)
        do (debug-reset-state)
        if (= char #o32)
        do (return)
        do (debug-process-char char)))

(defun debug-process-char ((char byte))          ;so others can force input
  (cond ((≤ #/0 char #/9) (debug-process-digit char))
        ((member char '(#/! #// #/[)) (debug-open-new-location char))
        ((member char '(#\return #o15 #\lf #o12 #/^ #o10))
         (debug-close-current-location-maybe-open-new char))
        ((member char '(#\tab #o11))
         (debug-indirect-through-current-value))
        ((= char #\altmode) (debug-process-altmode))
        ((= char #/@) (debug-set-memory-type))
```

```
((member char '(#/+ #\space #/- #/*)) (debug-setup-for-arithmetic char))
       (T (format t " ??? ")
          (debug-reset-state))))

(defun debug-setup-for-arithmetic ((char byte))
  (debug-finish-arithmetic)
  (when (= char #\space) (setq char #/+))       ;canonicalize
  (setq *arith-operator* char))

(defun debug-process-digit ((char byte))
  (setq *scratch-value-2* (+ (lsh! *scratch-value-2* 3) char (- #/0)))
  (setq *scratch-value-2-valid* true))

(defun debug-open-new-location ((char byte))
  (debug-finish-arithmetic)
  (if (not *scratch-value-1-valid*)
      (format t " Location? ")
    (debug-push-point)
    (setq *point* (location-and-mem-type *scratch-value-1* *selected-memory*))
    (setq *point-open?* true)
    (if (= char #/[) (setq *symbolic-typeout-mode* false))
    (if (= char #/!)
        (format t "   ")
      (debug-read-point)
      (debug-print-current-value))))

(defun debug-close-current-location-maybe-open-new ((char byte))
  (debug-finish-arithmetic)
  (when *scratch-value-1-valid*
    (debug-deposit-value-to-point))
  (format t "~&")                               ;indication of closing
  (if (member char '(#\return #o15))
      (setq *symbolic-typeout-mode* true)
    (incf (value *point*) (if (member char '(#\lf #o12)) 1 -1))
    (debug-read-point)
    (debug-print-current-value)))

(defun debug-process-altmode ()
  (let ((char (debug-tyi)))
    (unless *rubout-in-progress*
      (cond ((member char '(#\return #o15 #\lf #o12 #/^ #o10))
             (debug-push-point)                ;save it at end of ring
             (debug-pop-point)                 ;get it back
             (debug-pop-point)                 ;now get previous point
             (incf (value *point*) (cond ((member char '(#\return #o15)) 0)
                                         ((member char '(#\lf #o12)) 1)
                                         ((member char '(#/^ #o10)) -1)))
             (debug-read-point)
             (debug-print-current-value))
            ))))

(defun debug-set-memory-type ()
  (let ((char (debug-tyi)))
    (unless *rubout-in-progress*
      (if (≤ #/a char #/A) (setq char (- char #/a (- #/A))))
      (select char
        (#/A (setq *selected-memory* amem))
        (#/B (setq *selected-memory* bmem))
        (#/C (setq *selected-memory* cmem))
        (#/D (setq *selected-memory* display-mem))
        (#/V (setq *selected-memory* vmem))
        (#/T (setq *selected-memory* type-map))
        (otherwise (format t "?? Unknown memory type.")
                   (debug-reset-state))))))

(defun debug-push-point ()
  (setq *point-stack-pointer* (logand (1+ *point-stack-pointer*) 7))    ;pdp-10 style
  (setq (aref *point-stack* *point-stack-pointer*) *point*))

(defun debug-pop-point ()
  (setq *point* (aref *point-stack* *point-stack-pointer*))     ;still pdp-10 style
```

```
;;; -*- Mode: LIL; Package: LIL; Base: 8; Lowercase:of-course -*-

(include "Types-and-macros")
(include "string.EXT" "chaos-ncp.EXT" "chaos-user.EXT" "chaos-servers.EXT")
(include "disk-raw.EXT" "disk.EXT" "load-world.EXT")
(include "fep-utils.EXT")

(defpsect code address 410000)
(defpsect data address 700000)
(defpsect fep-io address #o77600020 address-only t)
(defpsect absolute address 0 address-only t)

(externals (fsm-init long long)
           (init-processes) (init-network) (init-display)
           (fep-net-reset) (init-hsb-for-dcp)
           (init-state-saving)                ;in Machine
           (init-keyboard)                    ;in Keyboard
           (config-ethernet)
           (init-chaos-ncp) (add-chaos-server string long)
           ;(init-disk)
           (scheduler)
           (Kbd-process-top-level)
           (Lcons-interface-top-level)
           )

(defun MAIN ()
  (declare (require asm-hack))
  (fsm-init #o710000 #o1000000)
  (init-keyboard)
  (init-state-saving)
  (init-processes)
  (init-network)
  (init-hsb-for-dcp)
  (init-display)
  ;(fep-net-reset)
  (config-ethernet)
  (init-chaos-ncp)
  (add-chaos-server "STATUS" #'status-server)
  (add-chaos-server "UPTIME" #'uptime-server)
  (add-chaos-server "DUMP-ROUTING-TABLE" #'dump-routing-table-server)
  (add-chaos-server "ECHO" #'echo-server)
  (add-chaos-server "SUPDUP" #'forwarding-supdup-server)

  (setq network-stream NULL-stream)
  (add-chaos-server "TALK" #'talk-server)

  (init-disk)
  (init-load-world)

  (setq *network-requested-crash* false)
  (add-chaos-server "CRASH" #'crash-server)
  (process-run-function "Remote disk" #'remote-disk)

  (process-run-function "Keyboard" #'Kbd-process-top-level)
  (process-run-function "Lcons interface" #'Lcons-interface-top-level)

  ;(process-run-function "Blip" #'blip)
  ;(format t "~%Calling scheduler.")
  (scheduler)
  )

#|  WEM's main

(defun MAIN ()
  (declare (require asm-hack))
  (fsm-init #o710000 #o1000000)
  (init-keyboard)                                       ;inits DMA as well
  (init-state-saving)
  (init-processes)
  (init-network)
  (init-hsb-for-dcp)
```

```
  (init-display)
;  (fep-net-reset)
;  (config-ethernet)
;  (init-chaos-ncp)
;  (add-chaos-server "STATUS" #'status-server)
;  (add-chaos-server "UPTIME" #'uptime-server)
;  (add-chaos-server "DUMP-ROUTING-TABLE" #'dump-routing-table-server)
;  (add-chaos-server "ECHO" #'echo-server)
;  (add-chaos-server "SUPDUP" #'forwarding-supdup-server)
;
;  (setq network-stream NULL-stream)
;  (add-chaos-server "TALK" #'talk-server)
;
;  (init-disk)
;  (init-load-world)
;
;  (setq *network-requested-crash* false)
;  (add-chaos-server "CRASH" #'crash-server)
  (process-run-function "Remote disk" #'remote-disk)

  (process-run-function "Keyboard" #'Kbd-process-top-level)
  (process-run-function "Lcons interface" #'Lcons-interface-top-level)

  ;(process-run-function "Blip" #'blip)
  ;(format t "~%Calling scheduler.")
  (scheduler)
  ) |#



(defun blip () (loop do (process-sleep 6000.) (tyo #/.)))

(defvar *network-requested-crash* boole false)

(defun crash-server ()
  (setq *network-requested-crash* true)
  (funcall (coerce long (make-pointer word-ptr (word 47100)))))
(defvar network-stream stream NULL-stream)

(defun talk-server ()                          ;not allowed to process-wait
  (process-run-function "Talker safety" #'talk-server-1))

(defun talk-server-1 ()                        ;allowed to process-wait
  (let ((conn (listen "TALK" 3 true)))
    (cond ((null conn))
          ((not (null (conn-error-message conn)))
           (remove-conn conn))
          (T (accept conn)
             (let ((old-stream network-stream)
                   (new-stream (chaos-make-stream conn)))
               (unless (null new-stream)
                 (setf (character-set (coerce chaos-stream new-stream)) cscs-telnet)
                 (setq network-stream new-stream)
                 (unless (null old-stream)
                   (stream-close old-stream))))))))

(defun (tyi-lockout byte) ()
  (when (null network-stream)
    (process-wait "Wait for Network stream" #'wait-for-network-stream))
  (unless (kbd-tyi-no-hang network-stream)
    (process-wait "Tyi" #'stream-kbd-tyi-no-hang network-stream))
  (tyi network-stream))

(defun (wait-for-network-stream boole) ()
  (not (null network-stream)))
```

```
(defun (read-number word) ()
  (loop with (ans word) = 0
        as (char byte) = (tyi-lockout)
        do (tyo char network-stream)
        if (or (< char #/0) (> char #/3))
        return ans
        do (setq ans (+ (* ans 8) (- char #/0)))))

(defvar *remote-disk-host* word 0)
(defvar *remote-disk-conn* conn NULL-conn)
(deftype access-path (enumeration ap-net ap-disk))
(defvar access-path access-path ap-net)

(defun remote-disk ()
  (setq *remote-disk-host* 0)
  (setq *remote-disk-conn* NULL-conn)
  (setq access-path ap-disk)
  (loop do (select (tyi-lockout)
              (#/h (do-h))
              (#/r (do-r))
              (#/o (do-o))
              (#/d (do-d))
              (#/n (do-n))
              (#/? (do-?))
              (#/w (do-w))
              (#/m (do-m))
              (#/c (do-c))
              (#/l (do-l))
              (#/Q (funcall (coerce long (make-pointer word-ptr (word 47100)))))
              (otherwise (format network-stream "??? "))))
  )

(defun do-c ()
  (loop repeat (progn (format network-stream "~&Number of characters: ")
                      (read-number))
   do (tyo #/a network-stream)))

(external fep-clear-hsb-disk-error ())
(defun do-d ()
  (setq access-path ap-disk)
  (fep-clear-hsb-disk-error)
  (format network-stream "~%Using the real disk.~%"))
(defun do-n ()
  (setq access-path ap-net)
  (format network-stream "~%Simulating disk over the net.~%"))

(defun do-h ()
  (format network-stream "Host: ")
  (set-remote-host (read-number)))

(deftype typeout-mode (enumeration tm-octal tm-ascii tm-36bit))

(defword lmach-36bit (:comma)
  (:byte "Word 0: " 32. #.(* 36. 0.))
  (:byte "Word 1: " 32. #.(* 36. 1.))
  (:byte "Word 2: " 32. #.(* 36. 2.))
  (:byte "Word 3: " 32. #.(* 36. 3.))
  (:byte "Word 4: " 32. #.(* 36. 4.))
  (:byte "Word 5: " 32. #.(* 36. 5.))
  (:byte "Word 6: " 32. #.(* 36. 6.))
  (:byte "Word 7: " 32. #.(* 36. 7.))
  )

(defun do-r ()
  (format network-stream "Read block number: ")
  (let ((dp (allocate-disk-page-preload 0 (read-number) 0)))
    (%issue-disk-page-read dp)
    (format network-stream "~%Data received.")
    (loop with (point word) = 0
          with (inc-dec word) = 1
```

```
 with (typeout-mode typeout-mode) = tm-octal
        as (print-something-this-time boole) = true
        do (select (tyi-lockout)
             (#/N (incf point inc-dec))
             (#/P (tyo #/^ network-stream) (decf point inc-dec))
             (#/. (setq inc-dec (read-number)
                        print-something-this-time false))
             (#/" (setq typeout-mode tm-ascii))
             (#/% (setq typeout-mode tm-36bit))
             ((#\return #o15) (setq typeout-mode tm-octal))
             (#/q (return))
             (otherwise (format network-stream "??? ")))
        if print-something-this-time
        do (setq inc-dec 1)
           (format network-stream "~&~O// " point)
           (select typeout-mode
             (tm-octal (format network-stream "~O "
                                (<-slong (aref (disk-data-slongs (disk-data dp)) point))))
             (tm-ascii (format network-stream "~B "
                                (make-pointer byte-ptr (aref (disk-data-bytes (disk-data dp))
                                                             (* point 4)))
                                4))
             (tm-36bit (format network-stream "~W "
                                (coerce *byte-array-ptr
                                        (make-pointer long-ptr
                                           (aref (disk-data-longs (disk-data dp)) point)))
                                lmach-36bit)
                       (setq inc-dec 9))
             )
           )
    (format network-stream "~&Returning disk page")
    (return-disk-page dp)))

(defun (prompt-open-file file-stream) ((prompt string))
  (format network-stream "~A" prompt)
  (let* ((filename (readline))
         (fs (open-file filename dm-block dd-read)))
    (return-string filename)
    fs))

(defun do-o ()
  (let ((fs (prompt-open-file "File to open: ")))
    (cond ((null fs) (format network-stream "~%Null file stream"))
          ((not (null (error-message fs)))
           (format network-stream "~%Error in file stream: ~A" (error-message fs)))
          (T (format network-stream "~%Perhaps file is open.")
             (format network-stream "~%Page info:")
             (loop for (base long) = 0 then (+ base count)
                   as (d&c dpn-and-count) = (d&c-for-block fs base)
                   as (dpn long) = (dpn d&c)
                   until (= dpn -1)
                   as (count long) = (count d&c)
                   do (format network-stream "~%  [~O,~O)" dpn (+ dpn count))
                     )))
    (close-file-stream fs)
    (format network-stream "~%File stream closed.")
    ))

(defun (readline string) ()
  (let ((s (make-string 100)))
    (loop for (ch byte) = (tyi-lockout)
          for (i word) upfrom 0
          do (tyo ch network-stream)
          until (member ch '(#\cr #\lf #o15 #o12))
          do (setf (aref (string-bytes s) i) ch)
          finally (setf (string-length s) i))
    s))

(defun (set-remote-host boole) ((host word))
  (if (not (null *remote-disk-conn*))
      (remove-conn *remote-disk-conn*))
```

```
(setq *remote-disk-host* 0
      *remote-disk-conn* NULL-conn)
(let ((conn (connect NULL-string host "DCP-REMOTE-DISK" 2 6000.)))
  (cond ((null conn) false)
        ((not (null (conn-error-message conn)))
         (format network-stream "~%Connect error: ~A" (conn-error-message conn))
         (remove-conn conn)
         false)
        (T (setq *remote-disk-host* host)
           (setq *remote-disk-conn* conn)
           (format network-stream "~%DCP-REMOTE-DISK connection is open.")
           true))))

(defword disk-status (:COMMA)
  (:BIT (READY) 0 "Ready" "Not ready")
  (:BIT (ON-CYLINDER) 1 "On cylinder" "Off cylinder")
  (:BIT (SEEK-ERROR) 2 "Seek error")
  (:BIT (FAULT) 3 "Fault")
  (:BIT (READ-ONLY) 4 "Read-only")
  (:BIT (ADDRESS-MARK) 5 "Address-mark")
  (:BIT INDEX 6)
  (:BIT SECTOR 7)
  (:BIT READ-CLK 10)
  (:BIT SERVO-CLK 11)
  (:BIT READ-DATA 12)
  (:BIT (PADDLE-DISABLE) 13 "Paddle disable" "Paddle enable")
  (:BIT (DISK-ERROR) 14 "Disk error")
  (:BIT (SELECT-ERROR) 15 "Select error")
  (:BIT (OVERRUN) 16 "Overrun")
  (:BIT (ECC=ZERO) 17 "ECC=0" "ECC≠0")
  (:BIT READ-COMPARE 20)
  (:BIT END-FLAG 21)
  (:BIT BUF-BUSY 22)
  (:BIT WAKEUP 23)
  (:BIT WRITE-DATA 24)
  (:BIT (NOT-SET-DONE NIL 0) 25 NIL "Set done")
  (:BYTE (U-FUNC) 2 26 NIL "Stop if ECC=0" "Err if start block" "Func set done")
  (:BIT (NOT-IDLE) 30 "STM not idle" "STM Idle")
  (:BIT NEXT-STATE-0 31)
  (:BIT (ADVANCE-STATE) 32 "Advance state")
  (:BYTE U-STATE 5 33))

(defword net-status (:COMMA)
  (:BYTE "Task:" 4 0)
  (:BIT (CPU-RCV-ENABLE) 4 "CPU receive enable" "CPU transmit enable")
  (:BYTE "Input byte count:" 2 5)
  (:BIT (BACKOFF-ENABLED) 7 "Backoff enabled")
  (:BIT (BUFFER-OVERFLOW) 10 "Buffer overflow")
  (:BIT (NET-COLLISION) 11 "Net collision")
  (:BIT (PREAMBLE-ERROR) 12 "Preamble error")
  (:BIT (ALIGNMENT-ERROR) 13 "Alignment error")
  (:BIT (CRC-ERROR) 14 "CRC error")
  (:BIT (PKT-RECEIVED) 15 "Packet received")
  (:BIT (CABLE-BUSY) 16 "Cable busy")
  (:BIT (XMT-REQUEST) 17 "Transmit request")
  (:BIT (RECEIVE-CLK) 20 "Receive clock")
  (:BIT (RECEIVE-DATA) 21 "Receive data")
  (:BIT (DATA-VALID) 22 "Data valid")
  (:BIT (COLLISION-DETECT) 23 "Collision detect")
  (:BIT (TEST-CABLE-BUSY) 24 "Cable busy(test)")
  (:BIT (TRANSMIT-CLK) 25 NIL "Transmit clock")
  (:BIT (TRANSMIT-DATA) 26 "Transmit data")
  (:BIT (CRC-DATA) 27 "CRC data")
  (:BIT (NET-START) 30 NIL "Net start")
  (:BIT (WAIT-FOR-PKT) 31 NIL "Wait for packet")
  (:BIT (PREAMBLE-0) 32 NIL "Preamble 0")
  (:BIT (PREAMBLE-1) 33 NIL "Preamble 1")
  (:BYTE "Transmit state:" 2 34)
  (:BIT (PKT-BEING-TRANSMITTED) 36 NIL "Packet being transmitted")
  (:BIT (PREAMBLE-DATA) 37 "Preamble data"))
```

```
(defword 32bit-word (:comma)
  (:byte "Value:" 32. 0)
  (:byte "Byte 0:" 8 00.)
  (:byte "Byte 1:" 8 08.)
  (:byte "Byte 2:" 8 16.)
  (:byte "Byte 3:" 8 24.)
  )

(defword 36bit-word (:comma)
  (:byte "Tag: " 4. 36.)
  (:byte "Value: " 32. 0)
  (:byte "Byte 0:" 8 00.)
  (:byte "Byte 1:" 8 08.)
  (:byte "Byte 2:" 8 16.)
  (:byte "Byte 3:" 8 24.)
  )

(deftype 4bytes (array byte 4))
(defun do-? ()
  (loop with (finished boole) = false
        with (value long)
        with (defword word-description)
        with (4bytes 4bytes)
        as (valid boole) = true
        do (format network-stream "~&Register: ")
           (select (tyi-lockout)
             (#/d (setq value (read-iob-reg *disk-status-offset*)
                        defword disk-status))
             (#/n (setq value (read-iob-reg *net-status-offset*)
                        defword net-status))
             (#/o (setq value (read-iob-reg (progn (format network-stream "Offset: ")
                                                   (read-number)))
                        defword 32bit-word))
             (#/q (setq finished true))
             (otherwise (setq valid false)))
        until finished
        when valid
        do (loop for (i word) upfrom 0 below 4
                 do (setf (aref 4bytes i) (byte value))
                    (setq value (lshr value 8)))
           (format network-stream "~&~W~&"
                   (coerce *byte-array-ptr (make-pointer byte-ptr (aref 4bytes 0)))
                   defword)))

(defun do-m ()                                   ;parse microcode file
  (let ((fs (prompt-open-file "Microcode file to parse: ")))
    (cond ((null fs) (format network-stream "~%Null file stream."))
          ((not (null (error-message fs)))
           (format network-stream "~%Error in file stream: ~A" (error-message fs)))
          (T (format network-stream "~%File should be open.")
             (set-filepos-and-mode fs 0 dm-word)
             (loop initially (format network-stream "~&Name string: ")
                   for (n word) downfrom (disk-tyi-16 fs) by 2 above 0
                   as (w word) = (disk-tyi-16 fs)
                   do (tyo (byte w) network-stream)
                   if (≠ n 1) do (tyo (byte (rotr w 8)) network-stream))
             (format network-stream "~&Version number: ~O" (disk-tyi-16 fs))
             (loop as (continue byte) = (progn (format network-stream " Next block? ")
                                               (tyi-lockout))
                   while (member continue '(#\space #/y #/Y))
                   do (show-microcode-load-block fs))
             (close-file-stream fs)
             (format network-stream "~&File stream closed.")))))

(defun show-microcode-load-block ((fs file-stream))
  (let* ((which (disk-tyi-16 fs))
         (start (disk-tyi-16 fs))
         (n     (disk-tyi-16 fs))
         (size  (disk-tyi-16 fs))
         (nsize (if (bit-test which #o100) (+ size 4) size)))
```

```
  (format network-stream "~&~A, ~O words (size ~O) starting at ~O.  Go ahead? "
          (select which
            (1 "Type map")
            (2 "A memory")
            (3 "B memory")
            (4 "C memory")
            (104 "C memory patches")
            (otherwise "Unknown microcode memory index."))
          n size start)
  (loop while (member (tyi-lockout) '(#\space #/y #/Y))
        do (loop repeat 20
                 while (> n 0)
                 do (loop initially (format network-stream "~&~O// " start)
                          repeat size
                          do (format network-stream "~O " (disk-tyi-16 fs)))
                 when (≠ size nsize)
                 do (loop initially (format network-stream
                                            "  Function: ~O, Bytes: "
                                            (disk-tyi-16 fs))
                          repeat (- nsize size 1)
                          as (next word) = (disk-tyi-16 fs)
                          do (tyo (byte next) network-stream)
                             (tyo (byte (lshr next 8)) network-stream))
                 do
                    (decf n)
                    (incf start))
        while (> n 0)
        do (format network-stream "~&--More?--")
        )
  (loop repeat (* n nsize) do (disk-tyi-16 fs))      ;read what user didn't
  ))

(defun do-w ()                                       ;parse world load file
  (let ((fs (prompt-open-file "World file to parse: ")))
    (cond ((null fs) (format network-stream "~%Null file stream."))
          ((not (null (error-message fs)))
           (format network-stream "~%Error in file stream: ~A" (error-message fs)))
          (T (format network-stream "~%File should be open.")
             (set-filepos-and-mode fs 0 dm-36bit)
             (format network-stream "~&MIC major version: ~O, World-load version: ~O"
                     (disk-tyi-36-data fs) (disk-tyi-36-data fs))
             (let* ((nsparse (word (disk-tyi-36-data fs)))
                    (ninitial (word (disk-tyi-36-data fs)))
                    (nload (word (disk-tyi-36-data fs))))
       (format network-stream
                        "~&~O sparse entries, ~O initial map entries, ~O load map entries."
                        nsparse ninitial nload)
               (maybe-show-sparse nsparse fs)
               (maybe-show-initial ninitial fs)
               (maybe-show-load nload fs))
             (close-file-stream fs)
             (format network-stream "~&File stream closed.")))))

(defun maybe-show-sparse ((n word) (fs file-stream))
  (format network-stream "~&Show some of the ~O sparse entries? " n)
  (loop with (entry-num long) = 0
        while (member (tyi-lockout) '(#\space #/y #/Y))
        do (loop repeat 20
                 while (> n 0)
                 as (VMA long) = (disk-tyi-36-data fs)
                 as (lbw lbus-word) = (disk-tyi-36 fs)
                 do (format network-stream "~&Entry ~O: VMA ~O, High4: ~O, Data ~O"
                            entry-num vma (ecc+high lbw) (data lbw))
                    (decf n)
                    (incf entry-num))
        while (> n 0)
        do (format network-stream "~&--More?--")
        )
  (loop repeat (* n 2) do (disk-tyi-36-data fs))
  )
```

```
(defun maybe-show-initial ((n word) (fs file-stream))
  (maybe-show-initial-or-load n fs "initial map"))

(defun maybe-show-load ((n word) (fs file-stream))
  (maybe-show-initial-or-load n fs "load map"))

(defun maybe-show-initial-or-load ((n word) (fs file-stream) (which string))
  (format network-stream "~&Show some of the ~O ~A entries? " n which)
  (loop with (entry-num long) = 0
        while (member (tyi-lockout) '(#\space #/y #/Y))
        do (loop repeat 20
                 while (> n 0)
                 as (VMA long) = (disk-tyi-36-data fs)
                 as (nwords long) = (disk-tyi-36-data fs)
                 as (file-page-number long) = (disk-tyi-36-data fs)
                 do (format network-stream
                            "~&Entry ~O: Starting VMA ~O, ~O words, starting disk page ~O"
                            entry-num vma nwords file-page-number)
                    (decf n)
                    (incf entry-num))
        while (> n 0)
        do (format network-stream "~&--More?--")
        )
  (loop repeat (* n 3) do (disk-tyi-36-data fs))
  )


(defun (y-or-n-p boole) ((prompt string))
  (loop do (format network-stream "~&~A (Y or N) " prompt)
        as (char byte) = (tyi-lockout)
        if (member char '(#/y #/Y #\space))
        return (progn (format network-stream "Yes. ") true)
        if (member char '(#/n #/N #o177))
        return (progn (format network-stream "No. ") false)
        ))

(defun do-l ()
  (let* ((filename (progn (format network-stream "~&World load file: ")
                          (readline)))
         (message (load-world 0 filename
                              false            ;insta-boot
                              false            ;maps after initial
                              false            ;use microcode
                              )))
    (format network-stream "~&Return answer was ~S." message)
    (return-string message)
    (return-string filename)))

(defun %issue-disk-page-read ((dp disk-page))
  (select access-path
    (ap-net (%issue-disk-page-read-via-net dp))
    (ap-disk (%issue-disk-page-read-via-disk dp))))

(defun %issue-disk-page-read-via-net ((dp disk-page))
  (format network-stream "~%(%issue-disk-page-read ... ~O ...)" (dpn dp))
  (let* ((unit (disk-unit dp))
         (dpn (dpn dp))
         (pointer (coerce long (disk-data dp))))
    (if (not (null (read-pkts *remote-disk-conn*)))
        (format network-stream "~%Unexpected data in connection, using it!!!"))
    (let* ((pkt (allocate-pkt)))
      (set-pkt-string pkt "(READ 00000000000)")
      (loop repeat 11.
            for (i long) = dpn then (lshr i 3)
            for (j word) = (- (pkt-nbytes pkt) 2) then (1- j)
            do (setf (aref (pkt-data-bytes pkt) j)
                     (byte (+ #/0 (logand (byte i) 7)))))
      (send-pkt *remote-disk-conn* pkt dat-op))
    (loop with (count word) = (* 288. 4)
          with (ptr byte-ptr) = (coerce byte-ptr pointer)
          until (zerop count)
```

```
          as (pkt pkt) = (get-next-pkt *remote-disk-conn* false)
          if (or (null pkt) (not (null (pkt-error pkt))))
          do (format network-stream "~%Connection error in %read: ~A"
                     (if (null pkt) "???" (pkt-error pkt)))
             (if (not (null pkt)) (return-pkt pkt))
             (return)
          do (loop repeat (min count (pkt-nbytes pkt))
                   for (i word) upfrom 0
                   until (zerop count)
                   do (setf @ptr (aref (pkt-data-bytes pkt) i))
                      (decf count)
                      (ptr-incf ptr byte-ptr (type-size byte)))
             (return-pkt pkt))))

(defun %issue-disk-page-read-via-disk ((dp disk-page))
  (process-wait "Disk wait my turn" #'%idprvd-wait)
  (setq fep-hsb-disk-page dp)
  (process-wait "Disk wait for completion" #'%idprvd-wait))
(defun (%idprvd-wait boole) ()
  (null fep-hsb-disk-page))

(defvar fep-hsb-disk-page disk-page NULL-disk-page)

(defun %issue-disk-page-write ((unit word) (dpn long) (pointer long))
  (format network-stream "~%Attempt to do a disk write."))

;;;-*- Mode: Lil; Package:Lil; Base:8. -*-
;;; (c) Copyright 1982, Symbolics, Inc.

(INCLUDE "Types-and-macros" "Fep-utils.ext")

(EXTERNAL INIT-DISPLAY ())

; Special bits in SPY-OPC

(DEFATOMMACRO OPC-NOT-NOP '40000)
(DEFATOMMACRO OPC-TASK-SWITCH '100000)

; Special bits in SPY-NEXT-CPC

(DEFATOMMACRO SPY-NEXT-CPC-RAW-BIT-12 '40000)   ;before skip logic
;100000 not wired to anything yet

;This variable holds the desired contents of the control register
;while the machine is running.  Use it to turn on and off features
;such as error halts, tasking, and traps.
(DEFVAR *SQ-CTL-WHILE-RUNNING* SQ-CTL
  (BUILD SQ-CTL ENABLE-OP 1 ENABLE-SQ 1 ENABLE-CMEM 1 ENABLE-TRAP 1
         ENABLE-ERRHALT 1 ENABLE-WP 1))

;This is a record of the last value written into SQ-CTL.
(DEFVAR *CURRENT-SQ-CTL* SQ-CTL (BUILD SQ-CTL))

;Stop the clock, and restart it.  Dynamic rams suffer .. So don't call friviously.
(DEFUN RESET-3600 ()
  (WRITE-SQ-CTL-TO-STOP-MACHINE)
  (DISCARD-STATE)

  ;(SETUP-MACHINE-DEPENDENCIES)
  (LET-GLOBALLY ((*SAVE-STATE* FALSE))
    ;; Howard... What does this do? /WEM
    (SETQ FEP-HSB-CONTROL (BUILD FEP-HSB-CONTROL WRITE-TO-DEV "Write"
                                 COUNT-UP "Up" NOT-SPY-DMA-BUSY 0))
    (SETQ FEP-HSB-POINTER -1)
    (SETQ FEP-HSB-DATA  0)                        ;Clear busy

    ;; Clear special Lbus modes.
    (SETQ FEP-LBUS-CONTROL (BUILD FEP-LBUS-CONTROL USE-UNC-DATA "Use Uncorrected Data"
                                  IGN-DOUBLE-ECC "Ignore Double ECC Error"
                                  NOT-BUSY "Lbus buffer busy"))
    (SETQ FEP-BOARD-ID-CONTROL (BUILD FEP-BOARD-ID-CONTROL CONTINUITY "Continuity"))
```

```
    ;; Set lbus power reset,  (reset-lbus) will clear it
    (SETQ FEP-PROC-CONTROL (BUILD FEP-PROC-CONTROL
                                  POWER-RESET "Lbus Power Reset" LBUS-RESET "Lbus Reset"))
    (RESET-LBUS)                                ;clear power reset.

    (RESET-TASKS)
    (MC-RESET))
  (INIT-DISPLAY)
  )


(DEFUN RESET-LBUS ()
  (SETQ FEP-PROC-CONTROL (BUILD FEP-PROC-CONTROL
                                LBUS-RESET "Lbus Reset" NOT-CLEAR-ERRORS "Clear Errors"))
  (SETQ FEP-PROC-CONTROL (BUILD FEP-PROC-CONTROL)))

;(DEFUN RESET-MPSC ()
;  ;; First reset all 4 mpsc channels
;  (WRITE-MPSC-REG MPSC-0-A 0 30)
;  (WRITE-MPSC-REG MPSC-0-B 0 30)
;  (WRITE-MPSC-REG MPSC-1-A 0 30)
;  (WRITE-MPSC-REG MPSC-1-B 0 30)
;  (WRITE-MPSC-REG MPSC-0-A 2 5)
;  (WRITE-MPSC-REG MPSC-1-B 2 5))


;;; Two functions to hack the mpscs.  First write the register select then
;;; write/read the selected register.
;(DEFUN WRITE-MPSC-REG ((MPSC MPSC MODE REF) (REG BYTE) (VAL BYTE))
;  (SETQ (CONTROL MPSC) REG)
;  (SETQ (CONTROL MPSC) VAL))
;
;(DEFUN (READ-MPSC-REG BYTE) ((MPSC MPSC MODE REF) (REG BYTE))
;  (SETQ (CONTROL MPSC) REG)
;  (CONTROL MPSC))

(DEFUN (READ-LBUS-BOARD-ID BYTE) ((BOARD WORD) (ID-LOC WORD))
  (LET ((ADDR (DPB (LONG BOARD) #o2305 (LSH (LONG ID-LOC) 2)))
        ((VAL LBUS-WORD)))
    (SETQ FEP-BOARD-ID-CONTROL
          (CHANGE FEP-BOARD-ID-CONTROL FEP-BOARD-ID-CONTROL NOT-ID-REQ "Lbus ID Req"))
    (SETQ VAL (READ-LBUS ADDR))
    (SETQ VAL (READ-LBUS ADDR))
    (SETQ FEP-BOARD-ID-CONTROL
          (CHANGE FEP-BOARD-ID-CONTROL FEP-BOARD-ID-CONTROL NOT-ID-REQ 1))
    (BYTE (DATA VAL))))

(DEFUN STOP-MACHINE ()
  (WRITE-SQ-CTL-TO-STOP-MACHINE))

(DEFUN SINGLE-STEP-MACHINE ((NTIMES WORD))
  (RESTORE-STATE)
  (LOOP REPEAT NTIMES
        UNTIL (MACHINE-ERROR-P)
        DO (STEP-MACHINE '(T))))

(DEFUN START-MACHINE ()
  (MC-ERROR-RESET)
  (RESTORE-STATE)
  (STEP-MACHINE '(T))                     ;Get past any current error (e.g. a breakpoint)
  (WRITE-SQ-CTL-TO-START-MACHINE (PARTS-ENABLE T)))
```

```
;Clock controls
;If ENABLE-TASK is off (implying "forced task") then make sure we don't task
;switch by making the forced task be the current task.
(DEFUN WRITE-SQ-CTL ((VAL SQ-CTL))
  (WHEN (NOT (BIT-TEST (BUILD SQ-CTL ENABLE-TASK "Enable-Task") VAL))
    (SETQ VAL (CHANGE SQ-CTL VAL FORCED-TASK (COERCE SQ-CTL (READ-TASK)))))
  (WRITE-SQ-CTL-IGNORING-TASKING-ISSUES VAL))

;Write the SQ-CTL register, compensating for the inverted bit
;and remembering the current value.
(DEFUN WRITE-SQ-CTL-IGNORING-TASKING-ISSUES ((VAL SQ-CTL))
  (DISTURB-UIR)                                  ;This usually trashes obus.
  (SETQ *CURRENT-SQ-CTL* VAL)
  (SETQ VAL (LOGXOR VAL (BUILD SQ-CTL ENABLE-SQ 1)))
  ;(FORMAT T "~%Write-SQ-CTL ~O." (LONG VAL))
  (SPY-WRITE16 SPY-SQ-CTL VAL))

(DEFUN WRITE-SQ-CTL-TO-STEP-MACHINE ((CTL-TEMPLATE SQ-CTL))
  ;; Set up enable bits, with step turned off
  (WRITE-SQ-CTL (CHANGE SQ-CTL CTL-TEMPLATE STEP 0))
  ;; Now set step; machine will clock once
  (WRITE-SQ-CTL (CHANGE SQ-CTL CTL-TEMPLATE STEP 1))
  ;; Kill WP enable so we don't lose next time
  (WRITE-SQ-CTL (CHANGE SQ-CTL CTL-TEMPLATE ENABLE-WP 0 STEP 0)))

;Start the machine, or some parts of it, running.
(DEFUN WRITE-SQ-CTL-TO-START-MACHINE ((CTL-TEMPLATE SQ-CTL))
  ;; Get the rest of the SQ CTL stable before setting RUN.  Otherwise
  ;; we can have synchronization problems that lead to things like forgetting
  ;; to have write pulses during the first microinstruction executed.
  (WRITE-SQ-CTL (CHANGE SQ-CTL CTL-TEMPLATE RUN 0))
  (WRITE-SQ-CTL (CHANGE SQ-CTL CTL-TEMPLATE RUN 1))
  (SETQ *MACHINE-RUNNING* TRUE))

;Turn off RUN without changing the other bits, to stop machine cleanly
(DEFUN WRITE-SQ-CTL-TO-STOP-MACHINE ()
  (SETQ *MACHINE-RUNNING* FALSE)
  (WRITE-SQ-CTL (CHANGE SQ-CTL *CURRENT-SQ-CTL* RUN 0)))

;;; Collect the sequencer status from various spy locations.
(DEFUN (READ-SQ-STATUS SQ-STATUS) ()
  (LET (((LOW LONG) (SPY-READ16 SPY-SQ-STATUS))
        ((HIGH LONG) SPY-SQ-STATUS2))
    (COERCE SQ-STATUS (DPB HIGH #02010 LOW))))

;Machine stopped because not RUN, halted, or errhalt.
;This will not be T if the machine is waiting for memory or a trap.
(DEFUN (MACHINE-STOPPED-P BOOLE) ()
  (LET ((STS (READ-SQ-STATUS)))
    (OR (BIT-TEST (BUILD SQ-STATUS TSK-STOP 1 HALTED 1) STS)
        (NOT (BIT-TEST (BUILD SQ-STATUS -ERRHALT 1) STS)))))


;T if there is a parity error and errhalt is enabled
(DEFUN (MACHINE-ERROR-P BOOLE) ()
  (AND (BIT-TEST (BUILD SQ-CTL ENABLE-ERRHALT 1) *CURRENT-SQ-CTL*)
       (BIT-TEST (BUILD SQ-STATUS SPARE-LOST 1 GC-MAP-LOST 1 TYPE-MAP-LOST 1 PAGE-TAG-LOST 1
                                  AMEM-LOST 1 BMEM-LOST 1 MC-LOST 1 AU-LOST 1 HALTED 1
                                  CTOS1-LOST 1 CTOS2-LOST 1 TSKM-LOST 1 UIR-PAR-EVEN 1)
                 (READ-SQ-STATUS))))
;Microinstruction and control-memory stuff

(DEFUN READ-UIR ((RTN MICROINSTRUCTION MODE REF))
  (SETF RTN SPY-CMEM)
  ;(FORMAT T "~%Write-cmem-wd uwd = ~U." RTN))
  )

(DEFUN WRITE-CMEM-WD ((WD MICROINSTRUCTION MODE REF))
  ;(FORMAT T "~%WRITE-CMEM-WD UWD = ~U." WD)
  (SETF SPY-CMEM WD))
```

```
(DEFUN WRITE-UIR ((WD MICROINSTRUCTION MODE REF))
  (DISTURB-UIR)
  (WRITE-CMEM-WD WD)
  ;(WRITE-SQ-CTL (CHANGE SQ-CTL *CURRENT-SQ-CTL* RUN 0 ENABLE-CMEM 0))  ;stop machine
  (STEP-MACHINE '(UIR)))

(DEFUN ADDRESS-CMEM ((ADDR WORD))
  (LET (((UWORD MICROINSTRUCTION)))
    (SETF UWORD (BUILD MICROINSTRUCTION CPC NAF))
    (ALTER MICROINSTRUCTION UWORD NAF ADDR)
    (WRITE-UIR UWORD)))

(DEFUN READ-CMEM ((ADDR WORD) (UWD MICROINSTRUCTION MODE REF))
  (ADDRESS-CMEM ADDR)
  (STEP-MACHINE '(UIR CMEM))
  (READ-UIR UWD))

(DEFUN WRITE-CMEM-AND-PARITY ((ADDR WORD) (UWD MICROINSTRUCTION MODE REF))
  ;(format t "~%Write-cmem loc = ~O, val = ~U." addr uwd)
  (ADDRESS-CMEM ADDR)                              ;SET UP ADDRESS LINES
  (WRITE-CMEM-WD UWD)                              ;SET UP VALUE TO BE WRITTEN
  (WRITE-SQ-CTL (BUILD SQ-CTL CMEM-WRITE 1))      ;WRITE-PULSE ON
  (WRITE-SQ-CTL (BUILD SQ-CTL)))                   ;WRITE PULSE OFF

(DEFUN WRITE-CMEM ((ADDR WORD) (UWD MICROINSTRUCTION MODE VALUE))
  (PUT-ODD-PARITY-ON-UWORD UWD)
  (WRITE-CMEM-AND-PARITY ADDR UWD))
;CPC, NPC, and OPC history

;Read NPC via the NEXT CPC lines
(DEFUN (READ-NPC LONG) ()
  (WRITE-UIR (BUILD MICROINSTRUCTION CPC NPC))
  (LOGAND 37777 (SPY-READ16 SPY-NEXT-CPC)))

;Read CPC by exchanging CPC and NPC, reading NPC, then exchanging them back
(DEFUN (READ-CPC LONG) ()
  (WRITE-UIR (BUILD MICROINSTRUCTION CPC NPC SPEC "NPC Magic" NPC 0 MAGIC 3))
  (STEP-MACHINE '(SQ))
  (PROG1 (LOGAND 37777 (SPY-READ16 SPY-NEXT-CPC))
         (STEP-MACHINE '(SQ))))

(DEFUN (READ-NEXT-CPC LONG) ()
  (LOGAND 37777 (SPY-READ16 SPY-NEXT-CPC)))

;CPC and NPC need to be written together
;Write them by executing jump microinstructions to load CPC, and loading NPC from CPC


(DEFUN WRITE-CPC-AND-NPC ((CPC LONG) (NPC LONG))
  (DISTURB-SEQUENCER)                              ;Why not this?
  (COND ((= NPC (DPB (1+ CPC) (BYTE 8 0) CPC))    ;Usual case
         (WRITE-UIR (BUILD MICROINSTRUCTION CPC NAF NAF (PROGN CPC) NPC "Next CPC+1"))
         (STEP-MACHINE '(SQ)))
        (T
         (WRITE-UIR (BUILD MICROINSTRUCTION CPC NAF NAF (PROGN NPC)))
         (STEP-MACHINE '(SQ))
         (WRITE-UIR (BUILD MICROINSTRUCTION CPC NAF NAF (PROGN CPC)
                                            SPEC "NPC Magic" NPC 0 MAGIC 3))
         (STEP-MACHINE '(SQ)))))

;Writing them separately...
(DEFUN WRITE-CPC ((VAL LONG))
  ;(DISTURB-SEQUENCER)
  (WRITE-CPC-AND-NPC VAL (READ-NPC)))

(DEFUN WRITE-NPC ((VAL LONG))
  ;(DISTURB-SEQUENCER)
  (WRITE-CPC-AND-NPC (READ-CPC) VAL))


(DEFUN COPY-OUT-OPCS ()
```

```
  (LOOP FOR (INDEX WORD) BELOW 20
        FOR (I WORD) = (LOGAND (1- INDEX) 17)
        DO (SETF (AREF *SAVED-OPCS* I) (WORD (AREF SPY-OPC 0))))
  (LOOP FOR (INDEX WORD) BELOW 20
        FOR (I WORD) = (LOGAND (1- INDEX) 17)
        DO (SETF (AREF *SAVED-OPCS* I) (DPB (WORD (AREF SPY-OPC 1))
                                            #O1010 (AREF *SAVED-OPCS* I))))
  (SETQ *OPCS-SAVED* TRUE))

;;; This interacts with state saving.  We want to copy out the OPC's before
;;; single stepping the machine.
(DEFUN (READ-OPC LONG) ((N LONG))
  (UNLESS *OPCS-SAVED* (COPY-OUT-OPCS))
  (AREF *SAVED-OPCS* (LOGAND N 17)))
;Control stack
(DEFUN (READ-CSP LONG) ()
  (DISTURB-SEQUENCER)
  (READ-CSP-INTERNAL))

(DEFUN (READ-CSP-INTERNAL LONG) ()
  (WRITE-UIR (BUILD MICROINSTRUCTION SPEC "NPC Magic" MAGIC 1 AMWA #.(+ 36_5 1)
                    MEM 1 AMRA-SEL 3 AMRA 2100 XYBUS-SEL 0 ALU XBUS BMWA 377))
  (STEP-MACHINE '(DP SQ))
  (FORMAT T "~% Read csp: 377@b = ~O" (DATA (READ-BMEM 377)))
  (LDB (BYTE 4 16.) (DATA (READ-BMEM 377))))

;---Note that this must step the DP, because the decode of the SEQ field is
;inhibited bu NOP

(DEFUN WRITE-CSP ((VAL LONG))
  (DISTURB-SEQUENCER)           ;Bothering CSP, and anyway going to garbage CPC and NPC
  (LET ((DIFF (- VAL (READ-CSP-INTERNAL))))
    (WHEN (NOT (ZEROP DIFF))
      (WRITE-UIR (BUILD MICROINSTRUCTION SEQ PUSHJ))
      (LOOP REPEAT (LOGAND DIFF 17) DO (STEP-MACHINE '(SQ DP))))))

;This location is replaced by the IFU data by the hardware.  In order to
;make the memory diagnostic work, we will simulate this location.
(DEFVAR *CSTK-17* LONG)

;;; Macro to setup machine to address an arbitrary CSTK location.
;Note: must write the task first, then the CSP, otherwise the tasking logic
;saves and restores the CSP when we switch tasks.
(DEFLILMACRO ADDRESS-CSTK (ADR &BODY BODY)
  '(WITH-TASK (LDB (BYTE 4 4) ADR)      ;implies (DISTURB-SEQUENCER)
     (WRITE-CSP (LDB (BYTE 4 0) ADR))
     ,@BODY))

(DEFUN (READ-CSTK LONG) ((ADR LONG))
  (IF (= ADR 17) *CSTK-17*
    (ADDRESS-CSTK ADR
      (WRITE-UIR (BUILD MICROINSTRUCTION CPC CTOS))
      (LOGAND 37777 (SPY-READ16 SPY-NEXT-CPC)))))

(DEFUN (READ-CSTK-AND-PARITY LONG) ((ADR LONG))
  (IF (= ADR 17) *CSTK-17*
    (ADDRESS-CSTK ADR
      (WRITE-UIR (BUILD MICROINSTRUCTION CPC CTOS))
      (LET ((VAL (LOGAND 37777 (SPY-READ16 SPY-NEXT-CPC))))
        (SETQ VAL (DPB (WORD SPY-CTOS-HIGH) (BYTE 2 14.) VAL))
        VAL))))

(DEFUN WRITE-CSTK-AND-PARITY ((ADR LONG) (VAL LONG))
  (IF (= ADR 17) (SETQ *CSTK-17* VAL))
  (ADDRESS-CSTK (DPB (1- ADR) (BYTE 4 0) ADR)    ;saves NPC
    ;; This microinstruction writes NPC with VAL and makes sure it stays that way
    ;; Note that CSTK will be written hundreds of times until WP-enable clears
    (WRITE-UIR (BUILD MICROINSTRUCTION CPC NAF NPC "Next CPC+1"
                      NAF (DPB (1- VAL) (BYTE 8 0) VAL)))
    (STEP-MACHINE '(SQ WP))))                       ;Always writes CSTK[CSP+1]
```

```
(DEFUN WRITE-CSTK ((ADR LONG) (VAL LONG))
  (LOOP FOR (BIT LONG) = 1 THEN (ASH BIT 1) UNTIL (= BIT 200)
        WITH (P1 LONG) = 1 WITH (P2 LONG) = 1
        WITH (HIGH LONG) = (ASH VAL -7)
        WHEN (BIT-TEST BIT VAL)
          DO (SETQ P1 (LOGXOR P1 1))
        WHEN (BIT-TEST BIT HIGH)
          DO (SETQ P2 (LOGXOR P2 1))
        FINALLY (WRITE-CSTK-AND-PARITY ADR (DPB P2 (BYTE 1 15.) (DPB P1 (BYTE 1 14.) VAL)))))

(DEFUN (READ-CTOS LONG) ()
  (WRITE-UIR (BUILD MICROINSTRUCTION CPC CTOS))
  (LET ((VAL (READ-NEXT-CPC)))
    (SETQ VAL (DPB (LONG SPY-CTOS-HIGH) (BYTE 2 14.) VAL))
    VAL))

(DEFUN CLEAR-CSTK ()
  (LOOP FOR (ADDR LONG) BELOW 400
        DO (WRITE-CSTK ADDR 0)))
;Task state memory

(DEFUN (READ-TASK LONG) () (LOGAND SPY-TASK 17))


(DEFUN WRITE-TASK ((VAL LONG))
  (IF *SAVE-STATE*
      (RESTORE-SEQUENCER))
  (WRITE-TASK-IGNORING-STATE-SAVING VAL))

(DEFUN WRITE-TASK-IGNORING-STATE-SAVING ((VAL LONG))
  ;; Set forced-task field in SQ-CTL
  (LET ((SQ (BUILD SQ-CTL ENABLE-TASK 0 FORCED-TASK (COERCE SQ-CTL VAL) ENABLE-SQ 1)))
    ;; Nop instruction
    (WRITE-UIR (BUILD MICROINSTRUCTION))
    ;; Now clock machine twice to complete the task switch
    (LOOP REPEAT 2
          DO (WRITE-SQ-CTL-IGNORING-TASKING-ISSUES SQ)
             (WRITE-SQ-CTL-IGNORING-TASKING-ISSUES (CHANGE SQ-CTL SQ STEP 1)))
    (WRITE-SQ-CTL-IGNORING-TASKING-ISSUES SQ)))

;Clear all task wakeups and put processor into task 0
(DEFUN RESET-TASK ((TASK WORD))
  (WITH-TASK TASK
    (WRITE-UIR (BUILD MICROINSTRUCTION SEQ DISMISS))
    (STEP-MACHINE '(SQ DP))))

(DEFUN RESET-TASKS ()
  ;;              TASK 3 REQ from the FEP gets cleared by resetting the Lbus,
  ;; just like those from I/O devices.  Clear the software-task wakeups.
  (RESET-TASK 1) (RESET-TASK 2) (RESET-TASK 5) (RESET-TASK 6)
  (WRITE-TASK 0))
;This module is in charge of the DP board

(DEFUN WRITE-DP-CONTROL-REG ((VAL LONG))
  (WRITE-LONG-INTO-MD VAL)
  (WRITE-UIR (MD-MICROINSTRUCTION ALU XBUS SPEC "Load DP Ctl"))
  (STEP-MACHINE '(DP)))

(DEFUN WRITE-BYTE-R ((VAL LONG))
  (WRITE-LONG-INTO-MD VAL)
  (WRITE-UIR (MD-MICROINSTRUCTION ALU XBUS SPEC "Load R" MAGIC 0))
  (STEP-MACHINE '(DP)))

(DEFUN (READ-BYTE-R LONG) ()
  (WRITE-UIR (BUILD MICROINSTRUCTION SPEC "Crocks to Ybus" ALU ALUB AMWA 0))
  (LDB (BYTE 5 24.) (DATA (READ-OBUS))))

(DEFUN WRITE-BYTE-S ((VAL LONG))
  (WRITE-LONG-INTO-MD VAL)
  (WRITE-UIR (MD-MICROINSTRUCTION ALU XBUS SPEC "Load S"))
  (STEP-MACHINE '(DP)))
```

```
(DEFUN (READ-BYTE-S LONG) ()
  (WRITE-UIR (BUILD MICROINSTRUCTION SPEC "Crocks to Ybus" ALU ALUB AMWA 1_11.))
  (LDB (BYTE 5 24.) (DATA (READ-OBUS))))

(DEFUN WRITE-XBAS ((VAL LONG))
  (WRITE-LONG-INTO-MD VAL)
  (WRITE-UIR (MD-MICROINSTRUCTION ALU XBUS SPEC "Load XBAS"))
  (STEP-MACHINE '(DP)))

(DEFUN (READ-XBAS LONG) ()
  (READ-AMEM-ADDR 2 2_9))

(DEFUN (READ-AMEM-ADDR LONG) ((AMRA-SEL LONG) (AMRA LONG))
  ;; Set up microinstruction that causes the effective address to be continuously
  ;; clocked into AMEM WA and continuously brought out to Obus<0:11>
  (WRITE-UIR (BUILD MICROINSTRUCTION AMRA-SEL (PROGN AMRA-SEL) AMRA (PROGN AMRA) AMWA-SEL 2
                    SPEC "Crocks to Ybus" AMWA 1_11. ALU ALUB))
  (LOGAND (READ-OBUS-LONG) 7777))
;Reads just 36 bits
(DEFUN (READ-AMEM LBUS-WORD) ((ADR LONG))
    (WRITE-UIR (BUILD MICROINSTRUCTION AMRA ADR ALU XBUS OBUS-CDR ABUS OBUS-HTYPE ABUS))
    (READ-OBUS))

;Returns all 40 bits (including the parity bits)
(DEFUN (READ-AMEM-AND-PARITY LBUS-WORD) ((ADR LONG))
  (WRITE-UIR (BUILD MICROINSTRUCTION AMRA ADR ALU XBUS))
  (LET ((ANS (READ-OBUS)))                         ;Low 32 bits. Type and cdr are random
    (WRITE-UIR (BUILD MICROINSTRUCTION AMRA ADR SPEC "Crocks to Ybus"
                      BYTE-FUNC 3 MAGIC 0 AMWA #.(+ 24 7_5)
                      ALU ALUB))
    (SETF (ECC+HIGH ANS) (LOGAND #O377 (WORD (READ-OBUS-LONG))))  ;High 4 bits and parity bits
    ANS))

;Writes 36 bits, hardware chooses parity bits
(DEFUN WRITE-AMEM ((ADR LONG) (VAL LBUS-WORD))
  (WRITE-MD VAL)
  (WRITE-UIR (MD-MICROINSTRUCTION ALU XBUS OBUS-HTYPE ABUS OBUS-CDR ABUS AMWA-SEL 0 AMWA ADR))
  (STEP-MACHINE '(DP WP)))

(DEFUN (READ-BMEM LBUS-WORD) ((ADR LONG))
  (WRITE-UIR (BUILD MICROINSTRUCTION
                    XYBUS-SEL 1 ALU XBUS OBUS-HTYPE BBUS OBUS-CDR BBUS BMRA ADR))
  ;(LET (((UWD MICROINSTRUCTION))) (READ-UIR UWD) (FORMAT T "~%Uir = ~U" UWD))
  (READ-OBUS))

;Returns all 40 bits (including the parity bits)
;Fakes the bottom 8 locations (macroinstruction constant) so address test will win
(DEFUN (READ-BMEM-AND-PARITY LBUS-WORD) ((ADR LONG))
  ;(IF (< ADR 10) (AREF *BMEM-INACCESSIBLE-SECTION* ADR)
  (WRITE-UIR (BUILD MICROINSTRUCTION BMRA ADR XYBUS-SEL 1 ALU XBUS OBUS-HTYPE BBUS))
  (LET ((ANS (READ-OBUS)))                         ;Low 34 bits
    (WRITE-UIR (BUILD MICROINSTRUCTION BMRA ADR SPEC "Crocks to Ybus"
                      BYTE-FUNC 3 MAGIC 0 AMWA #.(+ 22 5_5 1_11.)
                      ALU ALUB))
    (SETF (ECC+HIGH ANS)
          (DPB (LOGAND (WORD (READ-OBUS-LONG)) 77)       ;High 2 bits and parity bits
               (BYTE 6 2.) (ECC+HIGH ANS)))
    ANS))

;Writes 36 bits, hardware chooses parity bits
(DEFUN WRITE-BMEM ((ADR LONG) (VAL LBUS-WORD))
  ;(FORMAT T "~O@B ← ~L" ADR VAL)
  (WRITE-MD VAL)
  (WRITE-UIR (MD-MICROINSTRUCTION ALU XBUS OBUS-HTYPE ABUS OBUS-CDR ABUS
                                  SPEC 14 MAGIC 10 AMWA ADR BMWA ADR)) ;Extended BMWA
  (STEP-MACHINE '(DP WP)))
(DEFUN (READ-TYPE-MAP LONG) ((ADR LONG))
  (LET ((LBWD (LONG-INTO-LBUS-WORD (ASH (LDB (BYTE 4 0) ADR) 28.))))
    (SETF (ECC+HIGH LBWD) (WORD (LDB (BYTE 2 4) ADR)))
    (WRITE-MD LBWD))
  (WRITE-UIR (MD-MICROINSTRUCTION SPEC "Crocks to Ybus" BYTE-FUNC 3 MAGIC 0
```

```
                              AMWA #.(+ 34 3_5) ALU ALUB
                              TYPE-MAP-SEL (LDB (BYTE 6 6) ADR)))
  (LOGAND 17 (DATA (READ-OBUS))))

;Smashes 377@B (well, so does everything)
;Hardware does not compute parity
(DEFUN WRITE-TYPE-MAP ((ADR LONG) (VAL LONG))
  (SETQ VAL (INSERT-ODD-PARITY VAL 3))
  (WRITE-TYPE-MAP-AND-PARITY ADR (INSERT-ODD-PARITY VAL 3)))

(DEFUN WRITE-TYPE-MAP-AND-PARITY ((ADR LONG) (VAL LONG))
  (WRITE-BMEM 377 (LONG-INTO-LBUS-WORD VAL))
  (LET ((LBWD (LONG-INTO-LBUS-WORD (ASH (LDB (BYTE 4 0) ADR) 28.))))
    (SETF (ECC+HIGH LBWD) (WORD (LDB (BYTE 2 4) ADR)))
    (WRITE-MD LBWD))
;  (FORMAT T "~%~O@T ← ~O, MD = ~O, 377@B = ~O "
;         ADR VAL (DATA (READ-MD)) (DATA (READ-BMEM 377)))
  (WRITE-UIR (MD-MICROINSTRUCTION TYPE-MAP-SEL (LDB (BYTE 6 6) ADR)
                              BMRA 377 SPEC "Write TYPE//GC mem" MAGIC 2))
  (STEP-MACHINE '(DP WP)))

(DEFUN (READ-GC-MAP LONG) ((ADR LONG))
  (WRITE-LONG-INTO-MD (ASHL ADR 14.))
  (WRITE-UIR (MD-MICROINSTRUCTION SPEC "Crocks to Ybus" BYTE-FUNC "General" MAGIC 0
                              AMWA #.(+ 30 3_5) ALU ALUB))
  (LOGAND 17 (DATA (READ-OBUS))))

;Hardware does not compute parity
(DEFUN WRITE-GC-MAP ((ADR LONG) (VAL LONG))
  (WRITE-GC-MAP-AND-PARITY ADR (INSERT-ODD-PARITY VAL 3)))

(DEFUN WRITE-GC-MAP-AND-PARITY ((ADR LONG) (VAL LONG))
  (WRITE-BMEM 377 (LONG-INTO-LBUS-WORD VAL))
  (WRITE-LONG-INTO-MD (ASHL ADR 14.))
  (WRITE-UIR (MD-MICROINSTRUCTION BMRA 377 SPEC "Write TYPE//GC mem" MAGIC 1))
  (STEP-MACHINE '(DP WP)))
(DEFUN (READ-STACK-POINTER LONG) ()
  (WRITE-UIR (BUILD MICROINSTRUCTION AMRA-SEL 3 AMRA 0_9 ALU XBUS
                                 OBUS-LTYPE MAGIC# MAGIC 0 OBUS-HTYPE "Const 0"
                                 OBUS-CDR "Const 0"))
  (DATA (READ-OBUS)))

(DEFUN (READ-FRAME-POINTER LONG) ()
  (WRITE-UIR (BUILD MICROINSTRUCTION AMRA-SEL 3 AMRA 1_9 ALU XBUS
                                 OBUS-LTYPE MAGIC# MAGIC 0 OBUS-HTYPE "Const 0"
                                 OBUS-CDR "Const 0"))
  (DATA (READ-OBUS)))

(DEFUN WRITE-STACK-POINTER ((VAL LONG))
  (WRITE-LONG-INTO-MD VAL)
  (WRITE-UIR (MD-MICROINSTRUCTION ALU XBUS SPEC "Load STKP"))
  (STEP-MACHINE '(DP)))

(DEFUN WRITE-FRAME-POINTER ((VAL LONG))
  (WRITE-LONG-INTO-MD VAL)
  (WRITE-UIR (MD-MICROINSTRUCTION ALU XBUS SPEC "Load FRMP"))
  (STEP-MACHINE '(DP)))

(DEFUN DATA-TO-OBUS ((VAL LBUS-WORD))
  (WRITE-MD VAL)
  (WRITE-UIR (MD-MICROINSTRUCTION ALU XBUS OBUS-HTYPE ABUS OBUS-CDR ABUS)))

;;; Bit 11 of AMWA selects which set of crocks to read.
(DEFUN (READ-CROCKS LONG) ((ADR LONG))
  (WRITE-UIR (BUILD MICROINSTRUCTION AMWA (ASH ADR 11.)
                                 SPEC "Crocks to Ybus" ALU AluB))
  (DATA (READ-OBUS)))
(DEFUN WRITE-VMA ((VAL LONG))
  (DISTURB-VMA)
  (WRITE-BMEM 377 (LONG-INTO-LBUS-WORD VAL))
  (WRITE-UIR (BUILD MICROINSTRUCTION BMRA 377 XYBUS-SEL 1 ALU XBUS MEM 5))
```

```
(STEP-MACHINE '(DP)))

(DEFUN (READ-MICRODEVICE LBUS-WORD) ((SLOT LONG) (SUBDEVICE LONG))
  (WRITE-UIR (BUILD MICROINSTRUCTION AMRA-SEL 1
                    AMRA 100 MEM 1
                    AMWA (+ (LSH SLOT 5) SUBDEVICE)
                    ALU XBUS OBUS-HTYPE ABUS OBUS-CDR ABUS
                    BMWA 17))
  (STEP-MACHINE '(DP))
  (READ-BMEM 377))
;;; MC spy bus interfaces
(DEF-IO SPY-MC-CONTROL MC-CONTROL)                    ;Write only
(DEF-IO SPY-MC-ID BYTE)                               ;ID indexed by low 5 bits of SPY-MC-CONTROL
(DEF-IO SPY-MC-ERROR-STATUS MC-ERROR-STATUS)
(DEF-IO SPY-ECC-SYNDROME BYTE)                        ;6-0 inverted syndrome bits, 7 error flag
(DEF-IO SPY-ECC-ADDRESS BYTE)                         ;1-0 ADDR<1-0>, 7-2 ADDR<23-18>
(DEF-IO SPY-MC-STATUS MC-STATUS)
(DEF-IO SPY-LBUS-CONTROL WORD)                        ;Lbus control

(DEFVAR *LAST-MC-CONTROL* MC-CONTROL (BUILD MC-CONTROL))
(DEFVAR *MC-CONTROL-WHILE-RUNNING* MC-CONTROL (BUILD MC-CONTROL))
;;; Write mc-control compensating for inverted bits, and remembering the value written.
(DEFUN WRITE-MC-CONTROL ((VAL MC-CONTROL))
  (SETQ SPY-MC-CONTROL (LOGXOR (BUILD MC-CONTROL ECC-DRIVE-DISABLE 1 ERROR-RESET 1) VAL))
  (SETQ *LAST-MC-CONTROL* VAL))

(DEFUN MC-RESET ()
  ;; Clear errors then set up standard controls
  (WRITE-MC-CONTROL (BUILD MC-CONTROL ERROR-RESET 1))
  (WRITE-MC-CONTROL *MC-CONTROL-WHILE-RUNNING*))

(DEFUN MC-ERROR-RESET ()
  ;; Clear errors, leaving controls the same
  (WITH-SPECIAL-MC-CONTROL (ERROR-RESET 1)))

(DEFUN WRITE-MD ((VAL LBUS-WORD))
  (WITH-SPECIAL-MC-CONTROL (SPECIAL-LOAD-MD 1)
    (WRITE-LBUS 77777777 VAL)))

(DEFUN WRITE-LONG-INTO-MD ((VAL LONG))
  (WRITE-MD (LONG-INTO-LBUS-WORD VAL)))

;If there is an MC board, this reads the IO MD
(DEFUN (READ-MD LBUS-WORD) ()          ;via Abus, Xbus, Obus
  (WRITE-UIR (MD-MICROINSTRUCTION ALU XBUS OBUS-HTYPE ABUS OBUS-CDR ABUS))
  (READ-OBUS))

(DEFUN (READ-OBUS LBUS-WORD) ()
  (WITH-SPECIAL-MC-CONTROL (OBUS-TO-LBUS 1)
    (READ-LBUS 77777777)))

(DEFUN (READ-OBUS-LONG LONG) ()
  (WITH-SPECIAL-MC-CONTROL (OBUS-TO-LBUS 1)
    (DATA (READ-LBUS 77777777))))

(DEFUN MC-ECC-DIAG-MODE ((ON-OFF BOOLE))
  (COND (ON-OFF
         (SETQ SPY-LBUS-CONTROL (CHANGE FEP-LBUS-CONTROL SPY-LBUS-CONTROL ECC-DIAG 1))
         (WRITE-MC-CONTROL (BUILD MC-CONTROL ECC-DRIVE-DISABLE 1 ECC-CORRECT-DISABLE 1)))
        (T
         (SETQ SPY-LBUS-CONTROL (CHANGE FEP-LBUS-CONTROL SPY-LBUS-CONTROL ECC-DIAG 0))
         (WRITE-MC-CONTROL (BUILD MC-CONTROL ECC-DRIVE-DISABLE 0 ECC-CORRECT-DISABLE 0)))))

(DEFUN (READ-LBUS-AND-ECC LBUS-WORD) ((ADDR LONG))
  (WITH-LBUS-ECC-DIAG-MODE
    (LET (((LBW LBUS-WORD)))
      (SETQ (ADDRESS (AREF LBUS-MAP LBUS-MAP-SLOT)) (LBUS-ADDRESS-PAGE ADDR))
      (SETF (DATA LBW) (<-SLONG (AREF (AREF LBUS-DATA LBUS-MAP-SLOT)
                                      (LBUS-ADDRESS-OFFSET ADDR))))
      (SETF (ECC+HIGH LBW) (ECC+HIGH (AREF LBUS-MAP LBUS-MAP-SLOT)))
      LBW)))
```

```
(DEFUN WRITE-LBUS-AND-ECC ((ADDR LONG) (LBW LBUS-WORD))
  (WITH-LBUS-ECC-DIAG-MODE
    (SETQ (ADDRESS (AREF LBUS-MAP LBUS-MAP-SLOT)) (LBUS-ADDRESS-PAGE ADDR))
    (SETQ (ECC+HIGH (AREF LBUS-MAP LBUS-MAP-SLOT)) (ECC+HIGH LBW))
    (SETF (AREF (AREF LBUS-DATA LBUS-MAP-SLOT) (LBUS-ADDRESS-OFFSET ADDR))
          (->SLONG (DATA LBW)))))

;Saves and restores main memory locations 0,1 (which better exist!)
(DEFUN WRITE-AN-EMU-MD ((WHICH-ONE LONG) (VAL LBUS-WORD))
  (DISTURB-EMU-MD-PAIR)
  (LET ((SAVED-MAIN-MEM (READ-LBUS WHICH-ONE)))
    (WRITE-LBUS WHICH-ONE VAL)
    (WRITE-VMA (+ 1700000000 WHICH-ONE))
    (WRITE-UIR (BUILD MICROINSTRUCTION MEM 2))
    (STEP-MACHINE '(DP))
    (WRITE-LBUS WHICH-ONE SAVED-MAIN-MEM)))

(DEFUN (READ-AN-EMU-MD LBUS-WORD) ((WHICH-ONE LONG))
  (DISTURB-VMA)
(WRITE-VMA (+ 1700000000 WHICH-ONE))
(WRITE-UIR (BUILD MICROINSTRUCTION AMRA-SEL 3 AMRA 2000
                                   ALU XBUS OBUS-HTYPE ABUS OBUS-CDR ABUS))
(READ-OBUS))
(DEFUN (READ-VMA LONG) ()
  (WRITE-UIR (BUILD MICROINSTRUCTION AMRA-SEL 3 AMRA 2200
                                     ALU XBUS OBUS-HTYPE ABUS OBUS-CDR ABUS))
  (LOGAND #.(1- (ASH 1 28.)) (DATA (READ-OBUS))))

(DEFUN (READ-ASN LONG) ()
  (WRITE-UIR (BUILD MICROINSTRUCTION AMRA-SEL 3 AMRA 2200
                                     ALU XBUS OBUS-HTYPE ABUS OBUS-CDR ABUS))
  (LET ((LBWD (READ-OBUS)))
    (DPB (ECC+HIGH LBWD) #o0404 (LSH (DATA LBWD) -28.))))

(DEFUN (READ-PC LONG) ()
  (WRITE-UIR (BUILD MICROINSTRUCTION AMRA-SEL 3 AMRA 2400
                    ALU XBUS OBUS-HTYPE ABUS OBUS-CDR ABUS))
  (DATA (READ-OBUS)))

;Smashes VMA
(DEFUN WRITE-PC ((VAL LONG))
  (DISTURB-VMA)
  ;(SETQ *VMA-SAVED* FALSE)
  (WRITE-BMEM 377 (LONG-INTO-LBUS-WORD VAL))
  (WRITE-UIR (BUILD MICROINSTRUCTION BMRA 377 XYBUS-SEL 1 ALU XBUS OBUS-HTYPE BBUS
                    MEM 1 AMWA (+ 1_10. 37_5 2) AMWA-SEL 3))
  (STEP-MACHINE '(DP)))

;;; These are for the convenience of state saving
(DEFUN WRITE-PHTA-ASN ((VAL LONG))
  (DISTURB-PHTA-ASN)
  (WRITE-BMEM 377 (LONG-INTO-LBUS-WORD VAL))
  (WRITE-UIR (BUILD MICROINSTRUCTION BMRA 377 XYBUS-SEL 1 ALU XBUS OBUS-HTYPE BBUS
                                     MEM 1 AMWA (+ 1_10. 37_5 1) AMWA-SEL 3))
  (STEP-MACHINE '(DP)))

(DEFUN (READ-PHTA-ASN LONG) ()
  (DISTURB-VMA)
  (WRITE-VMA 17_20.)                              ;To get the PHTB bits
  (WRITE-UIR (BUILD MICROINSTRUCTION SPEC "Use PHTA"          ;Force PHTA to ADDR
                                     AMRA-SEL 3 AMRA 2300     ;Copy map output to 377eB
                                     ALU XBUS OBUS-HTYPE ABUS OBUS-CDR ABUS
                                     BMWA 377))
  (STEP-MACHINE '(DP WP))
  (LOGIOR (LOGAND (DATA (READ-BMEM 377)) #077770000)    ;PHTA/PHTB
          (READ-ASN)))


(DEFUN WRITE-PHTA-AND-ASN ((PHTC-ADDR LONG) (PHTC-SIZE LONG) (ASN LONG))
  ;; phtc-size is a power of 2 between 4K and 64K
  ;; phtc-addr is a multiple of 64k
```

```
;; asn is an 8 bit number
(DISTURB-PHTA-ASN)
(LET ((PHTB (DPB (- (LDB (BYTE 4 12.) PHTC-SIZE)) (BYTE 4 12.) 0)))
  (WRITE-LONG-INTO-MD (LOGIOR PHTC-ADDR PHTB ASN))
  (SETQ PHTB (DPB (- (LDB (BYTE 4 12.) PHTC-SIZE)) (BYTE 4 12.) 0))
  (WRITE-LONG-INTO-MD (LOGIOR PHTC-ADDR PHTB ASN))
  (WRITE-UIR (MD-MICROINSTRUCTION ALU XBUS OBUS-HTYPE ABUS BMWA 377))
  (STEP-MACHINE '(DP))
  (WRITE-UIR (BUILD MICROINSTRUCTION BMRA 377 XYBUS-SEL 1 ALU XBUS OBUS-HTYPE BBUS
                    MEM 1 AMWA (+ 1_10. 37_5 1) AMWA-SEL 3))
  (STEP-MACHINE '(DP))))

(COMMENT
(DEFVAR *MAP-EXPECTED-CONTENTS* (MAKE-ARRAY 20000 ':INITIAL-VALUE 0))
(DEFVAR *ALLOW-MAP-SLOW-READ* T)        ;Set this to NIL to not try all tags

;Read and write map.  Values in the form they actually are in the RAM (bits 0-32 only).
;Parity bit appears in 33 rather than 35 to make diagnostics happy.
;Bit 12 of the address is 0 for map A, 1 for map B


;Clobbers PHTA, ASN, VMA, 0@A
(DEFUN WRITE-MAP (ADR VAL &AUX ASN)
  ;; Clobber ASN with the bits that write from it
  (WRITE-PHTA-AND-ASN 0 10000 (SETQ ASN (LDB (BYTE 8 25.) VAL)))
  ;; Point VMA at the desired location
  (WRITE-VMA (ASH (LOGXOR (LDB (BYTE 12. 0) ADR) (LDB (BYTE 4 0) ASN)) 8))
  ;; Put Abus data into MD
  (WRITE-MD (LOGIOR (ASH (LDB (BYTE 16. 0) VAL) 8)
                    (LDB (BYTE 1 16.) VAL)
                    (ASH (LDB (BYTE 8 17.) VAL) 24.)))
  ;; Write it
  (WRITE-UIR (MD-MICROINSTRUCTION ALU XBUS OBUS-HTYPE ABUS AMWA-SEL 0 AMWA 0))
  (STEP-MACHINE '(DP))
  (WRITE-UIR (BUILD MICROINSTRUCTION AMRA 0 ALU XBUS OBUS-HTYPE ABUS OBUS-CDR ABUS
                                     MEM 1 AMWA (+ 1_10. 37_5 5 (LDB (BYTE 1 12.) ADR))
                                     AMWA-SEL 3))
  (STEP-MACHINE '(DP))
  (ASET VAL *MAP-EXPECTED-CONTENTS* ADR))

;Read the map through various strategems.


(DEFUN READ-MAP (ADR)
  ;; Get expected contents of fields not directly readable
  (LET ((VMA-TAG (LDB (BYTE 8 17.) (AREF *MAP-EXPECTED-CONTENTS* ADR)))
        (ASN-TAG (LDB (BYTE 8 25.) (AREF *MAP-EXPECTED-CONTENTS* ADR))))
    ;; Enable desired map
    (WITH-SPECIAL-MC-CONTROL (MAP-A-DISABLE (LDB (BYTE 1 12.) ADR)
                              MAP-B-DISABLE (LOGXOR (LDB (BYTE 1 12.) ADR) 1))
      (OR (AND (= (LDB (BYTE 4 4) VMA-TAG) 17)
               (AREF *MAP-EXPECTED-CONTENTS* ADR))
          (READ-MAP-TRY ADR VMA-TAG ASN-TAG)
          (READ-MAP-TRY-BIT-TOGGLES ADR VMA-TAG ASN-TAG)
          (AND *ALLOW-MAP-SLOW-READ* (READ-MAP-TRY-EVERYTHING ADR VMA-TAG ASN-TAG))
          (PROGN (FORMAT T "~&Unable to read map loc ~O no matter what;~@
                            Resume to return correct contents ~O"
                         ADR (AREF *MAP-EXPECTED-CONTENTS* ADR))
                 (PRINT-BIT-MASK (AREF *MAP-EXPECTED-CONTENTS* ADR) "; bits ")
                 (BREAK READ-MAP)
                 (AREF *MAP-EXPECTED-CONTENTS* ADR))))))

;Read map, return contents or NIL if no hit
(DEFUN READ-MAP-TRY (ADR VMA-TAG ASN-TAG)
  ;; Point ASN at the desired location
```

```
  (WRITE-PHTA-AND-ASN 0 10000 ASN-TAG)
  ;; Point VMA at the desired location
  (WRITE-VMA (ASH (LOGXOR (LDB (BYTE 12. 0) ADR)
                          (LDB (BYTE 4 0) ASN-TAG)
                          (ASH (8-BIT-REVERSE VMA-TAG) 4)
                          (ASH VMA-TAG 12.))
                  8))
  ;; Read the map
  (LET ((MAP-SEL (1+ (LDB (BYTE 1 12.) ADR)))
        (MAP (PROGN (WRITE-UIR (BUILD MICROINSTRUCTION AMRA-SEL 3 AMRA 2300
                                      ALU XBUS OBUS-HTYPE ABUS OBUS-CDR ABUS))
                    (READ-OBUS))))
    (AND (= (LDB (BYTE 2 32.) MAP) MAP-SEL)     ;Read from correct map if hit
         (LOGIOR (LDB (BYTE 16. 8) MAP)             ;15-0 PPN
                 (ASH (LDB (BYTE 1 34.) MAP) 16.)   ;16 Write protect
                 (ASH (LDB (BYTE 8 24.) MAP) 17.)   ;24-17 VMA tag
                 (ASH ASN-TAG 25.)))))              ;32-25 ASN tag

(DEFUN READ-MAP-TRY-BIT-TOGGLES (ADR VMA-TAG ASN-TAG)
  (FORMAT T "~&[Unable to read map, trying toggling bits in tag fields.]~%")
  (PROG READ-MAP-TRY-BIT-TOGGLES (TEM)
    (DOTIMES (I 8)
      (IF (SETQ TEM (READ-MAP-TRY ADR (LOGXOR VMA-TAG (ASH 1 I)) ASN-TAG))
          (RETURN-FROM READ-MAP-TRY-BIT-TOGGLES TEM)))
    (DOTIMES (I 8)
      (IF (SETQ TEM (READ-MAP-TRY ADR VMA-TAG (LOGXOR ASN-TAG (ASH 1 I))))
          (RETURN-FROM READ-MAP-TRY-BIT-TOGGLES TEM)))))

(DEFUN READ-MAP-TRY-EVERYTHING (ADR VMA-TAG ASN-TAG)
  (FORMAT T "~&[Unable to read map, trying all possible values in tag fields.]~%")
  (PROG READ-MAP-TRY-EVERYTHING (TEM)
    (DOTIMES (I 400)
      (IF (SETQ TEM (READ-MAP-TRY ADR I ASN-TAG))
          (RETURN-FROM READ-MAP-TRY-EVERYTHING TEM)))
    (DOTIMES (I 400)
      (IF (SETQ TEM (READ-MAP-TRY ADR VMA-TAG I))
          (RETURN-FROM READ-MAP-TRY-EVERYTHING TEM)))))

(DEFUN 8-BIT-REVERSE (NUMBER)
  (LOOP FOR I FROM 0 TO 7
        SUMMING (ASH (LOGAND (ASH NUMBER (- I)) 1) (- 7 I)))
)
;;; State saving
;;; Explicit read and write from console
;;; Here we want to interact with the state-saving, rather than primitively
;;; accessing the hardware

#|
Uir → Uir, Obus, Next-cpc, Sequencer-status
Sequencer → Npc, Cpc, Task, Csp
Vma
IO MD
EMU MDs
PHTA-ASN

Variables controling state saving.
  *Save-state*
     True   The first time an internal register is written, it's previous
            value is saved and will be restored by "restore".
     False  No hardware values are saved.

  *read-state*
     True   Reads from the console read from saved state iff the
            hardware has been written since the last "restore".
     False  Reads from the console always read from the hardware.

Functions that affect state saving.
  save-state      Save the most volatile parts of the machine.
  discard-state   Ignore any previous saved state.
  restore-state   Copy the saved state back into the machine.
```

```
; 1) No state saving at all.  Reads/Writes go directly to hardware and may cause
;    arbitrary amounts of state to be lost.
;
; 2) Reads/Writes both go to hardware, but if the operation requires that some
;    state of the machine be trashed, that state is saved by the FEP.  For
;    example: reading cmem will cause the UIR to be saved and restored when
;    the machine is C-p'ed.
;
; 3) Writes always go to hardware. Reads read either from hardware, or from
;    the saved state if the hardware has been disturbed.
```

```
;The saving of the hardware into these variables is only done when it is
;about to be changed.
; -1- Put it back whenever we disturb it
; -2- Put it back when we next return to command level
; -3- Put it back with the :RESTORE command only, and have a flag in the
;     status display that says it's been damaged.
; -4- Have a user-settable flag that chooses between 2 and 3
;This keeps track of whether or not we think that the machine is running

(DEFVAR&INITFUN INIT-STATE-SAVING ()
  *MACHINE-RUNNING* BOOLE FALSE
  *UPDATE-STATUS* BOOLE FALSE
  *SAVE-STATE* BOOLE FALSE
  *READ-STATE* BOOLE FALSE
  *UIR-SAVED* BOOLE FALSE
  *SEQUENCER-SAVED* BOOLE FALSE
  *IO-MD-SAVED* BOOLE FALSE
  *VMA-SAVED* BOOLE FALSE
  *PHTA-ASN-SAVED* BOOLE FALSE
  *EMU-MD-PAIR-SAVED* BOOLE FALSE)

(DEFVAR *SAVED-UIR* MICROINSTRUCTION)
(DEFVAR *SAVED-OBUS* LBUS-WORD)
(DEFVAR *SAVED-NEXT-CPC* LONG)
(DEFVAR *SAVED-SQ-STATUS* SQ-STATUS)
(DEFVAR *OPCS-SAVED* BOOLE)
(DEFVAR *SAVED-OPCS* (ARRAY LONG 16))

;The NPC (and hence CPC), CSP, and TASK must be disturbed to fool with the
;microcode control stack and the task memory.  Except when doing that we
;leave them alone.
(DEFVAR *SAVED-NPC* LONG)
(DEFVAR *SAVED-CTOS* LONG)
(DEFVAR *SAVED-CPC* LONG)
(DEFVAR *SAVED-CSP* LONG)
(DEFVAR *SAVED-TASK* LONG)

;The TMC.

(DEFVAR *SAVED-IO-MD* LBUS-WORD)
(DEFVAR *SAVED-EMU-MD-LOW* LBUS-WORD)
(DEFVAR *SAVED-EMU-MD-HIGH* LBUS-WORD)
(DEFVAR *SAVED-VMA* LONG)
(DEFVAR *SAVED-PHTA-ASN* LONG)
```

```
(DEFUN DISCARD-STATE ()
  (DISCARD-UIR)
  (DISCARD-SEQUENCER)
  (DISCARD-MC)
  (SETQ *UPDATE-STATUS* TRUE))

(DEFUN RESTORE-STATE ()
  (RESTORE-MC)
  (RESTORE-SEQUENCER)
  (RESTORE-UIR)
  (SETQ *UPDATE-STATUS* TRUE))

(DEFUN ENSURE-MACHINE-HALTED ()
  (WHEN *MACHINE-RUNNING*
    (FORMAT T "Attempt to clobber running machine.  Machine halted.")
    (WRITE-SQ-CTL-TO-STOP-MACHINE)))

;Save UIR and related registers (just before trashing them)
(DEFUN DISTURB-UIR ()
  (ENSURE-MACHINE-HALTED)
  (UNLESS (OR *UIR-SAVED* (NOT *SAVE-STATE*))
    (SAVE-UIR)
    (SETQ *UPDATE-STATUS* TRUE)))

(DEFUN SAVE-UIR ()
  (FORMAT T "~%Saving uir...")
  (SETQ *SAVED-UIR* SPY-CMEM
        *SAVED-OBUS* (READ-OBUS)
        *SAVED-NEXT-CPC* (READ-NEXT-CPC)
        *SAVED-SQ-STATUS* (READ-SQ-STATUS))
  (SETQ *UIR-SAVED* TRUE)
  ;; Copy out the OPCs before we trash them by single stepping the machine.
  (UNLESS *OPCS-SAVED* (COPY-OUT-OPCS)))

(DEFUN RESTORE-UIR ()
  (WHEN *UIR-SAVED*
    (WRITE-UIR *SAVED-UIR*))
  (SETQ *UIR-SAVED* FALSE
        *OPCS-SAVED* FALSE))

(DEFUN DISCARD-UIR () (SETQ *UIR-SAVED* FALSE))

;Save rest of sequencer
;Call this onlu if uou need to save CPC/NPC/CSP/TSK

(DEFUN DISTURB-SEQUENCER ()
  (ENSURE-MACHINE-HALTED)
  (UNLESS (OR *SEQUENCER-SAVED* (NOT *SAVE-STATE*))
    (SAVE-SEQUENCER)
    (SETQ *UPDATE-STATUS* TRUE)))

(DEFUN SAVE-SEQUENCER ()
  (FORMAT T "~%Saving uir...")
  (SETQ *SAVED-NPC* (READ-NPC)
        *SAVED-CTOS* (READ-CTOS)
        *SAVED-CPC* (READ-CPC)
        *SAVED-TASK* (READ-TASK)
        *SAVED-CSP* (READ-CSP-INTERNAL)
        *SEQUENCER-SAVED* TRUE))

(DEFUN RESTORE-SEQUENCER ()
  (WHEN *SEQUENCER-SAVED*
    (IF (= *SAVED-TASK* (READ-TASK))

        (FORMAT T "Restore sequencer has IASK change out from under it."))
    (WRITE-CSP *SAVED-CSP*)
    (WRITE-CPC-AND-NPC *SAVED-CPC* *SAVED-NPC*)
    (SETQ *SEQUENCER-SAVED* FALSE)))

(DEFUN DISCARD-SEQUENCER () (SETQ *SEQUENCER-SAVED* FALSE))
```

```
;Disturb the IO-MD (the one that READ-MD and WRITE-MD hack)
(DEFUN DISTURB-IO-MD ()
  (ENSURE-MACHINE-HALTED)
  (UNLESS (OR *IO-MD-SAVED* (NOT *SAVE-STATE*))
    (SAVE-IO-MD)))

(DEFUN DISTURB-EMU-MD-PAIR ()
  (ENSURE-MACHINE-HALTED)
  (UNLESS (OR *EMU-MD-PAIR-SAVED* (NOT *SAVE-STATE*))
    (SAVE-EMU-MD-PAIR)
    (SETQ *UPDATE-STATUS* TRUE)))

(DEFUN DISTURB-VMA ()
  (ENSURE-MACHINE-HALTED)
  (UNLESS (OR *VMA-SAVED* (NOT *SAVE-STATE*))
    (SAVE-VMA)
    (SETQ *UPDATE-STATUS* TRUE)))

(DEFUN DISTURB-PHTA-ASN ()
  (ENSURE-MACHINE-HALTED)
  (UNLESS (OR *PHTA-ASN-SAVED* (NOT *SAVE-STATE*))
    (SAVE-PHTA-ASN)
    (SETQ *UPDATE-STATUS* TRUE)))

(DEFUN SAVE-IO-MD ()
  (SETQ *SAVED-IO-MD* (READ-MD)
        *IO-MD-SAVED* TRUE))

(DEFUN SAVE-EMU-MD-PAIR ()
  (SETQ *SAVED-EMU-MD-LOW* (READ-AN-EMU-MD 0)
        *SAVED-EMU-MD-HIGH* (READ-AN-EMU-MD 1)
        *EMU-MD-PAIR-SAVED* TRUE))

(DEFUN SAVE-VMA ()
  (SETQ *SAVED-VMA* (READ-VMA)
        *VMA-SAVED* TRUE))

(DEFUN SAVE-PHTA-ASN ()
  (SETQ *SAVED-PHTA-ASN* (READ-PHTA-ASN)
        *PHTA-ASN-SAVED* TRUE))

(DEFUN RESTORE-MC ()
  (WHEN *PHTA-ASN-SAVED*
    (WRITE-PHTA-ASN *SAVED-PHTA-ASN*)
    (SETQ *PHTA-ASN-SAVED* FALSE))
  (WHEN *EMU-MD-PAIR-SAVED*
    (WRITE-AN-EMU-MD 0 *SAVED-EMU-MD-LOW*)
    (WRITE-AN-EMU-MD 1 *SAVED-EMU-MD-HIGH*)
    (SETQ *EMU-MD-PAIR-SAVED* FALSE))
  (WHEN *VMA-SAVED*
    (WRITE-VMA *SAVED-VMA*)
    (SETQ *VMA-SAVED* FALSE))
  (WHEN *IO-MD-SAVED*
    (WRITE-MD *SAVED-IO-MD*)
    (SETQ *IO-MD-SAVED* FALSE)))

(DEFUN DISCARD-MC ()
  (SETQ *PHTA-ASN-SAVED* FALSE
        *EMU-MD-PAIR-SAVED* FALSE
        *VMA-SAVED* FALSE
        *IO-MD-SAVED* FALSE))
```

F:>lmach>fep>Lcons-Interface.lil.28

```
;;;-*- Mode: Lil; Package: Lil; Base:8.; Lowercase: T -*-

(include "Types-and-macros" "Machine.ext")

(defatommacro version-number '2)
(defvar *pp-abort-flag* boole)
```

```
(defvar *checksum* word)

(deflilmacro inline-read-pp-byte ()
  '(if *pp-abort-flag* (byte 0)
     (let (((byte byte)))
       ;; Wait for next command
       (wait-for-strobe-to-set)
       ;; look for abort bit
       (cond ((bit-test p-port 1_14.)
              (setq *pp-abort-flag* true)       ;low level should clean up
              (byte 0))
             (t ;; Read the byte
              (setq byte (byte (logand #o377 p-port)))
              ;; ack the byte
              (setq p-port (logior 1_12. 2))
              (setq p-port (logior  1_15. 1_12. 2))
              ;; wait for our ack to be accepted
              (wait-for-strobe-to-clear)
              (setq p-port 0)
              (setq *checksum* (logxor (rotl *checksum* 1) (logand #o377 (word byte))))
             byte)))))

(deflilmacro defwcom (name args . body)
  '(defun ,name ()
     (let* ,(loop for (arg type) in args
                  collect (selectq type
                            (byte '((,arg byte) (read-pp-byte)))
                            (word '((,arg word) (read-pp-word)))
                            (addr '((,arg long) (read-pp-addr)))
                            (long '((,arg long) (read-pp-long)))
                            (otherwise (ferror nil "Bad argtype to def-com"))))
       (when (check-checksum)
         (setq *checksum* #o55555)
         ,@body
         (check-checksum)))))

(deflilmacro defrcom (name args . body)
  '(defun ,name ()
     (let* ,(loop for (arg type) in args
                  collect (selectq type
                            (byte '((,arg byte) (read-pp-byte)))
                            (word '((,arg word) (read-pp-word)))
                            (addr '((,arg long) (read-pp-addr)))
                            (long '((,arg long) (read-pp-long)))
                            (otherwise (ferror nil "Bad argtype to def-com"))))
       (when (check-checksum)
         (setq *checksum* #o55555)
         (write-pp-word ,(fep-op-number-from-process-function name))
         ,@body
         (write-pp-word *checksum*)))))

(defun (read-pp-byte byte) ()
  (inline-read-pp-byte))

(defun (read-pp-word word) ()
  (let ((b0 (word (read-pp-byte)))
        (b1 (word (read-pp-byte))))
    (dpb b1 #o1010 b0)))

(defun (read-pp-addr long) ()
  (let ((b0 (long (read-pp-byte)))
        (b1 (long (read-pp-byte)))
        (b2 (long (read-pp-byte))))
    (dpb b2 #o2010 (dpb b1 #o1010 (ldb #o0010 b0)))))   ;ldb needed 'cause sign extends...
(defun (read-pp-long long) ()
  (let ((b0 (long (read-pp-byte)))
        (b1 (long (read-pp-byte)))
        (b2 (long (read-pp-byte)))
        (b3 (long (read-pp-byte))))
    (dpb b3 #o3010 (dpb b2 #o2010 (dpb b1 #o1010 b0)))))
```

```
(deflilmacro inline-write-pp-byte (byte)
  '(unless *pp-abort-flag*
     (let (((byte word) (logand #o377 (word ,byte))))
      ;; assume we are going to win and update the checksum
       (setq *checksum* (logxor (rotl *checksum* 1) (word byte)))
       ;; Wait for next command
       (wait-for-strobe-to-set)
       ;; look for abort bit
       (cond ((bit-test p-port 1_14.)
              (setq *pp-abort-flag* true))      ;low level should clean up
             (t (setq byte (logior 2_12. byte))
                (setq p-port byte)
                (setq p-port (logior  1_15. byte))
                ;; wait for our ack to be accepted
                (wait-for-strobe-to-clear)
                (setq p-port 0))))))

(defun write-pp-byte ((byte word))
  (inline-write-pp-byte byte))

(defun write-pp-word ((word word))
  (write-pp-byte (ldb #o0010 word))
  (write-pp-byte (ldb #o1010 word)))

(defun write-pp-addr ((addr long))
  (loop repeat 3
        do (write-pp-byte (word (logand #o377 addr)))
           (setq addr (rotr addr 8))))

(defun write-pp-long ((long long))
  (loop repeat 4
        do (write-pp-byte (word (logand #o377 long)))
           (setq long (rotr long 8))))

;(defmacro wait-for-strobe-to-set () '(loop until (minusp p-port)))
;(defmacro wait-for-strobe-to-clear () '(loop while (minusp p-port)))

;;; Use these when we have the schedular
(defmacro wait-for-strobe-to-set (&optional allow-schedule)
  (if allow-schedule
      '(loop repeat 30000.
             until (minusp p-port)
             finally (process-wait "Strobe to set" #'parallel-port-strobe-set-p))
    '(loop until (minusp p-port))))

(defmacro wait-for-strobe-to-clear (&optional allow-schedule)
  (if allow-schedule
      '(loop repeat 30000.
             while (minusp p-port)
             finally (process-wait "Strobe to clear" #'parallel-port-strobe-clear-p))
    '(loop while (minusp p-port))))

(defun (parallel-port-strobe-set-p boole) () (minusp p-port))
(defun (parallel-port-strobe-clear-p boole) () (not (minusp p-port)))
(defatommacro normal-response 1_8.)
(defatommacro normal-response-with-data 2_8.)
(defatommacro jump-response 3_8.)
(defatommacro lbus-read-response 4_8.)

(defatommacro reset-response 10_8.)
(defatommacro command-error-response  11_8.)
(defatommacro bus-error-response 12_8.)
(defatommacro address-error-response 13_8.)
(defatommacro random-trap-response  14_8.)

(defun Lcons-interface-top-level ()
  ;(declare (require asm-hack))
  (prog (((resp word))                      ;response
         ((data word))                      ;we store word data here
         ((cmnd long))                      ;Put the 3 bits of command code here
         ((addr long)))                     ;address to read/write from
```

```
   (setq resp reset-response)
   (setq p-port resp)                     ;deskew the data
   (setq p-port (logior resp 1_15.))      ; by one instruction time.
   (go first-time-only)
resp
   (setq p-port resp)                     ;deskew the data
   (setq p-port (logior resp 1_15.))      ; by one instruction time.
   (ungrab-spy-bus)                       ;Let the net run again
first-time-only
   (wait-for-strobe-to-clear t)           ;wait for valid command to disappear
wait
   (setq p-port 0)
   (wait-for-strobe-to-set t)             ;wait for a command
   (setq cmnd (ldb #o1403 p-port))
   (if (< cmnd 6) (setq addr (dpb p-port #o0014 addr)))
   (grab-spy-bus false)                   ;Don't read net pkts in place of spy data
   (select cmnd                           ;dispatch
     ;; Read Ibus location
     (0 (setf (address remote-console-Ibus-map-slot) (Ibus-address-page addr))
        (setq cmnd (<-slong (aref remote-console-Ibus-data-page
                                  (Ibus-address-offset addr))))
        (setq resp (logior Ibus-read-response
                           (lsh (ldb #o0004 (ecc+high remote-console-Ibus-map-slot)) 2)
                           (ldb-typed word #o3602 cmnd)))  ;top 2 bits
        (setq p-port resp)
        (setq p-port (logior resp 1_15.))
        (wait-for-strobe-to-clear)
        ;; Strobe now clear.  Send middle 15 bits of result
        (setq p-port 0)
        (wait-for-strobe-to-set)
        (setq resp (ldb-typed word #o1717 cmnd))
        (setq p-port resp)
        (setq p-port (logior resp 1_15.))
        (wait-for-strobe-to-clear)
        ;; Now send last 15 bits
        (setq p-port 0)
        (wait-for-strobe-to-set)
        (setq resp (ldb-typed word #o0017 cmnd))
        (go resp))
     ;; Set high 12 bits of addr
     (5 (setq addr (dpb (long p-port) #o1414 addr))
        (go return-normal-response))
     ;; Byte read
     (1 (setq data (word (aref memory-as-bytes addr)))
        (setq resp (logior (ldb #o0010 data) normal-response-with-data))
        (go resp))
     ;; Word read.  Return low byte.
     (2 (setq data (aref memory-as-words (lsh addr -1)))
        (setq resp (logior (ldb #o0010 data) normal-response-with-data))
        (go resp))
     ;; Byte write.
     (3 (setf (aref memory-as-bytes addr) (byte data))
        (go return-normal-response))
;; Word write
     (4 (setf (aref memory-as-words (lsh addr -1)) data)
        (go return-normal-response) )
     ;; Extended commands
     (6 (select (ldb #o1004 p-port)
          ;; Reset
          (0 (funcall (coerce address (make-pointer long-ptr #o#.(+ 47160_16. 47165))))
             (go return-normal-response))
          ;; Return low byte of the data word
          (1 (setq resp (logior normal-response-with-data (ldb #o0010 data)))
             (go resp))
          ;; Return high byte of the data word
          (2 (setq resp (logior normal-response-with-data (ldb #o1010 data)))
             (go resp))
          ;; Set low byte of the data word
          (3 (setq data (dpb p-port #o0010 data))
             (go return-normal-response))
          ;; Set high byte of the data word
```

```
              (4 (setq data (dpb p-port #o1010 data))
                 (go return-normal-response))
              ;; Escape to the stream-oriented protocol
              (5 (setq resp jump-response)
                 (setq p-port resp)
                 (setq p-port (logior resp 1_15.))
                 (wait-for-strobe-to-clear)
                 (setq p-port 0)
                 (second-level-parallel-port-protocol)
                 (go wait))
              (otherwise
               (setq resp command-error-response)
               (go resp))))
         ;; error
         (7 (setq resp command-error-response)
            (go resp)))
   return-normal-response
      (setq resp normal-response)
      (go resp)))
;;; Second level command processor
;;; Helper macro to generate the select form from the common definition of the
;;; console-program/fep commands
(deflilmacro generate-dispatch-table ()
  `(progn 'compile
     (defconst *main-command-dispatch-table-length* word
       ,(length *fcn-to-opcode-mappings*))
     (defconst *main-command-dispatch-table* command-dispatch-table
       (constant command-dispatch-table
                     ,@(loop for (index name) in *fcn-to-opcode-mappings*
                             collect `(constant command-dispatch-table-entry
                                                cmd-code ,index
                                                cmd-fcn (function ,name)))))))

(generate-dispatch-table)                         ;use macro to generate the table
(defun second-level-parallel-port-protocol ()
  (prog (((disp word)))
        (setq *pp-abort-flag* false)
        (wait-for-strobe-to-set)
        (setq *checksum* #o55555)
        (setq disp (read-pp-word))
        (if *pp-abort-flag* (return))
        (loop for (i word) below *main-command-dispatch-table-length*
              for (this word) = (cmd-code (aref *main-command-dispatch-table* i))
              do ;(format t "~%I = ~O, this = ~O" i this)
                 (when (= disp this)
                   (funcall (cmd-fcn (aref *main-command-dispatch-table* i)))
                   (return))
              finally (process-cmd-error disp))))
(defun (check-checksum boole) ()
  (let ((check *checksum*)
        ((low word) (read-pp-byte)))
    (and (not *pp-abort-flag*)
         (wait-for-strobe-to-set)
         (if (bit-test 1_14. p-port)
             (not (setq *pp-abort-flag* true))
           (setq low (dpb p-port #o1010 low))
           (cond ((= low check)
                  (setq p-port 1_12.)
                  (setq p-port 11_12.)
                  (wait-for-strobe-to-clear)
                  (setq p-port 0)
                  true)
                 (t (setq p-port (+ 7_12. 2))
                    (setq p-port (+ 17_12. 2))
                    (wait-for-strobe-to-clear)
                    (setq p-port 0)
                    false))))))

(defun process-goto ()
  (let ((addr (read-pp-addr)))
```

```
    (if (check-checksum) (funcall addr))))

(defun process-cmd-error ((code word))
  (format t "~%? Error in fep command.  Unknown packet code ~D." code)
  ;; Now return a pkt with opcode 1 = error.
  (wait-for-strobe-to-set)
  (setq p-port (+ 7_12. 1))                    ;error 1
  (setq p-port (+ 17_12. 1))
  (wait-for-strobe-to-clear)
  (setq p-port 0))

(defrcom process-read-version ()
  (write-pp-word 1)                            ;first word == 0 if prom, 1 if ram
  (write-pp-long version-number))              ;second == version number

(defwcom process-write-bytes ((nbytes addr) (address addr))
  (loop for (addr long) from address below (+ address nbytes)
        do (setf (aref memory-as-bytes #-bdlc (logxor addr 1) #+bdlc addr)
                 (read-pp-byte))))

(defrcom process-read-bytes ((nbytes addr) (address addr))
  (loop for (addr long) from address below (+ address nbytes)
        do (write-pp-byte (aref memory-as-bytes #-bdlc (logxor addr 1) #+bdlc addr))))

(defwcom process-write-words ((nwords addr) (address addr))
  (loop for (addr long) from (lshr address 1) below (+ (lshr address 1) nwords)
        do (setf (aref memory-as-words addr) (read-pp-word))))

(defrcom process-read-words ((nwords addr) (address addr))
  (loop for (addr long) from (lshr address 1) below (+ (lshr address 1) nwords)
        do (write-pp-word (aref memory-as-words addr))))
;;; Two special purpose routines for doing reads/writes to the lbus as fast as possible.
;;; N.B.  These routines require that an even number of Lbus words be read/written.
(defwcom process-write-lbus-block ((nwds addr) (address addr))
  (loop with (tb byte) with (tl long)
        for (addr long) from address below (+ address nwds) by 2
        do (setq (address (aref lbus-map lbus-map-slot)) (word (lbus-address-page addr)))
           (setq tl (read-pp-long))
           (setq tb (read-pp-byte))
           (setq (ecc+high (aref lbus-map lbus-map-slot)) (ldb #o0004 tb))
           (setf (aref (aref lbus-data lbus-map-slot) (lbus-address-offset addr))
                 (->slong tl))

           (setq (address (aref lbus-map lbus-map-slot)) (word (lbus-address-page (1+ addr))))
           (setf tl (read-pp-long))
           (setq tl (rotl tl 4))
           (setf (ecc+high (aref lbus-map lbus-map-slot)) (word (ldb #o0004 tl)))
           (setf (aref (aref lbus-data lbus-map-slot) (lbus-address-offset (1+ addr)))
                 (->slong (dpb (lshr tb 4) #o0004 tl)))))

(defrcom process-read-lbus-block ((nwds addr) (address addr))
  ;(format t "~%Process read lmem, addr = ~O." address)
  (loop with (tb byte) with (tl long)
        for (addr long) from address below (+ address nwds) by 2
        do (setq (address (aref lbus-map lbus-map-slot)) (word (lbus-address-page addr)))
           (write-pp-long (<-slong (aref (aref lbus-data lbus-map-slot)
                                         (lbus-address-offset addr))))
           (setq tb (byte (ecc+high (aref lbus-map lbus-map-slot))))
           (setq (address (aref lbus-map lbus-map-slot)) (word (lbus-address-page (1+ addr))))
           (setq tl (<-slong (aref (aref lbus-data lbus-map-slot)
                                   (lbus-address-offset (1+ addr)))))
           (write-pp-byte (dpb (byte tl) #o0404 tb))
           (setq tl (dpb (ecc+high (aref lbus-map lbus-map-slot)) #o0004 tl))
           (setq tl (rotr tl 4))
           (write-pp-long tl)))

;;; These two routines transfer blocks of fixnums between the LM2 and the lbus.
;;; They are used by the kludge Chaos kludge.
(defwcom process-write-fixnums ((nwds addr) (address addr))
  (let ((end (+ nwds address)))
    ;(format t "~%Nwds = ~o, Address = ~o, Check = ~o" nwds address *checksum*)
```

```
    (loop with (addr long) = address
          while (< addr end)
          for (wds-this-whack long) = (- (min end
                                              (1+ (logior addr lbus-address-offset-mask)))
                                         addr)
          for (page word) = (word (lbus-address-page addr))
          for (off long) = (lbus-address-offset addr)
          for (bbase long) = (+ (coerce long (make-pointer lbus-data-page-ptr
                                                            (aref lbus-data lbus-map-slot)))
                                (lsh off 2))
          do (setq (address (aref lbus-map lbus-map-slot)) page)
             (setq (ecc+high (aref lbus-map lbus-map-slot)) 1)  ;dtp-fixnum
             (loop for (i long) from bbase below (+ bbase (lsh wds-this-whack 2)) by 2
                   do (setf *(coerce word-ptr i) (read-pp-word)))
             (incf addr wds-this-whack))))

(defrcom process-read-fixnums ((nwds addr) (address addr))
  (let* ((end (+ nwds address)))
    (loop with (addr long) = address
          while (< addr end)
          for (wds-this-whack long) = (- (min end
                                              (1+ (logior addr lbus-address-offset-mask)))
                                         addr)
          for (page word) = (word (lbus-address-page addr))
          for (off long) = (lbus-address-offset addr)
          for (bbase long) = (+ (coerce long (make-pointer lbus-data-page-ptr
                                                            (aref lbus-data lbus-map-slot)))
                                (lsh off 2))
          do (setq  (address (aref lbus-map lbus-map-slot)) page)
             (loop for (i long) from bbase below (+ bbase (lsh wds-this-whack 2)) by 2
          do (write-pp-word *(coerce word-ptr i)))
                  (incf addr wds-this-whack))))
(defwcom process-write-lbus ((address long))
  (let (((val lbus-word)))
    (setf (data val) (read-pp-long))
    (setf (ecc+high val) (read-pp-byte))
    (write-lbus address val)))

(defrcom process-read-lbus ((address long))
  (let ((val (read-lbus address)))
    (write-pp-long (data val))
    (write-pp-byte (byte (ecc+high val)))))

(defwcom process-write-lbus-and-ecc ((address long))
  (let (((val lbus-word)))
    (setf (data val) (read-pp-long))
    (setf (ecc+high val) (read-pp-word))
    (write-lbus-and-ecc address val)))

(defrcom process-read-lbus-and-ecc ((address long))
  (let ((val (read-lbus-and-ecc address)))
    (write-pp-long (data val))
    (write-pp-word (ecc+high val))))
;(defwcom process-write-cmem-wd ()
;  (loop for (i word) below (array-length spy-cmem)
;       do (setf (aref spy-cmem i) (read-pp-byte))))

(defwcom process-write-cmem ((count word) (addr word))
  (disturb-uir)
  ;(spy-write16 spy-sq-ctl (build sq-ctl enable-sq 1 step 0))   ;preset step off.
  (loop with (uwd microinstruction)
        with (adr microinstruction) = (build microinstruction cpc naf)
        for (ua word) from addr below (+ addr count)
        do ;; This loop assumes that the parity bit is CLEAR on the incoming instruction
           (loop with (parity byte) = 0
                 for (i word) below (array-length uwd)
                 for (next byte) = (read-pp-byte)
                 do (setf (aref uwd i) next)
                    (setq parity (logxor parity next))
                 finally (setq parity (logxor parity (lsh parity -4))
                               parity (logxor parity (lsh parity -2))
```

```
                    parity (logxor parity (lsh parity -1)))
                (if (not (bit-test parity 1))
                    (alter microinstruction uwd parity 1)))
        (alter microinstruction adr naf ua)
        (setf spy-cmem adr)         ;address cmem
        (spy-write16 spy-sq-ctl (build sq-ctl enable-sq 1 step 1))  ;(step-machine '(uir))
        (setf spy-cmem uwd)
        (spy-write16 spy-sq-ctl (build sq-ctl enable-sq 1 step 0 cmem-write 1))
        (spy-write16 spy-sq-ctl (build sq-ctl enable-sq 1 step 0 cmem-write 0))))

(defwcom process-write-cmem-and-parity ((count word) (addr word))
  (loop with (uwd microinstruction)
        for (ua word) from addr below (+ addr count)
        do (loop for (i word) below (array-length uwd)
                 do (setf (aref uwd i) (read-pp-byte)))
           (write-cmem-and-parity ua uwd)))

(defrcom process-read-cmem ((count word) (addr word))
  (loop with (uwd microinstruction)
        for (ua word) from addr below (+ addr count)
        do (read-cmem ua uwd)
           (loop for (i word) below (array-length uwd)
                 do (write-pp-byte (aref uwd i)))))

(defwcom process-write-amem ((count word) (address word))
  (loop with (val lbus-word)
        for (addr word) from address below (+ address count)
        do (setf (data val) (read-pp-long))
           (setf (ecc+high val) (read-pp-byte))
           (write-amem addr val)))

(defrcom process-read-amem ((count word) (address word))
  (loop for (addr word) from address below (+ address count)
        for (val lbus-word) = (read-amem addr)
        do (write-pp-long (data val))
           (write-pp-byte (logand #o17 (ecc+high val)))))

(defrcom process-read-amem-and-parity ((count word) (address word))
  (loop for (addr word) from address below (+ address count)
        for (val lbus-word) = (read-amem-and-parity addr)
        do (write-pp-long (data val))
           (write-pp-byte (logand #o377 (ecc+high val)))))

(defwcom process-write-bmem ((count word) (address word))
  (loop with (val lbus-word)
        for (addr word) from address below (+ address count)
        do (setf (data val) (read-pp-long))
           (setf (ecc+high val) (read-pp-byte))
           (write-bmem addr val)))

(defrcom process-read-bmem ((count word) (address word))
  (loop for (addr word) from address below (+ address count)
for (val lbus-word) = (read-bmem addr)
        do (write-pp-long (data val))
           (write-pp-byte (logand #o17 (ecc+high val)))))

(defrcom process-read-bmem-and-parity ((count word) (address word))
  (loop for (addr word) from address below (+ address count)
        for (val lbus-word) = (read-bmem-and-parity addr)
        do (write-pp-long (data val))
           (write-pp-byte (logand #o377 (ecc+high val)))))

(defwcom process-write-type-map ((count word) (address word))
  (loop for (addr word) from address below (+ address count)
        do (write-type-map addr (read-pp-byte))))

(defwcom process-write-type-map-and-parity ((count word) (address word))
  (loop for (addr word) from address below (+ address count)
        do (write-type-map-and-parity addr (read-pp-byte))))
```

```
(defrcom process-read-type-map ((count word) (address word))
  (loop for (addr word) from address below (+ address count)
        do (write-pp-byte (byte (read-type-map addr)))))

(defwcom process-write-gc-map ((count word) (address word))
  (loop for (addr word) from address below (+ address count)
        do (write-gc-map addr (read-pp-byte))))

(defwcom process-write-gc-map-and-parity ((count word) (address word))
  (loop for (addr word) from address below (+ address count)
        do (write-gc-map-and-parity addr (read-pp-byte))))

(defrcom process-read-gc-map ((count word) (address word))
  (loop for (addr word) from address below (+ address count)
        do (write-pp-byte (byte (read-gc-map addr)))))

(defwcom process-write-byte-r () (write-byte-r (read-pp-byte)))
(defrcom process-read-byte-r () (write-pp-byte (byte (read-byte-r))))

(defwcom process-write-byte-s () (write-byte-s (read-pp-byte)))
(defrcom process-read-byte-s () (write-pp-byte (byte (read-byte-s))))

(defwcom process-write-stack-pointer () (write-stack-pointer (read-pp-long)))
(defrcom process-read-stack-pointer () (write-pp-long (read-stack-pointer)))

(defwcom process-write-frame-pointer () (write-frame-pointer (read-pp-long)))
(defrcom process-read-frame-pointer () (write-pp-long (read-frame-pointer)))

(defwcom process-write-xbas () (write-xbas (read-pp-long)))
(defrcom process-read-xbas () (write-pp-long (read-xbas)))
(defrcom process-read-uir ()
  (let ((val (if (and *read-state* *uir-saved*) *saved-uir* spy-cmem)))
    (loop for (i word) below (array-length spy-cmem)
          do (write-pp-byte (aref val i)))))

(defwcom process-write-uir ()
  (loop with (wd microinstruction)
        for (i word) below (array-length wd)
        do (setf (aref wd i) (read-pp-byte))
        finally (write-uir wd))
  (if *save-state* (setq *uir-saved* false)))

(defwcom process-write-cpc ()
  (let ((val (read-pp-long)))
    (write-cpc val)
    (if (and *save-state* *sequencer-saved*) (setq *saved-cpc* val))))

(defrcom process-read-cpc ()
  (write-pp-long (if (and *read-state* *sequencer-saved*) *saved-cpc* (read-cpc))))

(defwcom process-write-npc ()
  (let ((val (read-pp-long)))
    (write-npc val)
    (if (and *save-state* *sequencer-saved*) (setq *saved-npc* val))))

(defrcom process-read-npc ()
  (write-pp-long (if (and *read-state* *sequencer-saved*) *saved-npc* (read-npc))))

(defwcom process-write-csp ()
  (let ((val (read-pp-long)))
    (write-csp val)
    (if (and *save-state* *sequencer-saved*) (setq *saved-csp* val))))

(defrcom process-read-csp ()
  (write-pp-long (if (and *read-state* *sequencer-saved*) *saved-csp* (read-csp))))

(defrcom process-read-ctos ()
  (write-pp-long (if (and *read-state* *sequencer-saved*) *saved-ctos* (read-ctos))))

(defrcom process-read-opc ((loc word)) (write-pp-word (word (read-opc loc))))
```

```
(defrcom process-read-obus ()
  (let ((val (if (and *read-state* *uir-saved*) *saved-obus* (read-obus))))
    (write-pp-long (data val))
    (write-pp-byte (logand #o17 (ecc+high val)))))

(defwcom process-write-md ()
  (let (((val Ibus-word)))
    (setf (data val) (read-pp-long))
    (setf (ecc+high val) (read-pp-word))
    (write-md val))
  (if *save-state* (setq *io-md-saved* false)))

(defrcom process-read-md ()
  (let ((val (if (and *read-state* *io-md-saved*) *saved-io-md* (read-md))))
    (write-pp-long (data val))
    (write-pp-byte (logand #o17 (ecc+high val)))))

(defwcom process-write-pc () (write-pc (read-pp-long)))
(defrcom process-read-pc () (write-pp-long (read-pc)))

(defwcom process-write-vma ()
  (write-vma (read-pp-long))
  (if *save-state* (setq *vma-saved* false)))

(defrcom process-read-vma ()
  (write-pp-long (if (and *read-state* *vma-saved*) *saved-vma* (read-vma))))

(defrcom process-read-asn () (write-pp-long (read-asn)))
(defrcom process-read-crocks ((addr long)) (write-pp-long (read-crocks addr)))

(defrcom process-read-lbus-board-id ((board byte) (loc byte))
  (write-pp-byte (read-lbus-board-id board loc)))

(defrcom process-read-fep-board-id ((loc byte))
  (write-pp-byte (aref fep-board-id-prom loc)))

(defrcom process-read-fep-paddle-id ((loc byte))
  (write-pp-byte (aref fep-paddle-id-prom loc)))

(defwcom process-write-cstk ((addr word)) (write-cstk addr (read-pp-word)))
(defwcom process-write-cstk-and-parity ((addr word))
  (write-cstk-and-parity addr (read-pp-word)))

(defrcom process-read-cstk ((addr word)) (write-pp-long (read-cstk-and-parity addr)))
(defwcom process-step-machine ((ntimes word)) (single-step-machine ntimes))
(defwcom process-start-machine () (start-machine))
(defwcom process-stop-machine () (stop-machine))
(defwcom process-restore-state () (restore-state))
(defwcom process-discard-state () (discard-state))
(defwcom process-write-cur-task () (write-task (read-pp-word)))
(defrcom process-read-cur-task () (write-pp-word (word (read-task))))

(defwcom process-reset-lbus () (reset-lbus))
(defwcom process-reset-3600 () (reset-3600))
(deflilmacro make-communication-var-tables ()

  (loop for (var type) in *console-communication-variables*
        collect `(type-size ,type) into sizes
        collect `(function ,var) into pointers
        finally (return `(progn 'compile
                           (defvar comm-var-sizes *byte-array (constant *byte-array ,@sizes))
                           (defvar comm-var-address *address-array
                             (constant *address-array ,@pointers))))))

(make-communication-var-tables)

(defwcom process-write-comm-var ((var word) (val long))
  (let ((addr (aref comm-var-address var)))
  (select (aref comm-var-sizes var)
    (1 (setf @(coerce byte-ptr addr) (byte val)))
    (2 (setf @(coerce word-ptr addr) (word val)))
```

```
   (otherwise (setf @(coerce long-ptr addr) val)))))

(defrcom process-read-comm-var ((var word))
  (let* ((addr (aref comm-var-address var))
         (val (select (aref comm-var-sizes var)
                (1 (long @(coerce byte-ptr addr)))
                (2 (long @(coerce word-ptr addr)))
                (otherwise @(coerce long-ptr addr)))))
    ;(format t "~%Read var ~O at ~O." var (long addr))
    (write-pp-long val)))
;;; Support for the Kludge
(define-sysdfl-atommacros
  (fep-communication-area
    kludge-input-character           ;NIL or character that has been typed
    kludge-output-character          ;NIL or character to be typed out
    kludge-mini-buffer-number        ;Next buffer to be filled (1 or 2)
    kludge-mini-buffer-full))        ;NIL if empty, else number of valid elements

(defatommacro *kludge-op-draw-char*                  '0_24.)
(defatommacro *kludge-op-set-cursorpos*              '1_24.)
(defatommacro *kludge-op-clear-eol*                  '2_24.)
(defatommacro *kludge-op-clear-eof*                  '3_24.)
(defatommacro *kludge-op-display-losenged-string*    '4_24.)
(defatommacro *kludge-op-losenged-char*              '5_24.)
(defatommacro *kludge-op-open-ascii-file*            '6_24.)
(defatommacro *kludge-op-open-binary-file*           '7_24.)
(defatommacro *kludge-op-filename-char*              '10_24.)
(defatommacro *kludge-op-open-probe*                 '11_24.)
(defatommacro *kludge-op-beep*                       '12_24.)
(defatommacro *kludge-op-input-char*                 '200_24.)
(defatommacro *kludge-op-set-size*                   '201_24.)
(defatommacro *kludge-op-binary-input-char*          '202_24.)
(defatommacro *kludge-op-file-open-success*          '203_24.)
(defatommacro *kludge-op-file-open-failure*          '204_24.)
(defatommacro *kludge-op-file-eof*                   '205_24.)

(defrcom process-kludge-status ()
  (write-pp-byte (if (machine-stopped-p) 1 0))
  (write-pp-byte (if (lisp-null (read-lbus kludge-output-character)) 0 1))
  (write-pp-word (if (lisp-null (read-lbus kludge-input-character)) 1 0))
  (write-pp-word (if (lisp-null (read-lbus kludge-mini-buffer-full)) 400 0)))

(defwcom process-send-kludge-mini-bytes ((nbytes word))
  (let (((addr long) (if (= (read-lbus-long kludge-mini-buffer-number) 1) 1000 1400)))
    (loop for (i long) from addr below (+ addr nbytes)
          for (char long) = (logand 377 (word (read-pp-byte)))
          do (write-lbus-long i (logior *kludge-op-input-char* char)))
    (write-lbus-long kludge-mini-buffer-full nbytes)))

(defwcom process-send-kludge-mini-words ((nwords word))
  (let (((addr long) (if (= (read-lbus-long kludge-mini-buffer-number) 1) 1000 1400)))
    (loop for (i long) from addr below (+ addr nwords)
          for (word long) = (logand 177777 (long (read-pp-word)))
          do (write-lbus-long i (logior *kludge-op-binary-input-char* word)))
    (write-lbus-long kludge-mini-buffer-full nwords)))

(defwcom process-send-kludge-mini-longs ((nlongs word))
  (let (((addr long) (if (= (read-lbus-long kludge-mini-buffer-number) 1) 1000 1400)))
    (loop for (i long) from addr below (+ addr nlongs)
          for (long long) = (read-pp-long)
          do (write-lbus-long i long))
    (write-lbus-long kludge-mini-buffer-full nlongs)))

(defwcom process-send-kludge-char ((nchars word))
  (loop repeat nchars
        for (char long) = (read-pp-long)
        do (loop until (lisp-null (read-lbus kludge-input-character)))
           (write-lbus-long kludge-input-character char)))

;; This should be hacked to batch stuff across
;(defrcom process-kludge-receive-chars ()
```

```
;  (let (((nchars word) (if (lisp-null (read-lbus kludge-output-character)) 0 1)))
;    (write-pp-word nchars)
;    (loop repeat nchars
;          do (write-pp-long (read-lbus-long kludge-output-character))
;             (write-lbus kludge-output-character
;                         (constant lbus-word ecc+high 0 data 2000740000))))) ;hard coded NIL

(defvar kludge-buffer (array long 100))
(defconst quote-nil lbus-word (constant lbus-word ecc+high 0 data 2001140000))
;; This should be hacked to batch stuff across
(defrcom process-kludge-receive-chars ()
  (loop for (index word) below 100
        for (wd lbus-word) = (read-lbus kludge-output-character)
        until (lisp-null wd)
        do (setf (aref kludge-buffer index) (data wd))
           (write-lbus kludge-output-character quote-nil)
           (loop repeat 100.)                 ;Pause to refresh.
        finally (write-pp-word index)
                (loop for (i word) below index
                      do (write-pp-long (aref kludge-buffer i)))))
```

F:>LMach>Fep>fontgen.lisp.1

```
;;; -*- Base: 8; Mode: LISP; Package: Lil; Base: 8; Lowercase: T -*-

;(deftype font (structure ()
;                (char-height word)
;                (char-width word)
;                (raster-height word)
;                (raster-width word)
;                (baseline word)
;                (bytes (array byte 0))
;
;(defglobal name font)

(defun output-font-to-linker (font &optional (psect "CODE"))
  (let* ((name (string (font-name font)))
         (rwidth (font-raster-width font))
         (rheight (font-raster-height font))
         (rasters-per-word (font-rasters-per-word font))
         (words-per-char (font-words-per-char font))
         (bytes-per-raster (// (+ rwidth 7) 8))
         (bytes-per-char (* bytes-per-raster rheight)))

    (send llink:*linker* ':module-declare name psect)
    (send llink:*linker* ':symbol-declare name 0 name)
    (send llink:*linker* ':set-origin name)
    (send llink:*linker* ':emit-word (font-char-height font) ':none)
    (send llink:*linker* ':emit-word (font-char-width font) ':none)
    (send llink:*linker* ':emit-word (font-raster-height font) ':none)
    (send llink:*linker* ':emit-word (font-raster-width font) ':none)
    (send llink:*linker* ':emit-word (font-baseline font) ':none)

    (loop for char below 200
          for c-off upfrom 0 by (* words-per-char 32.)
          do (loop repeat words-per-char
                   with bytes-left = bytes-per-char
                   for w-off upfrom 0 by 32.
                   do (loop repeat rasters-per-word
                            for r-off upfrom 0 by rwidth
                            for raster = (loop repeat rwidth
                                               for i upfrom (+ r-off w-off c-off)
                                               for shc upfrom 0
                                               sum (ash (aref font i) shc))
                            do (loop repeat (min bytes-per-raster bytes-left)
                                     for ppss upfrom #o0010 by #o1000
                                     for byte = (ldb ppss raster)
                                     do (send llink:*linker*
                                              ':emit-byte byte *bdlc*)
                                        (decf bytes-left))))))
```

```
;(deftype sync-program (structure ()
;                       (words-per-line word)
;                       (video-field-lines word)
;                       (n-words word)
;                       (sync (array word n-words))))
;
;(defglobal name sync-program)

(defun output-sync-program-to-linker (prog &optional (psect "CODE"))
  (let* ((name (send prog ':name))
         (arry (send prog ':make-program)))

    (send llink:*linker* ':module-declare name psect)
    (send llink:*linker* ':symbol-declare name 0 name)
    (send llink:*linker* ':set-origin name)
    (send llink:*linker* ':emit-word (send prog ':words-per-line) ':none)
    (send llink:*linker* ':emit-word (send prog ':video-field-lines) ':none)
    (send llink:*linker* ':emit-word (array-active-length arry) ':none)
    (loop for wd being the array-elements of arry
          do (send llink:*linker* ':emit-word wd ':none))))
```

F:>LMach>Fep>Display.lil.14

```
;;; -*- Mode: LIL; Base: 8;  Package: LIL; Lowercase: T -*-

(include "Types-and-macros")

(deftype window-stream-type (structure (include stream-type)
                              (window window)))

(deftype window-stream (pointer window-stream-type auto-dereference t))

(defglobal philips-display sync-program external t)
(defglobal bigfnt font external t)
(defglobal cptfont font external t)
(defglobal tvfont font external t)
(defvar *font* font-ptr)

(defvar *display-words-per-line* word)
(defvar *display-width* word)
(defvar *display-height* word)
(defvar *display-data-start* long)

(defvar *standard-output-stream* stream)
;(defvar *standard-output-window* window)
(defvar *whole-screen-window* window)

(deflilmacro write-display (off wd)
  `(write-iob-reg (+ (long ,off) *display-memory-offset*) ,wd))
(deflilmacro read-display (off)
  `(read-iob-reg (+ (long ,off) *display-memory-offset*)))

(deflilmacro write-sync (off wd)
  `(write-iob-reg (+ (long ,off) *sync-memory-offset*) ,wd))
(deflilmacro read-sync (off)
  `(read-iob-reg (+ (long ,off) *sync-memory-offset*)))
(defun init-display ()
  (setq *font* (make-pointer font-ptr cptfont))
  (display-setup-monitor philips-display)
  (set-fields *whole-screen-window*
              cursor-x 0 cursor-y 0
              x-offset 0 y-offset 0
              height *display-height* width *display-width*
              vsp 1)
  (setq *standard-output-stream* (allocate-stream (type-size window-stream-type)))
  (set-fields *standard-output-stream*
              x-pos 0 y-pos 0
              for-tyo #'window-stream-tyo
              for-terpri-or-fresh-line #'window-stream-terpri-or-fresh-line
              )
```

```
  (set-fields (window (coerce window-stream *standard-output-stream*))
              cursor-x 0 cursor-y 0
              x-offset 0 y-offset (// *display-height* 2)
              width *display-width* height (// *display-height* 2)
              vsp 1)
  (display-clear-window  *whole-screen-window*)
  (setq standard-output *standard-output-stream*)
  (format t "~&Fep's up! ")
  )

(defun display-setup-monitor ((program sync-program))
  ;(find-io-board-base)
  (stop-display)
  (setq *display-words-per-line* (words-per-line program) )
  (setq *display-width* (ashl *display-words-per-line* 5))
  (setq *display-height* (video-field-lines program))
  (setq *display-data-start* (+ *display-data-offset* *display-memory-offset*
                               *iob-board-base*))
  (display-load-sync-program program)
  (start-display)
  (display-load-line-pointers program))

(defun display-load-line-pointers ((program sync-program))
  (let ((words-per-line (words-per-line program))
        (lines (video-field-lines program)))
    (loop for (line-ptr word) below (lshl lines 1)
          do (write-display line-ptr 0))
    (loop for (line-ptr word) below (lshl lines 1) by 2
          for (line-address long) from *display-data-offset* by words-per-line
          do (write-display line-ptr (ashr line-address 1)))))  ;I don't understand this

(defun display-load-sync-program ((program sync-program))
  (loop for (i word) below (n-words program)
        do (write-sync i (aref (sync program) i))))

;(defun main () ;really display-test
;  (declare (require asm-hack))
;  (display-setup-monitor philips-display)
;  (display-home-up bigfnt)
;  (loop for (off word) upfrom 0
;       do (loop for (i word) from #/a to #/z
;                do (draw-character i bigfnt)
;                   (draw-character i cptfont)
;                   (draw-character i tvfont))
;          (display-newline bigfnt)))
;;; Higher level display hacking
(defun start-display ()
  (write-iob-reg *vd-status-offset* (build vd-status vseq-enable 1 vseq-run 1)))

(defun stop-display ()
  (write-iob-reg *vd-status-offset*
                 (change vd-status (read-iob-reg *vd-status-offset*)
                         vseq-enable 0 vseq-run 0)))
(defun draw-character ((char word) (font font) (how tv-fcn) (window window))
  (let* ((r-width (raster-width font))
         (baseline (baseline font))
         (bytes-per-raster (// (+ r-width 7) 8))
         (bytes-per-char (* bytes-per-raster (raster-height font)))
         ;; Pre-calculate the indexes into the font's byte array
         (char-start (* bytes-per-char char))
         (char-end (+ char-start bytes-per-char)))

    (setq (cursor-y window) (max (cursor-y window) baseline))

    (if (≥ (+ (char-width font) (cursor-x window)) (width window))
        (display-newline window font))

    ;; We go through this loop once for each raster line.
    (loop with (x word) = (+ (x-offset window) (cursor-x window))
          for (offset word) from char-start below char-end by bytes-per-raster
          for (y word) upfrom (+ (y-offset window) (- (cursor-y window) baseline))
```

```
            for (raster long) = 0
            do ;; Through this loop once for each byte in a raster line.
               (loop for (shc byte) below (byte r-width) by 8
                     for (i word) upfrom offset
                     do (setq raster
                              (logior raster
                                      (lshl (long (ldb #o0010 (word (aref (bytes font) i))))
                                            shc))))
               ;; Through this loop once for each 32 bit word read from the LBUS.
               (loop for (bits-left byte) = (byte r-width) then (- bits-left s)
                     until (zerop bits-left)
                     for (word long) upfrom (+ (* y *display-words-per-line*)
                                               *display-data-start*
                                               (lsh x -5.))
                     for (i long) = (lbus-address-offset word)    ;pointer into lbus map
                     for (p byte) = (ldb #o0005 (byte x)) then 0
                     for (s byte) = (min (- 32. p) bits-left)
                     for (mask long) = (ashl (1- (ashl 1 s)) p)
                     do (setf (address (aref lbus-map lbus-map-slot))
                              (word (lbus-address-page word)))
                        (setf (aref (aref lbus-data lbus-map-slot) i)
                              (->slong (logior (logand mask (ashl raster p))
                                               (logand (lognot mask)
                                                       (<-slong
                                                         (aref (aref lbus-data lbus-map-slot)
                                                               i))))))
                        ;; Account for the bits just output
                        (setq raster (lshr raster s))))
    (incf (cursor-x window) (char-width font))))

(defun display-newline ((window window) (font font))
  (setq (cursor-x window) 0)
  (incf (cursor-y window) (+ (char-height font) (vsp window)))
  (if (≥ (+ (- (char-height font) (baseline font)) (cursor-y window)) (height window))
      (display-home-up window font))
  (display-clear-line window font))

(defun display-home-up ((window window) (font font))
  (setq (cursor-x window) 0)
  (setq (cursor-y window) (baseline font)))

(defun display-clear-line ((window window) (font font))
  (setq (cursor-y window) (max (cursor-y window) (baseline font)))
  (loop repeat (+ (char-height font) (vsp window))
        for (y word) upfrom (- (cursor-y window) (baseline font))
        do (display-draw-line 0 y (width window) y alu-setz window)))

(defun display-clear-window ((window window))
  (loop for (y word) below (height window)
        do (display-draw-line 0 y (width window) y alu-setz window)))
(defun display-draw-line ((x word) (y word) (to-x word) (to-y word)
                          (how tv-fcn) (window window))
  (if (= y to-y)
      (display-draw-horizontal-line x to-x y how window)
    ;;Someday
    ))

(defun display-draw-horizontal-line ((x word) (to-x word) (y word)
                                     (how tv-fcn) (window window))

  (setq x (+ (max x 0) (x-offset window)))
  (setq to-x (+ (min to-x (width window)) (x-offset window)))
  (setq y (+ (max 0 (min (height window) y)) (y-offset window)))

  ;; First draw the portion in the first word
  (loop until (≥ x to-x)
        for (start word) = (ldb #o0005 x)
        for (end word) = (min 32. (- to-x x))
        for (nbits word) = (- end start)
        for (mask long) = (ashl (1- (ashl (long 1) nbits)) start)
        for (address long)  upfrom (+ (lsh x -5)
```

```
                              (long (* y *display-words-per-line*))
                              *display-data-start*)
      for (data long) = (read-lbus-long address)
      do (select how
           (alu-setz (setq data (logand (lognot mask) data)))
           (alu-xor (setq data (logxor mask data)))
           (alu-seta (setq data (logior mask data))))
         (write-lbus-long address data)
         (incf x nbits)))
;;; Stream interface to the display (output side).
(defun window-stream-tyo ((stream stream) (char byte))
  (draw-character char **font* alu-xor (window (coerce window-stream stream))))

(defun window-stream-terpri-or-fresh-line ((stream stream) (terpri boole))
  (let ((ws (coerce window-stream stream)))
    (if (or (not (zerop (cursor-x (window ws)))) terpri)
        (display-newline (window ws) **font*))))
```

F:>lmach>fep>Keyboard.lil.16

```
;;;-*- Mode: Lil; Package:Lil; Base:8.; Lowercase: T -*-

;;; My first LIL program, so don't laugh too hard...--HIC

(include "Types-and-macros")

(deflilmacro define-mpsc-constants (&rest regs)
  (let ((package (pkg-find-package #.(pkg-name package))))
    `(progn
       ,@(loop for (reg adr . data) in regs
               append (loop for (sym val) in data
                            collect `(defatommacro ,(fintern "~A--~A" reg sym) ',val))
               into code
               do (push `(defatommacro ,(fintern "~A-REG" reg) ',adr) code)
               finally (return code)))))

(define-mpsc-constants
  ;; Write registers
  (mpsc-ctl 0
   (reset-ext-status-ints 20)
   (channel-reset 30)
   (error-reset 60)
   (end-of-int 70))
  (mpsc-int 1
   (wait-enable 200)
   (wait-on-rx 40)
   (rxint-on-1st-or-spec 10) (rxint-on-all-or-spec-diff-vec 20)
                             (rxint-on-all-or-spec-same-vec 30)
   (status-affects-vec 4)       ;Channel B only
   (txint-dma-enb 2)
   (ext-int-enb 1))
  (mpsc-sys-config 2            ;Channel A only
   (syndet-not-rts-b 200)
   (vectored 40)
   (priority 4)
   (a-dma-b-int 1) (both-dma 2))
  (mpsc-vector 2)               ;Channel B only
  (mpsc-rcv 3
   (5-bits 0) (7-bits 100) (6-bits 200) (8-bits 300)
   (auto-enb 40)
   (hunt 20)
   (crc-enb 10)
   (addr-srch 4)
   (sync-load-inh 2)
   (enb 1))
  (mpsc-mode 4
   (x1-clock 0) (x16-clock 100) (x32-clock 200) (x64-clock 300)
   (8-bit-sync 0)
   (16-bit-sync 20) (hdlc-sdlc-flag 40) (ext-sync 60)
   (enb-sync 0)
```

```
 (1-stop-bit 4) (1.5-stop-bits 10) (2-stop-bits 14)
 (even-par 2)
 (par-enb 1))
(mpsc-xmt 5
 (dtr 200)
 (5-bits-or-less 0)
 (7-bits 40)
 (6-bits 100)
 (8-bits 140)
 (send-break 20)
 (enb 10)
 (crc-mode 4)
 (rts 2)
 (crc-enb 1))
(mpsc-sync-or-adr 6)
(mpsc-sync-or-flag 7)

;; Read registers
(mpsc-status 0
 (break-abort 200)
 (tx-underrun 100)
 (cts 40)
 (sync-hunt 20)
 (carrier-detect 10)
 (tx-empty 4)
 (int-pending 2)            ;Channel A only
 (char-avail 1))
(mpsc-rcv-cond 1
 (end-of-frame 200)
 (crc-framing-error 100)
 (rx-overrun-error 40)
 (parity-error 20))
)
(deflilmacro mpsc-write-reg (mpsc reg val)
  `(progn
     (setf (control ,mpsc) ,reg)
     (setf (control ,mpsc) ,val)))

(deflilmacro mpsc-read-reg (mpsc reg)
  `(progn
     (setf (control ,mpsc) ,reg)
     (control ,mpsc)))

(defmacro read-16-bit-dma-reg (reg)
  `(let ((low (logand 377 (word ,reg)))
         (high (logand 377 (word ,reg))))
     (logand low (lsh high 8))))

(defmacro write-16-bit-dma-reg (reg val)
  `(progn (setf ,reg (byte ,val))
          (setf ,reg (byte (lsh ,val -8)))))
(defatommacro kbd-dma-channel '0)
(defatommacro kbd-buffer-size 300)
(deftype kbd-buffer (pointer kbd-buffer-array))
(deftype kbd-buffer-array (array byte kbd-buffer-size))

(defvar kbd-buffer-array-0 kbd-buffer-array)
(defvar kbd-buffer-array-1 kbd-buffer-array)

;;; These pointers get swapped when we switch buffers.
(defvar current-kbd-buffer-for-filling kbd-buffer)
(defvar current-kbd-buffer-for-emptying kbd-buffer)
(defvar current-kbd-buffer-putter word)
(defvar current-kbd-buffer-taker word)
(defun init-keyboard ()
  (init-mpscs)
  (setf (read-temp^master-clear spy-dma-controller) 0)         ;master clear DMA controller
  (setf (status^command spy-dma-controller) (build fep-dma-command selection "Extended"
                                                         dreq "Active high"
                                                         dack "Active low"))  ;240
```

```
;;Initialize the database for KBD dma
(setq fep-serial-dma-and-clock-ctl (build fep-ser-dma-control a-dma "rcv a"))
(setq current-kbd-buffer-for-emptying (make-pointer kbd-buffer kbd-buffer-array-0))
(setq current-kbd-buffer-for-filling (make-pointer kbd-buffer kbd-buffer-array-1))
(maybe-swap-kbd-buffers true)                      ;startup dma
(setq current-kbd-buffer-putter 0)                 ;init the pointers
(setq current-kbd-buffer-taker 0))                 ; so we don't send a garbage buffer

(defun init-mpscs ()
  (mpsc-init-mpsc mpsc-0-a)
  (mpsc-init-mpsc mpsc-1-a)
  (mpsc-init-chan-async mpsc-0-a))

(defun mpsc-init-mpsc ((mpsc-chan-a mpsc mode ref))
  (mpsc-write-reg mpsc-chan-a mpsc-ctl-reg 30)          ;Reset channel A
  (mpsc-write-reg mpsc-chan-a mpsc-sys-config-reg mpsc-sys-config-a-dma-b-int))

(defun mpsc-init-chan-async ((mpsc mpsc mode ref))
  (mpsc-write-reg mpsc mpsc-ctl-reg 30)                 ;Channel reset
  (mpsc-write-reg mpsc mpsc-mode-reg (logior mpsc-mode-x1-clock mpsc-mode-1-stop-bit))
  (mpsc-write-reg mpsc mpsc-rcv-reg (logior mpsc-rcv-8-bits mpsc-rcv-enb))
  (mpsc-write-reg mpsc mpsc-xmt-reg
                  (logior mpsc-xmt-dtr mpsc-xmt-8-bits mpsc-xmt-enb mpsc-xmt-rts)))


;(defun mpsc-echo ((mpsc mpsc mode ref))
;  (do () (false)
;    (loop until (bit-test mpsc-status-char-avail (control mpsc))
;    (let ((char (data mpsc)))
;      (format t "~%Char = ~O" char))))
;
;(deftype p-byte (pointer byte))
;
;(defun mpsc-echo ((mpsc mpsc mode ref))
;  (let ((ptr (make-pointer p-byte (control mpsc))))
;    (do () (false)
;      (loop until (bit-test mpsc-status-char-avail @ptr))
;      (let ((char (data mpsc)))
;       (format t "~%Char = ~O" char)))))

(define-sysdf1-atommacros
  (system-communication-area
    mouse-x
    mouse-y
    mouse-buttons
    mouse-wakeup
    kbd-buffer-start
    kbd-buffer-end
    kbd-buffer-in-ptr
    kbd-buffer-out-ptr))

(define-sysconstant %%q-pointer)

(defatommacro 3600-fixnum 1)

(defatommacro key-type-bp 0403)

(defatommacro type-mouse-switch 0)
(defatommacro type-mouse-move 1)
(defatommacro type-all-keys-up 2)
(defatommacro type-boot 3)
(defatommacro type-key-down 4)
(defatommacro type-key-up 5)
(defun alter-3600-syscom ((addr long) (delta long))
  ;(format t "~&Alter syscom @~O, δ~O" addr delta)
  (let* ((wd (read-lbus addr))
         (val (data wd)))
    (setf val (dpb (+ val delta) %%q-pointer val))
    (setf (data wd) val)
    (write-lbus addr wd)))
```

```
(defun key-to-3600 ((key long))
  (let* ((in-ptr (read-lbus kbd-buffer-in-ptr))
         (in-ptr-pointer-old (ldb 0034 (data in-ptr)))
         (in-ptr-pointer (1+ in-ptr-pointer-old))
         (out-ptr (read-lbus kbd-buffer-out-ptr))
         (out-ptr-pointer (ldb 0034 (data out-ptr)))
         (start (read-lbus kbd-buffer-start))
         (start-pointer (ldb 0034 (data start)))
         (end (read-lbus kbd-buffer-end))
         (end-pointer (ldb 0034 (data end))))
    (if (> in-ptr-pointer end-pointer) (setq in-ptr-pointer start-pointer))
    ;(format t "~&Key to 3600 = ~O at ~O" key in-ptr-pointer)
    (if (= in-ptr-pointer out-ptr-pointer) (format t "~& No room in buffer"))
    ;; Should process wait here...
    (when (≠ in-ptr-pointer out-ptr-pointer)
      ;; Room in buffer, first store the character
      (write-lbus-long in-ptr-pointer-old key)
      ;; Now increment the in pointer to point to the next free location
      (setf (data in-ptr) (long (dpb in-ptr-pointer 0034 (data in-ptr))))
      (write-lbus kbd-buffer-in-ptr in-ptr))))

;;; This is called from the idle loops of the loader program
(defun Kbd-process-top-level () (run-keyboard mpsc-0-a))

;;; Code to run keyboard for 3600
(defun run-keyboard ((mpsc mpsc mode ref))
  (prog (((char byte)))
     wait-for-next-command
        (setq char (get-kbd-char))
     next-command
        (cond ((< char 0)
               ;; A command byte, process it
               (select (ldb 0403 char)          ;key-type-bp
                 ((type-all-keys-up type-key-down type-key-up)
                  ;; All of these read one more byte, then send data to L machine
                  (let ((next-char (get-kbd-char)))
                    ;(format t ", ~O" (logand 377 (word next-char)))
                    (if (≥ next-char 0)
                        (key-to-3600 (logior (lshl (logand 377 (long char)) 8)
                                             (logand 377 (long next-char))))
                      (setq char next-char)
                      (go next-command))))
                 (type-mouse-move
                  (let ((x-motion (ldb 0202 char))
                        (y-motion (ldb 0002 char)))
                    (cond ((= x-motion 1)
                           (alter-3600-syscom mouse-x 1))
                          ((= x-motion 2)
                           (alter-3600-syscom mouse-x -1)))
                    (cond ((= y-motion 1)
                           (alter-3600-syscom mouse-y 1))
                          ((= y-motion 2)
                           (alter-3600-syscom mouse-y -1))))
                  (write-lbus-long mouse-wakeup 0))
                 (type-mouse-switch
                  ;; Mouse buttons -- tell 3600
                  (let ((left-p (bit-test char 4))
                        (middle-p (bit-test char 2))
                        (right-p (bit-test char 1)))
                  (write-lbus-long mouse-buttons
                                   (logior (if left-p 1 0)
                                           (if middle-p 2 0)
                                           (if right-p 4 0)))
                  (write-lbus-long mouse-wakeup 0)))
                 (type-boot
                  (funcall (aref memory-as-longs 1))))))
        (go wait-for-next-command)))

;(defun (get-char-from-mpsc byte) ((mpsc mpsc mode ref))
;  (loop with (char byte)
```

```
;        until (Console-char-available-p (make-pointer mpsc-ptr mpsc))
;        do (process-wait "Character from console"
;                         #'Console-char-available-p (make-pointer mpsc-ptr mpsc))
;        finally (setq char (data mpsc))
;                ;(format t "~&Char = ~O" (logand 377 (word char)))
;                (return char)))

;(defun (Console-char-available-p boole) ((mpsc mpsc-ptr))
;  (bit-test mpsc-status-char-avail (control @mpsc)))
(defun (maybe-swap-kbd-buffers boole) ((swap-even-if-empty boole))
  ;;set the mask bit to stop chan, and clear flop
  (setf (write-single-mask spy-dma-controller) (+ 4 kbd-dma-channel))
  (setf (clear-flip-flop spy-dma-controller) 0)
  (let (((current-count word) (read-16-bit-dma-reg (kbd-count spy-dma-controller))))
    (when (or (≠ current-count kbd-buffer-size)
              swap-even-if-empty)
      ;;switch buffers
      (swapf current-kbd-buffer-for-filling current-kbd-buffer-for-emptying)
      (setq current-kbd-buffer-putter (- kbd-buffer-size current-count))
      (setq current-kbd-buffer-taker 0)
      ;; Now start dma on the next
      (let (((addr long) (coerce long current-kbd-buffer-for-filling)))

        ;; Now write the addresses. Fep handles high address bits itself.
        (write-16-bit-dma-reg (kbd-address spy-dma-controller) addr)
        (setf (aref spy-dma-high-addrs kbd-dma-channel) (byte (lsh addr -16.)))

        ;; Now write the byte count, and mode = 104
        (write-16-bit-dma-reg (kbd-count spy-dma-controller) kbd-buffer-size)
        (setf (write-mode spy-dma-controller)
              (build fep-dma-mode channel kbd-dma-channel direction "Write" mode "Single"))
        ;;clear errors, no interrupt enables.
        (setq fep-dma-control 0)))
    ;; Re-enable the channel
    (setf (write-single-mask spy-dma-controller) kbd-dma-channel))
  ;; Return buffer non-emptyness
  (≠ current-kbd-buffer-putter current-kbd-buffer-taker))

(defun (kbd-char-available boole) ()
  (or (≠ current-kbd-buffer-putter current-kbd-buffer-taker)
      (maybe-swap-kbd-buffers false)))

;;; Gets 1 char.  Process waits if none available.
(defun (get-kbd-char byte) ()
  (loop until (kbd-char-available)
        do (process-wait "Kbd in" #'kbd-char-available)
        finally (return (prog1 (aref @current-kbd-buffer-for-emptying
                                     current-kbd-buffer-taker)
                               (incf current-kbd-buffer-taker)))))
;;;-*- Mode:LISP; Package:USER; Base:10.; Lowercase:Yes -*-



;;; Macros to access the various parts of the instruction definitions
(defstruct (insn (:type :named-array)
                 :conc-name)
  :const
  :mask
  :b-pat
  :t-pat)

(defconst *binary-pattern-list*
 '(;pattern    name         size
   ("*"       alterant      1)
   ("ea"      ea            6)
   ("dst-ea"  dest-ea       6)
   ("rx"      regx          3)
   ("ry"      regy          3)
   ("cc"      condition     4)
   ("dir"     direction     1)
   ("size"    size-bwl      2)
   ("move-sz" move-sz       2)
   ("sz-wl"   size-wl       1)
   ("qdat"    q-data        3)
   ("byte"    byte          8)
```

```
  ("nib"      nibble          4)
  ("bitop"    bitop           2)                 ;one of 0=tst, 1=chg, 2=clr, 3=set
 ))

(defconst *text-pattern-list*
 '(;pattern           name
   ("Dx"              dreg-x)
   ("Dy"              dreg-y)
   ("Ax"              areg-x)
   ("Ay"              areg-y)
   ("-(Ax)"           auto-decr-x)
   ("-(Ay)"           auto-decr-y)
   ("(Ax)+"           auto-incr-x)
   ("(Ay)+"           auto-incr-y)
   ("d(Ay)"           indexed-displacement)
   ("idata"           immediate-data)
   ("iword"           immediate-word)
   ("qdata"           quick-data)
   ("baddr"           branch-address)
   ("idisp"           immediate-disp)
   ("dst-ea"          destination-ea)            ;move instructions
   ("ccr"             cc-register)
   ("sr"              status-register)
   ("usp"             user-stack-pointer)
   ("qbyte"           moveq-byte)
   ("vector"          vector)
   ("ea"              ea)
   ("eal"             ea-word)))

(defconst *instruction-patterns*
          '(("1100 rx 10000 * ry"          "abcd Dy,Dx" "abcd -(Ay),-(Ax)")
            ("1101 rx dir size ea"         "add ea,Dx")
            ("1101 rx sz-wl 11 ea"         "adda ea,Ax")
            ("0000 0110 size ea"           "addi idata,ea")
            ("0101 qdat 0 size ea"         "addq qdata,ea")
; adda?     ("1101 rx 1 size 00 * ry"      "addx Dy,Dx" "addx -(Ay),-(Ax)")
            ("1100 rx dir size ea"         "and ea,Dx")
            ("0000 0010 size ea"           "andi idata,ea")
            ("1110 qdat * size 0 00 ry"    "asr qdata,Dy" "asl qdata,Dy")
            ("1110 rx * size 1 00 ry"      "asr Dx,Dy" "asl Dx,Dy")
            ("0110 cc byte"                "b baddr")
            ("0000 rx 1 bitop ea"          "b Dx,eal")
            ("0000 1000 bitop ea"          "b iword,eal")
            ("0110 0000 byte"              "bra baddr")
            ("0110 0001 byte"              "bsr baddr")
            ("0100 rx 110 ea"              "chk eal,Dx")
            ("0100 0010 size ea"           "clr ea")
            ("1011 rx 0 size ea"           "cmp ea,Dx")
            ("1011 rx sz-wl 11 ea"         "cmpa ea,Ax")
            ("0000 1100 size ea"           "cmpi idata,ea")
            ("1011 rx 1 size 001 ry"       "cmpm (Ay)+,(Ax)+")
            ("0101 cc 11001 rx"            "db Dx,iword")     ;Disp is immediate 16 bits
            ("1000 rx * 11 ea"             "divu eal,Dx" "divs eal,Dx")
            ("1011 rx 1 size ea"           "xor Dx,ea")
            ("0000 1010 size ea"           "xori idata,ea")
            ("1100 rx 1 0100 * ry"         "exch Dx,Dy" "exch Ax,Ay")
            ("1100 rx 1 10001 ry"          "exch Dx,Ay")
            ("0100 100 01 sz-wl 000 rx"    "ext Dx")
            ("0100 1110 11 ea"             "jmp eal")
            ("0100 1110 10 ea"             "jsr eal")
            ("0100 rx 111 ea"              "lea eal,Ax")
            ("0100 1110 0101 0 rx"         "link Ax,iword")
            ("1110 qdat * size 0 01 ry"    "lsr qdata,Dy" "lsl qdata,Dy")
            ("1110 rx * size 1 01 ry"      "lsr Dx,Dy" "lsl Dx,Dy")
            ("00 move-sz dst-ea ea"        "move ea,dst-ea")
            ("0100 0100 11 ea"             "move eal,ccr")
            ("0100 0110 11 ea"             "move eal,sr")
            ("0100 0000 11 ea"             "move sr,eal")
            ("0100 1110 0110 dir rx"       "move Ax,usp")
;           ("001 sz-wl rx 001 ea"         "movea ea,Ax")
            ("0100 1 dir 001 sz-wl ea"     "movem iword,ea")
            ("0000 rx 1 dir sz-wl 001 ry"  "movep d(Ay),Dx")
            ("0111 rx 0 byte"              "moveq qbyte,Dx")
            ("1100 Rx * 11 ea"             "mulu eal,Dx" "muls eal,Dx")
            ("0100 1000 00 ea"             "nbcd eal")
            ("0100 0100 size ea"           "neg ea")
            ("0100 0000 size ea"           "negx ea")
            ("0100 1110 0111 0001"         "nop")
            ("0100 0110 size ea"           "not ea")
            ("1000 rx dir size ea"         "or ea,Dx")
            ("0000 0000 size ea"           "ori idata,ea")
            ("0100 1000 01 ea"             "pea eal")
            ("0100 1110 0111 0000"         "reset")
            ("1110 qdat * size 0 10 ry"    "roxr qdata,Dy" "roxl qdata,Dy")
            ("1110 rx * size 1 10 ry"      "roxr Dx,Dy" "roxl Dx,Dy")
            ("1110 qdat * size 0 11 ry"    "ror qdata,Dy" "rol qdata,Dy")
            ("1110 rx * size 1 11 ry"      "ror Dx,Dy" "rol Dx,Dy")
            ("0100 1110 0111 0011"         "rte")
            ("0100 1110 0111 0111"         "rtr")
            ("0100 1110 0111 0101"         "rts")
            ("1000 rx 10000 * ry"          "sbcd Dy,Dx" "sbcd -(Ay),-(Ax)")
```

```
("0101 cc 11 ea"                    "s eal")
("0100 1110 0111 0010"              "stop iword")
("1001 rx dir size ea"              "sub ea,Dx")
("1001 rx sz-wl 11 ea"              "suba ea,Ax")
("0000 0100 size ea"                "subi idata,ea")
("0101 qdat 1 size ea"              "subq qdata,ea")
("1001 rx 1 size 00 * ry"           "subx Dy,Dx" "subx -(Ay),-(Ax)")
("0100 1000 0100 0 rx"              "swap Dx")
("0100 1010 11 ea"                  "tax eal")
("0100 1110 0100 nib"               "trap vector")
("0100 1110 0111 0110"              "trapv")
("0100 1010 size ea"                "tst ea")
("0100 1110 0101 1 rx"              "unlk Ax")))
```

F:>LMach>Fep>nv.lisp.1

```
;-*- Mode:LISP; Package:LCONS; Base:8; Lowercase:yes -*-

;The cached-page "page table". This array is indexed by page number.
;Its entrys are:
;   NIL  -- page not referenced yet
;   T    -- page has been referenced... Must be read in if touched
;  otherwise the entry better be a cached-page
(defconst *cached-page-table* (make-array 1000. ':type 'art-q)) ;will grow if necessary

;Cached pages
(defconst *cached-page-size* 256.)
(defsubst frames-per-page (size) (// (+ 14. (* size 36.)) 15.))
(defstruct (cached-page :named-array-leader
                        :conc-name
                        (:make-array (:type 'art-q :length *cached-page-size*)))
  (leng *cached-page-size*)
  number
  writtenp)

;Cached pages are kept around as a resource.
(defresource cached-page () :constructor (cons-cached-page))
(defun cons-cached-page ()
  (loop with cp = (make-cached-page)
        for i from 0 below *cached-page-size*
         do (setf (aref cp i) 0)
        finally (setf (cached-page-number cp) 0)
                (setf (cached-page-writtenp cp) nil)
                (return cp)))

(defun find-cached-page (number)
  ;; First make sure the page table is large enough...
  (let ((leng (array-active-length *cached-page-table*)))
    (if (≥ number leng)
        (setq *cached-page-table* (adjust-array-size *cached-page-table*
                                                     (fix (* 1.5 (max leng number)))))))
  ;; Now see if there is an entry, if not, allocate one
  (let ((entry (aref *cached-page-table* number)))
    (if (or (null entry) (eq entry 't))
        (let ((page (allocate-resource 'cached-page)))
          (setf (cached-page-number page) number)
          (setf (cached-page-writtenp page) nil)
          (if entry (swap-in-cached-page page))
          (setf (aref *cached-page-table* number) page)
          page)
      entry)))

;The cached a-mem, an entry of NIL means not written, otherwise a fix/big num
(defconst *cached-amem* (make-array #o10000 ':type 'art-q))
(defun cached-read-amem (adr)
  (or (aref *cached-amem* adr)
      (ferror nil "~&Read from un-initialized AMEM location ~O." adr)))

(defun cached-write-amem (adr val)
  (setf (aref *cached-amem* adr) val))
```

```
;;; This is the routine that actually produces the "program" that is the
;;; disassembler.  It takes as input a list of instructions, and returns
;;; a piece of code to disassemble those instructions.
;;; The general algorithm is:
;;;
;;; 1.  If there is only a single instruction in the list, then return
;;;     the code to disassemble it.
;;;
;;;
;;; 2.  If there is more that one instruction, go though all instructions
;;;     in the list checking to see if there is some field of bits that
;;;     is "constant" (ie. not part of something like an EA or REG field.).
;;;     If such a field exists, return a program segment which is a "selectq"
;;;     on that field.  Recursivly call "generate-lookup-tree" to generate
;;;     the code for the instructions in each "clause" of the selectq.
;;;
;;; 3.  If there is no common "constant" field, then generate an "IF" check
;;;     for the instruction that has the greatest number of "constant" bits
;;;     and recurse to generate the program segments for that instruction
;;;     and the "rest"
(defun generate-lookup-tree (mask ilist)
 (local-declare ((special g-c-mask))            ;Greatest common mask
    (if (null (cdr ilist))
        ;; The trivial 1 instruction case
        (let ((insn (first ilist)))
          '(if (zerop (logand ,(insn-mask insn)
                              (logxor ,(insn-const (first ilist)) instruction)))
               ,(disassemble-68k-instruction (first ilist))
               (*throw 'Illegal-68K-Instruction nil)))
     ;; Here we have more than 1 instruction to decide between
     (let ((g-c-mask mask))
       ;; first see if there is some "constant" field common to all instructions
       (dolist (i ilist)
         (setq g-c-mask (logand (insn-mask i) g-c-mask)))

       (if (not (zerop g-c-mask))
           ;; Here we can compile a "selectq" on some field of the instruction
           ;; First sort the instructions (under g-c-mask) then return the form
           ;; '(selectq (logand instruction ,mask) (val-1 clause-list-1) ... )
           (loop for sorted-list on (sort (copylist ilist)
                                          #'(lambda (a b)
                                              (> (logand (insn-const a) g-c-mask)
                                                 (logand (insn-const b) g-c-mask))))
                 with clause-list ()
                  and current-clause ()
                 for  first-insn = (first sorted-list)
                  and second-insn = (and (cdr sorted-list) (second sorted-list))
                 for  first-index = (logand g-c-mask (insn-const first-insn))
                  and second-index = (if second-insn
                                         (logand g-c-mask (insn-const second-insn))
                                         -1)
                 do (push first-insn current-clause)
                 do (cond ((= first-index second-index)
                           (push '(,first-index
                                   ,(generate-lookup-tree (logand mask (lognot g-c-mask))
                                                          current-clause))
                                 clause-list)
                           (setq current-clause ())))

                 finally (return '(selectq (logand instruction ,g-c-mask)
                                   ,@clause-list)))

         ;; Now the case where there is no common constant field
         ;; Pick the instruction with the largest "constant" field, check for it
         ;; with an "IF" and recurse on the "rest"
         (loop for  insn in ilist
               with largest-so-far = 0
                and bits-in-largest = -1
               for bits = (bits-in-word (logand mask (insn-mask insn)))
               do (if (> bits bits-in-largest)
                      (setq bits-in-largest bits
                            largest-so-far insn))
               finally (if (zerop bits-in-largest)
                           (ferror nil "Ambiguous instructions ~S" ilist)
                        (return '(if (= (logand instruction ,(insn-mask largest-so-far))
                                        ,(logand (insn-mask largest-so-far)
                                                 (insn-const largest-so-far)))
                                     ,(generate-lookup-tree mask
                                                            (ncons largest-so-far))
                                     ,(generate-lookup-tree mask
                                                            (remq largest-so-far ilist))))))))))
;;; This routine takes a list of "patterns" (ala *instruction-patterns*) and returns
;;; a list of "insn" structures.  The only "special" pattern it knows about is the
;;; "alterant" pattern (ie a "*").  When it sees one of these, it generates 2 insn
;;; defs as appropriate.
(defun parse-instruction-list (ilist)
  (loop for i in ilist
        with insn-list ()
        for b-pat = (pattern-expand-binary-pattern (first i))
        for const = (first b-pat)
```

```
        for mask = (second b-pat)
        for b-fields = (cddr b-pat)
        for t-pat-list = (loop for p in (cdr i) collect (pattern-expand-text-pattern p))
        do (let ((sel (assoc 'alterant (cddr b-pat))))
             (if (null sel)
                 (push (make-insn :const const
                                  :mask  mask
                                  :b-pat b-fields
                                  :t-pat (first t-pat-list)) insn-list)
              (let ((pos (second sel)))
                (setq mask (deposit-byte mask pos 1 1)
                      b-fields (remq sel b-fields))
                (push (make-insn :const const
                                 :mask  mask
                                 :b-pat b-fields
                                 :t-pat (first t-pat-list)) insn-list)
                (setq const (deposit-byte const pos 1 1))
                (push (make-insn :const const
                                 :mask  mask
                                 :b-pat b-fields
                                 :t-pat (second t-pat-list)) insn-list))))
        finally (return insn-list)))

;;; This function takes a list of "insn" structures and returns a list with various
;;; fields "expanded".
;;; At the moment it only expands the "direction" field (by consing a new insn with
;;; the source and destination fields swapped.
(defun expand-instruction-list (ilist)
  (loop with un-expanded = (parse-instruction-list ilist)
        with result-list = ()
        with temp
        until (null un-expanded)
        for insn = (pop un-expanded)
        do (cond ((setq temp (assq 'direction (insn-b-pat insn)))
                  (let ((pos (second temp))
                        (t-pat (insn-t-pat insn)))
                    (if (= (length t-pat) 3)
                        (ferror nil "Dir field used on wrong length insn ~A."
                                t-pat))
                    (setf (insn-mask insn) (deposit-byte (insn-mask insn) pos 1 1))
                    (setf (insn-b-pat insn) (remq temp (insn-b-pat insn)))
                    (push insn un-expanded)
                    (setq insn (make-insn :const (deposit-byte (insn-const insn) pos 1 1)
                                          :mask (insn-mask insn)
                                          :b-pat (insn-b-pat insn)
                                          :t-pat (list (first t-pat)
                                                       (third t-pat)
                                                       (second t-pat))))
                                          (push insn un-expanded)))
                  (t (push insn result-list)))
        finally (return result-list)))

;;;; Routines to expand the text and binary patterns in "*instruction-patterns*"

;;; A pattern is a string that contains tokens separated by spaces.  Tokens
;;; are either constants (represented by some combinaton of the characters
;;; "0" and "1") or variable fields.  Variable fields are represented by various
;;; strings of alphabetic charcters. This routine parses the pattern
;;; according to the following algorithm:
;;;
;;;   Constant bits (ie "0"s or "1"s) are accumulated the the var CONST.  For each valid
;;;   bit in CONST a corrisponding bit is set in MASK.
;;;
;;;   For each variable field a list of the form '(name first-bit-pos #-of-bits-in-field)
;;;   is made.
;;;
;;; This routine verifies that all 16 bits of the instruction are described
;;; by the pattern and then returns '(,const ,mask ,@list-of-variable-lists)
(defun pattern-expand-binary-pattern (pattern)
  (loop with str-leng = (string-length pattern)
         and const = 0
         and mask = 0
         and bit-pos = 16
         and component-list ()

        for  str-pos = 0 then wd-end
        for  wd-strt = (string-search-not-char #\sp pattern 0)
                 then (or (string-search-not-char #\sp pattern str-pos)
                          (if (or (≥ str-pos str-leng)
                                  (char-equal #\sp (aref pattern str-pos)))
                              str-leng str-pos))

        until (or (≥ str-pos str-leng)
                  (≤ bit-pos 0))

        for  wd-end = (or (string-search-char #\sp pattern wd-strt) str-leng)
        for  word = (substring pattern wd-strt wd-end)

        do   (if (string-search-not-set '(#/0 #/1) word)
                 ;; Here if the entry is a pattern (ie. not just "0" and "1")
                 (let ((entry (assoc word *binary-pattern-list*))
```

```
            (if (null entry)
                (ferror nil "~&Bad component name in instruction def ~S." pattern)
             (let ((name (second entry))
                   (size (third entry)))
               (decf bit-pos size)
               (push '(,name ,bit-pos ,size) component-list))))

          ;; Here if the entry is part of the "constant" specification
          (dotimes (i (string-length word))
            (decf bit-pos)
            (setq mask (logior mask (lsh 1 bit-pos)))
            (if (char-equal #/1 (aref word i))
                (setq const (logior const (lsh 1 bit-pos))))))

    finally (if (or (≠ wd-strt str-leng)
                    (≠ bit-pos 0))
                (ferror nil "Instr def ~S doesn't specify 16 bits" pattern)
              (return '(,const ,mask ,@component-list)))))

;;; The text pattern is very fixed format.
;;; The first part of the string is the opcode (terminated by a space).
;;; Following the opcode are the arguments separated by commas.
(defun pattern-expand-text-pattern (pattern)
  (let* ((leng (string-length pattern))
         (delim (or (string-search-char #\sp pattern) leng))
         (opcode (substring pattern 0 delim)))
    (loop for start = (1+ delim) then (1+ end)
          for end = (or (string-search-char #/, pattern start) leng)
          until (≥ start leng)
          collect (let ((item (assoc (substring pattern start end)
                                     *text-pattern-list*)))
                    (if (null item)
                        (ferror nil "~&Invalid text pattern ~S." pattern)
                        (second item)))
                  into component-list
          finally (return (cons opcode component-list)))))
;;; Helper for disassemble-insturction
(defmacro add-format (string . arg)
  (if arg '(setq format-string (string-append format-string ,string)
                 format-args (append format-args ',arg))
         '(setq format-string (string-append format-string ,string))))


;;; This is the routine that takes an "insn" def and generates the code to produce
;;; the text string representing the disassembled instruction.
(defun disassemble-68k-instruction (insn)
  (let* ((b-pat (insn-b-pat insn))
         (t-pat (insn-t-pat insn))
         (format-string (pop t-pat))
         (format-args ())
         (instruction-bindings (loop for p in b-pat
                                     collect '(,(first p) (load-byte instruction
                                                                     ,(second p)
                                                                     ,(third p)))))
         (source-bindings ())
         (destination-bindings ()))

    ;; This is a hack to get the var "size" bound when either one of the
    ;; size specifiers is used
    (if (assq 'size-wl  b-pat) (push '(size (1+ size-wl)) instruction-bindings))
    (if (assq 'size-bwl b-pat) (push '(size (if (> size-bwl 2)
                                                 (*throw 'Illegal-68k-instruction nil)
                                                 size-bwl))
                                     instruction-bindings))
    (if (assq 'move-sz  b-pat) (push '(size (cadr (assoc move-sz '((1 0) (3 1) (2 2)))))
                                     instruction-bindings))

    ;; Expand the fields that actually modify the opcode
    (if (assq 'condition b-pat)
        (add-format "~A" (nth condition *condition-codes*)))
    (if (assq 'bitop b-pat)
        (add-format "~A" (nth bitop *bitop-types*)))
    (if (or (assq 'size-bwl b-pat) (assq 'size-wl b-pat) (assq 'move-sz b-pat))
        (add-format "~C" (nth size *instruction-sizes*)))
;; This is basically just a big selectq on the various "text-pattern" fields
(loop for form in t-pat
      for delim = " " then ","
      do (add-format delim)
      do (selectq form
           (dreg-x (add-format "D~O" regx))
           (dreg-y (add-format "D~O" regy))
           (areg-x (add-format "A~O" regx))
           (areg-y (add-format "A~O" regy))
           (auto-decr-x (add-format "-(A~O)" regx))
           (auto-decr-y (add-format "-(A~O)" regy))
           (auto-incr-x (add-format "(A~O)+" regx))
           (auto-incr-y (add-format "(A~O)+" regy))
           (indexed-displacement (add-format "~A" source-string)
                                 (push '(source-string (print-ea (logior #o50 regy) size))
                                       source-bindings))
```

```
            (quick-data (add-format "~[10~:;~:*~O~]" q-data))
            (immediate-data (add-format "#~O" immediate-data)
                            (push '(immediate-data (read-immediate-data size))
                                   instruction-bindings))
            (immediate-word (add-format "#~O" immediate-data)
                            (push '(immediate-data (read-immediate-data 1))
                                   source-bindings))
            (branch-address (add-format "~A" branch-addr)
                            (push '(branch-addr (print-branch-addr byte))
                                   source-bindings))
            (immediate-disp (add-format "~O" immediate-data)
                            (push '(immediate-data (read-immediate-data 1))
                                   source-bindings))
            (destination-ea (add-format "~A" dest-ea-string)
                            (push '(dest-ea-string (print-ea-swapped dest-ea size))
                                   destination-bindings))
            (ea (add-format "~A" ea-string)
                (push '(ea-string (print-ea ea size))
                       source-bindings))
            (ea-word (add-format "~A" ea-string)
                     (push '(ea-string (print-ea ea 1))
                            source-bindings))
            (vector (add-format "Vector=~O" nibble))
            (moveq-byte (add-format "#~O" byte))
            (cc-register (add-format "CCR"))
            (user-stack-pointer (add-format "USP"))
            (status-register (add-format "SR"))
            (otherwise (ferror nil "Bad instruction def.   Unknown pattern ~A." form))))
'(let* (,@(nreverse instruction-bindings)
        ,@source-bindings
        ,@destination-bindings)
    (format nil ,format-string ,@format-args))))

;;; Hack routine
(defun bits-in-word (word)
  (loop for i = word then (lsh i -1)
        until (zerop i)
        sum (if (oddp i) 1 0)))


;;; This macro generates the "selectq" tree for breaking down instructions.
;;; This is the guts of the disassembler
(defmacro generate-disassembler ()
  (generate-lookup-tree -1  (expand-instruction-list  *instruction-patterns*)))
```

F:>sys>lil>standard-image.lisp.5

```
;;;-*- Mode:LISP; Package:USER; Base:8.; Lowercase: t -*-
;;; (C) Copyright 1982 Symbolics Inc.

(defmacro rot-1-16 (value)
  '(let ((val ,value))
     (dpb val #o0117 (lsh val -15.))))

;;; Mix this in to simulate the block read/write messages with read/write word messages
(defflavor image-fake-block-io-mixin () ())

(defmethod (image-fake-block-io-mixin :write-words) (array offset addr n-words)
  (loop repeat n-words
        for i upfrom offset
        for a upfrom addr by 2
        do (send self ':write-word a (aref array i))))

(defmethod (image-fake-block-io-mixin :read-words) (array offset addr n-words)
  (loop repeat n-words
        for i upfrom offset
        for a upfrom addr by 2
        do (setf (aref array i) (send self ':read-word a))))

;;; Mix "image-cached-reads-mixin" before a normal image to cache the read data.
(defconst image-cached-page-size #o100)
(defstruct (image-cached-page :named-array-leader :conc-name
                              (:make-array (:type 'art-16b :length image-cached-page-size)))
  addr)

(defflavor image-cached-reads-mixin
        ((*cached-page-active-list* nil)          ;these have good data
         (*cached-page-passive-list* nil))        ; these are empty
        ()
  (:required-methods :read-words))

(defmethod (image-cached-reads-mixin :flush-cache) ()
  (setq *cached-page-passive-list* (nconc *cached-page-active-list*
                                           *cached-page-passive-list*))
  (setq *cached-page-active-list* nil))

(defmethod (image-cached-reads-mixin :read-word) (addr)
  (setq addr (// addr 2))
  (let ((pageno (// addr image-cached-page-size))
        (offset (\ addr image-cached-page-size)))
    (loop for page in *cached-page-active-list*
```

```
        when (= (image-cached-page-addr page) pageno) return (aref page offset)
        finally (let ((npage (or (pop *cached-page-passive-list*)
                                 (make-image-cached-page))))
                  (setf (image-cached-page-addr npage) pageno)
                  (send self ':read-words npage 0 (* (- addr offset) 2)
                        image-cached-page-size)
                  (push npage *cached-page-active-list*)
                  (return (aref npage offset))))))

(defmethod (image-cached-reads-mixin :before :write-word) (&rest ignore)
  (send self ':flush-cache))
(defmethod (image-cached-reads-mixin :before :write-words) (&rest ignore)
  (send self ':flush-cache))
(defmethod (image-cached-reads-mixin :before :reset-image) (&rest ignore)
  (send self ':flush-cache))
(defmethod (image-cached-reads-mixin :before :goto) (&rest ignore)
  (send self ':flush-cache))
;;; A debugger mixin for 68000 images
(defflavor image-debug-mixin
        ( *ddt-point* *point-open-p*                ;usual ddt style hackery
          *right-value* *left-value* *value-valid* *arith-op*
          *mode*                                    ;list of mode name and "args" (repeat count)
          *default-mode*                            ;mode ← default on a CR.
          (*address-stack* nil)                     ;'(point length) of place we "jumped" from
          *type-out-length*                         ;tells #\lf how far to jump forward
          *type-out-values*                         ;A list of all words last command typed out
          *last-address-printed*                    ;setup by the disassembler routines
          *location-to-tab-to*)                     ;set in routines that open/close locations
        ()
  :settable-instance-variables
  (:required-methods :read-word :write-word))

(defmethod (image-debug-mixin :debug) ()
  (setq *mode* '(symbolic 1) *default-mode* '(symbolic 1)
        *ddt-point* 0 *point-open-p* nil
        *right-value* 0 *left-value* 0
        *value-valid* nil *arith-op* '+
        *type-out-length* 0 *type-out-values* nil
        *last-address-printed* nil *location-to-tab-to* nil)
  (*catch 'exit-debugger
    (do () (())
      (error-restart-loop (sys:abort "Back to the 68k debugger")
        (send standard-output ':fresh-line)
        (*catch 'debugger-cmd-error
          (loop for ch = (funcall standard-input ':tyi)
                do (if (< ch 200) (funcall standard-output ':tyo ch))
                   (send self ':debug-process-char ch)))
        (princ " ??? ")
        (use-value)))))

(defmethod (image-debug-mixin :debug-process-char) (ch)
  (if (and (≥ ch #/0) (≤ ch #/9))
      (setq *right-value* (+ (lsh *right-value* 3) (- ch #/0))
            *value-valid* t)
    (selectq ch
      (#/|
       (setq *value-valid* (funcall self ':lookup-value (read standard-input)))
       (cond (*value-valid*
              (setq *right-value* *value-valid*
                    *value-valid* t)
              (do-arithmetic))
         (t (*throw 'debugger-cmd-error t))))
      (#\help (format t "~&C-z to exit."))
      ((#/+ #\sp) (do-arithmetic))
      (#/- (do-arithmetic) (setq *arith-op* '-))
      (#/. (setq *right-value* *ddt-point*
                 *value-valid* t)
       (do-arithmetic))
      (#/=
       (if *value-valid* (setq *type-out-values* (list (use-value))))
       (dolist (wd *type-out-values*) (format t " ~O " wd)))
      (#/# (send self ':describe-instance
                 (lil:lookup-type (pkg-bind 'lil (read standard-input)))
                 *ddt-point*))
      ((#// #/[ #/! #/")
       (if (not *value-valid*) (*throw 'debugger-cmd-error t)
         (if (= ch #/[) (setq *mode* '(octal 1)))
         (if (= ch #/") (setq *mode* '(ascii 2)))
         (push-*ddt-point*)
         (setq *ddt-point* (use-value)
               *left-value* 0)
         (if (= ch #/!)
             (open-location)
           (format t "    ")
           (setq *point-open-p* t))))
      (#\return (terpri)
       (close-location)
       (setq *mode* *default-mode*))
      ((#/^ #\c-h)
       (close-location)
       (decf *ddt-point* 2)
```

```
       (prompt-address)
       (open-location))
      (#\lf
       (close-location)
       (incf *ddt-point* *type-out-length*)
       (prompt-address)
       (open-location))
      (#\tab
       (close-location)
       (push-*ddt-point*)
       (setq *ddt-point* (or *location-to-tab-to* *ddt-point*))
       (prompt-address)
       (open-location))
      (#\c-Z (*throw 'exit-debugger t))
      (#\c-l (send standard-output ':clear-screen))
      (#\alt (send self ':debug-process-altmode))
      (otherwise (*throw 'debugger-cmd-error t)))))

(defmethod (image-debug-mixin :debug-process-altmode) ()
  (let ((ch (funcall standard-input ':tyi)))
    (if (and (≥ ch #/a) (≤ ch #/z))
        (setq ch (- ch (- #/a #/A))))
    (funcall standard-output ':tyo ch)
    (selectq ch
      ((#\return #\lf)
       (let ((addr-len (pop *address-stack*)))
         (if (null addr-len) (princ " ?no-stack ")
           (setq *ddt-point* (first addr-len)
                 *type-out-length* (if (= ch #\return)
                                       0 (second addr-len))))
         (send self ':debug-process-char #\lf)))        ;hack
      (#/G
       (if (or (not (memq 'goto (send self ':which-operations)))
               (not *value-valid*))
           (*throw 'debugger-cmd-error t))
       (setq *ddt-point* (use-value))
       (send self ':goto *ddt-point*)
       (if (memq ':talk (send self ':which-operations))
           (send self ':talk)))
      (#/T
       (if (not (memq ':talk (send self ':which-operations)))
           (*throw 'debugger-cmd-error t))
       (send self ':talk))
      (#/D
       (if (not (memq ':dump (send self ':which-operations)))
           (*throw 'debugger-cmd-error t))
       (send self ':dump))
      (#/?
       (if (not (memq ':why (send self ':which-operations)))
           (*throw 'debugger-cmd-error t))
       (funcall standard-output ':clear-screen)
       (send self ':why))
      (otherwise (*throw 'debugger-cmd-error t)))))

(defmethod (image-debug-mixin :why) (&optional (rg #o7000))
  (format t "~2&")
  (let* ((fp (send self ':read-long (+ rg 70)))
         (sp (send self ':read-long (+ rg 74)))
         (trapn (send self ':read-word (+ rg 100))))

    (loop for reg in '(D0 D4 A0 A4)
          with loc = rg
          do (format t "~&      ~A  =" reg)
             (loop repeat 4
                   do (format t "~130" (send self ':read-long loc))
                      (incf loc 4)))

    (format t "~2&Sp = ~O,  Fp = ~O,  " sp fp)
    (cond ((or (= trapn 8.) (= trapn 12.))
           (if (= trapn 8) (format t "Bus error") (format t "Address error"))
           (format t "~&Trap block Fcn = ~O,  Addr = ~O,  Ir = ~O,  Sts = ~O,  Pc = ~A(=~O)"
                   (send self ':read-word sp)
                   (send self ':read-long (+ sp 2))      ;access addr
                   (send self ':read-word (+ sp 6))      ;ir
                   (send self ':read-word (+ sp 8))      ;sts
                   (send self ':symbolic-address
                         (send self ':read-long (+ sp 10.)) 200)
                   (send self ':read-long (+ sp 10.)))   ;pc
           (incf sp 14.))                                ;account for 7 wds of stuff on stack
          ((and (≥ trapn 16.) (≤ trapn 44.))
           (format t "~A" (nth (// (- trapn 16.) 4)
                               '("Illegal insn" "Zero div" "CHK insn" "trapv insn"
                                 "Priv violation" "Trace" "op 1010 trap" "op 1111 trap")))
           (format t "~&Trap data Sts = ~O,  Pc = ~A(=~O)"
                   (send self ':read-word sp)
                   (send self ':symbolic-address (send self ':read-long (+ sp 2)) 200)
                   (send self ':read-long (+ sp 2)))
           (incf sp 6.))
          ((= trapn 0)
           (Format t "No trap taken..."))
          (t (format t "Unknown trap = ~O." trapn)))
```

```
;; Loop over all frames
(loop while (< sp rg)
      do (if (or (< fp sp) (≥ fp rg))
             (return (format t "~&Screwed up stack ... Sp = ~O, Fp = ~O, Rg = ~O"
                             sp fp rg)))
         (let* ((rts (send self ':read-long (+ fp 4)))
                (nfp (send self ':read-long fp))
                (pc (send self ':read-long (- rts 4))))
           ;; Try to print out the name of the function this frame belongs to.
           (format t "~2&Frame for fcn ~A:" (send self ':symbolic-address pc 200))

           ;; Loop over all word in the frame
           (loop until (≥ sp fp)
                 for wd = (send self ':read-word sp)
                 for lg = (send self ':read-long sp)
                 do (format t "~&~2X~12O: ~7O" sp wd)
                    (if (< sp (- fp 2))
                        (format t "  ~12O" lg))
                    (incf sp 2))

           ;; Now print the fp & rts linkage words
           (format t "~&~11XNfp: ~O" nfp)
           (format t "~&~11XRts:    ~O" (send self ':symbolic-address  rts 200))
           (setq sp (+ fp 8)
                 fp nfp)))
(format t "~&")))
(defmethod (image-debug-mixin :describe-instance) (type point)
  (if (eq type lil:**undefined-type**)
      (format t "~&Undefined type")
    (let ((type-type (lil:type-type type)))
      (format t "~&Type is ~A" type-type)
      (selectq type-type
        (lil:pointer (describe-pointer-type type point))
        (lil:composite (describe-composite-type type point))
        (otherwise (format t ", which has no describe support.")))
      (format t "~&"))))

(defun-method describe-pointer-type image-debug-mixin (type point)
  (let ((pointer (send self ':read-long point))
        (ntype (lil:type-pointed-to type)))
    (format t "~&Pointed-to structure is a ~A at ~O" (lil:type-name ntype) pointer)
    (send self ':describe-instance ntype pointer)))

(defun-method describe-composite-type image-debug-mixin (type point)
  (let ((type-included-type (lil:type-included-type type)))
    (when type-included-type (describe-composite-type type-included-type point)))
  (describe-cpe (lil:type-cpe type) point))

(defun-method describe-cpe image-debug-mixin (cpe point)
  (selectq (lil:cpe-type cpe)
    (lil:element (let* ((loc (+ point (// (lil:cpe-offset cpe) 8)))
                        (body-type (lil:cpe-body cpe))
                        (value-msg (selectq (lil:type-size body-type)
                                     (1 ':read-byte)
                                     (2 ':read-word)
                                     (4 ':read-long)
                                     (otherwise '()))))
                   (format t "~&~O// Slot is ~A (~A)"
                           loc (lil:cpe-name cpe) (lil:type-name body-type))
                   (when value-msg
                     (format t ", value = ~O" (send self value-msg loc)))))
    (lil:sequence (loop for cpe in (lil:cpe-body cpe)
                        do (describe-cpe cpe point)))
    (lil:union (describe-cpe (car (last (lil:cpe-body cpe))) point))))
;;; Utility functions
(defmethod (image-debug-mixin :dump) ()
  (let* ((sp (send self ':read-word #o7076))
         (start (max #o6000 (min #o6500 (- sp 10))))
         (first-byte (dpb 0 #o0003 start))
         (last-byte #o7117))
    (loop for i from first-byte to last-byte by #o20
          do (format t "~& ~9O = " i)
             (loop for j below #o20 by 2
                   do (format t "  ~6,'0O" (send self ':read-word (+ i j))))))
  (terpri))

(defun-method close-location image-debug-mixin ()
  (do-arithmetic)
  (if (and *point-open-p* *value-valid*)
      (let ((value (use-value)))
        (send self ':write-word *ddt-point* value)
        (setq *location-to-tab-to* value)))
  (use-value))

(defun-method push-*ddt-point* image-debug-mixin ()
  (push '(,*ddt-point* ,*type-out-length*) *address-stack*))

(defun-method open-location image-debug-mixin ()
  (setq *point-open-p* t)
  (selectq (car *mode*)
```

```
    (octal (setq *type-out-values* (loop repeat (cadr *mode*)
                                         for i upfrom *ddt-point* by 2
                                         for wd = (send self ':read-word i)
                                         collect wd
                                         do (format t " ~O " wd)))
           (setq *type-out-length* (* 2 (cadr *mode*)))
           (setq *location-to-tab-to* (car (last *type-out-values*))))
    (symbolic
     (setq *last-address-printed* nil)
     (setq *type-out-length* 0)
     (setq *type-out-values* nil)
     (format t " ~A " (send self ':disassemble-68k))
     (setq *location-to-tab-to* (or *last-address-printed* (car (last *type-out-values*)))))
    (ascii (setq *type-out-values* (loop repeat (// (cadr *mode*) 2)
                                         for i upfrom *ddt-point* by 2
                                         collect (send self ':read-word i)))
           (setq *type-out-length* (cadr *mode*))
           (setq *location-to-tab-to* (car (last *type-out-values*)))
           (loop repeat (cadr *mode*)
                 for i upfrom *ddt-point*
                 do (tyo (send self ':read-byte i))))
    (otherwise (ferror nil "bad mode"))))

(defun-method prompt-address image-debug-mixin ()
  (cond ((memq ':symbolic-address (send self ':which-operations))
         (format t "~&~O// " (send self ':symbolic-address *ddt-point* 200)))
        (t  (format t "~&~O// " *ddt-point*))))

(defun-method do-arithmetic image-debug-mixin ()
  (setq *left-value* (funcall *arith-op* *left-value* *right-value*)
        *right-value* 0
        *arith-op* '+)
  *left-value*)

(defun-method use-value image-debug-mixin ()
  (do-arithmetic)
  (prog1 *left-value* (setq *left-value* 0
                            *value-valid* nil)))
;;; This file contains the actual disassembler and all routines that it calls.
;;; It is not necessary to have the "generate" file loaded to use the disassembler

(defconst *condition-codes*
          '("t"  "f"  "hi" "ls" "cc" "cs" "ne" "eq"
            "vc" "vs" "pl" "mi" "ge" "lt" "gt" "le"))

(defconst *instruction-sizes*
          '(#/b #/w #/l))

(defconst *bitop-types*
          '("tst" "chg" "clr" "set"))

;;; Routine to process the 8 bit "branch" field of branch-class instructions
(defun-method print-branch-addr image-debug-mixin (byte)
  (let ((addr (+ 2 *ddt-point*
                 (if (zerop byte) (read-immediate-data 1) (sign-extend-byte byte)))))
    (disassemble-address addr)))

;;; Routines to generate the strings for "ea" type fields
(defun print-ea-swapped (ea size)
  (print-ea (dpb ea #o0303 (lsh ea -3)) size))

(defun-method print-ea image-debug-mixin (ea size)
  (let ((mode (ldb #o0303 ea))
        (reg (ldb #o0003 ea)))
    (selectq mode
      (0 (format nil "D~O" reg))
      (1 (format nil "A~O" reg))
      (2 (format nil "(A~O)" reg))
      (3 (format nil "(A~O)+" reg))
      (4 (format nil "-(A~O)" reg))
      (5 (format nil "~O(A~O)" (mask-to-word (read-immediate-data 1)) reg))
      (6 (let* ((wd (get-next-word))
                (da (if (zerop (ldb #o1701 wd)) "D" "A"))
                (sz (if (zerop (ldb #o1301 wd)) "w" "l"))
                (ireg (ldb #o1403 wd))
                (disp (sign-extend-byte (ldb #o0010 wd))))
           (format nil "~O(A~O, ~A~O.~A)" disp reg da ireg sz)))
      (7 (selectq reg
           ((0 1) (disassemble-address (mask-immediate-data
                                        (read-immediate-data (1+ reg)) (1+ reg))))
           (2 (let ((addr (+ *ddt-point* *type-out-length*))
                    (extn (read-immediate-data 1)))
                (disassemble-address (+ addr extn))))
           (3 "mode 7 reg 3 not done yet")
           (4 (string-append "#"
                (disassemble-address
                  (mask-immediate-data (read-immediate-data size) size))))))))))
```

```
(defun-method disassemble-address image-debug-mixin (addr)
  (setq *last-address-printed* addr)
  (cond ((memq ':symbolic-address (send self ':which-operations))
         (send self ':symbolic-address addr 200))
        (t (format nil "~O" addr))))
;;; Routines to implement a general purpose interface to the disassembler.
;;; All the user has to do is define a "memory-read" function.
;;; Routine to fetch next word from the instruction stream
(defun-method get-next-word image-debug-mixin ()
  (let* ((addr (+ *ddt-point* *type-out-length*))
         (word (send self ':read-word addr)))
    (incf *type-out-length* 2)
    (if *type-out-values* (rplacd (last *type-out-values*) (ncons word))
      (setq *type-out-values* (ncons word)))
    word))

;;; Routine to read immediate data (of size byte/word/long) from the instruction stream
(defun read-immediate-data (size)
  (caseq size
    (0 (sign-extend-byte (get-next-word)))
    (1 (sign-extend-word (get-next-word)))
    (2 (sign-extend-long (+ (lsh (get-next-word) 16.) (get-next-word))))))

(defun mask-immediate-data (val size)
  (caseq size
    (0 (mask-to-byte val))
    (1 (mask-to-word val))
    (2 (mask-to-long val))))

(defun sign-extend-byte (val)
  (if (> val #o177) (- val #o400) val))
(defun mask-to-byte (val)
  (logand val #o377))

(defun sign-extend-word (val)
  (if (> val #o77777) (- val #o200000) val))
(defun mask-to-word (val)
  (logand val #o177777))

(defun sign-extend-long (val)
  (if (> val #o17777777777) (- val #o40000000000) val))
(defun mask-to-long (val)
  (logand val #o37777777777))
;;; This is it.
(defmethod (image-debug-mixin :disassemble-68k) ()
    (let* ((instruction (get-next-word))
           (string (if (not (zerop instruction))       ;hack to disassemble 0 as 0
                       (*catch 'Illegal-68k-Instruction (generate-disassembler)))))
      ;; Generate-disassembler returns nil if the instruction wasn't valid
      (if (null string) (setq string (format nil "~O" instruction)))
      string))
(defflavor image-symbols-mixin
        ((symtab nil)
         (sorted nil)) ())

(defmethod (image-symbols-mixin :clear-symtab) ()
  (if symtab (setf (fill-pointer symtab) 0)))

(defmethod (image-symbols-mixin :add-symbol) (sym val)
  (if (null symtab) (setq symtab (make-array 100 ':type 'art-q ':leader-list '(0))))
  (setq sorted nil)
  (array-push-extend symtab (cons val sym)))

(defmethod (image-symbols-mixin :lookup-symbol) (addr)
  (if (null symtab)
      nil
    (cond ((not sorted) (sortcar symtab '<) (setq sorted t)))
    (loop for i being the array-elements of symtab
          until (> (car i) addr)
          for previous = i
          finally (if previous
                      (return (cdr previous) (- addr (car previous)))
                    (return nil)))))

(defmethod (image-symbols-mixin :lookup-value) (symbol)
  (if (null symtab)
      '()
    (loop for i being the array-elements of symtab
          when (string-equal symbol (cdr i) )
          return (car i)
          finally (return '()))))

(defmethod (image-symbols-mixin :symbolic-address) (addr max-off)
  (multiple-value-bind (sym off) (send self ':lookup-symbol addr)
    (if (and sym (≤ off max-off) (≠ addr off))  ;dont allow symbols at zero
        (format nil "~A~@[+~O~]" sym (if (zerop off) nil off))
      (format nil "~O" addr))))
```

```
;(defun dump-mem (&optional (start #o6000 startp) (nwords (if startp #o40 #o440)))
;  (let ((arry (make-array #o100 ':type 'art-16b))
;        (first-byte (dpb 0 #o0003 start))
;        (last-byte (logior 7 (+ start (* 2 nwords)))))
;    (loop for i from first-byte to last-byte by #o200
;          for words-in-blk = (min (// (1+ (- last-byte i))2) #o100)
;          do (funcall *image* ':read-words arry 0 i words-in-blk)
;             (loop for j below words-in-blk by #o10
;                   do  (format t "~& ~30 = " (+ i (* j 2)))
;                       (loop for k below #o10
;                             do (format t "  ~6,'00" (aref arry (+ j k)))))))))

;;; An imitation of KR's CRC program.  Just to figure out checksums by hand.
(defun cck (&rest bytes)
  (loop with check = #o55555
        for byte in bytes
        do (setq check (logxor (rot-1-16 check) (logand byte #o377)))
        finally (return (logand #o377 (lsh check -8)) (logand #o377 check))))

;(defun tst-blk (&optional (nwords 100) (addr 30000))
;  (let ((arry (make-array nwords ':type 'art-16b))
;        (image *image*))
;    (loop for i below nwords do (setf (aref arry i) 0))
;    (funcall image ':write-words arry 0 addr nwords)
;    (funcall image ':read-words arry 0 addr nwords)
;    (loop for i below nwords
;          do (if (not (zerop (aref arry i))) (ferror nil "Wrong data in array?"))
;             (setf (aref arry i) i))
;    (funcall image ':write-words arry 0 addr nwords)
;    (funcall image ':read-words arry 0 addr nwords)
;    (loop for i below nwords
;          do (if (≠ (aref arry i) i) (ferror nil "Wrong data in array?")))))
```

F:>lmach>fep>Parallel-port.lisp.8

```
;;; -*- Mode: LISP; Package: LIL; Base: 8; Lowercase:Yes -*-
;;; The parallel-port flavor implements a packet mode communicaton with the fep.
;;; The basic message commands for sending are:
;;;     :send-message-header-to-fep
;;;     :send-single-part-message-to-fep
;;;     :finish-sending-message-to-fep
;;; For receiving are
;;;     :receive-message-from-fep
;;;     :finish-receiving-message-from-fep
;;; For sending parts of message
;;;     :send-byte-array-to-fep
;;;     :send-byte-to-fep
;;;     :send-word-to-fep
;;;     :send-addr-to-fep
;;;     :send-long-to-fep
;;; For receiving parts of messages
;;;     :receive-byte-array-from-fep
;;;     :receive-byte-from-fep
;;;     :receive-word-from-fep
;;;     :receive-addr-from-fep
;;;     :receive-long-from-fep

(defflavor parallel-port
        ((*ppr-address* #o764126)
         (*checksum* #o55555)
         (*trace* nil))
        ()
  :settable-instance-variables)

(defsubst read-ppr () (%unibus-read #o764126))
(defsubst write-ppr (val) (%unibus-write #o764126 (logand val #o177777)))

(defmethod (parallel-port :send-message-header-to-fep) (byte-array offset nbytes)
  (send self ':abort-to-fep)
  (send self ':send-byte-array-to-fep byte-array offset nbytes)
  (send self ':send-word-to-fep *checksum*)
  (setq *checksum* #o55555))

(defmethod (parallel-port :finish-sending-message-to-fep) ()
  (send self ':send-word-to-fep *checksum*))
```

```
(defmethod (parallel-port :send-single-part-message-to-fep) (&rest args)
  (lexpr-send self ':send-message-header-to-fep args))

(defmethod (parallel-port :send-byte-array-to-fep) (byte-array offset nbytes)
  (setq *checksum* (sys:%send-bytes *ppr-address* *checksum* nbytes byte-array offset)))

;;; Slow debugging version
;(defmethod (parallel-port :send-byte-array-to-fep) (byte-array offset nbytes)
;  (loop for i from offset below (+ offset nbytes)
;        do (send self ':send-byte-to-fep (aref byte-array i))))

(defmethod (parallel-port :receive-message-from-fep) (opcode)
  (setq *checksum* #c55555)
  (let ((rcvd-opcode (send self ':receive-word-from-fep)))
    (if (≠ opcode rcvd-opcode)
        (ferror "Fep protocol error.  Received opcode ~D ≠ expected ~D." rcvd-opcode opcode))
    rcvd-opcode))

(defmethod (parallel-port :receive-byte-array-from-fep) (byte-array offset nbytes)
  (setq *checksum* (sys:%receive-bytes *ppr-address* *checksum* nbytes byte-array offset)))

(defmethod (parallel-port :finish-receiving-message-from-fep) ()
  (let* ((expected-chk *checksum*)
         (received-chk (send self ':receive-word-from-fep)))
    (when (≠ expected-chk received-chk)
      (ferror "Checksum error.  Expected ~O, received ~O." expected-chk received-chk))))

;;; This for "old protocol - escape to new"
(defmethod (parallel-port :abort-to-fep) ()
  (multiple-value-bind (ignore response) (expedient-fep-extended-command 5)
    (if (≠ response 3) (ferror "Wrong response ~O." response)))
  (setq *checksum* #o55555))

;;; This is needed inorder to be an "image" to the linker...
(defmethod (parallel-port :reset-image) ()
  (send self ':goto (send self ':read-word 6))
  (loop while (bit-test 1_15. (read-ppr)))
  (write-ppr -1)                                 ;clear the reset error.
  (loop until (bit-test 1_15. (read-ppr)))
  (write-ppr 0))

(defmethod (parallel-port :start-fep-system-and-wait-for-initialization) ()
  (send self ':goto 410000)
  (write-ppr -1)
  (process-wait-with-timeout "FEP init" (* 60. 10.) #'(lambda () (bit-test 1_15. (read-ppr))))
  (if (not (bit-test 1_15. (read-ppr)))
      (format T "~&Fep failed to initialize.  The program loaded was probably wrong."))
  (write-ppr 0))

;;; This for the "hack prom"
;(defmethod (parallel-port :abort-to-fep) ()
;  (loop do (multiple-value-bind (resp code) (send self ':pp-transact 7_12.)
;             (selectq code
;               (3 (tyo (logand #o377 resp)))
;               (7 (return))
;               (otherwise (ferror nil "Abort fep received code ~O. Expected abort." code)))))
;  (setq *checksum* #o55555))

(defmethod (parallel-port :send-byte-to-fep) (byte)
  (setq *checksum* (logxor (rot-1-16 *checksum*) (logand byte #o377)))
  (loop do (multiple-value-bind (resp code)
               (send self ':pp-transact (logior 2_12. (logand #o377 byte)))
             (selectq code
               (1 (return))
               (3 (tyo (logand #o377 resp)))
               (otherwise (ferror nil "Send byte received code ~O. Expected an ack"
                                  code))))))

(defmethod (parallel-port :send-word-to-fep) (word)
  (loop for ppss from #o0010 to #o1010 by #o1000
        do (send self ':send-byte-to-fep (ldb ppss word))))
```

```
(defmethod (parallel-port :send-addr-to-fep) (word)
  (loop for ppss from #o0010 to #o2010 by #o1000
        do (send self ':send-byte-to-fep (ldb ppss word))))

(defmethod (parallel-port :send-long-to-fep) (word)
  (loop for ppss from #o0010 to #o3010 by #o1000
        do (send self ':send-byte-to-fep (ldb ppss word))))

(defmethod (parallel-port :send-nbytes-to-fep) (nbytes word)
  (loop repeat nbytes
        for ppss upfrom #o0010 by #o1000
        do (send self ':send-byte-to-fep (ldb ppss word))))

(defmethod (parallel-port :receive-byte-from-fep) (&optional (randomness 0))
  (let ((byte (loop do (multiple-value-bind (resp code)
                           (send self ':pp-transact (logior 1_12. (logand randomness #o377)))
                         (selectq code
                           (2 (return (logand #o377 resp)))
                           (3 (tyo (logand #o377 resp)))
                           (otherwise
                            (ferror nil "Receive byte rcvd code ~O. Expected data" code)))))))
    (setq *checksum* (logxor (rot-1-16 *checksum*) (logand byte #o377)))
    byte))

(defmethod (parallel-port :receive-word-from-fep) ()
  (loop with rv = 0
        for ppss from #o0010 to #o1010 by #o1000
        do (setq rv (dpb (send self ':receive-byte-from-fep) ppss rv))
        finally (return rv)))
(defmethod (parallel-port :receive-addr-from-fep) ()
  (loop with rv = 0
        for ppss from #o0010 to #o2010 by #o1000
        do (setq rv (dpb (send self ':receive-byte-from-fep) ppss rv))
        finally (return rv)))

(defmethod (parallel-port :receive-long-from-fep) ()
  (loop with rv = 0
        for ppss from #o0010 to #o3010 by #o1000
        do (setq rv (dpb (send self ':receive-byte-from-fep) ppss rv))
        finally (return rv)))

(defmethod (parallel-port :receive-nbytes-from-fep) (nbytes)
  (loop with rval = 0
        repeat nbytes
        for ppss upfrom #o0010 by #o1000
        do (setq rval (dpb (send self ':receive-byte-from-fep) ppss rval))
        finally (return rval)))

(defmethod (parallel-port :pp-transact) (word &aux resp)
  (write-ppr 0)
  (loop repeat 10000.
        when (zerop (read-ppr)) return nil
        finally (ferror "Fep appears to be dead."))
  (write-ppr (ldb #o0017 word))
  (write-ppr (logior 1_15. word))
  (loop repeat 10000.
        when (bit-test 1_15. (read-ppr)) return nil
        finally (ferror "Fep appears to be dead."))
  (setq resp (read-ppr))
  (write-ppr 0)
  (if *trace* (format t "~&Out ~O. In ~O." word resp))
  (values resp (ldb #o1403 resp)))
(defmethod (parallel-port :talk) ()
  (loop for ppr = (read-ppr)
        do (if (bit-test 1_15. ppr)
               (cond ((= (ldb #o1403 ppr) 3)
                      (tyo (ldb #o0010 ppr))
                      (write-ppr 0)
                      (process-wait "PP wait" #'(lambda () (not (bit-test 1_15. (read-ppr)))))
                      (write-ppr -1))
```

```
                          (t (Format T "~&Non character data parallel port command.  I quit.")
                             (return)))
                  (write-ppr -1)
                  (process-wait "PP wait" #'(lambda () (bit-test 1_15. (read-ppr))))))
;This is the "old" protocol that talks over the parallel port.
;Included now just because it's fast.
; Protocol to bootstrap program in FEP EPROM, using the 16-bit parallel port.
;
; Each machine presents the other machine with 16 bits, consisting of 15 data
; bits and 1 sync bit.  A 4-way handshake is implemented using the sync bits.
; When the sync bit is 1, the remaining 15 bits of data are valid; note that
; it is necessary to re-read the data bits after discovering that the sync bit
; is 1, since the hardware does no deskewing.
;
; The word from the LM-2 consists of 3 command bits and 12 data bits.  The
; word from the FEP contains just 8 data bits, except that when the response
; is "echo" the FEP echos back all 15 bits from the LM-2.  Commands are as follows:
;
;       Command Data            Response        Meaning
;       0       addr <11:0>                     Read lbus
;       1       addr <11:0>     data <7:0>      Do a byte read into the "data" reg. Return
;                                               the byte
;       2       addr <11:0>     data <7:0>      Do a word read into the "data" reg. Return
;                                               the low byte.
;       3       addr <11:0>     success         Write byte
;       4       addr <11:0>     success         Write word
;       5       addr <23:12>    success         Store data in bits <23:12> of "addr" reg.
;       6                                       Extended command, bits <11:8> are sub-command
;         0     ignore          reset           Reset the program (and the 68K and SP)
;         1     ignore                          Return low byte of read data (after cmd 2)
;         2     ignore          data <15:8>     Return high byte of read data (after cmd 2)
;         3     data <7:0>      success         Store low byte of write-data
;         4     data <7:0>      success         Store high byte of write-data
;       7                       cmd error       Unassigned
;
; FEP responses are of the form "1 7-bits-of-response-code 8-bits-of-code-dependant-data"
;      Code     Means
;      1        Normal completetion
;      2        Normal completetion with return data in <7:0>
;      3        Jump response.
;      4        Lbus read response
;      10       RESET
;      11       Command error
;      12       Bus error
;      13       Address error
;      14       Some trap or interrupt
; The state of the bootstrap is kept in the following registers
;     resp      This contains the word to write to the parallel port.  Usually is the
;               response to the last command
;     cmnd      This contains the last command read from the parallel port.
;     addr      This contains the "address" from which to read, or to which to write
;     data      This contains the last word read, or data to write.
;
; The 4-way handshake works as follows:
; In the idle state both sync bits are 0.
; The LM-2 sends a command and sets its sync bit to 1.
; The FEP sees the sync bit, performs the command, sends a response,
; and sets its sync bit to 1.
; The LM-2 sees the response, copies the data, and clears its sync bit.
; The FEP sees the LM-2's sync bit clear so it clears its own and looks
; for another command.
; The LM-2 sees the FEP's sync bit clear so it returns and is ready
; to issue another command.

(defflavor expedient-parallel-port-mixin () ())

(defconst *fep-command-response-codes*
  '((1 "Normal completion")
    (2 "Normal completion with return data")
    (3 "Jump response")
```

```
    (10 "RESET")
    (11 "Command error")
    (12 "Bus error")
    (13 "Address error")
    (14 "Random trap or interrupt")))

(defun expedient-fep-command (opcode &optional (data 0) error-ok)
  (declare (return-list value status-code))
  (let ((cmd (logior (dpb opcode (byte 3 12.) data) 1_15.)) resp)
    ;; First make sure we ACK the last command
    (loop while (bit-test 1_15. (read-ppr))
          do (write-ppr 0))
    ;; Now feed it the command -- first with the valid data strobe bit off (preset the bus)
    (write-ppr (ldb (byte 15. 0) cmd))
    (write-ppr cmd)              ; Now with valid data strobe on
    ;; Wait for a response, grab it, and acknowledge it
    (loop until (bit-test 1_15. (read-ppr)))
    (setq resp (read-ppr))
    (write-ppr 0)
    (loop while (bit-test 1_15. (read-ppr)))
    ;; Analyze response for errors
    (let ((value (ldb (byte 8 0) resp))
          (status-code (ldb (byte 7 8) resp)))
      (unless (≤ status-code 7)
        (or error-ok
            (fsignal "FEP ~A error"
                     (or (cadr (assq status-code *fep-command-response-codes*))
                         "unrecognized"))))
      (values value status-code))))

(defun expedient-fep-extended-command (opcode &optional (data 0) error-ok)
  (expedient-fep-command 6 (dpb opcode (byte 3 8) (ldb (byte 8 0) data)) error-ok))

(defun expedient-fep-addr-setup (addr)
  (setq addr (ldb (byte 12. 12.) addr))
  (expedient-fep-command 5 addr))

(defmethod (parallel-port :read-byte) (addr)
  (expedient-fep-addr-setup addr)
  (expedient-fep-command 1 addr))

;Will get error from 68000 if address not even
(defmethod (expedient-parallel-port-mixin :read-word) (addr)
  (expedient-fep-addr-setup addr)
  (let ((low (expedient-fep-command 2 addr)))
    (dpb (expedient-fep-extended-command 2) (byte 8 8) low)))

(defmethod (expedient-parallel-port-mixin :write-byte) (addr val)
  (expedient-fep-addr-setup addr)
  (expedient-fep-extended-command 3 val)
  (expedient-fep-command 3 addr))

;Will get error from 68000 if address not even
(defmethod (expedient-parallel-port-mixin :write-word) (addr val)
  (expedient-fep-addr-setup addr)
  (expedient-fep-extended-command 3 val)
  (expedient-fep-extended-command 4 (ldb (byte 8 8) val))
  (expedient-fep-command 4 addr))

(defmethod (expedient-parallel-port-mixin :read-lbus) (addr)
  (expedient-fep-addr-setup addr)
  (multiple-value-bind (high-6 code) (expedient-fep-command 0 addr)
    (if (= code 4) (ferror "Bad code ~O returned by expedient lbus read.  Wrong prom?") code)
    (write-ppr 1_15.)    ;request the next 15 bits
    (loop until (bit-test 1_15. (read-ppr)))
    (setq high-6 (dpb (read-ppr) #o1717 (ash high-6 30.)))
    (write-ppr 0)
    (loop until (not (bit-test 1_15. (read-ppr))))
    (write-ppr 1_15.)    ;request the last 15 bits.
    (loop until (bit-test 1_15. (read-ppr)))
    (setq high-6 (dpb (read-ppr) #o0017 high-6))
    (write-ppr 0)
    high-6))
```

F:>lmach>fep>Remote-Lcons.lisp.14

```
;;; -*- Mode: LISP; Package: LIL; Base: 8; Lowercase: t -*-

;;; These two macros corrispond to macros in the lil code that implement the various
;;; requests.  The protocol is packet oriented (though the parallel-port and ethernet
;;; implementations differ).  Since the "debugging" machine is the "master" the
;;; protocol is not symmetric.  The actual details of the protocol are handled by
;;; the protocol driver.  At this level, there are two types of commands.  Read commands
;;; consist only of a "header".  The FEP is expected to respond with a packet that
;;; contains the read data.  A write command sends a two segment packet.  The header
;;; segment passes the address and length of the data.  The data segment follows.
;;; The reason for this is so the header can be checksummed separatly.

(defmacro fep-r-command (name args &body body)
  (multiple-value-bind (opcode length array code) (crack-fep-command-args name args)
    `(progn
       ,@(subst '',array 'array (nreverse code))
       (send self ':send-single-part-message-to-fep ',array 0 ,length)
       (send self ':receive-message-from-fep ,opcode)
       (prog1 (progn ,@body)
              (send self ':finish-receiving-message-from-fep)))))

(defmacro fep-w-command (name args &body body)
  (multiple-value-bind (opcode length array code) (crack-fep-command-args name args)
    (ignore opcode)
    `(progn
       ,@(subst '',array 'array (nreverse code))
       (send self ':send-message-header-to-fep ',array 0 ,length)
       ,@body
       (send self ':finish-sending-message-to-fep))))
;;; Basic-fep-access only provides direct access to the FEP address space and
;;; by including image-debug-mixin, makes debugging FEP programs somewhat easier.
;;; This flavor may be instantiated alone as a loader/debugger interface, or
;;; mixed with higher level flavors that use it to access the L-machine.
;;; This flavor implements the messages required of an "image" and hence can
;;; be used to receive the output of link-68k.

(defflavor basic-fep-access () (user:image-symbols-mixin user:image-debug-mixin)
  (:required-methods :receive-byte-from-fep :debug))

;;; First define the basic read/write byte/word/long methods
(defmethod (basic-fep-access :write-byte) (address byte)
  (fep-w-command write-bytes ((1 addr) (address addr))
    (send self ':send-byte-to-fep byte)))

(defmethod (basic-fep-access :read-byte) (address)
  (fep-r-command read-bytes ((1 addr) (address addr))
    (send self ':receive-byte-from-fep)))

(defmethod (basic-fep-access :write-word) (address word)
  (fep-w-command write-words ((1 addr) (address addr))
    (send self ':send-word-to-fep word)))

(defmethod (basic-fep-access :read-word) (address)
  (fep-r-command read-words ((1 addr) (address addr))
    (send self ':receive-word-from-fep)))

(defmethod (basic-fep-access :read-long) (addr)
  (let ((hi (send self ':read-word addr))
        (lo (send self ':read-word (+ addr 2))))
    (logior (ash hi 16.) lo)))

(defmethod (basic-fep-access :write-long) (addr long)
  (send self ':write-word addr (ldb #o2020 long))
  (send self ':write-word (+ addr 2) (ldb #o0020 long)))

(defmethod (basic-fep-access :goto) (address)
  (send self ':abort-to-fep)
```

```
  (send self ':send-word-to-fep (fep-op-number-from-name 'goto))
  (send self ':send-addr-to-fep address)
  (send self ':finish-sending-message-to-fep))

;;; Now define the block-mode read/write byte/word methods
(defmethod (basic-fep-access :write-bytes) (arry index addr nbytes)
  (fep-w-command write-bytes ((nbytes addr) (addr addr))
    (send self ':send-byte-array-to-fep arry index nbytes)))

(defmethod (basic-fep-access :read-bytes) (arry index addr nbytes)
  (fep-r-command read-bytes ((nbytes addr) (addr addr))
    (send self ':receive-byte-array-from-fep arry index nbytes)))

(defmethod (basic-fep-access :write-words) (arry index addr nwds)
  (let* ((nbytes (+ nwds nwds))
         (barray (make-array (+ nbytes index index) ':type 'art-8b ':displaced-to arry)))
    (fep-w-command write-words ((nwds addr) (addr addr))
      (send self ':send-byte-array-to-fep barray (* index 2) nbytes))))

(defmethod (basic-fep-access :read-words) (arry index addr nwds)
  (let* ((nbytes (+ nwds nwds))
         (barray (make-array nbytes ':type 'art-8b ':displaced-to arry)))
    (fep-r-command read-words ((nwds addr) (addr addr))
      (send self ':receive-byte-array-from-fep barray (* index 2) nbytes))))

(defmethod (basic-fep-access :read-fep-program-version) ()
  (fep-r-command read-version ()
    (let ((prom-p (send self ':receive-word-from-fep))
          (version (send self ':receive-long-from-fep)))
      (list prom-p version))))
;;; This is a copy of the omnibyte-image debugger.  The differences are that
;;; the fep puts it's stack in a different place, and that the traps are trap numbers
;;; and not trap addresses.
(defmethod (basic-fep-access :why) (&optional (rg #o400000) (sb #o406000))
  (format t "~2&")
  (let* ((fp (send self ':read-long (+ rg 70)))
         (sp (send self ':read-long (+ rg 74)))
         (trapn (send self ':read-word (+ rg 100))))

    (loop for reg in '(D0 D4 A0 A4)
          with loc = rg
          do (format t "~&      ~A  =" reg)
             (loop repeat 4
                   do (format t "~13O" (send self ':read-long loc))
                      (incf loc 4)))

    (format t "~2&Sp = ~O,  Fp = ~O,  " sp fp)
    (cond ((or (= trapn 2) (= trapn 3))
           (if (= trapn 2) (format t "Bus error") (format t "Address error"))
           (format t "~&Trap block Fcn = ~O,  Addr = ~O,  Ir = ~O,  Sts = ~O,  Pc = ~A(=~O)"
                   (send self ':read-word sp)
                   (send self ':read-long (+ sp 2))     ;access addr
                   (send self ':read-word (+ sp 6))     ;ir
                   (send self ':read-word (+ sp 8))     ;sts
                   (send self ':symbolic-address
                         (send self ':read-long (+ sp 10.)) 200)
                   (send self ':read-long (+ sp 10.)))  ;pc
           (incf sp 14.))                               ;account for 7 wds of stuff on stack
          ((and (≥ trapn 4) (≤ trapn 11.))
           (format t "~A" (nth (- trapn 4)
                               '("Illegal insn" "Zero div" "CHK insn" "trapv insn"
                                 "Priv violation" "Trace" "op 1010 trap" "op 1111 trap")))
           (format t "~&Trap data Sts = ~O,  Pc = ~A(=~O)"
                   (send self ':read-word sp)
                   (send self ':symbolic-address (send self ':read-long (+ sp 2)) 200)
                   (send self ':read-long (+ sp 2)))
           (incf sp 6.))
          ((= trapn 0)
           (Format t "No trap taken..."))
          (t (format t "Unknown trap = ~O." trapn)))
```

```
;; Loop over all frames
(loop while (< sp sb)
      do (if (or (< fp sp) (≥ fp sb))
             (return (format t "~&Screwed up stack ... Sp = ~O, Fp = ~O, Sb = ~O"
                          sp fp sb)))
         (let* ((rts (send self ':read-long (+ fp 4)))
                (nfp (send self ':read-long fp)))
           ;; Try to print out the name of the function this frame belongs to.
           (if (or (and (> rts #o4004) (< rts #o10000))
                   (and (> rts #o400004) (< rts #o1000000)))
               (format t "~2&Frame for fcn ~A:"
                       (send self ':symbolic-address
                             (send self ':read-long (- rts 4)) 200))
             (format t "~2&Frame for unknown function:"))
           ;; Loop over all word in the frame
           (loop until (≥ sp fp)
                 for wd = (send self ':read-word sp)
                 for lg = (send self ':read-long sp)
                 do (format t "~&~2X~12O: ~7O" sp wd)
                    (if (< sp (- fp 2))
                        (format t "  ~12O" lg))
                    (incf sp 2))

           ;; Now print the fp & rts linkage words
           (format t "~&~11XNfp: ~O" nfp)
           (format t "~&~11XRts:    ~O" (send self ':symbolic-address  rts 200))
           (setq sp (+ fp 8)
                 fp nfp)))
(format t "~&")))
;;; An instance of a smart-fep knows how to talk to a fep program that can access
;;; most of the L-Machine registers and datapaths directly.

(defflavor smart-fep-mixin () (basic-fep-access))

(defmethod (smart-fep-mixin :write-lbus) (addr word)
  (fep-w-command write-lbus ((addr long))
    (send self ':send-long-to-fep word)
    (send self ':send-byte-to-fep (ldb #o4004 word))))

(defmethod (smart-fep-mixin :read-lbus) (addr)
  (fep-r-command read-lbus ((addr long))
    (let ((wd (send self ':receive-long-from-fep)))
      (dpb (send self ':receive-byte-from-fep) #o4004 wd))))

(defmethod (smart-fep-mixin :write-lbus-and-ecc) (addr word)
  (fep-w-command write-lbus-and-ecc ((addr long))
    (send self ':send-long-to-fep word)
    (send self ':send-word-to-fep (ldb #o4014 word))))

(defmethod (smart-fep-mixin :read-lbus-and-ecc) (addr)
  (fep-r-command read-lbus-and-ecc ((addr long))
    (let ((wd (send self ':receive-long-from-fep)))
      (dpb (send self ':receive-word-from-fep) #o4014 wd))))

(defmethod (smart-fep-mixin :write-lbus-block) (arry index addr nwords)
  (if (oddp nwords) (ferror nil "Odd word count to write-lmem wont work"))
  (fep-w-command write-lbus-block ((nwords addr) (addr addr))
    (loop for i from index below (+ nwords index) by 2
          for wd1 = (aref arry i)
          for wd2 = (aref arry (1+ i))
          do (send self ':send-long-to-fep wd1)
             (send self ':send-byte-to-fep (dpb (logand wd2 #o17) #o0404 (ash wd1 -32.)))
             (send self ':send-long-to-fep (ash wd2 -4.)))))

(defmethod (smart-fep-mixin :read-lbus-block) (arry index addr nwords)
  (if (oddp nwords) (ferror nil "odd word count"))
  (fep-r-command read-lbus-block ((nwords addr) (addr addr))
    (loop for i from index below (+ nwords index) by 2
          for tl = (send self ':receive-long-from-fep)
          for tb = (send self ':receive-byte-from-fep)
          do (setf (aref arry i) (dpb tb #o4004 tl))
             (setq tl (send self ':receive-long-from-fep))
             (setf (aref arry (1+ i)) (dpb (lsh tb -4) #o0004 (ash tl 4))))))
```

```
;;; Support for Load a world load

(defmethod (smart-fep-mixin :lbus-write-from-stream) (nwords address stream)
  (if (bit-test nwords 3) (ferror nil "Bad word count."))
  (fep-w-command write-lbus-block ((nwords addr) (address addr))
    (loop with wds-left = (// (* nwords 9) 4)
          until (zerop wds-left)
          do (multiple-value-bind (buf index wd-cnt) (send stream ':get-input-buffer)
               (let* ((length (* (+ index wd-cnt) 2))
                      (d-array (cond ((not (si:array-indexed-p buf))
                                      (make-array length
                                                  ':type 'art-8b
                                                  ':displaced-to buf))
                                     (t
                                      (make-array length
                                                  ':type 'art-8b
                                                  ':displaced-to (si:array-indirect-to buf)
                                                  ':displaced-index-offset
                                                  (* 2 (si:array-index-offset buf))))))
                      (wds-this-whack (min wds-left wd-cnt)))
                 ;; (format t "~&Wds this whack = ~d." wds-this-whack)
                 (send self ':send-byte-array-to-fep
                       d-array (* index 2) (* 2 wds-this-whack))
                 (send stream ':advance-input-buffer (+ index wds-this-whack))
                 (decf wds-left wds-this-whack))))))

(declare (special lcons:*cached-page-size*))
(defconst bytes-per-page (// (* 9 lcons:*cached-page-size*) 2))
(defconst words-per-page (// bytes-per-page 2))
(defconst *lmem-read-byte-array* (make-array bytes-per-page
                                             ':type 'art-8b))
(defconst *lmem-read-word-array* (make-array words-per-page
                                             ':type ':art-16b
                                             ':displaced-to *lmem-read-byte-array*
                                             ':leader-list '(0)))

(defmethod (smart-fep-mixin :write-lbus-page-to-stream) (page stream)
  (fep-r-command read-lbus-block ((lcons:*cached-page-size* addr)
                  ((* page lcons:*cached-page-size*) addr))
    (send self ':receive-byte-array-from-fep
          *lmem-read-byte-array* 0 bytes-per-page))
  (setf (fill-pointer *lmem-read-word-array*) words-per-page)
  (funcall stream ':string-out *lmem-read-word-array*))
(defmethod (smart-fep-mixin :read-fixnums) (address wd-array)
  (let* ((nwords (array-active-length wd-array))
         (nnums (// nwords 2))
         (nbytes (* nnums 4))
         (barray (make-array nbytes ':type 'art-8b ':displaced-to wd-array)))
    (fep-r-command read-fixnums ((nnums word) (address addr))
      (send self ':receive-byte-array-from-fep
            barray 0 nbytes))
    wd-array))

(defmethod (smart-fep-mixin :write-fixnums) (address wd-array)
  (let* ((nwords (array-active-length wd-array))
         (nnums (// nwords 2))
         (nbytes (* nnums 4))
         (barray (make-array nbytes ':type 'art-8b ':displaced-to wd-array)))
;    (if (oddp nwords) (ferror nil "Fixnum packet not an integral number of words long"))
    (fep-w-command write-fixnums ((nnums word) (address addr))
      (send self ':send-byte-array barray 0 nbytes))
    wd-array))


;(defun zero-lbus-block (addr leng)
;  (if (bit-test leng 1) (Ferror nil "Zero-lbus-block must be given an even # of words."))
;  (with-new-protocol
;    (fep-w-command 130 ((leng addr) (addr addr))
;      (loop repeat (ash leng -1)
;            do (setq *checksum* (sys:%send-bytes *parallel-port-address*
;                                                 *checksum* 9
```

```
;                                           '#.(make-array 9 ':type ':art-8b) 0))))))
;
;;barf
;(defvar ones-array (make-array 9 ':type ':art-8b))
;(si:fill-array ones-array 9 -1)
;
;(defun ones-lbus-block (addr leng)
;  (if (bit-test leng 1) (Ferror nil "Ones-lbus-block must be given an even # of words."))
;  (with-new-protocol
;    (fep-w-command 130 ((leng addr) (addr addr))
;      (loop repeat (ash leng -1)
;            do (setq *checksum* (sys:%send-bytes *parallel-port-address*
;                                                 *checksum* 9 ones-array 0))))))
;(defmethod (smart-fep-mixin :write-cmem-wd) (wd)
;  (fep-w-command write-cmem-wd ()
;    (loop repeat 14.
;          for ppss upfrom #o0010 by #o1000
;          do (send self ':send-byte-to-fep (ldb ppss wd)))))

(defmethod (smart-fep-mixin :read-uir) ()
  (fep-r-command read-uir ()
    (loop repeat 14.
          with result = 0
          for ppss upfrom #o0010 by #o1000
          do (setq result (dpb (send self ':receive-byte-from-fep) ppss result))
          finally (return result))))

(defmethod (smart-fep-mixin :write-uir) (wd)
  (fep-w-command write-uir ()
    (loop repeat 14.
          for ppss upfrom #o0010 by #o1000
          do (send self ':send-byte-to-fep (ldb ppss wd)))))

(defmethod (smart-fep-mixin :write-cmem) (addr wd)
  (fep-w-command write-cmem ((1 word) (addr word))
    (loop repeat 14.
          for ppss upfrom #o0010 by #o1000
          do (send self ':send-byte-to-fep (ldb ppss wd)))))

(defmethod (smart-fep-mixin :write-cmem-and-parity) (addr wd)
  (fep-w-command write-cmem-and-parity ((1 word) (addr word))
    (loop repeat 14.
          for ppss upfrom #o0010 by #o1000
          do (send self ':send-byte-to-fep (ldb ppss wd)))))

(defmethod (smart-fep-mixin :write-cmem-block) (arry index start nwds)
  (fep-w-command write-cmem ((nwds word) (start word))
    (loop for i from index below (+ index nwds)
          for wd = (aref arry i)
          do (loop repeat 14.
                   for ppss upfrom #o0010 by #o1000
                   do (send self ':send-byte-to-fep (ldb ppss wd))))))

(defmethod (smart-fep-mixin :read-cmem) (addr)
  (fep-r-command read-cmem ((1 word) (addr word))
    (loop repeat 14.
          with result = 0
          for ppss upfrom #o0010 by #o1000
          do (setq result (dpb (send self ':receive-byte-from-fep) ppss result))
          finally (return result))))

(defmethod (smart-fep-mixin :read-cmem-block) (arry index start nwds)
  (fep-r-command read-cmem ((nwds word) (start word))
    (loop for i from index below (+ index nwds)
          do (loop repeat 14.
                   with result = 0
                   for ppss upfrom #o0010 by #o1000
                   do (setq result (dpb (send self ':receive-byte-from-fep) ppss result))
                   finally (setf (aref arry i) result)))))

(defmethod (smart-fep-mixin :write-amem) (addr val)
```

```
  (fep-w-command write-amem ((1 word) (addr word))
    (loop repeat 5
          for ppss upfrom #o0010 by #o1000
          do (send self ':send-byte-to-fep (ldb ppss val)))))

(defmethod (smart-fep-mixin :write-amem-block) (arry index addr nwds)
  (fep-w-command write-amem ((nwds word) (addr word))
    (loop for i from index below (+ index nwds)
          for val = (aref arry i)
          do (loop repeat 5
                   for ppss upfrom #o0010 by #o1000
                   do (send self ':send-byte-to-fep (ldb ppss val))))))
(defmethod (smart-fep-mixin :read-amem) (addr)
  (fep-r-command read-amem ((1 word) (addr word))
    (loop repeat 5
          with result = 0
          for ppss upfrom #o0010 by #o1000
          do (setq result (dpb (send self ':receive-byte-from-fep) ppss result))
          finally (return result))))

(defmethod (smart-fep-mixin :read-amem-and-parity) (addr)
  (fep-r-command read-amem-and-parity ((1 word) (addr word))
    (loop repeat 5
          with result = 0
          for ppss upfrom #o0010 by #o1000
          do (setq result (dpb (send self ':receive-byte-from-fep) ppss result))
          finally (return result))))

(defmethod (smart-fep-mixin :read-amem-block) (arry index addr nwds)
  (fep-r-command read-amem ((nwds word) (addr word))
    (loop for i from index below (+ index nwds)
          do (loop repeat 5
                   with result = 0
                   for ppss upfrom #o0010 by #o1000
                   do (setq result (dpb (send self ':receive-byte-from-fep) ppss result))
                   finally (setf (aref arry i) result)))))

(defmethod (smart-fep-mixin :write-bmem) (addr val)
  (fep-w-command write-bmem ((1 word) (addr word))
    (loop repeat 5
          for ppss upfrom #o0010 by #o1000
          do (send self ':send-byte-to-fep (ldb ppss val)))))

(defmethod (smart-fep-mixin :write-bmem-block) (arry index addr nwds)
  (fep-w-command write-bmem ((nwds word) (addr word))
    (loop for i from index below (+ index nwds)
          for val = (aref arry i)
          do (loop repeat 5
                   for ppss upfrom #o0010 by #o1000
                   do (send self ':send-byte-to-fep (ldb ppss val))))))

(defmethod (smart-fep-mixin :read-bmem) (addr)
  (fep-r-command read-bmem ((1 word) (addr word))
    (loop repeat 5
          with result = 0
          for ppss upfrom #o0010 by #o1000
          do (setq result (dpb (send self ':receive-byte-from-fep) ppss result))
          finally (return result))))

(defmethod (smart-fep-mixin :read-bmem-and-parity) (addr)
  (fep-r-command read-bmem-and-parity ((1 word) (addr word))
    (loop repeat 5
          with result = 0
          for ppss upfrom #o0010 by #o1000
          do (setq result (dpb (send self ':receive-byte-from-fep) ppss result))
          finally (return result))))

(defmethod (smart-fep-mixin :read-bmem-block) (arry index addr nwds)
  (fep-r-command read-bmem ((nwds word) (addr word))
    (loop for i from index below (+ index nwds)
          do (loop repeat 5
```

```
                    with result = 0
                    for ppss upfrom #o0010 by #o1000
                    do (setq result (dpb (send self ':receive-byte-from-fep) ppss result))
                    finally (setf (aref arry i) result)))))

(defmethod (smart-fep-mixin :write-type-map) (addr val)
  (fep-w-command write-type-map ((1 word) (addr word)) (send self ':send-byte-to-fep val)))

(defmethod (smart-fep-mixin :write-type-map-and-parity) (addr val)
  (fep-w-command write-type-map-and-parity ((1 word) (addr word))
    (send self ':send-byte-to-fep val)))
(defmethod (smart-fep-mixin :write-type-map-block) (arry index addr nwds)
  (fep-w-command write-type-map ((nwds word) (addr word))
    (send self ':send-byte-array-to-fep arry index nwds)))

(defmethod (smart-fep-mixin :read-type-map) (addr)
  (fep-r-command read-type-map ((1 word) (addr word)) (send self ':receive-byte-from-fep)))

(defmethod (smart-fep-mixin :read-type-map-block) (arry index addr nwds)
  (fep-r-command read-type-map ((nwds word) (addr word))
    (send self ':receive-byte-array-from-fep arry index nwds)))

(defmethod (smart-fep-mixin :write-gc-map) (addr val)
  (fep-w-command write-gc-map ((1 word) (addr word)) (send self ':send-byte-to-fep val)))

(defmethod (smart-fep-mixin :write-gc-map-and-parity) (addr val)
  (fep-w-command write-gc-map-and-parity ((1 word) (addr word))
    (send self ':send-byte-to-fep val)))

(defmethod (smart-fep-mixin :read-gc-map) (addr)
  (fep-r-command read-gc-map ((1 word) (addr word)) (send self ':receive-byte-from-fep)))

(defmethod (smart-fep-mixin :write-cpc) (val)
  (fep-w-command write-cpc () (send self ':send-long-to-fep val)))

(defmethod (smart-fep-mixin :read-cpc) ()
  (fep-r-command read-cpc () (send self ':receive-long-from-fep)))

(defmethod (smart-fep-mixin :write-npc) (val)
  (fep-w-command write-npc () (send self ':send-long-to-fep val)))

(defmethod (smart-fep-mixin :read-npc) ()
  (fep-r-command read-npc () (send self ':receive-long-from-fep)))

(defmethod (smart-fep-mixin :write-byte-r) (val)
  (fep-w-command write-byte-r () (send self ':send-byte-to-fep val)))

(defmethod (smart-fep-mixin :read-byte-r) ()
  (fep-r-command read-byte-r () (send self ':receive-byte-from-fep)))

(defmethod (smart-fep-mixin :write-byte-s) (val)
  (fep-w-command write-byte-s () (send self ':send-byte-to-fep val)))

(defmethod (smart-fep-mixin :read-byte-s) ()
  (fep-r-command read-byte-s () (send self ':receive-byte-from-fep)))

(defmethod (smart-fep-mixin :write-stack-pointer) (val)
  (fep-w-command write-stack-pointer () (send self ':send-long-to-fep val)))

(defmethod (smart-fep-mixin :read-stack-pointer) ()
  (fep-r-command read-stack-pointer () (send self ':receive-long-from-fep)))

(defmethod (smart-fep-mixin :write-frame-pointer) (val)
  (fep-w-command write-frame-pointer () (send self ':send-long-to-fep val)))

(defmethod (smart-fep-mixin :read-frame-pointer) ()
  (fep-r-command read-frame-pointer () (send self ':receive-long-from-fep)))

(defmethod (smart-fep-mixin :write-xbas) (val)
  (fep-w-command write-xbas () (send self ':send-long-to-fep val)))
```

```
(defmethod (smart-fep-mixin :read-xbas) ()
  (fep-r-command read-xbas () (send self ':receive-long-from-fep)))

(defmethod (smart-fep-mixin :read-obus) ()
  (fep-r-command read-obus () (send self ':receive-nbytes-from-fep 5)))

(defmethod (smart-fep-mixin :write-md) (val)
  (fep-w-command write-md () (send self ':send-nbytes-to-fep 5 val)))

(defmethod (smart-fep-mixin :read-md) ()
  (fep-r-command read-md () (send self ':receive-nbytes-from-fep 5)))
(defmethod (smart-fep-mixin :write-vma) (val)
  (fep-w-command write-vma () (send self ':send-long-to-fep val)))

(defmethod (smart-fep-mixin :read-vma) ()
  (fep-r-command read-vma () (send self ':receive-long-from-fep)))

(defmethod (smart-fep-mixin :write-pc) (val)
  (fep-w-command write-pc () (send self ':send-long-to-fep val)))

(defmethod (smart-fep-mixin :read-pc) ()
  (fep-r-command read-pc () (send self ':receive-long-from-fep)))

(defmethod (smart-fep-mixin :read-asn) ()
  (fep-r-command read-asn () (send self ':receive-long-from-fep)))

(defmethod (smart-fep-mixin :read-crocks) (addr)
  (fep-r-command read-crocks ((addr long)) (send self ':receive-long-from-fep)))

(defmethod (smart-fep-mixin :reset-lbus) () (fep-w-command reset-lbus nil))
(defmethod (smart-fep-mixin :reset-3600) () (fep-w-command reset-3600 nil))

(defmethod (smart-fep-mixin :read-lbus-board-id) (board loc)
  (fep-r-command read-lbus-board-id ((board byte) (loc byte))
    (send self ':receive-byte-from-fep)))

(defmethod (smart-fep-mixin :read-fep-board-id) (loc)
  (fep-r-command read-fep-board-id ((loc byte))
    (send self ':receive-byte-from-fep)))

(defmethod (smart-fep-mixin :read-fep-paddle-id) (loc)
  (fep-r-command read-fep-paddle-id ((loc byte))
    (send self ':receive-byte-from-fep)))

(defmethod (smart-fep-mixin :read-opc) (n)
  (fep-r-command read-opc ((n word)) (send self ':receive-word-from-fep)))

(defmethod (smart-fep-mixin :read-ctos) ()
  (fep-r-command read-ctos () (send self ':receive-long-from-fep)))

(defmethod (smart-fep-mixin :write-cur-task) (task)
  (fep-w-command write-cur-task () (send self ':send-word-to-fep task)))

(defmethod (smart-fep-mixin :read-cur-task) ()
  (fep-r-command read-cur-task () (send self ':receive-word-from-fep)))

(defmethod (smart-fep-mixin :write-cstk) (addr val)
  (fep-w-command write-cstk ((addr word)) (send self ':send-word-to-fep val)))

(defmethod (smart-fep-mixin :write-cstk-and-parity) (addr val)
  (fep-w-command write-cstk-and-parity ((addr word)) (send self ':send-word-to-fep val)))

(defmethod (smart-fep-mixin :read-cstk) (addr)
  (fep-r-command read-cstk ((addr word)) (send self ':receive-long-from-fep)))

(defmethod (smart-fep-mixin :write-csp) (csp)
  (fep-w-command write-csp () (send self ':send-long-to-fep csp)))

(defmethod (smart-fep-mixin :read-csp) ()
  (fep-r-command read-csp () (send self ':receive-long-from-fep)))
```

```
(defmethod (smart-fep-mixin :start-machine) ()
  (fep-w-command start-machine ()))

(defmethod (smart-fep-mixin :step-machine) (ntimes)
  (fep-w-command step-machine ((ntimes word))))

(defmethod (smart-fep-mixin :stop-machine) ()
  (fep-w-command stop-machine ()))

(defmethod (smart-fep-mixin :restore-state) ()
  (fep-w-command restore-state ()))

(defmethod (smart-fep-mixin :discard-state) ()
  (fep-w-command discard-state ()))

(defmethod (smart-fep-mixin :write-comm-var) (var value)
  (fep-w-command write-comm-var ((var word) (value long))))

(defmethod (smart-fep-mixin :read-comm-var) (var)
  (fep-r-command read-comm-var ((var word)) (send self ':receive-long-from-fep)))
;;; Support for the kludge.

(defmethod (smart-fep-mixin :kludge-query-status) (&aux stoppedp chars-availablep
                                                       normal-char-request-count
                                                       mini-char-request-count)
  (fep-r-command kludge-status ()
    (setq stoppedp (not (zerop (send self ':receive-byte-from-fep)))
          chars-availablep (not (zerop (send self ':receive-byte-from-fep)))
          normal-char-request-count (send self ':receive-word-from-fep)
          mini-char-request-count (send self ':receive-word-from-fep)))
  (setq stoppedp (lcons:machine-stopped-p))     ;for now...
  (values stoppedp chars-availablep normal-char-request-count mini-char-request-count))


;;; This reads n 32 bits numbers from the FEP
(defmethod (smart-fep-mixin :kludge-receive-input-characters) (arry)
  (setf (fill-pointer arry) 0)                  ;no chars to start with
  (fep-r-command kludge-receive-chars ()
    (loop repeat (send self ':receive-word-from-fep)
          do (array-push arry (send self ':receive-long-from-fep)))))

;;; This sends a single 32 bit number to the fep
(defmethod (smart-fep-mixin :kludge-send-kludge-char) (char)
  (fep-w-command send-kludge-char ((1 word))
    (send self ':send-long-to-fep char)))

;;; This sends n 32 bit longs.  Array is ART-Q.
(defmethod (smart-fep-mixin :kludge-send-kludge-mini-longs) (arry offset nlongs)
  (fep-w-command send-kludge-mini-longs ((nlongs word))
    (loop for i from offset below (+ offset nlongs)
          do (send self ':send-long-to-fep (aref arry i)))))

;;; This sends 16 bit words.  barray is ART-8B.  It reads (* nwords 2) bytes
;;; from the array.

(defmethod (smart-fep-mixin :kludge-send-kludge-mini-words) (barray offset nwords)
  (fep-w-command send-kludge-mini-words ((nwords word))
    (send self ':send-byte-array-to-fep barray offset (* nwords 2))))

;;; This sends 8 bit bytes.
(defmethod (smart-fep-mixin :kludge-send-kludge-mini-bytes) (barray offset nbytes)
  (fep-w-command send-kludge-mini-bytes ((nbytes word))
    (send self ':send-byte-array-to-fep barray offset nbytes)))
;;; A parallel port

(defflavor Parallel-port-image () (expedient-parallel-port-mixin smart-fep-mixin
                                   basic-fep-access parallel-port))
```

```
F:>lmach>fep>load-world.lil.43
;;;-*- Mode: Lil; Package:Lil; Base:8.; Lowercase: T -*-

(include "Types-and-macros")
(include "fsm.EXT" "disk-raw.EXT" "disk.EXT" "fep-utils.EXT" "machine.EXT")

(external (fep-disk-select-unit string) ((unit word)))  ;in hsb

(external (microcode-read-disk-to-vma string) ((unit word) (dpn long) (page-count long)
                                               (starting-vma long)))

(define-sysconstants

  %%vma-equals-pma                          ;ppss in pointer
  %%config-board-type                       ;ppss in ID prom
   %config-memory-board                     ;value
   %config-io-board                         ;value
   %config-no-board                         ;value
  %%config-first-page                       ;ppss
  %%config-last-page                        ;ppss
  )

(define-sysdfl-atommacros

  (microcode-constants
    (nil %quote-nil)
    (t   %quote-t)
    )

  (a-memory-variables
    %wired-virtual-address-high
    %wired-physical-address-low
    %wired-physical-address-high
    )

  (fep-communication-area
    load-map-size                           ;0 for preload, n-load for instaboot
    load-map-address                        ;at top mem - 1 page
    load-map-dpn-address                    ;0 for preload, entries for instaboot

    swap-map-size                           ;set to 1 for now
    swap-map-address                        ;points to table with 60000. for now
    swap-map-dpn-address                    ;points to table with 64000. for now

    bad-memory-pages-size                   ;set to 0 for now
    bad-memory-pages-address                ;points to table of [count,ppn]
    )
  )

(defvar *inhibit-verify-sparse-load* boole false)
(defun init-load-world ()
  (setq initial-map-array (make-null-pointer load-map-array))
  (setq load-map-array    (make-null-pointer load-map-array))
  (setq *inhibit-verify-sparse-load* false)
  )

(defun (load-world string) ((unit word)
                            (filename string)
                            (insta-boot boole)
                            (maps-after-initial boole)
                            (use-microcode-for-disk-loading boole))
  (let ((error-message NULL-string)
        (fs NULL-file-stream))
    (setq boot-status (cond ((not (null (setq error-message (fep-disk-select-unit unit))))
                             bs-world-unit-select-error)
                            ((null (setq fs (open-file filename dm-36bit dd-read)))
                             (setq error-message "No file stream what-so-ever.")
                             bs-world-open-error)
                            ((not (null (progn (swapf (error-message fs) error-message)
                                               error-message)))
                             bs-world-open-error)
                            ((not (null (setq error-message
```

```
      (load-world-from-file-stream
                                          fs insta-boot maps-after-initial
                                          use-microcode-for-disk-loading))))
                             boot-status)
                            (T (load-world-epilogue)
                               (setq error-message "Load world request complete.")
                               bs-success)))
    (unless (null fs) (close-file-stream fs))
    error-message))

(defun (load-world-from-file-stream string) ((fs file-stream)
                                             (insta-boot boole)
                                             (maps-after-initial boole)
                                             (use-disk-microcode boole))
  (let* ((mic-major-version (disk-tyi-36-data fs))
         (load-world-version (disk-tyi-36-data fs))
         (n-sparse (disk-tyi-36-data fs))
         (n-initial (disk-tyi-36-data fs))
         (n-load (disk-tyi-36-data fs))
         (error-message NULL-string))
    (setq boot-status bs-world-file-verify-error)      ;will get reset if changes
    (cond ((not (≤ 0 n-sparse  6000.)) "Unbelievable number of sparse entries.")
          ((not (≤ 0 n-initial  100.)) "Unbelievable number of initial entries.")
          ((not (≤ 0 n-load    1000.)) "Unbelievable number of load entries.")
          ((not (null (setq error-message (load-sparse  fs n-sparse))))  error-message)
          ((not (null (setq error-message (get-load-maps fs n-initial n-load))))
           error-message)
          ((not (null (setq error-message
                            (load-from-map fs initial-map-array
                                           n-initial use-disk-microcode
                                           "Error loading initial system."))))
           error-message)
          ((and (not insta-boot)
                (not (null (setq error-message
                                 (load-from-map fs load-map-array
                                                n-load use-disk-microcode
                                                "Error preloading load.")))))
           error-message)
          ((not (null (setq error-message (setup-load-maps maps-after-initial
                                                           load-map-array
                                                           n-load
                                                           insta-boot))))
           error-message)
          (T NULL-string))))

(defun (load-sparse string) ((fs file-stream) (n-sparse long))
  (let ((old-filepos (read-filepos fs dm-36bit)))
    (loop repeat n-sparse
          as (vma long) = (disk-tyi-36-data fs)
          as (data lbus-word) = (disk-tyi-36 fs)
          do (with-spy-bus-grabbed (write-vmem vma data)))
    (unless *inhibit-verify-sparse-load*
      (set-filepos-and-mode fs old-filepos dm-36bit)
      (loop repeat n-sparse
            as (vma long) = (disk-tyi-36-data fs)
            as (data lbus-word) = (disk-tyi-36 fs)
            as (expected lbus-word) = (with-spy-bus-grabbed (read-vmem vma))
            when (or (≠ (data data) (data expected))
                     (≠ (ecc+high data) (logand #o17 (ecc+high expected))))
            return "Sparse load compare error."
            finally (return NULL-string)))
    ))

(defun (allocate-load-map load-map-array) ((n-entries long))
  (coerce load-map-array (fsm-allocate (* (word n-entries) (type-size load-map-entry)))))

(defun return-load-map ((lma load-map-array))
  (fsm-free (coerce long lma)))

(defun (get-load-maps string) ((fs file-stream) (n-initial long) (n-load long))
  (unless (null initial-map-array)
```

```
    (return-load-map initial-map-array)
    (setq initial-map-array (make-null-pointer load-map-array)))
  (unless (null load-map-array)
    (return-load-map load-map-array)
    (setq load-map-array (make-null-pointer load-map-array)))
  (let ((error-message NULL-string))
    (setq error-message
          (cond ((null (setq initial-map-array (allocate-load-map n-initial)))
                 "Couldn't allocate initial map array.")
                ((not (null (setq error-message
                                  (fill-in-load-map fs initial-map-array n-initial))))
                 error-message)
                ((null (setq load-map-array (allocate-load-map n-load)))
                 "Couldn't allocate load map array.")
                ((not (null (setq error-message
                                  (fill-in-load-map fs load-map-array n-load))))
                 error-message)
                (T NULL-string)))
    error-message))

(defun (fill-in-load-map string) ((fs file-stream) (lma load-map-array) (n-entries long))
  (loop for (i long) upfrom 0 below n-entries
        as (starting-vma long)     = (disk-tyi-36-data fs)
        as (number-of-words long)  = (disk-tyi-36-data fs)
        as (file-page-number long) = (disk-tyi-36-data fs)
        as (disk-page-number long) = (dpn (d&c-for-block fs file-page-number))
        if (bit-test #o377 starting-vma)
        return "Some starting VMA is not on a page boundary."
        if (bit-test #o377 number-of-words)
        return "Some number of load words is not a multiple of one page."
        if (= disk-page-number -1)
        return "Some load map specifies non-existent disk page."
        do (setf (starting-vma     (aref @lma i)) starting-vma)
           (setf (number-of-words  (aref @lma i)) number-of-words)
           (setf (file-page-number (aref @lma i)) file-page-number)
           (setf (disk-page-number (aref @lma i)) disk-page-number)
        finally (return NULL-string)))

(defun (load-from-map string) ((fs file-stream)
                               (load-map load-map-array)
                               (n-entries long)
                               (use-microcode boole)
                               (suggested-error-message-if-error string))
  (loop with (error-message string)
        for (i long) upfrom 0 below n-entries
        if (not (null (setq error-message
                            (do-one-load-set fs
                                             (starting-vma     (aref @load-map i))
                                             (number-of-words  (aref @load-map i))
                                             (file-page-number (aref @load-map i))
                                             use-microcode
                                             suggested-error-message-if-error))))
        return error-message
        finally (return NULL-string)
        ))

(defun (do-one-load-set string) ((fs file-stream)
                                 (starting-vma long)
                                 (number-of-words long)
                                 (file-page-number long)
                                 (use-microcode boole)
                                 (suggested-error-message-if-error string))
  (if use-microcode
      (loop with (number-of-pages long) = (lshr number-of-words 8)
            while (> number-of-pages 0)
            as (d&c dpn-and-count) = (d&c-for-block fs file-page-number)
            as (how-many-this-time long) = (min number-of-pages (count d&c))
            as (error-message string) = (microcode-read-disk-to-vma
                                         (disk-unit fs) (dpn d&c)
                                         how-many-this-time starting-vma)
            if (not (null error-message)) return error-message
```

```
    do (incf starting-vma (lshl how-many-this-time 8))
            (decf number-of-pages how-many-this-time)
            (incf file-page-number how-many-this-time)
         finally (return NULL-string))
   (loop with (old-filepos long) = (read-filepos fs dm-36bit)
         initially (set-filepos-and-mode fs file-page-number dm-block)
         as (vma long) upfrom starting-vma by 256. below (+ starting-vma number-of-words)
         as (dp disk-page) = (get-next-page fs)
         as (dd disk-data) = (disk-data dp)
         if (not (null (error-message fs)))
         return (prog1 (error-message fs) (setf (error-message fs) NULL-string))
         if (or (null dp)
                (null (disk-data dp)))
         return "Unexpected error in file during load."
         do (write-lbus-from-disk-data vma (disk-data dp))
         finally (set-filepos-and-mode fs old-filepos dm-36bit)
                 (return NULL-string))))


(deftype wlfdd-4-bytes (structure ()
                          (* (union (the-array (array byte 4))
                                    (the-slong slong)))))
(defun write-lbus-from-disk-data ((starting-pma long) (dd disk-data))
  (let-globally ((lbus-map-slot lbus-map-slot-for-slow-disk-loading))
    (loop initially (setf (address (aref lbus-map lbus-map-slot))
                          (lbus-address-page starting-pma))
          with (4b wlfdd-4-bytes)
          for (lmach-offset long) upfrom 0 below 256.
          for (byte-offset word) upfrom 0 by 4
          do (setf (aref (the-array 4b) 0)
                   (aref (disk-data-bytes dd) (+ byte-offset 0)))
             (setf (aref (the-array 4b) 1)
                   (aref (disk-data-bytes dd) (+ byte-offset 1)))
             (setf (aref (the-array 4b) 2)
                   (aref (disk-data-bytes dd) (+ byte-offset 2)))
             (setf (aref (the-array 4b) 3)
                   (aref (disk-data-bytes dd) (+ byte-offset 3)))
          as (a-slong slong) = (the-slong 4b)
          as (a-byte  byte)  = (aref (disk-data-bytes dd) (+ byte-offset 4))
          if (bit-test lmach-offset 1)
          do (setq a-slong (->slong (rotr (logior (logand (<-slong a-slong) -1_4)
                                                  (logand a-byte #o17))
                                          4)))
             (setq a-byte (rotr a-byte 4))
             (incf byte-offset)                 ;fix byte crossing
          do (setq (ecc+high (aref lbus-map lbus-map-slot)) (logand a-byte #o17))
             (setq (aref (aref lbus-data lbus-map-slot) lmach-offset) a-slong))))
(defatommacro *swap-map-size* 1)

(defun (read-board-id long) ((number word))
  (select number
    ((0 1) (dpb %config-memory-board %%config-board-type
                (dpb -1 %%config-last-page
                     (dpb 0 %%config-first-page 0))))
    (8 (dpb %config-io-board %%config-board-type 0))
    (otherwise  (dpb %config-no-board %%config-board-type 0))))

;;; VMEM access here never go through the spy bus
(defun (setup-load-maps string) ((maps-after-initial boole)
                                 (load-map load-map-array)
                                 (n-load long)
                                 (insta-boot boole))
  (let* ((next-map-address (dpb-ior -1 %%vma-equals-pma
                             (if maps-after-initial
                                 (with-spy-bus-grabbed
                                   (read-amem-long %wired-physical-address-high))
                               (loop for (n word) upfrom 0 below 16.
                                     while (= (ldb %%config-board-type (read-board-id n))
                                              %config-memory-board)
                                     finally (return (- (ash (long n) 19.)
                                                        lbus-page-size))))))
```

```
        (parallel-address next-map-address))
    (let ((n-load-entries (if insta-boot n-load 0)))
      (setq parallel-address (+ next-map-address n-load-entries))
      (write-vmem-long load-map-size n-load-entries)
      (write-vmem-long load-map-address next-map-address)       ;for count-vpn
      (write-vmem-long load-map-dpn-address parallel-address)   ;for disk-page-number
      (loop for (i long) upfrom 0 below n-load-entries
            as (starting-vma long) =     (starting-vma     (aref *load-map i))
            as (number-of-words long) =  (number-of-words  (aref *load-map i))
            as (disk-page-number long) = (disk-page-number (aref *load-map i))
            as (count-vpn long) = (dpb-ior (lshr number-of-words 8) #o2414
                                           (lshr starting-vma 8))
            do (write-vmem-long next-map-address count-vpn)
               (write-vmem-long parallel-address disk-page-number)
               (incf next-map-address)
               (incf parallel-address))
      (setq next-map-address parallel-address))

    (setq parallel-address (+ next-map-address *swap-map-size*))
    (write-vmem-long swap-map-size *swap-map-size*)
    (write-vmem-long swap-map-address next-map-address)
    (write-vmem-long swap-map-dpn-address parallel-address)
    (progn
      (write-vmem-long next-map-address 60000.)
      (write-vmem-long parallel-address 64000.)
      (incf next-map-address)
      (incf parallel-address))
    (setq next-map-address parallel-address)

    (write-vmem-long bad-memory-pages-size 0)
    (write-vmem-long bad-memory-pages-address next-map-address)

  )
 NULL-string)

(defun load-world-epilogue ()
  (with-spy-bus-grabbed
    (setq quote-NIL (read-amem %quote-nil))
    (setq quote-T   (read-amem %quote-t))
    ))
```

F:>LMach>Fep>virtual-memory.lil.2

```
;;;-*- Mode: Lil; Package: Lil; Base: 8.; Lowercase: Nil -*-

(DEFVAR *MAPPING-ENABLED* BOOLE)

(DEFINE-SYSDF1-ATOMMACROS
  (A-MEMORY-VARIABLES %STACK-BUFFER-LOW %STACK-BUFFER-LIMIT)
  (MICROCODE-CONSTANTS (NIL %QUOTE-NIL)))

(DEFINE-SYSCONSTANT (A-MEMORY-VIRTUAL-ADDRESS %A-MEMORY-VIRTUAL-ADDRESS)
                    (PAGE-SIZE %PAGE-SIZE))

;;; Virtual memory versions.  For now these are the same as the LBUS versions
;;; except for the temporary memory control
(DEFUN (READ-VMEM LBUS-WORD) ((ADDR LONG))
  (SELECT (MAP-VIRTUAL-ADDRESS ADDR)
    (1 (READ-LBUS ADDR))
    (2 (READ-AMEM ADDR))
    ;(3 (READ-PAGED-OUT-VIRTUAL-LOCATION ADDR))
    ))

(DEFUN WRITE-VMEM ((ADDR LONG) (VAL LBUS-WORD))
  (SELECT (MAP-VIRTUAL-ADDRESS ADDR)
    (1 (WRITE-LBUS ADDR VAL))
    (2 (WRITE-AMEM ADDR VAL))
    ;(3 (WRITE-PAGED-OUT-VIRTUAL-LOCATION ADDR VAL))
    ))
```

```
;;; This routine takes a pointer to an address modifies the address
;;; depending on where the address really mapped to.  The return value
;;; tells where the virtual location actually lives
;;; Locations are: 1 → Physical memory, 2 → A memory, 3 → Paged out, Addr is in fep memory.
(DEFUN (MAP-VIRTUAL-ADDRESS WORD) ((ADDR LONG MODE REF))
  (COND ((≥ ADDR A-MEMORY-VIRTUAL-ADDRESS)
         (SETQ ADDR (LOGAND 7777 ADDR))
         2)
        ;; See if it is mapped somewhere into A memory
        ((MAPPED-INTO-A-MEMORY ADDR) 2)
        ;; Check the physical address case
        ((= (LDB #o3004 ADDR) 17) 1)
        ;; See if it is in the wired area.  If so, relocate the address to physical start.
        ((≤ ADDR (READ-ADDR-FROM-AMEM %WIRED-VIRTUAL-ADDRESS-HIGH))
         (INCF ADDR (READ-ADDR-FROM-AMEM %WIRED-PHYSICAL-ADDRESS-LOW))
         1)
        ((NOT *MAPPING-ENABLED*) 1)
        ;; For now...
        (T 1)))

;;; Like map-virtual-address, this takes an address and modifies it if it maps
;;; into amem.  Returns True if it clobbered the address
(DEFUN (MAPPED-INTO-A-MEMORY BOOLE) ((ADDR LONG MODE REF))
  (PROG (((BUFFER-LOW LONG)))
        (WHEN (≥ ADDR (READ-ADDR-FROM-AMEM %A-MEMORY-VIRTUAL-ADDRESS))
          (SETQ ADDR (LOGAND 7777 ADDR))
          (RETURN TRUE))
        (SETQ BUFFER-LOW (READ-ADDR-FROM-AMEM %STACK-BUFFER-LOW))
        (WHEN (AND (≠ BUFFER-LOW (READ-ADDR-FROM-AMEM %QUOTE-NIL))
                   (≥ ADDR BUFFER-LOW)
                   (≤ ADDR (READ-ADDR-FROM-AMEM %STACK-BUFFER-LIMIT)))
          (SETQ ADDR (LOGAND ADDR 1777))
          (RETURN TRUE))
        FALSE))

(DEFUN MAPPED-ADDRESS (ADR)
  (LET* ((VPN (// ADR SYM:PAGE-SIZE))
         (PPN (GETHASH-EQUAL VPN *MAPPED-ADDRESS-HASH-TABLE*)))
      (IF (NULL PPN)
         (LET* ((PHT-TOP (GET-PAGING-ARRAY-TOP 'SYM:*PHT*))
                (PHT-INDEX (REMOTE-PHT-LOOKUP VPN PHT-TOP)))
           (SETQ PPN (LCOLD:REMOTE-LOAD-BYTE-OFFSET PHT-TOP 0017 PHT-INDEX))
           (PUTHASH-EQUAL VPN PPN *MAPPED-ADDRESS-HASH-TABLE*)))
     (+ (\ ADR SYM:PAGE-SIZE) (* PPN SYM:PAGE-SIZE)))))
(defwiredfun pht-lookup (vpn)
  (loop with vpn-tag = (ldb %%pht-vpn-tag vpn)
        and foundp = nil
        for hash-vpn = vpn then (if (≥ %rehash-max probes)
                                    (rehash-vpn hash-vpn)
                                  (incf *count-pht-linear-probes*)
                                  (1+ hash-vpn))
        for pht-index = (\ hash-vpn *pht-size*)
        count t into probes
        until (or (null (pht-entry pht-index))
                  (and (= vpn-tag (pht-valid-vpn-tag pht-index))
                       (= vpn (let ((mmpt-index (mmpt-lookup (pht-ppn pht-index))))
                                (if (zerop (pht-pending pht-index))
                                    (mmpt-vpn mmpt-index)
                                  (pending-get mmpt-index))))
                       (setq foundp t))
                  (zerop (pht-collision-count pht-index))
                  (> probes (+ *pht-size* %rehash-max 100)))     ; The 100 is for grins.
        finally (incf (aref *pht-probes* (min* (1- probes) %pht-probes-max)))
                (and foundp (return pht-index))))


;;; Given a pointer to an array, this returns a pointer to the first data word.
(DEFUN (GET-PAGING-ARRAY-TOP LONG) ((P-ARRAY LONG))
  (SELECT (REMOTE-LOAD-FIELD ARRAY-DISPATCH-FIELD P-ARRAY)
    (%ARRAY-DISPATCH-LEADER
```

```
    (+ P-ARRAY (REMOTE-LOAD-FIELD ARRAY-LEADER-LENGTH P-ARRAY) 1))
   ((%ARRAY-DISPATCH-LONG %ARRAY-DISPATCH-LONG-MULTIDIMENSIONAL
     %ARRAY-DISPATCH-SHORT-INDIRECT)
    (REMOTE-LOAD-FIELD ARRAY-INDIRECT-POINTER P-ARRAY))
   (OTHERWISE (1+ P-ARRAY))))

(DEFSUBST PHT-REHASH-VPN (VPN) (DPB VPN 3205 (LDB 0532 VPN)))

(DEFUN REMOTE-PHT-LOOKUP (VPN PHT-TOP)
  (LOOP WITH PHT-SIZE = (LCOLD:XLDB SYM:%%Q-FIXNUM
                            (LCOLD:REMOTE-CONTENTS
                              (GET 'SYM:*PHT-SIZE* 'LCOLD:MAGIC-VARIABLE-LOCATION)))
        AND MMPT-TOP = (GET-PAGING-ARRAY-TOP 'SYM:*MMPT*)
        AND MMPT-Y-TOP = (GET-PAGING-ARRAY-TOP 'SYM:*MMPT-Y*)
        WITH VPN-TAG = (LCOLD:XLDB SYM:%%PHT-VPN-TAG VPN)
        AND FOUNDP = NIL
        FOR HASH-VPN = VPN THEN (IF (≥ SYM:%REHASH-MAX PROBES)
                                    (PHT-REHASH-VPN HASH-VPN)
                                  (1+ HASH-VPN))
        FOR PHT-INDEX = (\ HASH-VPN PHT-SIZE)
        COUNT T INTO PROBES
        AS PHT-DATA = (LCOLD:REMOTE-CONTENTS-OFFSET PHT-TOP PHT-INDEX)
        UNTIL (OR (= (LCOLD:XLDB SYM:%%Q-DATA-TYPE PHT-DATA) SYM:DTP-NIL)
                  (AND (= VPN-TAG (LCOLD:XLDB 2611 PHT-DATA))
                       (= VPN (LCOLD:REMOTE-LOAD-BYTE-OFFSET
                                MMPT-TOP SYM:%%MMPT-VPN
                                (REMOTE-MMPT-LOOKUP (LCOLD:XLDB 0020 PHT-DATA) MMPT-Y-TOP)))
                       (SETQ FOUNDP T))
                  (ZEROP (LCOLD:XLDB 2005 PHT-DATA))
                  (> PROBES (+ PHT-SIZE SYM:%REHASH-MAX 100)))  ; THE 100 IS FOR GRINS.
        FINALLY (AND FOUNDP (RETURN PHT-INDEX))))

(DEFUN REMOTE-MMPT-LOOKUP (PPN MMPT-Y-TOP)
  (LET* ((Y (LDB SYM:%%PPN-MMPT-Y PPN)))
    (+ (LDB SYM:%%PPN-MMPT-X PPN)
       (* (LCOLD:REMOTE-LOAD-BYTE-OFFSET
            MMPT-Y-TOP
            (NTH (\ Y 4) '(0004 1004 2004 3004))
            (// Y 4))
          SYM:%MMPT-X-SIZE))))
```

SCRC:<LFEP-X>FPCREQ.PAL;5

```
;-*- Mode:LISP; Package:USER; Base:10 -*-

(defpal FPCREQ PAL16L8
  (IPIN 11 PIO-RQ L)
  (IPIN  9 CART-RQ L)
  (IPIN  8 IORC L)
  (IPIN  7 A1 H)
  (IPIN  2 WRITE-T50 L)
  (IPIN  3 CART-DACK H)
  (IPIN  4 PIO-DACK H)
  (IPIN  5 IOW H)
  (IPIN  6 IOR H)

  (OPIN 12 PIO-WR-LB L)
  (OPIN 13 PIO-WR-HB L)
  (OPIN 19 PIO-RD-LB L)
  (OPIN 18 PIO-RD-HB L)
  (OPIN 16 CART-WR-LB L)
  (OPIN 15 CART-WR-CTL L)
  (OPIN 17 CART-RD-LB L)
  (OPIN 14 CART-RD-CTL L)

  (SETQ PIO-WR-LB (OR (AND PIO-RQ WRITE-T50 (NOT A1))
                      (AND PIO-DACK IOW)))
  (SETQ PIO-WR-HB (AND PIO-RQ WRITE-T50 (NOT A1)))
  (SETQ PIO-RD-LB (OR (AND PIO-RQ IORC (NOT A1))
                      (AND PIO-DACK IOR)))
  (SETQ PIO-RD-HB (AND PIO-RQ IORC (NOT A1)))

  (SETQ CART-WR-LB (OR (AND CART-RQ (NOT A1) WRITE-T50)
                       (AND CART-DACK IOW)))
  (SETQ CART-WR-CTL (AND CART-RQ A1 WRITE-T50))
  (SETQ CART-RD-LB (OR (AND CART-RQ (NOT A1) IORC)
                       (AND CART-DACK IOR)))
  (SETQ CART-RD-CTL (AND CART-RQ A1 IORC)))
```

SCRC:<LFEP-X>NANOFEP.UCODE:6

```
;-*- Mode:LISP; Package:SYSTEM-INTERNALS; Base:8.; Lowercase: T -*-
;;; Some prototype NanoFEP code

;;; Running at about 4mhz, the timer counts once every 120us.

;;; Memory is organized as follows:
;;;  Pages 1 and 2 contain the font -- each character is 5 bytes long.  Pgae
;;;  one contains characters 40 through 117 and page two contains 120 through
;;;  177.  Each character starts at (5*(char-40-(60*(pagenum-1)))).

(setq reg-base 0                    ;Registers base address
      id-base 100                   ;Id prom base address
      clock-base 300                ;Clock/calendar base address
      )

;;; Clock/calendar locations
(setq clock-seconds (+ clock-base 0)
      clock-seconds-alarm (+ clock-base 1)
      clock-minutes (+ clock-base 2)
      clock-minutes-alarm (+ clock-base 3)
      clock-hours (+ clock-base 4)
      clock-hours-alarm (+ clock-base 5)
      clock-day-of-week (+ clock-base 6)
      clock-day-of-month (+ clock-base 7)
      clock-month (+ clock-base 10)
      clock-year (+ clock-base 11)
      clock-register-a (+ clock-base 12)
      clock-register-b (+ clock-base 13)
      clock-register-c (+ clock-base 14)
      clock-register-d (+ clock-base 15)
      clock-ram-base (+ clock-base 16)
      )

;;; Registers
(setq disp-data-wr-reg (+ reg-base 0)
      disp-col-wr-reg (+ reg-base 1)
      freq-ctl-wr-reg (+ reg-base 2)
      fep-data-wr-reg (+ reg-base 3)
      power-ctl-wr-reg (+ reg-base 4)
      fep-ctl-wr-reg (+ reg-base 5)

      freq-data-rd-reg (+ reg-base 2)
      fep-data-rd-reg (+ reg-base 3)
      switches-rd-reg (+ reg-base 4)
      fep-status-rd-reg (+ reg-base 5)
      )

;;; Switches
;;; *** Check the names on these
(setq switch-any-key 37
      switch-key-0 1   switch-key-off 1
      switch-key-1 2   switch-key-secure 2
      switch-key-2 4   switch-key-remote 4
      switch-key-3 10  switch-key-local 10
      switch-key-4 20  switch-key-remote-secure 20
      switch-no 40
      switch-yes 100
      switch-enter 200)

;;; Fep status
(setq fep-ext-bg-l 1
      fep-some-rq 2
      fep-lbus-refresh 4
      fep-nfep-rq 10
      powered-on 20
      fep-plugged-in 100
      fep-some-rq 200)

;;; Frequency counter control
(setq freq-sel-source 37
      freq-disable-count 40
      freq-not-clear 100
      freq-hand-clock 200

      freq-sel-hand-clock 20
      freq-sel-fep-some-rq 21
      freq-sel-lbus-refresh 22
      freq-sel-p5 10
      freq-sel-n5.2 11
      freq-sel-n2 12
      freq-sel-n12 13
      freq-sel-p12 14
      freq-sel-nfep-p5 15
      freq-sel-temp-0 16
      freq-sel-temp-1 17)
```

```
(putprop 'nanofep '(

        (= 0)
        (jmp start)

        (= 3)

interrupt




        (= 200)
start
        (mov r0 (/# fep-status-rd-reg))
        (movx a @r0)
        ;; If this is the first time, say so and wait for a while
        (jb-under-mask powered-on power-on-start)
        ;; Not powered on, must have been reset by user
        (mov r0 (/# reset-by-user-message))
        (call nfep-message)

start-1
        (mov a (/# 40))            ;Wait about a second
        (call wait)                ; based on the internal timer
        ;; *** Setup clock and interrupts and stuff here
        (call update-clock)        ;Update internal time from
```

MC - PAL

SCRC:<LMIFU>SPY.PAL;1

```
; -*- Mode:Lisp; Package:User; Base:10 -*-

; This PAL decodes spy addresses (saves 2 DIPs)

(DEFPAL SPY PAL16L8
  (IPIN 3 SPY-ADDR-5)
  (IPIN 4 SPY-ADDR-4)
  (IPIN 5 SPY-ADDR-3)
  (IPIN 6 SPY-ADDR-2)
  (IPIN 7 SPY-ADDR-1)
  (IPIN 8 SPY-ADDR-0)
  (IPIN 9 SPY-WRITE L)
  (IPIN 11 SPY-READ L)
  (FIELD SPY-ADDR SPY-ADDR-5 SPY-ADDR-4 SPY-ADDR-3 SPY-ADDR-2 SPY-ADDR-1 SPY-ADDR-0)

  (OPIN 18 SPY-WRITE-41 L)
  (OPIN 17 SPY-WRITE-40 L)
  (OPIN 16 SPY-READ-45 L)
  (OPIN 15 SPY-READ-44 L)
  (OPIN 14 SPY-READ-43 L)
  (OPIN 13 SPY-READ-42 L)
  (OPIN 19 SPY-READ-41 L)
  (OPIN 12 SPY-READ-40 L)

  (SETQ SPY-READ-40 (AND SPY-READ (FIELD SPY-ADDR #o40)))
  (SETQ SPY-READ-41 (AND SPY-READ (FIELD SPY-ADDR #o41)))
  (SETQ SPY-READ-42 (AND SPY-READ (FIELD SPY-ADDR #o42)))
  (SETQ SPY-READ-43 (AND SPY-READ (FIELD SPY-ADDR #o43)))
  (SETQ SPY-READ-44 (AND SPY-READ (FIELD SPY-ADDR #o44)))
  (SETQ SPY-READ-45 (AND SPY-READ (FIELD SPY-ADDR #o45)))

  (SETQ SPY-WRITE-40 (AND SPY-WRITE (FIELD SPY-ADDR #o40)))
  (SETQ SPY-WRITE-41 (AND SPY-WRITE (FIELD SPY-ADDR #o41))))
; -*- Mode:Lisp; Package:User; Base:10 -*-

; This PAL controls Abus sources (and bidirectional transceivers)

(DEFPAL SOURCE PAL16L8
  ;; Microinstruction inputs
  (IPIN 6 ABUS-SOURCE)           ;We are to drive the Abus
  (IPIN 7 U-AMRA-8)
  (IPIN 8 U-AMRA-7)
  (IPIN 9 U-AMRA-6)

  ;; Other inputs
  (IPIN 4 EMULATOR-TASK)
  (IPIN 5 USE-AMEM-INSTEAD)      ;Amem substitutes for MD source

  ;; For bidirectional transceiver control
  (IPIN 11 ADDR-FROM-ABUS)
  (IPIN 3 MAP-SEL-0)
  (IPIN 1 MAP-B-WRITE)
  (IPIN 2 MAP-A-WRITE)
```

SCRC:<LMIFU>SOURCE.PAL;1

```
  ;; Abus source select outputs
  (OPIN 18 IO-MD-TO-ABUS L)
  (OPIN 17 EMU-MD-TO-ABUS L)
  (OPIN 16 PC-TO-ABUS L)
  (OPIN 15 VMA-TO-ABUS L)
  (OPIN 14 MAP-TO-ABUS L)
  (OPIN 13 ABUS-XCV-23-0-EN L)
  (OPIN 19 ABUS-XCV-31-24-B-EN L)
  (OPIN 12 ABUS-XCV-31-24-A-EN L)

  ;; Abus source select
  (FIELD ASOURCE U-AMRA-8 U-AMRA-7 U-AMRA-6)
  (SETQ MEM-TO-ABUS (AND ABUS-SOURCE (FIELD ASOURCE 0)))
  (SETQ LBUS-TO-ABUS (AND ABUS-SOURCE (FIELD ASOURCE 1)))
  (SETQ VMA-TO-ABUS (AND ABUS-SOURCE (FIELD ASOURCE 2)))
  (SETQ MAP-TO-ABUS (AND ABUS-SOURCE (FIELD ASOURCE 3)))
  (SETQ PC-TO-ABUS (AND ABUS-SOURCE (FIELD ASOURCE 4)))

  ;; The emulator MDs are used only for emulator-task memory reads.
  ;; The IO MD is used for non-emulator-task memory reads, microdevice reads,
  ;; and diagnostic data from the FEP.
  (SETQ EMU-MD-TO-ABUS (AND MEM-TO-ABUS (NOT USE-AMEM-INSTEAD) EMULATOR-TASK))
  (SETQ IO-MD-TO-ABUS (OR LBUS-TO-ABUS
                          (AND MEM-TO-ABUS (NOT USE-AMEM-INSTEAD) (NOT EMULATOR-TASK))))

  ;; Address to/from Abus enabled if reading map, reading VMA, or taking address
  ;; from Abus (which includes writing map [just for parity computation])
  (SETQ ABUS-XCV-23-0-EN (OR MAP-TO-ABUS VMA-TO-ABUS ADDR-FROM-ABUS))

  ;; Enable VMA Key bits of map that hits onto Abus when reading map; if neither
  ;; hits then pick one "at random".  Drive VMA Key bits of whichever maps are
  ;; being written from the Abus.
  (SETQ ABUS-XCV-31-24-A-EN (OR (AND MAP-TO-ABUS MAP-SEL-0) MAP-A-WRITE))
  (SETQ ABUS-XCV-31-24-B-EN (OR (AND MAP-TO-ABUS (NOT MAP-SEL-0)) MAP-B-WRITE)))
```

SCRC:<LMIFU>MDCTL1.PAL;1

```
; -*- Mode:Lisp; Package:User; Base:10 -*-

; MDCTL: MD controls

(DEFPAL MDCTL1 PAL16R8
  ;; Inputs
  (IPIN 2 BLK-PF)                       ;Page fault when starting block read
  (IPIN 3 ADDR-FROM-VMA)                ;Address coming from VMA
  (IPIN 4 ADDR-0-A)                     ;Low-order address bit in data stage
  (IPIN 5 LBUS-REQUEST-B L)             ;Any Lbus cycle starting
  (IPIN 6 SPY-LOAD-MD)                  ;FEP wants MD to capture write data
  (IPIN 7 PROC-READ-ACTIVE L)           ;Active cycle of processor read
  (IPIN 8 EMULATOR-TASK)                ;Microinstruction is for emulator
  (IPIN 9 LBUS-WAIT L)                  ;Lbus pipeline doesn't advance this cycle

  ;; Registered outputs
  (RPIN 18 IO-MD-FROM-LBUS L)           ;Latch Lbus data in IO MD
  (RPIN 17 EMU-MD0-FROM-LBUS L)         ;Latch Lbus data in even emulator MD
  (RPIN 16 EMU-MD1-FROM-LBUS L)         ;Latch Lbus data in odd emulator MD
  (RPIN 15 ADDR-FROM-VMA-A)             ;Active cycle, address came from VMA
  (RPIN 14 EMULATOR-TASK-A)             ;Active cycle, was started by emulator
  (RPIN 13 BLK-PF-D)                    ;Block-read page fault (data cycle)
  (RPIN 12 BLK-PF-A)                    ;Block-read page fault (active cycle)

  ;; Main MD loading controls
  ;; If not a virtual memory read, load both emulator MD's since we
  ;; don't know for sure which one will be gated onto the Abus.
  ;; Load IO MD with the special SPY LOAD MD feature as well.
  (SETQ NEXT-EMU-MD0-FROM-LBUS (AND NEXT-PROC-DATA-CYC EMULATOR-TASK-A
                                    (OR (NOT ADDR-0-A) (NOT ADDR-FROM-VMA-A))))
  (SETQ NEXT-EMU-MD1-FROM-LBUS (AND NEXT-PROC-DATA-CYC EMULATOR-TASK-A
                                    (OR ADDR-0-A (NOT ADDR-FROM-VMA-A))))
  (SETQ NEXT-IO-MD-FROM-LBUS (OR (AND NEXT-PROC-DATA-CYC (NOT EMULATOR-TASK-A))
                                 (AND LBUS-REQUEST-B SPY-LOAD-MD)))

  ;; True during the first clock of a data cycle for the processor
  (SETQ NEXT-PROC-DATA-CYC (AND PROC-READ-ACTIVE (NOT LBUS-WAIT)))

  ;; Bus state pipeline
  (SETQ NEXT-ADDR-FROM-VMA-A (OR (AND ADDR-FROM-VMA (NOT LBUS-WAIT))
                                 (AND ADDR-FROM-VMA-A LBUS-WAIT)))
  (SETQ NEXT-EMULATOR-TASK-A (OR (AND EMULATOR-TASK (NOT LBUS-WAIT))
                                 (AND EMULATOR-TASK-A LBUS-WAIT)))
  (SETQ NEXT-BLK-PF-D (OR (AND BLK-PF-A (NOT LBUS-WAIT))
                          (AND BLK-PF-D LBUS-WAIT)))
  (SETQ NEXT-BLK-PF-A (OR (AND BLK-PF (NOT LBUS-WAIT))
                          (AND BLK-PF-A LBUS-WAIT))))
```

SCRC:<LMIFU>MDCTL1.PAL;1

```
; -*- Mode:Lisp; Package:User; Base:10 -*-

; MDCTL: MD controls

(DEFPAL MDCTL1 PAL16R8
  ;; Inputs
  (IPIN 2 BLK-PF)                         ;Page fault when starting block read
  (IPIN 3 ADDR-FROM-VMA)                  ;Address coming from VMA
  (IPIN 4 ADDR-0-A)                       ;Low-order address bit in data stage
  (IPIN 5 LBUS-REQUEST-B L)               ;Any Lbus cycle starting
  (IPIN 6 SPY-LOAD-MD)                    ;FEP wants MD to capture write data
  (IPIN 7 PROC-READ-ACTIVE L)             ;Active cycle of processor read
  (IPIN 8 EMULATOR-TASK)                  ;Microinstruction is for emulator
  (IPIN 9 LBUS-WAIT L)                    ;Lbus pipeline doesn't advance this cycle

  ;; Registered outputs
  (RPIN 18 IO-MD-FROM-LBUS L)             ;Latch Lbus data in IO MD
  (RPIN 17 EMU-MD0-FROM-LBUS L)           ;Latch Lbus data in even emulator MD
  (RPIN 16 EMU-MD1-FROM-LBUS L)           ;Latch Lbus data in odd emulator MD
  (RPIN 15 ADDR-FROM-VMA-A)               ;Active cycle, address came from VMA
  (RPIN 14 EMULATOR-TASK-A)               ;Active cycle, was started by emulator
  (RPIN 13 BLK-PF-D)                      ;Block-read page fault (data cycle)
  (RPIN 12 BLK-PF-A)                      ;Block-read page fault (active cycle)

  ;; Main MD loading controls
  ;; If not a virtual memory read, load both emulator MD's since we
  ;; don't know for sure which one will be gated onto the Abus.
  ;; Load IO MD with the special SPY LOAD MD feature as well.
  (SETQ NEXT-EMU-MD0-FROM-LBUS (AND NEXT-PROC-DATA-CYC EMULATOR-TASK-A
                                    (OR (NOT ADDR-0-A) (NOT ADDR-FROM-VMA-A))))
  (SETQ NEXT-EMU-MD1-FROM-LBUS (AND NEXT-PROC-DATA-CYC EMULATOR-TASK-A
                                    (OR ADDR-0-A (NOT ADDR-FROM-VMA-A))))
  (SETQ NEXT-IO-MD-FROM-LBUS (OR (AND NEXT-PROC-DATA-CYC (NOT EMULATOR-TASK-A))
                                 (AND LBUS-REQUEST-B SPY-LOAD-MD)))

  ;; True during the first clock of a data cycle for the processor
  (SETQ NEXT-PROC-DATA-CYC (AND PROC-READ-ACTIVE (NOT LBUS-WAIT)))

  ;; Bus state pipeline
  (SETQ NEXT-ADDR-FROM-VMA-A (OR (AND ADDR-FROM-VMA (NOT LBUS-WAIT))
                                 (AND ADDR-FROM-VMA-A LBUS-WAIT)))
  (SETQ NEXT-EMULATOR-TASK-A (OR (AND EMULATOR-TASK (NOT LBUS-WAIT))
                                 (AND EMULATOR-TASK-A LBUS-WAIT)))
  (SETQ NEXT-BLK-PF-D (OR (AND BLK-PF-A (NOT LBUS-WAIT))
                          (AND BLK-PF-D LBUS-WAIT)))
  (SETQ NEXT-BLK-PF-A (OR (AND BLK-PF (NOT LBUS-WAIT))
                          (AND BLK-PF-A LBUS-WAIT))))
```

SCRC:<LMIFU>MDCTL.PAL;1

```
; -*- Mode:Lisp; Package:User; Base:10 -*-

; MDCTL: VMA-OFFSET PAL

(DEFPAL MDCTL PAL16R4
  ;; Inputs
  (IPIN 2 U-MEM-1)
  (IPIN 3 U-MEM-0)
  (IPIN 4 MC-MAP-MISS L)                  ;Take map miss trap
  (IPIN 5 EMULATOR-TASK)                  ;Emulator running now
  (IPIN 6 NOP)                            ;Don't execute microinstruction
  (IPIN 7 U-MEM-2)                        ;Increment VMA
  (IPIN 8 LBUS-IN-0)                      ;Input to low-order bit of VMA
  (IPIN 9 LOAD-PC L)                      ;Implies VMA being loaded

  ;; Register bits
  (RPIN 16 VMA-FOR-MD-0)                  ;Low bit of VMA that goes with emu MD
  (RPIN 15 VMA-OFFSET-1)                  ;How far VMA is ahead of emu MD
  (RPIN 14 VMA-OFFSET-0)

  ;; Unregistered outputs
  (OPIN 19 DONT-START-READ)               ;Suppress loading MD with result of this read
  (OPIN 18 VMA-FOR-MD-0 L)                ;I ran out of inverters
  (OPIN 13 LOAD-VMA-OUT L)                ;Load VMA from Lbus
  (IPIN 13 LOAD-VMA L)                    ;Have to make two passes through PAL

  (FIELD MEM U-MEM-2 U-MEM-1 U-MEM-0)

  ;; VMA is loaded by MEM function 5, and when PC is
  (SETQ LOAD-VMA-OUT (AND (OR (FIELD MEM 5) LOAD-PC) (NOT NOP)))

  ;; VMA offset clears when VMA is loaded, increases when VMA is incremented,
  ;; decreases as emulator task microinstructions get executed.  VMA offset
  ;; is meaningful in the data-cycle part of the pipeline, hence in the active
  ;; cycle part of the pipeline it will always be 2.
  ;; VMA offset is garbage during a block write (ought to be zero).
  (SETQ EMULATOR-RUN (AND EMULATOR-TASK (NOT NOP)))
  (SETQ INC-VMA (AND EMULATOR-RUN U-MEM-2))
```

```
(SETQ NEXT-VMA-OFFSET-1
      (AND (NOT LOAD-VMA)                    ;Clear when VMA loaded
           (OR INC-VMA                       ;Set when VMA incremented
               (AND (NOT EMULATOR-RUN) VMA-OFFSET-1))))        ;Hold
                                             ;Set to zero when emulator run without
                                             ;incrementing VMA
(SETQ NEXT-VMA-OFFSET-0
      (AND (NOT LOAD-VMA)                    ;Clear when VMA loaded
           (NOT INC-VMA)                     ;Clear when VMA incremented (to 2)
           (OR (AND EMULATOR-RUN VMA-OFFSET-1)        ;Count down
               (AND (NOT EMULATOR-RUN) VMA-OFFSET-0)))) ;Hold

;; VMA FOR MD 0 is VMA 0 xor'ed with VMA-OFFSET-0
;; It is valid in and after the data cycle (but not in active cycles)
(SETQ NEXT-VMA-FOR-MD-0
      (COND (LOAD-VMA LBUS-IN-0)        ;Loads from same thing as VMA
            ((AND INC-VMA (NOT LOAD-VMA)) (NOT VMA-FOR-MD-0)) ;Increments like VMA
            ((AND EMULATOR-RUN (NOT LOAD-VMA) (NOT INC-VMA))
             (XOR VMA-FOR-MD-0 NEXT-VMA-OFFSET-0))      ;1 word/2 cycles case
            ((NOT EMULATOR-RUN) VMA-FOR-MD-0)))          ;Hold

;; Any time a read gets started but then NOP comes on, we would like to
;; suppress clobbering of MD with the result.  For example, if there is
;; a breakpoint set on the microinstruction, the machine will be
;; committed to doing the read before the microinstruction parity error
;; can be detected.  Unfortunately, we can't just make NOP suppress
;; read-starting, because NOP might be on because of a map miss, and we
;; don't want to suppress loading of the PHT entry into MD.  This is
;; especially important in a block read, where MD is really being used
;; by the microinstruction that starts a read.
;; So we have NOP suppress reading into MD except when a map miss occurs.
;; See TMC.DESIGN for a discussion of the restrictions this imposes on
;; the microcode, when map miss occurs simultaneously with other traps.
(SETQ DONT-START-READ (AND NOP (NOT MC-MAP-MISS))))
```

SCRC:<LMIFU>MAP.PAL;1

```
; -*- Mode:Lisp; Package:User; Base:10 -*-

; Map and trap controls

(DEFPAL MAP PAL16L8
  ;; Inputs
  (IPIN 14 VMA-OFFSET-1)
  (IPIN 13 VMA-OFFSET-0)
  (IPIN 1 MD-PF)
  (IPIN 2 EMU-MD-TO-ABUS L)
  (IPIN 3 SPEC-CHECK-WRITE-ACCESS L)
  (IPIN 4 WRITE-PERMIT L)
  (IPIN 5 MAP-SEL-1)
  (IPIN 6 MAP-SEL-0)
  (IPIN 7 ADDR-FROM-MAP)
  (IPIN 8 PROC-GRANT)
  (IPIN 9 SPEC-USE-PHTA L)
  (IPIN 11 U-MEM-0)

  ;; Outputs
  (OPIN 18 ADDR-7-0-FROM-VMA)
  (OPIN 17 WRITE-LRU)
  (OPIN 16 MC-MAP-MISS L)
  (OPIN 15 BLK-PF)
  (OPIN 19 MC-TRAP-PARAM-1)
  (OPIN 12 MC-TRAP-PARAM-0)

  (FIELD VMA-OFFSET VMA-OFFSET-1 VMA-OFFSET-0)
  (FIELD MAP-SEL MAP-SEL-1 MAP-SEL-0)

  (SETQ BLOCK-OP (NOT (FIELD VMA-OFFSET 0)))
  (SETQ BLOCK-READ (AND BLOCK-OP (NOT U-MEM-0)))
  (SETQ BLOCK-WRITE (AND BLOCK-OP U-MEM-0))

  (SETQ MAP-HIT (NOT (FIELD MAP-SEL 0)))

  ;; Within-page addr bits come from VMA except when they come from PHTA.
  ;; When in a block read or write, we mustn't switch to PHTA because this
  ;; could select the same memory bank as in the previous cycle, which
  ;; won't work and could wipe out the memory.
  (SETQ ADDR-7-0-FROM-VMA (OR BLOCK-OP MAP-HIT))

  ;; Write the LRU memory whenever we get a real map hit
  (SETQ WRITE-LRU (AND PROC-GRANT ADDR-FROM-MAP (FIELD MAP-SEL (1 2))))

  ;; Map miss occurs if using map but PHTA got selected (and not forced)
  (SETQ MAP-MISS (AND PROC-GRANT ADDR-FROM-MAP (FIELD MAP-SEL 0) (NOT SPEC-USE-PHTA)))
  (SETQ WRITE-VIOLATION (AND PROC-GRANT ADDR-FROM-MAP
                             (NOT WRITE-PERMIT)
                             (OR U-MEM-0 SPEC-CHECK-WRITE-ACCESS)))

  ;; Defer trap if map miss in block read
  (SETQ BLK-PF (AND MAP-MISS BLOCK-READ))
  (SETQ DEFERRED-MAP-MISS (AND EMU-MD-TO-ABUS MD-PF))
```

```
;; Take map miss trap if non-block miss, write violation, or deferred miss
(SETQ MC-MAP-MISS (OR (AND MAP-MISS (NOT BLK-PF))
                      WRITE-VIOLATION
                      DEFERRED-MAP-MISS))

;; Trap parameter interpretation is as follows:
;;   0 - normal page fault, PHTC read in progress
;;   1 - block read, VMA offset = 1, no PHTC probe
;;   2 - block read, VMA offset = 2, no PHTC probe
;;   3 - block write, VMA offset = 0, no PHTC probe
;;       or write-protect violation
;;       (microcode will have to read the map to tell which)
;;
;; It is illegal to do a write or write-check in the middle of a block read,
;; so the VMA offset for a write-protect violation is zero.
(SETQ MC-TRAP-PARAM-1 (OR WRITE-VIOLATION
                          BLOCK-WRITE
                          (AND VMA-OFFSET-1 (NOT U-MEM-0))))
(SETQ MC-TRAP-PARAM-0 (OR WRITE-VIOLATION
                          BLOCK-WRITE
                          (AND VMA-OFFSET-0 (NOT U-MEM-0))))
```

F:>lmach>fep>debug.Lil.11

```
  (setq *point-stack-pointer* (logand (1- *point-stack-pointer*) 7)))

(defun debug-indirect-through-current-value ()
  (if (not *point-open?*)
      (format t " ?Location? ")
    (setq *point* *tab-point*)
    (debug-read-point)
    (debug-print-current-value)))

(defun debug-read-point ()
  (setq *tab-point-valid* true)                  ;usually
  (let ((loc (value *point*)))
    (with-spy-bus-grabbed
      (funcall (select (mem-type *point*)
                 (vmem #'debug-read-vmem)
                 (amem #'debug-read-amem)
                 (bmem #'debug-read-bmem)
                 (cmem #'debug-read-cmem)
                 (type-map #'debug-read-type-map)
                 (display-mem #'debug-read-display-mem)
                 (gc-map #'debug-read-gc-map)
                 )
               loc))))

(defun debug-value-from-lbus-word ()
  (setq *tab-point* (location-and-mem-type (data *debug-lbus-word*) vmem)))

(defun debug-read-vmem ((loc long))
  (setq *debug-lbus-word* (read-vmem loc))
  (debug-value-from-lbus-word))
(defun debug-read-amem ((loc long))
  (setq *debug-lbus-word* (read-amem loc))
  (debug-value-from-lbus-word))
(defun debug-read-bmem ((loc long))
  (setq *debug-lbus-word* (read-bmem loc))
  (debug-value-from-lbus-word))
(defun debug-read-display-mem ((loc long))
  (setq *debug-lbus-word* (read-display-mem loc))
  (debug-value-from-lbus-word))
(defun debug-read-cmem ((loc long))
  (read-cmem (word loc) *debug-microinstruction*)
  (setq *tab-point-valid* false))
(defun debug-read-type-map ((loc long))
  (setq *debug-long* (read-type-map loc))
  (setq *tab-point-valid* false))
(defun debug-read-gc-map ((loc long))
  (setq *debug-long* (read-gc-map loc))
  (setq *tab-point-valid* false))

(defun debug-deposit-value-to-point ()
  (setq *point* *point*))
```

```
(defun debug-print-current-value ()
  (setq *point* *point*))
(defun (read-display-mem lbus-word) ((loc long))
   *debug-lbus-word*)
```

F:>LMach>Fep>boot-control.Lil.4

```
;;;-*- Mode: Lil; Package: Lil; Base:8.; Lowercase: T -*-

(include "Types-and-macros")
(include "stream.EXT" "string.EXT")

(defvar&initfun init-boot-parameters ()
  boot-status boot-status bs-success
  boot-status-message string NULL-string

  bp-check-power-ok boole false
  bp-power-ok boole false

  bp-microcode-stream stream NULL-stream
  bp-microcode-unit word 0
  bp-microcode-filename string NULL-string      ;uses this if stream is NULL

  bp-load-microcode boole false
  bp-microcode-loaded boole false
  bp-verify-microcode boole false
  bp-microcode-verified boole false

  bp-temp-world-file-stream file-stream NULL-file-stream
  bp-world-stream stream NULL-stream
  bp-world-unit word 0
  bp-world-filename string NULL-string
  bp-verify-world-file boole false
  bp-world-file-verified boole false

  bp-load-sparse boole false
  bp-sparse-loaded boole false
  bp-verify-sparse boole false
  bp-sparse-verified boole false

  bp-load-initial boole false
  bp-use-microcode-for-load-initial boole false
  bp-initial-loaded boole false

  bp-setup-maps boole false
  bp-put-maps-after-initial boole false        ;not until DanG does max of more things
  bp-maps-setup boole false

  bp-preload-load boole false
  bp-use-microcode-for-preload-load boole false
  bp-load-preloaded boole false

  bp-setup-phtc boole false
  bp-phtc-setup boole false
  )

(defun reset-boot-parameters ()
  (unless (null bp-microcode-stream)   (stream-close bp-microcode-stream))
  (unless (null bp-microcode-filename) (return-string bp-microcode-filename))
  (unless (null bp-world-stream)       (stream-close bp-world-stream))
  (unless (null bp-world-filename)     (return-string bp-world-filename))
  )

(defun reinit-boot-parameters ()
  (reset-boot-parameters)
  (init-boot-parameters))

(defun (machine-memories-loaded boole) ()
  (and bp-power-ok
```

```
bp-microcode-loaded
(or (not bp-verify-microcode)  bp-microcode-verified)
(or (not bp-verify-world-file) bp-world-file-verified)
bp-sparse-loaded
(or (not bp-verify-sparse)     bp-sparse-verified)
bp-initial-loaded
bp-maps-setup
(or (not bp-preload-load)      bp-load-preloaded)
bp-phtc-setup
    ))
```

LIL SUMMARY

LIL Summary

This document describes LIL, a Lisp-like Implementation Language.

The phrase "as in Lisp" appears throughout this document. In these cases, refer to the documentation on Zetalisp for the exact syntax or semantics of the language feature being discussed.

LIL Overview

LIL is a language for system programming. Its main application here is in code for the front end processors. needs info . The LIL compiler is written in Lisp.

The best way to understand LIL is as a language with Lisp syntax and Pascal semantics. A LIL source program is a list and the LIL compiler reads the source using the Lisp reader. On the other hand, programs written in LIL operate only on numbers. The concepts of symbols, atoms, and lists are not part of LIL.

LIL is a strongly typed language. It has user-defined types but no user-defined generic operations. Variable references are lexically scoped. Function and type declarations must be at top level; they cannot be nested.

The design and names of various LIL language features were taken directly from Lisp. In particular, LIL programs can contain Lisp macros, whose expansion is handled by the compiler.

Notation Conventions

This section describes how to read the definitions.

- All parentheses that appear are required as shown. Parentheses are not part of the meta-syntactic notation.

- Words in uppercase are keywords in the language. LIL itself has no case requirements.

- Words in lowercase are nonterminals in the definition. Keep looking until you find the expansion. Nonterminals like "type-identifier" follow the same rules as for "identifier" and do not have separate expansions in the definitions. When space is limited, the "id" appears as an abbreviation for "identifier" and "expr" for "expression".

- Elements in italics are optional and can simply be omitted. When one of the elements is underlined, it is the default one.

- Sets of possibilties appear in braces: { }. Within the braces, mutually exclusive possibilities are separated by an upright bar: |. Other possibilities are separated by commas. Some definitions have nested sets of braces.

LIL Concepts and Syntax

Type declarations

Everything in LIL must have a type. You have to declare *identifiers* as being of a certain type. Every expression has a type. For example, the type of LET is the type of its last *form*. All types have to match or be coercible.

DEFTYPE defines an identifier as the name of a type; DEFGLOBAL declares an identifier as an instance of the type. The compiler permits forward references so you can use a type before defining it. Type declarations do not contain values for initializing objects of the type. (Initializing has to be done when you declare the identifier for the object.)

Type definitions must appear at top level. Identifier declarations can appear anywhere and are lexically scoped. LIL has four predefined types: WORD, BYTE, LONG, and BOOLE. LIL has four type constructors for user-defined types. No user-defined generic operations are available.

One class of types in LIL contains the numeric types, WORD, BYTE, LONG, and *LIL generic number*. LIL generic number is an internal type that is used for numeric literals until they can be assigned to one of the other numeric types. Generic numbers are coerced to one of the basic numeric types as soon as the appropriate type can be determined.

The type constructors for user-defined types can create two classes of types: aggregate (structure types) and nonaggregate (enumeration, pointer, and array types).

Enumeration — For associating members of a class or category. The type is formed by naming the literals of the type or by providing a subrange from another type. Example:

```
(deftype boole (enumeration false true))
(deftype byte (enumeration (-128 127)))
(deftype days (enumeration sunday monday tuesday wednesday
                           thursday friday saturday))
```

The type definition also declares the literals as global identifiers. The identifiers cannot be redefined.

Pointer — For providing pointers to user-defined types.

```
(deftype status-ptr-type (pointer status-record-type))
```

Array — For arrays of any named type or arrays of implicit enumeration, pointer, or array types. The number of dimensions possible for any array is not limited. As in Lisp, all array accesses are zero-based and the number in the dimension spec refers to a number one larger than the index of the last element in the array. The type of the array index must be numeric.

```
(deftype map-type (array word 128))
(deftype counter-array-type (array counter-type (-128 128)))
```

See also the section that collects all of the details about arrays.

Structure — For collections of objects, each of which can have any type. The objects are called fields.

```
(deftype str-type
  (structure ()
   (next code-symbol)
   (kind symbol-kind)
   (minimum-loc word)
   (maximum-loc word)))
```

See also the section that collects all of the details about structures.

*Formal syntax for types* type-definition ::= (DEFTYPE type-identifier type-generator)

type-generator ::= { noncomposite-type-gen | composite-type-gen } noncomposite-type-gen ::= {WORD
BYTE
BOOLE
LONG
{ (ENUMERATION literal-id1 . *literal-ids*) |
(ENUMERATION (min-literal-id max-literal-id)) } |
(POINTER type-id) |
(ARRAY array-type-gen dim-spec1 . dim-specs)
} array-type-gen ::= { type-id | noncomposite-type-gen } dim-spec ::= { size | (first last+1) } composite-type-gen ::= (STRUCTURE option-list
(field-id1 noncomposite-type-gen)
...
(field-idn noncomposite-type-gen))

option-list ::= ( *(INCLUDE structure-type-id)*,
*PRESERVE-ORDER* )

Declarations

The following constructs declare identifiers:

| | |
|---|---|
| DEFGLOBAL | Declares identifiers for global static variables. |
| DEFMANIFEST | Declares identifiers for global compile time constants. |
| DEFTYPE | Declares type identifiers and literals for enumeration types. |
| DEFUN | Declares formal parameter identifiers for functions. |
| LET | Declares identifiers for lexically scoped local variables. |

In LET, the identifier being declared must have a type. Either you specify the type explicitly or it inherits its type from the type of the expression used to define it. As in Lisp, LET specifies parallel binding of the identifiers; LET* specifies sequential binding.

*Formal syntax for declarations* declaration ::= { global-declaration | let-declaration |
parameter-declaration }

```
global-declaration ::= { ( DEFGLOBAL id-declaration . id-declaration) |
                         (DEFMANIFEST ????) }

id-declaration ::= ( identifier type-identifier . option-list )

option-list ::= ( { VOLATILE ,
                (ADDRESS expression) ,
                (ALIGNMENT {WORD | LONG}) ,
                (INIT expression)
                } )

let-declaration ::= { ( LET binding-form-list body) |
                      (LET* binding-form-list body) }

binding-form-list ::= ( binding-form . binding-form )
binding-form ::= { (identifier expression) |
                   ((identifier type-id) expression)}
```

Operators

LIL has a standard set of arithmetic, logical, and relational operators.

The arithmetic operators are generic. That is, they work on any numeric operands regardless of their internal type. The types for numeric values are WORD, BYTE, and LONG. Numeric literals are of type LIL-generic-number. (Numeric literals are decimal, not octal. Use #O as in Lisp to enter literal octal values.) The compiler does coercion on operands to make the types match.

The arithmetic operators:

```
+
-
*
//
\
MIN
MAX
```

Logical operators do bit-wise logical operations on numeric type operands. They return numeric values.

The logical operators:

```
LOGAND
LOGIOR
LOGXOR
LOGNOT
LSHL
LSHR
ASHL
ASHR
ROTL
ROTR
```

Relational operators take operands of ordered (enumerated) types only and return a value of type boole.

The relational operators:

```
<
≤
=
≠
```

≥
>

The syntax of all operators is as in Lisp.

Assignment

The assignment operators are SETQ and PSETQ. You can do whole array or whole structure assignment, so long as the types are compatible. SETQ does assignments sequentially; PSETQ does all of the assignments in parallel. As in Lisp, SETQ returns the value of the last form evaluated. PSETQ returns ????.

For assigning initial values to identifiers, see LET and the INIT option of DEFGLOBAL.

*Formal syntax for assignment*

```
assignment ::= { (SETQ assignments) |
                 (PSETQ assignments) }

assignments ::= identifier expression . assignments
```

Expressions

LIL is an expression language. With the notable exception of PROG, each form has a value. Details of expressions that involve array and structure selectors appear in the sections on arrays and structures.

The pointer dereferencing operator is @. The value of @identifier is the object that the pointer points to. Its type is the type of the thing pointed to.

```
expression ::= { literal |
                 identifier |
                 function-application |
                 prog-form |
                 pointer-dereference |
                 (AREF array-identifier dimension-value . dimension-value) |
                 (structure-field-id structure-identifier) }
```

Arrays

An array is simply a collection of objects, all of which have the same type, that are selected according to an element index. You can have arrays of anything, including arrays of arrays and arrays of structures.

*Defining an array type.*

The type of the array index must be numeric. At this time, the sizes of all array dimension specs must be compile-time constants.

```
(deftype map-type (array word 128))
(deftype counter-array-type (array counter-type (-128 128)))
```

*Declaring an array object.*

```
(defglobal (key-map map-type)
           (alt-map map-type))
```

*Array constructors.*

*Array literals.*

*Array element assignment.*

Array element assignment looks the same as in Lisp.

(SETF selector-expression expression)

```
(setf (aref counts bin) 36)
```

*Array element selectors.*

As in Lisp, all array accesses are zero-based and the number in the dimension spec refers to a number one larger than the index of the last element in the array. Array elements are selected by AREF and the appropriate index(es). The type of the index must be numeric. LIL does not provide array slices so you need one index for each dimension of the array.

```
(aref counters 4 27)
(setq t (aref key-map #\meta-m))
```

Structures

A structure is a heterogeneous collection of objects, called fields. Structure fields can have any type.

*Defining a structure type*

Structures are composed of hetergeneous objects. The compiler usually rearranges structure fields internally so as to make optimal use of storage space for an object of that type.

Sometimes you need to ensure that the fields remain in the order in which you declared them (for example, setting up packets for network transmission). PRESERVE-ORDER is an option on a structure type definition for requesting that fields in the object remain in the same order as fields in the definition.

```
(deftype str-type
  (structure ()
   (next code-symbol)
   (kind symbol-kind)
   (minimum-loc word)
   (maximum-loc word)))
```

*Declaring a structure object*

*Structure constructors*

*Structure literals*

*Structure field assignment*

```
(setf field-selector expression)
```

*Structure field selectors*

Structure element values are selected by means of selector forms that DEFTYPE creates. The name of the form is the name of the field. ??can't be that simple. need to explain INCLUDE in here too??

Pointers

Forms for making and testing pointers are provided.

make-pointer *type-name value* *Special Form*

Returns a pointer of type *type-name* pointing at *value*. *value* must be coercible to the type pointed to by *type-name*.

make-null-pointer *type-name* *Special Form*

Returns a pointer of type *type-name* pointing at nothing. All null pointers have the same value, so they may be compared and used as flags.

null *pointer-value*

Returns true if *pointer-value* is a null pointer, false otherwise.

Functions

Functions must be declared at top level with DEFUN. For a multiple value return, the function declaration must specify the types for the values being returned.

You can have several different functions with the same name, provided that the formal parameter lists do not have the same types for parameters in corresponding positions. The type of a function is determined by ??does the concept of a function type fit here?? So two functions are the same type if they have formal parameters with the same types.

Unlike Lisp, you can use RETURN to return none, one, or multiple values from a function.

*Formal syntax for functions* function-declaration ::= (DEFUN name-spec parm-list body)

name-spec ::= { name | (name type-id1 . *typeids* )} parm-list ::= (*parm-declarations*)

parm-declarations ::= (identifier type-id . *options*)

options ::= (MODE { VALUE | REF } )

*Function variables*

??function variables should have a type??

function *function-name* — *Special Form*

Returns a ??????? to function-name.

funcall *function* &rest *args*

Calls *function* with *args*. This form will not return a value.

Prog Forms

As in Lisp, LIL has a prog facility. A prog is a construct that is used for its effect rather than for its value and that is used for altering flow of control.

In spite of the fact that it is designed to be executed for effect, a prog can return a value, either using RETURN or by falling out the bottom (depending on the kind of prog).

For controlling flow of control, some prog forms can include labels and unconditional jumps (gotos) to labels. In addition, RETURN provides a mechanism for leaving the body of prog by some means other than falling out the bottom. This is like a break out of a block in a block-structured language.

LIL provides the following set of prog variants, as in Lisp.

| | |
|---|---|
| PROG | Does not return a value unless a RETURN that returns a value is encountered. Can include unconditional jumps (GO) to a label. Can include local variable declarations. |
| GO | Within a PROG, jumps to the specified label. |
| RETURN | Within a PROG (or DO or LOOP), leaves the PROG body immediately and makes the specified value the value of the PROG. |
| PROGN | Returns the value of the last form evaluated. |
| PROG1 | Returns the value of the first form evaluated. |
| PROG2 | Returns the value of the second form evaluated. |

*Formal syntax for progs*

```
prog ::= { (PROG
           prog-declaration-list
           prog-body) |
          ( {PROGN | PROG1 | PROG2 }
          prog-body) }
```

return-form ::= (RETURN *expressions*)

Conditionals

LIL has the standard Lisp conditional structures, IF, COND, AND, and OR. The semantics are as in Lisp.

LIL has SELECT and SELECTQ constructs for conditional execution. SELECTQ allows you to select an alternative based on an expression that is a compile-time constant. SELECT works on expressions that are evalutated at run time.

*Formal syntax for conditionals*

```
conditional-expression ::= { if-expression |
                             cond-expression |
                             and-expression |
                             or-expression |
                             select-expression }
```

Iteration

LIL has two main iteration constructs, LOOP and DO.

Functions and Special Forms Involving Types

Several forms allow manipulation of LIL types. Their behavior is similar to that of Lisp special forms in that type names must be specified. Since LIL is strongly typed, there is no notion of run-time typing.

type-size *type-name* *Special Form*

The number of bytes allocated for objects of type *type-name*.

array-length *value*

The number of elements in *value*. The type of *value* must be some array type.

structure-offset *slot-name type-name* *Special Form*

The distance in bytes from the beginning of objects of type *type-name* to the beginning of *slot-name*.

coerce *type-name value* *Special Form*

*value* treated as type *type-name*.

default-type *value* *Special Form*

This form gives a specific type to a generic number. The type chosen is the smallest "machine type" which will hold *value*. If *value* has a type already, the result is simply *value*.

constant *type-name* &rest *args* *Special Form*

*type* must be either an array or structure type. A value of type *type-name* is created with values filled in as specified. For a structure, *args* are pairs of slot names and values. For an array, *args* is simply a list if values. Each value specified must itself be constant.

```
(constant struct-1
   slot-1 123
   slot-2 456
   slot-3 (constant array-1 0 0 0 0 0))

(constant array-1 1 2 3 4 5)
```

IO - PAL

SCRC:<LMIOB>BI-PHASE.PAL;4

```
;-*- Mode:LISP; Package:USER; Base:10 -*-

;; Bi-phase decoder pal for the console link

(DEFPAL BI-PHASE PAL16R8
  ; pin 1 is 4.9152 MHz clock
  (IPIN 2 ENCODED-INPUT)

  (RPIN 19 RXD-SYNC)
  (RPIN 18 RXD-DLY)
  (RPIN 17 TRANSITION)
  (RPIN 16 SEQUENCER)
  (RPIN 15 RCV-CLK)
  (RPIN 14 MASK)
  (RPIN 13 SAMPLE)
  (RPIN 12 DECODED-OUTPUT)

  (SETQ RXD-SYNC ENCODED-INPUT)          ;Synchronize input data to local clock

  (SETQ RXD-DLY RXD-SYNC)                ;Second-half of synchronizer

  (SETQ TRANSITION (XOR RXD-SYNC RXD-DLY))      ;edge detector

  (SETQ SEQUENCER (AND (NOT MASK) (OR TRANSITION SEQUENCER)))   ;Start sequence

  (SETQ RCV-CLK (NOT SEQUENCER))         ;recovered clock

  (SETQ MASK (NOT RCV-CLK))              ;mask out mid-bit transitions

  (SETQ SAMPLE (COND ((AND SEQUENCER RCV-CLK) RXD-DLY)  ;sample first half data
                     ((NOT (AND SEQUENCER RCV-CLK)) SAMPLE)))

  (SETQ DECODED-OUTPUT (COND ((AND RCV-CLK MASK) (XOR (NOT RXD-DLY) SAMPLE))  ;recovered data
                             ((NOT (AND RCV-CLK MASK)) DECODED-OUTPUT)))

  ;; end of definition
)
```

SCRC:<LMIOB>CACCTL.PAL;1

```
;-*- Mode:LISP; Package:USER; BASE:10 -*-

;PAL For controlling the two word "cache" at the LBUS interface to the
;TV memory on the REV-3 I/O board.  PAL appears on dwg. CACCTL.DWG.

(DEFPAL CACCTL PAL16R6
;  (INPIN 1 -LB STATE CLOCK)

  (IPIN 2 CPU-DATA-CYCLE L)
  (IPIN 3 CPU-WRITE-DM L)
  (IPIN 4 CPU-WRITE)
  (IPIN 5 LB-WRITE L)
  (IPIN 6 LB-ADDR-00)
  (IPIN 7 CPU-ADDR-00)
  (IPIN 8 LB-TV-REQ L)
  (IPIN 9 CACHE-HIT L)

  (OPIN 19 CACHE-ACT-EN L)

  (RPIN 18 ODD-CACHE-WRITE)
  (RPIN 17 ODD-OE L)
  (RPIN 16 EVEN-OE L)
  (RPIN 15 CACHE-DIRTY L)
  (RPIN 14 EVEN-CACHE-WRITE)
  (RPIN 13 CACHE-ACTIVE-CYCLE L)

  (SETQ EVEN-CACHE-WRITE (AND LB-TV-REQ CACHE-HIT LB-WRITE (NOT LB-ADDR-00)
                              (NOT CACHE-DIRTY)))

  (SETQ CACHE-DIRTY (OR (AND CACHE-HIT LB-TV-REQ LB-WRITE (NOT LB-ADDR-00)
                             (NOT CACHE-DIRTY))
                        (AND CACHE-DIRTY (NOT CPU-WRITE-DM))))

  (SETQ CACHE-ACTIVE-CYCLE (OR (AND CACHE-HIT LB-TV-REQ (NOT LB-ADDR-00) LB-WRITE
                                    (NOT CACHE-DIRTY))
                               (AND CACHE-HIT LB-TV-REQ (NOT LB-WRITE) (NOT CACHE-DIRTY))))
```

```
  (SETQ EVEN-OE (OR (AND CACHE-ACTIVE-CYCLE (NOT CPU-ADDR-00) (NOT CPU-WRITE))
                    (AND CPU-DATA-CYCLE (NOT CPU-ADDR-00) (NOT CPU-WRITE))))

  (SETQ ODD-OE  (OR (AND CACHE-ACTIVE-CYCLE (NOT CPU-ADDR-00) (NOT CPU-WRITE))
                    (AND CPU-DATA-CYCLE CPU-ADDR-00 (NOT CPU-WRITE))))

  (SETQ CACHE-ACT-EN (OR (AND CACHE-HIT LB-TV-REQ (NOT LB-ADDR-00) LB-WRITE
                              (NOT CACHE-DIRTY))
                         (AND CACHE-HIT LB-TV-REQ (NOT LB-WRITE) (NOT CACHE-DIRTY))))

);END OF DEFINITION
```

SCRC:<LMIOB>DDROE.PAL;6

```
;-*- Mode:LISP; Package:USER; BASE:10 -*-

;PAL For controlling Display Data Register output enables and the register select
;inputs to the AM29520's.  Pal appears on dwg. FIFCTL.DWG.

(DEFPAL DDROE PAL16L8

  (IPIN 4 TV-DM-ACTIVE-A L)                              ;NOT USED
  (IPIN 5 FILL-ADDR-03)                                  ;NOT USED
  (IPIN 6 FILL-ADDR-02)
  (IPIN 7 FILL-ADDR-01)
  (IPIN 8 FILL-ADDR-00)
  (IPIN 9 FILL-GO)
  (IPIN 11 ODD-CHUNK-COUNT-A L)                          ;NOT USED

  (OPIN 16 DDR-OE-3 L)
  (OPIN 15 DDR-OE-2 L)
  (OPIN 14 DDR-OE-1 L)
  (OPIN 13 DDR-OE-0 L)
  (OPIN 19 DDR-PIPE-S-1)
  (OPIN 12 DDR-PIPE-S-0)

  (FIELD REG-ADDRESS FILL-ADDR-01 FILL-ADDR-00)

  (SETQ DDR-OE-0 (AND FILL-GO (FIELD REG-ADDRESS 0)))

  (SETQ DDR-OE-1 (AND FILL-GO (FIELD REG-ADDRESS 1)))

  (SETQ DDR-OE-2 (AND FILL-GO (FIELD REG-ADDRESS 2)))

  (SETQ DDR-OE-3 (AND FILL-GO (FIELD REG-ADDRESS 3)))

  (SETQ DDR-PIPE-S-0 (AND FILL-GO (NOT FILL-ADDR-02)))

  (SETQ DDR-PIPE-S-1 (AND FILL-GO FILL-ADDR-02))

);END OF DEFINITION
```

SCRC:<LMIOB>DKSER.PAL;3

```
; -*- Mode:Lisp; Package:User; Base:10 -*-

; PAL for disk serial data paths control

(DEFPAL DKSER PAL16L8
  (OPIN 16 DISK-START-BLOCK)                       ;Leading edge of index/sector
  (OPIN 15 ECC-XOR-READ)
  (OPIN 14 ECC-XOR-WRITE)
  (OPIN 13 NEXT-READ-COMPARE)                ;Register input for read compare flag
  (OPIN 19 DISK-FROM-MEM)
  (OPIN 12 DISK-FROM-MEM L)

  (IPIN 18 DISK-START-BLOCK-SYNC2)
  (IPIN 17 DISK-START-BLOCK-SYNC3)
  (IPIN 1 DISK-READ-DATA)                          ;Data bit from disk
  (IPIN 2 ECC-OUT)                           ;Bit out of ECC register
  (IPIN 3 DISK-SH-OUT)                       ;Data bit to disk
  (IPIN 4 READ-COMPARE)                      ;Register output for read compare flag
  (IPIN 5 U-DATA-FIELD)
  (IPIN 6 DISK-START)                        ;State machine starting
  (IPIN 7 DISK-COMMAND-3)                    ;State machine program select
  (IPIN 8 DISK-COMMAND-2)
  (IPIN 9 DISK-COMMAND-1)
  (IPIN 11 DISK-COMMAND-0)

  (FIELD DISK-COMMAND DISK-COMMAND-3 DISK-COMMAND-2 DISK-COMMAND-1 DISK-COMMAND-0)

  ;; Detect leading edge of synchronized block-pulse input
  (SETQ DISK-START-BLOCK (AND DISK-START-BLOCK-SYNC2 (NOT DISK-START-BLOCK-SYNC3)))

  ;; Do a pair of XOR gates (I had some spare pins on the PAL)
  (SETQ ECC-XOR-READ (OR (AND DISK-READ-DATA (NOT ECC-OUT))
                         (AND (NOT DISK-READ-DATA) ECC-OUT)))
```

```
(SETQ ECC-XOR-WRITE (OR (AND DISK-SH-OUT (NOT ECC-OUT))
                        (AND (NOT DISK-SH-OUT) ECC-OUT)))

;; Set READ-COMPARE if disk and memory data differ; clear at startup
(SETQ DATA-DIFFERENCE (AND U-DATA-FIELD
                           (OR (AND DISK-READ-DATA (NOT DISK-SH-OUT))
                               (AND (NOT DISK-READ-DATA) DISK-SH-OUT))))
(SETQ NEXT-READ-COMPARE (AND (NOT DISK-START)
                             (OR READ-COMPARE DATA-DIFFERENCE)))

;;---                    opcodes 0-7 are reads, 10-17 are writes
;;---               ignore unused inputs error.
(SETQ DISK-FROM-MEM (FIELD DISK-COMMAND #o(10 11 12 13 14 15 16 17))))
```

SCRC:<LMIOB>DKSTM2.PAL;3

```
; -*- Mode:Lisp; Package:User; Base:10 -*-

; PAL for disk state machine

(DEFPAL DKSTM2 PAL16L8
  (OPIN 14 ECC=ZERO)                ;Status flag
  (OPIN 13 NEXT-STATE-0)            ;Skip bit of prom address
  (OPIN 19 SET-DISK-ERROR L)        ;Direct Set error flip flop
  (OPIN 12 DISK-DONE L)             ;Clocked Clear idle flip flop

  (IPIN 18 ECC-ZERO-D)              ;ECC bits tested for zero 5 at a time
  (IPIN 17 ECC-ZERO-C)
  (IPIN 16 ECC-ZERO-B)
  (IPIN 15 ECC-ZERO-A)
  (IPIN 1 ECC-11)                   ;One left-over ECC bit
  (IPIN 2 PADDLE-SELECT-ERROR)          ;Disk select status
  (IPIN 3 ADVANCE-STATE L)          ;State machine advancing this clock
  (IPIN 4 OVERRUN)                  ;Error status
  (IPIN 5 DISK-START-BLOCK)             ;Error status
  (IPIN 6 DISK-END-FLAG)                ;Condition from L machine
  (IPIN 7 NEXT-STATE-CTL-1)         ;Field controlling NEXT-STATE-0
  (IPIN 8 NEXT-STATE-CTL-0)
  (IPIN 9 U-FUNC-1)                 ;DISK-DONE/error control field
  (IPIN 11 U-FUNC-0)

  (FIELD NEXT-CTL NEXT-STATE-CTL-1 NEXT-STATE-CTL-0)
               ;0 output 0
               ;1 output 1
               ;2 output DISK-END-FLAG
               ;3 (not used)

  (FIELD U-FUNC U-FUNC-1 U-FUNC-0)
               ;0 nothing
               ;1 stop if ecc=0
               ;2 error if DISK-START-BLOCK
               ;3 stop

  (SETQ ECC=ZERO (AND ECC-ZERO-A ECC-ZERO-B ECC-ZERO-C
                      ECC-ZERO-D (NOT ECC-11)))

  (SETQ NEXT-STATE-0 (OR (FIELD NEXT-CTL 1)
                         (AND (FIELD NEXT-CTL 2) DISK-END-FLAG)))

  (SETQ SET-DISK-ERROR (OR OVERRUN PADDLE-SELECT-ERROR
                           (AND (FIELD U-FUNC 2) DISK-START-BLOCK)))

  (SETQ DISK-DONE (OR (AND (FIELD U-FUNC 1) ECC=ZERO)
                      (AND (FIELD U-FUNC 3) ADVANCE-STATE))))
```

SCRC:<LMIOB>FIFCTL.PAL;5

```
;-*- Mode:LISP; Package:USER; BASE:10 -*-

;PAL For controlling the RAM FIFO.  Pal appears on dwg. FIFCTL.DWG.

(DEFPAL FIFCTL PAL16R4

;  (IPIN 1 PIXEL CLK/4 L)        ;CLOCK INPUT
;  (IPIN 11 GND)                 ;OUTPUT ENABLE

  (IPIN 18 TV-DM-ACTIVE-A L)
  (IPIN 13 STROBE-A)
  (IPIN 12 S+60-NS-A)
  (IPIN 2 LAST-CHUNK L)
  (IPIN 3 ODD-CHUNK-COUNT-A L)
  (IPIN 4 FILL-GO)
  (IPIN 5 FIFO-REQ+12)
  (IPIN 6 FILL-ADDR-03)
  (IPIN 7 FILL-ADDR-02)
  (IPIN 8 FILL-ADDR-01)
  (IPIN 9 FILL-ADDR-00)
```

```
  (RPIN 17 DRAIN-CNT-EN L)
  (RPIN 16 FILL-CNT-EN L)
  (RPIN 15 FIFO-WRITE L)
  (RPIN 14 LD-VSR L)

  (OPIN 19 FILL-GO-EN)

  (FIELD REG-ADDRESS FILL-ADDR-02 FILL-ADDR-01 FILL-ADDR-00)

;The DMD registers have been loaded with fresh data. Start a FIFO stuff cycle.
  (SETQ FILL-GO-EN (OR (AND S+60-NS-A (NOT FILL-GO))

                       (AND FILL-GO (NOT LAST CHUNK) (NOT (FIELD REG-ADDRESS 7)))

;This is the last chunk and the chunk count was even so we go ahead and load the odd one.

                       (AND FILL-GO LAST-CHUNK (NOT ODD-CHUNK-COUNT)
                            (NOT (FIELD REG-ADDRESS 7)))

;This is the last chunk and the count was odd so we do not load the odd one.

                       (AND FILL-GO LAST-CHUNK ODD-CHUNK-COUNT (NOT (FIELD REG-ADDRESS 3)))))

;Whenever the FIFO request wants it, it gets it.
  (SETQ DRAIN-CNT-EN FIFO-REQ+12)

;Fill go enable is asserted and the FIFO request is not happening so we might as well
;start the cycle now.

  (SETQ FILL-CNT-EN (OR (AND FILL-GO-EN (NOT FIFO-REQ+12))

;Increment te fill count.

                        (AND FILL-GO (NOT FIFO-REQ+12) (NOT LAST-CHUNK))

;We are at the end of a line but this is the even half of the last cycle so that we can
;go anyway.

                        (AND FILL-GO (NOT FIFO-REQ+12) (NOT FILL-ADDR-02)
                                                            LAST-CHUNK)

;We are at the end of a line, the odd half of the cycle, and it is not an odd chunk count.

                        (AND FILL-GO (NOT FIFO-REQ+12) LAST-CHUNK FILL-ADDR-02
                             (NOT ODD-CHUNK-COUNT))

;Something is wrong. The counter should always be at REG-ADDRESS 0 when FILL GO is not
;asserted.  Increment it till this is true.

                             (NOT-FILL-GO) (NOT (FIELD REG-ADDRESS 0)))

;FIFO WRITE always happens when you are filling.  It never happens when you are
;draining.

  (SETQ FIFO-WRITE (OR (AND FILL-GO-EN (NOT FIFO-REQ+12))
                       (AND FILL-GO (NOT FIFO-REQ+12))))

;After you enable the drain count you load the VSR.  Pipe delays.
  (SETQ LD-VSR DRAIN-CNT-EN)

;;END OF DEFINITION
)
```

SCRC:<LMIOB>LBDMA1.PAL;6

```
;-*- Mode:LISP; Package:USER; Base:10 -*-

;PAL For selecting microdevice write registers (or pseudo registers)
;(in drawings LBDMA)

;Each device on the board takes up a microdevice write address space of
;three bits (eight registers).  The task must be able to do a DMA write,
;a DISMISS write, a TASK END write or any combination of the three in
;the same write.
;It is convenient also for reading the net buffer register to have this
;latitude

(DEFPAL LBDMA1 PAL16L8                                          ;PAL16L8A
  (IPIN 1 LB-RESET L)
  (IPIN 2 LB-WRITE)
  (IPIN 3 LB-DEV-4)
  (IPIN 4 LB-DEV-3)
  (IPIN 5 LB-DEV-2)
  (IPIN 6 LB-DEV-1)
  (IPIN 7 LB-DEV-0)
  (IPIN 8 LB-DEV-READ)
  (IPIN 9 LB-DEV-WRITE)
  (IPIN 11 DEVICE-MATCH L)
```

```
  (OPIN 18 DISK-DMA-RQ-CYCLE)
  (OPIN 17 DISK-DISMISS)
  (OPIN 16 DISK-END)
  (OPIN 15 DISK-TASK-ACK)
  (OPIN 14 NET-DMA-RQ-CYCLE)
  (OPIN 13 NET-DISMISS)
  (OPIN 19 NET-END)
  (OPIN 12 DMA-TO-MEM-RQ-CYCLE)

  (FIELD DEVICE-ADDRESS LB-DEV-4 LB-DEV-3)

  (SETQ LB-DEV-CYCLE (OR LB-DEV-READ LB-DEV-WRITE))

;upper two bits specify which device you're talking to
; 00---disk
; 01---net
; 10---pio
; 11---vd

  (SETQ DISK-SELECT (AND (FIELD DEVICE-ADDRESS 0) DEVICE-MATCH))

  (SETQ NET-SELECT (AND (FIELD DEVICE-ADDRESS 1) DEVICE-MATCH))

  (SETQ PIO-SELECT (AND (FIELD DEVICE-ADDRESS 2) DEVICE-MATCH))

;lower three bits specify the function

  (FIELD DEV-OP LB-DEV-2 LB-DEV-1 LB-DEV-0)

;DISK FUNCTIONS
;       0       write disk buffer directly (rev 2 and later)
;       1       dma cycle (start dma cycle without dismissing)
;       2       dismiss, task acknowledge (just clear wakeup)
;       3       dismiss & dma cycle
;       4       dismiss (only)
;       5       kill disk task
;       6       dismiss, task acknowledge, set end flag
;       7       dma cycle & set end flag & dismiss

  (SETQ DISK-DMA-RQ-CYCLE (AND DISK-SELECT LB-DEV-WRITE (FIELD DEV-OP (1 3 7))))

  (SETQ DISK-DISMISS (OR LB-RESET
                         (AND DISK-SELECT LB-DEV-WRITE (FIELD DEV-OP (2 3 4 5 6 7)))))

  (SETQ DISK-END (AND DISK-SELECT LB-DEV-WRITE (FIELD DEV-OP (6 7))))

  (SETQ DISK-TASK-ACK (AND DISK-SELECT LB-DEV-WRITE (FIELD DEV-OP (2 6))))

;NET FUNCTIONS
;       bit 0   DMA
;       bit 1   Dismiss
;       bit 2   End

  (SETQ NET-DMA-RQ-CYCLE (AND NET-SELECT LB-DEV-CYCLE LB-DEV-0))

  (SETQ NET-DISMISS (OR LB-RESET (AND NET-SELECT LB-DEV-CYCLE LB-DEV-1)))

  (SETQ NET-END (AND NET-SELECT LB-DEV-CYCLE LB-DEV-2))

;PIO functions same as NET

  (SETQ PIO-DMA-RQ-CYCLE (AND PIO-SELECT LB-DEV-WRITE LB-DEV-0))

  (SETQ DMA-TO-MEM-RQ-CYCLE (AND (OR DISK-DMA-RQ-CYCLE NET-DMA-RQ-CYCLE)
                                  LB-WRITE))
  ;;; end of definition
  )
```

SCRC:<LMIOB>LBDMA2.PAL;7

```
;-*- Mode:LISP; Package:USER; Base:10 -*-

;PAL For selecting microdevice write registers (or pseudo registers)
;(in drawings LBDMA)

;Each device on the board takes up a microdevice write address space of
;three bits (eight registers).  The task must be able to do a DMA write,
;a DISMISS write, a TASK END write or any combination of the three in
;the same write.

(DEFPAL LBDMA2 PAL16L8                                  ;PAL16L8A
  (IPIN 1 LB-RESET L)
; (IPIN 2 LB-WRITE)               ;NOT USED
  (IPIN 3 LB-DEV-4)
  (IPIN 4 LB-DEV-3)
  (IPIN 5 LB-DEV-2)
  (IPIN 6 LB-DEV-1)
  (IPIN 7 LB-DEV-0)
  (IPIN 8 LB-DEV-READ)
```

```
  (IPIN 9 LB-DEV-WRITE)
  (IPIN 11 DEVICE-MATCH L)

  (OPIN 17 AUDIO-DISMISS)
  (OPIN 15 VD-DISMISS L)
  (OPIN 13 DISK-MICRODEVICE-WRITE)
  ;PINS 14,16,18 SPARE

  (OPIN 19 DEV-READ-CYCLE)
  (OPIN 12 DEV-WRITE-CYCLE)

  (FIELD DEVICE-ADDRESS LB-DEV-4 LB-DEV-3)

  (SETQ DEV-WRITE-CYCLE (AND DEVICE-MATCH LB-DEV-WRITE))

  (SETQ DEV-READ-CYCLE (AND DEVICE-MATCH LB-DEV-READ))

;lower three bits specify the function (whether DISMISS, DMA, NET or all)
  (SETQ END-RQ (AND LB-DEV-2 LB-DEV-WRITE))

  (SETQ DISMISS-RQ (AND LB-DEV-1 LB-DEV-WRITE))

  (SETQ DMA-RQ (AND LB-DEV-0 LB-DEV-WRITE))

;upper two bits specify which device you're talking to
; 00---disk
; 01---net
; 10---audio
; 11---vd

  (SETQ VD-SELECT (AND (FIELD DEVICE-ADDRESS 3) DEVICE-MATCH))
  (SETQ AUDIO-SELECT (AND (FIELD DEVICE-ADDRESS 2) DEVICE-MATCH))

  (SETQ AUDIO-DISMISS (OR LB-RESET (AND AUDIO-SELECT DISMISS-RQ)))

  (SETQ VD-DISMISS (OR LB-RESET (AND VD-SELECT DISMISS-RQ)))

  (SETQ DISK-MICRODEVICE-WRITE (AND DEV-WRITE-CYCLE (FIELD DEVICE-ADDRESS 0)))

  ;;; end of definition
  )
```

SCRC:<LMIOB>LBDMA3.PAL:10

```
;-*- Mode:LISP; Package:USER; Base:10 -*-

;PAL For selecting microdevice write registers (or pseudo registers)
;(in drawings LBDMA)

(DEFPAL LBDMA3 PAL16L8                                 ;PAL16L8A
  (IPIN 1 LBUS-IO-REQUEST L)
  (IPIN 2 SLOT-ADDR-MATCH L)
  (IPIN 3 LB-DEV-4)
  (IPIN 4 LB-DEV-3)
  (IPIN 5 LB-DEV-2)
  (IPIN 6 LB-DEV-1)
  (IPIN 7 LB-DEV-0)
  (IPIN 8 LB-DEV-READ)
  (IPIN 9 LB-DEV-WRITE)
  (IPIN 11 DEVICE-MATCH L)

  (OPIN 19 KILL-DISK-TASK L)
  (OPIN 18 READ-DISK-BUF L)
  (OPIN 17 READ-NET-BUF L)
  (OPIN 16 WRITE-NET-WBC)
  (OPIN 15 WRITE-DISK-BUF L)
  (OPIN 14 WRITE-NET-BUF L)
  (OPIN 13 WRITE-AUDIO-BUF)
  (OPIN 12 IO-READ-CYCLE)

  (FIELD DEVICE-ADDRESS LB-DEV-4 LB-DEV-3)
  (FIELD DEVICE-OP-CODE LB-DEV-2 LB-DEV-1 LB-DEV-0)

;upper two bits specify which device you're talking to
; 00---disk
; 01---net
; 10---audio
; 11---vd (except for write net wbc -- see below)

  (SETQ DIRECT-DEV-WRITE-CYCLE (AND DEVICE-MATCH LB-DEV-WRITE
                                    (FIELD DEVICE-OP-CODE 0)))

  (SETQ DIRECT-DEV-READ-CYCLE (AND DEVICE-MATCH LB-DEV-READ
                                   (FIELD DEVICE-OP-CODE 0)))

  (SETQ DIRECT-NET-READ-CYCLE (AND DEVICE-MATCH LB-DEV-READ))

  (SETQ DIRECT-NET-WRITE-CYCLE (AND DEVICE-MATCH LB-DEV-WRITE))
```

```
  (SETQ READ-DISK-BUF (AND (FIELD DEVICE-ADDRESS 0) DIRECT-DEV-READ-CYCLE))

  (SETQ READ-NET-BUF  (AND (FIELD DEVICE-ADDRESS 1) DIRECT-NET-READ-CYCLE))

  (SETQ WRITE-DISK-BUF  (AND (FIELD DEVICE-ADDRESS 0) DIRECT-DEV-WRITE-CYCLE))

  (SETQ WRITE-NET-BUF  (AND (FIELD DEVICE-ADDRESS 1) DIRECT-NET-WRITE-CYCLE))

;; KLUDGE
  (SETQ WRITE-NET-WBC  (AND (FIELD DEVICE-ADDRESS 3) DIRECT-DEV-WRITE-CYCLE))

  (SETQ WRITE-AUDIO-BUF  (AND (FIELD DEVICE-ADDRESS 2) DIRECT-DEV-WRITE-CYCLE))

  (SETQ IO-READ-CYCLE (AND LBUS-IO-REQUEST SLOT-ADDR-MATCH))

  (SETQ KILL-DISK-TASK (AND (FIELD DEVICE-ADDRESS 0) DEVICE-MATCH LB-DEV-WRITE
                            (FIELD DEVICE-OP-CODE 5)))

  ;;; end of definition
  )

SCRC:<LMIOB>LBMIO1.PAL;4

;-*- Mode:LISP; Package:USER; Base:10 -*-

;PAL For selecting memory-mapped registers for reading (in drawings LBMIO)

(DEFPAL LBMIO1 PAL16R8
  (IPIN 2 LB-ADDR-18)
  (IPIN 3 LB-ADDR-17)
  (IPIN 4 LB-ADDR-3)
  (IPIN 5 LB-ADDR-2)
  (IPIN 6 LB-ADDR-1)
  (IPIN 7 LB-ADDR-0)
  (IPIN 8 IO-READ-ACTIVE-CYCLE)
  (IPIN 9 IO-READ-RQ)

  (RPIN 19 READ-DISK-COMMAND L)
  (RPIN 18 READ-DISK-ECC L)
  (RPIN 17 READ-DISK-STATUS L)
  (RPIN 16 READ-DISK-RPS L)
  (RPIN 15 READ-NET-STATUS L)
  (RPIN 14 READ-VD-STATUS L)
  (RPIN 13 READ-VD-DIAG L)
  (RPIN 12 READ-PADDLE-ENB L)

  (FIELD REG-ADDR LB-ADDR-3 LB-ADDR-2 LB-ADDR-1 LB-ADDR-0)

  (SETQ REG-READ-RQ (AND (NOT LB-ADDR-18) (NOT LB-ADDR-17) IO-READ-RQ))

  (SETQ READ-DISK-COMMAND (OR (AND REG-READ-RQ (FIELD REG-ADDR 0))
                              (AND IO-READ-ACTIVE-CYCLE READ-DISK-COMMAND)))

  (SETQ READ-DISK-ECC (OR (AND REG-READ-RQ (FIELD REG-ADDR 1))
                          (AND IO-READ-ACTIVE-CYCLE READ-DISK-ECC)))

  (SETQ READ-DISK-STATUS (OR (AND REG-READ-RQ (FIELD REG-ADDR 2))
                             (AND IO-READ-ACTIVE-CYCLE READ-DISK-STATUS)))

  (SETQ READ-DISK-RPS (OR (AND REG-READ-RQ (FIELD REG-ADDR 3))
                          (AND IO-READ-ACTIVE-CYCLE READ-DISK-RPS)))

  (SETQ READ-NET-STATUS (OR (AND REG-READ-RQ (FIELD REG-ADDR 4))
                            (AND IO-READ-ACTIVE-CYCLE READ-NET-STATUS)))

  (SETQ READ-VD-STATUS (OR (AND REG-READ-RQ (FIELD REG-ADDR 6))
                           (AND IO-READ-ACTIVE-CYCLE READ-VD-STATUS)))

  (SETQ READ-VD-DIAG (OR (AND REG-READ-RQ (FIELD REG-ADDR 7))
                         (AND IO-READ-ACTIVE-CYCLE READ-VD-DIAG)))

  (SETQ READ-PADDLE-ENB (OR (AND REG-READ-RQ (FIELD REG-ADDR 8))
                            (AND IO-READ-ACTIVE-CYCLE READ-PADDLE-ENB)))

  ;; end of definition
)

SCRC:<LMIOB>LBMIO2.PAL;4

;-*- Mode:LISP; Package:USER; Base:10 -*-

;PAL For selecting memory-mapped registers for reading (in drawings LBMIO)

(DEFPAL LBMIO2 PAL16R8
  (IPIN 2 LB-ADDR-18)
  (IPIN 3 LB-ADDR-17)
  (IPIN 4 LB-ADDR-3)
```

```
  (IPIN 5 LB-ADDR-2)
  (IPIN 6 LB-ADDR-1)
  (IPIN 7 LB-ADDR-0)
  (IPIN 8 IO-READ-ACTIVE-CYCLE)
  (IPIN 9 IO-READ-RQ)

  (RPIN 13 READ-PIO-DATA L)
  (RPIN 12 READ-PIO-STATUS L)

  (FIELD REG-ADDR LB-ADDR-3 LB-ADDR-2 LB-ADDR-1 LB-ADDR-0)

  (SETQ REG-READ-RQ (AND (NOT LB-ADDR-18) (NOT LB-ADDR-17) IO-READ-RQ))

  (SETQ READ-PIO-STATUS (OR (AND REG-READ-RQ (FIELD REG-ADDR 9.))
                            (AND IO-READ-ACTIVE-CYCLE READ-PIO-STATUS)))

  (SETQ READ-PIO-DATA (OR (AND REG-READ-RQ (FIELD REG-ADDR 10.))
                          (AND IO-READ-ACTIVE-CYCLE READ-PIO-DATA)))

  ;; end of definition
)
```

SCRC:<LMIOB>LBMIO3.PAL;3

```
;-*- Mode:LISP; Package:USER; Base:10 -*-

;PAL For selecting memory-mapped registers for writing (in drawings LBMIO)

(DEFPAL LBMIO3 PAL16R8

  (IPIN 2 LB-ADDR-18)
  (IPIN 3 LB-ADDR-17)
  (IPIN 4 LB-ADDR-3)
  (IPIN 5 LB-ADDR-2)
  (IPIN 6 LB-ADDR-1)
  (IPIN 7 LB-ADDR-0)
;; 8 spare
  (IPIN 9 IO-WRITE-RQ)

  (RPIN 19 WRITE-DISK-COMMAND L)
  (RPIN 18 WRITE-DISK-DIAG L)
  (RPIN 17 WRITE-NET-DIAG L)
  (RPIN 16 WRITE-NET-CNTRL L)
  (RPIN 15 WRITE-VD-CNTRL L)
  (RPIN 14 WRITE-PIO-CNTRL L)
  (RPIN 13 WRITE-PIO-DATA L)
  (RPIN 12 WRITE-PADDLE-ENB L)

  (FIELD REG-ADDR LB-ADDR-3 LB-ADDR-2 LB-ADDR-1 LB-ADDR-0)

  (SETQ REG-WRITE-RQ (AND (NOT LB-ADDR-18) (NOT LB-ADDR-17) IO-WRITE-RQ))

  (SETQ WRITE-DISK-COMMAND (AND REG-WRITE-RQ (FIELD REG-ADDR 0)))

  (SETQ WRITE-DISK-DIAG (AND REG-WRITE-RQ (FIELD REG-ADDR 2)))

  (SETQ WRITE-NET-CNTRL (AND REG-WRITE-RQ (FIELD REG-ADDR 4)))

  (SETQ WRITE-NET-DIAG (AND REG-WRITE-RQ (FIELD REG-ADDR 5)))

  (SETQ WRITE-VD-CNTRL (AND REG-WRITE-RQ (FIELD REG-ADDR 6)))

  (SETQ WRITE-PADDLE-ENB (AND REG-WRITE-RQ (FIELD REG-ADDR 8.)))

  (SETQ WRITE-PIO-CNTRL (AND REG-WRITE-RQ (FIELD REG-ADDR 9.)))

  (SETQ WRITE-PIO-DATA (AND REG-WRITE-RQ (FIELD REG-ADDR 10.)))

  ;; end of definition
)
```

SCRC:<LMIOB>LBMIOR.PAL;5

```
;-*- Mode:LISP; Package:USER; Base:10 -*-

;PAL For selecting memory-mapped registers for reading (in drawings LBMIO)

(DEFPAL LBMIO1 PAL16R8
  (IPIN 2 LB-ADDR-18)
  (IPIN 3 LB-ADDR-17)
  (IPIN 4 LB-ADDR-3)
  (IPIN 5 LB-ADDR-2)
  (IPIN 6 LB-ADDR-1)
  (IPIN 7 LB-ADDR-0)
  (IPIN 8 IO-READ-ACTIVE-CYCLE)
  (IPIN 9 IO-READ-RQ)

  (RPIN 19 READ-DISK-COMMAND L)
```

```
  (RPIN 18 READ-DISK-ECC L)
  (RPIN 17 READ-DISK-STATUS L)
  (RPIN 16 READ-DISK-RPS L)
  (RPIN 15 READ-NET-STATUS L)
  (RPIN 14 READ-VD-STATUS L)
  (RPIN 12 READ-PADDLE-ENB L)

  (FIELD REG-ADDR LB-ADDR-3 LB-ADDR-2 LB-ADDR-1 LB-ADDR-0)

  (SETQ REG-READ-RQ (AND (NOT LB-ADDR-18) (NOT LB-ADDR-17) IO-READ-RQ))

  (SETQ READ-DISK-COMMAND (OR (AND REG-READ-RQ (FIELD REG-ADDR 0))
                              (AND IO-READ-ACTIVE-CYCLE READ-DISK-COMMAND)))

  (SETQ READ-DISK-ECC (OR (AND REG-READ-RQ (FIELD REG-ADDR 1))
                          (AND IO-READ-ACTIVE-CYCLE READ-DISK-ECC)))

  (SETQ READ-DISK-STATUS (OR (AND REG-READ-RQ (FIELD REG-ADDR 2))
                             (AND IO-READ-ACTIVE-CYCLE READ-DISK-STATUS)))

  (SETQ READ-DISK-RPS (OR (AND REG-READ-RQ (FIELD REG-ADDR 3))
                          (AND IO-READ-ACTIVE-CYCLE READ-DISK-RPS)))

  (SETQ READ-NET-STATUS (OR (AND REG-READ-RQ (FIELD REG-ADDR 4))
                            (AND IO-READ-ACTIVE-CYCLE READ-NET-STATUS)))

  (SETQ READ-VD-STATUS (OR (AND REG-READ-RQ (FIELD REG-ADDR 6))
                           (AND IO-READ-ACTIVE-CYCLE READ-VD-STATUS)))


  (SETQ READ-PADDLE-ENB (OR (AND REG-READ-RQ (FIELD REG-ADDR 8))
                            (AND IO-READ-ACTIVE-CYCLE READ-PADDLE-ENB)))

  ;; end of definition
)
```

SCRC:<LMIOB>LBMIOW.PAL;6

```
MN;-*- Mode:LISP; Package:USER; Base:10 -*-

;PAL For selecting memory-mapped registers for writing (in drawings LBMIO)

(DEFPAL LBMIO3 PAL16R8

  (IPIN 2 LB-ADDR-18)
  (IPIN 3 LB-ADDR-17)
  (IPIN 4 LB-ADDR-3)
  (IPIN 5 LB-ADDR-2)
  (IPIN 6 LB-ADDR-1)
  (IPIN 7 LB-ADDR-0)
;; 8 spare
  (IPIN 9 IO-WRITE-RQ)

  (RPIN 19 WRITE-DISK-COMMAND)
  (RPIN 18 WRITE-DISK-DIAG)
  (RPIN 17 WRITE-NET-DIAG)
  (RPIN 16 WRITE-NET-CNTRL)
  (RPIN 15 WRITE-VD-CNTRL)
  (RPIN 14 WRITE-AUD-CNTRL)
  (RPIN 12 WRITE-PADDLE-ENB)

  (FIELD REG-ADDR LB-ADDR-3 LB-ADDR-2 LB-ADDR-1 LB-ADDR-0)

  (SETQ REG-WRITE-RQ (AND (NOT LB-ADDR-18) (NOT LB-ADDR-17) IO-WRITE-RQ))

  (SETQ WRITE-DISK-COMMAND (AND REG-WRITE-RQ (FIELD REG-ADDR 0)))

  (SETQ WRITE-DISK-DIAG (AND REG-WRITE-RQ (FIELD REG-ADDR 2)))

  (SETQ WRITE-NET-CNTRL (AND REG-WRITE-RQ (FIELD REG-ADDR 4)))

  (SETQ WRITE-NET-DIAG (AND REG-WRITE-RQ (FIELD REG-ADDR 5)))

  (SETQ WRITE-VD-CNTRL (AND REG-WRITE-RQ (FIELD REG-ADDR 6)))

  (SETQ WRITE-PADDLE-ENB (AND REG-WRITE-RQ (FIELD REG-ADDR 8.)))

  (SETQ WRITE-AUD-CNTRL (AND REG-WRITE-RQ (FIELD REG-ADDR 9.)))

  ;; end of definition
)
```

SCRC:<LMIOB>LBSEL1.PAL;7

```
;-*- Mode:LISP; Package:USER; Base:10 -*-

;PAL For selecting memory-mapped registers for reading (in drawings LBSEL)
```

```
(DEFPAL LBSEL1 PAL16R8
  (IPIN 3 LB-ADDR-18)
  (IPIN 4 LB-ADDR-17)
  (IPIN 5 LB-ADDR-2)
  (IPIN 6 LB-ADDR-1)
  (IPIN 7 LB-ADDR-0)
  (IPIN 8 IO-READ-ACTIVE-CYCLE)
  (IPIN 9 IO-READ-RQ)

  (RPIN 19 READ-DISK-COMMAND L)
  (RPIN 18 READ-DISK-ECC L)
  (RPIN 17 READ-DISK-STATUS L)
  (RPIN 16 READ-DISK-RPS L)
  (RPIN 15 READ-NET-STATUS L)
  (RPIN 14 READ-VD-STATUS L)
  (RPIN 13 READ-VD-DIAG L)
  (RPIN 12 READ-PADDLE-ENB L)

  (FIELD REG-ADDR LB-ADDR-2 LB-ADDR-1 LB-ADDR-0)

  (SETQ REG-READ-RQ (AND (NOT LB-ADDR-18) (NOT LB-ADDR-17) IO-READ-RQ))

  (SETQ READ-DISK-COMMAND (OR (AND REG-READ-RQ (FIELD REG-ADDR 0))
                              (AND IO-READ-ACTIVE-CYCLE READ-DISK-COMMAND)))

  (SETQ READ-DISK-ECC (OR (AND REG-READ-RQ (FIELD REG-ADDR 1))
                          (AND IO-READ-ACTIVE-CYCLE READ-DISK-ECC)))

  (SETQ READ-DISK-STATUS (OR (AND REG-READ-RQ (FIELD REG-ADDR 2))
                             (AND IO-READ-ACTIVE-CYCLE READ-DISK-STATUS)))

  (SETQ READ-DISK-RPS (OR (AND REG-READ-RQ (FIELD REG-ADDR 3))
                          (AND IO-READ-ACTIVE-CYCLE READ-DISK-RPS)))

  (SETQ READ-NET-STATUS (OR (AND REG-READ-RQ (FIELD REG-ADDR 4))
                            (AND IO-READ-ACTIVE-CYCLE READ-NET-STATUS)))

  (SETQ READ-VD-STATUS (OR (AND REG-READ-RQ (FIELD REG-ADDR 5))
                           (AND IO-READ-ACTIVE-CYCLE READ-VD-STATUS)))

  (SETQ READ-VD-DIAG (OR (AND REG-READ-RQ (FIELD REG-ADDR 6))
                         (AND IO-READ-ACTIVE-CYCLE READ-VD-DM-ADR)))

  (SETQ READ-PADDLE-ENB (OR (AND REG-READ-RQ (FIELD REG-ADDR 7))
                            (AND IO-READ-ACTIVE-CYCLE READ-PADDLE-ENB)))

  ;; end of definition
)
```

SCRC:<LMIOB>LBSEL2.PAL;3

```
;-*- Mode:LISP; Package:USER; Base:10 -*-

;PAL For selecting memory-mapped registers for reading (in drawings LBSEL)

(DEFPAL LBSEL2 PAL16R8

  (IPIN 3 LB-ADDR-18)
  (IPIN 4 LB-ADDR-17)
  (IPIN 5 LB-ADDR-2)
  (IPIN 6 LB-ADDR-1)
  (IPIN 7 LB-ADDR-0)
;; 8 spare
  (IPIN 9 IO-WRITE-RQ)

  (RPIN 19 WRITE-DISK-COMMAND L)
  (RPIN 18 WRITE-DISK-DIAG L)
  (RPIN 17 WRITE-NET-DIAG L)
;; 16 SPARE
  (RPIN 15 WRITE-NET-CNTRL L)
  (RPIN 14 WRITE-VD-CNTRL L)
;;  13 SPARE
  (RPIN 12 WRITE-PADDLE-ENB L)

  (FIELD REG-ADDR LB-ADDR-2 LB-ADDR-1 LB-ADDR-0)

  (SETQ REG-WRITE-RQ (AND (NOT LB-ADDR-18) (NOT LB-ADDR-17) IO-WRITE-RQ))

  (SETQ WRITE-DISK-COMMAND (AND REG-WRITE-RQ (FIELD REG-ADDR 0)))

  (SETQ WRITE-DISK-DIAG (AND REG-WRITE-RQ (FIELD REG-ADDR 1)))

  (SETQ WRITE-NET-DIAG (AND REG-WRITE-RQ (FIELD REG-ADDR 2)))

;; 3 is spare

  (SETQ WRITE-NET-CNTRL (AND REG-WRITE-RQ (FIELD REG-ADDR 4)))

  (SETQ WRITE-VD-CNTRL (AND REG-WRITE-RQ (FIELD REG-ADDR 5)))
```

```
;; 6 is spare
  (SETQ WRITE-PADDLE-ENB (AND REG-WRITE-RQ (FIELD REG-ADDR 7)))

  ;; end of definition
)
```

SCRC:<LMIOB>LBSEL3.PAL;8

```
;-*- Mode:LISP; Package:USER; Base:10 -*-

;PAL For selecting microdevice write registers (or pseudo registers)
;(in drawings LBSEL)

;Each device on the board takes up a microdevice write address space of
;three bits (eight registers).  The task must be able to do a DMA write,
;a DISMISS write, a TASK END write or any combination of the three in
;the same write.

(DEFPAL LBSEL3 PAL16L8
  (IPIN 3 LB-WRITE)
  (IPIN 4 LB-DEV-4)
  (IPIN 5 LB-DEV-3)
  (IPIN 6 LB-DEV-2)
  (IPIN 7 LB-DEV-1)
  (IPIN 8 LB-DEV-0)
  (IPIN 9 LB-DEV-WRITE)
  (IPIN 11 DEVICE-MATCH L)

  (OPIN 18 DISK-DMA-RQ-CYCLE)
  (OPIN 17 DISK-DISMISS)
  (OPIN 16 DISK-END)
  (OPIN 15 DISK-TASK-ACK)
  (OPIN 14 NET-DMA-RQ-CYCLE)
  (OPIN 13 NET-DISMISS)
  (OPIN 19 NET-END)
  (OPIN 12 DMA-TO-MEM-RQ-CYCLE)

  (FIELD DEVICE-ADDRESS LB-DEV-4 LB-DEV-3)

;upper two bits specify which device you're talking to
; 00---disk
; 01---net
; 11---TV

  (SETQ DISK-SELECT (AND (FIELD DEVICE-ADDRESS 0) DEVICE-MATCH))

  (SETQ NET-SELECT (AND (FIELD DEVICE-ADDRESS 1) DEVICE-MATCH))

;lower three bits specify the function

  (FIELD OP LB-DEV-2 LB-DEV-1 LB-DEV-0)

;DISK FUNCTIONS
;       0       write disk buffer directly (rev 2 and later)
;       1       dma cycle (start dma cycle without dismissing)
;       2       dismiss, task acknowledge (just clear wakeup)
;       3       dismiss & dma cycle
;       4       dismiss (only)
;       5       kill disk task
;       6       dismiss, task acknowledge, set end flag
;       7       dma cycle & set end flag & dismiss

  (SETQ DISK-DMA-RQ-CYCLE (AND DISK-SELECT LB-DEV-WRITE (FIELD OP (1 3 7))))

  (SETQ DISK-DISMISS (AND DISK-SELECT LB-DEV-WRITE (FIELD OP (2 3 4 5 6 7))))

  (SETQ DISK-END (AND DISK-SELECT LB-DEV-WRITE (FIELD OP (6 7))))

  (SETQ DISK-TASK-ACK (AND DISK-SELECT LB-DEV-WRITE (FIELD OP (2 6))))

; NET OPERATIONS
;       bit 0 - DMA
;       bit 1 - dismiss
;       bit 2 - end

  (SETQ NET-DMA-RQ-CYCLE (AND NET-SELECT LB-DEV-WRITE LB-DEV-0))

  (SETQ NET-DISMISS (AND NET-SELECT LB-DEV-WRITE LB-DEV-1))

  (SETQ NET-END (AND NET-SELECT LB-DEV-WRITE LB-DEV-2))

  ;; if this has too many "or" terms, use the feedback versions
  (SETQ DMA-TO-MEM-RQ-CYCLE (AND LB-WRITE (OR DISK-DMA-RQ-CYCLE NET-DMA-RQ-CYCLE)))
  ;;; end of definition
  )
```

SCRC:<LMIOB>LBSEL4.PAL;4

```
;-*- Mode:LISP; Package:USER; Base:10 -*-

;PAL For selecting microdevice write registers (or pseudo registers)
;(in drawings LBSEL)

;Each device on the board takes up a microdevice write address space of
;three bits (eight registers).  The task must be able to do a DMA write,
;a DISMISS write, a TASK END write or any combination of the three in
;the same write.

(DEFPAL LBSEL4 PAL16L8
  (IPIN 1 SLOT-ADDR-MATCH L)
  (IPIN 2 LB-DEV-4)
  (IPIN 3 LB-DEV-3)
  (IPIN 4 LB-DEV-2)
  (IPIN 5 LB-DEV-1)
  (IPIN 6 LB-DEV-0)
  (IPIN 7 LBUS-ID-REQUEST L)
  (IPIN 8 LB-DEV-READ)
  (IPIN 9 LB-DEV-WRITE)
  (IPIN 11 DEVICE-MATCH L)

  (OPIN 18 READ-DISK-BUF L)
  ;(OPIN 17 READ-NET-BUF L)
  (OPIN 17 KILL-DISK-TASK L)
  (OPIN 16 READ-NET-CRC L)
  (OPIN 15 WRITE-NET-BUF L)
  (OPIN 14 VD-DISMISS L)
  (OPIN 13 ID-READ-CYCLE)
  (OPIN 19 DEV-WRITE-CYCLE)
  (OPIN 12 DEV-READ-CYCLE)

  (FIELD DEVICE-ADDRESS LB-DEV-4 LB-DEV-3)
  (FIELD DEVICE-OP-CODE LB-DEV-2 LB-DEV-1 LB-DEV-0)

;upper two bits specify which device you're talking to
; 00---disk
; 01---net
; 10---net buffer
; 11---TV

;DISK OPERATIONS
;       0       write disk buffer directly (rev 2 and later)
;       1       dma cycle (start dma cycle without dismissing)
;       2       dismiss, task acknowledge (just clear wakeup)
;       3       dismiss & dma cycle
;       4       dismiss (only)
;       5       kill disk task
;       6       dismiss, task acknowledge, set end flag
;       7       dma cycle & set end flag & dismiss

  (SETQ DISMISS-RQ (AND LB-DEV-1 LB-DEV-WRITE))

  (SETQ VD-SELECT (AND DEVICE-MATCH (FIELD DEVICE-ADDRESS 3)))

  (SETQ DEV-WRITE-CYCLE (AND DEVICE-MATCH LB-DEV-WRITE))

  (SETQ DEV-READ-CYCLE (AND DEVICE-MATCH LB-DEV-READ))

  (SETQ READ-DISK-BUF (AND (FIELD DEVICE-ADDRESS 0)
                           (FIELD DEVICE-OP-CODE 0)
                           DEV-READ-CYCLE))

  (SETQ KILL-DISK-TASK (AND (FIELD DEVICE-ADDRESS 0)
                            (FIELD DEVICE-OP-CODE 5)
                            DEV-WRITE-CYCLE))

  (SETQ READ-NET-BUF  (AND (FIELD DEVICE-ADDRESS 1)
                           (FIELD DEVICE-OP-CODE 0)
                           DEV-READ-CYCLE))

  (SETQ READ-NET-CRC  (AND (FIELD DEVICE-ADDRESS 1)
                           (FIELD DEVICE-OP-CODE 2)
                           DEV-READ-CYCLE))

  (SETQ WRITE-NET-BUF  (AND (FIELD DEVICE-ADDRESS 2)
                            (FIELD DEVICE-OP-CODE 0)
                            DEV-WRITE-CYCLE))

  (SETQ VD-DISMISS  (AND VD-SELECT DISMISS-RQ))

  (SETQ ID-READ-CYCLE (AND LBUS-ID-REQUEST SLOT-ADDR-MATCH))

 ;;; end of definition
 )
```

SCRC:<LMIOB>LBWAIT.PAL;3

```
;-*- Mode:LISP; Package:USER; BASE:10 -*-

;PAL for deciding when to hang the bus. PAL appears on dwg. MEMCTL.DWG.

(DEFPAL LBWAIT PAL16R4

;  (IPIN 1 LB-CLOCK L)    NOT LB STATE CLOCK!
;  (IPIN 11 GND)          output enable.

  (IPIN 2 CACHE-HIT L)
  (IPIN 3 CACHE-DIRTY L)
  (IPIN 4 LB-TV-REQ L)
  (IPIN 5 REF-REQ L)
  (IPIN 6 CACHE-ACTIVE)
  (IPIN 7 DM-ACTIVE-CYCLE)
  (IPIN 8 PANIC)
  (IPIN 9 LIT-REQ L)
  (IPIN 12 LB-REFRESH L)
  (IPIN 13 LB-ADDR-00)
  (IPIN 18 FULLNESS)

  (RPIN 17 ASSERT-LB-WAIT L)

  (OPIN 19 CLEAR-LB-WAIT L)                                ;INTERNAL USE

  (SETQ ASSERT-LB-WAIT (OR (AND LB-TV-REQ DM-ACTIVE-CYCLE)
                           (AND LB-TV-REQ LIT-REQ)
                           (AND LB-TV-REQ PANIC)
                           (AND LB-TV-REQ (NOT CACHE-HIT) CACHE-DIRTY)
                           (AND ASSERT-LB-WAIT (NOT CLEAR-LB-WAIT))))

  (SETQ CLEAR-LB-WAIT (AND ASSERT-LB-WAIT (NOT TV-DM-ACTIVE)))

;;END OF DEFINITION
)
```

SCRC:<LMIOB>LITCTL.PAL;1

```
;-*- Mode:LISP; Package:USER; BASE:10 -*-

;PAL for controlling the Line Index Table.  See dwg. TVADR0.

(DEFPAL LITCTL PAL16R4

;  (IPIN 1 LB-STATE-CLOCK L)
;  (IPIN 11 GND)          output enable.

  (IPIN 2 LIT-RESET L)
  (IPIN 3 REFRESH-DM-ACTIVE L)
  (IPIN 4 TV-DM-ACTIVE L)
  (IPIN 5 CPU-DM-ACTIVE L)
  (IPIN 6 REFRESH-DATA-CYCLE L)
  (IPIN 7 TV-DATA-CYCLE L)
  (IPIN 8 CPU-DATA-CYCLE L)
  (IPIN 9 LIT-REQ L)
  (IPIN 12 DMD-16)

  (RPIN 16 ODD-CHUNK-COUNT L)
  (RPIN 15 LIT-DATA-CYCLE L)
  (RPIN 14 LIT-DM-ACTIVE L)

  (OPIN 19 DM-DATA-CYCLE)                                  ;INTERNAL USE

;ODD CHUNK COUNT means there are an odd number of 64-pixel chunks that are to be read from
;the TV mem during this scan line.  DMD 16 is the LSB of the chunk count.  This info
;must be kept around so that the FIFO stuffer knows how to ignore the last chunk and to
;not put it in the FIFO.

  (SETQ ODD-CHUNK-COUNT (OR (AND DMD-16 LIT-DM-ACTIVE)                  ;sets the bit
                            (AND ODD-CHUNK-COUNT (NOT LIT-DM-ACTIVE)))) ;holds it on

;LIT DATA CYCLE happens one LBUS STATE after the LIT ACTIVE cycle.

  (SETQ LIT-DATA CYCLE (AND LIT-DM-ACTIVE (NOT LIT-DATA-CYCLE)))

;LIT DM CYCLE is the highest priority thing that can happen to the TV mem.  At the end of
;a scan line, LIT REQ is asserted.  This PAL gets the TV mem so it can go into the LIT
;and find the starting address for the next scan line segment.

  (SETQ LIT-DM-ACTIVE (AND LIT-REQ (NOT DM-ACTIVE-CYCLE)))

  (SETQ DM-DATA-CYCLE (OR LIT-DATA-CYCLE TV-DATA-CYCLE CPU-DATA-CYCLE REFRESH-DATA-CYCLE))

;;END OF DEFINITION
)
```

SCRC:<LMIOB>LWMIO1.PAL:3

```
;-*- Mode:LISP; Package:USER; Base:10 -*-

;PAL For selecting memory-mapped registers for reading (in drawings LBMIO)

(DEFPAL LBMIO1 PAL16R8
  (IPIN 2 LB-ADDR-18)
  (IPIN 3 LB-ADDR-17)
  (IPIN 4 LB-ADDR-3)
  (IPIN 5 LB-ADDR-2)
  (IPIN 6 LB-ADDR-1)
  (IPIN 7 LB-ADDR-0)
  (IPIN 8 IO-READ-ACTIVE-CYCLE)
  (IPIN 9 IO-READ-RQ)

  (RPIN 19 READ-DISK-COMMAND L)
  (RPIN 18 READ-DISK-ECC L)
  (RPIN 17 READ-DISK-STATUS L)
  (RPIN 16 READ-DISK-RPS L)
  (RPIN 15 READ-NET-STATUS L)
  (RPIN 14 READ-VD-STATUS L)
  (RPIN 13 READ-VD-DIAG L)
  (RPIN 12 READ-PADDLE-ENB L)

  (FIELD REG-ADDR LB-ADDR-3 LB-ADDR-2 LB-ADDR-1 LB-ADDR-0)

  (SETQ REG-READ-RQ (AND (NOT LB-ADDR-18) (NOT LB-ADDR-17) IO-READ-RQ))

  (SETQ READ-DISK-COMMAND (OR (AND REG-READ-RQ (FIELD REG-ADDR 0))
                              (AND IO-READ-ACTIVE-CYCLE READ-DISK-COMMAND)))

  (SETQ READ-DISK-ECC (OR (AND REG-READ-RQ (FIELD REG-ADDR 1))
                          (AND IO-READ-ACTIVE-CYCLE READ-DISK-ECC)))

  (SETQ READ-DISK-STATUS (OR (AND REG-READ-RQ (FIELD REG-ADDR 2))
                             (AND IO-READ-ACTIVE-CYCLE READ-DISK-STATUS)))

  (SETQ READ-DISK-RPS (OR (AND REG-READ-RQ (FIELD REG-ADDR 3))
                          (AND IO-READ-ACTIVE-CYCLE READ-DISK-RPS)))

  (SETQ READ-NET-STATUS (OR (AND REG-READ-RQ (FIELD REG-ADDR 4))
                            (AND IO-READ-ACTIVE-CYCLE READ-NET-STATUS)))

  (SETQ READ-VD-STATUS (OR (AND REG-READ-RQ (FIELD REG-ADDR 6))
                           (AND IO-READ-ACTIVE-CYCLE READ-VD-STATUS)))

  (SETQ READ-VD-DIAG (OR (AND REG-READ-RQ (FIELD REG-ADDR 7))
                         (AND IO-READ-ACTIVE-CYCLE READ-VD-DIAG)))

  (SETQ READ-PADDLE-ENB (OR (AND REG-READ-RQ (FIELD REG-ADDR 10))
                            (AND IO-READ-ACTIVE-CYCLE READ-PADDLE-ENB)))

 ;; end of definition
)
```

SCRC:<LMIOB>MEMCTL.PAL:5

```
;-*- Mode:LISP; Package:USER; BASE:10 -*-

;PAL for controlling the state of (AND ACCESS TO) the TV memory. Pal appears on
;dwg. MEMCTL.DWG.

(DEFPAL MEMCTL PAL16L8

  (IPIN 1 LB-WRITE)
  (IPIN 2 CACHE-HIT L)
  (IPIN 3 CACHE-DIRTY L)
  (IPIN 4 LB-TV-REQ L)
  (IPIN 5 REF-REQ L)
  (IPIN 6 CACHE-ACTIVE)
  (IPIN 7 DM-ACTIVE-CYCLE)
  (IPIN 8 PANIC)
  (IPIN 9 LIT-REQ L)
  (IPIN 11 LB-REFRESH L)
  (IPIN 13 LB-ADDR-00)
  (IPIN 14 CLEAR-LB-WAIT L)
  (IPIN 15 FULLNESS)

  (OPIN 17 CPU-ACTIVE-ENAB L)
  (OPIN 18 REFRESH-ENAB L)
  (OPIN 19 REF-REQ-ENAB L)
  (OPIN 12 TV-ACTIVE-ENAB L)

;Noone else is requesting the TV memory and we are not in the middle of a cycle.  Give
;the next cycle to the fifo if the fifo is not full.

  (SETQ TV-ACTIVE-ENAB (OR (AND (NOT LIT-REQ) (NOT CPU-REQ) (NOT REF-DM-EN) (NOT REF-REQ)
                                (NOT FULLNESS) (NOT DM-ACTIVE-CYCLE) (NOT CACHE-ACTIVE))
```

```
;The fifo is in panic mode.  Give it the cycle.

                        (AND (NOT LIT-REQ) (NOT DM-ACTIVE-CYCLE) PANIC)))

;Cache miss.  Cache is empty.

  (SETQ CPU-ACTIVE-ENAB (OR (AND (NOT LIT-REQ) (NOT PANIC) (NOT REF-REQ) (NOT DM-ACTIVE-CYCLE)
                                 (NOT CACHE-HIT) (NOT CACHE-DIRTY) LB-TV-REQ)

;Cache miss.  Cache is full.  Must assert write during this cycle, assert LBUS WAIT, flush
;cache, then request another cycle for the CPU.

                            (AND (NOT LIT-REQ) (NOT PANIC) (NOT REF-REQ) (NOT DM-ACTIVE-CYCLE)
                                 (NOT CACHE-HIT) CACHE-DIRTY LB-TV-REQ)

;Cache is dirty with data in the least significant word.  CPU wants to read this data.  Data
;is not yet in the TV memory.  Two birds are killed with one cycle.  To the TV mem it
;looks like a write cycle and the data in the cache is stored in TV mem.  To the CPU it
;looks like a read.  The data on DMD<31:00> bus going to the TV mem is clocked into the
;CPU read reg.
                            (AND (NOT LIT-REQ) (NOT PANIC) (NOT REF-REQ) (NOT DM-ACTIVE-CYCLE)
                                 (NOT LB-WRITE) CACHE-HIT  CACHE-DIRTY LB-TV-REQ
                                 (NOT CPU-ADDR-00))

;Cache is hit.  CPU wants to write data into the high half which is not dirty.  Since
;the next operation will most likely be at the current address plus one, which would
;cause a miss, write it thru now.

                            (AND (NOT LIT-REQ) (NOT PANIC) (NOT REF-REQ) (NOT DM-ACTIVE-CYCLE)
                                 LB-TV-REQ CACHE-HIT (NOT CACHE-DIRTY) LB-ADDR-00 LB-WRITE)

;Read cycle, cache hit but empty.  CPU wants the low half of cache but it is not dirty.
;Must go get fresh data.

                            (AND (NOT LIT-REQ) (NOT PANIC) (NOT REF-REQ) (NOT DM-ACTIVE-CYCLE)
                                 (NOT LB-WRITE) CACHE-HIT LB-TV-REQ (NOT CACHE-DIRTY))


;LBUS wants to refresh the RAM's and we are not panicking or LITing.  Do it.

  (SETQ REFRESH-DM-ENAB (OR (AND (NOT LIT-REQ) (NOT PANIC) LB-REFRESH (NOT DM-ACTIVE-CYCLE))

;A request for RAM refresh has been logged but not honored yet.  It is OK now.

                            (AND (NOT LIT-REQ) (NOT PANIC) REF-REQ (NOT DM-ACTIVE-CYCLE))))

;LBUS wants to refresh the RAMs but something more important is happening.  Log the request
;for a more fun time.

  (SETQ REF-REQ (OR (AND LB-REFRESH LIT-REQ)
                    (AND LB-REFRESH PANIC)
                    (AND LB-REFRESH DM-ACTIVE-CYCLE)
                    (AND REF-REQ (NOT REFRESH-DM-ENAB))))

;;END OF DEFINITION
)
```

SCRC:<LMIOB>NCRC1.PAL;7

```
;-*- Mode:LISP; Package:USER; Base:10 -*-

;One of the PALS for doing CRC error checking for the Ethernet.

(DEFPAL NCRC1 PAL16R8                                    ;PAL16R8A
  (IPIN 5 CRC-FEEDBACK L)
  (IPIN 6 CRC-CONTROL L)
  (IPIN 7 CRC-15)
  (IPIN 8 CRC-25)
  (IPIN 9 NET-COLLISION)

  (RPIN 12 CRC-0)
  (RPIN 13 CRC-1)
  (RPIN 14 CRC-2)
  (RPIN 15 CRC-3)
  (RPIN 16 CRC-4)
  (RPIN 17 CRC-5)
  (RPIN 18 CRC-16)
  (RPIN 19 CRC-26)

;The CRC logic is basiclly a 32 bit shift register with XOR's at critical
;places in the shift bit stream.

;If the CRC-CONTROL input is true certain bits get the xor of the previous
;bit in the stream and CRC-FEEDBACK.

  (SETQ CRC-SHIFT (NOT CRC-CONTROL))

  (SETQ CRC-INV NET-COLLISION)          ;invert the crc when colliding

  (SETQ CRC-0
```

```
       (COND (CRC-CONTROL CRC-FEEDBACK)
             (CRC-INV NIL)
             (CRC-SHIFT T)))                        ;Shift in 1's
 (SETQ CRC-1
       (COND (CRC-CONTROL (XOR CRC-FEEDBACK CRC-0))
             (CRC-INV (NOT CRC-0))
             (CRC-SHIFT CRC-0)))

 (SETQ CRC-2
       (COND (CRC-CONTROL (XOR CRC-FEEDBACK CRC-1))
             (CRC-INV (NOT CRC-1))
             (CRC-SHIFT CRC-1)))

 (SETQ CRC-3 (COND (CRC-INV (NOT CRC-2))                  ;Simple shift
                   ((NOT CRC-INV) CRC-2)))

 (SETQ CRC-4
       (COND (CRC-CONTROL (XOR CRC-FEEDBACK CRC-3))
             (CRC-INV (NOT CRC-3))
             (CRC-SHIFT CRC-3)))

 (SETQ CRC-5
       (COND (CRC-CONTROL (XOR CRC-FEEDBACK CRC-4))
             (CRC-INV (NOT CRC-4))
             (CRC-SHIFT CRC-4)))

 (SETQ CRC-16
       (COND (CRC-CONTROL (XOR CRC-FEEDBACK CRC-15))
             (CRC-INV (NOT CRC-15))
             (CRC-SHIFT CRC-15)))

 (SETQ CRC-26
       (COND (CRC-CONTROL (XOR CRC-FEEDBACK CRC-25))
             (CRC-INV (NOT CRC-25))
             (CRC-SHIFT CRC-25)))

;; end of definition
)
```

SCRC:<LMIOB>NCRC2.PAL;4

```
;-*- Mode:LISP; Package:USER; Base:10 -*-

;One of the PALS for doing CRC error checking for the Ethernet.

(DEFPAL NCRC2 PAL16R8                                    ;PAL16R8A
  (IPIN 5 CRC-FEEDBACK L)
  (IPIN 6 CRC-CONTROL L)
  (IPIN 7 CRC-6)
  (IPIN 8 CRC-21)
  (IPIN 9 NET-COLLISION)

  (RPIN 12 CRC-7)
  (RPIN 13 CRC-8)
  (RPIN 14 CRC-9)
  (RPIN 15 CRC-10)
  (RPIN 16 CRC-11)
  (RPIN 17 CRC-12)
  (RPIN 18 CRC-22)
  (RPIN 19 CRC-23)

;The CRC logic is basiclly a 32 bit shift register with XOR's at critical
;places in the shift bit stream.

;If the CRC-CONTROL input is true certain bits get the xor of the previous
;bit in the stream and CRC-FEEDBACK.

  (SETQ CRC-SHIFT (NOT CRC-CONTROL))

  (SETQ CRC-INV NET-COLLISION)            ;invert the crc when colliding

  (SETQ CRC-7
        (COND (CRC-CONTROL (XOR CRC-FEEDBACK CRC-6))
              (CRC-INV (NOT CRC-6))
              (CRC-SHIFT CRC-6)))

  (SETQ CRC-8
        (COND (CRC-CONTROL (XOR CRC-FEEDBACK CRC-7))
              (CRC-INV (NOT CRC-7))
              (CRC-SHIFT CRC-7)))

  (SETQ CRC-9 (COND (CRC-INV (NOT CRC-8))                 ;Simple shift
                    ((NOT CRC-INV) CRC-8)))

  (SETQ CRC-10
        (COND (CRC-CONTROL (XOR CRC-FEEDBACK CRC-9))
              (CRC-INV (NOT CRC-9))
              (CRC-SHIFT CRC-9)))
```

```
(SETQ CRC-11
      (COND (CRC-CONTROL (XOR CRC-FEEDBACK CRC-10))
            (CRC-INV (NOT CRC-10))
            (CRC-SHIFT CRC-10)))

(SETQ CRC-12
      (COND (CRC-CONTROL (XOR CRC-FEEDBACK CRC-11))
            (CRC-INV (NOT CRC-11))
            (CRC-SHIFT CRC-11)))

(SETQ CRC-22
      (COND (CRC-CONTROL (XOR CRC-FEEDBACK CRC-21))
            (CRC-INV (NOT CRC-21))
            (CRC-SHIFT CRC-21)))

(SETQ CRC-23
      (COND (CRC-CONTROL (XOR CRC-FEEDBACK CRC-22))
            (CRC-INV (NOT CRC-22))
            (CRC-SHIFT CRC-22)))

;; end of definition
)
```

SCRC:<LMIOB>NCRC3.PAL;3

```
;-*- Mode:LISP; Package:USER; Base:10 -*-

;One of the PALS for doing CRC error checking for the Ethernet.

(DEFPAL NCRC3 PAL16L8
  (IPIN 18 CRC-0)
  (IPIN 17 CRC-1)
  (IPIN 16 CRC-2)
  (IPIN 15 CRC-3)
  (IPIN 14 CRC-4)
  (IPIN 13 CRC-5)
  (IPIN 1 CRC-6)
  (IPIN 2 CRC-7)
  (IPIN 3 CRC-8)
  (IPIN 4 CRC-9)
  (IPIN 5 CRC-10)
  (IPIN 6 CRC-11)
  (IPIN 7 CRC-12)
  (IPIN 8 CRC-13)
  (IPIN 9 CRC-14)
  (IPIN 11 CRC-15)
  (FIELD CRC-A CRC-15 CRC-14 CRC-13 CRC-12 CRC-11 CRC-10 CRC-9 CRC-8 CRC-7 CRC-6
               CRC-5 CRC-4 CRC-3 CRC-2 CRC-1 CRC-0)

  (OPIN 19 CRC-OK-A L)

  (SETQ CRC-OK-A (FIELD CRC-A #o156573))

  ;; end of definition
  )
```

SCRC:<LMIOB>NCRC4.PAL;4

```
;-*- Mode:LISP; Package:USER; Base:10 -*-

;One of the PALS for doing CRC error checking for the Ethernet.

(DEFPAL NCRC4 PAL16L8
  (IPIN 18 CRC-16)
  (IPIN 17 CRC-17)
  (IPIN 16 CRC-18)
  (IPIN 15 CRC-19)
  (IPIN 14 CRC-20)
  (IPIN 13 CRC-21)
  (IPIN 1 CRC-22)
  (IPIN 2 CRC-23)
  (IPIN 3 CRC-24)
  (IPIN 4 CRC-25)
  (IPIN 5 CRC-26)
  (IPIN 6 CRC-27)
  (IPIN 7 CRC-28)
  (IPIN 8 CRC-29)
  (IPIN 9 CRC-30)
  (IPIN 11 CRC-31)
  (FIELD CRC-B CRC-31 CRC-30 CRC-29 CRC-28 CRC-27 CRC-26 CRC-25 CRC-24 CRC-23 CRC-22
               CRC-21 CRC-20 CRC-19 CRC-18 CRC-17 CRC-16)

  (OPIN 19 CRC-OK-B L)

  (SETQ CRC-OK-B (FIELD CRC-B #o143404))

  ;; end of definition
  )
```

SCRC:<LMIOB>NCRC5.PAL;10

```
;-*- Mode:LISP; Package:USER; Base:10 -*-

;One of the PALS for doing CRC error checking for the Ethernet.

(DEFPAL NCRC5 PAL16L8                                ;PAL16L8A actually
  (IPIN 16 NET-PKT-RCVD)
  (IPIN 15 CRC-OK-B L)
  (IPIN 14 CRC-OK-A L)
  (IPIN 13 NET-CRC-ERROR)
  (IPIN 1 CRC-31)
  (IPIN 2 NET-RCV-DATA)
  (IPIN 3 NET-RCV-ENABLE)
  (IPIN 4 NET-PKT-BEING-RCVD L)
  (IPIN 5 NET-PKT-BEING-XMTD L)
  (IPIN 6 NET-RESET L)
  (IPIN 7 NET-XMT-DATA)
  (IPIN 8 NET-XMT-STATE-0)
  (IPIN 9 NET-XMT-STATE-1)
  (IPIN 11 NET-WORD-CLK L)
  (FIELD XMT-STATE NET-XMT-STATE-1 NET-XMT-STATE-0)

  (OPIN 18 SET-CRC-ERROR L)
  (OPIN 17 NET-IDLE L)

  (OPIN 19 CRC-FEEDBACK L)
  (OPIN 12 CRC-CONTROL L)

  (SETQ NET-XMT-ENABLE (NOT NET-RCV-ENABLE))

  (SETQ SET-CRC-ERROR
        (AND (NOT NET-RESET)
             (OR NET-CRC-ERROR
                 (AND (NOT (AND CRC-OK-A CRC-OK-B))
                      NET-WORD-CLK
                      NET-PKT-RCVD))))

  (SETQ NET-IDLE (AND (NOT NET-PKT-BEING-RCVD) (NOT NET-PKT-BEING-XMTD)))

  (SETQ CRC-FEEDBACK
        (XOR (OR (AND NET-XMT-ENABLE NET-XMT-DATA)
                 (AND NET-RCV-ENABLE NET-RCV-DATA))
             CRC-31))

  (SETQ CRC-CONTROL
        (OR (AND NET-RCV-ENABLE NET-PKT-BEING-RCVD)
            (AND NET-XMT-ENABLE NET-PKT-BEING-XMTD
                 (FIELD XMT-STATE 2))))

  ;; end of definition
  )
```

SCRC:<LMIOB>NRCV.PAL;26

```
;Two ones in a row mean the packet starts.  When data valid goes away we know
;the packet has ended (then we go back to packet-wait)

  (SETQ NET-PKT-BEING-RCVD
        (AND (OR NET-PKT-BEING-RCVD
                 (AND NET-PREAMBLE-ONE
                      NET-DATA-VALID
                      NET-DATA-VALID-DLYD           ;dont look for 8-bit times
                      NET-RCV-DATA))
             NO-ERROR
             NET-DATA-VALID))

  (SETQ CLEAR-NET-PKT-RCVD (AND NET-PKT-RCVD (OR NET-RESET NET-BUF-OE)))

  ;; end of definition
  )
```

SCRC:<LMIOB>NRCV.PAL;26

```
;-*- Mode:LISP; Package:USER; Base:10 -*-

;Pal for detecting Ether net packets and scraping off the preamble.
;It is assumed that NET RCV CLK is always running, although it may
;be of non-uniform period when phase locking to the incoming signal.

;To get the receiver started, set NET-RCV-ENABLE and then NET-RESET

(DEFPAL NRCV PAL16R6                                     ;PAL16R6A
  (IPIN 2 NET-PKT-RCVD)
  (IPIN 3 NET-DATA-VALID-DLYD)
  (IPIN 4 NET-RESET L)
  (IPIN 5 NET-BUF-OE L)
```

```
  (IPIN 6 NET-RCV-ENABLE)
  (IPIN 7 NET-COLLISION)
  (IPIN 8 NET-DATA-VALID)
  (IPIN 9 NET-RCV-DATA)
;  (IPIN 12 NET-PKT-BEING-IGNORED)  ;Not used

  (RPIN 13 NET-PREAMBLE-ERROR)
  (RPIN 14 NET-PKT-BEING-RCVD L)

;These signals aren't really used.  They are just names for internal
;states of the FSM.  They are read back to the processor for debugging.
  (RPIN 15 NET-START L)
  (RPIN 16 NET-WAIT-FOR-PKT L)
  (RPIN 17 NET-PREAMBLE-ZERO L)
  (RPIN 18 NET-PREAMBLE-ONE L)

  (OPIN 19 CLEAR-NET-PKT-RCVD L)

;This FSM is very simple.  It has 7 states and each state is represented
;by one bit of the register.  No two bits should ever be on at the same
;time.  This should make debugging it easy.

;; These are gross errors
  (SETQ RCV-QUIT (OR NET-COLLISION
                     NET-PREAMBLE-ERROR
                     (NOT NET-RCV-ENABLE)))

  (SETQ NO-ERROR (NOT (OR NET-RESET
                          NET-PKT-RCVD
                          RCV-QUIT)))

;; Start if reseting and the minimal condition that receiving is enabled,
;;       otherwise only start if done and not losing.

  (SETQ NET-START
        (AND NET-RCV-ENABLE
             (OR  NET-RESET
                  NET-PKT-RCVD
                  (AND (NOT RCV-QUIT)              ;don't start if losing
                       (NOT NET-PKT-RCVD)          ;or done and not finished
                       (NOT NET-WAIT-FOR-PKT)      ;or in the wait state
                       NET-START)))))              ;hold until transition to w-f-p

  (SETQ NET-WAIT-FOR-PKT
        (AND NO-ERROR                 ;start looking for packets if there are no errors
             (OR (AND NET-START       ;and if we are in the START state or
                      (NOT NET-DATA-VALID)) ;and there is no data currently (may be aborting)
                 NET-WAIT-FOR-PKT)          ;hold if already waiting
             (NOT (OR NET-PREAMBLE-ZERO NET-PREAMBLE-ONE))))     ;until preamble

  (SETQ NET-PREAMBLE-ZERO
        (AND NO-ERROR
             (OR NET-WAIT-FOR-PKT
                 NET-PREAMBLE-ONE)
             NET-DATA-VALID
             (NOT NET-RCV-DATA)
             (NOT NET-PKT-BEING-RCVD)))

  (SETQ NET-PREAMBLE-ONE
        (AND NO-ERROR
             (OR NET-WAIT-FOR-PKT
                 NET-PREAMBLE-ZERO)
             NET-DATA-VALID
             NET-RCV-DATA
             (NOT NET-PKT-BEING-RCVD)))

;Can't get two zero's in a row during the preamble.  If we lose on a preamble
;then we stay in this state till we get reset.
  (SETQ NET-PREAMBLE-ERROR
        (AND (NOT NET-RESET)
             (NOT NET-PKT-RCVD)
             (OR NET-PREAMBLE-ERROR
                 (AND NET-DATA-VALID
                      NET-DATA-VALID-DLYD
                      (NOT NET-COLLISION)
                      NET-PREAMBLE-ZERO
                      (NOT NET-RCV-DATA)))))
```

SCRC:<LMIOB>NSER1.PAL;13

```
;-*- Mode:LISP; Package:USER; Base:10 -*-

;;; BYTE control PAL.  Sequence the assembly of bits into octets (bytes).

(DEFPAL NSER1 PAL16R8
;  (IPIN 1 NET-CLK L)                        ;CLK input

  (IPIN 2 NET-RESET L)
  (IPIN 3 NET-XMT-ENABLE)
  (IPIN 4 NET-DATA-VALID)
```

```
 (IPIN 5 NET-PKT-BEING-RCVD L)
 (IPIN 6 NET-PKT-BEING-XMTD L)
 (IPIN 7 NET-XMT-STATE-0)
 (IPIN 8 NET-XMT-STATE-1)
 (IPIN 9 NET-BYTE-CNT=3 L)

 (RPIN 12 Q-Q-NET-BYTE-END)
 (RPIN 13 Q-NET-BYTE-END)
 (RPIN 14 NET-BYTE-END)
 (RPIN 15 NET-BC-2 L)
 (RPIN 16 NET-BC-1 L)
 (RPIN 17 NET-BC-0 L)
 (RPIN 18 NET-ALIGN-ERROR)
 (RPIN 19 LOAD-NET-SH)

 (FIELD XMT-STATE NET-XMT-STATE-1 NET-XMT-STATE-0)
 (FIELD BC NET-BC-2 NET-BC-1 NET-BC-0)

 (SETQ NET-RCV-ENABLE (NOT NET-XMT-ENABLE))

 (SETQ LOAD-NET-SH (AND NET-XMT-ENABLE
                        (OR (AND NET-BYTE-CNT=3          ;1 so can load at end of preamble
                                 (FIELD XMT-STATE 1))
                            (FIELD XMT-STATE 2))         ;2 is transmitting data state
                        (FIELD BC 6)))

 (SETQ NET-ALIGN-ERROR
       (AND (NOT NET-RESET)
            (OR NET-ALIGN-ERROR                    ;hold once set
                (AND NET-RCV-ENABLE
                     (NOT NET-DATA-VALID)
                     NET-PKT-BEING-RCVD
                     (NOT (FIELD BC 7))))))

 (SETQ NET-BC-ENABLE                               ;essentially NET IDLE?
       (OR (AND NET-RCV-ENABLE NET-PKT-BEING-RCVD)
           (AND NET-XMT-ENABLE NET-PKT-BEING-XMTD)))

 (SETQ NET-BC-0
       (AND (NOT NET-RESET)
            (OR (AND NET-ALIGN-ERROR NET-BC-0)
                (AND (NOT NET-ALIGN-ERROR) NET-BC-ENABLE
                     (NOT NET-BC-0)))))

 (SETQ NET-BC-1
       (AND (NOT NET-RESET)
            (OR (AND NET-ALIGN-ERROR NET-BC-1)
                (AND (NOT NET-ALIGN-ERROR) NET-BC-ENABLE
                     (XOR NET-BC-1 NET-BC-0)))))

 (SETQ NET-BC-2
       (AND (NOT NET-RESET)
            (OR (AND NET-ALIGN-ERROR NET-BC-2)
                (AND (NOT NET-ALIGN-ERROR) NET-BC-ENABLE
                     (XOR NET-BC-2 (AND NET-BC-1 NET-BC-0))))))

 (SETQ Q-Q-NET-BYTE-END
       (AND (NOT NET-RESET)
            (AND (NOT NET-ALIGN-ERROR) NET-BC-ENABLE
                 (FIELD BC 5))))

 (SETQ Q-NET-BYTE-END (AND (NOT NET-RESET) Q-Q-NET-BYTE-END))

 (SETQ NET-BYTE-END (AND (NOT NET-RESET) Q-NET-BYTE-END))

 ;; end of definition
)
```

SCRC:<LMIOB>NSER2.PAL;19

```
;-*- Mode:LISP; Package:USER; Base:10 -*-

;Word Control

(DEFPAL NSER2 PAL16R8                              ;PAL16R8A actually
;  (IPIN 1 NET-CLK L)                              ;CLK input

 (IPIN 2 FEP-USING-NET)
 (IPIN 3 NET-XMT-ENABLE)
 (IPIN 4 NET-DATA-VALID)
 (IPIN 5 NET-PKT-BEING-RCVD L)
 (IPIN 6 NET-PKT-BEING-XMTD L)
 (IPIN 7 Q-NET-BYTE-END)
 (IPIN 8 NET-IBC-0)
 (IPIN 9 NET-IBC-1)

 (RPIN 14 NET-BYTE-CNT=3 L)
 (RPIN 15 NET-WORD-END L)
 (RPIN 16 NET-BYTE-CNT-1 L)
 (RPIN 17 NET-BYTE-CNT-0 L)
```

```
;; These are delayed one cycle from the BYTE CNT
(RPIN 12 NET-BYTE-3-EN L)
(RPIN 13 NET-BYTE-2-EN L)
(RPIN 18 NET-BYTE-1-EN L)
(RPIN 19 NET-BYTE-0-EN L)
(FIELD IBC NET-IBC-1 NET-IBC-0)
(FIELD BYC NET-BYTE-CNT-1 NET-BYTE-CNT-0)

(SETQ NET-RCV-ENABLE (NOT NET-XMT-ENABLE))

(SETQ NET-WORD-END
      (AND Q-NET-BYTE-END
           (OR (AND NET-RCV-ENABLE
                    NET-PKT-BEING-RCVD
                    (OR (FIELD BYC 3) (NOT NET-DATA-VALID)))
               (AND NET-XMT-ENABLE
                    NET-PKT-BEING-XMTD
                    (FIELD BYC 3)))))

(SETQ NET-BYTE-CNT=3
      (COND (Q-NET-BYTE-END (FIELD BYC 2))
            ((NOT Q-NET-BYTE-END) NET-BYTE-CNT=3)))

(SETQ NET-BYTE-CNT-0
      (COND (NET-RCV-ENABLE
             (AND NET-PKT-BEING-RCVD
                  (COND (Q-NET-BYTE-END (NOT NET-BYTE-CNT-0)) ;COUNT
                        ((NOT Q-NET-BYTE-END) NET-BYTE-CNT-0))))      ;HOLD
            (NET-XMT-ENABLE
             (AND NET-PKT-BEING-XMTD
                  (COND (Q-NET-BYTE-END
                         (COND (NET-WORD-END NET-IBC-0)        ;LOAD
                               ((NOT NET-WORD-END) (NOT NET-BYTE-CNT-0))))     ;COUNT
                        ((NOT Q-NET-BYTE-END) NET-BYTE-CNT-0))))))             ;HOLD

(SETQ NET-BYTE-CNT-1
      (COND (NET-RCV-ENABLE
             (AND NET-PKT-BEING-RCVD
                  (COND (Q-NET-BYTE-END (XOR NET-BYTE-CNT-1 NET-BYTE-CNT-0))  ;COUNT
                        ((NOT Q-NET-BYTE-END) NET-BYTE-CNT-1))))      ;HOLD
            (NET-XMT-ENABLE
             (AND NET-PKT-BEING-XMTD
                  (COND (Q-NET-BYTE-END
                         (COND (NET-WORD-END NET-IBC-1)        ;LOAD
                               ((NOT NET-WORD-END)
                                (XOR NET-BYTE-CNT-1 NET-BYTE-CNT-0))))         ;COUNT
                        ((NOT Q-NET-BYTE-END) NET-BYTE-CNT-1))))))    ;HOLD

(SETQ NET-BYTE-0-EN
      (OR (AND NET-RCV-ENABLE (FIELD BYC (0 3)))
          (AND NET-XMT-ENABLE (FIELD BYC 3) (NOT FEP-USING-NET))))

(SETQ NET-BYTE-1-EN
      (OR (AND NET-RCV-ENABLE (FIELD BYC (1 3)))
          (AND NET-XMT-ENABLE (FIELD BYC 0) (NOT FEP-USING-NET))))

(SETQ NET-BYTE-2-EN
      (OR (AND NET-RCV-ENABLE (FIELD BYC (2 3)))
          (AND NET-XMT-ENABLE (FIELD BYC 1) (NOT FEP-USING-NET))))

(SETQ NET-BYTE-3-EN
      (OR (AND NET-RCV-ENABLE (FIELD BYC 3))
          (AND NET-XMT-ENABLE (FIELD BYC 2) (NOT FEP-USING-NET))))

;; end of definition
)
```

SCRC:<LMIOB>NSPY1.PAL:4

```
;-*- Mode:LISP; Package:USER; Base:10 -*-

;PAL decoding spy bus cycle requests

(DEFPAL NSPY1 PAL16L8
  (IPIN 14 SPY-7)
  (IPIN 11 SPY-ADDR-0)
  (IPIN 9 SPY-ADDR-1)
  (IPIN 8 SPY-ADDR-2)
  (IPIN 7 SPY-ADDR-3)
  (IPIN 6 SPY-ADDR-4)
  (IPIN 5 SPY-ADDR-5)
  (IPIN 4 SPY-READ L)
  (IPIN 3 SPY-WRITE L)
  (IPIN 2 SPY-SELECTED L)
  (OPIN 18 SPY-WRITE-NET-CNTRL L)
  (OPIN 17 SPY-READ-NET-STATUS L)
  (OPIN 16 SPY-READ-NET-SIGNALS L)
  (OPIN 15 SPY-NET-RESET L)
```

```
;pin 19 spare
  (OPIN 12 SPY-WRITE-BOARD-SELECT L)

  (FIELD SPY-ADDR SPY-ADDR-5 SPY-ADDR-4 SPY-ADDR-3 SPY-ADDR-2 SPY-ADDR-1 SPY-ADDR-0)

;; 50 read = net-signals, write = board select
;; 51 read = net-status,  write = net-control

  (SETQ SPY-READ-NET-SIGNALS (AND SPY-READ SPY-SELECTED (FIELD SPY-ADDR #o50)))

  (SETQ SPY-WRITE-BOARD-SELECT (AND SPY-WRITE (FIELD SPY-ADDR #o50)))

  (SETQ SPY-READ-NET-STATUS (AND SPY-READ SPY-SELECTED (FIELD SPY-ADDR #o51)))

  (SETQ SPY-WRITE-NET-CNTRL (AND SPY-WRITE SPY-SELECTED (FIELD SPY-ADDR #o51)))

  (SETQ SPY-NET-RESET (AND SPY-WRITE SPY-SELECTED (FIELD SPY-ADDR #o51) SPY-7))

  ;; end of definition
)
```

SCRC:<LMIOB>NSPY2.PAL;21

```
;-*- Mode:LISP; Package:USER; Base:10 -*-

;PAL for SPY DMA control

(DEFPAL NSPY2 PAL16L8
  (IPIN 11 FEP-USING-NET)
  (IPIN  9 FEP-MONITORING-NET)
  (IPIN  8 SPY-DMA-BUSY L)
  (IPIN  7 SPY-DMA-ENB)
  (IPIN  6 NET-RCV-ENABLE)
  (IPIN  5 SPY-SELECTED L)
  (IPIN  4 NET-BYTE-END)
  (IPIN  3 NET-PKT-BEING-XMTD L)
  (IPIN  2 NET-COLLISION)
  (IPIN  1 SET-NET-SKIP-COND L)
  (IPIN 13 NET-XMT-LAST)
  (IPIN 14 FEP-NET-PKT-RCVD)
  (IPIN 15 LOAD-NET-SH)
  (IPIN 16 NET-CLK)

  (OPIN 18 FEP-SET-NET-XMT-LAST L)
  (OPIN 17 NET-SPY-DMA-SYNC L)

  (OPIN 19 NET-SPY-OE L)
  (OPIN 12 NET-SPY-DMA-BUSY)

  (SETQ NET-XMT-ENABLE (NOT NET-RCV-ENABLE))

  (SETQ FEP-HAS-NET (AND FEP-USING-NET SPY-DMA-ENB SPY-SELECTED))

  (SETQ FEP-SET-NET-XMT-LAST
        (AND NET-XMT-ENABLE
             FEP-HAS-NET
             NET-PKT-BEING-XMTD
             (OR (NOT SPY-DMA-BUSY) NET-COLLISION)      ;part of jamming kludge, namely
             (NOT NET-XMT-LAST)))                       ;collisions set the end flag

  (SETQ NET-SPY-DMA-BUSY (AND NET-RCV-ENABLE SPY-SELECTED
                              (OR FEP-USING-NET FEP-MONITORING-NET)
                              SPY-DMA-ENB
                              (NOT FEP-NET-PKT-RCVD)
                              (NOT SET-NET-SKIP-COND)))

  (SETQ NET-SPY-OE
        (AND SPY-DMA-ENB SPY-SELECTED
             (COND (NET-RCV-ENABLE (OR FEP-USING-NET FEP-MONITORING-NET))
                   (NET-XMT-ENABLE (AND FEP-USING-NET SPY-DMA-BUSY)))))

  (SETQ NET-SPY-DMA-SYNC
        (AND SPY-DMA-ENB SPY-SELECTED
             (COND (NET-RCV-ENABLE
                    (AND NET-BYTE-END (OR FEP-USING-NET FEP-MONITORING-NET)))
                   (NET-XMT-ENABLE (AND FEP-USING-NET
                                        (OR (AND LOAD-NET-SH SPY-DMA-BUSY)
                                            (AND NET-COLLISION
                                                 SPY-DMA-BUSY
                                                 NET-CLK)))))))

  ;; end of definition
)
```

SCRC:<LMIOB>NSTS.PAL;11

```
;-*- Mode:LISP; Package:USER; Base:10 -*-

;PAL decoding misc control signals
```

```
(DEFPAL NSTS PAL16L8
  (IPIN 1 NET-FEP-RCV-ENABLE)
  (IPIN 2 NET-CPU-RCV-ENABLE)
  (IPIN 3 NET-COLLISION)
  (IPIN 4 NET-BUFFER-OVERFLOW)
  (IPIN 5 NET-PREAMBLE-ERROR)
  (IPIN 6 NET-PKT-RCVD)
  (IPIN 7 LB-RESET L)
  (IPIN 8 SPY-NET-RESET L)
  (IPIN 9 LB-DATA-14)
  (IPIN 11 WRITE-NET-CNTRL L)

  (IPIN 13 FEP-USING-NET)
  (IPIN 14 NET-ALIGN-ERROR)
  (IPIN 15 NET-CRC-ERROR)
  ;I/OPIN 16 spare

  (OPIN 19 SET-NET-SKIP-COND L)
  (OPIN 18 NET-RCV-ENABLE L)
  (OPIN 17 NET-XMT-ENABLE L)
  (OPIN 12 NET-RESET L)

  (SETQ CPU-NET-RESET (AND LB-DATA-14 WRITE-NET-CNTRL))

  (SETQ NET-RESET (OR LB-RESET
                      SPY-NET-RESET
                      CPU-NET-RESET))

  (SETQ NET-RCV-ENABLE (COND (FEP-USING-NET NET-FEP-RCV-ENABLE)
                             ((NOT FEP-USING-NET) NET-CPU-RCV-ENABLE)))

  (SETQ NET-XMT-ENABLE (NOT NET-RCV-ENABLE))

  (SETQ SET-NET-SKIP-COND (OR NET-PKT-RCVD
                              NET-CRC-ERROR
                              NET-ALIGN-ERROR
                              NET-PREAMBLE-ERROR
                              NET-BUFFER-OVERFLOW
                              NET-COLLISION))

  (SETQ CLEAR-NET-WAKEUP (OR CPU-CLEAR-NET-WAKEUP
                             SPY-NET-RESET))

  ;; end of definition
)
```

SCRC:<LMIOB>NTASK.PAL;11

```
;-*- Mode:LISP; Package:USER; Base:10 -*-

;PAL for determining when task wakeups should happen for the net.

;;; The network task wakes up when a word of data has been received or when
;;; the interface has room in its buffer when transmitting.  Transmitting
;;; gets started by setting XMT REQUEST in the control register and enabling
;;; the dma microtask.  The first wakeup will then happen after any wait for
;;; the cable to become idle and when the first preamble word gets transmitted.
;;; While the second preamble word is being sent, a dma cycle is done as a
;;; result of the task wakeup, which loads the data buffer.  At the end of
;;; the second preamble word, this data is loaded in to the holding buffer/
;;; shift register, a task wakeup is done, etc.  When the last word is dma'ed
;;; NET XMT LAST must be set by a NET END cycle.  This is concurrent with the last
;;; dma cycle.  There will be a task wakeup after this word is sent which
;;; should be ignored.  After this last data word, a CRC word is sent.  A task
;;; wakeup then occurs to tell the processor that it can start a new packet
;;; or switch over to receive mode.
;;;
;;; The receive side is simple.  Task wakeups happen when data is available,
;;; and errors or packet done cause a skip condition.  If the processor decides
;;; that it doesn't want to receive the whole packet, it does a NET END cycle
;;; which causes NET PKT BEING IGNORED to get set for the duration.  The hardware
;;; continues to receive the packet (perhaps for the sake of the listening FEP)
;;; and will generate a new task wakeup (if enabled) after the last word has been
;;; received, so the processor can reset things, attempt a transmit, etc.
;;;
;;; The only other anomalous wakeup occurs when XMT ENABLE has been set and
;;; transmitting hasn't started yet and DATA VALID comes on, indicating that
;;; data is being received.  In this case, the task should punt getting
;;; ready to transmit and switch back over to receive mode (is this tricky to
;;; do?).  Part of the preamble will be lost, but this is no big deal.  This
;;; situation may not happen all that infrequently if the net is being pounded
;;; on hard.

(DEFPAL NTASK PAL16L8          ;PAL16L8A actually
  (IPIN 11 NET-RCV-ENABLE)
  (IPIN 9  NET-ACTIVE-CYCLE)
  (IPIN 8  NET-DATA-CYCLE)
  (IPIN 7  READ-NET-BUF L)
  (IPIN 6  WRITE-NET-BUF L)
  (IPIN 5  NET-WORD-END L)
```

```
(IPIN 4  NET-PKT-BEING-IGNORED)
(IPIN 3  NET-PKT-BEING-XMTD L)
(IPIN 2  NET-DATA-VALID)
(IPIN 1  NET-BACKOFF-TIMER-DONE L)
(IPIN 13 NET-BACKOFF-TIMER-ENB)
(IPIN 14 NET-CABLE-BUSY)
(IPIN 15 NET-RESET L)
(IPIN 16 FEP-USING-NET L)

(OPIN 12 SET-NET-WAKEUP L)
(OPIN 19 SERVICING-NET-BUF L)
(OPIN 18 NET-CABLE-CTR-ENB L)

(SETQ NET-XMT-ENABLE (NOT NET-RCV-ENABLE))

;;; Save a gate
(SETQ NET-CABLE-CTR-ENB (OR NET-BACKOFF-TIMER-ENB (NOT NET-CABLE-BUSY)))

(SETQ SERVICING-NET-BUF
      (OR (AND NET-RCV-ENABLE (OR READ-NET-BUF NET-ACTIVE-CYCLE))
          (AND NET-XMT-ENABLE (OR WRITE-NET-BUF NET-DATA-CYCLE))))

(SETQ SET-NET-WAKEUP
      (AND (NOT FEP-USING-NET)
           (NOT NET-RESET)
           (OR (AND NET-BACKOFF-TIMER-ENB NET-BACKOFF-TIMER-DONE)
               (AND NET-RCV-ENABLE (NOT NET-PKT-BEING-IGNORED) NET-WORD-END)
               (AND NET-XMT-ENABLE
                    (COND (NET-PKT-BEING-XMTD NET-WORD-END)
                          ((NOT NET-PKT-BEING-XMTD) NET-DATA-VALID))))))      ;switch to rcv mode

;; end of definition
)
```

SCRC:<LMUCODE>MASK.LISP;

```
; -*- Mode:Lisp; Package:User; Base:8 -*-

; Program to make the mask proms.  Same package as PROMP.

;Arrays containing the MB7138H data
(defvar mask0 (make-array 2048. ':type 'art-8b))
(defvar mask1 (make-array 2048. ':type 'art-8b))
(defvar mask2 (make-array 2048. ':type 'art-8b))
(defvar mask3 (make-array 2048. ':type 'art-8b))

#M
(declare (fixnum m r s rotate value mask))

#M
(defmacro <= (arg1 arg2 &rest more-args)
  (cond ((null more-args) '(not (> ,arg1 ,arg2)))
        (t '(and (not (> ,arg1 ,arg2))
                 (<= ,arg2 . ,more-args)))))

(defun store-mask (r s rotate value)
  (or (<= 0 r 37) (ferror nil "~S bad value for R" r))
  (or (<= 0 s 37) (ferror nil "~S bad value for S" s))
  (or (<= 0 rotate 1) (ferror nil "~S bad value for Rotate-Mask" rotate))
  (let ((adr (+ r (lsh rotate 5) (lsh s 6))))
    (aset (ldb 0010 value) mask0 adr)
    (aset (ldb 1010 value) mask1 adr)
    (aset (ldb 2010 value) mask2 adr)
    (aset (ldb 3010 value) mask3 adr)))

(defun fetch-mask (r s rotate)
  (or (<= 0 r 37) (ferror nil "~S bad value for R" r))
  (or (<= 0 s 37) (ferror nil "~S bad value for S" s))
  (or (<= 0 rotate 1) (ferror nil "~S bad value for Rotate-Mask" rotate))
  (let ((adr (+ r (lsh rotate 5) (lsh s 6))))
    (dpb (aref mask3 adr) 3010
         (dpb (aref mask2 adr) 2010
              (dpb (aref mask1 adr) 1010
                   (aref mask0 adr))))))

(defun setup-mask-proms ()
  ;The unrotated masks are simple enough
  (loop for s from 0 to 37
        as mask = 1 then (1+ (* mask 2))
        do (loop for r from 0 to 37
                 do (store-mask r s 0 mask)))
  ;The rotated masks provide for wrap-around bytes, probably unnecessary
  (loop for s from 0 to 37
        as mask = 1 then (1+ (* mask 2))
        do (loop for r from 0 to 37
                 as m = mask then (+ (logand #.(1- 1_32.) (* m 2))
                                     (ldb 3701 m))
                 do (store-mask r s 1 m))))

(setup-mask-proms)
```

```
;Function to print them out since we can't program them ourselves right now.
(defun print-mask-proms (file &aux (base 8))
  (with-open-file (standard-output file ':print)
    (loop for prom in '(mask0 mask1 mask2 mask3)
          do (format t "~A Prom:~2%~15<Octal Location~>~15<Hex Location~>~15<Octal Contents~>~
             15<Hex Contents~
             (setq prom (sumeval prom))
             (dotimes (i 2048.)
               (format t "~15O~12X" i)
               (hex-print i 3)
               (format t "~15O~13X" (aref prom i))
               (hex-print (aref prom i) 2)
               (terpri))
             (tyo #\page))))

(defun hex-print (number n-digits)
  (loop repeat n-digits
        as divisor = (^ 16. (1- n-digits)) then (// divisor 16.)
        do (tyo (nth (\ (// number divisor) 16.)
                     '(#/0 #/1 #/2 #/3 #/4 #/5 #/6 #/7 #/8 #/9 #/A #/B #/C #/D #/E #/F)))))
```

SCRC:<LMIOB>NXMT1.PAL;16

```
;-*- Mode:LISP; Package:USER; Base:10 -*-

;Transmitter control

;;NOTES: jamming works by setting NET XMT LAST via FEP SET NET XMT LAST
;;Then, the inverted CRC is sent (so it doesn't look like a good packet).

(DEFPAL NXMT1 PAL16R4                                  ;PAL16R4A, actually
;  (IPIN 1 NET-XMT-CLK L)                                     ;CLK input

  (IPIN 2 NET-XMT-ENABLE)
  (IPIN 3 NET-XMT-REQUEST)
  (IPIN 4 NET-RESET L)
  (IPIN 5 NET-COLLISION)
  (IPIN 6 NET-CABLE-IDLE L)
  (IPIN 7 NET-SPY-OE L)
  (IPIN 8 NET-BYTE-CNT=3 L)
  (IPIN 9 Q-Q-NET-BYTE-END)
  (IPIN 12 NET-XMT-LAST)
  (IPIN 13 Q-NET-BYTE-END)
  (IPIN 18 FEP-USING-NET)

  (RPIN 14 NET-XMT-STATE-0)
  (RPIN 15 NET-XMT-STATE-1)
  (RPIN 16 NET-PREAMBLE-DATA L)
  (RPIN 17 NET-PKT-BEING-XMTD L)

  (OPIN 19 CLEAR-NET-XMT-REQUEST L)

  (FIELD XMT-STATE NET-XMT-STATE-1 NET-XMT-STATE-0)

  (SETQ XMT-ERROR (OR NET-COLLISION
                      (NOT NET-XMT-ENABLE)
                      NET-RESET))

  (SETQ XMT-QUIT (OR NET-XMT-LAST
                     XMT-ERROR))

  (SETQ START-XMT (AND (IF FEP-USING-NET NET-SPY-OE
                           NET-XMT-REQUEST)
                       NET-CABLE-IDLE
                       (NOT NET-PKT-BEING-XMTD)
                       (NOT XMT-QUIT)))

  (SETQ WORD-END (AND NET-BYTE-CNT=3 Q-NET-BYTE-END))

  (SETQ NET-PKT-BEING-XMTD
        (AND (NOT NET-RESET)
             NET-XMT-ENABLE
             (OR START-XMT
                 (AND NET-PKT-BEING-XMTD                        ;hold until CRC goes out
                      (NOT (AND WORD-END (FIELD XMT-STATE 3)))))))

  (SETQ CLEAR-NET-XMT-REQUEST (OR NET-PKT-BEING-XMTD  XMT-ERROR))

  (SETQ NET-PREAMBLE-DATA
        (AND (NOT NET-RESET)
             (OR START-XMT NET-PKT-BEING-XMTD)
             (FIELD XMT-STATE (0 1))
             (OR (NOT NET-PREAMBLE-DATA)                        ;toggle
                 (AND (FIELD XMT-STATE 1)                       ;send two ones at the end
                      NET-BYTE-CNT=3 Q-Q-NET-BYTE-END))))

;; If in state 0 (transmit first preamble word), go to state 1 when WORD END.
;; If in state 1 (transmit second preamble word), go to state 2 when WORD END.
;; If in state 2 (transmit packet data), go to state 3 when NET XMT LAST.
```

```
;; If in state 3 (transmit CRC data), go to state 0 when WORD END.
;; Note, that when FEP sets NET XMT LAST, some random extra bytes may
;; get sent to round up to a word boundary.

  (SETQ NET-XMT-STATE-0
        (AND (NOT NET-RESET)
             NET-XMT-ENABLE
             (IF NET-XMT-STATE-1
                 (IF WORD-END
                     (AND NET-XMT-LAST (NOT NET-XMT-STATE-0))
                     NET-XMT-STATE-0)
                 (XOR WORD-END NET-XMT-STATE-0))))

  (SETQ NET-XMT-STATE-1
        (AND (NOT NET-RESET)
             NET-XMT-ENABLE
             (XOR (AND WORD-END NET-XMT-STATE-0)
                  NET-XMT-STATE-1)))

  ;; end of definition
)
```

SCRC:<LMIOB>NXMT2.PAL;7

```
;-*- Mode:LISP; Package:USER; Base:10 -*-

;; Counter to determine cable idleness

(DEFPAL NXMT2 PAL16R8
  (IPIN 5 NET-CABLE-CTR-ENB L)
  (IPIN 6 NET-RESET L)
  (IPIN 7 NET-BACKOFF-TIMER-ENB)
  (IPIN 8 NET-DATA-VALID)
  (IPIN 9 NET-CABLE-BUSY)

  (RPIN 19 NET-CABLE-IDLE L)                          ;also NET BACKOFF TIMER DONE L
  (RPIN 18 BIT-6 L)
  (RPIN 17 BIT-5 L)
  (RPIN 16 BIT-4 L)
  (RPIN 15 BIT-3 L)
  (RPIN 14 BIT-2 L)
  (RPIN 13 BIT-1 L)
  (RPIN 12 BIT-0 L)

  (FIELD COUNT BIT-6 BIT-5 BIT-4 BIT-3 BIT-2 BIT-1 BIT-0)

;;; Count 96. clock ticks after NET-CABLE-BUSY goes away.
;;; Also, count clock ticks for backoff timer.

  (SETQ COUNT-ENABLE
        (AND (NOT NET-RESET)
             NET-CABLE-CTR-ENB  ;count if enabled
             (NOT NET-CABLE-IDLE)))     ;and not done

  (SETQ BIT-0 (AND COUNT-ENABLE
                   (XOR BIT-0 T)))

  (SETQ BIT-1 (AND COUNT-ENABLE
                   (XOR BIT-1 BIT-0)))

  (SETQ BIT-2 (AND COUNT-ENABLE
                   (XOR BIT-2 (AND BIT-1 BIT-0))))

  (SETQ BIT-3 (AND COUNT-ENABLE
                   (XOR BIT-3 (AND BIT-2 BIT-1 BIT-0))))

  (SETQ BIT-4 (AND COUNT-ENABLE
                   (XOR BIT-4 (AND BIT-3 BIT-2 BIT-1 BIT-0))))

  (SETQ BIT-5 (AND COUNT-ENABLE
                   (XOR BIT-5 (AND BIT-4 BIT-3 BIT-2 BIT-1 BIT-0))))

  (SETQ BIT-6 (AND COUNT-ENABLE
                   (XOR BIT-6 (AND BIT-5 BIT-4 BIT-3 BIT-2 BIT-1 BIT-0))))

;; When used as a backoff timer, NET CABLE IDLE gets asserted for one clock period
;; (just long enough to cause a NET WAKEUP), then the counter is reset by
;; NET CABLE IDLE coming on, and counting continues.  To get accurate backoff
;; timings, NET RESET should presumably be hit to reset the counter, unless
;; you want the timing to date back to the last CABLE BUSY condition.

  (SETQ NET-CABLE-IDLE
        (OR (AND NET-BACKOFF-TIMER-ENB                ;if in use as backoff timer
                 (FIELD COUNT 127.))                  ;count 127. ticks
            (AND (NOT NET-BACKOFF-TIMER-ENB)          ;otherwise
                 (NOT NET-DATA-VALID)                 ;if not receiving
                 (NOT NET-CABLE-BUSY)                 ;and the cable is not busy
                 (OR NET-CABLE-IDLE                   ;and hasn't been for 96. ticks
                     (FIELD COUNT 95.)))))            ;then raise flag.

  ;; end of definition
)
```

SCRC:<LMIOB>VCLK.PAL;6

```
;-*- Mode:LISP; Package:USER; Base:10 -*-

;PAL For decoding cycle types and sync bits

(DEFPAL VCLK PAL16R8
;  (IPIN 1 VD-SSEQ-CLK L)        ;advance state only when not waiting
  (IPIN 2 SD-0)
  (IPIN 3 SD-1)

  (IPIN 5 SD-8)
  (IPIN 6 SD-9)
  (IPIN 7 SD-10)
  (IPIN 8 VD-SREG-ENB)
  (IPIN 9 VD-SSEQ-ENABLE)

  (RPIN 19 BLANK)
  (RPIN 18 V-SYNC)
  (RPIN 17 H-SYNC)

  (RPIN 15 VD-PROC-CYCLE L)                        ;3
  (RPIN 14 VD-LPTR-CYCLE L)                        ;2
  (RPIN 13 VD-REFR-CYCLE L)                        ;1
  (RPIN 12 VD-DISP-CYCLE)                          ;0

  (FIELD CYCLE-TYPE SD-1 SD-0)

  ;; 10=blank, 9=v sync, 8= h sync

  (SETQ BLANK  (AND VD-SSEQ-ENABLE (COND (VD-SREG-ENB SD-10)
                                         ((NOT VD-SREG-ENB) BLANK))))
  (SETQ V-SYNC (AND VD-SSEQ-ENABLE (COND (VD-SREG-ENB SD-9)
                                         ((NOT VD-SREG-ENB) V-SYNC))))
  (SETQ H-SYNC (AND VD-SSEQ-ENABLE (COND (VD-SREG-ENB SD-8)
                                         ((NOT VD-SREG-ENB) H-SYNC))))

  (SETQ VD-PROC-CYCLE
        (AND VD-SSEQ-ENABLE (COND (VD-SREG-ENB (FIELD CYCLE-TYPE 3))
                                  ((NOT VD-SREG-ENB) VD-PROC-CYCLE))))

  (SETQ VD-LPTR-CYCLE
        (AND VD-SSEQ-ENABLE (COND (VD-SREG-ENB (FIELD CYCLE-TYPE 2))
                                  ((NOT VD-SREG-ENB) VD-LPTR-CYCLE))))

  (SETQ VD-REFR-CYCLE
        (AND VD-SSEQ-ENABLE (COND (VD-SREG-ENB (FIELD CYCLE-TYPE 1))
                                  ((NOT VD-SREG-ENB) VD-REFR-CYCLE))))

  (SETQ VD-DISP-CYCLE
        (AND VD-SSEQ-ENABLE (COND (VD-SREG-ENB (FIELD CYCLE-TYPE 0))
                                  ((NOT VD-SREG-ENB) VD-DISP-CYCLE))))

  ;; end of definition
)
```

SCRC:<LMIOB>VCLK3.PAL;1

```
;-*- Mode:LISP; Package:USER; Base:10 -*-

;PAL For decoding cycle types and sync bits. Appears on dwg. VCLK.

(DEFPAL VCLK PAL16R8
;  (IPIN 1 VD-SSEQ-CLK L)        ;advance state only when not waiting
  (IPIN 2 SD-0)
  (IPIN 3 SD-1)

  (IPIN 5 SD-8)
  (IPIN 6 SD-9)
  (IPIN 7 SD-10)
  (IPIN 8 VD-SREG-ENB)
  (IPIN 9 VD-SSEQ-ENABLE)

  (RPIN 19 BLANK)
  (RPIN 18 V-SYNC)
  (RPIN 17 H-SYNC)
  (RPIN 16 FRAME-BIT)              ;3
  (RPIN 15 TAG-2 L)                ;2
  (RPIN 14 TAG-1 L)                ;1
  (RPIN 13 TAG-0 L)                ;0
  (RPIN 12 VD-SREG-ENB)

  (FIELD CYCLE-TYPE SD-1 SD-0)

  ;; 10=blank, 9=v sync, 8= h sync

  (SETQ BLANK  (AND VD-SSEQ-ENABLE (COND (VD-SREG-ENB SD-10)
                                         ((NOT VD-SREG-ENB) BLANK))))
```

```
  (SETQ V-SYNC (AND VD-SSEQ-ENABLE (COND (VD-SREG-ENB SD-9)
                                         ((NOT VD-SREG-ENB) V-SYNC))))
  (SETQ H-SYNC (AND VD-SSEQ-ENABLE (COND (VD-SREG-ENB SD-8)
                                         ((NOT VD-SREG-ENB) H-SYNC))))

  (SETQ TAG-0 (FIELD CYCLE-TYPE 0))

  (SETQ TAG-1 (FIELD CYCLE-TYPE 1))

  (SETQ TAG-2 (FIELD CYCLE-TYPE 2))

;MAYBE THE FRAME BIT SHOULD BE THE SAME AS ONE OF THE TAGS.

  (SETQ FRAME-BIT (FIELD CYCLE-TYPE 3))

  (SETQ VD-SREG-ENB (OR (NOT VD-SREG-ENB) SD-6)))

  ;; end of definition
)
```

SCRC:<LMIOB>VDCCTL.PAL;3

```
;-*- Mode:LISP; Package:USER; BASE:10 -*-

;PAL For controlling the two word "cache" at the LBUS interface to the
;TV memory on the REV-3 I/O board.  PAL appears on dwg. VDDCTL.

(DEFPAL VDCCTL PAL16R6
;  (INPIN 1 -LB STATE CLOCK)

  (IPIN 2 CPU-DATA-CYCLE L)
  (IPIN 3 CPU-WRITE-DM L)
  (IPIN 4 CPU-WRITE)
  (IPIN 5 LB-WRITE L)
  (IPIN 6 LB-ADDR-00)
  (IPIN 7 CPU-ADDR-00)
  (IPIN 8 LB-TV-REQ L)
  (IPIN 9 CACHE-HIT L)

  (OPIN 19 CACHE-ACT-EN L)

  (RPIN 18 ODD-CACHE-WRITE)
  (RPIN 17 ODD-OE L)
  (RPIN 16 EVEN-OE L)
  (RPIN 15 CACHE-DIRTY L)
  (RPIN 14 EVEN-CACHE-WRITE)
  (RPIN 13 CACHE-ACTIVE-CYCLE L)

  (SETQ EVEN-CACHE-WRITE (AND LB-TV-REQ CACHE-HIT LB-WRITE (NOT LB-ADDR-00)
                              (NOT CACHE-DIRTY)))

  (SETQ CACHE-DIRTY (OR (AND CACHE-HIT LB-TV-REQ LB-WRITE (NOT LB-ADDR-00)
                             (NOT CACHE-DIRTY))
                        (AND CACHE-DIRTY (NOT CPU-WRITE-DM))))

  (SETQ CACHE-ACTIVE-CYCLE (OR (AND CACHE-HIT LB-TV-REQ (NOT LB-ADDR-00) LB-WRITE
                                    (NOT CACHE-DIRTY))
                               (AND CACHE-HIT LB-TV-REQ (NOT LB-WRITE) (NOT CACHE-DIRTY))))

  (SETQ EVEN-OE (OR (AND CACHE-ACTIVE-CYCLE (NOT CPU-ADDR-00) (NOT CPU-WRITE))
                    (AND CPU-DATA-CYCLE (NOT CPU-ADDR-00) (NOT CPU-WRITE))))

  (SETQ ODD-OE  (OR (AND CACHE-ACTIVE-CYCLE (NOT CPU-ADDR-00) (NOT CPU-WRITE))
                    (AND CPU-DATA-CYCLE CPU-ADDR-00 (NOT CPU-WRITE))))

  (SETQ CACHE-ACT-EN (OR (AND CACHE-HIT LB-TV-REQ (NOT LB-ADDR-00) LB-WRITE
                              (NOT CACHE-DIRTY))
                         (AND CACHE-HIT LB-TV-REQ (NOT LB-WRITE) (NOT CACHE-DIRTY))))

;;END OF DEFINITION
)
```

SCRC:<LMIOB>VDDADR.PAL;2

```
;-*- Mode:LISP; Package:USER; BASE:10 -*-

;PAL for controlling the Line Index Table.  See dwg. VDDADR.

(DEFPAL VDDADR PAL16R4

;  (IPIN 1 LB-STATE-CLOCK L)
;  (IPIN 11 GND)          output enable.

  (IPIN 2 LIT-RESET L)
  (IPIN 3 REFRESH-DM-ACTIVE L)
  (IPIN 4 TV-DM-ACTIVE L)
  (IPIN 5 CPU-DM-ACTIVE L)
  (IPIN 6 REFRESH-DATA-CYCLE L)
```

```
  (IPIN 7 TV-DATA-CYCLE L)
  (IPIN 8 CPU-DATA-CYCLE L)
  (IPIN 9 LIT-REQ L)
  (IPIN 12 DMD-16)

  (RPIN 16 ODD-CHUNK-COUNT L)
  (RPIN 15 LIT-DATA-CYCLE L)
  (RPIN 14 LIT-DM-ACTIVE L)

  (OPIN 19 DM-DATA-CYCLE)                                    ;INTERNAL USE

;ODD CHUNK COUNT means there are an odd number of 64-pixel chunks that are to be read from
;the TV mem during this scan line.  DMD 16 is the LSB of the chunk count.  This info
;must be kept around so that the FIFO stuffer knows how to ignore the last chunk and to
;not put it in the FIFO.

  (SETQ ODD-CHUNK-COUNT (OR (AND DMD-16 LIT-DM-ACTIVE)                  ;sets the bit
                            (AND ODD-CHUNK-COUNT (NOT LIT-DM-ACTIVE)))) ;holds it on

;LIT DATA CYCLE happens one LBUS STATE after the LIT ACTIVE cycle.

  (SETQ LIT-DATA CYCLE (AND LIT-DM-ACTIVE (NOT LIT-DATA-CYCLE)))

;LIT DM CYCLE is the highest priority thing that can happen to the TV mem.  At the end of
;a scan line, LIT REQ is asserted.  This PAL gets the TV mem so it can go into the LIT
;and find the starting address for the next scan line segment.

  (SETQ LIT-DM-ACTIVE (AND LIT-REQ (NOT DM-ACTIVE-CYCLE)))

  (SETQ DM-DATA-CYCLE (OR LIT-DATA-CYCLE TV-DATA-CYCLE CPU-DATA-CYCLE REFRESH-DATA-CYCLE))

;;END OF DEFINITION
)
```

SCRC:<LMIOB>VDMADR.PAL;3

```
;-*- Mode:LISP; Package:USER; BASE:10 -*-

;PAL for controlling the write enables and bank selects of the TV memory,
;the CPU READ CLOCK, and CPU data output enable. Pal appears on dwg. VDMADR.DWG.

(DEFPAL VDMADR PAL16L8

  (IPIN 1 LIT-BNK-SEL)
  (IPIN 2 CACHE-DIRTY L)
  (IPIN 3 S+20-NS)
  (IPIN 4 STROBE)
  (IPIN 5 TV-DM-ACTIVE L)
  (IPIN 6 CPU-WRITE)
  (IPIN 7 LIT-DM-ACTIVE L)
  (IPIN 8 CPU-DM-ACTIVE)
  (IPIN 9 CPU-ADDR-01)
  (IPIN 11 CPU-ADDR-00)

  (OPIN 18 WE-0 L)
  (OPIN 17 WE-1 L)
  (OPIN 16 WE-2 L)
  (OPIN 15 WE-3 L)
  (OPIN 14 CPU-WRITE-DM L)
  (OPIN 13 BANK-0 L)
  (OPIN 19 BANK-1 L)
  (OPIN 12 CPU-RD-CLK L)

  (FIELD CPU-ADDRESS CPU-ADDR-01 CPU-ADDR-00)

;Normal write

  (SETQ WE-0 (OR (AND CPU-WRITE CPU-DM-ACTIVE (FIELD CPU-ADDRESS 0))

;Write thru cache if it is dirty.

                 (AND CPU-WRITE CPU-DM-ACTIVE (NOT CPU-ADDR-01) CACHE-DIRTY)))

  (SETQ WE-1 (OR (AND CPU-WRITE CPU-DM-ACTIVE (FIELD CPU-ADDRESS 1))))

  (SETQ WE-2 (OR (AND CPU-WRITE CPU-DM-ACTIVE (FIELD CPU-ADDRESS 2))
                 (AND CPU-WRITE CPU-DM-ACTIVE CPU-ADDR-01 CACHE-DIRTY)))

  (SETQ WE-3 (OR (AND CPU-WRITE CPU-DM-ACTIVE (FIELD CPU-ADDRESS-3))))

;Enable the outputs of the latches from the LB DATA bus to the DMD bus.

  (SETQ CPU-WRITE-DM (AND CPU-WRITE CPU-DM-ACTIVE))

;Bank select.  For the TV read cycles the bank switch happens as a function of the
;delayed strobe pulse.

  (SETQ BANK-0 (OR (AND CPU-DM-ACTIVE (NOT CPU-WRITE) (NOT CPU-ADDR-01))
                   (AND LIT-DM-ACTIVE (NOT LIT-BNK-SEL))
                   (AND TV-DM-ACTIVE (NOT S+20-NS))))
```

```
  (SETQ BANK-1 (OR (AND CPU-DM-ACTIVE (NOT CPU-WRITE) CPU-ADDR-01)
                   (AND LIT-DM-ACTIVE LIT-BNK-SEL)
                   (AND TV-DM-ACTIVE S+20-NS)

;Clocks the CPU read registers chock full of data at the leading edge of the
;strobe from the DRAM timer module if a CPU read was in progress.

  (SETQ CPU-RD-CLK (AND CPU-DM-ACTIVE (NOT STROBE) (NOT CPU-WRITE)))

;;END OF DEFINITION
)
```

SCRC:<LMIOB>VDMAG.PAL;8

```
;-*- Mode:LISP; Package:USER; Base:10 -*-

;PAL For decoding cycle types and sync bits

(DEFPAL VDMAG PAL16R8
;  (IPIN 1 VD-DMAG-CLK L)        ;advance state only when not waiting
  (IPIN 2 SD-0)
  (IPIN 3 SD-1)
  (IPIN 4 SD-2)
  (IPIN 5 SD-3)
  (IPIN 6 SD-4)
  (IPIN 7 SD-5)
  (IPIN 8 SD-6)
;  (IPIN 9 VD-SSEQ-ENABLE)

  (RPIN 19 VD-SREG-ENABLE)
  (RPIN 18 DMAG.CI)
  (RPIN 17 DMAG.Z L)
  (RPIN 16 DMAG.FE L)
  (RPIN 15 DMAG.PUP)
  (RPIN 14 DMAG.RE L)
  (RPIN 13 DMAG.S1)
  (RPIN 12 DMAG.S0)

  ;; goes low for one cycle when SD 6 is low to allow branches or calls in the 2910
  (SETQ VD-SREG-ENABLE (OR (NOT VD-SREG-ENABLE) SD-6))

  (FIELD CYCLE-TYPE SD-2 SD-1 SD-0)
  (FIELD DMAG-OP SD-5 SD-4 SD-3)

  ;; Cycle type           CYCLE-TYPE      DMAG-OP       2911 Controls
  ;; ----------           ----------      -------       -------------
  ;; Processor                 3              0           S1, S0            ; select D input
  ;; Display                   0              1           CI                ; increment PC
  ;; Refresh before LPTR       1              2           CI,S1,FE          ; TOS, pop
  ;; LPTR                      2              3           CI,S1,FE,PUP,RE   ; TOS, push, load
  ;; Refresh after LPTR        1              4           CI,S1,FE,PUP      ; TOS, push
  ;; Line Start                0              5           CI,S0,FE,PUP      ; AR, push
  ;; Top of Frame              2              6           CI,Z ,FE,PUP,RE   ; 0, push

  ;; Note: On processor cycles, the 2911 is not clocked, but just passes the D input
  ;;       to the output.  Memory access for LPTR cycles barely make it by the end of T6.

  ;;; 2911 Controls

  (SETQ DMAG.CI  (COND ((NOT VD-SREG-ENABLE) DMAG.CI)
                       (VD-SREG-ENABLE
                        (AND (FIELD CYCLE-TYPE (0 1 2 4))
                             (FIELD DMAG-OP (1 2 3 4 5 6))))))      ;not a processor cycle

  (SETQ DMAG.Z  (COND ((NOT VD-SREG-ENABLE) DMAG.Z)
                      (VD-SREG-ENABLE
                       (AND (FIELD CYCLE-TYPE 2)
                            (FIELD DMAG-OP 6)))))                  ;jump to zero

  (SETQ DMAG.FE   (COND ((NOT VD-SREG-ENABLE) DMAG.FE)
                        (VD-SREG-ENABLE
                         (AND (FIELD CYCLE-TYPE (0 1 2))
                              (FIELD DMAG-OP (2 3 4 5 6))))))

  (SETQ DMAG.PUP  (COND ((NOT VD-SREG-ENABLE) DMAG.PUP)
                        (VD-SREG-ENABLE
                         (AND (FIELD CYCLE-TYPE (0 1 2))
                              (FIELD DMAG-OP (3 4 5 6))))))

  (SETQ DMAG.RE   (COND ((NOT VD-SREG-ENABLE) DMAG.RE)
                        (VD-SREG-ENABLE
                         (AND (FIELD CYCLE-TYPE 2)
                              (FIELD DMAG-OP (3 6))))))

  (SETQ DMAG.S0   (COND ((NOT VD-SREG-ENABLE) DMAG.S0)
                        (VD-SREG-ENABLE
                         (AND (FIELD CYCLE-TYPE (0 3))
                              (FIELD DMAG-OP (0 5))))))

  (SETQ DMAG.S1   (COND ((NOT VD-SREG-ENABLE) DMAG.S1)
```

```
(VD-SREG-ENABLE
 (AND (FIELD CYCLE-TYPE (1 2 3))
      (FIELD DMAG-OP (0 2 3 4))))))

 ;; end of definition
)
```

SCRC:<LMIOB>VDMCTL1.PAL;2

```
;-*- Mode:LISP; Package:USER; Base:10 -*-

;PAL for Lbus/video control signals

;;; OE is grounded, CLK is LB-STATE-CLK

(DEFPAL VDMCTL1 PAL16R4
; (IPIN 1 LB-STATE-CLK L)
  (IPIN 2 LB-ADDR-0)
  (IPIN 3 LB-ADDR-0-A)
  (IPIN 4 LB-ADDR-10)
  (IPIN 5 LB-ADDR-10-A)
  (IPIN 6 LB-ADDR-17)
  (IPIN 7 LB-ADDR-17-A)
  (IPIN 8 IO-READ-RQ)
  (IPIN 9 IO-READ-ACTIVE-CYCLE)
  (IPIN 12 IO-WRITE-RQ)

  (RPIN 14 VD-READ-HI L)
  (RPIN 15 VD-READ-LO L)
  (RPIN 16 SYNC-MEM-CYCLE L)
  (RPIN 17 SYNC-MEM-WE L)

  (SETQ VD-READ-LO (OR (AND IO-READ-RQ LB-ADDR-10 (NOT LB-ADDR-0))
                       (AND IO-READ-ACTIVE-CYCLE LB-ADDR-10-A (NOT LB-ADDR-0-A))))

  (SETQ VD-READ-HI (OR (AND IO-READ-RQ LB-ADDR-10 LB-ADDR-0)
                       (AND IO-READ-ACTIVE-CYCLE LB-ADDR-10-A LB-ADDR-0-A)))

  (SETQ SYNC-MEM-SELECTED   (AND LB-ADDR-17 (NOT LB-ADDR-10)))
  (SETQ SYNC-MEM-SELECTED-A (AND LB-ADDR-17-A (NOT LB-ADDR-10-A)))
  (SETQ SYNC-MEM-WE (AND SYNC-MEM-SELECTED IO-WRITE-RQ))

  (SETQ SYNC-MEM-CYCLE (OR (AND SYNC-MEM-SELECTED IO-WRITE-RQ)
                           (AND SYNC-MEM-SELECTED IO-READ-RQ)
                           (AND SYNC-MEM-SELECTED-A IO-READ-ACTIVE-CYCLE)))

  ;; end of definition
  )
```

SCRC:<LMIOB>VDMCTL2.PAL;2

```
;-*- Mode:LISP; Package:USER; BASE:10 -*-

;PAL for controlling the state of (AND ACCESS TO) the TV memory. Pal appears on
;dwg. VDMCTL.

(DEFPAL VDMCTL2 PAL16L8

  (IPIN 1 LB-WRITE)
  (IPIN 2 CACHE-HIT L)
  (IPIN 3 CACHE-DIRTY L)
  (IPIN 4 LB-TV-REQ L)
  (IPIN 5 REF-REQ L)
  (IPIN 6 CACHE-ACTIVE)
  (IPIN 7 DM-ACTIVE-CYCLE)
  (IPIN 8 PANIC)
  (IPIN 9 LIT-REQ L)
  (IPIN 11 LB-REFRESH L)
  (IPIN 13 LB-ADDR-00)
  (IPIN 14 CLEAR-LB-WAIT L)
  (IPIN 15 FULLNESS)

  (OPIN 17 CPU-ACTIVE-ENAB L)
  (OPIN 18 REFRESH-ENAB L)
  (OPIN 19 REF-REQ-ENAB L)
  (OPIN 12 TV-ACTIVE-ENAB L)

;Noone else is requesting the TV memory and we are not in the middle of a cycle.  Give
;the next cycle to the fifo if the fifo is not full.

  (SETQ TV-ACTIVE-ENAB (OR (AND (NOT LIT-REQ) (NOT CPU-REQ) (NOT REF-DM-EN) (NOT REF-REQ)
                                (NOT FULLNESS) (NOT DM-ACTIVE-CYCLE) (NOT CACHE-ACTIVE))

;The fifo is in panic mode.  Give it the cycle.

                           (AND (NOT LIT-REQ) (NOT DM-ACTIVE-CYCLE) PANIC)))

;Cache miss.  Cache is empty.
```

```
(SETQ CPU-ACTIVE-ENAB (OR (AND (NOT LIT-REQ) (NOT PANIC) (NOT REF-REQ) (NOT DM-ACTIVE-CYCLE)
                               (NOT CACHE-HIT) (NOT CACHE-DIRTY) LB-TV-REQ)

;Cache miss.  Cache is full.  Must assert write during this cycle, assert LBUS WAIT, flush
;cache, then request another cycle for the CPU.

                          (AND (NOT LIT-REQ) (NOT PANIC) (NOT REF-REQ) (NOT DM-ACTIVE-CYCLE)
                               (NOT CACHE-HIT) CACHE-DIRTY LB-TV-REQ)

;Cache is dirty with data in the least significant word.  CPU wants to read this data.  Data
;is not yet in the TV memory.  Two birds are killed with one cycle.  To the TV mem it
;looks like a write cycle and the data in the cache is stored in TV mem.  To the CPU it
;looks like a read.  The data on DMD<31:00> bus going to the TV mem is clocked into the
;CPU read reg.
                          (AND (NOT LIT-REQ) (NOT PANIC) (NOT REF-REQ) (NOT DM-ACTIVE-CYCLE)
                               (NOT LB-WRITE) CACHE-HIT  CACHE-DIRTY LB-TV-REQ
                               (NOT CPU-ADDR-00))

;Cache is hit.  CPU wants to write data into the high half which is not dirty.  Since
;the next operation will most likely be at the current address plus one, which would
;cause a miss, write it thru now.

                          (AND (NOT LIT-REQ) (NOT PANIC) (NOT REF-REQ) (NOT DM-ACTIVE-CYCLE)
                               LB-TV-REQ CACHE-HIT (NOT CACHE-DIRTY) LB-ADDR-00 LB-WRITE)

;Read cycle, cache hit but empty.  CPU wants the low half of cache but it is not dirty.
;Must go get fresh data.

                          (AND (NOT LIT-REQ) (NOT PANIC) (NOT REF-REQ) (NOT DM-ACTIVE-CYCLE)
                               (NOT LB-WRITE) CACHE-HIT LB-TV-REQ (NOT CACHE-DIRTY))

;LBUS wants to refresh the RAM's and we are not panicking or LITing.  Do it.

 (SETQ REFRESH-DM-ENAB (OR (AND (NOT LIT-REQ) (NOT PANIC) LB-REFRESH (NOT DM-ACTIVE-CYCLE))

;A request for RAM refresh has been logged but not honored yet.  It is OK now.

                          (AND (NOT LIT-REQ) (NOT PANIC) REF-REQ (NOT DM-ACTIVE-CYCLE))))

;LBUS wants to refresh the RAMs but something more important is happening.  Log the request
;for a more fun time.

 (SETQ REF-REQ (OR (AND LB-REFRESH LIT-REQ)
                   (AND LB-REFRESH PANIC)
                   (AND LB-REFRESH DM-ACTIVE-CYCLE)
                   (AND REF-REQ (NOT REFRESH-DM-ENAB))))

;;END OF DEFINITION
)
```

SCRC:<LMIOB>VDMCTL3.PAL;2

```
;-*- Mode:LISP; Package:USER; BASE:10 -*-

;PAL for deciding when to hang the bus. PAL appears on dwg. VDMCTL

(DEFPAL VDMCTL3 PAL16R4

;  (IPIN 1 LB-CLOCK L)    NOT LB STATE CLOCK!
;  (IPIN 11 GND)          output enable.

  (IPIN 2 CACHE-HIT L)
  (IPIN 3 CACHE-DIRTY L)
  (IPIN 4 LB-TV-REQ L)
  (IPIN 5 REF-REQ L)
  (IPIN 6 CACHE-ACTIVE)
  (IPIN 7 DM-ACTIVE-CYCLE)
  (IPIN 8 PANIC)
  (IPIN 9 LIT-REQ L)
  (IPIN 12 LB-REFRESH L)
  (IPIN 13 LB-ADDR-00)
  (IPIN 18 FULLNESS)

  (RPIN 17 ASSERT-LB-WAIT L)

  (OPIN 19 CLEAR-LB-WAIT L)                                ;INTERNAL USE

  (SETQ ASSERT-LB-WAIT (OR (AND LB-TV-REQ DM-ACTIVE-CYCLE)
                           (AND LB-TV-REQ LIT-REQ)
                           (AND LB-TV-REQ PANIC)
                           (AND LB-TV-REQ (NOT CACHE-HIT) CACHE-DIRTY)
                           (AND ASSERT-LB-WAIT (NOT CLEAR-LB-WAIT))))

  (SETQ CLEAR-LB-WAIT (AND ASSERT-LB-WAIT (NOT TV-DM-ACTIVE)))

;;END OF DEFINITION
)
```

SCRC:<LMIOB>VFFCTL1.PAL:2

```
;-*- Mode:LISP; Package:USER; BASE:10 -*-

;PAL For controlling the RAM FIFO.  Pal appears on dwg. VFFCTL.

(DEFPAL VFFCTL PAL16R4

;  (IPIN 1 PIXEL CLK/4 L)        ;CLOCK INPUT
;  (IPIN 11 GND)                 ;OUTPUT ENABLE

  (IPIN 18 TV-DM-ACTIVE-A L)
  (IPIN 13 STROBE-A)
  (IPIN 12 S+60-NS-A)
  (IPIN 2 LAST-CHUNK L)
  (IPIN 3 ODD-CHUNK-COUNT-A L)
  (IPIN 4 FILL-GO)
  (IPIN 5 FIFO-REQ+12)
  (IPIN 6 FILL-ADDR-03)
  (IPIN 7 FILL-ADDR-02)
  (IPIN 8 FILL-ADDR-01)
  (IPIN 9 FILL-ADDR-00)

  (RPIN 17 DRAIN-CNT-EN L)
  (RPIN 16 FILL-CNT-EN L)
  (RPIN 15 FIFO-WRITE L)
  (RPIN 14 LD-VSR L)

  (OPIN 19 FILL-GO-EN)

  (FIELD REG-ADDRESS FILL-ADDR-02 FILL-ADDR-01 FILL-ADDR-00)

;The DMD registers have been loaded with fresh data. Start a FIFO stuff cycle.

  (SETQ FILL-GO-EN (OR (AND S+60-NS-A (NOT FILL-GO))

                       (AND FILL-GO (NOT LAST CHUNK) (NOT (FIELD REG-ADDRESS 7)))

;This is the last chunk and the chunk count was even so we go ahead and load the odd one.

                       (AND FILL-GO LAST-CHUNK (NOT ODD-CHUNK-COUNT)
                            (NOT (FIELD REG-ADDRESS 7)))

;This is the last chunk and the count was odd so we do not load the odd one.

                       (AND FILL-GO LAST-CHUNK ODD-CHUNK-COUNT (NOT (FIELD REG-ADDRESS 3)))))

;Whenever the FIFO request wants it, it gets it.

  (SETQ DRAIN-CNT-EN FIFO-REQ+12)

;Fill go enable is asserted and the FIFO request is not happening so we might as well
;start the cycle now.

  (SETQ FILL-CNT-EN (OR (AND FILL-GO-EN (NOT FIFO-REQ+12))

;Increment te fill count.

                        (AND FILL-GO (NOT FIFO-REQ+12) (NOT LAST-CHUNK))

;We are at the end of a line but this is the even half of the last cycle so that we can
;go anyway.

                        (AND FILL-GO (NOT FIFO-REQ+12) (NOT FILL-ADDR-02)
                                                            LAST-CHUNK)

;We are at the end of a line, the odd half of the cycle, and it is not an odd chunk count.

                        (AND FILL-GO (NOT FIFO-REQ+12) LAST-CHUNK FILL-ADDR-02
                             (NOT ODD-CHUNK-COUNT))

;Something is wrong. The counter should always be at REG-ADDRESS 0 when FILL GO is not
;asserted.  Increment it till this is true.

                             (NOT-FILL-GO) (NOT (FIELD REG-ADDRESS 0)))

;FIFO WRITE always happens when you are filling.  It never happens when you are
;draining.

  (SETQ FIFO-WRITE (OR (AND FILL-GO-EN (NOT FIFO-REQ+12))
                       (AND FILL-GO (NOT FIFO-REQ+12))))

;After you enable the drain count you load the VSR.  Pipe delays.

  (SETQ LD-VSR DRAIN-CNT-EN)

;;END OF DEFINITION
)
```

SCRC:<LMIOB>VFFCTL2.PAL:2

```
;-*- Mode:LISP; Package:USER; BASE:10 -*-

;PAL For controlling Display Data Register output enables and the register select
;inputs to the AM29520's.  Pal appears on dwg. VFFCTL

(DEFPAL VFFCTL2 PAL16L8

  (IPIN 4 TV-DM-ACTIVE-A L)                                 ;NOT USED
  (IPIN 5 FILL-ADDR-03)                                     ;NOT USED
  (IPIN 6 FILL-ADDR-02)
  (IPIN 7 FILL-ADDR-01)
  (IPIN 8 FILL-ADDR-00)
  (IPIN 9 FILL-GO)
  (IPIN 11 ODD-CHUNK-COUNT-A L)                             ;NOT USED

  (OPIN 16 DDR-OE-3 L)
  (OPIN 15 DDR-OE-2 L)
  (OPIN 14 DDR-OE-1 L)
  (OPIN 13 DDR-OE-0 L)
  (OPIN 19 DDR-PIPE-S-1)
  (OPIN 12 DDR-PIPE-S-0)

  (FIELD REG-ADDRESS FILL-ADDR-01 FILL-ADDR-00)

  (SETQ DDR-OE-0 (AND FILL-GO (FIELD REG-ADDRESS 0)))

  (SETQ DDR-OE-1 (AND FILL-GO (FIELD REG-ADDRESS 1)))

  (SETQ DDR-OE-2 (AND FILL-GO (FIELD REG-ADDRESS 2)))

  (SETQ DDR-OE-3 (AND FILL-GO (FIELD REG-ADDRESS 3)))

  (SETQ DDR-PIPE-S-0 (AND FILL-GO (NOT FILL-ADDR-02)))

  (SETQ DDR-PIPE-S-1 (AND FILL-GO FILL-ADDR-02))

);END OF DEFINITION
```

SCRC:<LMIOB>VRQCTL1.PAL:19

```
;-*- Mode:LISP; Package:USER; Base:10 -*-

;PAL for display memory access state machine

(DEFPAL VRQCTL1 PAL16R4
  ;; Inputs
  (IPIN 2 IO-REQUEST L)             ;Request for memory access on this board
  (IPIN 3 LB-ADDR-18)               ;Request is for video memory
  (IPIN 4 LB-WRITE)                 ;Request is to write
  (IPIN 5 LB-WAIT)                  ;Lbus is waiting
  (IPIN 6 VD-DONE)                  ;Video memory is done
  (IPIN 7 IO-WRITE-CYCLE)           ;Active cycle and writing
  (IPIN 8 VD-SSEQ-ENABLE)
  (IPIN 9 LB-RESET L)               ;General reset (initialize state)

  ;; Non-registered outputs
  (OPIN 19 VD-START L)              ;Set VD GO at next clock
  (OPIN 18 VD-START-WRITE)          ;Clock write data, close address latch

  ;; Registered output
  (RPIN 14 VD-WAIT L)               ;Drives LBUS WAIT

  ;; State bits
  (RPIN 15 VRQ-WRITING L)           ;Write request in progress
  (RPIN 16 VRQ-READING L)           ;Waiting for read request to finish
  (RPIN 17 VRQ-WAITING L)           ;New request waiting for prev write to finish

  ;; Incoming requests
  (SETQ READ-RQ (AND IO-REQUEST LB-ADDR-18 (NOT LB-WRITE) (NOT LB-WAIT)))
  (SETQ WRITE-RQ (AND IO-REQUEST LB-ADDR-18 LB-WRITE (NOT LB-WAIT)))

  ;; Video memory is busy if a write is in progress and isn't about to finish
  (SETQ BUSY (AND VRQ-WRITING (NOT VD-DONE)))

  ;; A write cycle when not busy starts after the data arrive in the active cycle.
  ;; The address latch needs to close during the active cycle, in case another
  ;; cycle is being requested immediately.  LBUS WAIT does not come on.

  ;; A read cycle when not busy starts immediately.  The address latch closes
  ;; during the active cycle.  LBUS WAIT stays on until the cycle is completed
  ;; whereupon we do one last active cycle, giving time for the data to arrive.

  ;; Any request when busy has to turn on LBUS WAIT and sit in "active cycle"
  ;; until the previous request is completed.  GO can then be set immediately
```

```
;; and simultaneously the write data are clocked.
;; The address latch opens during the last active cycle.
;; The previous request isn't really completed yet when DONE comes in, but
;; it will be by the time things get through the pipeline to the memory.

;; LBUS WAIT is generated while doing a read and when waiting
;; Note that this bit comes out through a register
(SETQ VD-WAIT (AND (NOT LB-RESET)
                   VD-SSEQ-ENABLE
                   (OR READ-RQ
                       (AND VRQ-READING (OR VRQ-WAITING (NOT VD-DONE)))
                       (AND WRITE-RQ BUSY)
                       (AND VRQ-WAITING BUSY))))

;; If a request comes in while busy, go into VRQ-WAITING state until done
(SETQ VRQ-WAITING (AND (NOT LB-RESET)
                       VD-SSEQ-ENABLE
                       (OR (AND READ-RQ BUSY)
                           (AND WRITE-RQ BUSY)
                           (AND VRQ-WAITING BUSY))))

;; Enter reading state immediately upon READ-RQ
;; The address latch remains open while reading
;; Generate START either immediately or after waiting for -busy
(SETQ VRQ-READING (AND (NOT LB-RESET)
                       VD-SSEQ-ENABLE
                       (OR READ-RQ
                           (AND VRQ-READING VRQ-WAITING)
                           (AND VRQ-READING (NOT VD-DONE)))))

(SETQ START-FOR-READ (AND (NOT LB-RESET)
                          VD-SSEQ-ENABLE
                          (OR (AND READ-RQ (NOT BUSY))
                              (AND VRQ-READING VRQ-WAITING (NOT BUSY)))))

;; Enter writing state immediately upon WRITE-RQ (it might already be set)
;; Normally go into an active cycle which closes the latch and generates START
;; If have to wait for busy first, do this active cycle as soon as DONE
(SETQ VRQ-WRITING (AND (NOT LB-RESET)
                       VD-SSEQ-ENABLE
                       (OR WRITE-RQ
                           (AND VRQ-WRITING VRQ-WAITING)
                           (AND VRQ-WRITING (NOT VD-DONE)))))
(SETQ START-FOR-WRITE (AND VD-SSEQ-ENABLE
                           IO-WRITE-CYCLE
                           (NOT VRQ-WAITING)))

(SETQ VD-START (OR START-FOR-READ START-FOR-WRITE))
(SETQ VD-START-WRITE START-FOR-WRITE)

;; end of definition
)
```

SCRC:<LMIOB>VRQCTL2.PAL;13

```
;-*- Mode:LISP; Package:USER; Base:10 -*-

;PAL for Lbus/video control signals

(DEFPAL VRQCTL2 PAL16L8
  ;; Lbus data cycle inputs
  (IPIN 1 VD-READ-LO L)                ;Address bit 0 (valid in the "active" cycle)
  (IPIN 2 VD-READ-HI L)                ;Address bit 0 (valid in the "data" cycle)
  (IPIN 3 LB-ADDR-18-A)                ;Address bit 17 (valid in the "active" cycle)
  (IPIN 6 IO-WRITE-CYCLE)              ;Any WRITE cycle on this board

  ;; Display memory proc cycle inputs
  (IPIN 7 DM-ODD-ADDR)                 ;Low-order address bit
  (IPIN 8 DM-WRITE)                    ;Proc cycle is for write
  (IPIN 9 VD-GO-SYNC)                  ;Proc cycle wanted
  (IPIN 11 VD-PROC-CYCLE L)            ;Time for proc cycle
  (IPIN 13 VRQ-WAITING L)              ;in waiting state (see VRQCTL1.PAL)

  ;; Display memory control outputs
  (OPIN 14 VD-PROC-ACTIVE L)           ;Proc cycle really happening
  (OPIN 19 RAS-EN-0)                   ;Enable RAS to even word
  (OPIN 12 RAS-EN-1)                   ;Enable RAS to odd word

  ;; 74LS646 control outputs
  (OPIN 15 LB-DATA-WRITE-CLK-ENB L)    ;enable write clock
  ;; Pin 16 free
  (OPIN 17 LB-DATA<->DMD-LO L)         ;Output enable for even word
  (OPIN 18 LB-DATA<->DMD-HI L)         ;Output enable for odd word

  ;; Display memory control.  RAS both halves except for single-word
  ;; processor cycles which RAS one half, and idle processor cycles
  ;; which RAS neither.
  (SETQ VD-PROC-ACTIVE (AND VD-PROC-CYCLE VD-GO-SYNC))

  (SETQ RAS-EN-0 (OR (NOT VD-PROC-CYCLE)
                     (AND VD-GO-SYNC (NOT DM-ODD-ADDR))))
```

```
(SETQ RAS-EN-1 (OR (NOT VD-PROC-CYCLE)
                   (AND VD-GO-SYNC DM-ODD-ADDR)))

;; Output enable is on for selected word when reading onto Lbus,
;; on for both words when processor cycle and writing.
(SETQ LB-DATA<->DMD-LO (OR (AND VD-READ-LO (NOT VRQ-WAITING))
                           (AND VD-PROC-ACTIVE DM-WRITE)))    ;write cycles

(SETQ LB-DATA<->DMD-HI (OR (AND VD-READ-HI (NOT VRQ-WAITING))
                           (AND VD-PROC-ACTIVE DM-WRITE)))    ;write cycles

(SETQ LB-DATA-WRITE-CLK-ENB (AND IO-WRITE-CYCLE (NOT VRQ-WAITING) LB-ADDR-18-A))

;; end of definition
)
```

SCRC:<LMIOB>VRQCTL3.PAL;3

```
;-*- Mode:LISP; Package:USER; Base:10 -*-

;PAL for Lbus/video control signals

;;; OE is grounded, CLK is LB-STATE-CLK

(DEFPAL VRQCTL3 PAL16R4
; (IPIN 1 LB-STATE-CLK L)
  (IPIN 2 LB-ADDR-0)
  (IPIN 3 LB-ADDR-0-A)
  (IPIN 4 LB-ADDR-18)
  (IPIN 5 LB-ADDR-18-A)
  (IPIN 6 LB-ADDR-17)
  (IPIN 7 LB-ADDR-17-A)
  (IPIN 8 IO-READ-RQ)
  (IPIN 9 IO-READ-ACTIVE-CYCLE)
  (IPIN 12 IO-WRITE-RQ)

  (RPIN 14 VD-READ-HI L)
  (RPIN 15 VD-READ-LO L)
  (RPIN 16 SYNC-MEM-CYCLE L)
  (RPIN 17 SYNC-MEM-WE L)

  (SETQ VD-READ-LO (OR (AND IO-READ-RQ LB-ADDR-18 (NOT LB-ADDR-0))
                       (AND IO-READ-ACTIVE-CYCLE LB-ADDR-18-A (NOT LB-ADDR-0-A))))

  (SETQ VD-READ-HI (OR (AND IO-READ-RQ LB-ADDR-18 LB-ADDR-0)
                       (AND IO-READ-ACTIVE-CYCLE LB-ADDR-18-A LB-ADDR-0-A)))

  (SETQ SYNC-MEM-SELECTED   (AND LB-ADDR-17 (NOT LB-ADDR-18)))
  (SETQ SYNC-MEM-SELECTED-A (AND LB-ADDR-17-A (NOT LB-ADDR-18-A)))
  (SETQ SYNC-MEM-WE (AND SYNC-MEM-SELECTED IO-WRITE-RQ))

  (SETQ SYNC-MEM-CYCLE (OR (AND SYNC-MEM-SELECTED IO-WRITE-RQ)
                           (AND SYNC-MEM-SELECTED IO-READ-RQ)
                           (AND SYNC-MEM-SELECTED-A IO-READ-ACTIVE-CYCLE)))

 ;; end of definition
 )
```

SCRC:<LMIOB>VRQCTL4.PAL;4

```
;-*- Mode:LISP; Package:USER; Base:10 -*-

;PAL for Lbus/video control signals.  DWG. MEMCTL.DWG

;;; OE is grounded, CLK is LB-STATE-CLK

(DEFPAL VRQCTL3 PAL16R4
; (IPIN 1 LB-STATE-CLK L)
  (IPIN 2 LB-ADDR-0)
  (IPIN 3 LB-ADDR-0-A)
  (IPIN 4 LB-ADDR-18)
  (IPIN 5 LB-ADDR-18-A)
  (IPIN 6 LB-ADDR-17)
  (IPIN 7 LB-ADDR-17-A)
  (IPIN 8 IO-READ-RQ)
  (IPIN 9 IO-READ-ACTIVE-CYCLE)
  (IPIN 12 IO-WRITE-RQ)
  (IPIN 13 IO-REQUEST L)

  (RPIN 15 LB-TV-REQ-A L)
  (RPIN 16 SYNC-MEM-CYCLE L)
  (RPIN 17 SYNC-MEM-WE L)

  (OPIN 18 LB-TV-REQ L)

  (SETQ LB-TV-REQ (AND IO-REQUEST LB-ADDR-18))

  (SETQ LB-TV-REQ-A LB-TV-REQ)

  (SETQ SYNC-MEM-SELECTED   (AND LB-ADDR-17 (NOT LB-ADDR-18)))
```

```
(SETQ SYNC-MEM-SELECTED-A (AND LB-ADDR-17-A (NOT LB-ADDR-18-A)))

(SETQ SYNC-MEM-WE (AND SYNC-MEM-SELECTED IO-WRITE-RQ))

(SETQ SYNC-MEM-CYCLE (OR (AND SYNC-MEM-SELECTED IO-WRITE-RQ)
                         (AND SYNC-MEM-SELECTED IO-READ-RQ)
                         (AND SYNC-MEM-SELECTED-A IO-READ-ACTIVE-CYCLE)))

;; end of definition
)
```

SCRC:<LMIOB>VSSEQ.PAL;2

```
;-*- Mode:LISP; Package:USER; Base:10 -*-

;PAL For decoding cycle types and sync bits.  Appears on dwg. VCLK.

(DEFPAL VSSEQ PAL16R8
;  (IPIN 1 VD-SSEQ-CLK L)       ;advance state only when not waiting
  (IPIN 2 SD-0)
  (IPIN 3 SD-1)

  (IPIN 5 SD-8)
  (IPIN 6 SD-9)
  (IPIN 7 SD-10)
  (IPIN 8 VD-SREG-ENB)
  (IPIN 9 VD-SSEQ-ENABLE)

  (RPIN 19 BLANK)
  (RPIN 18 V-SYNC)
  (RPIN 17 H-SYNC)
  (RPIN 16 FRAME-BIT)                 ;3
  (RPIN 15 TAG-2 L)                   ;2
  (RPIN 14 TAG-1 L)                   ;1
  (RPIN 13 TAG-0 L)                   ;0
  (RPIN 12 VD-SREG-ENB)

  (FIELD CYCLE-TYPE SD-1 SD-0)

  ;; 10=blank, 9=v sync, 8= h sync

  (SETQ BLANK  (AND VD-SSEQ-ENABLE (COND (VD-SREG-ENB SD-10)
                                         ((NOT VD-SREG-ENB) BLANK))))
  (SETQ V-SYNC (AND VD-SSEQ-ENABLE (COND (VD-SREG-ENB SD-9)
                                         ((NOT VD-SREG-ENB) V-SYNC))))
  (SETQ H-SYNC (AND VD-SSEQ-ENABLE (COND (VD-SREG-ENB SD-8)
                                         ((NOT VD-SREG-ENB) H-SYNC))))

  (SETQ TAG-0 (FIELD CYCLE-TYPE 0))

  (SETQ TAG-1 (FIELD CYCLE-TYPE 1))

  (SETQ TAG-2 (FIELD CYCLE-TYPE 2))

;MAYBE THE FRAME BIT SHOULD BE THE SAME AS ONE OF THE TAGS.

  (SETQ FRAME-BIT (FIELD CYCLE-TYPE 3))

  (SETQ VD-SREG-ENB (OR (NOT VD-SREG-ENB) SD-6)))

  ;; end of definition
)
```

SCRC:<LMIOB>XMIT-ENC.PAL;6

```
;-*- Mode:LISP; Package:USER; Base:10 -*-

;;Bi-phase encoder and clock divider for console

(DEFPAL XMIT-ENC PAL16R8
  ; pin 1 is 9.8304 MHz clock
  (IPIN 2 NRZ-TD)
  (IPIN 3 RTSA-LOW)

  (RPIN 19 ENCODED-TD)
  (RPIN 18 HDLC-RTS)
  (RPIN 17 CLK-153-6KHZ)
  (RPIN 16 CLK-307-2KHZ)
  (RPIN 15 CLK-614-4KHZ)
  (RPIN 14 CLK-1-2288MHZ)
  (RPIN 13 CLK-2-4576MHZ)
  (RPIN 12 CLK-4-9152MHZ)

  (SETQ CLK32 CLK-153-6KHZ )
  (SETQ CLK16 CLK-307-2KHZ )
  (SETQ CLK8  CLK-614-4KHZ )
  (SETQ CLK4  CLK-1-2288MHZ)
```

```
  (SETQ CLK2  CLK-2-4576MHZ)
  (SETQ CLK   CLK-4-9152MHZ)
  (SETQ PULSE (AND (NOT CLK) (NOT CLK2) CLK4))


  (SETQ ENCODED-TD (XOR ENCODED-TD (AND PULSE (OR CLK8 (NOT NRZ-TD)))))
  (SETQ HDLC-RTS   (COND ((AND CLK8 PULSE) RTSA-LOW)
                         ((NOT (AND CLK8 PULSE)) HDLC-RTS)))

  (SETQ CLK32      (XOR CLK32 (NOT (OR CLK CLK2 CLK4 CLK8 CLK16))))
  (SETQ CLK16      (XOR CLK16 (NOT (OR CLK CLK2 CLK4 CLK8))))
  (SETQ CLK8       (XOR CLK8  (NOT (OR CLK CLK2 CLK4))))
  (SETQ CLK4       (XOR CLK4  (NOT (OR CLK CLK2))))
  (SETQ CLK2       (XOR CLK2  (NOT CLK)))
  (SETQ CLK        (NOT CLK))

  ;; end of definition
)
```

FEP - PAL

SCRC:<LFEP>UDMAHA.PAL;2

```
;;; -*- Mode: LISP;  Base: 10;  Package: USER -*-

(DEFPAL UDMAHA PAL16L8
  (OPIN 12 WR-HIGH-ADR L)
  (OPIN 19 RD-HIGH-ADR L)
  (OPIN 13 CTL-WR L)
  (OPIN 14 CTL-RD L)
  (OPIN 15 DEV-0 L)
  (OPIN 16 DEV-1 L)
  (OPIN 17 DEV-2 L)
  (OPIN 18 DEV-3 L)

  (IPIN  1 CTL-RQ L)
  (IPIN  2 A1 H)
  (IPIN  3 A0 H)
  (IPIN  4 CART-DACK H)
  (IPIN  5 PAR-DACK H)
  (IPIN  6 SERB-DACK H)
  (IPIN  7 SERA-DACK H)
  (IPIN  8 IORC H)
  (IPIN  9 HIGH-ADR-RQ L)
  (IPIN 11 WRITE-T250 H)

  (SETQ DEV-3 (OR (AND HIGH-ADR-RQ A1 A0) CART-DACK))
  (SETQ DEV-2 (OR (AND HIGH-ADR-RQ A1 (NOT A0)) PAR-DACK))
  (SETQ DEV-1 (OR (AND HIGH-ADR-RQ (NOT A1) A0) SERB-DACK))
  (SETQ DEV-0 (OR (AND HIGH-ADR-RQ (NOT A1) (NOT A0)) SERA-DACK))

  (SETQ CTL-RD (AND IORC CTL-RQ))
  (SETQ CTL-WR (AND WRITE-T250 CTL-RQ))

  (SETQ RD-HIGH-ADR (AND IORC HIGH-ADR-RQ))
  (SETQ WR-HIGH-ADR (AND WRITE-T250 HIGH-ADR-RQ)))
```

SCRC:<LFEP>UDMABC.PAL;3

```
;;; -*- Mode: LISP;  Base: 10;  Package: USER -*-

(DEFPAL UDMABC PAL16L8
  (OPIN 12 WRITE-REG H)
  (OPIN 19 READ-REG H)
  (OPIN 13 IORC L)
  (OPIN 14 IOWC L)
  (OPIN 15 MRDC L)
  (OPIN 16 MWTC L)
  (OPIN 17 CLEAR-READY H)

  (IPIN 18 BG L)
  (IPIN  1 IOR L)
  (IPIN  2 IOW L)
  (IPIN  3 IO-SPACE H)
  (IPIN  4 MEMR L)
  (IPIN  5 MEMW L)
  (IPIN  6 T200 H)
  (IPIN  7 T50 H)
  (IPIN  8 BUS-IOWC H)
  (IPIN  9 BUS-IORC H)
  (IPIN 11 RQ L)

  (SETQ WRITE-REG (AND BUS-IOWC RQ (NOT T200)))
  (SETQ READ-REG (AND BUS-IORC RQ T50))

  (SETQ IORC (AND BG IO-SPACE MEMR))
  (SETQ IOWC (AND BG IO-SPACE MEMW))
  (SETQ MRDC (AND BG (NOT IO-SPACE) MEMR))
  (SETQ MWTC (AND BG (NOT IO-SPACE) MEMW))

  (SETQ CLEAR-READY (AND BG (OR MEMR IOR))))
```

SCRC:<LFEP>SERIAB.PAL;2

```
;;; -*- Mode: LISP;  Base: 10;  Package: USER -*-

(DEFPAL SERIAB PAL16L8
  (OPIN 12 TX-CLK-0 H)
  (OPIN 19 RX-CLK-0 H)
  (OPIN 13 TX-CLK-2 H)
  (OPIN 14 RX-CLK-2 H)
  (OPIN 18 BAUD-WR H)

  (IPIN  1 WRITE-T250 L)
  (IPIN  2 BAUD-RQ L)
  (IPIN  3 GEN-BAUD-2 H)
  (IPIN  4 EXT-RX-CLK-2 H)
  (IPIN  5 EXT-TX-CLK-2 H)
  (IPIN  6 CLK-SEL-2 H)
  (IPIN  7 GEN-BAUD-0 H)
  (IPIN  8 EXT-RX-CLK-0 H)
  (IPIN  9 EXT-TX-CLK-0 H)
  (IPIN 11 CLK-SEL-0 H)

  (SETQ BAUD-WR (AND BAUD-RQ WRITE-T250))

  (SETQ RX-CLK-0 EXT-RX-CLK-0)
  (SETQ TX-CLK-0 EXT-TX-CLK-0)

  (SETQ RX-CLK-2 (COND ((NOT CLK-SEL-0) GEN-BAUD-0)
                       (CLK-SEL-0 EXT-RX-CLK-2)))
  (SETQ TX-CLK-2 (COND ((NOT CLK-SEL-2) GEN-BAUD-2)
                       (CLK-SEL-2 EXT-TX-CLK-2))))
```

SCRC:<LFEP>SERDMA.PAL;8

```
;;; -*- Mode: LISP;  Base: 10;  Package: USER -*-

(DEFPAL SERDMA PAL16L8
  (OPIN 12 SERA-DREQ H)
  (OPIN 19 SERB-DREQ H)
  (OPIN 16 DMA-CYCLE L)
  (OPIN 17 DMA-R/-W H)
  (OPIN 18 DMA-SEL-A/-B H)

  (IPIN 14 SERB-RXRQ H)
  (IPIN 13 SERB-TXRQ H)
  (IPIN  1 SERA-RXRQ H)
  (IPIN  2 SERA-TXRQ H)
  (IPIN  3 DMA-B1 H)
  (IPIN  4 DMA-B0 H)
  (IPIN  5 DMA-A1 H)
  (IPIN  6 DMA-A0 H)
  (IPIN  7 SERB-DACK H)
  (IPIN  8 SERA-DACK H)
  (IPIN  9 IOW L)
  (IPIN 11 IOR L)

  (SETQ SERA-DREQ (COND ((AND (NOT DMA-A1) (NOT DMA-A0)) SERA-TXRQ)
                        ((AND (NOT DMA-A1) DMA-A0) SERA-RXRQ)
                        ((AND DMA-A1 (NOT DMA-A0)) SERB-TXRQ)
                        ((AND DMA-A1 DMA-A0) SERB-RXRQ)))
  (SETQ SERB-DREQ (COND ((AND (NOT DMA-B1) (NOT DMA-B0)) SERA-TXRQ)
                        ((AND (NOT DMA-B1) DMA-B0) SERA-RXRQ)
                        ((AND DMA-B1 (NOT DMA-B0)) SERB-TXRQ)
                        ((AND DMA-B1 DMA-B0) SERB-RXRQ)))

  (SETQ DMA-CYCLE (AND (OR SERA-DACK SERB-DACK) (OR IOW IOR)))
  (SETQ DMA-R/-W IOR)
  (SETQ DMA-SEL-A/-B (OR (AND SERA-DACK (NOT DMA-A1))
                         (AND SERB-DACK (NOT DMA-B1)))))
```

SCRC:<LFEP>SERCTL.PAL;4

```
;;; -*- Mode: LISP;  Base: 10;  Package: USER -*-

(DEFPAL SERCTL PAL16L8
  (OPIN 17 DRIVE-BUS H)
  (OPIN 16 SERIAL-A1 H)
  (OPIN 15 SERIAL-A0 H)
  (OPIN 14 B-CS L)
  (OPIN 13 A-CS L)
  (OPIN 19 WR L)
  (OPIN 12 RD L)

  (IPIN  1 T300 H)
  (IPIN  2 DMA-SEL-A/-B H)
  (IPIN  3 DMA-R/-W H)
  (IPIN  4 DMA-CYCLE L)
```

```
    (IPIN  5 IOWC H)
    (IPIN  6 IORC H)
    (IPIN  7 SERIAL-RQ L)
    (IPIN  8 A2 H)
    (IPIN  9 A1 H)
    (IPIN 11 A0 H)

    (SETQ RD (OR (AND SERIAL-RQ IORC)
                 (AND DMA-CYCLE DMA-R/-W)))
    (SETQ WR (OR (AND SERIAL-RQ IOWC (NOT T300))
                 (AND DMA-CYCLE (NOT DMA-R/-W))))
    (SETQ DRIVE-BUS RD)

    (SETQ A-CS (OR (AND SERIAL-RQ (NOT A2))
                   (AND DMA-CYCLE DMA-SEL-A/-B)))
    (SETQ B-CS (OR (AND SERIAL-RQ A2)
                   (AND DMA-CYCLE (NOT DMA-SEL-A/-B))))

    (SETQ SERIAL-A0 (OR (AND SERIAL-RQ A0)
                        (AND DMA-CYCLE NIL)))
    (SETQ SERIAL-A1 (OR (AND SERIAL-RQ A1)
                        (AND DMA-CYCLE NIL))))
```

SCRC:<LFEP>REQSEL.PAL;28

```
;;; -*- Mode: LISP;  Base: 10;  Package: USER -*-

(DEFPAL REQSEL PAL16L8
  (OPIN 12 LOW-BYTE L)
  (OPIN 19 HIGH-BYTE L)
  (OPIN 18 ROM-RQ L)
  (OPIN 17 RAM-RQ L)
  (OPIN 16 LDMA-RQ L)
  (OPIN 15 HIGH-TO-LOW-BYTE L)
  (OPIN 14 LOW-TO-HIGH-BYTE L)

  (IPIN 13 MWTC H)
  (IPIN  1 IOWC H)
  (IPIN  2 MRDC H)
  (IPIN  3 IORC H)
  (IPIN  4 BUS-MASTER L)
  (IPIN  5 BHEN H)
  (IPIN  6 A19 H)
  (IPIN  7 A18 H)
  (IPIN  8 A17 H)
  (IPIN  9 A16 H)
  (IPIN 11 A0 H)

  (FIELD 64K-NUMBER A19 A18 A17)

  (SETQ LOW-BYTE (OR BHEN (NOT A0)))
  (SETQ HIGH-BYTE (OR BHEN A0))

  (SETQ HIGH-TO-LOW-BYTE (OR (AND BUS-MASTER (NOT BHEN) (NOT A0)
                                  (OR MWTC IOWC))
                             (AND (OR (AND (FIELD 64K-NUMBER 0) (NOT A16))
                                      (FIELD 64K-NUMBER 1)
                                      (FIELD 64K-NUMBER 2)
                                      (FIELD 64K-NUMBER 3))
                                  (NOT BHEN) A0 MRDC)))
  (SETQ LOW-TO-HIGH-BYTE (OR (AND BUS-MASTER (NOT BHEN) (NOT A0)
                                  (OR MRDC IORC))
                             (AND (OR (AND (FIELD 64K-NUMBER 0) (NOT A16))
                                      (FIELD 64K-NUMBER 1)
                                      (FIELD 64K-NUMBER 2)
                                      (FIELD 64K-NUMBER 3))
                                  (NOT BHEN) A0 MWTC)))
  (SETQ ROM-RQ (AND (FIELD 64K-NUMBER 0) (NOT A16) MRDC))
  (SETQ RAM-RQ (AND (FIELD 64K-NUMBER 1) (OR MRDC MWTC)))
  (SETQ LDMA-RQ (AND (OR (FIELD 64K-NUMBER 2) (FIELD 64K-NUMBER 3))
                     (OR MRDC MWTC))))
```

SCRC:<LFEP>PROCA.PAL;8

```
;-*- Mode:LISP; Package:USER; Base:10 -*-

;;; Multibus Arbitrator Microcode

(COMMENT
;;; Timing based upon 16mhz clock
((ext-rq udma-rq bus-grant bus-free state) next-state ...)

;;; Loop here granting the 68000, waiting for another request
((0 0 x x 0) 0 fep-grant)
;;; Here's a udma rq.  Ask for the bus from the 68000
((x 1 0 x 0) 0 fep-grant bus-rq)
;;; Got the bus from the 68000, wait for the current bus cycle to complete
((x 1 1 0 0) 0 fep-grant bus-rq)
;;; It completed, ack the 68000 grant, and grant udma
((x 1 1 1 0) 1 udma-grant bus-rq bus-grant-ack)
```

```
;;; Wait while the udma uses the bus
((x x x 0 1) 1 udma-grant bus-grant-ack)
;;; The bus has become free, wait until the udma gives up its request
((x 1 x 1 1) 1 udma-grant bus-grant-ack)
;;; If ext is requesting, then grant it
((1 0 x 1 1) 2 ext-grant bus-grant-ack)
;;; Otherwise, let the 68000 run some more
((0 0 x 1 1) 0 fep-grant)

;;; Here's an ext rq.  Ask for the bus from the 68000
((1 0 0 x 0) 0 fep-grant bus-rq)
;;; Got the bus from the 68000, wait for the current bus cycle to complete
((1 0 1 0 0) 0 fep-grant bus-rq)
;;; It completed, ack the 68000 grant, and grant ext
((1 0 1 1 0) 2 ext-grant bus-rq bus-grant-ack)
;;; Wait while ext uses the bus
((x x x 0 2) 2 ext-grant bus-grant-ack)
;;; The bus has become free, wait until the ext gives up its request
((1 x x 1 2) 2 ext-grant bus-grant-ack)
;;; If udma is requesting, then grant it
((0 1 x 1 2) 1 udma-grant bus-grant-ack)
;;; Otherwise, let the 68000 run some more
((0 0 x 1 2) 0 fep-grant)
) ;End COMMENT

;;; Logic equations for PAL compiler

(defpal PROCA PAL16R8
  ;; Inputs
  (IPIN 9 BUS-GRANT L)
  (IPIN 6 BUS-FREE H)
  (IPIN 4 EXT-BR L)
  (IPIN 2 UDMA-BR H)

  (RPIN 12 STATE-0 L)
  (RPIN 13 STATE-1 L)
  (RPIN 14 STATE-2 L)
  (RPIN 15 BGACK L)
  (RPIN 16 BR L)
  (RPIN 17 FEP-BG L)
  (RPIN 18 EXT-BG L)
  (RPIN 19 UDMA-BG L)

  (FIELD STATE STATE-2 STATE-1 STATE-0)

  (SETQ UDMA-BG (OR (AND UDMA-BR BUS-GRANT BUS-FREE (FIELD STATE 0))
                    (AND (NOT BUS-FREE) (FIELD STATE 1))
                    (AND UDMA-BR BUS-FREE (FIELD STATE 1))
                    (AND (NOT EXT-BR) UDMA-BR BUS-FREE (FIELD STATE 2))))
  (SETQ EXT-BG (OR (AND EXT-BR (NOT UDMA-BR) BUS-FREE (FIELD STATE 1))
                   (AND EXT-BR (NOT UDMA-BR) BUS-GRANT BUS-FREE (FIELD STATE 0))
                   (AND (NOT BUS-FREE) (FIELD STATE 2))
                   (AND EXT-BR BUS-FREE (FIELD STATE 2))))
  (SETQ FEP-BG (OR (AND (NOT EXT-BR) (NOT UDMA-BR) (FIELD STATE 0))
                   (AND UDMA-BR (NOT BUS-GRANT) (FIELD STATE 0))
                   (AND UDMA-BR BUS-GRANT (NOT BUS-FREE) (FIELD STATE 0))
                   (AND (NOT EXT-BR) (NOT UDMA-BR) BUS-FREE (FIELD STATE 1))
                   (AND EXT-BR (NOT UDMA-BR) (NOT BUS-GRANT) (FIELD STATE 0))
                   (AND EXT-BR (NOT UDMA-BR) BUS-GRANT (NOT BUS-FREE) (FIELD STATE 0))
                   (AND (NOT EXT-BR) (NOT UDMA-BR) BUS-FREE (FIELD STATE 2))))
  (SETQ BR (OR (AND UDMA-BR (NOT BUS-GRANT) (FIELD STATE 0))
               (AND UDMA-BR BUS-GRANT (NOT BUS-FREE) (FIELD STATE 0))
               (AND UDMA-BR BUS-GRANT BUS-FREE (FIELD STATE 0))
               (AND EXT-BR (NOT UDMA-BR) (NOT BUS-GRANT) (FIELD STATE 0))
               (AND EXT-BR (NOT UDMA-BR) BUS-GRANT (NOT BUS-FREE) (FIELD STATE 0))
               (AND EXT-BR (NOT UDMA-BR) BUS-GRANT BUS-FREE (FIELD STATE 0))))
  (SETQ BGACK (OR (AND UDMA-BR BUS-GRANT BUS-FREE (FIELD STATE 0))
                  (AND (NOT BUS-FREE) (FIELD STATE 1))
                  (AND UDMA-BR BUS-FREE (FIELD STATE 1))
                  (AND EXT-BR (NOT UDMA-BR) BUS-FREE (FIELD STATE 1))
                  (AND EXT-BR (NOT UDMA-BR) BUS-GRANT BUS-FREE (FIELD STATE 0))
                  (AND (NOT BUS-FREE) (FIELD STATE 2))
                  (AND EXT-BR BUS-FREE (FIELD STATE 2))
                  (AND (NOT EXT-BR) UDMA-BR BUS-FREE (FIELD STATE 2))))
  (SETQ STATE-0 (OR (AND UDMA-BR BUS-GRANT BUS-FREE (FIELD STATE 0))
                    (AND (NOT BUS-FREE) (FIELD STATE 1))
                    (AND UDMA-BR BUS-FREE (FIELD STATE 1))
                    (AND (NOT EXT-BR) UDMA-BR BUS-FREE (FIELD STATE 2))))
  (SETQ STATE-1 (OR (AND EXT-BR (NOT UDMA-BR) BUS-FREE (FIELD STATE 1))
                    (AND EXT-BR (NOT UDMA-BR) BUS-GRANT BUS-FREE (FIELD STATE 0))
                    (AND (NOT BUS-FREE) (FIELD STATE 2))
                    (AND EXT-BR BUS-FREE (FIELD STATE 2))))
  (SETQ STATE-2 NIL))
```

SCRC:<LFEP>PROC.PAL;4

```
;-*- Mode:LISP; Package:USER; Base:10 -*-

(defpal PROC PAL16L8
  (IPIN 11 LDS L)
  (IPIN  9 UDS L)
```

```
(IPIN  8 AS L)
(IPIN  7 FC0 H)
(IPIN  6 FC1 H)
(IPIN  5 FC2 H)
(IPIN  4 WRITE L)
(IPIN  3 IO-SPACE L)

(OPIN 12 ODD-BYTE H)
(OPIN 19 BHEN H)
(OPIN 13 AUTOVECTOR L)
(OPIN 14 IOWC L)
(OPIN 15 IORC L)
(OPIN 16 MWTC L)
(OPIN 17 MRDC L)
(OPIN 18 ANY-RQ L)

;; Byte and word control signals
(SETQ ODD-BYTE (AND (NOT UDS) LDS))
(SETQ BHEN (AND UDS LDS))
;; Cause interrupts to vector automatically depending upon priority level
(SETQ AUTOVECTOR (AND FC2 FC1 FC0 AS))
;; Decode the four kinds of bus commands
(SETQ IOWC (AND WRITE IO-SPACE AS (OR UDS LDS) (NOT AUTOVECTOR)))
(SETQ IORC (AND (NOT WRITE) IO-SPACE AS (OR UDS LDS) (NOT AUTOVECTOR)))
(SETQ MWTC (AND WRITE (NOT IO-SPACE) AS (OR UDS LDS) (NOT AUTOVECTOR)))
(SETQ MRDC (AND (NOT WRITE) (NOT IO-SPACE) AS (OR UDS LDS) (NOT AUTOVECTOR)))
;; Any request from the 68000
(SETQ ANY-RQ (AND AS (OR UDS LDS) (NOT AUTOVECTOR))))
```

SCRC:<LFEP>PAGTAG.PAL;5

```
; -*- Mode:Lisp; Package:User; Base:10 -*-

; PAL for physical page tag memory

(DEFPAL PAGTAG PAL16L8
  ;; Latched readout of page tag memory
  (IPIN 1 PTOL-2)                        ;Even parity
  (IPIN 2 PTOL-1)                        ;Page modified
  (IPIN 3 PTOL-0)                        ;not GC tag
  ;; Command inputs for automatic operation
  (IPIN 4 WRITE-ACTIVE L)
  (IPIN 5 DP-SET-GC-TAG L)
  (IPIN 13 NORMAL-ACTIVE L)
  ;; Command inputs for microcode-directed operation
  (IPIN 8 LBUS-DEV-4)
  (IPIN 9 LBUS-DEV-3)
  (IPIN 11 WRITE-PAGE-TAG L)
  ;; Bank-select bits
  (IPIN 6 PT-PAGE-15)
  (IPIN 7 PT-PAGE-0)

  ;; Outputs to be written into page tag memory (parity computed externally)
  (OPIN 19 PTI-1)
  (OPIN 12 PTI-0)
  ;; Bank-select outputs
  (OPIN 15 PAGE-TAG-EN-1 L)
  (OPIN 16 PAGE-TAG-EN-0 L)
  ;; Outputs to rest of machine
  (OPIN 17 PAGE-TAG-COND)                ;Can be driven to LBUS DEV COND L
  (OPIN 18 PAGE-TAG-PAR-ERR L)           ;Parity error: stop machine

  ;pin 14 is a spare

  ;; Bank selection
  (SETQ PAGE-TAG-EN-0 (AND (NOT PT-PAGE-0) (NOT PT-PAGE-15)))
  (SETQ PAGE-TAG-EN-1 (AND PT-PAGE-0 (NOT PT-PAGE-15)))

  ;; Parity checking
  (SETQ PAGE-TAG-PAR-ERR (AND (NOT PT-PAGE-15)
                              (FIELD PTOL-2 PTOL-1 PTOL-0 (1 2 4 7))))

  ;; Testing of addressed bit (garbage if PT-PAGE-15 is 1)
  (SETQ PAGE-TAG-COND (COND ((FIELD LBUS-DEV-4 LBUS-DEV-3 0) (NOT PTOL-0))
                            ((FIELD LBUS-DEV-4 LBUS-DEV-3 1) PTOL-1)
                            ((FIELD LBUS-DEV-4 LBUS-DEV-3 2) PTOL-2)
                            ((FIELD LBUS-DEV-4 LBUS-DEV-3 3) NIL)))

  (SETQ WRITE-GC-TAG (AND WRITE-PAGE-TAG (NOT LBUS-DEV-4)))
  (SETQ WRITE-REF-TAG (AND WRITE-PAGE-TAG LBUS-DEV-4))

  ;; Writing of page referenced bit
  (SETQ PTI-1 (OR (AND WRITE-REF-TAG LBUS-DEV-3)        ;Microcode sets or clears
                  (AND (NOT WRITE-REF-TAG) PTOL-1)      ;Hold otherwise
                  (AND (NOT WRITE-REF-TAG)              ;Set if page referenced
                       NORMAL-ACTIVE)))

  ;; Writing of GC tag bit (stored complemented due to PAL limitations)
  (SETQ PTI-0 (NOT (OR (AND WRITE-GC-TAG LBUS-DEV-3)    ;Microcode sets or clears
                       (AND (NOT WRITE-GC-TAG) (NOT PTOL-0))    ;Hold otherwise
```

```
                  (AND (NOT WRITE-GC-TAG)          ;Set if page written
                       WRITE-ACTIVE                ; and value written is a
                       DP-SET-GC-TAG               ; pointer to temporary space
                       NORMAL-ACTIVE)))))
```

SCRC:<LFEP>LBPAR.PAL;9

```
;;; -*- Mode:LISP; Package:USER; Base:10 -*-

;;; Parity generate, ram enables

(DEFPAL LBPAR PAL16L8
  (IPIN 15 HB-BUS H)
  (IPIN 16 LB-BUS H)
  (IPIN 11 HB-PAR-ODD H)
  (IPIN  9 LB-PAR-ODD H)
  (IPIN  8 U-WE L)
  (IPIN  7 U-CE L)
  (IPIN  6 NEED-LBUS L)
  (IPIN  5 A0 H)
  (IPIN  4 BHEN H)
  (IPIN  3 U-MB-CE H)

  (OPIN 12 HB-CE L)
  (OPIN 19 LB-CE L)
  (OPIN 13 HB-WE-ENB L)
  (OPIN 14 LB-WE-ENB L)
  (OPIN 15 HB-BUS-OUT H)
  (OPIN 16 LB-BUS-OUT H)
  (OPIN 17 HB-PAR H)
  (OE   17 HB-PAR-ENB)
  (OPIN 18 LB-PAR H)
  (OE   18 LB-PAR-ENB)

  (SETQ HB-BUS-OUT (OR BHEN A0))
  (SETQ LB-BUS-OUT (OR BHEN (NOT A0)))

  ;;; Parity generation and enables
  (SETQ HB-PAR-ENB U-WE)
  (SETQ LB-PAR-ENB U-WE)
  (SETQ HB-PAR (NOT HB-PAR-ODD))
  (SETQ LB-PAR (NOT LB-PAR-ODD))

  ;;; Enables
  (SETQ HB-WE-ENB (AND U-WE (OR NEED-LBUS HB-BUS)))
  (SETQ LB-WE-ENB (AND U-WE (OR NEED-LBUS LB-BUS)))

  (SETQ HB-CE (COND (U-MB-CE (NOT HB-BUS))
                    ((NOT U-MB-CE) (AND U-CE (OR NEED-LBUS HB-BUS)))))
  (SETQ LB-CE (COND (U-MB-CE (NOT LB-BUS))
                    ((NOT U-MB-CE) (AND U-CE (OR NEED-LBUS LB-BUS)))))
  )
```

SCRC:<LFEP>LBBD.PAL;6

```
;;; -*- Mode:LISP; Package:USER; Base:10 -*-

;;; Buf to bus control, parity enables

(DEFPAL LBBD PAL16L8
  (IPIN 11 A0 H)
  (IPIN  9 BHEN H)
  (IPIN  8 BUS-TO-RAM H)
  (IPIN  7 NEED-LBUS L)
  (IPIN  6 MRDC H)
  (IPIN  5 ANY-RQ-RAW H)
  (IPIN  4 IORC H)
; (IPIN  3 BOARD-ID-RQ L)                        ;Unused -- should be NC
  (IPIN  2 MB-CONTROLLED-CE H)

  (OPIN 12 HB-XCVR-OE L)
  (OPIN 19 LB-XCVR-OE L)
  (OPIN 15 XCVR-READ H)
  (OPIN 16 PAR-HB-ENB H)
  (OPIN 17 PAR-LB-ENB H)

  ;; Parity controls
  ;; Though this enables spuriously when writing into the rams during a NEED-LBUS
  ;; type read cycle, it doesn't matter, since the registers aren't getting clocked.
  ;; Not checking in the BUS-TO-RAM case fixes the problem where you clock the registers
  ;; during a NEED-LBUS write cycle to get the low order 8 or 16 bits.
  (SETQ PAR-HB-ENB (OR (AND XCVR-READ (OR BHEN A0))
                       (AND NEED-LBUS (NOT MB-CONTROLLED-CE))
                       (AND MB-CONTROLLED-CE (NOT (OR BHEN A0)))))
  (SETQ PAR-LB-ENB (OR (AND XCVR-READ (OR BHEN (NOT A0)))
                       (AND NEED-LBUS (NOT MB-CONTROLLED-CE))
                       (AND MB-CONTROLLED-CE (NOT (OR BHEN (NOT A0))))))
```

```
;; Bus transceiver control
(SETQ XCVR-READ MRDC)
(SETQ HB-XCVR-OE (AND ANY-RQ-RAW (OR BHEN A0)
                      (OR (AND (NOT XCVR-READ) BUS-TO-RAM)
                          XCVR-READ)))
(SETQ LB-XCVR-OE (AND ANY-RQ-RAW (OR BHEN (NOT A0))
                      (OR (AND (NOT XCVR-READ) BUS-TO-RAM)
                          XCVR-READ))))
```

SCRC:<LFEP>LBARB.PAL;1

```
;-*- Mode:LISP; Package:USER; Base:10 -*-

;Lbus arbitrator and cycle control PAL for FEP

(DEFPAL LBARB PAL16L8
  (IPIN 11 REFRESH-RQ L)
  (IPIN  9 FEP-LBUS-RQ L)
  (IPIN  8 BUS-MWTC)
  (IPIN  7 ANY-ACTIVE L)
  (IPIN  6 FEP-LBUS-ACTIVE L)
  (IPIN  5 FEP-LBUS-DATA-CYC L)
  (IPIN  4 FEP-LBUS-ID-REQ L)
  (IPIN  3 FEP-LBUS-ECC-DIAG)

  (OPIN 12 FEP-LBUS-REFRESH L)
  (OPIN 19 FEP-LBUS-GRANT L)
  (OPIN 13 FEP-LBUS-WRITE L)
  (OPIN 14 FEP-LBUS-DRIVE-ECC L)
  (OPIN 15 FEP-LBUS-DRIVE-DATA L)
  (OPIN 16 FEP-LBUS-LATCH-OPEN)
  (OPIN 17 FEP-LBUS-DRIVE-ADR L)
  (OPIN 18 FEP-LBUS-DRIVE-ADR-AND-ID L)

  ;; FEP and Refresh request arbitration
  ;; Refresh has highest priority, FEP has second-highest, Proc & IFU lowest
  (SETQ FEP-LBUS-REFRESH (AND REFRESH-RQ (NOT ANY-ACTIVE)))
  (SETQ FEP-LBUS-GRANT (AND FEP-LBUS-RQ (NOT REFRESH-RQ) (NOT ANY-ACTIVE)))
  (SETQ READ (NOT BUS-MWTC))
  (SETQ WRITE BUS-MWTC)
  (SETQ FEP-LBUS-WRITE (AND FEP-LBUS-GRANT WRITE))

  ;; FEP Lbus address/data transceiver control
  ;; Drive the Lbus data lines during active write cycle
  (SETQ FEP-LBUS-DRIVE-DATA (AND FEP-LBUS-ACTIVE WRITE))
  (SETQ FEP-LBUS-DRIVE-ECC (AND FEP-LBUS-DRIVE-DATA FEP-LBUS-ECC-DIAG))

  ;; Hold data latch open while doing ID requests, and also during data cycle of a read
  (SETQ FEP-LBUS-LATCH-OPEN (OR FEP-LBUS-ID-REQ
                                (AND FEP-LBUS-DATA-CYC READ)))
  ;; Drive address when grant cycle, and also ID part of address when id requesting
  (SETQ FEP-LBUS-DRIVE-ADR FEP-LBUS-GRANT)
  (SETQ FEP-LBUS-DRIVE-ADR-AND-ID (OR FEP-LBUS-ID-REQ FEP-LBUS-GRANT)))
```

SCRC:<LFEP>LBAAR.PAL;4

```
;;; -*- Mode:LISP; Package:USER; Base:10 -*-

(DEFPAL LBAAR PAL16L8
  (IPIN 11 A0 H)
  (IPIN  9 A1 H)
  (IPIN  8 A2 H)
  (IPIN  7 U-SEL-A0 H)
  (IPIN  6 U-SEL-A1 H)
  (IPIN  5 BHEN H)
  (IPIN  4 U-RUN-LBUS H)
; (IPIN  3 BOARD-ID-RQ L)                      ;Unused -- should be NC
  (IPIN  2 MWTC H)
  (IPIN  1 ANY-RQ-SYNC H)
  (IPIN 14 NEED-LBUS L)
  (IPIN 16 LDMA-RQ L)
  (IPIN 17 BUF-SEL H)
; (IPIN 18 LBUS-ID L)                          ;Unused -- should be NC

  (OPIN 12 BUF-A0 H)
  (OPIN 19 BUF-A1 H)
  (OPIN 14 NEED-LBUS-OUT L)
  (OPIN 15 ANY-RQ-RAW H)

  (SETQ NEED-LBUS-OUT (OR U-RUN-LBUS
                          (AND (NOT BUF-SEL) LDMA-RQ MWTC A1 (OR BHEN A0))
                          (AND (NOT BUF-SEL) LDMA-RQ (NOT MWTC) (NOT A1) (OR BHEN (NOT A0)))))
```

```
;; When needing the LBUS, low two adr bits come from ucode
;; When not needing the LBUS, low adr bit comes from A1 on Multibus, and
;; next adr bit comes from A2 if hacking the buffer directly, or is forced
;;  to one if in "LBUS space", so that the low order bit selects between the low
;;  and medium words
(SETQ BUF-A0 (OR (AND NEED-LBUS U-SEL-A0)
                 (AND (NOT NEED-LBUS) A1)))
(SETQ BUF-A1 (OR (AND NEED-LBUS U-SEL-A1)
                 (AND BUF-SEL (NOT NEED-LBUS) A2)
                 (AND (NOT BUF-SEL) (NOT NEED-LBUS))))

(SETQ ANY-RQ-RAW (AND ANY-RQ-SYNC LDMA-RQ)))

;-*- Mode:LISP; Package:USER; Base:10 -*-

;;; Addresses:  control (360), data (362), pointer (364)
(defpal HSRQ PAL16L8
  (IPIN 11 A1 H)
  (IPIN  9 A2 H)
  (IPIN  8 IOWC H)
  (IPIN  7 BUF-RQ L)
  (IPIN  6 T50 H)
  (IPIN  5 DMA-SYNC^ L)
  (IPIN  4 WRITE-TO-DEV H)
  (IPIN  3 T200 H)
  (IPIN  2 BUF-ACK-WRITE H)

  (OPIN 12 DO-WRITE^ L)
  (OPIN 19 OUT-ENB L)
  (OPIN 13 WRITE-ADR L)
  (OPIN 14 READ-ADR L)
  (OPIN 15 WRITE-CTL L)
  (OPIN 16 READ-CTL L)
  (OPIN 17 DATA-RQ L)
  (OPIN 18 ACK L)

  ;; Start buffer memory write if either reading from the device and got a sync pulse,
  ;; or if the processor does a write cycle to the buffer
  (SETQ DO-WRITE^ (OR (AND (NOT WRITE-TO-DEV) DMA-SYNC^)
                      (AND (NOT A2) A1 BUF-RQ (NOT T50) IOWC)))
  ;; Enable buffer RAMs to drive if writing to the device and no processor request,
  ;; or a processor read request
  (SETQ OUT-ENB (OR (AND WRITE-TO-DEV (NOT BUF-RQ))
                    (AND BUF-RQ (NOT IOWC))))
  ;; Address and cycle-type decoding
  (SETQ WRITE-ADR (AND BUF-RQ IOWC A2 (NOT A1)))
  (SETQ READ-ADR (AND BUF-RQ (NOT IOWC) A2 (NOT A1)))
  (SETQ WRITE-CTL (AND BUF-RQ IOWC (NOT A2) (NOT A1)))
  (SETQ READ-CTL (AND BUF-RQ (NOT IOWC) (NOT A2) (NOT A1)))
  (SETQ DATA-RQ (AND BUF-RQ (NOT A2) A1))
  ;; Ack processor request
  (SETQ ACK (OR ;; Ack for pointer cycles
                (AND BUF-RQ A2 (NOT A1) T200)
                ;; Ack for control cycles
                (AND BUF-RQ (NOT A2) (NOT A1) T200)
                ;; Ack for data read cycles
                (AND BUF-RQ (NOT A2) A1 (NOT IOWC) T200)
                ;; Ack for data write cycles
                (AND BUF-RQ (NOT A2) A1 IOWC BUF-ACK-WRITE))))
```

SCRC:<LFEP>HSADR.PAL;9

```
;;; -*- Mode: LISP; Package: USER; Base: 10 -*-

;;; PAL for control of high speed buffer address

(defpal HSADR PAL16R4
  ;; Inputs
  (IPIN  9 WRITE-T50 L)
  (IPIN  8 BUS-DATA-RQ L)
  (IPIN  7 SPY-DMA-SYNC L)
  (IPIN  6 WRITE-ADR L)
  (IPIN  5 COUNT-UP H)
  (IPIN  4 SPY-DMA-ENB H)
  (IPIN  3 BUS-READ H)
  (IPIN  2 BUS-D0 H)

  ;; Outputs
  (OPIN 19 ENB-HIGH-BITS-COUNT L)
  (OPIN 18 ADR-CLK L)
  (OPIN 13 SPY-DMA-ENB-LB L)
  (OPIN 12 SPY-DMA-ENB-HB L)

  (RPIN 17 BUF-A0 H)
```

```
(SETQ ENB-HIGH-BITS-COUNT (OR BUS-DATA-RQ
                             (AND COUNT-UP BUF-A0)
                             (AND (NOT COUNT-UP) (NOT BUF-A0))))
(SETQ ADR-CLK (OR (AND SPY-DMA-ENB SPY-DMA-SYNC)
                  ;; When writing from bus, clock adr then do write
                  (AND BUS-DATA-RQ WRITE-T50)
                  ;; When reading to bus, don't clock adr until end of cycle
                  (AND BUS-DATA-RQ BUS-READ)
                  (AND WRITE-ADR WRITE-T50)))
(SETQ BUF-A0 (OR (AND (NOT WRITE-ADR) (NOT BUF-A0))
                 (AND WRITE-ADR BUS-D0)))
(SETQ SPY-DMA-ENB-LB (AND (NOT BUF-A0) SPY-DMA-ENB))
(SETQ SPY-DMA-ENB-HB (AND BUF-A0 SPY-DMA-ENB)))
```

SCRC:<LFEP>DYNMEM.PAL;15

```
;-*- Mode:LISP; Package:USER; Base:10 -*-

;;; Dynamic memory control microcode

;;; Timing based upon 16mhz clock

;;; ((state refresh-rq (and mem-rq any-rq-sync) refresh) nstate ...)
;((0 0 0 0) RasAdr)

;;; Here when a normal memory request received
;((0 x 1 0) 1 Ras RasAdr)        ;Address is already there
;((1 x 1 0) 2 Ras)               ;Setup CAS part of address
;((2 x 1 0) 3 Ras Cas)           ;Now CAS it
;((3 x 1 0) 5 Ras Cas)
;((5 x 1 0) 5 Ras Cas Ack)       ;Address is ignored, ack data
;((5 x 0 0) 7)
;((7 x x x) 0 RasAdr)

;;; This is refresh cycle (same timing as normal cycle, for PAL)
;((0 1 0 1) 1 Refresh)           ;One cycle for address setup
;((1 1 x 1) 2 Ras Refresh)
;((2 1 x 1) 3 Ras Refresh)
;((3 1 x 1) 4 Ras Refresh)
;((4 x x 1) 6 Ras Refresh)
;((6 x x 1) 7)
;((7 x x x) 0 RasAdr)

;;; Logic equations for PAL compiler

(defpal DYNMEM PAL16R8
  ;; Inputs -- refresh request, memory request, and the synchronizer signal used
  ;; to gate memory request
  (IPIN 9 REFRESH-RQ H)
  (IPIN 8 MEM-RQ L)
  (IPIN 7 ANY-RQ-SYNC H)
  ;; Use all registered outputs
  (RPIN 12 STATE-0 L)
  (RPIN 13 STATE-1 L)
  (RPIN 14 STATE-2 L)
  (RPIN 15 CAS L)
  (RPIN 16 RAS L)
  (RPIN 17 RASADR L)
  (RPIN 18 REFRESH L)
  (RPIN 19 ACK H)

  (FIELD STATE STATE-2 STATE-1 STATE-0)

  ;; Refresh turns on or off at state 0, turns off at state 6, else remains the same
  ;; Normal cycles have priority over refresh cycles
  (SETQ REFRESH (OR (AND (FIELD STATE 0) REFRESH-RQ (NOT (AND MEM-RQ ANY-RQ-SYNC)))
                    (AND (NOT (FIELD STATE 0)) (NOT (FIELD STATE 6)) REFRESH)))

  ;; RAS is never on in states 6 or 7
  ;; RAS comes on in state 0 if a normal cycle is starting
  (SETQ RAS (AND (NOT (AND STATE-1 STATE-2))
                 (OR (NOT (FIELD STATE 0))
                     (AND (FIELD STATE 0) (AND MEM-RQ ANY-RQ-SYNC)))))

  ;; CAS in certain states during normal cycle,
  ;; and hold CAS in state 5 until request goes away
  (SETQ CAS (AND (NOT REFRESH)
                 (OR (FIELD STATE 2)
                     (FIELD STATE 3)
                     (AND (FIELD STATE 5) (AND MEM-RQ ANY-RQ-SYNC)))))

  ;; ACK in state 5 until memory request goes away
  (SETQ ACK (AND (AND MEM-RQ ANY-RQ-SYNC) (NOT REFRESH) (FIELD STATE 5)))

  ;; RASADR off in states 2, 3, and 5 during normal memory cycle, and off during REFRESH
  (SETQ RASADR (AND (NOT NEXT-REFRESH)
                    (NOT (FIELD STATE 1)) (NOT (FIELD STATE 2))
                    (NOT (FIELD STATE 3)) (NOT (FIELD STATE 5))))
```

```
;; Low order bit of state
(SETQ STATE-0 (OR (AND (FIELD STATE 0) (AND MEM-RQ ANY-RQ-SYNC))
                  (AND (FIELD STATE 2) (NOT REFRESH))
                  (AND (FIELD STATE 3) (NOT REFRESH))
                  (AND (FIELD STATE 5) (NOT REFRESH))
                  (AND (FIELD STATE 0) REFRESH-RQ (NOT (AND MEM-RQ ANY-RQ-SYNC)))
                  (AND (FIELD STATE 2) REFRESH)
                  (AND (FIELD STATE 6) REFRESH)))

;; Next bit
(SETQ STATE-1 (OR (AND (FIELD STATE 1) (NOT REFRESH))
                  (AND (FIELD STATE 2) (NOT REFRESH))
                  (AND (FIELD STATE 5) (NOT REFRESH) (NOT (AND MEM-RQ ANY-RQ-SYNC)))
                  (AND (FIELD STATE 1) REFRESH)
                  (AND (FIELD STATE 2) REFRESH)
                  (AND (FIELD STATE 4) REFRESH)
                  (AND (FIELD STATE 6) REFRESH)))

;; High order bit of state

(SETQ STATE-2 (OR (AND (FIELD STATE 3) (NOT REFRESH))
                  (AND (FIELD STATE 5) (NOT REFRESH))
                  (AND (FIELD STATE 3) REFRESH)
                  (AND (FIELD STATE 4) REFRESH)
                  (AND (FIELD STATE 6) REFRESH))))
```

SCRC:<LFEP>DYNCTL.PAL;7

```
;;; -*- Mode: LISP;  Base: 10;  Package: USER -*-

(DEFPAL DYNCTL PAL16L8
  (OPIN 12 PARITY-ERROR L)
  (OPIN 18 ACK H)
  (OPIN 17 WE-LOW L)
  (OPIN 16 WE-HIGH L)
  (OPIN 14 CAS-MPX L)

  (IPIN 11 RAM-PARITY-LOW H)
  (IPIN  9 RAM-PARITY-HIGH H)
  (IPIN  8 BUS-PARITY-LOW H)
  (IPIN  7 BUS-PARITY-HIGH H)
  (IPIN  6 LOW-BYTE L)
  (IPIN  5 HIGH-BYTE L)
  (IPIN  4 MWTC H)
  (IPIN  3 ACK-RQ H)
  (IPIN  2 RQ L)
  (IPIN  1 REFRESH L)
  (IPIN 13 PROC-CYC-RAS L)
  (IPIN 15 MRDC H)

  ;; PROC-CYC-RAS is asserted during the idle time, thus driving the processor
  ;; RAS address most of the time.  When it turns off, and a refresh cycle isn't
  ;; happening, CAS-MPX comes out one PAL-delay time later.  This gives a decent
  ;; amount of time for the RAS address to become non-driven, and also a reasonable
  ;; amount of time for the CAS address to be driven before CAS
  (SETQ CAS-MPX (AND (NOT REFRESH) (NOT PROC-CYC-RAS)))

  (SETQ WE-LOW (AND MWTC LOW-BYTE))
  (SETQ WE-HIGH (AND MWTC HIGH-BYTE))

  (SETQ ACK (AND RQ ACK-RQ
                 (OR MWTC
                     (AND (OR (NOT LOW-BYTE)
                              (AND RAM-PARITY-LOW BUS-PARITY-LOW)
                              (AND (NOT RAM-PARITY-LOW) (NOT BUS-PARITY-LOW)))
                          (OR (NOT HIGH-BYTE)
                              (AND RAM-PARITY-HIGH BUS-PARITY-HIGH)
                              (AND (NOT RAM-PARITY-HIGH) (NOT BUS-PARITY-HIGH)))))))

  (SETQ PARITY-ERROR
        (AND RQ ACK-RQ MRDC
             (NOT (AND (OR (NOT LOW-BYTE)
                           (AND RAM-PARITY-LOW BUS-PARITY-LOW)
                           (AND (NOT RAM-PARITY-LOW) (NOT BUS-PARITY-LOW)))
                       (OR (NOT HIGH-BYTE)
                           (AND RAM-PARITY-HIGH BUS-PARITY-HIGH)
                           (AND (NOT RAM-PARITY-HIGH) (NOT BUS-PARITY-HIGH)))))))
```

SCRC:<LFEP>DEVNUM.PAL:8

```
;-*- Mode:LISP; Package:USER; Base:10 -*-

(defpal DEVNUM PAL16L8
  (IPIN 11 A0 H)
  (IPIN  9 A1 H)
  (IPIN  8 A2 H)
  (IPIN  7 A3 H)
  (IPIN  6 A4 H)
  (IPIN  5 A5 H)
  (IPIN  4 A6 H)
  (IPIN  3 A7 H)
  (IPIN  2 A8 H)
  (IPIN  1 A9 H)
  (IPIN 13 A10 H)
  (IPIN 14 A11 H)
  (IPIN 15 A12 H)

  (OPIN 12 DEV0 L)
  (OPIN 19 DEV1 L)
  (OPIN 17 DEV2 L)
  (OPIN 18 DEV3 L)

  (FIELD HA5 A12 A11 A10 A9 A8)
  (FIELD HA10 A12 A11 A10 A9 A8 A7 A6 A5 A4 A3)

  (SETQ UART (FIELD HA10 #o20))
  (SETQ SPY (AND (FIELD HA5 #o0) (NOT A7) A6))
  (SETQ 8-BIT-REGS (FIELD HA10 #o34))
  (SETQ PADDLE-ID (AND (FIELD HA5 #o0) A7 (NOT A6) A5))
  (SETQ LOCAL-ID (AND (FIELD HA5 #o0) A7 A6 (NOT A5)))
  (SETQ DMA-HIGH-ADR (AND (FIELD HA10 #o21) A2))
  (SETQ DMA-CONT (AND (FIELD HA5 #o0) A7 (NOT A6) (NOT A5) A4))

  (SETQ HS-BUF (FIELD HA10 #o36))
  (SETQ NANOFEP (AND (FIELD HA10 #o37) A2 (NOT A1)))
  (SETQ CART (AND (FIELD HA10 #o37) A2 A1))
  (SETQ LBUS-CTL (AND (FIELD HA10 #o35) (NOT A2) (NOT A1)))
  (SETQ SERIAL-BAUD (AND (FIELD HA10 #o35) A2))
  (SETQ PIO (AND (FIELD HA10 #o37) (NOT A2)))

  ;; Decode low bits of address into device number
  (SETQ DEV0 (OR UART
                 8-BIT-REGS
                 LOCAL-ID
                 DMA-CONT
                 HS-BUF
                 CART
                 SERIAL-BAUD))
  (SETQ DEV1 (OR SPY
                 8-BIT-REGS
                 DMA-HIGH-ADR
                 DMA-CONT
                 NANOFEP
                 CART
                 PIO))
  (SETQ DEV2 (OR PADDLE-ID
                 LOCAL-ID
                 DMA-HIGH-ADR
                 DMA-CONT
                 LBUS-CTL
                 SERIAL-BAUD
                 PIO))
  (SETQ DEV3 (OR HS-BUF
                 NANOFEP
                 CART
                 LBUS-CTL
                 SERIAL-BAUD
                 PIO)))

;;; -*- Mode: LISP; Base: 10; Package: USER -*-

(defpal DEVACK PAL16L8
  (IPIN 11 DEV0 L)
  (IPIN  9 DEV1 L)
  (IPIN  8 DEV2 L)
  (IPIN  7 DEV3 L)
  (IPIN  6 T100 H)
  (IPIN  5 T200 H)
  (IPIN  4 T400 H)
  (IPIN 15 IORC-OR-IOWC H)
  (IPIN 16 ADR-15-13=0 H)
  (IPIN 17 IOWC H)
  (IPIN 18 IORC H)

  (OPIN 12 ANY-DEVICE-RQ L)
  (OPIN 19 8-BIT-ACK L)
  (OPIN 13 16-BIT-ACK L)
  (OPIN 15 IORC-OR-IOWC-OUT H)
```

```
(FIELD DEVNUM DEV3 DEV2 DEV1 DEV0)

;; This may want to be generated faster externally at some point
(SETQ IORC-OR-IOWC-OUT (OR IORC IOWC))

;; Any request with non-zero device number and IO read or write req
(SETQ ANY-DEVICE-RQ (AND (OR DEV0 DEV1 DEV2 DEV3) ADR-15-13=0 IORC-OR-IOWC))

;; Ack timing is just a function of the hardware
(SETQ 8-BIT-ACK (OR (AND (FIELD DEVNUM #o1) T400 IORC-OR-IOWC)
                    (AND (FIELD DEVNUM #o2) T400 IORC-OR-IOWC)
                    (AND (FIELD DEVNUM #o3) T100 IORC-OR-IOWC)
                    (AND (FIELD DEVNUM #o4) T200 IORC)
                    (AND (FIELD DEVNUM #o5) T200 IORC)
                    (AND (FIELD DEVNUM #o6) T400 IORC-OR-IOWC)
                    (AND (FIELD DEVNUM #o7) T400 IORC-OR-IOWC)))
(SETQ 16-BIT-ACK (OR ;(AND (FIELD DEVNUM #o11 IORC-OR-IOWC))  ;Buffer ack external
                     (AND (FIELD DEVNUM #o12) T100 IORC-OR-IOWC)
                     (AND (FIELD DEVNUM #o13) T100 IORC-OR-IOWC)
                     (AND (FIELD DEVNUM #o14) T100 IORC-OR-IOWC)
                     (AND (FIELD DEVNUM #o15) T400 IORC-OR-IOWC)
                     (AND (FIELD DEVNUM #o16) T100 IORC-OR-IOWC))))
```

SCRC:<LFEP>LBBUFC.UCODE;27

```
;;; -*- Mode:LISP; Package:USER; Base:8; Lowercase:T -*-

;;; Three proms, eight bits each (0 is low order, 23. is high order bit), 9 address bits
(proms 8 3 9)

;;; Define data format: mask for complemented outputs, next-state, test, outputs
(data 04007200 0005 (2503 tests) outputs)

;;; Names for outputs.  The values get XOR'ed into the complemented output mask.
(define outputs ((reg-to-ram 230) (idle 400) (buf-ce 1000) (buf-we 2000) (clk-reg 4000)
                 (run-lbus 10000) (mb-controlled-ce 20000) (set-ack 40000) (bus-to-ram 100000)
                 (clear-any-request 4000000)
                 (select-adr 000) (select-high 040) (select-low 100) (select-med 140)))

;;; Format of address specifier: (reset write/-read state test)
(address 0 0701 0601 0105 0031)

;;; The names of the conditions themselves
(define tests ((0 0) (1 1) (dont-need-lbus 2) (any-request 3) (not-no-request 4)
               (lbus-ack 5) (no-parity-error 6) (id-request 7)))

;;; 16mhz clock

;;; ((reset write/-read state cond) next-state condition-select ...)
;;; select-adr   00
;;;       -high  01
;;;       -low   10
;;;       -med   11

;;; reg-to-ram, bus-to-ram, set-ack, mb-controlled-ce, run-lbus, clk-reg,
;;; buf-we, buf-ce, idle, clear-any-request

;;; 0, 1, dont-need-lbus, any-request, not-no-request, lbus-ack, no-parity-error, id-request

;;; any-request can only set while idle is set

;;; Reset
;;; Clear outstanding request, and generate clk-reg, which will cause the parity error
;;; latch to get cleared
((1 x  x x) (00 0 (clear-any-request clk-reg)))

;;; Idle, wait for a request
((0 x 00 0) (00 any-request (idle select-adr)))

;;; Read
((0 0 00 1) (01 dont-need-lbus (buf-ce select-adr clear-any-request)))

;;; Read from the ram (a0 and a1 externally selected)
;;; *** This will latch into some random latch, which is ok, but will also set the
;;;     parity error ff, so that the ack won't happen if there is a parity error ***
((0 0 01 1) (03 1 (buf-ce clk-reg)))
;;; Ack won't get set if a parity error has occured since the last dispatch
((0 0 03 1) (03 not-no-request (buf-ce set-ack)))
((0 0 03 0) (60 0 (idle)))

;;; Read from the Lbus (a0 and a1 come from ucode)
((0 0 01 0) (04 id-request (buf-ce clk-reg select-adr)))
;;; The hardware won't start the Lbus if there is a parity error here
((0 0 04 0) (05 no-parity-error (select-low run-lbus)))
```

```
;;; ID request cycle -- skip Lbus cycle, and assume data bits in latches are valid.
;;; This works as follows: you write the appropriate address bits as usual, then
;;; do a read cycle.  The read cycle latches the address bits into the latches, which
;;; are being driven onto the bus as the address continuously.  The correct data comes
;;; back sometime later, and is latched on every LBUS WP.  The read cycle completes,
;;; returning possibly garbage data.  The Multibus processor waits a while, to be sure
;;; the correct data has been latched, and then repeats the identical read cycle, which
;;; doesn't change the address, but does return the correct data.
((0 0 04 1) (12 0 (select-low reg-to-ram)))
((0 0 12 0) (12 1 (select-low reg-to-ram)))
((0 0 12 1) (13 not-no-request (select-low reg-to-ram set-ack)))
((0 0 13 1) (13 not-no-request (select-low reg-to-ram set-ack)))
((0 0 13 0) (00 0 (idle)))

;;; Parity error in buffered address.  Don't do Lbus cycle.  Try to set ack, but it
;;; won't actually ack the Multibus because of the parity error.
((0 0 05 0) (03 not-no-request (buf-ce set-ack)))

;;; Address parity is ok, so do the Lbus cycle
((0 0 05 1) (06 lbus-ack (select-low buf-ce buf-we reg-to-ram run-lbus)))
((0 0 06 0) (06 lbus-ack (select-low buf-ce buf-we reg-to-ram run-lbus)))
;;; *** This assumes that the changing of the address lines is slower than the
;;;     write-enable signal going by at least the write recovery time (5ns)
;;; *** Hold run-lbus so need-lbus stays asserted, forcing all ram writes to the full 16 bits.
;;; Now, hold the low data until the request goes away
((0 0 06 1) (17 not-no-request (select-low reg-to-ram set-ack run-lbus)))
((0 0 17 1) (17 not-no-request (select-low reg-to-ram set-ack run-lbus)))
;;; Write the medium word
((0 0 17 0) (07 0 (select-med reg-to-ram run-lbus)))
((0 0 07 0) (07 1 (select-med buf-ce buf-we reg-to-ram run-lbus)))
((0 0 07 1) (10 0 (select-med buf-ce buf-we reg-to-ram run-lbus)))
((0 0 10 0) (10 1 (select-high reg-to-ram run-lbus)))
((0 0 10 1) (11 0 (select-high buf-ce buf-we reg-to-ram run-lbus)))
;;; Write the high word into ram
((0 0 11 0) (00 0 (select-high buf-ce buf-we reg-to-ram run-lbus)))


;;; Write
((0 1 00 1) (02 dont-need-lbus (buf-ce select-adr clear-any-request)))

;;; Write to the ram (a0 and a1 externally selected)
;;; (Spuriously clock a register here, which will clear the parity error latch)
((0 1 02 1) (03 0 (buf-ce buf-we bus-to-ram clk-reg)))
((0 1 03 0) (04 1 (buf-ce buf-we bus-to-ram)))
((0 1 04 1) (04 not-no-request (set-ack)))
((0 1 04 0) (00 0 (idle)))

;;; Write to the Lbus (a0 and a1 come from ucode)
((0 1 02 0) (05 0 (buf-ce clk-reg select-adr)))
((0 1 05 0) (06 no-parity-error (select-med bus-to-ram)))

;;; Parity error in buffered address.  Don't ack mb, and don't start Lbus cycle
((0 1 06 0) (04 not-no-request (set-ack)))

;;; Address parity is ok, so continue with the Lbus cycle.  This will start the Lbus
;;; request before checking the parity of the data words.  That's ok, since the worst
;;; that will happen is that one bad word will get written into the Lbus.
((0 1 06 1) (07 0 (mb-controlled-ce select-med bus-to-ram)))
((0 1 07 0) (07 1 (mb-controlled-ce select-med bus-to-ram clk-reg)))
((0 1 07 1) (10 0 (buf-ce select-low run-lbus)))
((0 1 10 0) (10 1 (buf-ce select-low clk-reg)))
((0 1 10 1) (11 0 (buf-ce select-high)))
((0 1 11 0) (11 1 (buf-ce select-high clk-reg)))
;;; Wait for Lbus, and ack MB now.  Hardware will prevent ack if parity error in ram.
((0 1 11 1) (12 lbus-ack (set-ack)))
((0 1 12 0) (12 lbus-ack (set-ack)))
((0 1 12 1) (04 not-no-request (set-ack)))

END
```

SCRC:<LFEP-X>FPCEXT.PAL;2

```
;-*- Mode:LISP; Package:USER; Base:10 -*-

(defpal FPCEXT PAL16L8
  (IPIN 11 EXT-BUS-MASTER L)
  (IPIN  4 EXT-DIR-CTL L)
  (IPIN  8 IORC L)
  (IPIN  7 MRDC L)
  (IPIN  5 EXT-INT-PRESENT H)
  (IPIN  2 WRITE-T50 L)
  (IPIN  6 A1 H)
  (IPIN  9 PIO-RQ L)
  (IPIN  3 NFEP-RQ L)
```

```
  (OPIN 17 EXT-DATA-TO-BUS H)
  (OPIN 18 EXT-DRIVE L)
  (OPIN 19 EXT-BUS-MASTER-OUT H)
  (OPIN 14 PIO-WR-CTL L)
  (OPIN 13 PIO-RD-CTL L)
  (OPIN 16 FEP-NFEP-WR L)
  (OPIN 15 FEP-NFEP-RD L)
  (OPIN 12 EXT-INT-PRESENT-OUT L)

  (SETQ EXT-INT-PRESENT-OUT EXT-INT-PRESENT)
  (SETQ EXT-BUS-MASTER-OUT EXT-BUS-MASTER)
  (SETQ EXT-DATA-TO-BUS (COND ((NOT EXT-INT-PRESENT) NIL)
                              ((AND EXT-INT-PRESENT EXT-BUS-MASTER)
                               (NOT (OR IORC MRDC)))
                              ((AND EXT-INT-PRESENT (NOT EXT-BUS-MASTER))
                               (AND (OR IORC MRDC) EXT-DIR-CTL))))
  (SETQ EXT-DRIVE EXT-INT-PRESENT)

  (SETQ PIO-WR-CTL (AND PIO-RQ A1 WRITE-T50))
  (SETQ PIO-RD-CTL (AND PIO-RQ A1 IORC))

  (SETQ FEP-NFEP-WR (AND NFEP-RQ WRITE-T50))
  (SETQ FEP-NFEP-RD (AND NFEP-RQ IORC)))
```

SCRC:<LFEP-X>FPCBPE.PAL;3

```
;-*- Mode:LISP; Package:USER; Base:10 -*-

;; Bi-phase decoder pal for the console link

(DEFPAL FPCBPE PAL16R8
  ; pin 1 is 4.9152 MHz clock
  (IPIN 2 ENCODED-INPUT)

  (RPIN 19 RXD-SYNC)
  (RPIN 18 RXD-DLY)
  (RPIN 17 TRANSITION)
  (RPIN 16 SEQUENCER)
  (RPIN 15 RCV-CLK)
  (RPIN 14 MASK)
  (RPIN 13 SAMPLE)
  (RPIN 12 DECODED-OUTPUT)

  (SETQ RXD-SYNC ENCODED-INPUT)            ;Synchronize input data to local clock

  (SETQ RXD-DLY RXD-SYNC)                  ;Second-half of synchronizer

  (SETQ TRANSITION (XOR RXD-SYNC RXD-DLY))      ;edge detector

  (SETQ SEQUENCER (AND (NOT MASK) (OR TRANSITION SEQUENCER)))   ;Start sequence

  (SETQ RCV-CLK (NOT SEQUENCER))           ;recovered clock

  (SETQ MASK (NOT RCV-CLK))                ;mask out mid-bit transitions

  (SETQ SAMPLE (COND ((AND SEQUENCER RCV-CLK) RXD-DLY)  ;sample first half data
                     ((NOT (AND SEQUENCER RCV-CLK)) SAMPLE)))

  (SETQ DECODED-OUTPUT (COND ((AND RCV-CLK MASK) (XOR (NOT RXD-DLY) SAMPLE)) ;recovered data
                             ((NOT (AND RCV-CLK MASK)) DECODED-OUTPUT)))

  ;; end of definition
)
```

SCRC:<LMIFU>ERROR.PAL;1

```
; -*- Mode:Lisp; Package:User; Base:10 -*-

; This PAL detects and latches error conditions

(DEFPAL ERROR PAL16R4
  ;; Inputs
  (IPIN 12 DOUBLE-ERROR-B L)
  (IPIN 2 DOUBLE-ERROR-A L)
  (IPIN 3 MAP-SEL-1)
  (IPIN 4 MAP-SEL-0)
  (IPIN 5 ADDR-FROM-MAP)
  (IPIN 6 MAP-TO-ABUS L)
  (IPIN 7 PROC-GRANT L)
  (IPIN 8 MAP-PAR-ODD)
  (IPIN 9 SPY-ERROR-RESET L)
```

```
;; Normal outputs
(OPIN 19 ADDR-FROM-VMA)                 ;to MDCTL pipeline
(OPIN 18 MC-STOP L)                     ;to SQ, to stop machine
(OPIN 13 DOUBLE-ECC-ERROR L)            ;to FEP, to cause bus error if FEP read

;; Registered outputs (to spy bus)
;(RPIN 17 SPARE)
(RPIN 16 MAP-B-LOST)
(RPIN 15 MAP-A-LOST)
(RPIN 14 MEM-LOST)

;; Decode map parity errors
(FIELD MAP-SEL MAP-SEL-1 MAP-SEL-0)
(SETQ USING-MAP (OR (AND PROC-GRANT ADDR-FROM-MAP) MAP-TO-ABUS))
(SETQ MAP-A-ERROR (AND USING-MAP (NOT MAP-PAR-ODD) (FIELD MAP-SEL 1)))
(SETQ MAP-B-ERROR (AND USING-MAP (NOT MAP-PAR-ODD) (FIELD MAP-SEL 2)))

;; Stop machine if any error
;; Double-bit error (uncorrectable ECC) comes in on two pins because the PAL
;; that generates it doesn't have enough product terms to compute it completely
(SETQ DOUBLE-ECC-ERROR (OR DOUBLE-ERROR-A DOUBLE-ERROR-B))
(SETQ MC-STOP (OR DOUBLE-ECC-ERROR MAP-A-ERROR MAP-B-ERROR))

;; Error latches
(SETQ NEXT-MEM-LOST (AND (NOT SPY-ERROR-RESET) (OR DOUBLE-ECC-ERROR MEM-LOST)))
(SETQ NEXT-MAP-A-LOST (AND (NOT SPY-ERROR-RESET) (OR MAP-A-ERROR MAP-A-LOST)))
(SETQ NEXT-MAP-B-LOST (AND (NOT SPY-ERROR-RESET) (OR MAP-B-ERROR MAP-B-LOST)))

;; Decide whether this memory cycle is getting its low-order address bits from VMA
(SETQ ADDR-FROM-VMA (AND ADDR-FROM-MAP (NOT (FIELD MAP-SEL 0))))

; -*- Mode:Lisp; Package:User; Base:10 -*-

; Destination control, map LRU algorithm, and skip condition select

(DEFPAL DEST PAL16L8
  ;; Microinstruction Inputs
  (IPIN 7 WRITE-MC-DEV L)
  (IPIN 8 LBUS-DEV-2)
  (IPIN 9 LBUS-DEV-1)
  (IPIN 11 LBUS-DEV-0)
  (FIELD SUBDEVICE LBUS-DEV-2 LBUS-DEV-1 LBUS-DEV-0)

  ;; Map Controls
  (IPIN 4 MAP-B-LRU)
  (IPIN 5 SPY-MAP-B-ENABLE L)
  (IPIN 6 SPY-MAP-A-ENABLE L)

  ;; Skip Conditions
  (IPIN 2 ECC-ERROR L)
  (IPIN 3 MAP-A-VMA-MATCH L)

  ;; Outputs
  (OPIN 17 MC-COND)
  (OPIN 16 LOAD-PC L)
  (OPIN 15 LOAD-PHTA-AND-ASN L)
  (OPIN 13 WRITE-MAP L)
  (OPIN 19 MAP-B-WRITE)
  (OPIN 12 MAP-A-WRITE)

  ;; Lbus device write destination decode
  (SETQ LOAD-PHTA-AND-ASN (AND WRITE-MC-DEV (FIELD SUBDEVICE 1)))
  (SETQ LOAD-PC (AND WRITE-MC-DEV (FIELD SUBDEVICE 2)))
  (SETQ WRITE-MAP (AND WRITE-MC-DEV (FIELD SUBDEVICE (4 5 6 7))))

  ;; LOAD-VMA control is on MDCTL PAL.

  ;; Choosing which map to write
  (SETQ MAP-A-WRITE (AND WRITE-MAP
                         (OR (FIELD SUBDEVICE (5 7))
                             (AND (FIELD SUBDEVICE 4)
                                  (OR (NOT MAP-B-LRU)
                                      (NOT SPY-MAP-B-ENABLE))))))
  (SETQ MAP-B-WRITE (AND WRITE-MAP
                         (OR (FIELD SUBDEVICE (6 7))
                             (AND (FIELD SUBDEVICE 4)
                                  (OR MAP-B-LRU
                                      (NOT SPY-MAP-A-ENABLE))))))

  ;; Skip condition select
  (SETQ MC-COND (COND (WRITE-MAP MAP-A-VMA-MATCH)
                      ((NOT WRITE-MAP) ECC-ERROR))))

;-*- Mode:LISP; Package:USER; Base:10 -*-

(DEFPAL DECODE8 PAL10H8
  (IPIN 1 ECC-CORRECT-CLK)
  (IPIN 2 SYN-6 L)
  (IPIN 3 SYN-5 L)
  (IPIN 4 SYN-4 L)
```

```
(IPIN 5 SYN-3 L)
(IPIN 6 SYN-2 L)
(IPIN 7 SYN-1 L)
(IPIN 8 SYN-0 L)
(FIELD SYN SYN-6 SYN-5 SYN-4 SYN-3 SYN-2 SYN-1 SYN-0)

(OPIN 19 ECC-CORRECT-8)
(OPIN 18 ECC-CORRECT-9)
(OPIN 17 ECC-CORRECT-10)
(OPIN 16 ECC-CORRECT-11)
(OPIN 15 ECC-CORRECT-12)
(OPIN 14 ECC-CORRECT-13)
(OPIN 13 ECC-CORRECT-14)
(OPIN 12 ECC-CORRECT-15)

(SETQ ECC-CORRECT-8 (AND ECC-CORRECT-CLK (FIELD SYN #o015)))
(SETQ ECC-CORRECT-9 (AND ECC-CORRECT-CLK (FIELD SYN #o016)))
(SETQ ECC-CORRECT-10 (AND ECC-CORRECT-CLK (FIELD SYN #o117)))
(SETQ ECC-CORRECT-11 (AND ECC-CORRECT-CLK (FIELD SYN #o121)))
(SETQ ECC-CORRECT-12 (AND ECC-CORRECT-CLK (FIELD SYN #o122)))
(SETQ ECC-CORRECT-13 (AND ECC-CORRECT-CLK (FIELD SYN #o023)))
(SETQ ECC-CORRECT-14 (AND ECC-CORRECT-CLK (FIELD SYN #o124)))
(SETQ ECC-CORRECT-15 (AND ECC-CORRECT-CLK (FIELD SYN #o025))))

;-*- Mode:LISP; Package:USER; Base:10 -*-

(DEFPAL DECODE32 PAL16L8
  (IPIN 1 ECC-CORRECT-CLK)
  (IPIN 2 SYN-6 L)
  (IPIN 3 SYN-5 L)
  (IPIN 4 SYN-4 L)
  (IPIN 5 SYN-3 L)
  (IPIN 6 SYN-2 L)
  (IPIN 7 SYN-1 L)
  (IPIN 8 SYN-0 L)
  (FIELD SYN SYN-6 SYN-5 SYN-4 SYN-3 SYN-2 SYN-1 SYN-0)
  ;; Kludge because not enough product terms.  Clobber these bits if double-bit error
  (FIELD SYN6 SYN-5 SYN-4 SYN-3 SYN-2 SYN-1 SYN-0)

  (IPIN 9 SYN-NOT-0)
  (IPIN 11 ODD-NUM-ERRORS)

  (OPIN 16 DOUBLE-ERROR-B L)
  (OPIN 15 DOUBLE-ERROR-A L)
  (OPIN 14 ECC-CORRECT-35)
  (OPIN 13 ECC-CORRECT-34)
  (OPIN 19 ECC-CORRECT-33)
  (OPIN 12 ECC-CORRECT-32)

  (SETQ ECC-CORRECT-32 (AND ECC-CORRECT-CLK (FIELD SYN6 #o60))) ;160
  (SETQ ECC-CORRECT-33 (AND ECC-CORRECT-CLK (FIELD SYN6 #o61)))
  (SETQ ECC-CORRECT-34 (AND ECC-CORRECT-CLK (FIELD SYN6 #o62)))
  (SETQ ECC-CORRECT-35 (AND ECC-CORRECT-CLK (FIELD SYN6 #o64)))

  ;; Double bit error if syndrome not 0 and even number of errors (parity of syndrome),
  ;; or if one of the unused codes is encountered.
  ;; These include some double-bit errors and some replications in order to
  ;; cover all of the unused codes in the available number of product terms
  (SETQ DOUBLE-ERROR-A (AND ECC-CORRECT-CLK
                            (OR (AND SYN-NOT-0 (NOT ODD-NUM-ERRORS))
                                (FIELD SYN #o(131 132 133 135 136 137
                                              151 152 153 155 156 157
                                              161 162 163 165 166 167
                                              171 172 173 175 176 177)))))
  (SETQ DOUBLE-ERROR-B (AND ECC-CORRECT-CLK
                            (OR (AND SYN-NOT-0 (NOT ODD-NUM-ERRORS))
                                (FIELD SYN #o(070 071 072 073 074 075 076 077 174
                                              027 037 047 067 127 137 147 167))))))

;-*- Mode:LISP; Package:USER; Base:10 -*-

(DEFPAL DECODE24 PAL10H8
  (IPIN 1 ECC-CORRECT-CLK)
  (IPIN 2 SYN-6 L)
  (IPIN 3 SYN-5 L)
  (IPIN 4 SYN-4 L)
  (IPIN 5 SYN-3 L)
  (IPIN 6 SYN-2 L)
  (IPIN 7 SYN-1 L)
  (IPIN 8 SYN-0 L)
  (FIELD SYN SYN-6 SYN-5 SYN-4 SYN-3 SYN-2 SYN-1 SYN-0)

  (OPIN 19 ECC-CORRECT-24)
  (OPIN 18 ECC-CORRECT-25)
  (OPIN 17 ECC-CORRECT-26)
  (OPIN 16 ECC-CORRECT-27)
  (OPIN 15 ECC-CORRECT-28)
  (OPIN 14 ECC-CORRECT-29)
  (OPIN 13 ECC-CORRECT-30)
  (OPIN 12 ECC-CORRECT-31)
```

```
(SETQ ECC-CORRECT-24 (AND ECC-CORRECT-CLK (FIELD SYN #o144)))
(SETQ ECC-CORRECT-25 (AND ECC-CORRECT-CLK (FIELD SYN #o045)))
(SETQ ECC-CORRECT-26 (AND ECC-CORRECT-CLK (FIELD SYN #o046)))
(SETQ ECC-CORRECT-27 (AND ECC-CORRECT-CLK (FIELD SYN #o150)))
(SETQ ECC-CORRECT-28 (AND ECC-CORRECT-CLK (FIELD SYN #o051)))
(SETQ ECC-CORRECT-29 (AND ECC-CORRECT-CLK (FIELD SYN #o052)))
(SETQ ECC-CORRECT-30 (AND ECC-CORRECT-CLK (FIELD SYN #o054)))
(SETQ ECC-CORRECT-31 (AND ECC-CORRECT-CLK (FIELD SYN #o057))))

;-*- Mode:LISP; Package:USER; Base:10 -*-

(DEFPAL DECODE16 PAL10H8
  (IPIN 1 ECC-CORRECT-CLK)
  (IPIN 2 SYN-6 L)
  (IPIN 3 SYN-5 L)
  (IPIN 4 SYN-4 L)
  (IPIN 5 SYN-3 L)
  (IPIN 6 SYN-2 L)
  (IPIN 7 SYN-1 L)
  (IPIN 8 SYN-0 L)
  (FIELD SYN SYN-6 SYN-5 SYN-4 SYN-3 SYN-2 SYN-1 SYN-0)

  (OPIN 19 ECC-CORRECT-16)
  (OPIN 18 ECC-CORRECT-17)
  (OPIN 17 ECC-CORRECT-18)
  (OPIN 16 ECC-CORRECT-19)
  (OPIN 15 ECC-CORRECT-20)
  (OPIN 14 ECC-CORRECT-21)
  (OPIN 13 ECC-CORRECT-22)
  (OPIN 12 ECC-CORRECT-23)

  (SETQ ECC-CORRECT-16 (AND ECC-CORRECT-CLK (FIELD SYN #o026)))
  (SETQ ECC-CORRECT-17 (AND ECC-CORRECT-CLK (FIELD SYN #o130)))
  (SETQ ECC-CORRECT-18 (AND ECC-CORRECT-CLK (FIELD SYN #o031)))
  (SETQ ECC-CORRECT-19 (AND ECC-CORRECT-CLK (FIELD SYN #o032)))
  (SETQ ECC-CORRECT-20 (AND ECC-CORRECT-CLK (FIELD SYN #o034)))
  (SETQ ECC-CORRECT-21 (AND ECC-CORRECT-CLK (FIELD SYN #o141)))
  (SETQ ECC-CORRECT-22 (AND ECC-CORRECT-CLK (FIELD SYN #o142)))
  (SETQ ECC-CORRECT-23 (AND ECC-CORRECT-CLK (FIELD SYN #o043))))

;-*- Mode:LISP; Package:USER; Base:10 -*-

(DEFPAL DECODE0 PAL10H8
  (IPIN 1 ECC-CORRECT-CLK)
  (IPIN 2 SYN-6 L)
  (IPIN 3 SYN-5 L)
  (IPIN 4 SYN-4 L)
  (IPIN 5 SYN-3 L)
  (IPIN 6 SYN-2 L)
  (IPIN 7 SYN-1 L)
  (IPIN 8 SYN-0 L)
  (FIELD SYN SYN-6 SYN-5 SYN-4 SYN-3 SYN-2 SYN-1 SYN-0)

  (OPIN 19 ECC-CORRECT-0)
  (OPIN 18 ECC-CORRECT-1)
  (OPIN 17 ECC-CORRECT-2)
  (OPIN 16 ECC-CORRECT-3)
  (OPIN 15 ECC-CORRECT-4)
  (OPIN 14 ECC-CORRECT-5)
  (OPIN 13 ECC-CORRECT-6)
  (OPIN 12 ECC-CORRECT-7)

  (SETQ ECC-CORRECT-0 (AND ECC-CORRECT-CLK (FIELD SYN #o103)))
  (SETQ ECC-CORRECT-1 (AND ECC-CORRECT-CLK (FIELD SYN #o105)))
  (SETQ ECC-CORRECT-2 (AND ECC-CORRECT-CLK (FIELD SYN #o106)))
  (SETQ ECC-CORRECT-3 (AND ECC-CORRECT-CLK (FIELD SYN #o007)))
  (SETQ ECC-CORRECT-4 (AND ECC-CORRECT-CLK (FIELD SYN #o111)))
  (SETQ ECC-CORRECT-5 (AND ECC-CORRECT-CLK (FIELD SYN #o112)))
  (SETQ ECC-CORRECT-6 (AND ECC-CORRECT-CLK (FIELD SYN #o013)))
  (SETQ ECC-CORRECT-7 (AND ECC-CORRECT-CLK (FIELD SYN #o114))))

; -*- Mode:Lisp; Package:User; Base:10 -*-

; Track state of bus cycles
; Note that all outputs are registered

(DEFPAL BUSTATE PAL16R8
  (IPIN 2 DONT-START-READ)        ;Don't load MD from results of this read
  (IPIN 3 LBUS-WAIT L)            ;Don't advance most state
  (IPIN 4 ADDR-IN-AMEM L)         ;Inhibit processor cycle
  (IPIN 5 SPY-OBUS-TO-LBUS)       ;FEP wants to see datapath output
  (IPIN 6 SPEC-DMA L)             ;If start mem cycle, it's a DMA
  (IPIN 7 FEP-LBUS-RQ L)          ;FEP wants Lbus or has active cycle
  (IPIN 8 LBUS-REQUEST L)         ;Someone is starting a cycle
  (IPIN 9 LBUS-WRITE L)           ;Write cycle starting

  (RPIN 19 DATA-CYC L)            ;Any read-data cycle (for ECC)
  (RPIN 18 WRITE-ACTIVE-CYC)      ;Any write-active cycle
  (RPIN 17 READ-ACTIVE-CYC L)     ;Any read-active cycle
```

```
  (RPIN 16 FEP-READ-ACTIVE L)
  (RPIN 15 PROC-READ-ACTIVE L)
  (RPIN 14 MC-OBUS-REG-TO-LBUS L)        ;Processor write data to bus
  (RPIN 13 BUS-BUSY L)              ;Data lines in use for anything but processor read
  (RPIN 12 PROC-DATA-CYC L)         ;Data on lbus for processor read

  ;; If someone is requesting and it's not the FEP, it must be the processor
  ;; If they both are requesting, the FEP always takes priority
  ;; Ignore processor requests that map into A-memory (which is a physical
  ;; slot number that doesn't exist)
  (SETQ PROC-LBUS-GRANT (AND LBUS-REQUEST (NOT FEP-LBUS-RQ) (NOT ADDR-IN-AMEM)))

  ;; The FEP gets the bus if it wants it, except when refresh takes priority
  (SETQ FEP-LBUS-GRANT (AND FEP-LBUS-RQ LBUS-REQUEST))

  ;; Put processor write data on the bus during active cycle
  ;; If active cycle stretched by Lbus Wait, keep driving data
  ;; Use same path as way for FEP to read the datapath Obus
  (SETQ NEXT-MC-OBUS-REG-TO-LBUS
        (OR (AND PROC-LBUS-GRANT LBUS-WRITE (NOT SPEC-DMA) (NOT LBUS-WAIT))
            (AND MC-OBUS-REG-TO-LBUS LBUS-WAIT)
            SPY-OBUS-TO-LBUS))

  ;; Track the progress of various cycles
  (SETQ NEXT-PROC-READ-ACTIVE
        (OR (AND PROC-LBUS-GRANT (NOT LBUS-WRITE) (NOT SPEC-DMA)
                                 (NOT LBUS-WAIT) (NOT DONT-START-READ))
            (AND PROC-READ-ACTIVE LBUS-WAIT)))
  (SETQ NEXT-FEP-READ-ACTIVE
        (OR (AND FEP-LBUS-GRANT (NOT LBUS-WRITE) (NOT LBUS-WAIT))
            (AND FEP-READ-ACTIVE LBUS-WAIT)))

  ;; PROC DATA CYC is only on during the first cycle of a data cycle that
  ;; gets repeated due to Lbus wait.  This makes block read from TV memory work.
  (SETQ NEXT-PROC-DATA-CYC
        (AND PROC-READ-ACTIVE (NOT LBUS-WAIT)))

  ;; The bus is busy during write active cycles and during FEP data cycles
  ;; It is not busy during proc data cycles since that is accounted separately
  ;; However, if a data cycle is repeated the bus is busy with garbage data
  ;; during the repetitions
  (SETQ NEXT-BUS-BUSY (OR (AND LBUS-REQUEST LBUS-WRITE (NOT LBUS-WAIT))
                          (AND FEP-READ-ACTIVE (NOT LBUS-WAIT))
                          (AND BUS-BUSY LBUS-WAIT)
                          (AND PROC-DATA-CYC LBUS-WAIT)))

  ;; Track all reads so ECC-corrected data can be redriven onto bus
  ;; Don't do processor reads redirected to Amem (so bus won't be busy)
  (SETQ NEXT-READ-ACTIVE-CYC
        (OR (AND (OR FEP-LBUS-GRANT PROC-LBUS-GRANT) (NOT LBUS-WRITE) (NOT LBUS-WAIT))
            (AND READ-ACTIVE-CYC LBUS-WAIT)))
  (SETQ NEXT-DATA-CYC
        (OR (AND READ-ACTIVE-CYC (NOT LBUS-WAIT))
            (AND DATA-CYC LBUS-WAIT)))

  ;; Track write cycles for ECC-generation logic (also for special load MD)
  (SETQ NEXT-WRITE-ACTIVE-CYC
        (OR (AND LBUS-REQUEST LBUS-WRITE (NOT LBUS-WAIT))
            (AND WRITE-ACTIVE-CYC LBUS-WAIT))))

; -*- Mode:Lisp; Package:User; Base:10 -*-

; Bus arbitration (request from processor) PAL

(DEFPAL BUSARB PAL16L8
  ;; Microinstruction inputs
  (IPIN 5 U-AMRA-SEL-0)
  (IPIN 6 U-AMRA-10)
  (IPIN 7 U-AMRA-7)
  (IPIN 8 U-AMRA-6)
  (IPIN 9 U-MEM-1)
  (IPIN 11 U-MEM-0)
  (IPIN 15 SPEC-DMA L)

  (FIELD ASOURCE U-AMRA-7 U-AMRA-6)
  (SETQ ABUS-SOURCE (AND U-AMRA-SEL-0 U-AMRA-10))        ;We drive the Abus
  (SETQ ABUS-FROM-MEM (AND ABUS-SOURCE (FIELD ASOURCE 0)))
  (SETQ ABUS-FROM-LBUS (AND ABUS-SOURCE (FIELD ASOURCE 1)))
  (SETQ ABUS-FROM-VMA (AND ABUS-SOURCE (FIELD ASOURCE 2)))
  (SETQ ABUS-FROM-MAP (AND ABUS-SOURCE (FIELD ASOURCE 3)))

  ;; Note we only see the low 2 bits of the MEM field.  The functions are
  ;; encoded so as to make this work.  Functions 6 and 7 are the block-mode
  ;; versions of functions 2 and 3.  Function 5 uses the bus just like function
  ;; 1 does, but writes the VMA instead of a microdevice.
  (FIELD U-MEM U-MEM-1 U-MEM-0)
  (SETQ MICRODEVICE-OP (FIELD U-MEM 1))
  (SETQ MICRODEVICE-READ (AND MICRODEVICE-OP ABUS-FROM-LBUS))
  (SETQ MICRODEVICE-WRITE (AND MICRODEVICE-OP (NOT ABUS-FROM-LBUS)))
  (SETQ MICRODEVICE-WRITE-USING-BUS (AND MICRODEVICE-WRITE (NOT ABUS-FROM-MEM)))
  (SETQ START-READ (FIELD U-MEM 2))
  (SETQ START-WRITE (FIELD U-MEM 3))
  (SETQ MEM-START (OR START-READ START-WRITE))
```

```
;; NOP inhibits action of microinstruction, but not wait (it's too slow)
;; Note that PROC-WAIT feeds back to NOP, as does map miss (or any trap).
;; It is necessary to be careful to avoid feedback here.  In addition, if
;; a request to use the bus is inhibited because the bus is busy, we must
;; short-circuit the path from WAIT to NOP, to avoid driving the bus during
;; the time required to decide to turn on NOP (in other words, go through
;; the PAL once instead of twice).
(IPIN 4 NOP L)

;; PROC GRANT must latch up when the clock is asserted.  The memory card has
;; already decided to take a cycle, and has started RAS, so we mustn't drop
;; the request and mustn't change the address or the contents of memory will
;; be clobbered.  We still have until the trailing edge of the clock to decide
;; whether to do a write or a read.
(IPIN 14 CLK)

;; Reasons not to start a memory cycle (higher-priority request or active)
;; Don't start a memory cycle if tasking away--instead start when come back
;; This applies to both reads and writes: there are two reasons, to avoid
;; getting our MD smashed on reads, and to avoid causing a DMA task to wait
;; before starting its request.
;; Note that the processor is allowed to start a memory cycle if in its
;; own active cycle; it is assumed to know what it is doing.  Inter-task
;; interference is prevented by not starting when tasking away.  It is inutile
;; to dismiss and then start a memory cycle in the last microinstruction of the task.
(IPIN 2 TASK-SWITCH L)
(IPIN 3 ALLOW-PROC-GRANT L)   ;bus not tied up by FEP or refresh

(SETQ MEMORY-WAIT (OR (AND START-READ (NOT ALLOW-PROC-GRANT))
                      (AND START-WRITE (NOT ALLOW-PROC-GRANT))
                      (AND MEM-START TASK-SWITCH)))

;; Reasons not to do a microdevice op (conflicts for Lbus data lines)
(IPIN 13 BUS-BUSY L)
(IPIN 1 PROC-DATA-CYC L)

(SETQ MICRODEVICE-WAIT
      (OR (AND MICRODEVICE-OP BUS-BUSY)
          (AND MICRODEVICE-READ PROC-DATA-CYC)
          (AND MICRODEVICE-WRITE-USING-BUS PROC-DATA-CYC)))

;; Bus control outputs
(OPIN 18 BUS-DEV-READ L)
(OPIN 17 BUS-DEV-OR-VMA-WRITE L)
(OPIN 16 PROC-GRANT L)
(IPIN 16 PROC-GRANT-FEEDBACK L)
(OPIN 19 MC-OBUS-TO-LBUS L)

(SETQ PROC-GRANT (OR (AND MEM-START (NOT NOP) (NOT MEMORY-WAIT))
                     (AND PROC-GRANT-FEEDBACK CLK)))  ;latch

(SETQ BUS-DEV-READ (AND MICRODEVICE-READ (NOT NOP) (NOT MICRODEVICE-WAIT)))
(SETQ BUS-DEV-OR-VMA-WRITE (OR (AND MICRODEVICE-WRITE (NOT NOP) (NOT MICRODEVICE-WAIT))
                               (AND MEM-START SPEC-DMA (NOT NOP) (NOT MEMORY-WAIT))))

;; For lbus device write where data not coming from memory
(SETQ MC-OBUS-TO-LBUS (AND (OR MICRODEVICE-WRITE-USING-BUS
                               (AND MICRODEVICE-WRITE (NOT PROC-DATA-CYC)))

                           (NOT NOP) (NOT MICRODEVICE-WAIT)))

;; Processor wait output.  Must be fast
(OPIN 12 PROC-WAIT L)

;; Note: PROC-WAIT gets IORed with LBUS-WAIT to produce MC WAIT, the signal
;; that actually goes to the sequencer and tells the processor to wait.
;; This is done outside of the PAL to reduce the timing constraints on LBUS WAIT
;; and to leave a PAL input free for bug fixing.  It doesn't cost any time since
;; PROC-WAIT has to get inverted outside of the PAL anyway.

(SETQ PROC-WAIT (OR MICRODEVICE-WAIT MEMORY-WAIT)))
```

SQ - PAL

```
; -*- Mode:Lisp; Package:User; Base:10 -*-

; PAL for SQTSK1, holds and priority-encodes software task wakeups

(DEFPAL SQTSK1 PAL16R4
  (RPIN 17 TASK-6-WAKEUP-FLAG)   ;Register bits
  (RPIN 16 TASK-5-WAKEUP-FLAG)
  (RPIN 15 TASK-2-WAKEUP-FLAG)
  (RPIN 14 TASK-1-WAKEUP-FLAG)

  (IPIN 8 TASK-4-WAKEUP-FLAG)    ;TV request comes in from outside
  (IPIN 9 TASK-3-WAKEUP-FLAG)    ;Clock request comes in from outside

  (OPIN 19 PRI-2 L)              ;Priority-encoded task number
  (OPIN 18 PRI-1 L)
  (OPIN 13 PRI-0 L)
```

```
(IPIN 12 CUR-TASK-2)            ;Current task
(IPIN 2 CUR-TASK-1)
(IPIN 3 CUR-TASK-0)
(FIELD CUR-TASK CUR-TASK-2 CUR-TASK-1 CUR-TASK-0)

(IPIN 4 DISMISS L)              ;Dismiss command

(IPIN 5 MAGIC-1)                ;Task to be awakened
(IPIN 6 MAGIC-0)
(FIELD MAGIC MAGIC-1 MAGIC-0)

(IPIN 7 SET-WAKEUP L)           ;Wakeup command

(SETQ WAKEUP-1 (AND SET-WAKEUP (FIELD MAGIC 0)))
(SETQ WAKEUP-2 (AND SET-WAKEUP (FIELD MAGIC 1)))
(SETQ WAKEUP-5 (AND SET-WAKEUP (FIELD MAGIC 2)))
(SETQ WAKEUP-6 (AND SET-WAKEUP (FIELD MAGIC 3)))

(SETQ DISMISS-1 (AND DISMISS (FIELD CUR-TASK 1)))
(SETQ DISMISS-2 (AND DISMISS (FIELD CUR-TASK 2)))
(SETQ DISMISS-3 (AND DISMISS (FIELD CUR-TASK 3)))
(SETQ DISMISS-4 (AND DISMISS (FIELD CUR-TASK 4)))
(SETQ DISMISS-5 (AND DISMISS (FIELD CUR-TASK 5)))
(SETQ DISMISS-6 (AND DISMISS (FIELD CUR-TASK 6)))

;Priority Encoding.  Note well: DISMISS does not clear the request
; until the following cycle.  Thus, for software tasks you must
; dismiss one cycle earlier than for hardware tasks.  This is okay
; since software tasks are not DMA tasks, hence longer than 2 cycles.
;I had to do it this way to get the priority encoder inside the PAL.

(SETQ PRI-2 (OR TASK-6-WAKEUP-FLAG TASK-5-WAKEUP-FLAG TASK-4-WAKEUP-FLAG))
(SETQ PRI-1 (OR TASK-6-WAKEUP-FLAG
                (AND TASK-3-WAKEUP-FLAG
                     (NOT TASK-5-WAKEUP-FLAG) (NOT TASK-4-WAKEUP-FLAG))
                (AND TASK-2-WAKEUP-FLAG
                     (NOT TASK-5-WAKEUP-FLAG) (NOT TASK-4-WAKEUP-FLAG))))
(SETQ PRI-0 (OR (AND TASK-5-WAKEUP-FLAG (NOT TASK-6-WAKEUP-FLAG))
                (AND TASK-3-WAKEUP-FLAG
                     (NOT TASK-6-WAKEUP-FLAG) (NOT TASK-4-WAKEUP-FLAG))
                (AND TASK-1-WAKEUP-FLAG (NOT TASK-6-WAKEUP-FLAG)
                     (NOT TASK-4-WAKEUP-FLAG) (NOT TASK-2-WAKEUP-FLAG))))

(SETQ TASK-1-WAKEUP-FLAG        ;Feed into register
      (OR WAKEUP-1 (AND TASK-1-WAKEUP-FLAG (NOT DISMISS-1))))
(SETQ TASK-2-WAKEUP-FLAG
      (OR WAKEUP-2 (AND TASK-2-WAKEUP-FLAG (NOT DISMISS-2))))
(SETQ TASK-5-WAKEUP-FLAG
      (OR WAKEUP-5 (AND TASK-5-WAKEUP-FLAG (NOT DISMISS-5))))
(SETQ TASK-6-WAKEUP-FLAG
      (OR WAKEUP-6 (AND TASK-6-WAKEUP-FLAG (NOT DISMISS-6)))))

; -*- Mode:Lisp; Package:User; Base:10 -*-

; PAL for SQTRAP (rev. 3) to encode trap address

(DEFPAL SQTRAP PAL16L8
      ;; Inputs from data path
      (IPIN 2 DP-TRANSPORT-TRAP L)
      (IPIN 3 DP-TYPE-TRAP)
      (IPIN 4 DP-MISC-TRAP)
      (IPIN 5 DP-SLOW-JUMP L)
      (IPIN 6 DP-TYPE-TRAP-NUM-1)                  ;Trap Param 1
      (IPIN 7 DP-TYPE-TRAP-NUM-0)                  ;Trap Param 0
      ;; Input from memory control
      (IPIN 8 MC-MAP-MISS L)
      ;; Inputs from sequencer
      (IPIN 9 U-NAF-1)
      (IPIN 11 U-NAF-0)
      (IPIN 13 SPY-ENABLE-TRAP)
      ;; Input from clock
      (IPIN 1 CLK-EXTRA-INNINGS)

      ;; Outputs
      (OPIN 19 NEXT-CPC-1)                         ;Low bits of trap address
      (OPIN 12 NEXT-CPC-0)
      (OE 19 TAKE-TRAP-A)
      (OE 12 TAKE-TRAP-A)
      (OPIN 18 TRAP-TO-NAF L)                      ;Trap address select
      (OPIN 17 TRAP-SAVE-NPC L)                    ;Enable push on cstk
      (OPIN 16 TAKE-TRAP)                          ;Branch to trap address
      (IPIN 16 TAKE-TRAP-A)    ;Hack, Hack
      (OPIN 15 ANY-TRAP)                           ;NOP this cycle
      (OPIN 14 TRAP-A-2)                           ;Bit 2 of trap address (if not NAF)

      ;; Priority encoding (in descending order)
      ;; Highest:    Transporter
      ;;             Type-trap (invisible pointer, bad argument)
      ;;             Misc Trap (most traps, trap address from NAF)
      ;;             Map miss
      ;; Lowest:     Slow jump (gc write trap)
```

```
(SETQ TAKE-TRANSPORT-TRAP DP-TRANSPORT-TRAP)
(SETQ TAKE-TYPE-TRAP (AND DP-TYPE-TRAP (NOT DP-TRANSPORT-TRAP)))
(SETQ TAKE-NAF-TRAP (AND DP-MISC-TRAP (NOT DP-TRANSPORT-TRAP) (NOT DP-TYPE-TRAP)))
(SETQ TAKE-MAP-TRAP (AND MC-MAP-MISS (NOT DP-MISC-TRAP)
                         (NOT DP-TRANSPORT-TRAP) (NOT DP-TYPE-TRAP)))
(SETQ TAKE-SLOW-JUMP (AND DP-SLOW-JUMP (NOT DP-TRANSPORT-TRAP) (NOT DP-TYPE-TRAP)
                          (NOT DP-MISC-TRAP) (NOT MC-MAP-MISS)))

;; Decision whether to trap
(SETQ ANY-TRAP (OR TAKE-TRANSPORT-TRAP TAKE-TYPE-TRAP TAKE-NAF-TRAP TAKE-MAP-TRAP))
(SETQ TAKE-TRAP (AND (OR ANY-TRAP DP-SLOW-JUMP) SPY-ENABLE-TRAP CLK-EXTRA-INNINGS))

;; Save NPC if not trapping to NAF, allowing microinstruction retry
(SETQ TRAP-SAVE-NPC (AND TAKE-TRAP (NOT TRAP-TO-NAF)))

;; Trap address computation
(SETQ TRAP-TO-NAF (OR TAKE-NAF-TRAP TAKE-SLOW-JUMP))
(SETQ TRAP-A-2 TAKE-TYPE-TRAP)
(SETQ NEXT-CPC-1 (COND (TAKE-TRANSPORT-TRAP NIL)
                       (TAKE-TYPE-TRAP DP-TYPE-TRAP-NUM-1)
                       (TRAP-TO-NAF U-NAF-1)
                       (TAKE-MAP-TRAP NIL)))
(SETQ NEXT-CPC-0 (COND (TAKE-TRANSPORT-TRAP NIL)
                       (TAKE-TYPE-TRAP DP-TYPE-TRAP-NUM-0)
                       (TRAP-TO-NAF U-NAF-0)
                       (TAKE-MAP-TRAP T))))

; -*- Mode:Lisp; Package:User; Base:10 -*-

(DEFPAL SODCOD PAL16L8
  (IPIN 18 SPY-ADDR-5)
  (IPIN 17 SPY-READ-DP-ID L)
  (IPIN 1 U-COND-FUNC-1)
  (IPIN 2 U-COND-FUNC-0)
  (IPIN 3 U-MAGIC-1)
  (IPIN 4 U-MAGIC-0)
  (IPIN 5 SPEC-NPC-MAGIC L)
  (IPIN 6 MC-WAIT L)
  (IPIN 7 TAKE-TRAP L)
  (IPIN 8 NOP L)
  (IPIN 9 SPY-READ L)
  (IPIN 11 SPY-WRITE L)

  (OPIN 16 SHOULD-SKIP)
  (OPIN 15 NPC-MUX-EN L)
  (OPIN 14 NPC-XCV-EN L)
  (OPIN 13 NPC-XMT-EN L)
  (OPIN 19 NPC-SEL-1)
  (OPIN 12 SPY-XCV-EN L)

  (FIELD MAGIC U-MAGIC-1 U-MAGIC-0)

  ;; Control for spy bus buffer
  (SETQ SPY-XCV-EN (OR SPY-WRITE
                       (AND SPY-READ (NOT SPY-ADDR-5) (NOT SPY-READ-DP-ID))))

  ;; Skip if U COND FUNC = 1 and not trapping
  (SETQ SHOULD-SKIP (AND (FIELD U-COND-FUNC-1 U-COND-FUNC-0 1) (NOT TAKE-TRAP)))

  ;; Controls for the NPC input mux and the NPC to/from Lbus data path

  ;; Select alternate NPC inputs if special function or trap
  (SETQ NPC-SEL-1 (OR SPEC-NPC-MAGIC TAKE-TRAP))

  ;; Special functions
  (SETQ NPC-MUX-TO-LBUS (AND SPEC-NPC-MAGIC (FIELD MAGIC 1)))
  (SETQ NPC-FROM-LBUS (AND SPEC-NPC-MAGIC (FIELD MAGIC 2)))

  ;; Various tristate enables.  Be careful not to drive bus inadvertently.
  (SETQ NPC-MUX-EN (NOT NPC-FROM-LBUS))
  (SETQ DRIVE-LBUS (AND NPC-MUX-TO-LBUS (NOT MC-WAIT) (NOT NOP)))
  (SETQ NPC-XCV-EN (OR DRIVE-LBUS NPC-FROM-LBUS))
  (SETQ NPC-XMT-EN DRIVE-LBUS))

; -*- Mode:Lisp; Package:User; Base:10 -*-

(DEFPAL SODCOD PAL16L8
  (IPIN 18 SPY-ADDR-5)
  (IPIN 17 SPY-READ-DP-ID L)
  (IPIN 1 U-COND-FUNC-1)
  (IPIN 2 U-COND-FUNC-0)
  (IPIN 3 U-MAGIC-1)
  (IPIN 4 U-MAGIC-0)
  (IPIN 5 SPEC-NPC-MAGIC L)
  (IPIN 6 MC-WAIT L)
  (IPIN 7 TAKE-TRAP L)
  (IPIN 8 NOP L)
  (IPIN 9 SPY-READ L)
  (IPIN 11 SPY-WRITE L)
```

```
(OPIN 16 SHOULD-SKIP)
(OPIN 15 NPC-MUX-EN L)
(OPIN 14 NPC-XCV-EN L)
(OPIN 13 NPC-XMT-EN L)
(OPIN 19 NPC-SEL-1)
(OPIN 12 SPY-XCV-EN L)

(FIELD MAGIC U-MAGIC-1 U-MAGIC-0)

;; Control for spy bus buffer
(SETQ SPY-XCV-EN (OR SPY-WRITE
                     (AND SPY-READ (NOT SPY-ADDR-5) (NOT SPY-READ-DP-ID))))

;; Skip if U COND FUNC = 1 and not trapping
(SETQ SHOULD-SKIP (AND (FIELD U-COND-FUNC-1 U-COND-FUNC-0 1) (NOT TAKE-TRAP)))

;; Controls for the NPC input mux and the NPC to/from Lbus data path

;; Select alternate NPC inputs if special function or trap
(SETQ NPC-SEL-1 (OR SPEC-NPC-MAGIC TAKE-TRAP))

;; Special functions
(SETQ NPC-MUX-TO-LBUS (AND SPEC-NPC-MAGIC (FIELD MAGIC 1)))
(SETQ NPC-FROM-LBUS (AND SPEC-NPC-MAGIC (FIELD MAGIC 2)))

;; Various tristate enables.  Be careful not to drive bus inadvertently.
(SETQ NPC-MUX-EN (NOT NPC-FROM-LBUS))
(SETQ DRIVE-LBUS (AND NPC-MUX-TO-LBUS (NOT MC-WAIT) (NOT NOP)))
(SETQ NPC-XCV-EN (OR DRIVE-LBUS NPC-FROM-LBUS))
(SETQ NPC-XMT-EN DRIVE-LBUS))
```

DP - PAL

```
;-*- Mode:LISP; Package:USER; Base:10 -*-
; SPAL on DPSMC -- controls the BYTE S selection

;Byte Function 1 magic:
;  #2 = 1 => S=17
;  #2 = 0 => S=37 unless #=13 in which case S=17

(DEFPAL SPAL PAL16L8
  (IPIN 2 SREG-4)                         ;Inputs for high bit mux
  (IPIN 3 U-AMWA-9)
  (IPIN 4 U-COND-SEL-4)
  (IPIN 5 U-MAGIC-3)                      ;Magic number field
  (IPIN 6 U-MAGIC-2)
  (IPIN 7 U-MAGIC-1)
  (IPIN 8 U-MAGIC-0)
  (IPIN 9 U-BYTE-F-1)                     ;Byte Function field
  (IPIN 11 U-BYTE-F-0)

  (FIELD MAGIC U-MAGIC-3 U-MAGIC-2 U-MAGIC-1 U-MAGIC-0)
  (FIELD CASE U-MAGIC-1 U-MAGIC-0)
  (FIELD BYTE-F U-BYTE-F-1 U-BYTE-F-0)

  (OPIN 18 BYTE-S-4)                      ;High bit output
  (OPIN 17 BYTE-S-3)                      ;Low bits out with constants
  (OPIN 16 BYTE-S-2)
  (OPIN 15 BYTE-S-1)
  (OPIN 14 BYTE-S-0)
  (OPIN 13 S-SEL-2)                       ;Mux control for low 4 S bits
  (OPIN 19 S-SEL-1)
  (OPIN 12 S-SEL-0)

  (OE 17 S-SEL-2)                         ;Output enable for low bits
  (OE 16 S-SEL-2)
  (OE 15 S-SEL-2)
  (OE 14 S-SEL-2)

  (SETQ CONSTANT-S (FIELD BYTE-F (0 1)))
  (SETQ USE-SREG (AND (FIELD BYTE-F 3) (FIELD CASE 2)))
  (SETQ USE-AMWA (AND (FIELD BYTE-F 3) (FIELD CASE 0)))
  (SETQ USE-INST (AND (FIELD BYTE-F 3) (FIELD CASE 3)))
  (SETQ USE-COND (OR (AND (FIELD BYTE-F 3) (FIELD CASE 1))
                     (FIELD BYTE-F 2)))
  (SETQ S-SEL-2 CONSTANT-S)               ;PAL generates the constants
  (SETQ S-SEL-1 (OR USE-INST USE-COND))
  (SETQ S-SEL-0 (OR USE-AMWA USE-COND))

  (SETQ BYTE-S-4 (COND (USE-SREG SREG-4)
                       (USE-AMWA U-AMWA-9)
                       (USE-COND U-COND-SEL-4)
                       (USE-INST U-COND-SEL-4)  ;Only 8 INST bits!
                       (CONSTANT-S
                         (OR (FIELD BYTE-F 0)             ;37
                             (AND (FIELD BYTE-F 1)        ;37 except for...
                                  (NOT (OR (FIELD MAGIC #o13)  ;17 for these
                                           U-MAGIC-2)))))))
  (SETQ BYTE-S-3 T)                       ;Low 4 always on in constants for now
  (SETQ BYTE-S-2 T)
  (SETQ BYTE-S-1 T)
  (SETQ BYTE-S-0 T))
```

```
;-*- Mode:LISP; Package:USER; Base:10 -*-
; SHFMSK on DPSHMK
; Special modified version for low 2 bits
; If ALUB-SIGN-HACK is on, and you LDB out the sign bit,
; then you get the complement of the sign bit instead.

(DEFPAL SHFMSK0 PAL16L8
  (IPIN 18 SH-N+2)                ;Inputs from shifter
  (IPIN 17 SH-N+1)
  (IPIN 16 SH-N)
  (IPIN 15 SH-N-1)
  (IPIN 14 SH-N-2)
  (IPIN 2 XBUS-N+2)               ;Inputs to merge
  (IPIN 3 XBUS-N+1)
  (IPIN 5 MASK-N+2)               ;Inputs from mask prom
  (IPIN 6 MASK-N+1)
  (IPIN 7 ALUB-SIGN-HACK L)
  (IPIN 8 R1)                     ;Low bits of rotate amount
  (IPIN 9 R0)
  (IPIN 11 MERGE)                 ;Use XBUS (1) or 0 (0) as background
  (OPIN 13 ALUB-N+2)              ;Outputs
  (OPIN 19 ALUB-N+1)

 (SETQ ALUB-N+1
       (COND ((NOT MASK-N+1) (AND MERGE XBUS-N+1))        ;Background
             ((AND MASK-N+1 (NOT R1) (NOT R0)) SH-N+1)    ;Unshifted data
             ((AND MASK-N+1 (NOT ALUB-SIGN-HACK)          ;Shift left 1 normal
                   (NOT R1) R0) SH-N)
             ((AND MASK-N+1 ALUB-SIGN-HACK                ;Shift left 1 hacked
                   (NOT R1) R0) (NOT SH-N))
             ((AND MASK-N+1 R1 (NOT R0)) SH-N-1)          ;Shift left 2
             ((AND MASK-N+1 R1 R0) SH-N-2)))              ;Shift left 3

 (SETQ ALUB-N+2
       (COND ((NOT MASK-N+2) (AND MERGE XBUS-N+2))        ;0 background
             ((AND MASK-N+2 (NOT R1) (NOT R0)) SH-N+2)    ;Unshifted data
             ((AND MASK-N+2 (NOT R1) R0) SH-N+1)          ;Shift left 1
             ((AND MASK-N+2 R1 (NOT R0)) SH-N)            ;Shift left 2
             ((AND MASK-N+2 R1 R0) SH-N-1))))             ;Shift left 3

;-*- Mode:LISP; Package:USER; Base:10 -*-
; SHFMSK on DPSHMK

(DEFPAL SHFMSK PAL16L8
  (IPIN 18 SH-N+2)                ;Inputs from shifter
  (IPIN 17 SH-N+1)
  (IPIN 16 SH-N)
  (IPIN 15 SH-N-1)
  (IPIN 14 SH-N-2)
  (IPIN 1 SH-N-3)
  (IPIN 2 XBUS-N+2)               ;Inputs to merge
  (IPIN 3 XBUS-N+1)
  (IPIN 4 XBUS-N)
  (IPIN 5 MASK-N+2)               ;Inputs from mask prom
  (IPIN 6 MASK-N+1)
  (IPIN 7 MASK-N)
  (IPIN 8 R1)                     ;Low bits of rotate amount
  (IPIN 9 R0)
  (IPIN 11 MERGE)                 ;Use XBUS (1) or 0 (0) as background
  (OPIN 13 ALUB-N+2)              ;Outputs
  (OPIN 19 ALUB-N+1)
  (OPIN 12 ALUB-N)

 (SETQ ALUB-N
       (COND ((NOT MASK-N) (AND MERGE XBUS-N))            ;Background
             ((AND MASK-N (NOT R1) (NOT R0)) SH-N)        ;Unshifted data
             ((AND MASK-N (NOT R1) R0) SH-N-1)            ;Shift left 1
             ((AND MASK-N R1 (NOT R0)) SH-N-2)            ;Shift left 2
             ((AND MASK-N R1 R0) SH-N-3)))                ;Shift left 3

 (SETQ ALUB-N+1
       (COND ((NOT MASK-N+1) (AND MERGE XBUS-N+1))        ;Background
             ((AND MASK-N+1 (NOT R1) (NOT R0)) SH-N+1)    ;Unshifted data
             ((AND MASK-N+1 (NOT R1) R0) SH-N)            ;Shift left 1
             ((AND MASK-N+1 R1 (NOT R0)) SH-N-1)          ;Shift left 2
             ((AND MASK-N+1 R1 R0) SH-N-2)))              ;Shift left 3

 (SETQ ALUB-N+2
       (COND ((NOT MASK-N+2) (AND MERGE XBUS-N+2))        ;0 background
             ((AND MASK-N+2 (NOT R1) (NOT R0)) SH-N+2)    ;Unshifted data
             ((AND MASK-N+2 (NOT R1) R0) SH-N+1)          ;Shift left 1
             ((AND MASK-N+2 R1 (NOT R0)) SH-N)            ;Shift left 2
             ((AND MASK-N+2 R1 R0) SH-N-1))))             ;Shift left 3

;-*- Mode:LISP; Package:USER; Base:10 -*-
; RREG on DPSMC  (for the rev-3 board)

(DEFPAL RREG PAL16R6
  (IPIN 19 LOAD L)                ;Clock enable
  (IPIN 12 FROM-DISP)             ;Source select
  (IPIN 2 DISP-2 L)               ;Dispatch (array type)
  (IPIN 3 DISP-1 L)
  (IPIN 4 DISP-0 L)
```

```
(IPIN 5 OBUS-4)              ;Output bus
(IPIN 6 OBUS-3)
(IPIN 7 OBUS-2)
(IPIN 8 OBUS-1)
(IPIN 9 OBUS-0)
(RPIN 17 R-4)                ;Registered outputs
(RPIN 16 R-3)
(RPIN 15 R-2)
(RPIN 14 R-1)
(RPIN 13 R-0)

;Decode of control field
(SETQ HOLD (NOT LOAD))
(SETQ LOAD-OBUS (AND LOAD (NOT FROM-DISP)))
(SETQ LOAD-DISP (AND LOAD FROM-DISP))

;Load register from self, obus, or func(disp)
(SETQ R-0 (COND (HOLD R-0)
                (LOAD-OBUS OBUS-0)
                (LOAD-DISP (FIELD DISP-2 DISP-1 DISP-0 (0 2 4)))))
(SETQ R-1 (COND (HOLD R-1)
                (LOAD-OBUS OBUS-1)
                (LOAD-DISP (FIELD DISP-2 DISP-1 DISP-0 (0 3 4)))))
(SETQ R-2 (COND (HOLD R-2)
                (LOAD-OBUS OBUS-2)
                (LOAD-DISP (FIELD DISP-2 DISP-1 DISP-0 (1 2 3 4)))))
(SETQ R-3 (COND (HOLD R-3)
                (LOAD-OBUS OBUS-3)
                (LOAD-DISP (FIELD DISP-2 DISP-1 DISP-0 (0 1 2 3 4)))))
(SETQ R-4 (COND (HOLD R-4)
                (LOAD-OBUS OBUS-4)
                (LOAD-DISP (FIELD DISP-2 DISP-1 DISP-0 (0 1 2 3 4))))))

;-*- Mode:LISP; Package:USER; Base:10 -*-
; RPAL on DPSMC -- controls the BYTE R selection

;Byte Function 1 magic:
;  #2 = 1 => R=20, #3 = rotate-mask
;  #2 = 0 =>
;       #3 -> 20 bit of R
;       -#1 -> 16 bits of R
;       -#0 -> 01 bit of R
;       Thus:
;       0 -> 17        1 -> 16        2 -> 1         3 -> 0
;       10 -> 37       11 -> 36       12 -> 21       13 -> 20
;       Only codes 2, 3, 10, and 13 are used I believe

(DEFPAL RPAL PAL16L8
  (IPIN 2 RREG-4)                     ;Inputs for high bit mux
  (IPIN 3 U-AMWA-4)
  (IPIN 4 INST-4)
  (IPIN 5 U-MAGIC-3)                  ;Magic number field
  (IPIN 6 U-MAGIC-2)
  (IPIN 7 U-MAGIC-1)
  (IPIN 8 U-MAGIC-0)
  (IPIN 9 U-BYTE-F-1)                 ;Byte Function field
  (IPIN 11 U-BYTE-F-0)

  (FIELD MAGIC U-MAGIC-3 U-MAGIC-2 U-MAGIC-1 U-MAGIC-0)
  (FIELD CASE U-MAGIC-1 U-MAGIC-0)
  (FIELD BYTE-F U-BYTE-F-1 U-BYTE-F-0)

  (OPIN 18 BYTE-MERGE)                ;Background from Xbus
  (OPIN 17 ROTATE-MASK)
  (OPIN 16 BYTE-R-4 L)                ;High bit output
  (OPIN 15 BYTE-R-4)
  (OPIN 14 R-PAL-1-3)                 ;Bits 1-3 of constants
  (OPIN 13 R-PAL-0)                   ;Bit 0 of constants
  (OPIN 19 R-SEL-1)                   ;Mux control for low 4 R bits
  (OPIN 12 R-SEL-0)

  (SETQ CONSTANT-R (FIELD BYTE-F (0 1 2)))
  (SETQ USE-RREG (AND (FIELD BYTE-F 3) (FIELD CASE (1 2))))
  (SETQ USE-AMWA (AND (FIELD BYTE-F 3) (FIELD CASE 0)))
  (SETQ USE-INST (AND (FIELD BYTE-F 3) (FIELD CASE 3)))
  (SETQ R-SEL-1 (OR USE-INST CONSTANT-R))
  (SETQ R-SEL-0 (OR USE-AMWA CONSTANT-R))

  (SETQ BYTE-MERGE (AND (FIELD BYTE-F 3) U-MAGIC-2))
  (SETQ ROTATE-MASK (COND ((FIELD BYTE-F 3) U-MAGIC-3)
                          ((FIELD BYTE-F 1)
                           (OR (AND U-MAGIC-2 U-MAGIC-3)
                               (FIELD MAGIC #o13)))))

  (SETQ BYTE-R-4 (COND (USE-RREG RREG-4)
                       (USE-AMWA U-AMWA-4)
                       (USE-INST INST-4)
                       (CONSTANT-R
                         (AND (FIELD BYTE-F 1)
                              (OR U-MAGIC-3 U-MAGIC-2)))))

  (SETQ R-PAL-0 (AND (FIELD BYTE-F 1) (NOT U-MAGIC-2) (NOT U-MAGIC-0)))
  (SETQ R-PAL-1-3 (AND (FIELD BYTE-F 1) (NOT U-MAGIC-2) (NOT U-MAGIC-1))))
```

```
; -*- Mode:Lisp; Package:User; Base:10 -*-

; PAL#2 for DPDCOD
; Decodes miscellaneous special functions, mostly for the ALU.

(DEFPAL DPDCOD2 PAL16L8
  (OPIN 18 WEIRD-ALU-FCN)                  ;Select second set of 16 ALU functions
  (OPIN 17 TRAP-IF-BBUS-NOT-FIXNUM)        ;To DPTRAP print
  (OPIN 16 TRAP-IF-TYPE-COND)              ;To DPTRAP print
  (OPIN 15 TEST-ANY-STACK)                 ;To DPGC print
  (OPIN 14 TEST-OTHER-STACK)               ;To DPGC print
  (OPIN 19 EXTENDED-BMWA L)                ;To DPBMA print
  (OPIN 12 MPY-TO-XBUS L)                  ;To DPMPY print

  (IPIN 2 U-MAGIC-3)             ;Magic-number field, extends spec func
  (IPIN 3 U-MAGIC-2)
  (IPIN 4 U-MAGIC-1)
  (IPIN 5 U-MAGIC-0)
  (IPIN 6 U-SPEC-4)              ;Special function field
  (IPIN 7 U-SPEC-3)
  (IPIN 8 U-SPEC-2)
  (IPIN 9 U-SPEC-1)
  (IPIN 11 U-SPEC-0)

  (FIELD SPEC U-SPEC-4 U-SPEC-3 U-SPEC-2 U-SPEC-1 U-SPEC-0)
  (FIELD MAGIC U-MAGIC-3 U-MAGIC-2 U-MAGIC-1 U-MAGIC-0)

  (SETQ ARITHMETIC-MAGIC (FIELD SPEC #o(10 30)))
  (SETQ WEIRD-ALU-FCN (AND ARITHMETIC-MAGIC U-MAGIC-2))

  ;; Type checking
  (SETQ TRAP-IF-BBUS-NOT-FIXNUM (OR (AND ARITHMETIC-MAGIC U-MAGIC-1)
                                    (FIELD SPEC #o(12 13))))
  (SETQ TRAP-IF-TYPE-COND (OR (AND ARITHMETIC-MAGIC U-MAGIC-0)
                              (FIELD SPEC #o(11 12 13))))

  ;; Miscellaneous decodes
  (SETQ CROCKS (FIELD SPEC #o14))
  (SETQ GC-CROCKS (AND CROCKS (NOT U-MAGIC-3)))
  (SETQ TEST-ANY-STACK (AND GC-CROCKS U-MAGIC-0))
  (SETQ TEST-OTHER-STACK (AND GC-CROCKS U-MAGIC-1))
  (SETQ EXTENDED-BMWA (AND CROCKS (FIELD MAGIC #o10)))

  (SETQ MULTIPLY (FIELD SPEC #o(13 17)))
  (SETQ MPY-TO-XBUS (AND MULTIPLY (NOT U-MAGIC-1) U-MAGIC-2)))

; -*- Mode:Lisp; Package:User; Base:10 -*-

; PAL#1 for DPDCOD
; Generates ALU control signals for overflow, and decodes spec field.
; Almost all of the spec field decodes are in the other PAL now, where
; they can see the magic-number field.

(DEFPAL DPDCOD1 PAL16L8
  ;; Special function section
  (OPIN 18 ALUB-SIGN-HACK L)
  (OPIN 17 MULTIPLY L)
  (OPIN 16 CROCKS-TO-YBUS L)               ;To DPYSL2 print

  (IPIN 6 U-SPEC-4)              ;Special function field
  (IPIN 7 U-SPEC-3)
  (IPIN 8 U-SPEC-2)
  (IPIN 9 U-SPEC-1)
  (IPIN 11 U-SPEC-0)

  (FIELD SPEC U-SPEC-4 U-SPEC-3 U-SPEC-2 U-SPEC-1 U-SPEC-0)
  (SETQ ALUB-SIGN-HACK (FIELD SPEC #o15))
  (SETQ MULTIPLY (FIELD SPEC #o(13 17)))
  (SETQ CROCKS-TO-YBUS (FIELD SPEC #o16))

  ;; ALU Overflow Controls
  (OPIN 19 OVFL-F)               ;ALU function to overflow calculator
  (OPIN 12 OVFL-F L)             ;ALU wants both senses at equal speed

  (IPIN 1 ALUB-31)
  (IPIN 2 XBUS-31)
  (IPIN 3 ALUF-2)                ;Only look at these two bits of ALU fcn, since
  (IPIN 4 ALUF-1)                ;only A+1,A-1,A+B,and A-B work anyway.
  (IPIN 5 TRAP-IF-OVERFLOW)      ;Microcode enable for overflow checking

  (SETQ ADD (FIELD ALUF-2 ALUF-1 1))
  (SETQ SUB (FIELD ALUF-2 ALUF-1 2))
  (SETQ INC (FIELD ALUF-2 ALUF-1 0))
  (SETQ DEC (FIELD ALUF-2 ALUF-1 3))

  (SETQ SIGNS-DIFFER (OR (AND (NOT XBUS-31) ALUB-31)
                         (AND XBUS-31 (NOT ALUB-31))))

  (SETQ ENABLE (AND TRAP-IF-OVERFLOW
                    (OR (AND ADD (NOT SIGNS-DIFFER))
                        (AND SUB SIGNS-DIFFER)
                        INC DEC)))
```

```
;Select EQV (function 63) if overflow check enabled
;Select SETO (function 71) if overflow check not enabled
(SETQ OVFL-F ENABLE))

; -*- Mode:Lisp; Package:User; Base:10 -*-

; PAL for DPBAS4 to generate various base register control signals
; Use with the rev.3 board

(DEFPAL BASECTL PAL16L8
  (OPIN 18 W-STKP-BASE)           ;Amem Write uses stack-pointer as base
  (OPIN 17 W-FRMP-BASE)           ; .. uses frame-pointer
  (OPIN 16 W-INST-STKP)           ; .. uses stack-pointer, selected by INST
                                  ;       hence generate carry into adder
  (OPIN 15 AMEM-WRITE)            ;This cycle writing Amem
  ;(OPIN 14 NC)   ;not used
  (OPIN 13 ABUS-OFFBOARD L)       ;Enable input to come from memory control
  (OPIN 19 BASE-TO-ABUS L)        ;U-R-BASE-0 selects stack- or frame-pointer
  (OPIN 12 AMEM-TO-ABUS L)        ;A memory is Abus source

  (IPIN 1 U-W-BASE-1)             ;Amem write base-register select
  (IPIN 2 U-W-BASE-0)
  (IPIN 3 U-R-BASE-1)             ;Amem read base-register select
  ;(IPIN 4 U-R-BASE-0)  ;not used
  (IPIN 5 U-AMRA-SEL-1)           ;Amem read address select
  (IPIN 6 U-AMRA-SEL-0)
  (IPIN 7 INST-7)                 ;Sign bit of macroinstruction offset
  (IPIN 8 ADDR-IN-AMEM L)         ;Lbus address maps into Amem
  (IPIN 9 U-AMWA-SEL-PMA L)       ;Amem write address select -> Lbus address
  (IPIN 11 NOP L)                 ;Inhibit writing from this instruction

  (SETQ W-INST-STKP (AND (FIELD U-W-BASE-1 U-W-BASE-0 3) INST-7))
  (SETQ W-INST-FRMP (AND (FIELD U-W-BASE-1 U-W-BASE-0 3) (NOT INST-7)))
  (SETQ W-STKP-BASE (OR (FIELD U-W-BASE-1 U-W-BASE-0 0) W-INST-STKP))
  (SETQ W-FRMP-BASE (OR (FIELD U-W-BASE-1 U-W-BASE-0 1) W-INST-FRMP))

  ;Amem-write is on unless write-address is @Lbus-addr, in which case it is enabled
  ;by an enable and Addr-in-AMem.  Also it is inhibited by NOP.
  (SETQ AMEM-WRITE (NOT (OR (AND U-AMWA-SEL-PMA
                                 (NOT (AND ADDR-IN-AMEM U-W-BASE-1)))
                            NOP)))

  (SETQ AMRA-SEL-@ADDR (FIELD U-AMRA-SEL-1 U-AMRA-SEL-0 1))
  (SETQ AMRA-SEL-BASE (FIELD U-AMRA-SEL-1 U-AMRA-SEL-0 3))

  (SETQ AMEM-TO-ABUS (COND (AMRA-SEL-@ADDR ADDR-IN-AMEM)
                           ((NOT AMRA-SEL-@ADDR) (NOT AMRA-SEL-BASE))))
  (SETQ BASE-TO-ABUS (AND AMRA-SEL-BASE (NOT U-R-BASE-1)))
  (SETQ ABUS-OFFBOARD (OR (AND AMRA-SEL-BASE U-R-BASE-1)
                          (AND AMRA-SEL-@ADDR (NOT ADDR-IN-AMEM)))))

; -*- Mode:Lisp; Package:User; Base:8 -*-

; Program to make the mask proms.  Same package as PROMP.

;Arrays containing the MB7138H data
(defvar mask0 (make-array 2048. ':type 'art-8b))
(defvar mask1 (make-array 2048. ':type 'art-8b))
(defvar mask2 (make-array 2048. ':type 'art-8b))
(defvar mask3 (make-array 2048. ':type 'art-8b))

#M
(declare (fixnum m r s rotate value mask))

#M
(defmacro <= (arg1 arg2 &rest more-args)
  (cond ((null more-args) `(not (> ,arg1 ,arg2)))
        (t `(and (not (> ,arg1 ,arg2))
                 (<= ,arg2 . ,more-args)))))

(defun store-mask (r s rotate value)
  (or (<= 0 r 37) (ferror nil "~S bad value for R" r))
  (or (<= 0 s 37) (ferror nil "~S bad value for S" s))
  (or (<= 0 rotate 1) (ferror nil "~S bad value for Rotate-Mask" rotate))
  (let ((adr (+ r (lsh rotate 5) (lsh s 6))))
    (aset (ldb 0010 value) mask0 adr)
    (aset (ldb 1010 value) mask1 adr)
    (aset (ldb 2010 value) mask2 adr)
    (aset (ldb 3010 value) mask3 adr)))

(defun fetch-mask (r s rotate)
  (or (<= 0 r 37) (ferror nil "~S bad value for R" r))
  (or (<= 0 s 37) (ferror nil "~S bad value for S" s))
  (or (<= 0 rotate 1) (ferror nil "~S bad value for Rotate-Mask" rotate))
  (let ((adr (+ r (lsh rotate 5) (lsh s 6))))
    (dpb (aref mask3 adr) 3010
         (dpb (aref mask2 adr) 2010
              (dpb (aref mask1 adr) 1010
                   (aref mask0 adr))))))
```

```
(defun setup-mask-proms ()
  ;The unrotated masks are simple enough
/ (loop for s from 0 to 37
        as mask = 1 then (1+ (* mask 2))
        do (loop for r from 0 to 37
                 do (store-mask r s 0 mask)))
  ;The rotated masks provide for wrap-around bytes, probably unnecessary
  (loop for s from 0 to 37
        as mask = 1 then (1+ (* mask 2))
        do (loop for r from 0 to 37
                 as m = mask then (+ (logand #.(1- 1_32.) (* m 2))
                                     (ldb 3701 m))
                 do (store-mask r s 1 m))))

(setup-mask-proms)

 Function to print them out since we can't program them ourselves right now.
(defun print-mask-proms (file &aux (base 8))
  (with-open-file (standard-output file ':print)
    (loop for prom in '(mask0 mask1 mask2 mask3)
          do (format t "~A Prom:~2%~15<Octal Location~>~15<Hex Location~>~15<Octal
          Contents~>~15<Hex Contents~
              (setq prom (symeval prom))
              (dotimes (i 2048.)
                (format t "~15O~12X" i)
                (hex-print i 3)
                (format t "~15O~13X" (aref prom i))
                (hex-print (aref prom i) 2)
                (terpri))
              (tyo #\page))))

(defun hex-print (number n-digits)
  (loop repeat n-digits
        as divisor = (^ 16. (1- n-digits)) then (// divisor 16.)
        do (tyo (nth (\ (// number divisor) 16.)
                     '(#/0 #/1 #/2 #/3 #/4 #/5 #/6 #/7 #/8 #/9 #/A #/B #/C #/D #/E #/F)))))
```

What is claimed is:

1. In a method of data processing in a processor programmable in a symbolic programming language of the type including LISP and having automatic memory reclamation, wherein the processor repeatedly applies address words to gain memory to write data structures into main memory and read data structures from main memory to perform operations thereon, and the processor allocates previously used portions of main memory for writing data structures by reclaiming same, the improvement wherein the step of reclaiming comprises:

a. defining address regions in main memory including a main space and a relatively smaller subsidiary space;
b. writing new data structures into subsidiary space until it is full; and
c. reclaiming subsidiary space when it is full by
   i. detecting the writing of a data structure into main space having a pointe into subsidiary space;
   ii. adding memory locations of pointer detected in step (i) to a given data structure;
   iii. halting operation of the processor;
   iv. locating all pointers to subsidiary space by referencing the given data structure;
   v. locating useful data structures in subsidiary space from the pointers located in step (iv) and;
   vi. copying the located useful data structures into main space until there are no further pointers into subsidiary space.

2. The method according to claim 1, wherein the operation of detecting the writing of a pointer comprises referencing a table of addresses indexed by at least some bits of the location being written to indicate if the address is in main space and referencing a table of addresses indexed by at least some bits of the contents of the pointer being written to indicate if the pointer being written is a pointer to subsidiary space.

3. The method according to claim 2, wherein the steps of referencing the tables is performed in parallel with writing into memory.

4. The method according to claim 1, wherein the step of adding comprises setting a bit in a table indexed by at least some bits of the address being written.

5. The method according to claim 1, further comprising separating main space into pages of memory, writing pages of memory into a secondary storage device, scanning each page of memory when written into the secondary storage device to see if the page contains a pointer to secondary space, updating an associated data structure to indicate for each page when a pointer to subsidiary space is present, thereafter reclaiming subsidiary space by copying the data structures pointed to by the pointers of the indicated pages.

6. The method according to claim 1, further comprising:

defining three address regions in the main space including an old space, a copy space and a new space; and reclaiming old space during the repeated reading and writing by the processor by determining if an address desired by the processor is in old space by examining the address word in parallel with applying the address word to main memory and producing a trap if the address corresponds to old space and, if the trap is produced, copying the data structure associated with the address into a new address in copy space and writing a pointer into the address in old space indicating the new address in copy space and accessing each address in copy space to see if the data structure therein has a pointer to old space and if such pointer is present, moving the data structure from old space to a new address in copy space and updating the data structure of the accessed address in copy space to include a pointer to the new address in copy space.

* * * * *